United States Patent [19]

Carron et al.

[11] Patent Number: 4,724,521

[45] Date of Patent: Feb. 9, 1988

[54] METHOD FOR OPERATING A LOCAL TERMINAL TO EXECUTE A DOWNLOADED APPLICATION PROGRAM

[75] Inventors: James M. Carron, Aiea; Brian K. Uechi; Mohammed A. Khan, both of Honolulu; Clifton W. Royston, III; Jay A. Abel, both of Honolulu; Bradley J. Ferlane; Robert K. L. Loui, both of Honolulu; William R. Pape, III, Papaaloa, all of Hi.

[73] Assignee: Veri-Fone, Inc., Honolulu, Hi.

[21] Appl. No.: 819,186

[22] Filed: Jan. 14, 1986

[51] Int. Cl.⁴ .............................................. G06F 15/16

[52] U.S. Cl. ..................................... 364/300; 364/200

[58] Field of Search ................. 364/200 MS File, 300

[56] References Cited

U.S. PATENT DOCUMENTS 4,459,662 7/1984 Skelton et al. ...................... 364/200

*Primary Examiner*—Raulfe B. Zache

*Attorney, Agent, or Firm*—Lowell C. Bergstedt

[57] ABSTRACT

The present invention provides methods for operating a local terminal which includes a programmable computer so that the terminal executes a pre-arranged application program. More specifically, the present invention provides methods for operating a local terminal according to a pre-arranged application program which is created on a remote computer, then communicated by a communication channel to the local terminal where it is stored for execution.

18 Claims, 65 Drawing Figures

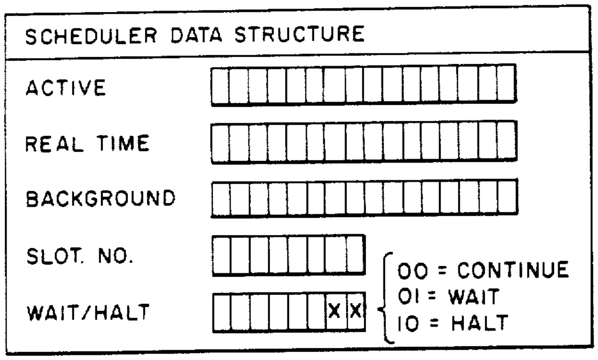
FIG. 12A
| DEVICES BYTE | |
|---|---|
| BIT NO. | ASSOCIATED DEVICE |
| 0 | CARD READER |
| 1 | KEYBOARD |
| 2 | MODEM |
| 3 | RS 232 PORT |
| 4 | PIN PAD |
| 5 | PHONE STATUS |
| 6 | TIMER |
| 7 | RUN. NO. INPUT |
FIG. 12E
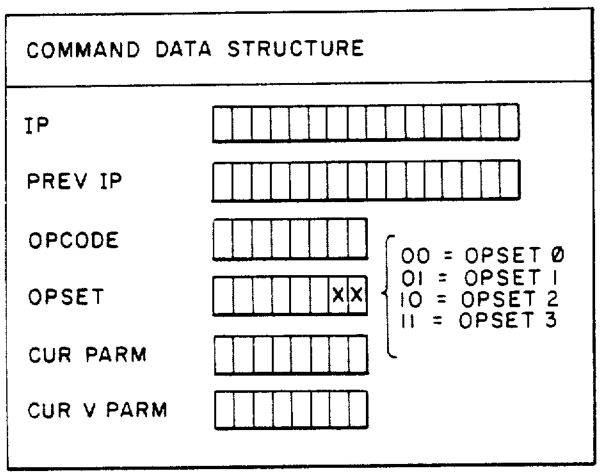
FIG. 12B
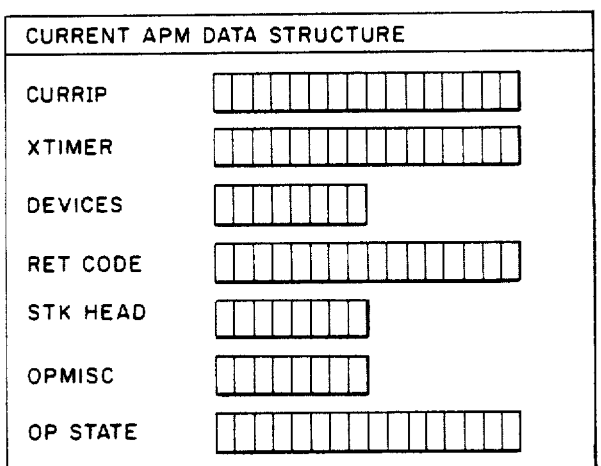
DATA STRUCTURES IN RAM
FIG. 12C
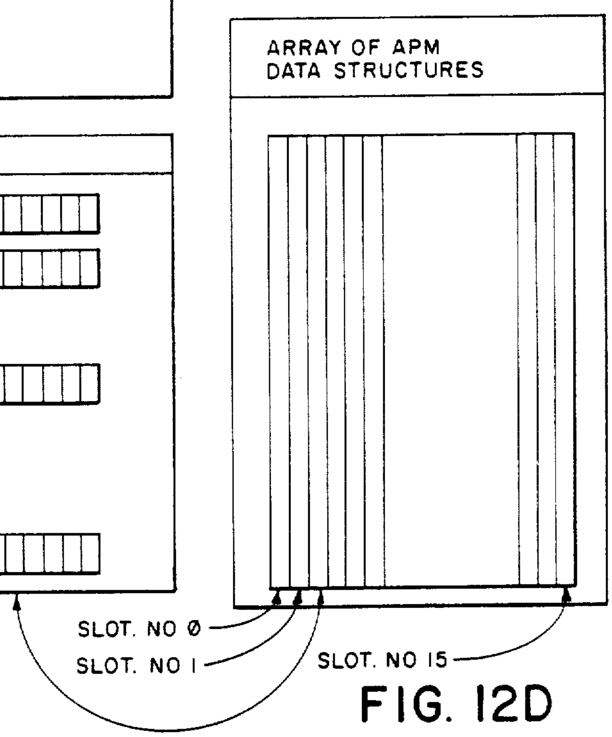
FIG. 12D

| DEVICES BYTE | |
|---|---|
| BIT. NO | DEVICE |
| 0 | CARD READER |
| 1 | KEYBOARD |
| 2 | MODEM |
| 3 | RS 232 |
| 4 | PIN PAD |
| 5 | PHONE |
| 6 | TIMER |
| 7 | (RESVD) |

METHOD FOR OPERATING A LOCAL TERMINAL TO EXECUTE A DOWNLOADED APPLICATION PROGRAM

Field of the Invention
Background and Prior Art
- 1. Demand for Point of Transaction Terminals with Custom Application Programs
- 2. Prior Art Approaches to Custom Terminal Programming
- 3. Prior Art of Downloading Program Information Summary of the Invention
- 1. Objects of this Invention
- 2. Features and Advantages of this Invention
  - a. Reduced Code Size for Application Program Download
  - b. The Programming Language Feature of This Invention
  - c. Concurrent Scheduling of Application Program Modules Brief Description of Drawing Figures
Detailed Description of Embodiments of the Invention
BACKGROUND ENVIRONMENT OF THE INVENTION
- 1. Illustrative Example of Local Terminal Features and Operation (FIGS. 1A and 1B)
  - a. The Telephone Function
  - b. The Calculator Function
  - c. The Transaction Terminal Functions
  - d. Standard and Custom Terminal Features
- 2. Illustrative Example of Local Terminal Hardware Environment for the Invention (FIGS. 2 and 3)

GENERAL METHOD OF THIS INVENTION
- 1. The Core Programming Methodology
  - a. Establishing the General Purpose Operation Routines
  - b. Defining a Set of Commands
    - (1) General Aspects
    - (2) Preferred Command Structure and Syntax
    - (3) Object Code Syntax of Defined Commands (FIGS. 4A and 4B)
    - (4) Alternative Operation Code Systems and Associated Object Code Command Syntax (FIGS. 5–8)
    - (5) Compiling Source Code Commands into Object Code Command Syntax
  - c. Storing the General Purpose Operation Routines
    - (1) The Preferred Storage and Accessing System (FIG. 9)
    - (2) Alternative Storage and Accessing Systems (FIGS. 10 and 11)
- 2. Establishing an Application Program Module
- 3. Communicating the Application Program Module to the Local Terminal
- 4. Establishing a Program Execution Routine
  - a. Data Structures and Arrays used in Executing Application Program Module (APM) Commands (FIGS. 12 and 13)
  - b. Execution of an Application Program Module Command (FIG. 14)
    - (1) Decoding Bitmap and Opcode Bytes
    - (2) Checking Validity of Opset and Opcode Values
    - (3) Parsing Command Parameters and Executing the Operation Routine
  - c. Specific Example of Execution of an Application Program Module Command
    - (1) Executing Command Parsing Module XA (FIGS. 9 and 15)
      - (a) Parsing Control Routine for Parameter Type X (FIG. 16)
      - (b) Parsing Routine BC for Constant-Byte Data Type (FIG. 17)
      - (c) Parsing Routine VS for Variable-Byte Data Type (FIG. 18)
      - (d) Parsing Routine EB for Extended-Byte Data Type (FIG. 19)
      - (e) Parsing Routine SV for Stack Ref.-Byte Data Type (FIG. 20)
      - (f) Parsing Control Routine for Parameter Type A (FIG. 21)
      - (g) Parsing Routine EA for Extended-Address Data Type (FIG. 22)
      - (h) Other Data Type Parsing Routines
    - (2) Executing Associated Operation Routine—The Start Job Command (FIGS. 23–25)
      - (a) The APMACTIVE Routine (FIG. 24)
      - (b) The STARTAPM Routine (FIG. 25)
  - d. Other Application Program Modules Utilizing the XA Type of Parsing Control Routine
    - (1) The CHK_JOB_DONE (CHK.APM.DONE) Command (FIG. 26)
    - (2) The START_BACK Command
  - e. Other APM Commands Which Use Both Parameter Address and Value—The INC_INT Command (FIG. 52)
- 5. Alternative Command Execution Routines
  - a. Alternative Routines Involving Alternative APM Storage and Accessing Systems
  - b. Alternative Routines for Executing APM Commands Using Alternative Bitmap/Operation Code Systems (FIGS. 27 and 28)

ALTERNATE IMPLEMENTATION OF GENERAL METHOD OF THE INVENTION
- 1. State Table Module
- 2. Interpreter Routine
  - a. Entry from Ready State
  - b. Opcode (APM Command) Execution Routine
  - c. Opcode (APM Command) Termination
- 3. Opcode Group of Operation Routines
- 4. External Event Processing Routines APPLICATION PROGRAM MODULE SCHEDULING METHOD
- 1. Data Structures Associated with the Scheduler Methodology (FIG. 12)
  - a. The Bitmaps of the Scheduler Data Structure (FIG. 12A)
  - b. Other Data Elements in the Scheduler Data Structure
- 2. One Version of the Scheduler Methodology of this Invention (FIG. 29)
  - a. The Read Input Routine (FIG. 30)
  - b. The ACTION.START.APM Routine (FIGS. 31 and 32)
  - c. The ACTIVE SCHEDULER Routine (FIG. 33)
  - d. The CHECK/EXECUTE Routine (FIG. 34) as Called by the ACTIVE SCHEDULER Routine
  - e. The REALTIME SCHEDULER Routine (FIG. 35)
  - f. The CHECK/EXECUTE Routine (FIG. 34) when called by the REALTIME SCHEDULER Routine
  - g. Alternative CHECK/EXECUTE Routines (FIG. 36)

h. Initiating APM Execution from Input
(1) State Table Look-Up of Input—the STATE.-TABLE.LOOKUP Routine (FIGS. 37A and 37B)
(2) Alternative Approaches to Initiating Execution of APMs
i. Execution of the DO.ACTION Routine (FIG. 52)
j. Execution of APM Commands which Terminate Execution of APMs
(1) The HALT Command (FIGS. 38–40) and the ABORT.STATE.TABLE.ACTIONS Routine (FIG. 49)
(2) Executing the STOPAPM Routine from the HALT Routine (FIG. 39)
(3) The SLOT.KILL Routine (FIG. 40)
(4) The STOPAPM Routine Continued (FIG. 39)
(5) The ABORT.STATE.TABLE.ACTIONS Subroutine (FIG. 49)
(6) The R_ABORT Action and Associated Subroutines (FIGS. 53, 49, and 54)
(7) The DONE Command and Associated Operation Routine (FIG. 41)
(8) The STOPAPM Routine as Executed from the DONE Routine (FIGS. 39 and 41)
(9) Executing the STOP_JOB Command and Associated Operation Routine (FIG. 42)
(10) The STOP_BACK Command and Associated Operation Routine (FIG. 43)
k. Commands and Associated Operation Routines that Suspend Execution of APMs
(1) The WAITFOR_JOB Command and Associated Operation Routine (FIG. 44)
(2) The NEED_INPUT, CHK_INSRCE and WAIT_JUMP Command Sequence
(a) The NEED_INPUT Command and Associated Operation Routine (FIG. 45)
(b) The CHK_INSRCE Command and Associated Operation Routine (FIG. 46)
(c) The WAIT_JUMP Command and Associated Operation Routine (FIG. 47)
l. Execution of other APM Commands which Manipulate Bitmaps in the Scheduler Data Structure
3. Example of an APM which Utilizes Concurrent Execution of Subsidiary APMs
4. Alternative Versions of Scheduler Methodology
OTHER PROGRAM COMPONENTS RESIDENT IN THE LOCAL TERMINAL
1. The Power-On Routine (FIG. 49)
2. The Executive Error Routine (FIG. 50)
3. The Download Control Code
4. Other Miscellaneous Program Components
a. Data Entry Routines
b. Control String Interpreter
c. The Operating System
d. File Manager System
e. Direct Download Program
f. Miscellaneous Support Routines
ESTABLISHING AN APPLICATION PROGRAM
1. The Tools Utilized in Establishing an Application Program
a. The Preprocessor Program: PREZAPD
b. The Assembler Program: ZAPDASM
2. Creating the Source Code of the Application Program
PERFORMING THE PROGRAM COMMUNICATION STEP
1. General Aspects of the Communication Step
2. The ROM-resident Routine R_LOADON Executed to Call For Download of an Application Program (FIG. 55)
3. The Communication Protocol in a Specific Version of the Application Program Downloading Methodology
4. The Downloaded Data in a Specific Version of the Communication Step of This Invention
a. General Aspects
b. The Binary Download
(1) The Fixed Portion
(2) The Variable Size Portion
c. The File and Record Download
ADVANTAGES OF THE METHODOLOGY OF THE INVENTION

FIELD OF THE INVENTION

This invention relates generally to methods for operating a local terminal which includes a programmable computer so that the terminal executes a prearranged application program. More specifically, this invention relates to methods for operating a local terminal according to a prearranged application program which is created on a remote computer, then communicated via a communication channel to the local terminal where it is stored for execution.

BACKGROUND AND PRIOR ART

1. Demand for Point of Transaction Terminals with Custom Application Programs Substantial performance improvements in integrated circuits for the microcomputer and telecommunications fields have been made in recent years so that functionally enhanced integrated circuits are available at the same or, lower price. These cost/performance improvements have made it attractive to mass produce and deploy computer based systems which employ integrated circuit technology. One such system application is the point of sale transaction terminal for credit verification and credit transaction data capture. Another application is the automated bank teller terminal which enables the unattended performance of a number of types of banking transactions.

Other applications involve a wide variety of local data capture terminals which communicate with a remote host computer. It is anticipated that such system applications will eventually extend the technology into home banking terminals for transfer of money between accounts, automated payment of bills, and potentially a wide variety of other financial and non-financial transactions.

The principal customers for point of sale transaction terminals of all types are major financial institutions, including banks, savings and loan associations, and credit operations of major chains of retail stores. For a variety of reasons, different customers for point of sale transaction terminals need or desire to customize the functions of their terminals. Banks and other financial institutions are in the process of extending their walls to the merchant's checkout counter and point of sale transaction terminals are a major factor in this extension of services.

For strong merchant acceptance, the features of point of sale transaction terminals must be tailored to meet the specifically perceived, different needs of each of the different merchant groups that represent the ultimate customers for the terminal. Even among merchant groups where the services needed are essentially the same, there is no standard approach to providing these services. Thus to satisfy the needs and demands of the marketplace, point of sale transaction terminals must be able to be customized for the particular application at which they are directed. To achieve this result, the computer program being executed by the local computer system in the local terminal must be a custom application program. In addition to providing point of sale transaction terminals initially with custom application programs, customers will often need or desire to alter the application program to add or change a feature or to remedy a problem or defect discovered in the program after the terminal is installed. The customer desiring or needing a program revision may have a large number of terminals physically located at many different places.

2. Prior Art Approaches to Custom Terminal Programming

Providing custom application programs for point of sale transaction terminals results in major problems for both the vendor of the terminals and the customer. The standard approach to programming a local terminal is to load the application program into one or more integrated circuits of the programmable read only memory type and then to physically install those program memory circuits in the terminals to be supplied to the customer. If the vendor is supplying terminals with different custom application programs to a number of different customers, there is a basic problem associated with maintaining segregated inventories of the different program memory circuits.

In a typical case of generating a custom application program for a particular customer, the program will evolve through several versions before it achieves satisfactory functionality. When the program is accepted by the customer, typically thousands of terminals are delivered and installed at widely separated geographic locations. Even with exercise of great care in developing and testing the program before delivering large quantities of terminals, it is very likely that certain minor program deficiencies will be detected by users of the terminals during the first few weeks and months of operation.

If the application program is stored in the local terminal in programmed read only memory, these program deficiencies can only be remedied by revising the application program, loading it into new memory circuits, and then installing the new memory circuits in each of the terminals by visiting each installation site or by bringing the terminals back to a central facility for installation of the new program memory circuit. Thus each program change causes an expensive and time-consuming logistics problem with all the attendant disruptions of the business of the customer.

The problems encountered with remedying program deficiencies are also present when the vendor and customer contemplate a program change to add or change features and wish to modify some or all of the terminals that are already installed in the field. The logistical problems tend to discourage enhancing the custom programs being executed in the terminals after satisfactory operation of the initial program has been achieved. Yet it is often very important to the customer to be able to enhance the program to meet competition or to keep up with the growing needs or expectations of the merchants or other parties that are using the terminals in their day to day business operations.

3. Prior Art of Downloading Program Information

The point of sale transaction terminals of the type to which this invention is directed are invariably installed with a communication link to a host computer. This has lead to consideration of implementing one solution to the logistical problem of updating existing terminals in the field by communicating the new program to the individual terminals in the field via the communication link with the host computer.

It has been known in the art for some time that it is feasible to download limited types of control information to a local terminal to alter the manner in which a relatively fixed local application program is executed. For example, there are systems in which the prompts presented to the operator of the terminal may be downloaded from the host to the local terminal. This may be done in a static sense, with the downloaded information stored in memory at the local terminal until it is changed by the host. Alternatively, it may be done in a dynamic mode, with the host controlling the prompts in an online manner.

It has also been known in the prior art to download from the host computer to the local terminal certain file and control information to be used by an otherwise fixed program in the terminal. For example, it is known to download such information as the telephone number for the terminal to dial or log-on information for accessing a remote network. It is also known to download a control string which controls the building of a data packet for transmission from the local terminal to the host computer. Control string downloads have also been used to control the files in which responses from the terminal are stored.

There have also been limited implementations in the prior art of downloading of entire machine language application programs from a remote computer to a local terminal with storage of the downloaded program in battery protected random access memory circuits at the local terminal. In this case the read only memory circuits at the local terminal contain only the programs for basic management of the download of the application program together with the operating system for the basic program control of the central processor unit in the terminal.

While, on the surface, this approach to customizing the application programs running on point of sale transaction terminals may look attractive, there are several reasons why a complete machine language program download is impracticable. The principal reason is the size of the machine language code and thus the time required to perform the download for each local terminal. It is not practicable to author the custom application program directly in machine language because of the scarcity of programmers who can author programs directly in machine language. Consequently it is necessary that the program be initially written in a high level language such as the C-language or Pascal, and then compiled and linked into directly executable machine code. The compiler and linker inherently produce a machine language version which is substantially larger in overall code size compared to the code size for an equivalent program written by a creative programmer directly in machine language.

This larger code size is not a problem when the code is directly loaded into read only memory program circuits for physical insertion into the local terminal because automated programming systems are available to load the code into a number of read only memory circuits simultaneously. The larger code size becomes a problem only when direct downloading of the entire code into the local terminal is contemplated.

To illustrate, a compiled and linked version of a typical application program may comprise 32 kilobytes of code. Most local terminals communicate with the host computer via a relatively inexpensive modem running at a data transmission rate of 300 baud. At that transmission rate, download of the application program to the local terminal will take about 20 minutes. This might be acceptable if there were only a few terminals to download from the remote host computer. In the typical case, it may be necessary to download several thousand local terminals. Assuming a download time of 20 minutes and 3000 terminals to download, a total of 60,000 minutes or 1000 hours of downloading time would be required. If the downloading were done by a single host computer during the twelve hours between 8 pm and 8 am, it would take over 80 days to download all of the terminals. It is thus apparent that the concept of downloading a complete machine language application program is impracticable where a large number of terminals are involved.

SUMMARY OF THE INVENTION

1. Objects of this Invention

It is the principal object of this invention to provide an improved method of operating a local terminal to execute a custom application program.

It is another object of this invention to provide a practicable method of operating a local terminal based on a custom application program downloaded from a remote host terminal.

2. Features and Advantages of this Invention a. Reduced Code Size for Application Program Download

This invention features a method for operating a local terminal which includes a computer system comprising a central processor unit, a read only memory coupled to the central processor unit, a random access memory coupled to the central processor unit, and a communication channel coupled to the central processor unit for communicating with a remote computer system. Other input devices, such as keyboards, PIN code entry pads, cardreaders, and the like may also be provided in the local terminal. The method of this invention provides a practicable approach to downloading an entire custom application program because the size of the program code required to be downloaded is reduced by a factor of three or four by avoiding the requirement of downloading all of the actual machine code instructions of the application program.

Instead, the method of this invention is based on storing in read only memory circuits within the local terminal a number of general purpose operation routines which comprise instructions to be executed by the central processor unit to accomplish a particular program task. Each of these general purpose operation routines is associated with a defined command which, in its object code version, includes an operation code. The object code version of the commands associated with the general purpose operation routines has a code length substantially shorter than the code length of the operation routine. In accordance with the method of this invention, the local terminal also has a program established in its read only memory system for interpreting the operation code to access the associated general purpose operation routine for execution by the central processor unit. The object code version of the application program in the form of a sequence of commands has a code size which is several times smaller than the compiled code size would be for an entire application program which could be directly executed after downloading.

More specifically, the method of this invention includes a first step of establishing a set of general purpose operation routines to be executed by the local computer system. Each of these general purpose operation routines comprises a set of instructions for execution by the central processor unit in a prearranged manner to accomplish a specific task. The next step is to store the set of general purpose operation routines in the read only memory of the local terminal so that they may be accessed for execution by the central processor unit. The storage locations of these general purpose operation routines will be arranged and noted so that the routines can be addressed.

A following step is to define a set of commands, each of which is associated with a specific one of the general purpose operation routines. Each of the commands includes at least an operation code relating the command to its associated general purpose operation routine. Each of the commands is defined such that it has an associated command code length substantially less than the code length of the associated general purpose operation routine. Preferably, for convenience of writing programs, each command is defined with a high level programming syntax in which the command is represented by a series of word forms in abbreviated notation which have a recognizable association with the task that the associated general purpose operation routine will perform when it is executed by the central processor unit in the local terminal. This high level form of the command is then compiled and assembled to produce the operation code which relates to the associated general purpose operation routine in a manner which is intelligible to the interpreter program in the local terminal.

Once these foregoing steps have been performed, then next step in the method of this invention is to establish at the remote computer system at least one application program module comprising a prearranged sequence of the commands which have been defined. This application program module is written such that, when the associated general purpose operation routines are executed by the central processor unit in the local terminal, a meaningful series of tasks associated with the desired functionality of the local terminal will be carried out. Typically, a custom application program running in a point of sale transaction terminal will utilize a multiplicity of application program modules which will be called for execution in a particular sequence to carry out a complete transaction. The simplest and broadest form of the invention, however, contemplates that there may be one or more application program modules.

The next step in the method of this invention is to communicate the application program module from the remote computer system to the local computer system via the communication channel. This includes the step of storing the operation codes associated with the prearranged sequence of commands in the random access memory of the local terminal.

The method further includes the step of establishing in the local computer system a program execution routine for enabling the central processor unit to execute the application program module. This is accomplished by repetitively performing the steps of:

(1) reading one of the operation codes stored in the random access memory;

(2) accessing a specific one of the general purpose operation routines associated with the read operation code; and (3) executing the accessed general purpose operation routine.

It will be appreciated that the core methodology of this invention provides a number of advantages which makes it practicable to download custom application programs in terms of the time required for the downloading. As will be better understood from the detailed description given below, the method of this invention involves a constructive and feasible tradeoff of program execution speed at the local terminal for spped of downloading the custom application program.

The speed of execution of the application program by the local terminal is reduced because of the steps involved in "interpreting" the operation code to access the associated general purpose operation routine so that it can be executed by the central processor unit. This interpreting step is not present when a machine language program stored in the local terminal is directly executed. It has been found, however, that this reduction of speed of execution at the local terminal is not a problem provided that the program execution overhead which is occupied by the interpreter program is kept at a manageable level.

Furthermore, the tradeoff in overall speed of execution can be reduced by creative authoring of the general purpose operation routines as highly efficient machine language routines. Since this authoring is done only once, it is feasible to have a very skilled machine language programmer spend a substantial amount of time to optimize the code of each routine. The set of routines can also be optimized to the type of transactions which are performed by the local terminal. When this is done, some of the time that is lost in accessing the general purpose operation routine to be executed can be made up in speed of execution of the routine itself.

More importantly, it has been found that, with creative implementation of the core concepts of this invention, it is possible to reduce the download time for a custom application program by a factor of two to three. A program which might otherwise take 20 minutes to download, can be downloaded in about 7-10 minutes using the method of this invention. This dramatic reduction in download time makes it feasible to download a new version of a custom program into a large number of local terminals within a reasonable time frame.

The method of this invention thus avoids all of the logistic problems associated with the prior art approach of loading the custom program into read only memory circuits physically installed in each of the local terminals. Instead, the local terminal is provided with read only memory for storing the operating system and the general purpose operation routines as well as the other locally resident programs modules and facilities which are required to implement the method. These read only memory circuits are common to all of the local terminals being sold regardless of the application program which the terminal will run. Random access memory is provided for storing the application program as well as alterable parameter and file information. Thus a terminal can be completely manufactured and inventoried for sale to any one of several ultimate customers having differing application program requirements. Prior to delivery the standard terminal can be downloaded with a standard application program or a custom program provided for that customer alone.

In initial programming of the local terminal, the download of the application program into random access memory terminal can be accomplished by a high speed direct data link, such as through the RS232 port communicating with a previously downloaded terminal at 9600 baud. This enables initial programming of the additional local terminals within less than one minute each, typically. Then after the terminals are installed and operating in the field, they can be conveniently reprogrammed to eliminate program deficiencies or to add enhanced features by downloading via the telephone lines through the modems at the host computer and the local terminal.

In addition to the core programming and program execution feature of this invention and its advantages as part of a method of operating a local terminal, this invention includes a number of other, related advantageous features:

(1) the methodology in which operation codes are grouped in plural groups and are defined at the object code level using a bitmap/opcode system.

(2) the methodology for handling specification of parameters within the defined commands and indicating the data types of varying data type parameters using data elements integrated into the bitmap/opcode system.

(3) the methodology for establishing general purpose operation routines which share program facilities within the local terminal for parsing the parameters which are included within the defined commands.

(4) the methodology of integrating parameter parsing routines and control of the selection of parameter parsing routines for varying parameters satisfied by different data types using data type data elements included in a bitmap/opcode system in the object code command syntax.

b. The Programming Language Feature of This Invention

This invention also features a method for programming a local terminal which involves the key step of establishing a tokenized interpretive programming language system having a source level command and parameter syntax, an associated object level command and parameter syntax including a defined operation code for each of the commands, a program module structure, and a compiler for translating source level commands in the application modules to the object level commands capable of being assembled and linked into binary code.

This programming method also involves establishing a set of operation routines for execution by the terminal to perform a set of terminal tasks. These operation routines are stored in the local terminal. An additional step in this method is defining a set of commands using the source level command and parameter syntax, each being associated with one of the defined operation routines.

After these steps have been performed the next step is creating an application program comprising the source level sequences of the defined commands in accordance with the program module structure. This is followed by compiling the application program using the compiler, and then assembling and linking the compiled program using a standard machine code assembler and linker program. The assembled and linked program is then communicated to the terminal for storage in local memory therein; and then the terminal is operated using the stored application program.

This methodology provides the capability of achieving higher programming productivity because of the high level nature of the commands. The commands can utilize command names which are self-documenting for the task that the associated general purpose operation routines will perform at the local terminal. The use of operation codes at the object code level of the command syntax provides the compressed download code feature of this invention.

c. Concurrent Scheduling of Application Program Modules

A second principal feature of this invention involves providing a methodology for psuedoconcurrent execution of application program modules. This methodology involves providing defined commands which can be incorporated within one application program module to start the execution of another application program module concurrently or to cause one of the active application program modules to wait or suspend its execution in favor of going forward with execution of a different active application program module, and by establishing a scheduler program to schedule the execution of the active application program modules so that a meaningful and organized approach to starting and stopping execution of individual active application program modules is attained. The preferred scheduler program feature includes methods for giving priority to active application program modules that need input from input devices or a timer.

This feature of this invention provides the advantage of greater flexibility in the structuring of application program modules to maximize the use of the program execution capability of the microprocessor within the local terminal. The scheduler program facility and the associated features of the defined commands that are integrated with the scheduler do not provide the capability for two application program modules to be actually running simultaneously. However, the scheduler and these commands enable the programmer to interleave the different application program modules that are active in the local terminal at any one time period in such a way that it appears that a number of tasks are being carried out at the same time. At places in the execution of a particular application program module where it cannot continue to execute without waiting for something to happen, such as waiting for a particular input to be received, or waiting for another application program module to finish its execution, the current application program module may suspend its execution with a WAIT command, so that other application program modules can proceed with their execution under the control of the scheduler.

From the above summary of the features of this invention, it should be apparent that this invention provides the capability of structuring operation routines and commands associated therewith such that the application program development tools facilitated by this invention can be optimized for the types of transactions being carried out by the local terminal. Furthermore, the overall methodology of this invention makes it possible to create a high level, pseudo-concurrent program language which facilitates the development of custom application programs for point of sale transaction terminals. This invention solves the difficult problem of manageable application program download times. It thus encourages users of point of sale transaction terminals to incorporate features and functions which maximize the utility and value of the local terminals in the business environment in which they are deployed.

Other objects, features and advantages of this invention will be apparent from a consideration of the detailed description given below in conjuction with the accompanying drawings.

BRIEF DESCRIPTION OF DRAWING FIGURES

FIGS. 12A-12E illustrate data structures and data element bit assignments useful in practicing the method of this invention.

DESCRIPTION OF EMBODIMENTS OF THE INVENTION

BACKGROUND ENVIRONMENT OF THE INVENTION

This invention involves a method for operating a local terminal to execute a prearranged application program which has been downloaded into the local terminal from another computer system. Execution of the application program enables the local terminal to perform a predefined set of functions. These functions are specific to the particular application to which the local terminal is dedicated, but may be altered by downloading a revised application program from a remote computer.

1. Illustrative Example of Local Terminal Features and Operation (FIGS. 1A and 1B)

The invention will be illustrated by discussing its use in a specific local terminal application, namely a point of sale transaction terminal of the type which is purchased by a retail merchant through a credit provider such as a local bank for the purpose of carrying out credit transactions with customers and related data capture functions. It should be understood, however, that the invention is not limited to this type of local terminal application, but could be used in a number of other local terminal applications having similar requirements for reprogramming of the local terminal from a remote host computer.

Figure 1A:
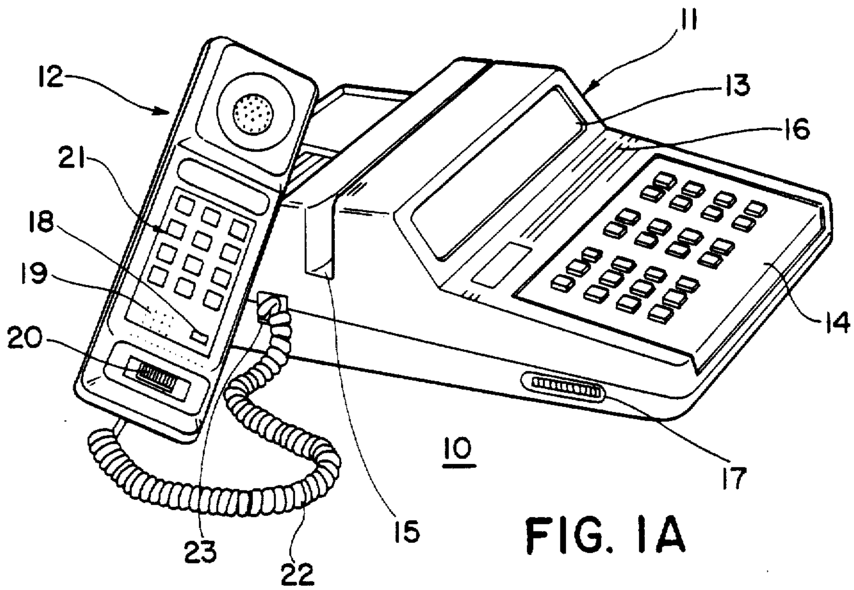
FIGS. 1A and 1B are illustrations of a local terminal in which the method of this invention may be practiced.
Figure 1B:
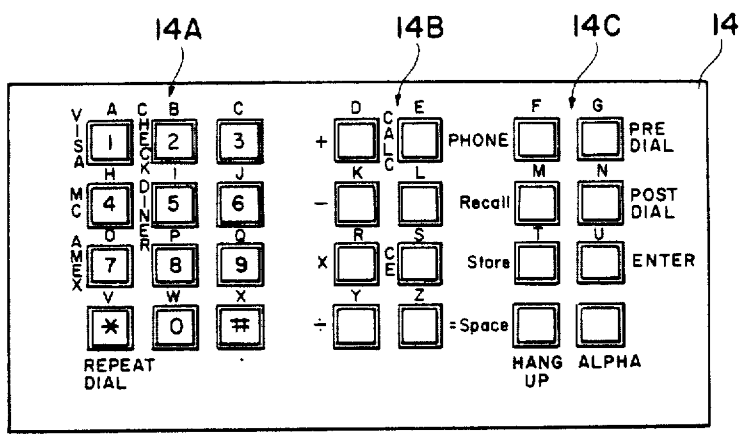

FIG. 1A depicts a local terminal sold by Veri-Fone, Inc. of Honolulu, Hawaii, under the trademark ZON. The terminal 10 comprises a base unit 11 and a telephone handset 12. The base unit 11 includes an alphanumeric display 13 having sixteen characters, a keyboard 14, a cardreader 15, a speaker 16, and a speaker volume control 17. The handset 12 includes a handset ringer switch 18, transmitter mouthpiece 19, a hang-up button 20, and a telephone keypad 21. The telephone keypad 21 is optional since, as will be discussed below, the telephone dialing function can be accomplished using a specific section of keys on the keyboard 14. The handset 12 is connected to the base unit 11 by way of a standard cord 22 and a standard jack 23.

The back (not shown) of the base unit 11 has a modular telephone jack for connecting the unit to a telephone outlet. It also has a plug into which an optional P.I.N. (Personal Identification Number) Pad may be connected, a serial port connector for a printer, and a plug to connect to a power pack for supplying electrical power to the unit. The base unit houses the electronic circuitry of the terminal which is shown in block diagram form in FIGS. 2 and 3.

Referring to FIG. 1B, it is seen that keyboard 14 has three sections of keys designated 14A, 14B, and 14C, comprising a total of twenty-eight keys in all. Each of the sections of keys serve multiple functions which depend on the state that the terminal is in. The keys in all three sections serve as alphabetic letter input keys with the particular letter assigned to each key shown as a label above the key. The keys in section 14A serve also as numeric input keys and transaction host selection keys. Note the identifiers of the major credit cards next to keys having the numeric labels 1, 4, 5, 7, and 8. The keys in section 14B serve as calculator function keys and the keys in section 14C serve as terminal function keys.

The standard functions that the ZON terminal performs are standard and programmable telephone dialing operations, four function calculator operations and point of sale transaction terminal operations.

a. The Telephone Function

Standard telephone dialing may be performed by using the keypad on the telephone handset. In this mode, the handset is directly connected to the telephone line when the handset is lifted and the keyed in tones are generated by the tone generation circuitry within the handset as the individual keys on the handset are pressed.

Telephone number dialing may also be done as a programmed feature of the terminal with the handset in place. When the "PHONE" key in section 14C of the keyboard 14 is depressed, the terminal enters the "phone" state and the keyboard section 14A becomes a telephone keypad for a computer telephone function. In this state, each of the keys labelled 0-9 invokes a DIALDIGIT action which is a predefined read only memory resident task of the computer system within the terminal and causes an appropriate tone to be generated and put out over the telephone line. It also causes each of the dialed digits to be stored in sequence in a reserved memory location for accessing using the REDIAL key in section 14A. This function of the terminal is an integral part of the application program which is executed by the terminal as will be discussed below in connection with the contents of a generic program which has been prepared for the ZON terminal using the method of this invention. These particular individual functions are predefined ROM functions in the ZON terminal and are accessed from the state tables, but it should be understood that they could also be application program module functions defined in the application program itself.

The terminal also has a memory speed dialing feature which permits up to eight frequently used telephone numbers to be programmed into the terminal, stored in memory in the terminal and later automatically dialed by the computer system within the terminal. The details of the programming of these phone numbers is not important to this invention and will not be discussed here. Once the numbers have been stored, the memory speed dialing is accessed by sequentially depressing the PHONE and RECALL keys in section 14C of the keyboard and then entering a two digit number between 09 and 16 on the keypad section 14A. The computer within the terminal produces in sequence the tones corresponding to the digits in the stored phone number. This is a standard speed dialing function which is available in many type of computer-based telephones and need not be described in detail here. These functions can be altered by altering the application program, for example, by altering the number of phone numbers that can be stored, or by altering the particular keys on the keyboard that are utilized to access the features. The terminal is programmed automatically to return to the READY state when the handset is replaced. This can also be changed or redefined by the application program.

b. The Calculator Function

The calculator function is accessed from the READY state of the terminal by pressing the CALC key in section 14B of the keyboard 14. The display responds by displaying "CALC", and the keyboard sections 14A and 14b then become number entry and math function keys of a regular four-function calculator. The functions of the calculator feature of the terminal are also predefined ROM resident functions accessed from the state tables, but these functions could alternatively be defined in the application program itself.

c. The Transaction Terminal Functions

The basic transaction terminal function is credit verification related to a sale using the customers credit card and either the manual or credit card reading method of entering the credit card data. Table V attached hereto illustrates the operation of the terminal in a typical transaction using the credit card method. The keystroke which selects the host automatically sets up the terminal to dial an appropriate telephone number to access the host computer for the credit card that is being used. In response to the display prompt to enter the account number, the credit card is swiped through the reader. If the information on the magnetic stripe of the card is successfully read by the terminal, the display prompts for the entry from the keyboard of the amount of the sale, followed by depression of the ENTER key. Once the ENTER key is depressed, the terminal takes over the processing of the transaction. The host computer is dialed, the transaction information is transmitted over the phone line, the approval information is received from the host computer, the approval information is displayed to the operator for noting on the credit slip and the terminal disconnects. Depressing the HANG UP key terminates the function and returns the terminal to the READY state.

The manual entry method shown in Table VI is utilized if the magnetic stripe on the customer's credit card is damaged. The transaction proceeds in the same manner except for manual entry of the credit card number and the expiration date of the card in response to prompts on the display of the terminal.

The terminal is also programmed to enable recall of the information transmitted and received during the last transaction carried out on the terminal after the HANG UP key is depressed. Another feature which is provided in the terminal is access to use of the McDonnell Douglas electronic draft capture system for capturing information on transactions in a batch processing mode. Data on sales, voids, and credits can be entered as well as doing post transaction authorizations, transaction batch inquiries, batch reviews in the forward or reverse direction, and other standard functions of the McDonnell Douglas system.

d. Standard and Custom Terminal Features

It should be understood that, using the method of this invention, the features which are provided as standard features of the terminal can be determined by the terminal vendor as part of its standard product strategy. Various standard models having different features can be offered by using somewhat different application programs for the different features of the different models. The terminal can also be customized in its function by providing a custom application program which adds other features to the standard ones provided or alters the features of the terminal or a combination of the two. Each of the following general functional areas of the terminal can be customized:

** data entry
** packet communication
** data capture
** local processing of data
** unassisted batch data transfer
** report generation and printing
** receipt slip formatting and printing
** PIN entry for identity verification The terminal can be custom programmed for control of external devices, such as the PIN pad for entry of personal identification number and printers which may be attached to the terminal to print receipts or reports, or control of other devices which can communicate with the terminal over the RS232C interface.

2. Illustrative Example of Local Terminal Hardware Environment for the Invention (FIGS. 2 and 3)

A particular local terminal hardware environment in which the method of this invention may be practiced is illustrated in the block diagrams of FIGS. 2 and 3 and will now be described. The hardware illustrated in that of the ZON terminal depicted in FIG. 1. However, it should be understood that the method of this invention is a general one and can be applied in a number of different local terminal hardware environments having at least a minimum set of hardware elements required for use of the invention.

Figure 2:
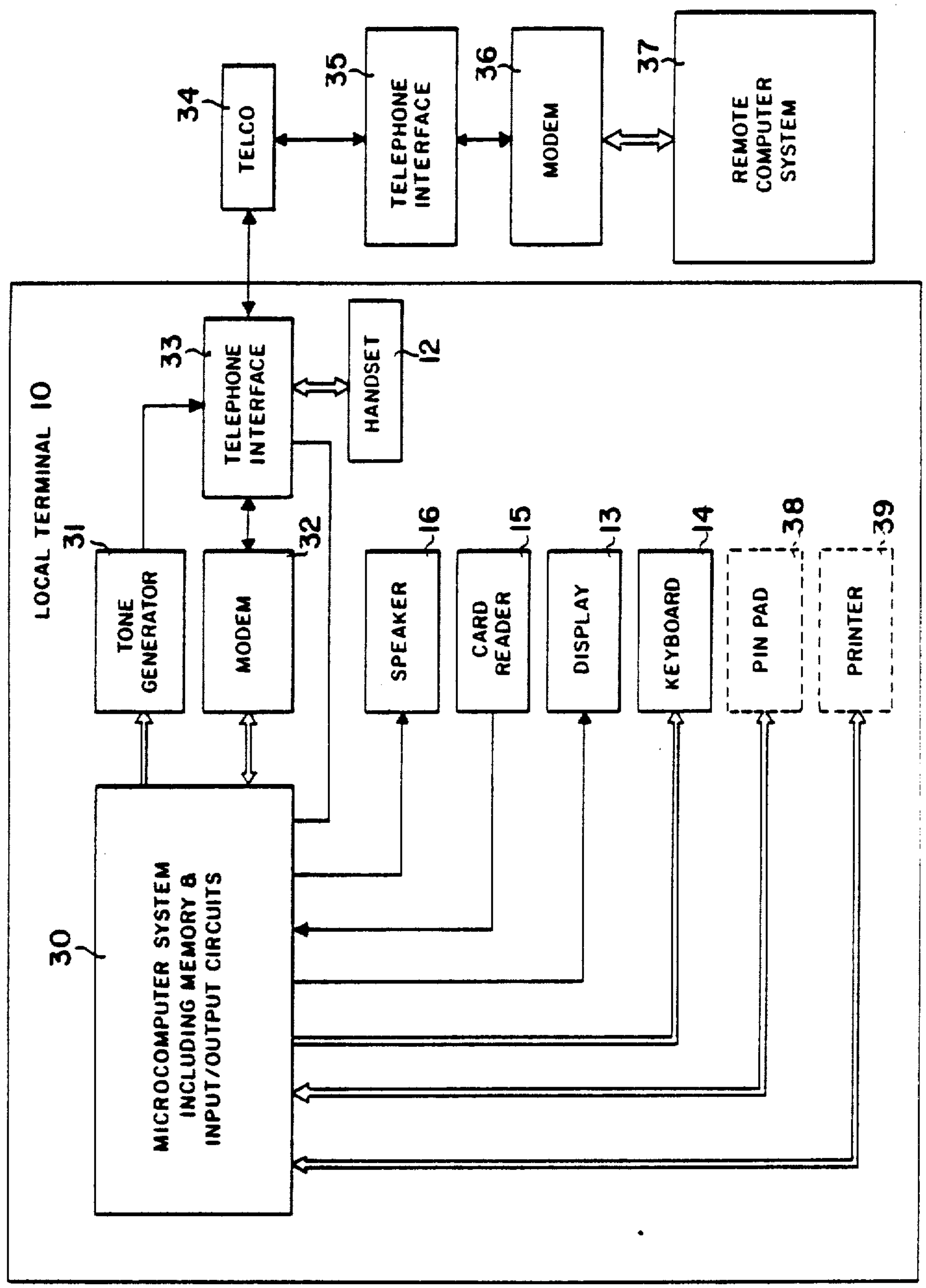
FIGS. 2 and 3 are block schematic diagrams of the circuitry of a local terminal in which the method of this invention may be practiced.
Figure 3:
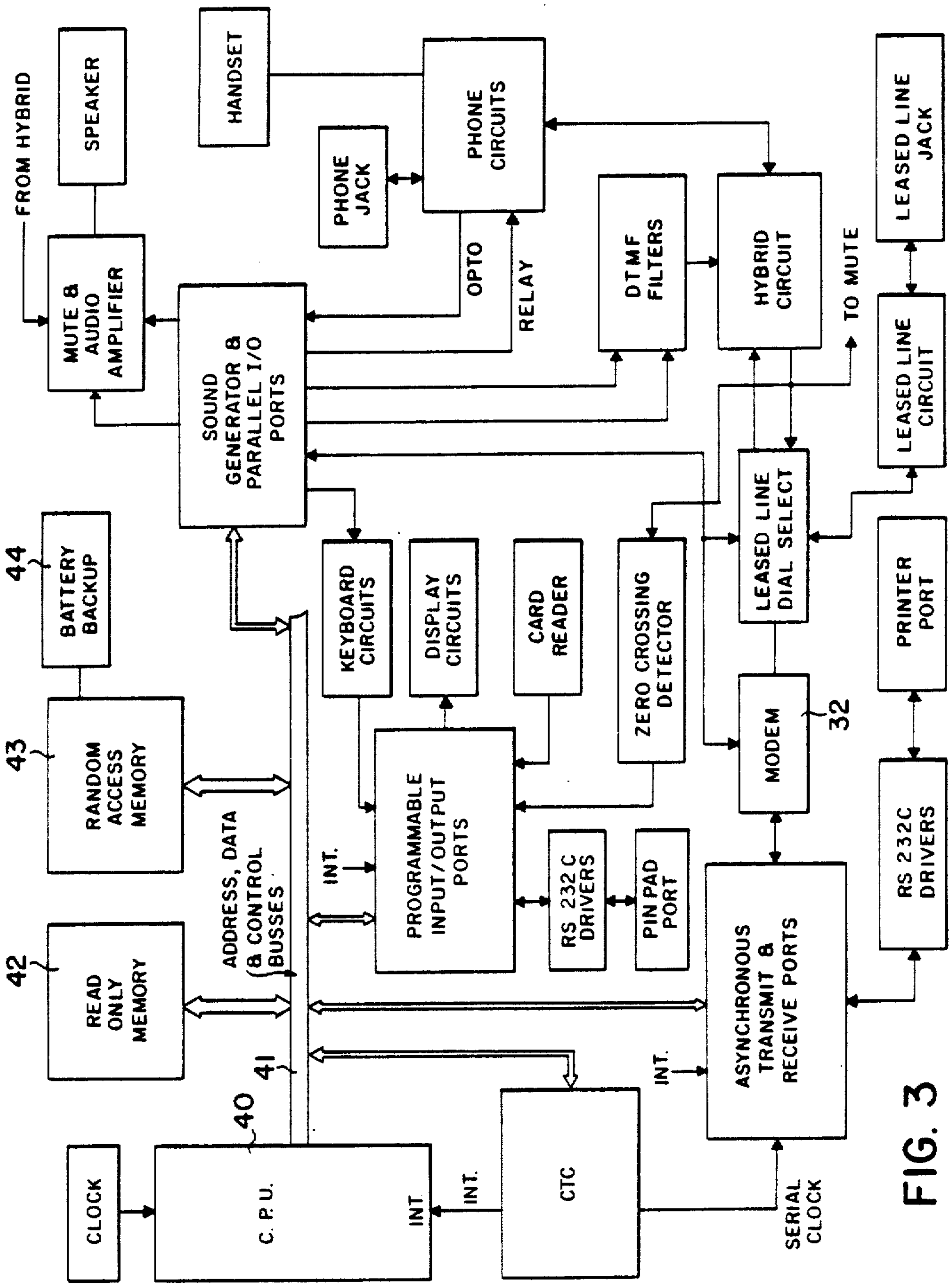

FIG. 2 taken together with FIG. 1 illustrates generally one example of a hardware system environment in which the method of this invention may be practiced. Local terminal 10 includes a microcomputer system 30 which incorporates memory and input/output circuits which communicate with and control speaker 16, card reader 15, display 13, and keyboard 14. Optional PIN pad 38 and printer 39 are also controlled and communicated with by the microcomputer system. A communication channel, comprising tone generator 31, modem 32 and telephone interface 33 is provided for communication with a remote computer system 37 via telephone company lines 34. The remote computer system will typically also have a modem 36 and a telephone interface 35 associated therewith. As will be explained in more detail later, this communication channel enables the local terminal to receive a download application program for storage in the memory circuits of the microcomputer system. This same communication channel thereafter serves to enable the local terminal to communicate with remote host computers to perform credit verification functions and/or data capture functions as generally described above.

It should be understood that the remote computer system which performs the application program download to the local terminal is not necessarily involved later in the credit verification function. The local terminal may be communicating with several different host computers for verification of credit relative to different credit cards.

FIG. 3 illustrates the hardware of the ZON terminal in more detail. The overall hardware system is generally quite conventional and the details of its components and the functioning of each will be apparent to persons knowledgeable about local terminal hardware. Thus these details will not be set forth herein, and only those aspects of the hardware which are pertinent to the method of operating the local terminal in accordance with this invention will be described.

Central processor unit (C.P.U.) 40 communicates over address, data and control busses 41 with read only memory 42 and random access memory 43. Read only memory 42 stores the operating system program which provides basic functional control of the microcomputer system within the local terminal. In the ZON terminal, a standard Z-80 central processor unit is employed and the operating system is a version of a real-time, multitasking executive called the AMX system available from KADAK Products Ltd. of Vancouver, British Columbia, Canada. This invention is not limited in any sense to this hardware or operating system environment and, as will be apparent to persons of skill in the computer art, the method of this invention may be used in local terminals which utilize a variety of computer hardware systems and realtime operating systems therefor.

Read only memory 42 also stores the terminal software which performs certain of the steps of the method of this invention which are carried out in the local terminal, including the scheduler routine, the command execution routine and the application program download routine. ROM 42 stores the general purpose operation routines which are accessed by the application program modules of the application program. Read only memory 42 may store certain predefined ROM-resident program modules which are standard program modules for performing tasks which are typically included as standard functions of the local terminal. It may also store a default application program having limited features so that the terminal operating system can copy this default program to random access memory 43 in the event that there is a major problem with the integrity of the application program stored in random access memory 43. In addition ROM 42 may store the following program components:

** data entry routines
** a control string interpreter
** a file manager system
** a direct download program
** miscellaneous support routines.

or any other functions which are to be made available under the control of the application program.

Random access memory 43 stores the application program modules which are downloaded from the remote computer along with other information forming the operational environment of the application program. Random access memory 43 also has a section which serves as scratch pad memory, including memory sections which may serve as data registers and buffers. Details of the types of information stored in random access memory 43 will become apparent from a consideration of the detailed description below of the information which is downloaded as part of the application program.

Random access memory 43 is preferably provided with battery backup to preserve the contents of the memory which are otherwise volatile in the event of loss of power to the local terminal. Another option is to use non-volatile random access memory circuits and associated system components which provide the capability to detect an impending power failure and to copy the contents of the volatile portion of the random access memory circuits to a non-volatile component of the circuits before all power to the local terminal is lost.

GENERAL METHOD OF THIS INVENTION

1. The Core Programming Methodology

The method of this invention includes three initial steps which form the core methodology of the invention and which are the basis for achieving the advantages of the invention which are summarized above. These three steps comprise the following:

(a) Establishing a set of general purpose operation routines to be executed by the local computer system in the local terminal, with each of these routines comprising a set of instructions for execution by the central processor unit in the local terminal in a prearranged manner to accomplish a specific task;

(b) Defining a set of commands, each of which is associated with a specific one of the general purpose operating routines and includes at least an operation code relating the command to the associated general purpose operation routine, with each of the commands having an associated command code length substantially less than the code length of the associated general purpose operation routine; and (c) Storing the set of general purpose operation routines in the read only memory of the local terminal.

a. Establishing the General Purpose Operation Routines

The step of establishing a set of general purpose operation routines involves identifying all of the specific tasks which the local computer system in the local terminal may be called upon to perform in the particular type of application to which it will be devoted. Once these tasks have been identified and fully defined, it is a relatively straightforward, though not necessarily trivial, task to create the set of routines which will accomplish these tasks. The routines must include the capability of performing all tasks which are necessary for the types of application programs to be executed by the terminal.

Preferably, the general purpose operation routines will be created in machine language which can be assembled into machine instructions which, in turn, can be directly executed by the central processor unit in the local terminal. This central processor unit will typically be a microprocessor having a specific machine instruction set. Utilizing machine language programming and having such programs authored by a highly skilled machine language programmer will provide the fastest execution time for the individual general purpose operation routines and thus faster execution time for the application program running at the local terminal.

It might also be possible to use a higher level language, such as the FORTH computer language, instead of machine language instructions. In such a case the execution of the instructions of the higher level language will require the intervention of an interpreter. If this does not result in too great a sacrifice of execution speed, the higher level language approach may be satisfactory. However, since the method of this invention inherently involves trading off speed of execution of the application program for reduced application program download time, use of expertly authored machine code for the general purpose operation routines is highly preferred.

Table I appended hereto sets forth a listing of the functions to be performed by a set of general purpose operation routines which have been created for the ZON family of terminals described above. The description given in Table I of the functional task to be performed by each of the general purpose operation routines is sufficient for a skilled machine language programmer to author a machine code listing which will accomplish that task. Flow charts of illustrative examples of the general purpose operation routines are included in the drawings and will be discussed below in connection with the step of executing those routines in the local terminal. The illustrative examples together with the descriptions of the specific task to be accomplished by each general purpose operation routine associated with each command illustrates this step of establishing a set of general operation routines sufficiently that skilled programmers can readily adapt the method of this invention for establishing a set of different routines, if required, to be used in other types of local terminal applications.

b. Defining a Set of Commands (1) General Aspects

The step of defining a set of commands, each of which is associated with a specific one of the general purpose operation routines, will typically be carried out by establishing a high level source code version of each command together with a corresponding object code version of each command and providing program tools for converting the high level source version of each command to the corresponding object code version. This approach to defining commands at source and object code levels together with creation of compiling, linking and assembling tools for conversion from source to object versions is well known in the art. Specific aspects of these tools, which are provided for conversion of the source level commands given in Table I into their corresponding object code, are discussed in more detail below.

(2) Preferred Command Structure and Syntax

The preferred syntax for a command at the source code level is as follows:

{<label>:} <command> {<P1> <P2> . . . <Pn>} {;<comment>} where P1, P2 . . . Pn are parameters associated with the command.

The label portion is typically utilized only if the particular application program module in which the command is included requires a label reference for going to that comand line from another location in the application program module. The command name is an integral portion of the command, as is a specification for each parameter which is associated with a command. Comment statements set off by the semicolon are optional. Good programmers provide well commented source code for purposes of documenting the overall functionality of the application program module in which a sequence of commands is provided.

Referring to Table I it is seen that some commands do not have any parameters associated with the command, while other commands have one or more associated parameters. It is also seen that the name assigned to each command preferably is a form of shorthand reference to the task which the associated general purpose operation routine performs. This shorthand reference approach to assigning command names is not a requirement of the invention, but is good practice since it greatly assists the programmers utilizing the set of commands to learn the command set and remember the task associated with each command. As will be discussed in more detail below, each of the command names defined at the source code level preferably converts to an operation code in binary number form at the object code level.

It is the binary operation code at the object code level of the command which relates the command to the associated general purpose operation routine. The manner in which this relationship is established in practice in the ZON terminal application of this invention will be discussed in detail below.

The advantage of a greatly reduced download time for an application program which is achieved utilizing the method of this invention is based on defining each command such that, at the object code level, the associated command code length is substantially less than the code length of the associated general purpose operation routine. Table II appended hereto is a chart which illustrates the substantial reduction in download code size which is achieved using the method of this invention. Table II lists in column one several examples of ZAPD commands found in Table I. In column two the size of the downloaded object code for each command is given. In column 3, the size of the object code level of the machine code routine associated with the command is given. Column four gives an estimate of the minimal machine code size that might be achieved for use in case the entire routine were downloaded in binary object code. Table II illustrates that, in most cases, the ZAPD object code command has a code size substantially less than the code size of the corresponding operation routine.

Table III appended hereto is a chart which shows the set of thirteen parameter types which are utilized in the defined commands shown in Table I. Table IV is a chart which shows a set of thirteen data types which comprise all of the different ways that parameter types may be specified. As shown in Table III each of the parameter types has at least a designated default data type and some of the parameters have alternative data types which may be used to specify that parameter. As shown in Table III, each of the parameter types of byte constant, integer constant, string constant, and address constant have only a default data type. Each of the other parameter types have, in addition to a default data type, two or three alternate data types which may be utilized to specify the parameter.

The default data type is selected for each of these parameter types which have alternate data types on the basis of the data type which is most likely to be used to satisfy that parameter. As will be discussed below, this tends to shorten the overall download code for the application program.

Table IV, in addition to giving the data type reference used in Table III, gives the data type name, the type of identifying symbol which is used at the source code level for specifying the data type reference and an example of a parameter specification utilizing the identifying symbol. In addition, Table IV specifies the length of the parameter in terms of the number of eight bit bytes which a parameter utilizing that data type will occupy in the object code form of the command and the number of bytes that will constitute the value of the parameter during execution of the general purpose operation routine associated with the command. The length specified as "n" means that the length can be up to 255 bytes.

As would be expected, each of the "byte" types of data type references will take on a value of a single byte. Each of the "integer" data types will have a value specified by two bytes and each of the strings will have a value specified by "n" bytes, i.e., up to 255 bytes. The extended address data type does not take on a value since it is typically used to specify a location to which the program may branch under certain conditions.

It should be understood that the parameter type system used in the preferred implementation of the method of this invention as shown in TABLES III and IV is not the only approach that could be implemented. One alternative is to define each command such that the parameters associated with the command can be satisfied by only one data type. This would permit the command parsing module for each command to directly call the parsing routines for the parameters associated with the command without using an intermediate parsing control routine. It would also eliminate the need for the CURVPARM data structure element, the VPARM array, and the data type data elements in the bitmap/opcode system for the object code command syntax discussed below.

However, implementing this alternative approach would require that a much larger number of commands be defined just to handle the different ways that the parameters associated with a particular operation routine are specified in the command. For example, consider the SEND_CHAR command which, as shown in TABLE I, utilizes two X type parameters in the preferred approach to parameter specification. The X type parameter is a varying parameter type with four different data type satisfiers. To cover all of the different ways to satisfy two X type parameters with different data types with different commands could potentially require sixteen different commands, within a family of commands that would all use the same operation routine but would require different parameter parsing routines.

Some of the commands listed in TABLE I use four or five varying parameter types. Using the alternative approach of defining commands with only one fixed set of data types to satisfy the associated parameters could drastically proliferate the number of commands which would be needed to provide the programmer with a reasonable level of flexibility in satisfying the parameters required for a given operation routine to perform its task. To make this approach practicable, the command definition step would necessarily leave out some possibilities, because programmers would not be able to deal with that many different commands and keep them sorted out. Moreover, the maximum number of commands which could be specified by a single byte operation code would be rapidly exceeded, making sixteen-bit operation codes necessary.

It should be noted that this alternative approach to implementation would not alter the number of operation routines that would need to be established, but it would multiply the number of general purpose operation routines to be established in the sense that each of the different commands in each family of commands would require a different command parsing module. Proliferation of the number of commands would greatly increase the number of groups of opcodes that would be required, and thus increase the size of the opset pointer table and opcode pointer table to be stored in ROM. It would also dramatically increase the number of command parsing modules to be stored in ROM, although it would eliminate the parsing control routines. Overall it would make the programming language much more cumbersome to handle.

It is thus seen that the preferred system of using parameter types which include varying parameter types which can be satisfied with plural data types provides a powerful and elegant way to achieve full programmer flexibility in satisfying parameters required by a particular operation routine without proliferation of commands. The programmer needs only master the source symbol notation for the different data types to use in the source syntax of the command and the data types associated with the different parameter types. In connection with this, the information shown in TABLES III and IV includes a new alternate form of notation which is different from the form used in TABLE I and which will eventually make the whole structure of this parameter system more logical and thus easier to remember.

Figure 4A:
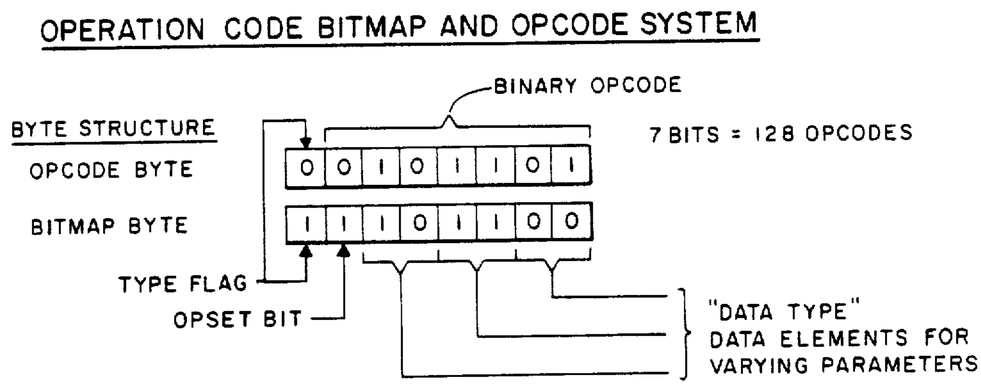
FIGS. 4A and 4B illustrate an operation bitmap and opcode system useful in practicing the method of this invention.
Figure 4B:
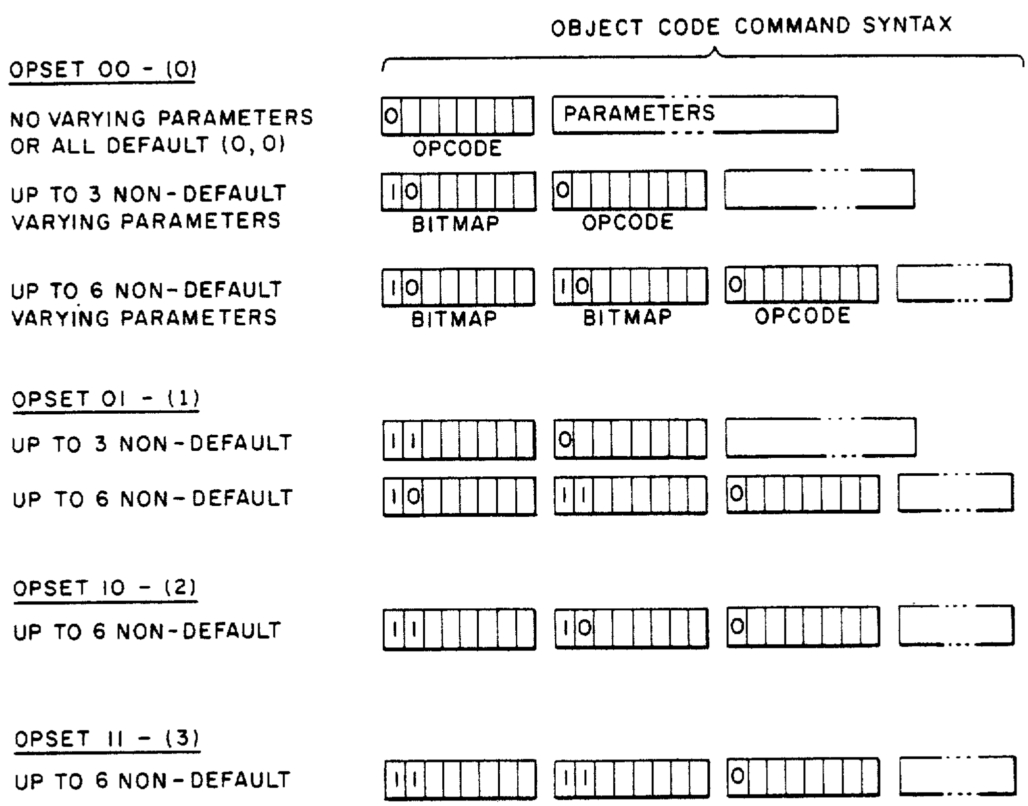

(3) Object Code Syntax of Defined Commands (FIGS. 4A and 4B)

Referring back to Table I, it can be seen that, in this particular implementation of the method of this invention, each of the commands in the defined set of commands is assigned an opcode group and an opcode number. The opcode group and opcode number set forth in Table I for each command is given in a decimal notation. In the object code command syntax, the opcode group is represented in binary form as 2 binary digits ("bits") in a bitmap byte. The opcode number is represented in the object code command syntax in the form of 7 bits of an opcode byte. Thus, in this version, the operation code which is defined for each command in the set of commands is a combination of a binary opcode group value, also designated "opset", and an opcode number, designated "opcode".

The purpose for this approach can briefly explained as follows. The Z80 micro processor utilized in this terminal is an 8 bit micro processor. Accordingly, the object code version of an application program module is limited to use of 8 bit bytes. An 8 bit byte can take on 256 different values, but with one bit reserved in this implemetation for a byte type flag, only 7 bits are available for designating the opcode. Thus, in order to provide the capability of having more than 128 commands and more than 128 associated operation codes, the opcode group and opcode number scheme was adopted. A two-bit opset number provides for four opcode groups and a seven-bit opcode number provides for 128 different opcodes in each opcode group. Together they provide the capability of having up to 512 total commands and associated operation codes.

FIGS. 4A and 4B illustrate the operation code system which has been adopted for implementation of this invention in the ZON terminals. This embodiment of the operation code system utilizes a combination of opcode bytes and bitmap bytes as shown in FIG. 4A Each opcode byte and bitmap byte has a bit 7 representing a byte type flag and the value of that type flag distinguishes opcode bytes from bitmap bytes. If the type flag has a binary 0 value, the byte is an opcode byte. If the type flag has a binary one value, the byte is a bitmap byte. The remaining seven bits of each opcode byte represents the binary opcode which can take on one of 128 different values.

The low-order six bits of a bitmap byte, i.e. bits 0–5, represent three groups of "data type" data elements. Each of these data elements is used for specifying the data type used by the programmer in the source code level of the command to satisfy the parameter. Since each parameter type which takes on varying data type values has at most four possible data types associated with it, two bit data elements are sufficient to specify the data type. Table III shows the binary values which are used in the data type data elements of the bitmap byte for designating the data type of the parameter.

The sixth bit of each bitmap byte is an opset bit and is used to designate the value of one of the two bits utilized to specify the opset in which the command associated with the particular operation code is grouped. Since there is only one opset bit in each bitmap byte, the operation code for each command may need to utilize two bitmap bytes to designate the opset into which the particular command is grouped. It will be seen, however, that for commands which are grouped in opset 0, one or both of the bitmap bytes may be "implied" bytes that are not actually present in the object code command syntax. For commands in opset 1, one of the bitmap bytes may be "implied". In other words, 1 or 2 bitmap bytes may be eliminated, depending on the number of non-default type varying parameters which are specified by the programmer in using the associated command. FIG. 4B illustrates this operation code bitmap and opcode system more extensively.

As shown in FIG. 4B, the object code command syntax for a command which falls into opset 00 may have one of three different structures. All commands in opset 00 which have no varying type parameters can be represented in object code syntax by a single opcode byte followed by whatever parameter bytes are required. In addition, any command in opset 00 which has parameter types which may have varying data types, and for which all of the assigned data types are the default type, may be represented by a single opcode byte followed by bytes comprising the parameters themselves. In both of these cases, no bitmaps are required since the opset 00 is the default opset. As will be shown in other Figures discussed below, the "translator" program uses an opset data structure which has a default value 00. Another way of looking at it is that the operation code for the command contains two implicit or understood bitmap bytes wherein the opset bit in each of the bitmap bytes, and all of the bitmap "data type" elements have value 0. Since there is no need for actual bitmap bytes, there is no reason for the compiler which generates the object code version of a command with no varying or non-default parameters to include any bitmaps.

The second form which the object code command syntax may take for commands which are grouped in opset 00 combines a single bitmap byte with a single opcode byte followed by whatever parameter bytes are required. A single bitmap byte permits up to three non-default varying parameters to have their data types specified in the three data type data elements which are provided in a single bitmap byte. The opset bit in the single bitmap byte must have a 0 value in this case to correspond to the first bit of the two-bit opset specifier. In this case the operation code for the command has one bit of the two-bit offset specifier understood, i.e., one of the bitmaps is implied or understood and not physically present.

The third form of object code command syntax for commands which fall into opset 00 is shown in FIG. 4B as involving two or more bitmap bytes followed by an opcode byte and whatever parameter bytes are required. With two bitmap bytes actually present, up to six non-default data types can be specified for parameter types which can take on varying data types. It is seen that the opset bit in each of the bitmaps has a 0 value and these two digits together indicate opset 00.

As shown in FIG. 4B, commands which are assigned to opset 01 may have an object code command syntax in one of two different forms. The first form involves a single bitmap byte and the second form involves two bitmap bytes. In the single bitmap byte case, the opset bit must have a value 1 to designate that the associated command has been assigned to opset 01. If two bitmap bytes are present, the opset bit in the first must have a 0 value and the second must have a 1 value so that together they designate opset 01. As seen the first form of command syntax with a single bitmap byte can handle up to three non-default varying parameters and the second form can handle up to six non-default varying parameters.

Two additional opcode groups, namely groups 2 and 3 having opset values 10 and 11, respectively, are provided for in the operation code system utilized in the embodiment of this invention implemented in the ZON terminal, but none of the defined commands have been assiged to either of these opcode groups. Opset 10 and opset 11 each have an object code command syntax which requires two bitmap bytes to specify the two bits which designate the opset. In other words, two bitmap bytes must be present regardless of whether the command has non-default parameters specified.

It should be understood that the operation code bitmap and opcode system illustrated in FIG. 4B could use more bitmap bytes in the command syntax than is shown. In the version of the invention implemented in the ZON terminal, provision is made for up to four bitmap bytes. This provides for up to twelve varying type parameters to be included in a command and have data types specified for each.

To minimize the code size of the object code form of the defined commands, all commands which have associated parameters of a type which have only a default data type may be grouped in opset 00 since such commands will, in every case, require no bitmap byte. Similarly, all commands which have no associated variables may be assigned to opset 00 since no bitmap bytes would be necessary for the object code version of such commands. This approach is obviously not necessary to implementation of the invention.

Another technique which may be used to reduce the size of the object code form of the commands which are included in an application program involves reordering the position of the parameters, in the ordered list of parameters defined as part of the command, as between the order designated in the source level, i.e., the source parameter syntax, and the order designated in the object code, i.e., the object syntax. Referring to the command set in Table I, it will be noted that, in some cases, the source syntax and the object snytax of some commands having more than one parameter may be different.

The purpose for reordering the parameters as between source and object syntax is to place those parameters which have only a default data type, and/or which are most likely to be assigned a default data type, at the end of the ordered list of parameters in the object syntax. This will tend to reduce the number of bitmaps present in the object code of the application program since data type data elements in bitmap bytes are only required to designate non-default data types for varying parameters. This is not a requirement of the operation code bitmap and opcode byte system used to implement the method of this invention, but it is relatively easy to provide this feature in the compiler which converts the source code level of the commands to the object code form thereof, and it provides further compression of the size of the object code to be downloaded.

(4) Alternative Operation Code Systems and Associated Object Code Command Syntax (FIGS. 5–8)

It should be understood that the method of this invention is not limited to the operation code system described above and other approaches to defining commands which include an operation code relating the command to an associated general purpose operation routine could be provided. For example, consider a case in which up to 256 commands may be defined and none of the commands requires more than four non-default varying parameters. In such a case, the operation code system could utilize the object code command syntax shown in FIG. 5A.

In this system, each command at the object code level would have a single bitmap byte and a single operation code byte followed by necessary parameter bytes. Since there is no provision for a type flag in either the bitmap or the operation code byte, both bytes must always be present at the object code level, so that the two bytes can be distinguished by their position in the multi-byte command sequence. Obviously, the order of the bitmap and operation code bytes could be reversed from that shown in FIG. 5A.

Figure 5A:
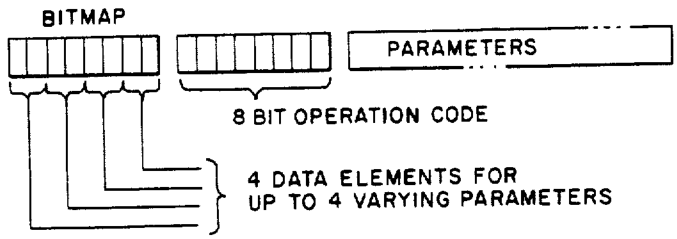
FIGS. 5A, 5B, 6, 7 and 8 illustrate alternative version of bitmap and opcode systems that may be used in practicing the method of this invention.
Figure 5B:
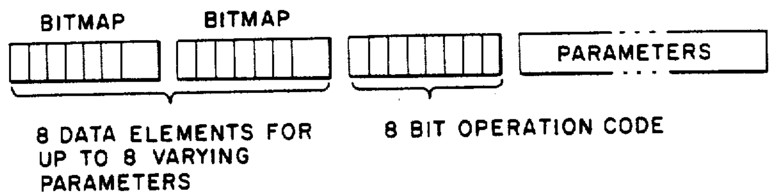

FIG. 5B shows another system in which two bitmap bytes are present in the object code command syntax along with a single operation code byte. The approach shown in FIG. 5B would permit up to eight varying parameters to be designated with different data types. Again both bitmaps would always have to be present, and the command execution program running in the local terminal would distinguish the bitmap bytes and the operation code byte on the basis of position in the object code command syntax. Other systems with more bitmap bytes to provide for more data type data elements for varying parameters could also be used.

Figure 6:
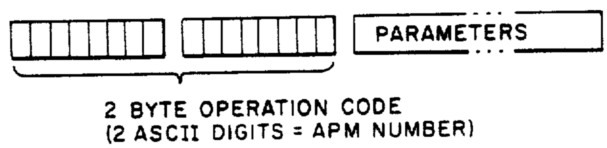

FIG. 6 illustrates another version of an operation code system which may be utilized in versions of this invention in which varying type parameters are not used. In this case, bitmap bytes are not utilized and two operation code bytes are provided. The operation code bytes may, for example, take on values corresponding to ASCII characters with two characters designating an operation code. This system is actually used in one alternative implementation of this invention described below. It should be apparent that the two opcode bytes could also designate corresponding commands and related operation systems in accordance with other notational approaches.

Figure 7:
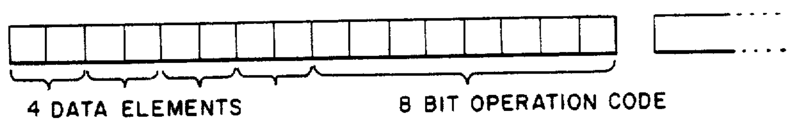

FIG. 7 illustrates an operation code system which might be employed in a local terminal system which utilized a central processor unit operating on the basis of sixteen bit words, rather than bytes. In such a system, eight bits of the word could be designated as the operation code and the other eight bits designated as 2-bit data elements for varying parameters. In this case the position of the bits within a single word designates what the bits represent.

Figure 8:
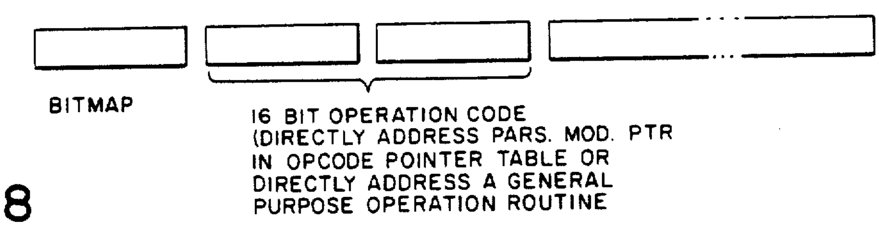

FIG. 8 shows another alternative operation code system which might be employed in implementing the method of this invention. In the FIG. 8 system, the operation code is a sixteen bit code. This sixteen bit code may be utilized to directly address the associated general purpose operation routine or a pointer to the general purpose operation routine.

(5) Compiling Source Code Commands into Object Code Command Syntax

Based on the above description of the operation code bitmap and opcode system, persons of skill in the programming art readily appreciate that the conversion of the defined commands at the source code level to the object code command syntax involves a relatively simple compiling function. Basically, the compiler converts the compound name and the assigned parameters into a set of 1 to 5 numeric values representing in decimal number format the binary values of bitmaps and opcodes. These decimal numbers are followed by the actual parameters associated with the command. As shown in the example of the generic transaction terminal program in Tables XXX and XXXI the compiler converts the source code command syntax into a sequence of code statements which can then be operated on by a machine language assembler and linker program to convert the code statements into binary form for the download into the local terminal. The final binary object code form of the generic program is shown in Table XXXII. The process of conversion from source to object code will be discussed in more detail below.

c. Storing the General Purpose Operation Routines (1) The Preferred Storage and Accessing System (FIG. 9)

Figure 9:
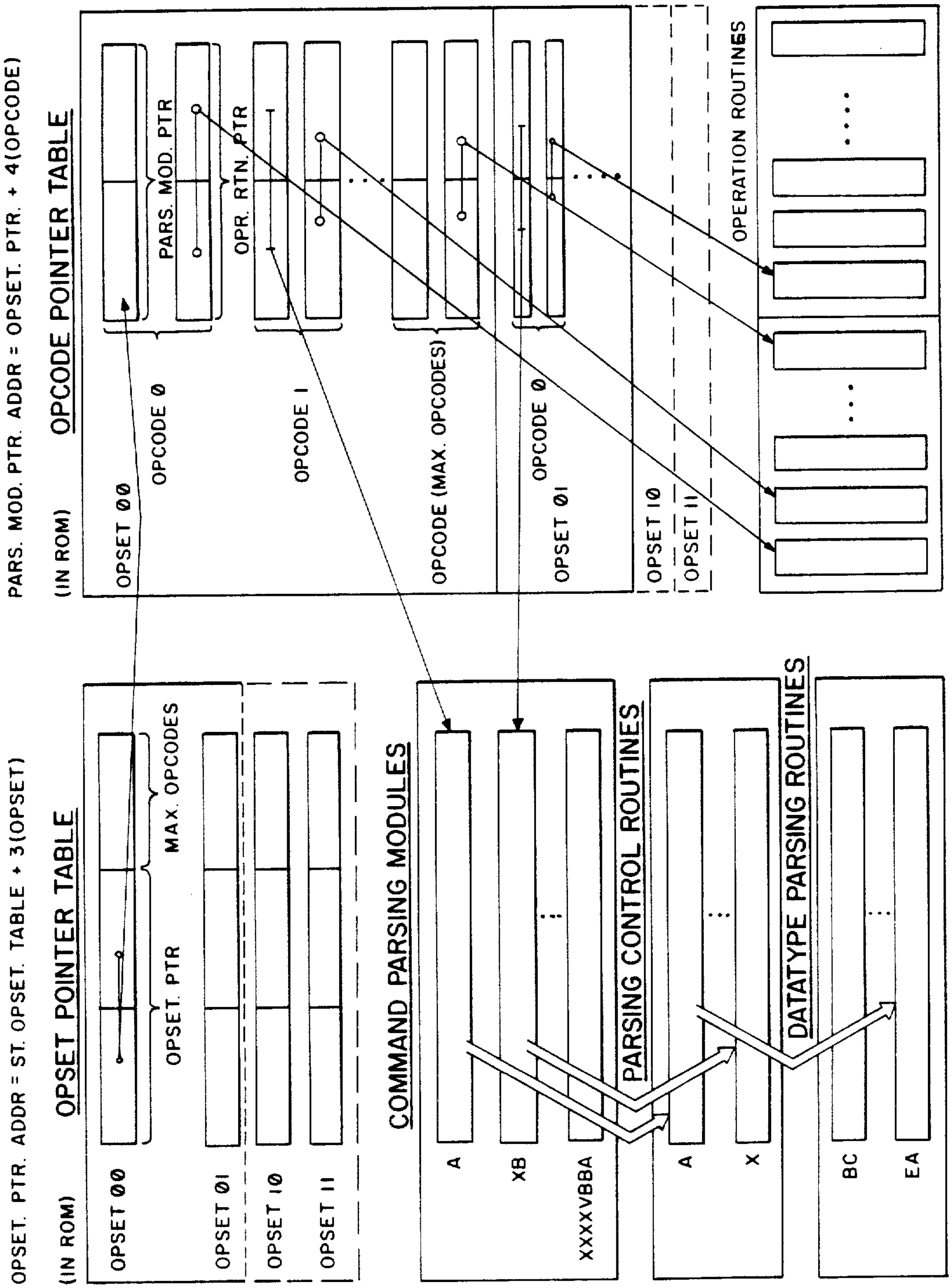
FIG. 9 illustrates a preferred system for storing and accessing operation routines and parsing routines in accordance with this invention.

FIG. 9 illustrates one approach to storing and accessing general purpose operation routines based on the opset/opcode system for designating the operation code of the associated command. As shown in Table I, most of the commands include a command name which is converted to an operation code and also a set of parameters with one or more parameter members in the set. Since this implementation of the method of this invention provides for parameters of varying data type, the general purpose operation routine associated with each command which includes parameters which may take on varying data types must have the capability of first "parsing" the parameters associated with the command and then executing an operation routine utilizing the parsed parameters.

For purposes of conceptual clarity, the general purpose operation routine associated with each command will be considered to incorporate the parameter parsing routines required for parsing the parameters associated with the command. This incorporation may be accomplished directly, i.e. by actually including the necessary parsing routines with the operation routines. Alternatively, and preferably to save memory space in the local terminal, the necessary parameter parsing routines are incorporated by reference to a set of parsing routines which are global to and shared by the different operation routines. The storage and access system shown in FIG. 9 illustrates an approach to storing parsing routines separate from operation routines and incorporating parsing routines by reference into general purpose operation routines.

As shown in FIG. 9, one implementation of the method of this invention involves storing in the read only memory of the terminal an opset pointer table, an opcode pointer table, a set of command parsing modules, a set of parsing control routines, a set of data type parsing routines, and a set of operation routines. The opcode pointer table is divided into separate opset tables and each opset within the opcode pointer table has a pair of pointers associated with each opcode value. The first pointer is a parsing module pointer and the second is an operation routine pointer. The parsing module pointer contains the address of one of the command parsing modules, i.e. the particular command parsing module associated with the command to which this opcode has been assigned. The operation routine pointer contains the address of the associated operation routine. Each of the command parsing modules includes program code for calling in sequence one or more of the parsing control routines. Each of the parsing control routines includes program code for calling one data type parsing routine from a subset of the total group of data type parsing routines. This will be explained in more detail below.

The opset pointer table contains three bytes of information, the first two bytes being an opset pointer and the third byte designating the maximum number of opcodes that have actually been defined in that particular opset. As will be discussed below, the MAX.OPCODES byte in the opset pointer table is used to verify whether the opcode number in the command being executed is a valid one, that is whether it falls within the range of opcodes actually utilized in the system. The opset pointer for each of the opset groups contains a two-byte address which is the address of the start of the corresponding opset section of the opcode pointer table.

As shown in FIG. 9, there is an algorithm which is executed to locate the appropriate opset pointer in the opset pointer table and another algorithm to calculate the location of the parsing module pointer. From the binary object code version of the command, the command execution routine recovers an opset value and an opcode value and stores these in data structures as will be described below. The location of the opset pointer may be calculated by adding three times the binary value of OPSET to the starting address of the opset table. Since there are three bytes associated with each opset in the opset pointer table, this algorithm, in effect, calculates the address of the opset pointer. When the opset pointer has been retrieved from this address, the address of the parsing module pointer is calculated by adding to the two-byte address of the opset pointer a value of four times the opcode value recovered from the binary version of the command.

Once the address of the parsing module pointer has been calculated, the two byte address which is stored at the calculated parsing module pointer address can be loaded and used to call the associated command parsing module. The subsequent call to the operation routine can be accomplished by utilizing the two-byte address which comprises the operation routine pointer immediately following the parsing module pointer. It is thus seen that the opcode pointer table directly associates a command parsing module with an operation routine. Together the command parsing module and the routines which it calls and the operation routine itself comprise the general purpose operation routine for each command.

Figure 10:
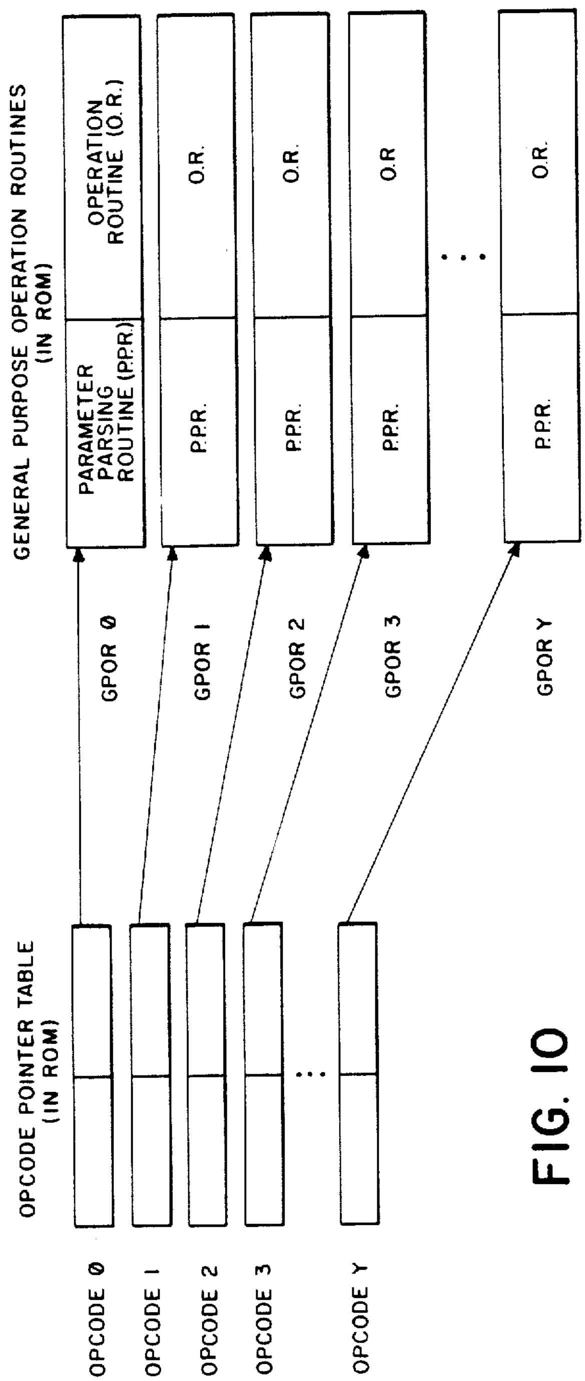
FIGS. 10 and 11 illustrate alternative systems for storing and accessing operation routines and parsing routines in accordance with this invention.
Figure 11:
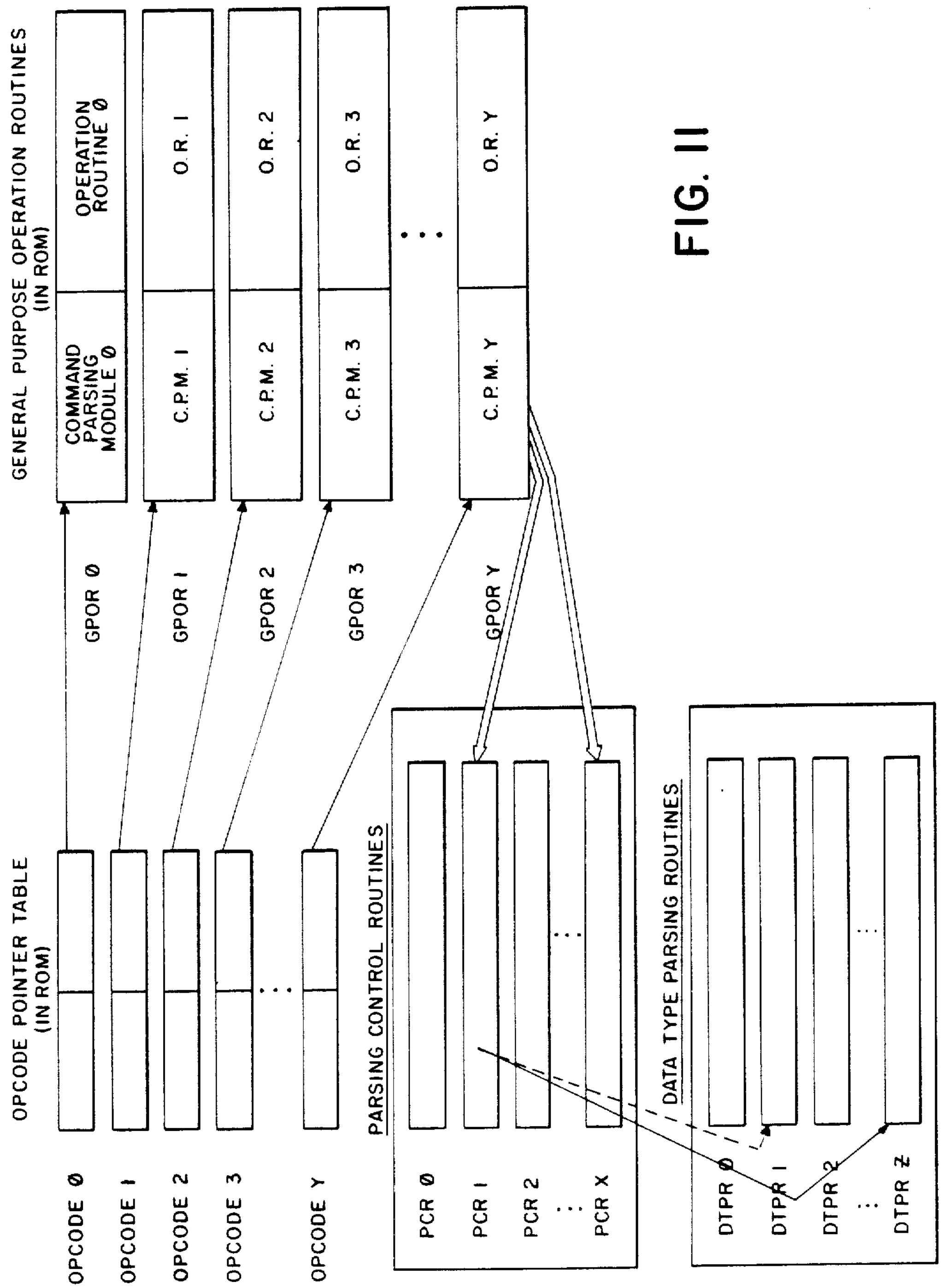

(2) Alternative Storage and Accessing Systems (FIGS. 10 and 11)

The purpose for using the preferred scheme discussed above for incorporating a parsing routine and operation routine by reference into an overall general purpose operation routine associated with each command is to reduce the amount of memory required for storing general purpose operation routines in the read only memory of the local terminal. It should be apparent that a trivial alternative, albeit one which would consume substantial additional memory space, would be to include all of the parsing control routines and data type parsing routines required for a particular command in the actual general purpose operation routine associated with that command. FIG. 10 illustrates such a system.

In this case the opcode pointer table need only contain a two-byte address of the corresponding general purpose operation routine. It should be apparent that this is a much less desirable approach from a memory space standpoint since some commands have as many as five or six associated parameters and several of those parameters may be varying data type parameters. Including all of the parameter parsing routines required in such a case locally in the general purpose operation routine would dramatically increase the code size of the general purpose operation routine and thus substantially affect the cost of memory in the terminal. It should be noted that this would have no affect on the application program download time and would have little or no beneficial affect on the speed of execution of the individual commands of the application program.

Going back to FIG. 9, the reason for separately storing command parsing modules relates to the circumstance that a number of the commands which are defined and set forth in Table I share the same ordered list of parameter types. For example, there are several commands having a single parameter of the same parameter type. There are other commands which have two parameters of the same types in the same order, and therefore have the same object syntax. Thus memory space is conserved by having the general purpose operation routines share command parsing modules.

However, as another alternative approach which would not consume a large amount of additional memory, each of the general purpose operation routines might include its own command parsing module of the type required for calling the parsing control routines which, in turn, call the appropriate data type parsing routines. This alternative scheme is shown in FIG. 11. In this case the opcode pointer table would contain the address of the general purpose operation routines and a separate parsing module pointer would not be required. The command parsing module would be located at the starting address of the general purpose operation routine which is pointed to by the operation routine pointer in the opcode pointer table.

Referring back to FIG. 9 in conjunction with Tables III and IV, it should be understood that the number of data type parsing routines stored in read only memory in the local terminal corresponds with the number of specific data types set forth in Table IV. In other words, in the present implementation of this invention in the ZON terminal, there are thirteen data types and each of these data types has a separate data type parsing routine associated therewith. As shown in Table III, there are twelve parameter types and each of these parameter types has a parsing control routine associated therewith.

Those parameter types which have only a default data type have a parsing control routines established such that it will call only a single data type parsing routine, namely the one associated with the single data type assigned to that parameter type. Others of the parameter types have three or four possible data types associated therewith. Accordingly the parsing control routines associated with those parameter types are established to determine the actual data type and call one of three or four of the data type parsing routines. Thus each of the twelve parsing control routines has associated therewith a subset of the data type parsing routines with the subset comprising one, three or four data type parsing routines.

The number of command parsing modules corresponds to the total number of different ordered lists of parameters in the object code syntax for the totality of the commands which are defined relative to the general purpose operation routines which are established. Although this means that there are large number of command parsing modules, the amount of code required to execute a sequence of calls to different parsing control routines is relatively small. Consequently, the amount of memory space occupied by the large number of command parsing modules is not overly extensive.

Referring back to FIGS. 5-7 which depict alternative operation code systems, if a single 8 bit operation code as shown in these alternative examples is utilized, a single opcode pointer table is all that is required. The parsing module pointer location can be calculated by adding four times the values of the operation code to the starting address of the opcode pointer table.

Referring to the operation code system shown in FIG. 8, the sixteen bit operation code could be used to directly address the parsing module pointer in a single opcode pointer table. If the operation code system depicted in FIG. 8 were utilized in conjunction with the approach to storing the general purpose operation routine which is depicted in FIG. 11, the sixteen bit operation code could be used to directly address the associated general purpose operation routine and the opcode pointer table could be eliminated.

These variations in implementation of the three initial steps which form the core methodology of this invention illustrates that the method of this invention is a general one. The invention is not limited to any particular form of implementation of the core programming methodologies, which provide a substantial reduction in the code size of an application program to be downloaded from a remote computer into a local terminal where it will be executed. The degree of application program code compression and the corresponding degree of reduction in application program code download time will, of course, be somewhat dependent on the particular implementation chosen.

2. Establishing an Application Program Module

Having established and stored the general purpose operation routines so that they can be executed at the local terminal and having defined a set of commands related to those general purpose operation routines, the next step is to establish an application program module on a remote computer system. This application program module will comprise a prearranged sequence of the commands which have been defined and will thus direct the local terminal to carry out a sequence of tasks by executing the associated general purpose operation routines in a particular order. Typically an overall application program to run on the local terminal will comprise a number of different application program modules, each of which enables the local terminal to carry out a set of functions associated with the transactions or other operational features which are desired.

The step of establishing an application program module is carried out by a programmer, utilizing the defined command set to put together a meaningful ordered sequence of commands, including designated parameters for each of the commands, so that a meaningful function is defined by the application program module. Other aspects of establishing an overall application program include establishing the environment of the overall application program, such as establishing application program variables and files which will be utilized. All of these are relatively standard aspects of programming. A specific illustrative example of steps involved in establishing an overall application program, utilizing the specific implementation of this invention which has been created for the above mentioned ZON terminals, and utilizing the command set which is illustrated in Table I, will be set forth in detail below.

3. Communicating the Application Program Module to the Local Terminal

The next step of the general method of this invention is to communicate the application program module which has been created from the remote computer to the local terminal. This communication step, referred to general as downloading the application program, involves the use of a download program routine operating at the local terminal, a download program operating at the remote computer and a communication link between the remote computer and the local terminal. In general, this communicating step or downloading step involves communicating a copy of the binary object code version of the overall application program, including all of the individual application program modules established in the prior step of the method, into the random access memory of the local terminal. It may also involve communicating ASCII data, the meaning and usage of which is defined by the application program, into the random access memory of the terminal.

There are numerous ways that this step can be accomplished, and a specific discussion of the application program downloading methodology which has been implemented for use in the ZON terminal is given below.

4. Establishing a Program Execution Routine

The next step in the general method of this invention is to establish in the local computer system a program execution routine for enabling the central processor unit in the local terminal to execute the application program module. This execution of the application program module is accomplished by repetitively performing the steps of reading one of the operation codes stored in the random access memory at the local terminal, accessing a specific one of the general purpose operation routines associated with the operation code which has been read, and then executing the accessed general purpose operation routine. As discussed above, the general purpose operation routine may include parsing routines for parsing the variables which are included along with the operation code in each command. To illustrate this step of the method, a specific example of methodology utilized to execute a general purpose operation routine associated with one command of an application program module will be discussed.

a. Data Structures and Arrays used in Executing Application Program Module (APM) Commands (FIGS. 12 and 13)

The program routine which is established at the local terminal for executing APM commands utilizes an arrangement of data structures and data arrays which are illustrated in FIGS. 12 and 13. FIG. 12A illustrates a scheduler data structure which is associated with the concurrent application program module scheduler feature of this invention and will be discussed below. The scheduler data structure is not actively involved in the execution of an individual APM command.

The Command Data Structure shown in FIG. 12B and the Current APM Data Structure shown in FIG. 12C are involved in command execution and will be discussed in this section. FIG. 12D represents an Array of APM Data Structures which relate to the functioning of the concurrent scheduler feature of this invention. Discussion of this feature will be deferred to a section below. FIG. 12E illustrates the bit assignment of the devices byte within the current APM data structure illustrated in FIG. 12C. This relates to concurrent scheduling of application program modules and specific discussion will be deferred to a section below.

Figure 13B:
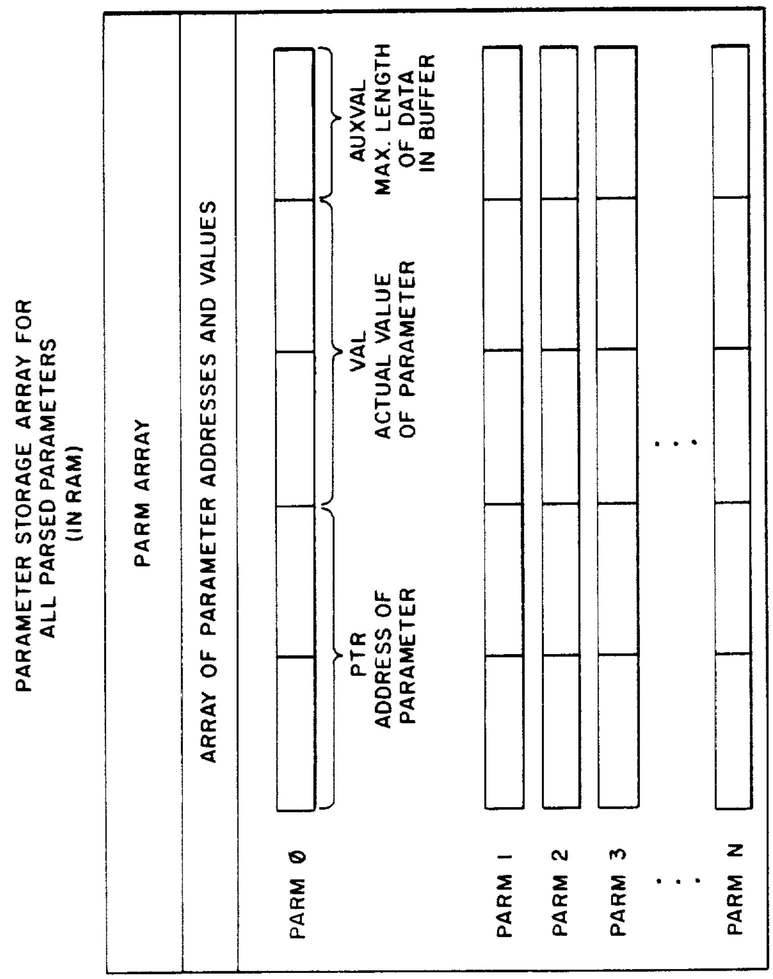
FIGS. 13A and 13B illustrate data structure and data storage arrays useful in the parameter parsing methods of this invention.
Figure 13A:
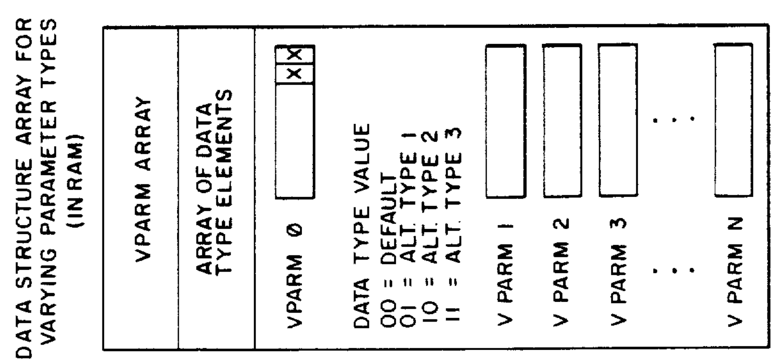

FIG. 13A illustrates the VPARM array which comprises an array of data type data elements for the varying type parameters associated with a command which is being executed. The use of this VPARM array will be discussed in this section. FIG. 13B illustrates a PARM array, which comprises an array of parameter addresses and values. This array is used in connection with parsing routines for obtaining parameter addresses and values for use by the operation routine portion of a general purpose operation routine. The use of this array will also be discussed in connection with execution of a single APM command.

Referring back to FIGS. 12B and 12C, the data elements in the command data structure will be discussed. The first data element, labelled IP, is a two-byte instruction pointer which is the working copy of the instruction pointer used in executing the current command. The second data element, labelled PREVIP, is also a two-byte data element which contains the instruction pointer to the address of the last APM command which was successfully executed. This data element of the command data structure is principally used for debugging purposes.

The next data element in the command data structure is a single byte data element labeled OPCODE. This data element stores the binary opcode associated with the APM command being executed. The next data element is a single byte labeled OPSET and is used to store the 2 bit opset value designating which opset or operation code group the current APM command is located in. The next data element is a single byte labeled CURPARM. This is a working variable utilized by the parameter parsing routines during execution of an APM command to keep track of the number of the parameter which is currently being parsed so that the address and value information associated with that parameter will be inserted into the correct location in the PARM array.

The final data element in the command data structure is a single byte element labeled CURVPARM. This data element is a working parameter utilized in assigning the data type data element present in a bitmap byte in the object code version of a command to an appropriate location in the VPARM array shown in FIG. 13A. It is also a working parameter during parameter parsing to keep track of the next location in the PARM array to be used to identify the data type of the next varying parameter type to be parsed. The functioning of each of these data elements in the command data structure will become more clear from the discussion below of the actual APM command execution routine, together with some examples of the execution of actual parameter parsing routines and associated operation routines for specific APM commands within the command set listed in Table I.

The current APM data structure shown in FIG. 12C includes a number of data elements associated with executing an application program module. The first data element is a two byte data element labeled CURRIP which contains a 16 bit pointer which is the current instruction pointer for the application program module. In other words this pointer indicates the address of the first byte in the object code command that is now being executed.

The next data element is a two-byte element labeled XTIMER. This data element is utilized by operation routines to setup a timer value and to check for the lapse of a period of time associated with that value. The next data element is a single byte data element labeled DEVICES. The DEVICES data element is a bitmap which is used by application program modules to indicate the different types of input from different input devices that the particular application program module is waiting for. The individual bits of this data element are set and reset by certain commands within an application program module. Specifically, the NEED_INPUT command may be executed within an application program module to set a particular one or more of the devices bits. This command and the associated operation routine will be discussed below.

The next data element is a two-byte element labeled RETCODE. This data element is a variable which contains the return code or the current status code for the associated application program module. This variable can be used to communicate between a subroutine and a main routine in an application program module or to communicate the final status value from one application program module to another, in connection with concurrent execution of application program modules utilizing the scheduler feature of this invention.

The next data element in the current APM data structure is a single byte data element labeled STACKHEAD which represents the index to the top of the stack for the current application program module which is being executed. The stack for application program modules is maintained on a software level as a linked list of three-byte data elements. The number of those data elements and thus the size of the total data area that the stack occupies can be determined by the application programmer when creating the source code for the overall application program.

The next data element is a single byte element labeled OPMISC which is followed by a two-byte data element labeled OPSTATE. These data elements are utilized by certain of the commands which may require repeated execution in order to accomplish a particular task. The application program accomplishes this by setting these two parameters to reflect what execution is occurring at the present time, adjusting the instruction pointer, and then suspending the application program module. When that application program module is again started by the scheduler, it will start on the same instruction, select the recorded point of execution to continue from, execute some further machine-language instructons, and continue this process of instruction execution until the task is finished.

The VPARM array shown in FIG. 13A is used for communicating, from the command execution routine to the command parsing routines, the parameter data type information which is contained in any bitmap associated with the command in the application program module. The command execution routine loads the data type data elements in bitmaps sequentially into the VPARM array. The data type values for the parameters of the command can then be read by the individual parsing control routines for varying parameters, (i.e. parameters which have varying data types to satisfy the parameter) to determine which data type parsing routine should be called for parsing that particular parameter. This array may for example contain twelve data elements each having a single byte. Only the first two bits of each byte are required for indicating the data type value of the associated parameter in the command. The number of data elements which are actually used in connection with execution of a particular command, of course, depends on the number of parameters which may have varying data types in that command.

The PARM array shown in FIG. 13B is used for communicating between the data type parsing routines and the operation routine executed for a particular command. This array contains the actual address of each parameter in a two-byte pointer labeled PTR, and the actual value of the parameter in a two-byte element labeled VAL, except in cases where the parameter is a string. In the case of a string, the current length of the string is contained in the VAL element. The one byte AUXVAL data element is used only in the case of parameters stored in buffers and this element stores a maximum length for the amount of data which can be put into that buffer. This is especially useful in connection with the commands involving string operations because it makes it possible to avoid accidentally overflowing a buffer and wiping out data which was stored elsewhere in memory.

b. Execution of an Application Program Module Command (FIG. 14)

Figure 14:
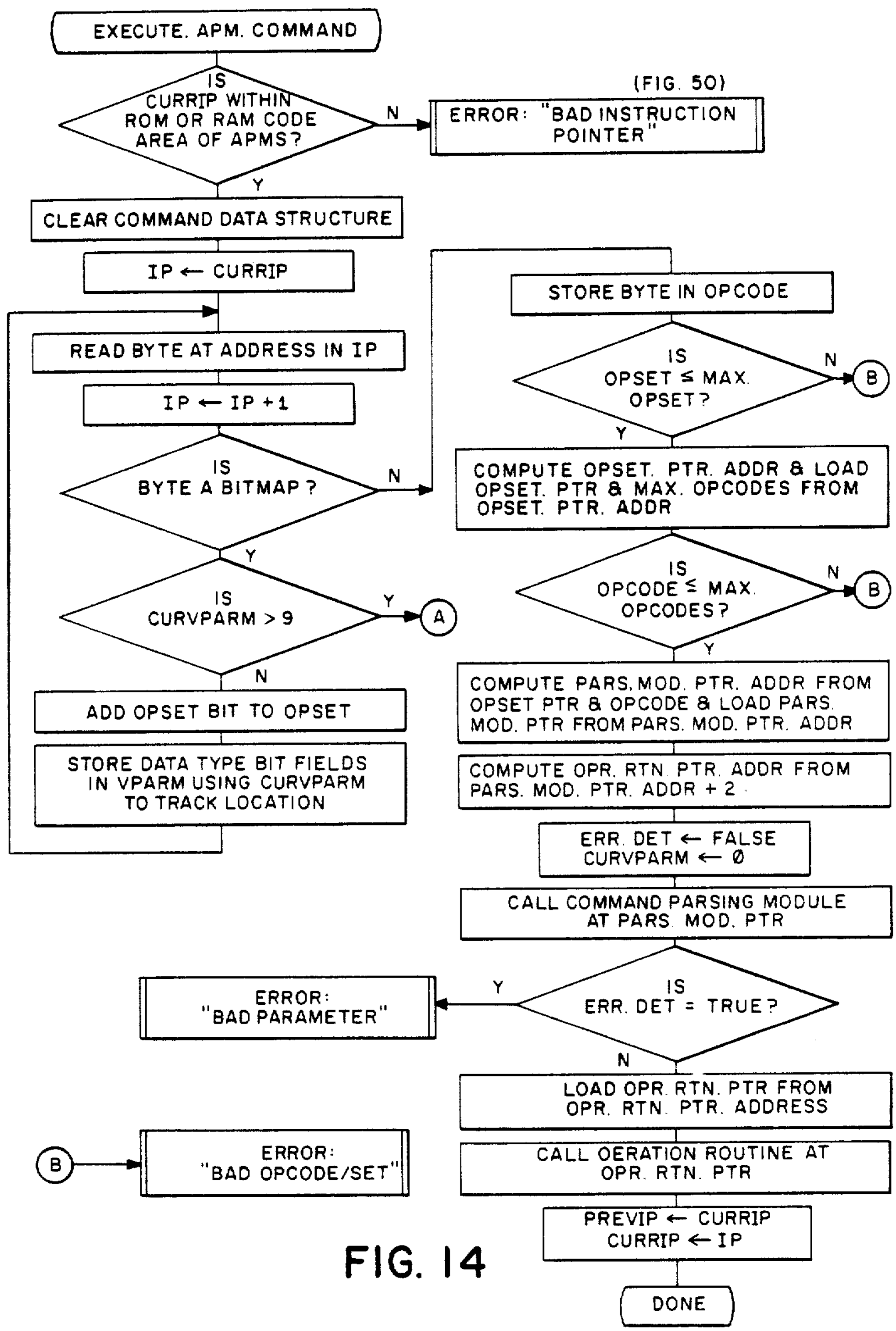
FIGS. 14-22 are flowcharts illustrating routines associated with executing application program module commands in accordance with this invention.

FIG. 14 illustrates a command execution routine for an application program module command which is provided in a current implementation of the method of this invention in the ZON terminal. The APM command execution routine utilizes the data structures shown in FIGS. 12 and 13. It utilizes the operation code bitmap and opcode system depicted in FIGS. 4A and 4B, and it utilizes the parsing routine, operation routine, and accessing approach thereto depicted in FIG. 9 and discussed above. Reference will be made to all of these figures in discussing the command execution routine for purposes of clarity.

The first step in the routine is to determine whether the address of the command which is stored in the CURRIP data element shown in FIG. 12C is within the ROM or RAM code area of the terminal. This is an optional checking step to determine that the instruction pointer for the command actually points to a memory storage location where there is a APM command stored. Most of the APMs are stored in RAM and are downloaded from the remote computer. In the ZON terminal implementation, a few APMs are also stored in ROM because they are APMs which are universal to all application programs that might be created. If this test returns a NO value, an executive error for bad instruction pointer is executed. The error trapping routine will be discussed below.

Assuming this test produces a YES result, the next step of the routine is to clear all of the operation code parameters which were used by the last command. This includes clearing the OPCODE, OPSET, CURPARM, and CURVPARM data elements in the command data structure shown in FIG. 12B and clearing the VPARM array and the PARM array shown in FIGS. 13A and 13B.

(1) Decoding Bitmap and Opcode Bytes

The routine now begins the steps necessary to decode the bitmap and opcode bytes which are in the object code command line. Thus the next step is to read the next byte in memory at the address given in the CURRIP data element. This is done after setting IP to the value of CURRIP so that IP can be used as a working instruction pointer without changing the value in CURRIP. This will be the first byte of the operation code. Following this a test is made to determine whether that byte is a bitmap or not after incrementing IP by 1 to point to the next byte in the operation code.

Referring to FIG. 4A, it can be seen that this test is performed by looking at the type flag which is the 7th bit of the byte that has been read to determine whether it is a 0 or 1 value. If it has a 1 value, this test indicates that a bitmap is present. If it has a 0 value, this test indicates that an opcode byte has been read. For purposes of illustration, assume that this first byte is a bitmap byte so that the test returns a YES. When this occurs the next step is a checking step to determine if the value of CURVPARM is greater than nine. If this step returns a YES value, a BAD PARAMETER error is declared. The reason for this is that there are a maximum of four bitmaps in this implementation and thus a maximum of twelve data type data elements. If the next byte is a bitmap, it has three additional data type data elements. If CURVPARM is already greater than nine, this means that the maximum of four bitmaps have already been decoded and there is a bad parameter specification in the command.

Assuming this checking step returns a NO value, the next step is to add the opset bit of the bitmap into the opset parameter in the command data structure of FIG. 12B. Following this step the three data type bit fields in the bitmap are examined in sequence and stored in sequence in the VPARM array. Preferably this is accomplished by a sequence of steps in which the individual two bit data elements in the bitmap byte are isolated and saved into the VPARM array of FIG. 13A. During this operation the CURVPARM parameter is incremented each time a particular two bit field is saved to indicate the location in the VPARM array for saving the next two bit field.

Once all three data type bit fields have been examined and stored in the VPARM array, the routine loops back to read the next byte at the address in IP and to determine whether that byte is a bitmap or a opcode. If the next byte is a bitmap, the same set of steps are performed to add the opset bit to the opset parameter and to store the data type bit fields of that bitmap in the VPARM array. If the next byte is a opcode, the command execution routine stores that byte in the opcode parameter in the command data structure shown in FIG. 12B.

(2) Checking Validity of Opset and Opcode Values

The next step performed by the routine is to determine whether the opset value which has been taken from the bitmaps is less than or equal to the maximum number of opsets which have been defined. If the opset value is greater than MAX.OPSET, then an executive error for BAD OPSET is executed through an executive error routine which will be discussed below. Assuming the opset is a valid opset, the next step is to compute the opset pointer address and then to load the opset pointer and MAX.OPCODES values located at that address. The opset pointer address is computed utilizing the algorithm shown in FIG. 9, i.e. by adding three times the opset value to the address which is the start opset table address.

The next step is to determine whether the opcode value is less than or equal to the maximum number of opcodes for this set of opcodes. If it is not, an error is declared, and if it is, execution continues to the steps involved in parsing any parameters associated with the command.

(3) Parsing Command Parameters and Executing the Operation Routine

The next step in the routine involves computing the parsing module pointer address from the opset pointer value and opcode value and loading the parsing module pointer found at that address. Next the operation routine pointer address is calculated by adding two to the value of the parsing module pointer address. Following this ERR.DET is set to FALSE and CURVPARM is set to value 0. This is performed to initialize these tracking data elements for the steps of the routine to follow. This step is followed by calling for execution the command parsing module at the address indicated by the parsing module pointer. As previously discussed, this command parsing module will call one or more parsing control routines in sequence which in turn will call individual data type parsing routines depending on the value of the associated data type in the VPARM array. A specific example of executing a command parsing module and associated parsing control routine and data type parsing routine will be discussed below.

After the command parsing module has been executed a checking routine will be executed to determine whether any of the parsing routines have set the error detect parameter to a TRUE value. If this test shows that error detect is TRUE, an executive error for a bad parameter will be executed. If the error detect parameter has a FALSE value, the command execution routine continues by loading the operation routine pointer from the operation routine pointer address previously calculated. The next step is to call the operation routine for the command at the address represented by the value in the operation routine pointer. Some specific examples of executing actual operation routines for particular commands will be given below.

After the operation routine for the command has been executed, the next step is to set the PREVIP variable to the value of the CURRIP variable and to set the CURRIP variable in the current APM data structure shown in FIG. 12C to the value of the IP variable in the command data structure. As will be seen in the discussion below, the value of the IP data element, i.e. the current instruction pointer, changes as the command is being executed. This step is performed so that the PREVIP data element will contain the value of the instruction pointer for the last successfully executed command and the CURRIP data element will contain the current working value of the instruction pointer, in case this particular application program module is to have its current APM data stored away in the APM data structure array to allow another application program module to continue its execution. This is a part of the concurrent schedule or feature of this invention which will be discussed below. Although not relevant at this point, it will be understood that the value of the IP parameter in the command data structure of FIG. 12B will be loaded with the CURRIP value at the time a particular application program module is loaded for execution by this concurrent scheduler. After the step of setting PREVIP and CURRIP parameters has been performed, execution of the APM command is finished. What happens at this time will be depend on the task that has been performed by the executed command. The various possibilities will be discussed below in connection with the concurrent scheduler routine of this invention.

c. Specific Example of Execution of an Application Program Module Command

To illustrate the execution of a single command in an application program module, execution of a START_JOB command, will be described. This command will also be referred to as the START.APM command. In Table I, the term job is used to refer to application program modules. Herein the term APM will be used most of the time, but it should be understood that the two terms mean the same thing.

Referring to Table I, it will be noted that the START_JOB command utilizes two parameters. The first parameter is referred to as the job id parameter which is a X type parameter and the second is an address parameter which is a type A parameter. Accordingly, as will be seen, the execution of the START_JOB command will involve calling a command parsing module with an XA label. In other words the parsing module pointer in the opcode pointer table associated with the START_JOB command will point to the address of an XA command parsing module.

Figure 15:
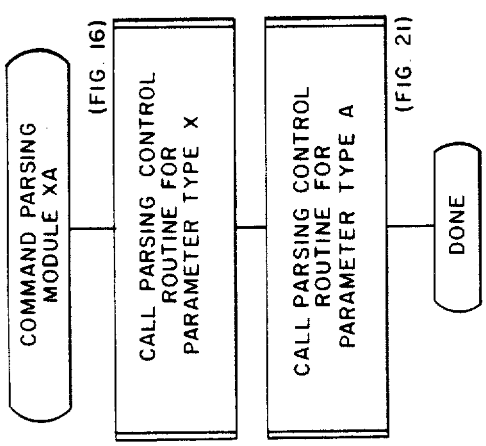

(1) Executing Command Parsing Module XA (FIGS. 9 and 15)

FIG. 15 illustrates the command parsing module XA which will be called for parsing the two parameters of the START_JOB command. As shown, command parsing module XA involves two steps: the first step calls a parsing control routine for parameter type X, and the second step calls a parsing control routine for parameter type A. Referring to FIG. 9, there will be included within the command parsing modules stored in the read only memory a command parsing module of the XA type. Within the parsing control routines stored in the read only memory, there will be parsing control routines for the X and A type parameters as shown. As indicated in Table II, the X type parameter is a varying parameter type and can take on four possible data types. The default data type is BC and the alternate data types are VS, EC, and SV. This means that the parsing control routine for the parameter type X will call one of four possible data type parsing routines stored in read only memory. The particular data type parsing routine which is called will depend on the value of the "data type" element in the VPARM array. In this case since the X type parameter is the first one being parsed, the "data type" value in VPARM 0 in the VPARM array will determine which of the data type parsing routines is actually called by the parsing routine X. This will be clear from a consideration of the parsing control routine X shown in FIG. 16. FIGS. 17-20 illustrate the data type parsing routines associated with data types BC, VS, EC, and SV, respectively.

Figure 16:
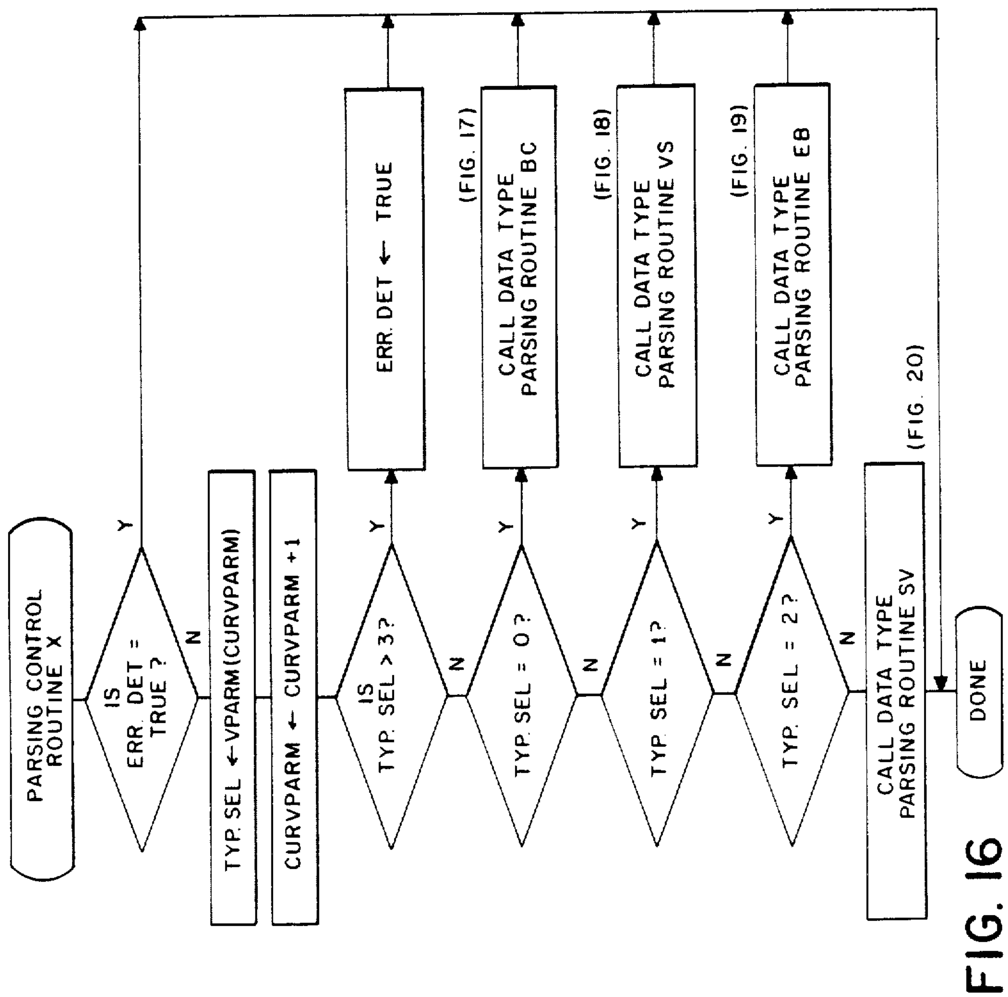

(a) Parsing Control Routine for Parameter Type X (FIG. 16)

Referring now to FIG. 16 showing parsing control routine X, the first step in that routine is to determine whether the error detect parameter is set to a TRUE value. Since this is the first parsing control routine to be executed, and ERR.DET was set to FALSE in the EXECUTE.APM.COMMAND routine prior to calling the command parsing module XA, this checking step will return a NO value and execution of the parsing control routine X will continue. If this parsing control routine X were a second routine and an error had been detected in a data type parsing routine called by a earlier parsing control routine, then ERR.DET would be TRUE, the checking step would return a YES value, and the remainder of the steps of this parsing control routine X would to be skipped, since there is no reason to attempt to parse this parameter if a error was detected in parsing a previous parameter.

Assuming that the execution of the routine continues, the next step is to set the type select variable to be equal to the data type value in the VPARM array corresponding to the location indicated by the CURVPARM data element in the command data structure of FIG. 12B. Since this is the first variable parameter type being parsed, CURVPARM will be equal to 0 and the type select variable will be set to the value of the data type in VPARM 0 of the VPARM array of FIG. 13A. The value stored in that location of the VPARM array will depend on how the job number parameter was specified by the programmer in using the command in the application program module in which it is inserted. For purpose of illustration, all of the possible cases of the value of this data type element VPARM 0 will be considered. After setting TYP.SEL, CURVPARM is incremented by one so that it will point to the next data element in the VPARM array.

The next step in parsing control routine X is to check to see whether the value of the type select variable is greater than 3. Since there are only four possible values for the data type value namely 0, 1, 2 and 3, i.e. these are stored in binary 2 digit number fashion, there is clearly an error in the type select value if its value is greater than 3. If such an error is detected the error detect parameter is set TRUE and the rest of the steps of the routine are skipped. Assuming that the value of the type select parameter is not greater than 3, the parsing control routine X will go through a series of steps to determine what the actual value of the type select parameter is and call the appropriate data type parsing routine associated with that value.

If type select is equal to 0, the BC data type parsing routine will be called. If the type select value equals 1, the VS data type parsing routine will be called. If the type select value is equal to 2, the EC data type parsing routine will be called. If the type select value is equal to 3, then the SV data type parsing routine will called. That completes the execution of parsing control routine X, and execution will pass back to the command parsing module XA which called the routine, and it will then call the parsing control routine for parameter type A. This parameter code control routine will be discussed below, after the following discussion of the steps involved in the data type parsing routines which may be called by parsing control routine X.

Figure 17:
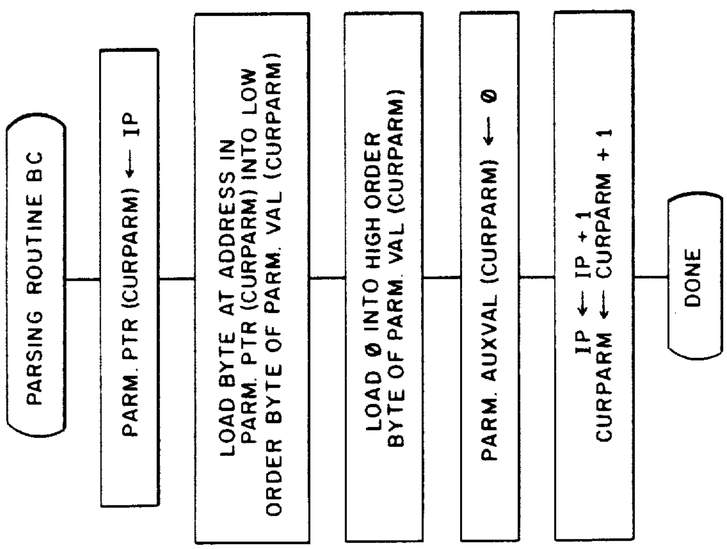

(b) Parsing Routine BC for Constant-Byte Data Type (FIG. 17)

FIG. 17 illustrates the steps of data type parsing routine BC. Referring back to Table III, it will be seen that data type BC is a byte constant so the actual parameter in the object code downloaded into the terminal will be a single byte containing the value of that byte constant. Keeping this in mind will make the following discussion of the parsing routine steps more meaningful.

An implicit step in data type parsing routine BC is to find the current element of the PARM array of FIG. 13B which is that element which is specified in the value of the variable CURPARM in the command data structure of FIG. 12B. (Remember, CURPARM is tracking the current variable being parsed to store the address and value in the proper location in the PARM array.) This can be looked at the setting a parameter pointer value to the address of the first byte in the PARM array corresponding to the CURPARM variable value. There are a number of ways that this setting step can be achieved. For example, since the starting address of the PARM array will be known, the value of the PARM pointer can be calculated by adding to that starting address five times the value of the CURPARM parameter since there are five bytes in each of the elements of the PARM array.

The next step in the data type parsing routine BC is to set the two pointer bytes located at the value of the parameter value pointer to the two-byte value of IP in the command data structure. This is represented in FIG. 17 by the following notation:

PARM.PTR(CURPARM)←IP

This means that the element PTR in the PARM array at the location set by the value in the data structure element CURPARM is set to the value in the data structure element IP. Similar notation will be used throughout the flowcharts in the drawings.

Since the instruction pointer IP contains the address of (is pointing to) the next variable in the object code version of the command stored in RAM and that variable is the byte constant itself, the address of the parameter is the current value in the instruction pointer IP.

The next step is to load the byte at the pointer address into the low order byte of the VAL data element at the parameter pointer location. This step is represented by the same type of notation as given above. This step is followeed by loading a 0 value into the higher value byte of the VAL data element. The next step is to set the AUXVAL data element to a 0 value. Following this the value in IP is incremented by 1, so that the IP points to the next variable in the command. In addition the CURPARM variable in the command data structure is incremented by 1 so that it will designate the next location in the PARM array for storing the results of the next data type parsing routine to be executed, if any. This completes the data type parsing routine BC. In summary what this data type parsing routine does is load the actual byte value of this parameter in the object code into the PARM array along with its address in the object code command.

Figure 18:
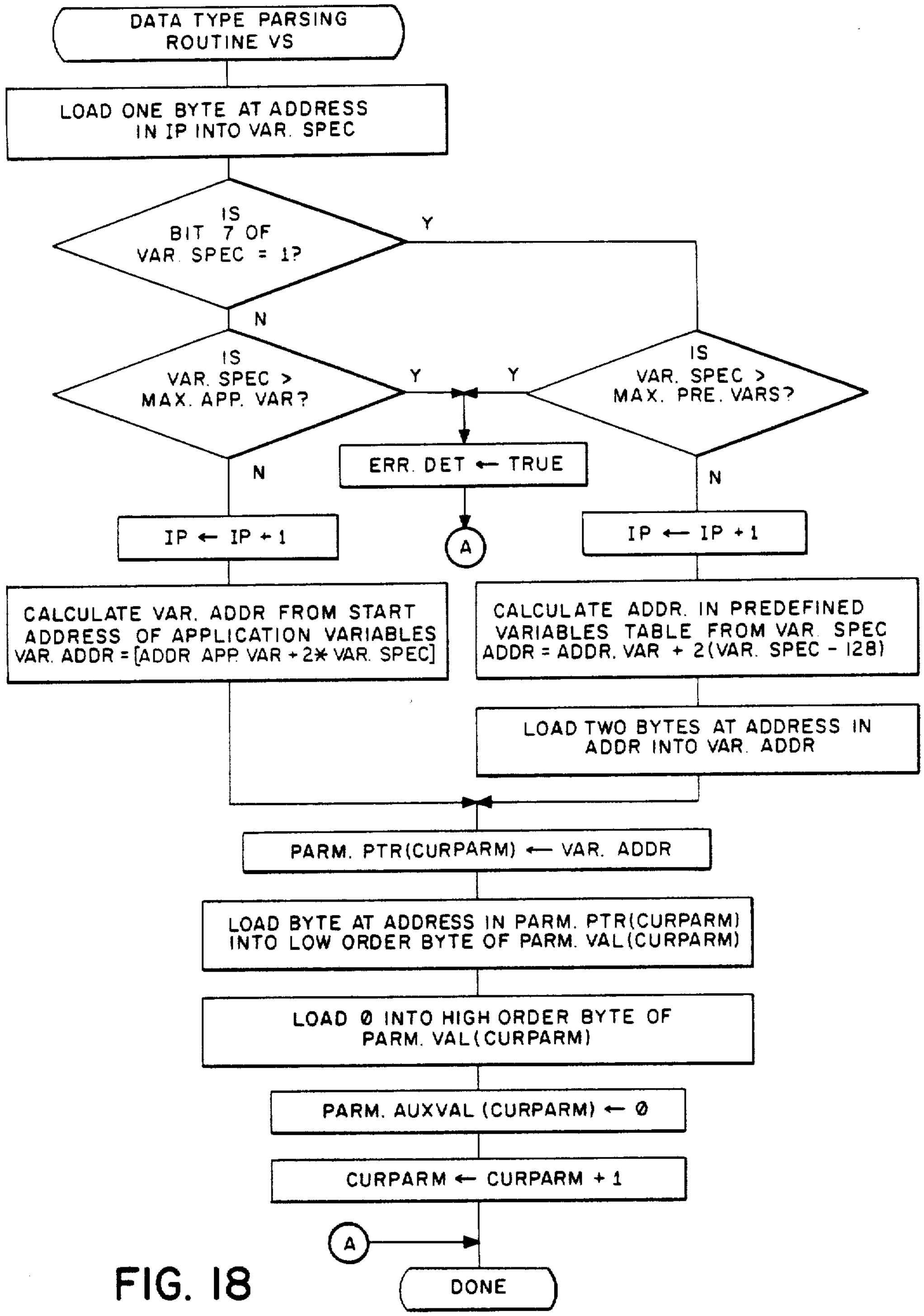

(c) Parsing Routine VS for Variable-Byte Data Type (FIG. 18)

Referring back to the Table III, it will be noted that a data type VS is a byte variable. This means that the value assigned to this parameter must be found as the value of a variable located somewhere in memory storage. To parse this variable, the parsing routine must determine the address of the variable and then read the actual value of that variable at the variable address and insert the value of the variable into the PARM array as part of the execution of the parsing routine. This VS type parsing routine is shown in FIG. 18.

Before discussing the steps of this routine, it should be understood that, in this specific implementation, there are predefined variables whose addresses are stored in a predefined variables table. Application defined variables are all stored in sequence in random access memory at the local terminal with a known starting address of the application variables. With this information let us now consider the steps of the data type parsing routine VS.

The first step is to load one byte at the instruction pointer into a register called VAR.SPEC. The next step is to check to see whether bit 7 of VAR.SPEC is equal to 1. If it is, that signifies that the byte variable is one of the predefined variables. If it isn't, that signifies that the variable is one of the application defined variables. Assume for the present that bit 7 is equal to 1. The next step in the routine is to check to see whether VAR.-SPEC has a value greater than the maximum number of predefined variables. If it is greater, the error detect variable is set to a TRUE value and the routine terminates. Assuming that VAR.SPEC is not greater than the maximum number of predefine variables, the next step is to increment IP by 1 and then to calculate the address in the predefined variables table from the value of VAR.-SPEC. This is done in accordance with the algorithm shown in FIG. 18. Substracting 128 from VAR.SPEC is eqivalent to setting bit 7 equal to 0, so that the VAR.-SPEC takes on values between 0 and 127.

After this address has been calculated, the two bytes present at that address are loaded into a register given the label VAR.ADDR. At this point the value of CURPARM is implicitly used to establish the address of the next parameter structure in the PARM array, and the PTR data element at that location in the PARM array is loaded with the value in VAR.ADDR. The next step is to load the single byte at the address in the PTR element, which is the same as the address in VAR-.ADDR, into the lower order byte of the VAL data element, and then to load a 0 into the higher order byte of the VAL data element as well as the AUXVAL data element. The final step is to increment the value of CURPARM in the command data structure, thereby advancing to the next parameter location in the PARM array.

Going back to the test for bit 7 of VAR.SPEC being equal to 1, assume at this point that bit 7 is 0. This designates that the parameter is an application defined variable. This branch of the routine next executes a check to see whether VAR.SPEC is greater than the maximum application variables defined. If it is, then ERR.DET is set TRUE and the routine terminates. If it isn't, the value of IP is incremented by 1, and the value of VAR.ADDR is calculated from the starting address of the application defined variables using the algorithm shown. The remaining steps in the execution of the routine are the same as described previously after the value of VAR.ADDR is determined.

Figure 19:
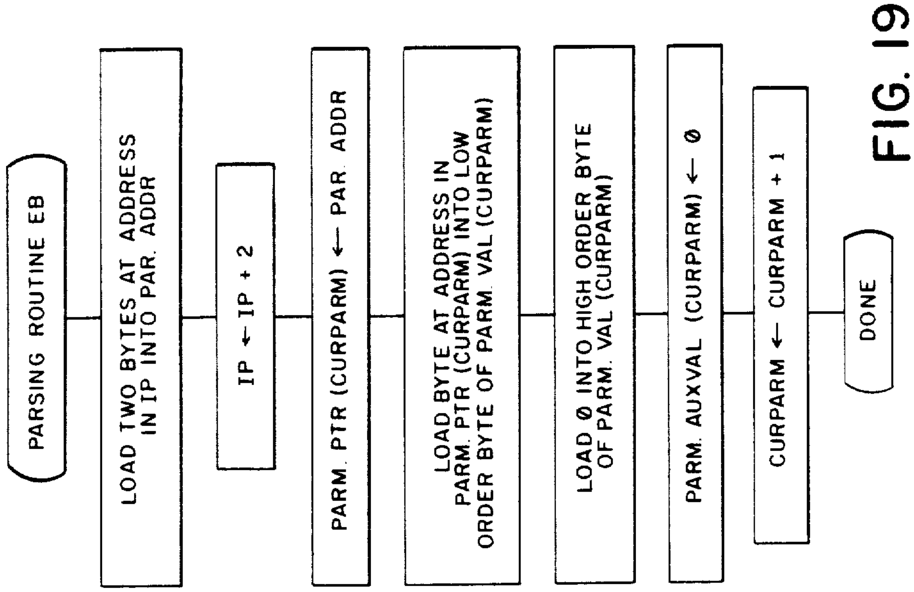

(d) Parsing Routine EB for Extended-Byte Data Type (FIG. 19)

A parameter which takes on an EB data type means that the programmer has arranged to store the single byte value of the parameter at a specific address in memory. Therefore, the object code version of the command contains two bytes which represent the actual address at which the value of the parameter will be found. Accordingly, the parsing routine for an EB type parameter is relatively simple as shown in FIG. 19.

The first step of the routine is to load two bytes at IP into a register designated PAR.ADDR. The next step is to increment IP by 2 since 2 bytes have been loaded from the object code command line. It is understood that there is an implicit step here, to locate the appropriate structure within the PARM array utilizing the value of CURPARM in the command data structure of FIG. 12B. Next the PTR data element in the current section of the PARM array pointed to by CURPARM is set to be equal to the value of PAR.ADDR. The following step is to load a single byte from the memory location at the address in PAR.ADDR into the VAL element of the current PARM section. Next a 0 value is loaded into the high order byte of the VAL data element and into the AUXVAL data element. The following step increments the CURPARM value by 1. That concludes the data type parsing routine EB.

Figure 20:
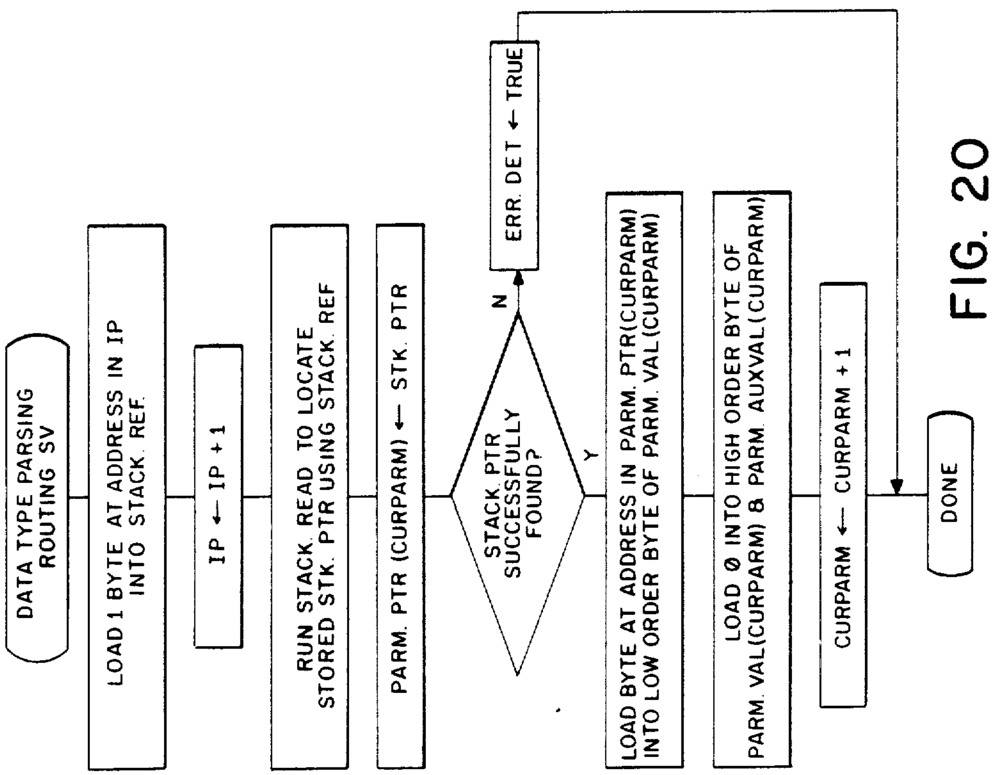

(e) Parsing Routine SV for Stack Ref.—Byte Data Type (FIG. 20)

A parameter which takes on an SV data means that the programmer intends to locate the value of the parameter at a stack pointer address located in the stack at a point referenced by the specified value of the parameter. Therefore the object code version of the command contains a single byte which represents the location in the stack of the stack address pointer.

The SV parsing routine is illustrated in FIG. 20. The first step in the routine is to load one byte at IP into the data register labelled STACK.REF. Following this the value of IP is incremented by 1, and then a Stack.Read routine is run to locate the stored STK.PTR address using the value of STACK.REF as the depth in the stack corresponding to the STK.PTR address. The PTR data element at the current location in the PARM array selected by CURPARM is then loaded with the value of the STK.PTR.

Next a checking step is performed to determine if the STK.PTR was successfully found. ERR.DET is set TRUE and the routine terminates if this step returns a NO value. If this step returns a YES value, a byte at the address in PTR element is loaded into the low order byte of the VAL element in the current section of the PARM array. Following this the value 0 is loaded into the high order byte of VAL and into AUXVAL. Finally, CURPARM is incremented by 1 to select the next section of the PARM array, and this parsing routine is done.

Figure 21:
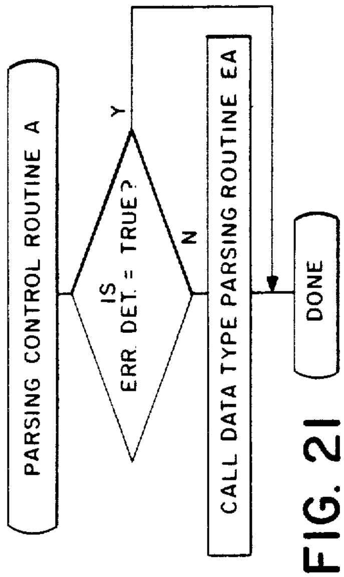

(f) Parsing Control Routine for Parameter Type A (FIG. 21)

Referring back to FIG. 15, it is seen that command parsing module XA calls a parsing control routine for parameter type A after it has finished calling the parameter control routine for parameter type X. In other words, after the parsing control routine X shown in FIG. 16 is done executing, the parsing control routine for parameter type A shown in FIG. 21 will be executed.

Referring back to the TABLE III, it is seen that parameter type A has only one data type associated with it, namely the EA data type. Accordingly, the parsing control routine A contains simply an instruction to call the data type parsing routine EA after checking to determine whether the value of ERR.DET was set TRUE by the prior parameter parsing routines. Note that this parsing control routine does not increment the value of CURVPARM since the A type parameter in not a varying parameter type. value in (g) Parsing Routine EA for Extended-Address Data Type (FIG. 22)

Figure 22:
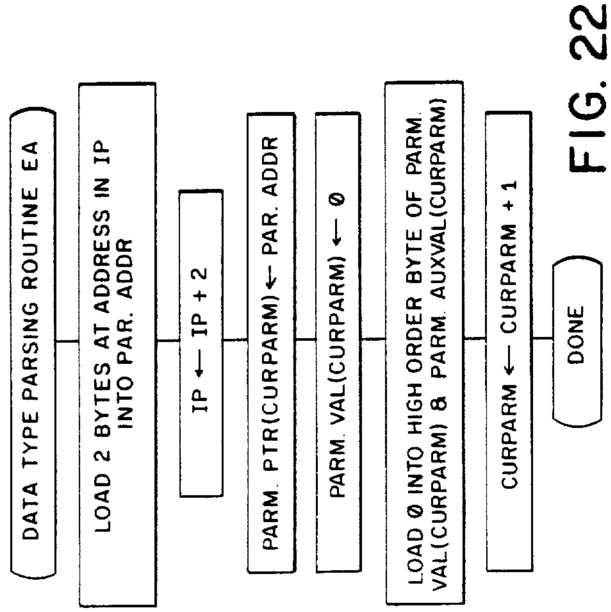

FIG. 22 illustrates the sequence of steps which are performed by the data type parsing routine EA to parse an A type parameter. The A type parameter is an address constant and the object code form of the command contains the actual address value as a two-byte parameter. Accordingly the EA parsing routine begins with loading the two bytes at the address in IP into the data register called PAR.ADDR. Next, IP is incremented by two since two bytes have been read from the object code. The PTR data element of the current section of the PARM array as specified by CURPARM is then set to the value of PAR.ADDR.

Since this parameter has only an address and not a value, the VAL component at this location in the PARM array is set to 0. Following this the value 0 is loaded into the high order byte of VAL and AUXVAL. The final step is to increment CURPARM by 1 to select the next section of the PARM array.

(h) Other Data Type Parsing Routines

All of the parsing routines for the byte data types and the parsing routine for the address data type have been described in detail above. The parsing routine for the integer and string data types shown in TABLE IV have a very similar structure of sequential steps. For example, the data type parsing routines for the integer data types VI, EI, and SI are virtually identical to the data type parsing routines for the byte data types VS, EB, and SV shown in FIGS. 18, 19, and 20. The only difference is that, in each case, instead of loading a single byte at PARM.PTR(CURPARM) into PARM.VAL(CURPARM), two bytes are loaded.

The data type parsing routine for the integer constant data type IC is quite similar to the data type parsing routine BC for the byte constant shown in FIG. 17 except that two bytes are loaded from the object code command line into PARM.VAL(CURPARM) and the step of loading 0 into the high order byte of this VAL element is not included and the value of IP is incremented by 2 since two bytes have been read from the object code.

The parsing routines for the string data types ES and SB are identical to the data type parsing routines EC and SV shown in FIGS. 19 and 20. The parsing routines for the string data types BS and SC are somewhat different from the parsing routines for byte data types VS and BC. The parsing routine for the BS data type looks up to the actual address of the buffer in a different table than the one used for looking up the address of variables. The buffer table is located towards the beginning of the fixed address download variables, and always contains seventeen entries in the current implementation. The first fifteen of these entries can be addressed by name by the applications programmer. The contents of each entry in the buffer table are the address of the buffer comprising two bytes and the maximum length of the buffer. The address of the buffer is copied out of the table into the PTR element of the PARM array location and the maximum length byte is copied out of the table into the AUXVAL element of the PARM array at the appropriate location. The VAL element is a single byte taken from the address in the PTR element.

The SC data type parsing routine is similar to the data type parsing routine BC in loading the PTR and VAL and AUXVAL components of the current location in the PARM array. However, the object code line of the command contains, for the string parameter, a first byte (i.e. the one loaded into VAL) which specifies the length of the following string in byte plus one. Thus the step of incrementing the value of IP adds the value in VAL to IP, to push IP past the bytes which represent the string, to the beginning of the operation code for the next command. In any operation routines which use the SC data type, the address of the string is computed by adding 1 to the PTR value stored in the PARM array.

It should be noted that in every case, on finishing executing the parsing routine for the last parameter of a command, IP has been advanced to point to the beginning of the following command stored in RAM. As will be seen later, this means that, unless the operation routine changes the value of IP to cause a program branch, after the operation routine has finished executing, CURRIP will be set from IP and used for the address of the next command to execute.

Figure 25:
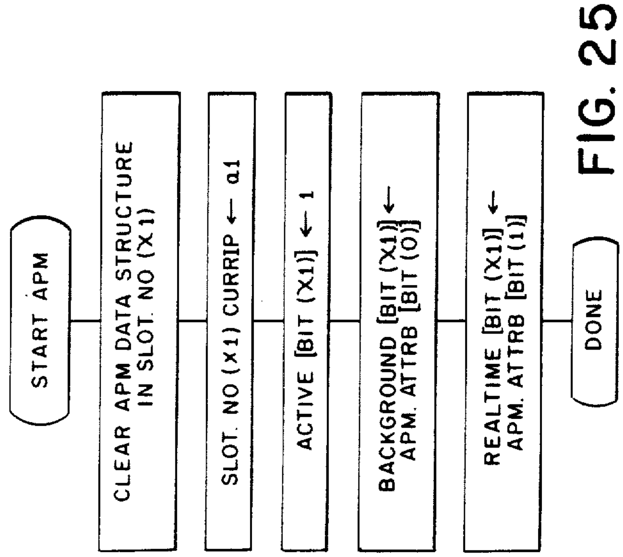
FIGS. 23-26 are flowcharts illustrating operation routines associated with application program module commands provided in accordance with this invention.
Figure 24:
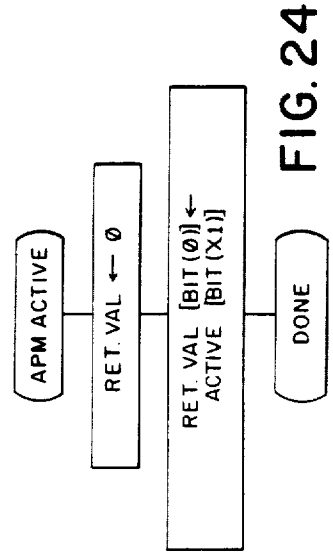
Figure 23:
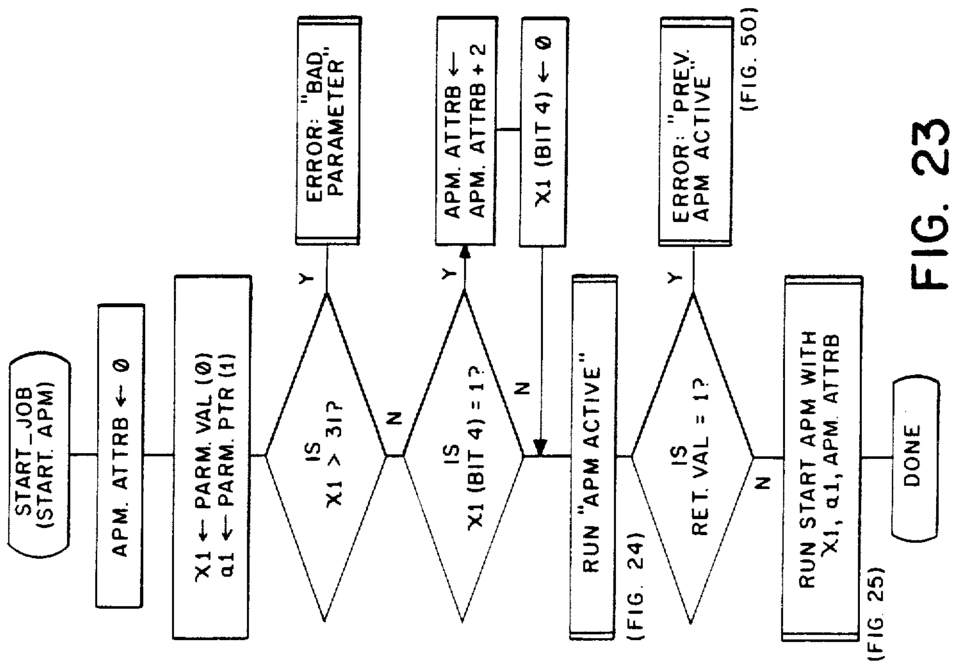

(2) Executing Associated Operation Routine—The Start_Job Command (FIGS. 23-25)

The START_JOB command is utilized within one application program module to start the execution of another application module in a different APM slot number. Referring back to the description of this command as listed in Table I, it is seen that the command has two parameters associated with it. The first parameter is called "job id" and the second parameter is called "address". The job id parameter is the job identification number, or in the terminology used herein, the APM slot number which the APM to be started by this command will be assigned within the array of APM data structures shown in FIG. 12D. The meaning of this assignment will be more clear after consideration of the discussion below of the scheduler feature of this invention. This job identification number of APM slot number is an X type parameter. It will take on a single byte value. The address parameter will take on two-byte value corresponding to the address of the first command of the application program module which is to be started.

The execution sequence of the START_JOB operation routine is depicted in FIG. 23 with associated routines depicted in FIGS. 24 and 25. The first step is to set a data register labeled APM.ATTRB to a 0 value. This register is used to indicated the attributes for the APM to be started.

The value 0 indicates that it is a foreground APM. If APM.ATTRB were 1, this would indicated a background APM. If the APM.ATTRB were of value 2, this would indicated a foreground job with a real time status. Finally if the APM.ATTRB takes on a value of 3 this would indicate a background APM with real time status. It should be understood that these values are the decimal equivalents of the binary values established by the last 2 bits in the data registered labeled APM.ATTRB.

The next step in the START_JOB routine is to set a data register x1 to the value of PARM.VAL(0) in the PARM array shown in FIG. 13B. The X type parsing control routine previously executed in connection with this command will have placed in PARM.VAL(0) a parameter value which contains the slot number of the APM array in which the APM to be started is to be placed. This step also involves setting an a1 register to the value of PARM.PTR(1), that is the value of the parameter stored in the PTR data element of the PARM1 section in the PARM data array shown in FIG. 13B. The value in PARM1 will have been established by the A type parsing routine and will thus be the address of the APM which is to be started. That address will be a two-byte address.

The next step is to check to see whether the value of x1 is greater than 31. If it is, this indicates that there is a bad parameter and an error of this type will be declared through execution of an executive error routine shown in FIG. 50 and described below. Assuming there is no bad parameter, the routine will check whether bit 4 of x1 is equal to 1. If it is, the value of APM.ATTRB register will be incremented by 2 and then bit 4 of x1 will be set back to 0.

This aspect of the routine requires some explanation regarding the assignment of values to the "job id" parameter of the command. The START_JOB routine permits the programmer to start the APM with a REALTIME status by using a job number parameter (APM SLOT.NO) in the range between 16 and 31, with 16 added to the actual job number which is between 0 and 15. This will put a 1 value in bit 4 of x1 and cause the APM.ATTRB to have a value of 2, indicating a foregoing job with REALTIME status. If the programmer wants the APM to start in foreground with a status which is not REALTIME, the job id assigned will be in the range of 0 to 15. This will place a 0 value in bit 4 of x1 and APM.ATTRB will have a 0 value.

It should be understood that this approach to permitting APMs to be started with a REALTIME attribute is not a necessary aspect of the invention, but it is advantageous because it can simplify certain types of specialized APMs for processing input. Because of the manner in which the version of the current scheduler routine in the ZON terminal is implemented, an APM which is started by another APM when there is imput from some source available may not first be scheduled for execution until that input is gone if all APMs are required to be started without REALTIME attributes. By permitting APMs to be started with REALTIME attributes the subsidiary APM can be set into a later SLOT.NO than the APM that started it so that it will be scheduled for execution before the input is taken by some other APM or processed throught the state table lookup. This feature provides a desirable capability in processing on-line transactions since it enables the application program to be defined to start APMs dynamically to process different types of messages or commands from the remote system.

(a) The APMACTIVE Routine (FIG. 24)

The next step in the routine is to run a routine called APMACTIVE shown in FIG. 24. The APMACTIVE routine first sets a data register labeled RET.VAL (standing for return value) to 0. The next step is to set bit 0 in the RET.VAL data register to the value of the bit in the ACTIVE bitmap of FIG. 12A which corresponds to the APM slot number designated by x1. In other words, if the APM slot number were 5, the routine would look at bit 5 of the active bitman in FIG. 12A and store its value into bit 0 of RET.VAL. That completes the execution of the APMACTIVE routine.

Referring back to FIG. 23 the next step in the START_JOB routine is to check whether the value of RET.VAL equals 1. If it does, that means that the bit in the ACTIVE bitmap of FIG. 12A was 1 and this accordingly signifies that a previous application program module which was running in that slot number has not completed execution. This results in an executive error being processed to display a message that a previous APM was still active. Assuming that the RET.VALUE is 0, the following step is to run the STARTAPM routine with parameters x1, a1, and APM.ATTRB. This STARTAPM routine is shown in FIG. 25.

(b) The STARTAPM Routine (FIG. 25)

The STARTAPM routine begins with the step of clearing the APM data structure in SLOT.NO(x1). This means that the data structure in the SLOT.NO corresponding to the parameter value x1 in the array of APM data structures shown in FIG. 12D is cleared. In other words all of the data elements in that APM data structure in that slot are set to 0. The next step is to set the data element CURRIP for the SLOT.NO corresponding to the x1 parameter to the two-byte value of al which is the starting address of the application program module to be started. This step is designated by the notation SLOT.NO(x1)CURRIP←a1.

The following step is to set the associated bit in the ACTIVE bitmap corresponding to SLOT.NO(x1) to a 1 value. This is done, of course, to indicated that there is now an active APM running in the SLOT.NO corresponding to the parameter x1. The next step is to set the bit number in the BACKGROUND bitmap corresponding to the SLOT.NO to the value of bit 0 of the APM.ATTRB register, which will be 0 in this case, since the purpose of this operation routine is to start a application program with a foreground attribute. There is a separate command, which will be discussed below, to start a application program module with a background attribute.

The next step of the STARTAPM routine is set the bit number corresponding to the slot number in the REALTIME bimap to the value of bit 1 of the APM.ATTRB register. As indicated above, bit 1 will have a 1 value if bit 4 of the x1 parameter was equal to 1. Otherwise bit 1 will have a 0 value. Execution of this step sets the appropriate bit value into the REALTIME bitmap to assign this application program module its appropriate attribute.

Figure 26:
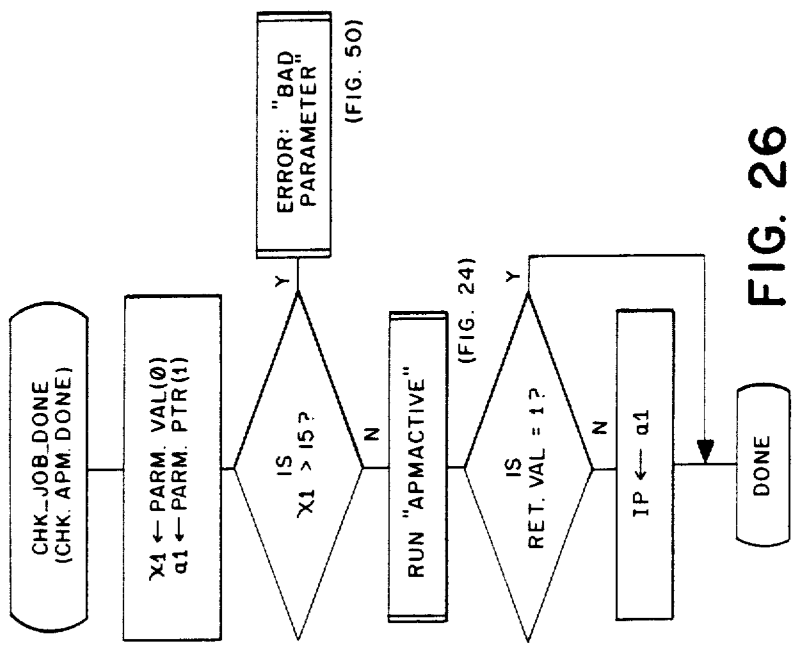

In summary, the general purpose operation routine associated with the START_JOB command listed in Table I (herein also called START.APM) involves first the execution of a command parsing routine XA which calls parsing control routines for an X and A parameters in sequence, which parsing control routines individually call a data type parsing routine for actual parsing of the parameter assigned by the programmer when issuing the command as part of an application program module. After this, the operation routine associated with the command is executed and utilizes the parameters which are parsed in the parameter parsing routines. It may use one or both of the address and/or value elements of the parameter.

d. Other Application Program Modules Utilizing the XA Type of Parsing Control Routine (1) The CHK_JOB_DONE (CHK.APM.DONE) Command (FIG. 26)

Referring to Table I, the CHK_JOB_DONE utilizes a first parameter of the X type and a second parameter of the A type. The X type parameter is the job identification number (i.e. the SLOT.NO) of the APM which is to be checked to determine whether it is finished. The A type parameter is the address to branch to if the APM checked has finished execution. Otherwise the application program module in which the this command is issued continues execution with the next command in the APM.

After the parameter parsing for the X and A type parameters has been accomplished for execution of the this command, the PARM0 section of the PARM array shown in FIG. 13B will have the value of the SLOT.NO of the application program module being checked present in the VAL data element of PARM0. PARM1 will have in its PTR element the two-byte address of the particular command to branch to. Accordingly, the first step of the associated operation routine is to set x1 to the parameter value stored in PARM.VAL(0) and to set a1 to the value of the parameter stored in PARM.PTR(1).

After this a checking step is performed to determine whether the value of x1 is greater than 15. The number 15 is used because there are 16 slot numbers in the APM data structure array of FIG. 12D, i.e. slot numbers 0-15. The invention is not limited to use of 16 slots with slot numbers 0 to 15, so this is given by way of example only. In this case, if x1 has a value greater than 15, then the executive error routine is called to process a bad parameter error. Assuming that x1 does have an appropriate value, the next step of the routine is to run the APMACTIVE routine shown in FIG. 24 and previously described. If the application program module being checked is still active and has a bit value 1 in its bit location of the ACTIVE bitmap shown in FIG. 12A, the return value will be 1, otherwise it will be 0. This routine performs a check to see whether the return value is 1. If it is, the execution of this command is completed and no branching is performed. If the return value is 0, this means that the application program module which was checked by the command is not executing, and in this case, the next step of this routine is to set the value of IP in the command data structure shown in FIG. 12B to the address value a1. This means that the next command that will be executed will be the command at the address given by a1.

(2) The START_BACK Command

Referring to Table I, it is seen that this command is used to start an application program module with a background attribute. The same set of X and A type parameters is utilized and the parameters mean the same thing as they did in the START_JOB command. However, this START_BACK command is specific to starting a job as a background task so the first step in the operating routine associated with this command will be to set the APM attribute data register APM.ATTRB to a 1 value. That step is the only difference between a START_BACK routine and a START_JOB routine shown in FIG. 23. Accordingly, the other steps in the START_BACK routine will not be discussed here.

If all of the other commands in Table I were reviewed, other commands which utilized the XA parsing routine would also be found. The CHK_INSRCE command, which uses the XA routine, will be discussed below. As a further example, the CHK_ANS_PHONE command and the CHK_CKBYTE command are two additional commands which use the XA type parsing routine. The actual operation routines associated with these commands are not flowcharted in the drawings, but the task associated with each of these commands is specifically described in Table I.

e. Other APM Commands which use Both Parameter Address and Value—The INC_INT Command (FIG. 51)

All of the APM commands discussed above use only one or the other of the address and value of the parsed parameter. These are APM commands, however, which use both the address and value of the parsed parameter. An example is the INC_INT command which, as shown in TABLE I, uses a single N type of parameter having varying data type satisfiers: VI—Variable Integer; EI—Extended Integer; and SI—Stack Reference Integer.

Figure 51:
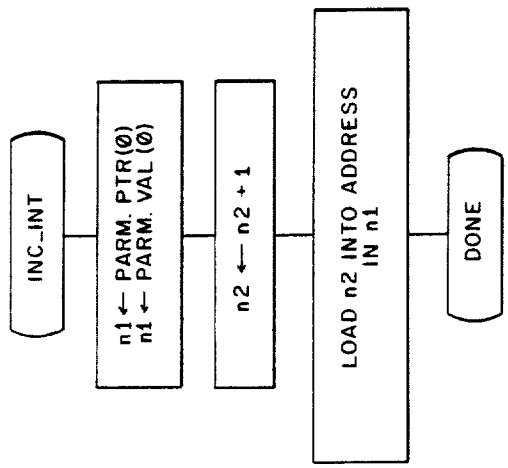
FIGS. 48-55 are flowcharts of routines which are useful in connection with implementing this invention.

The execution of the operation routine associated with the INC_INT command proceeds wit the flow of steps shown in FIG. 51. These steps are performed after a command parsing module of the N type is executed to call a parsing control routine for the N type parameter, which in turn calls one of the data type parsing routines for the three different data type satisfiers of the N type parameter.

The first step in the routine is to set the registers labeled n1 and n2 to the values stored in PARM.ADR(0) and and PARM.VAL(0), respectively. This is followed by incrementing the value in n2 by 1 and then storing the new value of n2 at the address in n1. It will be appreciated that the address in n1 is the address in memory that the value originally stored in PARM.VAL(0) was obtained from. Thus, when this routine is finished executing, the integer value (two-bytes) at that address will have been incremented by 1.

It should be apparent then that the reason that the parsing routines store both the address and value of the parsed parameter in the PARM array is that these parsing routines are shared by all of the commands in the set which makes up the programming language and must therefore provide all of the information about the parameter being parsed in case it is needed by one of the operation routines associated with one of the defined commands. The INC_INT command is not the only one in TABLE I which uses both value and address of the parsed parameter, but it should not be necessary to illustrate this point with further discussion of these other commands.

5. Alternative Command Execution Routines a. Alternative Routines Involving Alternative APM Storage and Accessing Systems Referring back to FIG. 10, it should be apparent that, if the parameter parsing routines were specifically included in each of the general purpose operation routine associated with a particular command and the opcode of that command, the routine for executing an APM command would be different from that shown in FIG. 14. Instead of computing a parsing module pointer address and separately loading the parsing module pointer to call a command parsing module and the operation routine pointer to call an operation routine for execution, the opcode pointer table would contain a single address to the beginning instruction of the general purpose operation routine which combines parameter parsing routines and operation routines. The same is true if the approach shown in FIG. 11 were utilized wherein the command parsing module is integrated with the operation routine.

b. Alternative Routines for Executing APM Commands Using Alternative Bitmap/Operation Code Systems (FIGS. 27 and 28)

Figure 27:
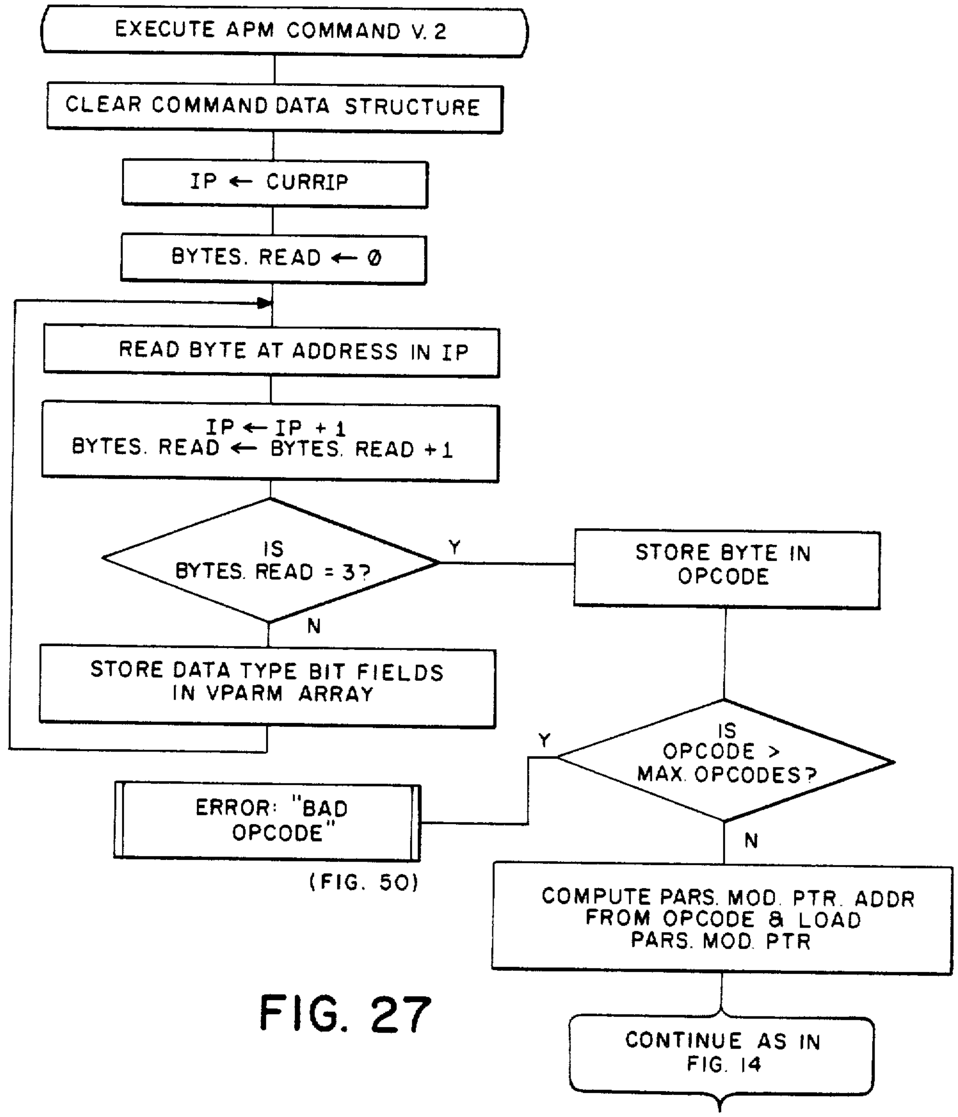
FIGS. 27 and 28 are flowcharts illustrating alternative routines for executing application program module commands in accordance with this invention.
Figure 28:
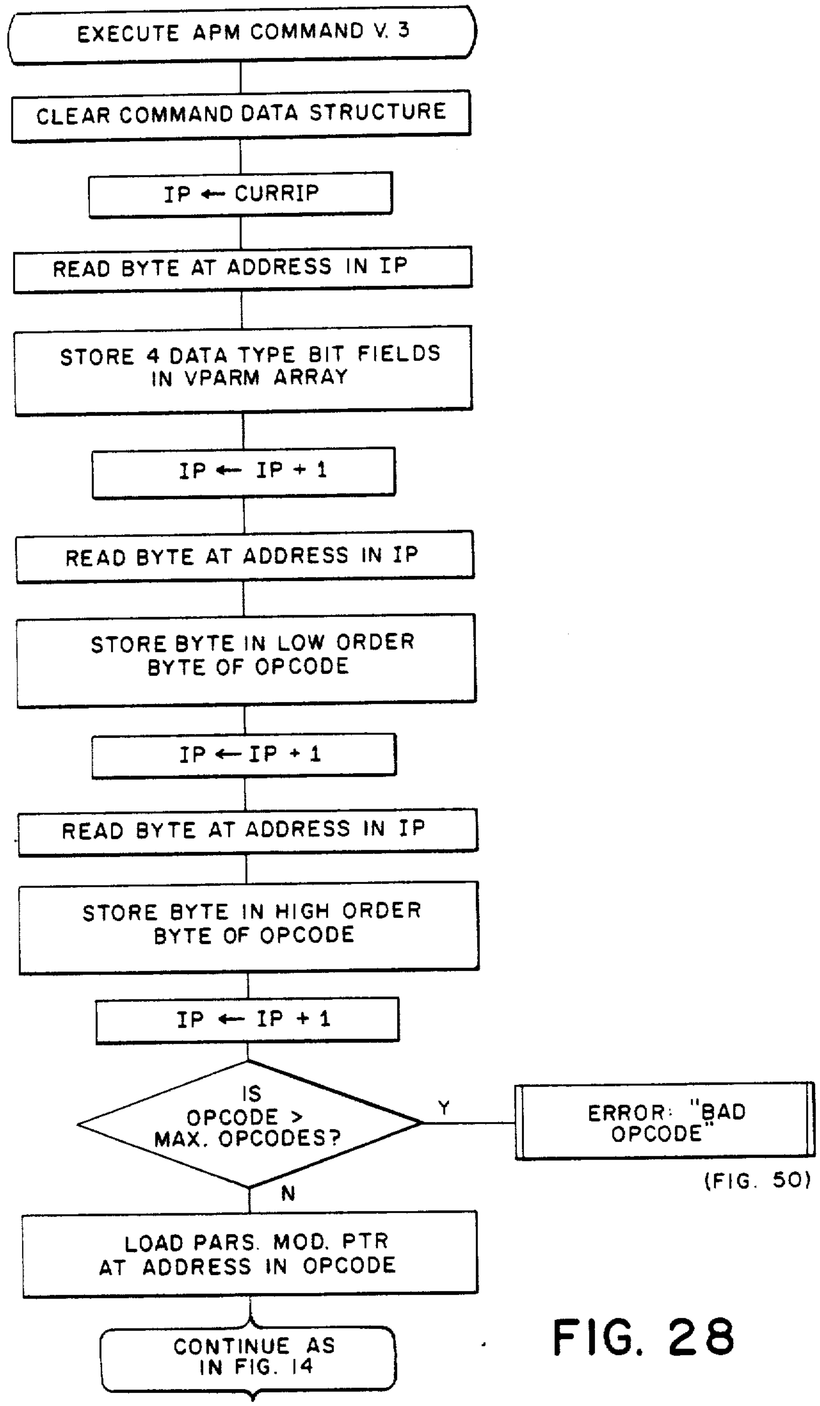

FIG. 27 illustrates an alternative form of the EXECUTE APM COMMAND routine which might be utilized if the bitmap/operation code system depicted in FIG. 5B were utilized. It will be recalled that the system depicted in FIG. 6 involves a rigid or fixed object code syntax involving 2 bitmaps which must be present followed by an 8 bit operation code which can designate up to 256 different commands. In this case, the opset/opcode system is not being used so the command data structure in FIG. 12B wouold have only the opcode data element. The other data elements of the command data structure of FIG. 12B and the VPARM array and the PARM array of FIGS. 13A and 13B would remain the same.

As shown in FIG. 27, the first step of this version of an EXECUTE APM COMMAND routine would be to clear the command data structure, and this will be followed by setting IP to CURRIP. This step is followed by setting a BYTES.READ register to a 0 value, followed by reading a byte at IP. After the byte has been read, IP is incremented by 1 and BYTES.READ is incremented by 1. A test is then performed to determine whether BYTES.READ is equal to 3. For the first byte actually read in the object code command line, BYTES.READ will have a value of 1, indicating that a bitmap byte has been read. Consequently, the routine will store the data type bit fields in that bitmap in the VPARM array and then loop back to read another byte at IP. Again IP and BYTES.READ will be incremented by 1 and the test for BYTES.READ being equal to 3 will be performed. Since BYTES.READ will have a value of 2 at this time, the second byte that is read is also a bitmap byte and the data type bit fields therein will be stored in the VPARM array.

The routine then loops back to read the next byte at IP and to increment IP and BYTES/READ by 1. At this point BYTES.READ will equal 3, and the third byte which is read will be stored in the opcode parameter in the command data structure of FIG. 12B. Following this a test will be performed to determine whether the opcode is greater than the MAX.OPCODES. The value of MAX.OPCODES will be stored somewhere in memory based on the number of commands and associated opcodes which have been defined. Assuming the opcode value is less than MAX.OPCODES, the routine continues to compute a parsing module pointer address from the opcode and to load the parsing module pointer present at that address. The remainder of this routine is the same as the version 1 shown in FIG. 14 and will not be repeated here.

It will be appreciated that if the single bitmap system shown in FIG. 5A were used, this same routine could be employed with a change in the test for "is BYTES.-READ equal to 3" to "is BYTES.READ equal to 2". Other systems with other numbers of bitmaps could also be used.

FIG. 28 illustrates a third version of an EXECUTE APM COMMAND routine which might be utilized in connection with the bitmap/operation code system of FIG. 8. In the FIG. 8 version, a 16 bit operation code comprising 2 bytes in the object code command line is provided. In this case also, the opset data element in the command data structure would be eliminated. Also, in this case, the opcode data element in the command data structure of FIG. 12B would be a two-byte element corresponding to the 2 bytes of operation code in the object code command line.

Referring to FIG. 28 the third version of a routine for executing an APM command would begin with a step to clear the command data structure, followed by the step of setting IP to CURRIP and then reading a byte at IP. Since this first byte is a bitmap byte, the next step for the routine is to store the data type bit fields in the VPARM array. Following this, IP is incremented by 1 and the second byte in the object code command line is read. This second byte is then stored in the lower order byte of the opcode data element. Following this, IP is again incremented by 1 and the byte at IP is read. This third byte is stored in a high order byte of the opcode data element and this completes the opcode of the command. IP is again incremented to point to the first parameter byte. Next the test is performed to determine whether the opcode stored is greater than the MAX-.OPCODES value and a bad opcode error is executed if the test returns YES. Assuming a NO is returned by the test, the next step is to load the parsing module pointer at the address in the memory given directly by the two-byte opcode. The remainder of the command execution routine is similar to that depicted in FIG. 14 and will not be repeated here.

As another variation to be considered, if either of the general purpose operation routine storage and accessing systems of FIG. 10 or 11 were utilized, the two-byte opcode in this case could be used to directly point to the starting address of the general purpose operation routine rather than going through the separate step of addressing a pointer table.

It is thus seen that there are encompassed within the general concept of the method of this invention variations in the approaches to storing and accessing general purpose operation routines associated with defined commands and there are variations in the operation code systems which may be utilized to access general purpose operation routines and the parameter parsing routines and operation routines associated therewith. The general concept is, however, the same in each case. General purpose operation routines are established and stored in read only memory in the local terminal. These general purpose operation routines either directly incorporate parameter parsing routines where necessary or incorporate such parameter parsing routines by reference to a global set of parsing routines. A set of commands is defined, with each command being associated with a particular one of the general purpose operation routines. Each of the commands includes an operation code which relates the command to the general purpose operation routine with which it is associated. Effective compression of the object code form of the overall application program is achieved because, in each case, the object code version of the command, including whatever bitmap and opcode bytes are used, will be substantially smaller in code size than the corresponding general purpose operation routine. This provides the reduced download time for the application program module and achieves the central advantage of this invention.

ALTERNATE IMPLEMENTATION OF GENERAL METHOD OF THE INVENTION

In addition to the implementation of the invention described above for use in the current versions of the ZON terminal, an earlier version of the invention having more limited capability was developed and implemented. The purposes of this other version were as follows:

a. Provide the ability to re-define the AMP initiated by pressing one or two of keys 0-9 inclusive on the keyboard of the local terminal.

b. Provide the ability to generate any reasonable data-capture application of limited complexity for the local terminal, from a downloaded application program.

This alternate version of the invention used four separate but interdependent sets of modules: State Table module; Interpreter routine for application program commands; Opcode group operation routines; and additional program processes which required external events to occur before they could return control to the interpreter. Each of these will be described separately below.

It should be understood that this alternative version did not use the concurrent or parallel APM execution feature of this invention, but instead only one APM was active in execution by the interpreter at any time. Thus APMs could only be executed sequentially. The only use of a wait command was to suspend operation until some external event occurred and then to return to execution of the same APM in which the wait command was executed.

1. State Table Module

The state table operation utilizes the same routines as were provided in ROM programmed terminals which proceeded this implementation of the invention. Specific table actions and states are defined to permit the interpreter to operate in the state table environment. Specifically, keys 0-9 are all mapped to start the interpreter from the READY state. Other table actions and states are defined as necessary.

2. Interpreter Routine

The interpreter routine is a simple continuous loop which looks up opcodes from object code stored in a designated file and passes them to the Opcode group operation routines for execution. This is done by placing the opcode string from the file in a designated buffer, computing the action number of the opcode, updating the parameter pointer for the upcode string, and entering a case switch statement which caused the execution of the computed action number. The following illustrates the execution of the interpreter routine.

a. Entry from Ready State

Get 1st opcode (record number of opcode=mapped key number. Key 1 gets record 1, etc). Examine the first 2-byte element of the opcode string and update opcode string pointer. The first element must evaluate to either 0, 1, or 2, other values not being allowed. If the value of the first element=0, no action is performed. If the value=1, the routine passes directly to opcode execution. If the value=2, the start address offsets are computed and the routine returns to the state table for processing second key entry.

b. Opcode (APM Command) Execution Routine

The action number is computed from the two byte element of the opcode string at the opcode string pointer. The opcode string pointer is then updated and the opcode value is processed by passing to the opcode case switch statement.

c. Opcode (APM Command) Termination

Execution returns here after the execution of the opcode (APM command) has finished. The opcode returns one of three values: 0=process next opcode immediately by looping to b. above; 1=Sleep during external process, resume with next opcode at b. above when awakened; and 2=die, i.e. stop all command execution. This value of 2 can result from either improper execution of an opcode or the successful completion of a complete operation of an APM. Opcodes which return values of 0 or 1 must prepare for the next opcode by leaving the opcode string pointer pointing to the element which contains the number of the next opcode to be executed.

3. Opcode Group of Operation Routines

These are a series of pre-defined commands and associated operation routines which can be used in proper sequence to perform a data capture operation. It should be noted that this implementation used one of the alternate approaches to parameter parsing described above, in which every parameter type is satisfied by only a single data types, and in which the parameter parsing operations are effectively embedded in the operation routines. The commands and operation routines consist of the following types, which are described in detail in TABLE XXVI.

a. Buffer manipulation routines for initializing, loading, moving, concatenating, and the like.

b. Arithmetic routines for adding and subtracting between buffers and accumulators.

c. Input/Output routines for displaying strings, accepting input, and communicating. Input and communication actions generally require an external event to occur prior to completion. These opcodes suspend the interpreter by returning a value of 1.

d. Branching routines which use pre-determined or received data to determine the path the operation will take by taking data elements directly as the next opcode number.

e. Wait routine which explicitly puts the interpreter to sleep pending completion of an external event. Completion of any external event in process will awaken the interpreter.

4. External Event Processing Routines

These include use of the Control String interpreter for input; the logon module for acquiring connection with the host computer; and the communications modules for actually performing communications. The opcode which initiates the external event then suspends the interpreter while the event is occurring. Each process is responsible for re-starting the interpreter when it has completed. Each of these processes was integrated into this implementation of the invention by adapting modules from previous usage in local terminals which utilized fixed ROM programming.

The source code for the entry point routine as well as the source code for the main loop of the opcode interpreter for executing the APM command associated with the operation code is set forth in TABLE XXV. A listing of defined commands for this version of implementation of the invention is set forth in TABLE XXVI.

It should be understood that this alternative version of the method of this invention utilizes the operation code system, shown in FIG. 6 and discussed above, in which two ASCII characters in the object code command form the operation code and are decoded to the action number by the command interpreter. The motivation for this is that the modules which were adapted from their previous usage in fixed ROM terminals could only work with ASCII data, and had no provision at that time for either downloading binary object code data or storing it in RAM areas.

APPLICATION PROGRAM MODULE SCHEDULING METHOD

This invention also includes a method for scheduling the execution of a plurality of active application program modules during any particular time period. This is accomplished in a version of the invention incorporated in the ZON terminal by starting the execution of a primary application program module and then having that application program module set up one or more other application program modules for execution utilizing the START_JOB command described above. Other active APM's in addition to the primary one can also utilize the START_JOB command to set up another APM for scheduled execution.

1. Data Structures Associated with the Scheduler Methodology (FIG. 12)

FIG. 12A shows the scheduler data structure which utilizes three two-byte bitmaps labeled ACTIVE, REALTIME, and BACKGROUND. The bit size of these bitmaps relates to the number of active APM slots which are utilized. In the version being described here, there are sixteen program slots, hence sixteen bits in each bitmap. In addition a single byte data element labeled SLOT.NO and a single byte data element labeled WAIT/HALT are provided.

FIG. 12D illustrates an array of APM data structures with each of the sections of the array having the form of the current APM data structure shown in FIG. 12C. The START_JOB command discussed above included a "job id" parameter for specifying which slot in the array that the APM should start in. This particular implementation thus involves a fixed APM data structure array, or in other words one which has a fixed number of slots to which application program modules can be assigned by the programmer.

The current implementation of the concurrent scheduler methodology of this invention involves copying the data elements of an APM data structure out of the array shown in FIG. 12D into the current APM data structure shown in FIG. 12C when a particular application program module is scheduled to begin or to continue execution. Similarly, when the currently scheduled APM executes a command which causes it to release the scheduler to start executing a different APM, the current APM data structure is recopied back to the appropriate SLOT.NO from which it originated in the array of APM data structure with its then current values for the data elements therein.

It should be appreciated that there are variations which could be introduced within the general concept of a concurrent APM scheduler in accordance with this invention. For example, the scheduler program routine could directly utilize a pointer to the appropriate data structures in the array of the APM data structures which is to be utilized for active APM execution so that that SLOT.NO in the array would become the active SLOT.NO.

Another variation would involve a dynamic allocation of application program modules to the array of APM data structures. Instead of the programmer assigning a particular SLOT.NO to an application program module, the START_JOB command could include a parameter giving a priority level to the APM. A separate routine within the overall concurrent scheduler routine could then allocate the application program module being started to a particular vacant slot in the array based on the assigned priority.

a. The Bitmaps of the Scheduler Data Structure (FIG. 12A)

The ACTIVE bitmap shown in FIG. 12A contains 16 bits, each of which is directly associated with one of the 16 slots.no's 0 through 15 of the array of APM data structures. The value of the bit in each of the bit locations of the ACTIVE bitmap designates whether a corresponding SLOT.NO of the array shown in FIG. 12D contains an active APM. Accordingly, the ACTIVE bitmap can be utilized both to determine whether there are any active application program modules in the array and to determine whether a particular SLOT.NO contains an active APM.

The REALTIME bitmap in the scheduler data structure is used to designate which of the active application program modules, in their corresponding SLOT.NOs, are in a REALTIME mode because they need some type of input from one of the input devices associated with the local terminal, possibly including a timer input associated with the central processor unit, before they can continue execution. As will be discussed below, there is a feature in the preferred version of the scheduler method which gives priority to execution of application program modules which have the REALTIME attribute, i.e. whose APM slot numbers have a 1 bit in the REALTIME bitmap.

The BACKGROUND bitmap is utilized to indicate which of the active application program modules have a BACKGROUND attribute. For purposes of this invention, the BACKGROUND attribute is utilized to signify application program modules which should be maintained in the array of active application program modules even if the main application program module completes its execution or is otherwise halted in its execution. In the current implementation of this invention in the ZON terminal, all active application program modules, except those which have BACKGROUND attributes, are stopped, i.e. taken out of the ACTIVE bitmap when the main application program module in SLOT.NO 0 completes execution or is halted. Typically, application program modules with BACKGROUND attribute are assigned to higher number slots in the APM data structure data array since they have lower priority of execution.

It should be understood that all application program modules which have BACKGROUND attribute are active application program modules and will have a 1 value bit in the corresponding bit location of the ACTIVE bitmap. BACKGROUND jobs may also have a bit value of 1 in the corresponding bit location in the REALTIME bitmap if the BACKGROUND application program module needs input for it to continue execution.

b. Other Data Elements in the Scheduler Data Structure

The SLOT.NO data element is utilized to keep track of the particular SLOT.NO of the APM data structure array of FIG. 12D from which the application program data elements were copied so that the current APM data structure of FIG. 12C can be recopied back to that SLOT.NO in the array at a later time.

The WAIT/HALT data element is utilized to communicate between the scheduler routine and the commands of the application program module so that the scheduler routine will know the status of the current application program module being executed. It should be understood that the current application program module will execute, command—by-command, until a command is encountered which explicitly or implicitly causes that application program module to be suspended in its execution or until the DONE or HALT command is executed as the last command of the application program module.

2. One Version of the Scheduler Methodology of this Invention (FIG. 29)

Figure 29:
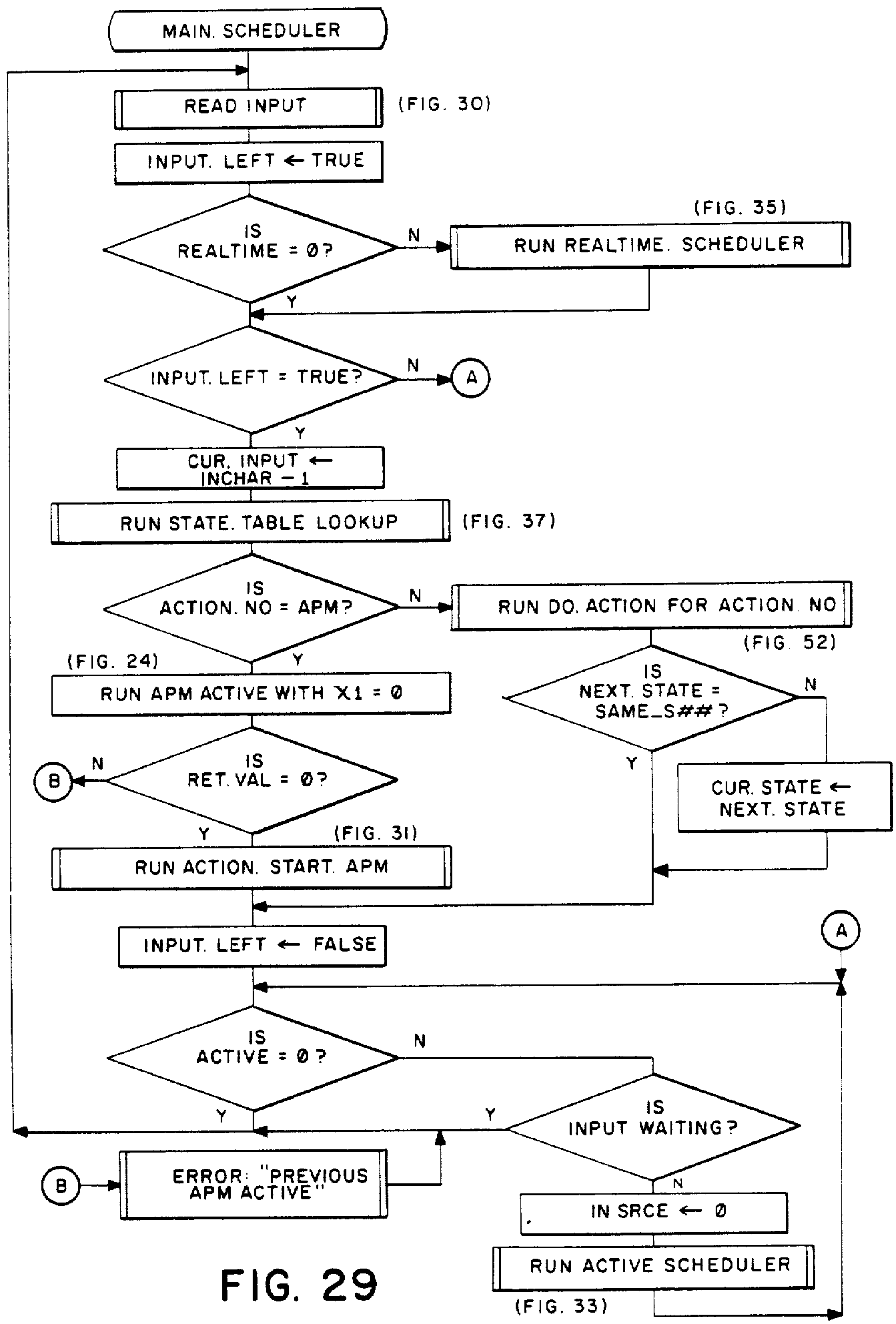
FIGS. 29-31 are flowcharts illustrating routines useful in implemnting the concurrent application program module scheduling methods of this invention.

FIG. 29 illustrates the steps of a MAIN SCHEDULER routine which implements one version of the general concept of the scheduler method of this invention. The MAIN SCHEDULER routine typically begins execution after a powerup or power-on routine is executed on the terminal. This powerup routine will be described below. The MAIN SCHEDULER routine is the dominant program running in the local terminal. It schedules and controls the execution of each active APM, including controlling the execution of the current APM on a command by command basis until a command is encountered which sets the WAIT/HALT data element to a value which represent either "wait" or "halt".

The scheduler routine depicted in FIG. 29 shows the current implementation of the scheduler methodology of this invention as implemented in the ZON terminal discussed above. The ZON terminal is an input driven terminal in the sense that no application program module will start executing until an input is received which designates a particular application program module to start execution. This assumes that there is no powerup application program module defined for the terminal. If such a powerup application program module is defined, the powerup routine will set up that APM to be executed by the scheduler routine until it is completed. The terminal will run under the scheduler in the default state for active jobs until the powerup routine has finished. At that point, the terminal is typically returned to the READY state and no further application program modules will be activated until input of some type is received by the terminal from the keyboard, from the card reader or some other input device.

a. The Read Input Routine (FIG. 30)

Assume for purposes of explaining the MAIN SCHEDULER routine that the initial condition is that no application program modules are active. The MAIN SCHEDULER routine is thus waiting for some input to cause some predefined ROM-resident task or some application program module to start execution. The first step of the MAIN SCHEDULER routine is a read input routine which is charted in FIG. 30.

Figure 30:
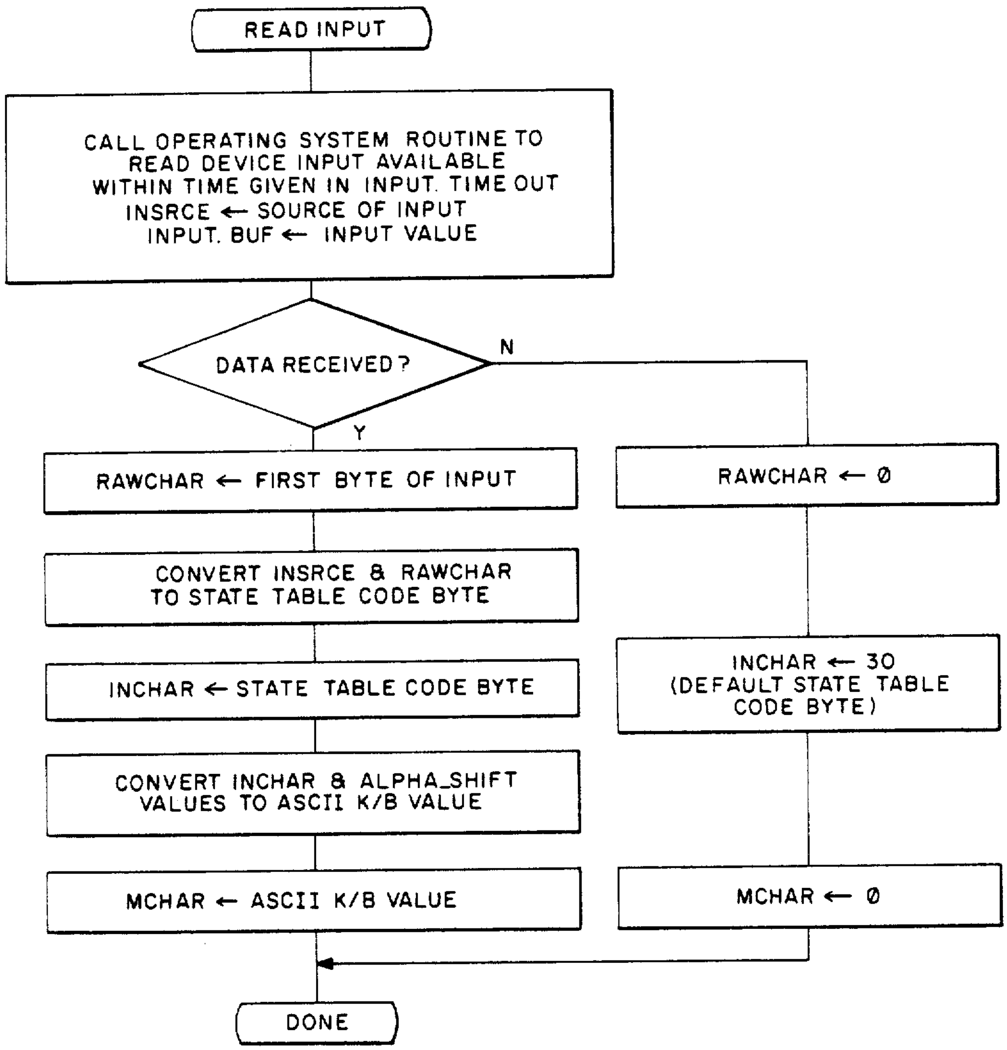

The first step of the read input routine shown in FIG. 30 is to call an operating system routine to read any device input available within the time given by the current value of the INPUT.TIMEOUT variable. If a device input is present, the INSRCE data register is then set to a byte value corresponding to the source of input and INPUT.BUF is set to the value of the input itself. Next a check is performed to determine whether data has been received. Assuming that no device input was present, this test will return a NO, and the RAWCHAR register will be set to a 0 value. The INCHAR register will be set to a value of 30 and the MCHAR register will be set to a value of 0.

Setting INCHAR to a value of 30 when no data is received is equivalent to setting the TIMEOUT input value as a default input. As shown in the READY state table in FIG. 37A, the TIMEOUT input, if processed through a state table lookup, will return the ACTION.NO value to call for execution a ROM-resident action routine called NOTHING, and the NEXT.STATE value to select SAME_S##, i.e. the same state as the current state of the terminal for the new state. The other path of the Read Input routine which executes when data is actually received will be described below.

After this path of the Read Input routine has been executed, the next step in the scheduler routine is to set the INPUT.LEFT data flag to a TRUE value. After this, a check is run to determine whether any application program module is in REALTIME. Since we have assumed that there are no active application program modules, there will be no application program modules in the REALTIME bitmap. Accordingly, the MAIN SCHEDULER routine will continue to a checking step to determine whether INPUT.LEFT is equal to TRUE. Since INPUT.LEFT was set TRUE, the scheduler routine next executes a routine called STATE.TABLE.LOOKUP which basically looks up the input in the current state table and set the values of ACTION.NO and NEXT.STATE data registers to the values found in the state table. The STATE.TABLE.LOOKUP routine is illustrated in FIG. 37B and will be described below together with the general concepts and implementation of the use of state tables in this type of local terminal application.

Since a default input of value corresponding to TIMEOUT is present, given the state table illustrated in FIG. 37.A, this STATE.TABLE.LOOKUP step will result in setting ACTION.NO to correspond to the action number assigned to the ROM-resident routine NOTHING and the NEXT.STATE value to SAME_S##, which will be translated to the READY state.

The test to determine whether an action is an application program module is based on assigning all application program modules an action number in the range of 128 to 255, and assigning all predefined ROM-resident tasks an action number (ACTION.NO) in the range of 0 to 127. In this case, the action number returned is 2 so the scheduler routine proceeds to the step of executing the ROM-resident action 2, or the R_NOTHING action. The R_NOTHING case of the action routine is then called through the DO.ACTION routine. This DO.ACTION routine will be described below in conjunction with the STATE.TABLE.LOOKUP routine. This predefined ROM-resident task, as shown in the listing of ROM-resident routines in Table VII, does nothing except restore the modem in the terminal to its originate mode if enough time has elapsed since the last transaction was completed. The NEXTSTATE is then checked, and as it contains the special value SAME_S##, the scheduler determines not to change the CUR.STATE value.

Next the scheduler sets INPUT.LEFT to a FALSE value and proceeds to check whether there are any active application program modules by looking at the status of the ACTIVE bitmap to see if any of the bits have a 1 value. With the conditions that we have initially assumed, there will be no active application program modules indicated in the ACTIVE bitmap. Thus the scheduler routine will loop back to the Read Input routine.

This same execution pathway through the scheduler routine will continue to be traced until an actual input is received to start an application program module into execution or to execute some predefined ROM-resident action, and change the state of the terminal to the calculator or the phone state from the ready state. The most likely source for such input would be an operator pressing an associated key on the terminal keyboard.

Assume now that the operator has pressed a key to initiate a transaction and that the particular key that has been pressed is key 1, associated with the APM for doing a VISA transaction. With this input present, the Read Input routine will load INSRCE with a byte value indicating keyboard input and put the value of the key struck into the input buffer. The data received test will return a YES value, and the read input routine will then set the appropriate values into the RAWCHAR, INCHAR, and MCHAR data registers so that the state table look up routine can be performed to set the action number associated with key 1 at the READY state. This APM action number relates to the location in an entry point table of the entry instruction pointer which contains the starting address of the application program module to be run in response to this input.

Figure 31:
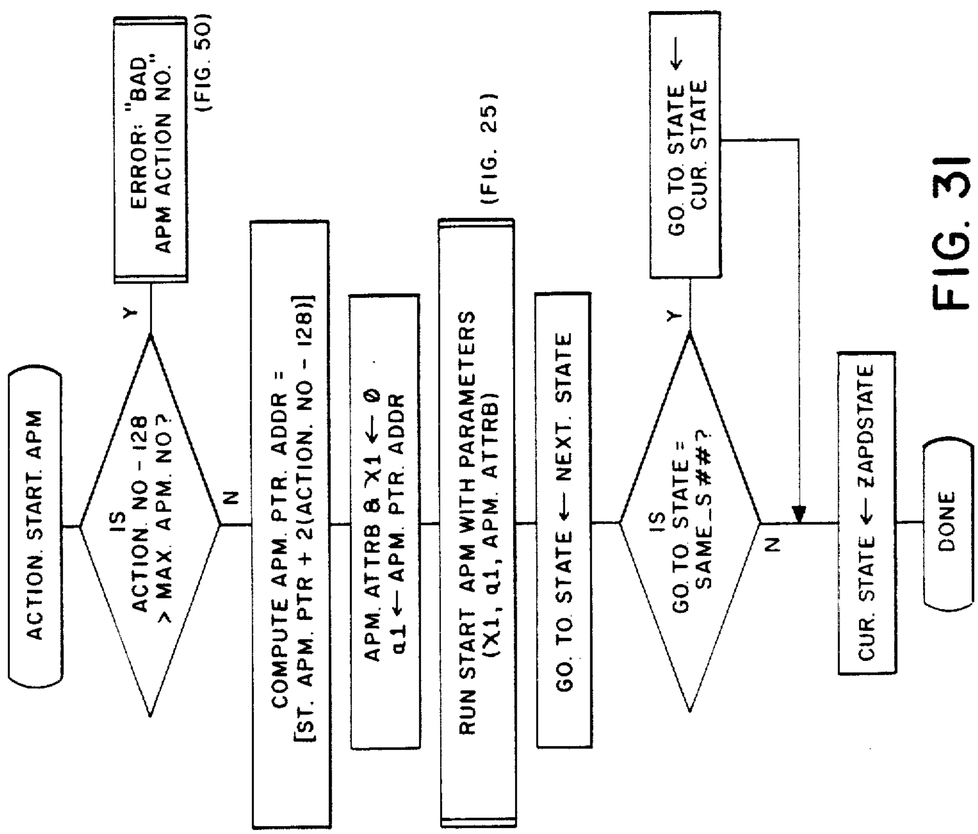

The test to determine whether the action is an application program module will now return a YES value since the action number is greater than 127. The scheduler routine will then run the APMACTIVE routine shown in FIG. 24 with a parameter x1=0 and the return value will be checked to see if it is 0. This checks to determine whether there is an application program module already active in SLOT.NO 0 of the APM data array. This test will return a NO under the assumed conditions that this is the first application program module to be set for execution.

b. The ACTION.START.APM Routine (FIGS. 31 and 32)

Figure 50:
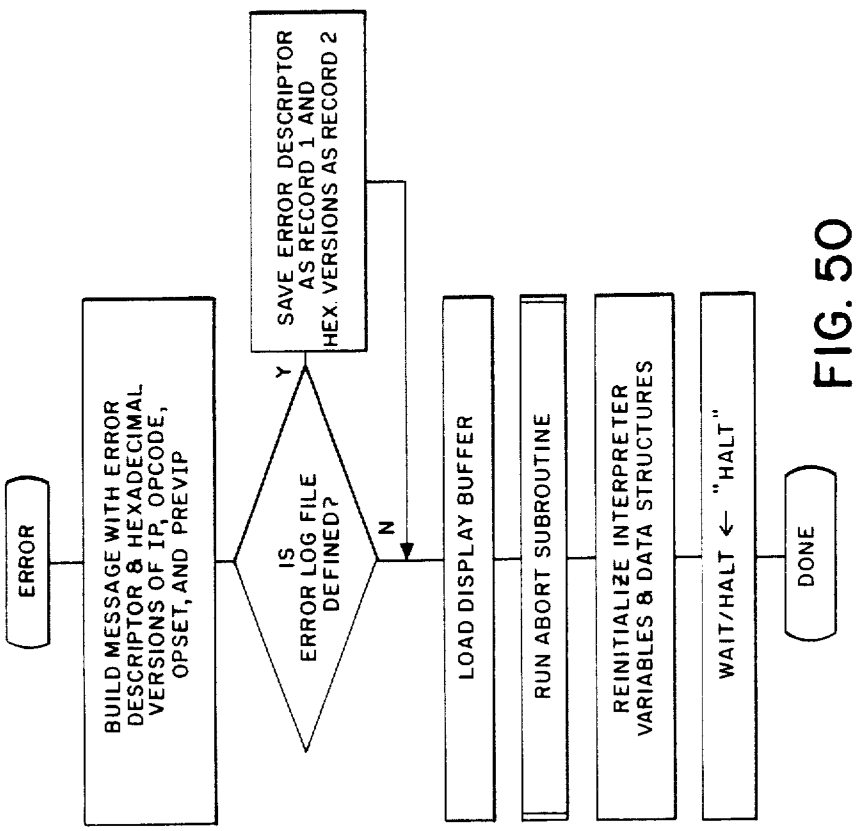

The scheduler routine then continues with execution of an ACTION.START.APM routine to select the application program module to start in SLOT.NO 0 based on the value of ACTION.NO set by the STATE.TABLE.LOOKUP routine of shown in FIG. 37B and described below. This ACTION.START.APM routine is illustrated in FIG. 31. It begins with a check to determine whether the value of ACTION.NO-128 is greater than the value of MAX.APM.NO which is assigned a value corresponding to the number of application program modules in the application program. If this test returns a YES value, the executive error routine of FIG. 50 is called to process the error as shown and execution of this routine halts. Assuming that there is no error in the value of ACTION.NO, the ACTION.START.APM routine continues by computing APM.PTR.ADDR using the algorithm shown. The reason for use of this algorithm is illustrated in FIG. 32 which shows one scheme for storing the application program modules which are downloaded from the remote computer system and tracking the starting address of each APM through use of an APM POINTER TABLE.

Figure 32:
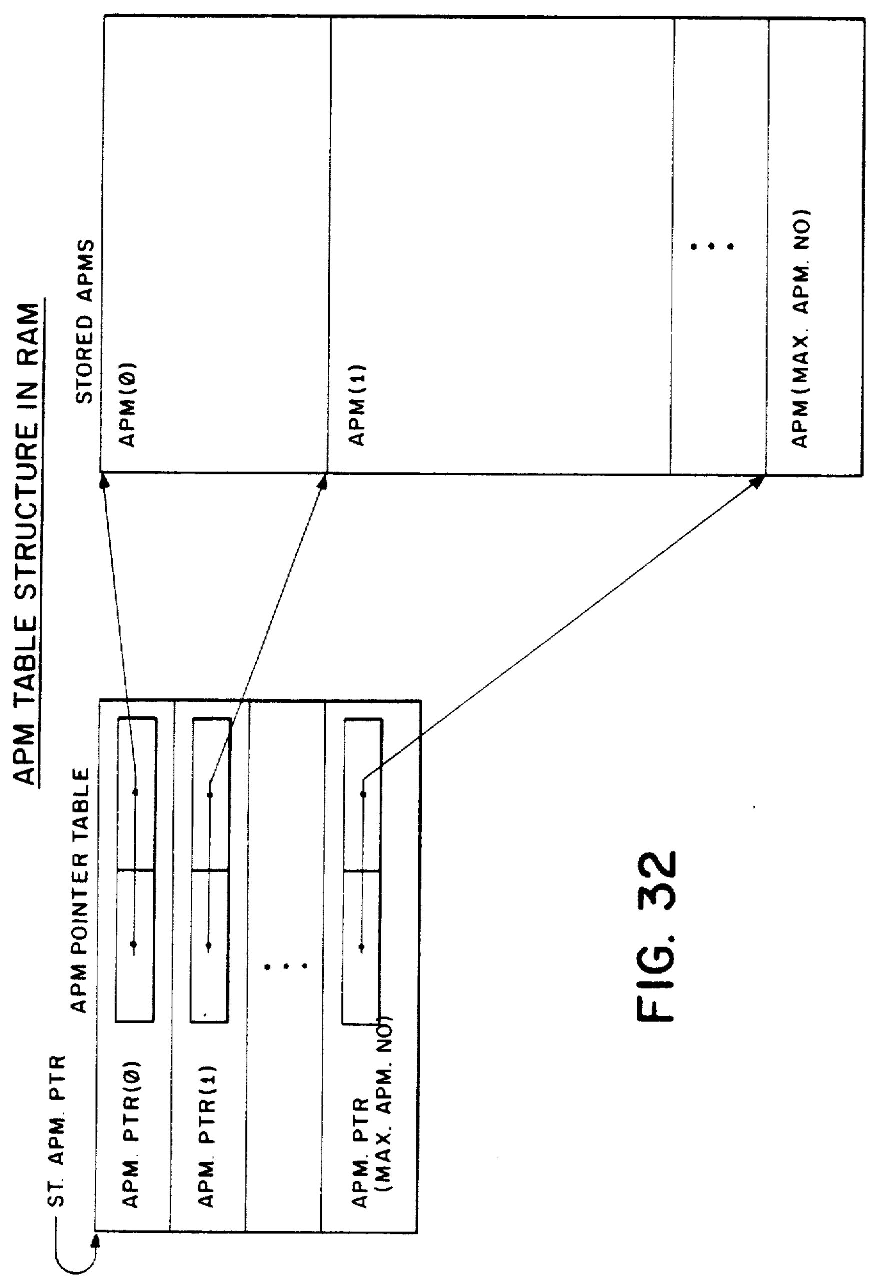
FIG. 32 illustrates a system for storing and accessing application program modules in accordance with this invention.

As shown in FIG. 32, each of the application program modules has a designated APM number between APM(0) and APM(MAX.APM.NO) and the starting address in random access memory in the local terminal is stored in the APM POINTER TABLE at the appropriate pointer location during the downloading of the application program. In other words, each of the two-byte entries in the APM POINTER TABLE, is a pointer to the starting address in random access memory of the associated APM. The starting address of the APM POINTER TABLE is known and thus the address of each of the APM pointers can be calculated using the algorithm shown.

The next step of this routine is to set both the data registers APM.ATTRB and x1 to 0 and to set a1 to the value of APM.PTR.ADDR. This is followed by executing the STARTAPM routine using the set parameters. This STARTAPM routine is charted in FIG. 25 and reference is made to the discussion of that routine given above. It will be remembered that the STARTAPM routine carries out the steps necessary to load the appropriate bits in the bitmaps of the Scheduler Data Structure and the starting values of the data elements in the appropriate SLOT.NO of the APM Data Structure Array. In this case the SLOT.NO is SLOT.NO 0.

The ACTION.START.APM routine continues with the step of setting GO.TO.STATE to the value of NEXT.STATE as set in the STATE.TABLE.LOOKUP routine. Next a checking step is performed to determine if the GO.TO.STATE value is equal to SAME_S##. If this check returns a YES value, then GO.TO.STATE is set to the value of CUR.STATE. Following this, CUR.STATE is set to ZAPDSTATE. AS will be discussed below, these values relate to the section of the state table that will be active as the current state when the application program module has completed its execution. This completes the execution of the ACTION.START.APM routine.

The main scheduler routine continues by setting INPUT.LEFT to FALSE and then performing a step to check whether any application program module is active. We have assumed that the key corresponding to VISA was depressed, and this will now have loaded an application program module with the name DFDOTR as defined in the sample program in TABLE XXX. This application program module, when it is started up, will eventually branch to the beginning of the DOT application program module which then calls or starts a number of other application program modules during the course of its execution.

Figure 33:
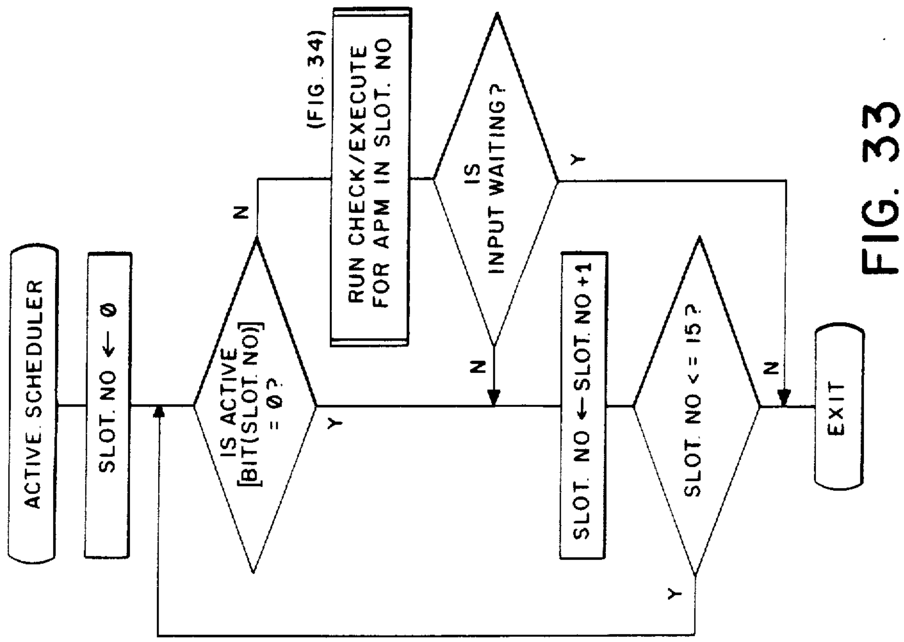
FIGS. 33-35 are flowcharts illustrating routines useful in implementing the concurrent application program module scheduling methods of this invention.

Since there is an active application program module, the scheduler routine will branch to a checking step to determine if there is any input waiting. Assume for now that there is no input waiting so that the next step of the scheduler routine is to run the ACTIVE SCHEDULER routine which is shown in FIG. 33.

c. The ACTIVE SCHEDULER Routine (FIG. 33)

The ACTIVE SCHEDULER routine begins with the step of setting SLOT.NO to 0 and then checks to determine if the bit in the ACTIVE bitmap for this SLOT.NO value has a 0 value. Since there is an active application program module in SLOT.NO 0, this test will return a YES value and the ACTIVE SCHEDULER routine will next run the CHECK/EXECUTE routine which is illustrated in FIG. 36.

To summarize, the CHECK/EXECUTE routine will first confirm that the application program module in the current SLOT.NO. should be run, and then causes the main application program module in the current SLOT.NO, i.e. slot 0, to execute its commands one by one until that application program module suspends its execution so that the scheduler can set up other subsidiary application program module to execute. When the application program module in SLOT.NO 0 suspends its execution, the CHECK/EXECUTE routine returns control to the ACTIVE SCHEDULER.

The ACTIVE SCHEDULER routine next performs a checking step to determine if input is waiting. If this checking step returns a YES value, the ACTIVE SCHEDULER routine exits and returns control to the main scheduler routine. The purpose of doing this is to give preference to execution of APMs with REAL-TIME attribute and to process inputs that are waiting as soon as the current APM has suspended itself or completed execution. An alternative approach would be to eliminate this checking step for input waiting, and always complete the running of the ACTIVE SCHEDULER routine until all active APMs have an opportunity to run. This alternative approach has been used in a current ZON terminal implementation, but the version shown in FIG. 33 is preferred since it speeds the processing of inputs by the APMs that need input to continue execution.

Assume for now that the checking step for input waiting returns a NO value. The ACTIVE SCHEDULER routine increments the SLOT.NO by 1, checks to see if SLOT.NO is less than or equal to the maximum number of slots that are present, 15 in this case, and loops back to check whether the next bit number in the ACTIVE bitmap has a zero value. This looping continues until the next bit location having a 1 value, if any, is found, or until all active APMs have been scheduled, checked for execution, and actually executed if able to do so without input.

When the next active SLOT.NO for an application program module is encountered, the CHECK/EXECUTE routine for the application program module in that SLOT.NO is executed. This means that the subsidiary application program module in that APM SLOT.NO will be first checked for eligibility and then have its commands executed one-by-one until it is completed executing or it suspends itself with an appropriate command.

It should be apparent that the ACTIVE SCHEDULER routine will schedule, in turn, all of the active application program modules for execution until it has cycled through all of them one time assuming that no input is present or waiting at any time during the looping through this routine. Then control returns to the MAIN SCHEDULER routine. The MAIN SCHEDULER routine will loop back to the step of checking whether any application program modules are active and, if there are, will look for input waiting. Note that there may be some APMs still active even though all have been scheduled for execution by the ACTIVE SCHEDULER routine (without input present) because one or more of the active APMs may have suspended its execution before completion, for example to wait for input from some source or for a timer value to expire. If there is still no input waiting the ACTIVE SCHEDULER routine will be run another time. This loop of the MAIN SCHEDULER routine will continue to execute until the checking step for input waiting in either the MAIN SCHEDULER routine or the ACTIVE SCHEDULER routine returns a YES value.

d. The CHECK/EXECUTE Routine (FIG. 34) as Called by the ACTIVE SCHEDULER Routine The CHECK/EXECUTE routine shown in FIG. 34 has a number of possible execution paths depending on the conditions that exist when the routine begins. These various paths are marked on the flowchart in FIG. 34. The CHECK/EXECUTE routine always begins with the step of transferring application program module data elements in the ARRAY(SLOT.NO) of the Array of APM Data Structures shown in FIG. 12D to the Current APM Data Structure shown in FIG. 12C.

The first checking step is whether the DEVICES byte for the current job is 0. If so, the job has no restrictions on when it can run, and the CHECK/EXECUTE routine will proceed to execute the commands of the current APM. Since we are assuming that the CHECK-/EXECUTE routine was called by the ACTIVE SCHEDULER routine, for an APM just started in SLOT.NO 0, we will also assume that the DEVICES bitmap byte has 0 value. Thus, execution of the APM commands will begin by calling the the EXECUTE APM COMMAND routine which is depicted in FIG. 14 and described above. This is Path 1 through the CHECK/EXECUTE routine.

The CHECK/EXECUTE routine will then continue to execute APM commands in sequence until either a WAIT-type of command or a DONE or HALT command, for example, are executed to suspend sequential command execution. Once any command is executed which sets the WAIT/HALT data element to a value other than "continue", the CHECK/EXECUTE routine suspends the current APM and transfers the contents of the Current APM Data Structure to the corresponding data elements in the data structure in ARRAY(SLOT.NO) in the Array of APM data structures. Then, if the WAIT/HALT value is "halt", the stack for the current APM is freed up and the CHECK/EXECUTE routine exits back to the ACTIVE SCHEDULER routine. This "halt" value is set by certain general purpose operation routines associated with certain commands, some of which will be described in detail below. However, it should be understood that, if this value has been set, all other activities associated with terminating this APM will have already been completed. If the WAIT/HALT value is simply "wait", the CHECK/EXECUTE routine exits back to the ACTIVE SCHEDULER routine so that the next active APM can start executing.

Figure 34:
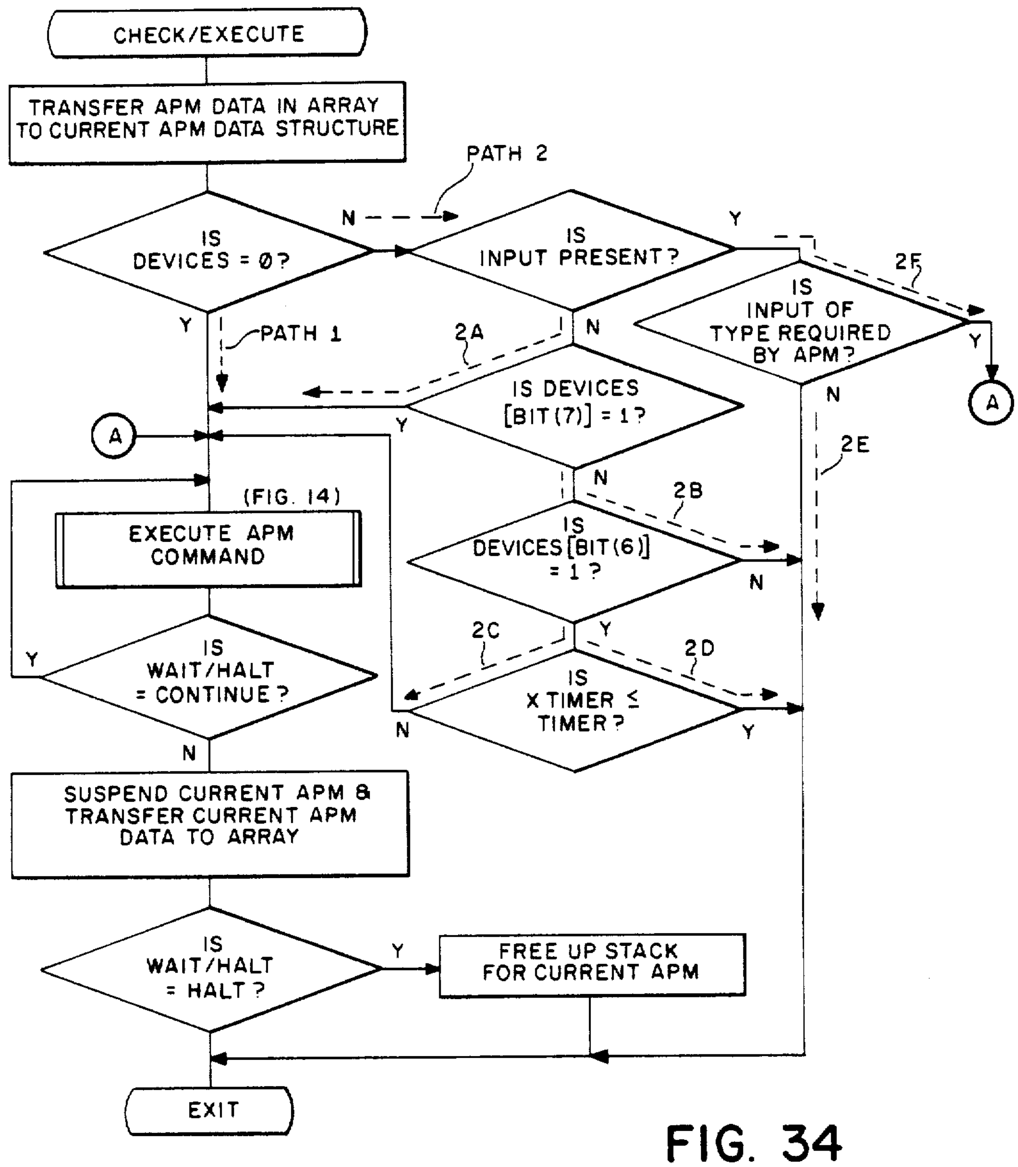

There is another path of execution through the CHECK/EXECUTE routine of FIG. 34 which will be taken, for example, when a single APM is active and it has just suspended operation to wait for a timer input. In this case the timer bit in the DEVICES bitmap is set to 1. Assuming that input is not received after the ACTIVE SCHEDULER routine finishes looping and checking for active APMs, the MAIN SCHEDULER routine will again call the ACTIVE SCHEDULER routine and the main APM in SLOT.NO 0 will be again scheduled. The first checking step will return a NO value, since the DEVICES bitmap has a 1 bit in at least one bit position. Execution will thus continue along Path 2.

The test for input being present will return a NO value, and the checking step for bit 7 being a 1 will return a NO value also, so the CHECK/EXECUTE routine will proceed to another checking step to determine if bit 6 in the DEVICES bitmap has a 1 value. In this case it has, so the next checking step will be performed to determine if the XTIMER data element has a value less than or equal to the actual value of the timer running in the microprocessor. If this checking step returns a YES value, this means that the APM which set the XTIMER value in a previous command is now able to continue execution, so execution will continue with the EXECUTE APM COMMAND routine shown in FIG. 14. This is Path 2C. If this checking step on XTIMER returns a NO value, the scheduled APM is not ready to continue execution and the CHECK/EXECUTE routine exits to the ACTIVE SCHEDULER routine. This is Path 2D.

It should thus be seen that this version of a CHECK/EXECUTE routine has the advantage that the APM which has suspended itself to await a timer value to be reached does not have to include commands to check for expiration of the timer. The checking step in the CHECK/EXECUTE routine keeps that APM from executing until the timer value passes the time set in the XTIMER data structure element for that APM. This speeds overall program execution since APMs not ready to execute are not scheduled only to immediately suspend themselves after the first command to check the timer value.

There are several other paths through the CHECK/EXECUTE routine which may be taken when that routine is executed as part of the ACTIVE SCHEDULER routine. As shown in the DEVICES byte bit assignments in FIG. 12E, bit 7 is designated as a RUN.NO.INPUT bit. If an APM command is executed which sets that bit to 1, this signals to the CHECK/EXECUTE routine that that APM can run even though it has a REALTIME attribute, and even though input of a particular type is needed but not yet present. This may be used for example in an APM which has certain commands which it can execute in one branch of the program module while it is awaiting input. At some point it will, of course, suspend itself and wait for the actual input needed before continuing further execution.

Thus, an alternate path of execution through the CHECK/EXECUTE routine of FIG. 34 occurs when input is not present, the ACTIVE SCHEDULER routine has scheduled an APM with REALTIME attribute to check for its readiness to execute, and bit 7 has been set by a prior command to 1 value to indicate that the APM can execute without input. In this case, the DEVICES bitmap byte does not have a 0 value so execution is along Path 2. Input is not present, but bit 7 is 1, so the APM will start or resume execution of commands. This is Path 2A through the CHECK/EXECUTE routine.

For example, the following sequence of code might appear in some APM, using the commands of the current implementation:

```
    NEED_INPUT 10000010B                            ; Run when keyboard or no input
MAINLOOP:
    WAIT                                            ; Suspend job
    CHK_INSRCE 00000010B @KEYINPUT                  ; Branch if keyboard input
    CHK_JOB_DONE 3 @ERROR1                          ; If Job 3 is done, go to
    BRANCH_GOTO @MAINLOOP                           ; error routine, otherwise wait
KEYINPUT:
    CHK_CHAR #MCHAR %EQ %HANGUPKEY @ERROR2          ; Branch if HANGUP key
    BRANCH_GOTO @MAINLOOP                           ; otherwise wait.
```

In this example, for the purposes of a certain application, it is necessary to have a single job monitor for both the unexpected termination of another job and the presence of a hangup key press. The definition of DEVICES bit 7 as the RUN.NO.INPUT bit permits this.

Figure 35:
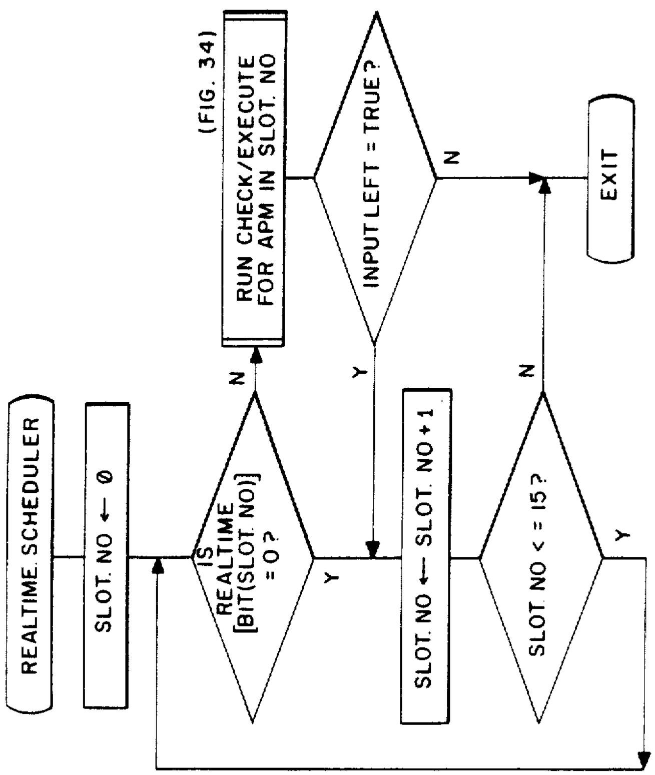

Finally, there is another path through the CHECK/EXECUTE routine which may be taken when that routine is called from the ACTIVE SCHEDULER routine. For example, assume that an APM has suspended itself to await input from some external input source, i.e. not for a timer input. However, the input looked for has not arrived and there is no input present. When this APM is again scheduled by the ACTIVE SCHEDULER routine and the CHECK/EXECUTE routine is called, the devices byte is not 0 so execution proceeds along Path 2. Input is not present, devices bit 7 called RUN.NO.INPUT is not 1, and devices bit 6, the TIMER bit, is not 1. Consequently, execution will be along Path 2B and the CHECK/EXECUTE routine will exit without executing any commands of that APM. That particular APM will not execute, as it should not, until the right input is present for it to use.

e. The REALTIME SCHEDULER Routine (FIG. 35)

Assume now that the conditions in the local terminal are such that an input is waiting and one of the active application program modules has previously executed a NEED_INPUT command to set one or more of the bits in the REALTIME bitmap of the Scheduler Data Structure of FIG. 12A to a 1 value. If the ACTIVE SCHEDULER routine is running, it will exit after the current APM suspends itself or completes execution because of the checking step for input waiting as shown in FIG. 33 and described above. The MAIN SCHEDULER routine will loop back after its INPUT WAITING test returns a YES and read the input that is present. INPUTLEFT will be set TRUE and the test for any APM to be in REALTIME will return a YES. This will initiate running of the REALTIME SCHEDULER routine shown in FIG. 35.

The REALTIME SCHEDULER routine is similar to the ACTIVE SCHEDULER routine in that it scans through the bit numbers in the REALTIME bitmap until it finds one that has a 1 value and then runs the CHECK/EXECUTE routine for the APM in the corresponding SLOT.NO of the APM array of Data Structures. However, the CHECK/EXECUTE routine has a different execution path when called by the REALTIME SCHEDULER routine.

f. The CHECK/EXECUTE Routine (FIG. 34) when called by the REALTIME SCHEDULER Routine Before discussing the steps of the CHECK/EXECUTE routine to be executed for an APM which is scheduled by the REALTIME SCHEDULER routine, it should be noted that an APM may have a single bit in its DEVICES bitmap with a 1 value or there may be two or more bits in the DEVICES bitmap which have a 1 value. For example, the timer bit 6 may have a 1 value along with the modem bit 2, or the keyboard bit 1, or the phone status bit 5, or both the keyboard and cardreader bits 0 and 1. It should also be understood that the timer which relates to the timer bit in the DEVICES bitmap is not associated with an input value which is obtained by execution of the Read Input routine, but is associated with an internal timer which is running in the microprocessor system, and with the desired timer value which is maintained for each APM. Thus, any APM which is in REALTIME only because its timer bit in the DEVICES bitmap has been set to 1 value along with the associated bit in the REALTIME bitmap may be skipped by the CHECK/EXECUTE routine for that APM when there is some specific input present of a kind which that APM does not use.

Referring again to FIG. 34, the first checking step of the CHECK/EXECUTE routine determines whether the DEVICES bitmap byte has a 0 value. Since the CHECK/EXECUTE routine was called from the REALTIME SCHEDULER routine, we will assume that this checking step returns a NO value since there should be at least one bit in the DEVICES bitmap with a 1 value. Thus execution proceeds along Path 2. The next checking step is to determine whether input is present. We have postulated input being present as a basis for entering the REALTIME SCHEDULER routine, so this checking step will return a YES value. In that case, the DEVICES byte for the scheduled APM will be checked to see if it contains a bit for the specific input which is present. If the result of this check is YES, the current APM can resume execution of its commands. This is Path 2F. Otherwise, the command execution step of the CHECK/EXECUTE routine will be bypassed, and execution will return to the REALTIME SCHEDULER which invoked the CHECK/EXECUTE routine. This is Path 2E.

Path 1 may also be taken by the CHECK/EXECUTE routine when called by the REALTIME SCHEDULER routine under special conditions. The START_JOB routine discussed above gives the programmer the opportunity to initiate execution of an APM with foreground and REALTIME attribute. Howver, until that APM executes a command there isn't any specification of the type of input that it requires and its DEVICES bitmap byte has a 0 value. If the REALTIME SCHEDULER routine is running at the time, it will encounter this APM with a 1 bit value in its slot in the REALTIME bitmap and the ACTIVE SCHEDULER routine will schedule it for execution and call the CHECK/EXECUTE routine. Since the DEVICES bitmap byte is 0, execution will proceed along Path 1 so that a command to specify the source from which input is needed can be executed.

It should thus be noted that the implementation of this version of the concurrent APM scheduling methodology of this invention gives top priority to executing APMs which are in REALTIME and need input. This is not a limitation of the invention and other implementations might not need or use such priority.

g. Alternative CHECK/EXECUTE Routines (FIG. 36)

It should be appreciated that there are a number of alternative CHECK/EXECUTE routines that could be implemented within the general concept of the scheduler method of this invention. One alternative would be to have a different CHECK/EXECUTE routine called by the REALTIME SCHEDULER routine than the one called by the ACTIVE SCHEDULER routine. The ACTIVE SCHEDULER routine does not need all of the checking steps in the CHECK/EXECUTE routine since there is no input present. However, it does need some of the checking steps so that an active application program module which has suspended itself after executing a NEED_INPUT command requesting only a single input device need not have subsequent commands executed before input is actually present. In other words, the checking step for required input being present is highly desirable in the CHECK/EXECUTE routine called by the ACTIVE SCHEDULER routine because then the APM can be written more simply, and can include subsequent commands in that APM which must not be executed until input is actually present and read by the scheduler routine.

For example, suppose there is only one active APM and it has executed a NEED_INPUT command, but the input needed has not yet arrived to be read. The ACTIVE SCHEDULER routine will cycle a second time and call the APM into the current APM data structure. However, if execution of the next command is not bypassed until the input is actually available, the APM must include many more commands to test whether the input is available, or there is very likely to be an error in program execution. The CHECK/EXECUTE routine test for input present precludes execution of the next command unless the NEED_INPUT command requested an internal timer input.

Another variation in the CHECK/EXECUTE routine would be required in an implementation of the method of this invention in which the transfer of APM data between the APM array and the Current APM Data Structure is avoided. In this case the ACTIVE SCHEDULER routine and the REALTIME SCHEDULER routine would point to the SLOT.NO in the APM array of data structures and the CHECK/EXECUTE routine would simply operate directly on the data elements in the SLOT.NO currently being pointed to.

Figures 36A, 36B:
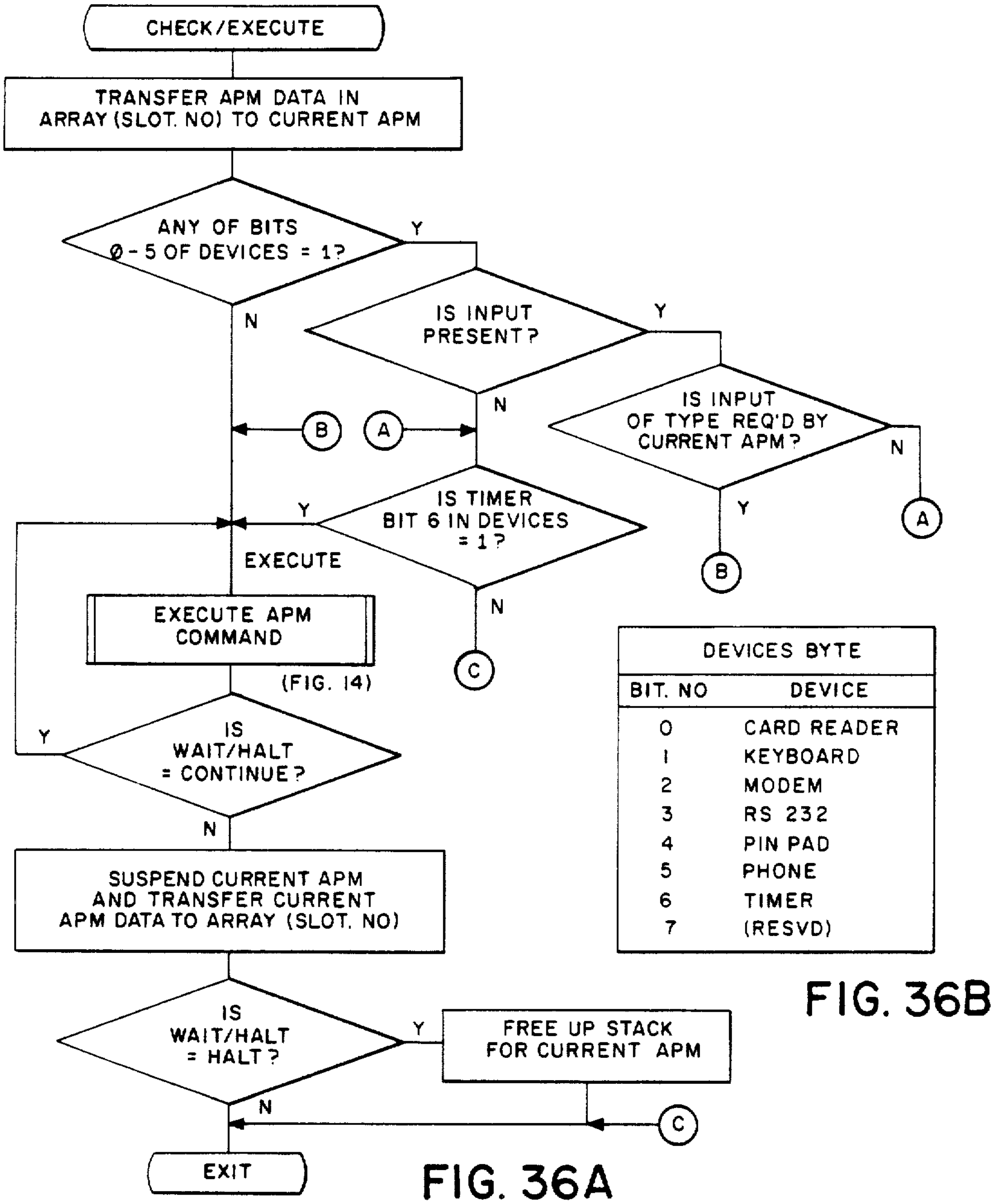
FIGS. 36A and 36B illustrate an alternative routine and data element bit assignment useful in implementing the concurrent application program module scheduling methods of this invention.

FIG. 36A illustrates a specific example of an alternative CHECK/EXECUTE routine. In this version, the initial test is to check for whether any actual device input is required, i.e. whether bits 0–5 of the DEVICES byte contain any 1 value bits. If no actual device inputs are required, the CHECK/EXECUTE routine will continue on to execute the APM.

Assume for present purposes that the first slot number encountered in the REALTIME bitmap has a DEVICES bitmap with a 1 value only in the timer bit 6. After the data elements have been transferred to the current APM data structure, the checking step for a 1 value in any of bits 0–5 of the DEVICES bitmap will return a NO value since only bit 6 has a 1 value. The CHECK/EXECUTE routine will thus proceed to execute the EXECUTE APM COMMAND routine for the next command in the then-current APM. Typically, this next command will be one which checks to see if the actual timer value is greater than or equal to the value stored in the XTIMER data element for the current APM, and then either suspends execution of that APM if the check returns a NO value or continues executing the commands of that APM if the check returns a YES value.

Assume now a second condition in which only one or more of the bits 0–5 in the DEVICES bitmap for the active APM have a 1 value. Under this condition, the test for any of bits 0–5 having a 1 value will return a YES value. The CHECK/EXECUTE routine will then execute a second checking step to see if input is actually present. Typically there will be input present if it was called from the REALTIME SCHEDULER routine, and not if it was called from the ACTIVE SCHEDULER routine. Assume there is no input present so that the test returns a NO value. The CHECK/EXECUTE routine will then execute a checking step to see if the timer bit 6 in the DEVICES bitmap has a 1 value. If it does, possibly because the APM started with a REALTIME attribute is waiting for a timer value to expire before beginning active execution of its task, this checking step will return a YES value and the CHECK/EXECUTE routine will proceed with execution of the EXECUTE APM COMMAND routine.

If the test for a 1 value in timer bit 6 returns a NO value, the EXECUTE ARM COMMAND routine will be bypassed and the current APM will be suspended. The REALTIME SCHEDULER routine will then continue to look for the next SLOT.NO, if any, for which the REALTIME bitmap has a 1 value.

Now assume that there is input present and the test for the presence of input returns a YES value. The next step of the CHECK/EXECUTE routine is to check whether the input present is of the type required by the current APM. This is done by determining whether the INSRCE value stored during execution of the READ INPUT routine matches any of the positions in the DEVICES bitmap which have a 1 value. If this checking step returns a YES value, the CHECK/EXECUTE routine proceeds to execution of the APM commands. If the checking step which looks for a match of the input present with the type of input required by the current application program module returns a NO value, the routine branches to the checking step which looks for a 1 value in the timer bit 6 of the DEVICES bitmap and proceeds from there, depending on the value returned by that checking step. This has already been described above and will not be repeated here. This completes the description of the various pathways of execution of this alternative CHECK/EXECUTE routine.

As indicated above, the preferred CHECK/EXECUTE routine shown in FIG. 34 avoids the necessity of using commands in the APM itself to check for passage of time, and is less likely to schedule an APM which is not acually ready to begin executing commands. This speeds up execution and may be a more favorable approach under most circumstances.

It should be apparent that there are a wide variety of more sophisticated CHECK/EXECUTE routines which might be employed together with other additional data elements in the Current APM Data Structure. For example, if a particular application required regular use of suspending execution of certain application program modules until application program modules in other slots were finished executing, the Current APM Data Structure could include another 2-byte data element labelled DONE.APMs and the CHECK/EXECUTE routine could include a checking step to bypass execution of the current APM unless all of the bits of the DONE.APMs data element which had 1 value matched up with all corresponding bits in the ACTIVE bitmap having 0 value.

In another application it might be desirable for the APM Data Structures to include a byte with an indication of any output devices on which each APM depended, so that an APM which needed to wait for some output channel such as a printer to be ready could be suspended by the scheduler and not restarted until the printer was available. As an alternative example, in some implementation of the method of this invention, it might be desirable for each input device to have a separate bitmap of all APMs which require that input, and to use the same format for it as the ACTIVE or REALTIME bitmap, rather than using the implementation described which uses a single REALTIME bitmap for all inputs and a separate DEVICES byte for each APM.

These are some examples of alternative CHECK/EXECUTE routines which might be used. Persons of skill in the art would readily adopt other versions of CHECK/EXECUTE routines as needed.

h. Initiating APM Execution from Input

Referring back to the MAIN SCHEDULER routine shown in FIG. 29, it will be seen that, after the REALTIME SCHEDULER routine has completed its execution, the MAIN SCHEDULER routine executes a checking step to determine if INPUTLEFT is TRUE. If this returns a NO value, this means that one of the APMs executed during the running of the REALTIME SCHEDULER routine took and used the input that was present. The MAIN SCHEDULER routine then bypasses the STATE.TABLE.LOOKUP routine, and checks for any active APMs. If there is still input to be used, the INPUTLEFT checking step returns a YES value, and the MAIN SCHEDULER routine proceeds to set CUR.INPUT to the INCHAR-1 and then runs the STATE.TABLE.LOOKUP routine with the CUR.STATE and CUR.INPUT parameters.

Figure 37A:
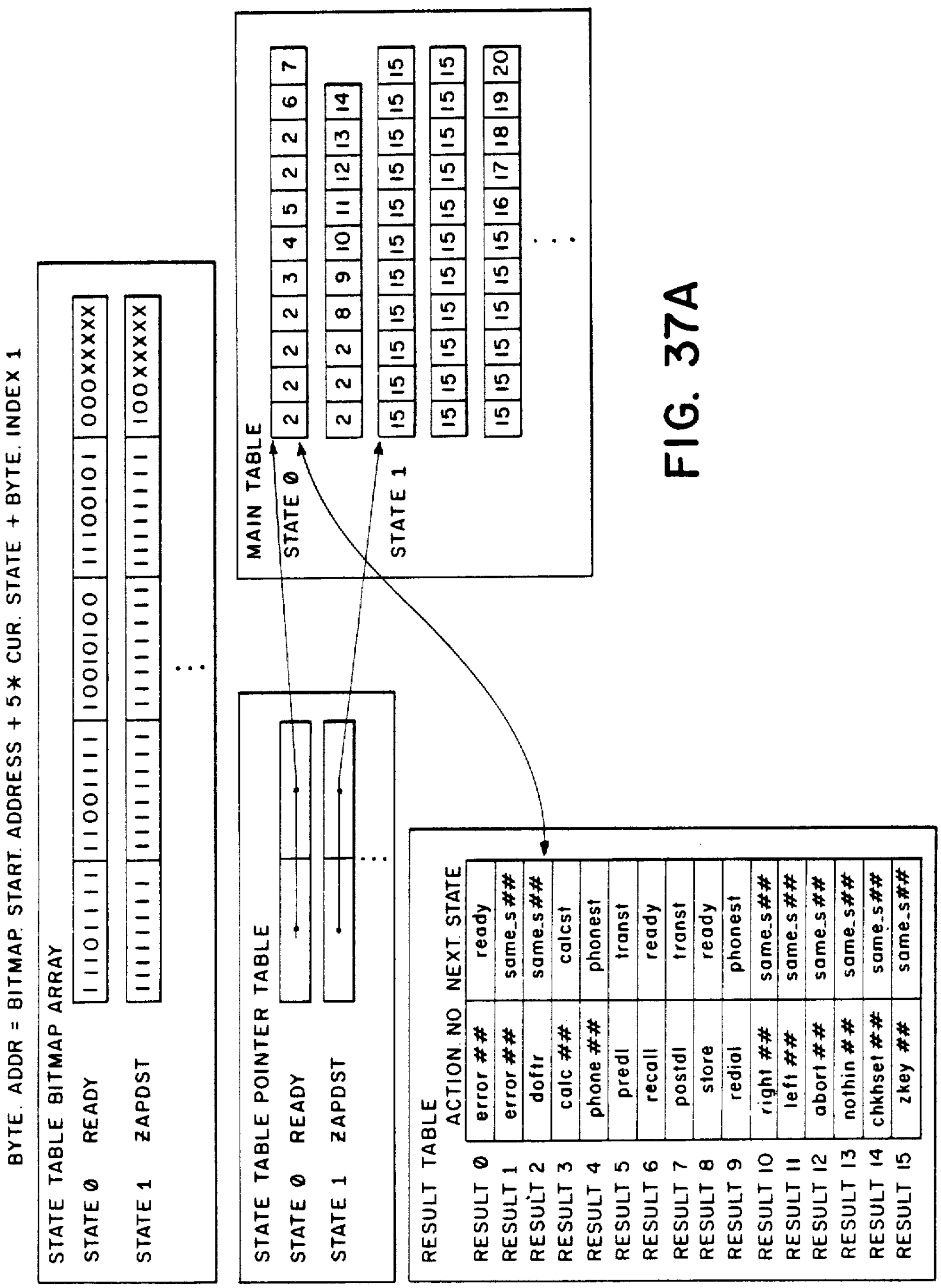
FIG. 37A illustrates a compressed state table storage and accessing system useful with this invention.
Figure 37B:
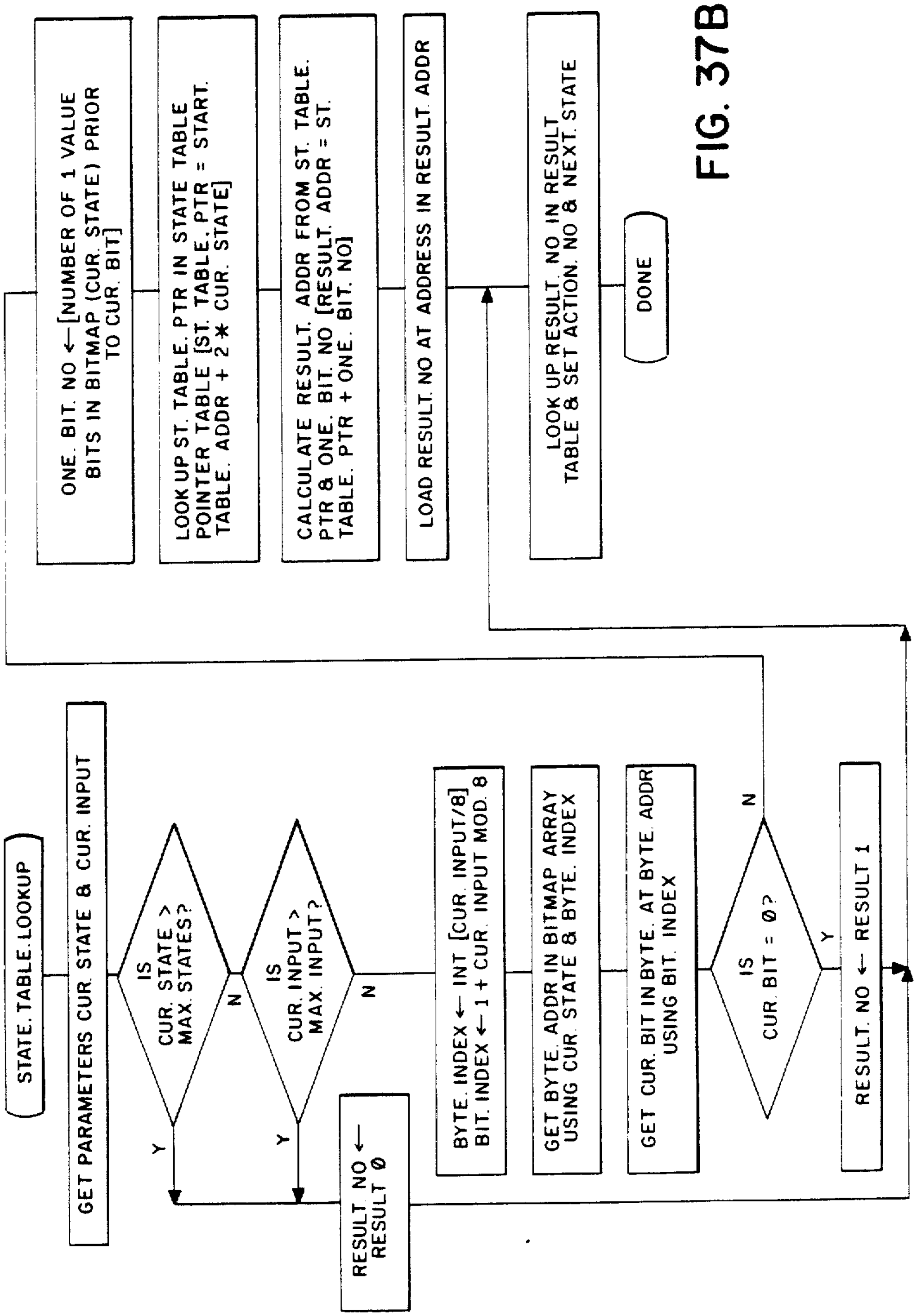
FIG. 37B illustrates a state table lookup routine useful with this invention.

(1) State Table Look-Up of Input—the STATE.TABLE.LOOKUP Routine (FIGS. 37A and 37B)

The method of this invention as implemented in the ZON terminal utilizes state table lookup to initiate execution of APMs and ROM-resident routines except in cases where the power-up routine initiates execution of an APM or one APM executes a command to start the execution of another APM.

It should be understood that the concept of using state tables and lookup routines to initiate program actions is not in itself novel and has been used, for example, in versions of the ZON terminal which preceded those versions that utilize the present invention. The method of this invention integrates this function in the scheduler feature. The STATE.TABLE.LOOKUP routine implemented in the current version of the ZON terminal is charted in FIG. 37B. The STATE.TABLE.-LOOKUP routine is based on a particular compression system for storing the state table as shown in FIG. 37A. It should be understood that other compression routines could be used, or state tables without compression could be used, with appropriate changes in the lookup routine.

Referring first to FIG. 37A, the particular state table compression system currently used in one implementation of the method of this invention is depicted. The information and values that are used in FIG. 37A for exemplifying this aspect of the MAIN SCHEDULER routine relate to the states in the state table defined in the example of an application program in TABLE XXX. Reference will be made to these actual state tables for purposes of specific illustration and explanation. FIG. 37A shows four components that are stored in the random access memory of the local terminal in connection with the state table, a state table bitmap array, a state table pointer table, a main table, and a result table.

Referring to the state table definitions given in TABLE XXX, it is seen that each state of the state table contains entries which assign to at least several keys of the keyboard and/or the inputs from other input devices the action designated "error##" and the state designated "same_s##". One aspect of the compression scheme is to select this particular action and associated state which are repetitively used as the default result. Doing so will reduce the size of the code required for downloading the state table information as will be seen in the following discussion.

The state table bitmap array contains a separate bitmap for each of the states that are defined in the application program and each of the bitmaps in the array contain a prearranged number of bytes so that the total number of bits in each bitmap is at least as great as the total number of inputs that are involved in the hardware of the local terminal. In the particular ZON terminal version of a local terminal, each of the keys of the keyboard is treated as a separate input source, and there are twenty eight keys and seven other possible inputs, only five of which are currently used, as indicated in each of the states of the state table. Each input source is specifically assigned to one of the bits in each of the bitmaps for each state that is defined.

Each state of the state table defined is mapped into its associated bitmap by placing a bit value 1 in each bit which is associated with an input source which does not have assigned to it the default result, RESULT(1), or in this case an ACTION.NO value of "error##" and a NEXT.STATE value of "same_s##". Thus referring to the state 0 bitmap for the READY state, comparing the bit values to the action and state assignments for input sources, all of the bits having a 1 value correspond to actions and states which are not the default items.

The state table pointer table contains a two-byte address for each of the states in the state table. This address is a pointer to the starting address for that state table in the main table. The main table stores in sequence single bytes having a value corresponding to a particular result in the result table. For each of the states, the main table stores only the result numbers corresponding to the input sources to which the default item is not assigned, and these result numbers are stored in sequence corresponding to the bit locations assigned in the bitmap array for each state. The result table stores at result number positions all of the different ACTION.NO and NEXT.STATE designations which are defined in all of the state tables defined for the application program. The result for RESULT(0) always stores the result to be returned in the case of erroneous parameters, namely "error##" and "READY", and as mentioned RESULT(1) stores the default entry for the state table, namely the value returned for those entries which have 0 bits in the bitmap table.

To illustrate this approach, consider the READY state defined in TABLE XXX. Each of the keys in the twenty-eight key array is assigned a CUR.INPUT value from 0 to 27 and a corresponding bit position in the bitmap for the READY state. Each of the other sources of input is assigned a CUR.INPUT value from 28 to 35 and a corresponding bit position in the bitmap. In the READY state there are 21 input sources which do not have the default result assigned to them, but many of the keys have the same assigned results, i.e. Result 1 in the Result Table. As shown in the Main Table, there are thirteen different results assigned to the different input sources in the READY state and the result 1 is used nine different times. In the state designated ZAPDST, the result 14 is used 28 times for all of the keys of the keyboard.

It should now be appreciated that, on average, compression of code size can be achieved by using a main table which stores one byte corresponding to an item in a result table which involves a two byte field due to the fact that many of the results in the result table are used a number of times. The alternative would be to store the two bytes of the ACTION.NO and NEXT.STATE directly in the main table. For state 0, the READY state, this would involve storing forty-two bytes. Instead there are twenty one bytes stored in the main table for state 0 and twenty-six bytes in the result table for this state, for a total of forty-seven bytes, so there are actually more bytes used in this case. However, for state 1 called ZAPDST, the un-compressed approach would involve storing sixty-six bytes of information, while the compression system shown involves storing only thirty-three bytes in the main table and twelve bytes in the result table for a total of forty-five bytes. Most of the state tables defined in the sample application program use the default result number and/or a sufficient number of redundant result numbers that the compression system results in a substantial reduction in overall code size.

It should be appreciated that accessing the result number information stored in the main table for an input source to which the default result number is not assigned can be done by determining how many 1 value bits are in the bitmap of the corresponding state table preceeding the bit number associated with the input source. That will indicate how far to jump into the main table from the start address for that particular state which is stored in the state table pointer table. Once the location of the result number stored for that input source is found and read, it can be used to access the information in the result table because its value indicates how far into the result table from the beginning address to go to find the ACTION.NO and NEXT.STATE record associated with that result number. This will become more clear from the discussion below of the STATE.TABLE.LOOKUP routine which performs these lookup steps.

Referring now to FIG. 37B in connection with FIG. 37A, it is seen that the first step of the STATE.TABLE.LOOKUP routine is to obtain the parameters CUR.STATE and CUR.INPUT. The value of CUR.STATE will have been previously set, either during a power up routine, as discussed below, or after executing a previous pre-defined action, or while terminating the execution of a previous APM as shown in the STOPAPM routine of FIG. 39. Note that the STOPAPM routine includes a step of setting CUR.STATE to GO.TO.STATE, where GO.TO.STATE will have been previously set to NEXT.STATE by the ACTION START APM routine shown FIG. 31 during the set-up of the terminating APM.

To follow this through and make it more clear, the purpose of the STATE.TABLE.LOOKUP routine is to set an ACTION.NO corresponding to the APM which is to be executed in SLOT.NO 0 of the scheduler APM array or the predefined ROM action routine which is to be executed, and to set NEXT.STATE as the state that the local terminal should go to after that APM or routine has completed execution. However, as shown in the ACTION START APM routine in FIG. 31, during execution of an APM, CUR.STATE is set to ZAPDST. Consequently, the ACTION START APM routine will have temporarily stored the NEXT.STATE information provided by the STATE.TABLE.LOOKUP routine in a data register called GO.TO.STATE. Thus the STOPAPM routine shown in FIG. 39 will have had the GO.TO.STATE available and stored it into the CUR.STATE data register when the APM in SLOT.NO 0 has been killed along with all other APMs running in other SLOT.NOs; or alternatively, if the STOPAPM routine were used with the options associated with the HALT command, the CUR.STATE will have been automatically set to "READY" when the STOPAPM routine called the ABORT routine. The above steps would only have been necessary if the action previously selected by the state table were an APM; if it selected a predefined ROM action routine, then the CUR.STATE value can be directly set from the NEXT.STATE routine.

One other point should be made clear relative to the use of "same.s##" and the NEXT.STATE value in the result table shown in FIG. 37A. This is a special value which is assigned to NEXT.STATE for purposes of the ACTION START APM routine. The "same.s##" designation is used in the default result, for example, and may be accessed from a number of different states. It designates that the state which the local terminal should go to after execution of an APM, or after executing a predefined ROM action, is the same state that it was in when the corresponding input processed therough the STATE.TABLE.LOOKUP routine arrived. The ACTION START APM routine shown in FIG. 31, includes a checking step after the step of setting the GO.TO.STATE to the value of NEXT.STATE to determine if NEXT.STATE has the special value "same.s##". If this checking step returns a YES value, GO.TO.STATE is set to CUR.STATE so that the local terminal will return to the same state after the APM set in SLOT.NO 0 has completed execution.

Returning now to the STATE.TABLE.LOOKUP routine in FIG. 37B, after getting the parameters CUR.STATE and CUR.INPUT, two checking steps are performed to check the validity of the parameters. CUR.STATE is checked to determine whether it is greater than the value of MAX.STATES and CUR.INPUT is checked to determine whether its value is greater than the value of MAX.INPUT. The MAX.STATES value is set during the definition of the application program by the number of state tables defined and is downloaded as part of the fixed download section of the application program as will be discussed below. The MAX.INPUT value is hardware related and will typically be a fixed parameter stored in read only memory of the local terminal.

If either of these two checking steps returns a YES value, there is an error; RESULT.NO is set to 0, and the routine proceeds to the step of looking up that value in the result table. This will give an ACTION.NO set to "error##" and a NEXT.STATE set to READY, so that the terminal will return to the ready state after processing the error action.

Assuming that the two checking steps return a NO value, the routine proceeds to calculate a BYTE.INDEX value and a BIT.INDEX value based on the value of CUR.INPUT as shown. Following this a step is performed to get BYTE.ADDR in the bitmap array using the values of CUR.STATE and BYTE.INDEX. BYTE.ADDR is the address of the byte in the bitmap array in which the bit corresponding to the input source associated with CUR.INPUT is located. Thus referring to FIG. 37A, it can be seen that BYTE.ADDR can be calculated by adding to the starting address of the state table bitmap array five times the value of CUR.STATE and one less than the value of the BYTE.INDEX. With thirty-five total input sources, there are five bytes in each bitmap. Thus the BITMAP.START.ADDRESS plus five times the value of CUR.STATE gives the starting address of the bitmap corresponding to the value of CUR.STATE. BYTE.INDEX gives the number of the byte within the bitmap and thus BYTE.INDEX less one added to this starting address gives the starting address of the desired byte.

The next step is to get CUR.BIT in this byte at BYTE.ADDR using the BIT.INDEX value which tells the position of the bit in the byte at BYTE.ADDR. Then the routine executes a checking step to determine if CUR.BIT has a value 0. If CUR.BIT has a value 0, this means that the RESULT.NO assigned to the associated input is the default result number, so RESULT.NO is set to result 1, the default result, and the routine proceeds to the step of looking up RESULT.NO in result table to set ACTION.NO and NEXT.STATE.

If the checking step for the value of CUR.BIT returns a NO value, the routine proceeds to execute steps to find the RESULT.NO in the main table. The first step is to determine the value of ONE.BIT.NO as the number of bits in the bitmap corresponding to CUR.STATE which are present in locations prior to the bit which is CUR.BIT. Following this the ST.TABLE.PTR is looked up in the state table pointer table using the value of CUR.STATE as shown. Then the RESULT.ADDR in the main table is calculated from the values of ST.TABLE.PTR and ONE.BIT.NO as shown, followed by loading the RESULT.NO at RESULT.ADDR. Finally, RESULT.NO is looked up in the result table and the ACTION.NO and NEXT.STATE values stored there are read and set. This completes the execution of the STATE.TABLE.LOOKUP routine.

(2) Alternative Approaches to Initiating Execution of APMs

The method of this invention is not limited to initiation of APMs using the method described above. For example, this invention could be employed in a local terminal which employed a keyboard and a cathode ray screen on which menus are presented to the operator for selecting program modules to be executed either by keyboard input or through the use of pointing devices such as a mouse or lightpen. Each menu selection might call up a particular program module for presentation of data entry templates and/or selection of submenu program modules and the like.

This invention is mainly directed toward local terminals which have strictly a dedicated function and a dedicated application program running in the terminal. However, the invention might also be employed in a local terminal which combined a particular preprogrammed function with the ability to use the local terminal also as a general purpose programmable computer to create and/or run other programs.

i. Execution of the DO.ACTION Routine (FIG. 52)

Figure 52:
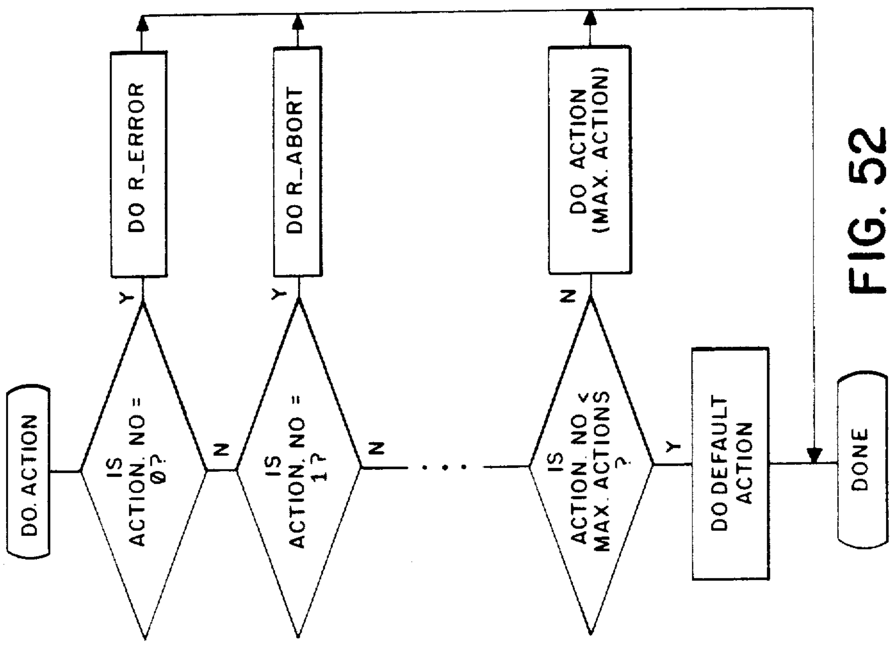

The DO.ACTION routine which is run by the MAIN SCHEDULER for ACTION.NO values not corresponding to APMs, is shown in FIG. 52 and basically comprises a series of case statements to cause execution of a particular one of the predefined ROM-resident routines based on the ACTION.NO value. This routine can be considered a number of checking steps executed sequentially as shown to find which ROM-resident routine corresponds to the ACTION.NO and then execute that routine. A complete listing of the ROM-resident action routines is provided in Table VII. Several of the routines that are pertinent to and called from APM routines are discussed below.

After executing the ROM-resident routine, as shown in FIG. 29, a checking step is preformed by the MAIN SCHEDULER routine to determine if NEXT.STATE is equal to same.s##. If it is, the MAIN SCHEDULER routine sets INPUTLEFT to FALSE and checks for any active APM. If NEXT.STATE is not equal to same.s##, CUR.STATE is set to NEXT.STATE so that the appropriate state table will be active for the next execution of the STATE.TABLE.LOOKUP routine.

j. Execution of APM Commands which Terminate Execution of APMs

As discussed above the scheduler method of this invention relies on execution of a command within an APM running in SLOT.NO 0 to start the execution of additional APMs in other SLOT.NOs. One such command, the START_JOB command is discussed in detail above. Once any APM has been set up by the START_JOB command to begin execution, it can start the execution of other APMs in other SLOT.NOs. The scheduler method of this invention also relies on execution of a command within an APM running in some SLOT.NO to suspend execution of the APM running in that SLOT.NO so that other APMs running in other SLOT.NOs can be executed. It also requires execution of a command at the end of each APM, i.e. the DONE command, to terminate the execution of that APM and to remove it from the array of active APMs. There are also commands defined, such as the HALT command and the STOP_JOB command, which will terminate the execution of APMs even before they complete their execution.

Figure 49:
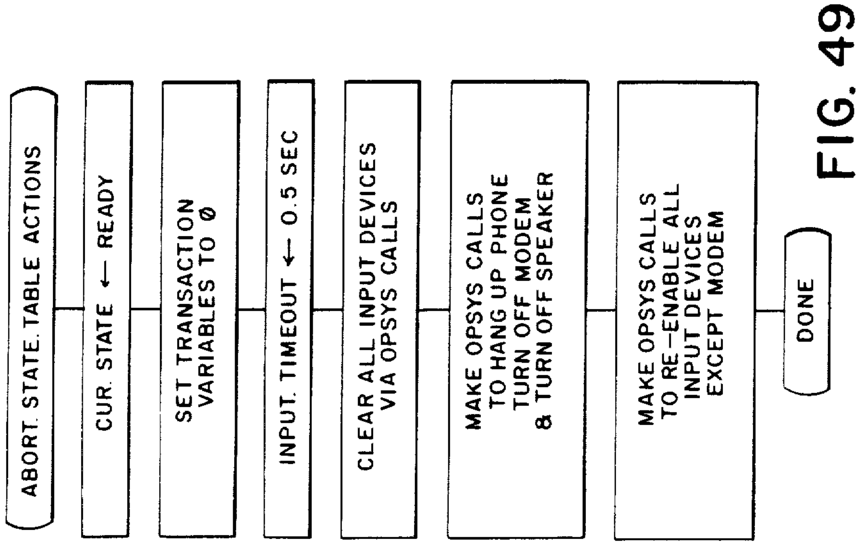

(1) The HALT Command (FIGS. 38–40) and the ABORT.STATE.TABLE.ACTIONS Routine (FIG. 49)

As described in Table I, the HALT command terminates all active APMs which do not have the background attribute, returns the local terminal to the READY state, and calls an abort subroutine shown in FIG. 49 to hang up the phone, restore the modem to the initial state, and to clear all input. The sequence of program steps executed by the HALT command is illustrated in FIG. 38 and includes the STOPAPM and SLOT.KILL routines which are shown in FIGS. 39 and 40.

Figure 38:
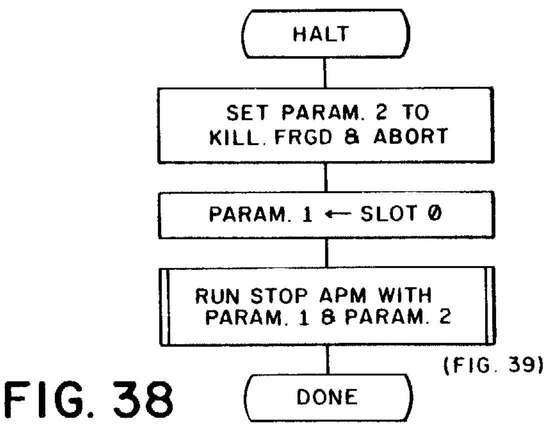
FIGS. 38-47 are flowcharts illustrating routines associated with application program module commands useful in implementing this invention.

Referring to FIG. 38, the first step of the HALT routine is to set PARAM.2 to include KILL.FRGD and ABORT. What this means is the binary value in the data register called PARAM.2 is set such that it indicates that the parameter has both attributes. PARAM.2 may take on three different attributes: KILL.FRGD, KILL.BKGD, and ABORT. These three attributes will control the execution path of the STOPAPM routine as will be discussed below. The setting of the PARAM.2 attributes can be accomplished in a number of ways. A single eight bit data register can be used, for example, with the bit values of the first three bits used as flag bits for each of the three different attributes. Thus the value 00000001 for PARAM.2 would designate KILL.FRGD only. The value 00000011 would designate KILL.FRGD and KILL.BKGD attributes. The value 00000101 would designate KILL.FRGD and ABORT attributes.

The next step in the HALT routine is to set PARAM.1 to a value of SLOT 0. As will be discussed below, setting the PARAM.1 parameter to this value will cause the STOPAPM routine to "kill" all active APMs with foreground attribute. Following this setting of PARAM.1, the STOPAPM routine is run using the values of PARAM.1 and PARAM.2 which have been set.

Figure 39:
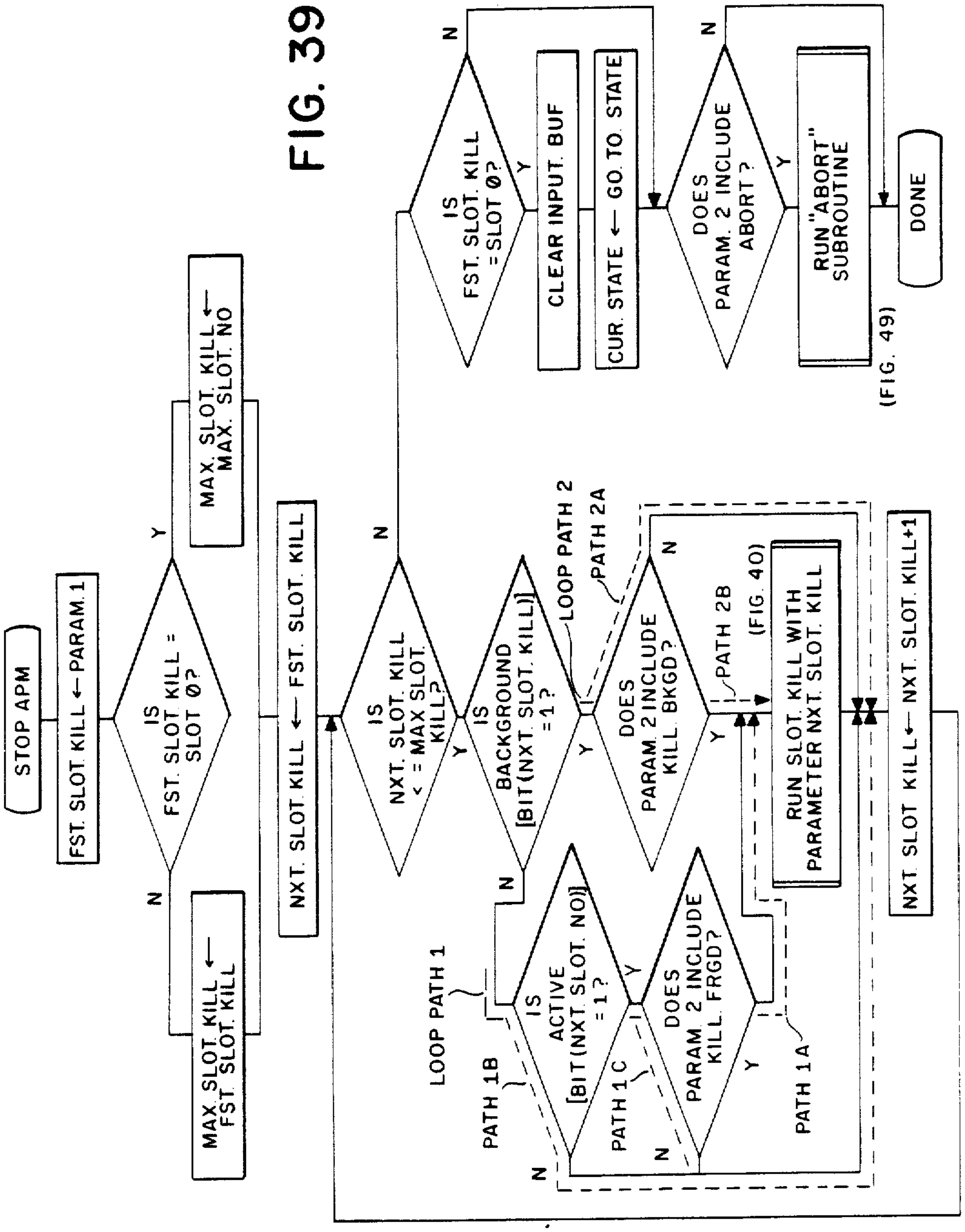
Figure 40:
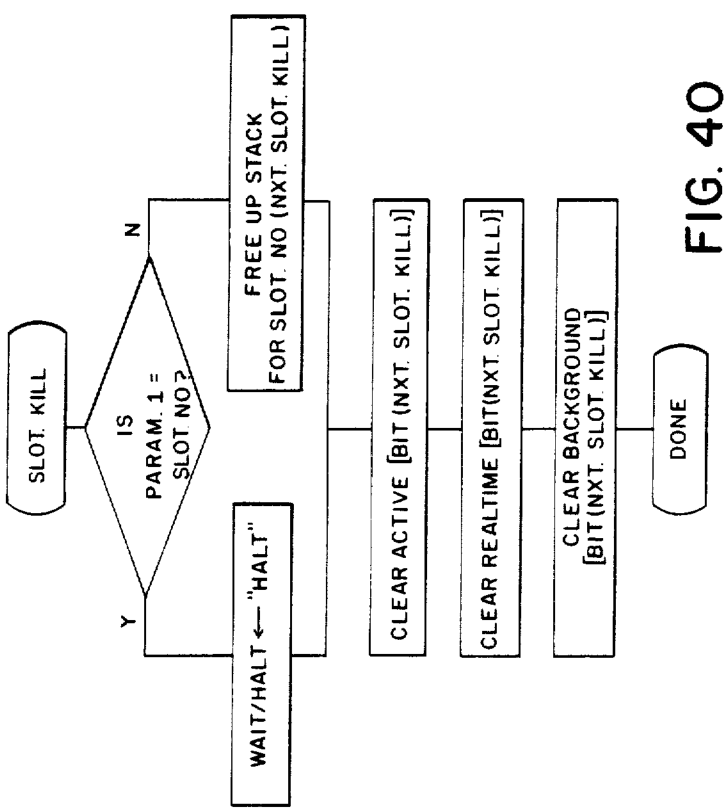

(2) Executing the STOPAPM Routine from the HALT Routine (FIG. 39)

Before discussing the specific execution steps and different execution paths of the STOPAPM routine, it will be helpful to note that this routine performs different overall tasks depending on the values assigned to PARAM.1 and PARAM.2 by the general purpose operation routine which calls it for execution. These different execution paths will be discussed in conjunction with the different commands and associated general purpose operation routines which use the STOPAPM routine.

Referring to FIG. 39, the STOPAPM routine begins with the step of setting the value in a data register called FST.SLOT.KILL to the value of PARAM.1, i.e. in this case to SLOT 0 as set by the HALT routine. Next a checking step is performed to determine if the value in FST.SLOT.KILL is equal to SLOT 0. In this case FST.SLOT.KILL has a SLOT 0 value so this checking step returns a YES value, and the next step is to set the value of a data register labelled MAX.SLOT.KILL to the value MAX.SLOT.NO. In this embodiment, the maximum slot number is 15 since the number of slots in the APM array of FIG. 12D is 15.

It should be understood that other implementations of this invention might use other arrangements involving more or less slot numbers in the APM array. Furthermore, if the implementation involved the alternative approach using dynamic allocation of slot numbers as discussed above, then this MAX.SLOT.NO value might be a varying value instead of a fixed value. The MAX.SLOT.KILL value is used in a later checking step to determine when to end the execution of a loop in the STOPAPM routine.

The other path out of this checking step when a NO value is returned, and the resulting execution path of the STOPAPM routine will be discussed below in connection with the DONE command and the STOP_JOB command, both of which also use the STOPAPM routine.

After MAX.SLOT.KILL is set to MAX.SLOT.NO, the value in a data register labelled NXT.SLOT.KILL is set to the value in data register FST.SLOT.KILL, which is in this case SLOT 0. The next step is a checking step to determine whether the value in NXT.SLOT.KILL is less than or equal to the value in MAX.SLOT.KILL. This is the first step in a program loop which will execute one or more times depending on the values of NXT.SLOT.KILL and MAX.SLOT.-KILL when the loop is first entered. In this case, the loop is entered with NXT.SLOT.KILL having a value SLOT 0 and MAX.SLOT.KILL having a value SLOT 15 so the program loop will be executed sixteen times.

The program loop in the STOPAPM routine uses the values of the BACKGROUND bitmap and the ACTIVE bitmap in the Scheduler Data Structure of FIG. 12A. For purposes of illustration, it will be assumed that the ACTIVE bitmap and the BACKGROUND bitmap have the following values:

| Bit Number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVE | 1 | 0 | 0 | 0 | 1 | 0 | 0 | 0 | 1 | 1 | 0 | 0 | 1 | 1 | 0 | 1 |
| BACKGROUND | 1 | 0 | 0 | 0 | 0 | 0 | 0 | 0 | 0 | 0 | 0 | 0 | 0 | 0 | 0 | 0 |

The values in the REALTIME bitmap for the APMs which have a value 1 in the ACTIVE bitmap are of no pertinence to execution of the STOPAPM routine and so will be ignored here.

Returning to the checking step to determine whether NXT.SLOT.KILL is less than or equal to MAX-.SLOT.KILL, when this loop is entered with the initial values of NXT.SLOT.KILL=SLOT 0 and MAX-.SLOT.KILL=SLOT 15, this checking step will return a YES value and the following checking step will be executed to determine whether the bit number in the BACKGROUND bitmap corresponding to NXT.SLOT.KILL has a value 1. At this point NXT.SLOT.KILL has a value of 0 and, as shown above, bit number 0 in the BACKGROUND bitmap has a value 0, so this checking step will return a NO value. Consequently, execution of the loop will proceed along Loop Path 1 which has three branch paths 1A, 1B, and 1C.

The program loop will thus branch to the first checking step in Loop Path 1 to determine whether the bit number in the ACTIVE bitmap corresponding to the value of NXT.SLOT.KILL has a value 1. At this time NXT.SLOT.KILL is SLOT 0 and bit number 0 in the ACTIVE bitmap has a value 1. Thus this checking step will return a YES value and the program loop will continue by executing a next checking step to determine whether PARAM.2 includes a KILL.FRGD attribute. Since the HALT routine set PARAM.2 to have a KILL.FRGD attribute, this checking step will return a YES value, and the program loop will continue along Path 1A by running the SLOT.KILL routine with parameter NXT.SLOT.KILL having its current value of SLOT 0.

(3) The SLOT.KILL Routine (FIG. 40)

Referring to FIG. 40 the SLOT.KILL routine begins with the checking step to determine whether the value of PARAM.1 is equal to the value of the data element SLOT.NO in the Scheduler Data Structure of FIG. 12A. This checking step is used to determine whether the APM being killed is the current APM being executed or some other active APM in the APM array of FIG. 12D. This step is necessary, to determine whether the memory allocated to the stack for the APM being killed should be freed up now, and whether the WAIT/HALT flag should be set to cause the current APM to stop execution after the current command. In some cases, such as during execution of a DONE command or a STOP_JOB command, this is a necessary step.

For present purposes, assume that the HALT command being executed was in the main APM in SLOT.NO 0 so this checking step returns a YES value because SLOT.NO has value SLOT 0 and PARAM.1 has value SLOT 0. Accordingly, the WAIT/HALT data element is set to a value HALT and the SLOT.-KILL routine continues by executing three sequential steps which together clear (set to value 0) each of the bits in the ACTIVE bitmap, REALTIME bitmap and BACKGROUND bitmap at the bit number corresponding to the value of NXT.SLOT.KILL or in this case, at this time, bit number 0 since NXT.SLOT.KILL is currently SLOT.NO. 0.

(4) The STOPAPM Routine Continued (FIG. 39)

Returning now to further execution of the STOPAPM routine, the next step is to increment the value of NXT.SLOT.KILL by the value 1 so that NXT.SLOT.KILL now has value SLOT 1. Following this, execution continues by looping back to the step of checking whether NXT.SLOT.KILL has a value less than or equal to MAX.SLOT.KILL. Since NXT.SLOT.KILL now has a value SLOT 1 and MAX.SLOT.KILL has a value SLOT 15, this checking step will again return a YES value, and the steps of the loop described above will execute again but along a different path, Path 1B.

The step of checking the value of bit number 1 in the BACKGROUND bitmap will return a NO value, but the following checking step regarding the value of bit number 1 in the ACTIVE bitmap will return a NO value under the assumed conditions shown in the bitmaps above. Thus execution of the loop will be along Path 1 which bypasses the step of running the SLOT.-KILL routine because there is no active APM in SLOT.NO 1 and there is no need to run the SLOT.-

KILL routine to clear the bit values in SLOT.NO 1 which are already at value 0. Accordingly, the next step executed is the step to increment NXT.SLOT.KILL from a value 1 to a value 2 and then to loop back again.

Now, it can be seen that Loop Path 1 will execute a total of fifteen times and, on the sixteenth pass through the loop, execution will switch to Loop Path 2 because bit number 15 in the BACKGROUND bitmap has a value 1 and the checking step for the value of the bit number in the BACKGROUND bitmap will return a YES value. Looking at the ACTIVE bitmap example shown above, it is seen that the bit numbers 0, 2, 3, 6, 7, and 11 have a value 1. Accordingly, Path 1A will be executed on the first, third, fourth, seventh, eighth, and twelfth times that Loop Path 1 is executed and Path 1B will be executed on all the other passes of the fifteen passes along Loop Path 1. At the end of the fifth pass, the bit values 1 at bit numbers 0, 2, 3, 6, 7, and 11 will have all been cleared to value 0 by execution of the SLOT.KILL routine and the bitmap pattern will be as follows:

| Bit Number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| ACTIVE | 1 | 0 | 0 | 0 | 0 | 0 | 0 | 0 | 0 | 0 | 0 | 0 | 0 | 0 | 0 | 0 |
| BACKGROUND | 1 | 0 | 0 | 0 | 0 | 0 | 0 | 0 | 0 | 0 | 0 | 0 | 0 | 0 | 0 | 0 |

It should be noted that Path 1C is never executed during execution of the HALT routine because PARAM.2 was set to include KILL.FRGD and the checking step regarding PARAM.2 will always return a YES value to set Path 1A instead of Path 1C.

As noted above, the sixteenth pass through the loop will now be executed along Loop Path 2 because the value of NXT.SLOT.KILL is now 15 and bit 15 in the BACKGROUND bitmap has a value 1. The first step in Loop Path 2 is a checking step to determine whether PARAM.2 includes the KILL.BKGD attribute. Since the HALT command operation routine shown in FIG. 38 only set PARAM.2 with attributes KILL.FRGD and ABORT, this checking step will return a NO value and execution will contine along Path 2A. Path 2A bypasses the running of SLOT.KILL and continues with incrementing NXT.SLOT.KILL to a value 16.

Remembering that the HALT command is defined such that only APMs with foreground attribute are to be killed, the Path 2B is never executed during execution of the HALT command. Path 2A is executed only once because, in the example given above, there is only one active APM with background attribute. If there were others, Path 2A would have executed each time NXT.SLOT.KILL had a value corresponding to a background APM, i.e. an active APM with value 1 in the associated bit number of the BACKGROUND bitmap.

After NXT.SLOT.KILL is incremented to value 16, the STOPAPM routine again loops back to the checking step to determine whether the value of NXT.SLOT.KILL is less than or equal to MAX.SLOT.KILL. This time the checking step returns a NO value and the STOPAPM routine exits the slot killing loop and proceeds to a checking step to determine whether FST.SLOT.KILL has a value SLOT 0. During execution of the HALT command, this checking step will always return a YES value. Thus execution will continue with the steps of clearing INPUT.BUF of any input which was read during the Read Input Routine of FIG. 30, and setting NEXT.STATE to the value of GO.TO.STATE which was set during the last running of the ACTION START APM routine shown in FIG. 31 and described above.

Next a checking step is executed to determine whether the value of PARAM.2 includes the ABORT attribute. Since the HALT routine sets PARAM.2 to have the ABORT attribute, this checking step will return a YES value, and the ABORT.STATE.TABLE.ACTIONS subroutine will be executed to cancel everything else and return the local terminal to the READY state under the control of the scheduler routine of FIG. 29.

(5) The ABORT.STATE.TABLE.ACTIONS Subroutine (FIG. 49)

The ABORT.STATE.TABLE.ACTIONS subroutine (also called the ABORT subroutine) shown in FIG. 49 first sets CUR.STATE to the READY state and follows this by setting all of the transaction variables in the predefined variables to 0. Next the INPUT.TIMEOUT register is set to 0.5 seconds so this value will be used in the next execution of the Read Input routine from the MAIN SCHEDULER routine as described above.

Then all input devices of the local terminal are cleared via calls to the operating system which are listed in Table XXXXI. Following this operating system calls are made to hang up the phone, turn off the modem, and turn off the speaker in the local terminal. Finally, operating system calls are made to re-enable all input devices except the modem and this completes the execution of this subroutine.

Figure 53:
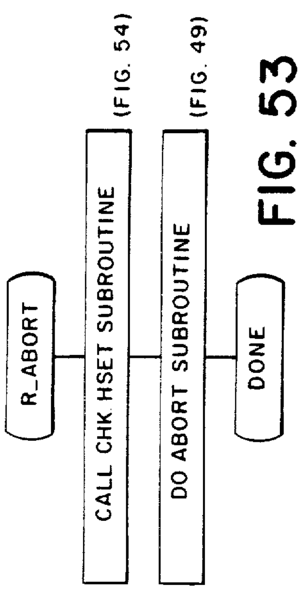
Figure 54:
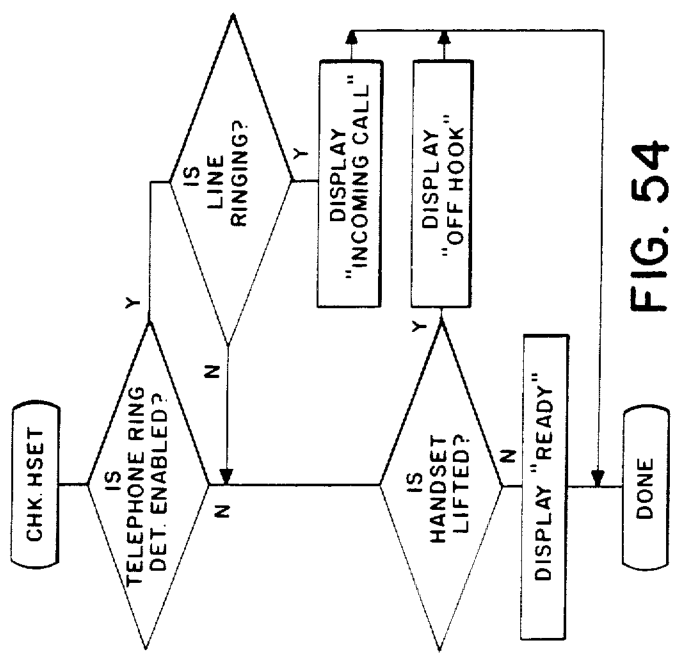

(6) The R_ABORT Action and Associated Subroutines (FIGS. 53, 49, and 54)

The R-ABORT action is a ROM-resident routine which is charted in FIG. 53 and basically contains steps to call the CHK.HSET subroutine and the ABORT.-STATE.TABLE.ACTIONS subroutine in sequence. The latter of these is discussed above. The CHK.HSET subroutine is shown in FIG. 54 and starts with a checking step to determine if the telephone ring detect is enabled. If this checking step returns a YES value, execution continues with a checking step to determine if the telephone line is ringing. If this checking step returns a YES value, there is an incomming call detected and the routine will cause a message display on the local terminal and then exit.

If either of the first two checking steps of the routine return a NO value, execution will continue with a checking step to determine if the handset of the local terminal is lifted. If this returns a YES value, an appropriate message is displayed and the routine exits. If a NO value is returned, the READY message is displayed and the routine exits. Thereafter, the ABORT subroutine executes and cancels all activity of the local terminal.

Figure 41:
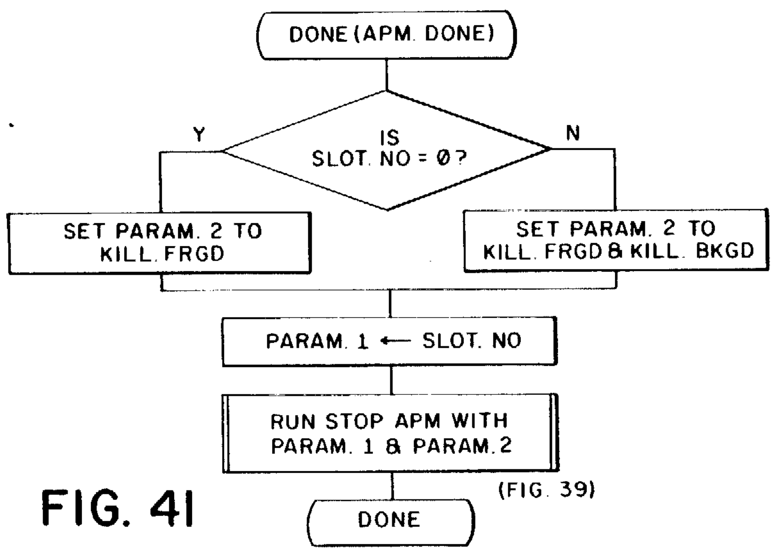

(7) The DONE Command and Associated Operation Routine (FIG. 41)

The DONE command is included at the end of each APM to kill that APM and free up the associated SLOT.NO in the APM array of FIG. 12D. In the version of this invention implemented in the ZON terminal, execution of the DONE command in an APM running in SLOT.NO 0 also causes the termination of all other APMs which are active but do not have background attribute. The steps of the operation routine associated with the DONE command are shown in FIG. 41. The DONE command and associated routine should not be confused with the "DONE" symbol used at the end of most of the operation routines and other routines which are illustrated in the drawing figures. The "DONE" symbol at the end of routines simply means that that routine is completed its execution and further execution returns to the point that that routine started from. The DONE command is a defined command which must be present as the last command in each APM which does not automatically jump or branch to another APM.

Referring to FIG. 41, it is seen that the first step of the DONE routine is a checking step to determine whether the value of the data element SLOT.NO in the Scheduler Data Structure of FIG. 12A is 0. This checking step will return a YES value if the APM in which the DONE command is being executed is located in SLOT.NO 0 or a NO value if the DONE command is in an APM in some other SLOT.NO. The purpose of this checking step is to cause the appropriate setting of PARAM.2 for appropriate execution of the STOPAPM routine called from the DONE routine. If the APM is in slot 0, PARAM.2 is set to have only the KILL.FRGD attribute. If the APM is in some other SLOT.NO, PARAM.2 is set to have both the KILL.FRGD and KILL.BKGD attributes.

The reason for setting PARAM.2 to KILL.FRGD only if the APM is in SLOT.NO 0 is that this version of the method of the invention being described is structured such that all active APM having foreground attributes will be killed when a DONE command is executed in the APM running in SLOT.NO 0. If the DONE command is in an APM in some other SLOT.NO, then only the application program module in the current SLOT.NO will be killed, but that APM may have either foreground or background attributes. Thus both KILL.FRGD and KILL.BKGD attributes must be set into PARAM.2 when SLOT.NO is not SLOT 0.

(8) The STOPAPM Routine as Executed from the DONE Routine (FIGS. 39 and 41)

Assume first that SLOT.NO is equal to 0 and PARAM.2 is set to KILL.FRGD. The next step is to set PARAM.1 to the value of SLOT.NO which is SLOT 0 in this case. Then STOPAPM is run with the values of PARAM.1 and PARAM.2. Referring back to the HALT routine shown in FIG. 38, it is seen that the STOPAPM routine is executed there with PARAM.1 set to SLOT 0 and PARAM.2 set to KILL.FRGD and ABORT. Thus it should be apparent that the running of the STOPAPM routine from the DONE routine with these parameter values is the same as the execution of the STOPAPM routine from the HALT routine until the execution reaches the checking step to determine if PARAM.2 includes the ABORT attribute. Thus all APMs which are active and have foreground attribute will be killed from the array of active APMs, but all background APMs will be left in the array to continue to execute. The ABORT routine will be skipped and execution will return to the scheduler routine with the state of the terminal determined by the GO.TO.STATE which was specified in the state table when the main APM was set up during the running of the STATE.TABLE.LOOKUP routine. This will cause any input read and not used by some APM running in the background to fall through to the STATE.TABLE.LOOKUP routine and cause an action to occur based on the value of the input and the content of the state table specified in the GO.TO.STATE data register.

Assume now a second condition in which the DONE command is executed in an APM running in a SLOT.NO other than SLOT 0. In this case PARAM.2 is set to KILL.FRGD and KILL.BKGD and PARAM.1 is set to the SLOT.NO of the APM. For this example, assume it is SLOT.NO 2 and that we are using the initial bitmap status shown above in connection with execution of the HALT command. With PARAM.1 set to a value other than SLOT 0, the execution of the STOPAPM routine will be quite different than that described above and only one APM, namely the one in which the DONE command is executed, will be killed from its associated SLOT.NO in the APM array.

Referring to FIG. 39, the first step of the STOPAPM routine will set FST.SLOT.KILL to the value of PARAM.1 which is SLOT.NO 2, under the conditions now assumed. The following checking step will return a NO value because FST.SLOT.KILL is not equal to SLOT 0. Consequently, MAX.SLOT.KILL will be set to FST.SLOT.KILL and NXT.SLOT.KILL will be set to FST.SLOT.KILL. Following this the checking step for MAX.SLOT.KILL less than or equal to MAX.SLOT.KILL will return a YES value since NXT.SLOT.KILL is equal to MAX.SLOT.KILL at this time.

The following checking step for the value of the bit in the BACKGROUND bitmap will return a NO value and Path 1A will be executed since the value of the corresponding bit in the ACTIVE bitmap is 1. The SLOT.KILL routine will be run to kill the application program module in SLOT.NO 2 and then NXT.SLOT.KILL will be incremented to the value SLOT.NO 3.

The routine loops back to the initial checking step in the loop which will now return a NO value because NXT.SLOT.KILL has a value SLOT.NO 3 which is greater than the value of MAX.SLOT.KILL which is SLOT.NO 2. The routine will thus exit the loop and the next two checking steps will return NO values and thus bypass the steps which are executed when SLOT.NO 0 is killed and when abort is executed.

If the DONE command is executed in a APM with background attribute, Path 2B through the loop of the STOPAPM routine will be executed one time. To follow this through, assume that the DONE command is being executed in the APM running in SLOT.NO 15 with a background attribute as shown in the bitmap example given above. The checking step in the DONE routine will result in PARAM.2 being set to KILL.FRGD and KILL.BKGD, and following that PARAM.1 will be set to SLOT.NO 15 and the STOPAPM routine will be run with those parameter values.

The STOPAPM routine will set FST.SLOT.KILL to SLOT.NO 15, followed by the checking step for the value of FST.SLOT.KILL which will return a NO value since FST.SLOT.KILL is not equal to SLOT 0. Thus both MAX.SLOT.KILL and NXT.SLOT.KILL will be set to SLOT.NO 15. The following checking step in the slot killing loop will return a YES value since NXT.SLOT.KILL is equal to MAX.SLOT.KILL at this time. The next checking step will also return a YES value since the associated bit value in the BACKGROUND bitmap has a value 1.

The execution will proceed to the checking step of determining whether the value of PARAM.2 includes a KILL.BKGD attribute. This time it does because PARAM.2 was set to include both KILL.FRGD and KILL.BKDG. Thus this checking step will return a YES value, and the SLOT.KILL routine will be run to kill the application program module running in SLOT.NO 15.

Next NXT.SLOT.KILL will be incremented to 16, and the checking step at the beginning of the loop will return a NO value since NXT.SLOT.KILL is 16 and MAX.SLOT.KILL is 15. The STOPAPM routine will exit the slot killing loop, having killed only the background APM in SLOT.NO 15, and the following two checking steps will both return NO values as discussed above in connection with executing the DONE command in connection with an APM with foreground attribute.

Figure 42:
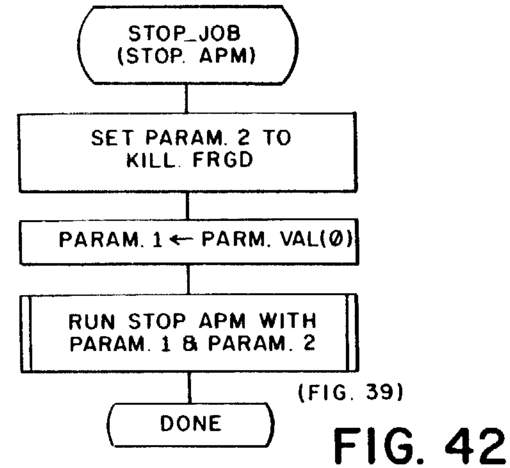

(9) Executing the STOP_JOB Command and Associated Operation Routine (FIG. 42)

As shown in Table I, the STOP_JOB command (also known here as the STOP.APM command, not to be confused with the STOPAPM routine which is called for execution from several of the defined commands) is associated with the task of stopping a single specified APM which has the foreground attribute. Thus the command has a single parameter of type X associated with it and that parameter is the job id which is to be stopped.

Referring back to FIG. 14, the command parsing module which is called for execution will be an X type command parsing module which will contain a single step of calling the parsing control routine for parameter X as shown in FIG. 16. In turn parsing control routine X will call one of the four data type parsing routines depending on the value of the data type element stored in VPARM 0 in the VPARM array of FIG. 13A. This will result in the job id parameter being stored in the VAL component of PARM 0 in the PARM ARRAY of FIG. 13B.

After the data type parsing routine is executed, the operation routine shown in FIG. 42 will be executed. The first step is to set PARAM.2 to KILL.FRGD, followed by the step of setting PARAM.1 to the value stored in the VAL component of PARM 0. Then the STOPAPM routine is run with those parameter values. If the job id parameter specified in the command is the APM SLOT.NO 0, then the STOPAPM routine will execute in exactly the same manner as is described above for the DONE command when executed in an APM running in SLOT.NO 0. All active APMs not having a background attribute will be killed along with the APM in SLOT.NO 0.

On the other hand, if the job id parameter is specified to be some APM SLOT.NO other than SLOT.NO 0, the STOPAPM routine will execute in exactly the same manner as described above for execution of the DONE command in an APM running in a SLOT.NO other than SLOT.NO 0 and having a foreground attribute. Only the APM in the specified SLOT.NO associated with the job id parameter will be killed.

Figure 43:
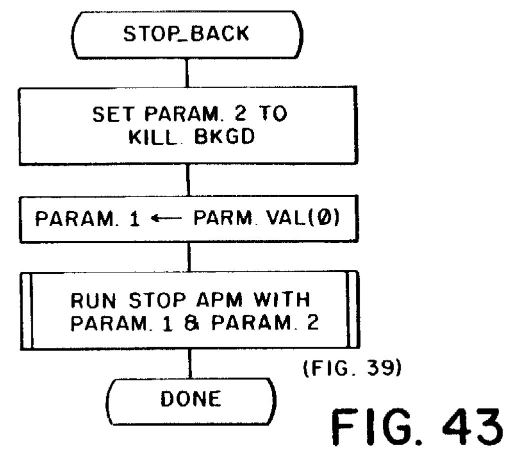

(10) The STOP_BACK Command and Associated Operation Routine (FIG. 43)

The STOP_BACK command is identical to the STOP_JOB command except that it is intended to accomplish the task of killing a single background APM. Usually the APM in SLOT.NO 0 will not be a background APM, but if it were the STOPAPM routine would be executed so as to kill all APM having a background attribute and leave all APM in foreground attribute untouched. The kill APM loop in the STOPAPM routine would execute sixteen times, each time going along Path 1B or 1C for NXT.SLOT.KILL values corresponding to SLOT.NOs which are inactive or have active APMs which are in foreground attribute or going along Path 2B to for NXT.SLOT.KILL values corresponding to SLOT.NOs which have active APMs with background attribute.

If the job id specified is not associated with SLOT.NO 0, the STOP_JOB routine will execute in exactly the same manner as a DONE routine executed for an APM running in background. Only the APM in the specified SLOT.NO stored in PARM.VAL(0) after the parsing routine is executed will be killed. Any and all other APMs running in background and all APMs running in foreground will be unaffected.

k. Commands and Associated Operation Routines that Suspend Execution of APMs

As previously mentioned, it is inherent in the concurrent scheduler feature of this invention that there are commands and associated operation routines defined that suspend the execution of the current APM being executed by the scheduler so that other APMs in other SLOT.NOs may be brought in for execution. Some of the commands defined for this purpose in the command set of Table I are the WAITFOR_JOB and WAIT_JUMP commands.

The WAIT_JUMP command is often used following the NEED_INPUT and CHK_INSRCE commands in an APM. The NEED_INPUT command specifies the input that is needed by the APM, the CHK_INSRCE command then checks to see if any of the inputs needed is already present and available and branches to a specified address if needed input is present. If needed input is not present, the WAIT_JUMP command is executed to suspend the execution of the current APM and to set the CKH_INSRCE command as the next command to execute when the realtime scheduler next calls up this APM for execution. These commands and associated general purpose operation routines will now be discussed in more detail.

Figure 44:
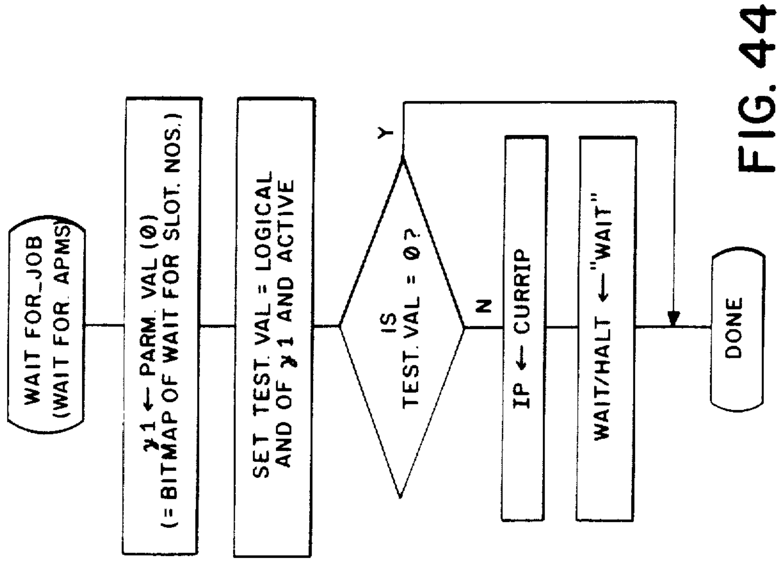

(1) The WAITFOR_JOB Command and Associated Operation Routine (FIG. 44)

As shown in Table I, the WAITFOR_JOB command is defined to accomplish the task of suspending execution of the current APM unless and until the APMs in other specified SLOT.NOs have completed their execution. The SLOT.NOs of the APMs to be waited for are specified in the single Y-type parameter associated with the command. This parameter in its object code form is a two-byte bitmap having bit values of 1 in the bit locations corresponding to the SLOT.NOs of the APMs to be waited for.

Execution of the general purpose operation routine for this WAITFOR_JOB command includes first executing a command parsing module of the Y-type. This command parsing module will, in turn, call for execution a parsing control routine for the Y-type of parameter. The parsing control routine will call one of the data type parsing routines for data types IC, VI, EI, or SI, since those are the data types by which a parameter of this type may be satisfied as shown in Table III. The parsed parameter will end up being stored in PARM.VAL(0) in the PARM Array of FIG. 13B.

FIG. 44 illustrates the steps which are executed by the operation routine associated with the WAITFOR_JOB command. First the data register y1 is set to the value of PARM.VAL(0) which is the bitmap of the SLOT.NOs to be waited for. Then the values of y1 and the ACTIVE bitmap are ANDed together (a binary logic function) and a TEST.VAL Data register is set to the result of that operation. The logical AND function is such that if all of the bit values of y1 and the ACTIVE bitmap in each relative bit location are either different or both of 0 value, the result will have a zero value. If any one of the bit locations has a value 1 in both y1 and the ACTIVE bitmap, the value of the result will not be 0. Some examples will illustrate this:

| | bit location = APM SLOT.NO | | | | | | | | | | | | | | | |
|---|---|---|---|---|---|---|---|---|---|---|---|---|---|---|---|---|
| bitmap | 15 | 14 | 13 | 12 | 11 | 10 | 9 | 8 | 7 | 6 | 5 | 4 | 3 | 2 | 1 | 0 |
| y1 | 0 | 0 | 1 | 0 | 1 | 0 | 0 | 0 | 0 | 0 | 1 | 1 | 0 | 0 | 0 | 0 |
| ACTIVE | 1 | 0 | 0 | 0 | 0 | 0 | 1 | 0 | 0 | 1 | 0 | 0 | 1 | 0 | 1 | 1 |
| TEST.VAL | 0 | 0 | 0 | 0 | 0 | 0 | 0 | 0 | 0 | 0 | 0 | 0 | 0 | 0 | 0 | 0 |
| y1 | 0 | 0 | 1 | 0 | 1 | 0 | 0 | 0 | 0 | 0 | 1 | 1 | 0 | 0 | 0 | 0 |
| ACTIVE | 1 | 0 | 0 | 0 | 1 | 0 | 0 | 0 | 0 | 0 | 1 | 0 | 1 | 0 | 1 | 1 |
| TEST.VAL | 0 | 0 | 0 | 0 | 1 | 0 | 0 | 0 | 0 | 0 | 1 | 0 | 0 | 0 | 0 | 0 |

In the first case above, the WAITFOR_JOB command has specified that execution should be suspended if any of the APMs in SLOT.NOs 4, 5, 11, or 13 are still active, i.e. have not completed their execution. The ACTIVE bitmap shows that all of these SLOT.NOs have a bit value of 0. The result of the ANDing operation or y1 and the ACTIVE bitmap is a TEST.VAL of value 0 since none of the bits have a value other than 0; this indicates that the APM currently executing may now continue. In the second case, SLOT.NOs 5 and 11 in the ACTIVE bitmap have a value 1, so TEST.VAL has a non-zero value, indicating that the APM currently executing should be suspended.

The next step of the WAITFOR_JOB operation routine is to perform a checking step to determine if TEST.VAL has a value 0. If it does not, IP in the Command Data Structure of FIG. 12B is set to CURRIP in the Current APM Data Structure of FIG. 12C so that this same command will be executed the next time this APM is called up for execution by the scheduler routine. Referring back to FIG. 14, it will be remembered that the last step of the routine to execute an APM command involves setting CURRIP to IP. Thus prior to the execution of the WAITFOR_JOB command, CURRIP has a value which is the address of the WAITFOR_JOB command in the APM being executed and has the same value as IP. During execution of the WAITFOR_JOB command, the value of IP is incremented as the bitmap/opcode decoding step and the parameter parsing routines, if any, are performed. By setting IP back to CURRIP in the WAITFOR_JOB operation routine, this prevents the APM execution routine from advancing to a new instruction with a changed value of CURRIP when it performs the step of setting CURRIP to IP. Thus the WAITFOR_JOB command will be re-executed the next time this APM is called up by the scheduler routine.

After setting IP to CURRIP, the WAIT/HALT data element is set to the value "WAIT" so that the CHECK/EXECUTE routine of FIG. 34 will suspend execution of this APM and return control to the scheduler routine after the execution of the WAITFOR_JOB command.

If the value of TEST.VAL is not 0, then the two setting steps described above will be bypassed, the IP will be left pointing to the next command, and the CHECK/EXECUTE routine will proceed to execute the next command in the current APM as previously described with respect to FIG. 34.

(2) The NEED_INPUT, CHK_INSRCE and WAIT_JUMP Command Sequence

Figure 46:
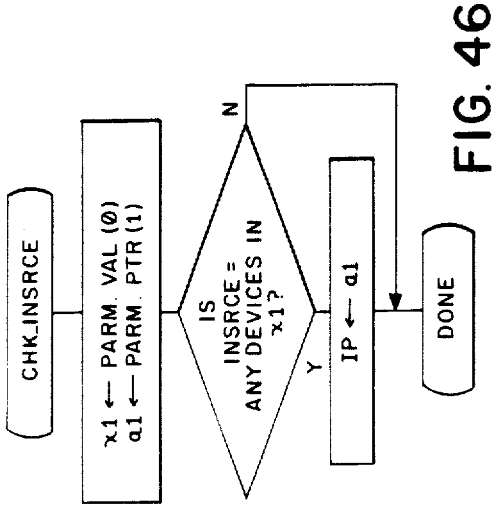
Figure 47:
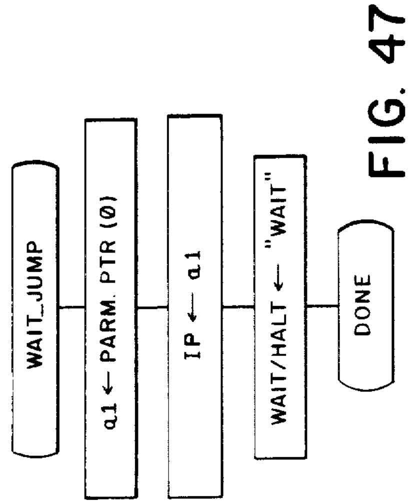
Figure 45:
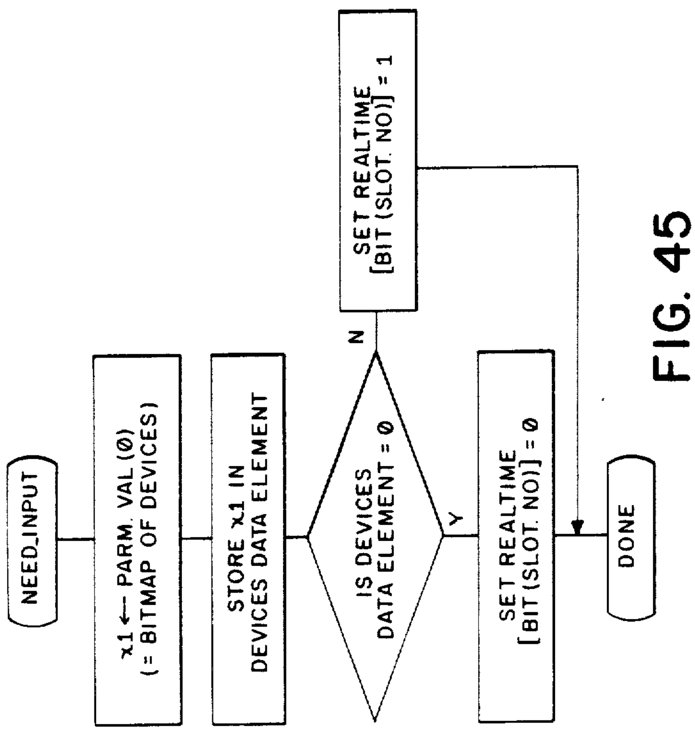

The operation routines associated with the NEED_INPUT, CHK_INSRCE, and WAIT_JUMP commands are illustrated in FIGS. 45–47. Since the execution of associated command parsing modules should now be well understood, this aspect of the execution of the general purpose operation routines associated with these commands will not be discussed here.

(a) The NEED_INPUT Command and Associated Operation Routine (FIG. 45)

As described in Table I, the NEED_INPUT command has one associated parameter which is a bitmap of the devices from which input is needed for further execution of the associated APM. The associated operation routine begins by setting the x1 data register to the value stored in VAL(PARM 0), which is the desired bitmap of devices, and then proceeds to store x1 in the DEVICES data element of the Current APM Data Structure of FIG. 12C.

The following step checks to determine whether the value stored in DEVICES is 0. DEVICES will be 0 if the NEED_INPUT command was issued using a zero value parameter, indicating that the job needs no inputs of any kind. If it has that value, the corresponding bit in the REALTIME bitmap of the Scheduler Data Structure of FIG. 12A will be set to a 0 value to keep the APM in a non-REALTIME attribute; this might be used to cancel the effects of a previous NEED_INPUT command. If the DEVICES byte does not contain a zero value, the corresponding bit in the REALTIME bitmap will be set to a 1 value, to indicate the APM has the REALTIME attribute and may need some inputs. Referring back to the scheduler routine shown in FIG. 29, it will be remembered that that the REALTIME bitmap determines which jobs will be examined for execution by the REALTIME SCHEDULER routine when input is present. This completes the execution of the operation routine associated with the NEED_INPUT command and execution returns to the CHECK/EXECUTE routine to execute the next command.

(b) The CKH_INSRCE Command and Associated Operation Routine (FIG. 46)

As described in Table I, the CHK_INSRCE command has two associated parameters: an X type parameter as an input bitmap for specifying which devices are to be compared to the source of any current input, and an A type parameter as an address for specifying the address to branch to if input is available from one of the specified sources. The XA type of command parsing module which is associated with execution of this command has been described above.

The operation routine associated with the CHK_INSRCE command is illustrated in FIG. 46. The first step is to set the values of the data registers x1 and a1 to the contents of the parsed parameters stored in the PARM array. Next a checking step is performed to determine if the value of INSRCE corresponds to any of the bit positions which contain a bit 1 in the bitmap stored in x1. If this checking step returns a YES value, IP is set to the address stored in a1, and the routine is done executing. If the checking step returns a NO value, then the step of setting Ip is bypassed and the routine is done. Execution passes back to the CHECK-/EXECUTE routine to execute the next command at the address value in IP.

(c) The WAIT_JUMP Command and Associated Operation Routine (FIG. 47)

Referring to Table I, the WAIT_JUMP command has the limited function of suspending the operation of the current APM and causing the next execution of that APM to resume at the command identified in the single parameter of X type which is the address of the command to branch to.

The steps of the operation routine associated with this command are illustrated in FIG. 46. The data register a1 is set to the value of the parameter stored in the PARM array. IP is then set to the value of a1, and this is followed by setting the WAIT/HALT data element in the Scheduler Data Structure to the value "WAIT" to complete the execution of this routine.

Referring back to the command execution routine of FIG. 14, it will be seen that the step of this operation routine of setting IP to the address stored in a1 will result in CURRIP in the Current APM Data Structure of FIG. 12C being set to the address stored in a1 as the last step of that command execution routine. Then referring to the CHECK/EXECUTE routine of FIG. 34, it is seen that the checking step for the value of the WAIT/HALT data element will return a NO value since WAIT/HALT data element has been set to "WAIT", so that the CHECK/EXECUTE routine will not loop back to execute another command. Instead the following step of suspending the current APM and transferring the contents of the Current APM Data Structure back to the appropriate SLOT.NO in the APM Array of FIG. 12D will be executed and control of execution will return to the scheduler routine.

1. Execution of other APM Commands which Manipulate Bitmaps in the Scheduler Data Structure Described above are some of the commands whose execution causes manipulation of the values of bits in the various bitmaps of the Scheduler Data Structure. Reference is made to the listing of commands in Table I for other commands which manipulate the values of bit locations in these bitmaps. For example, the TAKE_INPUT, RCV_PACKET, DO_STORE, and DO_DATA ENTRY are all commands which manipulate the value of the bit in the REALTIME bitmap corresponding to the SLOT.NO of the APM in which the command is executed.

3. Example of an APM which Utilizes Concurrent Execution of Subsidiary APMs

An example of an APM which utilizes concurrent execution of subsidiary APMs is given in Table XXXX. The example is taken from the generic application program set forth in Table XXX and shows how the main APM calls into execution two other APMs or jobs. A typical sequence of the command execution in each of the APMs is given.

4. Alternative Versions of Scheduler Methodology

It should be apparent to persons of skill in the art of designing real time computer program systems that there are many variations which could be introduced in the scheduler method of this invention within the general concept of concurrent scheduling for APMs to execute in parallel with each other. For example, one trivial variation would be to eliminate the background attribute and have all APMs execute only in foreground. Another variation would be to eliminate the REALTIME attribute and the associated REALTIME SCHEDULER routine, and have all APMs called for execution by the ACTIVE SCHEDULER routine.

Another simple variation would be to change the Read Input routine such that the STATE.TABLE.-LOOKUP routine is by-passed if no input was read by that routine instead of having a default input declared when no actual input is received. In some versions of the invention it might be desirable to eliminate the use of ROM-resident routines invoked by received input that is not used by some APM running in REALTIME and have all tasks for the local terminal defined by APMs.

Some similar variations in the scheduler method have been previously discussed, in discussing possible alternative implementations of the CHECK/EXECUTE routine.

OTHER PROGRAM COMPONENTS RESIDENT IN THE LOCAL TERMINAL

Figure 48:
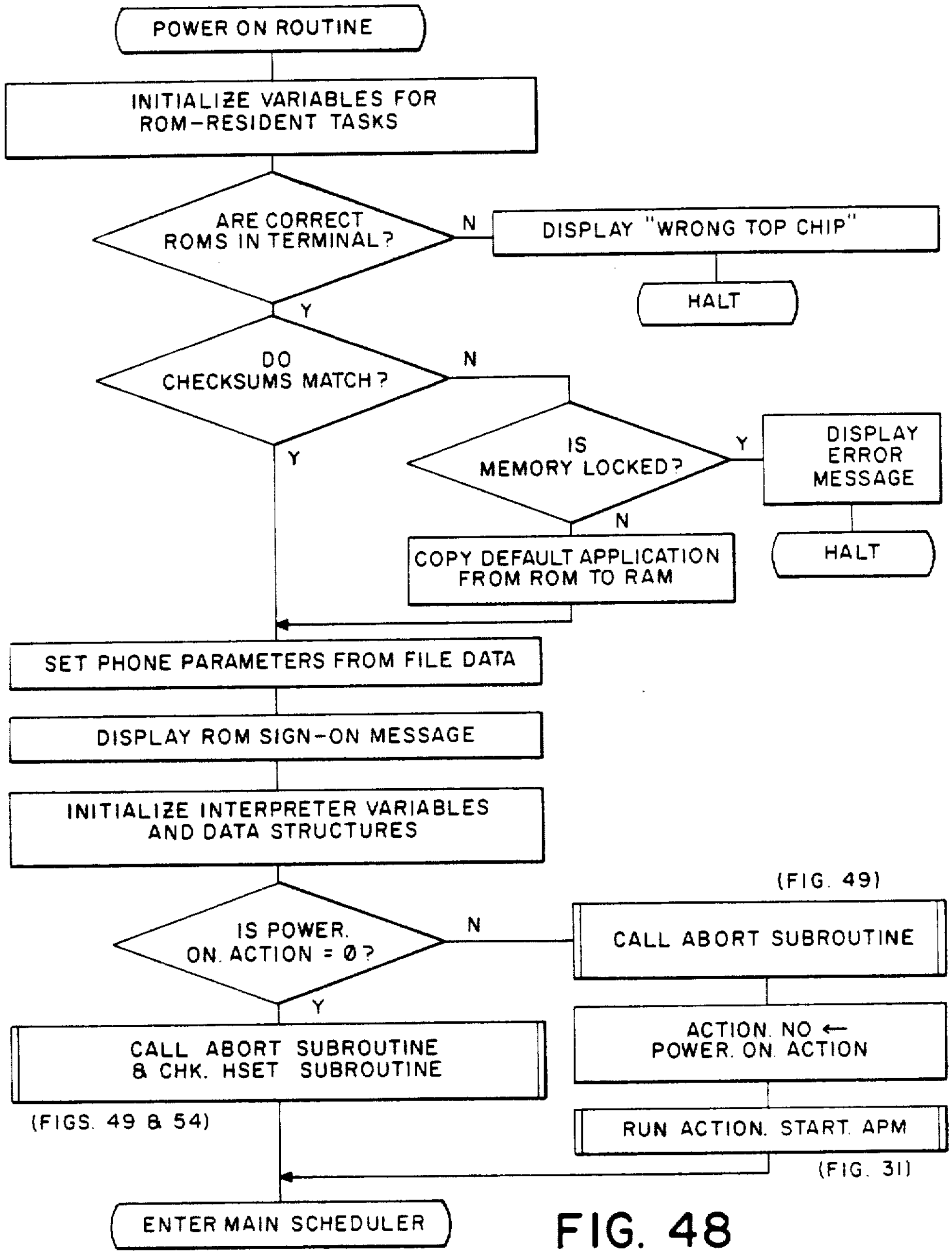

1. The Power-On Routine (FIG. 48)

The local terminal will typically include a power-on routine which is executed when the terminal is turned on, before execution transfers to the scheduler. As an example, the ZON terminal includes the power-on routine shown in FIG. 48. The first step of this routine is to initialize variables for ROM-resident tasks or routines. This is followed by a checking step to determine whether the correct ROMs are in the terminal. If this checking step returns a NO value, the message "wrong top chip" is displayed on the local terminal and the program halts. If the checking step returns a YES value, the following checking step is executed to determine if the checksums on the application program stored in random access memory match the stored values. This step determines the integrity of the application program stored in the random access memory. If the checking step returns a NO value, execution proceeds to another checking step to determine if the memory is in locked state. If this check-ing step returns a YES value, an error message is displayed and the program is halted. If a NO value is returned, the default application program stored in the read only memory is copied over to the random access memory so that there will be a program to execute in the local terminal such as for the purpose of requesting a fresh download of the application program which is intended to be run in the local terminal.

If the checking step regarding the checksums returns a YES value, the routine continues with execution of a step to set the telephone and dialing parameters from file data in the memory of the local terminal. This is followed by a display of a ROM sign-on message and then a step to initialize interpreter variables and data structures. This step includes clearing all of the data structures shown in FIG. 12, freeing all of the APM stack elements, and initializing default file variables from values stored in the ROM. Next a checking step is executed to determine if there is a power-up APM to run.

If this returns a NO value, execution proceeds to display the phone status on the terminal and to select the default state of the terminal (i.e. the "READY" state, for the ZON terminal) before entering the Main Scheduler routine shown in FIG. 29. This is done by a routine which performs the equivalent of the predefined R_ABORT action routine, by calling the CHK.HSET routine illustrated in FIG. 55 to display the terminal status and then the ABORT routine illustrated in FIG. 49 to set the terminal into the predetermined READY state.

If the checking step for a power-up APM returns a YES value, the execution proceeds to select the default state by calling the same ABORT routine in FIG. 49, and then to set up the power-up APM to start in scheduler SLOT.NO 0 before entering the main scheduler routine. The power-up APM is not actually started into execution until the scheduler calls it for execution. The routine for this set up step simply involves setting the ACTION.NO to the value stored in the downloaded area for the power-up APM, and then calling the ACTION.START.APM routine shown in FIG. 31.

It should be appreciated that the power-up routine that is utilized may vary substantially depending on the type of application which the local terminal is dedicated to. Variations in the routine might include, for example, automatically dialing up for a new download if the application program present in the terminal becomes defective.

The provision for a power-up APM is not necessary and this might be eliminated in some applications if desired.

2. The Executive Error Routine (FIG. 50)

Throughout a number of the routines shown in the drawings and described above, various checking steps were performed that led to declaring an error under certain conditions. FIG. 50 illustrates an error routine as an example of the type of routine that is preferably included in the local terminal to handle any errors that may occur and to return the local terminal to a predetermined state and condition after an error. Before discussing the routine some of the general aspects of error trapping as used in the ZON terminal will be described.

An error which is trapped by the interpreter is called an executive error, or "Exec Error", and will result in immediately aborting all jobs (foreground and background), terminating any communications in progress, reinitializing the interpreter, and returning to the READY state of the terminal. In general, the interpreter will raise an Exec Error when it detects some condition which makes it impossible to continue executing an APM, or causes the results of the APM command currently executing to be totally unreliable.

When an Exec Error takes place, a four-line message (which can be scrolled to show the full contents) will be created and displayed. This message takes the following form:

| ZAPD EXEC ERROR |
|---|
| xxxxxxxxxxxxxxxx |
| hhhh=IP ooo=OP |
| pppp = PREV IP |

where:

- xxxxxxxxxxxxxxxx is one of the descriptive error messages shown in TABLE VIII,
- hhhh is the hexadecimal value the instruction pointer had at the beginning of the command which caused the error,
- ooo is the hexadecimal value of the opcode group and opcode for the command which caused the error, and
- pppp is the hexadecimal value of the instruction pointer for the PREVIOUS executed instruction (i.e. the last instruction successfully executed by the interpreter.)

This information, when used with a listing of the opcode values and a symbol table giving the addresses for the labels in the application program being executed, can be of great assistance in finding the cause of an error.

If the DEFAULT ERR file option was selected in creating the application source code, and the default err file parameter was included in the downloaded information, then the above information will be stored into the error log file selected, where it can be retrieved later for diagnostic purposes.

The first step of the Error routine in FIG. 50 is to build a message to display which may include, for example, an error descriptor together with hexadecimal versions of IP, OPCODE, OPSET, and PREVIP. This information can then be noted from the display and will give the programmer clues as to why the error occurred and what program changes might be made to eliminate the occurrence of the error in the future if a program defect is present.

Following this first step, a checking step is performed to determined if an error log file is defined. If this returns a YES value, the error descriptor is saved as record one in the error log file and the other portions of the message are stored as record two. If there is no error log file, this saving step is not performed and execution continues to the step of loading the display buffer with the message. Next all state machine actions, i.e. all APMs, are aborted and the default state is selected. Following this, all interpreter variables and data structures are re-initialized and then the WAIT/HALT data element is set to the value HALT so that the CHECK-/EXECUTE routine will halt all further program execution and return to the main scheduler routine. Since the display buffer has already been loaded with the message, the beginning of the message will then appear on the display, and if the READY state actions permit, the operator of the terminal may scroll the display through the full message.

Clearly many variations are possible on the method described here.

3. The Download Control Code

One program component which is crucial to the method of this invention is the DOWNLOAD CONTROL code. This program component stored in the local terminal executes independently of the main scheduler routine and the routines that execute the APMs in the local terminal. This is the section of code that is required in order for the terminal to successfully receive a download of the object code for the application program over the phone lines. This downloaded code involves binary data which defines an application program, including the application program modules to be executed and the definition of the environment for those programs. This program component will be discussed in more detail below in the section dealing with communicating the application program from the remote terminal to the local terminal.

The actual download program running in the local terminal during a download of an application program is given along with other program components stored in ROM in the code printout in Table XXXII. This code is readily disassembled into uncommented source code through the use of such commercially available disassembler programs such as ZSID.COM and DDT.COM programs available from Digital Research Corporation. Furthermore, the general aspects of the functions of the download program are readily understood by the persons of skill in this field from the explanation of the packet formats for up/down line loading which are given in Table XXIX and discussed below in connection with the binary download.

4. Other Miscellaneous Program Components

The local terminal also has several other program components stored in ROM to provide all of the program functions required for local terminal operation. The following is a description of these program components which are integrated with the programs which incorporate the methodology of this invention.

a. Data Entry Routines

Another component that is important is the set of DATA ENTRY ROUTINES which are responsible for receiving formatted input from the keyboard, editing it for the correct types and then returning it to the APM being executed as a single string. This means that the APM can include a command such as the command INPUT_EDIT in TABLE I to get an edited data field and will return a string containing the edited results of the data entry, without the APM itself having to work with the data on a character by character basis. Other commands which use the facilities of the Data Entry Routines are the following: GET_EDIT, SET_EDIT, DO_DATA_ENTRY, and DO_STORE.

The actual data entry routines implemented in the ZON terminal version are in the object code version of the ROM programs in Table XXXIII. The use of these routines in source code of an application program is explained in the Tables XVIIIA and XVIIIB.

b. Control String Interpreter

The CONTROL STRING INTERPRETER is another program component which is integrated with the interpreter program for APM commands. It is used in a similar fashion to the data entry routines, but involves a higher level of sophistication. This component has been carried over from other local terminal implementations which use the fixed ROM programming.

The Control String Interpreter is a program facility for building a buffer by specifying a complete series of data entry operations, for example from the card reader or the keyboard, together with prompts for data entry, and includes facilities for inserting constant characters or data recalled from the terminal files. The data to be used is based on a performatted ASCII String containing a sequence of letters and digits which have meaning as Control String Interpreter commands. All the functions of the Control String Interpreter can be duplicated in other ways using APM commands. However, use of the Control String Interpreter is a very effective shorthand for specifying a sequence of operations to put together data entered from the keyboard with other data to build a complete buffer or packet for transmission. The Control String Interpreter can be executed from an APM using the DO_BLD_STRING command listed in TABLE I.

The control string interpreter resident in the ROM of the ZON terminal is given in object form in Table XXXIII. Explanations of how the application program uses the control string interpreter are given in Tables XXIIIA and XXIIIB.

c. The Operating System

As previously described the ROM in the local terminal preferably stores a form of commercially available multitasking, real-time operating system with buffered input and output handlers. This greatly simplifies integrating the method of this invention into the local terminal because it provides the opportunity for the main scheduler routine to handle inputs arriving at different rates from different sources conveniently.

Table XXVIII contains a summary of the changes which it has been found desirable to make to the commercially available form of the operating system, in order for it to better support the particular hardware environment of the ZON terminal which was used for the current implementation. From this listing these same changes could be implemented by persons skilled in this art. The operating system code is given in Table XXXIII. The interface between the ZAPD system implementation of the method of this invention and the AMX operating system is discussed in Table XXXXI.

d. File Manager System

Another program component is a FILE MANAGER SYSTEM, which allows definition of file partitions within the extra RAM (Random Access Memory) of the terminal. This allows the RAM that is not being used for storing variables or strings and that is not required for storage of the application program, to be allocated to different files and records. Data can be stored in those files in a compressed fashion. The file manager permits direct access by file and record number, either for reading the record, for writing a new value to replace it, or for deleting a record. Tables XVIIA and XVIIB give explanations of use of the file management function.

e. Direct Download Program

There is a DIRECT DOWNLOAD program which functions independently of the routines in the terminal which implement the method of this invention. This is a program which can be invoked or triggered from the operating system and its function is to allow two terminals connected by a RS-232 cable to exactly copy the memory contents of one into another, so that the second can be identically programmed to the first. When it can be used, this direct download program has great advantages, as it greatly speeds the time required to download a program compared to the download over the modem at 300 baud.

Using this routine the download procedure operates at 9600 baud (approximately 32 times the 300 baud speed of the modem). This can be very important in cases where one location has multiple terminals to be downloaded. One of the local terminals can be downloaded over the phone line at 300 baud and then the remaining terminals at the location can be downloaded directly at the 9600 baud rate. This program can completely copy one terminal's entire memory to the memory of another terminal in approximately 35 seconds. This direct download program component is provided in the ROM code in Table XXXIII.

f. Miscellaneous Support Routines

The final program component stored in the terminal is simply a collection of a large number of MISCELLANEOUS SUPPORT ROUTINES. These are typically general purpose utility routines for string manipulation, conversion of different types of data; sending data to different devices; performing standard calculations; and similar miscellaneous functions which the other sections of code must call upon to perform specific common tasks within the local terminal. These support routines are in the ROM code in Table XXXIII.

ESTABLISHING AN APPLICATION PROGRAM

1. The Tools Utilized in Establishing an Application Program

As previously mentioned, the method of this invention lends itself to establishing an application program which includes a plurality of Application program modules using source level versions of the APM commands which are defined, as exemplified in TABLE I. The basic steps involved are to first use a text editor to create the source code for the application program which includes a plurality of modules which are required for the program. Following this the source code is processed by a special preprocessor program and the result is then processed by a special assembler program and a state table compression program.

Following this the assembled program is processed using a standard machine code assembler program and linker program. Finally a truncating program is run to minimize the size of the download program by truncating unneeded, excess information from the assembled and linked version of the program. A download program called ZONTALK, is then used to process the downloading of the application program from the remote computer to the local terminal. The application program is then tested on the local terminal to verify satisfactory operation.

The actual compiling, assembling and linking steps are performed automatically in sequence by a submit program so that intervention to call the specific programs which are run to perform these tasks is not required.

More specifically the development tools which are used include the following:

CP/M utilities which are commercially available:

submit.com—CP/M Batch submit function.
pip.com—CP/M Copy command
m80.com—Microsoft Macro Assembler
180.com—Microsoft Linker Special Program Tools which are given in code form in Tables attached hereto (Tables XXXIV-XXXVIII):

prezapd.com—ZAPD Preprocessor
zapdasm.com—ZAPD Assembler for ZAPD Commands
zapdstat.com—ZAPD State Table Compression
filesym.com—ZAPD Program to resolve ROM symbols
trunczap.com—ZAPD Program to minimize download size.

Standard workfiles:

a000mem.mac—Skeleton memory image for binary download

Once the source code has been created, the steps required for performing the compiling into downloadable code are as follows:

Log onto the drive with the ZAPD source code.

Type submit zap <sourcename>

The <sourcename> should have the extension.-ZAP (e.g., VFI.ZAP).

No other operator intervention is required.

Two files are created by the development tools:

<sourcename>.MEM and

<sourcename>.UDL

The file with the .MEM extension is the binary file that contains information from the Environment and Application Modules.

The file with the .UDL extension is the ASCII file containing the initialized values of the information to be stored in the ZAPD file/record structure. This might be program control information such as prompts and control strings, and it might be merchant information such as telephone numbers and merchant ids.

Transfer both the .MEM and .UDL file to the computer which has the download program.

Run the Download Programs at the terminal and the remote computer.

Set forth in TABLE IX is the actual program listings for the CP/M 3.0 submit file that builds the download image files. This illustrates the steps that are performed in sequence in translating the source code to the downloadable object code. The lines which are preceeded with a ";" are comment lines, not program statements which are actually executed. The lines not starting with a ";" are the actual program statements.

a. The Preprocessor Program: PREZAPD

This program is used as a front-end preprocessor for ZAPD source statements. The program performs four functions:

It separates the ZAPD source statements into the constituent modules, it resolves symbolic references made in the source code, it generates the raw files which will be used to create the binary and ASCII download files, and it generates public labels for modules that have been labelled by the application programmer.

The input to this program consists of ZAPD application source code. The format of this source code is defined in the discussion above of creating an application program. aeThe output of this program may create intermediate files. This will depend upon the switches set in the command line.

There are three possible types of intermediate files:

Series of include files which require no further pre-processing before they can be used to build the A000h memory area.

ZAPD language commands that need to be further processed before building the A000h memory area.

State table definitions that need to be compress before building the A000h memory area.

This program can be invoked separately, i.e. not using the submit program discussed above by issuing a command in the following form:

```
PREZAPD <source file> <switches> <drive>
  <max # symbols>
```

where

<source file> Is the name of the file which contains the ZAPD source code. This is a required parameter.

<switches> = Pre-process time options used.

B = Surpress Listings of Source Code

L = List source code on LST device

T = Generate test listing on console.

W = Wait for CR after error. Note: T & B are mutually exclusive. This is a required parameter.

<drive> Drive used as a work drive for the ZAPD application. The work drive will be used to store all INC and MAC files. This is an optional parameter.

<max # symbols> This is used to determine the maximum number of symbols to be provided by the preprocessor. The default number is 512.

The following are the error messages which may be produced when running this program:

1 "Incorrect Syntax When Starting Program.",
2 "Source File Not Found.",
3 "Missing Module. Module=",
4 "Errors During First Pass. Execution Terminated.",
5 "Illegal Module Name. Module Name in Source=",
6 "Module Can Only Be Defined Once.",
7 "Modules Can't Be Nested. 2nd BEGIN before END. Module=",
8 "Symbol Defined Twice. Symbol=",
9 "More Than 512 Symbols Defined. Symbol=",
10 "Symbol Not Found. Symbol=",
11 "This Module Can Not Have Symbolic Labels. Module=
12 "Incorrect SWITCH. Values=B, L, T, or W",
13 "Missing Command. Command=",
14 "Command Can't Be Used This Module. Command/Module=",
15 "Command Can Only Be Used Once. Command=",
16 "Incorrect Command Parameter. Module/Command/Parameter=",
17 "Unrecognized Command in This Module. Module/Command=",
18 "BUFPAR is Too Large. No Parititon Exists.",
19 "VARPAR is Too Large. No Partition Exists.",
20 "Too Many Buffers Defined. Max # Buffers=17",
21 "Too Many Variables Defined. Max # Variables=255",
22 "Partition for File Doesn't Exist. File=",
23 "FDESC File not yet defined. File=",
24 "SECURITY File not yet defined. File=",
25 "Buffers 1-17 MUST be in Prescribed Order. Buffer=",
26 "Symbol not yet defined. Symbol=",
27 "DEFAULT file type not found. Default file=",
28 "STATE doesn't follow ACTION. Command=",
29 "ACTION and STATE Have Different Number Parameters.",
30 "ACTION does not precede STATE.",
31 "Incorrect Number Parameters for Command.",
32 "Job Name Used More Than Once. Job=",
33 "JOB Command Must Have Name.",
34 "Download String Longer than 192 Characters.",
35 "INCLUDE Files Can't Be Nested.",
36 "INCLUDE File Not Found.",
37 "Downloaded Data Must be Enclosed in Quotes.",
38 "Partition Address Must end in H.",
39 "STACKPAR is Too Large. No Corresponding Partition",
40 "Special Keys Must be Defined in Correct Sequence.", b. The Assembler Program: ZAPDASM The purpose of this program is to translate the ZAPD source commands into a file of ZAPD tokens which form the ZAPD object module. The concept of a tokenized language is discussed below. The input to this program is a series of ZAPD source statements as defined in Table I after being processed by the PREZAPD.COM preprocessor discussed above. The primary function of PREZAPD is to resolve any EQUATEs, and to insert a PUBLIC label in front of each ZAPD job module. This assembler can be run freestanding as long as all equates have been replaced by numeric values and each value has a public label.

All opcodes except four have a fixed number of parameters. Three opcodes (CALL, DO_C_CALL, and DO_OPSYS) have a variable number of parameters although in the database they are defined as having a fixed number of parameters. For these three opcodes the last parameter is the number of additional varying parameters.

The final opcode (BRANCH_SWITCH) is very different and is handled separately from all others. It provides a method of providing conditional multi-way branching.

The output of this program consists of a sequence of db and dw statements with appropriate public or local labels inserted into the code. The label ZBEGIN:: is added at the top of the output, and the label ZEND:: is added to the end of the output. This output is intended to be processed by a traditional Z80 machine language assembler. An example of the output for the generic terminal program is given in Table XXXI. It corresponds to the source code given in Table XXX, the form of the application program code before running it through the preprocessor.

This program can be started by itself as an alternative to using the submit program described above. This is performed by issuing the following command:

```
ZAPDASM <source.file> <switches>
```

where

<source file> = Name of the source file including drive specifier. This is a required parameter, and the name is usually ZAP.MAC.

<switches> = Assemble time options used.

B = Surpress Listings of Source Code.
I = Interlist source and generated code.
L = List source code
V = Show whether source param can vary.
W = WAIT after each ERROR.
This is an optional parameter.

The error messages which may be produced during the running of this program are the following:

1 "Source File Not Found. Filename=",
2 "Incorrect Syntax When Starting Program.",
3 "Opcode Not Found. Opcode=",
4 "Incorrect Number of Parameters this command.",
5 "Requested Data Type Not Known. Data Type=",
6 "Illegal Data Type. Data Type=",
7 "Illegal ~ Syntax. Parameter=",

2. Creating the Source Code of the Application Program

The source code for the specific implementation of this invention being described relative to the ZON terminal and the ZAPD language which has been created is composed of a number of different modules. These modules can be grouped into three main categories:

ZAPD Environment Modules
ZAPD Application Definition Modules
Merchant Information Modules The first two groups of modules can be created only in the ZAPD source code. The Merchant Information, however, can also be defined in the downline load program, and does not need to be included in the source code. If the Merchant Information is provided in the ZAPD source code, a ZAPD language module is created which is then read by the downline load program.

The different modules which are incorporated in each category are as follows:

ZAPD ENVIRONMENT MODULES

Header Module
Equates Module
Hardware Definition Module
Memory Utilization Group
  Memory Definition Module
  Variable Definition Module
  Buffer Definition Module
File Utilization Group
  File Definition Module
  Input Attribute Module
Security Definition Module

ZAPD APPLICATION MODULES

Job Definition Modules
State Table Definition Modules
Control String Modules
Build File Modules (optionally)

MERCHANT INFORMATION

Build File Module

After the source code has been compiled, two download modules are created: a binary module and an ASCII module. The ZAPD Environment and Application reside in the binary portion of the download and are not accessible from the keyboard of the local terminal. Merchant information is stored in the file/record structure created by the environment. This information can be retrieved or altered via the keyboard using the STORE and RECALL keys, if the application program permits this activity.

ENVIRONMENT MODULES

The Environment Modules provides the basic framework for the application program. They define what hardware is to be used, what memory is required for the application and how it will be used, what kinds of files exist and how data is to be entered in each file. They determine the security levels to be assigned for each file and record sequence, and how the special keys on the keyboard (hangup, backspace, alpha and enter) are mapped.

The Environment section of the source code is composed of ten modules. Each of these modules will be discussed below along with its structure with reference to a short sample application program. A more extensive example of an application program having the same structure is provided in TABLE XXX.

The source code structure has been designed to be as self-documenting as possible. Each module starts with a line containing the keyword BEGIN followed by the name of the module. The module terminates with the keyboard END followed by the name of the module. Any number of source statements may be included between these two lines. More specifically, the structure of each module is as follows:

| | |
|---|---|
| BEGIN | <module name> |
| | <module source statements> |
| END | <module name> |

The order of the modules is generally, unimportant; however, modules may not be nested. One module must be terminated before the next module can begin.

Each module also has certain characteristics:

Required?: Is this program component required to be in the source code? Possible values are 'Y' and 'N'. Some modules are optional.

Repeated? Can more than one module of this type be included in the source code? Values are "Y(es)" or "N(o)".

Symbols? Are modules of this type allowed to have a symbolic name?

Does Module Build File?: Does this module cause a file to be built? If so, this program will output all the source statements between the BEGIN and END lines, exclusive of these two lines, to the named file.

Filename: The name of the file that will receive all statements included between the BEGIN and END statements, not including the BEGIN and END statements.

Header (TABLE X)

Contains the basic information to keep track of different source code versions. This has the date of source code creation, the programmer's name, etc.

Optional Comment Module (Table XI)

Contains long comments for documentation purposes. Can be used as a block comment to avoid having to use ";" at the beginning of each line to identify line as a comment line.

Equates Module (TABLE XII)

Assigns values to symbolic labels used throughout the source code.

Hardware Definition Module (TABLE XIII)

Defines completely the minimum hardware requirement for the application. Identifies how much RAM is required.

Memory Partition Definition (TABLE XIV)

Partitions RAM into areas used by the application, and determines which RAM areas will be used by variables, buffers, the application program modules and files.

Variable Definition Module (TABLE XV)

Identifies each of the predetermined system variables as well as the user defined variables that will be used in the application.

Buffer Definition Module (TABLE XVI)

Identifies each of the system buffers that will be used by the application program as well as the length of each buffer for this particular application.

File Definition Module (TABLE XVII)

Defines how the file structure is to be handled for the application. Also can be used to identify a file as one of the default system files (Accumulator File, Prompt File, etc.). It also defines the security for the records in the file as well as the set of data entry attributes to be used for entering data to various file/records from the keyboard.

Input Attribute Module (TABLE XVIII)

Defines the different sets of possible data entry attributes. These include the type of characters allowed for a file/record, how the keyboard is mapped during data entry (Alpha or Numeric), the maximum and minimum number of characters to enter, and other editing parameters that are dependent upon the editing type.

Security Module (TABLE XIX)

Defines the functions that may be performed while a given password level is in effect. This defines the possible security levels that can be used for the application.

Special Keys (TABLE XX)

Identifies the location of special keys used by the ROM routines (e.g., Enter, Clear Entry, Hangup, Alpha, etc.

APPLICATION PROGRAM MODULES

The Application Program section of the source code provides the logic for building the application program functions. There are three modules which define the application section; a fourth, the FILE BUILD module, may also under some circumstances contain data defining the application.

State Table Definition (TABLE XXI)

Defines completely the state tables to be used in the application. this section is required if the state tables are to be used to define how transactions are started. The state tables tell the application program what to do when a particular key is pressed, or a specific input devide has data.

APM Definition Modules (TABLE XXII)

Contains the commands that provide the step-by-step insructions which define what task a single APM is to perform. This is required if the terminal is to provide functionality beyond the basic CALCULATOR and PHONE functions.

Control String Definition (TABLE XXIII)

Defines the individual control strings to be used by the application. These are used for packet building.

Build File Modules (TABLE XXIV)

Defines ASCII data to be separately downloaded into files under the control of the memory manager in the local terminal, containing speciric data that is required for the application to function. Each module defines the data to be stored in one file. One file might contain prompts required for the application; another might contain account range information for use with the BRANCH_RANGE command in the APM module section. A third might contain information used with the BRANCH_CASE command to analyze host responses.

MERCHANT INFORMATION

The Merchant Information may contain any other parameter values required to fully operate the application. This information might include specific telephone numbers, merchant id numbers, prompts, log-on passwords, etc. Such information is optional, rather than required as part of the source code, and is not normally considered as a part of the application. However, it can be used to provide default values for some operator-selectable options or information.

Build File Modules

Defines data to be separately downloaded into files under control of the memory manager. Each file is contained in one Build File Module. A file might, for example, contain telephoone numbers. Another file might have the merchant id numbers, etc.

PERFORMING THE PROGRAM COMMUNICATION STEP

1. General Aspects of the Communication Step

The step in the general method of this invention following the establishment of teh application program at the remote computer is to communicate the application program, which may involve one or more application program modules and possibly associated environment information, from the remote ccomputer system to the local computer system in the local terminal via a communication channel. This step includes the step of storing the operation codes and possibly parameters, associated with the prearranged sequence of commands in each application program module, in the random access memory of the local terminal.

In a typical case, the communication channel between the local terminal and the remote computer is the modem/phone line/modem communication link shown in FIG. 2. Other forms of state of the art communication channels could also be used and the invention is not limited to any particular communication channel.

In the specific case of the implementation of this invention in connection with the ZON terminal, the perferred approach is to utilize a computer program called ZONTALK running in the remote computer, which is preferably an IBM PC or equivalent. This program is a download management program and once it is set up on the remote computer, it functions without operator intervention being required to respond to calls from local terminals to download an application program. A version of the object code for a download program for the remote computer is set forth in Table XXXXIII.

At the local terminal end of the communication channel, the download program resident in the memory of the local terminal together with other aspects of the overall programs in the local terminal makes it possible for the operator of the local terminal to obtain a download very simply. If the terminal has never been downloaded, the operator must first use the "Store" key on the keyboard to store the phone number to call for the download and the ID for the application which should be downloaded, and possibly a specific terminal identifier.

2. The ROM-resident Routine R_LOADON Executed to call For Download of An Application Program (FIG. 55)

Figure 55:
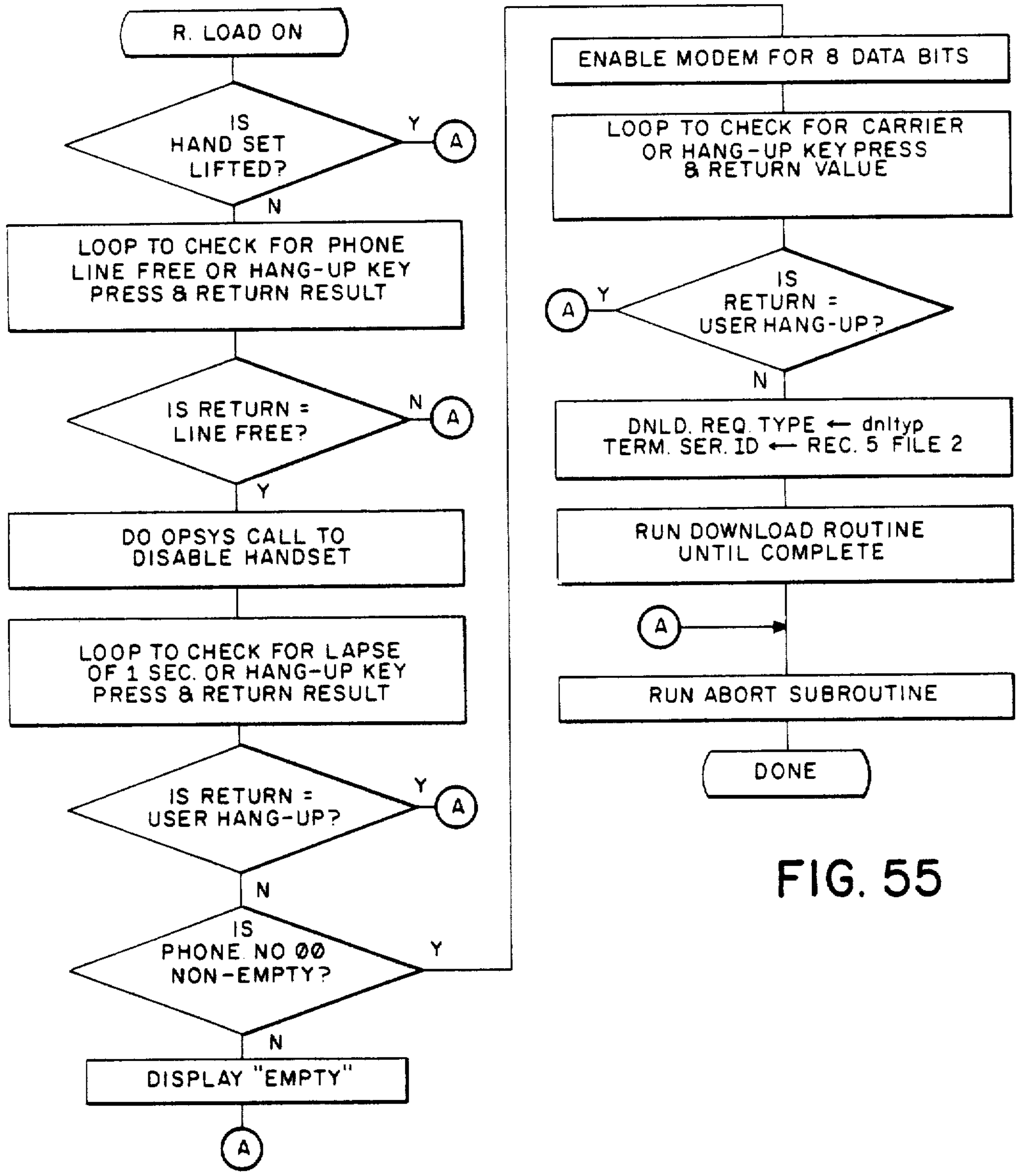

FIG. 55 illustrates the operation of the ROM-resident action routine called R_LOADON which is invoked from the keyboard of the local terminal by the operator when initiating the downloading of an application program. The first step is a checking step to determine if the handset is lifted. The hardware of the ZON terminal includes circuitry for monitoring the on and off-hook status of the handset and permits this step to be performed. If this checking step returns a YES value, execution branches to the ABORT subroutine since a download cannot occur while the handset is lifted.

If this first checking step returns a NO value, the program executes a checking loop to wait until either the telephone line connected to the local terminal is free or the user presses a hang-up key to stop a transaction. When either of these conditions is present, the checking loop gives a RETURN whose value indicates which condition occurred. Next a checking step is executed to determine if RETURN has a value corresponding to telephone line ready. If this results in a NO value, execution branches to the ABORT subroutine as shown since the routine will not wait for a free line to be available. If a YES value is obtained, an operating system call is made to disable the handset of the local terminal.

The routine then executes a loop to check for one of a pause for one second to occur or for the user to hit the hangup key and gives a RETURN with a value indicating which condition occurred. A checking step is then performed to determine if RETURN is equal to user hang-up. If this results in a YES value, execution branches to ABORT since the user has actively aborted the action, possibly because the key was hit by mistake. If a NO value results from this checking step, a further checking step is executed to determine whether there is a phone number stored in location 00.

If this checking step results in a NO value, the terminal displays "EMPTY" to indicate that the phone number is not stored. If a YES value results, the stored phone number is dialed and then the modem is enabled for eight data bits. The routine then executes a checking loop to determine the first occurrence of reciept of a carrier tone or the user hitting the hang-up key to abort the action, with the loop giving a RETURN with value corresponding to whichever occurred first.

Next a checking step is performed to see if RETURN has a value corresponding to user hang-up. If this results in a YES value, the action is aborted as shown. Otherwise the registers designated DOWNLOAD.-REQUEST.TYPE and TERMINAL.SERIAL.ID are loaded with values stored in ROM in the local terminal. Then the download routine stored in the ROM is run until it is completed. Finally, the ABORT subroutine is executed to bring the terminal back to the READY state so that transaction processing using the downloaded application program can commence. The download program stored in ROM is included in the hexadecimal code for the ROM which is provided in Table XXXII.

3. The Communication Protocol in a Specific Version of the Application Program Downloading Methodology To illustrate the step of communicating the application program from the remote computer system to the local terminal, a specific approach will be described. This discussion will refer to teh communication step as downloading the application program from the remote computer system to the local terminal.

The local terminal initiates a download session by dialing into the remote computer system as discussed above, establishing satisfactory communication between the two modems involved, and then sending a download request packet having the form and content shown in TABLE XXIX. As shown, in addition to the terminal's own identification, this request packet contains information like type of download, ROM version, and the application program identification. Upon receiving this request packet, the remote computer system starts downloading the requested information. The discussion here will focus on the download of an application program which involves an entire download of ZAPD application program modules and the environment modules and other associated modules which provide complete program information to the local terminal. Depending on the type of download selected, it is possible that only the application module set, only the file/record information such as the merchant information, or both together may be downloaded.

The download is performed by the remote computer system sending the local terminal a sequence of download data packets having the form and content shown in TABLE XXIX. As shown, the download data packet contains, along with the record contents, either the memory page location for binary downloaded data such as the environment and application program modules, or the file number and record number identifiers for ASCII downloaded data such as merchant information. The remote computer system sends these data packets one at a time using a modified version of the "VISA first-generation protocol" with the control characters ENQ, ACK, NAK, and EOT, in which it waits to receive an acknowledge from the local terminal that each packet has been successfully received before proceeding to transmit the next packet. If the remote computer system receives a not-acknowledge with respect to a particular data packet, that data packet is retransmitted until it is acknowledged. This is standard data transfer technology and is well known. The modem communication protocols do not need to be described in detail here.

When the local terminal receives a data packet, the memory management system resident in the local terminal, which has been described generally above, pulls out each data record from the packet and stores it at the appropriate location in the random access memory of the local terminal. After the last data packet of the application program has been successfully transmitted, the remote computer system sends a download session trail packet to the local terminal. After this trail packet has been acknowledged by the local terminal, the remote computer system sends an end of transmission signal and both the local terminal and the remote computer system automatically disconnect from the phone line and return their respective modems to initial states.

4. The Downloaded Data in a Specific Version of the Communication Step of This Invention a. General Aspects

There are two major divisions in the type of data that gets down loaded to a local terminal to program it with the application program which has been established in the remote computer system. The first section is a Binary Download, which contains the actual definitions of tables and the program object code for the series of APMs which make up the application program. The second section is the Parameter Download, or the File/Record Download, which includes the type of ASCII data that has been downloaded into the terminal in the prior art systems. The parameter download defines strings that will be used for prompts, control strings that will be used by the application, accumulators, phone numbers, merchant IDs and similar information.

b. The Binary Download

The binary download can itself be divided into two main portions. The first portion, called the Fixed Portion, contains the sections of the data which have fixed sizes and fixed addresses. The second portion, called the Varying Portion, contains sections of the data which have varying sizes and addresses.

(1) The Fixed Portion

The first section of this fixed portion of the binary download, is an eleven byte header which contains the information which is in the Header Module of the source code of the application program. See TABLE X and Header.Inc in Table XXXI for examples of the source code and assembled code portions from which this section is derived. This section includes a length byte and a three byte string that defines the version of the interpreter required to run this application program and is included so that the interpreter in the local terminal can check whether a correct form of application program has been downloaded to the terminal. Following this three byte string is seven bytes of data comprising the identification of this particular application program. Normally this is formatted as 3 characters, giving a code for the name of the application program, and 4 characters, giving a version number for the application program since there may be more than one version of the application program released as it goes through testing and development.

The second section of the fixed portion is a table defining all the buffer or string variables which are available to the application programmer. This is derived from the Buffer Definition Module of the source code. For each buffer a two-byte or single word entry, is stored containing the address at which the buffer starts. Following that there is a single byte which contains the maximum length for that buffer in bytes, up to a maximum value of 255 bytes. There are fifteen buffers which can be addressed by the application programmer. Of those, only the first buffer, namely the input buffer, is expected to be located at a fixed address in the random access memory and to have a fixed maximum length. All the other buffers are required to be in a fixed order here, but may actually be allocated in different positions in the terminal RAM.

There are two more buffers which cannot be directly addressed by the application programmer, but are reserved for temporary use within certain of the instructions which require temporary storage. Finally, there is a two byte pointer which defines the address of the INSRCE (input source) variable which denotes the source from which current input was received.

The third section contains eight bytes of information defining the hardware requirements that are expected for this application, that is, the type of modem which it expects to use, the type of cardreader, the type of printer and the memory configuration. This section is derived from the Hardware Definition Module of the source code. If desired, this information could be used to determine whether the application program could run on the current terminal.

The fourth section contains four bytes defining what keys are going to be assigned to particular special functions. This information is derived from the Special Keys Module of the source code. There are four keys that are required to have special meanings, in conjunction with entering data and with monitoring for an attempt to abort the transaction (i.e. break off what the terminal is currently doing). These are the values for the alphashift key, the hangup (cancel) key, the enter key, and the backspace (clear entry) key. These keys are used by the data entry routines, by the control string interpreter, and sometimes within the APMs to check for those specific keys which are to have specific meanings. It is, therefore, convenient to have the four keys which usually have special meanings defined in one place.

The fifth section of the binary download is a collection of information defining the locations and sizes of the state table. The variables that are stored there are: First a single byte indicating the number of states in the tables. (The number of inputs that can be accepted by the state table is a constant, 35 in the case of the ZON terminal, but this might vary with different local terminal hardware configurations). Next is a two-byte variable with the address of the "bitmap" table, followed by the two-byte address of the "table pointer" table and the two-byte address of the "result" table. These tables are shown in FIG. 37A and their contents are described above along with the STATE.TABLE.LOOKUP routine which utilizes the information in these tables. The actual state-tables themselves appear later in the download.

The sixth section of the fixed portion contains information defining the APM entry table, which is a list of all the APMs which can be initiated from the state table by a single key stroke or other input. The first entry here is a single byte indicating the number of entry points. There is another byte after that which indicates the number of the APM which should be run on first power up, if there is such a job. If the value here is non-zero, whenever the terminal is started up it will begin by running that APM. This is described above with respect to the Power-On routine shown in FIG. 48. Finally there is a two byte pointer containing the starting address of the APM Pointer Table which is illustrated in FIG. 32. The actual contents of this table are described again further below.

The seventh section contains a similar definition of the table of variables that are used in the ZAPD program. This is derived from the Variable Definition Module of the source code The first byte of this section is a variable containing the number of predefined variables that will be referenced from the application program, i.e. the number of variables which the application program will use and which are already defined with a fixed address by the ROM routines. Following that is a two-byte pointer containing the address of the beginning of a table, which contains the address of each ROM defined (or predefined) variable which will be referenced. Following that is a single byte containing the number of application defined variables, also called user defined variables, in the application program. Following that, a two byte pointer to a free region in random access memory to which all of those variables will be allocated, i.e. where all of these variables will be stored, each in its own two-byte area. There is no separate table of pointers for each of these variables, as it is assumed that all of them are the same size (two bytes). This means that the location of each variable can be computed, by adding twice the number of the variable to the value of the pointer that is given here. The means of accessing this data has previously been discussed in conjunction with the parsing routine for the VS data type.

The eighth section contains a pair of pointers which locate the beginning and the end of the APM command object code area in RAM. This information is derived automatically from the APM sections of the source code, and is provided so the EXECUTE.APM.COMMAND portion of the interpreter can do error checking on its instruction pointer, as it executes the commands within the object code for a given APM. The interpreter is the entire set of routines that schedule and check and execute the APMs in the local terminal. If it is ever discovered that this instruction pointer falls outside of the pair of values given here, and it is outside the values permitted for ROM-resident APM object code, then this indicates that a serious error has occurred in executing the program and the execution of commands should be brought to a halt by the usual error routine.

The ninth section is the definition of the area for, and size of, the program stack. The stack is used to keep track of the subroutine calls and returns (including parameter passing) for each of the APMs that can be running in parallel in the Main Scheduler routine of this invention. The first byte is a variable containing the size of the stack area in terms of the three byte elements which make up the stack elements, followed by a single reserved byte, followed by a pointer to the beginning of the stack area in RAM.

The tenth section is a definition of initial file number values or default file number values for certain types of operations. The motivation for this section of the downloaded data is that certain of the operation codes assume that a pre-selected file is going to be used as a source for certain data. For instance, the control string operation DO_BLD_STRING assumes that the control string file has already been selected. There are operation codes which allow specifically setting the variables to select the file number that will be used by those commands. However, to avoid having to do that, this section allows specification of default values for those files. The variables are, in order: a single byte value giving the default file for the control strings; a byte value giving the default value for the and the default value for the prompt file; a byte value giving the default value for the password file which is optionally used; a single byte value with the default for the accumulator file; a single byte value with the default for the sequence number file; and a byte which gives a value for the error log file and a byte giving the default for the system password file which is optionally used. The error log file has been described above in connection with FIG. 50 and is used to store a record of executive errors. If the value stored for the error log is a zero, then no such information will be stored; but if it a non-zero number, then that file will be used as the location to store a record of the single most recent executive error to occur.

The eleventh section contains a two-byte pointer to the printer definition table. This is an optional capability which will eventually provide the ability to support multiple printers with different definitions of handshaking, line width, page length, etc.

The twelfth section contains a two-byte pointer to the beginning of the Input Attributes Table; the elements of this table will be described below.

The thirteenth section is a pointer to the file description table, which associates the files for the application with the edit type in the input attribute table which should be used when data is being stored from the keyboard into those files. The elements of this table are described below.

The fourteenth section contains, first a pointer to the Security Definition table which gives the security descriptions for the different files, and determines whether or not it will be permitted to store that file or to recall data from that file using the keyboard. There is then a two-byte pointer to the "Password" table which associates the different function numbers required to access a record of a file with the possible values for the current (or security level) number which is obtained by checking passwords. These tables also are described fully below.

The fifteenth section is an optional two-byte pointer to a user defined routine for the control string interpreter. To implement certain types of special functions within control strings it is possible for the application programmer to write a specialized routine in the assembler language and include that as part of his download, labeling it USRCSI. In that case when the V command is present in a control string, the interpreter will call the routine that the programmer has defined to process that command. This allows the programmer to make alterations to a buffer to perform some sort of special processing. This is optional and if that routine is not included in the download, then the V command simply will do nothing.

The sixteenth section defines some very basic information about the file system. It is derived from the Memory Partition Definition Module of the source code (see TABLE XIV). The first byte is the number of partitions which the memory space will be divided into for the purpose of storing files, the next entry is a two byte pointer giving the address of the list of the different memory partitions which the programmer defines. The following variable is a single byte giving the maximum number of files that are present in the application program.

The last section contains a two byte value which is the memory address of the pair of checkbytes which is placed at the end of the binary download. The usage of this pointer to the checksum is explained in a following paragraph; however, this address can clearly also be used to locate the end of the binary downloaded area. There are then two bytes which contain the checksum on the fixed portion of the download. This checksum is the first of two, computed at two separate points. This first checksum is taken on the fixed portion of the download, that is, on all the data from the beginning address of the binary download, at the definition of the header section, to the bytes immediately preceding this checksum, defining the pointer to the secondary checksum. All the sections up to this point are of fixed length, and the addresses of each variable and each parameter up to this point in the download data are fixed addresses; therefore the checksum can be taken on a known area of known length. Four more bytes are stored in this area following the checksum, which are not included in either of the two checksums. The first byte is reserved for memory testing. By reading the byte there, changing its value, storing it back and then reading it again, it is possible to determine whether or not that section of memory is locked. This is used in the power-on routine which has been described above. The next byte is a flag which indicates a special function of the memory manager indicating whether the file structures have been properly built yet. This is used during the initialization of the terminal in power-on routine. Finally there are two reserved bytes. There four bytes can have their values change during the course of receiving and storing a download so they are not included in either of the checksums for the different sections.

All the data following this, beginning with the definition of the files for the memory manager, are considered part of the varying sized section of the download. They may be in varying sizes and in varying positions depending upon exactly what is included in the download and how much data is in each section. Therefore, a separate checksum is used on this area, and is found by the checksum pointer mentioned at the beginning of the last parragraph. The checksum is actually stored at the end of the download memory, and covers the area beginning with the definition of the files and ending with the byte immediatelyh prior to the checksum. Generally speaking, the checksums are present so that it is possible to do a integrity check on the binary code that has been downloaded, either at power-up or under the control of an APM command. With this check, it can be immediately determined whether or not some sort of damage has occurred to the data that was downloaded, leading to some invalid values being stored into the RAM in the local terminal. With this capability, the checking step which are included in the power-on routine discussed above and illustrated in FIG. 48 can determine if changes have occurred in memory and prevent the program from executing, thereby protecting against possible damage or unexpected behavior of the terminal.

The checksum on the fixed area of the binary download ends immediately before the four reserved bytes and the checksum on the variable size portion of the download begins immediately following those bytes; this means it is possible to include a very small amount of data here, which may be changed from time to time but which is needed to provide some sort of permanent reference information.

This ends the "fixed" portion of the binary download.

(2) The Variable Size Portion

All the sections of data in the variable size portion of the download may vary in their size and/or their address location within the RAM in the local terminal.

The first section of the variable-size portion of the binary download is called PARMEM (for partition membership). It contains the definitions of all the files for the application: what the number for each file is, what memory partition it belongs to, what compression scheme will be used in storing it, etc. This is stored in a format of eight bytes per file.

The second section is the variable address table for the predefined or ROM defined variables. This contains a succession of two-byte addresses, giving a pointer to each of the variables which will be referenced. This entire table is pointed to by the pointer given in the section of the "fixed" portion of the download. Following that there is a "partition address" table which gives the boundaries of each partition in the RAM which is allocated to storage of files. The format here is four bytes for each partition: there is a two byte pointer to the beginning of the partition and a two byte pointer to the last byte of that partition. Thus the table defines the beginning and the end of each available memory partition.

Following that there is the entry points table which again is reached by the pointer defined in the fixed section. This table contains a series of two byte pointers for each of the APMs which may be started on power on or started by a key entry from the state-tables. This is the APM Pointer table shown in FIG. 32. The pointers are placed in this table in the process of compiling the application from the source code to the object code, and are taken from those named entries in the BEGIN JOB (BEGIN APM) sections of the application portion of the source code which begin with a hyphen, indicating that they may be referenced from the state-table ACTION.START.APM routine or the power-on ACTION.START.APM routine.

The next section in the variable size portion of the binary download is the FDESC or file description table. Each entry in this table is six bytes, containing the number of the file, the minimum and maximum records in that file for which this description should apply and a pointer to an entry in the input attributes table. The contents of the input attribute entry will determine what sort of data may be entered when someone is storing data from the keyboard of the terminal into any record in the specified range of records in this file. It is important to understand that the entries given in this table will only be used to store data to the file if the security restrictions on the file have been set up so that it is possible to store data into that file. If there is no security entry for the file, then the file descriptor table will be ignored for that file.

The next section following the file description section is the security definition table. This must have an entry for each file from which data is allowed to be recalled or into which data may be stored using the keyboard. Each entry contains: the number of the file; the minimum and maximum records in this file which the entry should apply to, a description of what sort of access is permitted to it, (i.e. store or recall access or both) and the access function code which must be permitted for the user to access the specified records of file in the specified way. The access function codes depend on the set up of the security mode table which is explained below.

The next section is the input attributes table. Each entry in this table defines a complete set of attributes or characteristics for a particular type of data which may be entered from the keyboard using the data entry commands. For instance, it might define that the data which may be entered for "customer name" consists of a field between 25 and 30 characters long containing alphanumeric data only, or that the data entered for "file number" might consist of an integer between 0 and 254. The entries in this table are each nine bytes long. The first two bytes contain a pointer to the ROM data-entry edit routine (or to a user-defined and downloaded edit routine) which will be used to check each character of input received while entering data under this data type. The next byte contains a definition of what sort of keyboard mapping will be used, along with some other parameters such as whether the alpha-shift will be in effect when entering data, whether the screen should be cleared as the data begins to be entered, etc. The third field is a single byte, containing the maximum length which can be entered for this data field. The contents of the following four bytes (two two-byte fields) depend upon the edit type. TABLE XVIIIA describes what each of those parameters can be, depending on the edit routine selected by the first field. The final byte describes, for most of the edit routines, whether there is a minimum length criteria which can be applied. For instance, the programmer can specify that at least seven characters must be entered to a given field.

The very first entry in the input attribute table (i.e. the first group of fields describing a single data type) is used as the default data entry type. It describes the characteristics which will be used by the control string interpreter if no other data type and no other editing characteristics are specified within the control string. If some characteristics are specified in the control string, they will override it; but if not, the characteristics of the first entry in the input attributes table will be applied to each field which is entered from the control string.

The next section is the printer definition table. As indicated above the use of the printer definition table is optional and is not present in the current implementation in the Z0N terminal. Currently this section simply defines a label and creates no actual table.

Following that there is the "password definition" table or, more accurately, the security mode definition table. This table is derived from the Security Module of the source code illustrated in TABLES XIX. What this table does is define how a security mode (which can be set by program code or set by checking a password against a file of permissible passwords) corresponds to the different function numbers which are required by the security definition table when using this mode to access files. TABLE XIX describes how the use of the password mode table here and the security definition table interact when attempting to store and recall a record. Each entry in this table contains a single byte for the mode number being defined, followed by a counted string of variable size, defining a bit of one for each function number which is permitted by this mode. The last entry contains a single byte value of 255 decimal, to terminate the table.

The next section of the download is the program code of the application program modules. This is the sequential series of commands which can be executed by the interpreter. The commands are coded into binary numeric form using the opset/opcode system which has been described above. To summarize, the format for each instruction in this section is: an optional prefix of up to four bytes of bitmap, which can be identified by the high order bit of the bitmap byte being set to 1 value, followed by the operation code byte itself, which can be identified by the high order bit being 0, followed by a single byte, double byte or counted string for each parameter defined for this operation code, depending upon the type of parameters that are appropriate to a particular command. The one other thing that may be present in this section of the download is in-line Z80 assembler code, which can be incorporated into an APM, or unmodifed binary or ASCII data in the form of programmer defined tables or strings which are needed to be used by the application program.

The final section in the binary portion of the download is a set of tables making up a compressed form of the state-table derived from the State Table Definition module in the source code (TABLE XXI). The state table information is incorporated into four separate tables as shown in FIG. 37A. These tables are located using the pointers to them stored in the "fixed" section of the binary download. The compression scheme that is used is rather complex and is explained above with respect to FIG. 37A. These tables are derived from the State Table Definition module by using a separate compression program.

The value of the state-table is that it provides a essentially non-procedural or non-sequential way of defining what the terminal should do in a given combination of circumstances. It allows the programmer to specify the response of the local terminal to a number of different possible inputs or keys in one place, rather than having to use long sequences of program code to identify and process each of those possible inputs or keys.

The one remaining item in the binary portion of the download is the pair of checkbytes on the variable portion of the downmode, which contains a two byte value. This checkbyte, like the previous checkbyte on the fixed size portion is computed using a simple 16 bit additive checksum; the checksum is exclusive-ORed with a selected value before storing it and after checking it, to insure that a checksum on a memory area containing nothing but zeros would return a non-zero checksum. This means that a terminal which is completely empty can be identified, and will not be mistakenly assumed to contain valid data. The checksum algorithm that is used does not apply a two's complement or any of the more standard forms of checksums, but is a simple 16-bit additive total of the individual bytes in the memory area.

That is the end of the description of the variable section of binary portion of the terminal download.

C. The File and Record Download

The other category of downloaded data is the file portion which is not stored in immediately identifiable portions of memory as in the binary portion. Instead, to access data that is stored in files, it is necessary to use the file manager, which will locate a given record in a given file, find it in the memory partition in which it belongs and return that record by copying it into the string location. When the file and record data is being downloaded, it is represented within data packets, using a hexadecimal code for the file number followed by a hexadecimal code for the record number, followed by the actual intended contents of the record.

ADVANTAGES OF THE METHODOLOGY OF THE INVENTION

The present version of the implementation of the method of this invention as described above provides a number of advantages which should now be clear. Nearly everything needed for execution of the program is accessed through pointers and through entries in tables, and consequently nearly anything in the application program can be customized, as long as the changes do not require alteration of the operation routines and other program components resident in the ROM of the terminal itself. For instance, one application program may have only a single data entry input type whereas another might have twenty or a dozen. In either case the entries in that table can be found the same way, by specifying their address to an APM command, or by computing their position in memory using the addresses given in the "fixed" portion of the download. Only the amount of data entry information which is actually needed must be downloaded and stored. Similarly, to locate a particular variable number that is being referenced from the APM program code, all the VS or VI parsing routines need to do is check to see that the variable number exists (by checking against the maximum number of variables), find where the variables begin (i.e. the starting address) and add the variable number, to give the resulting address where the actual variable contents can be found. All the information needed to do this can be found through the fixed-address data in the download. Similar principles apply to all of the tables that have been described here. This greatly simplifies the process of redefining the environment for an application as part of the process of customizing the application program for a particular customer.

Because the tables can be used to define an environment for application program, defining the files that are available to it, the types of data entry, the variables, the string sizes etc., this takes a burden off the programmer who is writing the application. There is less need to include a lot of program code for special cases, to access a particular file, to create space for a variable whenever a variable is to be used, or to check whether a given file number exists. Most of that checking and definition of access to data is done by the support routines that are built into the ROM interpreter, using the tables that are downloaded in this binary portion as guidelines for how to interpret the code.

It should be apparent from the above description that the method of this invention makes it possible for the programmer to create application programs with commands in a source level language that are particularly suited to the type of application for the terminals that are to be programmed. The commands are compiled into compressed operation codes and parameters which reduce the size of the code which must be downloaded to a practicable size. The methods of this invention provide for parallel execution of APMs which greatly expands the facility with which the programmer can implement the execution of the program tasks in the local terminal without wasting time for inputs to arrive. This increases the efficiency of use of the central processor unit within the terminal.

The programming language embodied in the current implementation of the invention can be considered an instance of a pseudo-compiled, tokenized interpretive language, using terminology standard in the field of computer science.

The language is pseudo-compiled, in that it is translated out of its normal source code form into an intermediate form by a separate step or steps before it is executed. This is distinct from a true compiled language, which is typically translated from its source code form into machine language instructions which can be executed directly; or a non-compiled language which is typically interpreted directly from its source code form.

The language is tokenized, in that each individual command is transformed from its source code form into a compressed representation in the object code form of the language, with essentially a one-for-one relationship with the elements of the source code, and the commands are stored sequentially within the object code. In a non-tokenized interpretive language each command in source code may translate to a number of lines of object code depending on the command and its context.

The language is interpretive, in that the operation routine or routines which are executed to carry out a command is determined, for each instance of the command in an application program module written in the language, at the time the command is being executed. As previously noted, in a compiled, non-interpretive, language implementation, this determination of the appropriate operation routine or machine code instructions occurs previously, at the time the language is translated out of its source code form.

The language which this invention provides is specifically optimized for transaction processing and for the downloading of the compiled code. It is unique, in that it has built in facilities for handling concurrency of execution of APMs in an efficient fashion. It provides overall capabilites for customizing local terminal functions that could only be implemented with difficulty and less advantageously with other language systems.

The above description of particular implementations of the various features of methodology of this invention are given by way of example of the general concepts of the invention. In some cases alternative approaches to various features are discussed. It should be understood, however, that persons of skill in the art of real time programming in the field to which this invention pertains will be able to make numerous changes in the specific implementations without departing from the scope of this invention as claimed in the following claims.

APPENDED TABLES

COPYRIGHT LICENSE LEGEND

THE ATTACHED TABLES INCORPORATED INTO A PATENT APPLICATION INCLUDE MATERIAL WHICH IS COPYRIGHTED BY VERIFONE INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS

PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

TABLES

| TABLE NO. | DESCRIPTION |
|---|---|
| I | Listing of Defined Commands and Reference Tables Associated therewith |
| II | Chart of Examples of Command Code Length in Object Code versus Code Length of Associated General Purpose Operation Routine |
| III | List of Parameter Types and Default and Alternate Data Types Associated Therewith |
| IV | List of Data Types and Associated Symbols |
| V | Operation Sequence of Terminal in Credit Card Stripe Reading Mode |
| VI | Operation Sequence of Terminal in Manual Card Data Entry Mode |
| VII | Listing of Rom-Resident Routines |
| VIII | Listing of Error Messages Produced During Execution of the Error Routine |
| IX | Submit File Listing for Compiling Application Program Source Code to Downloadable Object Code |
| X | Example of Header Module in Source Code |
| XI | Example of Comment Module in Source Code |
| XII | Example of Equates Module in Source Code |
| XIII | Example of Hardware Definition Module in Source Code |
| XIV | Example of Memory Partition Definition Module in Source Code |
| XV | Example of Variable Definition Module in Source Code |
| XVI | Example of Buffer Definition Module in Source Code |
| XVIIA | Example of File Definition Module in Source Code |
| XVIIB | Structures for File Definition |
| XVIIIA | Example of Input Attribute Module in Source Code |
| XVIIIB | Input Attribute Reference Table |
| XIX | Example of Security Module in source Code |
| XX | Example of Special Keys Module in Source Code |
| XXI | Example of State Table Definition Module in Source Code |
| XXII | Example of APM Definition Modules in Source Code |
| XXIIIA | Example of Control String Definition Module in Source Code |
| XXIIIB | Specifications for I/O Format Control String Interpreter for Data Capture |
| XXIV | Example of Build File Modules in Source Code |
| XXV | Source Code for Alternative Implementation of the Method of the Invention |
| XXVI | Listing of Defined Commands Associated with Alternative Implementation |
| XXVII | Listing of Predefined Variables that Can Be Referenced in Application Program Modules |
| XXVIII | Listing of Changes Made to AMX Real Time Operating System |
| XXIX | Packet Formats for Up/Down Line Loading |
| XXX | Source Code for Generic Terminal Application Program |
| XXXI | Compiled Code for Generic Terminal Application Program |
| XXXII | Downloadable Object Code for Generic Terminal Application Program |
| XXXIII | Object Code of Program Components Stored in ROM in Local Terminal |
| XXXIV | Object Code of PREZAPD Preprocessor Program |
| XXXV | Object Code of ZAPDASM Compiler Program |
| XXXVI | Object Code of ZAPDSTAT State Table Compression Program |
| XXXVII | Object Code of FILESYM Program of Translate Relative Addresses to Absolute Addresses |

TABLES-continued

| TABLE NO. | DESCRIPTION |
|---|---|
| XXXVIII | Object Code of CTRUNZAP Program to Truncate Downloadable Object Code to Minimum Length |
| XXXIX | Source Code of Default Terminal Program Stored in ROM of Local Terminal |
| XXXX | Example of Sequence of Instructions For Concurrent Job (APM) Execution |
| XXXXI | Interface Between ZAPD System and AMX Operating System (Opsys Calls) |
| XXXXII | Addresses Within ROM for Program Routines Not Charted or Discussed. |
| XXXXIII | Object Code for Download Program Running In Remote Computer |

TABLE 1

Listing of Defined Commands and Reference Tables Associated Therewith

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

PREFACE

ZAPD (the ZON application development language) has been designed to allow application programmers to quickly develop transacton based applications using Veri-Fone's family of ZON terminals. ZAPD has been optimized for telecommunication based transactions and provides the maximum utility with the minimum number of commands.

The language is a psuedo-compiled language that is executed via a firmware-resident, run-time executive. Application programmers can use an IBM PC or CP/M computer to develop the source code which is then processed by Veri-Fone's ZAPD Compiler. The resulting "object" code is downline loaded to the individual terminal for use.

This manual outlines in some detail the specific commands in the ZAPD language, and is meant as a technical reference guide for ZAPD application programmers. It's primary objective is as an aid for those writing and debugging source code for the ZAPD job section of an application. The manual does not discuss the internal workings or design of the ZAPD interpreter.

It should be noted that the ZAPD language commands are only one portion of the complete ZAPD source code. The complete source code contains a variety of modules such as various Environment Modules, the State Table and other modules. For a brief overview of the various sections of ZAPD source code see Handout 9-1, "ZAPD Version 2.0 Source Code Format".

TABLE OF CONTENTS

Preface
Section 1: ZAPD Language Syntax Reference
Section 2: How to Use This Manual
Section 3: Reference Tables
Section 4: Alphabetic Reference for Each Command

| Command | | Op Group | Op Number (Decimal) |
|---|---|---|---|
| A - | ABS_NULL | (0 | 0) |
| B - | BRANCH_CASE | (1 | 1) |
| C - | CALC_BYTE | (0 | 5) |
| D - | DEC_ACCUM | (0 | 35) |
| E - | END_OF_FILE | (1 | 34) |
| F - | FETCH_BYTE | (0 | 53) |
| G - | GET_ACCUM | (0 | 55) |
| H - | HALT | (0 | 64) |
| I - | INC_ACCUM | (0 | 65) |
| L - | LOAD_ACCUM | (1 | 57) |
| M - | MOVE_BYTE | (0 | 84) |
| N - | NEED_INPUT | (0 | 87) |
| P - | PAD_BYTE | (1 | 61) |
| R - | RCV_BYTE | (0 | 93) |
| S - | SEND_CHAR | (0 | 95) |
| T - | TAKE_INPUT | (0 | 112) |
| W - | WAIT | (0 | 113) |

SECTION 1: ZAPD LANGUAGE SYNTAX REFERENCE

The formal syntax for the source code form of a ZAPD command is:

{<label>:}<op-code>{<parameter 1> . . .
<parameter n>}{; <comment>}

- Each command line consists of a number of fields. Each command line is terminated with an ASCII CR/LR. Each field consists of a number of ASCII characters (high bit not set).
- Labels must begin in column 1; all other fields are freeform within the command line.
- Fields must be separated by one or more blanks or tabs.
- Labels may consist of any number of alphanumeric characters, beginning with a letter; only the first 16 characters are significant. The colon is not considered part of the label.
- Op-codes must be taken from the list of accepted op-codes for the release of ZAPD the command is to be compiled for. The correct eprom version of ZAPD for this version of the reference manual is shown on the front cover of the manual.
- Most op-codes have a fixed number of parameters. (Only CALL, DO_C_CALL and DO_OPSYS have a variable number of parameters, denoted by use of the "R" parameter type).
- Each command requires a specific data type for each parameter, and the requirement is specific to the command.

Each parameter of a specific op-code belongs to a specific parameter type or category. These data types are currently coded in Section 4 of this manual by a single letter, such as C, X, Z, etc. FIG. 1 contains information on the parameter types.

Each of those parameter types has a pre-set range of from one to four specific data types which might be used to satisfy that parameter. Using a valid data type other than the default, for any parameter, implies that the ZAPD compiler/assembler will generate a bitmap and prefix it to the object code for the command, to indicate which alternate data types are being used for the object code form of the different parameters. FIG. 1 below identifies, for each parameter type: its reference code, its full name, its default data type, and any valid alternate data types.

Each data type has a specific symbol in the source code, which can be used to distinguish it from other data types which may belong to the same parameter type. FIG. 2 contains information on the specific data types which may have been listed for some parameter in FIG. 1. The table in FIG. 2 identifies, for each data type from FIG. 1: its reference code, its full name, the prefix symbol used to identify it in the source code, an example of the source code form which might be used for it, the length it occupies in the object code (in bytes), and the size of the data value it represents (in bytes).

A typical source code line might look something like this:

```
nextstep:   do_dial   $telbuf   ;Dial host telephone number
```

FIG. 1: DATA TYPES COMPRISING EACH ZAPD PARAMETER TYPE

| Parameter Ref. Code Usual | (New) | Parameter category: Type of data: | Expressed in form of: | Default Data Type [00/none] | Alternate Data types: Any? | Alt1 [01] | Alt2 [10] | Alt3 [11]* |
|---|---|---|---|---|---|---|---|---|
| C | (Bc) | Byte | Constant | BC | No | | | |
| V | (Bv) | Byte | Variable | VS | Yes: | EB | SV | |
| X | (B) | Byte | Const or Var | BC | Yes: | VS | EB | SV |
| I | (Ic) | Integer | Constant | IC | No | | | |
| N | (Iv) | Integer | Variable | VI | Yes: | EI | SI | |
| Y | (I) | Integer | Const or Var | IC | Yes: | VI | EI | SI |
| S | (Sc) | String | Constant | SC | No | | | |
| B | (Sv) | String | Variable | BS | Yes: | ES | SB | |
| Z | (S) | String | Const or Var | SC | Yes: | BS | ES | SB |
| A | (A) | Address Constant | | EA | No | | | |
| P | (E) | Parm (for Ext. call) | | IC | Yes: | VB | VI | BS |
| W | (Z) | Parm (for ZAPD call) | | IC | Yes: | VI | BS | EA |
| R | (x) | Repetition factor | | | Doesn't apply . . . | | | |
| *Bitmap fld to select data type | | | | [00/none] | | [01] | [10] | [11] |

FIG. 2: ZAPD DATA TYPES AND THEIR SYMBOLS

| Data Ref | Type (New) | Data Type Name | Source Symbol | Source Example | Obj Len | Value Size |
|---|---|---|---|---|---|---|
| BC | (CB) | Constant - Byte | [0-9],' | 23 (or) 'F' | 1 | 1 |
| VS | (VB) | Variable - Byte | # | #numtran | 1 | 1 |
| EB | (EB) | Extended - Byte | @ | @dialtyp## | 2 | 1 |
| SV | (SB) | Stack Ref. - Byte | ^# | ^#1 | 1 | 1 |
| IC | (CI) | Constant - Integer | [0-9] | 400 (or) 0AH | 2 | 2 |
| VI | (VI) | Variable - Integer | & or # | &countdown | 1 | 2 |
| EI | (EI) | Extended - Integer | @ | @akeymap## | 2 | 2 |
| SI | (SI) | Stack Ref. - Integer | ^&, ^# | ^#1 | 1 | 2 |
| SC | (CS) | Constant - String | ' | 'NOT LAST' | n+1 | n |
| BS | (BS) | Variable - String(Buffer) | $ | $int2buf | 1 | n |
| ES | (ES) | Extended - String | @ | @stormsg## | 2 | n |
| SB | (SS) | Stack Ref. - String | ^$ | ^$2 | 1 | n |
| EA | (EA) | Extended - Address | @ | @nxtloop | 2 | 0 |

Note to Figures 1 and 2: In both tables, the parenthesized reference codes represent a proposed change in terminology from previous versions of the ZAPD reference materials. They are desgined to make the labeling of the data types and parameter categories more regular and easier to remember and interpret.

Note to FIGS. 1 and 2: In both tables, the parenthesized reference codes represent a proposed change in terminology from previous versions of the ZAPD reference materials. They are desgined to make the labeling of the data types and parameter categories more regular and easier to remember and interpret.

SECTION 2: USING THIS REFERENCE MANUAL

This manual presents a detailed discussion of each ZAPD language command using the following format:

| <Command Name> | |
|---|---|
| <Description of the command> | |
| <Command Name> | <Source Syntax> |
| Opcode Group: | <Opcode set> |
| Opcode Number: | <Opcode number - decimal> |
| Source Syntax: | <Parameter-type for each parameter - source order> |
| Object Seq.: | <Order of source parameters in object code> |
| Object Syntax: | <Parameter-type for each parameter - object order> |
| <Parameter 1> | <Parameter 1 description> |
| ... | |
| <Parameter n> | <Parameter n description> |

Future versions of this manual will have a source example for each command, and will have still more debugging information, including the hexadecimal values of each command, and the name and address of the execution routine for each command. SECTION 3: REFERENCE TABLES The following tables use the same format used for ZAPD equates to define the specific values required as parameters by certain commands. All tables in this section are referred to by number from the opcode and parameter descriptions in Section 4 of this manual. This section has most of the standard equates for a ZAPD program, including some (flagged with an asterisk) which would normally appear as table elements rather than parameters to a command, and some (flagged with a plus) which would normally appear as possible input data values rather than as parameters to a command.

As the tables are not in any particular order, a key to their numbering is given below:

LIST OF REFERENCE TABLES

| Table | Description |
|---|---|
| 1 | Clock Format Type Equates |
| 2 | Data Validity Check Byte/Word Type Equates |
| 3 | Comparison Operators and Values |
| 4 | Bit Maps of INPUT Devices (used by NEED_INPUT) |
| 5 | Numeric/String Conversion Types and Values |
| 6 | Table of ROM Actions callable from ZAPD |
| 7 | Control String Interpreter Entry Point Equates |
| 8 | Left of Right Justification Parameter for PAD_x |
| 9 | Bit Maps of OUTPUT Devices (used by SEND_xxx) |
| 10 | Modem Disable/Originate/Answer Mode Command Values |
| 11 | Operators for String, Byte, and Integer Arithmetic |
| 12 | Conditional Operators for Branch_If Command |
| 13* | File Security Values (for FILE SECURITY definition) |
| 14* | Compression type (for FILE Definition) |
| 15+ | MAPPED Keyboard Character Equates |
| 16+ | Possible inputs from TELCO device |
| 17 | Handset Enable/Disable Command Values |
| 18 | Printer Selection Command Values |
| 19 | Speaker On/Off Command Values |
| 20 | Telco On/Off Command Values |
| 21* | Keyboard Map Values (for INPUT ATTRIBUTE definitions) |
| 22* | Hardware device defines |
| 23(*) | Not applicable definitions (share various uses) |

* - Normally used as table entry, not command parameter
\+ - Normally an input data value, not command parameter

TABLE 1

Clock format defines

| | | | |
|---|---|---|---|
| E | MDYHMS | 0 | ;format 0, MMDDYYHHMMSS |
| E | DMYHMS | 1 | ;format 1, DDMMYYHHMMSS |
| E | YMDHMS | 2 | ;format 2, YYMMDDHHMMSS |
| E | FMDYHM | 3 | ;format 3, MM/DD/YY HH:MM |
| E | FDYMHM | 4 | ;format 4, DD/MM/YY HH:MM |
| E | FYMDHM | 5 | ;format 5, YY/MM/DD HH:MM |
| E | MDY | 6 | ;format 6, MMDDYY |
| E | DMY | 7 | ;format 7, DDMMYY |
| E | YMD | 8 | ;format 8, YYMMDD |
| E | FMDY | 9 | ;format 9, MM/DD/YY |
| E | FDMY | 10 | ;format 10, DD/MM/YY |
| E | FYMD | 11 | ;format 11, YY/MM/DD |
| E | FHMS | 12 | ;format 12, HH:MM:SS |

TABLE 6

| Valid Rom Actions for DO_ACTION | | | |
|---|---|---|---|
| EQUATE | R_ERROR | 0 | ;Error beep for invalid keys |
| EQUATE | R_ABORT | 1 | ;Return telco to initial state, READY |
| EQUATE | R_NOTHIN | 2 | ;Nothing, except for tweaking the modem |
| EQUATE | R_LEFT | 3 | ;Scroll display 16 characters right |
| EQUATE | R_RIGHT | 4 | ;Scroll display 16 characters left |
| EQUATE | R_REDIAL | 5 | ;Redial number saved from phone |
| EQUATE | R_UNPGMD | 6 | ;Beep, display KEY NOT PROGRMD |
| EQUATE | R_CHKHSE | 7 | ;Display phone line status or prompt 0 |
| EQUATE | R_CALC | 8 | ;Display CALC and clear calc buffers |
| EQUATE | R_SETDEC | 9 | ;Entry of Decimal Point |
| EQUATE | R_BUILDN | 10 | ;Entry of any valid digit for calc. |
| EQUATE | R_OPERAT | 11 | ;Entry of an operation key (+ − / =) |
| EQUATE | R_CLEAR | 12 | ;CE key in calculator, twice to clear |
| EQUATE | R_PHONE | 13 | ;Display PHONE and grab phone line |
| EQUATE | R_HSDOWN | 14 | ;Abort if handset goes on hook from off |
| EQUATE | R_DIALDI | 15 | ;Dial and display digit |
| EQUATE | R_DOMEMD | 16 | ;Display MEM DIAL and clear memdial no. |
| EQUATE | R_LOADON | 17 | ;Start download at any time, in any state |
| EQUATE | R_LONGFL | 18 | ;Drop line, wait 250 ms, pickup line |
| EQUATE | R_GETFIR | 19 | ;Get first digit of memory dial number |
| EQUATE | R_GET2DI | 20 | ;Get second digit of memory dial number |

TABLE 2

| Check-byte type defines | | | |
|---|---|---|---|
| E | LRC | 00 | ;8 bit longitudinal redundancy check |
| E | CRC | 01 | ;16 bit cyclic redundancy check |
| E | CKS | 02 | ;checksum |

TABLE 3

| Comparison Operators | | | |
|---|---|---|---|
| | | C Language Symbol | English name of corresponding comparison |
| E | EQ | 0 ; == | Equal to |
| E | LT | 1 ; < | Less than |
| E | LE | 2 ; <= | Less than or equal to |
| E | GT | 3 ; > | Greater than |
| E | GE | 4 ; >= | Greater than or equal to |
| E | NE | 5 ; != | Not equal to |

TABLE 4

Input Device Bitmap Values

Bitmap format: Meaning of bits 7 — 0, left to right

[No input] [Timer] [Telco] [PIN] [RS232] [Modem] [Keybd] [Card]

| | | | |
|---|---|---|---|
| ;EQUATE | NONE | 00 | ;run ONLY when no input present |
| EQUATE | CARD | 01 | ;run only when card input present |
| EQUATE | KEYBD | 02 | ;run only when key input present |
| EQUATE | MODEM | 04 | ;run only when modem input present |
| EQUATE | RS232 | 08 | ;run only when RS-232 input present |
| EQUATE | PINPAD | 16 | ;run only when PIN pad input present |
| EQUATE | TELCO | 32 | ;run only when telco input present |
| EQUATE | TIMER | 64 | ;run only when timer has expired |
| EQUATE | NOINPUT | 128 | ;run even when input/timers not ready |
| EQUATE | MODTIM | 68 | ;modem and timer |
| EQUATE | TELTIM | 96 | ;telco and timer |
| EQUATE | KEYTIM | 66 | ;keyboard and timer |
| EQUATE | KEYCRD | 03 | ;keyboard and card-reader |
| EQUATE | KEYCRDTIM | 67 | ;keyboard, card-reader, and timer |

TABLE 5

| Numeric/string conversion operator defines | | | |
|---|---|---|---|
| EQUATE | SIGNED | 0 | ;Not valid for byte conversions |
| EQUATE | UNSIGNED | 1 | |
| EQUATE | HEX | 2 | |

TABLE 7

| Control String Entry Points | | | |
|---|---|---|---|
| EQUATE | DE | 0 | ;Data Entry or Card Input |
| EQUATE | DR | 1 | ;Data Capture, file and record support |
| EQUATE | FM | 2 | ;Formatting, Printing |

TABLE 8

| PAD_CHAR and PAD_BYTE left or right justification | | | |
|---|---|---|---|
| EQUATE | LJUST | 0 | ;left justify (i.e. flush left) |
| EQUATE | RJUST | 1 | ;right justify (i.e. flush right) |

TABLE 9

| Output Device Bitmap Values | | | |
|---|---|---|---|
| EQUATE | DISPLAY | 01 | |
| EQUATE | PRINTER | 02 | |
| ;EQUATE | MODEM | 04 | ;same value as input |
| ;EQUATE | RS232 | 08 | ;same value as input |
| ;EQUATE | PINPAD | 16 | ;same value as input |
| EQUATE | UDLOUT | 06 | ;modem and serial port |

TABLE 10

| Modem Disable/Answer/Originate Command Values | | | |
|---|---|---|---|
| EQUATE | MDM_OFF | 0 | ; no carrier, modem disabled |
| EQUATE | OFF | 0 | ; no carrier, modem disabled |
| EQUATE | ORIG | 1 | ; originate carrier enabled |
| EQUATE | ANSR | 2 | ; answer carrier enabled |

TABLE 11

| Arithmetic Operators | | | | |
|---|---|---|---|---|
| | | | C Language Symbol | English name of Corresponding operation |
| EQUATE | ADD | 0 | ; + | add |
| EQUATE | SUB | 16 | ; − | subtract |
| EQUATE | MUL | 32 | ; * | multiply |
| EQUATE | DIV | 48 | ; / | divide |
| EQUATE | OR | 4 | ; \| | bitwise OR |
| EQUATE | AND | 5 | ; & | bitwise AND |
| EQUATE | XOR | 6 | ; | bitwise XOR |
| EQUATE | LAND | 7 | ; && | logical AND |
| EQUATE | LOR | 8 | ; \|\| | logical OR |
| EQUATE | SHL | 9 | ; << | shift 1st operand left by 2nd operand |
| EQUATE | SHR | 10 | ; >> | shift. 1st operand right by 2nd operand |
| EQUATE | MOD | 11 | ; % | modulus (remainder of p1/p2) |

TABLE 12

| Branch_if instruction equates | | | |
|---|---|---|---|
| EQUATE | EQ0 | 0 | ;Branch if variable equal to 0 |
| EQUATE | NE0 | 1 | ;Branch if variable not equal to 0 |
| EQUATE | GE0 | 2 | ;Branch if variable positive |
| EQUATE | LT0 | 3 | ;Branch if variable negative |

TABLE 13

| File Security Values (for FILE SECURITY definition) | | | |
|---|---|---|---|
| EQUATE | READ | 1 | ; Allows access via "Recall" |
| EQUATE | WRITE | 2 | ; Allows access via "Store" |
| EQUATE | BOTH | 3 | ; Allows both "Store" & "Recall" |

TABLE 14

| Compression type (for FILE Definition) | | | |
|---|---|---|---|
| ;EQUATE | NONE | 0 | ; No compression - any Ascii |
| EQUATE | SIXBIT | . 1 | ; Ascii alphanumeric only |
| EQUATE | BCD | 2 | ; Numeric/telephone digits only |

TABLE 15

| MAPPED Keyboard Character Equates | | | |
|---|---|---|---|
| EQUATE | ENTERKEY | 131 | ; Mchar of enter key |
| EQUATE | CEKEY | 129 | ; Mchar of backspace/CE key |
| EQUATE | HANGUPKEY | 137 | ; Mchar of hangup key |
| EQUATE | SHIFTKEY | 128 | ; Mchar of shift key |

TABLE 16

| Possible inputs from TELCO device | | | |
|---|---|---|---|
| EQUATE | HS_UP | 1 | ; User picked up handset |
| EQUATE | HS_DN | 2 | ; User hung up on handset |
| EQUATE | GOT_RNG | 3 | ; Ring received from line |
| EQUATE | GOT_CAR | 4 | ; Modem detected carrier |
| EQUATE | LST_CAR | 5 | ; Modem detected loss of carrier |
| EQUATE | LST_RNG | 6 | ; Ring from line has stopped |

TABLE 17

| Handset Enable/Disable Command Values | | | |
|---|---|---|---|
| EQUATE | HS_ENABLE | 0 | ; Handset enabled |
| EQUATE | HS_DISABLE | 255 | ; Handset disabled |

TABLE 18

| Printer Selection Command Values | | | |
|---|---|---|---|
| | | | Select printer type - NOT SUPPORTED |
| EQUATE | VFI | 00 | ; VFI Slip printer |
| EQUATE | ROLL | 01 | ; Roll printer, "generic" driver |
| EQUATE | EATON | 02 | ; Eaton Roll/Slip printer |
| | | | Select printer status - MAY BE USED |
| EQUATE | OPNJAW | 3 | ; VFI Slip printer - open jaws |

TABLE 19

| Speaker On/Off Command Values | | | |
|---|---|---|---|
| ;EQUATE | OFF | 0 | ; Speaker disabled |
| ;EQUATE | ON | 255 | ; Speaker enabled |

TABLE 20

| Telco On/Off Command Values | | | | |
|---|---|---|---|---|
| EQUATE | ONHOOK | 0 | ; Base unit goes | "on-hook" (disconnect) |
| EQUATE | OFFHOOK | 255 | ; Base unit goes | "off-hook" (connect) |
| ;EQUATE | OFF | 0 | ; Base unit goes | "on-hook" (disconnect) |
| ;EQUATE | ON | 255 | ; Base unit goes | "off-hook" (connect) |

TABLE 21

| Keyboard Map Values (for INPUT ATTRIBUTE definitions) | | | |
|---|---|---|---|
| EQUATE | K_NORM | 0 | ;Normal keyboard mapping |
| EQUATE | K_CALC | 1 | ;Maps '#' to '.', and '/' to '#' |

TABLE 22

| Hardware device defines | | | |
|---|---|---|---|
| EQUATE | TI | 01 | ; MODEM: Currently unused, might be req'd |
| EQUATE | TRK2 | 01 | ; CARDRDR: Currently unused, might be req'd |
| ;EQUATE | ROLL | 01 | ; PRINTER: Currently unused, might be req'd |

TABLE 23

| Definitions of null values (share various uses) | | |
|---|---|---|
| EQUATE | NA | 0 |
| EQUATE | NONE | 0 |

SECTION FOUR: ALPHABETIC LISTING OF COMMANDS

ABS_NULL

This command does nothing—it is equivalent to the NOP (No operation) in many machine languages. It is primarily of use in debugging and making direct patches to ZAPD code during the testing and development phases of an application. Because it is one byte long, a series of ABS_NULL commands (hexadecimal 00) can be used to temporarily delete a ZAPD command of any length.

| | |
|---|---|
| ABS_NULL | None |
| Opcode Group: | 0 |
| Opcode Number: | 0 |
| Source Syntax: | |
| Object Seq.: | |
| Object Syntax: | |
| Entry Point: | zASNUL |
| Hex Opcode #: | 00 |

APPEND_REC

Add the data in a specified buffer as the last record in the specified file. The current record pointer will not be changed. NOTE: CAT_RECORD is the command to use to add data stored in memory to the end of a buffer.

| | |
|---|---|
| APPEND_REC | <file> <buffer> |
| Opcode Group: | 1 |
| Opcode Number: | 0 |
| Source Syntax: | XB |
| Object Seq.: | 1-2 |
| Object Syntax: | XB |
| Entry Point: | zAPREC |
| Hex Opcode #: | 00 |
| <file> | File to which record will be added. |
| <buffer> | Contains data that will be stored as the last record in the specified file. |

BRANCH_CASE

Compare string in a specified buffer against all the records in the designated file for an exact match. The record format should be <target string> <address to branch to> where the branch address appears in the source as a public label. Address should be stored as four ASCII hex digits. No spaces should be between target and branch address. On exact match, program will branch to address in that record. If no mach, then next command will be executed.

| | |
|---|---|
| BRANCH_CASE | <file> <buffer> <position> <length> |
| Opcode Group: | 1 |
| Opcode Number: | 1 |
| Source Syntax: | XBXX |
| Object Seq.: | 1-3-4-2 |
| Object Syntax: | XXXB |
| Entry Point: | zBACAS |
| Hex Opcode #: | 01 |
| <file> | Contains case statement entries. Each record has one case and one address. |

-continued

| | |
|---|---|
| <buffer> | Contains the string to be tested against case statements. |
| <position> | Points to beginning of the test item in the buffer. |
| <length> | Number of characters in the source buffer to compare against case statement |

BRANCH_GOTO

Causes program to branch to address label in the command.

| | |
|---|---|
| BRANCH_GOTO | <Address> |
| Opcode Group: | 0 |
| Opcode Number: | 1 |
| Source Syntax: | A |
| Object Seq.: | 1 |
| Object Syntax: | A |
| Entry Point: | zBAGOT |
| Hex Opcode #: | 01 |
| <Address> | Address for unconditional branch. |

BRANCH_IF

Test the specified integer variable according to the specified evaluation type, and branch to the specified address if the result is true otherwise continue to the next command. Table 11 contains a list of evaluation types in brief, they allow a test for the variable being zero, non-zero, positive (including zero), or negative. This command can be used as a short form for the most common cases of the more general CHK_xxx commands. See Table 12 for possible values.

| | |
|---|---|
| BRANCH_IF | <variable> <evaluation type> <address> |
| Opcode Group: | 0 |
| Opcode Number: | 2 |
| Source Syntax: | NXA |
| Object Seq.: | 2-1-3 |
| Object Syntax: | XNA |
| Entry Point: | zBAIF |
| Hex Opcode #: | 02 |
| <variable> | Integer variable to be tested. |
| <comparison> | Type of comparison to test for. (Table 12). |
| <address> | Branch address if comparison succeeds. |

BRANCH_INDEX

A position parameter of n will cause the program to branch to the nth label in a string of address labels in the branch table buffer (BRNTBL). The labels are stored as four ASCII hex digits in the object code, although they are public labels in the source. (An index of 3 will select the address in bytes 9-12.) This can be used to select a set of actions by loading the BRNTBL. One of these will be selected at a later time when this command is executed. BRNTBL must contain valid addresses.

| | |
|---|---|
| BRANCH_INDEX | <position> |
| Opcode Group: | 0 |
| Opcode Number: | 3 |
| Source Syntax: | X |
| Object Seq.: | 1 |
| Object Syntax: | X |
| Entry Point: | zBAIND |
| Hex Opcode #: | 03 |
| <position> | Index of 4 byte field in BRNTBL, not absolute displacement, of address. |

BRANCH_RANGE

Compare string in a specified buffer with all records in a designated file to determine which will contain the range the string falls within. The file contains the following: <low value> <high value> <branch address> Where the branch address in the source is a public symbol, and is stored as four ASCII hex digits. No space or characters are permitted between fields. When the string falls within a range, pro gram branches to address. No match next command.

| BRANCH_RANGE | <file> <buffer> <position> <length> |
|---|---|
| Opcode Group: | 1 |
| Opcode Number: | 2 |
| Source Syntax: | XBXX |
| Object Seq.: | 1-3-4-2 |
| Object Syntax: | XXXB |
| Entry Point: | zBARAN |
| Hex Opcode #: | 02 |
| <file> | Contains range table. |
| <buffer> | Contains the value to be "ranged". |
| <position> | Points to the beginning of the test item. |
| <length> | Number of test item characters to compare. |

BRANCH_ROM

Find the jump/branch instruction at the specified ıddress, load the destination address in that branch nstruction, and immediately branch to that address.

NOTE: This command differs from simply using the 3RANCH_GOTO comand to branch to a branch op:ode, in that it does not return to the interpreter before :xecuting the second branch. This allows entries to ROM ZAPD subroutines to be placed in a jumptable, vithout raising a BAD INSTR PNTR error.

| IRANCH_ROM | <jumptable entry address> |
|---|---|
| )pcode Group: | 1 |
| )pcode Number: | 3 |
| ource Syntax: | A |
| )bject Seq.: | 1 |
| )bject Syntax: | A |
| ntry Point: | zBAROM |
| lex Opcode #: | 03 |
| :Entry Address> | Address of the ROM routine. Entered as a symbolic value. |

BRANCH_SWITCH

Integer case statement for non-contiguous ranges of ata not larger than 255 cases. The bit map is treated as set defining the accepted values. For a value of i, the h bit in the bit map is examined. If it is true (1), the ddress in the address string corresponding to that bit is :lected as the branch address. If the bit is zero or i fails ut of the set range, the next command is executed. The rst bit in each set is for the value zero.

| RANCH_SWITCH | Nvariable> <bit map> <string with addresses> |
|---|---|
| pcode Group: | 0 |
| pcode Number: | 4 |

-continued

| | |
|---|---|
| Source Syntax: | XZZ |
| Object Seq.: | 1-2-3 |
| Object Syntax: | XZZ |
| Entry Point: | zBASWI |
| Hex Opcode #: | 04 |
| <variable> | Contains variable to be tested against the bit map. Assumed dense matrix. |
| <bit map> | Bits representing presence or absence of value. |
| <String w/addr> | string of addresses representing success match. |

BRK_POINT

Used to debug ZAPD code. Currently this command does no action whatever. The <Bpoint Number> is inserted into the code following two bytes of opcode identifier, and can be used to distinguish between different breakpoints.

| BRK_POINT | <Bpoint Number> |
|---|---|
| Opcode Group: | 1 |
| Opcode Number: | 4 |
| Source Syntax: | C |
| Object Seq.: | 1 |
| Object Syntax: | C |
| Entry Point: | zBKPOI |
| Hex Opcode #: | 04 |
| <Bpoint Number> | Unique reference number for this breakpoint. |

CALC_BYTE

Perform the specified arithmetical or logical operation on the specified byte values, and store the result in the specified destination byte variable. Table 11 contains a list of the codes for the valid arithmetical and logical operations.

| CALC_BYTE | <d. variable> <operand 1> <operator> <operand 2> |
|---|---|
| Opcode Group: | 0 |
| Opcode Number: | 5 |
| Source Syntax: | VXXX |
| Object Seq.: | 2-3-4-1 |
| Object Syntax: | XXXV |
| Entry Point: | zCLBYT |
| Hex Opcode #: | 05 |
| <d. variable> | Byte variable to receive result. |
| <operand 1> | First operand (variable or constant). |
| <operator> | Type of arithmetic operation to perform. |
| <operand 2> | Second operand (variable or constant). |

CALC_INT

Perform the specified arithmetical or logical operation on the two specified integer values, and store the result in the specified destination integer variable. Table 11 contains a list of the codes for the valid arithmetical and logical operations.

| CALC_INT | <d. variable> <operand 1> <operator> <operand 2> |
|---|---|
| Opcode Group: | 0 |
| Opcode Number: | 6 |
| Source Syntax: | NYXY |
| Object Seq.: | 2-3-4-1 |
| Object Syntax: | YXYN |
| Entry Point: | zCLINT |
| Hex Opcode #: | 06 |
| <d. variable> | Integer variable to receive results. |

-continued

| | |
|---|---|
| <operand 1> | First operand (variable or constant). |
| <operator> | Type of arithmetic operation to perform. |
| <operand 2> | Second operand (variable or constant). |

CALL

Begin ZAPD subroutine. ZAPD instruction pointer is pushed onto ZAPD stack and control is transferred to subroutine. This command can also be used to transfer up to ten parameters to the called subroutine. Any value returned by the subroutine will be returned in the completion code (END_CODE) of the job that issued the subroutine call. All parameters are "call by address", so the subroutine may update them to return values to the calling routine.

| | |
|---|---|
| CALL | <Address> <# parameters> <par 1 . . . n> |
| Opcode Group: | 0 |
| Opcode Number: | 7 |
| Source Syntax: | ACRW |
| Object Seq.: | 1-2 |
| Object Syntax: | ACRW |
| Entry Point: | zCLCAL |
| Hex Opcode #: | 07 |
| <Address> | Address of Subroutine. |
| <# parameters> | Number of parameters being passed to the called subroutine. |

CAT_ACCUM

Concatenate the specified accumulator record to the end of the designated buffer.

| | |
|---|---|
| CAT_ACCUM | <buffer> <record> |
| Opcode Group: | 0 |
| Opcode Number: | 8 |
| Source Syntax: | BX |
| Object Seq.: | 2-1 |
| Object Syntax: | XB |
| Entry Point: | zCTACC |
| Hex Opcode #: | 08 |
| <buffer> | Destination buffer. |
| <record> | Accumulator to be concatenated to specified buffer. |

CAT_BYTE

Concatenate value of specified variable to the end of the designated buffer.

| | |
|---|---|
| CAT_BYTE | <buffer> <variable> |
| Opcode Group: | 0 |
| Opcode Number: | 9 |
| Source Syntax: | BV |
| Object Seq.: | 2-1 |
| Object Syntax: | VB |
| Entry Point: | zCTBYT |
| Hex Opcode #: | 09 |
| <buffer> | Destination buffer. |
| <variable> | Byte stored at this address will be concatenated to buffer. |

CAT_CHAR

Concatenate character constant to the end of the designated buffer.

| | |
|---|---|
| CAT_CHAR | <buffer> <char const> |
| Opcode Group: | 0 |
| Opcode Number: | 10 |
| Source Syntax: | BC |
| Object Seq.: | 1-2 |
| Object Syntax: | BC |
| Entry Point: | zCTCHA |
| Hex Opcode #: | 0A |
| <buffer> | Destination buffer. |
| <char const> | ASCII character constant. |

CAT_CLOCK

Concatenate the current system clocdk value using the designated clock format type to the end of the designated buffer. See Table 1 for an explanation of clock format types.

| | |
|---|---|
| CAT_CLOCK | <buffer> <clk format> |
| Opcode Group: | 1 |
| Opcode Number: | 5 |
| Source Syntax: | BX |
| Object Seq.: | 1-2 |
| Object Syntax: | BX |
| Entry Point: | zCTCLO |
| Hex Opcode #: | 05 |
| <buffer> | Destination buffer. |
| <clk format> | Coded value for clock format (Table 1). |

CAT_FLD

Concatenate a substring from a source buffer to the end of the designated destination buffer. Length of zero will concatenate the field from the starting position specified through the end of the source string.

| | |
|---|---|
| CAT_FLD | <d.buff> <s.buff> <s.posit> <s.len> |
| Opcode Group: | 1 |
| Opcode Number: | 6 |
| Source Syntax: | BBXX |
| Object Seq.: | 3-4-1-2 |
| Object Syntax: | XXBB |
| Entry Point: | zCTFLD |
| Hex Opcode #: | 06 |
| <d.buff> | Destination Buffer. |
| <s.buff> | Source buffer. |
| <s.posit> | Position in source buffer to begin. |
| <s.len> | Length of source buffer. Zero means entire buffer. |

CAT_LRC

Compute validation value (LRC, CRC-16 or chksum) on designated buffer, beginning at specified position through the end of the buffer, and then concatenate the result to the end of the buffer. See Table 2 for a list of the possible validation types.

| | |
|---|---|
| CAT_LRC | <buffer> <position> <type validity> |
| Opcode Group: | 1 |
| Opcode Number: | 7 |
| Source Syntax: | BXX |
| Object Seq.: | 2-1-3 |
| Object Syntax: | XBX |
| Entry Point: | zCTLRC |
| Hex Opcode #: | 07 |
| <buffer> | Destination buffer. |
| <position> | Position in buffer from which LRC computations will begin. |
| <type validity> | Coded value for validation (LRC, CRC16, checksum, etc.) to be used. |

CAT_RECORD

Concatenate data in source file/record to the end of the designated buffer.

| CAT_RECORD | <buffer> <file> <record> |
|---|---|
| Opcode Group: | 0 |
| Opcode Number: | 11 |
| Source Syntax: | BXX |
| Object Seq.: | 2-3-1 |
| Object Syntax: | XXB |
| Entry Point: | zCTREC |
| Hex Opcode #: | 0B |
| <buffer> | Destination buffer. |
| <file> | Source file. |
| <record> | Source record. |

CAT_SEQ

Concatenate the specified record in the master sequence number file to the end of the designated buffer.

| CAT_SEQ | <buffer> <record> |
|---|---|
| Opcode Group: | 1 |
| Opcode Number: | 8 |
| Source Syntax: | BX |
| Object Seq.: | 2-1 |
| Object Syntax: | XB |
| Entry Point: | zCTSEQ |
| Hex Opcode #: | 08 |
| <buffer> | Destination buffer. |
| <record> | Specified master sequence number. |

CAT_STRCON

Concatenate string to the end of the designated buffer. May overflow destination buffer, and care must be taken to make sure this does not happen.

| CAT_STRCON | <buffer> <str constant> |
|---|---|
| Opcode Group: | 0 |
| Opcode Number: | 12 |
| Source Syntax: | BZ |
| Object Seq.: | 1-2 |
| Object Syntax: | BZ |
| Entry Point: | zCTSTR |
| Hex Opcode #: | 0C |
| <buffer> | Destination buffer. |
| <str value> | Counted string constant or variable. |

CAT_WCC

Adds a write control character (WCC) to the end of the designated buffer. Also sets a pointer to the WCC so that it can be later updated with the SET_WCC command. The trancode is the initial value which will be placed in the byte, and may be ORed with a different value when the SET_WCC command is executed. Bit 0=mag card indicator, Bit 1=multi-trans, Bits 2-5=trancode, Bit 6=always one.

| CAT_WCC | <buffer> <trancode> |
|---|---|
| Opcode Group: | 1 |
| Opcode Number: | 9 |
| Source Syntax: | BX |
| Object Seq.: | 2-1 |
| Object Syntax: | XB |
| Entry Point: | zCTWCC |
| Hex Opcode #: | 09 |
| <buffer> | Destination buffer. |
| <trancode> | Value to be inserted in tran type bit field of write control character. |

-continued

CHK_ACCUM

Test accumulator against specified value and branch if the test passes. If test fails, execute the next command. The test value must be a string. Table 3 contains a list of the comparison operators.

| CHK_ACCUM | <accum> <operator> <value> <address> |
|---|---|
| Opcode Group: | 1 |
| Opcode Number: | 10 |
| Source Syntax: | XXZA |
| Object Seq.: | 1-3-2-4 |
| Object Syntax: | XZXA |
| Entry Point: | zCKACC |
| Hex Opcode #: | 0A |
| <accum> | Accumulator to be tested. |
| <operator> | Type of test to be performed. (Table 3) |
| <value> | String to be tested against accumulator. |
| <address> | Branch address if test passes. |

CHK_ANS_PHONE

Check to see if the specified number of seconds has elapsed since the start of an incoming call. Branch if at least that number of seconds has elapsed. If no incoming call is pending, do not branch. Also, do not branch if the required number of seconds have not elapsed.

| CHK_ANS_PHONE | <Num of Seconds> <Address> |
|---|---|
| Opcode Group: | 1 |
| Opcode Number: | 11 |
| Source Syntax: | XA |
| Object Seq.: | 1-2 |
| Object Syntax: | XA |
| Entry Point: | zCKANS |
| Hex Opcode #: | 0B |
| <Num of Seconds | Number of seconds from start of ring required to take branch address. |
| <Address> | Branch address if number of seconds past is greater than number seconds specified |

CHK_BYTE

Compare byte variable against other byte variable specified in the command, and branch if the test succeeds. If the test fails, execute the next command. Table 3 contains a list of comparison operators.

| CHK_BYTE | <variable> <operator> <variable> <Address> |
|---|---|
| Opcode Group: | 0 |
| Opcode Number: | 13 |
| Source Syntax: | VXVA |
| Object Seq.: | 1-3-2-4 |
| Object Syntax: | VVXA |
| Entry Point: | zCKBYT |
| Hex Opcode #: | 0D |
| <variable> | Variable to be tested. |
| <operator> | Type of test to be performed. (Table 3) |
| <variable> | Value to be tested against variable. |
| <Address> | Address to branch to if test passes. |

CHK_CHAR

Test byte variable against specified byte constant and branch if test passes. If the test fails, execute the next address. Table 3 contains a list of comparison operators.

| | |
|---|---|
| CHK_CHAR | <variable> <operator> <char constant> <address> |
| Opcode Group: | 0 |
| Opcode Number: | 14 |
| Source Syntax: | VXCA |
| Object Seq.: | 1-2-3-4 |
| Object Syntax: | VXCA |
| Entry Point: | zCKCHA |
| Hex Opcode #: | 0E |
| <variable> | Variable to be tested. |
| <operator> | Type of test to be performed. (Table 3) |
| <char constant> | Character constant. |
| <address> | Address to branch to if test succeeds. |

CHK_CKBYTE

Each ZAPD file has a checksum. This command is used to test to see if a file has become corrupted. Branches if file is corrupted. If it is not corrupted, then continue with the next command.

| | |
|---|---|
| CHK_CKBYTE | <file> <address> |
| Opcode Group: | 1 |
| Opcode Number: | 12 |
| Source Syntax: | XA |
| Object Seq.: | 1-2 |
| Object Syntax: | XA |
| Entry Point: | zCKCKB |
| Hex Opcode #: | 0C |
| <file> | File to test to see if has been corrupted. |
| <address> | Branch address if file has been corrupted. |

CHK_CLOCK

Compare clock value in the command with the current system clock. Branch if the test passes. If the test fails, execute the next command. Table 1 contains a list of clock formats. Table 3 contains a list of comparison operators.

| | |
|---|---|
| CHK_CLOCK | <clock format> <operator> <str value> <address> |
| Opcode Group: | 1 |
| Opcode Number: | 13 |
| Source Syntax: | XXZA |
| Object Seq.: | 3-1-2-4 |
| Object Syntax: | ZXXA |
| Entry Point: | zCKCLO |
| Hex Opcode #: | 0D |
| <clock format> | Format for testing system clock. (Table 7) |
| <operator> | Type of test to be performed on system clock. (Table 3) |
| <str value> | String value (constant or variable) to test against system clock. |
| <address> | Branch address if test passes. |

CHK_DIAL_DONE

Test to see if the telephone dialing is finished. Branch if dialing is finished. Continue with the next command if it is not finished. NOTE: Finishing dialing does not imply that the connection has been established yet, only that the last digit has been dialed.

| | |
|---|---|
| CHK_DIAL_DONE | <Address> |
| Opcode Group: | 0 |
| Opcode Number: | 15 |
| Source Syntax: | A |
| Object Seq.: | 1 |
| Object Syntax: | A |
| Entry Point: | zCKDIA |
| Hex Opcode #: | 0F |
| <Address> | Branch address if dialing is finished. |

CHK_END_CODE

Compare the completion code (END_CODE) for the specified job with the specified comparison value, and branch to the specified address if the result of the comparison is true. Table 3 contains a list of the valid comparison operators. This command can be used to check whether a particular job or subroutine call executed successfully, or to find what type of result it had.

| | |
|---|---|
| CHK_END_CODE | <job number> <operator> <comparison value> <branch address> |
| Opcode Group: | 0 |
| Opcode Number: | 16 |
| Source Syntax: | XXYA |
| Object Seq.: | 1-2-3-4 |
| Object Syntax: | XXYA |
| Entry Point: | zCKEND |
| Hex Opcode #: | 10 |
| <job number> | ZAPD job identification number. (255=current job) |
| <operator> | Type of comparison to do. (Table 3) |
| <comp value> | Byte value to test for. |
| <address> | Branch address if the comparison succeeds. |

CHK_FILESIZE

Compare the number of records in a specified file against the number of records specified in the command. Branch if test passes. If the test fails, do the next command. NOTE: The file size is the record number of the last allocated record in the file. Table 3 contains a list of comparison operators.

| | |
|---|---|
| CHK_FILESIZE | <file> <operator> <filesize> <address> |
| Opcode Group: | 1 |
| Opcode Number: | 14 |
| Source Syntax: | XXXA |
| Object Seq.: | 1-3-2-4 |
| Object Syntax: | XXXA |
| Entry Point: | zCKFIL |
| Hex Opcode #: | 0E |
| <file> | File to test. |
| <operator> | Type of test to perform. (Table 3) |
| <filesize> | value to test filesize against. |
| <address> | Branch address if test passes. |

CHK_INSRCE

Determine if input is waiting from a specific input device(s). Branch if any of the specified devices have input. If they do not have data, continue with the next command. Table 4 contains a list of input devices and their bit locations.

| | |
|---|---|
| CHK_INSRCE | <Input Bit Map> <Address> |
| Opcode Group: | 0 |
| Opcode Number: | 17 |
| Source Syntax: | XA |
| Object Seq.: | 1-2 |
| Object Syntax: | XA |
| Entry Point: | zCKINS |
| Hex Opcode #: | 11 |
| <Input Bit Map> | Input device specifier. (Table 4) |
| <Address> | Branch address if input is from the specified input device(s). |

CHK_INT

Compare two sixteen bit integer variables and branch if the test passes. Continue with the next command if the test fails. Table 3 contains a list of comparison operators.

| | |
|---|---|
| CHK_INT | <variable> <operator> <variable> <address> |
| Opcode Group: | 0 |
| Opcode Number: | 18 |
| Source Syntax: | NXNA |
| Object Seq.: | 1-3-2-4 |
| Object Syntax: | NNXA |
| Entry Point: | zCKINT |
| Hex Opcode #: | 12 |
| <variable> | Address of the 16 bit variable to test. |
| <operator> | Type of test to perform. (Table 3) |
| <variable> | Address of second 16 bit variable. |
| <address> | Branch address if the test passes. |

CHK_INTCON

Compare sixteen bit integer variable with a sixteen bit constant and branch if the test passes. If the test fails, continue with the next command. Table 3 contains a list of comparison operators.

| | |
|---|---|
| CHK_INTCON | <variable> <operator> <int constant> <address> |
| Opcode Group: | 0 |
| Opcode Number: | 19 |
| Source Syntax: | NXIA |
| Object Seq.: | 1-2-3-4 |
| Object Syntax: | NXIA |
| Entry Point: | zCKIN1 |
| Hex Opcode #: | 13 |
| <variable> | Address of 16 bit variable. |
| <operator> | Type of test to perform. (Table 3) |
| <int constant> | 16 bit signed integer constant. |
| <address> | Branch address if test passes. |

CHK_JOB_DONE

Test to see if specific job is finished or if it is still running. Branch if the job is finished. If the job is still running, continue with the next command.

| | |
|---|---|
| CHK_JOB_DONE | <jobid> <address> |
| Opcode Group: | 0 |
| Opcode Number: | 20 |
| Source Syntax: | XA |
| Object Seq.: | 1-2 |
| Object Syntax: | XA |
| Entry Point: | zCKJOB |
| Hex Opcode #: | 14 |
| <jobid> | Job Identification Number. |
| <address> | Branch address if the job is finished. |

CHK_LENGTH

Compare the length of a designated buffer with the length specified in the command. Branch if the test passes. If the length test fails, continue with the next command. NOTE: The length of ZAPD buffers or strings INCLUDES the count byte making the true length one more than the apparent length. The string 'TEST' has a length of five.

| | |
|---|---|
| CHK_LENGTH | <buffer> <operator> <value> <address> |
| Opcode Group: | 0 |
| Opcode Number: | 21 |
| Source Syntax: | BXXA |
| Object Seq.: | 3-1-2-4 |
| Object Syntax: | XBXA |
| Entry Point: | zCKLEN |
| Hex Opcode #: | 15 |
| <buffer> | Destination buffer. |
| <operator> | Type of test to perform. |
| <value> | Test length value. |
| <address> | Branch address if test passes. |

CHK_LRC

Compare the vaidation value computed on the buffer with the last one or two bytes (depending upon the validation type) in the buffer. Branch if they are the same. If they are different continue to the next command. Table 2 contains a list of the validation types.

| | |
|---|---|
| CHK_LRC | <buffer> <posit start> <type> <address> |
| Opcode Group: | 1 |
| Opcode Number: | 15 |
| Source Syntax: | BXXA |
| Object Seq.: | 2-3-1-4 |
| Object Syntax: | XXBA |
| Entry Point: | zCKLRC |
| Hex Opcode #: | 0F |
| <buffer> | Source buffer. |
| <posit start> | Location in buffer to begin computing LRC. |
| <type> | Type of validity check to do. (Table 2) |
| <address> | Branch address if LRC computation passes. |

CHK_LUHN10

Test whether the digit at the specified position of the designated buffer is a valid check-digit for the remainder of the buffer contents; if it is valid, branch to the specified address. Otherwise continue to the next command. NOTE: The entire contents of the buffer are expected to be ASCII numeric digits.

| | |
|---|---|
| CHK_LUHN10 | <buffer> <check-digit pos> <branch address> |
| Opcode Group: | 1 |
| Opcode Number: | 16 |
| Source Syntax: | BXA |
| Object Seq.: | 2-1-3 |
| Object Syntax: | XBA |
| Entry Point: | zCKLUH |
| Hex Opcode #: | 10 |
| <buffer> | Buffer containing string to be checked. |
| <position> | Position of the check digit in the string. |
| <address> | Branch address if string contains the correct Luhn check digit. |

CHK_MEMLOK

Check A000h memory and see if memory switch (8) is locked. If it is unlocked so that memory can be changed, branch. If it is locked, continue with the next command.

| | |
|---|---|
| CHK_MEMLOK | <Address> |
| Opcode Group: | 1 |
| Opcode Number: | 17 |
| Source Syntax: | A |
| Object Seq.: | 1 |
| Object Syntax: | A |
| Entry Point: | zCKMEM |
| Hex Opcode #: | 11 |
| <Address> | Branch address if memory is UNLOCKED. |

CHK_MODE

Compare the current system security mode with the value in this command. Branch if the test passes and do the next command if the test fails. Table 3 contains a list of the comparison operators.

| | |
|---|---|
| CHK_MODE | <operator> <value> <address> |
| Opcode Group: | 1 |
| Opcode Number: | 18 |
| Source Syntax: | XXA |
| Object Seq.: | 2-1-3 |
| Object Syntax: | XXA |
| Entry Point: | zCKMOD |
| Hex Opcode #: | 12 |
| <operator> | Type of test to perform (Table 3) |
| <value> | Value to test mode against. |
| <address> | Branch address if test passes. |

CHK_PASSWORD

Check buffer contents against each record in the password file. If the password is found, branch to the address given in the command, and set the current security mode to the value found in that record. If the password is not found, execute the next command and set the mode to zero.

| | |
|---|---|
| CHK_PASSWORD | <file> <buffer> <address> |
| Opcode Group: | 1 |
| Opcode Number: | 19 |
| Source Syntax: | XZA |
| Object Seq.: | 1-2-3 |
| Object Syntax: | XZA |
| Entry Point: | zCKPAS |
| Hex Opcode #: | 13 |
| <file> | File containing passwords. |
| <buffer> | Buffer containing user password to be validated. |
| <address> | Branch address if password is valid. |

CHK_PRT_EXIST

Test to see if a printer is attached, and branch if it is attached. If it is not attached, execute the next command.

| | |
|---|---|
| CHK_PRT_EXIST | <Address> |
| Opcode Group: | 0 |
| Opcode Number: | 22 |
| Source Syntax: | A |
| Object Seq.: | 1 |
| Object Syntax: | A |
| Entry Point: | zCKPRT |

-continued

| | |
|---|---|
| Hex Opcode #: | 16 |
| <Address> | Branch address if printer exists. |

CHK_PRT_RDY

Test to see if the printer is able to print data. Branch if it is able to print. Continue with the next command if it is not ready. NOTE: Printer ready means that paper is inserted, and the printer is not actively printing at this moment. It does not mean that there is necessarily room in the output buffer to send more data to the printer./

| | |
|---|---|
| CHK_PRT_RDY | <Address> |
| Opcode Group: | 0 |
| Opcode Number: | 23 |
| Source Syntax: | A |
| Object Seq.: | 1 |
| Object Syntax: | A |
| Entry Point: | zCKPR1 |
| Hex Opcode #: | 17 |
| <Address> | Branch address if printer is ready to receive data. |

CHK_SEQ

Compare the specified record in the master sequence number file with the value provided in the command. Branch if the test passes. Execute the next command if it fails. Table 3 contains a list of comparison operators.

| | |
|---|---|
| CHK_SEQ | <record> <operator> <str value> <address> |
| Opcode Group: | 1 |
| Opcode Number: | 20 |
| Source Syntax: | XXZA |
| Object Seq.: | 1-3-2-4 |
| Object Syntax: | XZXA |
| Entry Point: | zCKSEQ |
| Hex Opcode #: | 14 |
| <record> | Record containing master sequence number to be tested. |
| <operator> | Type of test to perform. (Table 3) |
| <str value> | Counted string value to compare to designated master sequence number. |
| <address> | Branch address if test passes. |

CHK_TELCO_RDY

Check to see if an outside telco line is available. If line is available, grab the line in preparation for dialing, and branch to the specified address. If the line is not available, execute the next command. NOTE: The test will fail whenever there is insufficient voltage on the telephone line; either because another unit is using the line or because the terminal is not connected to a telco line.

| | |
|---|---|
| CHK_TELCO_RDY | <address> |
| Opcode Group: | 0 |
| Opcode Number: | 24 |
| Source Syntax: | A |
| Object Seq.: | 1 |
| Object Syntax: | A |
| Entry Point: | zCKTEL |
| Hex Opcode #: | 18 |

-continued

| | |
|---|---|
| <address> | Branch address if an outside line is available. |

CHK_TIMEOUT

Check the ZAPD timer that has been set for the current job, and branch if it has timed out. Continue with the next command if the timer has not expired.

| | |
|---|---|
| CHK_TIMEOUT | <Address> |
| Opcode Group: | 0 |
| Opcode Number: | 25 |
| Source Syntax: | A |
| Object Seq.: | 1 |
| Object Syntax: | A |
| Entry Point: | zCKTIM |
| Hex Opcode #: | 19 |
| <Address> | Branch address if current job has timed out. |

CHK_ZAPD

Check ZAPD program memory area and determine whether or not it has been corrupted. If it has been corrupted, branch. If the program memory is not corrupted, continue with the next command.

| | |
|---|---|
| CHK_ZAPD | <Address> |
| Opcode Group: | 1 |
| Opcode Number: | 21 |
| Source Syntax: | A |
| Object Seq.: | 1 |
| Object Syntax: | A |
| Entry Point: | zCKZAP |
| Hex Opcode #: | 15 |
| <Address> | Branch address if ZAPD download area in A000h is corrupted. |

CHNG_BYTE

Search a designated buffer for an 8 bit value. If found, replace value with counted string specified in the command. NOTE: The replacement string does NOT have to be one byte long. It may be either longer or shorter than the value it replaces. Therefore, this command may change the length of the buffer! Special care must be taken to not exceed the maximum length of the buffer! If not found, nothing is changed. Search and replacement start and length are set by parameters

| | |
|---|---|
| CHNG_BYTE | <buf dest> <pos dest> <len dest> <value> <replace str> |
| Opcode Group: | 1 |
| Opcode Number: | 22 |
| Source Syntax: | BXXXZ |
| Object Seq.: | 2-3-4-5-1 |
| Object Syntax: | XXXZB |
| Entry Point: | zCNBYT |
| Hex Opcode #: | 16 |
| <buf dest> | Destination buffer. |
| <pos dest> | Position in destination buffer to begin searching for target byte. |
| <len dest> | Length of destination buffer to search. |
| <value> | Value to search for in the buffer. |
| <replace str> | Counted string replacement if target string is found. |

CHNG_STRING

Search buffer for string. If found replace with replacement counted string. The search begins at the specified position and continues for the specified length. NOTE: The replacement string may be either longer or shorter than the original string resulting in a change in the final buffer length. Special care must be taken to not exceed the maximum buffer length! If not found, nothing is changed.

| | |
|---|---|
| CHNG_STRING | <buf dest> <posit dest> <len dest> <str value> <replace str> |
| Opcode Group: | 1 |
| Opcode Number: | 23 |
| Source Syntax: | BXXZZ |
| Object Seq.: | 2-3-5-1-4 |
| Object Syntax: | XXZBZ |
| Entry Point: | zCNSTR |
| Hex Opcode #: | 17 |
| <buf dest> | Destination buffer. |
| <posit dest> | Position in the destination buffer from which search will begin. |
| <len dest> | Number of bytes in destination buffer to search. |
| <str value> | String constant or variable to search for. |
| <replace str> | String constant or variable that will replace target string if target found. |

CNVRT_B2I

Convert an eight bit variable to a sixteen bit variable. High order byte in integer variable will be zeroed.

| | |
|---|---|
| CNVRT_B2I | <variable> <variable> |
| Opcode Group: | 0 |
| Opcode Number: | 26 |
| Source Syntax: | NV |
| Object Seq.: | 1-2 |
| Object Syntax: | NV |
| Entry Point: | zCVB2I |
| Hex Opcode #: | 1A |
| <variable> | Address 16 bit variable. |
| <variable> | Address 8 bit variable. |

CNVRT_B2STR

Convert the value of an eight bit variable to a string value which is then concatenated to the end of the specified buffer. Table 5 contains a list of the conversion types. SIGNED is not a valid parameter for this command.

| | |
|---|---|
| CNVRT_B2STR | <buffer> <type convers> <variable> |
| Opcode Group: | 0 |
| Opcode Number: | 27 |
| Source Syntax: | BXV |
| Object Seq.: | 3-1-2 |
| Object Syntax: | VBX |
| Entry Point: | zCVB2S |
| Hex Opcode #: | 1B |
| <buffer> | Destination string. |
| <type convers> | Type of conversion requested. (Table 5) |
| <variable> | Address of 8 bit variable to convert to a string. |

CNVRT_I2B

Convert a sixteen bit variable to an eight bit variable. High order byte of integer variable will be dropped when it is moved to the byte variable. Only the low order byte is moved.

| | |
|---|---|
| CNVRT_I2B | <variable> <variable> |
| Opcode Group: | 0 |
| Opcode Number: | 28 |
| Source Syntax: | VN |
| Object Seq.: | 1-2 |
| Object Syntax: | VN |
| Entry Point: | zCVI2B |
| Hex Opcode #: | 1C |
| <variable> | Address of eight bit variable. |
| <variable> | Address of sixteen bit variable. |

CNVRT_I2STR

Convert a sixteen bit variable to a string value that will be concatenated to the end of the specified buffer. Table 5 contains a list of the conversion types.

| | |
|---|---|
| CNVRT_I2STR | <buffer> <type convers> <variable> |
| Opcode Group: | 0 |
| Opcode Number: | 29 |
| Source Syntax: | BXN |
| Object Seq.: | 3-1-2 |
| Object Syntax: | NBX |
| Entry Point: | zCVI2S |
| Hex Opcode #: | 1D |
| <buffer> | Destination buffer. |
| <type convers> | Type of conversion requested. (Table 5) |
| <variable> | Address of sixteen bit variable. |

CNVRT_STR2B

Convert a string to a numeric value. The lowest byte of the sixteen bit result is stored in the specified byte variable. Table 5 contains a list of conversion types. NOTE: The result may be "garbage" if the string does not contain exclusively numeric values. SIGNED is not a valid parameter for this command.

| | |
|---|---|
| CNVRT_STR2B | <variable> <type convers> <buffer> |
| Opcode Group: | 0 |
| Opcode Number: | 30 |
| Source Syntax: | VXB |
| Object Seq.: | 1-3-2 |
| Object Syntax: | VBX |
| Entry Point: | zCVSTR |
| Hex Opcode #: | 1E |
| <variable> | Address eight bit variable. |
| <type convers> | Type of conversion requested. (Table 5) |
| <buffer> | Counted string buffer to be converted. Must be numeric to be meaningful. |

CNVRT_STR2I

Convert counted string buffer to a numeric value. The lowest sixteen bits are stored in the specified integer variable. NOTE: The results may be "garbage" if the string does not exclusively contain numeric values. Table 5 contains a list of conversion types.

| | |
|---|---|
| CNVRT_STR2I | <variable> <type convers> <buffer> |
| Opcode Group: | 0 |
| Opcode Number: | 31 |
| Source Syntax: | NXB |
| Object Seq.: | 1-3-2 |
| Object Syntax: | NBX |
| Entry Point: | zCVST1 |
| Hex Opcode #: | 1F |
| <variable> | Address sixteen bit variable. |
| <type convers> | Type of conversion requested. (Table 5) |

-continued

| | |
|---|---|
| <buffer> | Counted string buffer to be converted. Must be numeric to be meaningful. |

COMP_BYTE

Compare byte at specified position in designated buffer with the value stored in the specified variable. Branch if test passes. Continue with the next command if the test fails. Table 3 contains a list of the comparison operators.

| | |
|---|---|
| COMP_BYTE | <buffer> <position> <operator> <variable> <Addr> |
| Opcode Group: | 1 |
| Opcode Number: | 24 |
| Source Syntax: | BXXVA |
| Object Seq.: | 2-4-1-3-5 |
| Object Syntax: | XVBXA |
| Entry Point: | zCMBYT |
| Hex Opcode #: | 18 |
| <buffer> | Destination buffer. |
| <position> | Position in the destination buffer to be be compared. First char = 1. |
| <operator> | Type of comparison requested. (Table 3) |
| <variable> | Address of eight bit variable. |
| <Addr> | Branch address if test passes. |

COMP_CHAR

Compare byte at specified position in the designated buffer with the byte constant in the command. Branch if the test passes. Continue with the next command if the test fails. Table 3 contains a list of comparison operators.

| | |
|---|---|
| COMP_CHAR | <buffer> <position> <operator> <chr constant> <address> |
| Opcode Group: | 1 |
| Opcode Number: | 25 |
| Source Syntax: | BXXCA |
| Object Seq.: | 2-1-3-4-5 |
| Object Syntax: | XBXCA |
| Entry Point: | zCMCHA |
| Hex Opcode #: | 19 |
| <buffer> | Destination buffer. |
| <position> | Position in destination buffer to compare. |
| <operator> | Type of comparison to perform. (Table 3) |
| <chr constant> | Character constant to compare against buffer character. |
| <address> | Branch address if test passes. |

COMP_FLD

Compare specified substring of one buffer with the specified substring of the same length in another buffer. Branch if test passes and continue to the next command if it fails. Table 3 contains a list of comparison operations. NOTE: For two substrings to be equal, they must match exactly in both length and contents.

| | |
|---|---|
| COMP_FLD | <bf d> <pos d> <oper> <bf s> <pos s> <len s> <addr> |
| Opcode Group: | 1 |
| Opcode Number: | 26 |
| Source Syntax: | BXXBXXA |
| Object Seq.: | 2-5-6-1-4-3-7 |
| Object Syntax: | XXXBBXA |
| Entry Point: | zCMFLD |
| Hex Opcode #: | 1A |
| <bf d> | Destination buffer. |

-continued

| | |
|---|---|
| <pos d> | Position in destination buffer to begin comparison. |
| <oper> | Type of comparison. (Table 3) |
| <bf s> | Source buffer. |
| <pos s> | Location of beginning of substring to compare with destination. |
| <len s> | Length of source substring. |
| <addr> | Branch address if test passes. |

COMP_STRCON

Compare string constant with specified substring of the same length in designated buffer. Branch if test passes. Continue with the next command if the test fails. Table 3 contains a list of comparison operations. NOTE: For two substrings to be equal, they must have exactly the same length and content.

| | |
|---|---|
| COMP_STRCON | <buffer> <posit> <operator> <str constant> <address> |
| Opcode Group: | 1 |
| Opcode Number: | 27 |
| Source Syntax: | BXXZA |
| Object Seq.: | 2-1-3-4-5 |
| Object Syntax: | XBXZA |
| Entry Point: | zCMSTR |
| Hex Opcode #: | 1B |
| <buffer> | Destination buffer. |
| <posit> | Position in destination buffer to begin comparison. |
| <operator> | Type of comparison to make. (Table 3) |
| <str value> | Counted string constant or variable to compare with destination. |
| <address> | Branch address if comparison passes. |

COPY_BYTE

Copy value of byte variable into specified position of designated buffer. NOTE: The old value at that position in the buffer will be over-written. Also, this command will permit a copy to the position immediately after the end of the buffer, but it will not allow a copy to any other position beyond the end of the buffer. A copy to these positions will generate a ZAPD exec error.

| | |
|---|---|
| COPY_BYTE | <buffer> <position> <variable> |
| Opcode Group: | 0 |
| Opcode Number: | 32 |
| Source Syntax: | BXV |
| Object Seq.: | 2-3-1 |
| Object Syntax: | XVB |
| Entry Point: | zCPBYT |
| Hex Opcode #: | 20 |
| <buffer> | Destination buffer. |
| <position> | Position in destination buffer to get new byte. |
| <variable> | Address of 8 bit variable whose value will be copied into the specified buffer |

COPY_CHAR

Copy character constant into specified position of designated buffer. NOTE: The old value at that position in the buffer will be over-written. Also, this command can copy to the position immediately after the end of the buffer, but an attempt to copy to any other position after the end of the buffer will generate a ZAPD exec error.

| | |
|---|---|
| COPY_CHAR | <buffer> <position> <chr constant> |

-continued

| | |
|---|---|
| Opcode Group: | 0 |
| Opcode Number: | 33 |
| Source Syntax: | BXC |
| Object Seq.: | 2-1-3 |
| Object Syntax: | XBC |
| Entry Point: | zCPCHA |
| Hex Opcode #: | 21 |
| <buffer> | Destination buffer. |
| <position> | Position in destination buffer to be modified. |
| <chr constant> | Character constant to be copied into destination buffer. |

COPY_FLD

Copy specified substring of source buffer into specified destination buffer at specified position. NOTE: The old value in the destination buffer will be over-written. Also, it is possible for this command to extend the length of the destination string. Care must be taken not to exceed the maximum buffer length. An attempt to copy to a position not contiguous with the string will generate a ZAPD exec error.

| | |
|---|---|
| COPY_FLD | <bf d> <pos d> <bf s> <pos s> <len s> |
| Opcode Group: | 1 |
| Opcode Number: | 28 |
| Source Syntax: | BXBXX |
| Object Seq.: | 2-4-5-1-3 |
| Object Syntax: | XXXBB |
| Entry Point: | zCPFLD |
| Hex Opcode #: | 1C |
| <bf d> | Destination buffer. |
| <pos d> | Position in destination buffer to be overwritten. |
| <bf s> | Source buffer. |
| <pos s> | Position in source buffer to begin copying. |
| <len s> | Length of source field to copy. |

COPY_STRCON

Copy specified string value into the specified buffer beginning at designated position. Old buffer value at that position will be over-written. An attempt to copy to a position not contiguous with the original buffer will create a ZAPD exec error. This command may extend the length of the destination buffer, and caution should be used to not extend the buffer beyond its maximum length.

| | |
|---|---|
| COPY_STRCON | <buffer> <position> <str constant> |
| Opcode Group: | 0 |
| Opcode Number: | 34 |
| Source Syntax: | BXZ |
| Object Seq.: | 2-3-1 |
| Object Syntax: | XZB |
| Entry Point: | zCPSTR |
| Hex Opcode #: | 22 |
| <buffer> | Destination buffer. |
| <position> | Position in destination buffer to get new value. |
| <str value> | Counted string constant or variable to replace portion of destination buffer. |

DEC_ACCUM

Decrement the designated accumulator and branch if the result is zero. If not zero, then the next command is executed. If no address is provided, the compiler will insert the address of the next command.

| | |
|---|---|
| DEC_ACCUM | <record> <Address> |
| Opcode Group: | 0 |
| Opcode Number: | 35 |
| Source Syntax: | XA |
| Object Seq.: | 1-2 |
| Object Syntax: | XA |
| Entry Point: | zDCACC |
| Hex Opcode #: | 23 |
| <record> | Specific accumulator being decremented. |
| <Address> | Branch address if decrementing accumulator causes zero value. |

DEC_BYTE

Decrement the value of a byte variable and branch if the result is zero. If not zero, then continue with next command. If no address is provided, the compiler will insert the address of the next command.

| | |
|---|---|
| DEC_BYTE | <variable> <Address> |
| Opcode Group: | 0 |
| Opcode Number: | 36 |
| Source Syntax: | VA |
| Object Seq.: | 1-2 |
| Object Syntax: | VA |
| Entry Point: | zDCBYT |
| Hex Opcode #: | 24 |
| <variable> | Address of 8 bit variable whose value will be decremented. |
| <Address> | Branch address if decrementing value results in zero. |

DEC_INT

Decrement the value of the specified integer variable. If the value is zero after decrementing it, branch to the specified address otherwise, continue to the next command.

| | |
|---|---|
| DEC_INT | <variable> <address> |
| Opcode Group: | 0 |
| Opcode Number: | 37 |
| Source Syntax: | NA |
| Object Seq.: | 1-2 |
| Object Syntax: | NA |
| Entry Point: | zDCINT |
| Hex Opcode #: | 25 |
| <variable> | Integer variable to be decremented. |
| <address> | Branch address if decrementing variable results in zero value. |

DEC_RECNUM

Decrement the current record pointer and branch if the result is zero. If not zero, continue with the next command. If no address is provided, then the compiler will insert the address of the next command. NOTE: There is only one current record pointer set by SET_FILE_REC.

| | |
|---|---|
| DEC_RECNUM | <address> |
| Opcode Group: | 0 |
| Opcode Number: | 38 |
| Source Syntax: | A |
| Object Seq.: | 1 |
| Object Syntax: | A |
| Entry Point: | zDCREC |
| Hex Opcode #: | 26 |
| <address> | Branch address if new current record pointer is zero. |

DEC_SEQ

Decrement the designated master sequence number and branch if the result is zero. If not zero, the next command will be executed. If no address is provided, the compiler will insert the address of the next command.

| | |
|---|---|
| DEC_SEQ | <record> <address> |
| Opcode Group: | 0 |
| Opcode Number: | 39 |
| Source Syntax: | XA |
| Object Seq.: | 1-2 |
| Object Syntax: | XA |
| Entry Point: | zDCSEQ |
| Hex Opcode #: | 27 |
| <record> | Record number of the sequence number being decremented. |
| <address> | Branch address if the result is zero. |

DELETE_FLD

Delete the specified substring in the designated buffer. If the substring is in the middle of the buffer, data to the right will move left. In all cases the buffer will be shortened by the length of the deletion.

| | |
|---|---|
| DELETE_FLD | <buffer> <position> <length> |
| Opcode Group: | 1 |
| Opcode Number: | 29 |
| Source Syntax: | BXX |
| Object Seq.: | 2-3-1 |
| Object Syntax: | XXB |
| Entry Point: | zDLFLD |
| Hex Opcode #: | 1D |
| <buffer> | Destination buffer. |
| <position> | Position in the buffer where deletion will begin. |
| <length> | Number of characters to remove. |

DELETE_REC

Delete a specified record in a specific file. Turns the record into a null string. The number of records in the file is not modified.

| | |
|---|---|
| DELETE_REC | <file> <record> |
| Opcode Group: | 0 |
| Opcode Number: | 40 |
| Source Syntax: | XX |
| Object Seq.: | 1-2 |
| Object Syntax: | XX |
| Entry Point: | zDLREC |
| Hex Opcode #: | 28 |
| <file> | File containing the record that will be deleted. |
| <record> | Record that will be deleted. |

DISPLAY_BACK

Cause the display to backspace one character. If there is nothing on the display, this command will do nothing.

| | |
|---|---|
| DISPLAY_BACK | None |
| Opcode Group: | 0 |

-continued

| | |
|---|---|
| Opcode Number: | 41 |
| Source Syntax: | |
| Object Seq.: | |
| Object Syntax: | |
| Entry Point: | zDSBAC |
| Hex Opcode #: | 29 |

DISPLAY_CLEAR

Clear the display. Has the same effect as sending a control-z (hex 1A) to the display as the first character of a string to be displayed.

| DISPLAY_CLEAR | None |
|---|---|
| Opcode Group: | 0 |
| Opcode Number: | 42 |
| Source Syntax: | |
| Object Seq.: | |
| Object Syntax: | |
| Entry Point: | zDSCLE |
| Hex Opcode #: | 2A |

DISPLAY_FLD

Display the specified substring on the terminal's display. Do not automatically clear the screen. NOTE: The string is concatenated to the display buffer whether it is visible on the display depends on what was previously in the display and whether a specific window on the display has been selected. If the display has been set to show the first 16 characters and the display buffer already has 30 characters, a new 10 character addition will not be visible.

| DISPLAY_FLD | <buffer> <position> <length> |
|---|---|
| Opcode Group: | 0 |
| Opcode Number: | 43 |
| Source Syntax: | BXX |
| Object Seq.: | 2-3-1 |
| Object Syntax: | XXB |
| Entry Point: | zDSFLD |
| Hex Opcode #: | 2B |
| <buffer> | Source buffer that will be displayed. |
| <position> | Starting position in source buffer that will be displayed. |
| <length> | Number of characters in source buffer to be concatenated to display buffer. |

DISPLAY_PROMP

Show the prompt stored in the designated record of the prompt file on the terminal's display. NOTE: The PROMPT must have been previously set either by the SET_FILE_PRM command or by the DEFAULT keyword in the FILE MODULE of the ZAPD Environment. NOTE: See the discussion under DISPLAY_FLD regarding whether or not the new message will be visible on the display.

| DISPLAY_PROMP | <record> |
|---|---|
| Opcode Group: | 0 |
| Opcode Number: | 44 |
| Source Syntax: | X |
| Object Seq.: | 1 |
| Object Syntax: | X |
| Entry Point: | zDSPRO |
| Hex Opcode #: | 2C |
| <record> | Record in the default PROMPT file that will be put on the display. |

DISPLAY_STRIN

Show the designated string value on the terminal's display. Does not automatically clear the display. See the discussion under DISPLAY_FLD to determine whether or not the new addition will be visible on the display.

| DISPLAY_STRIN | <str constant> |
|---|---|
| Opcode Group: | 0 |
| Opcode Number: | 45 |
| Source Syntax: | Z |
| Object Seq.: | 1 |
| Object Syntax: | Z |
| Entry Point: | zDSSTR |
| Hex Opcode #: | 2D |
| <str value> | Counted string constant or variable to be concatenated to display buffer. |

DONE

Terminate the current job. If it is the main application (job 0) terminate all non-background jobs and transfer control to previously selected state of the state machine. The state to return to is selected either by the state table on starting the job (next state), or by the use of the SET_GOTOST command.

| DONE | None |
|---|---|
| Opcode Group: | 0 |
| Opcode Number: | 46 |
| Source Syntax: | |
| Object Seq.: | 0 |
| Object Syntax: | |
| Entry Point: | zDNDON |
| Hex Opcode #: | 2E |

DO_ACTION

Does direct call to execute a single state machine action. Does not suspend the current job. Table 6 contains a list of the possible actions, with notes on certain actions which should NOT be generally executed under ZAPD. (The preprogrammed state machine actions, when they can be used, can save many lines of ZAPD code.)

| DO_ACTION | <action> |
|---|---|
| Opcode Group: | 0 |
| Opcode Number: | 47 |
| Source Syntax: | X |
| Object Seq.: | 1 |
| Object Syntax: | X |
| Entry Point: | zD_ACT |
| Hex Opcode #: | 2F |
| <action> | Action index number for the stale machine of the desired action. |

DO_BLD_STRING

Start the control string interpreter using the control string stored in the specified record. When interpreter finishes, store the result in the designated buffer. NOTE: certain other buffers may be used or altered by this command! DESTR, INTBUF and INPUT are almost always modified by this command. The first entry in the input attribute table is used for the default data entry parameters for all data entry control strings. See data capture control string document.

| DO_BLD_STRING | <buffer> <record> <entry point> |
|---|---|
| Opcode Group: | 0 |
| Opcode Number: | 48 |
| Source Syntax: | BXC |
| Object Seq.: | 2-1-3 |
| Object Syntax: | XBC |
| Entry Point: | zD_BLD |
| Hex Opcode #: | 30 |
| <buffer> | Destination buffer. |
| <record> | Record in the default CONTROL STRING file containing control string. |
| <entry point> | Control string entry point desired. (Table 7) |

DO_C_CALL

Directly executes a C-callable routine and pass the designated parameters to the routine in the same order as C parameters are usually passed. The return value, if any, will be returned in the completion code (END_CODE) for the current job. Does not suspend the current job. This command is NOT SUPPORTED!

| DO_C_CALL | <Address> <# parameters> <param 1 . . . n> |
|---|---|
| Opcode Group: | 0 |
| Opcode Number: | 49 |
| Source Syntax: | ACRP |
| Object Seq.: | 1-2 |
| Object Syntax: | ACRP |
| Entry Point: | zD_C_C |
| Hex Opcode #: | 31 |
| <Address> | Address of C callable routine. |
| <# parameters> | Number of parameters to be passed to the routine. |
| <param 1 . . . n> | Each parameter to be passed. |

DO_DATA_ENTRY

Begin the keyboard data entry process for the current job using the currently selected input editing instructions. Deposit the result in the DESTR buffer. Input editing attributes are selected with the SET_EDIT command or with the GET_EDIT command when entering data for a specific file/record.

| DO_DATA_ENTRY | None |
|---|---|
| Opcode Group: | 0 |
| Opcode Number: | 50 |
| Source Syntax: | |
| Object Seq.: | |
| Object Syntax: | |
| Entry Point: | zD_DAT |
| Hex Opcode #: | 32 |

DO_DIAL

Begin dialing the telephone number contained in the specified string, and branch if dialing successfully begins. Continue to next command if telephone number is invalid or phone line is not available. Valid phone numbers contain numbers, a dash, the letters P or T, and #, * or space. Any other characters are invalid.

| DO_DIAL | <buffer> <Address> |
|---|---|
| Opcode Group: | 1 |
| Opcode Number: | 30 |
| Source Syntax: | ZA |
| Object Seq.: | 1-2 |
| Object Syntax: | ZA |
| Entry Point: | zD_DIA |
| Hex Opcode #: | 1E |
| <buffer> | Buffer with telco string to dial. |
| <Address> | Branch address if dialing is successful. |

DO_OPSYS

Do direct call to the ZON operating system with the parameters designated in the call. The return value, if any, will be returned in the completion code of the job that issued the call. This command is NOT SUPPORTED.

| DO_OPSYS | <Opsys ID #> <# parameter> <param 1 . . . n> |
|---|---|
| Opcode Group: | 1 |
| Opcode Number: | 31 |
| Source Syntax: | XCRP |
| Object Seq.: | 1-2 |
| Object Syntax: | XCRP |
| Entry Point: | zD_OPS |
| Hex Opcode #: | 1F |
| <Opsys ID #> | Opsys identification number for direct opsys calls. |
| <# parameter> | Number of parameters to be passed to the routine. |
| <param 1 . . . n> | Each parameter to be passed to the routine. |

DO_RECALL

Recall a specific record from a specific file and show on display, if security settings allow. Will display <EMPTY> if nothing is stored at that location. Does not clear the display. If the security settings do not allow RECALL of that record, the display is unchanged and the completion code (END_CODE) for the current job is set to one.

| DO_RECALL | <file> <record> |
|---|---|
| Opcode Group: | 1 |
| Opcode Number: | 32 |
| Source Syntax: | XX |
| Object Seq.: | 1-2 |
| Object Syntax: | XX |
| Entry Point: | zD_REC |
| Hex Opcode #: | 20 |
| <file> | File that will be displayed on the screen. |
| <record> | Record that will be displayed on the screen. |

DO_STORE

Sets data entry attributes for the specified file/record, and performs data entry using those attributes. When data entry is completed, stores the data into the designated file/record. If the security settings do not permit storage into this record, this command does nothing, and sets the job completion code for this job (END_CODE) to one.

| DO_STORE | <File> <Record> |
|---|---|
| Opcode Group: | 1 |
| Opcode Number: | 33 |

-continued

| | |
|---|---|
| Source Syntax: | XX |
| Object Seq.: | 1-2 |
| Object Syntax: | XX |
| Entry Point: | zD_STO |
| Hex Opcode #: | 21 |
| <File> | File that will receive new data from keyboard. |
| <Record> | Record that will receive new data from keyboard. |

END_OF_FILE

Set the current record pointer to the last record in the designated file.

| END_OF_FILE | <file> |
|---|---|
| Opcode Group: | 1 |
| Opcode Number: | 34 |
| Source Syntax: | X |
| Object Seq.: | 1 |
| Object Syntax: | X |
| Entry Point: | zEDOF_ |
| Hex Opcode #: | 22 |
| <file> | File being analyzed. |

ERR_BEEP

Send the standard error "beep" tone to the ZON speaker.

NOTE: The error beep is on the same audio channel as the key-press beep tone, different from the phone line or the dialing tones. This means that it will not be disabled, even when the SET_SPKR command has been used to turn off the speaker.

| ERR_BEEP | None |
|---|---|
| Opcode Group: | 0 |
| Opcode Number: | 51 |
| Source Syntax: | |
| Object Seq.: | |
| Object Syntax: | |
| Entry Point: | zERBEE |
| Hex Opcode #: | 33 |

EXTRACT_BYTE

Get a single character from the specified position in the designated buffer and store in the specified byte variable. NOTE: This command does not affect the source buffer. The character "extracted" will still be there.

| EXTRACT_BYTE | <variable> <buffer> <position> |
|---|---|
| Opcode Group: | 0 |
| Opcode Number: | 52 |
| Source Syntax: | VBX |
| Object Seq.: | 3-1-2 |
| Object Syntax: | XVB |
| Entry Point: | zETBYT |
| Hex Opcode #: | 34 |
| <variable> | Variable address that will receive the character. |
| <buffer> | Source buffer from which character will be extracted. |
| <position> | Position in source buffer indicating character to be extracted. |

FETCH_BYTE

Fetch a byte from the memory location pointed to by the contents of the specified integer (pointer) variable, and store it in the specified byte destination variable.

| FETCH_BYTE | <dest. var> <pointer var.> |
|---|---|
| Opcode Group: | 0 |
| Opcode Number: | 53 |
| Source Syntax: | VN |
| Object Seq.: | 1-2 |
| Object Syntax: | VN |
| Entry Point: | zFTBYT |
| Hex Opcode #: | 35 |
| <dest. var> | Variable that will receive new value. |
| <pointer var.> | Address of byte variable whose value will be retreived. |

FETCH_INT

Fetch two bytes from the memory location pointed to by the contents of the specified integer (pointer) variable, and store in the specified destination integer variable.

| FETCH_INT | <dest. variable> <pointer variable> |
|---|---|
| Opcode Group: | 0 |
| Opcode Number: | 54 |
| Source Syntax: | NN |
| Object Seq.: | 1-2 |
| Object Syntax: | NN |
| Entry Point: | zFTINT |
| Hex Opcode #: | 36 |
| <dest. var.> | Integer variable that will get new value. |
| <pointer var.> | Address of integer variable whose value will be retreived. |

FINDNTH_BYTE

Find the nth occurrence of the specified byte value within the designated substring of the buffer. The position of the nth occurrence, relative to the beginning of the buffer, is stored in the specified destination byte variable a zero is stored if no match is found. Branch to the specified address if a match is found. Continue with the next command if no match is found, or fewer than the specified number of occurrences is found.

| FINDNTH_BYTE | <variable> <buf> <posit> <len> <variable> <number> <address> |
|---|---|
| Opcode Group: | 1 |
| Opcode Number: | 35 |
| Source Syntax: | VBXXVXA |
| Object Seq.: | 3-4-6-1-5-2-7 |
| Object Syntax: | XXXVVBA |
| Entry Point: | zFNBYT |
| Hex Opcode #: | 23 |
| <variable> | Address of variable to receive the postion of the target string in buffer. |
| <buf> | Source buffer. |
| <posit> | Position in the source buffer from which search will begin. |
| <len> | Number of characters in the source buffer that will be examined. |
| <variable> | Address of the variable with the value that will be searched for. |
| <number> | Number of times the character needs to be found before a match is made. |
| <address> | Branch address if a match is found. |

FINDNTH_CHAR

Find the nth occurrence of the specified byte value within the designated substring of the buffer. The position of the nth occurrence, relative to the beginning of the buffer, is stored in the specified destination byte variable a zero is stored if no match is found. Branch to the specified address if a match is found. Continue with the next command if no match is found, or if fewer than the specified number of occurrences is found.

| | |
|---|---|
| FINDNTH_CHAR | <variable> <buf> <posit> <len> <chr const> <num times> <address> |
| Opcode Group: | 1 |
| Opcode Number: | 36 |
| Source Syntax: | VBXXCXA |
| Object Seq.: | 3-4-6-1-2-5-7 |
| Object Syntax: | XXXVBCA |
| Entry Point: | zFNCHA |
| Hex Opcode #: | 24 |
| <variable> | Address of variable to receive position of character constant in buffer. |
| <buf> | Source buffer. |
| <posit> | Position in source buffer to begin search. |
| <len> | Number of source buffer characters to search. |
| <chr const> | Character constant to search for. |
| <num times> | Number of times character constant must appear before match is made. |

FIND_BYTE

Find the first occurrence of the specified byte value within the designated substring of the buffer. The position relative to the beginning of the buffer is stored in the designated destination byte variable a zero is stored if no match is found. Branch to the specified address if a match is found. Continue to the next command if no match is found.

| | |
|---|---|
| FIND_BYTE | <variable> <buffer> <posit> <length> <variable> <address> |
| Opcode Group: | 1 |
| Opcode Number: | 37 |
| Source Syntax: | VBXXVA |
| Object Seq.: | 3-4-1-5-2-6 |
| Object Syntax: | XXVVBA |
| Entry Point: | zFNBYT |
| Hex Opcode #: | 25 |
| <variable> | Address of variable to receive character position of the byte being searched for. |
| <buffer> | Source buffer. |
| <posit> | Position in the source buffer to begin the search. |
| <length> | Number of source characters to search. |
| <variable> | Address of variable with the value that will be searched for. |
| <address> | Branch address if match is made. |

FIND_CHAR

Find the first occurrence of the specified byte value within the designated substring of the buffer. The position relative to the beginning of the buffer is stored in the designated destination byte variable a zero is stored if there is no match. Branch to specified address if a match is found. Continue to the next command if there is no match.

-continued

| | |
|---|---|
| FIND_CHAR | <variable> <buffer> <posit> <len> <chr constant> <address> |
| Opcode Group: | 1 |
| Opcode Number: | 38 |
| Source Syntax: | VBXXCA |
| Object Seq.: | 3-4-1-2-5-6 |
| Object Syntax: | XXVBCA |
| Entry Point: | zFNCHA |
| Hex Opcode #: | 26 |
| <variable> | Address of variable to receive character position of match. |
| <buffer> | Source buffer. |
| <posit> | Position in source buffer to begin the search. |
| <len> | Number of source buffer characters to search. |
| <chr constant> | Character constant to search for. |
| <address> | Branch address if match is made. |

FIND_FLD

Find the designated substring of the source buffer anywhere within the designated subfield of the destination buffer. The position relative to the beginning of the buffer is stored in the destination byte variable a zero is stored if no match is found within the specified subfield. Branch to the specified address if a match is found continue to the next command if not.

| | |
|---|---|
| FIND_FLD | <variable> <bf d> <pos d> <len d> <bf s> <pos s> <len s> <addr> |
| Opcode Group: | 1 |
| Opcode Number: | 39 |
| Source Syntax: | VBXXBXXA |
| Object Seq.: | 3-4-6-7-1-2-5-8 |
| Object Syntax: | XXXXVBBA |
| Entry Point: | zFNFLD |
| Hex Opcode #: | 27 |
| <variable> | Address of variable to receive position of target substring in source. |
| <bf d> | Source buffer. |
| <pos d> | Position in source buffer to begin search. |
| <len d> | Number of source characters to search. |
| <bf s> | Target string. |
| <pos s> | Position in target string to begin the target pattern. |
| <len s> | Number of target string characters to use for the target. |
| <addr> | Branch address if match is found. |

FIND_RECORD

Compare the designated substring of the buffer with the contents of each record in the specified file, starting at the specified position of each record. If an exact match is found, store the record number of the first matching record into the specified byte destination variable, and then branch to the specified branch address otherwise store zero into the destination variable and continue to the next command.

| | |
|---|---|
| FIND_RECORD | <variable> <file> <rec posit> <buf> <posit> <len> <address> |
| Opcode Group: | 1 |
| Opcode Number: | 40 |
| Source Syntax: | VXXBXXA |
| Object Seq.: | 2-3-5-6-1-4-7 |
| Object Syntax: | XXXXVBA |
| Entry Point: | zFNREC |
| Hex Opcode #: | 28 |
| <variable> | Address of variable to receive record number of the record where match found. |
| <file> | File to be reviewed. |
| <rec posit> | Position in record where match will |

-continued

| | |
|---|---|
| | begin. |
| <buf> | Target buffer for matching with record. |
| <posit> | Position in buffer for beginning the target. |
| <len> | Number of characters in buffer to use as target. |
| <address> | Branch address if match is found. |

FIND_STRCON

Find the specified string value anywhere within the designated subfield of the destination buffer. Store the position relative to the beginning of the buffer in the byte destination variable store a zero in the destination variable if no match is found. Branch to the specified address if a match is found continue to the next command if not.

| | |
|---|---|
| FIND_STRCON | <variable> <buffer> <posit> <length> <str constant> <address> |
| Opcode Group: | 1 |
| Opcode Number: | 41 |
| Source Syntax: | VBXXSA |
| Object Seq.: | 3-4-1-2-5-6 |
| Object Syntax: | XXVBSA |
| Entry Point: | zFNSTR |
| Hex Opcode #: | 29 |
| <variable> | Address of variable that will be used to store position of string constant. |
| <buffer> | Source buffer. |
| <posit> | Position in source buffer from which search will begin. |
| <length> | Number of source buffer characters within which match may take place. |
| <str value> | Counted string value to be searched for. |
| <address> | Branch address if match is found. |

GET_ACCUM

Copy accumulator into the specified buffer from a specified record within the accumulator file. Branch to designated address if the accumulator is zero. NOTE: Accumulator file is set by the SET_FILE_ACC command or by the DEFAULT keyword in the FILE MODULE of the ZAPD Environment.

| | |
|---|---|
| GET_ACCUM | <buffer> <record> <address> |
| Opcode Group: | 0 |
| Opcode Number: | 55 |
| Source Syntax: | BXA |
| Object Seq.: | 2-1-3 |
| Object Syntax: | XBA |
| Entry Point: | zGTACC |
| Hex Opcode #: | 37 |
| <buffer> | Destination buffer. |
| <record> | Accumulator file. |
| <address> | Branch address if accumulator value is zero. |

GET_ADDRESS

Takes the address of the specified source variable (which may be an integer constant, a byte or integer variable, a buffer, or an actual address) and stores it in the specified integer (pointer) variable. This command would principally be used to initialize a pointer before using it in the FETCH_xxx or STORE_xxx commands.

| | |
|---|---|
| GET_ADDRESS | <pointer variable> <source variable> |
| Opcode Group: | 1 |

-continued

| | |
|---|---|
| Opcode Number: | 42 |
| Source Syntax: | NW |
| Object Seq.: | 1-2 |
| Object Syntax: | NW |
| Entry Point: | zGTADD |
| Hex Opcode #: | 2A |
| <pointer var.> | Integer variable into which will be stored the source variable address. |
| <source var.> | Variable (integer, byte or buffer) whose address needs to be found. |

GET_CKBYTE

Get the validity checkbyte for a particular file and store in designated sixteen bit integer variable. NOTE: A simple 16 bit additive checksum is used for comparison rather than a twos complement check-sum.

| | |
|---|---|
| GET_CKBYTE | <variable> <file> |
| Opcode Group: | 1 |
| Opcode Number: | 43 |
| Source Syntax: | NX |
| Object Seq.: | 2-1 |
| Object Syntax: | XN |
| Entry Point: | zGTCKB |
| Hex Opcode #: | 2B |
| <variable> | Address of variable to store validity check byte for specified file. |
| <file> | File for which validity checkbyte should be found. |

GET_CLOCK

Get the system clock, format it to the desired format (e.g., MM/DD/YY HH:MM:SS) and store in designated buffer. Table 1 contains a list of the clock formats.

| | |
|---|---|
| GET_CLOCK | <buffer> <clock format> |
| Opcode Group: | 0 |
| Opcode Number: | 56 |
| Source Syntax: | BX |
| Object Seq.: | 1-2 |
| Object Syntax: | BX |
| Entry Point: | zGTCLO |
| Hex Opcode #: | 38 |
| <buffer> | Destination buffer. |
| <clock format> | System clock format type that is desired. (Table 1) |

GET_DEFREC

Get the data stored in the current file and current record and store it in the designated buffer.

| | |
|---|---|
| GET_DEFREC | <buffer> |
| Opcode Group: | 0 |
| Opcode Number: | 57 |
| Source Syntax: | B |
| Object Seq.: | 1 |
| Object Syntax: | B |
| Entry Point: | zGTDEF |
| Hex Opcode #: | 39 |
| <buffer> | Destination buffer. |

GET_DEVICE

Get the number of bytes which are free in the system output buffer for the specified device, and store it in the specified byte variable. This command can be used to avoid accidentally overrunning the operating system's output buffer for a slow peripheral device (such as a printer) which would result in some of the data sent to the device being lost. Table 9 contains output device codes.

| | |
|---|---|
| GET_DEVICE | <dest. variable> <output device number> |
| Opcode Group: | 0 |
| Opcode Number: | 58 |
| Source Syntax: | VX |
| Object Seq.: | 2-1 |
| Object Syntax: | XV |
| Entry Point: | zGTDEV |
| Hex Opcode #: | 3A |
| <d. variable> | Variable to receive the number of bytes available in output buffer for device. |
| <output dev #> | Output device number. (Table 9) |

GET_EDIT

Find data entry attributes associated with this file and record and select them as the current keyboard input editing attributes. This is often used immediately before a DO_DATA_ENTRY command.

| | |
|---|---|
| GET_EDIT | <file> <record> |
| Opcode Group: | 0 |
| Opcode Number: | 59 |
| Source Syntax: | XX |
| Object Seq.: | 1-2 |
| Object Syntax: | XX |
| Entry Point: | zGTEDI |
| Hex Opcode #: | 3B |
| <file> | File for which input will be requested. |
| <record> | Record for which input will be requested |

GET_END_CODE

Get the end code for a specific job and put it in a designated integer variable. If job is still running, or is the current job, the end code will reflect the value of the last executed DO_C_CALL, DO_OPSYS, DO_RECALL, DO_STORE, or SET_END_CODE command within that job.

| | |
|---|---|
| GET_END_CODE | <Variable> <Job ID> |
| Opcode Group: | 0 |
| Opcode Number: | 60 |
| Source Syntax: | NX |
| Object Seq.: | 1-2 |
| Object Syntax: | NX |
| Entry Point: | zGTEND |
| Hex Opcode #: | 3C |
| <Variable> | Address of variable to receive completion code for particular job. |
| <Job ID> | Job Identification number of job being tested. (255 = current job) |

GET_FILE_SIZE

Determine the number of records in a file and store this value in a byte variable. NOTE: Reports the highest previously allocated record which may be null. This is the same record as selected by the END_OF_FILE or CHK_FILESIZE commands. NOTE: The records within a file are numbered beginning with record 0.

| | |
|---|---|
| GET_FILE_SIZE | <variable> <file> |
| Opcode Group: | 1 |
| Opcode Number: | 44 |
| Source Syntax: | VX |
| Object Seq.: | 2-1 |
| Object Syntax: | XV |
| Entry Point: | zGTFIL |
| Hex Opcode #: | 2C |
| <variable> | Address of variable to receive the number of records in the specified file. |
| <file> | File whose size is being measured. |

GET_LENGTH

Get current length of the specified buffer and store in the designated byte variable. NOTE: The true length of a string is one more than the apparent length because the length byte is included in the string length. A null string, for example, has a length of one.

| | |
|---|---|
| GET_LENGTH | <variable> <buffer> |
| Opcode Group: | 0 |
| Opcode Number: | 61 |
| Source Syntax: | VB |
| Object Seq.: | 1-2 |
| Object Syntax: | VB |
| Entry Point: | zGTLEN |
| Hex Opcode #: | 3D |
| <variable> | Address of variable where buffer length will be stored. |
| <buffer> | Buffer whose length will be determined. |

GET_LOOKUP

Use the specified byte variables for the state index and the input-type index into the state-table lookup, to return the values of the action result and the next-state result that have been programmed in the corresponding state table entry. Store the action and next-state result in the specified byte destination variables. NOTE: This can be used to run state-machine actions under ZAPD, or, for example, to define special purpose keyboard character mappings.

| | |
|---|---|
| GET_LOOKUP | <Addr D1> <Addr D2> <Addr S1> <Addr S2> |
| Opcode Group: | 1 |
| Opcode Number: | 45 |
| Source Syntax: | VVXX |
| Object Seq.: | 1-2-3-4 |
| Object Syntax: | VVXX |
| Entry Point: | zGTLOO |
| Hex Opcode #: | 2D |
| <Addr D1> | Action value from state table. |
| <Addr D2> | Next state value from state table. |
| <Addr S1> | Current state. |
| <Addr S2> | Input from operating system (INCHAR - 1) |

GET_LRC

Compute the specified type of validation value on the designated substring of the buffer, starting the computation with the specified initial value (which need not be zero) store the result in the specified integer destination variable. Table 2 contains a list of the validation types. NOTE: the capability to start a computation with a given initial value allows computation of a validation value or checkbyte to be carried over several different buffers, unlike the CAT_LRC command.

| | |
|---|---|
| GET_LRC | <Variable> <type LRC> <buffer> <posit> <len> <Int value> |

-continued

| | |
|---|---|
| Opcode Group: | 1 |
| Opcode Number: | 46 |
| Source Syntax: | NXBXXY |
| Object Seq.: | 4-5-6-1-3-2 |
| Object Syntax: | XXYNBX |
| Entry Point: | zGTLRC |
| Hex Opcode #: | 2E |
| <Variable> | Address of integer variable where LRC will be stored. |
| <type LRC> | Type of validity check to be computed. |
| <buffer> | Source buffer. |
| <posit> | Position in source buffer from which to start computing validity check. |
| <len> | Number of source buffer characters to use for computing validity check. |
| <Int value> | Initial value of validity check. |

GET_MEMSIZE

Take the specified record size, and a specified file, and use to determine the maximum number of records of that size which could fit in the remaining unused space in the memory partition which that file belongs to store the result in the specified byte destination variable. NOTE: This computation does not allow for space which may be taken up by adding records to other files in the same partition.

| GET_MEMSIZE | <Variable> <File> <Record Size> |
|---|---|
| Opcode Group: | 1 |
| Opcode Number: | 47 |
| Source Syntax: | VXX |
| Object Seq.: | 2-3-1 |
| Object Syntax: | XXV |
| Entry Point: | zGTMEM |
| Hex Opcode #: | 2F |
| <Variable> | Address of variable to receive max num of records that could be stored in file. |
| <File> | File being tested. |
| <Record Size> | Number of raw characters per record that are expected for the file. |

GET_MODE

Determine the current system security mode level, and store its value in the specified byte destination variable.

| GET_MODE | <Variable> |
|---|---|
| Opcode Group: | 1 |
| Opcode Number: | 48 |
| Source Syntax: | V |
| Object Seq.: | 1 |
| Object Syntax: | V |
| Entry Point: | zGTMOD |
| Hex Opcode #: | 30 |
| <Variable> | Address of variable to receive current system mode level. |

GET_RECORD

Copy the string stored at the specified file and specified record into the designated buffer. NOTE: If no record has been stored at that location, a null string will be returned. If the specified file has not been defined, it will generate a ZAPD exec error.

| GET_RECORD | <buffer> <file> <record> |
|---|---|
| Opcode Group: | 0 |
| Opcode Number: | 62 |
| Source Syntax: | BXX |

-continued

| | |
|---|---|
| Object Seq.: | 2-3-1 |
| Object Syntax: | XXB |
| Entry Point: | zGTREC |
| Hex Opcode #: | 3E |
| <buffer> | Destination buffer. |
| <file> | File being read. |
| <record> | Record being read. |

GET_SEQ

Copy the string at the specified record of the master sequence number file into the designated buffer. The sequence number file must have been previously set with the SET_FILE_SEQ command or with the DEFAULT keyword of the FILE MODULE of the ZAPD Environment.

| GET_SEQ | <buffer> <record> |
|---|---|
| Opcode Group: | 0 |
| Opcode Number: | 63 |
| Source Syntax: | BX |
| Object Seq.: | 2-1 |
| Object Syntax: | XB |
| Entry Point: | zGTSEQ |
| Hex Opcode #: | 3F |
| <buffer> | Destination buffer. |
| <record> | Master Sequence Number being requested. |

HALT

Cancel all activity and halt ZAPD interpreter. Stop all non-background jobs; return to the READY state of the state-machine (ignoring any previously set GOTO state); perform a C-call to abort_, to hang up phone, restore modem to initial state, clear all pending input, etc. NOTE: The prime characteristic of background jobs is that they are not stopped by the HALT command, and must be explicitly stopped.

| HALT | None |
|---|---|
| Opcode Group: | 0 |
| Opcode Number: | 64 |
| Source Syntax: | |
| Object Seq.: | 0 |
| Object Syntax: | |
| Entry Point: | zHLHAL |
| Hex Opcode #: | 40 |

INC_ACCUM

Increment the value in the specified record of the accumulator file. The accumulator file must have been previously set with the SET_FILE_ACC command or the DEFAULT keyword of the FILE MODULE of the ZAPD Environment.

| INC_ACCUM | <record> |
|---|---|
| Opcode Group: | 0 |
| Opcode Number: | 65 |
| Source Syntax: | X |
| Object Seq.: | 1 |
| Object Syntax: | X |
| Entry Point: | zICACC |
| Hex Opcode #: | 41 |
| <record> | Specific accumulator to be incremented. |

INC_BYTE

Increment the value of the byte variable specified in the command.

| | |
|---|---|
| INC_BYTE | <variable> |
| Opcode Group: | 0 |
| Opcode Number: | 66 |
| Source Syntax: | V |
| Object Seq.: | 1 |
| Object Syntax: | V |
| Entry Point: | zICBYT |
| Hex Opcode #: | 42 |
| <variable> | Address of variable to be incremented. |

INC_INT

Increment the value of the specified integer variable.

| | |
|---|---|
| INC_INT | <variable> |
| Opcode Group: | 0 |
| Opcode Number: | 67 |
| Source Syntax: | N |
| Object Seq.: | 1 |
| Object Syntax: | N |
| Entry Point: | zICINT |
| Hex Opcode #: | 43 |
| <variable> | Integer variable to be incremented. |

INC_RECNUM

Increment the current default record number. NOTE: The default record number may be set initially by the SET_FILEREC command, and is used in the GET_DEFREC and PUT_DEFREC commands.

| | |
|---|---|
| INC_RECNUM | None |
| Opcode Group: | 0 |
| Opcode Number: | 68 |
| Source Syntax: | |
| Object Seq.: | |
| Object Syntax: | |
| Entry Point: | zICREC |
| Hex Opcode #: | 44 |

INC_SEQ

Increment the value at the specified record in the master sequence number file, and branch if the result exceeds its maximum value and wraps around to zero. Otherwise, continue to the next command. NOTE: The maximum value for any sequence number must be explicitly set using the SET_SEQ_SIZE command before this command can be executed.

| | |
|---|---|
| INC_SEQ | <record> <Address> |
| Opcode Group: | 0 |
| Opcode Number: | 69 |
| Source Syntax: | XA |
| Object Seq.: | 1-2 |
| Object Syntax: | XA |
| Entry Point: | zICSEQ |
| Hex Opcode #: | 45 |
| <record> | Specific sequence number that should be incremented. |
| <Address> | Branch address if sequence number wraps back to zero. |

INIT_ACCUM

Set value of specified record in the accumulator file to a "zero". The accumulator file is set by the SET_FILE_ACC command or the DEFAULT keyword of the FILE MODULE of the ZAPD Environment. NOTE: a "zero" value in the accumulator file is not a null string or a binary zero, but the string '0'.

| | |
|---|---|
| INIT_ACCUM | <record> |
| Opcode Group: | 0 |
| Opcode Number: | 70 |
| Source Syntax: | X |
| Object Seq.: | 1 |
| Object Syntax: | X |
| Entry Point: | zIACC |
| Hex Opcode #: | 46 |
| <record> | Specific accumulator to set to zero. |

INIT_BYTE

Set value of the specified byte variable to zero.

| | |
|---|---|
| INIT_BYTE | <variable> |
| Opcode Group: | 0 |
| Opcode Number: | 71 |
| Source Syntax: | V |
| Object Seq.: | 1 |
| Object Syntax: | V |
| Entry Point: | zIIBYT |
| Hex Opcode #: | 47 |
| <variable> | Address of variable whose value will be set to zero. |

INIT_CLOCK

Set system clock value to the default value in the ROM.

| | |
|---|---|
| INIT_CLOCK | None |
| Opcode Group: | 1 |
| Opcode Number: | 49 |
| Source Syntax: | |
| Object Seq.: | 0 |
| Object Syntax: | |
| Entry Point: | zIICLO |
| Hex Opcode #: | 31 |

INIT_FILE

Delete all the records in a file. NOTE: To delete all records means to change the value of all the records to null strings. It does not de-allocate the records completely.

| | |
|---|---|
| INIT_FILE | <file> |
| Opcode Group: | 1 |
| Opcode Number: | 50 |
| Source Syntax: | X |
| Object Seq.: | 1 |
| Object Syntax: | X |
| Entry Point: | zIIFIL |
| Hex Opcode #: | 32 |
| <file> | File that will no longer contain any records. |

INIT_INT

Set value of specified integer variable to zero.

| | |
|---|---|
| INIT_INT | <Variable> |
| Opcode Group: | 0 |
| Opcode Number: | 72 |
| Source Syntax: | N |
| Object Seq.: | 1 |
| Object Syntax: | N |
| Entry Point: | zIIINT |
| Hex Opcode #: | 48 |
| <Variable> | Sixteen bit variable to set to zero. |

INIT_MEMORY

Marks ZAPD program memory as bad, and then goes to power-on restart routines. Prevents terminal from being used again until memory has been cleared and terminal has been re-downloaded. NOTE: Memory can be cleared by starting the diagnostic "destructive-memory-test" from the keyboard. On the current release of ZAPD, the memory need not be explicitly cleared, but will be cleared automatically by the power-on routines if memory is discovered to be bad.

| | |
|---|---|
| INIT_MEMORY | ZON (string constant) |
| Opcode Group: | 1 |
| Opcode Number: | 51 |
| Source Syntax: | S |
| Object Seq.: | 1 |
| Object Syntax: | S |
| Entry Point: | zIIMEM |
| Hex Opcode #: | 33 |
| | String constant 'ZON' to verify that programmer really wants to clear. |

INIT_RECORD

Replace string at specified file/record with a null string. NOTE: Currently equivalent to DELETE_REC when memory manager is upgraded to provide true "garbage collection", this command will NOT deallocate the record whereas DELETE_REC will.

| | |
|---|---|
| INIT_RECORD | <file> <record> |
| Opcode Group: | 0 |
| Opcode Number: | 73 |
| Source Syntax: | XX |
| Object Seq.: | 1-2 |
| Object Syntax: | XX |
| Entry Point: | zIIREC |
| Hex Opcode #: | 49 |
| <file> | File whose record will be initialized. |
| <record> | Record that will be turned to null string. |

INIT_SEQ

Set the specified record in the sequence number file to all ASCII zeroes. (e.g., '00000'). The sequence number file is set by the SET_FILE_SEQ command or by the DEFAULT keyword of the FILE MODULE of the ZAPD Environment. NOTE: The number of zeroes to be stored in the record is set by the SET_SEQ_SIZE command, which must be executed before this command is used.

| | |
|---|---|
| INIT_SEQ | <record> |
| Opcode Group: | 1 |
| Opcode Number: | 52 |
| Source Syntax: | X |

-continued

| | |
|---|---|
| Object Seq.: | 1 |
| Object Syntax: | X |
| Entry Point: | zIISEQ |
| Hex Opcode #: | 34 |
| <record> | Sequence number that will be set to ASCII '0'. |

INIT_STRING

Set designated buffer to a null string. NOTE: A null string has length of 1.

| | |
|---|---|
| INIT_STRING | <buffer> |
| Opcode Group: | 0 |
| Opcode Number: | 74 |
| Source Syntax: | B |
| Object Seq.: | 1 |
| Object Syntax: | B |
| Entry Point: | zIISTR |
| Hex Opcode #: | 4A |
| <buffer> | Buffer that will be turned to null string. |

INLINE_ON

Following code is direct Z80 code. Code will be executed directly and all ZAPD functions will cease until the machine code returns to ZAPD by executing a RET instruction. At this point, if the interpreter is still active, it will branch to the specified address. This command is NOT SUPPORTED!

| | |
|---|---|
| INLINE_ON | <Address> |
| Opcode Group: | 0 |
| Opcode Number: | 75 |
| Source Syntax: | A |
| Object Seq.: | 1 |
| Object Syntax: | A |
| Entry Point: | zILON |
| Hex Opcode #: | 4B |
| <Address> | Address of next ZAPD command to execute. |

INPUT_EDIT

Selects the set of data entry attributes specified by the label, and then accepts data entry from the keyboard using those attributes, and stores the result in the DESTR buffer. (Functionally equivalent to SET_EDIT <label>, followed by the DO_DATA_ENTRY command.)

| | |
|---|---|
| INPUT_EDIT | <label> |
| Opcode Group: | 1 |
| Opcode Number: | 53 |
| Source Syntax: | A |
| Object Seq.: | 1 |
| Object Syntax: | A |
| Entry Point: | zIPEDI |
| Hex Opcode #: | 35 |
| <address> | ID number of selected error checking routine (1-9) |

INPUT_KEY

Waits for any input from the keyboard with the specified timeout. If a key has been pressed before the timer expires, branches immediately to the specified address. Otherwise, continues to the following command when the timer expires. NOTE: Does not "take" the key input which has been received.

| | | |
|---|---|---|
| INPUT_KEY | <timeout> <address> |
| Opcode Group: | 0 |
| Opcode Number: | 76 |
| Source Syntax: | YA |
| Object Seq.: | 1-2 |
| Object Syntax: | YA |
| Entry Point: | zIPKEY |
| Hex Opcode #: | 4C |
| <timeout> | Timeout before input is expected in 10 ms intervals. |
| <address> | Branch address if input received before the timeout period expires. |

INSRT_BYTE

Nondestructively insert the value of the byte variable into the buffer at the designated position. Any data to the right of that position in the buffer will be shifted right by one space, and the length of the buffer will be increased by one.

| | |
|---|---|
| INSRT_BYTE | <buffer> <posit> <variable> |
| Opcode Group: | 1 |
| Opcode Number: | 54 |
| Source Syntax: | BXV |
| Object Seq.: | 2-3-1 |
| Object Syntax: | XVB |
| Entry Point: | zISBYT |
| Hex Opcode #: | 36 |
| <buffer> | Destination buffer. |
| <posit> | Position in destination buffer to get new value. |
| <variable> | Address of byte to insert into buffer. |

INSRT_CHAR

Nondestructively insert a byte constant into the buffer at the designated location. Any data to the right of that position in the buffer will be shifted right by one space, and the length of the buffer will be increased by one.

| | |
|---|---|
| INSRT_CHAR | <buffer> <position> <chr constant> |
| Opcode Group: | 0 |
| Opcode Number: | 77 |
| Source Syntax: | BXC |
| Object Seq.: | 2-1-3 |
| Object Syntax: | XBC |
| Entry Point: | zISCHA |
| Hex Opcode #: | 4D |
| <buffer> | Destination buffer. |
| <position> | Position in buffer to receive character. |
| <chr constant> | Character constant to be inserted in buffer. |

INSRT_FLD

Nondestructively insert the specified substring of the specified source buffer into the destination buffer at the designated position. All data to the right of that position in the destination buffer are shifted right by the length of the inserted field, and the length of the destination buffer is increased by the length of the inserted field.

| | |
|---|---|
| INSRT_FLD | <bf d> <pos d> <bf s> <pos s> <len s> |
| Opcode Group: | 1 |

-continued

| | |
|---|---|
| Opcode Number: | 55 |
| Source Syntax: | BXBXX |
| Obect Seq.: | 2-4-5-1-3 |
| Object Syntax: | XXXBB |
| Entry Point: | zISFLD |
| Hex Opcode #: | 37 |
| <bf d> | Destination buffer. |
| <pos d> | Position in destination buffer where insert will occur. |
| <bf s> | Source buffer. |
| <pos s> | Position in source buffer where char to insert will begin. |
| <len s> | Number of characters to insert. |

INSRT_STRCON

Nondestructively insert the specified string value into the designated destination buffer at the specified position. All data in the destination buffer to the right of that position will be shifted right by the length of the inserted string and the length of the destination will be increased by the same amount.

| | |
|---|---|
| INSRT_STRCON | <buffer> <position> <str constant> |
| Opcode Group: | 1 |
| Opcode Number: | 56 |
| Source Syntax: | BX |
| Object Seq.: | 2-1-3 |
| Object Syntax: | XBS |
| Entry Point: | zISSTR |
| Hex Opcode #: | 38 |
| <buffer> | Destination buffer. |
| <position> | Position in the destination buffer where string insert will begin. |
| <str value | Counted string constant or variable to insert. |

LOAD_ACCUM

Store specified string constant into the specified record of the accumulator file. The accumulator file is set by the SET_FILE_ACC command or by the DEFAULT keyword of the FILE MODULE of the ZAPD Environment.

| | |
|---|---|
| LOAD_ACCUM | <record> <string constant> |
| Opcode Group: | 1 |
| Opcode Number: | 57 |
| Source Syntax: | XS |
| Object Seq.: | 1-2 |
| Object Syntax: | X |
| Entry Point: | zLAACC |
| Hex Opcode #: | 39 |
| <record> | pecific accumulator that will be set to the value in the buffer. |
| <string const> | Source buffer contains the value to be loaded into the accumulator. |

LOAD_B2STR

Convert the binary value of the specified byte constant to its equivalent in ASCII digits, storing the result in the designated buffer. Any previous data in the buffer will be lost. Table 5 contains a list of conversion types.

| | |
|---|---|
| LOAD_B2STR | <buffer> <type> <character> |
| Opcode Group: | 0 |
| Opcode Number: | 78 |
| Source Syntax: | BXC |

-continued

| | |
|---|---|
| Object Seq.: | 1-2-3 |
| Object Syntax: | BXC |
| Entry Point: | zLAB2S |
| Hex Opcode #: | 4E |
| <buffer> | Destination buffer. |
| <type> | Type of conversion to perform. (Table 5) |
| <character> | Character constant. |

LOAD_BYTE

Load the specified byte value into the designated byte variable.

| | |
|---|---|
| LOAD_BYTE | <variable> <char constant> |
| Opcode Group: | 0 |
| Opcode Number: | 79 |
| Source Syntax: | VC |
| Object Seq.: | 1-2 |
| Object Syntax: | VC |
| Entry Point: | zLABYT |
| Hex Opcode #: | 4F |
| <variable> | Byte variable which will be initialized to specific value. |
| <char constant> | Character constant. |

LOAD_CLOCK

Set the system clock using the designated string value. The value must be a valid date and time and conform to the system clock format.

| | |
|---|---|
| LOAD_CLOCK | <str constant> |
| Opcode Group: | 0 |
| Opcode Number: | 80 |
| Source Syntax: | S |
| Object Seq.: | 1 |
| Object Syntax: | S |
| Entry Point: | zLACLO |
| Hex Opcode #: | 50 |
| <str constant> | Counted string with system clock initialization. |

LOAD_I2STR

Convert the binary value of the specified integer constant to its equivalent in ASCII digits, storing the result in the designated buffer. Table 5 contains a list of conversion types.

| | |
|---|---|
| LOAD_I2STR | <Buffer> <type> <int constant> |
| Opcode Group: | 0 |
| Opcode Number: | 81 |
| Source Syntax: | BCI |
| Object Seq.: | 1-2-3 |
| Object Syntax: | BCI |
| Entry Point: | zLAI2S |
| Hex Opcode #: | 51 |
| <Buffer> | Destination buffer. |
| <type> | Type of conversion. (Table 5) |
| <int constant> | Integer constant. |

LOAD_INT

Load the specified integer value into the designated integer variable.

| | |
|---|---|
| LOAD_INT | <variable> <Int constant> |
| Opcode Group: | 0 |
| Opcode Number: | 82 |

-continued

| | |
|---|---|
| Source Syntax: | NI |
| Object Seq.: | 1-2 |
| Object Syntax: | NI |
| Entry Point: | zLAINT |
| Hex Opcode #: | 52 |
| <variable> | Address of sixteen bit variable to be initialized. |
| <Int constant> | Integer constant. |

LOAD_RECORD

Copy the specified string value into the designated record of the designated file, replacing any previously stored data in that record.

| | |
|---|---|
| LOAD_RECORD | <file> <record> <str constant> |
| Opcode Group: | 1 |
| Opcode Number: | 58 |
| Source Syntax: | XXS |
| Object Seq.: | 1-2-3 |
| Object Syntax: | XXS |
| Entry Point: | zLAREC |
| Hex Opcode #: | 3A |
| <file> | File whose record is to be set. |
| <record> | Record that will be set to new string constant. |
| <str constant> | Counted string constant value for record. |

LOAD_SEQ

Copy the specified string value to the designated record in the master sequence number file, replacing any previously stored value. The master sequence number file must have been set using the SET_FILE_SEQ command or the DEFAULT keyword of the FILE module in the ZAPD Environment.

| | |
|---|---|
| LOAD_SEQ | <record> <str constant> |
| Opcode Group: | 1 |
| Opcode Number: | 59 |
| Source Syntax: | XS |
| Object Seq.: | 1-2 |
| Object Syntax: | XS |
| Entry Point: | zLASEQ |
| Hex Opcode #: | 3B |
| <record> | Specific sequence number to be initialized. |
| <str constant> | Counted string constant for initializing sequence number. |

LOAD_STRING

Copy the specified string value to the designated buffer, replacing any previous value the buffer contained.

| | |
|---|---|
| LOAD_STRING | <buffer> <str constant> |
| Opcode Group: | 0 |
| Opcode Number: | 83 |
| Source Syntax: | BS |
| Object Seq.: | 1-2 |
| Object Syntax: | BS |
| Entry Point: | zLASTR |
| Hex Opcode #: | 53 |
| <buffer> | Destination buffer. |
| <str constant> | Counted string constant. |

MOVE_BYTE

Load value of the source byte variable into the destination byte variable.

| | |
|---|---|
| MOVE_BYTE | <d. variable> <s. variable> |
| Opcode Group: | 0 |
| Opcode Number: | 84 |
| Source Syntax: | VV |
| Object Seq.: | 1-2 |
| Object Syntax: | VV |
| Entry Point: | zMVBYT |
| Hex Opcode #: | 54 |
| <variable> | Address of destination variable. |
| <variable> | Address of source variable. |

MOVE_INT

Load the value of the source integer variable into the destination integer variable.

| | |
|---|---|
| MOVE_INT | <d. variable> <s. variable> |
| Opcode Group: | 0 |
| Opcode Number: | 85 |
| Source Syntax: | NN |
| Object Seq.: | 1-2 |
| Object Syntax: | NN |
| Entry Point: | zMVINT |
| Hex Opcode #: | 55 |
| <variable> | Address sixteen bit destination variable. |
| <variable> | Address sixteen bit source variable. |

MOVE_RANDOM2B

Get a random byte value and load it into the specified byte variable.

| | |
|---|---|
| MOVE_RANDOM2B | <variable> |
| Opcode Group: | 1 |
| Opcode Number: | 60 |
| Source Syntax: | V |
| Object Seq.: | 1 |
| Object Syntax: | V |
| Entry Point: | zMVRAN |
| Hex Opcode #: | 3C |
| <variable> | Address of variable to receive the random byte. |

MOVE_STRING

Move the string in the source buffer to the destination buffer, replacing any previous value in the destination.

| | |
|---|---|
| MOVE_STRING | <d. buffer> <s. buffer> |
| Opcode Group: | 0 |
| Opcode Number: | 86 |
| Source Syntax: | BB |
| Object Seq.: | 1-2 |
| Object Syntax: | BB |
| Entry Point: | zMVSTR |
| Hex Opcode #: | 56 |
| <buffer> | Destination buffer. |
| <buffer> | Source Buffer. |

NEED_INPUT

Indicates which devices this job wants to receive input from. This bitmap of input devices may include the timer for the current job. Table 4 contains a description of the bit-map values for the different input devices.

| | |
|---|---|
| NEED_INPUT | <bit map> |
| Opcode Group: | 0 |
| Opcode Number: | 87 |
| Source Syntax: | X |
| Object Seq.: | 1 |
| Object Syntax: | X |
| Entry Point: | zNEINP |
| Hex Opcode #: | 57 |
| <bit map> | Bit map of the devices this job needs input from (Table 4). |

PAD_BYTE

Pad the specified buffer to the specified length with the value in the specified byte variable. Left or right justification must be specified. Table 8 contains the values used to specify left or right justification.

NOTE: If the buffer length is already greater than or equal to the specified length, the buffer will be left unchanged.

| | |
|---|---|
| PAD_BYTE | <buffer> <final length> <variable> <justify> |
| Opcode Group: | 1 |
| Opcode Number: | 61 |
| Source Syntax: | BXVX |
| Object Seq.: | 2-3-1-4 |
| Object Syntax: | XVBX |
| Entry Point: | zPDBYT |
| Hex Opcode #: | 3D |
| <buffer> | Buffer to be padded. |
| <final length> | Final length of buffer. |
| <variable> | Address of the variable whose value will be used to pad. |
| <justify> | Used to indicate left or right justification of existing data. |

PAD_CHAR

Pad the specified buffer to the specified length with the specified byte value. Left or right justification must be specified. Table 8 contains the values used to specify left or right justification.

NOTE: If the buffer length is already greater than or equal to the specified length, the buffer will be left unchanged.

| | |
|---|---|
| PAD_CHAR | <buffer> <final length> <chr constant> <justify> |
| Opcode Group: | 0 |
| Opcode Number: | 88 |
| Source Syntax: | BXCC |
| Object Seq.: | 2-1-3-4 |
| Object Syntax: | XBCX |
| Entry Point: | zPDCHA |
| Hex Opcode #: | 58 |
| <buffer> | Buffer to be padded. |
| <final length> | Final buffer length. |
| <chr constant> | Character constant to be used for padding. |
| <justify> | Left or right justify existing data in the buffer. |

PAUSE

Waits for the specified number of 10 ms time intervals before continuing to the next command.

| | |
|---|---|
| PAUSE | <timeout> |
| Opcode Group: | 0 |
| Opcode Number: | 89 |
| Source Syntax: | Y |
| Object Seq.: | 1 |
| Object Syntax: | Y |
| Entry Point: | zPUPAU |
| Hex Opcode #: | 59 |
| <timeout> | Number of 10ms intervals job is to wait before restarting. |

PUT_ACCUM

Copy the designated buffer into the specified record in the default accumulator file. The accumulator file must be set with the SET_FILE_ACC command or the DEFAULT keyword of the FILE module in the ZAPD Environment.

| | |
|---|---|
| PUT_ACCUM | <record> <buffer> |
| Opcode Group: | 0 |
| Opcode Number: | 90 |
| Source Syntax: | XB |
| Object Seq.: | 1-2 |
| Object Syntax: | XB |
| Entry Point: | zPTACC |
| Hex Opcode #: | 5A |
| <record> | Specific accumulator that will be updated. |
| <buffer> | Buffer contains the new value of the accumulator. |

PUT_CLOCK

Set the system clock using the value in the designated buffer. The value must be a valid date and time and conform to the system clock format. The system clock format is <CS> MMDDYYHHMMSS where <CS> is the string count including the count byte.

| | |
|---|---|
| PUT_CLOCK | <buffer> |
| Opcode Group: | 1 |
| Opcode Number: | 62 |
| Source Syntax: | B |
| Object Seq.: | 1 |
| Object Syntax: | B |
| Entry Point: | zPTCLO |
| Hex Opcode #: | 3E |
| <buffer> | Source buffer. |

PUT_DEFREC

Store the designated buffer into the current default file and record.

NOTE: The default file and record are set using the SET_FILEREC command.

| | |
|---|---|
| PUT_DEFREC | <buffer> |
| Opcode Group: | 0 |
| Opcode Number: | 91 |
| Source Syntax: | B |
| Object Seq.: | 1 |
| Object Syntax: | B |
| Entry Point: | zPTDEF |
| Hex Opcode #: | 5B |
| <buffer> | Source buffer. |

PUT_RECORD

Store the source buffer into the designated file and record.

| | |
|---|---|
| PUT_RECORD | <file> <record> <buffer> |
| Opcode Group: | 0 |
| Opcode Number: | 92 |
| Source Syntax: | XXB |
| Object Seq.: | 1-2-3 |
| Object Syntax: | XXB |
| Entry Point: | zPTREC |
| Hex Opcode #: | 5C |
| <file> | File to receive data. |
| <record> | Record to receive data. |
| <buffer> | Source buffer. |

PUT_SEQ

Store the designated buffer into the specified record of the master sequence number file. The master sequence number file must be set with the SET_FILE_SEQ command or the DEFAULT keyword in the FILE module of the ZAPD Environment.

| | |
|---|---|
| PUT_SEQ | <record> <buffer> |
| Opcode Group: | 1 |
| Opcode Number: | 63 |
| Source Syntax: | XB |
| Object Seq.: | 1-2 |
| Object Syntax: | XB |
| Entry Point: | zPTSEQ |
| Hex Opcode #: | 3F |
| <record> | Specific sequence number to be stored. |
| <buffer> | Source buffer. |

RCV_BYTE

Wait for any character to be received from the modem or for the specified time period to expire. If a character is received before the timeout, store it in the specified variable and branch to the specified address. Otherwise, continue to the next command.

| | |
|---|---|
| RCV_BYTE | <variable> <timeout> <address> |
| Opcode Group: | 0 |
| Opcode Number: | 93 |
| Source Syntax: | VYA |
| Object Seq.: | 2-1-3 |
| Object Syntax: | YVA |
| Entry Point: | zRVBYT |
| Hex Opcode #: | 5D |
| <variable> | Address of variable to receive the incoming character. |
| <timeout> | Timeout (in 10 msec intervals). |
| <address> | Branch address if character is received before timeout. |

RCV_FLD

Wait for characters from the specified input device(s). Store the characters in the destination buffer. Stop collecting characters and take the branch either when the specified maximum number of characters is reached or when a specified terminator character is seen. Continue to the next instruction if the timeout expires.

| | |
|---|---|
| RCV_FLD | <device> <dest buf> <timeout> <max char> <term char> <address> |
| Opcode Group: | 1 |
| Opcode Number: | 64 |

-continued

| | |
|---|---|
| Source Syntax: | XBYXZA |
| Object Seq.: | 4-1-3-5-1-6 |
| Object Syntax: | XXYZBA |
| Entry Point: | zRVFLD |
| Hex Opcode #: | 40 |
| <device> | Bitmap of input devices. Usually just one device. |
| <dest. buf> | Buffer to hold incoming characters. |
| <timeout> | Maximum time to wait in 10ms ticks. |
| <max char> | Maximum number of characters to wait for |
| <term char> | String of termination characters. |
| <address> | Branch address taken if max characters reached or if terminator char seen. |

RCV_PACKET

Wait for receipt of a packet in STX/ETX/LRC from the modem. Store it in the destination buffer and branch to the specified address if it is received successfully with a correct LRC, and the timeout is not exceeded between any two characters of the packet. If the packet contains an incorrect LRC, NAK the packet, and begin attempting to receive it again. A maximum of three NAKs will be sent before the command fails. If the command is not successful, continue to the next command.

| | |
|---|---|
| RCV_PACKET | <buffer> <timeout> <address> |
| Opcode Group: | 0 |
| Opcode Number: | 94 |
| Source Syntax: | BYA |
| Object Seq.: | 2-1-3 |
| Object Syntax: | YBA |
| Entry Point: | zRVPAC |
| Hex Opcode #: | 5E |
| <buffer> | Destination buffer. |
| <timeout> | Timeout in 10ms intervals. |
| <address> | Branch address if packet received before timeout. |

RETURN

Exit ZAPD subroutine. Pop the number of items indicated from the ZAPD stack before returning to the statement following the statement which called the subroutine.

NOTE: The number given in the return must match EXACTLY the number of parameters which the subroutine was called with!

| | |
|---|---|
| RETURN | <# Pop> |
| Opcode Group: | 0 |
| Opcode Number: | 95 |
| Source Syntax: | C |
| Object Seq.: | 1 |
| Object Syntax: | C |
| Entry Point: | zRTRET |
| Hex Opcode #: | 5F |
| <# Pop> | Number of items to pop from the ZAPD stack. |

SEND_CHAR

Send the character constant to the specified output device or devices. Table 9 contains the bit positions used to specify the different output devices.

| | |
|---|---|
| SEND_CHAR | <bitmap> <char constant> |
| Opcode Group: | 0 |
| Opcode Number: | 96 |

-continued

| | |
|---|---|
| Source Syntax: | XX |
| Object Seq.: | 1-2 |
| Object Syntax: | XX |
| Entry Point: | zSNCHA |
| Hex Opcode #: | 60 |
| <bitmap> | Bitmap of the possible output devices. |
| <byte value> | Character constant or variable to send. (Table 9) |

SEND_FLD

Send the specified substring of the designated buffer to the specified output device or devices. Table 9 contains a list of the bit positions used to specify the different output devices.

| | |
|---|---|
| SEND_FLD | <bitmap> <buffer> <position> <length> |
| Opcode Group: | 1 |
| Opcode Number: | 65 |
| Source Syntax: | XBXX |
| Object Seq.: | 3-4-2-1 |
| Object Syntax: | XXBX |
| Entry Point: | zSNFLD |
| Hex Opcode #: | 41 |
| <bitmap> | Bitmap of output devices to receive data (Table 9) |
| <buffer> | Source buffer. |
| <position> | Position in source buffer. |
| <length> | Number of source buffer characters to send. |

SEND_STRCON

Send the specified string value to the specified output device or devices. Table 9 contains a list of the bit positions within the bit map used to specify the different output devices.

| | |
|---|---|
| SEND_STRCON | <bitmap> <string constant> |
| Opcode Group: | 0 |
| Opcode Number: | 97 |
| Source Syntax: | XZ |
| Object Seq.: | 1-2 |
| Object Syntax: | XZ |
| Entry Point: | zSNSTR |
| Hex Opcode #: | 61 |
| <bitmap> | Bitmap of output devices. (Table 9) |
| <str value> | Counted string constant or variable. |

SET_CHIP

Use a counted string as the raw data for initializing any of the Z80 family chips and the AY sound generation chip. The data is formatted within the counted string to allow sending any number of bytes to any of the Z80's I/O ports.

NOTE: This command should be used only for setting the baud rate on the RS-232 port. Other uses are NOT SUPPORTED. The format for the table is db <port #>, db <# items to send>, db <. . . items . . . >, db -1, End of list.

| | |
|---|---|
| SET_CHIP | <str constant> |
| Opcode Group: | 1 |
| Opcode Number: | 66 |
| Source Syntax: | Z |
| Object Seq.: | 1 |
| Object Syntax: | Z |
| Entry Point: | zSTCHI |
| Hex Opcode #: | 42 |

-continued

| | |
|---|---|
| <str constant> | Counted string in the same format as TBLxxx.MAC for init chips. |

SET_CURRST

Set the state machine's current state variable to the specified new state value. This will generally result in exiting the ZAPD state, so it should be used only with extreme caution it may result in state-machine actions being executed in parallel with the ZAPD programs.

| SET_CURRST | <New State> |
|---|---|
| Opcode Group: | 1 |
| Opcode Number: | 67 |
| Source Syntax: | X |
| Object Seq.: | 1 |
| Object Syntax: | X |
| Entry Point: | zSTCUR |
| Hex Opcode #: | 43 |
| <New State> | New state that will become the current state. |

SET_EDIT

Selects the set of data entry input attributes specified by the label. Unless subsequently altered, these parameters will be used for the next DO_DATA_ENTRY command.

| SET_EDIT | <address> |
|---|---|
| Opcode Group: | 1 |
| Opcode Number: | 68 |
| Source Syntax: | A |
| Object Seq.: | 1 |
| Object Syntax: | A |
| Entry Point: | zSTEDI |
| Hex Opcode #: | 44 |
| <address> | Label of entry in input attributes table section of ZAPD environment. |

SET_END_CODE

Set the completion code for the current job to the specified integer value. NOTE: the completion code for the current job or a different job can be examined using the CHK_END_CODE or GET_END_CODE commands.

| SET_END_CODE | <compl code> |
|---|---|
| Opcode Group: | 0 |
| Opcode Number: | 98 |
| Source Syntax: | Y |
| Object Seq.: | 1 |
| Object Syntax: | Y |
| Entry Point: | zSTEND |
| Hex Opcode #: | 62 |
| <compl code> | New value for sixteen bit job status code. |

SET_FILE_ACC

Set the default file number for the accumulator file, which will be used by all the accumulator-specific commands.

NOTE: The default accumulator file can also be set by the DEFAULT keyword in the FILE module of the ZAPD environment.

| SET_FILE_ACC | <file> |
|---|---|
| Opcode Group: | 1 |
| Opcode Number: | 69 |
| Source Syntax: | X |
| Object Seq.: | 1 |
| Object Syntax: | X |
| Entry Point: | zSTFIL |
| Hex Opcode #: | 45 |
| <file> | File number that will become the default file for the accumulator based commands. |

SET_FILE_CSI

Set the default file number for the control string file, which will be used by the DO_BLD_STRING command.

NOTE: The default control string file can also be set by the DEFAULT keyword of the FILE module of the ZAPD Environment.

| SET_FILE_CSI | <file> |
|---|---|
| Opcode Group: | 1 |
| Opcode Number: | 70 |
| Source Syntax: | X |
| Object Seq.: | 1 |
| Object Syntax: | X |
| Entry Point: | zSTFI1 |
| Hex Opcode #: | 46 |
| <file> | File number that will be the default file for control strings. |

SET_FILE_PAS

Set the default file number for the password file, which will be used by the CHK_PASSWORD command to check user passwords and set the security mode.

NOTE: The default password file can also be set by the DEFAULT keyword of the FILE module of the ZAPD Environment.

| SET_FILE_PAS | <file> |
|---|---|
| Opcode Group: | 1 |
| Opcode Number: | 71 |
| Source Syntax: | X |
| Object Seq.: | 1 |
| Object Syntax: | X |
| Entry Point: | zSTFI2 |
| Hex Opcode #: | 47 |
| <file> | File number that will contain the default file number for user passwords. |

SET_FILE_PRMP

Set the default file number of the prompt file, which will be used by the DISPLAY_PROMPT command and the control string prompt functions of the DO_BLD_STRING command.

NOTE: the default prompt file can also be set by the DEFAULT keyword in the FILE module of the ZAPD Environment.

| SET_FILE_PRMP | <file> |
|---|---|
| Opcode Group: | 1 |
| Opcode Number: | 72 |
| Source Syntax: | X |
| Object Seq.: | 1 |
| Object Syntax: | X |
| Entry Point: | zSTFI3 |
| Hex Opcode #: | 48 |

-continued

| | |
|---|---|
| <file> | File number that will become the default prompt file. |

SET_FILE_REC

Set current default file and default record number to values specified. A value of 255 for either the file or record will cause that parameter to remain unchanged. (No actual file or record can be numbered 255.) Used in conjunction with the GET_DEFREC, PUT_DEFREC, INC_RECNUM, and DEC_RECNUM commands.

| | |
|---|---|
| SET_FILE_REC | <file> <record> |
| Opcode Group: | 1 |
| Opcode Number: | 73 |
| Source Syntax: | XX |
| Object Seq.: | 1-2 |
| Object Syntax: | XX |
| Entry Point: | zSTFI4 |
| Hex Opcode #: | 49 |
| <file> | File number that will become current file. |
| <record> | Record number that will become current record. |

SET_FILE_SEQ

Set the default file number for the master sequence number file, used by all the sequence number specific opcodes.

NOTE: the default sequence number file can also be set by the DEFAULT keyword in the FILE module of the ZAPD environment.

| | |
|---|---|
| SET_FILE_SEQ | <file> |
| Opcode Group: | 1 |
| Opcode Number: | 74 |
| Source Syntax: | X |
| Object Seq.: | 1 |
| Object Syntax: | X |
| Entry Point: | zSTFI5 |
| Hex Opcode #: | 4A |
| <file> | File number that will become default sequence number file. |

SET_GOTOST

Set the state in the state machine which control will go to when the main ZAPD job exits via the DONE statement. (Otherwise, the state which it goes to will be the next-state value in the statetable entry used to start the main job.)

NOTE: If the main job is stopped by a HALT (in the main job or another job) the value set by this command will be ignored, and control will be automatically returned to the READY state of the state machine.

| | |
|---|---|
| SET_GOTOST | <New state> |
| Opcode Group: | 1 |
| Opcode Number: | 75 |
| Source Syntax: | X |
| Object Seq.: | 1 |
| Object Syntax: | X |
| Entry Point: | zSTGOT |
| Hex Opcode #: | 4B |
| <New state> | The state that ZAPD will execute upon exit. |

SET_HSET

Enable or disable the handset. When enabled, the handset will be connected to the phone line if it is picked up (off-hook). When disabled, the handset can not be connected, even if it is picked up by the user. Table 17 contains the values used to enable or disable the handset.

| | |
|---|---|
| SET_HSET | <Toggle value> |
| Opcode Group: | 0 |
| Opcode Number: | 99 |
| Source Syntax: | X |
| Object Seq.: | 1 |
| Object Syntax: | X |
| Entry Point: | zSTHSE |
| Hex Opcode #: | 63 |
| <Toggle value> | Value either enables or disables handset. (Table 17) |

SET_MODE

Set the current system security mode from the byte value specified. Replaces or overrides any previous value set by this command or the CHK_PASSWORD command. The system security mode can be used to control access to different terminal functions, including access to storing and recalling file and record data from the keyboard. The current mode is always checked on executing the DO_STORE and DO_RECALL commands.

| | |
|---|---|
| SET_MODE | <New Mode> |
| Opcode Group: | 1 |
| Opcode Number: | 76 |
| Source Syntax: | X |
| Object Seq.: | 1 |
| Object Syntax: | X |
| Entry Point: | zSTMOD |
| Hex Opcode #: | 4C |
| <New Mode> | New value for the system mode (0-255) with 255 being most protected level. |

SET_MODEM

Set modem to disabled (inactive), originate mode, or answer mode, as specified by a byte value. Table 10 contains the list of values for each of the above modes.

| | |
|---|---|
| SET_MODEM | <modem status> |
| Opcode Group: | 0 |
| Opcode Number: | 100 |
| Source Syntax: | X |
| Object Seq.: | 1 |
| Object Syntax: | X |
| Entry Point: | zSTMO1 |
| Hex Opcode #: | 64 |
| <modem status> | Value for modem status (off, answer or orginate) from Table 10. |

SET_PRINTER

Selects the specified printer driver type from the three possible cases of: VFI ZON Printer Eaton slip/-roll printer and "generic" serial roll-type printer.

NOT YET ACTIVATED. Will be added in future releases of the language.

| | |
|---|---|
| SET_PRINTER | <printer driver type> |
| Opcode Group: | 1 |
| Opcode Number: | 77 |
| Source Syntax: | X |
| Object Seq.: | 1 |
| Object Syntax: | X |
| Entry Point: | zSTPRI |
| Hex Opcode #: | 4D |
| <printer type> | Determines which printer driver software routine is used. (Table 18) |

SET_SEQ_SIZE

Sets the number of digits which will be used for all sequence numbers and all sequence number commands to the specified byte value. Must be executed before the INIT_SEQ, INC_SEQ, or DEC_SEQ commands. For example, if the sequence number size is set to 4 with this command, the range of sequence number values will be '0000' to '9999', and if '9999' is incremented, it will wrap around to '0000'.

| | |
|---|---|
| SET_SEQ_SIZE | <Num digits> |
| Opcode Group: | 1 |
| Opcode Number: | 78 |
| Source Syntax: | X |
| Object Seq.: | 1 |
| Object Syntax: | X |
| Entry Point: | zSTSEQ |
| Hex Opcode #: | 4E |
| <Num digits> | Number of digits in sequence number. |

SET_SPKR

Turn the base unit speaker on or off, to enable or disable the user hearing what is being sent and received on the phone line. Table 19 contains the values used to enable or disable the speaker.

| | |
|---|---|
| SET_SPKR | <Toggle value> |
| Opcode Group: | 0 |
| Opcode Number: | 101 |
| Source Syntax: | X |
| Object Seq.: | 1 |
| Object Syntax: | X |
| Entry Point: | zSTSPK |
| Hex Opcode #: | 65 |
| <Toggle value> | Determines whether speaker is on or off. (Table 19) |

SET_TELCO

Unconditionally set the base unit to be off-hook (connected to phone line) or on-hook (hang up on phone line.) Table 20 contains the values used. NOTE: When attempting to go off-hook to dial (as opposed to answering a ring), the CHK_TELCO13 RDY command should be used instead, as this command does not check for dial tone or sufficient line voltage. The disable (hang-up or "on-hook") parameter to the command can be safely used in all cases to disconnect the base unit.

| | |
|---|---|
| SET_TELCO | <Toggle value> |
| Opcode Group: | 0 |
| Opcode Number: | 102 |
| Source Syntax: | X |
| Object Seq.: | 1 |
| Object Syntax: | X |
| Entry Point: | zSTTEL |

-continued

| | |
|---|---|
| Hex Opcode #: | 66 |
| <Toggle value> | Value for telco status (on, offhook) (Table 20) |

SET_TIMEOUT

Set the timer value for the current job to the specified integer value for timeout, in 10 ms intervals. The timer can later be checked, using the CHK_TIMEOUT command, to see whether it has expired.

NOTE: The maximum timer value which can be set is 32767 10 ms "ticks" (approximately 5 minutes). If larger values are set, or the timer goes unchecked for that long, CHK_TIMEOUT may give the wrong result. Use the clock commands for such cases.

| | |
|---|---|
| SET_TIMEOUT | <timeout> |
| Opcode Group: | 0 |
| Opcode Number: | 103 |
| Source Syntax: | Y |
| Object Seq.: | 1 |
| Object Syntax: | Y |
| Entry Point: | zSTTIM |
| Hex Opcode #: | 67 |
| <timeout> | Sixteen bit timeout value in 10 ms intervals. |

SET_WCC

Update the write control character (WCC) with the specified value. The WCC must have been previously set with the CAT_WCC command or the Q option of the control string (DO_BLD_STRING) command. The value given here is ORed with the previously set value, and stored back into its previous location.

| | |
|---|---|
| SET_WCC | <value for trancode> |
| Opcode Group: | 1 |
| Opcode Number: | 79 |
| Source Syntax: | X |
| Object Seq.: | 1 |
| Object Syntax: | X |
| Entry Point: | zSTWCC |
| Hex Opcode #: | 4F |
| <value for tran | Value written as trancode for this transaction packet. |

START_BACK

Start a ZAPD job as a background task. This means that it will not be terminated even when the main ZAPD job is terminated by a DONE or HALT command. Background jobs should generally be given high job numbers, so as to be low in the priority chain, and should not generally be set to use input. One use is to establish a job which will wait for a specific time or event to start some activity. Starts the ZAPD module at the specified address as the specified (background) job number.

| | |
|---|---|
| START_BACK | <job id> <Address> |
| Opcode Group: | 0 |
| Opcode Number: | 104 |
| Source Syntax: | XA |
| Object Seq.: | 1-2 |
| Object Syntax: | XA |
| Entry Point: | zSABAC |
| Hex Opcode #: | 68 |

-continued

| | |
|---|---|
| <job id> | Identification number of the job to start. (0-15) |
| <Address> | Address of the ZAPD command that will be the first command in the new job. |

START_JOB

Starts the ZAPD module at the specified address running as the specified job number. Its initial status will be: foreground (not back-ground) and non-realtime. It may become a real-time job by executing the NEED_INPUT command, which indicates that it needs input and should receive priority whenever input is present. NOTE: Jobs run in round robin priority by job junger. Job 0 is always started from state table and is highest priority. CURJOB variable is current active job.

| | |
|---|---|
| START_JOB | <job id> <address> |
| Opcode Group: | 0 |
| Opcode Number: | 105 |
| Source Syntax: | XA |
| Object Seq.: | 1-2 |
| Object Syntax: | XA |
| Entry Point: | zSAJOB |
| Hex Opcode #: | 69 |
| <job id> | Job identification number. (0-15). If bit 5 is set all realtime jobs started. |
| <address> | Address of ZAPD command to next execute to begin this job. |

STOP_BACK

Stop a currently running background job. No other jobs will be stopped. If the job is NOT a background job, or is not active, this command will do nothing. Takes effect immediately and is visible to the CHK_JOB_DONE command. Also see notes to START_JOB command.

| | |
|---|---|
| STOP_BACK | <job id> |
| Opcode Group: | 0 |
| Opcode Number: | 106 |
| Source Syntax: | X |
| Object Seq.: | 1 |
| Object Syntax: | X |
| Entry Point: | zSOBAC |
| Hex Opcode #: | 6A |
| <job id> | Job identification number of background job to stop. (0-15) |

STOP_JOB

Stop the specified (foreground) ZAPD job. If the job is a background job, or is not active, this command will do nothing. If the job stopped is the main job (Job 0) all foreground jobs, including the current one, will be stopped. Takes effect immediately and is visible to the CHK_JOB_DONE command. See notes to START_JOB command also.

| | |
|---|---|
| STOP_JOB | <job id> |
| Opcode Group: | 0 |
| Opcode Number: | 107 |
| Source Syntax: | X |
| Object Seq.: | 1 |
| Object Syntax: | X |
| Entry Point: | zSOJOB |
| Hex Opcode #: | 6B |
| <job id> | Job identification number. (0-15) |

STORE_BYTE

Store the specified byte value into the byte in the memory location which is pointed to by the contents of the specified integer (pointer) variable.

NOTE: If the pointer variable has not been initialized properly to point to a valid destination variable, the results could be disastrous. Do NOT use this command carelessly.

| | |
|---|---|
| STORE_BYTE | <pointer variable> <byte value> |
| Opcode Group: | 0 |
| Opcode Number: | 108 |
| Source Syntax: | NX |
| Object Seq.: | 1-2 |
| Object Syntax: | NX |
| Entry Point: | zSOBYT |
| Hex Opcode #: | 6C |
| <pointer var.> | Address to receive byte value. |
| <byte value> | Value to store in other address. |

STORE_INT

Store the specified integer value in the two byte area in memory which is pointed to by the contents of the specified integer (pointer) variable.

NOTE: If the pointer variable has not been initialized properly to point to a valid destination variable, the results may be disastrous. Do NOT use this command carelessly.

| | |
|---|---|
| STORE_INT | <pointer variable> <integer value> |
| Opcode Group: | 0 |
| Opcode Number: | 109 |
| Source Syntax: | NY |
| Object Seq.: | 1-2 |
| Object Syntax: | NY |
| Entry Point: | zSOINT |
| Hex Opcode #: | 6D |
| <pointer var.> | Address to receive integer value. |
| <integer value> | Value to store. |

SUM_ACCUM

Perform the specified arithmetical operation on the designated buffer and the specified record in the accumulator file, and store the result in the MATHBUF buffer. Both the accumulator and the buffer specified MUST be strings containing valid numbers. Valid arithmetic operators include only +, −, *, and /.

| | |
|---|---|
| SUM_ACCUM | <buffer> <operation> <accum> |
| Opcode Group: | 0 |
| Opcode Number: | 110 |
| Source Syntax: | BXX |
| Object Seq.: | 3-1-2 |
| Object Syntax: | XBX |
| Entry Point: | zSMACC |
| Hex Opcode #: | 6E |
| <buffer> | Destination buffer. |
| <operation> | Type of arithmetic operation to perform. (Table 11) |
| <accum> | Accumulator record to use as the 2nd operand. |

SUM_STRING

Perform the specified arithmetic operation on the two designated buffers, and store the result in the MATHBUF buffer. Both buffers MUST be strings containing valid numbers. The only valid math operators are +, −, * and /.

| | |
|---|---|
| SUM_STRING | <buffer> <operation> <buffer> |
| Opcode Group: | 0 |
| Opcode Number: | 111 |
| Source Syntax: | BXB |
| Object Seq.: | 1-3-2 |
| Object Syntax: | BBX |
| Entry Point: | zSMSTR |
| Hex Opcode #: | 6F |
| <buffer> | Destination buffer (operand 1) |
| <operation> | Type of math operation to do. |
| <buffer> | Source buffer (operand 2). |

TAKE_INPUT

Set the length of INPUT to null, set the input source (INSRCE) to zero, and indicate that no input is currently present. Must be done if input is used, to indicate that the input should no longer be made available to other parallel jobs. Certain commands such as RCV_PACKET, DO_STORE, or DO_DATA_ENTRY will implicitly do this on all input which they use, so that this command need not be used immediately following those.

| | |
|---|---|
| TAKE_INPUT | None |
| Opcode Group: | 0 |
| Opcode Number: | 112 |
| Source Syntax: | |
| Object Seq.: | 0 |
| Object Syntax: | |
| Entry Point: | zTKINP |
| Hex Opcode #: | 70 |

WAIT

Allow other jobs to run. Each job, once started, will run continuously until a WAIT, WAIT_JUMP, PAUSE, or some other command is executed which implies that the current job should wait. ONLY THEN will other jobs be allowed to run, and ONLY THEN can input be received from the operating system. For an application to function correctly, it is critical for each job to "wait" at the appropriate places, so that other functions can take place.

| | |
|---|---|
| WAIT | None |
| Opcode Group: | 0 |
| Opcode Number: | 113 |
| Source Syntax: | |
| Object Seq.: | |
| Object Syntax: | |
| Entry Point: | zWIWAI |
| Hex Opcode #: | 71 |

WAITFOR_JOB

Suspend current job, and do not continue to next command of the job until all jobs indicated in the bitmap parameter are no longer active. Will continue to wait as long as even one indicated job number is active.

| | |
|---|---|
| WAITFOR_JOB | <bitmap> |
| Opcode Group: | −1 |
| Opcode Number: | 115 |
| Source Syntax: | Y |
| Object Seq.: | 1 |
| Object Syntax: | Y |
| Entry Point: | zWIJOB |
| Hex Opcode #: | 73 |
| <bitmap> | Sixteen bit vector with 1 for each job that must complete. Job 0 is lcb. |

WAIT_JUMP

Allow other jobs to ruun, and branch to the specified address when the current job is restarted. Each job, once started, will run continuously until a WAIT, WAIT_JUMP, WAITFOR_JOB or other command is executed which causes it to "wait". Only then can other jobs be run or input received from the operating system. For an application to function correctly, it is critical for each job to "wait" at the appropriate places so that other functions in other jobs can occur.

| | |
|---|---|
| WAIT_JUMP | <address> |
| Opcode Group: | −1 |
| Opcode Number: | 114 |
| Source Syntax: | A |
| Object Seq.: | 1 |
| Object Syntax: | A |
| Entry Point: | zWIJUM |
| Hex Opcode #: | 72 |
| <address> | Branch address when control returns next to this job. |

<End of Document>

TABLE II

Chart of Examples of Command Code Length in Object Code versus Code Length of Associated General Purpose Operation Routine

| ZAPD COMMAND | ZAPD OBJECT CODE | ROM CODE | MINIMUM CODE |
|---|---|---|---|
| WAITFOR_JOB 00000110B | 3 | 21 | 13 |
| ABS_NUL | 1 | 1 | 1 |
| ERR_BEEP | 1 | 3 | 3 |
| INIT_INT #var | 2 | 12 | 6 |
| EXTRACT_BYTE #var $string #pos | 5 | 24 | 11 |
| FETCH_BYTE #dest &PTR | 4 | 10 | 8 |
| INSRT_STRCON $string #pos 'XYZ' | 8 | 44 (+53) | 20 (+53) |

TABLE III

List of Parameter Types and Default and Alternate Data Types Associated Therewith

| Parameter Ref. Code Usual (New) | Parameter category: Type of data: | Expressed in form of: | Default Data Type [00/none] | Alternate Data types: Any? | Alt1 [01] | Alt2 [10] | Alt3 [11]* |
|---|---|---|---|---|---|---|---|
| C (Bc) | Byte | Constant | BC | No | | | |
| V (Bv) | Byte | Variable | VS | Yes: | EB | SV | |
| X (B) | Byte | Const or Var | BC | Yes: | VS | EB | SV |
| I (Ic) | Integer | Constant | IC | No | | | |
| N (Iv) | Integer | Variable | VI | Yes: | EI | SI | |
| Y (I) | Integer | Const or Var | IC | Yes | VI | EI | SI |
| S (Sc) | String | Constant | SC | No | | | |
| B (Sv) | String | Variable | BS | Yes: | ES | SB | |
| Z (S) | String | Const or Var | SC | Yes: | BS | ES | SB |
| A (A) | Address Constant | | EA | No | | | |
| P (E) | Parm (for Ext. call) | | IC | Yes: | VB | VI | BS |
| W (Z) | Parm (for ZAPD call) | | IC | Yes: | VI | BS | EA |
| R (x) | Repetition factor | | | Doesn't apply | | | |
| *Bitmap fld to select data type | | | [00/none] | | [01] | [10] | [11] |

TABLE IV

List of Data Types and Associated Symbols

ZAPD DATA TYPES AND THEIR SYMBOLS

| Data Type Ref (New) | Data Type Name | Source Symbol | Source Example | Obj Len | Value Size |
|---|---|---|---|---|---|
| BC (CB) | Constant - Byte | [0-9],' | 23 (or) 'F' | 1 | 1 |
| VS (VB) | Variable - Byte | # | #numtran | 1 | 1 |
| EB (EB) | Extended - Byte | @ | @dialtyp## | 2 | 1 |
| SV (SB) | Stack Ref. - Byte | ^# | ^#1 | 1 | 1 |
| IC (CI) | Constant - Integer | [0-9] | 400 (or) 0AH | 2 | 2 |
| VI (VI) | Variable - Integer | & or # | &countdown | 1 | 2 |
| EI (EI) | Extended - Integer | @ | @akeymap## | 2 | 2 |
| SI (SI) | Stack Ref. - Integer | ^&, ^# | ^#1 | 1 | 2 |
| SC (CS) | Constant - String | ' | 'NOT LAST' | n+1 | n |
| BS (BS) | Variable - String(Buffer) | $ | $int2buf | 1 | n |
| ES (ES) | Extended - String | @ | @stormsg## | 2 | n |
| SB (SS) | Stack Ref. - String | ^$ | ^$2 | 1 | n |
| EA (EA) | Extended - Address | @ | @nxtloop | 2 | 0 |

TABLE V

Operation Sequence of Terminal in Credit Card Stripe Reading Mode

| Keystroke | | Display will read |
|---|---|---|
| | | READY |
| [VISA] | Select the Host that will do the transaction; i.e., keys 1-8. | ENTER ACCT NUM |
| | Swipe care through Card Reader (with magnetic stripe down and away) | AMOUNT OF SALE |
| [10.00] | Enter the amount of sale. To enter decimal point press [#]. | 10.00 |
| [ENTER] | | PROCESSING DIALING TRANSMIT-TING RECEIVING APPROVAL 11111 |
| [HANG UP] | Ends the function. | READY |

TABLE VI

Operation Sequence of Terminal in Manual Card Data Entry Mode

| Keystroke | | Display will read |
|---|---|---|
| | | READY |
| [VISA] | Select the Host; i.e keys 1-8. | ENTER ACCT NUM |
| [4811 . . . ] | Enter the account number manually through the keyboard | 4811 . . . . . . |
| [ENTER] | | EXPIRY DATE? |
| [0185] | Enter the 4-digit expiry date on the card. The format generally is MMYY. | 0185 |
| [ENTER] | | AMOUNT OF SALE |
| [10.00] | Enter amount of sale To enter a decimal point, press [#]. | 10.00 |
| [ENTER] | | PROCESSING DIALING TRANSMITTING RECEIVING APPROVAL 22222 |
| [HANG UP] | | READY |

TABLE VII

Listing of ROM Resident Routines

Can be Used from Any State

```
#define ABORT        1    /* From anywhere to READY */
/*      return to "READY" state, cancel whatever's happening */
#define NOTHING      2    /* At any state, esp. READY */
/*      If timer expired, set modem back to originate */
```

Generally Used from READY State

TABLE VII-continued

Listing of ROM Resident Routines

```
#define SCROLLLEFT        3    /* At READY */
/*     if have more than 16 chars to display and not at end of display buffer
#define SCROLLRIGHT       4    /* At READY */
/*     if have more than 16 chars to display and not at end of display buffer
#define REDIAL            5    /* From READY to MANDIAL */
/*     Wait for line, then redial last phone number entered. */
#define UNPGMED           6    /* At READY */
/*     Beep, display "terminal not programmed" */
#define CHKHSET           7    /* At READY */
/*     If hset up/down or ring, display phone status */
Calculator
#define CALCON            8    /* From READY to CALCST */
*/ display "CALC"
#define SETDECIMAL        9    /* At CALCST */
*/ set decimal point in number being entered for calculator
#define BUILDNUM          10   /* At CALCST */
*/ scroll in digit entered from keyboard and append to number being entered for calculator
#define OPERATION         11   /* At CALCST */
/*     do indicated operation
#define CLEAR             12   /* At CALCST */
*/ clear number being entered for calculator and display "0.00"
Phone
#define PHONEON           13   /* From READY to PHONEST */
/*     access phone line
*/
#define HSDOWN            14   /* At any phone state */
#define DIALDIGIT         15   /* (From PHONEST) to/at MANDIAL */
/*     map digit from keyboard and dial it
*/
#define DOMEMDIAL         16   /* From PHONEST to MEMDIAL */
/*     display MEM DIAL
*/
#define LOADON            17   /* From PHONEST to LOADST */
/*     connect to remote computer and start download process*/
#define LONGFLASH         18   /* At MANDIAL, MEMDIAL, MEM2 */
/*     hangup line and then reaccess line for one second */
#define GETFIRSTDIGIT     19   /* From MEMDIAL to MEM2 */
/*     scroll in digit entered from keyboard and begin selecting number to memory dial */
#define R_GET2DIGIT       20   /* From MEM2 to MANDIAL */
/*     scroll in second digit entered and dial the selected phone number
*/
```

TABLE VIII

LISTING OF ERROR MESSAGES PRODUCED DURING EXECUTION OF THE ERROR ROUTINE

DESCRIPTIVE ERROR MESSAGES

The descriptive message for any ZAPD Executive Error should be one of the following:

PREV JOB ACTIVE—An attempt has been made to start a job from the state table when there is already a main ZAPD job (Job 0) active; or, an attempt has been made to start a specific job number from within a ZAPD job, when there is already a job executing with that job number.

BAD JOB NUMBER—In a command which takes a job number as a parameter, the value specified is not in the range 0–15.

BAD INSTR PNTR—In the last branch or control-flow instruction, the instruction pointer which was transferred to was outside the ZAPD code area for the current application. The value given for the PREVIOUS instruction pointer will generally identify the erroneous command.

BAD OPCODE/SET—The value at the current instruction pointer is not a valid ZAPD opcode. This too may be due to an incorrect branch instruction, or to some invalid data being inserted into the ZAPD code area.

BAD PARAMETER—The parsing routines detected an error in the form of the parameters for this command (e.g. a reference was made to stack parameter 5 when only 3 items were on the stack); or, an opcode which accepts only a limited range of values for a certain parameter was given a value outside that range (e.g. a value of 4 was specified for control string entry point in the DO_BLD_STRING command); or, some parameter to this opcode was detected to be invalid in the current context, but no more detailed information could be given.

STRING OVERFLOW—The opcode action routine detected that performing the specified string operation would have caused the specified destination buffer to exceed its maximum length. (The error may be dependent on the specific values in the buffers at the time the opcode was executed.)

BAD STRING INDEX—The sub-string parameters for this opcode, such as position and length, specified a field which was outside the bounds of the string in question.

BAD FILE ACCESS—A serious memory manager problem has been detected; may mean that the current partition has filled up completely or that file memory for the current partition has become corrupt.

INVALID FILE—An invalid logical file number has been specified in a memory access command; or, in a file which has a "cutoff point" a record number has been specified falling outside the valid range.

BAD FILE CRC—On accessing a file, its checkbyte value has been determined to be incorrect for the file contents. Contents of the specified file may no longer be valid.

BUFFER OVERFLOW—An attempt has been made to store a record from a string which is longer than 192 bytes; or, an attempt has been made to retrieve a record into a buffer which has a maximum length shorter than the record in question.

NON-EXECUTIVE ERROR MESSAGES

There are several more possible error messages, resulting from sources outside the Executive Error handler. These messages will be described individually:

OP NOT PRGMD—nn

A ZAPD opcode has been encountered which falls into the range of valid opcodes, but has no corresponding action routine. This error message should not be encountered if you use the development software provided and restrict yourself to the prescribed set of commands.

KEY NOT PROGRMD

This does not actually constitute an error; it is the only result of executing the action called UNPGMED. It can be used in the state table as a way of responding to undefined key sequences by the operator.

BAD TBL ACTION

This error message indicates that an invalid ROM action number has been specified; it could occur as the result of an invalid state-table entry, or as the result of an invalid parameter to the ZAPD DO ACTION command.

MEMORY LOCKED

PROGRAM GONE

The preceding two error messages should only occur at powerup. They will appear, in that sequence, if the terminal determines that the ZAPD program area has been corrupted, but it is unable to restore the default program area from the ROM because Switch 8 has been set to write-protect the memory. The only cure for this is to close Switch 8 and power up the unit again, so that it can wipe and reload memory.

RELOADING RAM

This message will appear briefly at power-up, if the terminal determines that the ZAPD program area has been corrupted and it begins reloading the default program area from the ROM. When it is finished, the normal sign-on message will be displayed. CL SYS ERR aaaabbbbccccdddd

Some condition has occurred which the operating system can not handle. The most common cause is an input buffer for some device overflowing, because input is not being processed quickly enough. The 16-digit hexadecimal display which follows the SYS ERR message can be valuable in determining the specific source of the error, but is very difficult to interpret. After both errors have been displayed for a number of seconds, the terminal will restart from its power-up sequence.

APERR nn

This message should not generally appear; it will only occur from the ROM actions, if some condition is detected which can not be handled by the ROM routine. The error code nn can be used in some cases to determine the source of the error. The application can generally continue executing despite the error. CL WRONG TOP CHIP This error message can only occur at power-up. It only appears if an "A" ROM chip (in the bottom socket of the ZON) has been incorrectly matched with the "B" ROM chip (in the internal ROM socket of the ZON). The chips must be correctly paired before the unit can be powered up.

TABLE IX

Submit File Listing for Compiling Application Program Source Code to Downloadable Object Code

```
;ZAP.SUB
;
zaprel $1
zapcom $1
;ZAPREL.SUB
;
; BUILD ZAPD REL FILE
;
; Initial steps = build include files, process two of them specially.
;
prezapd $1.zap bw
zapdasm zap.mac bw
zapdstat stl.mac stl.inc
;
; Put in null printer table entry.
pip prt.inc=prt.bk
;
; Assemble basic rel file.
m80 $1=a000mem
;ZAPCOM.SUB
;
; BUILD ZAPD BINARY AND DOWNLOAD FILES FROM
; .REL file created by ZAPREL.
;
; Build basic binary file.
xsub
l80
/p:0
$1,zromvars,zdefines
$1/n:p/y/e
n
;
; Set up download file/record files.
era temp.udl
filesym $1.sym data.udl temp.udl
pip $1.udl=temp.udl,csi.inc
era temp.udl
;
;Truncate the excess baggage from the com file, making
;the memory image for download
trunczap $1.sym $1.com $1.mem
;
;We are now ready for transfer and download
;
```

TABLE X

Example of Header Module in Source Code

```
BEGIN HEADER
TITLE           INTERNATIONAL MEDICAL
                EXCHANGE (IMX)
VERSION         0.004
DATE            6/19/85
PROGRAMMER      WRP
DOWNLOAD        IMX00.0
; Header Source Code Documentation Notes:
;
; Purpose:       To provide basic information for proper
;                tracking of the source file.
;
; Required?:     Yes
; Repeated?      No
; Builds File?:  Yes
; Filename:      HDR.INC
; Symbols?:      No
```

TABLE X-continued

Example of Header Module in Source Code

```
;
; Post
; Processing?:  None
; Format:       All items must be included in the order shown.
;
END HEADER
```

TABLE XI

Example of Comment Module in Source Code

```
BEGIN COMMENT
              This is a comment block. Comments can be
              identified as a block, or leading semi-colons can be
              used when only a few comment lines are
              required.

              I am using the IMX application to test out the
              adequacy of ZAPD opcodes. This is a simulated
              source program that would define the IMX
              application.
Assumption:   Each key on the keyboard is programmed by ZAPD.
Assumption:   Each key has a ZAPD program that is initiated
              when the key is pressed. Keys are referenced
              by their alphabetic assignments (A-Z, SP for
              space, and MODE for the ORANGE key).
; Comment Source Code Documentation Notes:
;
; Purpose:      To provide a method of large comment blocks
;               without requiring multiple semi-colons.
;
; Required?:    No
; Repeated:     Yes
; Builds File?: No
; Filename:     None
; Symbols?:     No
;
; Post
; Processing?:  None
; Format:       None. Free Form.
;
END COMMENT
```

TABLE XII

Example of Equates Module in Source Code

```
BEGIN EQUATE
EQUATE      SECOND        100
EQUATE      ORIGINATE     55
; Equate Source Code Documentation Notes:
;
; Purpose:      To assign values to symbolic labels used
```

TABLE XII-continued

Example of Equates Module in Source Code

```
;               throughout the source code.
;
; Required?:    Yes
; Repeated?     No
; Builds File?: No
; Filename:     None
; Symbols?:     No
;
; Post
; Processing?:  None
; Format:       The preprocessor resolves all equates and
;               substitutes the value for all equated symbols.
;
END EQUATE
```

TABLE XIII

Example of Hardware Definition Module

```
BEGIN HARDWARE DEFINITION TABLE
    ZMODEM      TI       ;(AMD or TI)
    ZCARDRDR    TRK2     ;(TRK2, TRK1/2, TRK1&2)
    ZPRINTER    ROLL     ;(ROLL, VFISLIP, EATSLP)
; NOTE: The following equates identify which physical memory
; chips will be used for the application.
;
    MEM8000     _2K      ;(_2K or _8K)
    MEMA000     _8K      ;(_2K or _8K)
    MEMC000     _8K      ;(_2K or _8K)
    MEME000     _0K      ;(_0K or _2K)
    MEME800     _0K      ;(_0K or _2K)
    MEMF000     _0K      ;(_0K or _2K)
    MEMF800     _0K      ;(_0K or _2K)
; Hardware Source Code Documentation Notes:
;
; Purpose:      To completely define the hardware environment
;               for the application.
;
; Required?:    Yes
; Repeated?:    No
; Builds File?: Yes
; Filename:     HDW.INC
; Symbols?:     No
;
; Post
; Processing?:  The information needs to be reformatted for
;               section 3 of the A000H memory table.
;
; Format:       Each item above must be included as shown.
;               The options for each are shown as comments
;               on the same line.
;
END HARDWARE DEFINITION TABLE
```

TABLE XIV

Example of Memory Partition Definition Module in Source Code

```
BEGIN MEMORY PARTITION
;                      Start      End
;                      Addr       Addr     ID     Description
;
PARTITION              0c800h     0dfffh   buf2   ;Buffers and all RAM file
s
PARTITION              endram##   087ffh   zap3   ;ZAPD variables
VARPAR      zap3
BUFPAR      buf2
STACKPAR    buf2
STACKSIZE   90
; Memory Partition Source Code Documentation Notes:
;
; Purpose:      To define the memory segments that are used by
;               the application.
;
; Required?:    Yes
; Repeated?:    No
; Builds File?: Yes
```

TABLE XIV-continued

Example of Memory Partition Definition
Module in Source Code

```
; Filename:     MEM.INC
; Symbols?:     No
;
; Post
; Processing?:  The information needs to be reformatted for
;               the Memory Definition Table (MDT).
;
; Format:       PARTITION <Start Address> <End Address> <name>
;               where
;
;               <Start Address> = Hexadecimal address of the
;                            start of the memory block.
;
;               <End Address> = Hexadecimal address of the end
;                            of the memory block.
;
;               <name> = Name used by application programmer
;                            to refer to partition in subsequent
;                            sections of source code.
;
;
; BUFPAR <partition name> = Identifies the partition to be
;                           used by ALL the system buffers that are
;                           referenced using the short buffer
;                           reference data type.
; VARPAR <partition name> = Identifies the partition to be
;                           used by ALL USER DEFINED variables that
;                           are referenced using the short variable
;                           variable reference data type.
;
END MEMORY PARTITION
```

TABLE XV

Example of Variable Definition Module
in Source Code

```
BEGIN VARIABLE DEFINITION TABLE
;
;             Variable
;             Name       Description
;
VARIABLE      outst##    ;Display justification: 0=right, -1=left
VARIABLE      imxlog     ;Indicates number of logons
;
; Variable Definition Table Source Code Documentation Notes:
;
; Purpose:      To completely identify all variables used in
;               the application.
;
; Required?:    Yes
; Repeated?:    No
; Builds File?: Yes
; Filename:     VAR.INC
; Symbols?:     No
;
; Post
; Processing?:  The information needs to be reformatted for
;               section 6 of the A000H memory table. Also,
;               the variable definition table identified by
;               section 6 must be built using this information.
;
; Format:       VARIABLE <name> ¶ <name##>
;               where
;
;               <name> = local ZAPD variable
;               <name##> = ROM defined external variable
;
END VARIABLE DEFINITION TABLE
```

TABLE XVI

Example of Buffer Definition Module
in Source Code

```
;
BEGIN BUFFER DEFINITION TABLE
;
; Only 17 buffers are provided in ZAPD, and each one must have
; a length specified, even if it is null length (1). A length
; value of 0 is not allowed.
;
; All buffers before userlbuf are required and must be in the order
; shown, though the lengths may be increased. The lengths given
; are suggested minimum lengths for each buffer.
;
; Buffers TEMP1BUF and TEMP2BUF can not be referenced
; by the application program. They are used for intermediate
; storage only by several ZAPD language commands. The
; application programmer, though, must include these in the list of
; defined buffers.
;
;             Buffer
;             Name       Length  Description
;
BUFFER        input       126    ;input buffer
BUFFER        transmit    190    ;transmit buffer
BUFFER        receive     100    ;receive buffer
BUFFER        destr        50    ;data entry string buffer
BUFFER        intbuf       50    ;control string buffer
BUFFER        int2buf     170    ;data capture result buffer
BUFFER        int3buf      35    ;miscellaneous buffer
BUFFER        supbuf       64    ;supervisor data buffer
BUFFER        amtsav       17    ;amount save buffer
BUFFER        brntbl       32    ;branch-table buffer
BUFFER        mathbuf      16    ;mathmetic buffer
BUFFER        user1buf      1    ;Reversed buffer for user
BUFFER        user2buf      1    ;Reversed buffer for user
BUFFER        user3buf      1    ;Reserved buffer for user
BUFFER        user4buf      1    ;Reserved buffer for user
BUFFER        temp1buf    128    ;implied buffer 1
BUFFER        temp2buf    128    ;implied buffer 2
Buffer Definition Table Source Code Documentation Notes:
;
; Purpose:          To completely identify the lengths of the 15
;                   buffers that can be used in the application.
;                   NOTE: INPUT's length can not be redefined.
;
```

TABLE XVI-continued

Example of Buffer Definition Module in Source Code

```
; Required?:     Yes
; Repeated?:     No
; Builds File?:  Yes
; Filename:      BUF.INC
; Symbols?:      No
;
; Post
; Processing?:   The information needs to be reformatted for
;                section 1 of the A000H memory table. Also,
;                the variable definition table identified by
;                section 6 must be built using this information.
;
; Format:        BUFFER   [name]  [length]
;                where
;                [name] = buffer logical name
;                [length] = number of bytes reserved for data
;                      for the buffer. Remember that the actual
;                      memory requirement for a buffer is
;                      length+1 because of the count byte.
;
END BUFFER DEFINITION TABLE
```

TABLE XVIIA

Example of File Definition Module in Source Code

```
BEGIN FILE DEFINITION TABLE
;
;                    SAMPLE ENTRY
;
;FILE       Name    Id      Compr   Part     Altfile
                                             Cutf
;DESCFILE   Name    Min     Max     Prompt   Edit
;SECURITY   Name    Min     Max     Type     Func
;DEFAULT    Name    Type
;
;            SEQUENCE AND ACCUMULATORS
;
FILE        F_SEQ   1       BCD     buf2     na    na
DESCFILE    F_SEQ   0       254     prompt1  attr1
SECURITY    F_SEQ   0       0       both     3
SECURITY    F_SEQ   1       254     read     0
SECURITY    F_SEQ   1       254     write    1
DEFAULT     ACC     F_SEQ
;
;
; File Definition Table Source Code Documentation Notes:
;
; Purpose:      To completely identify all the files to be used
;               in the application. Their are four commands
;               that define each file:
;                     FILE - Creates Memory Definition
;                     DESCFILE - Describes input editing
;                     SECURITY - Determines file access
;                            security
;                     DEFAULT - Labels the file as one of the
;                            system default files.
;
; Required?:    Yes
; Repeated?:    No
; Builds File?: Yes
; Filename:     MDT.INC
; Symbols?:     No
;
; Post
; Processing?:  Needs to be first separated into its constituent
;               parts by macro type. The subsequent info is used
;               to create section 9 and 10.6 of the A000H memory
;               table. Also, needs to be reformatted for input into
;               the existing MDT software to build the
;               file structure.
;
; Format:
; [File Description - Comment]
; FILE   [filename] [ID#] [compress type] [partition] [alt file]
[cutoff]
;
```

TABLE XVIIA-continued

Example of File Definition Module in Source Code

```
; where
;
; [filename] =       Logical File Name.
;
; [file ID#] =       Logical File identification number.
;
; [compress type] =  Type of Compression to be applied to the file.
;                    The possible values are:
;                          None
;                          BCD (4 bit coding with escape codes
;                                for non-numeric)
;                          6 bit (primarily used for alphanumeric)
;                          hybrid (used for equal mixes of
;                           numeric and alphabetic)
;
; [partition] =      The primary memory segment into which
;                    records for this file will be stored.
;
; [alt file] =       It is often desirable to reference items in ROM
;                    and RAM of in two different RAM areas
;                    with the same logical file number. If an
;                    alternate file is specified, records not con-
;                    tained in the defined file will be searched
;                    for in the alternate file.
;
; [cutoff record] =  The logical record number that separates
;                    records in this file from records in the
;                    alternate file. The cutoff record is the
;                    record number of the first record in the
;                    alternate file
;
;
; DEFAULT  [file name]  [file type]
;
; [file number] =  The same file name used previously.
;
; [file type] =    Identifier of a default file type. The
;                  default file types are used to shorten the
;                  ZAPD commands so that file number does not
;                  have to be added:
;                        ACC = Default Accumulator File
;                        CSI = Default Control String File
;                        ERR = Default Error Status File
;                        PAS = Default User Password File
;                        PRM = Default Prompt File
;                        SEQ = Default Sequence Number File
;                        SYS = Default System Password File
;
;
; DESCFILE [file #] [min] [max] [prompt] [edit]
;
; [file #] =   The logical file number that will be used to store
;              data input using this attribute type.
;
; [min] =      Specifies the lowest record in the file to which
;              this description applies.
;
; [max] =      Specifies the highest record in the file to which
;              this description applies.
;
; [prompt] =   Record number of the prompt in the default prompt
;              file to display when data for this file are
;              inputted.
;
; [edit] =     Label name of the input attribute used for this
;              range of records.
;
; NOTE:  There may be more than one DESCFILE statement
;        for a given file if different records within the same
;        file have different input attributes.
;
;
; SECURITY [file] [min] [max] [type] [func]
;
; [file #] =  The logical file number for which security
;             is provided.
;
; [min] =     minimum record number (inclusive) that corresponds
;             to this input attribute.
```

TABLE XVIIA-continued

Example of File Definition Module in Source Code

```
;
; [max] =    maximum record number (inclusive) that corresponds
;            to this input attribute.
;
; [type] =   kind of access permitted:
;                  READ
;                  WRITE
;                  BOTH
;            If no entry is provided, the record sequence
;            within the file may not be either READ or
;            WRITTEN from the keyboard.
;
; [func] =   function group for this activity
;
; NOTE:  There may be more than one SECURITY statement
;        for a given file if different records within the same
;        file have different security requirements, or a file
;        may have different security requirements for reading
;        than for writing.
;
;
END FILE DEFINITION TABLE
```

TABLE XVIIB

STRUCTURES FOR FILE DEFINITIONS

SDT STRUCTURE:

SECURITY file# minimum read# maximum.read# security.type function#.reqd

Multiple entries can be given to create different access levels for the same or different ranges of any file. An entry must be present for any file to be stored or recalled. If NO value entry is given for a particular access type to a particular file, for example a file has entry for READ, but no entry for WRITE, that access type can not be performed on that file (i.e. you can not store anything to the file, no matter what your access level.)

No wild card specifiers are allowed. An entry of 255 for file number inidcates the end of the table, not "any file."

FEDSC STRUCTURE:

DESCFILE file# minimum.read# maximum.read# prompt# input.attribute.entry

Multiple entries may be given to create different data entry types or prompts for different ranges of a file. Some entry must be present for any file which is to be stored. However, a "wild card" entry giving 255 as the file number may be placed at the end of the table to allow use of a default data entry type for all other files. Note that only files which have an SDT entry permitting WRITE access can be stored using the DO_STORE opcode.

TABLE XVIIIA

Example of Input Attribute Module in Source Code

```
BEGIN INPUT ATTRIBUTE
;
;EDIT    Label   Edit     Map   Len   P1   P2   Dec
;
EDIT     Telco   Telnum   Num   32    na   na   na
; Input Attribute Definition TABLE Source Code Documentation
  Notes:
;
;Purpose:      To completely identify all the input editing
;              routines for non-file input in the application.
; Required?:   No
; Repeated?:   No
```

TABLE XVIIIA-continued

Example of Input Attribute Module in Source Code

```
; Builds File?:   Yes
; Filename:       INP.INC
; Symbols?:       No
; Post
; Processing?:    A new A000h section needs to be built with this
;                 information.
; Format:
; EDIT [label] [edit type] [keymap] [len] [P1] [P2] [dec]
;
; where
; [label] =       Label used for identifying this particular input
;                 attribute. Used by entries in the File Definition
;                 Table to refer to specific input attributes.
;
; [edit type] =   Type of editing routine that will be used to
;                 edit input for this file:
;                        alpha_
;                        num_ed
;                        alphan
;                        intege
;                        teleno
;                        pw_edi
;                        amount
;                        usredi
;
; [keymap] =      Way special keys (#) are mapped for inputting
;                 this file. Possible values are: num and tel
;
; [len] =         Maximum Length of input string for this record.
;
; [P1] =          Parameter 1 for input checking. Value will
;                 depend upon input checking type.
;
; [P2] =          Parameter 2 for input checking. Value will
;                 depend upon input checking type.
;
; [dec] =         Number of decimal places required for entry if
;                 it is an amount, otherwise it is the minumum
;                 length.
;
;
END INPUT ATTRIBUTE
```

TABLE XVIIIB

Input Attribute Reference Table

Introduction

This handout explains the possible input attribute editing types, and the meaning of the various parameters that are used for each editing type. The input attributes are used when creating a file with the EDIT keyword. As shown in the summary document. "ZAPD Version 2.0 Source Code Format", the syntax of the EDIT command is as follows:

EDIT <Label> <Edit> <Map> <Len> <P1> <P2> <Dec>

NOTE: The header for this section in the sample ZAPD skeleton will soon be updated to use more descriptive titles for each of these fields, based upon the explanation given below.

The <Label> Parameter

The <Label> parameter is the local label the programmer wishes to give to the specific combination of edit type and edit parameters. It is the name used to refer to this combination of attributes from either the File Description Table or from ZAPD source code.

The <Edit> Parameter

The <Edit> parameter identifies which of the ROM based editing routines will be used for input editing. The following input editing routines are supported. NOTE: The name of the editing routine must be entered exactly as shown below:

| Name of <Edit> | Used When Editing |
|---|---|
| pwedit | Passwords. |
| alpha_ed | Alpha only input. |
| num_edit | Numeric only input. |
| alphanum | Mixed alpha and numeric input. |
| teleno_ed | Telephone numbers. |
| integer_ | Numeric data that has no decimal point, and with minimum & maximum value limits. |

TABLE XVIIIB-continued

Input Attribute Reference Table

| | |
|---|---|
| amount_ed | Dollar amounts |
| usredit | Edit from user supplied list of characters. |
| (userlabel) | User defines the label of a Z-80 assembler edit routine, downloaded with the application to the terminal. |

The following discussion explains in more detail the use of each editing type, and it explains the use of the parameters <Len>, <P1>, <P2>, and <Dec> for each edit type.

PWEDIT

This edit routine is used for editing passwords. Each user entered character is echoed to the screen as a *. The password can contain any alpha or numeric character that can be generated from the ZON keyboard.

<map> = All features except auto enter are allowed.
<len> = Maximum length of the password.
<P1> = Ignored for this edit checking type.
<P2> = Ignored for this edit checking type.
<dec> = Ignored for this edit checking type.

ALPHA_ED

This edit checking routine is used for entering alphabetic characters only (A thru Z).

<map> = All functions are operative for this edit checking type.
<len> = Maximum length of the alphabetic string.
<P1> = Ignored for this edit checking type.
<P2> = Ignored for this edit checking type.
<dec> = Minimum length of the alphabetic string.

NUM_EDIT

This edit checking routine is used for entering numeric characters only (0 thru 9). A decimal point is permitted as an acceptable entry.

<map> = All functions are operative for this edit checking type.
<len> = Maximum length of the numeric string.
<P1> = Ignored for this edit checking type.
<P2> = Ignored for this edit checking type.
<dec> = Minimum length of the numeric string.

ALPHANUM

This edit checking routine is used for entering any ASCII character that can be reproduced from the ZON keyboard.

<map> = All functions are operative for this edit checking type.
<len> = Maximum length of the string.
<P1> = Ignored for this edit checking type.
<P2> = Ignored for this edit checking type.
<dec> = Minimum length of the string.

TELENO_ED

This edit checking routine is used for entering a telephone number. Standard numeric characters (0-9) are allowed as are the letters P, T, and A, and the characters *, #, -, and (space).

<map> = All functions are operative for this edit checking type.
<len> = Maximum length of the string.
<P1> = Ignored for this edit checking type.
<P2> = Ignored for this edit checking type.
<dec> = Minimum length of the string.

INTEGER_

This edit checking routine is used for entering an integer value. It differs from the NUM_EDIT routine in that this edit type allows range checking. A minimum and maximum range value can be checked for. Decimal points are not permitted. The auto-enter feature is not supported, but the data input will automatically auto-enter when the field is full. If auto enter should be disabled, the maximum length can be made larger than the largest permissible value.

<map> = All keymap functions are available except auto enter.
<len> = Maximum length of the string.
<P1> = Minimum value.
<P2> = Maximum value.
<dec> = Minimum length of the string.

AMOUNT_ED

This editing type is used for editing dollar amounts. The decimal point is fixed and the user sees a leading dollar sign. Only numeric values (0 thru 9) are permitted, and a second decimal point is not permitted.

<map> = All keymap functions are available except auto enter.
<len> = Maximum length of the string.
<P1> = Allow trailing sign (minus can be added)
<P2> = Not used for this editing type.
<dec> = Not used for this editing type.

USREDIT

This edit checking type allows for the programmer to supply a semi-customized editing routine. Characters are allowed as input only if they are found in the string of characters supplied by the user.

<map> = All functions are operative here.
<len> = Maximum length of the string to be entered.
<P1> = P1 is the address of the edit string.
<P2> = Not used.
<dec> = Minimum length of the string to be entered.

The <Map> Parameter

The <map> parameter is used to set various bit flags that are used to provide additional information to control what data can be entered by the user and the behavior of the display during input. This single byte variable is bit mapped as follows:

xxxfacmm where xxx = reserved bits, not yet used.
f = alpha flag to indicate whether the keyboard should be shifted to alpha mode during data entry.
  0 = keyboard is in numeric mode.
  1 = keyboard is in alpha mode.
a = flag to signal auto-enter mode. If data entry is in auto-enter mode, this means that when the field is full, the user will not be required to press the ENTER key. This is valid only on some edit types.
  0 = user must press ENTER key to terminate data entry.
  1 = data entry terminated when input field is full.
c = flag to signal clearing of display. If this flag is set, the display will clear when the first key is pressed. If the flag is not set, the screen will not clear.
  0 = don't clear screen with first key press.
  1 = clear screen with first key press.
mm = flag to set the mapped value of certain keys.
  00 = normal operation. All keys are as shown.
  01 = calculator mode. # key is now the decimal point, and the / key is the # sign.

Writing User Defined Edit Routines:

Further information on writing user supplied edit routines can be supplied on demand. In creating user supplied edit routines, the programmer must specify the label of the assembly language edit routine. This routine must be inserted in the ZAPD download using the INLINE command. This programmer supplied assembly routine must edit the entered data on a character by character basis and follow Aztec C II parameter passing and calling conventions (Parameter is passed on the stack, BC must be preserved). The current character is supplied as its only parameter. The routine must return after each character has been validated and possibly added to the destr buffer, and must handle the Clear-Entry and Enter keys. When the routine detects that the field has been successfully entered, it must call ENTER_ACTION before exiting.

In writing this user defined edit routine, the following ZAPD system variables are used to pass parameters from the input attribute table to the user defined editing routine:

| | |
|---|---|
| map_misc | (Byte) Contains the "mm" field of the <map> parameter. This is always 00 or 01, currently. |
| alpha_flag | (Byte) Is set to 2 if the "f" field of the <map> parameter is 1; 0 if the "f" field is 0. |
| autoenter | (Byte) Is set to 0FFh if the "a" field of the <map> parameter is 1; 0 if it is 0. |
| cls | (Byte) Is set to 0FFh if the "c" field of the <map> parameter is 1; 0 if it is 0. |
| de_length | (Byte) Contains the value of the <len> parameter. |
| de_min | (Word) Contains the value of the <P1> parameter. |
| de_max | (Word) Contains the value of the <P2> parameter. |
| req_de | (Byte) Contains the value of the <dec> or <minimum len> parameter. |

<End of Document>

TABLE XIX

Example of Security Module in Source Code

```
BEGIN PASSWORD MODE SET TABLE:
;
;               0        1        2        3        4
;MODE   mode    12345678 90123456 78901234 56789012 34567890
MODE    1       11110100 10000000
MODE    2       00000011
MODE    3       00001000
MODE    4       11111111 11110000
;
; Password Mode Set Definition Table
;
; Purpose:      To indicate the valid funtion groups for each
;               password mode.
;
; Required?:    Yes
; Repeated?:    No
; Builds File?: Yes
; Filename:     MOD.INC
; Symbols?:     No
;
; Post
; Processing?:  A new A000h section needs to be built with this
;               information.
;
; Format:
; MODE [password mode] [bitmap]
;
; where
;
; [password mode] =    password mode value set by a lookup into the
;                      password file.
;
; [function bitmap] =  up to six 8-bit binary values, where the
;                      first bit corresponds to function group 1,
;                      the second bit is for function group 2, etc.
;                      If a function group's bit is on, it will be
;                      allowed when the specified password
;                      mode is in effect. If a byte is not specified,
;                      no space will be allocated to it in the
;                      table, and all groups in that byte will be
;                      assumed to be false. The preprocessor will
;                      generate the appropriate length byte in
;                      each case.
;
;
END PASSWORD MODE
```

TABLE XX

Example of Special Keys Module in Source Code

```
BEGIN SPECIAL KEYS
;
; NOTE:  This section may be eliminated.
;
; NOTE:  The application programmer can define four keys:
;              ENTER key,
;              BACKSPACE or CLEAR ENTRY key,
;              HANGUP key, and
;              ALPHA key.
;        These four keys can be mapped to any key on the
;        keyboard, and this is handled with the KEYMAPPING
;        section of the program.
;
;        Other keys can generally be remapped by changing
;        the State Table.
;
;        If no KEYMAPPING section is provided, the defaults
;        are as follows:
;
;              ALPHA    EQU  MODE
;              HANGUP   EQU  SPACE
;              ENTER    EQU  U
;              BACKSP   EQU  S
;
           KEY  ALPHA       MODE
           KEY  HANGUP      SPACE
           KEY  ENTER       U
           KEY  BACKSP      S
; Special Keys Source Code Documentation Notes:
;
; Purpose:      To completely identify keys used by ROM
;               applications.
;
; Required?:    No
; Repeated?:    No
; Builds File?: Yes
; Filename:     KEY.INC
; Symbols?:     No
;
; Post
; Processing?:  The information needs to be reformatted for
;               section 3.5 of the A000H memory table.
;
; Format:       Key [name] [value]
;
END SPECIAL KEYS
```

TABLE XXI

Example of State Table Definition Module in Source Code

```
BEGIN STATE TABLE - READY
;
; The State Table is used to identify the keys that
; can initiate transactions from the READY state.
;
;
; NOTE:  The task list entry point is in lower case and is
;        shown UNDER the key. The key legends are shown
;        above the key.
;
; NOTE:  Task list entry points that end with a ## sign
;        are ROM based (e.g., calc##). Those without
;        a ## sign are RAM based.
;
; NOTE:  Underneath each task list entry point is the
;        next STATE that will be entered after the
;        current task has been completed.
;
;
;
;
;
```

TABLE XXI-continued

Example of State Table Definition Module in Source Code

```
;          A        B        C         D        E          F         G
;          AUTHOR   POST     ENDDAY             CALC       PHONE
;          +---+    +---+    +---+     +---+    +---+      +---+     +---+
;          ¶ 1 ¶    ¶ 2 ¶    ¶ 3 ¶     ¶   ¶    ¶   ¶      ¶   ¶     ¶   ¶
;          +---+    +---+    +---+     +---+    +---+      +---+     +---+
ACTION     imxcrd   servce   endday    errbp    calc##     phone     errbp
STATE      same_s## same_s## same_s##  same_s## same_s##   same_s##  same_s##
;
;          H        I        J         K        L          M         N
;                            CALLME                        SELECT
;          +---+    +---+    +---+     +---+    +---+      +---+     +---+
;          ¶ 4 ¶    ¶ 5 ¶    ¶ 6 ¶     ¶   ¶    ¶   ¶      ¶   ¶     ¶   ¶
;          +---+    +---+    +---+     +---+    +---+      +---+     +---+
ACTION     errbp    errbp    callimx   errbp    errbp      recall    errbp
STATE      same_s## same_s## same_s##  same_s## same_s##   same_s##  same_s##
;
;          O        P        Q         R        S          T         U
;          OTHER    CHECK                       BKSP                 ENTER
;          +---+    +---+    +---+     +---+    +---+      +---+     +---+
;          ¶ 7 ¶    ¶ 8 ¶    ¶ 9 ¶     ¶   ¶    ¶   ¶      ¶   ¶     ¶   ¶
;          +---+    +---+    +---+     +---+    +---+      +---+     +---+
ACTION     credit   check    errbp     errbp    errbp      store     errbp
STATE      same_s## same_s## same_s##  same_s## same_s##   same_s##  same_s##
;
;          V        W        X         Y        Z          Space     MODE
;          REPEAT   NO                 SCROLL   SCROLL     HANG      ALPHA
;          DIAL                        RIGHT    LEFT       UP
;          +---+    +---+    +---+     +---+    +---+      +---+     +---+
;          ¶ * ¶    ¶ 0 ¶    ¶ # ¶     ¶   ¶    ¶   ¶      ¶   ¶     ¶   ¶
;          +---+    +---+    +---+     +---+    +---+      +---+     +---+
ACTION     redial   errbp    errbp     right##  left##     abort##   errbp
STATE      same_s## same_s## same_s##  same_s## same_s##   same_s##  same_s##
;
;
;          CARDRDR      MODEM       TELCO      PINPAD
;          -------      -------     -------    -------
ACTION     imxcrd       errbp       telco      errbp
STATE      same_s##     same_s##    same_s##   same_s##
; State Table Source Code Documentation Notes:
;
; Purpose:        To define how the system should behave when
;                 a particular kind of input arrives. NOTE:
;                 The state table can either be defined in ROM
;                 or RAM. It can not be mixed in both locations.
;
; Required?:      No
; Repeated?:      Yes
; Builds File?:   Yes
; Filename:       ST1.MAC
; Symbols?:       Yes
; Post
; Processing?:    The information needs to be reformatted for
;                 section 4 of the A000H memory table. The
;                 data must also be reformatted to be input
;                 for the state table compression routines
;                 COMPRESS4.COM.
;
; Format:         STATE [state 1] . . . [state n]
;                 ACTION [action 1] . . . [action n]
;
END STATE TABLE - READY
```

TABLE XXII-continued

Example of APM Definition Modules in Source Code

```
; ___________________________________________
; APPLICATION PROGRAM MODULES
; ___________________________________________
; ___________________________________________
;        ABORT
; ___________________________________________
BEGIN JOB -ABORT
         chk_zapd @okmem
         display_clear
         display_string 'DOWNLOAD NOW BAD'
         ;
okmem:   halt
; ZAPD Source Code Documentation Notes:
; ___________________________________________
; Purpose:        The ZAPD source code defines the application's
;                 function.
;
; Required?:      Yes
; Repeated?:      Yes
; Builds File?:   Yes
; Filename:       ZAP.MAC
; Symbols?:       Yes
;
; Post
; Processing?:    The information needs to be reformatted for
;                 section 5, 7 and 7.5 of the A000H memory table.
;                 The data must also be reformatted to be input
;                 for the ZAPD assember.
;
; Format:         As shown above.
; ___________________________________________
END JOB -ABORT
```

TABLE XXIIIA

Example of Control String Definition Module in Source Code

```
BEGIN CONTROL STRING F_CSI -AUTH_NDC
;
; NDC type Credit Authorization
;
;   Command    Description
;   _______    ____________________
;
    Q          Write Control Character
    A5B1       Get account and expiration date
    C1-4-6     Prompt for amount, use dollar edit and
;              limit entry to 6 characters
    R35        append # sign to amount
    R#201      append tran code 01
;
; Control string definition
; ___________________________________________
; Purpose:        To define control strings used by the application
;                 that will be downloaded after the absolute download.
;
; Required?:      No
; Repeated?:      Yes
; Builds File?:   Yes
; Filename:       DATA.UDL [same as BUILD FILE below]
; Symbols?:       Yes
;
; Post
; Processing?:    Equates are generated for the specified labels,
;                 and the data is prepared for the download
;                 program.
;
; Format:
; [control string command] [comment]
;
; where
;
; [control string command] =   any valid control string or
;                              portion of a control string. Use
;                              dashes instead of commas as
;                              delimiters.
;
; [comment] =     after the first blank or tab following
```

TABLE XXIIIA-continued

Example of Control String Definition Module in Source Code

```
;                 the first non-blank parameter will be treated
;                 as a comment.
;
; ___________________________________________
END CONTROL STRING F_CSI -AUTH_NDC
```

TABLE XXIIIB

SPECIFICATIONS FOR I/O FORMAT CONTROL STRING INTERPRETER - ZON VFI DATA CAPTURE

INTRODUCTION:

First generation Veri-Fone terminals had a rudimentary ability to customize the terminal's operation through the use of a "control string". The initial control string was used to determine (1). What prompts were displayed.
(2). What device was enabled for input for each prompt, and
(3). What special control information (e.g., Frame Separator) was to be included in the transmit packet.

Data inputted in response to each prompt was used to create the packet of information that was ultimately sent to the host computer. The control strings lived in RAM, and could be downline loaded or entered via the keyboard. The function of the first generation "control string" is well documented in the user's manual for version 16.5 of the 6800 based Veri-Fone terminal.

A typical control string might look something like this:

QIA5BICI

In this example the values Q, A, B, and C are each commands. The numbers following the letters are parameters that modify the commands. This example shows four different commands

- Q1 - Put Write Control Character in Transmit Packet.
- A5 - Display message A and get input from keyboard or card reader. If it came from the card reader, skip next two characters of control string.
- B1 - If input to message A came from keyboard, display message B and get keyboard input to this query.
- C1 - If input to message A came from keyboard, display message C and get keyboard input to this query.

In preparation for data capture environments, the original control string language had been expanded. It is now called the I/O Formatting Control String and handles a wide variety of input and output during the terminal's operation.This document describes the use of the expanded control string.The example below shows a sample of the expanded control string:

R86R73T18,0,−22,32T14,2T37,0,9,32

This control string formats a line to the printer for a receipt.

This document first provides a brief introduction to the I/O Format control string commands, then reviews the types of each command in detail. Finally, the document describes how to use the I/O Format Control String Interpreter. An application example is at the end of the document. This document is intended for use by software engineers, and is not an end user document.

PURPOSE OF I/O FORMAT CONTROL LANGUAGE

The I/O Format Control Commands are used to

- build data packets for communication with the host or the PIN PAD.
- determine what is to be stored in data capture memory.
- control data entry formatting and editing, and print reports or receipts.

The control string contains the instructions to assemble information in a buffer which is ultimately sent to either the host, memory, the printer or the PIN Pad. A specific control string has a single purpose. It either

- builds the transmit packet that willbe sent to the host computer,
- builds the record that will be stored during data capture,
- builds the packet sent to the PIN Pad, or

- builds a line of information that is sent to the printer.

A control string's purpose is determined by the entry point through which the I/O Format Control String Interpreter iscalled. The table below contains the entry points for interpreting different control string functions; the ZAPD commandDO_BLD_STRING can use any of these entry points, depending on the control string entry code if it is given as a parameter.

| Function | Entry Point | ZAPD Entry |
|---|---|---|
| Build transmit packet to the host computer or to PIN Pad. | ctlstr( ) | %DE |

TABLE XXIIIB-continued

SPECIFICATIONS FOR I/O FORMAT CONTROL STRING INTERPRETER - ZON VFI DATA CAPTURE

| | | |
|---|---|---|
| Build record to be stored in Data Capture memory. | stltrns( ) | %DR |
| Build record for printer. | prntstr( ) | %FM |

where %DE = 0, %DR = 1, and %FM = 2

A global variable, CONSPEC contains the binary value of the control string number for the string that should be interpreted.

BRIEF INTRODUCTION TO I/O FORMAT COMMANDS

Within the ZON I/O Format Control Language a command begins with a letter from A to Z. Some commands consist of more than one letter. Commands are followed by parameters.

| COMMAND | PURPOSE OF COMMAND | SIMPLE COMMAND EXAMPLE |
|---|---|---|
| A, B, . . . P —⌇ | These commands display prompts on ZON screen. each letter represents a single prompt. | D causes record number of prompt file to be displayed. |
| | Prompt commands are also used to identify which input device is to be used to satisfy the input request. | D1 causes record number in prompt file to be displayed, and input to be accepted from the keyboard. |
| AA . . PA —⌇ | These prompt commands are extensions of original ones to allow more than 16 prompts. Purpose is the same as the single letter prompt command. These prompts also resides in RAM. | CA1 causes record number in prompt file to be displayed, and input to be accepted from the keyboard. |
| Q ————⌇ | This command has the original control string function - it inserts the write control character into the buffer being built. | QA1 causes the write control char to be inserted first into the buffer and then a prompt to be shown and then data entered from the keyboard. |
| R ————⌇ | This command is used to cause constant data to be inserted into the buffer. | R28 causes an ASCII frame separator to be added to the buffer. |
| S ————⌇ | This command is used to send the buffer that has been built to the printer or to branch to another control string. | A1B1C1S0 causes a record which contains the keyboard response to prompts A, B, C to be sent. |
| T ————⌇ | This command manipulates information in the transmit buffer. The command can be used to store info in the transmit buffer, or extract it from the buffer. | TS2 causes variable S2 to be copied to the transmit buffer. |
| U ————⌇ | This command manipulates information in the receive buffer. | U10,5 causes the five bytes in the receive buffer beginning at the tenth byte to be extracted. |
| V ————⌇ | This command invokes a user defined function. | V1 invokes the user defined function with a parameter of 1. Coding of user defined function will not be explained here. |
| W ————⌇ | Reserved for expansion | |

DETAILED ANALYSIS OF I/O FORMAT CONTROL STRING COMMANDS

A detailed discussion of each command follows. In each of the following discussions, the following general symbols are used:

| | |
|---|---|
| ⌇ ⌇ | indicates the command component |
| :: | provides the possible values for the command component. |
| [ ] | indicates mandatory set of values |
| § † | indicates optional set of value |
| . . . | indicates a range of values |
| j,k,n,m | indicate integers |

Note: Throughout the discussion of control strings, numerous examples are provided. Some of the characters indicated in the examples can not be entered from the keyboard. In these cases, the following substitutions are valid:

| Original Chars defined | | Valid Substitution |
|---|---|---|
| $ | —⌇ | + |
| @ | —⌇ | * |
| . | —⌇ | — |

GET INPUT COMMANDS: A . . . P, AA . . . PE

Purpose: Put message on ZON's display and get input from either the keyboard or the cardreader. Primitive input editing features are provided.

Syntax: ⌇prompt identifier⌇ ⌇input identifier⌇

⌇prompt identifier⌇ :: [A ¶ B ¶ . . . ¶ P] ¶
[AA ¶ BA ¶ . . . ¶ PA ¶ AB ¶ . . . ¶ PE] ¶

⌇input identifier⌇ :: [1, 2, 3 . . . ⌇3] §,n † §,m †

Examples:

| | |
|---|---|
| A1 | Display string stored at record #1 of the prompt file. and then and get input from the keyboard. |
| BC3 | Display string stored at record 50 of the prompt file, and then get input from either the card reader or the keyboard. If input comes from the card reader, skip over the next two characters in the control string. |
| DE1,2,4 | Display string stored at record 84 of the prompt file and then get input from the keyboard. The input is of numeric type and has a maximum length of four characters. |

Prompt Identifier

Originally, only 16 prompts or string constants could be stored and used. These prompts all were RAM resident. Sophisticated applications require more than 16 prompts. Thescheme identified here allows up to a theoretical maximum of 254 prompts in a single application.

The prompts live in a particular memory location that is fixed for the application. In ZAPD, the prompt file is defined by the ZAPD Environment (using the DEFAULT keyword of the FILE DEFINITION Module) or by using the SET_FILE_PRM command.

Each prompt is identified by its group number and the relative position within that group. If a prompt is identified by a single char (as with the original control strings) then it belongs to default group 0. If two characters are used then second character tells which group this prompt belongs to.

For example:

| | |
|---|---|
| AB | first prompt of the group B. |
| CA | third prompt of the group A. |
| PD | sixteenth prompt of the group D. |
| F | sixth prompt of the default group. |

The following is the memory location range for prompts which are stored in RAM:

| RECORDS | | GROUP |
|---|---|---|
| 1-16 | - | default group |
| 17-32 | - | group A |
| 33-48 | - | group B |
| 49-64 | - | group C |
| 65-80 | - | group D |
| 81-96 | - | group E |
| . | | |
| . | | |
| . | | |

TABLE XXIIIB-continued

SPECIFICATIONS FOR I/O FORMAT CONTROL STRING INTERPRETER - ZON VFI DATA CAPTURE

| | | |
|---|---|---|
| 225-240 | - | group N |
| 241-255 | - | group O (only 14 prompts) |

Input Indentifier:

The input identifier is responsible for indicating the source of the input, and it can optionally do primitive input verification. The format for the input identifier is d §n[n],m[m] † d = input device number.

There are two possible values.

1 = Input from keyboard.

2 = Input from card reader.

If a value of 3 or greater is entered, then input is allowed from either the card reader or keyboard. If the value is greater than 3, then this indicates the number of characters to skip in the control string if input comes from the card reader.

§n[n] = the type of permitted input

1 = alpha type data

2 = numeric type data

3 = alpha-numeric type data

4 = dollar amount type data

§m[m] = the maximum length of the input. It can have a value from 1 to 51.

WRITE CONTROL CHARACTER COMMAND - Q

Purpose: Insert WCC (Write Control Character) with variable contents into the buffer being built.

Syntax: Q §{tran code value} †

{tran code value} :: n ¶
$n n :: {1 .. 16}

Examples:

Q - Concatenate WCC with transaction code of 0.

Q3 - Concatenate WCC with transaction code of 2.

Q$1 - Add WCC with transaction code taken from the trancode variable.

A Write Control Character is a single ASCII character composed of binary fields which provide basic information about the transaction. The binary fields in the WCC are as follows:

WCC BINARY FIELDS bit 0 - 1 if the following field was from the card reader.
0 if the following field was from the keyboard.

bit 1 - 1 if multiple transactions are being requested by the terminal.
0 if only a single transaction is being requested.

bits 2-5 contain a binary transaction codce value (0-16) which defaults to a zero. The transaction code specified in the Q command is decremented by one to give the value stored.

bit 6 - is always 1.

bit 7 - parity bit (always even parity).

It should be noted that if a card is subsequently read during the execution of this control string, the respective bit field will be zero and this will be automatically set.

DATA INSERTION COMMAND - R

Purpose: Insert constant data into the buffer being built.

Note: None of the R format commands will prefix an ASCII FS (frame separator) to data they insert.

Syntax: R {data insertion parameter}

{data insertion parameters} :: n ¶
n §,m[m]† ¶
#n {character strings} ¶
*n §,m[m] † ¶
$n §, † ¶

Examples:

| | |
|---|---|
| R28 | Insert frame separator (ASCII 28) into buffer. |
| R28,10 | Insert ten frame separators into buffer. |
| R#4,TEST | Inserts string "TEST" into buffer. |
| R*15 | Left justify the buffer that has already been built and pad with spaces so that the total buffer length is now fifteen spaces. |
| R$10, | Format the value in the global variable AMTSAV as a dollar value in a ten byte wide window, add a floating dollar sign, and then add to the buffer. |

Data Insertion Parameters

Rn

This form of the command is used to insert a single ASCII character into the buffer. The value of n is a decimal number from 0 to 127. R65, for example, will insert a capital A into the buffer.

Rn,m

This form of the command is used when there is a need to insert an ASCII character more than one time. R65,5 will put five capital A's into the buffer. The value of n varies from 0 to 127, and m can be as large as 255.

R#n {character string}

This form of the command is used to insert an ASCII string into the buffer. R#9,VERI-FONE will insert the word VERI-FONE into the buffer. Note that the value of n is the length of the string. In this instance, the length of the string does not include the length byte. Strings up to 255 bytes can be included.

R*n §,m[m] †

This form of the command is used to left justify the length of an item in the buffer. The value of n determines the length of the buffer AFTER the operation. The optional parameter§,m[m] defines the character to be used for padding. A space is the default pad character if no value of m is provided. If the value of n is less than the existing buffer size, the buffer will be trucated to the specified length. The value of m can be from 0 to 127 and represents the decimal equivalent of an ASCIIcharacter.

This command will mostly be used in formatting lines for the printer where each line has to be tightly formatted by adding spaces.

The command R*20 will cause the buffer which has previously been built to be left justified to 20 spaces. If the buffer only had twelve characters, eight spaces would be added to the right of the buffer. The command R*20,42 would fill these eight spaces with asterisks ('*').

R$n §,†

This form of the command is used to format the digits in the AMTSAV buffer into a dollar amount of length n, and then append the string to the buffer. If the optional comma delimiter is used, a floating dollar sign will be inserted into the string. This command assumes that the amount is already in buffer. AMTSAV with or without a decimal point init. For example, if AMTSAV is "1225" or "12.25" then

```
R#8,AMOUNT $R$7    -}  AMOUNT  $  12.25
                                  +-----+
                                   len 7
R#6,AMOUNTR$9,     -}  AMOUNT    $ 12.25
                                 +-------+
                                   len 9
```

Two decimal points are assumed. In the first example the R#8, AMOUNT $ will put the string "AMOUNT $" into the buffer. The command R$7 will format the value of AMTSAV (1225) into a sevencharacter field.

In the second example notice that the dollar sign is no longer part of the string constant, but has been added to the final buffer through the use of the comma delimiter. This dollar sign, though, is a floating dollar sign.

BRANCHING COMMAND - S

Purpose: The branching command is used to either end the buffer building and terminate the control string, or to transfer control to another control string. If the print control string entry point had been selected, and the S command is used to end the control string, the control string interpreter will automatically send the buffer that has been built to the printer. In other cases, the ZAPD application must determine what will be done with the buffer.

Syntax: S {control transfer parameter}

{control transfer parameter} :: 0 §,n † ¶
[1 . . . n]

Examples:

S12 Transfer control to control string 12

S0 Terminate control string interpreter.

Control Transfer Parameter:

S0

This form of the command is used to signal the end of the control string. The control string interpreter will automatically perform the action that is implicit with the type of control string.

The automatic actions performed upon control string termination

TABLE XXIIIB-continued

SPECIFICATIONS FOR I/O FORMAT CONTROL STRING INTERPRETER - ZON VFI DATA CAPTURE are as follows:

| Control String Type | At Termination Interpreter |
|---|---|
| %DE | Does nothing |
| %DR | Does nothing |
| %FM | Send line to printer. |

If a data capture record is being built with the control string, this will be stored in data capture file number one. To store in another data capture file, the next formof the command should be used.

Sn

This form of the command is used transfer control to another control string. This allows control strings to be longer than 50 characters. The value of n ranges from 1 through 255. the command S32 will transfer control to the thirty second (decimal) control string.

TRANSFER COMMAND - T

Purpose: The T command is used to transfer information from some area of memory to the buffer that is currently being built. The T command can access information that is in the transmit buffer, record of a file, or a system variable.

Syntax: T ¦transfer parameter¦

¦transfer parameter¦ ::
  n,m §,j,k † ¶
• n,m §,j,k † ¶
n:m §,l,r † §,j,k† ¶
$ n §,j,k †

Examples:

T14,2 Transfer the two byte data field beginning in the 15th position in the transmit buffer to the current buffer being built.

T*2,14 Transfer data starting with the 15th byte following 2 FS and continue until an ETX, FS or end of source string to the current buffer being built.

T#3:2 Transfer the information stored in record 2 of file 3 to the buffer being built.

T$3 Transfer the amount to the buffer being built.

Tn,m §,j,k †

This form of the command is used to identify data from the transmit buffer that should be included in the buffer that is currently being built.

n = Number of characters to skip in the transmit buffer where n varies from 0 to 255. Because this can be 1, 2 or 3 digits long, there must be a comma to indicate the end of this field.

m = length of the data to include in the data capture buffer. When zero is specified (e.g., Tm,0), a variable length field is assumed, and all data until the next ¦FS¦ or ¦ETX¦ is collected.

j,k = two extra optional parameters can be used to control the length (length justification) of copied matter.

j - defines the desired length and can have a value 0 to 254. By default it causes right justification, however, if "j" starts with a minus ("−") sign then the field becomes left justified to the specified length.

k - defines the decimal value for the ASCII character to used for length justification.

These parameters are defined with an extra ',' after first two parameters. If the ',' is not present then system would not justify the length of copied data.

All of the above parameters can be defined as a constant value or through a variable number by using $n, where n is $1 - trancode
$5 - trnumb
$6 - trnrec
$7 - wrkvbl If these variables are used, their value must have been previously set from ZAPD.

Example:

Assume that the transmit buffer held the following data:

```
¦STX¦
CHECK.00000
¦FS¦
@
40                     :Tran Type
¦SF¦
5297643719528912345    :Account #
¦FS¦
100                    :Amount
¦ETX¦
¦LRC¦
```

The following data capture command string would create a capture buffer which would have the following format:

```
VI          (Absolute)
Account #   (from Transmit Buffer) - 22 digits
Tran Type   (from Transmit Buffer) - 2 digits
Amount      (from Transmit Buffer) - 9 digits)
*3 05 R86R73T18,0,−22,32T14,2T37,0,9,32
      1 2    3     4    5        commands
```

NOTE: For this control string to work, all fields in the transmit buffer should have constant, fixed lengths except for the final field which is declared to be a variable length record.

You can also build the data capture buffer from a new series of prompts and keystrokes that would occur AFTER the transaction. The example below indicates how this method of building the data capture buffer would be mixed with incorporating items from the transmit buffer.

Example:

The format for the data capture file will be as follows:

```
VI          (Absolute)
Account #   (from Transmit Buffer)
Clerk ID    (from User Prompted Input)
Tran Type   (from Transmit Buffer)
Amount      (from Transmit Buffer)
*3 05 R86R73T18,19M1T14,2T37,0
```

The M1 indicates that prompt M (Which might be ENTER CLERK ID) is shown on the display. and keyboard entry only is accepted.

T*n,m §,j,k †

In this form of the command, information from the transmit buffer is included in the current buffer being built based on the number of frame separators before the desired data field is identified:

n = The number of Frame Separator characters that are in front of the desired information. If the data item is the first data item, zero is used.

m = The offset within the field where the desired data begins. An offset of zero indicates that the desired data begins immediately after the frame separator.

j,k = Follow the same rules for substring specification as with the previous command (see T n,m §,j,k .)

The previous example can be rewritten as follows:

*3 05 R86R73T*2,0T*1T*3,0

NOTE: This control string does not require all fields in the buffer to be of constant length.

T#n:m §,l,r † §,j,k†

This form of the command provides the capability to include a record of a file in the buffer being built. Two extra parameters l and k can be used to identify the subfield of a record.

n - file number, value range is 1 to 99
m - record number, value range is 1 to 255
l - (optional) beginning position in the record.
r - (optional) length of the data to include.
j,k follow the same format for substrings as described previously in the discussion of the T n,m §,j,k command.

All of above parameters can be defined as a constant value or through a variable number by using $n, where n is $1 - trancode
$5 - trnumb
$6 - trnrec
$7 - wrkvbl Example:

Assume a sample HEADER packet has the following format:

| Field | Length |
|---|---|
| Packet type "52" | 2 |
| Merchant # | 12 |
| Terminal # | 4 |
| Blocking Factor | 4 |
| Currency code | 3 |
| Filler (spaces) | 7 |
| ETB | 1 |
| | 30 bytes |

The control string that would construct this information would be

TABLE XXIIIB-continued

SPECIFICATIONS FOR I/O FORMAT CONTROL STRING INTERPRETER - ZON VFI DATA CAPTURE

*4 05 R35R32T#4:30,1,12T#4:30,17,4T#8:6T#4:21,18,3R20,7R23

With optional parameters — Without optional parameters

This example assumes that the merchant identification number was stored in record 30 of file 4, and that the terminalnumber was stored in record six of file 8. Notice that in the first instance, the optional parameters are used to only allow the first twelve characters of the merchant identification number to be used.

TSn §,j, k†

This is the final version of the T command. This version indicates that a particular variable should be appended to the buffer being built. There are four variables from $1 to $4.

n = Variable identification number (1 to 4). These variables have special meaning.

| Id | | Name | Type |
|---|---|---|---|
| T$1 | = | Trancode | (String) |
| T$2 | = | Trnrec | (Byte) |
| T$3 | = | Amtsav | (String) |
| T$4 | = | Receive | (String) |

Note: If these variables are used, their value must have been previously set from ZAPD.

j,k = Follows same format for substrings as described in Tn,m §,j,k†

The earlier example can be rewritten as

*3 05 R86R73T*2,0T*1,1T$3,9,32

RECEIVE BUFFER EXTRACTION COMMAND - U

Purpose: To extract information contained in the receive buffer, and include this information in the buffer that is currently being built.

Syntax: U {Receive Buffer Extraction Parameter}

{Receive Buffer Extraction Parameter} :: n,m §,j,k† "
*n,m §,j,k†

Examples:

U14,4 This command takes the four bytes from the receive buffer beginning at byte 15, and puts them into the buffer being built.

U*3,8 This command takes the data field starting the 9th character following the 3rd Frame Separator {FS} in the receive buffer and continue until another {FS}, {ETX} or end of source string.

Un,m §,j,k†

This form of the command is used to identify data from the receive buffer that should be included in the data capture area.

n = Number of skipped characters in the receive buffer where n varies from 0 to 254. Because this can be 1, 2 or 3 digits long, there must be a comma to indicate the end of this field.

m = length of the data to include in the data capture buffer. When zero length is specified (e.g., Tm,0), a variable length is assumed, and all data until the next {FS} or {ETX} is collected.

j,k = The same substring function as found in Tn,m §,j,k† .

Example:

Assume that the receive buffer held the following data and transmit buffer still holds the data from last example:

{STX}
CHECK.00000
{FS}
AP37624
{ETX}
{LRC}

The following data capture command string would create a data capture buffer which would have the following format:

| | |
|---|---|
| VI | (Absolute) |
| Account # | (From Transmit Buffer) |
| Approval Code | (From Receive Buffer) |
| Tran Type | (From Transmit Buffer) |
| Amount | (From Transmit Buffer) |

*3 05 R86R73T18,19U13,7T14,2T37,0

NOTE: The final field is declared to be a variable length record.

As with the T command, the U command can be combined with user entry prompts that are entered following the end of the transaction.

U*n,m §,j,k†

In this form of the command, information from the receive buffer is included in the current buffer being built based on the number of frame separators before the desired data field is identified:

n = The number of Frame Separator characters that are in front of the desired information. If the data item is the first data item, zero is used m = The offset within the field where the desired data begins. An offset of zero indicates that the desired data begins immediately after the frame separator.

j,k = The same substring function as described in Tn,m §,j,k† .

This command causes all data from the specified starting location until the next FS or ETX to be included in the data capture storage buffer.

The above example can be rewritten as follows:

*3 05 R86R73T*2,0U*1,0T*1,1T*3,0

— End of Document —

TABLE XXIV

Example of Build File Modules in Source Code

```
BEGIN BUILD FILE
;
;          file name
;          ---------
DLLFILE F_PASSWORD
;
;          record   contents
;          ------   --------
RECORD 1            "ZONVF1,4"
;
; Password Mode Set Definition Table
;
; Purpose:         To indicate the valid function groups for each
;                  password mode.
;
; Required?:       No
; Repeated?:       Yes
; Builds File?:    Yes
; Filename:        DATA.UDL
; Symbols?:        No
;
; Post
; Processing?:     A new A000h section needs to be built with this
;                  information.
;
; Format:
; DLLFILE [file name]
;
; where
;
; [file name] =          File into which the records following are
;                        to be placed.
;
;
; RECORD [record number] "[contents]"
;
; where
;
; [record number ] =     record number to put the data following
;                        into.
;
; [contents] =           contents to be placed in record - must be
;                        enclosed in double quotes.
;
;
END BUILD FILE
```

TABLE XXV

SOURCE CODE AND SUPPORTING DOCUMENTATION FOR ALTERNATE VERSION OF THE INVENTION

CASE KMATERP is the initial entry point from the READY state. This is the routine in which preliminary initialization and keystroke analysis occurs.

```
case KMATERP:
if (prog_flg == FALSE)

        putdsp(prgmsg);
        errbeep();
        abort();
        return;

†
input[LENGTH] =                         /* !1 */
transmit[LENGTH] =                      /* !1 */
receive[LENGTH] =                       /* !1 */
de_str[LENGTH] =                        /* !1 */
intbuf[LENGTH] =                        /* !1 */
int2buf[LENGTH] =                       /* !1 */
sup_buf[LENGTH] =                       /* !1 */
amtsav[LENGTH] =                        /* !2 */
brntbl[LENGTH] = CSTR_NULL;             /* !2* /
/* set date/time mem location from opsys */
getclk();
blockmv(input, int2buf, int2buf[LENGTH]);
swapchar(&input[1], &input[5]);
swapchar(&input[2], &input[6]);
swapchar(&input[3], &input[5]);
swapchar(&input[4], &input[6]);
putmem(F_DATIM, 1);
input[LENGTH] = int2buf[LENGTH] = CSTR NULL;
cstrco(k_dat,&mchar,0,1);
k_stat = catoi(k_dat);
k_ctr = k_stat + k_act;
kdtfile = F_TASKSPEC;
getkdt(k_ctr);
k_ctr = 1;
k_stat = k_in0();
kmatl();
return;
```

KMATl is the intermediate entry point. This is where external processes such as CSINTERP enter to provide a restart capability. The source code for this routine is given below:

```
kmatl()

    k_acfl = 0;
    switch (k_stat)

        case 0:
            k_act = 0;
            errbeep();
            getout();
            return;
        case 1:
            k_act = k_in0();
            for (;;)

                k_acfl = 0;
                k_terp(k_act);
                k_act = k_inh();
                if (k_act != 0xff)

                    getkdt(k_act);
                    k_ctr = 1;
                † /* do not get new string if k_act = 0FFH */
                k_act = 0;
                if (k_acfl == 1)

                    k_stat = 1;
                    return;
                † /* end k_acfl = 1 */
                if (k_acfl == 2)

                    errbeep();
                    cWAITM(3*SECONDS);
                    getout();
                    return;
                † /* end k_acfl = 2 */
                k_act = k_in0();
            † /* end for (;;) */
            return;
    case 2:
```

TABLE XXV-continued

SOURCE CODE AND SUPPORTING DOCUMENTATION FOR ALTERNATE VERSION OF THE INVENTION

```
                        k_act = k_in0();
                        putdsp(compmsg);
                        currstate = nextstate = TRSELECT;
                        return;
        } /* end switch k_stat */
} /* end kmatl */
```

K_TERP is the opcode switch action which causes actual execution of the operation routine associated with the operation code in accordance with the following routine. Note each of the commands is listed along with the actual C-code commands which are executed to perform the task associated with the APM command. The source version of the command is set forth in the materials which follow the listing below.

```
k_terp(k_act)
char    k_act;

        register int    i;
        switch (k_act)

        case    K_DONE:
                k_acfl = 1;
                abort();
                return;
        case    K_BLDXMT:
                initcs();
                k_acfl = 1;
                csinterp();
                return;
        case    K_BLDDC:
                initcs();
                captstr();
                return;
        case    K_PUTDC:
                putmem(F DETAIL,apprec);
                return;
        case    K_GETDC:
                getmem(F_DETAIL,apprec);
                return;
        case    K_MOVBUF:
                k_ini();
                return;
        case    K INCACC:
                recnum = k_in0();
                incaccum(recnum);
                return;
        case    K_DECACC:
                recnum = k_in0();
                decaccum(recnum);
                return;
        case    K_SUMACC:
                recnum = k_in0();
                mathcode = k_in0();
                mathpak(mathcode, (recnum * 256) + F_DATAST, amtsav);
                putmem(F_DATAST,recnum);
                return;
        case    K_SETMAX:
                setmax();
                return;
        case    K_GETACC:
                recnum = k_in0();
                getmem(F_DATAST,recnum);
                if ((input[0] == 1) || (catoi(input) == 0))
                        k_act = k_inh();
                return;
        case    K_XMTPIN:
                putpin(transmit);
                return;
        case    K_RECPIN:
                errbeep();
                return;
        case    K_PUTPRN:
                putrs2(int2buf);
                return;
        case    K_DIALUP:
                dl_flg = 0;
                if (predial == TRUE)

                        orgmode();
                        startdial();
                } /* end of predial == TRUE */
```

TABLE XXV-continued

SOURCE CODE AND SUPPORTING DOCUMENTATION FOR ALTERNATE VERSION OF THE INVENTION

```
                return;
        case    K_ENQPKT:
                dl_flg = 0;
                pakprog = 0xff;
                etxlrc();
                ntrans = 0;
                k_acfl = 1;
                alldone();
                return;
        case    K_BLDPRN:
                initcs();
                prntstr();
                return;
        case    K_GETCLK:
                getclk();
                return;
        case    K_PUTCLK:
                putclk();
                return;
        case    K_SETSUP:
                if (sup_flg == 1)
                        sup_mode = 1;
                return;
        case    K_RELSUP:
                sup_mode = 0;
                return;
        case    K_CATBUF:
                k_in2();
                return;
        case    K_SETREC:
                setrec();
                return;
        case    K_CHKMEM:
                setrec();
                ++apprec;
                maxrec = k_in0();
                fld_len = 1;
                mem_full();
                if (fld_len == 0)

                        putdsp(nospace);
                        k_acfl = 2;
                        return;
/*************
                        cWAITM(3*SECONDS);
                        getout();
                        return;
*/
                } /* end of mem_full abort routine */
                maxrec = k_in0();
                mem_80();
                return;
        case    K_DETAIL:
                detspc = k_in0();
                setmax();
                apprec = 0;
                nonedisp = TRUE;
                nextstate = TRDETAIL;
                k_acfl = 1;
                c_detail();
                return;
        case    K_INCSEQ:
                getmem(F_SEQUENCE,1);
                i = catoi(input);
                ++i;
                if (i > = 9999)

                        i = 0;
                }
                itoca(i, input);
                putmem(F_SEQUENCE,1);
                return;
        case    K_INACCT:
                host_sel = inacct();
                if (host_sel == -1)

                        putdsp(nocard);
                        k_acfl = 2;
                }
                return;
```

TABLE XXV-continued

SOURCE CODE AND SUPPORTING DOCUMENTATION FOR ALTERNATE VERSION OF THE INVENTION

```
        case    K_CHKBYT:
                byt_ct = k_in0();
                byt_val = k_dat[k_ctr++];
                if (input[byt_ct] != byt_val)
                        k_act = k_inh();
                return;
        case    K_CHKSUP:
                if (sup_mode == 1) /* if in super-mode, no need to check */
                        return;
                sup_flg = 0;
                chksup();
                if (sup_flg == 0)

                        putdsp(rejsuper);
                        k_acfl = 2;

                return;
        case    K_DSPBUF:
                dispbf();
                return;
        case    K_ZERACC:
                recnum = k_in0();
                zeraccum(recnum);
                return;
        case    K_WTRESP:
                k_acfl = 1;
                inptimeout = WAIT_RESP;
                nextstate = RESPST;
                return;
case    K_INIBUF:
                k_in3();
                return;
        case    K_XMTPKT:
                k_acfl = 1;
                pakprog = 0xff;
                etxlrc();
                sndpak();
                return;
        case    K_ANRESP:
                ana_resp();
                return;
        case    K_SETBYT:
                byt_ct = k_in0();
                byt_val = k_dat[k.ctr++];
                input[byt_ct] = byt_val;
                return;
        case    K_ALTHST:
                fld_len = k_in0();
                getmem(F_ACCTRNG,host_sel);
                cstrco(k_dat,input,fld_len,4);
                k_ctr = 1;
                host_sel = k_in0();
                if (host_sel == 0)

                        putdsp(noresp);
                        k_acfl = 2;
                †
                return;
        case    K_CWAITM:
                fld_len = k_in0();
                cWAITM(fld_len*SECONDS/10);
                return;
        case    K_RMDCML:
                k_rmd();
                return;
        case    K_COPBUF;
                k_in4();
                return;
        case    K_FMTAMT:
                fld_len = k_in0();
                fmtamt(intbuf,fld_len);
                return;
        case    K_CHGTSK:
                fld_len = k_in0();
                cstrco(k_dat,brntbl,fld_len,2);
                k_ctr = 1;
                return;
        case    K_WSTATE:
                if ((dialog == 3) || (dialog == 0xff))
```

TABLE XXV-continued

SOURCE CODE AND SUPPORTING DOCUMENTATION FOR ALTERNATE VERSION OF THE INVENTION

```
                return;
            }
            if (predial == FALSE)
                {
                orgmode();
                startdial();
            } /* end of predial == FALSE */
            dl_flg = 0;
            pakprog = 0xff;
            k_acfl = 1;
            return;
    case    K_SFLREC:
            trancode = k_in0();
            trnumb = k_in0();
            return;
    case    K_INCREC:
            ++trnumb;
            return;
    case    K_CALREF:
            call_out(k_in0());
            return;
    case    K_SEARCH:
            filesearch();
            return;
    case    K_WAIT:
            if (dl_flg == 1)
                {
                k_act = k_inh();
            } /* end of dl_flg == 1 (primary action failed) */
            return;
    case    K_CHGSEG:
            kdtfile = k_in0();
            return;
    default:
            putdsp(badtask);
            abort();
    } /* end switch k_act */
} /* end of k_terp */
This is the end of the source listing.
```

TABLE XXVI

Listing of Defined Commands Associated with Alternative Implementation of Invention

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

Section 0—Introduction to the ZAPD language

The ZAPD (Zon APplication Development) language is a simple programming language intended to provide access to the existing software features of ZON terminals in a flexible way. The language includes features which provide a simple means of associating groups of simple actions (or "task lists") with individual keys on the terminal, so that those actions will be performed whenever that key is pressed at the READY state. It has a source form modeled loosely after some assembly languages, and an ASCII "object-code" form which can be executed by an interpreter. The interpreter for the language (formerly called the KMATERP interpreter, or Key Mapped Action inTERPreter) can be made resident in ZON terminals, and the object-code can be up- and down-line loaded.

Actions are generally programmed by: using a word processor to write the ZAPD language file in source form, running the ZAPD assembler to translate it into object code, transferring the resulting object-code file into the download system, and then down-loading it into a ZON terminal which contains the KMATERP software.

Within the terminal, the object code resides in the task list file, at memory locations *7 001-254 (absolute file number 12x [18 decimal], records 01x to FEx.). The code is executed from this file by the interpreter. Some of the ZAPD language features allow one to specify the contents of certain other files which may refer to or be referred to by the "task list": the control string file, the jump-table file (actually the prompts file), the account range file, and the response format file. Records for these files, if defined, are generated by the ZAPD assembler, transferred into the download system, and up- or down-line loaded in the same way as the task list file and its object code.

The terms "action", "command", and "task" will be used more or less interchangeably, to mean either the source form or object form of a single operation which the interpreter can execute. The term "pseudo-op" will be used to mean in instruction in the source file which does not translate into a single ZAPD action. The term "statement" will be used to mean a line of the source file which contains either a ZAPD command or a ZAPD pseudo-op. The term "task list" will be used to mean a group of related tasks (and associated pseudo-ops), in either source or object form. The term "program" will be used to mean a complete set of task lists (and/or pseudo-ops defining other forms of data) in source or object form.

Section 1—ZAPD pseudo-assembler features

This section describes the features and language components of the ZAPD development language which are not actual executable commands to the Task Interpreter. These will be referred to as "pseudo-ops", by analogy with the corresponding features in assembly language.

; Comment pseudo-op

Comments can be inserted in the source code by preceding them with a semicolon, in the familiar assembly language convention. Trailing comments are permitted on a line which contains source code. Lines which contain only comments, or blank lines, are also valid.

SOURCE EXAMPLE

; This is a comment on a line by itself.

KEY0 NULL ; This is a source code line with trailing comments.

KEYn NULL Key non-definition pseudo-op

A KEYn NULL pseudo-op is used to indicate that no action corresponds to key "n" on the numeric keypad. The "n" is required.

KEYn NULL is exactly equivalent to a KEYn BEGIN 00 pseudo-op. One of these two should always be used to define a key with no action, rather than leaving a certain key undefined by not listing it. KEYn NULL is preferred, as being more readable.

SOURCE EXAMPLE

See example for the KEYn BEGIN pseudo-op. CL

KEYn BEGIN xx Key begin definition pseudo-op

A KEYn BEGIN xx pseudo-op is required for each key of the numeric keys on the terminal which is intended to activate a task list or perform a transaction of some kind. Three forms of this line are possible:

KEYn BEGIN 00 is equivalent to the KEY NULL pseudo-op, and means that when the key "n" is pushed from the currently defined state nothing will happen. The "n" is required.

KEYn BEGIN 01 means that the following list of actions (tasks) will be activated when the key "n" is pushed from the currently defined state. All commands from the KEYn BEGIN to the next KEY END are assumed to be part of the task list for key "n". The "n" is required.

KEYn BEGIN 02 means that key "n" is valid only as the first key stroke of a two keystroke sequence to initiate a task list. The scope of the KEYn BEGIN 02 extends until the next KEY END 02 command is encountered. Within this area, KEYm BEGIN 00, KEYm NULL, or KEYm BEGIN 01 definitions should be used to define what should happen for each key when key "m" is pressed after key "n" has previously been pressed. That is, the KEYn BEGIN 02 changes the currently defined state for the other KEY commands from the READY state to the state where the first key of the sequence has been pressed.

```
SOURCE EXAMPLE:
KEY0  NULL                      ; Nothing will happen when 0 is pressed from READY
KEY1  BEGIN 00                  ; Nothing will happen when 1 is pressed from READY
KEY2  BEGIN 01                  ; Defines a set of tasks to be executed when 2 is
      K_GETCLK                  ; pressed from the ready state (displays clock)
      K_MOVBUF INPUT INT2BUF
      K_DSPBUF DONE
KEY2  END
KEY3  BEGIN 02                  ; Defines that several commands will begin with a "3":
KEY0  NULL                      ;    "30" does nothing.
KEY1  BEGIN 01                  ;    "31" does something or other
  .
  .
KEY1  END
  .
  .
KEY   END 02                    ; End of commands begun with a "3".
KEY4  NULL                      ; Key 4 does nothing
```

KEYn END xx Key end definition pseudo-op

A KEY END pseudo-op is required to terminate every KEYn BEGIN 01 or KEYn BEGIN 02 pseudo-op. No KEY END is required for a KEYn NULL or a KEYn BEGIN 00 pseudo-op, because they do not contain a task list.

KEYn END 01 will terminate the current key definition task list (begun with a KEYn BEGIN 01), if there is one. The "n" parameter and the "01" are optional, and are not checked for.

KEYn END 02 will terminate a group of two-keystroke definitions (begun with a KEYn BEGIN 02). All KEYm BEGIN 01 definitions within that group must have been properly closed off. The "02" on the KEY END statement is required, to indicate that a group of definitions is being closed. The "n" parameter is optional, and is not checked for.

SOURCE EXAMPLE

See example for the KEYn BEGIN pseudo-op.

nnnn EQUATE xx Equate definition pseudo-op

The EQUATE pseudo-op (as in assembly language programming) is used to define a symbolic name (nnnn) for a constant value (xx). The name is required, must begin with a letter, and may be up to 8 alphanumeric digits. The value must be a two-digit decimal number. Equates must be defined before they can be referenced.

An EQUATE specifies that whenever the symbolic name given in the equate is used as a parameter to a ZAPD command, the value given in the equate should be substituted instead. An equated value may only be used in a context where a numeric value is expected; it may not be used for a parameter which takes a label value. Equates will not be substituted within the context of a CONTROLSTRING, JUMPTABLE, RESPONSE, or ACCTRANGE definition.

```
SOURCE EXAMPLE:
INPUT          EQUATE     00
INT2BUF        EQUATE     04
KEY1 BEGIN 01
 .
 .
               K_MOVBUF INPUT INT2BUF
 .
 .
```

@11111 @Label definition pseudo-op

The label definition pseudo-op (as in assembly language programming) is used to define a symbolic label (@11111) for a statement in the program (i.e. task list). The label name must begin with an @ sign, must be the first item on a line containing a valid ZAPD action ("op-code"), and may be up to 8 alphanumeric digits. The ZAPD assembler translates @labels in the output phase of processing, so references to a label may appear in the program before the label is defined.

A @label definition specifies that whenever that label name is used as a parameter to a ZAPD command, the task list record number of the command labeled should be substituted instead. Within a ZAPD command, a label may only be used in a context where a label parameter is expected; it may not be used for a parameter which expects a numeric value. Labels are also translated within the scope of a data record definition (e.g. JUMPTABLE BEGIN . . . JUMPTABLE END); here no type checking is performed.

COMMON BEGIN Common begin pseudo-op

A COMMON BEGIN pseudo-op is required to define groups of tasks which can not be associated with a specific key, or are used by several keys. This pseudo-op has no parameters, but should be paired with a COMMON END statement. Either a single or multiple COMMON areas may be defined; they will be treated in the same way by the assembler.

SOURCE EXAMPLE

See the example for the @label pseudo-op.

COMMON END Common end definition pseudo-op

A COMMON END pseudo-op is required to terminate every COMMON BEGIN pseudo-op.

SOURCE EXAMPLE

See the example of the @label pseudo-op.

%11111 %Label pseudo-op

The %label pseudo-op is used to refer to a symbolic record number (%11111) for a data record defined using the JUMPTABLE, CONTROLSTRING, RESPONSE, or ACCTRANGE [BEGIN] pseudo-ops. The label name must begin with an % sign, must be defined using one of the preceding pseudo-ops, and may be up to 8 alphanumeric digits. The ZAPD assembler translates % labels in the output phase of processing, so references to a label may appear in the program before the label is defined.

A %label definition specifies that whenever that label name is used as a parameter to a ZAPD command, the number specified in defining the label should be substituted instead. Within a ZAPD command, a %label may only be used in a context where a numeric parameter is expected; it may not be used for a parameter which expects a task list label value. Labels are also translated within the scope of a data record definition (e.g. JUMPTABLE BEGIN . . . JUMPTABLE END); here no type checking is performed.

SOURCE EXAMPLE

See the example for the @ label pseudo-op or the JUMPTABLE BEGIN pseudo-op.

JUMPTABLE BEGIN nn %lllll Jump-table begin pseudo-op

A JUMPTABLE BEGIN pseudo-op is used to specify data which will go into the prompts file (which is also used for jump-tables and miscellaneous data) rather

```
SOURCE EXAMPLE:
KEY2 BEGIN 01
                   K_GETACC 01 @ACC1OK @ACC1BAD    ; Branch on Acc 1 ( non-0/0 )
@ACC1OK            K_GETCLK @DSPINP                ; Get time into input, go display it
@ACC1BAD           K_BLDDC %ERRMSG @DSPIN2         ; Build error message, go display it
KEY2 END
COMMON BEGIN
;
@DSPINP            K_MOVBUF INPUT INT2BUF
@DSPIN2            K_DSPBUF DONE
;
COMMON END
CONTROLSTRING      BEGIN 61 %ERRMSG
                   R26                             ; Insert clear-display
                   T#19:2                          ; Retrieve message from file
CONTROLSTRING      END
```

than into the task list file. The "nn" is required to give the record number in the prompts file. The pseudo-op may also define a symbolic label name (%lllll) which can be used elsewhere to refer to this record number. See the previous entry on the %label pseudo-op for the usage rules for such a label. A JUMPTABLE END must be paired with every JUMPTABLE BEGIN.

All statements between the JUMPTABLE BEGIN and JUMPTABLE END command will be treated as data; blanks will be stripped off, and the first parameter on each line will be concatenated onto the output record. Equated values appearing as parameters will not be translated. Parameters beginning with an @ or % will be treated as labels and translated to their corresponding values. Blanks can be inserted into the output record by entering them as underscores.

```
SOURCE EXAMPLE:
JUMPTABLE BEGIN 01   %JMPTBLA
         10          ; This definition will produce the
                       output:
         @CFA        ; "10aabbccdd210  ", where
         @CEC        ; aa - dd are the values of the
         @CBI        ; corresponding labels in the
         @ADC        ; definition.
         210__
JUMPTABLE END
```

JUMPTABLE END Jump-table end definition pseudo-op

A JUMPTABLE END pseudo-op is required to terminate every JUMPTABLE BEGIN pseudo-op.

SOURCE EXAMPLE

See the example for the JUMPTABLE BEGIN pseudo-op.

ACCTRANGE BEGIN nn %lllll Account-range begin pseudo-op

A ACCTRANGE BEGIN pseudo-op is used to specify data which will go into the account-range-table file rather than into the task list file. The "nn" is required to give the record number in the account-range file. The pseudo-op may also define a symbolic label name (%lllll) which can be used elsewhere to refer to this record number. See the previous entry on the %label pseudo-op for the usage rules for such a label. An ACCTRANGE END must be paired with every ACCTRANGE BEGIN.

All statements between the ACCTRANGE BEGIN and ACCTRANGE END commond will be treated as data; blanks will be stripped off, and the first parameter on each line will be concatenated onto the output record. Equated values appearing as parameters will not be translated. Parameters beginning with an @ or % will be treated as labels and translated to their corresponding values. Blanks can be inserted into the output record by entering them as underscores.

SOURCE EXAMPLE

ACCTRANGE BEGIN 01 %VISARNG
ACCTRANGE END

ACCTRANGE END Account-range end definition pseudo-op

A ACCTRANGE END pseudo-op is required to terminate every ACCTRANGE BEGIN pseudo-op.

SOURCE EXAMPLE

See the example for the ACCTRANGE BEGIN pseudo-op.

CONTROLSTRING BEGIN nn %lllll Control-string begin pseudo-op

A CONTROLSTRING BEGIN pseudo-op is used to specify data which will go into the control string file rather than into the task list file. The "nn" is required to give the record number in the control string file. The pseudo-op may also define a symbolic label name (%lllll) which can be used elsewhere to refer to this record number. See the previous entry on the %label pseudo-op for the usage rules for such a label. An CONTROLSTRING END must be paired with every CONTROLSTRING BEGIN.

All statements between the CONTROLSTRING BEGIN and CONTROLSTRING END command will be treated as data; blanks will be stripped off, and the first parameter on each line will be concatenated onto the output record. Equated values appearing as parameters will not be translated. Parameters beginning with an @ or % will be treated as labels and translated to their corresponding values. Blanks can be inserted into the output record by entering them as underscores.

SOURCE EXAMPLE

CONTROLSTRING BEGIN 01 %ERRMSG
CONTROLSTRING END

CONTROLSTRING END Control-string end definition pseudo-op

A CONTROLSTRING END pseudo-op is required to terminate every CONTROLSTRING pseudo-op.

SOURCE EXAMPLE

See the example for the CONTROLSTRING BEGIN pseudo-op.

RESPONSE BEGIN nn %lllll Response begin pseudo-op

A RESPONSE BEGIN pseudo-op is used to specify data which will go into the response message format file rather than into the task list file. The "nn" is required to give the record number in the response format file. The pseudo-op may also define a symbolic label name (%lllll) which can be used elsewhere to refer to this record number. See the previous entry on the %label pseudo-op for the usage rules for such a label. An RESPONSE END must be paired with every RESPONSE BEGIN.

All statements between the RESPONSE BEGIN and RESPONSE END command will be treated as data; blanks will be stripped off, and the first parameter on each line will be concatenated onto the output record. Equated values appearing as parameters will not be translated. Parameters beginning with an @ or % will be treated as labels and translated to their corresponding values. Blanks can be inserted into the output record by entering them as underscores.

SOURCE EXAMPLE

RESPONSE BEGIN 01 %RESPOK
RESPONSE END

RESPONSE END Response end definition pseudo-op

A RESPONSE END pseudo-op is required to terminate every RESPONSE BEGIN pseudo-op.

SOURCE EXAMPLE

See the example for the RESPONSE BEGIN pseudo-op.

SEG2 DEFINE nn %lllll Segment end pseudo-op

* THIS FEATURE IS NOT YET IMPLEMENTED *

A SEG2 DEFINE pseudo-op is required if an alternate segment file will be used to allow a greater number of task list entries. There must be only one per program, and it must precede any SEG2 BEGIN pseudo-op. It defines the file number to be used for the alternate segment task list file. The "nn" is required. The %label is optional; if included, it functions the same as the %label in the RESPONSE BEGIN or related pseudo-ops, in allowing you to define a symbolic label for the number defined in this statement.

SOURCE EXAMPLE

See the example for the SEG2 BEGIN pseudo-op.

SEG2 BEGIN Segment begin pseudo-op

* THIS FEATURE IS NOT YET IMPLEMENTED *

A SEG2 BEGIN pseudo-op is used to specify data which will go into the second (alternate segment) task list file. The number of the file must have already been defined using a SEG2 DEFINE pseudo-op. An SEG2 END must be paired with every SEG2 BEGIN. Multiple task lists in the alternate segment may be defined.

All statements between the SEG2 BEGIN and SEG2 END command will be treated as ordinary task statements, with the exception that they will go into the alternate segment. Labels can be defined and referenced as usual. It is up to the programmer to be sure that labels in segment 1 (the default segment) are not referenced by statements in segment 2 (the alternate segment), and vice versa. The only context in which it is actually meaningful to refer to a label in segment 1 from a statement in segment 2 (or vice versa) is within a K_CHGSEG command, which allows one to change segments during execution of a series of task list commands, by branching to the specified label of the specified task list.

```
SOURCE EXAMPLE:
SEG2 DEFINE 19      %ALTSEG
 :
 :
                    K_MOVBUF INPUT INT2BUF
                    K_CHGSEG %ALTSEG
                    @DSPWARN
SEG2 BEGIN
@DSPWARN            K_DSPBUF
 :
 :
                    K_CHGSEG %ALTSEG @ABCD
SEG2 END
@ABCD               K_BLDDC %CTL1
 :
 :
```

SEG2 END Segment end pseudo-op

* THIS FEATURE IS NOT YET IMPLEMENTED *

A SEG2 END pseudo-op is required to terminate every SEG2 BEGIN pseudo-op. It causes the following task list statements to go back to being inserted in the default task list file, rather than in the alternate segment task list file.

SOURCE EXAMPLE

See the example for the SEG2 BEGIN pseudo-op.

SECTION 2—ZAPD "op-codes "

This section is the description document for the commands (individual actions) of the ZAPD language (formerly the KMATERP interpreter). Each action is described here, with the additional parameters it requires.

The actions are listed in numeric order by their object code value. To find a specific command, use the index of commands by command name to find the number of the command, then look it up in this list.

```
Common parameter abbreviations:
(Parameters for object code section:)
dd =    2 decimal ASCII digits (meaning as specified in
        command)
c  =    single printable ASCII character value
bb =    Buffer value ( 2 ASCII digits decimal ) from following
        list:
        00 - input      ;address of input buffer
        01 - transmit   ;address of transmit buffer
        02 - receive    ;address of receive buffer
        03 - de_str     ;address of data entry string buffer
        04 - int2buf    ;address of data capture result buffer
        05 - sup_buf    ;address of supervisor data buffer
        06 - intbuf     ;address of control string buffer
        07 - amtsav     ;address for amount save buffer
        08 - brntbl     ;address for branch-table buffer
aa =    Alternate next task to be executed ( 2 ASCII digits
        hexadecimal)
nn =    Next task to be executed ( 2 ASCII digits hexadecimal)
```

K_DONE: Action # 0

Return to READY state gracefully. Hangs up phone line, resets operating parameters (performs abort), and leaves last message on display.

SOURCE SYNTAX

K_DONE (one separate line) with no parameters; or pseudo-label DONE specified as primary or alternate task path.

```
SOURCE EXAMPLES:
@ABC  K_BLDXMT 01           ; Build a transmit buffer and
                              continue.
      K_DONE                ; Stop (return to ready)
(or)
      K_BLDXMT 01 DONE      ; Build a transmit buffer and
                              then stop.
OBJECT SYNTAX:
   00 as action, or as value of next task path.
OBJECT EXAMPLES:
Recd 80:  010181        = Build buffer, then go to task 81
Recd 81:  00            = Stop (return to ready)
(or)
Recd 80:  010100        = Build buffer, and then stop.
```

K_BLDXMT: Action # 1

Activate Control String to build transmit buffer. May be used to build all or part of buffer on a pass. Appends to existing contents of transmit buffer, does NOT clear it. Must be preceded by K_INIBUF to start a new transmit buffer.

```
SOURCE SYNTAX:
    K_BLDXMT (Command), Control string specifier,
    [Next task label, if not default]
SOURCE EXAMPLES:  To build a transmit buffer with control
                  string 4:
@ABC              K_BLDXMT 04
(or)
                  K_BLDXMT 04 @LABEL1
OBJECT SYNTAX:
    01 (command) dd (Control String Specifier) nn (Next task)
OBJECT EXAMPLE:   To build a transmit buffer with control
                  string 4:
Recd 80:   010481
```

K_BLDDC: Action # 2

Active Control String to build data capture buffer. May be used to build all or part of buffer on a pass. Appends to existing contents of data capture buffer, does NOT clear it. Must be preceded by K_INIBUF to start a new data capture buffer.

```
SOURCE SYNTAX:
    K_BLDDC (Command), Control string specifier, [Next
    task label, if not default]
SOURCE EXAMPLE:
@ABC   K_BLDDC 05    ; Build a DC buffer with control
                     string 5
OBJECT SYNTAX:
02 (command) dd (Control String Specifier) nn (Next task)
OBJECT EXAMPLE:
Recd 80: 020581      = Build a DC buffer with control
                     string 5, goto task 81
```

K_PUTDC: Action # 3

Store contents of INPUT into file F_DETAIL at record number RECNUM. RECNUM must be first set using K_SETREC (action # 22).

```
SOURCE SYNTAX:
    K_PUTDC (command), [Next task label, if not default]
SOURCE EXAMPLE:
    K_PUTDC    ; Save new current detail record
OBJECT SYNTAX:
    03 (Command) nn (Next Task)
OBJECT EXAMPLE:
Recd 80: 0381 = Store new current detail record, goto task 81.
```

K_GETDC: Action # 4

Read contents of file F_DETAIL at record number RECNUM into INPUT. RECNUM must be first set using K_SETREC (action # 22).

```
SOURCE SYNTAX:
    K_GETDC (command), [Next task label, if not default]
SOURCE EXAMPLE:
    K_GETDC    ; Read current detail record
OBJECT SYNTAX:
    04 (Command) nn (Next Task)
OBJECT EXAMPLE:
```

-continued

```
Recd 80: 0481 = Read current detail record, goto task 81.
```

K_MOVBUF: Action # 5

Transfer contents from one addressable buffer to any other one, replacing its previous contents.

```
SOURCE SYNTAX:
    K_MOVBUF (Command), Destination buffer, Source buffer.
       [Next task, if not default]
SOURCE EXAMPLE:
XMIT      EQUATE 01
INT2BUF   EQUATE 04
                K_MOVBUF XMIT INT2BUF ; Move
                contents of INT2BUF into XMIT
OBJECT SYNTAX:
    05 (Command) bb (destination) bb (source) nn (Next Task)
OBJECT EXAMPLE:
Recd 80: 05010481 ; Move contents of int2buf to transmit,
    goto task 81.
```

K_INCACC: Action # 6

Increment specified accumulator. The file is automatically assumed to be F_DATAST. The accumulator number (recnum) must be specified in the Task List.

```
OBJECT SYNTAX:
    06 (command) dd (Accumulator #) nn (Next Task)
OBJECT EXAMPLE:
Recd 80: 060581 == Increment accumulator # 5, goto task 81.
```

K_DECACC: Action # 7

Decrement specified accumulator. The file is automatically assumed to be F_DATAST. The accumulator number (recnum) must be specified in the Task List.

```
OBJECT SYNTAX:
    07 (command) dd (Accumulator #) nn (Next Task)
OBJECT EXAMPLE:
Recd 80: 070581 == Decrement accumulator # 5, goto task 81.
```

K_SUMACC: Action # 8

Perform specified math operation using contents of INT2BUF and the specified accumulator number. The result is stored back into the specified accumulator. NOTE: Only ADDCMAS and SUBCMAS are permitted as mathcodes.

```
OBJECT SYNTAX:
    08 (command) dd (Accumulator #) mm (math operation)
       nn (Next Task)
OBJECT EXAMPLE:
Recd 80: 08050181 == Add INT2BUF into accumulator # 5,
    goto task 81.
```

K_SETMAX: Action # 9

Set the value of the MAXREC variable from the value of a specified accumulator. This command is used in conjunction with K_SEARCH, and must be executed before K_SEARCH can be executed.

SOURCE SYNTAX:
K_SETMAX (Command), Accumulator number, [Next task, if not default]
SOURCE EXAMPLE:
K_SETMAX 03 ; Set MAXREC = contents of Accum. 3
OBJECT SYNTAX:
09 (Command) dd (Accumulator #) nn (Next Task)
OBJECT EXAMPLE:
Recd 80: 090381 == Set MAXREC equal to the contents of Accumulator #3, goto task 81

K_GETACC: Action # 10

Read the contents of the specified accumulator into INPUT; then branch to the alternate task if the contents are non-zero, or continue to the primary next task if the contents are zero or the empty string.

SOURCE SYNTAX:
K_GETACC (command), Accumulator number, Alternate task label, [Next task label, if not default]
SOURCE EXAMPLE:
K_GETACC 05 @NONZERO
@ZERO . . .
OBJECT SYNTAX:
10 (Command) dd (Accumulator #) aa (Alternate task) nn (Next Task)
OBJECT EXAMPLE:
Recd 80: 10058581 == Read the contents of Accumulator #5 into INPUT, goto task 85 if non-zero, goto task 81 if zero or empty.

K_XMTPIN: Action # 11

Send contents of TRANSMIT buffer to the PIN Pad. It is assumed that if a PIN requirement is specified, then one MUST be entered. The K_WTSTAT command may later be executed to return to the state machine and allow the action to complete, and the K_WAIT action MUST later be executed to test whether the action completed successfully.

OBJECT SYNTAX:
11 (command) nn (Next task)
OBJECT EXAMPLE:
Recd 80: 1181 == Send TRANSMIT buffer to PIN Pad, goto task 81

K_RECPIN: Action # 12

Read text response from PIN Pad into RECEIVE buffer. The K_WTSTAT command may later be executed to return to the state machine and allow the action to complete, and the K_WAIT action MUST later be executed to test whether the action completed successfully.

OBJECT SYNTAX:
12 (command) nn Next task)
OBJECT EXAMPLE:
Recd 80: 1281 == Request RECEIVE buffer from PIN Pad, goto task 81

K_PUTPRN: Action # 13

Print the contents of INT2BUF on the attached printer. The K_WTSTAT command may later be executed to return to the state machine and allow the action to complete, and the K_WAIT action MUST later be executed to test whether the action completed successfully.

OBJECT SYNTAX:
13 (command) nn (Next task)
OBJECT EXAMPLE:
Recd 80: 1381 == Send INT2BUF buffer to printer, goto task 81

K_DIALUP: Action # 14

Begin dialup and communications process using phone number and logon sequence specified by the value of HOST_SEL. (The value of HOST_SEL is usually set by account range command, K_INACCT.) Task path must lead to K_WAIT prior to specifying any action requiring successful logon.

OBJECT SYNTAX:
14 (command) nn (Next task)
OBJECT EXAMPLE:
Recd 80: 1481 == Start dialup and login process, goto task 81

K_ENQPKT: Action # 15

Wait for ENQ from host, then send contents of TRANSMIT buffer. This is used for the first packet in a communication session. ETX and LRC are inserted here. The K_WTSTAT command may later be executed to return to the state machine and allow the action to complete, and the K_WAIT action MUST later be executed to test whether the action completed successfully.

OBJECT SYNTAX:
15 (command) nn (Next task)
OBJECT EXAMPLE:
Recd 80: 1581 == Finish packet & send on receiving ENQ, goto task 81

K_BLDPRN: Action # 16

Activate Control String to build buffer for printing. May be used to build all or part of buffer on a pass. Appends to existing contents of buffer, does NOT clear it. Must be preceded by K_INIBUF to start a new printing buffer.

SOURCE SYNTAX:
K_BLDPRN (Command), Control string specifier, [Next task label, if not default]
SOURCE EXAMPLE:
@ABC K_BLDPRN 05 ; Build a print buffer with control string 5
OBJECT SYNTAX:
16 (command) dd (Control String Specifier) nn (Next task)
OBJECT EXAMPLE:
Recd 80: 160581 == Build a print line with cntl string 5, goto task 81

K_GETCLK: Action # 17

Read the current date/time from the system software clock into INPUT.

OBJECT SYNTAX:
17 (command) nn (Next task)
OBJECT EXAMPLE:
Recd 80: 1781 == Read time into INPUT, goto task 81

K_PUTCLK: Action # 18

Set current date/time in the system software clock using the contents of INT2BUF as the new date/time values.

```
OBJECT SYNTAX:
  18 (command) nn (Next task)
OBJECT EXAMPLE:
Recd 80: 1881 == Set date and time from INT2BUF,
  goto task 81
```

K_SETSUP: Action # 19

Put the terminal in "Supervisor Mode" for performing multiple protected transactions without having to verify Supervisor Number before each transaction. Check "Supervisor validated" variable set by K_CHKSUP; if valid, then sets "Supervisor mode" variable; thus the supervisor number must already have been validated when _SETSUP is executed or the mode will not be set. (See also K_RELSUP action #20, K_CHKSUP action #28.)

```
OBJECT SYNTAX:
  19 (Command) nn (Next Task)
OBJECT EXAMPLE:
Recd 80: 1981 == Set Supervisor Mode, if Supervisor Number
          has been validated; then goto task 81.
```

K_RELSUP: Action # 20

Take the terminal out of "Supervisor Mode". (Resets "Supervisor mode" variable.) Performs no action if Supervisor Mode not set. (See also K_SETSUP action # 19, K_CHKSUP action # 28.)

```
OBJECT SYNTAX:
  20 (Command) nn (Next Task)
OBJECT EXAMPLE:
Recd 80: 2081 == Release Supervisor Mode, then goto task 81.
```

K_CATBUF: Action # 21

Concatenate contents of one of the addressable buffers onto the end of any other one.

```
OBJECT SYNTAX:
  21 (Command) bb (destination) bb (source) nn (Next Task)
OBJECT EXAMPLE:
Recd 80: 21010481 == Concatenate contents of int2buf to
  end of transmit buffer, goto task 81
```

K_SETREC: Action # 22

Assigns the value of the specified accumulator to RECNUM.

-continued

```
SOURCE SYNTAX:
  K_SETREC (command), Accumulator specifier, [Next
    task label, if not default]
SOURCE EXAMPLE:
  K_SETREC 04   ; Set RECNUM to the value of
    accumulator 4
OBJECT SYNTAX:
  22 (Command) dd (Accumulator #) nn (Next Task)
OBJECT EXAMPLE:
Recd 80: 220481 == Set RECNUM to the value of Accum. #4,
  goto task 81.
```

K_CHKMEM: Action # 23

Check contents of accumulator against specified maximum and warning limits. If maximum is exceeded, abort and return to READY state; else if warning limit is exceeded, display obnoxious warning and continue to next task; else continue to next task.

```
OBJECT SYNTAX:
  23 (Command) dd (Accumulator #) dd (Maximum Limit)
    dd (Warning Limit) nn (Next Task)
OBJECT EXAMPLE:
Recd 80: 2307997981 == Check contents of Accumulator #7;
          abort if greater than 99; sound warning if
          greater than 79; otherwise goto task 81.
```

K_DETAIL: Action # 24

Setup sequential display of detail records. Establishes the specified maximum number of records, displays the first record, and sets the State Machine to TRDETAIL. While in TRDETAIL, hitting the ENTER key will display the next record. Hitting the '9' key will create and process a correction transaction. Hitting any other key will produce ERRBEEP.

OBJECT SYNTAX: Command (24), Control String Specifier, Accumulator Specifier for Max records, Primary Task Path, Alternate Task Path.

OBJECT EXAMPLE: 2407085261 Setup and display detail record using Data Capture Control String #7 up to a maximum number of records specified by the value in Accumulator #8. Transfer control to the Task at address 52 when finished (not usually used because the clerk will probably hit the HANGUP key and return to READY). Transfer control to the Task at address 61 to perform a correction transaction.

K_INCSEQ: Action # 25

Increment the terminal Master Sequence Number. This is the only operation which is allowed on the Master Sequence Number. It will automatically reset to 0 after 9999 is reached.

```
OBJECT SYNTAX:
  25 (command) nn (Next Task)
OBJECT EXAMPLE:
Recd 80: 2545 == Increment Master Sequence Number,
  goto task 81.
```

K_INACCT: Action # 26

Determine account range for further actions. Entered account number (keyboard or card swipe) is compared against values in the file F_ACCTRNG. HOST_SEL is set from the record number in the file, when a successful account range match is found. If no match is found, the entire transaction is aborted. K_INACCT expects the account number to be in either INPUT (for card swipe) or DE_STR (for keyboard input). Upon completion, the account number will be appended to TRANSMIT. To comply with Bank One Specification, all card swipe account numbers are padded with zeroes to a full 40 character length.

OBJECT SYNTAX:
26 (Command) aa (Alternate Task)
OBJECT EXAMPLE:
Recd 80: 2685 == Perform account range check, goto task at address 52 if successful, abort otherwise.

K_CHKBYT: Action # 27

Evaluate the value of the character at the specified byte position in INPUT against the specified (printable ASCII) value. Branch to alternate next task if they match, continue to primary next task if they do not match. Note that the comparison value is only one byte wide, rather than the usual two bytes.

OBJECT SYNTAX:
27 (Command) dd (position of char) c (match value) aa (Alternate Next Task) nn (Primary Next Task)
OBJECT EXAMPLE:
Recd 80: 2703A5258 == Compare the character in position 3 of INPUT to "A"; if they match, goto task 52; otherwise, goto 58.

K_CHKSUP: Action # 28

Evaluate entered Supervisor Number [and/or PIN], starting at specified byte of transmit buffer, against stored (correct) value. If "Supervisor Mode" variable has been set, then bypass comparison and proceed to next task; else if Supervisor Number matches correct value, then set "Supervisor validated" variable and proceed to next task (leaving the Supervisor Number in SUP_BUF for use as needed); else (Supervisor Number does not match correct value) display rejection message, ERRBEEP, and abort task list. (See also K_SETSUP action # 19, and K_RELSUP action # 20.)

OBJECT SYNTAX:
28 (Command) dd (offset into Transmit buffer) nn (Next Task)
OBJECT EXAMPLE:
Recd 80: 280281 == Evaluate Supervisor Number, starting at 2nd character of Transmit buffer; goto task 81 if valid, or if Supervisor mode has been set; otherwise abort.

K_DSPBUF: Action # 29

Display the contents of INT2BUF. If the display is to be cleared, the CLEARDISP character MUST be in INT2BUF.

OBJECT SYNTAX: Command (29), Task Path.

OBJECT EXAMPLE: 2958 Display the contests of INT2BUF. Transfer control to the Task at address 58.

K_ZERACC: Action # 30

Zero the specified accumulator.

OBJECT SYNTAX: Command (30), Accumulator Specifier, Task Path.
OBJECT EXAMPLE: 300160 Zero Accumulator #1. Transfer control to the Task at address 60.

K_WTRESP: Action # 31

Wait for text response from host (or PIN Pad) by returning to state machine. Machine State is changed to RESPST. Timeout is set from the timeout specifier. The code executed within the state machine (the input processor) must restart the Task List when the response is received. To check whether the action completed successfully, the K_WAIT action MUST be executed before trying to read the input.

OBJECT SYNTAX:
31 (Command) nn (Next Task)
OBJECT EXAMPLE:
Recd 80: 3181 == Wait for response, go to task 81 when returned.

K_INIBUF: Action # 32

Initialize the specified buffer (i.e. set to null string.)

SOURCE SYNTAX:
K_INIBUF (command), Buffer specifier, [Next task label, if not default]
SOURCE EXAMPLE:
INPUT EQUATE 00
K_INIBUF INPUT
OBJECT SYNTAX:
32 (Command) bb (buffer to clear) nn (Next Task)
OBJECT EXAMPLE:
Recd 80: 320181 == Set TRANSMIT to empty string, goto task 81.

K_XMTPKT: Action # 33

Send contents of TRANSMIT buffer to host without waiting for ENQ. This is used for all subsequent packets in a communication session. ETX and LRC are inserted here. The K_WTSTAT command may later be executed to return to the state machine and allow the action to complete, and the K_WAIT action MUST later be executed to test whether the action completed successfully.

SOURCE SYNTAX:
K_XMTPKT (command), [Next task label, if not default]
SOURCE EXAMPLE:
K_XMTPKT
OBJECT SYNTAX:
33 (Command) nn (Next Task)
OBJECT EXAMPLE:
Recd 80: 3381 == Send contents of TRANSMIT buffer to host, goto task 81.

K_ANRESP: Action # 34

Analyze response from host. Accomplished by comparing the specified number of bytes in the RECEIVE buffer, starting at the specified position in the RECEIVE buffer, against values in records in the file F_RESPMSG. When a match is found, the interpreter will branch to the task label specified in the record which matched. A MATCH MUST EXIST FOR EVERY POSSIBLE RESPONSE, OR UNPREDICTABLE THINGS MIGHT HAPPEN!!! In general it is impossible to tell what the next task executed after this one will be without looking at the values in the response message format file.

```
SOURCE SYNTAX:
    K__ANRESP (command), Start of field in Receive buffer,
        Length of field in Receive buffer. No next task
        label permitted.
SOURCE EXAMPLE:
        K__ANRESP 03 05   ; Analyze response field chars 3-5
                            and do wild
                          ; branch depending on value found
                            there.
OBJECT SYNTAX:
    34 (Command) dd (Offset into RECEIVE) dd (length
        of field)
OBJECT EXAMPLE:
Recd 80: 340305 == Compare field from columns 3-7 of receive
        buffer to values in F__RESPMSG and branch
        to task number given by the two bytes following
        the matched value in the file.
```

K_SETBYT: Action # 35

Set the byte at the specified position in INPUT to the specified value. Useful for changing Store Forward and Display Permission flags.

OBJECT SYNTAX: Command (35), Position Specifier, Value, Task Path.

OBJECT EXAMPLE: 3505Z88 Set byte 5='Z'. Transfer control to the Task at address 88.

K_ALTHST: Action # 36

Extract alternate host data from the record in F_ACCTRNG specified by the current value of HOST_SEL. 4 bytes will be transferred to K_DAT for analysis. THe first two bytes must be the new value for HOST_SEL, the following must be the next Task path.

OBJECT SYNTAX: Command (36), offset.

OBJECT EXAMPLE: 3644 Extract 4 bytes from F_ACCTRNG, HOST_SEL, starting at position 44. New value for HOST_SEL=CATOI(1st two bytes). Task path=CATOI(2nd two bytes).

K_CWAITM: Action # 37

Sleep for a specified period of time, in tenths of seconds. Primary use is for timing messages on display.

```
SOURCE SYNTAX:
    K__CWAITM (command), Number of tenths of seconds, [Next
        task, if not default]
SOURCE EXAMPLE:
        K__CWAITM 30        ; Sleep for 3 seconds.
OBJECT SYNTAX:
    37 (Command) dd (Number of tenths of seconds) nn (Next Task)
OBJECT EXAMPLE:
Recd 80: 373081 == Sleep for 3 seconds, goto Task 81.
```

K_RMDCML: Action # 38

Remove all decimal points found in TRANSMIT, starting at the specified offset position.

OBJECT SYNTAX: Command (38), Offset, Task Path.

OBJECT EXAMPLE: 38106C Remove all decimal points encountered in TRANSMIT starting at position 10. Resume action with Task at address 6C.

K_COPBUF: Action # 39

Copy specified length of specified source buffer starting at specified position into specified destination buffer.

OBJECT SYNTAX: Command (39), Length, Offset, Source, Destination, Task Path.

OBJECT EXAMPLE: 39051201058E Copy 5 bytes starting at position 12 from TRANSMIT into SUP_BUF. Resume action with Task at address 8E.

K_FMTAMT: Action # 40

Format the value found in INTBUF to the specified length. Dollar sign and decimal point will be inserted for dollar amount format.

OBJECT SYNTAX: Command (40), Format length, Task Path.

OBJECT EXAMPLE: 4008F3 Format the value in INTBUF to dollar format with length 8. Result will remain in INTBUF. Resume action with Task at address F3.

K_CHGTSK: Action # 41

Extract two bytes from INT2BUF at the specified position and use them as the following Task Path.

OBJECT SYNTAX: Command (41), Offset

OBJECT EXAMPLE: 4106 Accept the two bytes starting at position 6 of INT2BUF as the following Task Path.

K_WTSTAT: Action # 42

Reenter state machine to allow some hard-coded function to be performed; return to task list when reactivated by normal code. An example of this command would be to allow dialing and a login to complete before checking whether the login was successful and attempting to perform a transaction.

```
SOURCE SYNTAX:
K__WTSTAT (Command name), [ Next task (if not default)]
SOURCE EXAMPLE:
        K__DIALUP             ; Start dialing
        K__WTSTAT             ; Let dialing complete
        K__WAIT @OK @BAD      ; Check if status is OK
@OK     K__ENQPKT             ; Send initial packet
OBJECT SYNTAX:
    42 (command) nn (next task)
OBJECT EXAMPLE:
Recd 80: 4281 == Wait for state machine to return, go to record 81
```

K_SFLREC: Action # 43

Set file and record number variables used by control string interpreter. This can be used to make the same control string insert different items of constant data into a buffer, under dynamic control by the task list. The file number variable which this command sets is called???; the record number variable is called "trncnt".

```
SOURCE SYNTAX:
K__SFLREC (Command name), File number, Record number, [ Next task (if not
default)]
SOURCE EXAMPLE:
ERRMSG      EQUATE     8
NOCREDIT    EQUATE     4
            K__SFLREC ERRMSG NOCREDIT     ; Set variables to file 8, recd 4
            K__BLDDC    79                ; Build buffer with err msg in it.
OBJECT SYNTAX:
```

-continued

```
43 (command) dd (file number) dd (record number) nn (next task)
OBJECT EXAMPLE:
Recd 80: 43080481 == Set variables to file 8, recd 4, goto task 81
```

K_INCREC: Action # 44

Increment record number variable (trncnt) used by control string interpreter. This can be used to simplify building of multiple buffers using successive records from the same file. (See also preceding action, K_SFLREC)

```
SOURCE SYNTAX:
K_INCREC (Command name), [ Next task (if not default)]
SOURCE EXAMPLE:
DETAIL EQUATE 21
    K_SFLREC DETAIl 01     ; Set first detail record
    K_BLDDC %DETAILC       ; Build detail packet with
                             first record
    K_INCREC               ; Advance to next record
    K_BLDDC %DETAILC       ; Build detail packet with
                             next record
OBJECT SYNTAX:
    44 (command) nn (next task)
OBJECT EXAMPLE:
Recd 80: 4481 == Increment trncnt, go to record 81
```

K_CALREF: Action # 45

Call a number for voice approval; i.e. do dialing and turn on base speaker, without attempting to raise carrier. The unit goes on-hook, waits 2 seconds, waits until the line is free, goes off-hook, dials the specified phone number, waits for the handset to go off-hook.

```
SOURCE SYNTAX:
    K_CALREF (Command name), Record no. of phone number,
      [ Next task (if not default)]
SOURCE EXAMPLE:
        K_CALREF 09 ; Call the number in recd 9 of
          phone file
OBJECT SYNTAX:
        45 (command) dd (phone number) nn (next task)
OBJECT EXAMPLE:
Recd 80: 450981 == Dial 9th phone number, go to record 81
```

K_SEARCH: Action # 46

For each record in the specified file, see if the string in the specified buffer matches the field in the record. K_SETMAX must be used to set the maximum number of records to search. If a match is found then the record number of that record is left in accum 21.

```
        Example: (probably with syntax errors)
SOURCE SYNTAX:
        K_SEARCH (Command name), file#, start, buffer#,
          Alternate task (jump-on-not-found), [ Next task, i.e.
          jump-on-found (if not
          default)]
        where file# is the number of the file to search, start is the
        position within each record at which to start comparing
        characters, buffer # is the number of the buffer with the
        match string, and the last two parameters are the
        addresses of the tasks to continue with if not-
        found, and if found.
SOURCE EXAMPLE:
        Key 9 begin 01
          K_BLDXM 80           ;get seq # from keyboard
          control string 80
              •                ;an automatic FS will be the first
```

-continued

```
                               char
              H1               ;"ENTER OLD SEQ#"
              R28              ;append FS
          control string end
          K_BLDDC 79           ;format user's input
          control string 79
              T*1-0-6-48       ;right just with zero padding
                               don'
                               ;copy leading and trailing FS
                               from
                               ;xmit buffer
          control string end
          K_MOVBUF input int2buf   ;copy from int2buf to
          input buffer
          K_SETMAX 01   ;max. records to search is set to
          accum 01
          K_SEARCH 23 17 input @notfound ;
          K_BLDDC 77   ;display detail record
          K_DSPBUF @DONE
      @notfound
          K_BLDDC 78           ;display not found message
          K_DSPBUF
          @DONE
OBJECT SYNTAX:
          46 (command) dd (file) dd (start) bb (buffer) aa (alternate
          path) nn (next task)
OBJECT EXAMPLE:
Recd 80: 461105018581 == Search through file 11, looking at the
          field beginning in the 5th byte of each record; if
          no match with the INPUT buffer is found, goto task
          85; if a match is found, then goto record 81
```

K_CHGSEG: Action # 47

This command causes the task list interpreter to start reading the task list input from a different file. This can be used to switch into an alternate segment, and then switch back to the normal task list file. Currently, definition of alternate segments is not supported by the assembler. When it is supported, an alternate segment may be defined using the SEG2 DEFINE, SEG2 BEGIN, and SEG2 END pseudo-ops.

```
SOURCE SYNTAX:
    K_CHGSEG (Command name), File number for alternate
      segment, Next task in new segment (Required!)
SOURCE EXAMPLE:
    See the example under the SEG2 BEGIN pseudo-op in Section 1.
OBJECT SYNTAX:
    47 (command) dd (alternate segment file no.) nn (next task)
OBJECT EXAMPLE:
Recd 80: 471323 == goto record 23 (hex) in file 13 (decimal),
      and begin executing tasks from there.
```

K_WAIT: Action # 99

Look at value of status variable (set by hard-coded logic in state machine), and do two-way branch based on that value. Alternate path (first label) is path taken if status is zero (OK); Primary path (second label) is path taken if status is non-zero (not OK). (See also under K_WTSTAT, Action 42, Wait for state machine)

```
SOURCE SYNTAX:
    K_WAIT (Command name), Alternate Label, [Label for
      next task, if not default]
SOURCE EXAMPLE:
```

-continued

```
          K_DIALUP                 ; Start dialing
          K_WTSTAT                 ; Let dialing complete
          K_WAIT @OK @BAD          ; Check if status is OK
@OK       K_ENQPKT                 ; Send initial packet
:
@BAD      K_BLDDC %ERRCSTR         ; Build error message
OBJECT SYNTAX:
   99 (Command) aa (Alternate Task Path) nn (Primary
      Next Task)
OBJECT EXAMPLE:
Recd 80: 998581 == Check status; if 0 then goto task 85, if non-zero
          then goto task 81.
```

Section 3—Index of commands/"op-codes"

Section 3 - Index of commands / "op-codes"

| Command name | Command Value | No. of Parameters | Alternate/Primary Next Task Path? |
|---|---|---|---|
| K_ALTHST | Action # 36 | 2 | None |
| K_ANRESP | Action # 34 | 3 | None |
| K_BLDDC | Action # 2 | 2 | Primary (default) |
| K_BLDPRN | Action # 16 | 2 | Primary (default) |
| K_BLDXMT | Action # 1 | 2 | Primary (default) |
| K_CALREF | Action # 45 | 2 | Primary (default) |
| K_CATBUF | Action # 21 | 3 | Primary (default) |
| K_CHGSEG | Action # 47 | 2 | Primary (required!!!) |
| K_CHGTSK | Action # 41 | 2 | None |
| K_CHKBYT | Action # 27 | 4 | Alternate, then primary |
| K_CHKMEM | Action # 23 | 4 | Primary (default) |
| K_CHKSUP | Action # 28 | 2 | Primary (default) |
| K_COPBUF | Action # 39 | 5 | Alternate, then primary |
| K_CWAITM | Action # 37 | 2 | Primary (default) |
| K_DECACC | Action # 7 | 2 | Primary (default) |
| K_DETAIL | Action # 24 | 3 | Primary (default) |
| K_DIALUP | Action # 14 | 1 | Primary (default) |
| K_DONE | Action # 0 | 0 | None |
| K_DSPBUF | Action # 29 | 1 | Primary (default) |
| K_ENQPKT | Action # 15 | 1 | Primary (default) |
| K_FMTAMT | Action # 40 | 2 | Primary (default) |
| K_GETACC | Action # 10 | 3 | Alternate, then primary |
| K_GETCLK | Action # 17 | 1 | Primary (default) |
| K_GETDC | Action # 4 | 1 | Primary (default) |
| K_INACCT | Action # 26 | 1 | Alternate only |
| K_INCACC | Action # 6 | 2 | Primary (default) |
| K_INCREC | Action # 44 | 1 | Primary (default) |
| K_INCSEQ | Action # 25 | 1 | Primary (default) |
| K_INIBUF | Action # 32 | 2 | Primary (default) |
| K_MOVBUF | Action # 5 | 3 | Primary (default) |
| K_PUTCLK | Action # 18 | 1 | Primary (default) |
| K_PUTDC | Action # 3 | 1 | Primary (default) |
| K_PUTPRN | Action # 13 | 1 | Primary (default) |
| K_RECPIN | Action # 12 | 1 | Primary (default) |
| K_RELSUP | Action # 20 | 1 | Primary (default) |
| K_RMDCML | Action # 38 | 2 | Primary (default) |
| K_SEARCH | Action # 46 | 5 | Alternate, then primary |
| K_SETBYT | Action # 35 | 3 | Primary (default) |
| K_SETMAX | Action # 9 | 2 | Primary (default) |
| K_SETREC | Action # 22 | 2 | Primary (default) |
| K_SETSUP | Action # 19 | 1 | Primary (default) |
| K_SFLREC | Action # 43 | 3 | Primary (default) |
| K_SUMACC | Action # 8 | 3 | Primary (default) |
| K_WAIT | Action # 99 | 2 | Alternate, then primary |
| K_WTRESP | Action # 31 | 1 | Primary (default) |
| K_WTSTAT | Action # 42 | 1 | Primary (default) |
| K_XMTPIN | Action # 11 | 1 | Primary (default) |
| K_XMTPKT | Action # 33 | 1 | Primary (default) |
| K_ZERACC | Action # 30 | 2 | Primary (default) |

NOTES:
(1) The number of parameters listed includes the next task parameters (if any).
(2) The preceding table is derived from the actual command data table used by the ZAPD assembler. To make it more readable, it has been altered so that the number of parameters shown for each command does not include the command itself (although it does include any next task pointers used), and so that the last column showing type of next task pointer can be more easily understood.

The description of the actual command data table structure from the ZAPD pseudo-assembler is reproduced below, in case it is necessary to add more commands:

Data Structure

<Cmd Name>, <Cmd Value>, <No. Parameters>, <Parm types>

| | | |
|---|---|---|
| <Command Name> | = | Capitalized name of command. |
| <Command Value> | = | Action (object code value) for command. |
| <No. Parameters> | = | Number of parameters. Includes COMMAND itself, and NEXT TASK pointer. |
| <Parm types> | = | Bit mapped; Bit i (of bits 1-8) is set to 1 iff i-th parameter is a label, i.e. a pointer to the next task. NOTE: For most commands this parm will have at least one bit set on, for the last parameter (NEXT TASK pointer). The few commands which do not take a NEXT TASK pointer are shown in this data table as having one more parameter than they actually take, and do NOT have the bit for that last parameter set on. |

Example 1: a valid command to build the data capture buffer is:
K_BLDDC 01 (or) K_BLDDC 01 @NEWLBL
(which becomes "0201xx", where xx is the pointer to the new task.)
This command is represented as: data "K_BLDDC", 2, 3, 4
Example 2: a valid command to analyze the host response is:
K_ANRESP 01 04
(which becomes "340104", with no next-task pointer in the output.)
This command is represented as: data "K_ANRESP", 34, 4, 0

Section 4—Usage of ZAPD/UNZAPD programs

The ZAPD program is the assembler for the ZAPD language. It will take a valid ZAPD language source file, and will generate a down-loadable object-code file, a symbol file, and optionally a report file containing summary information on the program.

As of January 28, the most current version is ZAPD14. (ZAPD Version 1.4)

The assembler program is invoked by issuing the command:

ZAPD14[−[R][Pnn]]<source-file>

The (ZAPD source) input to the program will be taken from the file <source-file>.FKY The (downloadable object-code) output from the program will be stored in the file <source-file>.DAT The symbol table output from the program will be stored in the file <source-file>.SMB If −R is used, miscellaneous information will be written out to the report output file <source-file>.RPT If -Pnn is used, output task list records will be packed together where possible (using the FF next-task entry) up to a maximum of nn bytes data per record. If no value is specified, 12 bytes will be used. If −P is not specified, no packing will be done.

Examples

| | | |
|---|---|---|
| Use | ZAPD14 -RP24 TEMP | to process file named TEMP.FKY, creating output file TEMP.DAT with task recds packed at 24 bytes, TEMP.SMB file with symbol table, and TEMP.RPT with summary information |
| Use | ZAPD14 -R TEMP | to process same files, including report file, with no packing. |

-continued

| Examples | | |
| --- | --- | --- |
| Use | ZAPD14 -P TEMP | to process/create same files, packing at 12 bytes, with no report file |

The UNZAPD program is the disassembler for the ZAPD language. It will take a down-loadable object-code file generated by the ZAPD program or uploaded from a terminal, and possibly a symbol file generated by the ZAPD program, and will generate a valid ZAPD language source file. UNZAPD will only disassemble the task-list portion of the program. Any disassembly of control strings, jump-tables, etc. which is necessary must be done by hand.

As of January 28, the most current version is UNZAPD10. (UNZAPD Version 1.0)

The disassembler program is invoked by issuing the command:

UNZAPD10<source-file>

The (task list object-code) input to the program will be taken from the file <source-file>.DAT The (ZAPD source) output from the program will be stored in the file <source-file>.FKY Symbol file input will be taken from the file named <source-file>.SMB, if the program finds it; if so, it will use the label names contained in that file on the corresponding statements; otherwise it will generate its own label names for statements.

| Examples: | | |
| --- | --- | --- |
| Use | UNZAPD10 TEMP | to disassemble the file TEMP.DAT, using the symbol file TEMP.SMB as a source of label names, and place the output in a file named TEMP.FKY |

TABLE XXVII

FILE: TABLEVAR
SYMBOLS.MAC - Symbol definition file
NAME('ZAP30R')

| | | | |
| --- | --- | --- | --- |
| | .PHASE | 086a4H | phase is the address of the variable use the name "ACTION" in form "ACTION##" in variable definition table or use in data type parameter specifier as @action## as an address or extended address type of data type. |
| ACTION:: | | DS 0 | |
| | .DEPHASE | | |
| | .PHASE | 08587H | |
| ACTIVE:: | | DS 0 | |
| | .DEPHASE | | |
| | .PHASE | 039beH | |
| ALPHAN:: | | DS 0 | |
| | .DEPHASE | | |
| | .PHASE | 03994H | |
| ALPHA_:: | | DS 0 | |
| | .DEPHASE | | |
| | .PHASE | 03b6dH | |
| AMOUNT:: | | DS 0 | |
| | .DEPHASE | | |
| | .PHASE | 08703H | |
| APPTIM:: | | DS 0 | |
| | .DEPHASE | | |
| | .PHASE | 08589H | |
| BACKGR:: | | DS 0 | |
| | .DEPHASE | | |
| | .PHASE | 0838fH | |
| BELFLG:: | | DS 0 | |
| | .DEPHASE | | |

TABLE XXVII-continued

FILE: TABLEVAR
SYMBOLS.MAC - Symbol definition file
NAME('ZAP30R')

| | | |
| --- | --- | --- |
| | .PHASE | 08320H |
| BUFFRC:: | | DS 0 |
| | .DEPHASE | |
| | .PHASE | 08340H |
| BUFPRC:: | | DS 0 |
| | .DEPHASE | |
| | .PHASE | 086eaH |
| CARDRE:: | | DS 0 |
| | .DEPHASE | |
| | .PHASE | 086ffH |
| CARDTR:: | | DS 0 |
| | .DEPHASE | |
| | .PHASE | 086a8H |
| CDSTAT:: | | DS 0 |
| | .DEPHASE | |
| | PHASE | 087a9H |
| CHKVBY:: | | DS 0 |
| | .DEPHASE | |
| | PHASE | 03c11H |
| CKHANG:: | | DS 0 |
| | .DEPHASE | |
| | .PHASE | 086d5H |
| CLS:: | DS 0 | |
| | .DEPHASE | |
| | .PHASE | 086d5H |
| CLS_:: | DS 0 | |
| | .DEPHASE | |
| | .PHASE | 086e0H |
| CCNSPC:: | | DS 0 |
| | .DEPHASE | |
| | .PHASE | 086e3H |
| CSDEV_:: | | DS 0 |
| | .DEPHASE | |
| | .PHASE | 086e4H |
| CSPTR_:: | | DS 0 |
| | .DEPHASE | |
| | .PHASE | 086f5H |
| CURACC:: | | DS 0 |
| | .DEPHASE | |
| | .PHASE | 086f2H |
| CURCSI:: | | DS 0 |
| | .DEPHASE | |
| | .PHASE | 086f7H |
| CURERR:: | | DS 0 |
| | .DEPHASE | |
| | .PHASE | 086f9H |
| CURFIL:: | | DS 0 |
| | .DEPHASE | |
| | .PHASE | 086fbH |
| CURMOD:: | | DS 0 |
| | .DEPHASE | |
| | .PHASE | 08595H |
| CURPAR:: | | DS 0 |
| | .DEPHASE | |
| | .PHASE | 086f4H |
| CURPAS:: | | DS 0 |
| | .DEPHASE | |

TABLE XXVIII

Listing of Changes Made to AMX Real Time Operating System

** Change AMSTBG so loop is larger and guaranteed EI.
** Change INTSV to remove Alternate
** Change CLOCK so that each interrupt is a time tick.
** Return CLOCK to original code.
** Disable EI on clock return
** Change PHASE to E300h.
** Remove AMX timer calls because Aztec does not support code to permit access to TMSTP TMGET, TMPUT. Further, all application timing can be done with WAITM call.
** Remove entry STTMR and rename TRTASK to STTMR.
** Remove redundancy in 8 and 16 bit circular lists.
** Change JP to JR to reduce code size.
** Move CLOCK to CLKISP routine.
Copy RRCLK to RRTMR for initialization.

TABLE XXVIII-continued

| Listing of Changes Made to AMX Real Time Operating System |
|---|
| ** Remove CTASK and WAKEC code. Modify TEND to remove WAKEC call. |
| ** PUSH/POP IX & IY during INTSV |
| ** Need to push IX/IY at AMSUSP entry |
| ** Eliminate use of IX register by Clist routines |
| ** Fix bug in CXABL when C8ABL was entry. Routine was putting value in wrong location. |
| ** Relocated location of LD E.A near CLX2 |
| ** Made .phase conditional on not being zapd. ZAPD units will be straight dseg |

TABLE XXIX

PACKET FORMATS FOR UP/DOWN LINE LOADING PURPOSE

Following are the different packet types used during the process of up/down line loading the programming prameters and ZAPD code.

Note:

| | | |
|---|---|---|
| STX (02h) | - | Start of Text |
| ETX (03h) | - | End of Text |
| CRC 16 bits | - | Cyclic Redundancy Check |
| LRC 8 bits | - | Longitudenal Redundancy Check Both are computed on first byte after STX to a byte before CRC/LRC itself. |

(1) Download Request Packet (from Terminal to Host):

```
+-----+-----+-----+-----+------+---+----------------+-----+-----+

¶ STX ¶ TTT ¶ ZZZ ¶ AAA ¶ VV.V ¶ N ¶ Terminal Id ¶ ETX ¶ LRC ¶

+-----+-----+-----+-----+------+---+----------------+-----+-----+
```

where

N = A (41h) - All download request
P (50h) - Parameter only download request
Z (5Ah) - Zapd code only download request
TTT = Terminal Type (e.g. § TM for generic ZON) and §ZP for ZAPD ZON)
ZZZ = ZAPD interpreter version number
AAA = Application Identifier (e.g. NDC for NDC d.c.
VV.V = Application version number
Terminal ID = Terminal Id of requesting terminal (2) Download Data Packet (from Host to Terminal):

```
+-----+---+----+----+--------+--+----+----+-------...---+----+-----+

¶ STX ¶ N ¶ FF ¶ RR ¶ R. C. ¶ FS ¶ FF ¶ RR ¶ R. C.    ¶ ETX ¶ CRC ¶

+-----+---+----+----+--------+--+----+----+-------...---+----+-----+
```

where

N = 1 (13h) - Download data packet
FF = File Number in 2 digit hex decimal
RR = Record Number in 2 digit hex decimal
R. C. = Record Contents
FS = Field Seperator (3) Upload Request Packet (from Host to Terminal):

```
+-----+---+----+-----+-----+

¶ STX ¶ N ¶ FF ¶ ETX ¶ CRC ¶

+-----+---+----+-----+-----+
```

where

N = 0 (30h) - upload request for a file by the Host
FF = File Number in 2 digit hex decimal (4) Upload Data Packet (from terminal to Host):

```
+-----+---+---+----+----+--------+--+----+----+-------...---+----+-----+

¶ STX ¶ N ¶ M ¶ FF ¶ RR ¶ R. C. ¶ FS ¶ FF ¶ RR ¶ R. C.    ¶ ETX ¶ CRC ¶

+-----+---+---+----+----+--------+--+----+----+-------...---+----+-----+
```

where

N = 5 (35h) - Upload data packet
M = 0 (30h) - Contain last record of a file

TABLE XXIX-continued

PACKET FORMATS FOR UP/DOWN LINE LOADING PURPOSE

```
             1 (31h) - More records are still left
      FF =   File Number in 2 digit hex decimal
      RR =   Record Number in 2 digit hex decimal
    R. C. =  Record Contents
      FS =   Field Seperator
```

(5) Message Packet (from Host to Terminal):

```
+-----+---+-----------+----+-----+
¶ STX ¶ N ¶ MESSAGE ¶ ETX ¶ CRC ¶
+-----+---+-----------+----+-----+
```

where

```
      N =  2 (32h) - Message Packet
        =  3 (33h) - Successful download
                     sesion trail packet
                     with a message
        =  4 (34h) - Unsuccessful download
                     session trail packet
                     with an error message
```

(6) ZAPD Code Download Packet (from Host/Terminal to Terminal/Host):

```
+-----+---+---+---+----------------------+-----+
¶ STX ¶ N ¶ P ¶ R ¶ Binay Data - 128 bytes ¶ CRC ¶
+-----+---+---+---+----------------------+-----+
```

where

```
          N =  % (25h) - Binary Download Packet
                         (from host to terminal)
               & (26h) - Binary Upload Packet
                         (from terminal to host)
          P =  00h-FFh - Page Number, where
                         page size is 100h
          R =  0 (30h) - Lower 128 bytes of page
                         and more data to follow
               1 (31h) - Higher 128 bytes of page
                         and more data to follow
               2 (32h) - Lower 128 bytes of page and
                         last binary data packet
               3 (33h) - Higher 128 bytes of page and
                         last binary data packet
Binary Data =  8 bit binary data, length will always
               be 128 bytes. Smaller data field
               would be padded with 01h to make
               it 128 bytes long.
```

(7) Zapd Code Upload Request Packet (from Host to terminal):

```
+-----+---+---+----+-----+
¶ STX ¶ N ¶ P ¶ ETX ¶ CRC ¶
+-----+---+---+----+-----+
```

where

```
      N =  ' (27h) - Binary Upload Request Packet
                     (from host to terminal)
      P =  00h-FFh - Starting Page Number, where
                     page size is 100h
```

```
BEGIN HEADER

TITLE          ZAPD VFI APPLICATION
VERSION        2650
DATE           11/13/85
PROGRAMMER     Brian K. Uechi
DOWNLOAD       201VFI2650

END HEADER

.pa

BEGIN COMMENT

        11/10/85 ZAP28R

        1) Specifiers are auto-entering even though that is
        not desired.  May have to change edit type from integer
        to numeric then do range checking after enter pressed.

        This program emulates the operation of the standard
        authorization only VFI terminal, version 26.5.  See the 26.5
        manual for detailed information.  The differences are
        explained below.

        Implemented features that have changed
        ______________________________________

        1.  Store/recall no longer uses the '*' and '#' keys.

        Old  New  Desciption
        ---  ---  ----------

        *0   --   Password
        *1   11   Merchant id
        *2   12   Network protocol specifier
        *3   --   Wait code (obsolete)
        *4   --   Modem delay (obsolete)
        *5   03   Base set ring flag
        *6   16   Network login name/password specifier
        *7   17   Control string specifier
        *8   18   Network login name
        *9   19   Network login password

        #0   --   nothing
        #1   21   Display transmit buffer
        #2   22   Display receive buffer
        #3   23   Control string
        #4   24   Prompts
        #5   05   Terminal/down load serial number
        #6   04   Call restriction flag
        #7   27   Display card data flag
        #8   --   nothing (?)
        #9   02   Tone/pulse dial select

        00   01   Phone numbers.  The old version required only 2 key
        01   01        strokes (e.g. [RECALL] 05) to access a phone.
        02   01        The new version requires 4 key strokes (e.g.
        .              [RECALL] 01 05).
        .
        .
        19   01

        New  Old  Desciption
        ---  ---  ----------

        01        Primary transaction and speed dial phone
        02   #9   Tone or pulse dial flag
        03   *5   Ring detect/incoming call
        04   #6   Call restriction
        05   #5   Terminal/application serial number
        06        % Alternate transaction phone number
        07        % Default dial type
        08        % Alternate network login name/password specifier
        09

        10   *0
        11   *1   Merchant ID
        12   *2   Network protocol specifier
        13   *3   % Alternate merchant ID
        14   *4   % Alternate network protocol specifier
        15   *5   See 03
        16   *6   Network login name/password specifier
        17   *7   Control string specifier
        18   *8   Network login name
        19   *9   Network login password

        20   #0
        21   #1   Display transmit buffer
        22   #2   Display receive buffer
        23   #3   Control string
        24   #4   Prompts
        25   #5   See 05
        26   #6   See 04
        27   #7   Display card data flag
        28   #8
        29   #9   See 02

        % means did not appear in old software


        2.  Alternate phone number dialing.
                No longer uses the 'A' command in the phone number for
                alternate host phone number.  See alternate phone number
                group.

        3.  Password is requested when needed.
                [STORE] *0 is no longer necessary.  The terminal will
                request the unlock password when necessary.  After
```

```
        the correct password has been entered, the terminal
        remains unlocked until the next transaction is started.


    New features
    ------------
    1.  Default dialing type per host key.
    2.  Alternate logon protocol.
    3.  Alternate merchant id.
    4.  Alternate control string.
    5.  9 hosts (1-9) instead of 8 (1-8).  0 not used because phone number
        00 is already allocated for down load.
    6.  Default value for pre/post dial when host key pressed in READY
        state.

    Unimplemented features
    ----------------------
    1.  Print flag.  I don't think this was ever used in VFI.
    2.  UD sequence number.  I don't think this was ever used in VFI.

END COMMENT
.pa

BEGIN COMMENT


*************************************************************************
*               T A B L E   O F   C O N T E N T S                       *
*************************************************************************

    Not applicable definitions
    File security definitions
    Prompt and display message definitions
    Hardware definitions
    Telco Device definitions
    Accumulator definitions
    Job definitions
    Memory Full definitions
    Math definitions
    Clock definitions
    Character padding definitions
    Control String entry definitions
    Relational operator definitions
    Numeric Conversion definitions
    Check byte definitions
    ASCII Control Codes
    Input Edit definitions
    Miscellaneous definitions
END COMMENT

.pa
;

BEGIN EQUATE DEFINITIONS
```

```
;         ************************************************
;         Define for not being applicable
EQUATE  NA      0

;
;       **************************************************
;         File security defines
EQUATE  READ    1
EQUATE  WRITE   2
EQUATE  BOTH    3

;
;       **************************************************
;         Compression type
;
EQUATE  NONE    0
EQUATE  SIXBIT  1
EQUATE  BCD     2
EQUATE  HYBRID  4


;       **************************************************
;         Mapped key defines

EQUATE  ENTERKEY        131     ; Mchar of enter key
EQUATE  CEKEY           124     ; Mchar of backspace/CE key
EQUATE  HANGUPKEY       137     ; Mchar of hangup key
EQUATE  SHIFTKEY        128     ; Mchar of shift key


;       **************************************************
          ;Math function defines
EQUATE  ADD             0
EQUATE  SUB             16
EQUATE  MUL             32
EQUATE  DIV             48


;       **************************************************
;         Handset enable/disable
EQUATE  HSETOFF         255
EQUATE  HSETON          0


;       **************************************************
;         Hardware device defines
EQUATE  TI      01
EQUATE  TRK2    01
EQUATE  ROLL    01

EQUATE  CARD    01
EQUATE  KEYBD   02
EQUATE  MODEM   04
EQUATE  RS232   08
```

```
EQUATE  PIN     16
EQUATE  TELCO   32
EQUATE  MODTIM  68              ;modem and timer
EQUATE  TELTIM  96              ;telco and timer
EQUATE  KEYTIM  66              ;keyboard and timer
EQUATE  KEYCRD  03              ;keyboard and cardreader
EQUATE  KEYCRDTIM       67      ;keyboard, cardreader, timer

;       *************************************************
;       Modem (carrier) Directives
EQUATE  OFF     0
EQUATE  ORIG    1
EQUATE  ANSR    2

;       *************************************************
;       TELCO status defines
EQUATE  GOT_CAR 04
EQUATE  LST_CAR 05
EQUATE  HS_UP   02
EQUATE  HS_DN   04

EQUATE  GOT_RNG 03
EQUATE  LST_RNG 06

;       *************************************************
        ;Clock format defines

EQUATE  MM      0       ;format 0, MMDDYYHHMMSS
EQUATE  DD      1       ;format 1, DDMMYYHHMMSS
EQUATE  YY      2       ;format 2, YYMMDDHHMMSS
EQUATE  MH      3       ;format 3, MM/DD/YY HH:MM
EQUATE  DH      4       ;format 4, DD/MM/YY HH:MM
EQUATE  YH      5       ;format 5, YY/MM/DD HH:MM
EQUATE  MY      6       ;format 6, MMDDYY
EQUATE  DM      7       ;format 7, DDMMYY
EQUATE  YD      8       ;format 8, YYMMDD
EQUATE  MDY     9       ;format 9, MM/DD/YY
EQUATE  DMY     10      ;format 10, DD/MM/YY
EQUATE  YMD     11      ;format 11, YY/MM/DD
EQUATE  HMS     12      ;format 12, HH:MM:SS



;       *************************************************
;       The following equates define either left or right justification
;       for the PAD_CHAR and PAD_BYTE opcodes.
;
EQUATE  PAD_L   0
EQUATE  PAD_R   1
;
```

```
;       *************************************************
;       The following three equates define the entry points to the
;       control string interpreter.  DE requires data entry and enters
;       through the "original" entry point.  DR builds a buffer from
;       files and constants and enters through the "data capture" entry
;       point.  FM performs formatting using files and constants, and
;       enters through the "print control string" entry point.
;
EQUATE  IDE 0
EQUATE  DR  1
EQUATE  FM  2


;       *************************************************
;       Relational operator equates.
;       NOTE:  These may be removed if the preprocessor
;              learns how to deal with relational operators directly
EQUATE  eq      0
EQUATE  lt      1
EQUATE  le      2
EQUATE  gt      3
EQUATE  ge      4
EQUATE  ne      5


;
;       *************************************************
;       Branch_if instruction equates
;
EQUATE  EQ0     0
EQUATE  NE0     1
EQUATE  GE0     2
EQUATE  LT0     3


;       *************************************************
;       Numeric/string conversion operator defines
EQUATE  SIGNED    0
EQUATE  UNSIGNED  1
EQUATE  HEX       2


;       *************************************************
;       Check byte type defines
EQUATE  LRC  00         ;8 bit longitudinal redundancy check
EQUATE  CRC  01         ;16 bit cyclic redundancy check
EQUATE  CKS  02         ;checksum


;       *************************************************
;       ASCII conversion code defines

EQUATE  ON      1
```

```
EQUATE  TRUE  01
EQUATE  FALSE 00
EQUATE  STX   02
EQUATE  ETX   03
EQUATE  EOT   04
EQUATE  ENQ   05
EQUATE  ACK   06
EQUATE  CR    13
EQUATE  NAK   21
EQUATE  FS    28
EQUATE  BLANK 32
EQUATE  AST   42
EQUATE  DASH  45
EQUATE  PD    46
EQUATE  S_PAD 48
EQUATE  COLON 58
EQUATE  QMARK 63
EQUATE  AT    64                    ;40h
EQUATE  H     72                    ;48h
EQUATE  EQUAL 61                    ;3dh
EQUATE  ZERO_CHAR       48          ;30h
EQUATE  COMMA 44                    ;2ch
EQUATE  C_CHAR  67                  ;43h
EQUATE  SPACE   32                  ;20h
EQUATE  Y_CHAR  89                  ;59h
EQUATE  A_CHAR  65                  ;41h
EQUATE  P_CHAR  80                  ;50h
EQUATE  CNTLH   8                   ;08H
EQUATE  SEMICOL 59                  ;3bh
EQUATE  PERIOD  46                  ;2eh

;       **************************************************
;       Input edit keyboard map
;
EQUATE  K_NORM  0                   ;Normal keyboard mapping
EQUATE  K_CALC  1                   ;Maps key 24 from '0' to '.'
                                    ;Maps key 25 from '/' to '0'


;       **************************************************
;       Miscellaneous defines.
EQUATE  ZERO    00
EQUATE  ONE     01
EQUATE  TWO     02
EQUATE  THREE   03
EQUATE  FOUR    04
EQUATE  FIVE    05
EQUATE  SIX     06
EQUATE  SEVEN   07
EQUATE  EIGHT   08
EQUATE  NINE    09
EQUATE  YES      1
EQUATE  NO       0
```

```
EQUATE  CRDMCC  65
EQUATE  KBDMCC  64

;
; state machine ROM action numbers
;
EQUATE  DABORT      1
EQUATE  SCRLLEFT    3
EQUATE  SCRLRIGHT   4
EQUATE  CHK_NSET    7

;
; operating system function numbers
;
EQUATE  SETINP      45
EQUATE  HANGUP      81
EQUATE  DISBL_MDM 107

;
; operating system device numbers
;
EQUATE  MODEMIN     3


END EQUATE DEFINITIONS


.pa

BEGIN HARDWARE DEFINITION TABLE
        $MODEM          TI      ;(AMD or TI)
        $CARDRDR        TRK2    ;(TRK2, TRK1/2, TRK1&2)
        $PRINTER        ROLL    ;(ROLL, VFISLIP, EATSLP)

;  NOTE:  The following equates identify which physical memory
;         chips will be used for the application.

        MEM8000_8K              ;(2K or 8K)
        MEMA000_8K              ;(2K or 8K)
        MEMC000_8K              ;(2K or 8K)
        MEME000_2K              ;(0K or 2K)
        MEME800_0K              ;(0K or 2K)
        MEMF000_0K              ;(0K or 2K)
        MEMF800_0K              ;(0K or 2K)


END HARDWARE DEFINITION TABLE

.pa

BEGIN MEMORY PARTITION
;               Start   End
;               Addr    Addr    ID      Description
;               _____   _____   ___     _______________________
```

```
PARTITION    ENDZAPD+1h 0BFFFh  sap1     ;Non-volatile, Switch
                                         ;protected (ZAPD code stuff
                                         ;goes here)

PARTITION      0E000h  0E7FFh  sap2      ;Non-volatile RAM, scratch area

VARPAR     sap2
BUFPAR     sap2
STACKPAR   sap2
STACKSIZE  90

END MEMORY PARTITION

.pa

BEGIN COMMENT
System Monitoring:
_________________________
CDSTAT00          Carrier Detect System Variable.
DNLTYP00          Download variable type.
ERRCODE00         System errcode variable

HSETUP00          Handset Status Variable.
MCHAR00           Variable containing maped keyin char
OUTST_00          Display parameter

RANCHAR00         Variable containing raw character
RECNUM00          Default record 0 for control string (t0$ command)
TRANCODE00        Variable used for control string $1
TRNREC00          Default file 0 for control string (t0$ command)

END COMMENT

BEGIN VARIABLE DEFINITION TABLE
;
;                 Variable
;                 Name          Description
;                 ________      ______________________
;
VARIABLE          ALTFLAG       ;Alternate Host flag

VARIABLE          CDSTAT00      ;carrier detect system variable

VARIABLE          CLS_00        ;if non-zero, clears screen on first key press
                                ;... of data entry

VARIABLE          DATAIN        ;data entry done flag used to synchronize
                                ;...concurrent dial/login with data entry

VARIABLE          DNLTYP00      ;download type

VARIABLE          ERRCODE00     ;system errcode variable

VARIABLE          PONEFIL       ;phone number file number

VARIABLE          HOSTNUM       ;host number 1 - 30

VARIABLE          HSETUP00      ;handset status flag

VARIABLE          I             ;misc variable

VARIABLE          LGTRY         ;number of logon tries

VARIABLE          LOGSFIL       ;login parameter specifier file

VARIABLE          MCHAR00       ;variable containing mapeed keyin char

VARIABLE          MIDLEN        ;merchant ID length

VARIABLE          MULTI_00      ;multiple transaction flag.  0 = single tran.
                                ;... 2 = multiple tran.  The control string
                                ;... interpreter will OR this byte on top of
                                ;... the Write Control Character.

VARIABLE          OUTST_00      ;display parameter

VARIABLE          PREDIAL00     ;pre/post dial flag. 0 = postdial, 1 = predial

VARIABLE          XMITRDY       ;semaphore used by get_host/dotran
                                ;... set to 1 by dotran or one of its sub-jobs
                                ;... set to 0 by get_host or "  "  "  "
                                ;... 0 = $transmit not ready to send or already
                                ;...      sent
                                ;... 1 = $transmit ready to send

VARIABLE          PROTSPC       ;protocol specifer used in logon

VARIABLE          PROTFIL       ;protocol specifer file

VARIABLE          RANDVAL       ;random value, used both as BYTE and INT

VARIABLE          RANCHAR00     ;variable containing raw char

VARIABLE          RCHAR         ;variable used in logon

VARIABLE          RCVDONE       ;Response packet is received

VARIABLE          RECNUM00      ;Default record 0 for control string
                                ;t0$ command

VARIABLE          RSPVALID      ;semaphore used by get_host/dotran
                                ;... set to 0 by dotran or one of its sub-jobs
                                ;... set to 1 by get_host or "  "  "  "
                                ;... 1 = $receive has valid response from host
                                ;... 0 = $receive does not have valid
                                ;...      response from host or already analyzed

VARIABLE          SPFLAG        ;special function flag used in UD state
```

```
VARIABLE        STATUS          ;status flag used in logon

VARIABLE        TIMER           ;time out variable used in modem comm.

VARIABLE        TRANCODE$$      ;variable for control string $1

VARIABLE        TRNREC$$        ;Default file # for control string
                                ;t#$ command

VARIABLE        UNLOKF          ;Tells whether or not storing is allowed.

VARIABLE        USR1VAR         ;Misc var used in logon

VARIABLE        USR4VAR         ;Misc var used in logon

VARIABLE        XTRIES          ;number of transmission tries

VARIABLE        XTVALID         ;transmit packet valid

END VARIABLE DEFINITION TABLE

.pa

BEGIN BUFFER DEFINITION TABLE
;
;  NOTE:  These are minimum lengths.
;
;           Buffer
;           Name          Length  Description
;           ____          ______  ________________________
BUFFER     input           128     ;desc of input buffer
BUFFER     transmit        192     ;desc of transmit buffer
BUFFER     receive         128     ;desc of receive buffer
BUFFER     destr            50     ;desc of data entry string buffer
BUFFER     intbuf           50     ;desc of control string buffer
BUFFER     int2buf         170     ;desc of data capture result buffer
BUFFER     int3buf          35     ;desc of miscellaneous buffer
BUFFER     supbuf            1     ;desc of supervisor data buffer
BUFFER     amtsav           17     ;desc of amount save buffer
BUFFER     brntbl           32     ;desc of branch-table buffer
BUFFER     mathbuf          16     ;desc of mathematic buffer
BUFFER     user1buf        128     ;desc of misc. buffer
BUFFER     user2buf          1     ;
BUFFER     user3buf          1     ;
BUFFER     user4buf         64     ; used in login stuff
BUFFER     tmp1buf         128     ;temporary buffer for implied use
BUFFER     tmp2buf         128     ;temporary buffer for implied use

END BUFFER DEFINITION TABLE
.pa

; ____________________________________________________________
BEGIN FILE DEFINITION TABLE
```

```
;
;                  SUMMARY OF FILES
;
;
;
;     Physical Logical
;     File #   File #   File Name      Description
;     ______   ______   _________      ___________
; The first five logical files are REQUIRED to appear in the
; designated order.
;
;        1        1     F_PHNM         Primary and speed dial phone numbers
;        2        2     F_DLTP         Tone/pulse select
;        3        3     F_RING         Ring Detect/incoming ring
;        4        4     F_CALL         Call restriction flag
;        5        5     F_SERL         Terminal serial number
;
; Logical file 6 thru logical file n can be any file and can be
; in any order.
;
;        6        6     F_UDNO         Up/Download sequence number
;        7        7     F_CFLG         Display card data flag
;
;        8        8     F_PROSP        Network protocol specifier
;        9        9     F_APRSP        Alternate network protocol specifier
;       10       10     F_LOGSP        Network login parameters specifier
;       11       11     F_ALGSP        Alternate network login param. spec.
;       12       12     F_LOGNM        Network login name parameter
;       13       13     F_LOGPS        Network login password parameter
;       14       14     F_CTLSP        Control String Specifier
;
;       15       15     F_CNSTR        Control String
;       16       16     F_PROMP        Prompts
;       17       17     F_MRID         Merchant IDs
;       18       18     F_PRNT         Print Flag
;       19       19     F_SECPH        Alternate phone numbers (trans only)
;       20       20     F_DFDL         Default dial type by host
;       21       21     F_MISC         Miscellaneous storage
;                                      01 Copy of last transmit buffer
;                                      02 Copy of last receive buffer
;       22       22     F_ALMID        Alternate merchant ID
;
;

;
;          Name        Id     Compr    Part    Alt     Cutf
;          ____        __     _____    ____    ___     ____
FILE       F_PHNM      01     BCD      sapl    na      255
FILE       F_DLTP      02     none     sapl    na      255
FILE       F_RING      03     none     sapl    na      255
FILE       F_CALL      04     none     sapl    na      255

FILE       F_SERL      05     sixbit   sapl    na      255
FILE       F_SECPH     06     BCD      sapl    na      255
```

```
FILE     F_DFDL       07   none    sap1   na     255
FILE     F_ALGSP      08   none    sap1   na     255
FILE     F_UNUSED1    09   none    sap2   na     255

FILE     F_UNUSED2    10   none    sap2   na     255
FILE     F_MRID       11   BCD     sap1   na     255
FILE     F_PROSP      12   none    sap1   na     255
FILE     F_ALMID      13   BCD     sap1   na     255
FILE     F_APRSP      14   none    sap1   na     255

FILE     F_UNUSED3    15   none    sap2   na     255
FILE     F_LOGSP      16   none    sap1   na     255
FILE     F_CTLSP      17   none    sap1   na     255
FILE     F_LOGNM      18   sixbit  sap1   na     255
FILE     F_LOGPS      19   sixbit  sap1   na     255

FILE     F_UNUSED4    20   none    sap2   na     255
FILE     F_XMIT       21   none    sap2   na     255
FILE     F_RECV       22   none    sap2   na     255
FILE     F_CNSTR      23   sixbit  sap1   na     255
FILE     F_PROMP      24   sixbit  sap1   na     255

FILE     F_UNUSED5    25   none    sap2   na     255
FILE     F_UNUSED6    26   none    sap2   na     255
FILE     F_CFLG       27   none    sap1   na     255

;                 File         Min    Max    Prompt   Input
;                 Name         Rec    Rec    Rec #    Attr
;                 ----         ---    ---    ------   -----
DESCFILE          F_MMM        0      19     na       telc
DESCFILE          F_DLTP       1      1      na       flag
DESCFILE          F_RING       1      1      na       flag
DESCFILE          F_CALL       1      1      na       flag
DESCFILE          F_SERL       1      2      na       udno

DESCFILE          F_SECPM      1      9      na       telc
DESCFILE          F_DFDL       1      9      na       flag
DESCFILE          F_ALGSP      1      9      na       edlgspc
DESCFILE          F_MRID       1      9      na       edmid
DESCFILE          F_PROSP      1      9      na       proto
DESCFILE          F_APRSP      1      9      na       proto
DESCFILE          F_ALMID      1      9      na       edmid
DESCFILE          F_LOGSP      1      9      na       edlgspc
DESCFILE          F_CTLSP      1      9      na       edcaspc

DESCFILE          F_LOGNM      1      8      na       edlgn
DESCFILE          F_LOGPS      1      8      na       edlgn

DESCFILE          F_XMIT       1      1      na       na
DESCFILE          F_RECV       1      1      na       na
DESCFILE          F_CNSTR      1      0      na       edcst
DESCFILE          F_PROMP      1      16     na       prmpt
DESCFILE          F_CFLG       1      1      na       flag
```

```
;               File         Min    Max    Type     Access
;               Name         Rec    Rec    Protect  Level
;               ----         ---    ---    -------  ------
SECURITY        F_MMM        0      19     both     1
SECURITY        F_DLTP       1      1      both     1
SECURITY        F_RING       1      1      both     1
SECURITY        F_CALL       1      1      both     1
SECURITY        F_SERL       1      2      both     1

SECURITY        F_SECPM      1      9      both     1
SECURITY        F_DFDL       1      9      both     1
SECURITY        F_ALGSP      1      9      both     1
SECURITY        F_MRID       1      9      both     1
SECURITY        F_PROSP      1      9      both     1
SECURITY        F_ALMID      1      9      both     1
SECURITY        F_APRSP      1      9      both     1
SECURITY        F_LOGSP      1      9      both     1
SECURITY        F_CTLSP      1      9      both     1

SECURITY        F_LOGNM      1      8      both     1
SECURITY        F_LOGPS      1      8      both     1

SECURITY        F_XMIT       1      1      read     1
SECURITY        F_RECV       1      1      read     1
SECURITY        F_CNSTR      1      0      both     1
SECURITY        F_PROMP      1      16     both     1
SECURITY        F_CFLG       1      1      both     1

DEFAULT         CSI          F_CNSTR
DEFAULT         PRM          F_PROMP

END FILE DEFINITION

BEGIN INPUT ATTRIBUTE
;                                Key      Max
;EDIT   Label    Edit    Map      Len   P1    P2    Dec
;       -----    ----    ---      ---   --    --    ---
EDIT    csedit   alphan  k_calc   50    na    na    na
EDIT    telc     teleno  k_norm   32    na    na    na
EDIT    udno     alphan  k_norm   10    na    na    na
EDIT    flag     alphan  k_norm   1     na    na    na
EDIT    edmid    alphan  k_calc   24    na    na    na
EDIT    prmpt    alphan  k_norm   16    na    na    na
EDIT    edcaspc  intege  k_norm   1     1     0     1
EDIT    edcst    alphan  k_norm   25    na    na    na
EDIT    proto    intege  k_norm   1     0     5     1
EDIT    edlgspc  intege  k_norm   1     1     0     1
EDIT    edlgn    alphan  k_norm   12    na    na    na
```

```
EDIT    range    alphan  k_norm  24      na      na      na
EDIT    igetpas  pw_edi  k_norm  16      na      na      na

END INPUT ATTRIBUTE
.pa

BEGIN BUILD FILE

        DLLFILE F_SERL
RECORD  02      "VFI2650"

        DLLFILE F_PNUM
RECORD  00      "208"                    ;VFI TEST DOWN LOAD NUMBER

RECORD  01      "9-18003363846"          ;VISA 1 GEN VANILLA
RECORD  02      "9-5269753"              ;TELECHECK
RECORD  03      "8-4-062-7036918200"     ;TYMSHARE/TYMNET
RECORD  04      "9-18003254154"          ;MASTER CARD
RECORD  05      "8-4-062-6144572105"     ;COMPUSERVE
RECORD  06      "8-4-062-8167657315"     ;CREDIT SYSTEM (UMB)
RECORD  07      "9-18005543363"          ;NDC
RECORD  08      "8-4-062-2135870030"     ;TELECHECK VIA TYMNET
RECORD  09      "9-5248110"              ;NDC VIA TELENET


        DLLFILE F_MRID
RECORD  01      "4.4212931203034400"     ;VFI TEST MERCHANT ID
RECORD  02      "B.TCK.1256."            ;VFI TEST MERCHANT ID
RECORD  03      "PM.TXSLK*J0M.85TXSO"    ;VFI TEST MERCHANT ID
RECORD  04      "4.14991234569"          ;VFI TEST MERCHANT ID
RECORD  05      "B.4443003426111066"     ;VFI TEST MERCHANT ID
RECORD  06      "B.4016002028134400"     ;VFI TEST MERCHANT ID
RECORD  07      "4.08920000000009999"    ;VFI TEST MERCHANT ID
RECORD  08      "KCW5GUOTXSOTXSOTXSO"    ;VFI TEST MERCHANT ID
RECORD  09      "4.08920000000009999"    ;VFI TEST MERCHANT ID

        DLLFILE F_PROSP
RECORD  01      "0"             ;NO LOGIN
RECORD  02      "0"             ;NO LOGIN
RECORD  03      "1"             ;TYMNET
RECORD  04      "0"             ;NO LOGIN
RECORD  05      "2"             ;COMPUSERVE
RECORD  06      "0"             ;NO LOGIN
RECORD  07      "0"             ;NO LOGIN
RECORD  08      "1"             ;TYMNET
RECORD  09      "3"             ;TELENET


        DLLFILE F_CTLSP
RECORD  01      "1"
RECORD  02      "2"
RECORD  03      "1"
RECORD  04      "1"
RECORD  05      "1"
RECORD  06      "1"
RECORD  07      "4"
RECORD  08      "5"
RECORD  09      "4"

        DLLFILE F_LOGSP
RECORD  03      "1"
RECORD  05      "2"
RECORD  08      "1"
RECORD  09      "3"

        DLLFILE F_CNSTR
RECORD  01      "QA5B1C1,4,6"
RECORD  02      "QF6R28R28C1,4,6"
RECORD  03      "QH1G1I1J1C1,4,6"
RECORD  04      "QA5B1C1,4,6R35K1"
RECORD  05      "QF6G1C1,4,6"

        DLLFILE F_PROMP

;;;;;;;;;;;;;;;;1234567890123456
RECORD  01      "ENTER ACCOUNT NO."              ;PROMPT A
RECORD  02      "ENTER EXP. DATE"                ;PROMPT B
RECORD  03      "ENTER AMOUNT"                   ;PROMPT C
RECORD  04      "ENTER ACCOUNT #"                ;PROMPT D
RECORD  05      "ENTER EXPIR DATE"               ;PROMPT E
RECORD  06      "TCK ID# OR CARD"                ;PROMPT F
RECORD  07      "ENTER STATE CODE"               ;PROMPT G
RECORD  08      "ENTER LICENSE NO."              ;PROMPT H
RECORD  09      "ENTER CHECK NO."                ;PROMPT I
RECORD  10      "BIRTHDATE MMDDYY"               ;PROMPT J
RECORD  11      "ENTER TRAN CODE"                ;PROMPT K


        DLLFILE F_LOGNM
RECORD  01      "TSDUPONE"
RECORD  02      "B1"
RECORD  03      "404079"
RECORD  04      "NAME 04"
RECORD  05      "NAME 05"
RECORD  06      "NAME 06"
RECORD  07      "NAME 07"
RECORD  08      "NAME 08"

        DLLFILE F_LOGPS
RECORD  01      "UPONETRAN"
RECORD  02      "PASS 02"
RECORD  03      "PASS 03"
RECORD  04      "PASS 04"
RECORD  05      "PASS 05"
RECORD  06      "PASS 06"
RECORD  07      "PASS 07"
RECORD  08      "PASS 08"
```

```
END BUILD FILE
.pa

BEGIN PASSWORD MODE SET TABLE
;
;                   0        1        2        3        4
;MODE    mode       12345678 90123456 78901234 56789012 34567890
;        ----       --------------------------------------------
MODE     1          11111111 11111111 11111111 11111111 11111111
;
END PASSWORD MODE

.pa

BEGIN SPECIAL KEYS

;
;         A      B      C           D      E           F      G
;Key #:   1      2      3           4      5           6      7
;       +---+  +---+  +---+       +---+  +---+       +---+  +---+
;       | 1 |  | 2 |  | 3 |       |   |  |.  |       |   |  |   |
;       +---+  +---+  +---+       +---+  +---+       +---+  +---+
;
;         H      I      J           K      L           M      N
;Key #:   8      9      10          11     12          13     14
;       +---+  +---+  +---+       +---+  +---+       +---+  +---+
;       | 4 |  | 5 |  | 6 |       |   |  |   |       |   |  |   |
;       +---+  +---+  +---+       +---+  +---+       +---+  +---+
;
;         O      P      Q           R      S           T      U
;                                          CE                 ENTER
;Key #:   15     16     17          18     19          20     21
;       +---+  +---+  +---+       +---+  +---+       +---+  +---+
;       | 7 |  | 8 |  | 9 |       |   |  |   |       |   |  |   |
;       +---+  +---+  +---+       +---+  +---+       +---+  +---+
;
;         V      W      X           Y      Z         HANGUP ALPHA
;Key #:   22     23     24          25     26          27     28
;       +---+  +---+  +---+       +---+  +---+       +---+  +---+
;       | * |  | 0 |  | # |       |   |  |   |       |   |  |   |
;       +---+  +---+  +---+       +---+  +---+       +---+  +---+
;
        KEY    ALPHA   28       ;ALPHA
        KEY    HANGUP  27       ;HANGUP
        KEY    ENTER   21       ;ENTER
        KEY    BACKSP  19       ;CE (clear entry)

END SPECIAL KEYS

.pa
```

```
;        RAM STATE TABLE DEFINITIONS
;
;        The State Table is used to identify the keys that
;        can initiate transactions from the READY state.
;
;        NOTE:  The task list entry point is in lower case and is
;               shown UNDER the key.  The key legends are shown
;               above the key.
;
;        NOTE:  Task list entry points that end with a ## sign
;               are ROM based (e.g., calc##).  Those without
;               a ## sign are RAM based.
;
;        NOTE:  Underneath each task list entry point is the
;               next STATE that will be entered after the
;               current task has been completed.
.pa


BEGIN STATE TABLE -READY
;
;
;         A       B       C            D       E            F       G
;        VISA    CHECK                         CALC
;        +---+   +---+   +---+        +---+   +---+        +---+   +---+
;        | 1 |   | 2 |   | 3 |        |   |   |   |        |   |   |   |
;        +---+   +---+   +---+        +---+   +---+        +---+   +---+
ACTION   dfdotr  dfdotr  dfdotr       error## calc##       phone## predl
STATE    same_s## same_s## same_s##   same_s## calcst      phonest transt
;
;         H       I       J            K       L            M       N
;        MC      DINER
;        +---+   +---+   +---+        +---+   +---+        +---+   +---+
;        | 4 |   | 5 |   | 6 |        |   |   |   |        |   |   |   |
;        +---+   +---+   +---+        +---+   +---+        +---+   +---+
ACTION   dfdotr  dfdotr  dfdotr       error## error##      recall  postdl
STATE    same_s## same_s## same_s##   same_s## same_s##    ready   transt
;
;         O       P       Q            R       S            T       U
;        AMEX    CB                            CE                  ENTER
;        +---+   +---+   +---+        +---+   +---+        +---+   +---+
;        | 7 |   | 8 |   | 9 |        |   |   |   |        |   |   |   |
;        +---+   +---+   +---+        +---+   +---+        +---+   +---+
ACTION   dfdotr  dfdotr  dfdotr       error## error##      store   error##
STATE    same_s## same_s## same_s##   same_s## same_s##    ready   same_s##
;
;         V       W       X            Y       Z           Space   MODE
;        REPEAT                       SCROLL  SCROLL       HANG    ALPHA
;        DIAL                         RIGHT   LEFT         UP
;        +---+   +---+   +---+        +---+   +---+        +---+   +---+
;        | * |   | 0 |   | # |        |   |   |   |        |   |   |   |
;        +---+   +---+   +---+        +---+   +---+        +---+   +---+
ACTION   redial## error## error##     right## left##       abort## error##
```

```
STATE   phonest  same_s@@ same_s@@      same_s@@ same_s@@      same_s@@ same_s@@
;
;
;       CARDRDR     TIMEOUT     MODEM    TELCO    PINPAD
;       -------     -------     -----    -----    ------   --------  --------
ACTION  error@@     nothin@@    error@@  chkhset@@ error@@ error@@   error@@
STATE   same_s@@    same_s@@    same_s@@ same_s@@ same_s@@ same_s@@  same_s@@
;

END STATE TABLE READY
.pa



BEGIN STATE TABLE -ZAPDST
;
;
;         A        B        C              D        E              F        G
;       +---+    +---+    +---+          +---+    +---+          +---+    +---+
;       | 1 |    | 2 |    | 3 |          |   |    |   |          |   |    |   |
;       +---+    +---+    +---+          +---+    +---+          +---+    +---+
ACTION  skey@@   skey@@   skey@@         skey@@   skey@@         skey@@   skey@@
STATE   same_s@@ same_s@@ same_s@@       same_s@@ same_s@@       same_s@@ same_s@@
;
;         H        I        J              K        L              M        N
;       +---+    +---+    +---+          +---+    +---+          +---+    +---+
;       | 4 |    | 5 |    | 6 |          |   |    |   |          |   |    |   |
;       +---+    +---+    +---+          +---+    +---+          +---+    +---+
ACTION  skey@@   skey@@   skey@@         skey@@   skey@@         skey@@   skey@@
STATE   same_s@@ same_s@@ same_s@@       same_s@@ same_s@@       same_s@@ same_s@@
;
;         O        P        Q              R        S              T        U
;       +---+    +---+    +---+          +---+    +---+          +---+    +---+
;       | 7 |    | 8 |    | 9 |          |   |    |   |          |   |    |   |
;       +---+    +---+    +---+          +---+    +---+          +---+    +---+
ACTION  skey@@   skey@@   skey@@         skey@@   skey@@         skey@@   skey@@
STATE   same_s@@ same_s@@ same_s@@       same_s@@ same_s@@       same_s@@ same_s@@
;
;         V        W        X              Y        Z            Space    MODE
;       +---+    +---+    +---+          +---+    +---+          +---+    +---+
;       | * |    | 0 |    | # |          |   |    |   |          |   |    |   |
;       +---+    +---+    +---+          +---+    +---+          +---+    +---+
ACTION  skey@@   skey@@   skey@@         skey@@   skey@@         skey@@   skey@@
STATE   same_s@@ same_s@@ same_s@@       same_s@@ same_s@@       same_s@@ same_s@@
;
;
;       CARDRDR     TIMEOUT     MODEM     TELCO     PINPAD
;       -------     -------     -----     -----     ------   --------  --------
ACTION  scardi@@    stimeo@@    smodem@@  stelco@@  spinin@@ error@@   error@@
STATE   same_s@@    same_s@@    same_s@@  same_s@@  same_s@@ same_s@@  same_s@@
;

END STATE TABLE ZAPDST
```

```
.pa



BEGIN STATE TABLE -CALCST
;
;
;         A        B        C              D        E              F        G
;       +---+    +---+    +---+          +---+    +---+          +---+    +---+
;       | 1 |    | 2 |    | 3 |          |   |    |   |          |   |    |   |
;       +---+    +---+    +---+          +---+    +---+          +---+    +---+
ACTION  buildn@@ buildn@@ buildn@@       operat@@ abort@@        error@@  error@@
STATE   same_s@@ same_s@@ same_s@@       same_s@@ ready        same_s@@ same_s@@
;
;         H        I        J              K        L              M        N
;       +---+    +---+    +---+          +---+    +---+          +---+    +---+
;       | 4 |    | 5 |    | 6 |          |   |    |   |          |   |    |   |
;       +---+    +---+    +---+          +---+    +---+          +---+    +---+
ACTION  buildn@@ buildn@@ buildn@@       operat@@ error@@        error@@  error@@
STATE   same_s@@ same_s@@ same_s@@       same_s@@  same_s@@      same_s@@ same_s@@
;
;         O        P        Q              R        S              T        U
;       +---+    +---+    +---+          +---+    +---+          +---+    +---+
;       | 7 |    | 8 |    | 9 |          |   |    |   |          |   |    |   |
;       +---+    +---+    +---+          +---+    +---+          +---+    +---+
ACTION  buildn@@ buildn@@ buildn@@       operat@@ clear@@        error@@  error@@
STATE   same_s@@ same_s@@ same_s@@       same_s@@ same_s@@       same_s@@ same_s@@
;
;         V        W        X              Y        Z            Space    MODE
;       +---+    +---+    +---+          +---+    +---+          +---+    +---+
;       | * |    | 0 |    | # |          |   |    |   |          |   |    |   |
;       +---+    +---+    +---+          +---+    +---+          +---+    +---+
ACTION  error@@  buildn@@ setdec@@       operat@@ operat@@       abort@@  error@@
STATE   same_s@@ same_s@@ same_s@@       same_s@@ same_s@@       ready same_s@@
;
;
;       CARDRDR     TIMEOUT     MODEM    TELCO     PINPAD
;       -------     -------     -----    -----     ------   --------  --------
ACTION  error@@     nothin@@    error@@  hadown@@  error@@  error@@   error@@
STATE   same_s@@    same_s@@    same_s@@ same_s@@  same_s@@ same_s@@  same_s@@
;

END STATE TABLE CALCST
.pa



BEGIN STATE TABLE -PHONEST
;
;
;         A        B        C              D        E              F        G
;       +---+    +---+    +---+          +---+    +---+          +---+    +---+
;       | 1 |    | 2 |    | 3 |          |   |    |   |          |   |    |   |
```

```
;        +---+    +---+    +---+          +---+    +---+          +---+    +---+
ACTION   dialdi() dialdi() dialdi()       error()  error()        longfl() error()
STATE    same_s() same_s() same_s()       same_s() same_s()       same_s() same_s()
;
;          H        I        J              K        L              M        N
;        +---+    +---+    +---+          +---+    +---+          +---+    +---+
;        | 4 |    | 5 |    | 6 |          |   |    |   |          |   |    |   |
;        +---+    +---+    +---+          +---+    +---+          +---+    +---+
ACTION   dialdi() dialdi() dialdi()       error()  error()        domend() error()
STATE    same_s() same_s() same_s()       same_s() same_s()       memdial  same_s()
;
;          O        P        Q              R        S              T        U
;        +---+    +---+    +---+          +---+    +---+          +---+    +---+
;        | 7 |    | 8 |    | 9 |          |   |    |   |          |   |    |   |
;        +---+    +---+    +---+          +---+    +---+          +---+    +---+
ACTION   dialdi() dialdi() dialdi()       error()  error()        loadon() error()
STATE    same_s() same_s() same_s()       same_s() same_s()       same_s() same_s()
;
;          V        W        X              Y        Z            Space    MODE
;        +---+    +---+    +---+          +---+    +---+          +---+    +---+
;        | * |    | 0 |    | # |          |   |    |   |          |   |    |   |
;        +---+    +---+    +---+          +---+    +---+          +---+    +---+
ACTION   dialdi() dialdi() dialdi()       error()  error()        abort()  error()
STATE    same_s() same_s() same_s()       same_s() same_s()       ready    same_s()
;
;
;        CARDRDR     TIMEOUT     MODEM    TELCO    PINPAD
;        -------     -------     -----    -----    ------   ------   ------
ACTION   error()     nothin()    error()  hadown() error()  error()  error()
STATE    same_s()    same_s()    same_s() same_s() same_s() same_s() same_s()
;

END STATE TABLE PHONEST
.pa

BEGIN STATE TABLE -MEMDIAL
;
;
;          A        B        C              D        E              F        G
;        +---+    +---+    +---+          +---+    +---+          +---+    +---+
;        | 1 |    | 2 |    | 3 |          |   |    |   |          |   |    |   |
;        +---+    +---+    +---+          +---+    +---+          +---+    +---+
ACTION   getfir() getfir() error()        error()  error()        longfl() error()
STATE    mem2     mem2     same_s()       same_s() same_s()       phonest  same_s()
;
;          H        I        J              K        L              M        N
;        +---+    +---+    +---+          +---+    +---+          +---+    +---+
;        | 4 |    | 5 |    | 6 |          |   |    |   |          |   |    |   |
;        +---+    +---+    +---+          +---+    +---+          +---+    +---+
ACTION   error()  error()  error()        error()  error()        error()  error()
STATE    same_s() same_s() same_s()       same_s() same_s()       same_s() same_s()
;
;          O        P        Q              R        S              T        U
;        +---+    +---+    +---+          +---+    +---+          +---+    +---+
;        | 7 |    | 8 |    | 9 |          |   |    |   |          |   |    |   |
;        +---+    +---+    +---+          +---+    +---+          +---+    +---+
ACTION   error()  error()  error()        error()  error()        domend() error()
STATE    same_s() same_s() same_s()       same_s() same_s()       same_s() same_s()
;
;          V        W        X              Y        Z            Space    MODE
;        +---+    +---+    +---+          +---+    +---+          +---+    +---+
;        | * |    | 0 |    | # |          |   |    |   |          |   |    |   |
;        +---+    +---+    +---+          +---+    +---+          +---+    +---+
ACTION   error()  getfir() error()        error()  error()        abort()  error()
STATE    same_s() mem2     same_s()       same_s() same_s()       ready    same_s()
;
;
;        CARDRDR     TIMEOUT     MODEM    TELCO    PINPAD
;        -------     -------     -----    -----    ------   ------   ------
ACTION   error()     nothin()    error()  hadown() error()  error()  error()
STATE    same_s()    same_s()    same_s() same_s() same_s() same_s() same_s()
;

END STATE TABLE MEMDIAL
.pa

BEGIN STATE TABLE -MEM2
;
;
;          A        B        C              D        E              F        G
;        +---+    +---+    +---+          +---+    +---+          +---+    +---+
;        | 1 |    | 2 |    | 3 |          |   |    |   |          |   |    |   |
;        +---+    +---+    +---+          +---+    +---+          +---+    +---+
ACTION   get2di() get2di() get2di()       error()  error()        longfl() error()
STATE    phonest  phonest  phonest        same_s() same_s()       phonest  same_s()
;
;          H        I        J              K        L              M        N
;        +---+    +---+    +---+          +---+    +---+          +---+    +---+
;        | 4 |    | 5 |    | 6 |          |   |    |   |          |   |    |   |
;        +---+    +---+    +---+          +---+    +---+          +---+    +---+
ACTION   get2di() get2di() get2di()       error()  error()        error()  error()
STATE    phonest  phonest  phonest        same_s() same_s()       same_s() same_s()
;
;          O        P        Q              R        S              T        U
;        +---+    +---+    +---+          +---+    +---+          +---+    +---+
;        | 7 |    | 8 |    | 9 |          |   |    |   |          |   |    |   |
;        +---+    +---+    +---+          +---+    +---+          +---+    +---+
ACTION   get2di() get2di() get2di()       error()  error()        domend() error()
STATE    phonest  phonest  phonest        same_s() same_s()       same_s() same_s()
;
;          V        W        X              Y        Z            Space    MODE
;        +---+    +---+    +---+          +---+    +---+          +---+    +---+
;        | * |    | 0 |    | # |          |   |    |   |          |   |    |   |
;        +---+    +---+    +---+          +---+    +---+          +---+    +---+
```

```
ACTION  error() get2di() error()          error() error()         abort() error()
STATE   same_s() phonest  same_s()        same_s() same_s()       ready  same_s()
;
;
;       CARDRDR    TIMEOUT    MODEM   TELCO    PINPAD
;       -------    -------    -----   -----    ------    -------  -------
ACTION  error()    nothin()   error() hsdown() error()   error()  error()
STATE   same_s()   same_s()   same_s() same_s() same_s() same_s() same_s()
;

END STATE TABLE MEM2
.pa

BEGIN STATE TABLE -TRANST
;
;
;         A       B       C            D       E           F       G
;       +---+   +---+   +---+        +---+   +---+       +---+   +---+
;       | 1 |   | 2 |   | 3 |        |   |   |   |       |   |   |   |
;       +---+   +---+   +---+        +---+   +---+       +---+   +---+
ACTION  dotran  dotran  dotran       error() calc()      phone() multr
STATE   same_s() same_s() same_s()   same_s() calcst     phonest same_s()
;
;         H       I       J            K       L           M       N
;       +---+   +---+   +---+        +---+   +---+       +---+   +---+
;       | 4 |   | 5 |   | 6 |        |   |   |   |       |   |   |   |
;       +---+   +---+   +---+        +---+   +---+       +---+   +---+
ACTION  dotran  dotran  dotran       error() error()     recall  multr
STATE   same_s() same_s() same_s()   same_s() same_s()   ready   same_s()
;
;         O       P       Q            R       S           T       U
;       +---+   +---+   +---+        +---+   +---+       +---+   +---+
;       | 7 |   | 8 |   | 9 |        |   |   |   |       |   |   |   |
;       +---+   +---+   +---+        +---+   +---+       +---+   +---+
ACTION  dotran  dotran  dotran       error() error()     store   error()
STATE   same_s() same_s() same_s()   same_s() same_s()   ready   same_s()
;
;         V       W       X            Y       Z         Space   MODE
;       +---+   +---+   +---+        +---+   +---+       +---+   +---+
;       | * |   | 0 |   | # |        |   |   |   |       |   |   |   |
;       +---+   +---+   +---+        +---+   +---+       +---+   +---+
ACTION  redial() error() error()     left()  right()     abort() error()
STATE   same_s() same_s() same_s()   same_s() same_s()   same_s() same_s()
;
;
;       CARDRDR    TIMEOUT    MODEM   TELCO    PINPAD
;       -------    -------    -----   -----    ------    -------  -------
ACTION  error()    nothin()   error() chkhset() error()  error()  error()
STATE   same_s()   same_s()   same_s() same_s() same_s() same_s() same_s()
;

END STATE TABLE TRANST
.pa
```

```
INCLUDE C:XMITCOMM.SCM

INCLUDE C:ZNETWRK.SCM

INCLUDE C:VFIAPP.INC

INCLUDE C:VFIRCLST.INC

;              (End of Document)
```

```
;;;;;;;;;;;;;;;;;;;;;;;;;;;;;;;;;;;;;;;;;;;;;;;;;;;;;;;;;;;;;;;;;;;;;;;;;
;
;       XMITCOMM.ECM
;
;       9/3/85  -mk-    Configured for Generic ECM
;       9/30/85 -bu-    Move check for carrier lost from xmt_pak to
;                       loop in xmtcmn that checks for xmt_pak done.
;
;                       Don't send ACK from xmt_pak.  Let xmtcmn do it.
;


BEGIN JOB HANGLINE

hangline:
        ; ??? can this be replaced by set_modem 0 ???

        do_opsys        %HANGUP         0               ;hangup line
        do_opsys        %DISBL_MDM      0               ;disable modem
        do_opsys        %SETINP 2  %MODEMIN  128        ;flush modem
                                                        ;...input buffer
        return  0

END JOB HANGLINE



BEGIN JOB XMT_PAK
;
; Job to send the transmit buffer.  Transmit buffer should include
; any ETX or LRC.  Then look for ACK back from host or
; response.  If NAK, resend up to three times.  If EOT,
; disconnect and signal transaction abort.  If STX, we are
; receiving a message unexpectedly, go capture it.  Other
; characters from host are ignored.
;
;       Assumes:
;               Already connected to host via modem.  Host is
;               ready to receive data (usually means host has
;               already sent ENQ).
;       Input:
;               $transmit - data to be sent over modem.  already have
;                           STX, ETX, and LRC.
;       Output:
;               end code of current job set to 0 for success, 1 for fail
;       Uses:
;               @xtries - number of retries variable
;               @xtvalid - $transmit successfully sent (? negative logic)
;               @rchar  - character from modem
;               &timer  - time out value

xmtpak:
        set_end_code    1                       ;set failed end code
        load_byte       @xtvalid  %TRUE
        load_byte       @XTRIES  3

        ;Packet is already formatted.  Send it.
        display_clear
        display_string  'SENDING'
xmt01:
        send_fld        %MODEM  $transmit  1  0

        ;Packet is gone.  Now see if host got it.
        ;Maximum wait time is 60 seconds
xmt021: load_int        &TIMER 6000
        rcv_byte        @RCHAR  &TIMER @xmt022

        ;If we get here, we timed out without hearing anything
        ;from the host.  Display no response message and signal abort
xmt023: display_clear
        display_string  'NO RESP FR HOST'
        pause           100
        branch_goto     @xmtxit

        ;If we get here, we must have received something.  See if it
        ;is what we want to see
xmt022:
        chk_char        @RCHAR  %eq  %STX  @xmtOK       ;if STX w/o ACK
        take_input
        chk_char        @RCHAR  %eq  %ZERO  @xmt023     ; ??? why do this if
                                                        ;...NULL receive
xmt03:  chk_char        @RCHAR  %eq  %ACK  @xmtack
        chk_char        @RCHAR  %ne  %NAK  @xmt05

        ;If we got here, we received a NAK.  Try again up to 3
        chk_char        @xtvalid  %eq  %FALSE  @xmt021  ;if useless NAK
        display_clear
        dec_byte        @XTRIES  @xmt04
        display_string  'RESENDING'
        branch_goto     @xmt01

        ;If we got here, we NAKked out.  Quit.
xmt04:  display_string  'TOO MANY ERRS'
        branch_goto     @xmtxit

xmtack:
        load_byte       @xtvalid  %FALSE
        branch_goto     @xmt021                         ;wait for STX


        ;No luck so far, maybe it is an EOT?  If not, go look for
        ;another character.  If it is, display bad news and signal
        ;transaction abort.
xmt05:  chk_char        @RCHAR  %ne  %EOT  @xmt021
        display_clear
        display_string  'HOST GAVE UP'
        branch_goto     @xmtxit
```

```
xmetx:

        ;We made it!  Signal success and quit.
xmtOK:
        ;Now we wait for some kind of response from host.
        display_clear
        display_string  'RECEIVING'
        ;

        ;Receive the packet
do_rcv: ;
        init_string     $receive                ;initialize the receive buffer
        rcv_packet      $receive  4500  @do_10  ;complete packet is received
        branch_goto     @xmtxit                 ;if didn't receive any char
                                                ; for 45 seconds then jump

        ;
        ;Complete response packet is received
do_10:
        ;ACK the packet here
        send_char       %MODEM   %ACK
        ;
        ;Successful exit
        set_end_code    0
xmtxit:
        done

END JOB XMT_PAK
```

```
BEGIN COMMENT

        7/24/85 -mk- added tymnet, telenet, geisco, uninet.
                     now it takes care of alternate host too.

        9/30/85 -bu- modify for generic vfi software.
                        in uninet login, change use of user2buf to
                        user4buf.
                        eliminate use of mathbuf, supbuf, user3buf
                        by using new instruction, calc_byte.
        11/18/85 -bu- All logins were using F_PROSP to get login
                        specifier.  Changed to F_LOGSP.
                      Compuserve login was not taking input after
                        getting '?' or after getting char following
                        '?'.
                      Switched codes for compuserve and tymnet to match
                        generic ZON.
                      logins were not taking modem input after rcv_byte
                        causing much error beeping.
        11/12/85 -BU- Disable handset during transaction.


        This ZAPD module contains the following logon procedures:

            Protocol Type       Protocol Specifier
            _____________       __________________

            No Logon                    0
            Tymnet                      1
            Compuserve                  2
            Uninet                      3
            Telenet                     4
            Geisco                      5

        Following are the steps which ZNETWRK follows:

        1, Get the Phone number depending upon the values of variable
           $hostnum and constant %PH/HOST (phone numbers per host).

        2, Also takes care of the alternate phone number (and also
           host) depending upon the flag $altflag.

        3, Check the type of Logon asked, jump to the respective logon
           scode.

        4, When finished Logon, it looks for ENQ and when find it
           returns with successful code 0.

        5, Following is the calling sequence:

        ;start the logon job
        load_byte       $hostnum  1                     ;primary host number
        load_byte       $altflag  %FALSE                ;first try primary host
        load_byte       $LGTRY    2                     ;try primary host twice
        start_job       %GET_HOST @dialog               ;start the dialling job
        ;

END COMMENT

BEGIN COMMENT
*****************************************************************************

 get_host - job to connect to a host computer

        Takes care of retrying and switching to alternate host if necessary.
        Once the connection is made, carrier is monitored.  If carrier is
        lost, this job will try to reconnect with the host.  This job only
        terminates when it has exhausted all retrys on both primary and
        alternate hosts.

        Input:
                $lgtry   - numbers of time to try primary host.  alternate
                           always tried once.
        Output:
                end code - 0 not connected yet, 1 connected
        Uses:
                $altflag - flag that tells whether on primary or alternate
                           host.  0 = primary, 1 = alternate
                $user4buf - message buffer for safedsp routine
                job 3 - check for carrier
                job 4 - dialog

*****************************************************************************
END COMMENT

BEGIN JOB GET_HOST

get_host:
        set_hset        %HSETOFF

        init_byte       $altflag
        load_byte       $fonefil %F_PHNM
        load_byte       $protfil %F_PROSP
        load_byte       $logofil %F_LOGSP

geth00:
        start_job       3 @chkcar       ;checks for carrier loss
        start_job       4 @dialog       ;does one attempt at dialing/logon
geth05:
        chk_job_done    3 @commerr      ;jump if lost carrier
        chk_job_done    4 @geth10       ;jump if job done
        wait_jump       @geth05

geth10:
        chk_end_code    4 %NE 0 @commerr        ;jump if connection not made

        ;
```

```
        ; connection made to host
        ;
geth20:
        chk_job_done    3 @commerr      ;jump if lost carrier
        chk_char        $xmitrdy %NE 0 @geth30
        wait_jump       @geth20
        ;
        ; $transmit buffer ready to send
        ;
geth30:
        start_job       7 @xmtpak
geth40:
        chk_job_done    3 @commerr
        chk_job_done    7 @geth50
        wait_jump       @geth40
geth50:
        chk_end_code    7 %NE 0 @commerr
        init_byte       $xmitrdy
        load_byte       $rspvalid 1
        wait_jump       @geth20

        ;
        ; did not make connection for some reason
        ;
commerr:
        stop_job        3               ;kill carrier loss job
        stop_job        4               ;kill dial/logon job

        call            @hangline 0
        pause           100
        chk_char        $altflag  %eq  %TRUE  @geth95   ;alternate host?
        ;
        ; see if should try primary host again.
        ;
        dec_byte        $LGTRY  @geth90         ;change to alternate host?
        load_string     $user4buf 'RETRYING HOST'
        call            @safedsp 1 $user4buf
        branch_goto     @geth00

        ;
        ; set up for a pass at an alternate host, if any
        ;
geth90:
        load_byte       $altflag   %TRUE
        load_byte       $LGTRY  3               ;try twice
        load_byte       $fonefil %F_SECPH
        load_byte       $protfil %F_APRSP
        load_byte       $logsfil %F_ALGSP

        ;
        ; if alternate merchant ID not empty then
        ;    replace merchant ID in buffer with alternate
        ;
        get_record      $int2buf %F_ALMID $hostnum
        chk_length      $int2buf %LE 1 @geth95
        delete_fld      $transmit 2 $midlen
        insrt_fld       $transmit 2 $int2buf 1 0
        ;
        ; see if should try alternate host again.
        ;
geth95:
        dec_byte        $LGTRY  @geth99
        load_string     $user4buf 'RETRYING ALT HOST'
        call            @safedsp 1 $user4buf
        branch_goto     @geth00

geth99:
        halt


;;;;;;;;;;;;;;;;;;;;;;;;;;;;;;;;;;;;;;;;;;;;;;;;;;;;;;;;;;;;;;;;;;;;;;;;;;;;
;
; subroutine that displays a string only if data entry is done.
;
;       call            safedsp 1 $buffer
;
safedsp:
        chk_char        $datain %EQ 0 @saf90
        display_clear
        display_string  ^$1
saf90:
        return          1


END JOB GET_HOST

; ************************************************************************
;
; check for carrier loss.
;       the job will terminate only when carrier is lost.
;       if carrier is not present when the job is started, it will
;       wait for carrier.
;
;       Input:
;               $CDSTAT - system variable that reflects modem carrier status
;                         0 = no carrier, 1 = carrier
;                         ZAPD exec automatically updates CDSTAT whenever
;                         TELCO device reports carrier on or off.
;
;       Output:
;               job status - use "chk_job_done" to find out whether or not
;                            this job is still running.  Job stops when
;                            carrier is lost.
;
BEGIN JOB CHKCAR

chkcar:
        need_input      %TELCO
chkc10:
```

```
        chk_char        $CDSTAT %EQ 0 @chkc20
        wait_jump       @chkc10
chkc20:
        wait
        chk_char        $CDSTAT %NE 0 @chkc20

        need_input      0
        done

END JOB CHKCAR

; **********************************************************************
;
; dialog - connect with host including dialing, logging on, waiting for ENQ.
;
;       Input:
;
;
;
BEGIN JOB DIALOG

dialog:
        set_end_code    1               ;init end code to no-host-connection

com002: call            @getline   1   $datain
        set_spkr        %ON

        load_string     $user4buf 'DIALING'
        call            @safedsp 1 $user4buf
        get_record      $user4buf  $fonefil $hostnum
        do_dial         $user4buf  @gh0a
        branch_goto     @gh80
gh0a:
        chk_dial_done   @gh0b                   ;jump if dialing finished
        wait_jump       @gh0a

        ;Arrival here means we successfully dialed.
        ;Now let's see if we get a carrier
gh0b:   call            @get_car  1  3000       ;wait for 30 seconds
        chk_char        $CDSTAT  %eq  0  @gh20  ;jump if no carrier

        ;Now we have carrier.  Let's see who we are talking to
        ;If the record contains a '0', then we are doing direct
        ;dial.  If it is non zero then we will do corresponding
        ;logon.

gh0c:   get_record      $user4buf  $protfil $hostnum    ;protocol spec
        ;

gh0d:   cnvrt_str2b     $protspc   %unsigned   $user4buf
        chk_char        $protspc   %eq  %ZERO   @enq01  ;look for ENQ
        chk_char        $protspc   %eq  %ONE    @tymnet
        chk_char        $protspc   %eq  %TWO    @cmpsrv
        chk_char        $protspc   %eq  %THREE  @uninet
        chk_char        $protspc   %eq  %FOUR   @telenet
        chk_char        $protspc   %eq  %FIVE   @geisco
        branch_goto     @enq01                          ;look for ENQ

        ;######################## GEISCO LOGON ########################
        ;
geisco: pause   150                     ;give a little time to settle down
        ;

ge01:   ;Now send four 'H's out after every small delay of 500ms
        send_char       %MODEM  %H
        pause           50
        send_char       %MODEM  %H
        pause           50
        send_char       %MODEM  %H
        pause           50
        send_char       %MODEM  %H
        pause           50
        ;

        ;now wait for '=' sign for 15 seconds and will look only 60 chars
        load_byte       $usr4var  60            ;look for only 60 chars
ge02:
        rcv_byte        $RCHAR  1500  @ge03     ;jump if char received
        branch_goto     @gh22                   ;No response from network

        ;We have a character.  We are interested only in '='.
        ;From now on, we only allow a 2 second intercharacter timeout
ge03:   chk_char        $RCHAR  %eq  %EQUAL  @ge04
        load_int        $TIMER  200
        dec_byte        $usr4var  @gh11         ;Network is acting funny
        wait_jump       @ge02

        ;we got  the good response for GEISCO and now we can send username
        ; and password
ge04:
        take_input
        ;first get the logon specifier
        get_record      $user4buf  $logsfil $hostnum
        cnvrt_str2b     $usr4var   1    $user4buf       ;get logon specifier

        ;send the username and password
        get_record      $user4buf  %F_LOGNM  $usr4var   ;get the logon name
        send_fld        %MODEM  $user4buf  1  0         ;send user name
        send_char       %MODEM  %COMMA                  ;send ','
        get_record      $user4buf  %F_LOGPS  $usr4var   ;get the password
        send_fld        %MODEM  $user4buf  1  0         ;send the password
        send_char       %MODEM  %COMMA                  ;send ','
        send_char       %MODEM  %COMMA                  ;send ','
        send_char       %MODEM  %CR                     ;send Carriage Return
        ;
        ;Now we look for ENQ
```

```
        branch_goto     @enq01                          ;jump to look for ENQ


        ;$$$$$$$$$$$$$$$$$$$$$$$$ UNINET LOGON $$$$$$$$$$$$$$$$$$$$$$$$$$
        ;
uninet:: ;
        ;now wait for '?' sign for 5 seconds and will look only 30 chars
        load_int        &TIMER    500           ;wait for 5 seconds only
un001:
        rcv_byte        $RCHAR   &TIMER  @un002
        branch_goto     @un03                   ;jump even no char received

        ;We have a character.  We are interested only in '?'
        ;From now on, we only allow a 2 second intercharacter timeout
un002:  take_input
        chk_char        $RCHAR  %eq  %QMARK  @un03      ;check if '?'
        wait_jump       @un001

;       ;now wait for ANY char for 20 seconds
;un01:  chk_char        $CDSTAT  %eq  0  @gh21  ;jump if CARRIER LOST
;       rcv_byte        $RCHAR  2000  @un03     ;jump if any char received
;       branch_goto     @gh22                   ;No response from network
;
        ;We have a character.
un03:   ;wait for ONE second
        pause           100
        ;
        ;Now send char CR, '.' and CR
        send_char       %MODEM  %CR
        pause           50
        send_char       %MODEM  %PERIOD
        pause           50
        send_char       %MODEM  %CR
        ;

        ;now wait for ':' sign for 15 seconds and will look only 120 chars
        load_byte       $usrivar  120           ;look for only 120 chars
        load_int        &TIMER  1500
un04:
        rcv_byte        $RCHAR  &TIMER  @un05
        branch_goto     @un13                   ;jump if didn't see ':'

        ;We have a character.  We are interested only in ':'
un05:   take_input
        chk_char        $RCHAR  %eq  %COLON  @un13
        dec_byte        $usrivar  @gh11         ;Network is acting funny
        wait_jump       @un04

        ;send the command to turn off the echo
un13:   send_strcon     %MODEM  'SET2:0'
        pause           20
        send_char       %MODEM  %CR
```

```
        ;now wait for ':' sign for 10 seconds and will look only 120 chars
        load_byte       $usrivar  120           ;look for only 120 chars
        load_int        &TIMER  1000
un14:
        rcv_byte        $RCHAR  &TIMER  @un15
        branch_goto     @un06                   ;jump even it didn't see ':'

        ;We have a character.  We are interested only in ':'
un15:   take_input
        chk_char        $RCHAR  %eq  %COLON  @un06
        dec_byte        $usrivar  @gh11         ;Network is acting funny
        wait_jump       @un14

        ;we got the good response from UNINET and now we can send the username
un06:
        ;first get the logon specifier
        get_record      $user4buf  $logefil $hostnum
        cnvrt_str2b     $usrivar   1    $user4buf       ;get logon specifier

        ;send the username and password
        get_record      $user4buf  %F_LOGNM  $usrivar   ;get the logon name
        send_fld        %MODEM  $user4buf  1  0         ;send user name
        send_char       %MODEM  %CR                     ;send Carriage Return
        ;
        ;Now we look for ENQ
        branch_goto     @enq01                          ;jump to look for ENQ



        ;$$$$$$$$$$$$$$$$$$$$$$$$ TELENET LOGON $$$$$$$$$$$$$$$$$$$$$$$$$$
        ;
telenet:
        pause   150                     ;Wait for ONE second
        ;

te01:   ;Now send three CRs out after every small delay of 250ms
        send_char       %MODEM  %CR
        pause           50
        send_char       %MODEM  %CR
        pause           50
        send_char       %MODEM  %CR
        pause           50
        ;

        ;now wait for '@' sign for 10 seconds and will look only 60 chars
        load_byte       $usr4var  60            ;look for only 60 chars
te02:
        rcv_byte        $RCHAR  1000  @te03
        branch_goto     @gh22                   ;NO RESPONSE FROM NETWORK

        ;We have a character.  We are interested only in '@'
        ;From now on, we only allow a 2 second intercharacter timeout
```

```
te03:   take_input
        chk_char        $RCHAR  %eq  %AT  @te04
        load_int        &TIMER  200
        dec_byte        $usr4var  @gh11         ;Network is acting funny
        wait_jump       @te02

        ;we got the good response from TELENET and now we can send username
te04:
        ;first get the logon specifier
        get_record      $user4buf  #logsfil #hostnum
        cnvrt_str2b     $usr4var   1    $user4buf        ;get logon specifier

        ;send the username
        send_char       %MODEM  %C_CHAR                  ;send C
        send_char       %MODEM  %SPACE                   ;send space
        get_record      $user4buf  %F_LOGNM  $usr4var    ;get the logon name
        send_fld        %MODEM  $user4buf  1  0          ;send user name
        send_char       %MODEM  %CR                      ;send Carriage Return
        ;
        ;Now we look for ENQ
        branch_goto     @enq01                           ;jump to look for ENQ


        ;######################## TYMNET LOGON ##########################
        ;
tymnet: pause   150                                      ;WAIT for ONE second
        ;

        ;now wait for CR sign for 20 seconds and will look only 250 chars
        load_byte       $usr4var  250           ;look for only 250 chars
ty01:
        rcv_byte        $RCHAR  2000  @ty02
        branch_goto     @gh22                   ;No response from network

        ;We have a character.  We are interested only in CR
        ;From now on, we only allow a 2 second intercharacter timeout
ty02:   take_input
        chk_char        $RCHAR  %eq  %CR  @ty03
        load_int        &TIMER  200
        dec_byte        $usr4var  @gh11         ;Network is acting funny
        wait_jump       @ty01

ty03:   ;Now send char 'T's out
        send_char       %MODEM  %T_CHAR
        pause           50
        ;

        ;now wait for ':' sign for 10 seconds and will look only 250 chars
        load_byte       $usr4var  250           ;look for only 250 chars
        load_int        &TIMER  1000            ;wait ':' sign  for 10 seconds
ty04:
        rcv_byte        $RCHAR  &TIMER  @ty05
        branch_goto     @gh22                   ;No response from network

        ;We have a character.  We are interested only in ':'
        ;From now on, we only allow a 2 second intercharacter timeout
ty05:   take_input
        chk_char        $RCHAR  %eq  %COLON  @ty06
        load_int        &TIMER  200
        dec_byte        $usr4var  @gh11         ;Network is acting funny
        wait_jump       @ty04

        ;we got the good response for TYMNET and now we can send username
        ; and password
ty06:
        ;first get the logon specifier
        get_record      $user4buf  #logsfil #hostnum
        cnvrt_str2b     $usr4var   1    $user4buf        ;get logon specifier

        ;send the username and password
        get_record      $user4buf  %F_LOGNM  $usr4var    ;get the logon name
        send_char       %MODEM  %CNTLH                   ;send CNTL/H
        send_fld        %MODEM  $user4buf  1  0          ;send user name
        send_char       %MODEM  %SEMICOL                 ;send ';'
        get_record      $user4buf  %F_LOGPS  $usr4var    ;get the password
        send_fld        %MODEM  $user4buf  1  0          ;send the password
        send_char       %MODEM  %SEMICOL                 ;send ';'
        send_char       %MODEM  %CR                      ;send Carriage Return
        ;
        ;Now we look for ENQ
        branch_goto     @enq01                           ;jump to look for ENQ


        ;####################### COMPUSERVE LOGON #####################
        ;
cmpsrv: pause           200

gh01:   ;Now we send a CR and wait for Compuserve to say something
        ;We will wait for 20 seconds for the firse character.
        ;If we don't hear anything, we give up.
        send_char       %MODEM  %CR
        load_byte       $usr4var  30                     ;look for 30 char
gh02:
        rcv_byte        $RCHAR  2000  @gh03
        branch_goto     @gh22

        ;We have a character.  We are interested only in ':'
        ;From now on, we only allow a 2 second intercharacter timeout
gh03:   take_input
        chk_char        $RCHAR  %eq  %COLON  @gh04
        load_int        &TIMER  200
        dec_byte        $usr4var  @gh11         ;network acting funny
        wait_jump       @gh02

        ;We are now talking to Compuserve.  Send Host Name and see
        ;if they like it.
gh04:
```

```
        ;first get the logon specifier
        get_record      $user4buf  #logsfil #hostnum
        cnvrt_str2b     #usr4var   1    $user4buf       ;get logon specifier
        get_record      $user4buf  %F_LOGNM  #usr4var   ;get the logon name
        send_char       %MODEM  39                      ;send '
        send_fld        %MODEM  $user4buf  1  0         ;send logon name
        send_char       %MODEM  %CR                     ;send Carriage Return
        ;

        ;We sent the Host Name.  Now fall through to look for ENQ
gh05:   load_byte       #usr4var  60                    ;only look for 60 char
gh51:
        rcv_byte        #RCHAR  1500  @gh06
        branch_goto     @gh23                           ;NO ENQ

        ;We have a character.  We are now interested in ENQ or '?'
        ;From now on, we only allow a 2 second intercharacter timeout
gh06:   take_input
        chk_char        #RCHAR  %eq  %ENQ  @ghOK
        chk_char        #RCHAR  %eq  %QMARK  @gh07
        load_int        &TIMER  200
        dec_byte        #usr4var  @gh11                 ;network acting funny
        wait_jump       @gh51

gh07:   ;If we get here, we have a Compuserve problem.  Analyze it
        ;and see if there is something we can do.
        ;We are now interested in seeing '*','-',' ', or '?'
        load_int        &TIMER  1000
gh71:
        rcv_byte        #RCHAR  &TIMER  @gh08
        branch_goto     @gh21

        ;We have a character.  We are now interested in ENQ or '?'
        ;From now on, we only allow a 2 second intercharacter timeout
gh08:   take_input
        chk_char        #RCHAR  %eq  %AST  @gh09
        chk_char        #RCHAR  %eq  %DASH  @gh10
        chk_char        #RCHAR  %eq  %BLANK  @gh11
        chk_char        #RCHAR  %eq  %QMARK  @gh11
        load_int        &TIMER  200
        wait_jump       @gh71

gh09:   ;We got an asterisk.  This means all ports are busy.  Set end
        ;code for a 1 to let main process know it can try again,
        ;display "NETWORK BUSY", and quit
        set_end_code    1
        load_string     $user4buf  'NETWORK BUSY'
        branch_goto     @do_disp

gh10:   ;We got a dash.  This means the network cannot find the
        ;host.  Set end code for a 2 to let main process know to
        ;call an alternate or quit, display "NETWORK BUSY", and quit
        set_end_code    2
        load_string     $user4buf  'HOST COMPTR BUSY'
        branch_goto     @do_disp

gh11:   ;We got a blank or a question mark.  These mean that there
        ;is a network problem.  Set end code for a 2 to let main
        ;process know to call an alternate or quit, display
        ;"NETWORK PROBLEM" and quit
        set_end_code    2
        load_string     $user4buf  'NETWORK PROBLEM'
        branch_goto     @do_disp

gh20:   ;We never got a carrier.  Set end code for a 2 to let main
        ;process know to call an alternate or quit, display
        ;"NO CARRIER" and quit
        set_end_code    2
        load_string     $user4buf  'NO CARRIER'
        branch_goto     @do_disp

gh21:   ;We lost carrier.  Set end code for a 2 to let main process
        ;know to call an alternate or quit, display "LOST CARRIER"
        ;and quit
        set_end_code    2
        load_string     $user4buf  'LOST CARRIER'
        branch_goto     @do_disp

gh22:   ;If No Response.  Set end code for a 2 to let main process
        ;know to call an alternate or quit, display "NO RESP/F NETWRK"
        ;and quit
        set_end_code    2
        load_string     $user4buf  'NO RESP/F NETWRK'
        branch_goto     @do_disp

gh23:   ;If No ENQ from Host.  Set end code for a 2 to let main process
        ;know to call an alternate or quit, display "NO ENQ FROM HOST"
        ;and quit
        set_end_code    2
        load_string     $user4buf  'NO ENQ FROM HOST'
        branch_goto     @do_disp

gh80:   ;Dialling was unsuccessful as phone number string was null.
        ;"NO PHONE NUMB" and quit
        set_end_code    2
        load_byte       #LGTRY  1               ;no more try
        load_string     $user4buf  'NO PHONE NUMBER'
        branch_goto     @do_disp

        ;---------------------------------------------------------
        ;Display the message only if Data entry is not active
do_disp:;
        call            @safedsp 1 $user4buf
        branch_goto     @ghdone

        ;##################### LOOK FOR ENQ ONLY ##################
```

```
        ;We sent the Host Name.  Now fall through to look for ENQ
enq01:  load_byte       @usr4var  60
        load_int        &TIMER    3000                  ;
enq02:
        rcv_byte        @RCHAR  &TIMER  @enq03          ;wait for 30 sec
        branch_goto     @gh23

        ;We have a character.  We are now interested in ENQ
        ;From now on, we only allow a 2 second intercharacter timeout
enq03:  take_input
        chk_char        @RCHAR  %eq  %ENQ  @ghOK
        dec_byte        @usr4var  @gh23
        wait_jump       @gh51
        ;


        ;@@@@@@@@@@@@@@@@@@@@@ EVERY THING WENT OK @@@@@@@@@@@@@@@@@
ghOK:   ;Egad!  We are logged on and have communication with the
        ;host.  Press on.
        take_input
        set_end_code    0
        done

ghdone: ;Common exit from GET_HOST error conditions.
        err_beep
        pause   100                     ;pause to display message
        done

END JOB DIALOG
.pa

; ***********************************************************************
;
; get_car - subroutine that waits for modem carrier to go on.
;
; It can be called any time the application
; needs to monitor carrier status.  Stack position one
; must contain the timer value governing how long GET_CAR
; will wait for carrier.  This value should be fairly high.
;
BEGIN JOB GET_CAR

get_car:
        set_modem       %ORIG
        set_timeout     ^01
        need_input      %TELTIM
gc00:
        wait
        chk_inarce      %TELCO  @gc01
        chk_timeout     @gc02
        branch_goto     @gc00
gc01:
        chk_char        @CDSTAT  %eq 0  @gc00
gc02:
        take_input
        return          1

END JOB GET_CAR
.pa

; ***********************************************************************
;
; getline - subroutine to get the phone line.
;
;       Input:
;               ^01 - flag that tells whether to display the
;                     "WAIT-LINE IN USE" message.
;       Output:
;               does not return until line is free
;       Uses:
;               &randval - random time interval
;
BEGIN JOB GETLINE
getline:
        ;look for the phone line
        chk_telco_rdy   @gotline

        ;Didn't get the line, check whether to put up a message
        ;parm 1 == 0 => no message; par 1 == 1 => display msg
        chk_char        ^01    %eq    %FALSE  @wtline
        display_clear
        display_string 'WAIT-LINE IN USE'
        ;

wtline:
        ;
        ; wait for some time between 1.00 to 2.27 seconds before testing
        ;       the line again.
        ;
        init_int        &randval                ;make sure top 8 bits are zero
        move_random2b   @randval                ;value is 0..127 in low 8 bits
        calc_int        &randval &randval %ADD 100
        pause           &randval
        branch_goto     @getline
        ;

gotline:
        ;got the line, now pause 2 seconds for dial tone
        pause           200
        return          1               ;got the line finally

END JOB GET_LINE
```

```
BEGIN JOB -INIT FIRSTJOB
;
; This job runs only on unit power up
;

        display_clear
        display_string  'VFI ZON X26.5 ~20'
        set_mode        1
        init_byte       @unlokt

        call            @ppause 2 200 %KEYCRDTIM
        do_action       %CHK_MSET
        halt

END JOB INIT


BEGIN JOB -PREDL
;
; set pre-dial mode for next transaction
;

        load_byte       @predial %TRUE

        display_clear
        display_string  'PRE-DIAL'

predl0:
        load_byte       @multi_ 0               ;not multi-trans mode
        done

END JOB PREDL


BEGIN JOB -POSTDL
;
; set post-dial mode for next transaction
;

        load_byte       @predial %FALSE

        display_clear
        display_string  'POST-DIAL'
        branch_goto     @predl0

END JOB POSTDL


BEGIN JOB -MULTR
;
; set multiple transaction mode
;

        load_byte       @multi_ 2

        display_clear
        display_string  'MULTI-TRANS'
        done

END JOB MULTR


BEGIN JOB -DFDOTR
;
; start in READY state by pressing host key.  set predial from
;       default dial type file F_DFDL.
;
        calc_byte       @hostnum @mchar %SUB %ZERO_CHAR
        get_record      $brntbl %F_DFDL @hostnum
        cnvrt_str2b     @i %UNSIGNED $brntbl

        ;
        ; if flag == 0 then
        ;       predial = 1
        ; else
        ;       predial = 0
        ;
        init_byte       @predial
        chk_char        @i %NE 0 @dot00
        inc_byte        @predial
        branch_goto     @dot00

END JOB DFDOTR


;;;;;;;;;;;;;;;;;;;;;;;;;;;;;;;;;;;;;;;;;;;;;;;;;;;;;;;;;;;;;;;;;;;;;;;;;;;;;;;;
;
; do a transaction
;
;       input variables
;       ---------------
;
;       @mchar is the selected host ('1'..'9').  @hostnum is used to
;               save the binary value.
;       @multi_ tells whether to do a single or multiple transactions
;       @predial tells whether to pre or post dial
;
;       job hierarchy
;       -------------
;
;       0     dotran
;       1       chkhangup
;       2       get_host
;       3           chkcar
;       4           dialog
;       5       bld_xmit
;       6       xmtpak
;
```

```
BEGIN JOB -DOTRAN

        calc_byte       @hostnum @mchar %SUB %ZERO_CHAR
dot00:
        ; reset store enable.  password must be entered again
        ; to enable storing to memory.
        init_byte       @unlokt

        init_byte       @xmitrdy        ;packet not built yet
        init_byte       @rspvalid       ;no response from host yet
        load_byte       @lgtry 3        ;try primary host up to 3 times
        ;
        ; start job that checks for HANGUP/RESET/CANCEL key
        ;
        start_job       1 @chk_hangup

        ;
        ; start dialing/logon job if pre-dial is true
        ;
        chk_char        @predial %EQ %FALSE @dot10
        start_job       2 @get_host
dot10:
        ;
        ; build $transmit buffer from data entry
        ;
        start_job       5 @bld_xmit
dot20:
        chk_job_done    5 @dot30
        wait_jump       @dot20
dot30:
        chk_char        @predial %EQ %TRUE @dot35
        ;
        ; start dialing/logon job if pre-dial is false (i.e. post-dial)
        ;
        start_job       2 @get_host

dot35:
        start_job       5 @ignkey       ;ignore keyboard (job 1 takes care of
                                        ;... HANGUP key)
dot40:
        ;
        ; wait for get_host to send packet and get response
        ;
        chk_char        @rspvalid %NE 0 @dot50
        wait_jump       @dot40
dot50:
        stop_job        5
        init_byte       @rspvalid       ;indicate that the response has been
                                        ;...taken.
        call            @anarsp 0
        ;
        ; if multi-trans then wait for ENTER key so user can read display then
        ;       go build another buffer
        ;
        chk_char        @multi_ %EQ 0 @dot99    ;all done if single trans.

        stop_job        1               ;temprorarily kill chk_hangup job so
        start_job       5 @viewdisp     ;... viewdisp can take care of it.
        waitfor_job     00100000b
        start_job       1 @chk_hangup

        start_job       5 @bld_xmit     ;another round of data entry
dot60:
        chk_job_done    5 @dot70
        wait_jump       @dot60
dot70:
        branch_goto     @dot40          ;go back to wait for get_host to
                                        ;...send it and get response.
dot99:
        halt


;;;;;;;;;;;;;;;;;;;;;;;;;;;;;;;;;;;;;;;;;;;;;;;;;;;;;;;;;;;;;;;;;;;;;;;;;;;
;
; ignkey - ignore keyboard
;
;       This job never terminates by itself.
;
ignkey:
        need_input      %KEYBD
ignk10:
        chk_inserc      %KEYBD @ignk20
        wait_jump       @ignk10
ignk20:
        take_input
        err_beep
        wait_jump       @ignk10


;;;;;;;;;;;;;;;;;;;;;;;;;;;;;;;;;;;;;;;;;;;;;;;;;;;;;;;;;;;;;;;;;;;;;;;;;;;
;
; viewdisp - job to allow user to scroll display then press enter to
;               continue
;
viewdisp:
        need_input      %KEYBD
vewd10:
        chk_inserc      %KEYBD @vewd20
        wait_jump       @vewd10
vewd20:
        take_input
        chk_char        @mchar %EQ 35 @vewd30           ; '#'
        chk_char        @mchar %EQ 61 @vewd40           ; '='
        chk_char        @mchar %EQ %HANGUPKEY @vewd50
        chk_char        @mchar %EQ %ENTERKEY @vewd90
        err_beep
        wait_jump       @vewd10
vewd30:
```

```
        do_action       %SCRLLEFT
        wait_jump       @vewd10
vewd40:
        do_action       %SCRLRIGHT
        wait_jump       @vewd10
vewd50:
        ;
        ; don't wipe out last response message on screen.
        ;
        halt
vewd90:
        need_input      0
        done


;;;;;;;;;;;;;;;;;;;;;;;;;;;;;;;;;;;;;;;;;;;;;;;;;;;;;;;;;;;;;;;;;;;;;;;;;;
;
; anarsp - subroutine to analyze response from host.
;
;       This is for non-data capture applications so
;       just display everything in $receive except STX, ETX, LRC.
;
anarsp:
        ;
        ; save copy of $receive so user may look at it later
        ;
        put_record      %F_RECV 01 $receive

        ;
        ; $receive has ETX LRC at end so delete them
        ;
        get_length      #i $receive
        calc_byte       #i #i %SUB 2
        delete_fld      $receive #i 0

        display_clear
        display_fld     $receive 2 0    ;start display at 2nd char to skip STX
        return          0


;;;;;;;;;;;;;;;;;;;;;;;;;;;;;;;;;;;;;;;;;;;;;;;;;;;;;;;;;;;;;;;;;;;;;;;;;;
;
; bld_xmit - job to build transmit buffer from user input
;
bld_xmit:
        init_byte       #datain                 ;data entry is occurring.
                                                ;get_host must suppress
                                                ;status messages.
        ;
        ; check for a valid control string specifier and control string
        ;
        get_record      $brntbl %F_CTLSP #hostnum
        cnvrt_str2b     #i %unsigned $brntbl
        chk_char        #i %EQ 0 @bldx90
        get_record      $transmit %F_CNSTR #i
        chk_length      $transmit %EQ 1 @bldx92
        ;
        ; have a non-empty control string.  now init the transmit buffer
        ;       with <STX> merchant id.  start getting data from user
        ;
        load_string     $transmit '^02'
        cat_record      $transmit %F_MRID #hostnum
        get_length      #midlen $transmit
        calc_byte       #midlen #midlen %SUB 2
        do_bld_string   $transmit #i %ZDE

        display_clear
        display_string  'PROCESSING'

        cat_char        $transmit %ETX
        cat_lrc         $transmit 2 %LRC
        put_record      %F_XMIT 01 $transmit    ;save so user can recall later.
        load_record     %F_RECV 01 ''           ;wipe out previous receive
                                                ;... buffer to avoid confusion.

        load_byte       #xmitrdy 1              ;get_host is checking this
                                                ;...var to see when the
                                                ;...transmit buffer is ready.

        load_byte       #datain 1               ;data entry done.  allow status
                                                ;...messages.  get_host
                                                ;...checks this
                                                ;...to see if it can display
                                                ;....status messages
        ;
        ; transmit buffer is ready to go.
        ;
        done


        ;------------------------------------------------------------
        ;
        ; FATAL ERROR EXITS
        ;

        ;
        ; no control string specifier
        ;
bldx90:
        display_clear
        display_string  'NO CTRL STR SPC'
        halt

        ;
        ; no control string
        ;
bldx92:
        display_clear
```

```
        display_string  'NO CONTROL STRNG'
        halt

END JOB DOTRAN

BEGIN JOB GENROU
;;;;;;;;;;;;;;;;;;;;;;;;;;;;;;;;;;;;;;;;;;;;;;;;;;;;;;;;;;;;;;;;;;;
;
; ppause - preemptable pause
;
;       call    @ppause 2 ^$1 ^$2
;
;               ^$1 = time to pause in ticks.
;               ^$2 = bit map of input devices that can terminate pause.
;                       (assembler does not allow a variable/parameter
;                       on the chk_inrce instruction)
;
;       example:
;               call    @ppause 2 300 %KEYCRDTIM
;
;               Wait for either keyboard or cardreader input
;               for up to 3 seconds.  If input does arrive before the
;               time out expires, the routine returns leaving the input
;               available for processing.
;
ppause::
        set_timeout     ^$1
        need_input      ^$2

ppau10:
        chk_inrce       %KEYCRDTIM @ppau90      ;should be ^$2 but
                                                ;zapa200S does not generate
                                                ;the correct code.
        wait_jump       @ppau10

ppau90:
        need_input      0
        return          2

END JOB GENROU
```

```
BEGIN JOB -RECALL

        ; Start job to check for hangup.
        start_job       1 @chk_hangup

        ; Start job to get file/record and do the recall.
        start_job       2 @do_rcl
waitrcl:
        waitfor_job     00000100B
;       chk_job_done    2 @rcldone
;       wait_jump       @waitrcl
;rcldone:
        done

END JOB RECALL


BEGIN JOB -STORE

        take_input
        ; Check that memory is unlocked.
        chk_memlok      @sto01

        ; Memory is locked - can't store.
        display_string  @MEMLKEDMSG@@
        done

sto01:
        ; Start job to check for hangup.
        start_job       1 @chk_hangup
        chk_char        @unlokt %NE 0 @sto20
        err_beep
sto05:
        start_job       2 @getpass
        waitfor_job     00000100b
        comp_strcon     $destr 1 %EQ 'ZOMVF1' @sto10
        display_clear
        display_string  'WRONG PASSWORD'
        err_beep
        call            @ppause 2 150 %KEYCRDTIM
        branch_goto     @sto05
sto10:
        inc_byte        @unlokt
sto20:
        ; Start job to get file/record and do the STORE.
        start_job       2 @do_str
waitstr:
        waitfor_job     00000100B
;       chk_job_done    2 @strdone
;       wait_jump       @waitstr
;strdone:
        do_action       %CHK_MSET
        halt
```

```
;;;;;;;;;;;;;;;;;;;;;;;;;;;;;;;;;;;;;;;;;;;;;;;;;;;;;;;;;;;;;;;;;;;;;;;;;
;
; getpass - job to get password
;
getpass:
        display_clear
        display_string  'ENTER PASSWORD'
        set_edit        @igetpas
        load_byte       @cls_ %TRUE
        do_data_entry
        done

END JOB STORE

BEGIN JOB ROMENTRIES
chk_hangup:
        branch_rom      @jckhang@@

do_str:
        branch_rom      @jdostr@@

do_rcl:
        branch_rom      @jdorcl@@

END JOB ROMENTRIES
```

```
;       A000MEM.MAC = Initialization for fixed RAM tables in A000 area
;       6/6/85  - cwr - create from A000MEM v. 6
;       6/7/85  - cwr - 7| finish adding file defs,etc.
;       6/7/85  - cwr - 8| add inpatt def'n, implicit buff ptrs, etc.
;       6/19/85 - cwr - 9| make phased labels public, so that A000NULL
;                       can be dropped from link; add ZNAPPVARS
;       6/24/85 - cwr - 10| add more space to patch in ZAPD instructions.
;       7/01/85 - wp  - 11| massive overhaul to conform to prezapd output.
;       7/03/85 - cwr/wp 12| Add AUSRCSI for A(User Defined Control String)
;       7/08/85 - wp    13|  Rearrange ROMA000.
;       8/7/85  = CWR   15| (SOME CHANGES MISSING) Rearrange so that the
;                       flags which can be updated fall into a "hole" which
;                       is not counted by the checksum routines.  Then
;                       shovel dirt on them.
;                       16| ADD .Z80 FOR BENEFIT OF INLINE CODE.

        NAME('A00M16')


; Reference to INPUT and INSRCE are handled through COMMON because
; these are defined by the OPSYS and are not redefinable by the
; application programmer.  They are only included in the list of
; buffers because the application programmer should be aware of their
; existence.

;COMMON /INPUT_/
;input$:                ds      0

;COMMON /INSRCE/
;insrce$:       ds      0

        external input
        external insrce

        .Z80            ;16|


        CSEG
ROMA000::
        .PHASE  0A000H

;       Section 0 - Header information.
;13|            Download ID     = 11 bytes
;               Used to identify a download; can be retrieved
;               by ZAPD routines, up/download routines, etc.

        INCLUDE HDR.INC

;       Section 1 - Buffer definition table for ZAPD &
;       application routines = 53 bytes.
;               Table contains address and length of each of
;               the 11 primary buffers, and up to 4 user-defined
;               buffers, and 2 tmp buffers used for implied
;               buffers.  Three bytes per entry.  Also defines
;               AINSRCE which is two bytes.

        INCLUDE BUF.INC


;       Section 2 - Hardware definition table = 8 bytes
;               Defines expected conditions under which this
;               software will operate, and hardware which it uses.
;
        INCLUDE HDW.INC

                db      0,0,0,0 ;(Reserved for hardware expansion)

;2|     Section 3 - Special fn key defns = 4 bytes
;               Gives key definitions for keys which must be
;               treated specially, in ways which are not
;               defined in the state-table.

        INCLUDE KEY.INC

;       Section 4 - State-table pointers = 8 bytes
;               The state-table structure is too complex to
;               explain simply here; however, the number of
;               states (listed here) and the addresses of
;               three of its four sub-tables are all that the
;               Lookup routine needs to work. (The fourth table,
;               MainTbl is addressed via pointers in TablPtr.)
;               The tables are included below as ST1.INC.

NSTATES::
        DB      MAXSTATE

ABITMAP::               ; Address of Lookup's BitMap sub-table
        DW      BITMAP
ATABLPT::
        DW      TABLPT  ; Address of Lookup's TablPtr sub-table
ATRESULT::              ; (MainTbl sub-table not listed here.)
        DW      TRESULT ; Address of Lookup's TResult sub-table


;       Section 5 - ZAPD entry table info = 4 bytes
;               Contains size of table (in 2-byte entries),
;               number of entry to be run on power-up, and
;               pointer to beginning of table.  Table is
;               varying size, containing a pointer to each ZAPD
;               entry point which may be started up from the
;               state-table or on power-up.  Entry point n is
;               referenced in the state-table as 128+n.

ZNENTRIES::
        DB      ZMAXENTRIES     ; Number of ZAPD entry points
ZAPDAPP::
        DB      FIRSTJOB        ; Index of init job (+128)
```

```
AZENTRY::
        DW      ZENTRY          ; Pointer to start of table.
                                ; The table is INCLUDED below as
                                ; ZAP.INC.


;       Section 6 - ZAPD variable table info = 4 bytes
;               Contains size of table (in 2-byte entries),
;               pointer to beginning of table.  Table is
;               varying size, containing pointers to any vars
;               you want to define for this application.

        INCLUDE  VAR.INC


;       Section 7 - Pointers to ZAPD code seg = 8 bytes
;               Used for range checking on ZAPD instruction
;               pointer, to discourage code from running amok.

AZBEGIN::                       ; Address of first ZAPD opcode.
        DW      ZBEGIN
AZEND::                         ; Address of last ZAPD parameter + 1.
        DW      ZEND

        DS      3               ; 3 bytes reserved


;2|     Section 8 - Pointers to ZAPD stack = 4 bytes
;               The software stack is implemented as a
;               singly or doubly linked-list (currently
;               as a singly-linked-list).  ZSTKSIZE defines
;               its size in numbers of entries (3 bytes ea.
;               for a singly-linked list.) AZSTACK contains
;               a pointer to the stack's beginning.

ZSTKSIZE::                      ;2| Size of stack area.
        DB      STACKSIZE       ;2|
        DS      1               ;3| reserved.
AZSTACK::                       ;2|
        DW      ZSTACK          ;2| Pointer to beginning


;       Section 9 - Pointer to table with initial file number
;               values = 8 bytes.
;               Default values for certain files used by the
;               ZAPD interpreter, the control string interp.,
;               and other required functions.

        INCLUDE MDT.INC

;       Section 10 - Pointer to prtr defn = 2 bytes
;               Printer definition table gives a list of entries
;               for each index value, defining handshake type,
;               slip/roll printer, default page length & line
;               width, etc.  Used by printer module & opcodes.

APRTTBL::
        DW      PRTTBL


;8|     Section 11 - Pointer to edit parameters table.  (2 bytes)
;               This is included below as INP.INC.
AINPATT::
        DW      INPATT


;       Section 12 - Pointer to table which associates files with
;               their input editing characteristics. (2 bytes).
;               This is included below as FDESC.INC.
AFDESC::
        DW      FDESC


;       Section 13 - Pointer to table which associates security
;               levels with files.  This is included below as
;               SDT.INC.
ASDT::
        DW      SDT


;       Section 14 - Pointer to table which associates security
;               access levels for file/records with passwords.
;               This table is included as PAS.INC.
APASTBL::
        DW      PASTBL


;12|    Section 15 - Pointer to User Defined Control String
;               Interpreter Routine.
AUSRCSI::
IFNDEF USRCSI
        DW      0
ELSE
        DW      USRCSI
ENDIF

;4|     Section 17 - (Moved from being Section 8)
;5|             MDT part 1      = 5 bytes
;               This part of the MDT is given a fixed address,
;               to avoid needing indirection to refer to these
;               basic variables.  Part two of the MDT (which
;               gives definitions for each file) follows right
;               after the A000MEM area, and so begins with a
;4|             fixed address (PARMEM).  Part three (which gives
;4|             the partition definitions) is pointed to by the
;4|             APRTADR pointer in this section.
        INCLUDE MEM.INC
```

```
;       Section 18 - Chkbyte info for DML = 4 bytes
;               Pointer to checkbyte for var. portion of DML is
;               so that you know where the checkbyte computation
;               should terminate and what its value should be.
;               Separate checkbyte for fixed portion of DML is
;               added so that you know you can trust the pointers
;               before you start calculating checks on what they
;               point to.

ACKVBYTE::
        .DEPHASE
ROMACKVBYTE::
        .PHASE  ACKVBYTE
        DW      CKVBYTE ; Address of checkbyte on variable part.

CKFBYTE::
        DB      'N','O' ; Chkbyte for fixed part of DML must be
                        ; inserted here by some special program.

;       Section 16
;  THINGS WHICH MUST NOT BE CHECKSUMMED!!!

MEMTST::                ;5| Contents irrelevant;
        DS      1       ;5|  used for testing memory lock status

FDTFLG::
        DB      0        ;5| Set to 1 by mem mgr when FDTs built

        DS      2       ; Reserved.

;       End of fixed-size portion of absolute addressed DML
; ---------------------------------------------------------------


        INCLUDE AUTZAP.INC

;       .dephase
;       .phase  BEGBUF
        INCLUDE FDESC.INC
        INCLUDE SECURITY.INC
        INCLUDE INP.INC
        INCLUDE PAS.INC
        INCLUDE PRT.INC — ?
        INCLUDE ZAP.INC
        INCLUDE STI.INC

CKVBYTE::
        db      'C','S'
ENDZAPD::
        .DEPHASE
ENDCODE::
```

```
.PHASE ENDZAPD
INCLUDE DEPHASE.INC
.DEPHASE

END
```

```
TITLE ZAPD VFI APPLICATION
SUBTTL VERSION 2650
IDNLID::  db  11,'201VFI2650'
```

```
BUFTBL::
AINPUT::
          dw  INPUT
          db  128
ATRANSMIT::
          dw  TRANSM
          db  192
ARECEIVE::
          dw  RECEIV
          db  128
ADESTR::
          dw  DESTR
          db  50
AINTBUF::
          dw  INTBUF
          db  50
AINT2BUF::
          dw  INT2BU
          db  170
AINT3BUF::
          dw  INT3BU
          db  35
ASUPBUF::
          dw  SUPBUF
          db  1
AAMTSAV::
          dw  AMTSAV
          db  17
ABRNTBL::
          dw  BRNTBL
          db  32
AMATHBUF::
          dw  MATHBU
          db  16
AUSER1BUF::
          dw  USER1B
          db  128
AUSER2BUF::
          dw  USER2B
          db  1
AUSER3BUF::
          dw  USER3B
          db  1
AUSER4BUF::
          dw  USER4B
          db  64
ATMP1BUF::
          dw  TMP1BU
          db  128
ATMP2BUF::
          dw  TMP2BU
          db  128
AINSRCE:: dw   INSRCE
```

```
EHARDTBL::
VMODEM::   db   TI
VCARD::    db   TRK2
VPRINT::   db   ROLL
VMEMORY::  db   15
```

```
KEYALPHA::
           db   20
KEYHANGUP::
           db   27
KEYENTER::
           db   21
KEYBACKSP::
           db   19
```

```
ZNVARS:: db 13
AZVARIABLE::
        dw ZVARIABLE
ZNAPPVARS::
        db 23
AZAPPVARS::
        dw ZAPVARPART
```

```
DEFCSI::        db F_CNSTR
DEFPRM::        db F_PROMP
DEFPAS::        db 0
DEFACC::        db 0
DEFSEQ::        db 0
DEFERR::        db 0
DEFSYS::        db 0
NUMPAR:: db 2
APRTADR:: dw PRTADR
MAXFILS:: db 27
```

```
PARMEM::
        db  0,0,19,BCD,01,255,NA,0  ;F_PMNM
        db  0,1,18,NONE,02,255,NA,0  ;F_DLTP
        db  0,2,17,NONE,03,255,NA,0  ;F_RING
        db  0,3,16,NONE,04,255,NA,0  ;F_CALL
        db  0,4,15,SIXBIT,05,255,NA,0  ;F_SERL
        db  0,5,14,BCD,06,255,NA,0  ;F_SECPH
        db  0,6,13,NONE,07,255,NA,0  ;F_DFDL
        db  0,7,12,NONE,08,255,NA,0  ;F_ALGSP
        db  0,8,11,BCD,11,255,NA,0  ;F_MRID
        db  0,9,10,NONE,12,255,NA,0  ;F_PROSP
        db  0,10,9,BCD,13,255,NA,0  ;F_ALMID
        db  0,11,8,NONE,14,255,NA,0  ;F_APRSP
        db  0,12,7,NONE,16,255,NA,0  ;F_LOGSP
        db  0,13,6,NONE,17,255,NA,0  ;F_CTLSP
        db  0,14,5,SIXBIT,18,255,NA,0  ;F_LOGNM
        db  0,15,4,SIXBIT,19,255,NA,0  ;F_LOGPS
        db  0,16,3,SIXBIT,23,255,NA,0  ;F_CNSTR
        db  0,17,2,SIXBIT,24,255,NA,0  ;F_PROMP
        db  0,18,1,NONE,27,255,NA,0  ;F_CFLG
        db  1,0,8,NONE,09,255,NA,0  ;F_UNUSED1
        db  1,1,7,NONE,10,255,NA,0  ;F_UNUSED2
        db  1,2,6,NONE,15,255,NA,0  ;F_UNUSED3
        db  1,3,5,NONE,20,255,NA,0  ;F_UNUSED4
        db  1,4,4,NONE,21,255,NA,0  ;F_XMIT
        db  1,5,3,NONE,22,255,NA,0  ;F_RECV
        db  1,6,2,NONE,25,255,NA,0  ;F_UNUSED5
        db  1,7,1,NONE,26,255,NA,0  ;F_UNUSED6

$VARIABLE:
        dw  CDSTAT##
        dw  CLS_##
        dw  DNLTTP##
        dw  ERRCODE##
        dw  HSETUP##
        dw  MCHAR##
        dw  MULTI_##
        dw  OUTST_##
        dw  PREDIAL##
        dw  RAMCHAR##
        dw  RECNUM##
        dw  TRANCODE##
        dw  TRNREC##

PRTADR:
BUSR0:  dw  ENDZAPD+1H
EUSR0:  dw  0BFFFH
BUSR1:  dw  0E000H
EUSR1:  dw  0E7FFH-1141-46-270


$ENTRY::

        dw  _DFDOTR
        dw  _PREDL
        dw  _RECALL
        dw  _POSTDL
        dw  _STORE
        dw  _DOTRAN
        dw  _MULTR
        dw  _INIT


ACK  EQU  6
ADD  EQU  0
_ALTFLAG  EQU  0
_AMTSAV  EQU  9
ANSR  EQU  2
AST  EQU  42
AT  EQU  64
A_CHAR  EQU  65
BCD  EQU  2
BLANK  EQU  32
BOTH  EQU  3
_BRNTBL  EQU  10
CALCST  EQU  2
CARD  EQU  1
_CDSTAT  EQU  128
CEKEY  EQU  124
CHK_HSET  EQU  7
CKS  EQU  2
_CLS_  EQU  129
CNTLR  EQU  8
COLON  EQU  58
COMMA  EQU  44
CR  EQU  13
CRC  EQU  1
CRIMCC  EQU  65
C_CHAR  EQU  67
DABORT  EQU  1
DASH  EQU  45
_DATAIN  EQU  1
DD  EQU  1
_DESTR  EQU  4
DFDOTR  EQU  128
DH  EQU  4
DISBL_MDM  EQU  107
DIV  EQU  48
DMY  EQU  10
_DNLTYP  EQU  130
DOTRAN  EQU  133
DR  EQU  1
EIGHT  EQU  8
ENQ  EQU  5
ENTERKEY  EQU  131
EOT  EQU  4
```

```
EQ EQU 0
EQ0 EQU 0
EQUAL EQU 61
_ERRCODE EQU 131
ETX EQU 3
FALSE EQU 0
FIVE EQU 5
FN EQU 2
_FONEFIL EQU 2
FOUR EQU 4
FS EQU 28
F_ALGSP EQU 8
F_ALMID EQU 13
F_APRSP EQU 14
F_CALL EQU 4
F_CFLG EQU 27
F_CNSTR EQU 23
F_CTLSP EQU 17
F_DFDL EQU 7
F_DLTP EQU 2
F_LOGNM EQU 18
F_LOGPS EQU 19
F_LOGSP EQU 16
F_MRID EQU 11
F_PHNM EQU 1
F_PROMP EQU 24
F_PROSP EQU 12
F_RECV EQU 22
F_RING EQU 3
F_SECPM EQU 6
F_SERL EQU 5
F_UNUSED1 EQU 9
F_UNUSED2 EQU 10
F_UNUSED3 EQU 15
F_UNUSED4 EQU 20
F_UNUSED5 EQU 25
F_UNUSED6 EQU 26
F_XMIT EQU 21
GE EQU 4
GE0 EQU 2
GOT_CAR EQU 4
GOT_RNG EQU 3
GT EQU 3
H EQU 72
HANGUP EQU 81
HANGUPKEY EQU 137
HEX EQU 2
HMS EQU 12
_HOSTNUM EQU 3
HSETOFF EQU 255
HSETON EQU 0
_HSETUP EQU 132
HS_DN EQU 4
HS_UP EQU 2
HYBRID EQU 4
_I EQU 4
INIT EQU 135
_INPUT EQU 1
_INT2BUF EQU 6
_INT3BUF EQU 7
_INTBUF EQU 5
KBDMCC EQU 64
KEYBD EQU 2
KEYCRD EQU 3
KEYCRDTIM EQU 67
KEYTIM EQU 66
K_CALC EQU 1
K_NORM EQU 0
LE EQU 2
_LGTRY EQU 5
_LOGSFIL EQU 6
LRC EQU 0
LST_CAR EQU 5
LST_RNG EQU 6
LT EQU 1
LT0 EQU 3
_MATHBUF EQU 11
_MCHAR EQU 133
MDY EQU 9
MEM2 EQU 5
MEMDIAL EQU 4
MH EQU 3
_MIDLEN EQU 7
MM EQU 0
MODEM EQU 4
MODEMIN EQU 3
MODTIM EQU 68
MUL EQU 32
_MULTI_ EQU 134
MULTR EQU 134
MY EQU 6
NA EQU 0
NAK EQU 21
NE EQU 5
NE0 EQU 1
NINE EQU 9
NO EQU 0
NONE EQU 0
OFF EQU 0
ON EQU 1
ONE EQU 1
ORIG EQU 1
_OUTST_ EQU 135
PAD_L EQU 0
PAD_R EQU 1
PD EQU 46
PERIOD EQU 46
PHONEST EQU 3
```

```
PIN EQU 16
POSTDL EQU 131
_PREDIAL EQU 136
PREDL EQU 129
_PROTFIL EQU 10
_PROTSPC EQU 9
P_CHAR EQU 80
QMARK EQU 63
_RANDVAL EQU 11
_RANCHAR EQU 137
_RCHAR EQU 12
_RCVDONE EQU 13
READ EQU 1
READY EQU 0
RECALL EQU 130
_RECEIVE EQU 3
_RECNUM EQU 138
ROLL EQU 1
RS232 EQU 0
_RSPVALID EQU 14
SCRLLEFT EQU 3
SCRLRIGHT EQU 4
SEMICOL EQU 59
SETINP EQU 45
SEVEN EQU 7
SHIFTKEY EQU 128
SIGNED EQU 0
SIX EQU 6
SIXBIT EQU 1
SPACE EQU 32
_SPFLAG EQU 15
_STATUS EQU 16
STORE EQU 132
STX EQU 2
SUB EQU 16
_SUPBUF EQU 8
TELCO EQU 32
TELTIM EQU 96
THREE EQU 3
TI EQU 1
_TIMER EQU 17
_TMP1BUF EQU 16
_TMP2BUF EQU 17
_TRANCODE EQU 139
_TRANSMIT EQU 2
TRANST EQU 6
TRK2 EQU 1
_TRNREC EQU 140
TRUE EQU 1
TWO EQU 2
_UNLOKT EQU 18
UNSIGNED EQU 1
_USER1BUF EQU 12
_USER2BUF EQU 13
_USER3BUF EQU 14
_USER4BUF EQU 15
_USR1VAR EQU 19
_USR4VAR EQU 20
WRITE EQU 2
_XMITRDY EQU 8
_XTRIES EQU 21
_XTVALID EQU 22
YD EQU 0
YES EQU 1
YH EQU 5
YM EQU 7
YMD EQU 11
YY EQU 2
Y_CHAR EQU 89
ZAP1 EQU 0
ZAP2 EQU 1
ZAPDST EQU 1
ZDE EQU 0
ZERO EQU 0
ZERO_CHAR EQU 48
Z_PAD EQU 48
ZMAXENTRIES EQU 8
ZMAXSTATE EQU 7
MAXSTATE EQU 7
FIRSTJOB EQU 135
```

```
FDESC::
        db  1,0,19,NA
        dw  TELC
        db  2,1,1,NA
        dw  FLAG
        db  3,1,1,NA
        dw  FLAG
        db  4,1,1,NA
        dw  FLAG
        db  5,1,2,NA
        dw  UCNO
        db  6,1,9,NA
        dw  TELC
        db  7,1,9,NA
        dw  FLAG
        db  8,1,9,NA
        dw  EDLGSPC
        db  11,1,9,NA
        dw  EDMID
        db  12,1,9,NA
        dw  PROTO
        db  14,1,9,NA
        dw  PROTO
        db  13,1,9,NA
        dw  EDMID
        db  16,1,9,NA
        dw  EDLGSPC
        db  17,1,9,NA
        dw  EDCSSPC
        db  18,1,8,NA
        dw  EDLGN
        db  19,1,8,NA
        dw  EDLGN
        db  21,1,1,NA
        dw  NA
        db  22,1,1,NA
        dw  NA
        db  23,1,8,NA
        dw  EDCST
        db  24,1,16,NA
        dw  PRMPT
        db  27,1,1,NA
        dw  FLAG
        db  255
```

```
SDT::
        db  1,0,19,BOTH,1
        db  2,1,1,BOTH,1
        db  3,1,1,BOTH,1
        db  4,1,1,BOTH,1
        db  5,1,2,BOTH,1
        db  6,1,9,BOTH,1
        db  7,1,9,BOTH,1
        db  8,1,9,BOTH,1
        db  11,1,9,BOTH,1
        db  12,1,9,BOTH,1
        db  13,1,9,BOTH,1
        db  14,1,9,BOTH,1
        db  16,1,9,BOTH,1
        db  17,1,9,BOTH,1
        db  18,1,8,BOTH,1
        db  19,1,8,BOTH,1
        db  21,1,1,READ,1
        db  22,1,1,READ,1
        db  23,1,8,BOTH,1
        db  24,1,16,BOTH,1
        db  27,1,1,BOTH,1
       db 255
```

```
INPATT::
CSEDIT:
            dw  ALPHAN@@
            db  K_CALC
            db  50
            dw  NA
            dw  NA
            db  NA
TELC:
            dw  TELENO@@
            db  K_NORM
            db  32
            dw  NA
            dw  NA
            db  NA
UDNO:
            dw  ALPHAN@@
            db  K_NORM
            db  10
            dw  NA
            dw  NA
            db  NA
FLAG:
            dw  ALPHAN@@
            db  K_NORM
            db  1
            dw  NA
            dw  NA
            db  NA
EDMID:
            dw  ALPHAN@@
            db  K_CALC
            db  24
            dw  NA
            dw  NA
            db  NA
PRMPT:
            dw  ALPHAN@@
            db  K_NORM
            db  16
            dw  NA
            dw  NA
            db  NA
EDCSSPC:
            dw  INTEGE@@
            db  K_NORM
            db  1
            dw  1
            dw  0
            db  1
EDCST:
            dw  ALPHAN@@
            db  K_NORM
            db  25
            dw  NA
            dw  NA
            db  NA
PROTO:
            dw  INTEGE@@
            db  K_NORM
            db  1
            dw  0
            dw  5
            db  1
EDLGSPC:
            dw  INTEGE@@
            db  K_NORM
            db  1
            dw  1
            dw  0
            db  1
EDLGN:
            dw  ALPHAN@@
            db  K_NORM
            db  12
            dw  NA
            dw  NA
            db  NA
RANGE:
            dw  ALPHAN@@
            db  K_NORM
            db  24
            dw  NA
            dw  NA
            db  NA
IGETPAS:
            dw  PW_EDI@@
            db  K_NORM
            db  16
            dw  NA
            dw  NA
            db  NA
            db  255
```

```
PASTBL::
        db  1
        db  5
        db  11111111B
        db  11111111B
        db  11111111B
        db  11111111B
        db  11111111B

            db  255
```

```
IBEGIN::
RANGLINE:
db  192
db  31
db  81
db  0
db  192
db  31
db  107
db  0
db  192
db  31
db  15
db  2
dw  3
dw  128
db  95
db  0
XMTPAK:
db  98
dw  1
db  79
db  _XTVALID
db  1
db  79
db  _XTRIES
db  3
db  42
db  45
db  8,'SENDING'
XMT01:
db  192
db  65
db  1
db  0
db  _TRANSMIT
db  4
XMT021:
db  82
db  _TIMER
dw  6000
db  144
db  93
db  _TIMER
db  _RCHAR
dw  XMT022
XMT023:
db  42
db  45
db  16,'NO RESP FR HOST'
db  89
dw  100
db  1
dw  XMTXIT
XMT022:
db  14
db  _RCHAR
db  0
db  2
dw  XMTOK
db  112
db  14
db  _RCHAR
db  0
db  0
dw  XMT023
XMT03:
db  14
db  _RCHAR
db  0
db  6
dw  XMTACK
db  14
db  _RCHAR
db  5
db  21
dw  XMT05
db  14
db  _XTVALID
db  0
db  0
dw  XMT021
db  42
db  36
db  _XTRIES
dw  XMT04
db  45
db  10,'RESENDING'
db  1
dw  XMT01
XMT04:
db  45
db  14,'TOO MANY ERRS'
db  1
dw  XMTXIT
XMTACK:
db  79
db  _XTVALID
db  0
db  1
dw  XMT021
XMT05:
db  14
db  _RCHAR
db  5
db  4
dw  XMT021
db  42
```

```
db  45
db  13,'HOST GAVE UP'
db  1
dw  XMTXIT
XMSTX:
XMTOK:
db  42
db  45
db  10,'RECEIVING'
DO_RCV:
db  74
db  _RECEIVE
db  94
dw  4500
db  _RECEIVE
dw  DO_10
db  1
dw  XMTXIT
DO_10:
db  96
db  4
db  6
db  98
dw  0
XMTXIT:
db  46
GET_HOST:
db  99
db  255
db  71
db  _ALTFLAG
db  79
db  _PONEFIL
db  1
db  79
db  _PROTFIL
db  12
db  79
db  _LOGSFIL
db  16
GETH00:
db  105
db  3
dw  CHKCAR
db  105
db  4
dw  DIALOG
GETH05:
db  20
db  3
dw  COMMERR
db  20
db  4
dw  GETH10
db  115
dw  GETH05
GETH10:
db  16
db  4
db  5
dw  0
dw  COMMERR
GETH20:
db  20
db  3
dw  COMMERR
db  14
db  _XMITRDY
db  5
db  0
dw  GETH30
db  115
dw  GETH20
GETH30:
db  105
db  7
dw  XMTPAK
GETH40:
db  20
db  3
dw  COMMERR
db  20
db  7
dw  GETH50
db  115
dw  GETH40
GETH50:
db  16
db  7
db  5
dw  0
dw  COMMERR
db  71
db  _XMITRDY
db  79
db  _RSPVALID
db  1
db  115
dw  GETH20
COMMERR:
db  107
db  3
db  107
db  4
db  7
dw  HANGLINE
db  0
db  89
```

```
dw  100
db  14
db  _ALTFLAG
db  8
db  1
dw  GETH95
db  36
db  _LGTRY
dw  GETH90
db  83
db  _USER4BUF
db  14,'RETRYING HOST'
db  160
db  7
dw  SAFEDSP
db  1
db  _USER4BUF
db  1
dw  GETH00
GETH90:
db  79
db  _ALTFLAG
db  1
db  79
db  _LGTRY
db  3
db  79
db  _FONEFIL
db  6
db  79
db  _PROTFIL
db  14
db  79
db  _LOGSFIL
db  8
db  132
db  62
db  13
db  _HOSTNUM
db  _INT2BUF
db  21
db  1
db  _INT2BUF
db  2
dw  GETH95
db  196
db  29
db  2
db  _MIDLEN
db  _TRANSMIT
db  128
db  192
db  55
db  2
db  1
db  0
db  _TRANSMIT
db  _INT2BUF
GETH95:
db  36
db  _LGTRY
dw  GETH99
db  83
db  _USER4BUF
db  17,'RETRYNG ALT HOST'
db  160
db  7
dw  SAFEDSP
db  1
db  _USER4BUF
db  1
dw  GETH00
GETH99:
db  64
SAFEDSP:
db  14
db  _DATAIN
db  0
db  0
dw  SAF90
db  42
db  176
db  45
db  1
SAF90:
db  95
db  1
CHKCAR:
db  87
db  32
CHKC10:
db  14
db  _CDSTAT
db  8
db  0
dw  CHKC20
db  115
dw  CHKC10
CHKC20:
db  113
db  14
db  _CDSTAT
db  5
db  0
dw  CHKC20
db  87
db  0
db  46
```

```
DIALOG:
db  98
dw  1
COM002:
db  144
db  7
dw  GETLINE
db  1
db  _DATAIN
db  101
db  1
db  83
db  _USER4BUF
db  0,'DIALING'
db  160
db  7
dw  SAFEDSP
db  1
db  _USER4BUF
db  148
db  62
db  _PONEFIL
db  _HOSTNUM
db  _USER4BUF
db  208
db  30
db  _USER4BUF
dw  GH0A
db  1
dw  GH80
GH0A:
db  15
dw  GH0B
db  115
dw  GH0A
GH0B:
db  7
dw  GET_CAR
db  1
dw  3000
db  14
db  _CDSTAT
db  0
db  0
dw  GH20
GH0C:
db  148
db  62
db  _PROTFIL
db  _HOSTNUM
db  _USER4BUF
GH0D:
db  30
db  _PROTSPC
db  _USER4BUF
db  1
db  14
db  _PROTSPC
db  0
db  0
dw  ENQ01
db  14
db  _PROTSPC
db  0
db  1
dw  TYMNET
db  14
db  _PROTSPC
db  0
db  2
dw  CMPSRV
db  14
db  _PROTSPC
db  0
db  3
dw  UNINET
db  14
db  _PROTSPC
db  0
db  4
dw  TELENET
db  14
db  _PROTSPC
db  0
db  5
dw  GEISCO
db  1
dw  ENQ01
GEISCO:
db  89
dw  150
GE01:
db  96
db  4
db  72
db  89
dw  50
db  96
db  4
db  72
db  89
dw  50
db  96
db  4
db  72
db  89
dw  50
db  96
```

```
db  4
db  72
db  89
dw  50
db  79
db  _USR4VAR
db  60
GE02:
db  93
dw  1500
db  _RCHAR
dw  GE03
db  1
dw  GH22
GE03:
db  14
db  _RCHAR
db  0
db  61
dw  GE04
db  82
db  _TIMER
dw  200
db  36
db  _USR4VAR
dw  GH11
db  115
dw  GE02
GE04:
db  112
db  140
db  62
db  _LOGSPIL
db  _HOSTNUM
db  _USER4BUF
db  30
db  _USR4VAR
db  _USER4BUF
db  1
db  132
db  62
db  18
db  _USR4VAR
db  _USER4BUF
db  192
db  65
db  1
db  0
db  _USER4BUF
db  4
db  96
db  4
db  44
db  132
```

```
db  62
db  19
db  _USR4VAR
db  _USER4BUF
db  192
db  65
db  1
db  0
db  _USER4BUF
db  4
db  96
db  4
db  44
db  96
db  4
db  44
db  96
db  4
db  13
db  1
dw  ENQ01
UNINET::
db  82
db  _TIMER
dw  500
UN001:
db  144
db  93
db  _TIMER
db  _RCHAR
dw  UN002
db  1
dw  UN03
UN002:
db  112
db  14
db  _RCHAR
db  0
db  63
dw  UN03
db  115
dw  UN001
UN03:
db  89
dw  100
db  96
db  4
db  13
db  89
dw  50
db  96
db  4
db  46
db  89
```

```
db  112
db  14
db  _RCHAR
db  0
db  58
dw  UN06
db  36
db  _USR1VAR
dw  GH11
db  115
dw  UN14
UN06:
db  148
db  62
db  _LOGSFIL
db  _HOSTNUM
db  _USER4BUF
db  30
db  _USR1VAR
db  _USER4BUF
db  1
db  132
db  62
db  18
db  _USR1VAR
db  _USER4BUF
db  192
db  65
db  1
db  0
db  _USER4BUF
db  4
db  96
db  4
db  13
db  1
dw  ENQ01
TELENET:
db  89
dw  150
TE01:
db  96
db  4
db  13
db  89
dw  50
db  96
db  4
db  13
db  89
dw  50
db  96
db  4
db  13
```

```
dw  50
db  96
db  4
db  13
db  79
db  _USR1VAR
db  120
db  82
db  _TIMER
dw  1500
UN04:
db  144
db  93
db  _TIMER
db  _RCHAR
dw  UN05
db  1
dw  UN13
UN05:
db  112
db  14
db  _RCHAR
db  0
db  58
dw  UN13
db  36
db  _USR1VAR
dw  GH11
db  115
dw  UN04
UN13:
db  97
db  4
db  7,'SET2:0'
db  89
dw  20
db  96
db  4
db  13
db  79
db  _USR1VAR
db  120
db  82
db  _TIMER
dw  1000
UN14:
db  144
db  93
db  _TIMER
db  _RCHAR
dw  UN15
db  1
dw  UN06
UN15:
```

```
db  89
dw  50
db  79
db  _USR4VAR
db  60
TE02:
db  93
dw  1000
db  _RCHAR
dw  TE03
db  1
dw  GH22
TE03:
db  112
db  14
db  _RCHAR
db  0
db  64
dw  TE04
db  82
db  _TIMER
dw  200
db  36
db  _USR4VAR
dw  GH11
db  115
dw  TE02
TE04:
db  148
db  62
db  _LOGSFIL
db  _HOSTNUM
db  _USER4BUF
db  30
db  _USR4VAR
db  _USER4BUF
db  1
db  96
db  4
db  67
db  96
db  4
db  32
db  132
db  62
db  18
db  _USR4VAR
db  _USER4BUF
db  192
db  65
db  1
db  0
db  _USER4BUF
db  4
```

```
db  96
db  4
db  13
db  1
dw  ENQ01
TYMNET:
db  89
dw  150
db  79
db  _USR4VAR
db  250
TY01:
db  93
dw  2000
db  _RCHAR
dw  TY02
db  1
dw  GH22
TY02:
db  112
db  14
db  _RCHAR
db  0
db  13
dw  TY03
db  82
db  _TIMER
dw  200
db  36
db  _USR4VAR
dw  GH11
db  115
dw  TY01
TY03:
db  96
db  4
db  89
db  89
dw  50
db  79
db  _USR4VAR
db  250
db  82
db  _TIMER
dw  1000
TY04:
db  144
db  93
db  _TIMER
db  _RCHAR
dw  TY05
db  1
dw  GH22
TY05:
```

```
db  112
db  14
db  _RCHAR
db  0
db  58
dw  TY06
db  82
db  _TIMER
dw  200
db  36
db  _USR4VAR
dw  GH11
db  115
dw  TY04
TY06:
db  148
db  62
db  _LOGSFIL
db  _HOSTNUM
db  _USER4BUF
db  30
db  _USR4VAR
db  _USER4BUF
db  1
db  132
db  62
db  18
db  _USR4VAR
db  _USER4BUF
db  96
db  4
db  8
db  192
db  65
db  1
db  0
db  _USER4BUF
db  4
db  96
db  4
db  59
db  132
db  62
db  19
db  _USR4VAR
db  _USER4BUF
db  192
db  65
db  1
db  0
db  _USER4BUF
db  4
db  96
db  4
```

```
db  59
db  96
db  4
db  13
db  1
dw  ENQ01
CMPSRV:
db  89
dw  200
GH01:
db  96
db  4
db  13
db  79
db  _USR4VAR
db  30
GH02:
db  93
dw  2000
db  _RCHAR
dw  GH03
db  1
dw  GH22
GH03:
db  112
db  14
db  _RCHAR
db  0
db  58
dw  GH04
db  82
db  _TIMER
dw  200
db  36
db  _USR4VAR
dw  GH11
db  115
dw  GH02
GH04:
db  148
db  62
db  _LOGSFIL
db  _HOSTNUM
db  _USER4BUF
db  30
db  _USR4VAR
db  _USER4BUF
db  1
db  132
db  62
db  18
db  _USR4VAR
db  _USER4BUF
db  96
```

```
db  4
db  39
db  192
db  65
db  1
db  0
db  _USER4BUF
db  4
db  96
db  4
db  13
GH05:
db  79
db  _USR4VAR
db  60
GH51:
db  93
dw  1500
db  _RCHAR
dw  GH06
db  1
dw  GH23
GH06:
db  112
db  14
db  _RCHAR
db  0
db  5
dw  GHOK
db  14
db  _RCHAR
db  0
db  63
dw  GH07
db  82
db  _TIMER
dw  200
db  36
db  _USR4VAR
dw  GH11
db  115
dw  GH51
GH07:
db  82
db  _TIMER
dw  1000
GH71:
db  144
db  93
db  _TIMER
db  _RCHAR
dw  GH08
db  1
dw  GH21
```

```
GH08:
db  112
db  14
db  _RCHAR
db  0
db  42
dw  GH09
db  14
db  _RCHAR
db  0
db  45
dw  GH10
db  14
db  _RCHAR
db  0
db  32
dw  GH11
db  14
db  _RCHAR
db  0
db  63
dw  GH11
db  82
db  _TIMER
dw  200
db  115
dw  GH71
GH09:
db  98
dw  1
db  83
db  _USER4BUF
db  13,'NETWORK BUSY'
db  1
dw  DO_DISP
GH10:
db  98
dw  2
db  83
db  _USER4BUF
db  17,'HOST COMPTR BUSY'
db  1
dw  DO_DISP
GH11:
db  98
dw  2
db  83
db  _USER4BUF
db  16,'NETWORK PROBLEM'
db  1
dw  DO_DISP
GH20:
db  98
dw  2
```

```
db  83
db  _USER4BUF
db  11,'NO CARRIER'
db  1
dw  DO_DISP
GH21:
db  98
dw  2
db  83
db  _USER4BUF
db  13,'LOST CARRIER'
db  1
dw  DO_DISP
GH22:
db  98
dw  2
db  83
db  _USER4BUF
db  17,'NO RESP/F NETWRK'
db  1
dw  DO_DISP
GH23:
db  98
dw  2
db  83
db  _USER4BUF
db  17,'NO ENQ FROM HOST'
db  1
dw  DO_DISP
GH80:
db  98
dw  2
db  79
db  _LOTRY
db  1
db  83
db  _USER4BUF
db  16,'NO PHONE NUMBER'
db  1
dw  DO_DISP
DO_DISP:
db  160
db  7
dw  SAFEDSP
db  1
db  _USER4BUF
db  1
dw  GHDONE
ENQ01:
db  79
db  _USR4VAR
db  60
db  82
db  _TIMER
```

```
dw  3000
ENQ02:
db  144
db  93
db  _TIMER
db  _RCHAR
dw  ENQ03
db  1
dw  GH23
ENQ03:
db  112
db  14
db  _RCHAR
db  0
db  5
dw  GHOK
db  36
db  _USR4VAR
dw  GH23
db  115
dw  GH51
GHOK:
db  112
db  98
dw  0
db  46
GHDONE:
db  51
db  89
dw  100
db  46
GET_CAR:
db  100
db  1
db  176
db  103
db  1
db  87
db  96
GC00:
db  113
db  17
db  32
dw  GC01
db  25
dw  GC02
db  1
dw  GC00
GC01:
db  14
db  _CDSTAT
db  0
db  0
dw  GC00
```

```
GC02:
db  112
db  95
db  1
GETLINE:
db  24
dw  GOTLINE
db  160
db  14
db  1
db  0
db  0
dw  WTLINE
db  42
db  45
db  17,'WAIT-LINE IN USE'
WTLINE:
db  72
db  _RANDVAL
db  192
db  60
db  _RANDVAL
db  144
db  128
db  6
db  _RANDVAL
db  0
dw  100
db  _RANDVAL
db  144
db  89
db  _RANDVAL
db  1
dw  GETLINE
GOTLINE:
db  89
dw  200
db  95
db  1
_INIT::
db  42
db  45
db  16, 'VPX ECN 826.9 ', 20H
db  192
db  76
db  1
db  71
db  _UNLOKT
db  7
dw  PPAUSE
db  2
dw  200
dw  67
db  47
```

```
db  7
db  64
_PREDL::
db  79
db  _PREDIAL
db  1
db  42
db  45
db  9,'PRE-DIAL'
PRED10:
db  79
db  _MULTI_
db  0
db  46
_POSTDL::
db  79
db  _PREDIAL
db  0
db  42
db  45
db  10,'POST-DIAL'
db  1
dw  PRED10
_MULTR::
db  79
db  _MULTI_
db  2
db  42
db  45
db  12,'MULTI-TRANS'
db  46
_DFDOTR::
db  144
db  128
db  5
db  _MCHAR
db  16
db  48
db  _HOSTNUM
db  132
db  62
db  7
db  _HOSTNUM
db  _BRNTBL
db  30
db  _I
db  _BRNTBL
db  1
db  71
db  _PREDIAL
db  14
db  _I
db  5
db  0
```

```
dw  DOT00
db  66
db  _PREDIAL
db  1
dw  DOT00
_DOTRAN::
db  144
db  128
db  5
db  _MCHAR
db  16
db  48
db  _HOSTNUM
DOT00:
db  71
db  _UNLOKT
db  71
db  _XMITRDY
db  71
db  _RSPVALID
db  79
db  _LOTRY
db  3
db  105
db  1
dw  CHK_HANGUP
db  14
db  _PREDIAL
db  0
db  0
dw  DOT10
db  105
db  2
dw  GET_HOST
DOT10:
db  105
db  5
dw  BLD_XMIT
DOT20:
db  20
db  5
dw  DOT30
db  115
dw  DOT20
DOT30:
db  14
db  _PREDIAL
db  0
db  1
dw  DOT35
db  105
db  2
dw  GET_HOST
DOT35:
db  105
db  5
dw  IGNKEY
DOT40:
db  14
db  _RSPVALID
db  5
db  0
dw  DOT50
db  115
dw  DOT40
DOT50:
db  107
db  5
db  71
db  _RSPVALID
db  7
dw  ANARSP
db  0
db  14
db  _MULTI_
db  0
db  0
dw  DOT99
db  107
db  1
db  105
db  5
dw  VIEWDISP
db  114
dw  00100000B
db  105
db  1
dw  CHK_HANGUP
db  105
db  5
dw  BLD_XMIT
DOT60:
db  20
db  5
dw  DOT70
db  115
dw  DOT60
DOT70:
db  1
dw  DOT40
DOT99:
db  64
IGNKEY:
db  87
db  2
IGNK10:
db  17
db  2
```

```
dw  IGNK20
db  115
dw  IGNK10
IGNK20:
db  112
db  51
db  115
dw  IGNK10
VIEWDISP:
db  87
db  2
VEWD10:
db  17
db  2
dw  VEWD20
db  115
dw  VEWD10
VEWD20:
db  112
db  14
db  _NCHAR
db  0
db  35
dw  VEWD30
db  14
db  _NCHAR
db  0
db  61
dw  VEWD40
db  14
db  _NCHAR
db  0
db  137
dw  VEWD50
db  14
db  _NCHAR
db  0
db  131
dw  VEWD90
db  51
db  115
dw  VEWD10
VEWD30:
db  47
db  3
db  115
dw  VEWD10
VEWD40:
db  47
db  4
db  115
dw  VEWD10
VEWD50:
db  64
VEWD90:
db  87
db  0
db  46
ANARSP:
db  92
db  22
db  01
db  _RECEIVE
db  61
db  _I
db  _RECEIVE
db  144
db  128
db  5
db  _I
db  16
db  2
db  _I
db  208
db  29
db  _I
db  0
db  _RECEIVE
db  42
db  43
db  2
db  0
db  _RECEIVE
db  95
db  0
BLD_XMIT:
db  71
db  _DATAIN
db  132
db  62
db  17
db  _HOSTNUM
db  _BRNTBL
db  30
db  _I
db  _BRNTBL
db  1
db  14
db  _I
db  0
db  0
dw  BLDX90
db  132
db  62
db  23
db  _I
db  _TRANSMIT
db  21
```

```
db  1
db  _TRANSMIT
db  0
dw  BLDX92
db  03
db  _TRANSMIT
db  2, 02H
db  132
db  11
db  11
db  _HOSTNUM
db  _TRANSMIT
db  61
db  _MIDLEN
db  _TRANSMIT
db  144
db  128
db  5
db  _MIDLEN
db  16
db  2
db  _MIDLEN
db  144
db  48
db  _I
db  _TRANSMIT
db  0
db  42
db  45
db  11,'PROCESSING'
db  10
db  _TRANSMIT
db  3
db  192
db  7
db  2
db  _TRANSMIT
db  0
db  92
db  21
db  01
db  _TRANSMIT
db  192
db  58
db  22
db  01
db  1,''
db  79
db  _XMITRDY
db  1
db  79
db  _DATAIN
db  1
db  46
BLDX90:
db  42
db  45
db  16,'NO CTRL STR SPC'
db  64
BLDX92:
db  42
db  45
db  17,'NO CONTROL STRNG'
db  64
PPAUSE::
db  176
db  103
db  1
db  176
db  87
db  2
PPAU10:
db  17
db  67
dw  PPAU90
db  115
dw  PPAU10
PPAU90:
db  87
db  0
db  95
db  2
_RECALL::
db  105
db  1
dw  CHK_HANGUP
db  105
db  2
dw  DO_RCL
WAITRCL:
db  114
dw  00000100B
db  46
_STORE::
db  112
db  192
db  17
dw  STO01
db  160
db  45
dw  MEMLXEDMSG00
db  46
STO01:
db  105
db  1
dw  CHK_HANGUP
db  14
db  _UNLOKT
```

```
db  5
db  0
dw  STO20
db  51
STO05:
db  105
db  2
dw  GETPASS
db  114
dw  00000100B
db  192
db  27
db  1
db  _DESTR
db  0
db  7,'EONVF1'
dw  STO10
db  42
db  45
db  15,'WRONG PASSWORD'
db  51
db  7
dw  PPAUSE
db  2
dw  150
dw  67
db  1
dw  STO05
STO10:
db  66
db  _UNLOKT
STO20:
db  105
db  2
dw  DO_STR
WAITSTR:
db  114
dw  00000100B
db  47
db  7
db  64
GETPASS:
db  42
db  45
db  15,'ENTER PASSWORD'
db  192
db  60
dw  IGETPAS
db  79
db  _CLS_
db  1
db  50
db  46
CHK_HANGUP:
db  192
db  3
dw  JCKHANG00
DO_STR:
db  192
db  3
dw  JDOSTR00
DO_RCL:
db  192
db  3
dw  JDORCL00
ZEND::
```

```
; TABLES.ASM - tables for state-table LookUp procedure

; XAPD version - Assemble/link with downloadable tables.

BITMAP::                ;BitMap[state][bytectr]
        DB      0f7H    ; state=0, bytectr = 0
        DB      0f3H    ; state=0, bytectr = 1
        DB      029H    ; state=0, bytectr = 2
        DB      0a7H    ; state=0, bytectr = 3
        DB      00H     ; state=0, bytectr = 4
        DB      0ffH    ; state=1, bytectr = 0
        DB      0ffH    ; state=1, bytectr = 1
        DB      0ffH    ; state=1, bytectr = 2
        DB      0ffH    ; state=1, bytectr = 3
        DB      01H     ; state=1, bytectr = 4
        DB      09fH    ; state=2, bytectr = 0
        DB      0c7H    ; state=2, bytectr = 1
        DB      0c7H    ; state=2, bytectr = 2
        DB      0a7H    ; state=2, bytectr = 3
        DB      00H     ; state=2, bytectr = 4
        DB      0a7H    ; state=3, bytectr = 0
        DB      0d3H    ; state=3, bytectr = 1
        DB      0e9H    ; state=3, bytectr = 2
        DB      0a4H    ; state=3, bytectr = 3
        DB      00H     ; state=3, bytectr = 4
        DB      023H    ; state=4, bytectr = 0
        DB      00H     ; state=4, bytectr = 1
        DB      048H    ; state=4, bytectr = 2
        DB      0a4H    ; state=4, bytectr = 3
        DB      00H     ; state=4, bytectr = 4
        DB      0a7H    ; state=5, bytectr = 0
        DB      0c3H    ; state=5, bytectr = 1
        DB      049H    ; state=5, bytectr = 2
        DB      0a4H    ; state=5, bytectr = 3
        DB      00H     ; state=5, bytectr = 4
        DB      0f7H    ; state=6, bytectr = 0
        DB      0f3H    ; state=6, bytectr = 1
        DB      029H    ; state=6, bytectr = 2
        DB      0a7H    ; state=6, bytectr = 3
        DB      00H     ; state=6, bytectr = 4

TABLPT::                ;TablePtr[state] (holding true pointers)
        DW      MNTAB0  ; state = 0
        DW      MNTAB1  ; state = 1
        DW      MNTAB2  ; state = 2
        DW      MNTAB3  ; state = 3
        DW      MNTAB4  ; state = 4
        DW      MNTAB5  ; state = 5
        DW      MNTAB6  ; state = 6

MNTABL::                ; MainTable[index]
MNTAB0:                 ; (entries for state 0)
        DB      2D      ; index = 0
        DB      2D      ; index = 1
        DB      2D      ; index = 2
        DB      3D      ; index = 3
        DB      4D      ; index = 4
        DB      5D      ; index = 5
        DB      2D      ; index = 6
        DB      2D      ; index = 7
        DB      2D      ; index = 8
        DB      6D      ; index = 9
        DB      7D      ; index = 10
        DB      2D      ; index = 11
        DB      2D      ; index = 12
        DB      2D      ; index = 13
        DB      8D      ; index = 14
        DB      9D      ; index = 15
        DB      10D     ; index = 16
        DB      11D     ; index = 17
        DB      12D     ; index = 18
        DB      13D     ; index = 19
        DB      14D     ; index = 20
MNTAB1:                 ; (entries for state 1)
        DB      15D     ; index = 21
        DB      15D     ; index = 22
        DB      15D     ; index = 23
        DB      15D     ; index = 24
        DB      15D     ; index = 25
        DB      15D     ; index = 26
        DB      15D     ; index = 27
        DB      15D     ; index = 28
        DB      15D     ; index = 29
        DB      15D     ; index = 30
        DB      15D     ; index = 31
        DB      15D     ; index = 32
        DB      15D     ; index = 33
        DB      15D     ; index = 34
        DB      15D     ; index = 35
        DB      15D     ; index = 36
        DB      15D     ; index = 37
        DB      15D     ; index = 38
        DB      15D     ; index = 39
        DB      15D     ; index = 40
        DB      15D     ; index = 41
        DB      15D     ; index = 42
        DB      15D     ; index = 43
        DB      15D     ; index = 44
        DB      15D     ; index = 45
        DB      15D     ; index = 46
        DB      15D     ; index = 47
        DB      15D     ; index = 48
        DB      16D     ; index = 49
        DB      17D     ; index = 50
        DB      18D     ; index = 51
        DB      19D     ; index = 52
        DB      20D     ; index = 53
MNTAB2:                 ; (entries for state 2)
```

```
        DB      21D     ; index = 54
        DB      21D     ; index = 55
        DB      21D     ; index = 56
        DB      22D     ; index = 57
        DB      23D     ; index = 58
        DB      21D     ; index = 59
        DB      21D     ; index = 60
        DB      21D     ; index = 61
        DB      22D     ; index = 62
        DB      21D     ; index = 63
        DB      21D     ; index = 64
        DB      21D     ; index = 65
        DB      22D     ; index = 66
        DB      24D     ; index = 67
        DB      21D     ; index = 68
        DB      25D     ; index = 69
        DB      22D     ; index = 70
        DB      22D     ; index = 71
        DB      23D     ; index = 72
        DB      13D     ; index = 73
        DB      26D     ; index = 74
MNTAB3:                 ; (entries for state 3)
        DB      27D     ; index = 75
        DB      27D     ; index = 76
        DB      27D     ; index = 77
        DB      28D     ; index = 78
        DB      27D     ; index = 79
        DB      27D     ; index = 80
        DB      27D     ; index = 81
        DB      29D     ; index = 82
        DB      27D     ; index = 83
        DB      27D     ; index = 84
        DB      27D     ; index = 85
        DB      30D     ; index = 86
        DB      27D     ; index = 87
        DB      27D     ; index = 88
        DB      27D     ; index = 89
        DB      23D     ; index = 90
        DB      13D     ; index = 91
        DB      26D     ; index = 92
MNTAB4:                 ; (entries for state 4)
        DB      31D     ; index = 93
        DB      31D     ; index = 94
        DB      32D     ; index = 95
        DB      33D     ; index = 96
        DB      31D     ; index = 97
        DB      23D     ; index = 98
        DB      13D     ; index = 99
        DB      26D     ; index = 100
MNTAB5:                 ; (entries for state 5)
        DB      34D     ; index = 101
        DB      34D     ; index = 102
        DB      34D     ; index = 103
        DB      32D     ; index = 104
        DB      34D     ; index = 105
        DB      34D     ; index = 106
        DB      34D     ; index = 107
        DB      34D     ; index = 108
        DB      34D     ; index = 109
        DB      34D     ; index = 110
        DB      33D     ; index = 111
        DB      34D     ; index = 112
        DB      23D     ; index = 113
        DB      13D     ; index = 114
        DB      26D     ; index = 115
MNTAB6:                 ; (entries for state 6)
        DB      35D     ; index = 116
        DB      35D     ; index = 117
        DB      35D     ; index = 118
        DB      3D      ; index = 119
        DB      4D      ; index = 120
        DB      36D     ; index = 121
        DB      35D     ; index = 122
        DB      35D     ; index = 123
        DB      35D     ; index = 124
        DB      6D      ; index = 125
        DB      36D     ; index = 126
        DB      35D     ; index = 127
        DB      35D     ; index = 128
        DB      35D     ; index = 129
        DB      8D      ; index = 130
        DB      37D     ; index = 131
        DB      11D     ; index = 132
        DB      10D     ; index = 133
        DB      12D     ; index = 134
        DB      13D     ; index = 135
        DB      14D     ; index = 136

TRESULT::               ; Result[code] (meaning of MainTable entries)
        ; code = 0 (Parameter range error)
        DB      ERROR$$,READY   ; Action, Nextstate
        ; code = 1 (Default return value)
        DB      ERROR$$,SAME_S$$        ; Action, Nextstate
        ; code = 2
        DB      DFDOTR,SAME_S$$ ; Action, Nextstate
        ; code = 3
        DB      CALC$$,CALCST   ; Action, Nextstate
        ; code = 4
        DB      PHONE$$,PHONEST ; Action, Nextstate
        ; code = 5
        DB      PREDL,TRANST    ; Action, Nextstate
        ; code = 6
        DB      RECALL,READY    ; Action, Nextstate
        ; code = 7
        DB      POSTDL,TRANST   ; Action, Nextstate
        ; code = 8
        DB      STORE,READY     ; Action, Nextstate
        ; code = 9
```

```
DB      REDIAL00,PHONEST        ; Action, Nextstate
        ; code = 10
DB      RIGHT00,SAME_S00        ; Action, Nextstate
        ; code = 11
DB      LEFT00,SAME_S00 ; Action, Nextstate
        ; code = 12
DB      ABORT00,SAME_S00        ; Action, Nextstate
        ; code = 13
DB      NOTHIN00,SAME_S00       ; Action, Nextstate
        ; code = 14
DB      CHKUSET00,SAME_S00      ; Action, Nextstate
        ; code = 15
DB      EKEY00,SAME_S00 ; Action, Nextstate
        ; code = 16
DB      SCARDI00,SAME_S00       ; Action, Nextstate
        ; code = 17
DB      ETIMEO00,SAME_S00       ; Action, Nextstate
        ; code = 18
DB      EMODEM00,SAME_S00       ; Action, Nextstate
        ; code = 19
DB      ETELCO00,SAME_S00       ; Action, Nextstate
        ; code = 20
DB      SPININ00,SAME_S00       ; Action, Nextstate
        ; code = 21
DB      BUILDN00,SAME_S00       ; Action, Nextstate
        ; code = 22
DB      OPERAT00,SAME_S00       ; Action, Nextstate
        ; code = 23
DB      ABORT00,READY   ; Action, Nextstate
        ; code = 24
DB      CLEAR00,SAME_S00        ; Action, Nextstate
        ; code = 25
DB      SETDEC00,SAME_S00       ; Action, Nextstate
        ; code = 26
DB      RSDOWN00,SAME_S00       ; Action, Nextstate
        ; code = 27
DB      DIALDI00,SAME_S00       ; Action, Nextstate
        ; code = 28
DB      LONGFL00,SAME_S00       ; Action, Nextstate
        ; code = 29
DB      DOMEMD00,MEMDIAL        ; Action, Nextstate
        ; code = 30
DB      LOADON00,SAME_S00       ; Action, Nextstate
        ; code = 31
DB      GETFIR00,MEM2   ; Action, Nextstate
        ; code = 32
DB      LONGFL00,PHONEST        ; Action, Nextstate
        ; code = 33
DB      DOMEMD00,SAME_S00       ; Action, Nextstate
        ; code = 34
DB      GET2DI00,PHONEST        ; Action, Nextstate
        ; code = 35
DB      DOTRAN,SAME_S00 ; Action, Nextstate
        ; code = 36
DB      MULTR,SAME_S00  ; Action, Nextstate
        ; code = 37
DB      REDIAL00,SAME_S00       ; Action, Nextstate
```

```
RECBUF::
.dephase
.phase 0E7FFH - 1141
TRANSM:: ds 192
RECEIV:: ds 128
DESTR::  ds 50
INTBUF:: ds 50
INT2BU:: ds 170
INT3BU:: ds 35
SUPBUF:: ds 1
ANTSAV:: ds 17
BRKTBL:: ds 32
MATHBU:: ds 16
USER1B:: ds 120
USER2B:: ds 1
USER3B:: ds 1
USER4B:: ds 64
TMP1BU:: ds 128
TMP2BU:: ds 128
.dephase
.phase 0E7FFH-1141-46
ZAPVARPART:
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
ds 2
.dephase
.phase 0E7FFH-1187-270
ZSTACK:: ds 270
STACKSIZE equ 90
```

TABLE XXXII

Downloadable Object Code for Generic Terminal Application Program

TABLE

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

:200000000B3230315646493236353 09F82808AE3C04AE400CAE432FCE4322EE5AAD8E52385
:20002000FBE501FCE5110DE6202DE6103DE680BDE601BEE601BFE640FFE6807FE7809E827B
:20004000010101 0F000000001C1B151307F39A169BAD9B08870191 0D5F91175CE3F892F331
:200060009A0000005A004EE217180000000000000007A9291911092F09200000279911BF9BB
:200080009B4E4F000000000000130201FF000000011200 02FF0000000211000 3FF000000EA
:2000A00003100004FF000000040F0105FF000000050E0206FF000000060D0007FF000000DF
:2000C000070C0008FF000000080B020BFF000000090A000CFF0000000A09020DFF000000A8
:2000E0000B08000EFF0000000C070010FF0000000D060011FF0000000E050112FF00000076
:200100000F040113FF00000010030117FF00000011020118FF000000120100 1BFF00000136
:2001200000080009FF00000101070 00AFF00000102060 00FFF00000103050014FF00000169
:2001400004040015FF00000105030016FF00000106020019FF00000107010 01AFF0000A87A
:20016000 86D58608879F86A7869A86DF86018205879C860687EE86ED86FC9BFF8F00E04E90
:20018000E2FA98C4986E9AD6987A9A1799E898A29801001300839202010100959203010142
:2001A00000959204010100959205010200 8C92060109008392070109009592080109 00CB8B
:2001C000 0920B0109009E920C010900C2920E010900C2920D0109009E9210010900CB9211A3
:2001E0000010900B0921201080 0D4921301080 0D4921501010000001601010000017010861
:200200000 0B9921801100 0A7921B0101009592FF0100130301020101030103010103 0104C1
:200220000101030105010203010601090301070109030108010903010B01090301 0C01093E
:20024000030 10D010903010E01090301100109030111010903011201080301130108 0301E7
:20026000015010101011601010101170108030110011003011B01010301FFBE3901320000B0
:200280000000000E2390020000000000BE39000A000000000BE390001000000000BE3933
:2002A00001180000000000BE390010000000000063A00010100080001BE3900190000 00C3
:2002C00000000063A000100000500010 63A00010100080001BE39000C00000000 00BE390092
:2002E0000180000000003D390010000000000FF0105FFFFFFFFFFFFC01F5100C01F6B00E7
:20030000C01F2D020300 80005F006201004F16014F15032A2D0853454E44494E47C0410154
:200320000002045211701790 5D110C45932A2D104E4F2052455350204652204 84F5354591E
:20034000 0640001C4930E0C0002A793700E0C00002D930E0C000689930E0C05158F930E168B
:2003600000023932A241577932D0A52455345 4E44494E47011D932D0E544F4F204D414EAA
:2003800059204552525301C4934F16000123930E0C050423932A2D0D484F535420474156BB
:2003A0004520555001C4932A2D0A52454345495649 4E474A035E941103BE9301C49360047E
:2003C000066200002E63FF47004F02014F0A0C4F06106903 99946904AE9414031794140 4A0
:2003E000E59373DA931004050000179414031794 0E080500F99373EC9369070A931403174B
:200400009414070894 73FD93100705000017944708 4F0E0173EC936B036B0407F89200 5961
:20042000064000E0000016C942405459 4530F0E52455452594E4720484F5354A0078D943D
:2004400010F01D2934F00014F05034F02064F0A0E4F0608843E0D03061501 06026C94C4AA
:200460001D02070280C037020100020624058C94530F115245545259 4E4720414C54204882
:20048000 4F5354A0078D94010F01D293400E01000097942AB02D015F0157200E800000A49D
:2004A00094739B94710E800500A49457002E620100900 76D9801016501530F084449414C5A
:2004C000494E47A0078D94010F943E02030FD01E0FD6940106980FDC9473D694075298012C
:2004E000B80B0E800000AC97943E0A030F1E090F010E0900002A980E09000160960E090045
:200500002D7960E0900037F950E0900040D960E090005189501 2A985996006004485932CE
:2005200006004485932006004485932006004485932004F143C5DDC050C3F9501D4970EDF
:20054000 0C003D50955211C8002414949773369570943E06030F1E140F01843E12140FC04E
:2005600004101000F0460042C843E13140FC04101000F0460042C60042C60040D012A9852E3
:2005800011F401905D110C8C95019695700E0C003F969573839559640060040D5932006066
:2005A000042E5932006004 0D4F137852 11DC05905D110CB89501C695700E0C003AC69524F9
:2005C00013949773AF956104075345543 23A30591400600 40D4F13785211E803905D110C22
:2005E000E59501F395700E0C003AF3952413949773DC95943E06030F1E130F01843E121354
:20060000FC04101000F0460040D012A985996006004 0D59320060040D59320060040D59D1
:2006200032004F143C5DE8030C2E9601D497700E0C004040965211C8002414949773259609
:20064000943E06030F1E140F016004436004208 43E12140FC04101000F0460040D012A9803
:200660005996004F14FA5DD0070C6F9601D497700E0C000D81965211C800241494977366 68
:20068000966004595932004F14FA5211E803905D110C979601D497700E0C003AA9965211C8
:2006A000C80024149497738E96943E06030F1E140F01843E12140F600408C04101000F04D4
:2006C00060043B843E13140FC04101000F0460043B60040D012A9859C80060040D4F141E88
:2006E0005DD0070CE99601D497700E0C003AFB9652 11C80024149497773E096943E06030F19
:200700001E140F01843E12140F600427C04101000F0460040D4F143C5DDC050C219701ED00
:20072000977 00E0C000548980E0C003F39975211C8002414949773189752 11E803905D118E
:20074000C469701BF97700E0C002A66970E0C002D7B970E0C002094970E0C003F94975214
:2007600011C800733D97620100530F0D4E4554574F524B2042555359012198620200530F7A
:20078000114 84F535420434F4D50545220425553590121986202 00530F104E4554574F5243
:2007A0004B2050524F424C454D012198620200530F0B4E4F20434152524945520121986251
:2007C000 0200530F0D4C4F5354204341525249455201219862020 0530F114E4F2052455306
:2007E000502F46204E455457524B012198620200530F114E4F20454E512046524F4D20484B
:200800004F5354012198620200 4F0501530F104E4F2050484F4E45204E554D424552012 18B
:20082000 98A0078D94010F014D984F143C5211B80B905D110C3A9801ED97700E0C00054865
:20084000982414ED977310977062000 02E335964002E6401B0670157607111206498196AAF
:20086000980159980E800000599B705F01189D98A00E0100008A982A2D11574149542D4C6B
:20088000494E4520494E20555345480BC03C0B9080060B0064000B90590B016D9859C800B3
:2008A0005F012A2D10564649205A4F4E205A32362E352020C04C014712075D9A02C800437F
:2008C000002F07404F88012A2D095052452D4449414C4F86002E4F88002A2D0A504F5354BB
:2008E0002D4449414C01D2984F86022A2D0C4D554C54492D5452414E532E908005851030C4
:200900003843E07030A1E040A0147860E0405001E994288011E99908005851030 0347127C
:20092000470847 0E4F05036901E79A0E8800003 5996902C5936905DD991405409977339 98F
:200940000E880 0014A996902C593690581990E0E05005799734E996B05470E07C399000E31
:20096000860000 0996B0169058F99722000690 1E79A6905DD9914057D99737699014E99DC
:20098000405702110 28A997383997033738399570211029899 7391997 00E850023B5990E0B
:2009A00085003DBA990E850089BF990E850083C099337391992F037391992F047391994090
:2009C00057002E5C1601033D040390800504100204D01D0400032A2B0200035F0047018430
:2009E0003E11030A1E040A010E040000369A843E1704021501020049 9A5302020 28 40B0BBF
:200A0000 03023D07029080050710020790300402002A2D0B50524F4345535349 4E470A0225
:200A200003C0070202005C150102C03A1601014F08014F01012E2A2D104E4F204354524C32
:200A40002053545220535043402A2D114E4F20434F4E54524F4C205354524E4740B06701EB
:200A6000B0570211436A9A73639A57005F026901E79A6902EF9A7204002E70C011849AA06B
:200A80002D19112E6901E79A0E120500C39A336902CD9A720400C01B010400075A4F4E56B5
:200AA0004631C19A2A2D0F57524F4E4720504153535 74F524433075D9A0296004300018F42
:200AC0009A42126902EB9A7204002F07402A2D0F454E5445522050415353574F5244C044D1
:200AE000E6924F8101322EC003D33FC003D63FC003D93FF7F329A700FFFFFFFF019FC7C7E1
:200B0000A700A7D3E9A400230048A400A7C349A400F7F329A700249B399B5A9B6F9B819B59
:200B2000899B989B0202020304050202020607020202020 8090A0B0C0D0E0F0F0F0F0F0F0F7D
:200B40000F0F0F0F0F0F0F0F0F0F0F0F0F0F0F0F0F0F0F0F0F0F0F1011121314151515161 7157F
:200B60001515161515151616181519161617 0D1A1B1B1B1C1B1B1B1D1B1B1B1E1B1B1B170D71
:200B80001A1F1F20211F170D1A222222202222222222222122170D1A2323230304242323B2
:200BA00023062423232308250B0A0C0D0E000000FF80FF08020D03810682008306840 00563
:200BC0000304FF03FF01FF02FF07FF32FF33FF36FF35FF34FF37FF0AFF0BFF01000CFF09A9
:200BE000FF0EFF0FFF12FF100411FF1305120310FF140385FF86FF05FF435300000000 00B0
:200C00000000000000000000000000000000000000000000000000000000000000000000D4
:200C20000000000000000000000000000000000000000000000000000000000000000000B4
:200C4000000000000000000000000000000000000000000000000000000000000000000094
:200C6000000000000000000000000000000000000000000000000000000000000000000074
:200C8000000000000000000000000000000000000000000000000000000000000000000054
:200CA000000000000000000000000000000000000000000000000000000000000000000034
:200CC000000000000000000000000000000000000000000000000000000000000000000014
:200CE0000000000000000000000000000000000000000000000000000000000000000000F4
:200D00000000000000000000000000000000000000000000000000000000000000000000D3
:200D20000000000000000000000000000000000000000000000000000000000000000000B3
:200D4000000000000000000000000000000000000000000000000000000000000000000093
:200D6000000000000000000000000000000000000000000000000000000000000000000073

```
:200D80000000000000000000000000000000000000000000000000000000000000000000053
:200DA0000000000000000000000000000000000000000000000000000000000000000000033
:200DC0000000000000000000000000000000000000000000000000000000000000000000013
:200DE00000000000000000000000000000000000000000000000000000000000000000000F3
:200E000000000000000000000000000000000000000000000000000000000000000000000D2
:200E200000000000000000000000000000000000000000000000000000000000000000000B2
:200E40000000000000000000000000000000000000000000000000000000000000000000092
:200E60000000000000000000000000000000000000000000000000000000000000000000072
:200E80000000000000000000000000000000000000000000000000000000000000000000052
:200EA0000000000000000000000000000000000000000000000000000000000000000000032
:200EC0000000000000000000000000000000000000000000000000000000000000000000012
:200EE00000000000000000000000000000000000000000000000000000000000000000000F2
:200F000000000000000000000000000000000000000000000000000000000000000000000D1
:200F200000000000000000000000000000000000000000000000000000000000000000000B1
:200F40000000000000000000000000000000000000000000000000000000000000000000091
:200F60000000000000000000000000000000000000000000000000000000000000000000071
:200F80000000000000000000000000000000000000000000000000000000000000000000051
:200FA0000000000000000000000000000000000000000000000000000000000000000000031
:200FC0000000000000000000000000000000000000000000000000000000000000000000011
:200FE00000000000000000000000000000000000000000000000000000000000000000000F1
:2010000000000000000000000000000000000000000000000000000000000000000000000D0
:2010200000000000000000000000000000000000000000000000000000000000000000000B0
:20104000000000000000000000000000000000000000000000000000000000000000000090
:20106000000000000000000000000000000000000000000000000000000000000000000070
:20108000000000000000000000000000000000000000000000000000000000000000000050
:2010A000000000000000000000000000000000000000000000000000000000000000000030
:2010C000000000000000000000000000000000000000000000000000000000000000000010
:2010E0000000000000000000000000000000000000000000000000000000000000000000F0
:2011000000000000000000000000000000000000000000000000000000000000000000000CF
:2011200000000000000000000000000000000000000000000000000000000000000000000AF
:20114000000000000000000000000000000000000000000000000000000000000000000008F
:20116000000000000000000000000000000000000000000000000000000000000000000006F
:20118000000000000000000000000000000000000000000000000000000000000000000004F
:0C11A00000000000000000000000000043
:00000001FF
:20118000000000000000000000000000000000000000000000000000000000000000000004F
:0C11A00000000000000000
```

| | | | |
|---|---|---|---|
| 0000 ERROR | 00FF SAME_S | 0008 CALC | 000D PHONE |
| 0005 REDIAL | 0004 RIGHT | 0003 LEFT | 0001 ABORT |
| 0002 NOTHIN | 0007 CHOOSE | 0032 ZKEY | 0033 ZCARDI |
| 0036 ZTIMEO | 0035 ZMODEM | 0034 ZTELCO | 0037 ZPININ |
| 000A BUILDN | 000B OPERAT | 000C CLEAR | 0009 SETDEC |
| 000E MSDOWN | 000F DIALDI | 0012 LONGFL | 0010 DOMEMD |
| 0011 LOADON | 0013 GETFIR | 0014 GET2DI | 98FA _DFDOT |
| 9917 _DOTRA | 98A2 _INIT | 98E8 _MULTR | 98D6 _POSTD |
| 98C4 _PREDL | 9A6E _RECAL | 9A7A _STORE | 9023 AAMTSA |
| 904D ABITMA | 9026 ABRNTB | 907F ACKVBY | 9014 ADESTR |
| 9073 APDESC | 9071 AINPAT | 900B AINPUT | 903E AINSRC |
| 901A AINT2B | 901D AINT3B | 9017 AINTBU | 39BE ALPHAN |
| 9029 AMATHB | E5FC AMTSAV | 9077 APASTB | 9000 APPBGN |
| 907C APRTAD | 906F APRTTB | 9011 ARECEI | 9075 ASDT |
| 9020 ASUPBU | 904F ATABLP | 9038 ATMP1B | 903B ATMP2B |
| 900E ATRANS | 9051 ATRESU | 902C AUSER1 | 902F AUSER2 |
| 9032 AUSER3 | 9035 AUSER4 | 9079 AUSRCS | 905B AZAPPV |
| 905D AZBEGI | 905F AZEND | 9055 AZENTR | 9066 AZSTAC |
| 9058 AZVARI | 9BFB BEGBUF | 9AF3 BITMAP | E60D BRNTBL |
| 900B BUFTBL | 86A8 CDSTAT | 9081 CKFBYT | 98F9 CKVBYT |
| 86D5 CLS_ | 906B DEFACC | 9064 DEFCSI | 906D DEFERR |
| 906A DEFPAS | 9069 DEFPRM | 906C DEFSEQ | 906E DEFSYS |
| E4CA DESTR | 8708 DNLTYP | 0BFB ENDCOD | 9BFB ENDZAP |
| 869F ERRCOD | 9191 FDESC | 9084 FDTFLG | 86A7 HSETUP |
| 927A INPATT | 829F INPUT | 829E INSRCE | E52E INT2BU |
| E5D8 INT3BU | E4FC INTBUF | 3A06 INTEGE | 3FD3 JCKHAN |
| 3FD9 JDORCL | 3FD6 JDOSTR | 9048 KEYALP | 904B KEYBAC |
| 904A KEYENT | 9049 KEYHAN | E62D MATHBU | 907E MAXFIL |
| 869A MCHAR | 1119 MEMLKE | 9083 MEMTST | 9824 MNTABL |
| 86DF MULTI_ | 904C NSTATE | 907B NUMPAR | 8281 OUTST_ |
| 9087 PARMEM | 92F0 PASTBL | 9A5D PPAUSE | 8705 PREDIA |
| 393D PW_EDI | 869C RAMCHA | E44A RECEIV | 8706 RECNUM |
| 0000 ROMA00 | 007F ROMACK | 9210 SDT | E5FB SUPBUF |
| 9B16 TABLPT | 39E2 TELEND | E6FF TMP1BU | E77F TMP2BU |
| 86EE TRANCO | E30A TRANSM | 9BAD TRESUL | 86ED TRNREC |
| 957F UNINET | E63D USER1B | E6BD USER2B | E6BE USER3B |
| E6BF USER4B | 9041 VCARD | 9043 VMEMOR | 9040 VMODEM |
| 9042 VPRINT | 9054 ZAPDAP | E35C ZAPVAR | 92F8 ZBEGIN |
| 9000 ZDNLID | 9AF3 ZEND | 9181 ZENTRY | 9040 ZHARDT |
| 905A ZMAPPV | 9053 ZNENTR | 9057 ZNVARS | E24E ZSTACK |
| 9064 ZSTKSI | 915F ZVARIA | 86A4 ACTION | 8587 ACTIVE |
| 3994 ALPHA_ | 3B6D AMOUNT | 8703 APPTIM | 8589 BACKGR |
| 838F BELFLG | 8320 BUFFRC | 8340 BUFPRC | 86EA CARDRE |
| 86FF CARDTR | 87A9 CHKVBY | 3C11 CKHANG | 8605 CLS |
| 86E0 CONSPC | 86E3 CSDEV_ | 86E4 CSPTR_ | 86F5 CURACC |
| 86F2 CURCSI | 86F7 CURERR | 86F9 CURFIL | 86FB CURMOD |
| 8595 CURPAR | 86F4 CURPAS | 86F3 CURPRM | 86FA CURREC |
| 8597 CURRIP | 858D CURRJO | 86A1 CURRST | 86F6 CURSEQ |
| 86F8 CURSYS | 8596 CURVPA | 7131 C_CHKH | 792C DATA7 |
| 7935 DATA8 | 38FA DECAMT | 8282 DECHIT | 8608 DECIMA |
| 86E6 DESTPT | 859B DEVICE | 86CC DE_CTE | 86D8 DE_ENT |
| 86CF DE_LEN | 86D2 DE_MAX | 86D0 DE_MIN | 86D9 DE_VAL |
| 8381 DLSTAT | 3C26 DORCL | 3C3F DOSTR | 8769 DSPCAR |
| 86EB DSP_RN | 8382 DTTERM | 7A17 FRHHEE | 8707 FILE_S |

```
86E9 FILL_C    875D FIRST_    38B5 FMTAMT    86A3 GOTOST
8387 NIBIT     8389 NSTV1_    838A NSTV2_    838B NSTV3_
869B INCHAR    828A INPDEV    869D INPTIM    829F INPUT$
86A5 INPUTL    829F INPUT_    858F IP 85A2 JOB_
3B16 MAPCHA    86CE MAP_MI    869A MCHAR_    86A6 MEMBAD
8386 MODEMS    86A2 NEXTST    8760 NMSEQN    86DE NOFS_
39AD NUM_ED    8593 OPCODE    859F OPMISC    8594 OPSET
85A0 OPSTAT    8769 PAKPRO    865E PARM_     8775 PINCLR
8771 PINCNT    8770 PINDTA    8774 PINERR    876E PINFLG
8772 PINMAX    8773 PINRTC    876F PINWT     8591 PREVIP
86FC PRNOHA    86FD PSERIA    86CA PTELCH    8388 R232ST
8585 REALTI    1366 RECALM    86D4 REQ_DE    859C RETCOD
8390 RGFQ1     8391 RGFQ2     8392 RGPER     8393 RINGTB
838D RNGCNT    838C RNGFLG    1381 SECVIO    86E8 SKPNUM
859E STKHEA    1374 STOREM    86A9 TELLMU    8380 TEST_
8382 TIMER_    86EC TRNUMB    818C U2OUTB    39EB USREDI
8652 VPARM_    8701 WAKEME    86E1 WCCPNT    86F1 WRKVBL
8E6F X8800     858B XTIMER    8700 XT_MOD    875E XT_VAL
8384 ZTIMER    29A8 ZTKINP    8585 Z_ 0008 CALCON
000D PHONEO    0015 RECALL    0014 R_GET2    0017 STORE
0017 STOREO    0006 UNPGMD    0006 UNPGME

MER     29A8 ZTKINP     8585 Z_ 00
```

```
"0502VF12650"
"0100288"
"01019-18003363846"
"01029-5269753"
"01038-4-062-7036918200"
"01049-18003254154"
"01058-4-062-6144572105"
"01068-4-062-8167657315"
"01079-18005543363"
"01088-4-062-2135870030"
"01099-5248110"
"0B014.42129312830344OO"
"0B028.TCK.1256."
"0B03PM.TXSLK*J8M.85TXSO"
"0B044.14991234569"
"0B058.4443003426111086"
"0B068.4016002028134400"
"0B074.0892000000009999"
"0B08KCM5GUOTXSOTXSOTXSO"
"0B094.0892000000009999"
"0C010"
"0C020"
"0C031"
"0C040"
"0C052"
"0C060"
"0C070"
"0C081"
"0C093"
"11011"
"11022"
"11031"
"11041"
"11051"
"11061"
"11074"
"11085"
"11094"
"10031"
"10052"
"10081"
"10093"
"1701QA5B1C1,4,6"
"1702QF6R28R28C1,4,6"
"1703QH1G1I1J1C1,4,6"
"1704QA5B1C1,4,6R35K1"
"1705QF6G1C1,4,6"
"1801ENTER ACCOUNT NO."
"1802ENTER EXP. DATE"
"1803ENTER AMOUNT"
"1804ENTER ACCOUNT #"
"1805ENTER EXPIR DATE"
"1806TCK ID# OR CARD"
"1807ENTER STATE CODE"
```

```
"1008ENTER LICENSE NO."
"1009ENTER CHECK NO."
"180ABIRTHDATE MMDDYY"
"180BENTER TRAN CODE"
"12011TSDUPCODE"
"120281"
"120340407 9"
"1204NAME 04"
"1205NAME 05"
"1206NAME 06"
"1207NAME 07"
"1208NAME 08"
"1301UPCORETRAN"
"1302PASS 02"
"1303PASS 03"
"1304PASS 04"
"1305PASS 05"
"1306PASS 06"
"1307PASS 07"
"1308PASS 08"
```

TABLE XXXIII

Object Code of Program Components Stored in ROM in Local Terminal

TABLE

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
:20000000F33E03D37397016F0E110180626F77EDB031DC8311C800CD4D420107FFCD3342CC
:2000200010E81CD3342010F00CD3342CDBF47ED5E2100027CED4721F3C9227D872108017E
:20004000046235E2356EB131ACD855CEB10F3214801CDC800216301CDC80021D100CDAA002A
:200060097D3B03E40D3B1CDB50011578A3A060112133AFB001221458A3E8177233E007745
:2000800003E0F06B0CD21423EB032878C3E0132EA8D32F18D2190833E6477233E9677233E46
:2000A00002773E7F328783C3C8594E23793CC84623EDB318F521498A0EE2CDBF000EE3ED98
:2000C000A23E01ED79EDA2C95E2356234E23EDB0C970030708107102072072010173028714
:2000E00099B205CFCF1897B0B305CFBD1A9743E30B18044C011F0200036105EAE2091804A9
:2001000047011303600520FF150080080C8008180082480305880106C8010808010948050
:2001200030C880C08C8140D0816B3F82348A82102488042488042C880440880464880 46435
:2001400008840E8880600881020831800002488000024880002C880000408800006488004E
:200160000000000608C1700000000FF00000100E80328003C00006400960002001900000018
:200180000000089498949000000000000000001010800808 24C294D010000000000000010108E2
:2001A00008808C4C8949010000000000000010108 00FF9B4C964C060000000000000F0F0084C
:2001C0000007A74CAF4C010100000000000010120000FB24C1C4D0B0000000000000001011073
:2001E0000020B24C1C4D1B000000000000000000000000000000000007B5A50323032A4
:20020000ED4ED2481A4EB948C44E2448E44DA248C147C14742523E49C447D1472843292085
:200220003139383520566572692D466F6E652C20496E632E29E429E429E4249408C409E4213
:20024000B0413D4280429E429E429E429E429E429E429E429E429E429E429E429E429E420C
:200260009E429E429E429E429E429E429E42A142A142A142A142A142A142A142A142A14266
:20028000A142A142A442FF43054408440B440E449644F0441C454B454B454B454B454B45FB
:2002A0004B454B454B454B454B454B454B454B454B454B454B454B454B454B454B453E
:2002C0005D475D475D475D475D475D475D475D475D474E4503464C465746662466884635
:2002E000A1465D47C8465D475D475D475D475D475D475D475D475D475D475D475D475D4711
:200300005D475D475D47CE46DC4616474D475D475D475D475D475D475D475D475D4706
:200320005D475D475D475D475D475D475D475D475D475D47014303000001630300000015353
:200340000300000307F8F800000A080800000432320000030 7F8F800000A08080000049670
:2003600096000000 10A000000000607F8F800000496960000BEEEE00000C020200000D00AB
:200380000000000A101000009A03048B6A8A0F000A0000006A8AF003DC832E5CFA830000AD
:2003A000000001D50228400000000A25144840000000ED516C8400000001C528A840000C5
:2003C0000000D7538A84000000000DB54A8840000000001556DF840000000F00384850000C0
:2003E0000000F657848500000000000060470000CD707E00002101007D32A98621081122E9
:20040000CA8621F90122FD86214100 7D32088721FFFF7D32818221DE3A22DC8621FE10E58A
:20042000CD1F7FD1CA2F04215311E5CD3A7FD1CD3907CA7B04CD630DC24104CD8A73C26834
:2004400004CD8A73CA04D421191 1C35004212811E5CD5E7AD1219001E5CD425DD121361160
:20046000E5CD3A7FD1C37B04214411E5CD5E7AD1CD770D21C800E5CD425DD1CD8808CD1562
:2004800038216611E5CD5E7AD121C800E5CD425DD1CDF00BCD7A083A54906F26007CB5CA61
:2004A000B304CD55363A54906F2600E5CD7505D1C3B604CD6F08CDEA3521FFFF7D32A586D7
:2004C000CD6A0CCAC904CD420A3AA5866F26007CB5CA5C0521A286E521A486E53A9B866FAB
:2004E00026002BE53AA1866F2600E5CD417FEB21080039F93AA4866F2600118000EBCDA82E
:200500007ECA1A05210000E5CD590CD1CA1A05219111E5CDC10CD1C35C053AA4866F260052
:20052000118000EBCDC37ECA51053AA4866F2600E5CDBE08D13AA2866F260011FF00CD9A61
:200540007ECA4E053AA2866F26007D32A186C35C053AA4866F2600E5CD7505D1210000E513
:200560002A3E90D173CD870CCA7105CD1E0AC36505C3B604C9CD707E000021080039 5E2399
:20058000562180FF19444D3A53906F2600E56069D1EBCDC47EC2A4056069110000EBCDC3D0
:2005A0007ECAA80521FFFFC93AA2866F26007D32A386E521FF00D1CD8D7ECAC7053AA186EA
:2005C0006F26007D32A3862101007D32A2867D32A186210000E5606929EB2A5590195E2353
:2005E00056D5210000E5CDED05D1D1D1C9CD707E0000210800395E2356D5CD590CD1CA0D2C
:20060000621911 1E5CDC10CD121FFFFC9210800395E2356D5CDDF0BD1210A00395E235608
:20062000D5210A00395E2356210B00CDDD7E11A28519D1732372210800395E2356D5218776
:2006400085E5CDC179D1D1210C00395E1600210100CD677ECA6806210800395E2356D52172
:2006600089 85E5CDC179D1D1210C00395E1600210200CD677ECA8906210800395E2356D5C8
:20068000218585E5CDC179D1D1210000C9CD707EFEFF210A00395E1600424B78B1C2AE06FB
:2006A000211000EB21040039732372C3B906606923EB21040039732372C3C206606923443E
:2006C0004D2B6069EB210400397E23666FCDC37ECA1307C5CD540CD1CAF306210C00395EDE
:2006E0001600210100CD677ECAF006C5CD190CD1C31Q07210C00395E1600210200CD677E3F
:20070000CA1007C5CD590CD1CA1007C5CD190CD1C3BC06210A00395E16007AB3C22507CD82
:20072000A829CD0D0C210C00395E1600210400CD677ECA3807CD5536C9CD707E00002A81C1
:20074000901 14E4FCD8D7ECA5D072A7F905E2356214353CD8D7ECA5D07210000C92A819063
:2007600011C3C3CD177FE5210200E5218090E5210090E5CD8379D1D1D1D1CD9A7ECA84079F
:2007800021FFFFC92A7F905E235621C3C3CD177FE5210200E52A7F902BE5218790E5CD83B4
:2007A00079D1D1D1D1CD9A7ECAAF0721FFFFC9210000C9CD707E00003A0D906F2600E52A0F
:2007C000B90E5210E00395E1600D5210E00395E1600D5211E00E5CDA95DEB210A0039F9F8
:2007E000EB229F867CB5CAF5072A9F86110200CD8D7ECAF607C92A9F86E5CDF337D1C9CD74
:20080000707E000021080039 4E234660695E1600210100CDA97ECA2208217911E5CD5E7A55
:20082000D1C921C800E5CD425DD12102007D3281 8360695E1600EB28E5606923E5215000C3
:20084000E5CD1A40D1D1D1CD3E5DC92A0B90E53603233A9A867723363ACD5E7AE1233A5D3E
:2008600087D6305F8787838786D630320687C9AF329C86CD3171CD5536C9CD3E10CDD10B09
:2008800021A28511A385360001AF00EDB03A689032F2863A699032F3863A6A9032F4863A80
:2008A0006B9032F5863A6C9032F6863A6D9032F7863A6E9032F886C93EFF32088CC9CD7089
:2008C0007E000021080 0395E1600EBC39709CD177AC9CD6F08C93A03876F26007CB5CAF4FA
:2008E000083A03876F26002B7D3203877CB5C2F408CD2F37C9218612E5CD5E7AD1CD177AD6
:20090000C9211000E5212E00E5CD1A40D1D1C921F0FFE5212E00E5CD1A40D1D1C9CDF9654C
:20092000C9CD2C66C9CD6166C9CD8766C9CDFE67C9CD3171C9CD6571C9CD0037C24209CD39
:200940008471C9CDAE71C9CD2F37CD9370C9CDBE71C9CD0037C25B09CDD171C93AA0826FC6
:200960002600110200CD8D7ECA6E09CD6F08C93A9B866F2600E5CD163BD17D325D87CDA054
:2009800007AC9CD3A37C9C9CD177AC9219712E5CD5E7AD1CD5536C911000019EB21C8FF19C1
:2009A000DA8B0921AD0919195E2356EBE9CE08D208D60801090F095209F50831091D09218C
:2009C000092509290 92D0935095C093909430947094E096F0982098B098B098B098B098BC2
:2009E000098B098B098B098B098B098B098B098B098B098B098B098B098B098B098B098BB7
:200A0000098B098B098B098B098B098B098B098B098709870986098609860987 09C9C52121
:200A2000 01004C44ED5B87857DA320047CA2280CE5C5CD670ACD7A0CE1E120040C2930E4D1
:200A4000C1C9C52101004C44ED5B87857DA320047CA2280DE5C5CD670AE1E13AA586B728BC
:200A6000040C2930E3C1C9E1D1D5E5C5DDE57B328D85FE10D2660BCD7D0B119785010B000F
:200A8000EDB0AF328E85CD890BCA620B2A9785EB2A5D902BED523008 2A5F90ED52D2B00A5F
:200AA00021103CED52D26B0B21CE3CED52DA6B0BEBCDBB0B0152867E07302E07F53A9485FF
:200AC0008F329485F1B7E5215B86ED42E1DA750B0707F5E6030203F10707F5E6030203F17F
:200AE0000707E603020 32318CE0F3293855F23228F85AF47573A9485FE04D2700B4F2193EE
:200B000013090909 4E2346237E3DBB3863EB292909 5E235623EB015E86D5AFCD6F7EE1206D
:200B2000545E2356EBDD215E86CD6F7E2A9785229185 2A8F852297853A8E85B7CA8F0A3A68
:200B40008D855F1600CD7D0BEB219785010B00ED803A8E85D6FF200A573A8D855FD5CDD028
:200B60010D1DDE1C1C911A211180D11B311180811C411180311D511CDC50C18E5626B29E5
:200B80002919291911A28519C93A9B85B728295F2A3E907EB720103E80A3C07BE640C8CD42
:200BA000CD29F2B60B1811477 8E63FC8053E0128031710FDA3C9AFC9F6FFC9C5E5010300D1
:200BC00119485CD040C0E0C115286CD040CE1C1C9C5E5011D00118585CD040CE1C1C9E1B7
:200BE000D1D5E5C5CD7D0BEB010B00CD040CC1C9C5E5210B903E0106115E23562323 1210F7
:200C0000F8E1C1C9AF120B6B6213EDB0C9F53AA38632A18632A286F1C9E1D1D5E5D53A8D92
:200C2000 85BB20073EFF328E851803CDD010218785E5CDE179218585E3CDE179218985E303
:200C4000CDE179E1D1C92A8585F1D1D5F5C54BCD5E0CC1C92A898518F02A878518EB3E109A
:200C60009147AF2910FD678F6FC92A858518082A898518032A87857CB5C92A0A872D2003A7
:200C80002A0188AF67B5C9CD7A0CC2957E18E5C5213212E5CD5E7AE13A93852A0B90360303
:200CA000E523CD907CCD5E7A211900E3CD425DE1C1C911D511180E11F7111809 11E6111843
:200CC0004E1D1D5E5C5D5CDA8293EFF3281822A0B90CD0B0DD1E5D53AF786B728104F06CA
:200CE0001C5CD6621C104E1D1D5E5CD6621212012E5CD5E7AE1CD5E7AE1CD5E7AE1CD7A44
:200D00008CD55363EFF328E85C1C93601ED5B978501 0812CD3F0DE57E4FC6037706000997
:200D20003A9485C63077233A9385CD907C010E12CD570DE1ED5B9185011412CD3F0DC9E526
:200D4000D57E5F1600C6047719D17ACD907C7BCD907CCD570DE1C9D1E1E5D5C5E5CD4C7B74
:200D6000D1D1C92EFF1101A01A673DF3121A3C12FBBC20012C65C9C52A563D110090AFED0D
```

:200D8000523845284323234D4421D73CEDB0C1C53A7B904704C52A7C90E5E1C105C5281BCC
:200DA0005E235623D55E235623E3EBB7ED5228EA4D44626B360113EDB018DFE1CD7B5D3E94
:200DC00001328490C1C3A638C30000CD630FFE04305921D70D187BAA0E500F010FE10ECD62
:200DE000630FFE04304521EB0D1867B70E5A0F0B0FEC0ECD630FFE04303121FF0D1853C432
:200E0000E1F0F010FE10ECD630FFE03301D21130E183F500F010FE10ECD630FFE03300B98
:200E200021250E182D1F0F010FE10E21FFFFB4C9CD630FFE0430F4213C0E1816B70E500F2E
:200E40001F0FF60ECD630FFE0430E0FE032811215A0E19195E2356EBAFE9B70E500F5A0F33
:200E6000CD1F0FC521FBFF095D541313EDA0EDA0C1C9CD630FFE0330B2217E0E18D45A0FEF
:200E8000B0FEC0EC0F1D1D5F53A9585B7289C21FDFF097EEBB7CA1B0FE5F5AFCD6F7E2086
:200EA0005F1E13D18EFF1E11881C0CDA00FEDA0AF12131213181FC0CDA00FEDA0EDA0AFAE
:200EC00012131812C0CDA00F7E1213F5AF12F113121306004F094842228F8521958534185D
:200EE0003ACD870FC0EDA0AF12131826CD870FC0EDA0EDA0181CC0CD750FAF121312131863
:200F000011CD750FEDA0AF12131807CD750FEDA0EDA0AF12134B4221958534AFED62C92AC3
:200F20008F857EB7CA2B0E3DFE0FD22B0E23228F8516005F210B901919195E2356237E695A
:200F40006073237223EBEDA04FAF1213791218C4CDAC0FEDA0AF121318B8CDAC0FEDA0ED49
:200F6000A018AF200E2196855E341600215286195E7BC9E1C92A8F855E235623228F8569C3
:200F80006073237223EBC92A8F855E23228F851600D5C5CD8E10E1D1C05E235623EBAFC933
:200FA0002A8F85EB696073237223EBC92A8F857E231600875F30143A579087BBDA2B0E22A9
:200FC0008F852A5890195E235618103A5A9087BBDA2B0E228F852A5B9019EB696073237 23A
:200FE00023EBC9373EAFED62C1C9C5C521000039E5CD6D10D1C1C2E30F2A6690090909EB9E
:20100000219E857E12711321040039EDA0EDA0C3E50FC53A9E854F0600B0CAE30F2A669046
:20102000090909EB1A329E851321040039 7E23666FEBC5EDA0EDA0CD5710D1C3E50FC50108
:201040001002A6690701806C5CD5710D18C79216490BE30F3C1C9C5210400394E06002A69
:2010600066 90545D090909EB7E1271C1C9C5210400395E23562A66904E0600EB7123707962
:20108000B0CAE30F626B090909EDA0C3E50FC52106003946237EB72007B02004216490BE1F
:2010A000D2E30F3A9E855F160018072A66901919195E7BB2CAE30F10F22A66901919192339
:2010C000E5210600395E2356E1EDA0EDA0C3E50FC5210400395E23566B62191929 29AFED5B
:2010E0005211A985194E4777180E59502A66900909094ED5CD5710D179B020EEC1C90A42FB
:2011000041422030392F383511303132333435363738392A2354502D410F1A4D454D4F5201
:2011200059204C4F434B45440E1A434C454152204D454D4F52590E1A50524F4752414D209C
:20114000474F4E450F1A52454C4F4144494E472052414D101A57524F4E4720544F5020437B
:20116000484950010200131A564649205A41504420322E3032203330520A203C454D5054D7
:20118000593E20081A415045525220065245414459115052455 6204A4F422041435449 5681
:2011A00045201120424144204A4F42204E554D42455220112042414420494E5354522050B6
:2011C0004E5452201120424144204F50434F44452F53455420112042414420504152414D65
:2011E0004554455220201153545249 4E47204F564552464C4F5720114241442053545249A9
:201200004E4720494E444558063D4950202006 3D4F5020200C203D2050524556204950 20C4
:20122000121A5A415044204558454320455 2524F522 0101A4F50204E4F5420505 2474D44D0
:201240002D2D1120424144204 6494C4520414343455353112020494E56414C494420464923
:201260004C4520201120204241442046494C4520435243202011204255464 6455 2204F565D
:20128000455 2464C4F57111A4B4559204E4F542050524F47524D44101A424144205442 4C2C
:2012A0002041435449 4F4E0C1A444941 4C2057484154 3F081A524544494C0A1A4F4646AB
:2012C0002D484F4F4B121A5741495 42D4C494E4520494E20555345091A4449414C494E471B
:2012E0000A1A4D454D2044494C0F1A494E434F4D494E472043414C4C0E1A55502F444F69
:201300005 74E204C4F41440E1A484F535420485 54E4720555 0111A4E4F20434F4D4D2057E0
:201320002F20484F5354111A4E4F2052455350204652 20484F53540E1A494C4C4547414CC6
:2013400020484F53540F1A444E4C2043414E43454C4C4544121A57524F4E4720564552 5374
:201360004E2053 454E540E1A5245434 14C4C2057484154 3F0D1A53544F52452057484154 4F
:201380003F121A4D454D4F52592 0505 24F544543544 5 449F13746F1550AF1600AF1600AF0C
:2013A000163C19B016202AE617012B9217602BFF182B2B72183B1B2019441BC516332A9B9D
:2013C000173C245A17A423DF16CA2315185124FD16C4247817BF1A8617C91AB016D11CBA8A
:2013E000183D1A95177B272417E01A3F17EA1A95178E19BF17D624B0165A1DB016671DB017
:2014000016831CB016C2292D17A91A6017382 66C17B71A0F1773266017532 70F17FE26F844
:20142000179 02DA717992DF318FA2D95176F2F5417091B09171A1BB0162E1F9517553009A7
:201440 0018FB20AF16B827AF16C1271518C4279217D8272C19F027AF16021A92177F1AA722
:2014600017ED31B916952AAF169F31AF16F61DF817A81B6C17131E1E171D1EA117F22EEB83
:20148000168122D116571FF2178E1D0918793139172 31A5A179C231518A61F9B171D30AF5A
:2014A00016F4199217262F51171518061 72F1BAF16BC1F951736309217D82E5117B41A066F
:2014C000017A41A0918D71FD1169223B016882A0819511CA7172320F116242666 17B71A4E90
:2014E000179722F7165F261817A91AE516E923721 7B71A1E17A91AD416E9239217F927AD03
:20150000172D2E05192F1C9B17132FD116F31F1518E31F171918280E195F289217652A0975
:2015200018 6C29E718932905191C1A9217391D9217E11C921718 1D92172C1D0519B62995E5
:20154000173D1995174219921 7AB199217A6193917291E4817311EB917AA2FD916D62FAFB1
:2015600016A829AF16E7190519D419B016ED199B17731E6018812B6018DF2BB016272A03E5
:20158000173C19EB164B22211 8F823B9177D249B1768249B17C01BF918 8B2F9517461D9572
:2015A00017831E35195C225A189A1E1818C41EA117FC1BB016AE1E0F18B31DED18422CF9A4
:2015C000189C30B016B91EAE18A325CF18F6240418E72CC517FB2C6C184C2DCE17242D6630
:2015E000188B12D1518A1272F19AF1CD717CA2A0918E63009182D3192173D1F8418 74337895
:20160000188B334E18543339186 7339F1872349018DF334518D13433173C1E E017491FF2AE
:20162000176D1F7D178B1AC318FC1E3318791F5117D11DAF168D229217C41F4E17D91D92B3
:201640017FA2FB0169731F8171720661 87D20B31751 20EC17EA2F2D18E31FEC17A2305197
:20166000 17021BFE17212ED11697229B1730300818E728271 87A292C19F91D92176E1AB000
:20168000169131921 71A1C9217211C9217131C9217A129091803209217281C921778 1A9264
:2016A00017CA1D9217741D9217A8309217D718C9C3F60ECDF60EC3AA0ECD831611440ED52C
:2016C000CD840ED1C9CD831611300ED5CD840ED1C9C3190ECD190E18F8CDD416C3CB0DCD51
:2016E000190EC3AA0ECD190EC3C40ECD190EC3CB0DCDEB16C3AA0ECDEB16C3B70ECD190E9D
:20170000C3F30DC3AA0EC3720ECD720EC3F60ECD720ECD190EC3CB0DCD720EC3870ECD7244
:20172000 0EC3720ECD1E17CDCB0DC3F60ECD720EC3070ECD720EC3300ECD720EC3CB0DCDC2
:2017400039 17CD870EC3F60ECD720EC3DF0DC3C40EC3070ECD070EC3F60ECD070EC3190E02
:20176000CD5A17C3CB0DCD070EC3AA0ECD070EC3720ECD070EC3070ECD7217181 8CD721778
:20178000CDCB0DC3CB0DCD070ECDCB0DCDAA0EC3F60EC3CB0DCDCB0DC3F60ECDCB0DC319AE
:2017A000 0ECD9B17C3F60ECD9B17C3AA0ECDA717C3CB0DCD9B17C3F30DCD9B17C3CB0DCD8C
:2017C000B917C3F60ECDB917CDAA0EC3F60ECDB917CDF30DC3F60ECDCB0DCDAA0EC3BC1699
:2017E000CDCB0DC3720ECDE017C3F60ECDCB0DC3C40ECDCB0DC3070ECDF217C3190ECDF83A
:20180000 17C3CB0DCDF81718 8CCDCB0DC3CB0DCD0918C3F60ECD0918C3190ECD1518C3F616
:201820000ECD0918C3D416CD1518C3CB0DCD0918C3C40ECD0918C3070ECD3318CD190ECD48
:20184000AA0EC3F60ECD3318CDFD16C3F60ECD3318CD070ECD190EC3F60ECD0918C3951738
:20186000CD0918C39B17CD6018C3190ECD6618C39517CD0918C3F217CD7218CD190ECDAAA0
:201880000EC3F60ECD7218CD070ECD190EC3F60ECD0918CD0918CD070ECD190EC3F60ECD39
:2018A0000918CD0918CD070ECDD416C3F60ECD0918CDCB0DCDF30DC3190ECD0918CDDF0DC8
:2018C000C3F60ECD0918CD2619CD190EC3CB0DCD0918CDF30DCD190EC3F30DCD9B17CDDF1B
:2018E0000DCDE718C3F60ECDCB0DC3F30DCDE718C3F60ECDE718C3190ECDE718C39517CD8F
:20190000E718C3F30DC3DF0DCDDF0DC3F60ECDDF0DCD190EC3F60ECDDF0DCD070EC3F60E00
:20192000CDDF0DCDCB0DCDDF0DC3720EC3F30DCDF30DC3F60ECDF30DCD0F18C9C9010100A1
:201940001803010000216186702B7EE6E0C2B20C7E0F0F0FE602B14F7EE60F77606FE5CD06
:20196000590CD1280A219111E5CDC10CD1180FC52A6386E52A6086E5CDED05D1D1D1C921F7
:2019800061 86AF772B7E3C20043A8D85777EFE10300621FFFFC3770C21D511E5CDC10CD1F0
:2019A000210000C3770C010200180301 0100CD7F19280AC52A6086E5CD8D06D1D1C9CD7F38
:2019C0001928102A6086E5CD590CD120062A6386228F85C92A6086ED5B8785CD677E7CB53F
:2019E000C82A978522 8F853E01328E85C9CD202ACDE719C9210600E5210000E5CD8D06D166
:201A0000D1C93A8D85FE00200521020018032103 00E56F2600E5CD8D06D1D1C92A608622FF
:201A20009C85C9ED4B5E863A6586326086CD7F19C82A6086CD541A60697323 72C9CD7F19EC
:201A4000C82A6086CD541AEBED4B6A86ED5B6586C3F51AC93A8D85BD20052A9C85EBC95411
:201A60005D29291929191 1A785195E2356C93A608632A28632A186C93A608632A386C92A5C
:201A8000608 6E5CDBE08D1229C85C92A6386E52A5E86E52A6F86E52B2A6A86E5CD417FD194
:201AA000D1D1D1C911000018 04ED5B65862A5E867323 72C9AF18033A65862A5E8677C9ED81
:201AC0004B6586ED5B6A861808ED4B6A86ED5B65863A60869 17BED5B6D86CD471EC3A67C9F
:201AE000ED4B6586ED5B6A861808ED4B6A86ED5B65862A6086ED427BED5B6D86CD471EC326

:201B0000A67C2A5E86ED5F77C92A5E8635C02A6386228F85C92A5E8634C9ED5B60861B2A76
:201B20005E867323727BB2C02A6386228F85C9ED5B6086132A5E86732372C9CD4D1B7D2ABE
:201B40006D8677C9CD4D1BEB2A6D8618EA3A6586FE1038040F0F0F0FFE0CD2B20C26006F39
:201B60002911721B195E2356D52A6A86ED5B6086AFC98A1B8C1BDD7E3B7DC47D677E177FFE
:201B8000901B9D1BE57DCC7D557D19C9EBED52C97DB428117BB2280D37ED62B5C97DB4206F
:201BA000F77BB220F3ED62C9ED5B60867B2A6886ED4B6A86B9D2B70C19ED5B6386EDA0C9FF
:201BC0002A63865E341600193A60861717F640CDF11B7022E186C92AE1867DB4C83A608668
:201BE0001717B6CDF11B3A0100B728023E01B077C9473A5F87B7C83E02B047C9ED4B6886D1
:201C00002A6086E52A6386E5CDAB64E1E1C8ED438F85C93A608632F486C93A608632F58602
:201C2000C93A608632F286C93A608632F686C9CD511ECD86293A9B85F640CDFC27CD591E05
:201C4000CDCD29F23D1C3A9B85E6BFCDFC27C3691ECD511ECD86293A9B85F642CDFC27CD06
:201C6000591E2A3E907EFE022808CDCD29FA781C18ED2A6386228F853A9B85E6BDCDFC27B8
:201C8000C3691EED4B5E863A868CB7280B3A8183FE01C8FE02C818123AA786B7200C2155F1
:201CA00000E5CD1A40D17DFE0DC8ED438F85C92A5E86ED5B6086ED4B6386231DC8D5E521AA
:201CC0005000E5CD1A40D1D1D17CB5C0ED438F85C93A8183FE01C8FE02C82A5E86228F8526
:201CE000C93A6086B7200F216B00E5CD1A40E12E802603C3EE363D200218083D200218080E0
:201D0000C3B20CCD2F371803CD243726032EFFCDEE362164115CD8B7AE1C93A6086B72196
:201D200052002022E53E5CD1A40E1C93A6086B721580020F12E5118ED2A6086E52E54E5B7
:201D4000CD1A40E1E1C93A8C83B7C83A608621B383BED02A6386228F85C9ED4B5E86CD10F9
:201D600073C8ED438F85C9ED4B5E86CD0973C8ED438F85C93A6086FE03300432098 7C9D62B
:201D800003FE04D2B20C26006FE52E6C18B13A6086FE05D2B20C6F2D26002911AB1D195EE3
:201DA0002356EB7E23962A638677C9C808C81D0813F82ED4B6086ED5B65863AFB86917BB6
:201DC000ED5B6886CD471EC3A67C3A608632FB86C93AFB862A5E8677C92A5E86E521F21DEE
:201DE000E5CD107BD1D17CB5C2B20C218190 34C30000045A4F4EC3177A2A5E86ED5B3890BD
:201E00004EAF47B9C8D5EDB03D12D113EBF3CDAA00FBC92A6586ED5B5E86EDA0C92A658693
:201E2000ED5B5E86EDA0EDA0C92A60863A658677C92A6086ED5B6586732372C92A5E86ED0F
:201E40005B6386732372C9210000C8380223C92BC92AA0857DB4C8D1E9E122A0853E0132CF
:201E60008E852A9785228F85C9AF6F6722A085329F85C93A6086CD8A21454FED5B6386CDF5
:201E80006621C93A6086CDA021E5EB5E2356E1A7ED52C82A6386228F85C93A6086CD8A2164
:201EA0004D3A6A86473A65862A6D86C31822CD630DC02A5E86228F85C9CD3907C82A5E8638
:201EC000228F85C92A68863A60864FED5B6D863A6586D5E516005919E35E19D1B728012BA4
:201EE0002BE52BF5CDC521F1E316005EB7280356235EE1A7ED52E1C0228F85C92A7286ED88
:201F00005B6086ED4B6586CDFB29C2B70C19545D0B093A7986F501231FC547E52A6A86E3AA
:201F2000C3CB21EB2A6D86F173B7C82372C93AFA863D32FA86C02A5E86228F85C93A608613
:201F4000CD8A217D3D32FA86C93A6086CDA021EB2A6386732372C93AFA86473AF9864FED61
:201F60005B5E863A62866FCD2721C3EE7C3A6086CD8A217D2A638677C93A6086CD8A212A25
:201F80004C8C2323235E23561B2A4A8CA7ED52110000380BEB3A658626006FCD3B7DEB2A95
:201FA00068867 32372C93A60864F3A658647ED5B68863A6C866FCD2721C3EE7C3AFA863C7E
:201FC00032FA86C93A6086CD8A2145040 5C805F54FCD7821F118F63A60864F3A658647CD82
:201FE0007821C93A60864F3A658647ED5B6886CD6621C93AF9864F3AFA8647ED5B5E86CD4F
:202000006621C93A608632F9863A658632FA86C93A608632F886C93A65864F2A68863A6C34
:2020200086180A3A6A864F2A63863A67863D8EDABC0CC5E57EED5B6086932 80B4F06005ED9
:2020400050195 45D2BEDB8E1C134ED5B60861971C92A6086E52A6886E5ED5B6386D51A3DF0
:202060005F3A67864F06017E3DCD932E2009CDBE20D1D1D1C9D1D1D1D1D1C3BC0C2A728669
:20208000ED5B6586ED4B6A86CDFB2928053DC8C3B70C192B5ED5E50C71ED5B6086D5E5ED8E
:2020A0005B6D86D51A3D5F3A71864F06017E3DCD932E20C1CDBE20D1D1D1E1D173C9C521A4
:2020C0000400395E2356D5234E2346235E2356E1C5E50A3D4F8647700019E35E1600192B31
:2020E000D10600C5E5A7ED5223444DD1E1E519EBEDB8C1EB13E123EDB0C1C93A60864F3AF2
:20210000658647CD7821C9ED5B17903A19906F1816ED5B1A903A1C906F180CED5B1D903A55
:202120001F906F18022EFF26007DB720022EFFE5D568E569E52E1EE5CDA95DD1D1D1D1EB09
:20214000E3E1EBC9D5EB16005E192B935F7EF5EBCD27217CB52804F112D1C91A47F11205C7
:20216000E37E8077E1C9D5260068E569E52E1FE5CDA95DD1D1D1C9C5260068E569E52E01
:2021800020E5CDA95DD1D1D1C1C9F501010021FFFF11FFFFCDE75FCD29607E26006FF1C90F
:2021A000F501010021FFFF11FFFFCDE75FCD2960235E2356234E23460B23E560693E02CDD4
:2021C000C521D1F1C947E5210000E3E5A7ED52E138161A4FE378FE02CA0722FE01CAEA21D9
:2021E000B7CC0322E31318E3E1C9C506087C29A9F2FB213E05AD6F3E80AC67CB0110EEC1B2
:20220000C3E42179AD6FC9D516005919D1C3E421AF0405C8AE2318FA0405281405281505B3
:2022200028170528180528190528 1CC9228F85C9B928F9C9B9C830F4C9B9D830EFB938EC25
:20224000C9B928E838E6C9B920E2C93A6286CD2F7D4F2A5E863A6586CDB822C9DDE5210110
:2022600000E52A5E86E5210400E5CD1A40E3CD107BD1D1D1DDE13A6A86ED5B6D86CDA67C95
:20228000C92A5E863E017732608 6C34B22217679CDA122229C85C92A5E86CDA122229C85DC
:2022A000C9DDE5110000D5E5210300E5CD1A40E1E1E1210000DDE1C9DDE5226087C5CD17D9
:2022C00023C1E52A60875E83B9380AE1DDE121FFFF229C85C977160019E5110000D52104E8
:2022E00000E5CD1A40D1D1D1DDE12260872A6087DD7E00DD23FE1F300A06004F09EDA0EDFD
:20230000A0180212133A5F873D325F8720DFDDE1210000229C85C947212E231600B72804CD
:202320005E1910FC7E3D3D325F87237E23C9080C01030507090B080C03010507090B080CF9
:2023400005010307090B0B0E012F032F0520073A090B0E032F012F0520073A090B0E052F38
:2023600012F0320073A0905060103050506030105050605010307080 12F032F05070803FC
:202380002F012F05070805 2F012F030708073A093A0B3E012A5E8677326086C93A65862AD1
:2023A0005E8677C93A6786CD2F7D4F2A63867EB9380921E611E5CDC10CE1C93C773265866E
:2023C0004F0D0600093A608677C93A6286CD2F7D4F2A5E867E3CB938021 8D7773260864FC0
:2023E0000D0600093A658677C9CD9223ED5B6386D5E5CD4C7BE1E1C92A6D86ED5B6086ED98
:202400004B6586CDFB2928053DC8C3B70C19E5C5ED5B6886D51A3D5F513A6C864F06017A0C
:20242000CD932E2806E1E1E1C3BC0CE1C17E5F1600817719EBE178B1C8EDB0C93AF5864FE5
:202440003A608647ED5B63863A6786CD2F7DC34421F53A60864FF13A658647ED5B68863AEB
:202460006C86CD2F7DC344213AF6864F3A608647ED5B63863A6786CD2F7DC344213A67863D
:20248000CD2F7D472A63867E3C5F3A6A86FE03D2B20C4F780DFA99243CB03803C3B22377C9
:2024A000E5F53A60865FF1160019E33A65865F1D19D13A6A86E5F5CDC521F1D1EB2373B784
:2024C000C82372C9DDE52A6386E52A5E86E5CD4C7BE1E1DDE1C92A6386ED5B6D867EED4B48
:2024E0006086B93A6A86210000CAA67C380423C3A67C2BC3A67C2A6D86ED5B6086ED4B65CA
:2025000086CDFB29C21B2A19EB2A7286793C963001C93C474E0DC823EBC5E5D50600CD10BC
:202520007DD1E1C12807230578B720EDC93A6A863DB93834CA8A25D5C5E52A6D86914F8640
:20254000F53A71865FF1BB3019775F1600421B19545DED42C1C5E5ED42E5C1E1EDB8D1C365
:202560008D25E1E1E1C3BC0CD5C5E54779904F06002A6D867E5F50917719EBE1E509EBED5A
:202580005 2E3EBC1D5EDB0D11803D5C5EB2A68864E0D230600EDB0EBC1D1789147DA2C2546
:2025A000C319252A7286ED5B6086ED4B6586CDFB29C21B2A1978B128073A6A86EDB1280846
:2025C0003A74862A728677C92BE55D54C53A6F86FE022816FE01201D2378B12802EDB03AE9
:2025E00074863D327486C1E118CB2A6D86237E12C1E12318C02A72864E09E5ED52E52A7268
:20260000863D3D81773274864F09EBC1E1EDB8EB2A6D8623F53A6F864FF106000DEDB0EBE2
:20262000C1D118912A5E863601EB3A6586F53A62864FF12A6886 18103A6A86ED5B6386F523
:202640003A67864FF12A5E863D285C3D200E1AE56F2600C6021219EBE1C3F526C3B20C2AFD
:202660005E863601EB3A6586F53A62864FF12A6886 18103A6A86ED5B6386F53A67864FF1E1
:202680002A5E86FE0228 0ED55E2356EBD1B7284A3D281718C7E51A6F2600C6041219EBE185
:2026A00023CDF5262B184E6E2600DDE5D5E5216D86E3E5CDCE7BE1E1D1DDE1DDE57EE5EB1B
:2026C000863D477948CD2F7DB93006E1DDE1C3BC0CE5CD4C7BE1E1DDE1C93E80A428CBD5B1
:2026E000110000EBED52D1E5D5EB5E16003419362DD1E118B57EE5EBCD907CEBE1C92A633D
:20270000863A6A86B728093D282B3D282FC35C26233E2D8E2B2802181C116D867E3D12D53D
:20272000133D4F06002323EDB0CDA67BD1110000EBED521811E5CDA67BD1180A23CDA4791B
:2027400057CDA4795FEBED5B5E86EB732372ED536086C92A63863A6A863D28063D280AC306
:202760005C26E5CDA67BD1180723CDA4796F2600ED5B5E86EB73ED536086C92A3E907EB7CC
:202780002008CDCD29F03E4018 0BC5473E01052803171 0FDC12A5E86A6C82A6386228F8598
:2027A000C9CDF02928053DC8C3B70C7E917793C8195450094FED80C9212F00E5CD1A40D11C
:2027C000C9C33B7CCDF029C21B2A192B7EF50C71E5CD5E7AE1F177C9C53A6086473AF3861A
:2027E0004FED5B3890CD25217CB5EBCDF327C1C92A5E86E5CD5E7AD1C93A6086329B852A0C
:202800008D852600E5218585E5B72806CDC179D1D1C9CDE179D1D1C93A9F85B720103C32EF
:202820009F85ED5B6086CD8A293E44CDFC272A3E907EFE03280FCDCD29FA52282A978522D7
:202840008F85C3D8293A9C862A6386772A6886228F85AF6F6722A085329F85CDFC27C93A57
:202860009F85B7201B219F85347EFE0430E4219B2822A085ED5B6086CD8A293E44CDFC27BA

```
:202080002A3E907EFE03280FCDCD29FA52282A9785228F85C3D8292AA085E93A9C86FE047D
:2020A00028B0FE0220E02A63863602237721852822A08518D9CDDE29FE0320D221C4282227
:2020C000A08518CACDDE29C52A63864605052323CD9C79B7C1CA4C28211508E52E04E5CD18
:2020E000207AD1D1C36528CD511EAF329F85ED5B6A86CDBA293A6086F640CDFC271803CDF5
:20290000591E2A3E907EB7280F473E010528031718FD2A5E86A62008CDCD29FA652918DFE4
:202920002A0B90E52A6386E5CD4C7BE1E14E0D3A9F8581329F85ED5B6F86BB3805CDA8293C
:20294000181A41EB13C51AED4B74862A7286EDA1ED81C1280710EDCDA82918A3CDA8292A99
:202960007786228F85AFCDFC27C3691E2A6586E52A6086E5CD207AD1D1C9CDF029C21B2A8D
:20298000192B7EF50C71E52A6F86E5CD8D7AD1E1F177C92A6386E52A6086E5CD8D7AD1D1A0
:2029A000C93A608632F386C9AF32A5862A3E90773C2A0B9077C9ED5B60862A8483192299CB
:2029C00085C9CDCD29F02A5E86228F85C92A8483EB2A9985B7ED52C93E01328E85C92A63EC
:2029E000865E160034193A9C8677F5CDA829F1C92A6886ED5B6086ED4B65867E3D28177B92
:202A0000B72815BE301279B720037E934F83BE38037E934FAFC93CC9F6FFC93DC8C3B70C6D
:202A20002A5E86228F85C92A5E86237E23666F228F85C92A8F85E5CDEA0FD1ED4B65860303
:202A400018010B3E01B930166069110500CDDD7E115E86195E2356D5CDEA0FD118E42A5E38
:202A600086228F85C9E5ED4B6086060018010B79B0280B21000039E5CD1210D118F0218F91
:202A800085E5CD1210D1E1C92A8F85ED5B5E86EB228F85EBE9ED4B658679B7281860691196
:202AA0000500CDDD7E116686194156285ED5110400ED5210F52A5E86ED4B6586CD6F7E2278
:202AC0009C8579B7C847D110FDC9ED4B658679B728186069110500CDDD7E116686194156A8
:202AE0002B5ED5110400ED5210F52A6086ED4B6586E5CD1A40229C85E179B7C847D110FD9F
:202B0000C9ED5B65862A60863A608647B77A2004B3C018101004B3C8180A1004B7F81804BA
:202B200010 06B7F0228F85C9C3B20C2A63863A60864FCD3072C8C51E000D2809237E0608CF
:202B4000CD5A2B18F4C1CD5A2B16001B2A68862319195E2356ED538F85C91F30011C10FAFC
:202B60002A26903A60863D07873C5FC6034EB9D0160019CDA4792357CDA4795FED538F859F
:202B8000C9CD8D2C2053ED4B60860601ED5B38902A3B90C5D5E5CD2521CDCE2BCDEE7CE1A9
:202BA000D1C1C01AFE023823C5D5E54F7EC603B930164E0D2313CD107D7CB5200BE1D1C180
:202BC0004E0600EB09C3732BE1D1C10418C57DFE02C0D1D1D1D1C93E096FAF67C3EE7CCDE8
:202BE000BD2C20F5ED4B60860601ED5B38902A3B90C5D5E5CD2521CDCE2BCDEE7CE1D1C1AB
:202C0000C01AFE023839C5D5E54F7E87C602B9302B4E0D2313CD107D7D3C2820E1D1D5E562
:202C20004E0600EB09EB0D23CD107D7D3D280DE1D1C14E0600EB09092BC3732BE1D1C10421
:202C400018AFAF32FB86ED5B3B902A6386ED4B65863A3D90B93880ED80ED4B60860601EDDB
:202C60005B38902A3B90C5D5E5CD2521CDCE2BCDEE7CE1D1C1C01AFE02383FC5D5E54F7E9D
:202C8000C602B9303206004E0D2313CD107D7CB52025E1D1C1C5D5E5783206874E0600EB82
:202CA000093E20BE201123CDA47932FB862A6886228F85E1E1E1C9E1D1C10418A9AF473CDA
:202CC0002A3B9077E52A6D865D54ED4B658609EBD55F3A3A904F3A6A86CD932EE1D1C07994
:202CE0003C1213ED80AFC92A6886ED5B6086ED4B6A863A6586473A6F8618122A6386ED4BE0
:202D000065863A6F8647ED5B60863A6A86F57BB93804F1C3AE2D197EB8CD471EF1ED5B72DA
:202D200086C3A67C0100002A6386ED5B6086CDFB29FE02D2B70C19ED5B6D861A133DB930B9
:202D400014F414FCDAF2E3A6A8618D10100002A6D86ED5B6086CDFB29FE02D2B70C19C526
:202D6000E5ED4B6A862A7286ED5B6586CDFB29FE023805D1D1C3B70C19EBE179C1B9300192
:202D80004F414FCDAF2E3A7986ED5B7C86C3A67C2A6886ED4B658618072A6386ED4B6A86AD
:202DA000ED5B60867EB838062001341971C9C3B70C2A6D86E51600F53A60865FF119E52A9B
:202DC0007286F53A65865FF1E519F53A60865FF13A6586473A71864F3A6A86E3CD932EE1C6
:202DE0002805E1E1C3BC0CD1EBE33A608681BE380177E1EB79B0C8ED80C92A6086E57EED20
:202E00005B608619E52A6386F53A6A865FF11D7E3DF53A6C864FF10601CD932E2328C818F8
:202E2000C12A60863A6C864F3A6586180A2A63863A67864F3A6A8647E55E1600193A60866B
:202E40001D9328023002E1C9C50600F5CD932EC1D1209048EB6CE3463A60863C77EB3A6FFD
:202E600086FE02302AB7200C41F10405CAB70C772310FCC92BE52A608619D1EB78480D286E
:202E8000040600ED8823473A60863C904718DAF1C3B20CB720027E90477B80F579B7200113
:202EA0000DF1B9380628043E09B7C948AF47C978B7281779B72813B83801780DE5C54F0605
:202EC00000CD107DC1DDE17CB5C0AFED627891C8FAD52E23C92BC9C93AF5864F3A60864748
:202EE0001E021630D521000039EBCD6621CDAF30D1C93AF5864F3A608647ED5B6386CD252A
:202F000021CDAF30C02A6386CDC730C02A6086228F85C93AF5864F3A608647ED5B6386CD0D
:202F20006621CDAF30C9CD82300E00CDAF30C00600C526312E02E521000039E52A3890CD37
:202F4000DD30E50428052100001803211000E5CDFE64E1E1E1E1C10C28053AF58618033A45
:202F6000F6864F3A6086472A2990EBCD6621C9CDB230CDAF30C00E0006FFCD312F2A2990F6
:202F8000CDC730C02A6386228F85C9CDB230DDE5ED5B63862A38904ECD107DDDE1CD471E6F
:202FA0003A6A86ED5B6D86C3A67C3AF5864F3A608647ED5B3890CD2521C4EE7CC02A63863B
:202FC000CDDD30E52A3890CDDD30E52A6A86E5CDFE64D1E1C1C92A6386CDDD30E52A5E8637
:202FE000CDDD30E52A6A86E518E53AF5864F3A608647ED5B6386CD6621C92A3890E5D13A7B
:203000006B873C47773E30052804237710FC3AF6864F3A608647CD6621CDAF30C93AF68697
:203020004F3A608647ED5B6386CD2521CDAF30C93AF686C3162FCDC230CDAF30C00EFFCD5E
:203040002F2F2A2990463A6B873CB8D02A6386228F85C3FA2FCDC230CDAF30C02A3890CDDD
:20306000C73020150EFF06FFCD312F2A2990CDC730C02A6386228F85C92A38903A6B873C0D
:203080004777230528063E39772310FC3AF6864F3A608647ED5B3890CD6621C9CDC230C3E4
:2030A000E2F3AF686C3ED2F3A6086326887C9C3EE7C3AF5864F3A6086472A3890EBCD254D
:2030C00021C93AF68618EE7E3DC8C54605233E30BE28053E2EBE200310F3AFC1C97E3DC037
:2030E00021E430C90230210000229C853A60864F3A658647C51E01CD65724F3AFB86CD0CF6
:2031000072C1B72007219C8534C3177AED5B3890CD25212805FE02C2EE7CD51AFE02300831
:203120002179114E0600EDB0E1CD627AC92AA0857DB4202A229C853A60864F3A658647C5F3
:203140001E02CD65724F3AFB86CD0C72C1B72007219C8534C3177ACD9A72EBCD1833CD9FA5
:20316000312AA0857DB4C0ED5B14903A60864F3A658647CD6621C3EE7C210000229C853AF8
:2031800060864F3A658647CD9A72320687EBC318332A5E86C31833CD511ECD91311803CD2E
:2031A000511EAF32818232D886676F22D9862A14903C773E0B32D8863A9B85F602CDFC2736
:2031C0001803CD591E2A3E907EFE0220F53A9A86FE8928EECDA829CDF63228E6CDE432206A
:2031E000E13A9B85E6FDCDFC27CD691EC9CD511E2A6A863E02BD3857AF676F32818232DEF8
:2032000008622E18622E4863C32698732CE8632EA862A638622E6863A608632E0863A9B85DA
:2032200 0F603CDFC272A7190CD18332A6A8611CC3229195E2356EBCD6F7E2AE486237CB593
:203240002011 3A9B85E6FCCDFC273EFF326987CD691EC93E012A14907732D5863E0B32D82E
:2032600086 1803CD591E2A3E907EFE0128393AE386E602280C3A9F86B7280B21D232CD623F
:203280007ACD177A18DDED5B08902AE686D5E5CD4C7BD1D12A3E907EFE012809E5F5CDA88B
:2032A00029F1E177C32532FE0220B83A9A86FE8928B1CDA8293AE386E60128C5CDF63228BE
:2032C000A2CDE432209DED5B14901 8BE596A616A5D6A121A504C454153452054525920412F
:2032E0004741494E2A9A862600E52ACC86CD6F7ED13AD886B7C93A9B86214890BE3AD68690
:20330000200B3CFE031801AF32D686AFC93DC032D6863CC9D1E1E5D5C511CC86010900ED3C
:20332000B0053ACE865FE60332CE863E04A328017832D5863E08A328017832D7863E10A35F
:2033400028023E0232D686C13ACF861E80BBD07B32CF86C92A7786E52A72863A6F8647ED98
:203360005B68860E0118312A7786E52A6D863A74864718EB2A7C86E52A77863A748647ED65
:203380005B6D86F53A6A864FF1180D2A7C86E52A72863A79864718E7AF123A6086B7283BAE
:2033A000C54EB93035D516005F19D1473A6586B7282480B930203A65864847EBE3EB7A0DBC
:2033C000CBE23280410F9180A1D20F4E171E1228F85C9E1E1C97990180FE1E1C3B70C2A49
:2033E0007C86E52A7286E52A7786ED5B6A86ED4B6F86CDFB29C2CC34ED436F8619ED4B60CA
:20340000860601C5E5ED5B3890CD25217DFE02284DCDEE7CE1C12055C5E51AFE02300F3AD5
:2034200006F86B720343A6586FE012826182BED4B6F862A6586EBCDFB29201EED4B6F862A24
:2034400003890ED5B658619D1D5CD107D7CB5E1C12009E170E1228F85C9E1C10418A5E1C126
:203460003A6F86B720073A6586FE0128E5E13600E1C92A8186E52A7286E52A7C86ED5B6A52
:2034800086ED4B6F86CDFB292042192B7EF50C71E52A7786ED5B6086ED4B6586CDFB292084
:2034A00029192B7ED1F5D50C71110100D5E5CD04354DE1D1D1F177EBF17779E177D1B7C88B
:2034C000ED538F853A60860177C9D1D1D1D1C3B70C2A7786E52A6886E52A6D86ED5B608699
:2034E000ED4B6586CDFB2920E3192B7EF50C71ED5B7286D5110100D5E5CD04354DE1D1D1CA
:20350000F17718B6F1E1DDE1D1D5DDE5E5F5C5DDE5C10601E5EB78BE380C5F79933C6F26CE
:2035200007D84C1C1C9E379BE380521000018F1EB692600197EEBE3EB682600196EEBBB09
:203540002004040C18D07990C6024F060118C7210A877E3D2819772A5B877E23225B872A49
:203560000B90360223773A5A872A3E907718462A9D86E5212800E5CD1A407DE1E1329F86D9
:203580000FE0E20032E1EC92A3E907EFE042808FE032804FE02201E325A872A0B907EFE037D
:2035A0000380F110B87ED535B871B4F0600ED80189E2A3E907EFE0220082A0B90236E260022
:2035C000C9210000FE0120032E1DC9FE0320032E1FC9FE062007CDCA37212000C9FE05206B
:2035E000032E21C9FE04C02E22C9CD4F357D329B86E5CD163BD17D329A867BFE1E28082A20
```

:203600000B90237E329C86EBC9CDEA357DFE1F20042E00182AFE2020163A9C86FE04200773
:20362000AF329C866F1818FE0520DE2E06181021499 0BE20042E051806FE1E20CC2E03AF76
:2036400067B5C9D1E1E5D53E01BE38032179 11E5CD5E7AE1C93E0032A18632A286AF32FF31
:20366000863 2D58632008732D68632CE8632DF8632698732A88621000022018 72E32229D67
:20368000863C320587320A872E802603CDEE362604CDEE362602CDEE362EFFCDEE362604A3
:2036A000CDEE362E012601CDEE362605CDEE36652E68E5CD1A40215100E3CD1A40215300BC
:2036C000E3CD1A40E1210000E52E54E5CD1A40E1E1CD24373E01320387211400E5CD425D00
:2036E000E126062E80CDEE362E01CDEE36C9E57C2600E56FE52E2DE5CD1A40E1E1E1E1C9C1
:20370000C506010E04CD0721C1EB3E02BEC2957E233E59BE28053CBEC2957ECD177ACD6F49
:203720008C3A27EC53E7F0600CD0F42FBC1C9C53E7F0680CD0F42FBC1C9C5CD4B083A06A3
:2037400087 6FE53E016FE5CD8307E1E106010E04CD0721218A37E5D5CD107BD1D17D8428B5
:2037600082A0B90E5CD4336E12A0B907E2311A98612133D4F06003DFA8837C5D5ED802EB8
:20378000050E5CD1A40D1D1D1C1C90259D1E1E5D5E5212800E5CD1A40E1E1E52A3E907EE1D1
:2037A000FE062005CDCA37181DFE0220192A0B90236E2600E5CD163B7DE1FE892008CD6FDC
:2037C000083E016FB7C93E0018F92A0B90237E3D200D3C32A786215300E5CD1A40E1C93D92
:2037E000200432A786C9D60220033C18023DC032A886C9D1E1E5D57DFE00C8E5218311E5D8
:20380000CD5E7AE1D1216A87E5E5D5CDCE7BE1E1CD5E7AE1C9C5ED5B0B90D50E020601CD18
:2038200025211AFE02200A131AFE5020043EFF1801AF32668CD1D50E030601CD25211AFE4D
:203840001281DFE02200D131AFE4E2813FE593EFF280F1BD5CDA67BD17DFE0430021802FC
:203860003E00328F83D1D504CD25213E96CD9238329083D1D504CD25213E64CD92383291A0
:20388000083D1D504CD25213E02CD9238329283D1C1C9C54F1AFE01280AD5CDA67BD17D844B
:2038A0002801 4D79C1C9C53A69904F0600118B11CD6621C1C9F1E1D1D5E5F5D5E5CDFA38AC
:2038C000E1D17BBE3012C5012A00C5D51C7323E5CD627CE1D1D1C1C9D55ED5E5CD3770E1A0
:2038E000D123237EFE2D200736242B362D18032B36242BE5CD3770D1D1C9D1E1E5D5C5E554
:203900004E0D201A237EFE302804FE2020030D20F3D1D5793C123D2805130600EDB0CDE66E
:203920006FE17EFE04300A110300D5E5CD3E70E1D1110200D5E5CDCC6FD1D1C1C9C5210497
:2039400000397EFE83200D3ADB865F1600D5CD053CD1183EFE81201A2A14907EFE01282F8D
:20396000352101 00E5CD425D212F00E3CD1A40D1182047 21CF864E0C2A14907EB9301034AC
:203980005F1600197 03E2A329A86CDA07A1803CD177AC1C9D1E1E5D5C50E007DFE4138084A
:2039A000FE5A280230020E01CD973AC1C9D1E1E5D5C5E5CD7E7CD14D7BCD973AC1C9D1E1CC
:2039C0007DFE8E20022E2EFE8F20022E2D7D329A86E5D5C50E007DCB7F20020E01CD973A64
:2039E000C1C921081122D086C3EB39D1E1E5D5C5E52AD086E5CD7F7B0E0028020E01E1E159
:203A00007DCD973AC1C9D1E1E5D5E5CD7E7CD17BCA2F3A2A14905E3416001977CDA07ACDB0
:203A20006E3A3ACF862A1490BED0CD403A1836FE812005CD7A3A1836FE83202F2168 3AE570
:203A40002AD986EB2AD286A7ED52D82AD086EBED52D83AD4862A1490BED02AD8862600E3AC
:203A6000CD053CD1C9CD7A3ACD6E3AC3177A2A1490E5CDA67BD122D986C93E012A1490BECD
:203A800301135110100D5CD425DD11E2FD5CD1A40D1C9CD177AC94779B7281C2A149016E3
:203AA000005E3ACF86BB3810F5341970CDA07AF1C03AD786B7C8181678FE812004CD7A3AEC
:203AC000C9FE8320152A14903AD486BE300C26003ADB866FE5CD053CE1C9CD177AC931 32B4
:203AE000332B858687 34353 62D8C8D8E37383958939 4952A30232F3D9B9C414243444546F2
:203B000047484 94A4B4C4D4E4F505152535455565758595A2020210200395EAF6B677BFE67
:203B20001DD03AD686B7203F7B2148901680BE2814231689BE280E23168 3BE28082316 81CE
:203B40008E2802180 5AF676AB5C9AF572ADC862B196E673ACE86FE01C07DFE2320032E2E4D
:203B6000C9FE2FC02E23C93E1C835F18DDE1D1D5E516002A1490E5D5CD7E7CD1E128173A48
:203B8000CF86BE385D3E01BE38053E30BB28537B5E341977184F7BFE8120083E01BE30420A
:203BA000351842FE831E2020 28E5E53AD086B728057B5E341977E1ED5B2390C54E0600EDB2
:203BC000B0C1CDFA38E12ADB862600E5CD053CD1C9FE2D20095F3AD086B7280618CBFE2B22
:203BE00028F4C3177AC52A14904E0600ED5B389005EDB0211000E3E5CDB538CD3B7CCD5E8A
:203C00007AD1D1C1C9AF32DB86C9ED5B1490C32521570271110 21B3C73143C900E9A860544
:203C200089133C2F0740B0075F3C02661301 00D4200001 10FF0000003E3CA02D81132EB0AB
:203C4000075F3C02741302 00D421000110FF000000583CA02D81132E311538002F072E2A03
:203C6000B02D0188540202C044CE3C904FD586FF32845400D9860E000500083C4200470172
:203C80002A2D063031 3D3030018 53C9431E77202000210FF0500009D3C33015F3C2D023D8D
:203CA000C035CE3C845401D98615010403B53C2D033031420195 8031F4720300010210FF2A
:203CC000050000C93C33015F3C2D02205F02063A000200006300000B323031524F4D302ECC
:203CE00030309F0280FFE4807FE580FFE5403FE6407FE6A0BFE640FFE6403FE7104FE71CBC
:203D00006BE7107BE7017CE7017DE7017EE7017FE7408FE7409E820101013F000000001CA5
:203D20001B151306C591E39162920380C79000BF9003F9E47E91C5910000002D0072E4008B
:203D4000060000006300000002891CD9004917A91000002BF9007A4924E4F00000000000019
:203D6000060201FE00000001050102FE00000002040103FE00000003030104FE0000000420
:203D8000020205FE00000005010106FE00000010001 0163FE000000A8FFBF00E072E47E9102
:203DA0009791A391010014003A91020101005E91030101005E91030204003191040101000F
:203DC0005E91050101004C91050202005591060050007091FF00FE002891FF0100140001FF
:203DE00002010100010301040001040101000105010200010600500001630102 0101FFBE29
:203E000039001E0000000000063A00030000FF0000E239002000000000000000BE3900120000C5
:203E2000000000BE39000A00000000000BE39090700000000007BE390001000000000003D3905
:203E4000002800000000000BE3901100000000000FF0001FFFF2A2D113C4E4F542050524F8E
:203E600047524 14D4D45443E5964002F07406901B9916902C1917204002E70C011AD91A0A0
:203E80002D19112E6901B9916902BD917204002EC003D33FC003D63FC003D93FB7D369A76A
:203EA00000FFFFFFFF019FC7C7A700A7D3E9A400230048A400A7C349A400EF9103922492F9
:203EC00039924B92539202020203040202020502020206070206090A0B0C0D0D0D0D0D0DA8
:203EE0000D0D0D0D0D0D0D0D0D0D0D0D0D0D0D0D0D0D0D0D0D0D0D0D0D0D0E0F1011121313131415F2
:203F000013131314131313141613171414150B181919191A1919191B1919191C19191915D5
:203F20000B181D1D1E1F1D150B182020201E20202020201F20150B18000000FF06FF08D1
:203F40000020D03810082000 5FF03FF04FF01FF02FF07FF32FF33FF36FF35FF34FF37FF0AFD
:203F6000FF0BFF01000CFF09FF0EFF0FFF12FF100411FF1305120310FF14034353000000EB
:203F800000000000000000000000000000000000000000000000000000000000000000000021
:203FA0000000000000000000000000000000000000000000000000000000000000000000001
:203FC000000000000000000000000000000000000000001113C013F3C01263C015F3CC355
:203FE0001A40C3177AC3207AC38B7AC3877AC35E7AC3BD7AC3E772C3F472C32C79C3357977
:20400000FFFFFFFFFFFFFFFFFFFFFFFFFFFFFFFFFFFFFFFFFFFFFFFFFFFFFFFFFFC5210400397E19
:20402000060 84FCD8F4F7EFE8038062108 00C33F40871100005F213402195E2356EBE9C100
:2040400007D84C9C121000018F7210600395E2356EB11EA8D010D00ED8021080 0397EB7C4C5
:20406000071 40AFF321E48D0604237710FCFBC34340C5D5E521EB8DE546234E23D1C50104F8
:2040800000EDB0C1EB702371E1D1C1C921A3410604C50EFF0CC5CDEB40C5F1C130F6CD09AA
:2040A00040F1F5E5CD0041E101040009C110E2210600397EB7C4BE4021EA8DC33F40C5D57A
:2040C000E521F08DE54E2B462BD1C5010400ED88C1EB712B70E1D1C1C9F311E88DE5B7063F
:2040E000041A8E121B2B10F9E1FBC9F311E88DE5B706041A9E1278F5C11B2B10F6E1FBC906
:20410000C0DC8FE012021F5413AE98DB720023E0A3D32E98DFE07380CF53AE88DB72804C2
:204120003D32E88DF110E5F1F5CD76414FF13D87875F1600DD218841DD19DD5E00DD56011F
:20414000DD6E02DD6603ED67070707 0723ED6781274 70E00FE99280993280530037818039A
:20416000C8227ED6F2B0F0F0F0FED6FAF81C8110400DD1918C4790EFF0CD60A30FBC60AEF
:20418000477907070707 80C96000F58D6000F38D2400F18D3201ED8D1301EB8D9900EF8D48
:2041A000845A5A000583C30000178700000064210600 39CD8F41210000 7D84C34340D5E0
:2041C0007E235E235623EBCDD641EB5E2356CD4D423D20EDD1C9F5D57E234E234623CD332E
:2041E00042CD7D87F57EEB67E5EB57784223 56235EE3BCE32011824 7D51600CD4D42D1CDAJ
:2042000003342CD7D8718EAF1F13D20CDD1F1C9E5C5F321458AA6B0770E0E47CD3342C1E11E
:20422000C9E5C5F321468AA6B0770E0F47CD3342C1E1C9F3F579D3D078D3D2F1C921060047
:20424000395E2356CD4D42EB7D84C34340F57AB320103E963D20FD1D20F815FA62421EFF03
:20426000018F0F1C9D5EB2AF0887D84200CE1E322FA88EB22F88971801B7D1C92AFA88E92A
:20428000213E03CD8942C34340F5CD8F410100001 10300CDAF5B213903CD8F41F1C9C34346
:2042A00040C343409732548A21008 8235E2B16001C1DCA4243CD765DFB057887 87D55F2163
:2042C000208319 22628ACB2B210B56195E2356EB225 88AD12A628A237EB7200A04210008A4
:2042E000CD5B5DFB18CB783C2A3E907721618A71FE06CAA643FE05CABB433D28732A628A4B
:204300000F37E234E912B77FB3EFFB920020E019723235E2356EB57CD725D7AFB800D20F6BC
:2043200004F3CED5B0B90121 32A588ACD725DFB78121 30D20F63A618AB76F2600CA4340C303
:2043400003F403A548AB728072E0E2600C33F403C32548A3EFF32448A01000021060039 5EF4
:2043600002356CDAF5BF59732448AF128DBC3A8422A0B902316 80D51112890E00413A878C25

:20438000FEA0200206601AB0200B770CE3252005E3231310F1E1212003352A0B900C7121DB
:2043A0002003335C335432A0B903E0277233A610A7721348335210000C3434021300335 0E24
:2043C00001ED5B0B901321956 07EF52BCD725DFB28250C781213FE15281DFE0E2013FE06E2
:2043E0002815FE042011FE032807F13D280AF518DBF13E01F518D5F12A0B9071C33543CD8C
:20440000D753C33F40C34340C34340C34340210600395E1D4323234ECB23CB23160021 2079
:204420008319233E80B9280771210000C34340047 8FE06284905972B772377235E2356EB91
:204440003E04CD855CFB581600CB23CB23CB2321400319226 68ACD97575 8CB23210B56198E
:204460005E2356EBED5B3E90783C1213237E3C122B1304C5CD725DFB78121320F7C1582110
:20448000018 8562B141520A1CD765DFB7B8828F5CD645DFB18EF010000110200CDAF5B2199
:2044A000060039 7E217989E5B7F55E1600217A8919F2B644ED444F477EFE2E282FFE2C28D4
:2044C0002BF1F5F2CF442B10EF79ED444F10032310E6F179E186FEC1300BFEB1300A77CD77
:2044E0009550C343409710F63EB010F2040C18D1010000110200CDAF5B2178897EB728167B
:2045000016005F217A89192B7E3E2077217889352 37EB72801 35CD9550C34340F32106004C
:2045200039 5E2356211E01D5E50608E1D17B0F5F232323D5E530095E2356237EEBCD855C5B
:2045400010E9E1E1FBC34340C34340C343402108003 97E3C32598C2B2B5E2356EB225A8C80
:204560003A618CB7200706083EF7CD0F423A668CB72007CD2958FBC343403A658CB7280A28
:2045800006203EDFCD0F42CD5047CD2659FBC343403A618CB7203B06003EF7CD0F42FB0636
:2045A000043EFBCD0F42FBCD504797F332798C325F8C3E03CD144CFBCDA65B06003EFBCD20
:2045C0000F42FB3A5F8CB728093E01328183210D00C9CDE7453AA186B7280A0100002A673F
:2045E0008CEBCDAF5B97C9CD80593E3032868C06403EBFCD0F42FBCD504706103EEFCD0FA6
:2046000042FBC9F39732818332598C32588C328C8321000022F888FB0E0B064ECD3342FBFE
:20462000E0D0600CD3342FB06003EEFCD0F42FB3A618CB7C24340CD504706003EBFCD0F6A
:2046400042FBAF32868CCDA359C343400 6003EFECD0F42FBC343400 6013EFECD0F42FBC35B
:20466000434021060039 7EB7281006083EF7CD0F42FB3EFF32608CC3434006003EF7CD0FD6
:2046800042FB9732608C18EF3A8183B7280AFE032806210D00C33F40CD9145C23F40C34371
:2046A000403A8183B72812FE03300E3E023281 83CDA65B3A8183B720F721060039225A8C94
:2046C0003E02325 98CC36045CDE745C34340F33E01328683F3CDFD46FBC34340F3CDFD4628
:2046E000FB3E08210C80CD855C3E10216C80CD855C3E6B21D081CD855CFBC343403E18D3E2
:20470000E221FC00CDAA00CDB50011578A3A0601129732868 3C93A8883B72022F53E7506D5
:204720008A0EE321588ACDE251F13E0CD3E13EF506080EE321588ACDE251FBC34340218CE9
:2047400081060CCD605DFBCD054FC34340C34340F53E0AF33288A8CFBCDA65BF1C9C3434053
:20476000CDBF47F32100F87EFE44200 7237EFE49CA08F8CD885106703E8FCD214211010096
:20478000CD4D4206003E8FCD21423EC0CD415121AE471177890113 00EDB0CD9550D8B1CB7C
:2047A0005F20053E01CD144C3E08CD895BC9000E005A4F4E203042414220 30392F3835ED1D
:2047C0004DFBED4DF308D9DBB0CB7?CA754EC3A04DD9083A0D89B7C2A04E3A618CB7280754
:2047E0003E02CD144C1838DBB14FCB51CA4B4ECB79CA8F523A868CB7200ECB69200A3A8F5B
:20480000 83B728043E051814CB59200A3A608CB720043E011806CB6120053E06CD144C084D
:20482000D9FBED4D08D9DBE221498A4677A823773E10D3E21186831AB72811FE012812FE7B
:204840002282BCB5E28053E04CD144C08D9FBED4D7EE60828F6E53E023286830602 3EFDFB
:20486000EE221578ACDE2510E04CD734FE17EE6202 8D93E033286830608 3EF70EE2215718
:204880008ACDE2513E03D3E23E61D3E2DBE2E60428BA21D081CD725D28827 8B728F7D3E0D2
:2048A00018AA08D93E01D3E2DBE22148 8A4677A823773E30D3E2C3E64D08D93E01D3E3DBE5
:2048C000E3214F8A4677A823773E30D3E3D908FBED4D08D9CD2E493E10D3E311888 3214E0E
:2048E0008A7ECB5F200508D9FBED4DCD2E49CB5F18F41AFE01280FB720EC068A3E750EE38A
:20490000215 88ACDE2513E021221DC0522830C18D5CD2E49CB5F971206003EFD0EE3215860
:204920008ACDE2513E40218C81CD855C18B8D8E3F5214D8A4677B82803A82377F1C908D99B
:2049400021F3C9227D8797326 28C21798CBE283935203 62B7E237723E53A828CB72004DB84
:20496000B11802D8E2E1A623BE200F233520 1A235E23569721798C77EBE9E511060019353A
:20498000E120E8232323C36F492AF8887CB528132B22F8887CB5200B3EFF32628CCD7C4223
:2049A000C3FA4B3A8A8CB7280B3D328A8C20053E08CDCF5B3A0D89B7C2FA4B3A6F87B72831
:2049C0000C3A478CFE04C2FA4BAF326F873A488A3C281A3A468AE670C610FE702006973D86
:2049E00032488A3C473E0FCD2142C3454B97324 88A4757213B8ABECA3A4B23BEC2094A231B
:204A0000BEC2394C23BEC2394C21430ABEC23A4B213F8ABECA3B4A23BEC2294A23BEC25274
:204A20004C23BEC2524CC3384A23BECA334A3504C33B4A23BEC23B4A77351 4213D8ABECAA3
:204A4000464A35C33A4B23BEC2504A7735C33A4BB8C23A4BBAC23A4B21438A7735213B8A98
:204A6000CD634C47213F8A97BECA0D4BCD634CB8380 34E7841FE08D20D4BCB0FCB0FCB0FDD
:204A8000B047E6E0CA0D4B3A8B8C3C28437 8FE2B203E3A898C3C32898CFE02C2C84A217FFA
:204AA0004DCD3C4D2100A07EED4447777EB82008218A4DCD3C4D18ECAF210080771101 8014
:204AC0001FF7FEDB0C3000021744DCD3C4D186A3AA186B720373A888C3C283170FE38201D
:204AE0001F21484DCD3C4D21FFFFE5CD1E63D17CB5200521694D1803215E4DCD3C4D183AAC
:204B0000FE3120092153 4DCD3C4DC3CB633A898CB72808C521954DCD3C4DC1AF32898C2109
:204B2000188 0CD575D97218382BE200E3506022 18A82CD575D3E07CD895B213C8A77214013
:204B40008A77C3FA4B3A628CB7C2FA4B3A8883FE0220162A838C2B22838C7CB5200B3E03B9
:204B6000328883CDDD4EC3FA4B3A8C83B7282B2A8D8323228D83E5114600ED5220062163F1
:204B800003CDD6413A768C1E0057E1ED52380BAF328C830E06CD734F1860D8B1CB7FC2A7D0
:204BA0004B327587C3FA4BCD0C4C28102A468C7D84284E2B22468CCD0C4C2045060421E9B7
:204BC0008D2B34200210FA2A8283232282832A8483232284833A8C83B7280B21B2833520E9
:204BE00053E6477233408D9CDBF47CD875A3E00CD895B3A900332808 7C92A468C23224699
:204C00008C21FBC9227D8708D9FBED4D3A80873D328087C9F347217 98C97BE201B78327756
:204C20008CCB27CB27CB27CB2716005F217D0119117 88C010B00EDB0C997324 38A323A8AE0
:204C400021000022 3B8A223D8A223F8A22418AC3FA4B3E01323A8A210000223F8A22418A55
:204C6000C33B4A7E211C0011F9FF0E04190DCB3F38FA0C0D2805CB3FC3734C5F160019 7DD7
:204C80003CC9CD224FAF328C83C3FA4BCD4E4FAF328C83C3FA4B3EFF325F8C3E08CDCF5BE0
:204CA000AF328C83C3FA4BCDFD460E05CD734FC3FA4B3A8C83B7201921B3 03772B3E6477F7
:204CC0003EFF328C833A8F83E60128050E03CD734F210000228D833A8F83E60228 3E3A8CA3
:204CE00083FEFF28072190833EFF10052191833E01328C83E521690311938 3011F00EDB06C
:204D0000E1119A837E121312210900191192831A77237721938 3CD0641C3FA4BDBB1CB5F62
:204D200020F73E01CD144C18F03A868CB720EA3A8F83B720E43E05CD144C18DD1177890155
:204D40000B00EDB0CD9550C90008004D535452 20444C20000800534C56202044C2000081D
:204D600004241442020444C20000800444C2020204F4B2000080043 4C4541523F202000DC
:204D80008004D454D20434C522000080055 4E4C434B204D200008004E4F5420434C5220DF
:204DA000F6F03C283A3DE60F21468A477EE670B0213B8ABE282 7213F8ABE2821473E0121F6
:204DC0003A8ABE381A4E34231104000C0D280419C3CC4D70237023 3E0277C3DF4D237708 9D
:204DE000D9FBED4D08D921F3C9227D87DBE0473A8783A047210C80CD575D97218482BE20CA
:204E0000E350603218A82CD575D3E07CF495B21FBC9227D8708D9FBED4D08D921F3C922A1
:204E20007D87DBE14721008 0CD575D97218582BE200E350604218A82CD575D3E07CD895BBB
:204E400021FBC9227D8708D9FBED4D473EB7D3B33EFBD3B33E97D3B23EBFD3B2210D893EDF
:204E6000FF772397773 20C8923111189732372 3E1012C3884E210E89E6802811BE30092A7D
:204E8000F89B6CB3F77380ED908FBED4DBE20EF06FF70C37F4E06102370220F89C3884E19
:204EA0003E97D3B23EB0D3B2CDA359AF2100897721F3C9227D873E06CD895B21FBC9227D03
:204EC00087C3884E08D921D081CD725D280878D3E008D9FBED4D3E28D3E2C3D14E3EF7061A
:204EE000080EE321588ACDE251CD054FC908D93A8883FE033808CD054F08D9FBED4D3E28C8
:204F0000D3E3C3F94E3E043288832 18C81CD725D280478D3E1C93E03328883 3E28D3E3C30A
:204F2000154FCDBB5906003EF7CD0F423EFF32618C0E01CD734F3A458AE6102808 3EEE0678
:204F40001CD0F42C906403EBFCD0F4218F6CDA3599732618C3A458AE610200706003EBF52
:204F6000CD0F420E02CD734F3A8183FE02C8973281 83C9213483340606210008CD5B5D2171
:204F8000F3C9227D87CDF15621FBC9227D87C9E5216488CD5B5DFB2008C5CD765DFBC11874
:204FA000F2E1C911E8883E03210200394E234623EBF5CD645DFB2806F13DEB20EFC9F3F1F1
:204FC00021F3C9227D8721135011778901 0F00EDB0CD0950217889361 02323E521E888CD75
:204FE0006D5DCDF74F2164881603CDF74F1520FAE1CD0950C30000DDE1CD6D5DE378CD9095
:205000007C79CD907CE3DDE5C9CD955011003 0CD4D42C900070053595320455252 06C90E50
:2050200000CD8F4F0E0021788 9515E23231911C880EBCD725DFB2825EB78FE1B300EFE1A8D
:20504000 38EFCD8851 0E00CD6D5118E5FE5B3803D620470C3EC1B928E9702318D4217889A6
:20506000798677F526006F117A89190E109147287EFE2E2804FE2C2002050C0D20F178FE1B
:20508000C13801AF2179897 73A8182B728023600F1C49550C9CD6D51AF3277890E102178F3
:2050A000897E9130014E239647F2AE500600160 05E2319117789E5C50C7EFE2E2804FE2C6C
:2050C00020091A3C1278B72802050C230D20EAC178812177 89964FFE10380E0E103EC0CD9E
:2050E00041513EFF327589181CF6C0CD41513EE3591D2804C60218F9327589 3E0FB9200571

:205100003EA8CD41511A7789014F3D16005FE119973276897EFE2F300DFE2E20053276895C
:205120001814FE2C28F7CD41513A7689B72807CD4151973276890D2B20DA3A7589CD41518C
:20514000C9F3F5C5D5E50EB0060826202E0016301E10173809ED59ED690520F61807ED51FF
:20516000ED610520EDE1D1C1F1CD7D87C9F5C506703E0FCD21420E120D20FD06003E0FCDBA
:205180002142CD7D87C1F1C9F5C506C03E20217A89772310FC97217789772377237723C171
:2051A000F1C906CA0E00CD8F4FF33A8683B7200A3C328683CDCF51FB1814FBFE03200FD804
:2051C000E2E604C821D081CD725DFB78D3E0C9F5C5E506803E7F0EE221578ACDE251E1C1C8
:2051E000F1C9F3A6B0770605ED41ED79C906CB0E00CD8F4FF33A8883B7201A3E0221DC05D8
:2052000022838C328883068A3E750EE321588ACDE251FB1806FE03CC054FFBC906CC0E0008
:20522000CD8F4FF3216E877EB72802FBC93E87D3723E80D3723EFF7723773E0121718777 6D
:20524000FBC908D93A6E87B7280E21F3C9227D87FA7853FE01CAFA523E03D372CDA3593A27
:205260006F87FE80201706053A74874F210088CD5B5D21308334CDF156AF326F87AF326E84
:205280008732738721FBC9227D870908FBED4D3A7387216E87B6C28452DBB1E680C2795223
:2052A0003E97D3B33E43F680473A868CB0D3B33E87D3723A8087219003BE280F3A7587B7F2
:2052C000280EAF3275873E87C3D2523E6FC3D2523E9ED372216E873E0177233A6F87B72064
:2052E000073601 3E30327207233601233E08773E0F232377AF2377C384523A7387E6F0C2E5
:20530000F53F6F03273873E87D3723E80D372217087DBB1E680470000DBB1E68088204BA6
:205320004617CB18702335C28452AFB0E26F53E67F47219480CD575D21728735CA63537821
:20534000E67FFE032817FE04CA6353FE0ECA5D53FE15CA6353FE06CA6353C358523E017766
:20536000C358523E80326F87C358523E1918023E1621748777C3585221718735CCA5537E18
:20538000FE0AC28953AF2B18113DC293533E402BC39A532BCB1E1F1FE64047DBB1E6BFB086
:2053A000D3B1C38452213F82CD725D200BE1AF32878B326F87C35852217087AFB0EAC25348
:2053C000EE80773E0A2377C9C8808C81D0810C813F8204030203019732518A06CD0E00CD6A
:2053E0008F4F3A8083B7280F210C00390177820AAE7723030AAE773E053C325F8A2179820A
:205400002B22648A21C653E5210E00395E2356D52B2B2B5E2356EB7EB7CA9B54F522598AF3
:205420002A598A3A5F8A3D325F8AB7286DFE08C178C1D113133004CB091802CB08D5C5F51D
:2054400030DEF5E52A648A2322648A7EB7280D211000393DBEE1F13805C32054E1F1E5EB62
:205460005E2356E1233D28B84FEBF5C60423862B963D3050F11A4713CD575DFBCCA5540D61
:2054800020F3F5D5E53A5F8A3D16005F21D253197ECD895BE1D1F1C32054E1E1E121000049
:2054A0003A518A6FC9F5C5D5E53EFF32518AE506003A5F8A4FC50E03C5CDA34FC1C1C1E106
:2054C000D1C1F1C9F13E053C215F8A966FAF37172D20FC21518AAE77C3205406CE0E00CDB4
:2054E0008F4F210C89AF772111894F16647EFE5028093A0E89B7282BC36355237EB72B2870
:20550000F1237EB72829CB27E227550F0F0F2FE60F47A94F78C630771520E63E18320C89F4
:20552000C343553E1518F63E1618F23E1718EE3E04A94F237ECB27E227550F0F0F2FE60F7A
:205540008920E82120833406013A0C894F210088CD5B5D21F3C9227D87CDF15621FBC92221
:205560007D87C92A0F892B220F89CDF5553C320E892A0F89233A0E894FB728A73EFFCDED19
:205580005528A0CB121FE6F8FEA028050520F418EDE523220F89CB3F772BE31E0505CCEDF9
:2055A00055280DCB121F1D20F4E3CDD155E318EB16FFCB121F1D20FAE3CDD155E1AF320E8A
:2055C00089111189CDF5554F2A0F89CDD855C3D854CB3FE67C772BC9C5D5E5CB39280A46B1
:2055E0001A777812132B0D20F6E1D1C1C906052B56CB220DC92A0F89111189AFED527D3C90
:20560000C9118918800C8000802480118980806C80588094809732618A32538A06CF0E00C7
:20562000CD8F4F218A82CD725DFBC878FE022006213403CD89423D8716005F210B56195E73
:205640002356EB225B8A87878716005F21828319226 88ACB3F5F2140831922668ACB3F5FA1
:2056600021208319226 28ACB3F16005F210156195E2356D51600CB3F5F21828219225D8ABD
:205680003C32608A9711FC881213F321FC88E3CD725D7828061213E33418F3E12A5D8A97D4
:2056A00077FB21FC887EB7C84F22558A2A558A237E22558A47972A668ABE78205ECDB65755
:2056C0002856C5CDDF57C10D20E22A628A56235E978B28283DBB28253A538AB7281E7ABB97
:2056E000381A2100883A608A473A618A4FCD5B5DFB3A448AB728053E08CDCF5BC92B3EFFF6
:205700007723EB2A668A232323469777EB235E2356EBCD575DFB18CACDD5572A668A235E6B
:205720002356EB78BE2819EB23235E23F546CDDF57231D20F8F147CDDF57CDA357C3C75664
:20574000EB562B5E1373237223235E16001C7319772A668A35C2C75611030019462A628AD4
:205760003423235E2356EBCD575DFBCD97573EFF32538AC3C756E5110700D516001E06D5A9
:205780001809E5D526002E07E518003EFF32618ACDA34FC1C1C1C9972A668A1E0877231D23
:2057A00020FBC9972A668A772377237723231E04771D2320FBC9C52A688A4E16000C0D2820
:2057C0000E235E23BE280B38060D28031918F34705807BC1C9EB2A668A7723732372C9D546
:2057E000E52A588ACD575DFBCC82572A668A110300193 4E1D1C9C92A5C8C5E2356EB7EF58E
:20580000235E2356EB7E234E2346CD33423D20F6EBF13D20EA2A728CCD64420E0B064ECDBE
:2058200033420E0D0600CD3342CD4959FE2D200821B80BCD644218F187214C588530012448
:205840006F225C8C2A708CCD644218AB64586B5872587958805887588E5895589C58A358E0
:20586000AA58B15803CD58DB58E95803B858D458E95803B858DB58E95803B858E258E958EC
:205880003BF58D458E95803BF58DB58E95803BF58E258E95803C658D458E95803C658DBD4
:2058A00058E95803C658E258E95803CD58E258E95803CD58D458E9580307FC0810006E03EC
:2058C00007FC081000640307FC0810005A0307FC081000520307FC0910023F0307FC0910E2
:2058E00023A0307FC09100234030B4E0C000D0D06003EEFCD0F422A6D8CCD644206103E5A
:20590000EFCD0F422A6B8CCD64423A588C3D32588C20DD3A658CB7280D210A00CD644206BD
:205920003EDFCD0F42CD4959FE2D200821B80BCD644218F1FE0A30EDB720023E0A32583A
:205940008C2A698CCD644218A73A8183FE0228053E013281833A598C3D32598C28332A5A38
:205960008C7E23225A8CFE2D2820FE23281DFE2A281CFE502003F118ADFE542004F1C32933
:20598000580630FA5559FE0A30CBC93E0AC93E0BC93A8183FE0220053E08CDCF5B97328128
:2059A000833E1C93E97D3B306433A868CB0D3B3C93E97D3B33E43F630D3B3C93E97F620D3BC
:2059C000B33E43F6F7D3B3C9180111F32A9803F92176870E29CD805A21F3C9227D872A8EC5
:2059E0003EB2A8C03CD735A424B3EFFCD645DF5EB21080009EBF130EFD5CD145CC12A887C
:205A00003EB2A8A03E5C53680EB4E23462378B1204DEB3A7A873C327A87E5C50E20CD4064
:205A20005AC1E123232323712370231A7713231A7713010900093E04E3F51A13B7474F287D
:205A40008D516005FCD735A444DEBD1F1E3712370233D20E3C1EBE311200019D118A6D196
:205A6000D15E2356237AB32872E5EBCD725AF3E118EFE97BCD855CEB2923232323 19EBC9D1
:205A80003600230D20FAC9E3D5C5F5DDE5FDE5EB2100003922818 72A9803F92100F3227CC8
:205AA00087EBCD725AF33A78872FA7282E2A8187F93A7F87A7060220152101FB227C87FDF5
:205AC000E1DDE1F1C1D1E1FBC9F3DDE5FDE521000039EB2A76877023732372319F87AF3229
:205AE0007F873D327887FB0120002A8A0357180109147EA728FAE60C20F67EFE802817F355
:205B00002276877A3278877E3600E60223280B5E2356EBF918A300FB18FC3C327C873EFB9A
:205B2000327D872323352 34E2346235E235623EBF9FBCD495BFB2A7687EB21030019F37EB2
:205B4000A72898EB3601C3DB5AC5EB0E07CD805A233E04F55E235623EB7CB5C46D5DFB203F
:205B60006EBF13D20EDC9F12A7687110D001971237060692323E5232323235E2356E1C9DC
:205B8000E5D5C5F50602C3C95AE5D5CDFA5BFAA05BEB21030019F3341AF60112327F87AF79
:205BA000CD7D87D1E1C9E5D5C5F50604C3C95AE5D52A768711080019D1F37323722371239F
:205BC00070233600CDA65B7EA7E1C83EFBB7C9E5D5CDFA5BFAF35BF37EE6043EFA2814367E
:205BE0002327F8711080019AF7723772377237723 3604CD7D87B7D1E1C92A79876FBC3E52
:205C0000FF300F7DD52600292929 29EB2A8A031901B7C92A92032929EB2A94037BB228E3
:205C200063600231B18F63A9003328087C92A8A03EB210800191AB7F8E604280ACD515CCA
:205C4000300520033E0212FBEB01200009EB0918E5D5CD735C280F1B7AA33C20010BCD681C
:205C60005C7BB2B1B03FD1C9E5F373237223712370E1C9E5F35E2356234E234678B1B2B399
:205C8000E1C83EFFC9F5E5F377AF237723772377E1F1C9D5E5F5F356237EBA3806F1E1D1C5
:205CA000AF3FC93C77BA3F3C3DF5237EB720017A3D775F23231600E5210500397EE1B72037
:205CC0004197018051919712370F1E1E1D1C9D5E5F5F356237EBA30C43C77BA3F3C3DF536
:205CE00023237E5F3CBA2001AF7718C8D5E5F5F356237EB728A73D77FE013CF5237E5F3C25
:205D0000BA2001AF7723231600E5210500397EE1B720041946180519194E2346F1E1E1D1BF
:205D2000C9D5E5F5F356237EB7CA9D5C3D77FE013CF523237EB720017A3D775F18C8CDA627
:205D40005BC9C5210400395E2356010000CDAF5BB72100006FC1C997C3935C3EFFC3935C44
:205D600097C3CF5C3EFFC3CF5C97C3EC5C3EFFC3EC5C97C3215D3EFFC3215D3A7E90473E66
:205D80001F5CD2960E52A4C8C11080019EBE1AF77237323722373237223772377233A5075
:205DA0008CF68077F13C10D9C9C5210400395E7BFE1E280DFE1F2810FE20281321FF00C1AF
:205DC000C9CDF45E7CB5C1C9CDDC5D7CB5C1C9210000E5CD305F7CB5D1C1FBC9AF32A1876D
:205DE00032548CCDD35F47C5D5B72808217E904E0CB93806210100C3F15ECD2960E5232395
:205E0000235E2356ED534E8CED53488C2A4C8C23232322518CE1E5CD7D60C1D1C5E52125FE
:205E20008DE5CD0B61F1E1D1C1D5F51AB928273825CDC360CD936022488C5E78FE02381241
:205E40003E0132548C16001D2A4E8CA7ED52224E8C5F1600180DEB47799032A187573C8690
:205E6000771E00E1E57E935F7A16002820381EEB16005F19EBD52A4E8C19ED5B4A8CA7ED21

```
:205E800052D13809CDB960210300C3F15ED5AF21540CBEC1D12010E1CD305F7CB72004855C
:205EA000FE05D0E5CDC360D5C5C52A510C5E2356ED4B400C6B62A7ED4223E3260019EBC155
:205EC000ED08C1E1D1C5DDE1E5CDA760E1CD015FE5DDE5C12A400C3AA187470B72805360186
:205EE0002310FBD1EB4E0600ED80CDB960210000C9D1D1C9CDD35FEB3601EBCD015FE3E30D
:205F00007EFE012025D511258DD5CDFE61E1784680300147D1F5784806001223130D280244
:205F2000ED80F13006E1210900C912E1210000C9F3D9DDE1CDD35FDDE5CD015FCDC3607E86
:205F4000FE0120377E16003D5F2F3C06FF4FC53601 23E519E52A4C8C2323235E2356EBD1F4
:205F6000A7ED52444DE12803EBED80C1D1CDA760DDE1CDB15FDDE5D5CDB960D1D9FBC9FB2F
:205F8000C9217E906E2CBD3008210100 7D04C3AF5FCD2960F1E5F57E0CB930072102007C14
:205FA000B5180B0DD5C5CD7D60C1C5CD9360C1D1C9E53A558CF521558C343A538CBE380DD0
:205FC0002100019EBCDA260CDA76010E9F132550CE1C9AF32508C210A00397E23234E23EC
:205FE00046235E2356236ED5E5C5217E9046110000E01210B90BE280D190C10F93A7E900F
:206000003CC1E145D1C97923C15E1600236EEBA7ED42300E7BEB210000A7ED524D0600C5DD
:2060200018C8E14532558CD1C9C5D53DF526006F292929EB2107901946234E23798657F174
:206040005F8632538C237E32508CD57887870716005F792A7C90194E2346235E2356ED534AC0
:206060008CD187878726006F09E57A3D87878726006F09224C8CE1229F87D1C1C9235E239F
:2060800005623E523237ECB5728062323 7E32508CE1EBC9C5AF41B0280711000 05E1910FCFF
:2060A000C1C921010018052103001800D5195E2356EB09EB722B73D1C9CDC3602A9F87CD80
:2060C000D560C9E5D5F52A9F87110700193E800677F1D1E1C9C5D5E5235E2356234E2346E0
:2060E00008 23E560693E02CDC521E35E2356237ECB7F2007E1EBA7ED52180CD12B722B7323
:2061000023233E7FA677AFE1D1C1C9C5E5DDE136011AFE0230233601 3A508CE60F1A2803D9
:206120003423773D4723AF32568C77F5131A4FF1C5D5CD3B61D1C110F2C1C9F53A508CCB57
:206140004720 18CB4F2055CB57280D3A568C3CFE0532568C38021844C3E86179D620FE401C
:206160003 80AD620FE403804D620E63F4FF1571EFFB72002CBDFD60247F5792805 0FCB3 84C
:2061800010FB4F7AFE022803DD3400B7280B79A3B677237B2FA177F1C971F1C9E579060F7F
:2061A0000E0021EF61BE2820230C10F9E1F1CDCA61F51ACB3FCB3FCB3FCB3F4FF1CDCA61E9
:2061C000F51AE60F4FF11802E1F1B720043600CBDFD60447F5792804CB2710FCB677F1B746
:2061E0002804DD3400C923C9F17123DD3400C93031323334353637383 9542A232D20C5D5B9
:20620000DDE1DD3600013A508CE60F2801 23460523AF32568C13DD3400C5D5CD2662D1122E
:20622000 78C110F1C1C9F53A508CCB472017CB4F2043CB57280D3A568C3CFE0532568C38CB
:206240000218321869F11EFF57B72002CBDFD60247F52804CB3B10FC7AB728037BA6234F48
:206260007B2FA6B1C1C54F78B779280307 10FDE63FC620C1C9F1CD9762FE0F200F78CD97FD
:206280006287878787 5F78CD9762B3C9E521EF6116005F197EE1C9B72002CBDFD60447F5C2
:2062A0007E2806CB3F10FC1803E60F23C1C9F17E230600C921C262017002EDB301E309EDCC
:2062C000B3C90701180446010003C105EA0E0D217642D8E3E6012802DBE1FE0637C8FE158F
:2062E000280CFE052808 2B7CB520E70D20E1B7C94FC5E5066D215912DBE30F300CF5D8E194
:20630000FE15280DFE052809F1E602280879D3E126E1E1C1C92B7CB520DE10D9182CC5E528
:20632000D0210200DD39CDB462060DCDCD6220333005CDE66218F7C5219764117789010AAC
:2063400000ED80CD9550C110E2040458DDF93E07D3703E20D37021F10001E308EDB350EB00
:20636000FBC1C9F321A1641177890 10A00ED80CD9550E116803E0829303 4E51808 7CCDF08C
:2063800062C20D64E12100025DCD7D633E24CD7E637ACD7E631ACD7E631C20F9CD7D63CDA8
:2063A0007D63CDCD6230DE147AE60720D8E1825720C321C66346237ECDF06228F510F7CDA2
:2063C000CD6220EE188504022A80FFCDB4620E05CD3B64C454642809FE022807CD5F642046
:2063E000F718EBF3167F317D64D92100005CD91816D9D62A5F2031FEFA203B180A57D9BABC
:2064000003034203231 8564184B282BD94F06087C29A9F21D643E05AD6F3E80AC67CB0110E3
:20642000EE79C9121CD920DC318964 18DAD918D77CB57AD9283E0E15319364061F2137128D
:20644000D8E3E60420082B7CB520F510F0C979D3E1C928E4061F213712D8E3E60120082BA9
:206460007CB520F510F0C9D8E1C928CCFE02CAE663CD5F64570E067BB720BD18BE0964F143
:2064800063 0964FD630964236409642D6409643064000 52646A640007004E4F20434F4D82
:2064A0004D0007005 3454E44494E47C5210600390600 4E2B7E2B6E6779E5D109E5EB4E09FF
:2064C00058477990 47CDF76428197ED630CB27FE0A3802D60983 5FCDF76428077ED630838D
:2064E0005F18E2D60A2805F2E364ED44E1C1C6308ECAA27EC3957E2B0DC80528FAC9C53EC3
:20650000 0132A2873EFF326E8ECD1766210400397EF523234E2346C5E60C2807CD072120A1
:20652000 50C1D5E1CD7B65F1F5E6300F0F0F0F5F160021C565197E329A86FE2F2004AF32D4
:20654000A287AF32408ECD8766CD2C6A210A00394E2346F1C5E6032807CD0721 2014C1D56E
:206560008E1CD7B65AF32408ECD8766AF326E8EC1C9C1C12A29903E01771 8F0461E2DD5E51F
:20658000CD7F7BE1D120053E10323F8E1E2ED5E5CD7F7B4DE1D13E00280632A28778913D2F
:2065A0005F3E0C935F1600E521208E19EBE1D51600501 92BD1057EFE2E2806FE2D280212F5
:2065C000132B10F2C92B2D502FED5B29903A2B9021208E4605B03001477012D52313237E5D
:2065E000FE202007E335E310F518031210EFE13AA287B72803353535C9C5210000E52E01A2
:20660000E52E2DE5CD1A40E1E1E121536AE5CD5E7AE1CD1766C1C93E0132408ECD1A6ACD11
:206620002C6A32418E323E8E321E8EC9C53A408EB7280C21466AE5CD5E7AE1AF32408E3249
:20664000418E3A3E8EB72805CD177A18123C323E8E212B8E223C8E21496AE5CD5E7AE1C1F9
:20666000C9C53A408EB728112E1A2600E52E01E5CD207AE1E1AF32408E3A1E8EFE0C380528
:20668000CD177A18303C321E8EAF32418ECDA07A3A9A86E60F473A3E8EB72011782137 8EC1
:2066A00011308E010C00EDB8322C8E18082A3C8E702B223C8EC1C9C5AF32418E323E8E329B
:2066C0001E8E3A408EB728103A1F8EFE3D28323A9A86321F8EC3E46721118E11048E010DE3
:2066E00000ED0011208E21128E060C3A3F8E32118EAF323F8E771AED67131AED6713231039
:20670000F4214A8E061E97CD036A21F78D22448EE5060DCD036ADDE1214C67E521118E2273
:20672000488E11048EED53468E3A1F8E473A9A86321F8E78FE2BCA2668FE2DCA2A68FE588F
:20674000CA6F68FE2FCA1569E1C3E467E6FE280E213F6A11208E4E0600EDB0C3C467212071
:206760008E3E0277233E1A7723E5061A3E30CD036AD121F78DCB6628083E2D121321208EDC
:20678000 3421038ED5CDEE673E2012133E2E1213E1E53E30010C00EDA1E29E6720F92BEB1B
:2067A000ED52E5C1EBD1ED8021FD8DCDEE671BEB0E0B3E30EDA9E2BB6720F9111E8EED528A
:2067C0007D32208E21208E7EFE14DAD0673E1377E5C5D5CDC965D1C1E13A6E8EB72008E53D
:2067E000CD5E7AE1CD2C6A3E0132408EC1C93E300606ED6F1213ED6F12132B10F5C9C53E6F
:206800000132408EAF323E8E321E8E3A418EB7F5C41A6AF1CC2C6A3E0132418E214C6AE5A0
:20682000CD5E7AE1C1C90E0018020E101AE6D0F6C0DD7700A9AE2313DD23060CCB67201324
:20684000CDE769D2BB69214A8ECBC62A448ECBCEC3BB69CDF569D2BB692A448E7EEE10770F
:20686000B723060C3E009E27772310F8C3BB69CDD969ED536A8EDD22688E3E0C326D8E3EAF
:20688000001326C8E3A6C8EB72A6A8E7E20040F0F0F0FE60F4F281A214A8EED5B408E13DD53
:2068A000214A8E060CCDE769300421568E340D20E63A6D8EFE073A4A8E380BE60F281A2A40
:2068C000448ECBC61813E60F473A6C8EB77020040F0F0F0F2A688EB677060C21568E7E71D8
:2068E0002BED6710FB216C8E3528992A6A8E23226A8E3A6D8EFE0730072A688E2322688ED2
:206900003D326D8EC27F68ED5B688E214A8E0E06EDB0C3A569CDD969E5010600214A8E09AE
:20692000EB0E0CEDB0E1060C48CD086A28533E25326C8EDD22688E115C8EED536A8E973240
:206940006D8E214A8E0612CD0E6A216C8E3528402A688E41CD0E6A97326D8E2A488E23EDB4
:206960005B688EDD2A6A8E41CDF56938D5216D8E342A688EED5B6A8EED53688E226A8E1836
:20698000DA2A448ECBD6233E99060CCD036A182B2A688E41CD086A2A448E2802CBC6EB13A2
:2069A000214A8EEDB0114A8E0E06EDB0214A8E0606CD086A28052A448ECBCE21F78D1111DA
:2069C0008E010D00EDB02A448EE523060CCD086AE12002CBA67EE60FC91AAEE610F6C0DD28
:2069E00077002313DD23C9B71A8E27DD77001323DD2310F4C9B71A9E27DD77001323DD2324
:206A000010F4C9772310FCC997B62310FCC93A6D8EED6F2310FB326D8EC93E2B321F8EAF49
:206A2000323E8E21F78D0627CD036AC9212B8E223C8EAF323F8E21208E0618CD036AC90718
:206A40001A4552524F52031A3003202E071A30202E3030061A43414C433E0118063E04180B
:206A6000023E0232A587ED5B1A90C53AE086473AF2864FCD1B213E0132A687EB444D16009E
:206A80005E1936FFED5BE4867AB32010505913E521A88736FFE1AF32A78718303AA787B7BE
:206AA000282AAF32A787E52A3E907E3600E1FE01201A32EA86E52AE1867D8428047EF601E0
:206AC00077E13AE886B72804133D20FC32E88637ED523832EB7EFE51CA0E6BFE53CA376B2F
:206AE000FE52CA9A6BFE54CA326DFE55CA386DFE56CA436EE67FFE413805FE51DA3D6C2355
:206B000022E486C36B6A21FFFF22E486C[illegible]C93E1CCDAD6ECDC86EB728053DCB27CB274F3A49
:206B2000DF86B1F640CDAD6EED53E1863E0132DE8622E486C36B6A3AA587F5CDC86EB7204C
:206B400018F1E5FE042804E1C3E686E5CD877AE13601E1C3316B32E086210000 2288
:206B6000E486AF32DE863C32D586F1C1FE01CA596AFE02CA616AFE04CA5D6AC5C3066B231B
:206B80007EE60F23C3316BCDC86EFE09D2316BE5CD716FE1CD166FC3316B237EFE23282258
:206BA000FE2A282DFE24284AFE2B28462BCDC86EF5CD2E6C20023E0147F1CDAD6E10FBC354
:206BC0002C6BCDC86E47237ECDAD6E10F923C32C6BCDC86EF506207EFE2D2804FE2C200484
:206BE000CDC86E47F14F78E52AE686CD0870E1C32C6BCDC86E4F0600ED5B23907EFE2D2874
```

:206C000004FE2C200B23E5C5D5CDB538E1E1180DE5C5D5D5CDFA38D1CD3770E1E12A2390A1
:206C2000E52AE686E5CD4C7BE1E1E1C32C6B7EFE2C2806FE2D2802AFC9CDC86EC93AA5878E
:206C4000FE042823AF32D6863A16903D32CF86E521BE3922CC86E13ADE86B720053E1CCD13
:206C6000AD6E3E0032DE867ED64047237EFE41380DFE513009E60F87878787804722 322E49C
:206C8000863AA587FE04286D2BCDC86EF57EFE2C2804FE2D2049CDC86EE521D68636021138
:206CA0009439FE012825360011AD39FE02281C118E39FE032815113D39FE05280EF53E020F
:206CC00032D486AF32D486F1116D38E1ED53CC867EFE2C2804FE2D2006CDC86E32CF8622FB
:206CE000E486F10E00FE033805D6034F3E0332E3067932E886783AF3864FCD0A3CD53AA58F
:206D000087FE022814FE04201C2AE686E3E5CD4C7BE1E12AE486C3316B3AEB86B72806AF8C
:206D200032EB861803CD3B7CCD5E7AE1C12AA78734C9ED5B0E901804ED5B1190D5237EFE16
:206D400024CA056EFE2BCA056EF5FE2A2807FE2328032B1800CDC86EF5CDC86E4FF147F11E
:206D6000D1E5EBFE2A282EFE23CA0D6E7E3D282E3C04052807233D282510FA5F0C0D284B67
:206D8000ED5B1490B930014F793C1213ED80E1CD166FC32C6B5E23040528251D200A3E016D
:206DA000E52A149077E118567EFE1C232810FE3D20E93AA687FE0028E23E0032A68710D82C
:206DC000410405280 61D28D62310FA43EB2A1490360123EB0528277EFE1C2822FE03281E35
:206DE000FE3D200E3AA687FE0028073E0032A687180C7E1213E52A149034E12318D6E1CDAB
:206E0000166FC32C6BD1C3876BD1E518F178414FCD0A3CE17EFE2C2804FE2D2020CDC86E10
:206E2000F5CDC86E47F1B72814E5682600E56FE52A1490E5E5CD257BD1D1D1D1E1CD166F07
:206E4000C32C6BED5BE686D52322A387E51100007EFEFF280CFE413804FE5B3804231318DD
:206E6000EF22E486D57B32A6872A79907CB5C46F7ED1D1D12AE486C32C6BE1D1D5E52AA139
:206E8000871C3AA68757141D280F1528147E23FE2C28F4FE2D28F018F12BCDC86E6F2600E2
:206EA000C921FFFFC9ED5B0E90ED53E6864FE52AE6867EE52110906E2D2DBDE130081600ED
:206EC0005E34791977EBE1C9E5210000E3237EFE24281FFE2B2818FE303813FE3A300FD65D
:206EE00030E329545D29291916005F1918DEE37DE1C9D1237E2311EE86FE31281711EC86A1
:206F0000FE35281011ED86FE36280911F186FE372802AFC91AC97EFE2CE52804FE2D204295
:206F2000E1237EFE2D200123F52BCDC86EF5CDC86E32E986F116005FF1E52A14902809D594
:206F4000E5CD4370E1D1181AD55EE3E5A7ED52380D233AE9864F7DE1E1CD8F6F1804D1136D
:206F6000E1732A1490E52AE686E5CD4C7BE1E1E1C9ED5B149021EE86FE01282021ED86FE35
:206F80000228252A2390FE0328122A1190FE04280B21EC86FE0528103E0112C93E01124E03
:206FA0003DB9C80600EDB0C9D55E1600D5CDCE7BD1D1C92A0E9018072A0E9018000E2047CC
:206FC0007E5F1600807719712310FCC9F1E1D1D5E5F5C5435E160034195D541B1A771B2807
:206FE00010FA362EC1C9F1E1E5F5C5E546052815235D541AFE2E2008E335E3131A0528051F
:2070000077231310EEE1C1C9C5060032E9861809F1E1D1D5E5F5C5424B16005E1BE56069EC
:20702000A7ED52380D280B3AE9864F7DE1CD8F6FC1C903E171C1C93E2032E98618053E30AE
:2070400032E986F1E1D1D5E5F57B3C96C83831C5F57EB72003F1C1C9D57B5E3C7716001BA0
:207060004B42E519F1D1F5E5F5E119EBE179B02802ED80E123F1473AE986772310FCC1C921
:20708000C54B0600733423E52F3C16005F19D1ED80C1C9C53AA786B7C22A7121F912E5CD1C
:2070A0003773D1CA2A71AF470EFFC50E54C5CD1A40E1E10E64C5CD8C37D1206E0E01ED5B9B
:2070C0001490CD25211A133D4F200BCD3B7C217911CD627A184AC5D5215000E5CD1A40D1F3
:2070E000D1D17CB520440E0AC5CD4C37D1203B3A8183FE0128F0CD3579CD031DCD0936FEF9
:20710000528273AA886B728F32A08872600E50E050601ED5B1490D5CD2521CD8D73D1D1C0
:20712000CD1538CD177AC1C35536CD177AC1C36F083A9C86FE04C8FE05C83A8C83B721EA73
:2071400012201C3AA786B721B8122013C5CD3B7C3AF3864F0600ED5B0B90CD2521EBC1E5CA
:20716000CD5E7AE1C9C53E013207873E0232CE8621A712E5CD3773D128423E0132A98632F3
:20718000D5861838C5AF328182CDA07A3A9B866F2600E5CD163BD1E52E56E5CD1A40C1D1E9
:2071A00021A9864E3E20B93813340973180EC521E012E5CD5E7AE13EFF32D586C1C9C5217C
:2071C0005300E5CD1A40E12E51E5CD1A40E1C36671C521B312E5CD37737D84E128DE3E020A
:2071E00032CE86CD3B7C21A986E5CD4336E17EFE0238C93D4FC523E521C800E5CD425DE136
:207200002E50E5CD1A40D1D1D1C3BC71CD1372C8C33072D52A77901600F57E5F3C280AF1B5
:2072200023BB28085E193D18F06F67F17DB4D1C9D506007E3D8787873DB9381D790600CB32
:2072400039CB39CB390CE509F6073C477EE1C50E00CD5D7279C1B7D1C9AF4F18F91F10FDDF
:20726000D0F50CF1C92A7590E57EB928053C28241819237EB828023012237EB8380D237E4E
:20728000B72803A32805B3237E180DE1D511050019D118D4AF676FE3E1C92A7390E57EB9C6
:2072A00028053C28021814237EB82802300D237EB83808237E235E235618DDE11106001915
:2072C00018DB2A7590E57EB928053C28C7180F2323237EB728B0A32805B3237E18BAE1D5CF
:2072E00011050019D118DEF1E1D1D5E5F5C54DCDC2721811DDE1F1E1D1D5E5F5DDE5C5F57E
:20730000C145CD65727DB4C1C93A8883D603181EDBE3E62018103AFC86B72012210500E518
:20732000CD8C37D118003E0028013D6F67C921FFFF2801237DB4C93A868CB7201D21550076
:20734000E5CD1A40D17DFE0D201B3AA786B7201521C512E5CD5E7AE1181F3A8183FE01283B
:2073600018FE022814215200E5CD1A40D1E1D1D5E5D5CD5E7AE1C3A27ECD357C110A00190D
:20738000E5CD8C37D128B0C3957EC3A27EAF32B8873C2A119077F1E1D1D5E5F57B32A98749
:2073A000C5E5AF329C8621B80BE52A119023E5CD9078D1D1E1C29B74E53A9C86FE052802ED
:2073C00018E0ED5B1190ED53B6870E050602CD25213E200E07EBE5CD08702A0E9022B48774
:2073E00036102336022311FA01EB010600EDB0E13601230E07EDB0EB3AA98777233E0032E2
:20740000A9872AB487E5CD4C7BE1E1CD77771803CD90773E01325E87AF329C86210500E58E
:2074200021DC05E52AB487E5CD0378D1D1D17DB4211513C2B9743A9C86FE0220092AB6873B
:20744000360223771809AF329C863C2AB68777210300E5217017E52AB687E5CD0677D1C18E
:20746000C17DB420363AA987B728003DCA67753DCA6276EB237EFE25CAA376FE27CA537667
:20748000FE31CAE275FE30CA4275FE322853FE332855FE34286821371318 1EFE05200521E8
:2074A00045131815FE01200521071318 0CFE0620052107131803212613E5CD5E7AE1CDC3F0
:2074C00074C1C9216B00E5CD1A40E12E53E5CD1A40E12E51E5CD1A40219001E3CD425DE15A
:2074E000C9CD2C75C34674CD2C75212C01E5CD425DE1CDC3743AB887B7C20000C1C9CD2C71
:207500007521819034212C01E5CD425DE1CDC374216400E52E28E5CD1A40D1D13E0EBD286D
:20752000EF2A3E907EFE0220E7C300002AB68723361A2B35E5210100E5CDBD7AE1E1CDCB98
:2075400077C9E5CDCB77E13E0132A98723CD357732AA87CD8A21F57D32AB87F121AD87CD15
:2075600013773EFF32B0873E35CD4E773AB0873C21AB87BE305B21B187F5CD1377F132B015
:2075800087473AAA874FCD07211A3D20DFD5CD5C772AB487E5CD4C7BE1D13AB0873C21AB92
:2075A00087BE302D473AAA874FCD0721EB5E1D2009043AAB87B83819188EB2AB4877E3C3CCD
:2075C000083D6463803C3107416005E3419361C189B2AB4872323233E31773E0032A987C3AD
:2075E000107423AF32B187CD357732AC87CD357732B087E52A1790E5068236013E202377B9
:2076000010FC0682D1E1D50E007E0C2313FE1C2813F53E0132B187F1FE032800123E0032EA
:20762000B18710E5D17912E5D526003AB0876FE53AAC876FE5211F00E5CDA95D7D329F868F
:2076400021080039F9E13AB187FE012096CDCB77C34674233E0232A9877E32AD873E003222
:20766000AC873AAC87F55FC68032AC8721AD8756343E26CD4E7772233630F1B7280134E5B1
:2076800023EB018000EDB0EBA72AA9872BED523007E13434AF32A9872AB4873685CD8177C2
:2076A000C310743E0132B8872356237EF5CB471E0028021E8023B7E5210090ED52E1200913
:2076C000D5E5CDF276E1D1201D018000EDB0CDCB77F1CB4FCA4674CD8F0D3E5032A9872196
:2076E0006311E5C3C273F1215413E5CD5E7AE1C30575D1E1E5D5C53E0BBE20112311FD017D
:207700006031A13BE23200510F8AF180137ED627DC1C9473E03772370E6F00F0F0F0FCD57
:207720002C77772370E60FCD2C7777C9FE0A3802C607C630C97ECD467707070707 47237E15
:2077400023CD4677B0C9D630FE0AD8D607C92AB4873604233602237723 3630C921AD87E557
:207760002AB487E5CD4C7BE1E121B187E52AB487E5CD4C7BE1E1C92AB487E516005E3419B7
:207780003603E1AF460505342323AE10FC2377C92AB487E55E160019343603EBE1E52323FE
:2077A0003E01CDBC77E35E3434160019D1722373C92AB487E55E1600192B18DFE55E1600BE
:2077C000191BE123EB3E01CDC521C921D477E5CD8B7AE1C90206DDE1E1D1F1F5D5E5DDE524
:2077E000C5F5C17932B987ED4B9D86ED539D86C5E55E1D3601201823EB0619CDA778207127
:20780000E67FFE02280610F32E021865E1E55E160019EBCDA7782059CD7C78FE252814065C
:20782000FECD8578204BCD7C78FE03281210F22E02183E0682CD85782037CD7C7810F6CD54
:207840008578202DCD7C78CD85782025CD7C781B23EB3E01CDC5217CB5281421B987352807
:207860000A2E15CDC670E1360118852E0418022E00AF67B5D1C1ED439D86C1C9DDE1E13474
:20788000E513DDE5C9CDA778C84F7DFE01C079C9F1D1E1E5D5F5C5ED4B9D86229D86CDA7B9
:2078A00078ED439D86C1C9D5CD0936D120102100003A9C8612FE042804FE84200323B7C98C
:2078C000BFC9F1E1E5F52600E5210400E5CD207AD1D1C9DDE1D1E1F1F5E5D5DDE5C5F5C140
:2078E0007932B987ED4B9D86C5D5229D86CD8B7A0E19CD09362806FE03281B182C3A9C864C
:20790000E67FFE0420042E01181FFE062819FE022815FE15200A21B9873520D12E041809DD
:20792000D20CF2E0218022E00C371781E283E7F21527918101E683EFF215E7918071E20F8
:207940003E7F216A79F33287837B32578ACDAA00FBC9E209180447011303610520FFE20991
:20796000180447011303E10568FFE209180447011303600520FF0D3039323338353132307C

:20798000303030C5210400390603SE235623D510F9C179E1D1CDC521C17CB5C9AF0405C879
:2079A000AE2318FAD57ECD8879070707075F237ECD8879E60FB3D1C9D630FE0A3802D60712
:2079C000C9F1D1E1E5D5F57DFE10D02101008728O3CD087AD5CD017ACDC47DEBE1732372DF
:2079E000C9F1D1E1E5D5F57D21FEFFB72806FE10D0CD087AD5CD017ACD677EEBE17323721C
:207A0000C9E5EB5E2356E1C9C5F5B72807F1F547ED6A10FCF1C1C9210800E5CD1A40E1C9C2
:207A2000C50632C5210800395619E02D516002B2B5E21000039CD4A7AD1C128021002C1C9CA
:207A4000210A00E5CD425D0118D9010000C5D5E54EC51E29D5CD1A40D1D1D1D1D1C9D1E182
:207A6000E5D5C54E0D281E0C281B0DE5233E1ABE21C8807E232801968930014F0CE17111F8
:207A80000100CD4A7AC1C93E0018063E0418023E10D1E1E5D5E56F2600E5CD8D7AD1D1C982
:207AA000C53AD586B72807CD3B7CAF32D5863A9A866FE52E01E5CD207AE1E1C1C9DDE1D1C2
:207AC000E1E5D5DDE5C54605281E04281B05C523E56E2600E5D5CD207A7CB5200BD1E1E136
:207AE000C110EBCD957EC1C9D1D1D1D1C1C9CD767BDD6E00DD6601DD5E02DD5603DD4E04A3
:207B0000DD460578B12843092BEB092BED88183ACD767BDD6E00DD6601DD5E02DD56034E51
:207B2000CD107D1823CD767BDD5E00DD5601DD6E02DD6603DD4E04060009DD4E0679B02830
:207B400093C1213EDB018027CB5C1C9CD767BDD5E00DD56011A6F260019DD4E02DD460301
:207B6000C50A3D4F1A0112EBE14E0600230B7881280D48EDB018D4E1C5DD210400DD39E9CD89
:207B8000767BDD6E00DD6601DD5E024E060079B0280F7B5923EDB1E2A17B7B916F26001828
:207BA000A721000018A2CD767BDD6E00DD6601E5DDE1DD5E00210000DD231D288BDD7E00CC
:207BC000E60F444D292909294F06000918EACD767BDD6E00DD6601DD5E02DD5603D53E0167
:207BE0001213011027CD037C01E803CD037C016400CD037C010A00CD037C7DF63012E134D2
:207C0000C34A7BCD267C2007A7ED42300509C9A7ED423E2F093CA7ED4230FA091213DDE1F5
:207C2000E334E3DDE5C9E5D5210800395E23561AFE01D1E1C9ED5F6F2600C9211A00E52E40
:207C400001E5CD207AE1E1C9C521090039462B4E2B562B5E2B7E2B6E6778B12803EBEDB0D6
:207C6000C1C9C5210400395E2356234E2346236EEB78B1CA7C7C73230BC3717CC1C9210241
:207C800000397EFE30DA957EFE3AD2957EC3A27EF50F0F0F0FCD997CF1E60FC630FE3A38B3
:207CA00002C6077723C9B728133D28163D28193D281F3D28223D282821FFFFC97D842826A8
:207CC00018287D3C282018227DB4281A3C281718197D3D281118137D8428083D2808180AF9
:207CE0007DB420021804ED538F85210000C97DB4C8FE02C8F5214212111100FEFF280AFE5D
:207D000083802D606471910FDE5CDC10CE1F1C9AF47B128121AEDA113FA237D2009E22B52
:207D20007D18F2210100C921FFFFC9210000C9B7C03DC97C2F677D2F6FB4C97AAC32B8873E
:207D4000CD667DEB3AB887B7FAB27D7DB4C9CD7C7DEB7DB4C97A32B887CD667D3AB887B7B6
:207D6000FAB27D7CB5C97CB7F2717D2F677D2F6F237AB7F27C7D2F577B2F5F13C5444D21C4
:207D800000003E1032BA8729EB29EB3001237D916F7C9867300E093ABA873D32BA8720E735
:207DA000C17DB4C9133ABA873D32BA8720D9C17DB4C97D2F6F7C2F67237DB4C97CB5CAA22F
:207DC0007EC3957E7CB2677DB36FB4C9EB7BE61F5FCAF07D7CB4F23A7E7C371F677D1F6F7F
:207DE0001D20F6B4C9EB7BE61F5F2804291D20FC7DB4C9EBED52C9EBE1C54E234623E8092F
:207E0000EB4E2346237AB838047BB93004232319195E2356EBC1E9EB7D937C9A3E003FCE87
:207E2000006F2600C9EB7D937C9A3E00CE006F2600C9EB7BE61F5FCAF07D7CB71F677D1F13
:207E40006F1D20F6B4C9ED80C9D121020039C5D511BC8706067E1223130520F921617EE3AF
:207E6000E9C17CB5C9A7C97CA2677DA36FB4C9E9E1C55E23562344D21000039EB39F9D5F7
:207E80006069CD6F7EEBE1F9C1EB7CB5C97D9320047C92280D210000AFC97D9320047C92A2
:207EA00028F32101007DB4C9EB7CAAFABB7E7D937C9A3F3E00CE006F2600C97A07E6016FA1
:207EC0002600C9EB7CAAFAD57E7D937C9A3E00CE006F2600C97C07E6016F2600C9C5444DA7
:207EE0002100003E1029EB29EB3001093D20F6C17DB4C9EBE1C5424B5E23561B7AB7FA1058
:207F00007F2379BE280523232318F02378BE20F7237E23666FC1E97CAA677DAB6FB4C9D1C5
:207F2000E1E5D5C511B64706004E231A13EDA12003EA2B7F60697DB4C1C9D1CD5E7A0018D8
:207F4000FDC5DDE5FDE5FD2100002108003911C2877E12472323137EFE233013FE00FA6F68
:207F60007F123A4C90883807FE00FA6F7F1807FD230E00C3C67F2A4D9004052806110500D4
:207F80001910FD3AC38747E6F80F0F0F16005F78E6073C47197E0E000F30010C10FA380451
:207FA000E0118221DFAB47F2B7E06080F30010C10FA18F00B2A4F903AC2875F16001919DB
:207FC0005E2356EB094E06002A51900909EBDD210C00DD390602DD6E00DD66011A77DD2332
:167FE000DD231310F1210000FDE5F1A7280128FDE1DDE1C1C90062
:00000001FF
E06002

TABLE XXXIV

Object Code of PREZAPD Preprocessor Program

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
:10010000C35B38002750524555A41504420127C00AE
:1001100000A04040404040000008F8F8F8F8F82106
:100120001FF220078CD96012A0D0101640009C16A
:10013000F9C50117010AB7C03D02221301EB2211D4
:1001400001C13600237D937C9ADA4201C5CD3D0280
:10015000210 1FF2200780E0CCD0500221801 7DE65A
:1001600030D6300E2D1EFFD405002180007EB7C88A
:1001700047237EFE20C27D0105C8C371012B70E5B7
:10018000 6823E523CD6102220F01C1D170231A77C4
:10019000130DC28D01C92A0479220879C9C3000050
:1001A000220E79C9220A79C92A0C79C92A1279C979
:1001B0002A10797DB4C8E5210400CD6102C1E5367D
:1001C000802336022371237 0E1C92A0A79220C792F
:1001D0002A0E797CB5CAE401EB60692210792A13F2
:1001E00001F9EBE9C50E09112C02CD0500D1D50EA0
:1001F00002CD0500C1580E02CD050011350 20E09D1
:10020000CD0500F1F5CD1502E17DCD15020E021EE2
:1002100048CD0500C7F50F0F0F0FCD1E02F1E60FF9
:10022000C69027CE40270E025FC305000D0A455237
:10023000524F52202420415420504320242218019D
:10024000444D360023360023EB210000221D012AF5
:100250000600EB7B91772 37A9877211B0122150109
:10026000C93E01321A01110200 19DAD302444D7D50
:10027000D6FD7CDE7FD2D30211FCFF192A1501DAEC
:1002800084020E042215015E23567BB2CACB02D52E
:100290001313EB5E23567B915F7A9857E1DA840261
:1002A0007BD6047ADE00D2B E02E5EB2A15011A776E
:1002B0002313 1A7713E11A7723131A7723C9E52337
:1002C00023732372E11971237023C9211A01352385
:1002D000CA8402014F4DC3CA012B462B4EEB2A158F
:1002E000017D937C9ADAEB02211B01221501 7E230A
:1002F000666FB4CA1B037B957A9CD2EB02D5EB09DF
:100300007D937C9AE1EBC21B037E1223137E1223A2
:1003100018 7E23814F7E8847C321037D12137C12ED
:100320001B2A1501E5D523235E235619D17D937C25
:100330009AE1D23F03732372EB23237123 70C91A0E
:100340007723131A77237E8177237E8877C9EE3748
:10035000F5110000211B014E2346237E23666FF119
:10036000F5DA680319C36F037D937C9ADA7003EBA7
:100370006069 7D84C25703F1EBC9EBC121F8FF39C5
:10038000F9C5EB424BC3A109444D21020039CDA16F
:100390009D1F9EBE921020039EB210A00394E239A
:1003A0004623EBCDA109EBD1F9EBE9CD8103C39223
:1003B00008424BE5CD7A09C1C9E521040039444D15
:1003C000CD7A09C1CD9208E1D1D1D1D1E9444DCD49
:1003D0007A0921020039444DC3C403210A0039447B
:1003E0004DCD7A0921020039444DCD9208E1D1D199
:1003F000D1D1C3C803CD8103CDAA05C121F8FF398E
:10040000F9C5444DC38E09CD1104CDAA05C1C38ED3
:100410009444DCD7A0921040039444DE3E9CD2446
:100420004C30A0421040039444DCD7A09D1C12105
:1004300080039F9C5444DC5EBE9CD8103CD80068F
:10044000C3FB03CD1104CDB006C30D04CD2404C3FA
:100450004604CD8103CDA705C3FB03CD6404CDA7EE
```

```
:100460005C30D04E5210600394444DC5CD7A09E1E7
:10047000C1E3E9CD1104C35E04CD8604CDA705E137
:10048000D1F9D5C30204210C0039444DE5CD7A09D8
:100490002106003944 4DE1E3E9CD8103CD7F07C327
:1004A000FB03CD6404CD7F07C30D04CD1104C3A5A8
:1004B0004CD8604CD7F07C37F04444DCD5608C3C9
:1004C000FB0321020039444DCD7A09CDC20AE8C1AC
:1004D00021080039F9EBC5C921020039CDE904EB47
:1004E000C121080039F9EBC5C9444DC50A01010510
:1004F0007D2F704010905CD7A09C1CDAA05C3C207
:100500000A400000000000050C000000000000091
:1005100050EBE1223679EBCD7A032A3679E52102D8
:100520000397EB7C8EE8077C9E1D17BE67F5FD521
:10053000E9D1C1E1E1E1D521000079B7C828F82369
:1005400023C9211D790E07E5C51195322A3979CDC8
:100550001B0A110D1B197CE67F67223979EB2148B4
:100560001CD5B0A3E99C601272DF26605C1E177F0
:10057000230DC247053E40321579AF321479CD0ABA
:100580009012579C5CD8E09E1C37A030E0CCD058D
:10059000000252A0279C2A3051125790E9BCD0500FD
:1005A0002A2879223979C93E80FEAF3238793A1546
:1005B0007957B7C2C205CD7A09211479 3A3879AE94
:1005C00077C90AB7C8E67FBAC5D2DC050125 79CD5F
:1005D0008E09C1CD7A09211479C3E605012579E197
:1005E000CDA1092125793A3879AE773A2579E67F88
:1005F0005721157996CA2E06FE10012579D27A095F
:10060000723236790FD21306F5AFCDE708F1E67FE7
:10061000CA2E06111C796F260019EB473E08904F31
:100620001A7713230DC22006712305C228063A2526
:1006300079211479AEFA5206112679CDC209D24930
:10064000063E01CDE708CD7107011C79CD6A09C3CB
:100650005E07212C79CD3F09111D79212679 0107EB
:1006600099DA7706373E008896EB86EB27120D1352
:1006700023C26506C30A09EB2B3E008896C60027F5
:1006800077233E008896EB8627EB770D1323C282F3
:10069000063A2579E680321479CD0A09211C797E43
:1006A000FE50C249063A3679FE03DA490636 00C9D9
:1006B0002115797EB7C80AB7CA5108E6802BAE77F4
:1006C000230AE67FD64086F2D2060A87FA790736F1
:1006D00000C97703C51107077B3238790126 7921D4
:1006E0001D797E0203231DC2E2062126797E0203C4
:1006F0002315C2ED06CDC8081E0F21167971231DE2
:10070000C2FD06211679223679E17E23E5B7CA4972
:100710007F5E60FCA2B07471126792A3679CDC58A
:100720009D2270723343F05C21807F10F0F0F0F17
:10073000E60FCA490747112D792A36791A8E27778D
:100740001323CDC50905C236072138793 52A3679F4
:1007500023C20607C1CD0A09011C79CD6A092124EB
:10076000797EB7C8AF772B361006062B7705C26B9C
:1007700073A15793C321579F0014F46C3CA012179
:100780014790AE680AE770AE67FCA46085F237EC0
:10079000B7C893C641FA4C08773E1032 38790360E7
:1007A00069223679AF322D7906FF111D792A367903
:1007B00043E9A96EB86EB27120E9913233E00898E
```

```
:1007C00096EB86EB271213233E008996EB86EB27E8
:1007D0001213233E008996EB86EB271213233E006B
:1007E0008996EB86EB271213233E008996EB86EB66
:1007F000271213233E008996EB86EB2712133E0047
:1008000089EB862777DAAA072A3679EBCDC2092346
:100810007ECE002777212D797E80773A38793DCAC0
:100820003408323879010800CDCB08211D79CDC884
:100830008C3A807011C79CDA109CD0A09011C79BB
:10084000CD6A09C35E0701445AC3CA01D641F27991
:100850007AF321579C978E680321479CA650897EE
:10086000914F9891473E46321579211D7911070025
:1008700072231DC2700869600E1029EB21217906D0
:10088000037E8F27772305C28108EB0DC27A0BC348
:10089000A092115790AB6C80AE6802BBEC2B70834
:1008A0000AE67F23BE3FC2B10821070009CD3F09F8
:1008B000C82114791FAE17DABD08AF3DC93E818744
:1008C000C971231DC2C108C90107000970545D1B0D
:1008D0001AAEE6F0AE0F0F0F0F771B2B0DC2D0082C
:1008E0007E8787878777C9211D79111C790E074775
:1008F0001AAEE6F0AE0F0F0F0F1213230DC2F00861
:100900001AE6F0B00F0F0F0F12C93A2379FE10D07C
:10091000B7CA2409211C79010800CDCB0821157918
:1009200035F071C921237911227906071A772B1818
:1009300005C22C09702115793535F20A0970C901F3
:1009400023790ABEC02B0B0ABEC02B0B0ABEC02BDC
:10095000B0ABEC02B0B0ABEC02B0B0ABEC02B0B52
:10096000ABEC90AC60527C370090AC650273E0039
:100970002D0030ACE0027C370090AE6806F0AE698
:100980007F67221479036069011D79C3A5092A14C0
:10099000797CB7C2980902C9B502211D7903C3A5A4
:1009A000097E0223037E0223037E0223037E0223A9
:1009B000037E0223037E0223037E0223037E02239F
:1009C00003C9211D791A8E277713231A8E277713CF
:1009D000231A8E277713231A8E277713231A8E272D
:1009E000771323 1A8E277713231A8E2777C92102AC
:1009F0000397EE67FFE41D2FD093600C9473E4DF3
:100A000090D83C470FE67F23B7CA130A3600233D30
:100A1000C20C0A780FD03EF0A677C97CBADA210A58
:100A2000EB444D21000078B7C42C0A792917D23243
:100A30000A192917D2380A192917D23E0A19291773
:100A4000D2440A192917D24A0A192917D2500A1969
:100A50002917D2560A192917D019C97CAAF5AAFC58
:100A6000950AEB7CB7FC950ACA9C0A06107AB7C2B5
:100A7000760AB3F2A80A78010000F52979174F78B1
:100A800017477993789ADA8E0A4779934F23F13D85
:100A9000C27A0AF1F097956F9C9567C90608656F51
:100AA000B2C2760AB3FA760A972917BBDAB10A936B
:100AB0002305C2A90A4FC3930AC1D1C5CD5B0A6001
:100AC00069C92100003A1579B7C8D641F83C4F06EC
:100AD00055112379D5545D29291929780747D11A49
:100AE000D2E70A18C3EB0A0F0F0FE60F856F8CBF
:100AF00095670DC2D40A3A1479B7C8AF936F9C9523
:100B000067C9444D21010078B1C8C5D5CD1B0AD1B4
:100B1000C10BC3070B11EB0FEB223C79E1220278EA
:100B2000E1220478EBCDBA042A0478E52A0278E5BC
:100B3000C33A0B11EB0FEB223C7921040039444DF1
:100B4000CD7A09C1D1F9D5C52123792251793A3E0F
:100B500079B7CAED0DAF323F793A4E79B7C26D0B16
:100B6000C1323E79CDFF11014E4EC3CA013A5B79C5
:100B7000FE23CAF70BFE24C28D0BCD5511FE24CAED
:100B8000EF0B3E24CDB2103A5B79C3700BFE2AC244
:100B90009F0BCD5511FE2ACAEF0B3E2AC3840BFED4
:100BA0002EC2B70BCD5511FE233E2EC2840BAF32A1
:100BB00050790E01C31F0CFE2DC2E00BCD5511FE66
:100BC00023CAD80BFE2E3E2DC2840B3E013245793E
:100BD000AF3250794FC31F0C3E01324579C3F70B3A
:100BE000FE5CCC5511B7C4B210CD5511C3700B3299
:100BF00047790E02C3FF0B3E203247790E000CCD21
:100C00005511FE23CAFE0BFE2CC2140C3EFF324FC0
:100C100079C3FE0B21507971FE2E0E00C2300C3EBE
:100C2000FF323F79CD5511FE23C2300C0CC3240C8A
:100C3000214179710E00FE5EC2430CCD55110EFFAD
:100C4000C3360C21437971FE2DC2540C3EFF32464F
:100C500079CD55113E0E323879015C79CD8E093A45
:100C600015794FB7C2900C324279324479110F0096
:100C700021167972231DC2730C3A5079B7CA810CC0
:100C80003D3248793A4579B73E20C4B210C36E0D63
:100C90003A4579B7CA9D0CCDE210CDB2103A4379EE
:100CA000B72144793600C2030D79D64047CAB70C44
:100CB000D2C60C2F3C77AF324279473A5079B7CA47
:100CC000C90C04C3C90C3242793A4F79B7CAE10C56
:100CD000780E00FE04DADE0CD6030CC3D30C798048
:100CE000473A507990324879F22E0D3E25CDB21018
:100CF000AF324F79324579324679015C79CD7A0944
:100D0000C3FE0D3A50793242794779D64090773A0E
:100D10004579EB214679B6EB3E00C22B0DCDE210B2
:100D20003E00CA2B0D34214279353C3248793A4293
:100D30007921417986473A4379B7C2440D3A4479D8
:100D40004F78914778FE0ED26E0D012479573F1FE0
:100D50003C0B3DC2510D7A0FDC63097A0FD46A094E
:100D60002124797EB7CA6E0DCD5E07C3540C3A4874
:100D700079B7C29C0D3A4679214579B6C2D00DCDDE
:100D8000E210CAD00D3A4279B7C2EB0C3A5079FE64
:100D900002DAEB0C3E2DCDB210C3D00D473A4779A5
:100DA0004F57FE2ACAB00DFE24C2B00D0E.41620E5
:100DB0003A4679214579B6C2C10DCDE210CAC10DBE
:100DC0004F05CACC0D7ACDB210C3C10D79CDB2108A
:100DD0003A5079B7CA750EFE01C2630E3A4579B72B
:100DE000C2630E3A1479B7C2750EC3630E3A157911
:100DF000B7C2FE0D3E20CDB2103E30C3B2103E0C45
:100E0000323879011D79CD6A09CD5E07213E797EA0
:100E10003240793600CDE210CDB2103A1579D64085
:100E200032447921437906 00FE0DDA380E3CCA3788
:100E30000E773E01C33E0E04360021447970 3242E3
:100E4000792FC60F804F211D79AF0D0DB623CA4AE9
:100E50000E0CE60FCA580E0C793241793D079F2FD0
:100E6000323F793A4279B73E30CCB210C3750ECDDD
:100E70008A10CDB2103A38793D21427935B6F26FF9
```

:100E80000E3A4279CDA710AF324F79213F797E0FCC
:100E90003E2EDCB2103A3E79213F792FB6CADC0EE5
:100EA0003A4379B7C2BF0E3A4479473A4179B8D24A
:100EB000B70E47AFC3B80E9032417978CDA7103A3C
:100EC0003879B7CAD60E21417935FADC0ECD8A10B1
:100ED000CDB210C3BF0E3A4179CDA7103A4379B7CE
:100EE000CA190F3E45CDB2102144793A3E79B7C2B6
:100EF000F30E357EB70E20F2FE0E2F3C0E2D4779F5
:100F0000CDB210780E2F0CD60AF2060FC60A47791A
:100F1000CDB21078F630CDB2103A4679B7CA2A0F62
:100F2000CDE210CDB210AF3246793245793A3E79F2
:100F3000B7C03A4079323E79C911EB0FEB223C79C8
:100F4000EB7CB5C24F0F3A3E79B7C8E5C3900FE5C9
:100F50007EE67F57235E233A3E79B7C2780F7AB395
:100F6000CA6E0F7E23E5CDD410E11BC35E0FE17C7A
:100F7000B5C87E07D0C3D9023A4D79B7C28C0FC12C
:100F8000323E79CDFF11014E53C3CA01224B79EB9A
:100F90002249793A5B79FE2FCAB40FFE21CAC30FEA
:100FA000FE26CACC0FFE5CCC5511B7C4B210CD558D
:100FB00011C3960FCD8D11CD5511B7CA7F0FFE2FDE
:100FC000C2B40FCD8D11CD5511C36E0FCD8211CA94
:100FD000C60FCD7911CDB210C3CC0FCD150BC3E424
:100FE0000FCD330B3A3E79B7C03E20210078344F05
:100FF0003A3B79B7C2FD0F2A01002E0CE9590E05C4
:10100000C30500CD150BC30C10CD330BCD98113E8D
:1010100001320078 3E0DCDEF0F3E0AC3EF0FCD1524
:101020000BC32710CD330B3A3E79B7C03A0078D6C0
:1010300014C8D22F10F53E20CDEB0FF13CC2351075
:10104000C9CD390FC30C10CD390F3A3E79B7CA2C30
:1010500010C92A00782600C93A007895DA3510C8F8
:10106000E5CD0C10E13E0195C8C33510CD5810C335
:101070002C10CD5810C30C10213B79BEC8F53A0096
:10108000783DC40C10F1323B79C92138797E352A7C
:1010900051790F7ED29E102B225179C3A2100F0FCF
:1010A0000F0FE60FF630C94705F83E30CDB210C33A
:1010B000A810CDD410FE30D83A4F79B7C83A43794A
:1010C000B7C03A4279D603CAD210D603CAD210D6D4
:1010D00003C03E2CF5C5D5CDDE10D1C1F1C92A3CE7
:1010E00079E93A1479B73E20C83E2DC9EB2A5779E1
:1010F0007CB5012A46C2CA01EB3EFF323E797EE64C
:101100007F47234E23225779225979EB6069225376
:10111000792255792100001AFE23C2221126FFC32D
:101120004B11FE2FCA4911FE26CA4911FE21CA4998
:1011300011FE5CC24B11130B78B1C24B11323E79D0
:10114000CDFF1101554EC3CA012EFF130B78B1C25A
:101150001711224D792A55797CB5C269112A537924
:101160002255792A5779C372112B2255792A597938
:101170007E23225979325B79C92A4B797E23224B0F
:1011800079C92A49797CB5C82B224979C9CD821100
:101190003E20C47911C3B21011EB0FEB223C792130
:1011A0003E793435C83421FF11E53A5B79FE23C816
:1011B000FE2FC8FE21C8FE26C8FE24C2CC11CD5584
:1011C00011FE24C83E24CDB210C3AA11FE2AC2DCEF
:1011D00011CD5511FE2AC83E2AC3C611FE2DC2EFFD
:1011E00011CD5511FE23C8FE2EC83E2DC3C611FED8
:1011F0005CCC5511B7C8CDB210CD5511C3AD112A75
:1012000057792B2BEB210000225779EBC36F0FEBA3
:101210003A1801E630D63021FFFFD87BE60F8787EA
:101220008787F50E9CCD0500110E00197EE60F474D
:10123000F1B0770EA1CD05006F67C93A1801E6300D
:10124000D630D80E9FC305003E09213E0C213E0634
:101250002A01006FE9E57CB5CA711246234E23C308
:101260006C12C5E54ECD4B12E1C1230B78B1C262C1
:10127000120E20CD4B12E1C30B16228B79328579E9
:101280003A1801E630D630D29812CD53140F2A0204
:101290007923220279D280120E0A110178CD05003D
:1012A0000E021E0DCD05000E021E0ACD05003E01E8
:1012B0003200783A8579B7CA2C13AF328A79326412
:1012C0007947573C4F5F2102783A0278B7CA7F13B8
:1012D000CD5E137EFE20CAC912FE22CAF012CD8A4C
:1012E00013FE2CCA1713CD9613CD5E137EC3E112E5
:1012F0003EFF328A79CD5E13CD8A137EFE22CA0A62
:1013000013CD9613CD5E13C3FB12CD5E137EFE226A
:10131000CA0113AF328A79CDA5137EFE2CCA2613D8
:10132000CD5E13C31A131C1600C3C9122A8B79CDC4
:10133000FC153A0278110000B7CA57136F26002334
:1013400023CD6102E53600231102781A47041A778B
:10135000231305C24E13D12A8B79732372C93A0223
:10136000782304CA6813B8D0CDA5133A8A79B72B6D
:101370007EE1CA7A13FE22C27F133A8579BBC81177
:10138000B1130E09CD0500C38012E5D5216579168C
:10139000001971D1E1C97EE5C521027806000977FF
:1013A000C1E10C14C9E5D5217579160019D172E196
:1013B000C9696D70726F70657220696E7075742086
:1013C0002D207265656E7465720D0A24E5CDFC15DD
:1013D000CD14167CB5E5CAEF13D52323CD6102D118
:1013E000C1E5702371231A77130B78B1C2E513D1CD
:1013F000E1732372C9E5CDFC15CD2F1478B1CA0A6B
:1014000014C5D521020009C3DC13E1772377C9E5B0
:10141000CD1416444DE1C3A214CD2F14C3A214E57C
:10142000CD1416444DE1C39C15CD2F14C39C15EB70
:101430002A0679444D2A08797D917C98DA4714016F
:101440004F44E1E1C3CA0146234E23E5092208794E
:10145000E1EBC9CD4E12C6FF9F676FC9CD4B12F5AB
:101460004FCD4B12F16F2600C9CD4B126F2600C92F
:101470007D327514DB006F2600C945E1D17B3283D4
:101480001478D300E96E2600C97DE1D112E9EBC1E1
:1014900021F8FF39F9C5D5131A4F13CDA214E1C3B2
:1014A0000B162291793EAA328F7979328E79AF0E5E
:1014B0000877230DC2B1142B0E0EEBAF328D7932AB
:1014C0009079CDE615FE20CAC214FE2BCAD914FEAF
:1014D0002DC2DC143E80329079CDE615FE30CAD99B
:1014E000140600FE2EC20B153A8D791FDA91152FC6
:1014F000328D7979FE0EC24E15CDE615FE30C2E171
:10150000143A90793D329079C3F914FE45CA5415C6
:10151000FE65CA5415CDF215D2221579FE0EC8C340
:10152000911547AFB1CA40150D3A8F7907328F79BF
:10153000D23C15788787878712C340151AB01218D3

:101540003A8D790FDA4E153A90793C329079CDE6A2
:1015500015C3E11479FE0EC8CDE615FE28CA541558
:1015600047D62D5FCA6D15C60278C27015CDE61537
:101570000600CDF215DA911547CDE615CDF215DA54
:101580008A154F78878780878147788B7C2911590EE
:10159000473A9079C640802A917977C9AF329379DA
:1015A00079328E79E5EB110000CDE615FE2BCACA23
:1015B00015FE2DC2CD153EFF329379C3CA15EB2916
:1015C000444D2929094F060009EBCDE615CDF2154A
:1015D000D2BE153A9379B7CAE1157A2F577B2F5FA0
:1015E00013E1732372C93A8E79B7C83D328E797E82
:1015F00023C9FE30D8FE3A3FD8E60FC95E23562AEB
:101600000D017D937C9AEBDAD902C97CB5C87E07BF
:10161000DAD902C92164794E0C7106002165790975
:101620005E16002102781 9EB217579096E2600C932
:101630002AE879EBCD0500221279C92AE87911212F
:101640000001934C023C342160E0FC330160E13C345
:1016500030160E16C330160E10CD30163CC00143A6
:1016600045C3CA010E21CD3016C33B160E22CD3024
:1016700016C33B160E1AC305003A1801E630D630E1
:10168000D82AE87911300019EBC374163A1801E62C
:101690003OD630DA9B167CB5C2D6160E19CD0500B1
:1016A000F50E0DCD05002212795701455834180163
:1016B000E630D630DABB1614CACA010E0ED15ACDA6
:1016C0000500221279570145583A1801E630D63004
:1016D000D814CACA01C9EB0E25CD050022127930CE7
:1016E000014558CACA01C92AE879C3D902AF5E7751
:1016F0002356772A0D017D937C9AEBDAD902C97CB7
:10170000B5C87E07DAD902C921000022FF793E114F
:1017100032037A877A1F577B1F5F21037A35CA409D
:10172000172AFF79D22817097C1F677D1F6F22FFB8
:10173000792A017A7C1F677D1F6F22017AC31317F4
:101740002A017AEB2AFF79444DC92AE87911390038
:1017500019C9CD4A1722EA79EBC37416118000 2A01
:10176000EA791922EA79EBC3741601424E7CB5CAB4
:10177000CA013E80953E009CDACA01E53E07293D3C
:10178000C27E1701390009E5CD610222E8791139DD
:101790000060070231B7AB3C29317CD8517C10B97
:1017A0002AE8790922EF7922F179E17D32F379CDC6
:1017B000CA17C3521701EC792AE87911240019 1EBF
:1017C000A7E0203231DC2C117C90124002AE87939
:1017D000901EC791E0A0A7703231DC2D617C9C571
:1017E000D5CDB517E1CD1718119479197E23B6011F
:1017F0004446C2CA01EB2AE879EB722B73E122EC72
:10180000793AF3793DC2CA177CB5CACA1721EE7975
:101810007EF64077C3CA1722F479297CB5CA271807
:101820003E28953E009CD0014E46E1C3CA017CB5DE
:10183000CA50197EE67FB7C25019E5237E23B7CA86
:101840004F1947EB2AE8793A1801E630D630D2A08A
:1018500018E5233E0B3620233DC25518E178FE03E0
:10186000DA7318131AFE3A18C27318050 51AE60F2D
:1018700077131323 0E08AF32267ACDFB1805CAA4BE
:1018800018DA8C180DC27A1805CAA4181AFE2E137D
:10189000C288180E03AF32267ACDFB1805CAA418E9
:1018A0000DC29918E1C3FF1622067A21087A220494
:1018B0007A78FE1ED24F191A77132305C2B7187013
:1018C000E9811047ACD05007CB5C24F192AE8792B
:1018D000EB211A00197E2138001987CAE31836FF20
:1018E000C3E41877211000194 44D213000191E0857
:1018F000A7723031DC2F018C3A4183A267A0FDA18
:1019000022191AFE2EC20F19230DC2081937C9FE5B
:101910002AC228193AFC790F3E2AD228193EFF32F2
:10192000267A363F2304B7C9FE60DA3419FE7BD22B
:101930003419E65FFE3ACA4F19FE2ACA4F19FE3F14
:10194000CA4819772313B7C93AFC790FDA5719E156
:1019500014946E1C3CA013E3FC343192AEA79EB74
:101960002AF1797D934F7C9A4703EB161A72230B69
:1019700078B1C26D19C92AF179EB2AEF79237B95E9
:101980007A9CD822EF79C932277ACD6A17E1D1C182
:10199000E3E5CDDF17E1CD2E183A1801E630D63059
:1019A000DACD193A277A0FD2B6192AE879EB210550
:1019B0000197EF680773A277A0F0FD2CA192AE8E3
:1019C00079EB210600197EF68077CD7916CD481681
:1019D000FEFFCAEC192AE879112100 19AF5E7723BE
:1019E0005677EB22FD79CD5C193EFFC9CDE7162A6B
:1019F000F47929E511947919AF772377E111BE794C
:101A0000195E23667CB3014F45CACA016B01E93226
:101A1000277ACD6A17E1D1C1E3E5CDDF17E1CD2EFD
:101A200018CD7916CD4D163A1801E630D630DA4980
:101A30001A2AE879EB213800197EB7CA491A21061B
:101A400000197EF68077CD7916CD5216FEFFC25C66
:101A500019014D45C3CA01EBE1E3CD171801BE7969
:101A60009732372C9CD171801947909 5E23567A38
:101A7000B3014655CACA01EB22E8792AF479290153
:101A8000BE79095E2356EB22F679CD851 72AEC799B
:101A90022FA792102003922F879C3521701EE792E
:101AA000AE6FBF68002070 7DABB1A3AF37901521D
:101AB000423DC20721015255C307217CB50149525D
:101AC000CA07212B444D2AEC79EBCD08172AEA7975
:101AD0007BE67F856F3E008C672BE57B177A175F6F
:101AE000791757D5CD9E1DD10121002AE8790973B8
:101AF000237221EE797EE6FD77E122EF79C3CA17E2
:101B0000C1D1C53A1801E6F0D630D2111B21000030
:101B1000C9E5EBCD651AE1E5CD9D1ACD7A1B0E2AFC
:101B2000CD3016B7D1C0D513EBCD9D1ACD7A1B0E93
:101B30002ACD3016B7D1C8E5EBCD9D1ACD7A1B0E54
:101B40002BCD3016E1C9C1D1C53A1801E6F0D63027
:101B5000D2571B210000C9E5EBCD651AE1E5CD9D0B
:101B60001ACD7A1B0E2BCD3016B7D1C013EBCD9DFD
:101B70001ACD7A1B0E2BCD3016C92AFD79EB2AEA35
:101B800079732372C9CD52172AE879EB212E0019F7
:101B9000EB012100097E1223137E1221EE793E0211
:101BA000B6773AF37932287ACD64168 7C2BA1B21D8
:101BB000287A35C8CD5C17C3A81B3AEE79F61032E7
:101BC000EE79C35C19CD7619D2D71BCD9E1DCD4AB7
:101BD0001722EF79CD851B3AEE790F0FD4851B2A9A
:101BE000EF797EFE1AC0C3FF1ECDC51BFE0AC02AB8
:101BF000EC797CB5CAE91B015245C30721CD651AB2

:101C0000CD7619D21A1C3AEE79E610C2FF1ECD9E8F
:101C10001DCD4A1722EF79CD851B3AEE790F0FD4EF
:101C2000851B2AEF796E2600E5CDCA17E1C9E50EBE
:101C300000210278C5E5CDE91BFE20CA361CE1C1B2
:101C4000FE2CCA611CFE0DCA571C4779FE32CA34ED
:101C50001C0C7023C3341C2AEC797CB5C5CCC51B85
:101C6000C1110278E1C921000022297AFE0ACA8C3A
:101C70001CCDE91BFE22CA8C1C21307A362C212D6A
:101C80007A3600210278222E7AC3AF1C32307A21B4
:101C90000278222E7AAF322D7A3A307AFE0AC2AC1E
:101CA0001CCDC51BFE0AC28B1CC3EB1CCDE91B210E
:101CB000307ABECAD61CFE0DCAE31C2A2E7A7723C0
:101CC000222E7A212D7A7E3C773CC2991CCD0A1DAA
:101CD000C38F1CCDE91BFE0DCAE31CFE2CC2D31C16
:101CE000C3EB1C2AEC797CB5CCC51BCD0A1D2A2977
:101CF0007A3A307AFE0AC07CB5C856235E7BB2CAF7
:101D0000061D1B732B722A297AC91100002A297A11
:101D10007CB5CA191D56235E23E52A2D7A260019A3
:101D2000D5E52323CD6102222B7AD1722373C1D151
:101D3000C3381D1A2377130B7881C2331D3A2D7A9D
:101D4000B7CA501D4F1102781A2377130DC2481DD0
:101D50002A297A7CB5C4D9022A2B7A22297AC9E5A4
:101D6000CDED163E0ACD661CEBE1732372C3CA1794
:101D7000CD2E1CC39C15CD2E1CC3A214E5CDED1693
:101D80003E22CD661CEBE1732372C92AEC797CB547
:101D9000CACA17CDC51BFE0AC2931DC3CA1721EEBE
:101DA000797E0FD08777E682FE02015752CA07215B
:101DB000F5CD52172AEF79EB2AEA797B955F7A9C69
:101DC000577B077A173CF5CD6C16B7C2E61DCD5C84
:101DD00017F13DC2C61DCD5217F107D25C1921EE95
:101DE000793EFDA677C9CDCA172AF879F92AF6797E
:101DF0007CB5014457CA0721E9473A3E790F78DAA2
:101E0000051EFE20C8F52AEC797CB5CA1D1E2AFAE8
:101E1000797CB5014552CA07212B22FA79CD761972
:101E2000D22C1ECD9E1D2AEA7922EF793AEE79E670
:101E300082FE80C24A1ECD851B2AE8790121000955
:101E40004E23460B702B712AEF79F17721EE793E04
:101E500001B677C9D1EBE3D5CD651AE17DCD051E7D
:101E6000C3CA173A3E790FDA711E3E22E5CD051E30
:101E7000E111051ECD3C0F3A3E790F3E22D4051EDE
:101E8000C3921E11F91DCD360BC3921E11F91DCD43
:101E9000180B3A3E790F3E2CD2051EC93A3E790FF7
:101EA000DAAA1E3E22E5CD051EE111051ECD3C0F2E
:101EB0003A3E790F3E22D4051EC3CB1E11F91DCD2B
:101EC000360BC3CB1E11F91DCD180B3A3E7911F913
:101ED0001D0FDC9B112AFA797CB5CAEF1E2B2BC390
:101EE000EA1EE53E20CD051EE12B7CB5C2E21E3E7A
:101EF0000DCD051E3E0ACD051ECD9B11C3CA172A66
:101F0000E879EB212E0019EB012100091A77231340
:101F10001A772AEF792B22EF7921EE797EE6FD7789
:101F2000CDCA172AF879F92AF6797CB5014546CA4F
:101F3000CA01E9CD1718E501947909AF5E772356F8
:101F4000777AB3014355CA0E21EB22E879CD5217B7
:101F5000CDB517CD9E1DCD5217CD5716E101BE79D7
:101F600009AF772377C3E716210100C3811F1194BE
:101F700079E529197E23666FB4E1C4331F2A317ACB
:101F80002322317A1114007B957A9CD26E1FC9CD21
:101F90001718019479E509AF5E772356777AB30174
:101FA0004455CA0E21EB22E879CD5217CD5716CDF4
:101FB0007916CD4D16C35C1FEB2102003922F8794A
:101FC000E1E3D5E5210100CD6A17E1CD2E180E1110
:101FD000CD30163C014652C207212AE87922337AD5
:101FE000210100CD6A17E1CD2E180E11CD30163C1F
:101FF000CA1E202AE87901100009EB2A337A7E12E2
:1020000013230DC2FE1FCD79160E17CD3016CDE766
:10201000162A337A22E879CDE71621FFFFC9CDE7EA
:10202000162A337A22E879CDE716210000C9E52186
:102030000100CD6A173EFF32FC79E1CD2E182AE867
:1020400079010C0009363F2323363F210000223559
:102050007A0E19CD05005FD52AE8797EB7CA7C20B3
:102060003D5F0E0ECD0500221279570145583A18F2
:1020700001E630D630DA7C2014CACA010E1FCD0525
:1020800000E35D0E0ECD0500221279570145583A46
:102090001801E630D630DA9D2014CACA01E12323A4
:1020A000460505110400194EC50E11CD3016FEFF70
:1020B000CAF5200F0F0FE660C6102AEA794F060016
:1020C00009110000C179C5B7CADC2006087E238615
:1020D00023CAD5201305C2CD20C3E92006107E23D4
:1020E000B7CAE5201305C2DE202A357A1922357ACF
:1020F0000E12C3AB20CDE716AF32FC792A357AC178
:1021000005C829C30021C92AF879F9C3CA01E1C366
:10211000CA01D5E5CD8823E5C5EB5059CD8823E527
:10212000C5EB097C1FE6C0C24D21E52323CD61022A
:1021300022377AD1CD9623C1D1CD9E23C1D1CD9E58
:1021400023E1CDEC23E1CDEC232A377AC9210C0021
:1021500039F901534CC3CA01E5D57AB3CAA7217C2A
:10216000B5CA8121CD8823E5EB5059CD88237993A9
:102170005F789A57B3C2BD21D178B1CA8C21EB1ACE
:10218000BEC28C2113230B78B1C27F21D1E1F5D5DA
:10219000CDEC23E1CDEC23F1CAA121DAA321F68015
:1021A000C9AFC93E8187C9CD8823CA8C2137C38C6A
:1021B00021EBCD8823CA8C21373FC38C21E17A07DC
:1021C000C38C21EB4E234679BBC2CF2178BAC82BF2
:1021D000E5D5CDD023E17CB5CAE4217E07D46D23AE
:1021E0007EE67F77EBE1732372C9E5CD8823CAFAD7
:1021F000216E2600E3CDEC23E1C9014143E1C3CACE
:1022000001E5210300CD6102110100CD9623C171CA
:1022100002B2BC92A0F01C9C1EBE1C57A0701535322
:10222000DACA01E5CD88237993789AD230225059C1
:10223000E5D5EB2323CD610222397AD1CD96234215
:102240004BD1CD9E23E1CDEC232A397AC97CB5C888
:10225000CD8823C52B2BCDEC23E1C9EBE1E37A0735
:10226000015353DACA01E5CD882379934F789A4711
:10227000DA912209E5D5EB2323CD6102223B7AD105
:10228000CD9623424BD1CD9E23E1CDEC232A3B7A40
:10229000C9E17CB5C87E07D8C36D23444DE1D1E3C5
:1022A00078B2FAF5227AB3CAF5227CB5C87EE67F09
:1022B00023B62BC2BD22CDEC23210000C9E5C5CD3C

:1022C0000823799 34F789A47DAFB22031B19D17937
:1022D00093789AD2D8225059E5D51313EBCD6102E9
:1022E000223D7AD1CD9623424B01CD9E23E1CDEC38
:1022F000232A3D7AC9015353C3CA01210000223D5C
:102300007AE1C3ED22C9213E797E323F7AAF77323E
:1023100002781 13A23CD3608 2A027826 00E52323D2
:10232000CD6102C1E5788F6807723712311037 8CD62
:102330009E23E13A3F7A323E79C9FE20C8210278D5
:10234000345E16001977C97CB5C87E07D46D23E5C5
:10235000CD8823CA6B23161A1E617E93BAD26423DA
:102360007EE65F77230B78B1C25A23E1C9CD88237B
:10237000E5C521020009CD6102D1CD96234248D1A2
:10238000E5CD9E23E12B2BC97CB5444DC87EE67F6D
:1023900047234E23B1C97AF68077237323C978B7D0
:1023A000CAAF23C50E40CDC82305C2A423C179B14D
:1023B000C8E603CAC123C54F1A7713230DC2B82339
:1023C000C179E6FCC81F1F4F1A7713231A7713230E
:1023D0001A7713231A7713230DC2C823C95E235615
:1023E0002A0D017D937C9AEBDAD902C97CB5C87EAF
:1023F00007DAD902C9EB21040039C1F5C50AFE0389
:10240000CA1F24FE04CA1A24D5E57E23666FCDC3F5
:1024100021E1D123231313C329240608C321240651
:1024200027E12231305C22124C103F13DC2FB2306
:10243000D1F9D56069E922407A5E23562A0D017DE3
:10244000937C9AEBD25124CDD9022A407AAF7723DC
:1024500077E1E37DFE03CA5E24FE04CA63243E02E4
:10246000C365243E0832457A21557A22737A2102C7
:1024700000394E234623090979324A7A1101000 1B5
:1024800000000C3A62432427A2B7E2BE56E6723C55B
:10249000CD1B0AEB2A737A7323722322737AE11914
:1024A000444DE13A427A3DC285242B7E2BE56E678E
:1024B00023C5CD1B0A3A457A5F1600CD1B0AC10918
:1024C00009224B7AC5CD6102224D7AEB2A4B7A194B
:1024D00022517AE1291922 4F7A2A4D7A2B462B4E26
:1024E0000B0B23233600230B78B1C2E424E17E23B7
:1024F000E5666F233A457A5F1600CD1B0AAF956FEC
:102500009C956722537A3A4A7AC3542532427A2AF2
:10251000737A2B562B5E22737AEBC337252A517AB6
:10252000EB2A537A1922517AEB2A4F7A2B722B73AA
:10253000224F7A2A437A2B22437A7CB5C21D25E1A9
:10254000237E23E5666F2329AF956F9C9567225301
:102550007A3A427A3DC20C25E12A4D7AEB2A407A3A
:10256000732372 3A4A7AE1D1D13DC26825E9C92282
:1025700081 7AEBC1E122777AE1227B7AC5AF933E83
:1025800009A014D50F2CA012A777ACD9626CAEAFE
:10259000256069227 97A2A817A7995789C2B22752F
:1025A0007ADAEA252A7B7ACD9626EB210100CAED5C
:1025B000256069227D7A1AFE5CC2BE252B13130B9F
:1025C00078B1C2B625227F7A2A757AC3D825E1234D
:1025D000E5CDFC25E1DAED25E5EB2A7F7A19EB2A3A
:1025E000797A7D937C9AF2CE25E1210000E52A7B61
:1025F0007ACD8D262A777ACD8D26E1C922847AAFCD
:1026000032837A21020022867A2A847AEB2A797A26
:102610007D937C9A3FD02A867AEB2A7B7A197ED6E4
:102620005C21837AB6C22D2636FFC33826CD4C26D8
:10263000D02A847A2322847A2A867A2322867AEB05
:102640002A7D7A237D937C9AD20926C92A867AEB41
:102650002A7B7A19462A777AEB2A847A23194E2123
:10266000837A7EB7C2852678FE3FCA8926FE23C2BA
:1026700078 2679D630FE0AC9FE21C2872679E65F20
:10268000D641FE1BC93600788937C83FC97CB5C8EA
:102690007E07DAD902C97CB5444DC87EE67F472360
:1026A0004E23B1C978CD96012A0D0101640009C1FC
:1026B000F9C50117010AB7C03D02221301EB22112F
:1026C0001C1360023 7D937C9ADA4201C5CD3D02DB
:1026D0002101FF2200780E0CCD050022180170E6B5
:1026E00030D6300E2D1EFFD405002180007EB7C8E5
:1026F00047237EFE20C27D0105C8C371012B70E512
:102700006823E5001431362020202020202020208E
:102710002020202020202020200006425546464528
:102720005200015900015900014E00014E000742BC
:1027300055462E494E430001590001310005 4255CE
:10274000494C4400014E000159000159000159 0053
:10275000844415441 2E55444C000159000330 2097
:102760002000 07434F4D4D454E5400014E00014E91
:1027700000015900014E00000014E000130000729
:10278000434F4E54524F4C00014E0001590001 5925
:102790000001590007435349 2E494E4300014E00A2
:1027A000013100064551554154450001590001 4E83
:1027B000000159 00014E00000014E0002302000CF
:1027C000446494C450001590001590001 4E0001E1
:1027D0004E00074D44542E494E430001590001322A
:1027E00000084841524445 5741524500015900159DF
:1027F000014E00014E00074844572E494E430049
:102800000159000231200006484541444552000 16B
:10281000590001590001 4E00014E0007484452 2E54
:10282000494E4300015900013100054 94E505554AD
:102830000000015900015900014E00014E0007494EA8
:10284000502E494E43000159000132000 34A4F42C5
:102850000000159000159000159000159000 75A416E
:10286000502E4D41430001 4E0003322020000064D02
:10287000454D4F5259000159000159000 14E0001C8
:102880004E00074D454D2E494E4300015900 01327F
:10289000000850415353574F524400014E00015914
:1028A000000 14E00014E0007504153 2E494E430097
:1028B000015900013100075052494E544552000160
:1028C0004E0001590001 4E00014E00075052542E97
:1028D000494E430001590001320007535045434916
:1028E000414C00015900015900014E00014E000702
:1028F0004B45592E494E4300015900013100055303
:1029000054415445 00014E000159000159000159 3C
:10291000000753543 12E4D41430001590001 31004D
:1029200008564152494 1424C4500015900015900A5
:1029300014E00014E0007564 1522E494E43000100
:10294000590001320002333300064143 54494F4ECF
:1029500000055354415445 00014E00015900013017
:102960000006425546464552000642554646 4552E7
:1029700000015900015900013200064255465041FC

:102980005200064D454D4F525900015900014E006D
:10299000013100044441544500064845414445 5234
:1029A00000014E00014E00013000074445464155EC
:1029B0004C54000446494C4500014E0001590001A9
:1029C0003200084445534346494C45000446494CAF
:1029D0004500014E0001590001350007444C4C46AA
:1029E000494C4500054255494C4400014E000159EF
:1029F0000001310008444F574E4C4F4144000648F7
:102A0000454144455200015900014E000131000486
:102A1000454449540005494E5055540001590001A0
:102A200059000137000446494C450004 46494C45CD
:102A300000015900015900013600034B45590007B8
:102A40005350454349414C00014E000159000132A9
:102A500000074D454D38303030000848415244574A
:102A600041524500015900014E000631202020202E
:102A70002000074D454D4130303000084841524458
:102A80005741524500015900014E00023120000714
:102A90004D454D4330303000084841524457415273
:102AA0004500015900014E00043120202000074D4F
:102AB000454D453030300008484152445741524559
:102AC00000015900014E00013100074D454D4538C8
:102AD00030300008484152445741524500015900E6
:102AE000014E00013100074D454D463030300008A1
:102AF000484152445741524500015900014E0001DE
:102B00003100074D454D46383030000848415244A9
:102B10005741524500015900014E00013100044D5A
:102B20004F4445000850415353574F524400014E03
:102B30000001590001300009504152544954494F95
:102B40004E00064D454D4F525900015900015900A4
:102B50000133000A50524F4752414D4D4552000635
:102B600048454144455200015900014E00013000E2
:102B7000065245434F524400054255494C4400011A
:102B80004E00015900013000085345435552495445
:102B900059000446494C45000159000159000135CE
:102BA0000008535441434B50415200064D454D4F90
:102BB000525900015900014E0002312000095354BE
:102BC00041434B53495A4500064D454D4F5259001C
:102BD000015900014E000231200005535441544573
:102BE0000005535441544500014E00015900013085
:102BF00000055449544C450006484541444552009F
:102C0000015900014E000A302020202020202020E1
:102C10002000085641524941424C45000856415255
:102C20004941424C4500015900015900013100065B
:102C300056415250415200064D454D4F52590001E8
:102C40005900014E000131000756455253494F4E7D
:102C5000000648454144455200015900014E00011B
:102C60003100085A434152445244520008484152EC
:102C7000445741524500015900014E000131000600
:102C80005A4D4F44454D0008484152445741524522
:102C900000015900014E00013100085A5052494EBE
:102CA0005445520008484152445741524500015989
:102CB00000014E000131000231360005494E5055E9
:102CC0005400085452414E534D4954000752454355
:102CD00045495645000544455354520006494E5453
:102CE0004255460007494E54324255460007494E68
:102CF000543342554600065355504255460006414E
:102D00004D54534156000642524E54424C00074D1A
:102D100041544842554600012A00012A00012A0078
:102D2000012A0007544D50314255460007544D507A
:102D300032425546000137000343534900035052C5
:102D40004D00035041530003414343000353455199
:102D5000000345525200035359530001340005410A
:102D60004C504841000648414E4755500005454EDD
:102D700054455200064241434B5350FF00046462E5
:102D80002020000120000000012000000001300090
:102D90000120000000142A2A2A2A204552524F52AC
:102DA0002E20204C696E65203D20000B2E202045F2
:102DB00072726F72203D200016486974205245548B
:102DC00055524E20746F20636F6E74696E75650086
:102DD000014000022020000220200000000F564D7C
:102DE000454D4F52593A3A2020646220200001207C
:102DF0000002783D00036C6F3D000368693D0004EC
:102E00007461723D000520746D703D0006202373CF
:102E1000796D3D00046E64783D00036C313D000324
:102E20006C323D00013B00013000013900013000EF
:102E30000120000C202020202020202020202020E5
:102E4000000130 00213D3D3D3D3D3D3D3D3D3D3D91
:102E50003D3D3D3D3D3D3D3D3D3D3D3D3D3D3D3DA2
:102E60003D3D3D3D3D00215A415044205072655D
:102E700070726F636573736F722E20205665727364
:102E8000696F6E20322E30326200213D3D3D3D3D66
:102E90003D3D3D3D3D3D3D3D3D3D3D3D3D3D3D3D62
:102EA0003D3D3D3D3D3D3D3D3D3D3D3D001F436F75
:102EB0007079726967687420313938352C2056650D
:102EC00072692D466F6E652C20496E632E00135279
:102ED000656164696E6720536F757263652046692A
:102EE0006C65000420203D2000114F7574707574CE
:102EF000206F6E2044726976653A20000000013A26
:102F000000013A000744656661756C740012205335
:102F1000796D626F6C7320706F737369626C652E6C
:102F200000014200015700015000014C0001410026
:102F3000015400000000000655736167653A0037D0
:102F40007072657A617064203C736F757263653E60
:102F5000203C73776974636865733E207B3C776FB0
:102F6000726B2064726976653E203C6D61782073D7
:102F7000796D626F6C3E7D000000015900014E00CA
:102F80000A6175787A61702E696E630009666465FE
:102F900073632E696E63000C73656375726974796F
:102FA0002E696E63000000064551554154450007E7
:102FB000494E434C5544450005424547494E0001A2
:102FC0004E0007434F4E54524F4C000000012D005D
:102FD000034A4F42000000000846495253544A39
:102FE0004F420001300000000131000645515541BB
:102FF000544500054245 47494E0003454E440001F3
:103000005900015900015900012000012600204506
:103010006E64206F6620536F75726365204669 6C1D
:10302000652E202050726F63657373696E672E0082
:103030000159000159001420657272 6F7273206586

```
:103040006E636F756E74657265642E000126000DE7
:1030500053796D626F6C205461626C653A00012691
:103060000022020000B646570686173652E696E34
:103070006300255072657072 6F63657373696E6764
:10308000205375636365737366756C6C7920436F49
:103090006D706C657465642E00154275696C6469A9
:1030A0006E67207375626D69742066696C652E00A9
:1030B0000000105A4150442053746174697374695C
:1030C00063733A00112D2D2D2D2D2D2D2D2D2D2DF0
:1030D0002D2D2D2D2D0013536F75726365204CF2
:1030E000696E65732E2E2E2E2E2E2E001353796DA3
:1030F000626F6C7320557365642E2E2E2E2E2E2E2D
:10310000001353796D626F6C732052656D61696E47
:10311000696E672E2E00134D656D6F7279205061B4
:103120007274697469 6F6E732E2E00134275666631
:1031300065727320446566696E65642E2E2E2E00BE
:10314000135661726961626C657320446566696ECD
:1031500065642E2E001346696C65732E2E2E2E2E5E
:103160002E2E2E2E2E2E2E2E2E00194D656D6F72A8
:10317000792052656D61696E696E672E2E2E2E2E36
:103180002E2E2E2000012D00014E00012D00055392
:103190005441544500034A4F4200013000034A4F56
:1031A0004200012600015F00023A3A0018486974A3
:1031B00020616E79206B657920746F20636F6E7467
:1031C000696E75652E00012D00012D00054C696E9C
:1031D0006520000000013B00012E000000000001FE
:1031E000250007434F4D4D454E5400012500013049
:1031F0000000220200014E00022020000B457870C4
:10320000656374656420 3D20000B2E2020466F7599
:103210006E64203D2000065449544C452000012096
:10322000000753554254544C2000012000125A44C8
:103230004E4C49443A3A20206462202031312C27F8
:10324000000127000F56434152443A3A20202020E3
:1032500064622020000A5A4841524454424C3A3A8F
:10326000000F564D4F44454D3A3A202020646220CD
:1032700020000F565052494E543A3A2020206462A2
:10328000202000035F324B00035F384B00035F32A6
:103290004B00035F384B00035F324B00035F384B3A
:1032A00000035F304B00035F324B00035F304B0085
:1032B000035F324B00035F304B00035F324B000370
:1032C0005F304B00035F324B000355535200013A0D
:1032D00000001200014100014800014100014800B7
:1032E00001420006202064772020000145000620CE
:1032F0002064772020000842554654424C3A3A0058
:10330000012A00014100023A3A000E20202020202C
:10331000202020202064772020000E202020202044
:103320002020202020646220200 0045C235C2300F5
:103330000E20202020202020202020647720200024
:1033400001260008494E504154543A3A00013A00CF
:103350000126000F20202020202020202020206473
:1033600077202000022323000126000F20202020A8
:103370002020202020202064622020000126000F31
:1033800020202020202020202020206462202000D7
:103390000126000F20202020202020202020206433
:1033A000772020000126000F202020202020202030
:1033B00020202064772020000126000F20202020DC
:1033C00020202020202020646220200001260002EE
:1033D000202000034B455900023A3A0010202020DB
:1033E0002020202020202020646220202000102087
:1033F0002020202020202020202064622020200067
:1034000001390003444546000F3A3A20202020208D
:103410002020206462202030000126000746444519
:1034200053433A3A000130000F2020202020202072
:10343000202020206462202000012C000126000FA3
:103440002020202020202020202020647720200001
:10345000012600012600055344453A3A0001300089
:103460000F202020202020202020202064622020E7
:1034700000012C000126000220200002232300016D
:103480003000055354415445000126000126000830
:1034900050415354424C3A3A000126000C2020205F
:1034A00020202020202064622020000126000C202003
:1034B00020202020202064622020000126000C20F3
:1034C00020202020202020646220200001420001D2
:1034D00026000320202000065245434F524400009E
:1034E0000000000001260000000642554646455200F5
:1034F0000126001541494E535243453A3A2064771C
:10350000202020494E5352434500085641524941 1C
:10351000424C45000126000D5A4E564152533A3A4C
:103520002064622020000126000C415A5641524975
:1035300041424C453A3A0001260016202020202026
:1035400020202020647720205A5641524941424C85
:1035500045000126000B5A4E415050564152533AF5
:103560003A000126000D2020202020202020206469
:10357000622020000126000B415A41505056415212
:10358000533A3A000126001720202020202020202036
:1035900020647720205A41505641525041525400E5
:1035A000064D454D4F5259000126000E4E554D50C7
:1035B00041523A3A20206462202000012600144142
:1035C0005052544144523A3A206477202050525489
:1035D0004144520000000446494C450005494E5004
:1035E00055540000000000000000000446494C4500010D
:1035F00026001220202020202020202020202064626D
:1036000020203235350001260010202020202020E7
:10361000202020206462203235350005494E505567
:1036200054000850415353574F5244000126001292
:1036300020202020202020202020206462202032F2
:103640003535000126000F4D415846494C533A3A52
:10365000202064622020000126000220200001 2694
:1036600000085041524D454D3A3A000F202020208D
:10367000202020202020206462202000012C000136
:103680002C00012C00012C00012C00012C00052C29
:103690003020203B000126000126000220200001EE
:1036A00026000A5A5641524941424C453A000126E9
:1036B000000126000220200001260007505254413C
:1036C00044523A00012D00012D00012D0001260079
:1036D00001260001260002202000012600085A458C
:1036E0004E5452593A3A000126000F202020202043
:1036F0002020202020647720205F00012600022067
```

```
:103700002000012600084245474255463A3A00014A
:103710002600082E64657068617365000126000745
:103720002E706861736520000320 2D2000012600A3
:10373000023A3A00062020202020200007202020E6
:103740006473202000012600093A3A202020647387
:1037500020200001260002202000012600082E64FF
:103760006570686173650001260007 2E70686173DB
:10377000652000012D00012D000126000B5A41504B
:1037800056415250415254 3A000126001020202048
:1037900020202020202020206473202032000126B9
:1037A0000002202000012600082E64657068617305
:1037B00065000126000 72E70686173652000012DE9
:1037C00000012D000126000E5A535441434B3A3A52
:1037D000202064732020000126000E535441434BE7
:1037E00053495A45206571752000012600022020AA
:1037F00000015F00000001260007202045515520F0
:103800002000012600125A4D4158454E5452494558
:10381000532020455155202000012600125A4D41C9
:103820005853544154452020202045515520200014
:10383000012600114D415853544154452020202069
:103840004551552020000126001146495253544A43
:103850004F42202020204551552020110078CD1FB7
:1038600001210327220479220879217B2D22067960
:10387000C33F393E01218A7ACDF52303217C2DE512
:103880002A8E7A11040019195E2356210100291984
:103890005E2356D5210100CD6F25228C7A2A8C7AA1
:1038A0007CB5D6019FF52A8E7A11040019195E2382
:1038B0005621010029195E2356EBCD4D22110F0030
:1038C0007B956F7A9CB5D6019FC1B01FD2E1382A93
:1038D0008A7ACD8A04CD062311887ACDC321C33BA1
:1038E000392A8E7A11040019195E23562101002904
:1038F000195E2356D52A8E7A11040019195E2356B3
:1039000021010029195E2356EBCD4D22E52A8C7A40
:10391000232323D17B956F7A9C67CD5B2211907A0C
:10392000CDC3212A907ACD8E142A8A7ACD8A04CDBD
:103930001E04CD062311887ACDC3212A887AC9C3F3
:1039400073393E0121947ACDF523032A947A110923
:10395000007B957A9CF265392A947A1137001922F6
:10396000927AC36F392A947A1130001922927A2AF6
:10397000927AC9C3113A3E0121987ACDF5230521E7
:103980000100229A7AC3CE392A987AE52A9A7AE5F2
:10399000210100CD9B22EB21822DCD5821C6FF9F16
:1039A000F52A987AE52A9A7AE5210100CD9B22CD65
:1039B000EA211109007B956F7A9CB5C6FF9FC1A0D3
:1039C0001FD2C739C3EE392A9A7A23229A7A2A98C3
:1039D0007ACD4D22EB2A9A7A7B957A9C1FB2F28897
:1039E0003911967A21852DCDC3212A967AC92A9834
:1039F0007AE52A987ACD4D22E52A9A7A2BD17B95C1
:103A00006F7A9C67CD5B2211967ACDC3212A967A74
:103A1000C9C3B03A3E01219E7ACDF5230521872DF9
:103A2000E52A9E7AE5210100CD6F2522A07A2109A1
:103A300000CD0122E52A9E7AE5210100CD6F2522E5
:103A4000A27A2AA27A7CB5C6FF9FF52AA07A7CB515
:103A5000D6019FF52AA27AEB2AA07A7B957A9C0759
:103A6000C1B0C1A01FD26E3A2AA27A22A07A2AA09F
:103A70007A1100007B957A9CF29F3A2A9E7AE52A79
:103A80009E7ACD4D22EB2AA07A7B956F7A9C67CDEA
:103A90005B22E5CD7639119C7ACDC321C3A83A11BA
:103AA0009C7A218A2DCDC3212A9C7AC92A9C7AC965
:103AB000C3DC3A3E0121A67ACDF523032AA67ACDAE
:103AC000BA04CD0623118C2DCD1221E5210200CDA3
:103AD0005B2211A47ACDC3212AA47AC9C3253B3E17
:103AE0000121AA7ACDF523032AAA7AEB211000CD71
:103AF0005B0A22AC7A2AAA7AE5211000CD890A2203
:103B0000AE7A2AAC7AE5CD4239CD0122E52AAE7AE9
:103B1000E5CD4239CD0122D1CD122111A87ACDC3F4
:103B2000212AA87AC9C3C13B3E0121B27ACDF5232F
:103B3000052AB27ACD4D2222B47A11FFFFD5C38B6C
:103B40003B2AB27AE52AB47AE5210100CD9B22EB2B
:103B5000218F2DCD5821C6FF9FF52AB27AE52AB4D0
:103B60007AE5210100CD9B22CDEA211109007B9548
:103B70006F7A9CB5C6FF9FC1A01FD2803BC3A93BF3
:103B800011FFFF2AB47A1922B47AD5EB210100F192
:103B9000B7F2953BEB7D937C9AF2413B11B07A21D1
:103BA000922DCDC3212AB07AC92AB27AE52AB47AF5
:103BB000CD172211B07ACDC3212AB07AC92AB07AA2
:103BC000C9C30E3C3E0121B87ACDF523032ABA7A47
:103BD0002322BA7ACD0C1021942DCD390F2ABC7A2C
:103BE000CDDB0F21AA2DCD390F2AB87ACD03102AAB
:103BF000BE7A7CB5CA063C21872DCD390FCD6914EC
:103C000022B87ACD0C102AB67AC92AB67AC9C3620C
:103C10003C3E0221C27ACDF523050321010022C6D4
:103C20007AC34B3C2AC87AEB2AC67A29195E2356F6
:103C30002AC27AEBCD5821C2443C2AC67A22C07AE5
:103C40002AC07AC92AC67A2322C67AEB2AC47A7D88
:103C5000937C9A1FB4F2243C21000022C07A2AC02F
:103C60007AC9C3423D3E0121CC7ACDF5230521011D
:103C70000022CE7A2AD27A22D07A2ACE7AEB2AD0A1
:103C80007A19EB210200CD5B0A22D47A2AD87AEB8A
:103C90002AD47A29195E23562101002919 5E235658
:103CA000EB11D67ACDC3212ACC7A11DA7ACDC32191
:103CB0002AD67ACD4D22E52ACC7ACD4D22D17B95DC
:103CC0007A9CF2DB3C2ACC7AE52AD67ACD4D22CDFD
:103CD000172211DA7ACDC321C3EE3C2AD67AE52A1F
:103CE000CC7ACD4D22CD172211D67ACDC3212AD63A
:103CF0007AEB2ADA7ACD5821C2053D2AD47A22CA33
:103D00007A2ACA7AC92ACE7AEB2AD07A7B957A9C0B
:103D1000FA1D3D21000022CA7A2ACA7AC92ADA7A13
:103D2000EB2AD67ACD5821D2343D2AD47A2B22D010
:103D30007AC33B3D2AD47A2322CE7AC37A3C2ACA5C
:103D40007AC9C3E93D3E0121E47ACDF523052AE491
:103D50007AE5210100CD1722CDEA2122E67A2AE672
:103D60007A1140007B957A9CF27D3D2AE67A1137E4
:103D7000007D936F7C9A6722E67AC38C3D2AE67AAF
:103D80001130007D936F7C9A6722E67A2AE47AE507
:103D9000210200E5210100CD9B22CDEA2122E87A13
:103DA0002AE87A1140007B957A9CF2BF3D2AE87A96
:103DB0001137007D936F7C9A6722E87AC3CE3D2A43
```

```
:103DC000E87A1130007D936F7C9A6722E87A2AE6C0
:103D00007A111000CD1B0AEB2AE87A19CDBA84211A
:103DE000DC7ACD880321DC7AC9C3033E3E0121EC15
:103DF0007ACDF523032AEC7AE5210A00CDB90A220F
:103E0000EE7A2AEC7AEB2AEE7A7B956F7A9C67EB56
:103E1000210A00CD5B0AE5210A00CDB90A22F07A19
:103E20002AF07A110A00CD1B0AEB2AEC7A7D936FF7
:103E30007C9A67EB2AEE7A7B956F7A9C67EB21641C
:103E400000CD5B0A22F27A2AF27A11410019CD01E3
:103E50002211CF2DCD1221E52AF07A11410019CD82
:103E60000122D1CD1221E52AEE7A11410019CD01AE
:103E700022D1CD122111EA7ACDC3212AEA7AC92AA8
:103E8000EA7AC9C3953F3E0321F67ACDF5230305AF
:103E9000052AFC7A11020019195E23562AFA7ACDF6
:103EA0005821C6FF9FF52AFC7A11020019195E23DA
:103EB000562AF87ACD5821C6FF9FC1A01FD2043FD1
:103EC000211000E5CDC43B2AFE7AEB2A007B29199C
:103ED0005E2356EBCD390F2AFC7A11010019195EC9
:103EE0002356EB11D22DCD1221EB21D62DCD12214F
:103EF000E52AFC7A11020019195E2356EBD1CD1286
:103F000021CD41102A8E7A11040019195E23562101
:103F1000010029195E2356210A2DCD5821C2373FE1
:103F20002A8E7A11040019195E235621010029190D
:103F3000EB21DC2DCDC3212AFC7A11020019195E78
:103F400023562AFA7ACD5821C2523F2AF47AC9C39D
:103F50008D3F2A8E7A11040019195E235621010023
:103F60002919E52A8E7A11040019195E2356210188
:103F700000029195E2356D5210F00CD1722E52AF618
:103F80007AE5CD7338D1CD1221D1CDC3212AF47A6F
:103F9000C92AF47AC9C3D63F3E01210A7BCDF52355
:103FA000032A0A7B7CB5C2B93F210000CDBA0421A7
:103FB000027BCD880321027BC92A0A7B2BE52A0CD0
:103FC0007BCDB90A23CDBA0421027BCD880321021F
:103FD0007BC921027BC9C354403E0121107BCDF532
:103FE00023052A107BCD4D2222127B11FFFFD5C362
:103FF00036402A107BE52A127BE5210100CD9B2269
:10400000EB21ED2DCD5821C22B402A107BE52A1043
:104010007BCD4D22EB2A127B7B956F7A9C67CD5B23
:1040200022110E7BCDC3212A0E7BC911FFFF2A125C
:104030007B1922127BD5EB210100F1B7F24040EB56
:104040007D937C9AF2F23F2A107B110E7BCDC32127
:104050002A0E7BC9C31D423E0121167BCDF52305E7
:104060002A187B7CB5C27840210000221 47B2100F5
:1040700000221A7B2A147BC921010022CE7A2A1839
:104080007B22D07A2ACE7AEB2AD07A19EB21020051
:10409000CD5B0A22D47A2A1E7BEB2AD47A29195EB8
:1040A00023562A1C7B19195E2356EB11D67ACDC3F1
:1040B000212A167B11207BCDC3212AD67ACD4D2211
:1040C000E52A207BCD4D22D17B957A9CF2FB402ABC
:1040D000227BE52A207BCD4D22E52AD67ACD4D22C2
:1040E000D17B956F7A9C67CD1722EB2AD67AEBCDE0
:1040F000122111D67ACDC321C33941 2AD67ACD4DAA
:1041000022E52A207BCD4D22D17D937C9AF2394144
:104110002A227BE52AD67ACD4D22E52A207BCD4D79
:104120000022D17B956F7A9C67CD1722EB2A207BEBFF
:10413000CD122111207BCDC3212A247B7CB5CAB0A1
:104140004121F02DCD390F2AD47ACDDB0F21F42D6A
:10415000CD390F2ACE7ACDDB0F21F92DCD390F2A9B
:10416000D07ACDDB0F21FE2DCD390F2AD67ACD396D
:104170000F21042ECD390F2A207BCD390F210B2E94
:10418000CD390F2A187BCDDB0F21132ECD390F2A05
:104190001E7BEB2AD47A29195E2356EBCDDB0F2147
:1041A000192ECD390F2AD67ACD4D22CDDB0F211E07
:1041B0002ECD390F2A207BCD4D22CD03102AD67A61
:1041C000EB2A207BCD5821C2DA4121FFFF221A7B46
:1041D0002AD47A22147B2A147BC92ACE7AEB2AD0DD
:1041E0007A7D937C9AF2F8412100002 21A7B2AD42E
:1041F0007A22147B2A147BC92A207BEB2AD67ACD1B
:104200005821D20F422AD47A2B22D07AC316422ABE
:10421000D47A2322CE7AC384402A147BC9C3A34212
:104220003E022128 7BCDF5230505210000222C7BB1
:10423000C35B422A307BEB2A2C7B29195E23562153
:10424000010029195E23562A2A7BCD5821C25442E7
:104250002A267BC92A2C7B23222C7BEB2A2E7B7DD2
:10426000937C9A1FB4F233422A307BEB2A2E7B29AF
:10427000195E2356210100291 9EB2A2A7BCDC3217F
:104280002A307BEB2A2E7B29195E23562102002936
:1042900019EB2A287BCDC3212A2E7B23222E7B2AB1
:1042A000267BC9C3D0433E0421347BCDF5230303D1
:1042B00003052A347B7CB5D6019FF52A187B7CB593
:1042C000D6019FC1B01FD2CC42C3FF422A3A7BE540
:1042D000CD5740223C7B2A1A7B7CB5CAFF422A3448
:1042E0007B2B7CB5C2FB42210800E5CDC43B2A3ABA
:1042F0007BCD41102A327BC9C3FF422A327BC92AB7
:104300001 87B7CB5C20D4321000022D07A2A187B8D
:10431000232 2187B2A187BEB2A3E7B7D937C9AF222
:104320003B43210900E5CDC43B2A3A7BCD47102A07
:104330001 87BCD0310CD681FCD9D012A1C7BEB2A75
:104340001 87B2919EB2A3A7BCDC3212A407BEB2A23
:104350001 87B2919EB2A367BEB7323722A427BEBFD
:104360002A187B2919EB2A387BEB7323722A187BD6
:1043700022447B11FFFFD5C3A0432A1E7BEB2A44B6
:104380007B2919E52A447B2BEB2A1E7B19195E2316
:1043900056E173237211FFFF2A447B1922447BD517
:1043A0002AD07A23EB2A447BEBF1B7F2AF43EB7DC3
:1043B000937C9AF27A432AD07A23EB2A1E7B19192E
:1043C000EB2A187BEB7323722A327BC92A327BC912
:1043D000C31F443E0121487BCDF52305212 32EE553
:1043E0002A487BE5210100CD6F25224A7B2A4A7BA2
:1043F0001100007B957A9CF20E442A487BE52A4AFC
:104400007B2BCD172211467BCDC321C317442A48ED
:104410007B11467BCDC3212A467BC92A467BC9C373
:104420004B443E01214E7BCDF523052A4E7BE5CD45
:10443000D343E5CD283BE5CD7639CD4723114C7BE1
:10444000CDC3212A4C7BC92A4C7BC9C3E2443E011F
:104450002152 7BCDF523052A527BE5210100CD17A2
:1044600022EB21262ECD58213F17F52A527BE5213C
:1044700000100CD1722EB21292ECD58212F07C1A0F5
```

```
:104480001FD291442A527B11507BCDC3212A507BED
:10449000C92A527BE5CD574022547B2A1A7B7CB532
:1044A000C2BD44211A00E5CDC43B2A527BCD411048
:1044B00011507B212C2ECDC3212A507BC92A1E7B73
:1044C000EB2A547B29195E23562A427B19195E2355
:1044D00056EBCDBA04CD062311507BCDC3212A5013
:1044E0007BC9C375453E0121587BCDF52305212F9E
:1044F0002EE52A587BE5210100CD6F25225A7B212C
:104500000900CD0122E52A587BE5210100CD6F2568
:10451000225C7B2A5C7B7CB5C6FF9FF52A5A7B7C9C
:10452000B5D6019FF52A5C7BEB2A5A7B7B957A9C5A
:104530007C1B0C1A01FD23F452A5C7B225A7B2A0B
:104540005A7B1100007B957A9CF264452A587BE5E2
:10455000210100E52A5A7B2BCD9B2211567BCDC32E
:1045600021C36D452A587B11567BCDC3212A567B2A
:10457000C92A567BC9215000225E7B219600226009
:104580007B21020022627B21100022647B21FF003C
:1045900022667B21400022687B21FF00226A7B216A
:1045A0000100226C7B210000226E7B21000022BCD6
:1045B0007A21000022BA7A21000022187B21000013
:1045C00022707B21000022727B21000022747B215B
:1045D000000022767B21000022787B210000227AD5
:1045E0007B210000227C7B210000227E7B210000B9
:1045F000222E7B21000022807B21000022827B1161
:10460000227B21322ECDC32111847B21402ECDC3AC
:104610002121000022D07ACD0C10CD0C1021432E88
:10462000CD411021662ECD411021892ECD41102182
:10463000AC2ECD4110CD0C1021CD2ECD390FCD1388
:1046400022CD472311867BCDC321211000E5210215
:1046500000E5210200E5210500E521887BCD362417
:104660002A667BE5210100E5210500E5218A7BCD55
:1046700036242A647BE5210200E5210200E52105BC
:1046800000E5218C7BCD36242A647BE5210100E501
:10469000210300E5218E7BCD36242A687BE52106A7
:1046A00000E5210200E5210500E521907BCD3624BF
:1046B0002A6A7BE5210200E5210200E5210500E5EB
:1046C00021307BCD36242A5E7BE5210100E52105E2
:1046D00000E521FC7ACD36242A607BE52A627BE561
:1046E000210200E5210500E5218E7ACD36242192B4
:1046F0007BCD29142A927BE5210100E5210300E509
:1047000021947BCD36242A927BE5210100E5210308
:1047100000E521967BCD36242A927BE5210100E538
:10472000210500E521FE7ACD36242A927BE5210180
:1047300000E5210500E521987BCD36242A927BE512
:10474000210100E5210500E5219A7BCD36242A923E
:104750007BE5210100E5210500E5219C7BCD362488
:104760002A927BE5210100E5210500E5219E7BCD14
:1047700036242A927BE5210100E5210500E521C8C8
:104780007ACD36242A927BE5210100E5210500E55A
:1047900021A07BCD36242A927BE5210100E521036F
:1047A00000E521A27BCD362421010022127BC31813
:1047B000482AFE7AEB2A127B2919CDF5132A987B19
:1047C000EB2A127B2919CDF5132A9A7BEB2A127B4F
:1047D0002919CDF5132A9C7BEB2A127B2919CDF5D8
:1047E000132A9E7BEB2A127B2919CDF5132AC87A4E
:1047F000EB2A127B2919CDF5132AA07BEB2A127B19
:104800002919CDF5132AA27BEB2A127B2919CD2970
:10481000142A127B2322127BEB2A927B7D937C9AB3
:104820001FB4F2B1472A867BE5CDE54411A47BCDC8
:10483000C3212A867BE5CD143AE5CDE54411A67B5C
:10484000CDC3212A867BE5CD143AE5CD143AE5CDDA
:10485000E54411A87BCDC3212A867BE5CD143AE53A
:10486000CD143AE5CD143AE5CDE544CD8E14CDD03E
:1048700004223E7B2A3E7B7CB5C282482100022274
:104880003E7B2A3E7BE5210100E5210500E5211C58
:104890007BCD36242A3E7BE5210100E5210300E59E
:1048A00021407BCD36242A3E7BE5210100E5210312
:1048B00000E521427BCD36242A3E7BE5210100E53F
:1048C000210300E5211E7BCD362421E22ECD390FB8
:1048D0002AA47BCD411021E82ECD390F2AA87BEBED
:1048E00021FB2ECD5821CA20492AA87BCD41102A70
:1048F000A87BE5210100CD5B22EB21FD2ECD5821C7
:10490000CA1D492AA87BE5210100CD1722EB210011
:104910002FCD122111A87BCDC321C31D49C3264928
:1049200021032FCD41102A3E7BCDDB0F210C2FCD53
:104930004110CD0C1021202FE52AA67BE521010096
:10494000CD6F257CB5CA514921000022AA7BC357EF
:1049500049210100 22AA7B21232FE52AA67BE521FC
:104960000100CD6F257CB5CA734921010022BE7AB2
:10497000C379492100002 2BE7A21262FE52AA67B91
:10498000E5210100CD6F257CB5CA954921010022A2
:10499000247BC39B4921000022247B21292FE52A67
:1049A000A67BE5210100CD6F257CB5CAB6493EFF47
:1049B000CD7810C3BB493E00CD7810212C2FE52ABD
:1049C000A67BE5210100CD6F257CB5CAD749210121
:1049D00022AC7BC3DD4921000022AC7B212F2FBC
:1049E000E52AA67BE5210100CD6F257CB5CAF949F2
:1049F00021010022AE7BC3FF4921000022AE7B21B2
:104A00000100E5219652CD571A2AA47BEB21322FC3
:104A1000CD5821D6019FF52AA67BEB21342FCD5806
:104A200021D6019FC1B01FD2434A210100E5CDC468
:104A30003B21362FCD4110213E2FCD4110CD681F97
:104A4000CD9D012AA47BE5210000E5210100E5219F
:104A500001003E00CD871911A67B21772FCDC32100
:104A600021D27ACD29142AD27AE5210400E5210247
:104A700000E5210500E521D87ACD36242AD27AE551
:104A8000210100E5210300E521B07BCD36242AD2A7
:104A90007AE5210100E5210300E521B27BCD362432
:104AA00021010022127BC3E74A21010022C67AC3FA
:104AB000CD4A2AD87AEB2A127B29195E23562AC6B8
:104AC0007A2919CDF5132AC67A2322C67A11FBFF5B
:104AD00019D2B24A2AB07BEB2A127B2919CD2914AC
:104AE0002A127B2322127BEB2AD27A7D937C9A1F97
:104AF000B4F2A94A21B47BCD29142AB47BE5210163
:104B000000E5210500E521B67BCD362421000022F9
:104B1000127BC3284B2AB67BEB2A127B2919CDF5D1
:104B2000132A127B2322127BEB2AB47B7D937C9A7F
:104B30001FB4F2154B21B87BCD29142AB87BE5218F
```

:104B40000100E52105O0E521BA7BCD36242101 00D5
:104B500022127BC3694B2ABA7BEB2A127B2919CD1F
:104B6000F5132A127B2322127BEB2AB87B7D937CE0
:104B70009A1FB4F2564B21BC7BCD29142ABC7BE58D
:104B8000210100E5210500E521BE7BCD3624210170
:104B90000022127BC3AA4B2ABE7BEB2A127B291967
:104BA000CDF5132A127B2322127BEB2ABC7B7D934B
:104BB0007C9A1FB4F2974B21010022127BC3D54B84
:104BC0002AB27BEB2A127B29193600233600 2A12DF
:104BD0007B2322127BEB2AD27A7D937C9A1FB4F23C
:104BE000C04B21010022127BC3004C2A967BEB2A8A
:104BF000127B29193600233600 2A127B2322127BCE
:104C0000EB2A927B7D937C9A1FB4F2EB4B2101003F
:104C100022127BC32B4C2A8E7BEB2A127B2919365E
:104C20000023360 02A127B2322127BEB2A647B7D31
:104C3000937C9A1FB4F2164C21010022127BC356BA
:104C40004C2A947BEB2A127B2919360023360 02A42
:104C5000127B2322127BEB2A927B7D937C9A1FB4DA
:104C6000F2414C21010022127BC3CE4C2A9A7BEBED
:104C70002A127B29195E235621792FCD5821D6017E
:104C80009FF52A127B2BE52AC87AEB2A127B291979
:104C90005E2356D5CD113C7CB5D6019FC1A01FD255
:104CA000C74C2AC87AEB2A127B29195E23562AA8F8
:104CB0007BEBCD1221E5210000E52A127B23E521C3
:104CC00001003E00CD0F1A2A127B2322127BEB2A11
:104CD000927B7D937C9A1FB4F26C4C2101002212CE
:104CE0007BC32E4D2A9A7BEB2A127B29195E235611
:104CF000217C2FCD5821C2274D2A127B2322C07B35
:104D00002AA87BEB217F2FCD1221E5210000E52A87
:104D1000C07BE52101003E00CD0F1A2A127B232320
:104D20002322C27BC33B4D2A127B2322127BEB2A18
:104D3000927B7D937C9A1FB4F2E44C2A927B2323CE
:104D40022C47B2AA87BEB218B2FCD1221E52100E9
:104D500000E52AC47BE52101003E00CD0F1A2A920E
:104D60007B23232322C67B2AA87BEB21962FCD12FF
:104D70021E5210000E52AC67BE52101003E00CDAA
:104D80000F1A11A87B21A42FCDC321210100E521F9
:104D9000D452CD571A2AC27BE521A352CD571ACD42
:104DA000D7562AFC7A11010019195E235621A62F25
:104DB000CD5821C2BC4DCD5F55C39F4D2AFC7A1101
:104DC00001 0019195E235621AE2FCD5821C2104E75
:104DD0002AC87B7CB5CAEB4D212300E5CDC43B2A14
:104DE000CA7BCD4110C39F4DC3104E2AFC7A1102DD
:104DF00000019195E2356D5210000E52AC27BE52162
:104E000001003E00CD871921010022C87BC39F4DC0
:104E10002AFC7A11010019195E235621B72FCD58AB
:104E200021CA274EC39F4D21010022127BC3184F78
:104E30002AFC7A11020019195E2356D52AFE7AEB54
:104E40002A127B29195E2356EBD1CD5821C2C34EBD
:104E50002A127B22007B2A947BEB2A127B2919E5FC
:104E60002A947BEB2A127B29195E2356EB23EBE174
:104E700073237 22A9C7BEB2A127B29195E2356210D
:104E8000BE2FCD5821D6019FF52A947BEB2A127BA9
:104E900029195E23562101007D937C9A07C1A01F2A

:104EA000D2AD4E210600E5CDC43BC3C34ECD9955CE
:104EB0002AA27BEB2A007B29195E2356EB22CC7BAE
:104EC000C3414F2AFC7A11020019195E2356D52AD4
:104ED000FE7AEB2A127B29195E2356D52AFC7A1119
:104EE000020019195E2356EBCD4D22CD1722D1CDEC
:104EF0005821D2114F210500E5CDC43B2AFC7A117F
:104F0000020019195E2356EBCD4110CD681FCD9DCF
:104F1000012A127B2322127BEB2A927B7D937C9ABF
:104F20001FB4F2304E210500E5CDC43B2AFC7A11B6
:104F3000020019195E2356EBCD4110CD681FCD9D9F
:104F4000012AFE7AEB2A007B29195E235621C12F04
:104F5000CD5821C2EE4F2A8E7A11010019195E2315
:104F6000562101002919EB21CA2FCDC321210100AF
:104F700022CE7B2AFC7A11040019195E2356D5CD66
:104F80004E44CD8E14CDD80422D07B2AFC7A110554
:104F900000019195E2356D5210100CD1722EB21CC33
:104FA0002FCD5821CAC24F2AFC7A11050019195E6B
:104FB0002356D5CD4E44CD8E14CDD80422D27BC3FA
:104FC000EE4F2AFC7A11050019195E2356D52AFCEA
:104FD0007A11050019195E2356EBCD4D222BCD5BBE
:104FE00022E5CD4E44CD8E14CDD80422D27B2AFEAC
:104FF0007AEB2A007B29195E235621CF2FCD582129
:10500000CA0C5021000022D47BC32951210100 2267
:10501000D47B2AFC7A11030019195E235621D42F60
:10502000CD5821C23950212100E5CDC43B11D67B9A
:1050300021D62FCDC321C35E502AFC7A110300195B
:10504000195E2356D52AFC7A11030019195E2356DE
:10505000EBCD4D222BCD5B2211D67BCDC3212AFC7B
:105060007A11040019195E235621D82FCD5821C278
:105070007F502AD67BE5CD4E4411847BCDC32121C0
:10508000010022127BC31C512A307BEB2A127B29A0
:10509000195E235621010029195E23562AD67BEB7F
:1050A000CD5821C215512A307BEB2A127B29195E7B
:1050B000235621020029195E235621E22FCD5821C3
:1050C000D6019FF52A307BEB2A127B29195E2356E5
:1050D000021020029195E235621E52FCD5821D60142
:1050E0009FC1B01FD205512A307BEB2A127B2919B0
:1050F0005E23562102002919EB21E72FCDC321C3DE
:10510000 2951C31551212000E5CDC43B2AD67BCDC2
:105110004110C329512A127B2322127BEB2A2E7BBA
:105120007D937C9A1FB4F28850CDD756CD45582A2E
:10513000FC7A11010019195E235621EA2FCD58215E
:10514000C24951CD5F55C329512AFC7A110100197A
:10515000195E235621F22FCD5821C2735121070029
:10516000E5CDC43B2AFC7A11020019195E2356EBE7
:10517000CD41102AFC7A11010019195E235621F93C
:105180002FCD5821C2A8512A9A7BEB2A007B2919DE
:105190005E235621FE2FCD5821C2A551CDB26BC33F
:1051A0009F4DC3A851C39F4D2ACE7B7CB5CA0A52DE
:1051B000210100 22127BC3FA512A8E7A11010019B3
:1051C000195E23562101002919E52A8E7A11010062
:1051D00019195E23562101 0029195E2356D52AFC90
:1051E0007AEB2A127B29195E2356EBD1CD1221D1FD
:1051F000CDC3212A127B2322127BEB2A6C7B7D9369

:105200007C9A1FB4F2B951C329512AA87BEB2A0022
:105210007B29195E2356210130CD5821C22852CD59
:1052200083259C32951C396522A9A7BEB2A807B2913
:10523000195E2356210430CD5821C293522101001A
:10524000221 27BC36D522AFC7AEB2A127B29195E4B
:1052500023562AD87BEBCD1221EB210730CD12212A
:1052600011D87BCDC3212A127B2322127BEB2A6C1F
:105270007B7D937C9A1FB4F24652210A30CDEC100C
:105280002A007B23CD651A2AD87BCD9C1EC32951C9
:10529000C39652C32951210200E5CDC43BCD681FFE
:1052A000CD9D012AC87B7CB5CAB4522AC27BCD33BE
:1052B0001FC3C152212400E5CDC43B2ACA7BCD4186
:1052C0001021000022C87B2AC27BE521A352CD57C2
:1052D0001AC39F4DCD0C10210D30CD411021010078
:1052E000CD331F21010022127BC337532A947BEB5D
:1052F0002A127B29195E23567AB3D6019FF52A9884
:105300007BEB2A127B29195E2356212F30CD5821A1
:10531000D6019FC1A01FD23053210300E5CDC43B6D
:105320002AFE7AEB2A127B29195E2356EBCD411017
:105330002A127B2322127BEB2A927B7D937C9A1F7D
:10534000B4F2EC52210100221 27BC3A8532AB27B93
:10535000EB2A127B29195E23567AB3D6019FF52AD0
:10536000D87AEB2A127B29195E23562103002919CA
:105370005E2356213230CD5821D6019FC1A01FD2C5
:10538000A153210D00E5CDC43B2AD87AEB2A127B2C
:1053900029195E235621010029195E2356EBCD41C0
:1053A000102A127B2322127BEB2AD27A7D937C9AD0
:1053B0001FB4F24D532ABA7A7CB5CA5A542104005C
:1053C000E5CDC43B2ABA7A2BCDDB0F213530CD4158
:1053D000102AAE7B7CB5CA5754214B30CDEC102A35
:1053E000C07BCD651A214E30CD9C1E210100221 28A
:1053F0007BC34454215D30CDEC102AC07BCD651AAF
:105400002A1E7BEB2A127B29195E23562A1C7B1944
:10541000195E2356216030CD1221E52A1E7BEB2A2E
:10542000127B29195E23562A427B19195E2356EBFB
:10543000CD8A04CD0623D1CD1221CD9C1E2A127BDC
:105440002322127BEB2A187B7D937C9A1FB4F2F403
:1054500053C38D54C35A54C38D542AA87BEB216483
:1054600030CD1221E5210000E5210100E5210100F8
:105470003E00CD0F1A217130CD4110CDC56ECD0C3F
:10548000102198 30CD41102101 00CD331F210100A2
:1054900022127BC3B9542AC87AEB2A127B29195EDF
:1054A000235621AF30CD5821CAB2542A127B23CDC6
:1054B000331F2A127B2322127BEB2A927B7D937C63
:1054C0009A1FB4F296542AC07BCD331F2AC47BCDD9
:1054D000331F2AC67BCD331FCD0C1021B130CD41F7
:1054E0001021C330CD411021D630CD390F2ABC7ADE
:1054F000CD031021EB30CD390F2A187BCD031021BD
:1055000031CD390F2A3E7BEB2A187B7B956F7AD1
:105510009C67CD0310211531CD390F2A787BCD033F
:1055200010212A31CD390F2A707BCD0310213F3154
:10553000CD390F2A727BEB2A747B19CD03102154CD
:1055400031CD390F2A7A7BCD0310CD0C1021693172
:10555000CD390FCD4E03CD0310CD681FCD9D012158
:10556000FFFF22DA7BC36E5521000022DA7B2AFC82
:105570007A11020019195E2356D52AFC7A1103000C
:1055800019195E2356EBCD8E14CD0804E52ADA7BAB
:10559000E5210100E5CDA642C9218431E52ACA7B77
:1055A000E5210100CD6F257CB5C2AD55C92A9E7B92
:1055B000EB2A007B29195E2356218731CD5821C261
:1055C000DA55210B00E5CDC43B2AFE7AEB2A127B8B
:1055D00029195E2356EBCD4110C9218A31E52ACA2B
:1055E0007BE5210100CD6F2522127B2ACA7BE52AAB
:1055F000CA7BCD4D22EB2A127B7B956F7A9C67CDBF
:105600005B22E5CDE54411DC7BCDC3212AFE7AEB9C
:105610002A007B29195E2356218D31CD5821C2288D
:10562000562A767B2322767B2AFE7AEB2A007B2978
:10563000195E2356219431CD5821C25B562A2E7B08
:105640001180001922DE7B21FFFF22E07B2ADC7B18
:10565000E5219931E5CD2042C38E562A967BEB2A6F
:1056600007B29195E2356EB22DE7B21010022E01C
:105670007B2A967BEB2A007B2919E52A967BEB2A6D
:1056800007B29195E2356EB23EBE17323722ADC9E
:105690007BE52ADE7BE52A007BE52AE07BE5CDA6D8
:1056A000422AFE7AEB2A007B29195E2356219C317F
:1056B000CD5821C2D65621A131CDEC102A007B2332
:1056C000CD651A2ADC7B11A431CD1221EB21A73143
:1056D000CD1221CD9C1EC9CD53147CB5CA0557CD22
:1056E0005C1422127B2A127B2B2B2B7CB5C2F95621
:1056F000CD681FCD9D01C3055721AB31CD4110CDE4
:105700006914221 27B2AC87B7CB5CA1C572AC27B2B
:10571000CD651A21D87BCD5F1DC3285721010 0CD4F
:105720006 51A21D87BCD5F1D2ABC7A2322BC7A2A38
:10573000AA7B7CB5CA58572ABC7ACDDB0F21C5316C
:10574000CD390FCD4E03CDDB0F21C831CD390F2A16
:10575000D87BCD4110C36D57210D00CD0122CD392D
:105760000F21CB31CD390F2ABC7ACDDB0F2AD87B64
:1057700011CA7BCDC3212AD87BE5CD224411D87B29
:10578000CDC3212AD87BEB21D231CD5821D6019F20
:10579000F52AD87BE5210100CD1722EB21D431CDAC
:1057A0005821D6019FC1B0F52AD87BE5210100CD53
:1057B0001722EB21D731CD5821D6019FC1B01FD27E
:1057C000C557C3D75621010022127BC3E5572AFCD7
:1057D0007AEB2A127B2919EB21DA31CDC3212A1267
:1057E0007B2322127BEB2A6C7B7D937C9A1FB4F285
:1057F000CE5721010022E27B210000226C7BC331C5
:10580000582AFC7AEB2AE27B2919E52AD87BE5CDD8
:10581000E544D1CDC3212AD87BE5CD143A11D87BFC
:10582000CDC3212AE27B2322E27B2A6C7B23226CDC
:105830007B2AD87BEB21DC31CD5821C2015821 01D4
:105840000022E27BC921DE31E52ACA7BE521010085
:10585000CD6F257CB5D6019FF52AFE7AEB2A007B19
:1058600029195E235621E131CD5821D6019FC1B0BF
:105870001FD27558C92101002212 7BC324592AFC6A
:105880007AEB2A127B29195E2356D5210100CD1708
:1058900022EB21EA31CD5821C21D592AFC7AEB2A8C
:1058A000127B29195E2356D52AFC7AEB2A127B2912
:1058B000195E2356EBCD4D222BCD5B2211DC7BCD27

```
:1058C000C3212ADC7BE5CD574022E47B2A1A7B7C6E
:1058D000B5CA00592AFC7AEB2A127B2919E52A1E3F
:1058E0007BEB2AE47B29195E23562A427B19195E39
:1058F0002356EBCDBA04CD0623D1CDC321C31D5908
:105900002AFC7AEB2A127B2919EB21ED31CDC32138
:10591000210A00E5CDC43B2ADC7BCD41102A127B55
:105920002322127BEB2A6C7B7D937C9A1FB4F27E40
:1059300058C92AFC7A11010019195E2356D5CD6504
:105940003C22E67B2AE67B7CB5C27A59211100E530
:10595000CDC43B2AFE7AEB2A007B29195E2356210F
:10596000F031CD1221E52AFC7A11010019195E23CC
:1059700056EBD1CD1221CD4110C92AB27BEB2AE6DC
:105980007B2919E52AB27BEB2AE67B29195E23568F
:10599000EB23EBE17323722AB27BEB2AE67B291916
:1059A0005E23562101007D937C9A07F52AD87AEB75
:1059B0002AE67B29195E235621040029195E235605
:1059C00021F431CD5821D6019FC1A01FD2E6592123
:1059D0000F00E5CDC43B2AFC7A11010019195E23A2
:1059E00056EBCD4110C92AD87AEB2AE67B29195EFD
:1059F000235621020029195E2356D52AFE7AEB2A66
:105A0000007B29195E2356EBD1CD5821CA3D5A217E
:105A10000E00E5CDC43B2AFC7A11010019195E2362
:105A20005621F731CD1221E52AFE7AEB2A087B2997
:105A3000195E2356EBD1CD1221CD4110C92A6C7BC2
:105A40002BE52AB07BEB2AE67B29195E2356E17B06
:105A5000956F7A9CB5C6FF9FF52AB07BEB2AE67B53
:105A600029195E23567AB3C6FF9FC1A01FD2AA5A36
:105A7000211F00E5CDC43B2AFC7A11010019195EF3
:105A80002356EBCD411021FB31CD390F2AB07BEBF2
:105A90002AE67B29195E2356EBCD0B0F210832CD98
:105AA000390F2A6C7B2BCD0310C92AE67B11FE5AD5
:105AB000D52B2911BC5A197E23666FE93068745FB3
:105AC000C55EF95B38656A669D69FB5BD2614364BC
:105AD0002863E15CF85C085D185D285D385D485D11
:105AE000F26A585DFA5BB6696267F45E525F8F696D
:105AF000FF5A0561235F7C5B3D5C6C5CB25CC92A2C
:105B00006E7B23226E7B2A8E7A11000019195E2388
:105B1000562101002919EB211532CDC321210200A4
:105B200022127BC36E5B2A8E7A11000019195E2344
:105B3000562101002919E52A8E7A11000019195EF3
:105B4000235621010029195E2356D52AFC7AEB2A17
:105B5000127B29195E2356EBD1CD1221EB211D3288
:105B6000CD1221D1CDC3212A127B2322127BEB2A15
:105B70006C7B7D937C9A1FB4F2265BC92A6E7B23D3
:105B8000226E7B2A8E7A11010019195E2356210198
:105B9000002919EB212032CDC32121010022127BE3
:105BA000C3EB5B2A8E7A11010019195E235621017D
:105BB000002919E52A8E7A11010019195E23562150
:105BC000010029195E2356D52AFC7AEB2A127B297B
:105BD000195E2356EBD1CD1221EB212932CD1221B2
:105BE000D1CDC3212A127B2322127BEB2A6C7B7D31
:105BF000937C9A1FB4F2A35BC9C9C92A6E7B232286
:105C00006E7B2A8E7A11020019195E23562101003B
:105C10002919E52AFC7A11020019195E23562A2255
:105C20007BCD1221E5210A00CD1722112C32CD1295
:105C300021EB214032CD1221D1CDC321C92A6E7B67
:105C400023226E7B2A8E7A11020019195E235621B7
:105C500001002919E52AFC7A11020019195E235660
:105C6000EB114332CD1221D1CDC321C92A6E7B2342
:105C7000226E7B2A8E7A11000019195E23562101AB
:105C8000002919EB215432CDC3212A8E7A1101004B
:105C900019195E23562101002919E52AFC7A1102FF
:105CA0000019195E2356EB116032CD1221D1CDC3FC
:105CB00021C92A6E7B23226E7B2A8E7A110300195A
:105CC000195E23562101002919E52AFC7A110200E8
:105CD00019195E2356EB117132CD1221D1CDC3219A
:105CE000C92A6E7B23226E7B218232E5218732E531
:105CF000210100E5CD863EC9218C32E5219132E5B6
:105D0000210200E5CD863EC9219632E5219B32E590
:105D1000210400E5CD863EC921A032E521A532E56A
:105D2000210800E5CD863EC921AA32E521AF32E542
:105D3000211000E5CD863EC921B432E521B932E516
:105D4000212000E5CD863EC921BE32E521C332E5E2
:105D5000214000E5CD863EC92A787BCDBA04CD0628
:105D60002311C832CD1221EB21CD32CD122111E801
:105D70007BCDC3212AE87BCD4D222B2B2B2B2B2B2C
:105D80002B7C07D2965D2AE87BEB21D032CD122105
:105D900011E87BCDC3212AFC7A11020019195E2378
:105DA00056D5210100CD1722EB21D332CD58211732
:105DB000F52AFC7A11020019195E2356D52101003B
:105DC000CD5B22EB21D632CD5821C6FF9FC1A0F575
:105DD0002AFC7A11030019195E2356D5210100CD42
:105DE0001722EB21D932CD582117F52AFC7A11035D
:105DF0000019195E2356D5210100CD5B22EB21DC71
:105E000032CD5821C6FF9FC1A0C1B01FD2165E215E
:105E10002600E5CDC43B2A8C7BEB2A787B29195ED2
:105E200023562101002919E52AE87B11DF32CD1222
:105E300021EB21E232CD1221E52AFC7A1102001970
:105E4000195E2356EBD1CD1221D1CDC3212A8C7BF3
:105E5000EB2A787B29195E23562102002919E52AAD
:105E6000E87B11EA32CD1221EB21ED32CD1221E592
:105E70002AFC7A11030019195E2356EBD1CD1221A9
:105E8000D1CDC3212AFC7A1102001919E52AFC7A26
:105E900011040019195E2356EBD1CDC3212AFC7AD7
:105EA0001103001919E52A787BCDBA04CD0623D158
:105EB000CDC321CD5F552A6E7B23226E7B2A787B52
:105EC0002322787BC92AFC7A11020019195E235615
:105ED000D5CD4E4411EA7BCDC3212AEA7BCD8E1469
:105EE0002A787BCDBA04CD0B03F2F35E211200E504
:105EF000CDC43BC92AFC7A11020019195E2356D57C
:105F0000CD4E4411EC7BCDC3212AEC7BCD8E142ADF
:105F1000787BCDBA04CD0B03F2225F212700E5CDEB
:105F2000C43BC92AFC7A11020019195E2356D5CD4B
:105F30004E4411EE7BCDC3212AEE7BCD8E142A7800
:105F40007BCDBA04CD0B03F2515F211300E5CDC454
:105F50003BC92AFC7A11020019195E2356EBCD8E3B
:105F600014210300CDBA04CD4C04CD062311F07BDF
:105F7000CDC321C92A6E7B232323226E7B2A707B0B
```

:105F80007CB5C29C5F2A8E7A11000019195E2356D7
:105F90002101002919EB21F532CDC3212AFC7A1108
:105FA000020019195E2356D52AB67BEB2A707B298D
:105FB000195E2356EBD1CD5821C6FF9FF52AB67B3B
:105FC000EB2A707B29195E235621FF32CD5821C65A
:105FD000FF9FC1A01FD2EF5F211900E5CDC43B2A6E
:105FE000FC7A11020019195E2356EBCD4110C92A23
:105FF000707B110300CD1B0A23EB2A8E7A19195EE0
:1060000023562101002919E52AFC7A1102001919E9
:106010005E2356EB110233CD1221EB210533CD1255
:1060200021D1CDC3212A707B110300CD1B0A23236C
:10603000EB2A8E7A19195E23562101002919E52AC7
:10604000FC7A11020019195E2356D5210600CD17DE
:1060500022110933CD1221D1CDC3212A707B110326
:1060600000CD1B0A232323EB2A8E7A19195E2356AF
:106070002101002919E52AFC7A11030019195E2370
:1060800056EB111933CD1221D1CDC3212A887BEBD8
:106090002A707B29195E23562101002919E52AFC63
:1060A0007A11020019195E2356EBD1CDC3212A883B
:1060B0007BEB2A707B29195E23562102002919E502
:1060C0002AFC7A11030019195E2356EBD1CDC321A6
:1060D0002A707B2322707B2A707B1111007B957ABA
:1060E0009CF2EB60211400E5CDC43B2AFC7A11033D
:1060F000001919E52A707BCDBA04CD0623D1CDC392
:1061000021CD6855C9212933E52AFC7A11020019ED
:10611000195E2356D5210100CD6F257CB5CA986143
:106120002A8A7BEB2A6E7B2919E52AFC7A11020068
:1061300019195E2356EB112F33CD1221D1CDC32176
:106140002AFC7A1103001919E52A727B11800019C3
:10615000CDBA04CD0623D1CDC3212AFC7A11020089
:106160001919E52AFC7A11020019195E2356D52A5D
:10617000FC7A11020019195E2356EBCD4D222B2B10
:10618000CD1722D1CDC3212A6E7B23226E7B2A72AA
:106190007B2322727BC3B5612AFC7A110300191993
:1061A000E52A747BCDBA04CD0623D1CDC3212A7450
:1061B0007B2322747B2A727BEB2A747B1911FF00EC
:1061C0007B957A9CF2CE61211500E5CDC43BCD686C
:1061D00055C92A807B7CB5C2ED61213F33CDEC10DF
:1061E0002A007B23CD651A214233CD9C1E2A807B59
:1061F0002322807B2AFC7A11020019195E23562182
:106200004C33CD122111F27BCDC321214F33CDEC84
:10621000102A007B23CD651A2AF27BCD9C1E2AFC16
:106220007A11030019195E2356EB115233CD122156
:10623000EB216333CD122111F27BCDC321216733D2
:10624000CDEC102A007B23CD651A2AF27BCD9C1E53
:106250002AFC7A11040019195E2356EB116A33CD1A
:10626000122111F27BCDC321217B33CDEC102A000A
:106270007B23CD651A2AF27BCD9C1E2AFC7A110560
:106280000019195E2356EB117E33CD122111F27B0A
:10629000CDC321218F33CDEC102A007B23CD651A8D
:1062A0002AF27BCD9C1E2AFC7A11060019195E2366
:1062B00056EB119233CD122111F27BCDC32121A3D4
:1062C00033CDEC102A007B23CD651A2AF27BCD9CBE
:1062D0001E2AFC7A11070019195E2356EB11A6330A
:1062E000CD122111F27BCDC32121B733CDEC102A81
:1062F000007B23CD651A2AF27BCD9C1E2AFC7A11E5
:10630000080019195E2356EB11BA33CD122111F290
:106310007BCDC32121CB33CDEC102A007B23CD656F
:106320001A2AF27BCD9C1EC92A827B2322827B2AD9
:10633000BE7BEB2A827B29195E2356D52AFC7A1173
:10634000020019195E2356EBD1CD5821C6FF9FF5E7
:106350002A827BEB2ABC7B7D937C9A07C1B01FD23B
:106360008F63212800E5CDC43B2ABE7BEB2A827BCC
:1063700029195E2356EBCD390F21CE33CD390F2AA3
:10638000FC7A11020019195E2356EBCD4110C92A7F
:106390008E7AEB2A6E7B29195E235621010029197A
:1063A000E52AFC7A11020019195E2356EB11D2334B
:1063B000CD1221EB21D733CD1221D1CDC3212AFC1F
:1063C0007A11030019195E2356EBCD4D222B7CB5B3
:1063D000C211642A6E7B23EB2A8E7A19195E23562A
:1063E0002101002919E52AFC7A11030019195E23FD
:1063F00056EBCDEA211140007D936F7C9A67CDBAB0
:1064000004CD062311DB33CD1221D1CDC321C33AF4
:10641000642A6E7B23EB2A8E7A19195E235621019A
:10642000002919E52AFC7A11030019195E2356EB9D
:1064300011ED33CD1221D1CDC3212A6E7B2323222E
:106440006E7BC92AFC7A11050019195E2356D521E5
:106450000100CD1722EB21FF33CD5821F27B642AB6
:10646000FC7A1105001919E52AFC7A1105001919A1
:106470005E2356D5CD4E44D1CDC3212AFC7A1105D9
:106480000019195E2356EBCD8E142A787BCDBA0401
:10649000CDDB03F2AC64211600E5CDC43B2AFC7AC7
:1064A00011020019195E2356EBCD41102102002282
:1064B000C67AC3E2642A907BEB2A7A7B29195E2391
:1064C00056D52AC67A2BD12919E52AFC7AEB2AC699
:1064D0007A29195E2356EBD1CDC3212AC67A23220D
:1064E000C67A11FAFF19D2B5642A907BEB2A7A7B1F
:1064F00029195E23562106002919E52AFC7A11067E
:106500000019195E2356EBD1CDC3212A907BEB2ACB
:106510007A7B29195E23562105002919E52AFC7A80
:106520001107001919 5E2356EBD1CDC3212A7A7BBE
:1065300023227A7BCD5F55C92A6E7B7CB5C29365D9
:106540002A887B226E7B21010022127BC386652A3A
:106550008E7AEB2A127B29195E2356210200291913
:10656000E52A8A7BEB2A127B29195E2356EB11022E
:1065700034CD1221EB210734CD1221D1CDC3212AF4
:10658000127B2322127BEB2A887B7D937C9A1FB46B
:10659000F24F6521010022127BC346662AFC7A1164
:1065A000020019195E2356D52A8A7BEB2A127B29E1
:1065B000195E2356EBD1CD5821C23F662A8E7AEB65
:1065C0002A127B29195E23562102002919E52A8EF9
:1065D0007AEB2A127B29195E235621020029195EC3
:1065E0002356D52A8E7AEB2A127B29195E2356214F
:1065F000020029195E2356EBCD4D222BCD1722D157
:10660000CDC3212A8E7AEB2A127B29195E235621CB
:1066100002002919E52A8E7AEB2A127B29195E23BA
:106620005621020029195E2356D52AFC7A1103004F
:1066300019195E2356EBD1CD1221D1CDC321C92A20

:10664000127B2322127BEB2AB87B7D937C9A1FB4AA
:10665000F29C65211B00E5CDC43B2AFC7A110200A7
:1066600019195E2356EBCD4110C92A7C7B7CB5C23B
:106670008466211834CDEC102AC47BCD651A211B09
:1066800034CD9C1E2A7C7B23227C7B2AFC7A11023F
:10669000001919E52AFC7A1102001919E52356D552
:1066A000CD4E44D1CDC3212AFC7A1102001919 5EC6
:1066B0002356212434CD5821C2D166211700E5CDBF
:1066C000C43B2AFC7A1102001919 5E2356EBCD4116
:1066D0001011F47B212734CDC321210200221 27B2B
:1066E000C30A672AFC7AEB2A127B29195E23562AF1
:1066F000F47BEBCD1221EB213834CD122111F47B48
:10670000CDC3212A127B2322127B11FAFF19D2E377
:10671000662AF47BE52AF47BCD4D222BCD1722117E
:10672000F47BCDC321213B34CDEC102AC47BCD6555
:106730001A2AF47BCD9C1E2AFC7A1106001919 5ED8
:106740002356EB113E34CD122111F47BCDC3212110
:106750004F34CDEC102AC47BCD651A2AF47BCD9C36
:106760001EC92A7E7B7CB5C27C67215234CDEC10D9
:106770002AC67BCD651A215534CD9C1E2A7E7B23EB
:10678000227E7B2AFC7A1102001919E52AFC7A1173
:10679000020019195E2356D5CD4E44D1CDC3212A0E
:1067A000FC7A110200191 95E2356215C34CD582160
:1067B000C2C967211800E5CDC43B2AFC7A1102004A
:1067C00019195E2356EBCD411011F67B215F34CD84
:1067D000C32121020022127BC30268 2AFC7AEB2A21
:1067E000127B29195E23562AF67BEBCD1221EB2171
:1067F0007034CD122111F67BCDC3212A127B2322C6
:10680000127B11F9FF19D2D8672AF67BE52AF67BAA
:10681000CD4D222BCD172211F67BCDC32121733410
:10682000CDEC102AC67BCD651A2AF67BCD9C1EC9FD
:106830002A6C7B22F87B2A6E7B22FA7B21020022C3
:10684000127BC3D5682AFC7AEB2A127B29195E23B6
:1068500056EB11D67BCDC3212A8E7AEB2A6E7B298B
:10686000195E2356210100291 9E52AD67BEB2176F2
:1068700034CD1221D1CDC3212AD67BE5CD5740227C
:10688000547B2A1A7B7CB5D6019FF52AD67BE5215D
:106890000200CD5B22EB217A34CD5821C6FF9FC187
:1068A000A01FD2C7682AD67BE52A2E7B110000194B
:1068B000E521FFFFE521FFFFE5CDA6422AD67BE5D6
:1068C000217E34E5CD20422A6E7B23226E7B2A1264
:1068D0007B2322127BEB2A6C7B7D937C9A1FB4F284
:1068E0004568CDD7562AFC7A11010019195E235646
:1068F000218134CD5821CA1069211C00E5CDC43B4B
:106900002AFC7A11010019195E2356EBCD4110C9FA
:106910002A6C7BEB2AF87B7B956F7A9CB5CA2E6933
:10692000211D00E5CDC43B2A6C7BCD0310C921029B
:10693000022127BC381692A8E7AEB2AFA7B2919FD
:106940005E2356210100291 9E52A8E7AEB2AFA7B6B
:106950002919 5E2356210100291 95E2356D52AFCE8
:106960007AEB2A127B29195E2356EBD1CD1221D165
:10697000CDC3212AFA7B2322FA7B2A127B232212FF
:106980007BEB2A6C7B7D937C9A1FB4F23769C9211B
:106990001E00E5CDC43B2ACA7BCD4110C92AFC7A32
:1069A00011020019195E2356D5CD4E44CD8E14CD5B
:1069B000D80422FC7BC9212200CD0122E52ACA7B12
:1069C000E5210100CD6F2522547B2A547B7CB5C282
:1069D000E069212500E5CDC43B2ACA7BCD4110C921
:1069E0002ACA7BE5CDD343E5CD283B11CA7BCDC375
:1069F000212ACA7BE52ACA7BCD4D22EB2A547B7B18
:106A0000956F7A9C67CD5B2211D67BCDC3212AD6A8
:106A10007BE5210100CD1722E5212200CD0122D105
:106A2000CD5821C23A6A2AD67BE52AD67BCD4D22A3
:106A30002BCD5B2211D67BCDC3212AFC7A1102001B
:106A40001919E52AFC7A1102001919 5E2356D5CDD1
:106A50004E44D1CDC3212AFC7A1102001919 5E23BC
:106A600056EBCD8E14CDD804E5CDDF3AEB2AD67B9C
:106A7000CD122111D67BCDC321212200CD0122E5EB
:106A80002AFC7BE5CDDF3AD1CD1221EB2AD67BCD96
:106A900012 2111D67BCDC3212AD67BE5210100CD61
:106AA0005B22E5212200CD0122D1CD5821CAC46A42
:106AB000212200CD0122EB2AD67BEBCD122111D66B
:106AC0007BCDC3212AD67BCD4D2211C0007B957A88
:106AD0009CF2DE6A212200E5CDC43BC3F16A218825
:106AE00034CDEC102A007B23CD651A2AD67BCD9CB1
:106AF0001EC92A6E7B7CB5C20D6B218B34CDEC1088
:106B00002A007B23CD651A218E34CD9C1E2198341A
:106B1000CDEC102A007B23CD651A2AFC7A110200E5
:106B200019195E2356EB119B34CD1221CD9C1E21E9
:106B3000A934CDEC102A007B23CD651A2A6C7B2B5F
:106B40002BCDBA04CD062311AC34CD1221CD9C1E21
:106B5000210300221 27BC38A6B21BA34CDEC102AA8
:106B6000007B23CD651A2AFC7AEB2A127B29195E59
:106B70002356EB11BD34CD1221EB21CB34CD1221A4
:106B8000CD9C1E2A127B2322127BEB2A6C7B7D93E9
:106B90007C9A1FB4F2596B2A6E7B23226E7B21CE26
:106BA00034CDEC102A007B23CD651A21D134CD9C45
:106BB0001EC92ACE7B7CB5CA126C2AD07B22FC7BF4
:106BC0002AFC7A1101001919EB21D634CDC3212AF0
:106BD000FC7A1102001919E52AD27BCDBA04CD0640
:106BE00023D1CDC3212A8E7A11010019195E2356B3
:106BF000210100291 95E2356EB11D67BCDC321CD8F
:106C00000E6A11D67B21DE34CDC32121000022CEB5
:106C10007BC921010022C67AC3996C210000221 28F
:106C20007BC3856C2A8E7AEB2A127B29195E235648
:106C30002AC67A29195E235621E034CD5821CA7E0E
:106C40006C21E234CDEC102A007B23CD651A2A8E0C
:106C50007AEB2A127B29195E23562AC67A29195EF5
:106C60002356EBCD9C1E2A8E7AEB2A127B29195EC5
:106C700023562AC67A2919EB21E534CDC3212A12D0
:106C80007B2322127BEB2A6E7B7D937C9A1FB4F2CE
:106C9000246C2AC67A2322C67AEB2ACC7B7D937C8D
:106CA0009A1FB4F21B6C210000226E7B2AFE7AEB45
:106CB0002A007B29195E235621E734CD5821C2F1E1
:106CC0006C2AB47B23EB2A707B7B956F7A9CB5CAC8
:106CD000D06C211900E5CDC43BC9C3F16C21EF3453
:106CE000CDEC102A007B23CD651A21F234CD9C1EF9
:106CF000C92AFE7AEB2A007B29195E235621093521

```
:106D0000CD5821C2A46D211335CDEC102A007B2370
:106D1000CD651A2A727BCDBA04CD0623111635CD66
:106D20001221CD9C1E212535CDEC102A007B23CDD0
:106D3000651A212835CD9C1E213635CDEC102A0050
:106D40007B23CD651A213935CD9C1E215135CDECE3
:106D5000102A007B23CD651A215435CD9C1E21615C
:106D600035CDEC102A007B23CD651A2A747BCDBA71
:106D700004CD0623116435CD1221CD9C1E2173351F
:106D8000CDEC102A007B23CD651A217635CD9C1ED3
:106D90002183335CDEC102A007B23CD651A21863561
:106DA000CD9C1EC92AFE7AEB2A007B29195E235648
:106DB000219F35CD5821C2FB6D21A735CDEC102A7E
:106DC000007B23CD651A2A787BCDBA04CD0623112A
:106DD000AA35CD1221CD9C1E21BA35CDEC102A004A
:106DE0007B23CD651A21BD35CD9C1E2A007B232235
:106DF000FE7B11E87B21D335CDC3212AFE7AEB2A15
:106E0000007B29195E235621D535CD5821D6019F07
:106E1000F52AFE7AEB2A007B29195E235621DB3501
:106E2000CD5821D6019FC1B01FD2476E11F47B21EE
:106E3000E235CDC32111F67B21E435CDC32111F21A
:106E40007B21E635CDC3212AFE7AEB2A007B291966
:106E50005E235621E835CD5821C2806E21EE35CD16
:106E6000EC102AC47BCD651A21F135CD9C1E21057D
:106E700036CDEC102AC67BCD651A210836CD9C1E76
:106E80002AFE7AEB2A007B29195E2356211A36CD79
:106E90005821D6019FF52AFE7AEB2A007B29195E3C
:106EA0002356212136CD5821D6019FC1B01FD2C40F
:106EB0006E212836CDEC102A007B23CD651A212EB6
:106EC00036CD9C1EC9214236CDEC102AFE7BCD6505
:106ED0001A2A7A7BCDBA04CD06231145 36CD12216C
:106EE000CD9C1E215636CDEC102AC07BCD651A21D3
:106EF0005936CD9C1E215D36CDEC102AC07BCD6568
:106F00001A216036CD9C1E21000022C67AC3646F10
:106F10002A907BEB2AC67A29195E23562104002980
:106F2000195E2356EBCD8E14CDD804EB2A8E7B1937
:106F300019E52A907BEB2AC67A29195E235621048B
:106F400000029195E2356EBCD8E14CDD804EB2A8E82
:106F50007B19195E2356EB23EBE17323722AC67A61
:106F60002322C67A2A7A7B2BEB2AC67A7B957A9CD7
:106F70001FB2F2106F21000022127BC3EB702100C0
:106F800000022007C21000022C67AC3D3702A127B23
:106F9000CDBA04CD0623E52A907BEB2AC67A2919BF
:106FA0005E23562104002919 5E2356EBD1CD5821CA
:106FB000CAB66FC3CC702A127BCDBA04CD0623119A
:106FC0006A36CD1221EB217B36CD1221E52A007CD9
:106FD000CDBA04CD0623D1CD1221EB217E36CD12C0
:106FE00021E52A8E7BEB2A127B29195E23562A0083
:106FF0007C7B956F7A9C67CDBA04CD0623D1CD12E8
:1070000021EB218136CD122111027CCDC3212A90A2
:107010007BEB2AC67A29195E235621030029195EC3
:10702000235 62A027CEBCD1221EB218436CD12218E
:10703000E52A907BEB2AC67A29195E2356210200A5
:1070400029195E2356EBD1CD1221EB218736CD12C3
:1070500021E52A907BEB2AC67A29195E2356210561
:10706000000029195E2356EBD1CD1221EB218A36CDB2
:107070001221E52A907BEB2AC67A29195E23562134
:1070800006029195E2356EBD1CD1221EB218D3656
:10709000CD1221E52A907BEB2AC67A29195E235668
:1070A00021010029195E2356EBD1CD122111027C5A
:1070B000CDC3212194 36CDEC102AC07BCD651A2A90
:1070C000027CCD9C1E2A007C2322007C2AC67A23C7
:1070D00022C67A2A7A7B2BEB2AC67A7B957A9C1F6A
:1070E000B2F28D6F2A127B2322127BEB2A787B7DF2
:1070F000937C9A1FB4F27E6F219736CDEC102AC094
:107100007BCD651A219A36CD9C1E219E36CDEC1082
:107110002AC07BCD651A21A136CD9C1E21000022FC
:10712000127BC3487121AD36CDEC102AC07BCD65F2
:107130001A2A8A7BEB2A127B29195E2356EBCD9CF7
:107140001E2A127B2322127B2A727B2BEB2A127BB4
:107150007B957A9C1FB2F22571 21B036CDEC102AB6
:10716000C07BCD651A21B336CD9C1E2100002204C0
:107170007C21010022127BC3A8712A047CCDBA04B1
:107180002A887BEB2A127B29195E235621020029CB
:10719000195E2356EBCD8E14CD1E04CDD8042204E7
:1071A0007C2A127B2322127B2A707B2BEB2A127BF8
:1071B0007B957A9C1FB2F27A712A747B2922067C15
:1071C0002AEE7BCD8E14CDD80422087C2AEA7BCD12
:1071D0008E14CDD804220A7C2AEC7BCD8E14CDD817
:1071E0004220C7C21B736CDEC102AC07BCD651A69
:1071F00021BA36CD9C1E21000022127BC3DA722AEE
:107200008C7BEB2A127B29195E235621020029 1957
:107210005E2356EB11D67BCDC3212A127BEB2A0AC3
:107220007C7B956F7A9CB5C248722AD67BEB21C3D2
:1072300036CD1221E52A047CCDBA04CD0623D1CD6A
:1072400012211 1D67BCDC3212A127BEB2A087C7B2D
:10725000956F7A9CB5C276722AD67BEB21C636CD65
:107260001221E52A067CCDBA04CD0623D1CD122108
:1072700011D67BCDC3212A127BEB2A0C7C7B956F28
:107280007A9CB5C29D722AD67BEB21C936CD1221DC
:10729000EB2AF07BCD122111D67BCDC32121CC3638
:1072A000CDEC102AC07BCD651A2A8C7BEB2A127B91
:1072B00029195E235621010029195E2356EBCD9C26
:1072C0001E21CF36CDEC102AC07BCD651A2AD67B85
:1072D000CD9C1E2A127B2322127BEB2A787B7D9386
:1072E0007C9A1FB4F2FF7121D236CDEC102AC07BFC
:1072F000CD651A21D536CD9C1E21D936CDEC102A6C
:10730000C07BCD651A21DC36CD9C1E21000022 12E7
:107310007BC3457321E636CDEC102AC07BCD651AC0
:107320002A307BEB2A127B29195E235621010029 82
:10733000195E2356EB11E936CD1221CD9C1E2A127F
:107340007B2322127B2A2E7B2BEB2A127B7B957AC6
:107350009C1FB2F2147321FA36CDEC102AC07BCDFB
:10736000651A21FD36CD9C1E210137CDEC1021017F
:1073700000CD651A210437CD9C1E210E37CDEC10AF
:10738000210100CD651A211137CD9C1E2AEA7BCD43
:107390008E14CDD804EB2A8C7B19195E235621025A
:1073A0000029195E2356EB11EA7BCDC321211B373F
:1073B000CDEC10210100CD651A2AEA7BE5CD093F3D
```

:1073C000111E37CD1221EB212737CD1221E52A04DA
:1073D0007CCDBA04CD0623D1CD1221CD9C1E210136
:1073E000002212 7BC3D6742A887BEB2A127B2919D0
:1073F0005E2356210100 29195E2356EBCD4D222B29
:107400002B2B2B2B2B7C07D28474212C37CDEC100B
:10741000210100CD651A2A887BEB2A127B29195E8F
:10742000235621010029195E2356212F37CD122121
:10743000E5213337E52A887BEB2A127B29195E2365
:107440005621010029195E2356EBCD4D221106006D
:107450007B956F7A9C67CD1722D1CD1221EB213B12
:1074600037CD1221E52A887BEB2A127B29195E236E
:107470005621020029195E2356EBD1CD1221CD9C55
:107480001EC3CF74214437CDEC10210100CD651A05
:107490002A887BEB2A127B29195E23562101002989
:1074A000195E2356D5210600CD1722EB214737CD93
:1074B0001221E52A887BEB2A127B29195E235621AB
:1074C000020029195E2356EBD1CD1221CD9C1E2A34
:1074D000127B2322127B2A707B2BEB2A127B7B955B
:1074E0007A9C1FB2F2E773215237CDEC102AC07B91
:1074F000CD651A215537CD9C1E215937CDEC102171
:1075000000100CD651A215C37CD9C1E210000220EA2
:107510007C2A087CEB2A0A7C7B956F7A9CB5C22773
:10752000752A047C22107C2AEE7BCD8E14CD0804E3
:10753000EB2A8C7B19195E2356210200 29195E2340
:1075400056EB11EE7BCDC321216637CDEC10210126
:1075500000CD651A2AEE7BE5CDD93F116937CD12F2
:1075600021EB217237CD1221E52A107CCDBA04CD52
:107570000623D1CD1221EB217537CD1221E52A0644
:107580007CCDBA04CD0623D1CD1221CD9C1E21780D
:1075900037CDEC10210100CD651A217B37CD9C1E23
:1075A00021000022127BC3C275218837CDEC102147
:1075B0000100CD651A218B37CD9C1E2A127B232218
:1075C000127B2A747B2BEB2A127B7B957A9C1FB251
:1075D000F2A975219D37CDEC10210100CD651A214E
:1075E000A037CD9C1E21A437CDEC10210100CD6524
:1075F0001A21A737CD9C1E210000220E7C2A0C7C6C
:10760000EB2A0A7C7B956F7A9CB5C213762A047CA0
:1076100022107C2A0C7CEB2A087C7B956F7A9CB527
:10762000C22E762A107CEB2A067C1922107C2AECCA
:107630007BCD8E14CD0804EB2A8C7B19195E235692
:107640002102 0029195E2356EB11EC7BCDC32121C9
:10765000B137CDEC10210100CD651A2AEC7BE5CDC8
:10766000D93F11B437CD1221EB21BD37CD1221E521
:107670002A107CCDBA04CD0623D1CD1221EB21C036
:1076800037CD1221EB2AF07BCD1221CD9C1E21C3D8
:1076900037CDEC10210100CD651A2AF07B11C637D9
:1076A000CD1221CD9C1E21D637CDEC10210100CD6D
:1076B000651A2AF07BCD8E14210300CDBA04CD811A
:1076C00004CD062311D937CD1221CD9C1E21E937D7
:1076D000CDEC102AC07BCD651A21EC37CD9C1E2144
:1076E00000100221 27BC36E772A1E7BEB2A127B2984
:1076F000195E23562A407B19195E23567AB3C20DB0
:107700007711D67B21F037CDC321C3167711D67BF5
:1077100021F337CDC32121F537CDEC102AC07BCD25
:10772000651A2A1E7BEB2A127B29195E23562A1C16
:107730007B19195E23562AD67BEBCD1221EB21F85B
:1077400037CD1221E52A1E7BEB2A127B29195E23F5
:10775000562A427B19195E2356EBCDBA04CD062377
:10776000D1CD1221CD9C1E2A127B2322127BEB2A23
:10777000187B7D937C9A1FB4F2E87621013 8CDEC1A
:10778000102AC07BCD651A2A2E7BCDBA04CD0623E4
:10779000110438CD1221CD9C1E211038CDEC102AB1
:1077A000C07BCD651A2A767BCDBA04CD0623111 8BA
:1077B00038CD1221CD9C1E212F38CDEC102AC07B54
:1077C000CD651A2A767BCDBA04CD06231132 38CD89
:1077D0001221CD9C1E214538CDEC102AC07BCD65F1
:1077E0001A2A847B114838CD1221CD9C1EC9CD6840
:1077F0001FCD9D016E67202226223B20232061752C
:0000000000

TABLE XXXV

Object Code of ZAPDASM Compiler Program

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
:10010000C3FC5900275A41504441534D20947D006F
:1001100000A04040404040400008F8F8F8F8F82106
:1001200001FF22007ACD96012A0D01016400009C168
:10013000F9C50117010AB7C03D02221301EB2211D4
:1001400001C13600237D937C9ADA4201C5CD3D0280
:100150002101FF22007A0E0CCD0500221801 7DE658
:1001600030D6300E2D1EFFD4050021800007EB7C88A
:10017000047237EFE20C27D0105C8C371012B70E5B7
:10018000068 23E523CD6102220F01C1D17023 1A77C4
:10019000130DC28D01C92A047B22087BC9C300004C
:1001A000220E7BC9220A7BC92A0C7BC92A127BC971
:1001B0002A107B7DB4C8E5210400CD6102C1E5367B
:1001C00080233602237123 70E1C92A0A7B220C7B2B
:1001D0002A0E7B7CB5CAE401EB606922107B2A13EE
:1001E00001F9EBE9C50E09112C02CD0500D1D50EA0
:1001F00002CD0500C1580E02CD05001135020E09D1
:10020000CD0500F1F5CD1502E17DCD15020E021EE2
:1002100048CD0500C7F50F0F0F0FCD1E02F1E60FF9
:10022000C69027CE40270E025FC305000D0A455237
:10023000524F5220242041542050432024221B019D
:10024000444D360023360023EB210000221D012AF5
:100250000600EB7B9177237A9877211B0122150109
:10026000C93E01321A0111020019DAD302444D7D50
:10027000D6FD7CDE7FD2D30211FCFF192A1501DAEC
:1002800084020E042215015E23567BB2CACB02D52E
:10029000131 3EB5E23567B915F7A9857E1DA840261
:1002A0007BD6047ADE00D2BE02E5EB2A15011A776E
:1002B00023131A7713E11A7723131A7723C9E52337
:1002C00023732372E11971237023C9211A01352385
:1002D000CA8402014F4DC3CA012B462B4EEB2A158F
:1002E000017D937C9ADAEB02211B01221501 7E230A
:1002F000666FB4CA1B037B957A9CD2EB0205EB09DF
:100300007D937C9AE1EBC21B037E1223137E1223A2
:1003100018 7E23814F7E8847C321037D12137C12ED
:10032000182A1501E5D523235E235619D17D937C25
:100330009AE1D23F03732372EB2323712370C91A0E
:1003400077231 31A77237E8177237E8877C9EE3748
:10035000F5110000211B014E2346237E23666FF119
:10036000F5DA680319C36F037D937C9ADA7003EBA7
:10037000060697DB4C25703F1EBC9EBC121F8FF39C5
:10038000F9C5EB424BC3A109444D210200 39CDA16F
:100390009D1F9EBE921020039EB210A00394E239A
:1003A0004623EBCDA109EBD1F9EBE9CD8103C39223
:1003B0008424BE5CD7A09C1C9E5210400394 44D15
:1003C000CD7A09C1CD9208E1D1D1D1D1E9444DCD49
:1003D0007A0921020039444DC3C403210A0039447B
:1003E0004DCD7A0921020039444DCD9208E1D1D199
:1003F000D1D1C3C803CD8103CDAA05C121F8FF39BE
:10040000F9C5444DC38E09CD1104CDAA05C1C38ED3
:100410009444DCD7A0921040039444DE3E9CD2446
:1004200004C30A0421040039444DCD7A09D1C12105
:1004300080039F9C5444DC5EBE9CD8103CD80068F
:10044000C3FB03CD1104CD8006C30D04CD2404C3FA
:1004500004604CD8103CDA705C3FB03CD6404CDA7EE
:100460005C30D04E521060039444DC5CD7A09E1E7
:10047000C1E3E9CD1104C35E04CD8604CDA705E137
:10048000D1F9D5C30204210C0039444DE5CD7A09D8
:100490002106003944 4DE1E3E9CD8103CD7F07C327
:1004A000FB03CD6404CD7F07C30D04CD1104C3A5A8
:1004B00004CD8604CD7F07C37F04444DCD5608C3C9
:1004C000FB032102 0039444DCD7A09CDC20AEBC1AC
:1004D0002108 0039F9EBC5C921020039CDE904EB47
:1004E000C121080039F9EBC5C9444DC50A01010510
:1004F00007D2F704010905CD7A09C1CDAA05C3C207
:100500000A40000000000000050C00000000000091
:1005100050EBE122367BEBCD7A032A367BE52102D4
:100520000397EB7C8EE8077C9E1D17BE67F5FD521
:10053000E9D1C1E1E1E1D521000079B7C82BF82369
:1005400023C9211D7B0E07E5C51195322A397BCDC4
:100550001B0A110D1B197CE67F6722397BEB2148B2
:1005600001CD5B0A3E99C601272DF266^5C1E177F0
:10057000230DC247053E4032157BAF32147BCD0AB6
:100580000901257BC5CD8E09E1C37A030E0CCD058B
:100590000252A027BC2A30511257B0E9BCD0500F9
:1005A0002A287B22397BC93E80FEAF32387B3A1540
:1005B0007B57B7C2C205CD7A0921147B3A387BAE8E
:1005C00077C90AB7C8E67FBAC5D2DC0501257BCD5D
:1005D0008E09C1CD7A0921147BC3E60501257BE193
:1005E000CDA10921257B3A387BAE773A257BE67F82
:1005F0005721157B96CA2E06FE1001257BD27A095B
:100600007232367B0FD21306F5AFCDE708F1E67FE5
:10061000CA2E06111C7B6F260019EB473E08904F2F
:100620001A7713230DC22006712305C228063A2526
:100630007B21147BAEFA520611267BCDC209D2492A
:10064000063E01CDE708CD7107011C7BCD6A09C3C9
:100650005E07212C7BCD3F09111D7B21267B0107E5
:1006600099DA7706373E008896EB86EB27120D1352
:1006700023C26506C30A09EB2B3E008896C60027F5
:1006800077233E008896EB8627EB770D1323C282F3
:10069000063A257BE68032147BCD0A09211C7B7E3D
:1006A000FE50C249063A367BFE03DA49063600C9D7
:1006B00021157B7EB7C80AB7CA5108E6802BAE77F2
:1006C000230AE67FD64086F2D2060A87FA790736F1
:1006D0000C97703C51107077B32387B01267B21D0
:1006E0001D7B7E0203231DC2E20621267B7E0203C0
:1006F0002315C2ED06CDC8081E0F21167B71231DE0
:10070000C2FD0621167B22367BE17E23E5B7CA496E
:100710007F5E60FCA2B074711267B2A367BCDC586
:100720009D2270723343F05C21807F10F0F0F0F17
:10073000E60FCA490747112D7B2A367B1A8E277789
:100740001323CDC50905C2360721387B352A367BF0
:1007500023C20607C1CD0A09011C7BCD6A092124E9
:100760007B7EB7C8AF772B361006062B7705C26B9A
:1007700073A157B3C32157BF0014F46C3CA012175
:10078000147B0AE680AE770AE67FCA46085F237EBE
:10079000B7C893C641FA4C08773E103238 7B0360E5
:1007A0006922367BAF322D7B06FF111D7B2A367BFB
:1007B00043E9A96EB86EB27120E9913233E00898E
```

:1007C00096EB86EB271213233E008996EB86EB27E8
:1007D0001213233E008996EB86EB271213233E006B
:1007E0008996EB86EB271213233E008996EB86EB66
:1007F000271213233E008996EB86EB2712133E0047
:1008000089EB862777DAAA072A367BEBCDC2092344
:100810007ECE002777212D7B7E80773A387B3DCABC
:10082000340832387B010800CDCB08211D7BCDC8B0
:1008300008C3A807011C7BCDA109CD0A09011C7BB7
:10084000CD6A09C35E0701445AC3CA01D641F27991
:1008500007AF32157BC978E68032147BCA650897EA
:10086000914F9891473E4632157B211D7B11070021
:1008700072231DC2700869600E1029EB21217B06CE
:10088000037E8F27772305C28108EB0DC27A08C348
:100890000A0921157B0AB6C80AE6802BBEC2B70832
:1008A0000AE67F23BE3FC2810821070009CD3F09F8
:1008B000C821147B1FAE17DABD08AF3DC93E818742
:1008C000C971231DC2C108C90107000970545D1B0D
:1008D0001AAEE6F0AE0F0F0F0F771B2B0DC2D0082C
:1008E0007E8787878777C9211D7B111C7B0E074771
:1008F0001AAEE6F0AE0F0F0F0F1213230DC2F00861
:100900001AE6F0B00F0F0F0F12C93A237BFE10D07A
:10091000B7CA2409211C7B010800CDCB0821157B17
:1009200035F071C921237B11227B06071A772B1B17
:1009300005C22C097021157B3535F20A0970C901F1
:10094000237B0ABEC02B0B0ABEC02B0B0ABEC02BDA
:100950000B0ABEC02B0B0ABEC02B0B0ABEC02B0B52
:100960000ABEC90AC60527C370090AC650273E0039
:1009700002D0030ACE0027C370090AE6806F0AE698
:100980007F6722147B036069011D7BC3A5092A14BC
:100990007B7CB7C2980902C9B502211D7B03C3A5A0
:1009A000097E0223037E0223037E0223037E0223A9
:1009B000037E0223037E0223037E0223037E02239F
:1009C00003C9211D7B1A8E277713231A8E277713CD
:1009D000231A8E277713231A8E277713231A8E272D
:1009E0007713231A8E277713231A8E2777C92102AC
:1009F00000397EE67FFE41D2FD093600C9473E4DF3
:100A000090D83C470FE67F23B7CA130A3600233D30
:100A1000C20C0A780FD03EF0A677C97CBADA210A58
:100A2000EB444D21000078B7C42C0A792917D23243
:100A30000A192917D2380A192917D23E0A19291773
:100A4000D2440A192917D24A0A192917D2500A1969
:100A50002917D2560A192917D019C97CAAF5AAFC58
:100A6000950AEB7CB7FC950ACA9C0A06107AB7C2B5
:100A7000760AB3F2A80A78010000F52979174F78B1
:100A800017477993789ADA8E0A4779934F23F13D85
:100A9000C27A0AF1F097956F9C9567C90608656F51
:100AA000B2C2760AB3FA760A972917BBDAB10A936B
:100AB0002305C2A90A4FC3930AC1D1C5CD5B0A6001
:100AC00069C92100003A157BB7C8D641F83C4F06EA
:100AD0005511237BD5545D29291929780747D11A47
:100AE000D2E70A1BC3EB0A0F0F0F0FE60F856F8CBF
:100AF00095670DC2D40A3A147BB7C8AF956F9C9521
:100B000067C9444D21010078B1C8C5D5CD1B0AD1B4
:100B1000C10BC3070B11EB0FEB223C7BE122027AE6
:100B2000E122047AEBCDBA042A047AE52A027AE5B6
:100B3000C33A0B11EB0FEB223C7B2104003944 4DEF
:100B4000CD7A09C1D1F9D5C521237B22517B3A3E0B
:100B50007BB7CAED0DAF323F7B3A4E7BB7C26D0B10
:100B6000C1323E7BCDFF11014E4EC3CA013A5B7BC1
:100B7000FE23CAF70BFE24C28D0BCD5511FE24CAED
:100B8000EF0B3E24CDB2103A5B7BC3700BFE2AC242
:100B90009F0BCD5511FE2ACAEF0B3E2AC3840BFED4
:100BA0002EC2B70BCD5511FE233E2EC2840BAF32A1
:100BB000507B0E01C31F0CFE2DC2E00BCD5511FE64
:100BC00023CAD80BFE2E3E2DC2840B3E0132457B3C
:100BD000AF32507B4FC31F0C3E0132457BC3F70B36
:100BE000FE5CCC5511B7C4B210CD5511C3700B3299
:100BF000477B0E02C3FF0B3E2032477B0E000CCD1D
:100C00005511FE23CAFE0BFE2CC2140C3EFF324FC0
:100C10007BC3FE0B21507B71FE2E0E00C2300C3EBA
:100C2000FF323F7BCD5511FE23C2300C0CC3240C88
:100C300021417B710E00FE5EC2430CCD55110EFFAB
:100C4000C3360C21437B71FE2DC2540C3EFF32464D
:100C50007BCD55113E0E32387B015C7BCD8E093A3F
:100C6000157B4FB7C2900C32427B32447B110F0090
:100C700021167B72231DC2730C3A507BB7CA810CBC
:100C80003D32487B3A457BB73E20C4B210C36E0D5F
:100C90003A457BB7CA9D0CCDE210CDB2103A437BEA
:100CA000B721447B3600C2030D79D64047CAB70C42
:100CB000D2C60C2F3C77AF32427B473A507BB7CA43
:100CC000C90C04C3C90C32427B3A4F7BB7CAE10C52
:100CD000780E00FE04DADE0CD6030CC3D30C798048
:100CE000473A507B9032487BF22E0D3E25CDB21014
:100CF000AF324F7B32457B32467B015C7BCD7A093C
:100D0000C3FE0D3A507B32427B4779D64090773A0A
:100D1000457BEB21467BB6EB3E00C22B0DCDE210AE
:100D20003E00CA2B0D3421427B353C32487B3A428F
:100D30007B21417B86473A437BB7C2440D3A447BD3
:100D40004F78914778FE0ED26E0D01247B573F1FDE
:100D50003C0B3DC2510D7A0FDC63097A0FD46A094E
:100D600021247B7EB7CA6E0DCD5E07C3540C3A4872
:100D70007BB7C29C0D3A467B21457BB6C2D00DCDD8
:100D8000E210CAD00D3A427BB7C2EB0C3A507BFE60
:100D900002DAEB0C3E2DCDB210C3D00D473A477BA3
:100DA0004F57FE2ACAB00DFE24C2B00D0E241620E5
:100DB0003A467B21457BB6C2C10DCDE210CAC10D8A
:100DC0004F05CACC0D7ACDB210C3C10D79CDB2108A
:100DD0003A507BB7CA750EFE01C2630E3A457BB727
:100DE000C2630E3A147BB7C2750EC3630E3A157B0D
:100DF000B7C2FE0D3E20CDB2103E30C3B2103E0C45
:100E000032387B011D7BCD6A09CD5E07213E7B7E9A
:100E100032407B3600CDE210CDB2103A157BD64081
:100E200032447B21437B0600FE0DDA380E3CCA3784
:100E30000E773E01C33E0E04360021447B703242E1
:100E40007B2FC60F804F211D7BAF0D0DB623CA4AE5
:100E50000E0CE60FCA580E0C7932417B3D079F2FCE
:100E6000323F7B3A427B873E30CCB210C3750ECDD9
:100E70008A10CDB2103A387B3D21427B35B6F26FF5

:100E80000E3A427BCDA710AF324F7B213F7B7E0FC6
:100E90003E2EDCB2103A3E7B213F7B2FB6CADC0EE1
:100EA0003A437BB7C2BF0E3A447B473A417BB8D244
:100EB000B70E47AFC3B80E9032417B7BCDA7103A3A
:100EC000387BB7CAD60E21417B35FADC0ECD8A10AD
:100ED000CDB210C3BF0E3A417BCDA7103A437BB7CA
:100EE000CA190F3E45CDB21021447B3A3E7BB7C2B2
:100EF000F30E357EB70E20F2FE0E2F3C0E2D4779F5
:100F0000CDB210780E2F0CD60AF2060FC60A47791A
:100F1000CDB21078F630CDB2103A467BB7CA2A0F60
:100F2000CDE210CDB210AF32467B32457B3A3E7BEC
:100F3000B7C03A407B323E7BC911EB0FEB223C7BC2
:100F4000EB7CB5C24F0F3A3E7BB7C8E5C3900FE5C7
:100F50007EE67F57235E233A3E7BB7C2780F7AB393
:100F6000CA6E0F7E23E5CD0410E11BC35E0FE17C7A
:100F7000B5C87E07D0C3D9023A4D7BB7C28C0FC12A
:100F8000323E7BCDFF11014E53C3CA01224B7BEB96
:100F900022497B3A587BFE2FCAB40FFE21CAC30FE6
:100FA000FE26CACC0FFE5CCC5511B7C4B210CD558D
:100FB00011C3960FCD8D11CD5511B7CA7F0FFE2FDE
:100FC000C2B40FCD8D11CD5511C36E0FCD8211CA94
:100FD000C60FCD7911CDB210C3CC0FCD150BC3E424
:100FE0000FCD330B3A3E7BB7C03E2021007A344F01
:100FF0003A3B7BB7C2FD0F2A01002E0CE9590E05C2
:10100000C30500CD150BC30C10CD330BCD98113E8D
:101010000132007A3E0DCDEF0F3E0AC3EF0FCD1522
:10102000BC32710CD330B3A3E7BB7C03A007AD6BC
:1010300014C8D22F10F53E20CDEB0FF13CC2351075
:10104000C9CD390FC30C10CD390F3A3E7BB7CA2C2E
:1010500010C92A007A2600C93A007A95DA3510C8F4
:10106000E5CD0C10E13E0195C8C33510CD5810C335
:101070002C10CD5810C30C10213B7BBEC8F53A0094
:101080007A3DC40C10F1323B7BC921387B7E352A76
:1010900517B0F7ED29E102B22517BC3A2100F0FCB
:1010A0000F0FE60FF630C94705F83E30CDB210C33A
:1010B000A810CDD410FE30D83A4F7BB7C83A437B46
:1010C000B7C03A427BD603CAD210D603CAD210D6D2
:1010D00003C03E2CF5C5D5CDDE10D1C1F1C92A3CE7
:1010E0007BE93A147BB73E20C83E2DC9EB2A577BD8
:1010F0007CB5012A46C2CA01EB3EFF323E7B7EE64A
:101100007F47234E2322577B22597BEB6069225372
:101110007B22557B210001AFE23C2221126FFC329
:101120004B11FE2FCA4911FE26CA4911FE21CA4998
:1011300011FE5CC24B11130B78B1C24B11323E7BD6
:10114000CDFF1101554EC3CA012EFF130B78B1C25A
:101150001711224D7B2A557B7CB5C269112A537B1E
:1011600022557B2A577BC37211282557B2A597B30
:101170007E2322597B325B7BC92A4B7B7E23224B09
:101180007BC92A497B7CB5C82B22497BC9CD8211FA
:101190003E20C47911C3B21011EB0FEB223C7B212E
:1011A0003E7B3435C83421FF11E53A5B7BFE23C812
:1011B000FE2FC8FE21C8FE26C8FE24C2CC11CD5584
:1011C00011FE24C83E24CDB210C3AA11FE2AC2DCEF
:1011D00011CD5511FE2AC83E2AC3C611FE2DC2EFFD
:1011E00011CD5511FE23C8FE2EC83E2DC3C611FEDB
:1011F0005CCC5511B7C8CDB210CD5511C3AD112A75
:101200000577B2B2BEB21000022577BEBC36F0FEB9F
:1012100003A1801E630D63021FFFFD87BE60F8787EA
:101220008787F50E9CCD0500110E00197EE60F474D
:10123000F1B0770EA1CD05006F67C93A1801E6300D
:10124000D630D80E9FC305003E09213E0C213E0634
:101250002A01006FE9E57CB5CA711246234E23C30B
:101260006C12C5E54ECD4B12E1C1230B78B1C262C1
:1012700120E20CD4B12E1C30B16228B7B32857BE5
:101280003A1801E630D630D29812CD53140F2A0204
:101290007B2322027BD280120E0A11017ACD050037
:1012A0000E021E0DCD05000E021E0ACD05003E01E8
:1012B00032007A3A857BB7CA2C13AF328A7B32640C
:1012C0007B47573C4F5F21027A3A027AB7CA7F13B5
:1012D000CD5E137EFE20CAC912FE22CAF012CD8A4C
:1012E00013FE2CCA1713CD9613CD5E137EC3E112E5
:1012F0003EFF328A7BCD5E13CD8A137EFE22CA0A60
:1013000013CD9613CD5E13C3FB12CD5E137EFE226A
:10131000CA0113AF328A7BCDA5137EFE2CCA2613D9
:10132000CD5E13C31A131C1600C3C9122A8B7BCDC2
:10133000FC153A027A110000B7CA57136F26002332
:1013400023CD6102E5360023110 27A1A47041A7789
:10135000231305C24E13D12A8B7B732372C93A0221
:101360007A2304CA6813B8D0CDA5133A8A7BB72B69
:101370007EE1CA7A13FE22C27F133A857BBBC81175
:10138000B1130E09CD0500C38012E5D521657B168A
:101390000001971D1E1C97EE5C521027A06000977FD
:1013A000C1E10C14C9E5D521757B160019D172E194
:1013B000C9696D70726F7065722069 6E7075742086
:1013C0002D207265656E7465720D0A24E5CDFC15DD
:1013D000CD14167CB5E5CAEF13D52323CD6102D118
:1013E000C1E5702371231A77130B78B1C2E513D1CD
:1013F000E1732372C9E5CDFC15CD2F1478B1CA0A6B
:1014000014C5D521020009C3DC13E1772377C9E5B0
:10141000CD1416444DE1C3A214CD2F14C3A214E57C
:10142000CD1416444DE1C39C15CD2F14C39C15EB70
:101430002A067B444D2A087B7D917C98DA4714016B
:101440004F44E1E1C3CA0146234E23E50922087B4C
:10145000E1EBC9CD4E12C6FF9F676FC9CD4812F5AB
:101460004FCD4B12F16F2600C9CD48126F2600C92F
:101470007D327514DB006F2600C945E1D17B3283D4
:1014800014780300E96E2600C97DE1D112E9EBC1E1
:1014900021F8FF39F9C5D5131A4F13CDA214E1C3B2
:1014A000B1622917B3EAA328F7B79328E7BAF0E58
:1014B0008877230DC2B1142B0E0EE8AF328D7B32A9
:1014C000907BCDE615FE20CAC214FE2BCAD914FEAD
:1014D0002DC2DC143E8032907BCDE615FE30CAD999
:1014E000140600FE2EC208153A8D7B1FDA91152FC4
:1014F000328D7B79FE0EC24E15CDE615FE30C2E16F
:1015000143A907B3D32907BC3F914FE45CA5415C2
:10151000FE65CA5415CDF215D2221579FE0EC8C348
:1015200911547AFB1CA40150D3A8F7B07328F7BBB
:10153000D23C157887878787 12C340151AB0121BD3

:101540003A8D7B0FDA4E153A907B3C32907BCDE69C
:1015500015C3E11479FE0EC8CDE615FE20CA541558
:1015600047D62D5FCA6D15C60278C27015CDE61537
:101570000600CDF215DA911547CDE615CDF215DA54
:101580008A154F788787808781477BB7C2911590EE
:10159000473A907BC640802A917B77C9AF32937BD4
:1015A00079328E7BE5EB110000CDE615FE2BCACA21
:1015B00015FE2DC2CD153EFF32937BC3CA15EB2914
:1015C000444D2929094F060009EBCDE615CDF2154A
:1015D000D2BE153A937BB7CAE1157A2F577B2F5F9E
:1015E00013E1732372C93A8E7BB7C83D328E7B7E7E
:1015F00023C9FE30D8FE3A3FD8E60FC95E23562AEB
:101600000D017D937C9AEBDAD902C97CB5C87E07BF
:10161000DAD902C921647B4E0C71060021657B0971
:101620005E160021027A19EB21757B096E2600C92E
:101630002AE87BEBCD050022127BC92AE87B112129
:10164000001934C023C342160E0FC330160E13C345
:1016500030160E16C330160E10CD30163CC00143A6
:1016600045C3CA010E21CD3016C33B160E22CD3024
:1016700016C33B160E1AC305003A1801E630D630E1
:10168000D82AE87B11300019EBC374163A1801E62A
:1016900030D630DA9B167CB5C2D6160E19CD0500B1
:1016A000F50E0DCD050022127B570145583A180161
:1016B000E630D630DABB1614CACA010E0ED15ACDA6
:1016C000050022127B570145583A1801E630D63002
:1016D000D814CACA01C9EB0E25CD050022127B3CE5
:1016E000014558CACA01C92AE87BC3D902AF5E774F
:1016F0002356772A0D017D937C9AEBDAD902C97CB7
:10170000B5C87E07DAD902C921000022FF7B3E114D
:1017100032037CB77A1F577B1F5F21037C35CA4099
:10172000172AFF7BD22817097C1F677D1F6F22FFB6
:101730007B2A017C7C1F677D1F6F22017CC31317EE
:101740002A017CEB2AFF7B444DC92AE87B11390032
:1017500019C9CD4A1722EA7BEBC374161180002AFF
:10176000EA7B1922EA7BEBC3741601424E7CB5CAB0
:10177000CA013E80953E009CDACA01E53E07293D3C
:10178000C27E1701390009E5CD610222E87B1139DB
:1017900000060070231B7AB3C29317CDB517C10B97
:1017A0002AE87B0922EF7B22F17BE17D32F37BCD8E
:1017B000CA17C3521701EC7B2AE87B112400191EBB
:1017C0000A7E0203231DC2C117C90124002AE87B37
:1017D0000901EC7B1E0A0A7703231DC2D617C9C56F
:1017E000D5CDB517E1CD171811947B197E23B6011D
:1017F0004446C2CA01EB2AE87BEB722B73E122EC70
:101800007B3AF37B3DC2CA177CB5CACA1721EE7B6F
:101810007EF64077C3CA1722F47B297CB5CA271805
:101820003E28953E009CD0014E46E1C3CA017CB5DE
:10183000CA50197EE67FB7C25019E5237E23B7CA86
:101840004F1947EB2AE87B3A1801E630D630D2A888
:1018500018E5233E0B3620233DC25518E178FE03E0
:10186000DA7318131AFE3A1BC2731805051AE60F2D
:10187000771313230E08AF32267CCDFB1805CAA4BC
:1018800018DA8C180DC27A1805CAA4181AFE2E137D
:10189000C288180E03AF32267CCDFB1805CAA418E7

:1018A0000DC29918E1C3FF1622067C21087C220490
:1018B0007C78FE1ED24F191A77132305C2B7187011
:1018C0000E9811047CCD05007CB5C24F192AE87B27
:1018D000EB211A00197E21380019B7CAE31836FF28
:1018E000C3E4187721100019444D213000191E0857
:1018F0000A7723031DC2F018C3A4183A267C0FDA16
:1019000022191AFE2EC20F19230DC2081937C9FE5B
:101910002AC228193AFC7B0F3E2AD228193EFF32F0
:10192000267C363F2304B7C9FE60DA3419FE7BD229
:101930003419E65FFE3ACA4F19FE2ACA4F19FE3F14
:10194000CA4819772313B7C93AFC7B0FDA5719E154
:10195000014946E1C3CA013E3FC343192AEA7BEB72
:101960002AF17B7D934F7C9A4703EB161A72230B67
:1019700078B1C26D19C92AF17BEB2AEF7B237B95E5
:101980007A9CD822EF7BC932277CCD6A17E1D1C17E
:10199000E3E5CD0F17E1CD2E183A1801E630D63059
:1019A000DACD193A277C0FD2B6192AE87BEB21054C
:1019B00000197EF680773A277C0F0FD2CA192AE8E1
:1019C0007BEB210600197EF68077CD7916CD48167F
:1019D000FEFFCAEC192AE87B11210019AF5E7723BC
:1019E0005677EB22FD7BCD5C193EFFC9CDE7162A69
:1019F000F47B29E511947B19AF772377E111BE7B46
:101A0000195E23667CB3014F45CACA016BD1E93226
:101A1000277CCD6A17E1D1C1E3E5CD0F17E1CD2EFB
:101A200018CD7916CD4D163A1801E630D630DA4980
:101A30001A2AE87BEB213800197EB7CA491A210619
:101A400000197EF68077CD7916CD5216FEFFC25C66
:101A500019014D45C3CA01EBE1E3CD171801BE7B67
:101A600009732372C9CD171801947B095E23567A36
:101A7000B3014655CACA01EB22E87B2AF47B29014F
:101A8000BE7B095E2356EB22F67BCDB5172AEC7B95
:101A900022FA7B2102003922F87BC3521701EE7B28
:101AA0000AE6FBF680020707DABB1A3AF37B015218
:101AB000423DC20721015255C307217CB50149525D
:101AC000CA07212B444D2AEC7BEBCD08172AEA7B71
:101AD0007BE67F856F3E008C672BE57B177A175F6F
:101AE000791757D5CD9E1DD10121002AE87B0973B6
:101AF000237221EE7B7EE6FD77E122EF7BC3CA17DE
:101B0000C1D1C53A1801E6F0D630D2111B21000030
:101B1000C9E5EBCD651AE1E5CD9D1ACD7A1B0E2AFC
:101B2000CD3016B7D1C0D513EBCD9D1ACD7A1B0E93
:101B30002ACD3016B7D1C8E5EBCD9D1ACD7A1B0E54
:101B40002BCD3016E1C9C1D1C53A1801E6F0D63027
:101B5000D2571B210000C9E5EBCD651AE1E5CD9D0B
:101B60001ACD7A1B0E2BCD3016B7D1C013EBCD9DFD
:101B70001ACD7A1B0E2BCD3016C92AFD7BEB2AEA33
:101B80007B732372C9CD52172AE87BEB212E0019F3
:101B9000EB012100097E1223137E1221EE7B3E020F
:101BA000B6773AF37B32287CCD6416B7C2BA1B21D4
:101BB000287C35C8CD5C17C3A81B3AEE7BF61032E3
:101BC000EE7BC35C19CD7619D2D71BCD9E1DCD4AB5
:101BD0001722EF7BCD851B3AEE7B0F0FD4851B2A96
:101BE000EF7B7EFE1AC0C3FF1ECDC51BFE0AC02AB6
:101BF000EC7B7CB5CAE91B015245C30721CD651AB0

:101C0000CD7619D21A1C3AEE7BE610C2FF1ECD9E8D
:101C10001DCD4A1722EF7BCD851B3AEE7B0F0FD4EB
:101C2000851B2AEF7B6E2600E5CDCA17E1C9E50EBC
:101C30000021027AC5E5CDE91BFE20CA361CE1C1B0
:101C4000FE2CCA611CFE0DCA571C4779FE32CA34ED
:101C50001C0C7023C3341C2AEC7B7CB5C5CCC51B83
:101C6000C111027AE1C921000022297CFE0ACA8C36
:101C70001CCDE91BFE22CA8C1C21307C362C212D68
:101C80007C360021027A222E7CC3AF1C32307C21AC
:101C9000027A222E7CAF322D7C3A307CFE0AC2AC16
:101CA0001CCDC51BFE0AC2BB1CC3EB1CCDE91B210E
:101CB000307CBECAD61CFE0DCAE31C2A2E7C7723BC
:101CC000222E7C212D7C7E3C773CC2991CCD0A1DA6
:101CD000C38F1CCDE91BFE0DCAE31CFE2CC2D31C16
:101CE000C3EB1C2AEC7B7CB5CCC51BCD0A1D2A2975
:101CF0007C3A307CFE0AC07CB5C856235E7BB2CAF3
:101D0000061D1B732B722A297CC91100002A297C0D
:101D10007CB5CA191D56235E23E52A2D7C260019A1
:101D2000D5E52323CD6102222B7CD1722373C1D14F
:101D3000C3381D1A2377130B78B1C2331D3A2D7C9B
:101D4000B7CA501D4F11027A1A2377130DC2481DCE
:101D50002A297C7CB5C4D9022A2B7C22297CC9E59E
:101D6000CDED163E0ACD661CEBE1732372C3CA1794
:101D7000CD2E1CC39C15CD2E1CC3A214E5CDED1693
:101D80003E22CD661CEBE1732372C92AEC7B7CB545
:101D9000CACA17CDC51BFE0AC2931DC3CA1721EEBE
:101DA0007B7E0FD08777E682FE02015752CA072159
:101DB000F5CD52172AEF7BEB2AEA7B7B955F7A9C65
:101DC000577B077A173CF5CD6C16B7C2E61DCD5C84
:101DD00017F13DC2C61DCD5217F107D25C1921EE95
:101DE0007B3EFDA677C9CDCA172AF87BF92AF67B78
:101DF0007CB5014457CA0721E9473A3E7B0F78DAA0
:101E000051EFE20C8F52AEC7B7CB5CA1D1E2AFAE9
:101E10007B7CB5014552CA07212B22FA7BCD76196E
:101E2000D22C1ECD9E1D2AEA7B22EF7B3AEE7BE66A
:101E300082FE80C24A1ECD851B2AE87B0121000953
:101E40004E23460B702B712AEF7BF17721EE7B3E00
:101E500001B677C9D1EBE3D5CD651AE17DCD051E7D
:101E6000C3CA173A3E7B0FDA711E3E22E5CD051E2E
:101E7000E111051ECD3C0F3A3E7B0F3E22D4051EDC
:101E8000C3921E11F91DCD360BC3921E11F91DCD43
:101E9000180B3A3E7B0F3E2CD2051EC93A3E7B0FF3
:101EA000DAAA1E3E22E5CD051EE111051ECD3C0F2E
:101EB0003A3E7B0F3E22D4051EC3CB1E11F91DCD29
:101EC000360BC3CB1E11F91DCD180B3A3E7B11F911
:101ED0001D0FDC9B112AFA7B7CB5CAEF1E2B2BC38E
:101EE000EA1EE53E20CD051EE12B7CB5C2E21E3E7A
:101EF0000DCD051E3E0ACD051ECD9B11C3CA172A66
:101F0000E87BEB212E0019EB012100091A7723133E
:101F10001A772AEF7B2B22EF7B21EE7B7EE6FD7783
:101F2000CDCA172AF87BF92AF67B7CB5014546CA4B
:101F3000CA01E9CD1718E501947B09AF5E772356F6
:101F4000777AB3014355CA0E21EB22E87BCD5217B5
:101F5000CDB517CD9E1DCD5217CD5716E101BE7BD5
:101F600009AF772377C3E716210100C3811F1194BE
:101F70007BE529197E23666FB4E1C4331F2A317CC7
:101F80002322317C1114007B957A9CD26E1FC9CD1F
:101F9000171801947BE509AF5E772356777AB30172
:101FA0004455CA0E21EB22E87BCD5217CD5716CDF2
:101FB0007916CD4D16C35C1FEB2102003922F87B48
:101FC000E1E3D5E5210100CD6A17E1CD2E180E1110
:101FD000CD30163C014652C207212AE87B22337CD1
:101FE000210100CD6A17E1CD2E180E11CD30163C1F
:101FF000CA1E202AE87B01100009EB2A337C7E12DE
:1020000013230DC2FE1FCD79160E17CD3016CDE766
:10201000162A337C22E87BCDE71621FFFFC9CDE7E6
:10202000162A337C22E87BCDE716210000C9E52182
:102030000100CD6A173EFF32FC7BE1CD2E182AE865
:102040007B010C0009363F2323363F210000223557
:102050007C0E19CD05005FD52AE87B7EB7CA7C20AF
:102060003D5F0E0ECD050022127B570145583A18F0
:1020700001E630D630DA7C2014CACA010E1FCD0525
:1020800000E35D0E0ECD050022127B570145583A44
:102090001801E630D630DA9D2014CACA01E12323A4
:1020A000460505110400194EC50E11CD3016FEFF70
:1020B000CAF5200F0F0FE660C6102AEA7B4F060014
:1020C00009110000C179C5B7CADC2006087E23B615
:1020D00023CAD5201305C2CD20C3E92006107E23D4
:1020E000B7CAE5201305C2DE202A357C1922357CCB
:1020F0000E12C3AB20CDE716AF32FC7B2A357CC174
:1021000005C829C30021C92AF87BF9C3CA01E1C364
:10211000CA01D5E5CD8823E5C5EB5059CD8823E527
:10212000C5EB097C1FE6C0C24D21E52323CD61022A
:1021300022377CD1CD9623C1D1CD9E23C1D1CD9E56
:1021400023E1CDEC23E1CDEC232A377CC9210C001F
:1021500039F901534CC3CA01E5D57AB3CAA7217C2A
:10216000B5CA8121CD8823E5EB5059CD88237993A9
:102170005F789A57B3C2BD21D178B1CA8C21EB1ACE
:10218000BEC28C2113230B78B1C27F21D1E1F5D5DA
:10219000CDEC23E1CDEC23F1CAA121DAA321F68015
:1021A000C9AFC93E8187C9CD8823CA8C2137C38C6A
:1021B00021EBCD8823CA8C21373FC38C21E17A07DC
:1021C000C38C21EB4E234679B8C2CF2178BAC82BF2
:1021D000E5D5CDD023E17CB5CAE4217E07D46D23AE
:1021E0007EE67F77EBE1732372C9E5CD8823CAFAD7
:1021F000216E2600E3CDEC23E1C9014143E1C3CACE
:1022000001E5210300CD6102110100CD9623C171CA
:102210002B2BC92A0F01C9C1EBE1C57A0701535322
:10222000DACA01E5CD88237993789AD230225059C1
:10223000E5D5EB2323CD610222397CD1CD96234213
:102240004BD1CD9E23E1CDEC232A397CC97CB5C886
:10225000CD8823C52B2BCDEC23E1C9EBE1E37A0735
:10226000015353DACA01E5CD882379934F789A4711
:10227000DA912209E5D5EB2323CD6102223B7CD103
:10228000CD9623424BD1CD9E23E1CDEC232A3B7C3E
:10229000C9E17CB5C87E07D8C36D23444DE1D1E3C5
:1022A00078B2FAF5227AB3CAF5227CB5C87EE67F09
:1022B00023B62BC2BD22CDEC23210000C9E5C5CD3C

:1022C000082379934F789A47DAFB22031819D17937
:1022D00093789AD2D8225059E5D51313EBCD6102E9
:1022E000223D7CD1CD9623424BD1CD9E23E1CDEC36
:1022F000232A3D7CC9015353C3CA01210000223D5A
:102300007CE1C3ED22C9213E7B7E323F7CAF773238
:1023100027A113A23CD360B2A027A2600E52323CE
:10232000CD6102C1E578F6807723712311037ACD60
:102330009E23E13A3F7C323E7BC9FE20C821027ACF
:10234000345E16001977C97CB5C87E07D46D23E5C5
:10235000CD8823CA6B23161A1E617E93BAD26423DA
:102360007EE65F77230B78B1C25A23E1C9CD88237B
:10237000E5C521020009CD6102D1CD9623424BD1A2
:10238000E5CD9E23E12B2BC97CB5444DC87EE67F6D
:1023900047234E23B1C97AF68077237323C978B7D0
:1023A000CAAF23C50E40CDC82305C2A423C179B14D
:1023B000C8E603CAC123C54F1A7713230DC2B82339
:1023C000C179E6FCC81F1F4F1A7713231A7713230E
:1023D0001A7713231A7713230DC2C823C95E235615
:1023E0002A0D017D937C9AEBDAD902C97CB5C87EAF
:1023F0007DAD902C9EB210400039C1F5C50AFE0389
:10240000CA1F24FE04CA1A24D5E57E23666FCDC3F5
:1024100021E1D123231313C329240608C321240651
:1024200027E12231305C22124C103F13DC2FB2306
:10243000D1F9D56069E922407C5E23562A0D017DE1
:10244000937C9AEBD25124CDD9022A407CAF7723DA
:1024500077E1E37DFE03CA5E24FE04CA63243E02E4
:10246000C365243E0832457C21557C22737C2102C1
:1024700000394E234623090979324A7C11010001B3
:102480000000C3A62432427C2B7E2BE56E6723C559
:10249000CD1B0AEB2A737C7323722322737CE11910
:1024A000444DE13A427C3DC285242B7E2BE56E678C
:1024B00023C5CD1B0A3A457C5F1600CD1B0AC10916
:1024C00009224B7CC5CD6102224D7CEB2A4B7C1945
:1024D00022517CE12919224F7C2A4D7C2B462B4E20
:1024E0000B0B23233600230B78B1C2E424E17E23B7
:1024F000E5666F233A457C5F1600CD1B0AAF956FEA
:102500009C956722537C3A4A7CC3542532427C2AEC
:10251000737C2B562B5E22737CEBC337252A517CB0
:10252000EB2A537C1922517CEB2A4F7C2B722B73A4
:10253000224F7C2A437C2B22437C7CB5C21D25E1A3
:10254000237E23E5666F2329AF956F9C9567225301
:102550007C3A427C3DC20C25E12A4D7CEB2A407C32
:102560007323723A4A7CE1D1D13DC26825E9C92280
:10257000817CEBC1E122777CE1227B7CC5AF933E7D
:10258000009A014D50F2CA012A777CCD9626CAEAFC
:1025900025606922797C2A817C7995789C2B22752B
:1025A0007CDAEA252A7B7CCD9626EB210100CAED58
:1025B000256069227D7C1AFE5CC2BE252B13130B9D
:1025C00078B1C2B625227F7C2A757CC3D825E12349
:1025D000E5CDFC25E1DAED25E5EB2A7F7C19EB2A38
:1025E000797C7D937C9AF2CE25E1210000E52A7B5F
:1025F0007CCD8D262A777CCD8D26E1C922847CAFC7
:1026000032837C21020022867C2A847CEB2A797C1E
:102610007D937C9A3FD02A867CEB2A7B7C197ED6E0
:102620005C21837CB6C22D2636FFC33826CD4C26CE
:10263000D02A847C2322847C2A867C2322867CEBFD
:102640002A7D7C237D937C9AD20926C92A867CEB3D
:102650002A7B7C19462A777CEB2A847C23194E211D
:10266000837C7EB7C2852678FE3FCA8926FE23C2B8
:10267000782679D630FE0AC9FE21C2872679E65F20
:10268000D641FE1BC9360078B937C83FC97CB5C8EA
:102690007E07DAD902C97CB5444DC87EE67F472360
:1026A0004E23B1C97ACD96012A0D0101640009C1FA
:1026B000F9C50117010AB7C03D02221301EB22112F
:1026C00001C13600237D937C9ADA4201C5CD3D02D8
:1026D0002101FF22007A0E0CCD05002218017DE6B3
:1026E00030D6300E2D1EFFD405002180007EB7C8E5
:1026F00047237EFE20C27D0105C8C371012B70E512
:102700006823E50002313200014300024243000227
:102710004E4100024E4100024E4100014E00015860
:102720000002424300025642000245410002535655
:102730000001590001490002494300024E410002D4
:102740004E4100024E4100014E0001590002494332
:1027500000025649000245410002535600015900 4B
:1027600001530002534300024E4100024E41000259
:102770004E4100014E00015A0002534300024253F1
:102780000002454100025342000159000156000277
:10279000564200024541000253560002 4E410001DC
:1027A0005900014E000256490002454100025356AD
:1027B00000024E4100015900014200024253000252
:1027C00045410002534200024541000159000141C8
:1027D00000024541000 24E4100024E4100024E41BE
:1027E00000014E00015000024943000256420002 1F
:1027F0005649000242530001590001570002494363
:1028000000025642000242530002454100015900B5
:102810000231300002424300015900013000013909
:102820000002425300014E0001240000000245411 5
:1028300000014E00014000000002494300015900 20
:10284000013000013900025342000 14E00025E24B3
:10285000000000002534300014E000127000000267
:10286000535600014E00025E23000000025649004C
:10287000014E000126000000025642 00014E0001F8
:1028800023000000024243000 14E00012D00000021
:1028900003313936000F4142535F4E554C4C2020D6
:1028A00020202020200001310001300001300001F3
:1028B00030000820202020202020200010 20202070
:1028C00020202020202020202020202020000F4118
:1028D0005050454E445F52454320202020200001A7
:1028E000320001300001320001320008584220203D
:1028F0002020202000010312D32202020202020D8
:10290000202020202020000F4252414E43485F43A8
:10291000415345202020200001320001310001 34C4
:102920000001340008584258582020202000103 15F
:102930002D332D342D322020202020202020200057
:102940000F4252414E43485F474F544F20202020B2
:102950000001310001310001310001300008412047
:102960002020202020200010312020202020202086
:102970002020202020202020000F4252414E43489A

```
:1029800005F49462020202020200001310001320034
:10299000013300013200084E58412020202020200041
:1029A00010322D312D3320202020202020202020E7
:1029B00020000F4252414E43485F494E4445582043
:1029C00020200001310001330001310001310008F5
:1029D00058202020202020200010312020202020DE
:1029E00020202020202020202020000F4252414E75
:1029F00043485F52414E47452020200001320001EC
:102A00003200013400013400085842585820202078
:102A1000200010312D332D342D3220202020202075
:102A2000202020000F4252414E43485F524F4D201C
:102A3000202020200001320001330001310001304C
:102A400000084120202020202020001031202020BC
:102A5000202020202020202020202020000F425253
:102A6000414E43485F53574954434820200001 31A9
:102A70000001340001330001330008585A5A202065
:102A8000202020001031 2D322D3320202020202026
:102A90002020202020000F42524B5F504F494E54BF
:102AA00020202020202000013200013400013100CC
:102AB0000130000843202020202020200010312059
:102AC0002020202020202020202020202020000F37
:102AD00043414C435F425954452020202020200090
:102AE00001310001350001340001340008565858 06
:102AF000582020202000 10322D332D342D3120205D
:102B0000202020202020200000F43414C435F494ECD
:102B10005420202020202020000131000136000117
:102B20003400013400084E5958592020202000104C
:102B3000322D332D342D312020202020202020202024
:102B4000000F43414C4C20202020202020202020201A
:102B500020000131000137000132000130000 8413E
:102B600043575757575757000 10312D322D332D34B7
:102B70002D352D362D372D382000 0F4341545F4120
:102B80004343554D2020202020200001310001 38F2
:102B90000001320001320008425820202020202 06D
:102BA0000010322D31202020202020202020202025
:102BB0002020000F4341545F425954452020202 0DB
:102BC000202020000131000139000132000132 00D3
:102BD0000008425620202020200010322D312020B5
:102BE00020202020202020202020200000F4341549E
:102BF0005F4348415220202020202020000131 0046
:102C000002313000013200013100084243202020 0F
:102C100020202000 10312D322020202020202020B4
:102C200020202020200000F4341545F434C4F434B52
:102C30002020202020202000013200013500013200 38
:102C40000131000842582020202020200010312D82
:102C50003220202020202020202020202020000F93
:102C60004341545F464C44202020202020202000 57
:102C700001320001360001340001340008424258 9C
:102C800058202020200010332D342D312D322020CB
:102C90002020202020202000 0F4341545F4C52432D
:102CA0002020202020202020000132000137000 1B8
:102CB0003300013200084258582020202020001004
:102CC000322D312D3320202020202020202020202 0B4
:102CD000000F4341545F5245434F524420202020 6F
:102CE0002000013100023131000133000133000 8BE
:102CF0004258582020202020 0010322D332D312022
:102D00002020202020202020202020000F4341545F3D
:102D1000534551202020202020202020000132000196
:102D20003800013200013200084258202020202020C3
:102D3000200010322D312020202020202020202093
:102D4000202020000F4341545F535452434F4E20E4
:102D500020202020000131000231320001320001 28
:102D6000310008425A2020202020200010312D322E
:102D700020202020202020202020202020000F4361
:102D800041545F5743432020202020202020000171
:102D9000320001390001320001320008425820207F
:102DA000202020200010322D312020202020202023
:102DB000202020202020000F43484B5F41434355F3
:102DC0004D2020202020200001320002313000015F
:102DD00034000132000858585A41202020200010A9
:102DE000312D332D322D342020202020202020202072
:102DF000000F43484B5F414E535F50484F4E4520B4
:102E000020000132000231310001320001310008 9E
:102E100058412020202020200010312D3220202059
:102E200020202020202020202020000F43484B5F1E
:102E3000425954452020202020202000013100024A
:102E400031330001340001320008565856412020 29
:102E5000202000 10312D332D322D342020202020 31
:102E60002020202000 0F43484B5F43484152202040
:102E700020202020200001310002313400013400E4
:102E8000013100085658434120202020 0010312DE8
:102E9000322D332D3420202020202020202020000F10
:102EA00043484B5F434B425954452020202020008B
:102EB0000132000231320001320001310008584174
:102EC0002020202020200010312D32202020202002
:102ED00020202020202020200000F43484B5F434C1F
:102EE0004F434B2020202020202000013200023133AC
:102EF0000001340001310008585 85A4120202020 98
:102F00000010332D312D322D342020202020202080
:102F10002020000F43484B5F4449414C5F444F4ED3
:102F2000452020000131000231350001310001301F
:102F300000084120202020202020001031202020C7
:102F4000202020202020202020202020000F434867
:102F50004B5F454E445F434F444520202000013 1E4
:102F6000000231360001340001330008585859413D
:102F7000202020200010312D322D332D3420202010
:102F80002020202020200 00F43484B5F46494C451D
:102F900053495A452020200001320002313400 01FB
:102FA000340001320008585858412020202000 10D9
:102FB000312D332D322D3420202020202020202020A0
:102FC000000F43484B5F494E53524345202020 2079
:102FD00020000131000231370001320001300008C9
:102FE00058412020202020200010312D3220202088
:102FF00020202020202020202020000F43484B5F4D
:10300000494E54202020202020202020000131 0002A1
:10301000313800013400013200084E584E41202062
:103020002020200010312D332D322D34202020205F
:1030300020202020000F43484B5F494E54434F4E01
```

```
:103040002020202020000131000231390001340000D
:10305000013100084E5849412020202000010312D18
:1030600322D332D342020202020202020202000F3E
:103070004348485F4A4F425F444F4E4520202000005B
:1030800001310002323000013200013100085841A4
:10309000202020202020000103122D32202020202030
:1030A000202020202020200000F434848B5F4C454B
:1030B0004E4754482020202020000131000232 31A8
:1030C0000000134000132000842585841202020200D
:1030D000000103320312D322D342020202020200AF
:1030E0002020000F434848B5F4C524320202020200B
:1030F0002020200001320002313500013400013 36C
:10310000000084258584120202020000103 22D332D35
:1031100003 12D342020202020202020000F434863
:103120004B5F4C55484E3130202020202000013 28A
:1031300000023136000133000132000842584120BC
:103140002020202000010322D312D332020202020 5F
:10315000202020202020000F434848B5F4D454D4C40
:103160004F4B202020202000013200023137000187
:103170003100013000084120202020202020000108 4
:1031800031202020202020202020202020202020 2E
:10319000000F434848B5F4D4F4445202020202020 06
:1031A0002000013200023138000133000131000 8F3
:1031B00058584120202020200001032 2D312D33205E
:1031C0002020202020202020202000 0F434848B5F7B
:1031D0005041535353574F524420202020000132 0002E7
:1031E0003139000133000132000858 5A41202020B3
:1031F00020200010312D322D332020202020202 0AF
:10320000202020200000F43484B5F5052545F455808
:103210004953542020000131000232320001 3100B4
:1032200013000084120202020202020 0001031 20E3
:10323000202020202020202020202020202 0000FBF
:10324000434848B5F5052545F5244592020202000 85
:103250000131000232330001310001300008412009
:10326000202020202020000103120202020202020 7D
:10327000202020202020200000F434848B5F534572
:1032800051202020202020202000013200023230 56
:1032900000013400013200085858 5A41202020 20F3
:1032A000000103 12D332D322D34202020202020 DD
:1032B0002020000F434848B5F54454C434F5F52441E
:1032C0005920200001310002323400013100013060
:1032D0000000084120202020202020000103120202024
:1032E000202020202020202020202020000F4348C4
:1032F0004B5F54494D454F55542020202000013148
:103300000000232350001310001300008412020204 8
:1033100020202020000103120202020202020202020 CC
:103320002020202020200000F434848B5F5A4150446A
:1033300020202020202020000132000232310001 14
:103340003100013000084120202020202020200010E2
:1033500031202020202020202020202020202020 205C
:10336000000F43484E475F42595445202020202 0FB
:103370002000013200023232000135000135000820
:1033800042585858 5A202020000103 22D332D342D09
:103390003 52D31202020202020200000F43484E478B
:1033A6005F535452494E4720202020200001 32000232
:1033B0003233000135000134000842585858 5A5A206F
:1033C0002020000103 22D332D352D312D342020209A
:1033D00020202020000F434E5652545F42324920 95
:1033E000202020202000013100023236000132006E
:1033F00000132000084E5620202020202000010312DC0
:1034000032202020202020202020202020200000FD8
:10341000434E5652545F42325354522020202000D3
:1034200001310002323700013300013200084258F6
:103430005620202020200010332D312D32202020 36
:1034400020202020202020000F434E5652545F81
:10345000493242202020202020000131000232385 1
:103460000001320001320008564E20202020202 08A
:10347000000103 12D3220202020202020202020204C
:103480002020000F434E5652545F49325354522 06D
:10349000202020000131000232390001330001 32C6
:1034A00000000842584E20202020200010332D312D8E
:1034B0003220202020202020202020202000 0F434EDA
:1034C0005652545F5354523242202020200001318 2
:1034D00000023330000133000132000856584220 08
:1034E0002020202000010312D332D3220202020208C
:1034F00020202020202000 0F434E5652545F53546A
:10350000523249202020200001310002333100 01D5
:1035100033000132000084E5842202020202000 10A5
:10352000312D332D3220202020202020202020204B
:1035300000 0F434F4D505F4259544520202020201A
:1035400020000132000232340001350001330008 4E
:1035500042585856412020200010322D342D312D54
:10356000332D352020202020202000 0F434F4D50A8
:103570005F43484152202020202020000132000 2D9
:103580003235000135000132000842585843412 0CD
:10359000202000103 22D312D332D342D35202020C8
:1035A000202020200000F434F4D505F464C442020E8
:1035B000202020202000013200023236000137 0096
:1035C00000013500084258584258584120001032 2D09
:1035D000352D362D312D342D332D372020200 00F61
:1035E000434F4D505F535452434F4E2020202000F4
:1035F0000001320002323700013500013300084258 21
:10360000585A4120202000010322D312D332D342DD9
:1036100035202020202020200000F434F50595F42AA
:103620005954452020202020200001310002333 24F
:1036300000013300013300084258562020202020 8A
:103640000010322D332D3120202020202020202020 5A
:10365000202000 0F434F50595F4348415220202003
:10366000202020000131000233330001330001 32F9
:10367000000084258432020202020200010322D312DF8
:10368000332020202020202020202020000F434F06
:103690005 0595F464C4420202020202020000 13239
:1036A000000023238000135000135000842584258 06
:1036B0005820202000010322D342D352D312D33206F
:1036C00020202020202020000F434F50595F5354529 8
:1036D000434F4E20202020200001310002333400 01EE
:1036E00033000133000842585A2020202020000 10C7
:1036F000322D332D3120202020202020202020207A
```

```
:10370000000F4445435F414343554D202020202076
:103710002000013100023335000132000131000080
:1037200058412020202020200010312D3220202040
:10373000202020202020202020200000F4445435F0F
:1037400042595445202020202020000131000231
:10375000333600013200013100085641202020207C
:1037600020200010312D3220202020202020202059
:1037700020202020000F4445435F494E5420202044
:1037800020202020200001310002333700013200C8
:1037900001310004E412020202020200010312D32
:1037A00032202020202020202020202020200000F38
:1037B0004445435F5245434E554D2020202020200074
:1037C0000131000233380001310001300008412086
:1037D00020202020202000103120202020202020008
:1037E0002020202020202020200000F4445435F534507
:1037F000512020202020202020000131000233339D8
:1038000000013200013100085841202020202020F2
:1038100000010312D322020202020202020202020A8
:1038200020200000F44454C4554455F464C44202021
:10383000202020000132000232390001330001332 0
:10384000000084258582020202020200010322D332D0F
:1038500031202020202020202020202020200000F44453F
:1038600004C4554455F52454320202020200000013123
:103870000000234300013200013200085858202084
:1038800020202020200010312D3220202020202020 38
:103890002020202020200000F444953504C41595FE4
:1038A00042414348202020000131000234310001 0D
:1038B000300001300008202020202020202000108F
:1038C00020202020202020202020202020202020 20F8
:1038D000000F444953504C41595F434C4541522 0DD
:1038E00020000131000234320001300001300008B4
:1038F000202020202020202000010202020202020 F8
:10390000202020202020202020200000F44495350 38
:1039100004C41595F464C4420202020200001310002D8
:103920003433000133000133000842585820 20206E
:103930002020001 0322D332D312020202020202067
:10394000202020200000F444953504C41595F5052D1
:10395000 4F4D5054200001310002343400013100 39
:1039600001310008582020202020202020001031208 4
:103970002020202020202020202020202020200000F78
:1039800 04449 53504C41595F535452494E472000CB
:10399000013100023435000131000131000085A20A4
:1039A0002020202020202000103120202020202020 36
:1039B000202020202020202000 0F444F4E45202092
:1039C000202020202020202020200001310002343639
:1039D0000000130000130000820202020202020207D
:1039E0000001030202020202020202020202020 20F7
:1039F00020200000F444F5F414354494F4E2020206 8
:103A000020200001310002343700013100013153
:103A1000000085820202020202020200010312 02020C5
:103A200020202020202020202020202020200000F444F74
:103A30005F424C445F535452494E472020000131AD
:103A400000023438000133000133000842584320 9B
:103A500020202020200010322D312D3120202020202046
```

```
:103A600020202020202020200000F444F5F435F43414C23
:103A70004C202020202020200001310002343900019 8
:103A80003200013000084143505050505050001057
:103A9000312D322D332D342D352D362D372D382027
:103AA000000F444F5F444154415F454E54525920EA
:103AB0002000013100023530000130000130000 8E3
:103AC00020202020202020200001020202020202026
:103AD000202020202020202020200000F444F5F4461
:103AE000049414C2020202020202020200001320002CB
:103AF0003330000132000131000085A41202020 20D8
:103B00002020001 0312D322020202020202020 2085
:103B100020202020000F444F5F4F5053595320 2046
:103B20002020202020200001320002333100013200 29
:103B300001310008584350505050505000010312D62
:103B4000322D332D342D352D362D372D3820000FC5
:103B5000444F5F52454 3414C4C2020202020200000
:103B60000132000233320001320001320008585 89D
:103B7000202020202020200010312D3220202020 2045
:103B80002020202020202020200000F444F5F53544F3E
:103B900052452020202020202000013200023333 13
:103BA0000000132000132000858582020202020 2037
:103BB00000010312D32202020202020202020202005
:103BC0002020000F454E445F4F465F46494C45203C
:103BD0002020200001320002333400013100013185
:103BE0000000085820202020202020001031202020F4
:103BF000202020202020202020202020200000F45529F
:103C0000525F4245545502020202020200001 31D5
:103C100000023531000130000130000820202020 52
:103C20002020202000102020202020202020202020C4
:103C30002020202020200000F45585452414354 5F3B
:103C4000425954452020200001310002353200 0144
:103C50003300013300085642582020202020001055
:103C6000332D312D3220202020202020202020200 4
:103C70000000F46455443485F4259544520202020B8
:103C8000200001310002353300013200013200080A
:103C9000564E2020202020200010312D32202020C0
:103CA0002020202020202020202020200000F46455443A3
:103CB00485F494E54202020202020000131000 27E
:103CC0003534000132000132000084E4E20202020 01
:103CD00020200010312D32202020202020202020E4
:103CE00020202020000F46494E444E54485F425940
:103CF000544520202000013200023335000137 00F6
:103D0000013600085642585856584120001033 2DAD
:103D1000342D362D312D352D322D37202020000F1A
:103D200046494E444E54485F43484152202020 00AB
:103D300001320002333600013700013500085642D7
:103D400058584358412000103 32D342D362D312D35
:103D5000322D352D37202020000F46494E445F423A
:103D6000595445202020202020000132000233 3702
:103D700000013600013500085642585856412020AF
:103D800000010332D342D312D352D322D36202020AD
:103D900020200000F46494E445F43484152202020D6
:103DA000202020000132000233380001360001 34A7
:103DB000000085642585843412020001033 2D342D1E
```

```
:103DC000312D322D352D3620202020000F464960
:103DD0004E445F464C44202020202020200013209
:103DE00000023339000138000137000856425858A4
:103DF0004258584100103320342D362D372D312D9A
:103E0000322D352D3820000F46494E445F52454338
:103E10004F5244202020200001320002343000001A3
:103E2000370001360008565858425858412000010B3
:103E3000322D332D352D362D312D342D37202020A8
:103E400000F46494E445F535452434F4E202020AA
:103E50002000013200023431000136000134000834
:103E600056425858534120200010332D342D312D07
:103E7000322D352D362020202020000F4745545F5D
:103E800041434355 4D20202020202000013100002D5
:103E900035350001330001320008425841202020 0E
:103EA00020200010322D312D3320202020202020F2
:103EB0002020200000F4745545F41444452455381
:103EC000532020202000013200023432000132 0051
:103ED000013200084E572020202020200010312DD4
:103EE0003220202020202020202020202020000FF1
:103EF0004745545F434B425954452020202020 0021
:103F00000132000234330001320001320008 4E5001
:103F1000202020202020001032 2D3120202020 20A1
:103F200020202020202020000F4745545F434CB4
:103F30004F434B2020202020200001310002353645
:103F400000013200013100084258202020202020AA
:103F50000010312D32202020202020202020202061
:103F60002020000F4745545F4445465245432020DA
:103F7000202020000131000235370001310001 31DD
:103F800000000842202020202020200010312020 2066
:103F90002020202020202020202020202020000F474506
:103FA000545F44455649434520202020200000131DC
:103FB000000235380001320001320008565820 2036
:103FC00020202020001032 2D312020202020 20F1
:103FD0002020202020000F4745545F45444954AD
:103FE00020202020202020200001310002353900014E
:103FF000320001320008585820202020202000010D4
:10400000312D3220202020202020202020202020 2080
:104010000000F4745545F454E445F434F44452020C1
:104020002000013100023630000132000131000869
:104030004E58202020202020001031 2D3220202020 1A
:104040002020202020202020202020000F4745545FE2
:1040500046494C455F53495A45202000013200 0231
:104060003434000132000132000856582020202020 4C
:1040700020200010322D3120202020202020202040
:104080002020202000F4745545F4C454E47544 8A0
:104090002020202020000131000236310001320 0B2
:1040A000013200085642202020202020 0010312D0F
:1040B00032202020202020202020202020202000 0F1F
:1040C0004745545F4C4F4F4B55502020202020 0037
:1040D00001320002343500013400013400085656 24
:1040E00058582020202020 0010312D322D332D34201F
:1040F000202020202020202020000F4745545F4C52D4
:1041000043202020202020202000001320002343 6CD
:10411000000136000135000 84E58425858592020F9
:104120000000103 42D352D362D312D332D3220202089
:1041300020 20000F4745545F4D454D53495A4520B7
:10414000202020000132000234370001330001 3307
:1041500000008565858202020202000 10322D332DE2
:104160003120202020202020202020202020000F474523
:10417000545F4D4F44452020202020202020000 13254
:1041800000023438000131000131000856202020 9F
:10419000202020200010312020202020202020203E
:1041A00020202020200000F4745545F5245434FD8
:1041B00052442020202020000131000236320001 2C
:1041C000330001330008425858202020202020 0010DE
:1041D000322D332D31202020202020202020202020 8F
:1041E00000000F4745545F534551202020202020 20B8
:1041F00020000131000236330001320001320008 94
:104200004258202020202020 0010322D312020 2054
:1042100020202020202020202020000F48414C5426
:104220002020202020202020202020 0001310002FA
:1042300036340001300001300008202020202020EA
:104240002020001030202020202020202020202020 8E
:104250002020202020000F494E435F41434354 4D200D
:1042600020202020200001310002363500013100DD
:10427000013100085820202020202020 001031206B
:10428000202020202020202020202020202020 0000F5F
:10429000494E435F4259544520202020202020 00D1
:1042A00001310002363600013100013100085620 8C
:1042B0002020202020200010312020202020202020 1D
:1042C00020202020202020000F494E435F494E0F
:1042D00054202020202020200001310002363 7E9
:1042E000000013100013100084E20202020202020 34
:1042F000001031202020202020202020202020 20DD
:10430000202000 0F494E435F5245434E554D20201B
:10431000202020000131000236380001300001 3039
:1043200000008202020202020202000102020 2020F5
:1043300020202020202020202020202020000F494E57
:10434000435F534551202020202020202020000131B0
:104350000000236390001320001310008584120 20A6
:104360002020202000103 12D322020202020202 04D
:104370002020202020000F494E49545F41434314
:10438000554D202020202020000131000237300001 4F
:104390003100013100085820202020202020 00106A
:1043A00031202020202020202020202020202020 FC
:1043B000000F494E49545F425954452020202020 87
:1043C000200001310002373100013100013100 08C5
:1043D00056202020202020200010312020202020 C6
:1043E0002020202020202020202000 0F494E49544A
:1043F0005F434C4F434B2020202020 000132000 21D
:1044000034390001300001300008202020202020 15
:1044100020200010302020202020202020202020 BC
:10442000202020200000F494E49545F46494C45202A
:104430002020202020000132000235300001310010
:1044400001310008582020202020202000103120 99
:10445000202020202020202020202020202020000F8D
:10446000494E49545F494E542020202020202000EE
:1044700000131000237320001310001310008 4E20C5
```

```
:10448000202020202020001031202020202020204B
:104490002020202020202020000F494E49545F4D2D
:1044A000454D4F5259202020200001320002353165
:1044B00000013100013000085320202020202020 5E
:1044C00000103120202020202020202020202020 0B
:1044D0002020000F494E49545F5245434F5244201B
:1044E0002020200001310002373300013200013268
:1044F000000858582020202020200010312D322084
:10450000202020202020202020202020000F494E85
:1045100049545F53455120202020202020000132A3
:1045200000023532000131000131000858202020FE
:1045300020202020001031202020202020202020 9A
:10454000202020202020000F494E49545F53545210
:10455000494E47202020200001310002373400015D
:1045600031000131000842202020202020200010AE
:10457000312020202020202020202020202020202A
:10458000000F494E4C494E455F4F4E2020202020C1
:1045900020000131000237350001310001300008F0
:1045A000412020202020200010312020202020202009
:1045B00020202020202020202020000F494E505570
:1045C000545F45444954202020202000013200023D
:1045D0003533000131000130000841202020202027
:1045E0002020001031202020202020202020202020EA
:1045F00020202020000F494E5055545F4B45592034
:104600002020202020000131000237360001320036
:104610000001310008594120202020200010312D98
:104620003220202020202020202020202020000FA9
:10463000494E5352545F4259544520202020200 0B7
:1046400001320002353400013300013300084258C2
:10465000562020202020 0010322D332D3120202004
:104660002020202020202020000F494E5352545F4C
:1046700043484152202020202000013100023737DA
:10468000000133000132000842584320202020203E
:104690000010322D312D33202020202020202020FA
:1046A0002020000F494E5352545F464C4420202096
:1046B000202020000132000235350001350001358F
:1046C000000842584258582020200010322D342D26
:1046D000352D312D3320202020202020000F494E61
:1046E0005352545F535452434F4E20202000013206
:1046F0000002353600013300013200084258532 0D1
:10470000202020200010322D312D33202020202089
:10471000202020202020000F4C4F41445F41434384
:10472000554D2020202020000132000235370001A5
:104730003200013100085853202020202020001092
:10474000312D3220202020202020202020202020 39
:10475000000F4C4F41445F423253545220202020DE
:104760002000013100023738000133000131000818
:1047700042584320202020200010312D322D33209C
:1047800020202020202020202020000F4C4F4144BA
:104790005F425954452020202020200001310002 92
:1047A000373900013200013100085643202020201 3
:1047B00020200010312D32202020202020202020F9
:1047C00020202020000F4C4F41445F434C4F434B6F
:1047D000202020202000013100023830000131006B
```

```
:1047E000013000085320202020202020001031 20FC
:1047F000202020202020202020202020202020000FEA
:104800004C4F41445F4932535452202020202000 15
:1048100001310002383100013300013100084243 08
:1048200049202020202000 10312D322D332020203F
:104830002020202020202020000F4C4F41445F49A1
:104840004E542020202020202000013100023832 48
:104850000001320001310008 4E4920202020202094
:104860000010312D3220202020202020202020202048
:10487000202000 0F4C4F41445F5245434F5244208B
:104880002020200001320002353800013300013 2BF
:10489000000858585320202020200010312D322DA0
:1048A000332020202020202020202020000F4C4FCB
:1048B00041445F5345512020202020202000013218
:1048C0000002353900013200013100085853202020
:1048D000202020200010312D3220202020202020D8
:1048E000202020202020000F4C4F41445F53545281
:1048F000494E4720202020000131000238330001BA
:104900003200013100084253202020202020 0010D6
:10491000312D322020202020202020202020202067
:10492000000F4D4F56455F4259544520202020200E
:104930002000013100023834000132000132000849
:1049400056562020202020200010312D32202020FB
:1049500020202020202020202020000F4D4F5645D1
:104960005F494E54202020202020200001310002E9
:10497000383500013200013200084E4E2020202040
:1049800020200010312D32202020202020202020 27
:1049900020202020000F4D4F56455F52414E444F7E
:1049A0004D3242202000013200023630000131 0039
:1049B0000131000856202020202020200010312026
:1049C00020202020202020202020202020200000F18
:1049D0004D4F56455F535452494E472020202000EA
:1049E0000131000238360001320001320008424233
:1049F000202020202000 10312D32202020202020B7
:104A00002020202020202020000F4E4545445F49D3
:104A10004E50555420202020200001310002383 70C
:104A2000000131000131000858202020202020 20E2
:104A30000010312020202020202020202020202095
:104A40002020000F5041445F425954452020202 02F
:104A5000202020000132000236310001340001 33F1
:104A60000008425856582020202000 10322D332DA7
:104A7000312D34202020202020202020000F5041E4
:104A8000445F43484152202020202020200001 3153
:104A90000002383800013400013200084258434314
:104AA000202020200010322D312D332D34202020C5
:104AB00020202020202020000F5041555345202049
:104AC0002020202020202000013100023839000160
:104AD000310001310008592020202020202000 1022
:104AE000312020202020202020202020202020 20B5
:104AF000000F5055545F414343554D202020202046
:104B000020000131000239300001320001320008 7A
:104B100058422020202020200010312D32202020 3B
:104B200020202020202020202020000F5055545FDE
:104B3000434C4F434B202020202020000132000214
```

:104B400036320001310001310008422020202020AF
:104B50002020001031202020202020202020202074
:104B60002020202020000F5055545F44454652454385
:104B70002020202020000131000239310001310 0C5
:104B8000013100084220202020202020000103120 68
:104B900020202020202020202020202020200000F46
:104BA0005055545F5245434F5244202020202020004E
:104BB0000013100023932000133000133000858583 6
:104BC000042202020202000103122D322D33202020A3
:104BD00020202020202020202020000F5055545F5345D6
:104BE00005120202020202020200000132000236 33D6
:104BF000000132000132000858422020202020202 0ED
:104C000000103122D32202020202020202020202 0A4
:104C10002020000F5243565F42595445202020204 7
:104C2000202020000131000239330001330001321 D
:104C300000008565941202020202000103222D312D0F
:104C400033202020202020202020202020000F52432D
:104C5000565F464C44202020202020202020000132 96
:104C6000000236340001360001350008584259581 0
:104C70005A41202000103122D322D332D342D352D69
:104C800036202020202020000F5243565F5041434BD6
:104C900045542020202020200001310002393400013 9
:104CA00033000132000842594120202020202000100A
:104CB000322D312D3320202020202020202020202 0A4
:104CC000000F52455455524E202020202020202020F5
:104CD00020000131000239350001310001300008A7
:104CE0004320202020202020200010312020202020C0
:104CF000202020202020202020202020000F53454E443 B
:104D00005F434841522020202020200001310002 32
:104D10003936000132000130000858582020202020 88
:104D200020200010312D32202020202020202020 83
:104D30002020202020000F53454E445F464C4420204 5
:104D4000202020202020000132000236350001340 0EE
:104D500001330008584258582020202020001033 2DDD
:104D6000342D322D312020202020202020202000 0F23
:104D700053454E445F535452434F4E2020202020005 1
:104D800001310002393700013200013000085 85A61
:104D9000202020202020200010312D322020202020 13
:104DA000202020202020202020000F5345545F43481E
:104DB0000495020202020202020200001320002363 6D9
:104DC00000001310001310008 5A20202020202020203D
:104DD00000103120202020202020202020202020F2
:104DE0002020000F5345545F43555252535420200 6
:104DF00020202020000132000236370001310001314D
:104E000000085820202020202020000103120202 0C1
:104E100020202020202020202020202020000F53456B
:104E2000545F4544495420202020202020000132 96
:104E300000002363800013100013000084120202 0F6
:104E4000202020200010312020202020202020202 081
:104E500020202020202020000F5345545F454E445F02
:104E6000434F44452020200001310002393800012 1
:104E700031000131000859202020202020200010 7E
:104E8000312020202020202020202020202020201 1
:104E9000000F5345545F46494C455F414343202032
:104EA0002000013200023639000131000131000 8D2
:104EB000582020202020202000103120202020200 D9
:104EC00020202020202020202020000F5345545F48
:104ED00046494C455F43534920202000013200 02DF
:104EE000373000013100013100085820202020202 0F7
:104EF00020200010312020202020202020202020 D1
:104F00002020202020000F5345545F46494C455F50F8
:104F10004153202020000132000237310001310 0CE
:104F20000131000858202020202020200010312 0AE
:104F3000202020202020202020202020202020000FA2
:104F400053455 45F46494C455F50524D502020001 8
:104F500013200023732000131000131000858 20CF
:104F600020202020202000103120202020202020 60
:104F70002020202020202020000F5345545F46494 8
:104F80004C455F52454 3202020000132000237335 8
:104F900000013200013200085858202020202020 33
:104FA00000103122D322020202020202020202020 01
:104FB0002020000F5345545F46494C455F534551EF
:104FC000202020200001320002373400013100013 17D
:104FD00000008582020202020200010312020 20F0
:104FE000202020202020202020202020000F53459A
:104FF000545F474F544F5354202020202000001324B
:10500000000237350001310001310008582020200E
:1050100020202020200010312020202020202020AF
:105020002020202020202020000F5345545F48534554 32
:10503000202020202020200001310002393900 01E9
:1050400031000131000858202020202020200010AD
:10505000312020202020202020202020202020203F
:1050600000000F5345545F4D4F44452020202020 01
:105070002000013200023736000131000131000 802
:105080005820202020202000103120202020200 7
:10509000202020202020202020202020000F5345545F76
:1050A0004D4F44454D2020202020200001310003 99
:1050B0003130300001310001310008582020202 01B
:1050C000202020001031202020202020202020 20FF
:1050D00020202020200000F5345545F5052494E5449
:1050E000455220202020000132000237370001 31D4
:1050F0000001310008582020202020200001031FD
:10510000202020202020202020202020202020000BF
:105110000F5345545F5345515F53495A4520202052
:1051200000013200023738000131000131000858 17
:105130002020202020202000103120202020202 08E
:105140002020202020202020000F5345545F5392
:105150005048522020202020200000131000 3311C
:1051600030310001310001310008582020202020 7A
:10517000202000103120202020202020202020204E
:105180002020202020000F5345545F54454C434F20AE
:1051900020202020200001310003313032000131 75
:1051A00000001310008582020202020200010314C
:1051B0002020202020202020202020202020200000F
:1051C0000000F5345545F54494D454F555420202020DE
:1051D000000013100033130330001310001310089A
:1051E000059202020202020200010312020202020A5
:1051F00020202020202020202020000F5345545F15

```
:1052000057434320202020202020202000013200028C
:10521000373900013100013100085820202020208A
:105220002020001031202020202020202020202009D
:1052300020202020000F53544152545F4241434BE1
:10524000202020202000013100033130340001 32C1
:10525000000131000858412020202020200010317A
:105260002D3220202020202020202020202020003F
:105270000F53544152545F4A4F4220202020202097
:10528000000131000331303500013200013100008E6
:10529000584120202020202000103 12D3220202085
:1052A00020202020202020202020200000F53544F5069
:1052B0005F4241434B20202020202000001310003 89
:1052C0003130360001310001310008582020202003
:1052D00020202000103120202020202020202020ED
:1052E00020202020200000F53544F505F4A4F42206F
:1052F00020202020202000013100033130370001 20
:105300003100013100085820202020202020 0010EA
:10531000312020202020202020202020202020207C
:105320000000F53544F52455F425954452020202 0CE
:10533000200001310003313038000132000132 0019
:105340000084E58202020202020200010312D3220200F
:1053500020202020202020202020202020000F53544FE8
:1053600052455F494E5420202020202000001310 06A
:10537000331303900013200013200084E5920203B
:105380002020202020001031 2D32202020202020201D
:1053900020202020202020000F53554D5F41434355CE
:1053A0004D202020202020200001310003313130 0029
:1053B0000013300013200085858422020202020 00EC
:1053C000103 12D332D3220202020202020202020209D
:1053D00020000F53554D5F535452494E4720202013
:1053E00020200001310003313131000133000 1324E
:1053F000000084258422020202020000103 12D332D5B
:1054000032202020202020202020202020000F544166
:1054100048455F494E5055542020202020200001313B
:1054200000033131320001300001300008202020 1B
:105430002020202020001030202020202020202020 8C
:10544000202020202020200000F5741495420202 0D8
:105450002020202020202020200001310003313133 82
:1054600000013000013000082020202020202020 D2
:1054700001020202020202020202020202020205C
:105480002020000F5741495464F525F4A4F422057
:10549000202020000131000331313400013100 01AE
:1054A00031000859202020202020200010312 02009
:1054B000202020202020202020202020000F57E6
:1054C00004149545F4A554D50202020202020 0001A2
:1054D00031000331313500013100013000084120 35
:1054E000202020202020200010312020202020202 0D8
:1054F000202020202020202000013700 23536F751A
:105500007263652046696C65204E6F7420466F7526
:105510006E642E202046696C656E616D65203D20AD
:105520000001590027496E636F72726563742053DE
:10553000796E746178205768656E20537461727457
:10554000696E672050726F6772616D2E00014E00A8
:105550001C4F70636F6465204E6F7420466F756ECC
:10556000642E20204F70636F6465203D2000015938
:105570002C496E636F7272656374204E756D62A4
:1055800065722 06F66205061726 16D657465727 31B
:10559000207468697320636F6D6D616E642E000105
:1055A0004E002C5265717565737465642044617496
:1055B0006120547970652 04E6F74204B6E6F776E4A
:1055C0002E20204461746120547970652 03D2000B4
:1055D0000159002 0496C6C6567616C2044617461FD
:1055E0002054797065 2E202044617461205479 70B4
:1055F00065203D200001590 01F496C6C6567616C96
:10560000207E2053796E7461782E2020506172 6163
:105610006D657465722 03D20000159FF000120 0076
:1056200000000120000000013000012000C00014F3
:105630002A2A2A20204552524F522E20204C696E91
:1056400065203D2000015900164869742052455 4D8
:1056500055524E20746F20636F6E74696E756500CD
:105660000120000 17C000140000256490002564220
:105670000012D00000001 3B000120000242430018
:1056800001490001590001570001500001 4E00027C
:1056900049430001590002424300014900015900F9
:1056A000015700015000014E0002494300000 02153
:1056B0007676767676767676767676767676768A
:1056C0007676767676767676767676767676767A
:1056D00076001E5A4150442041737365 6D626C65BB
:1056E000722020205665727369 6F6E20322E303022
:1056F0005300215E5E5E5E5E5E5E5E5E5E5E5E5E70
:105700005E5E5E5E5E5E5E5E5E5E5E5E5E5E5E5EB9
:105710005E5E5E5E001F436F7079726967687420 19
:105720003139383 52C20566572692D466F6E652CDF
:1057300020496E632E0013526561646 96E672053C1
:105740006F7572636520466 96C6500014200015007
:10575000014C00014100014900014F00015600C9
:105760000159000157000153000000295573 61677A
:1057700065202020 2D2D202020 7A617064 61736D20 8A
:10578000203C736F75726365 3E20203C73776974AB
:105790006368657 33E0004202 03D20001357656157
:1057A0006B20747970652063686 5636B696E672E22
:1057B00000015537 4726F6E67207479 7065206368 8A
:1057C00065636B696E672E00077A61702E696E6380
:1057D00000001260008 5A424547494E3A3A00013A2C
:1057E000000012600064 94E4C494E4500024F4E002E
:1057F00000000002202000012600 0F43414C4C2020D5
:1058000020202020202020202020 0000F444F5F435FD5
:1058100043414C4C2020202020 20000F444F5F4F5C
:10582000505359532020202020202 0000D232044B5
:105830006 5636C617265642 03D20000A2E20466F0E
:10584000756E64203D20000D4252414E43485F5327
:1058500057495443480000B45787065637465642 06C
:105860003D20000B2E2020466F756E64203D2000E9
:105870000920202020202020202020000 15E000000A0
:10588000032020200009202020202020202020 0008C
:10589000022020000131000132000920202020 20B8
:1058A0002020202000024243000464622020 00002E5
:1058B0000454100046477202000024943000 126008E
```

:1058C00005646220205F00046477202000025342B8
:1058D0000002535600046462202000025343000017A
:1058E0007E00046462202000012C0002425300026A
:1058F00056530002564200056462202058F000256A3
:1059000049000564622020 5F00046462202000009D1
:105910002020202020202020200002202000009 20FC
:10592000202020202020202020000220200001 4E00E6
:10593000013200013200013200013400046462 20AF
:1059400020000131000764622020313230000 12636
:1059500000092020202020202020200020456E64E7
:10596000206F66205 36F7572636520466 96C652EE3
:1059700020205072 6F63657373696E672E0014206 8
:10598000457272 6F72732045 6E636F756E746572C7
:10599000065642E0001260006 5A454E443A3A00003E
:1059A000000000000000000000000000001 3B000000BB
:1059B0000127000127000000056C696E65200000CA
:1059C00000017E00017E00022C20000000022C203D
:1059D00000003272C2000003202C270003272C200065
:1059E0000013900013000014800017E00046462209A
:1059F000200003 2C202700042C2027271100 7ACD1B
:105A00001F0121032722047B22087B211B5622062B
:105A10007BC3455A3E01218A7CCDF523032A8A7C2B
:105A20001109007B957A9CF2375A2A8A7C1137003B
:105A3000192288 7CC3415A2A8A7C11300019228895
:105A40007C2A887CC9C3E35A3E01218E7CCDF52394
:105A50000521010022907CC3A05A2A8E7CE52A9061
:105A60007CE5210100CD9B22EB211C56CD5821C69F
:105A7000FF9FF52A8E7CE52A907CE5210100CD9BD5
:105A80022CDEA211109007B956F7A9CB5C6FF9F54
:105A9000C1A01FD2995AC3C05A2A907C2322907C5D
:105AA0002A8E7CCD4D22EB2A907C7B957A9C1FB26E
:105AB000F25A5A118C7C211F56CDC3212A8C7CC9E5
:105AC0002A8E7CE52A8E7CCD4D22E52A907C2BD136
:105AD0007B956F7A9C67CD5B22118C7CCDC3212A8C
:105AE0008C7CC9C3825B3E0121947CCDF5230521CA
:105AF0002156E52A947CE5210100CD6F2522967C74
:105B00002109 00CD0122E52A947CE5210100CD6F19
:105B10002522987C2A987C7CB5C6FF9FF52A967C26
:105B20007CB5D6019FF52A987CEB2A967C7B957AEA
:105B30009C07C1B0C1A01FD2405B2A987C22967CF2
:105B40002A967C1100007B957A9CF2715B2A947CEA
:105B5000E52A947CCD4D22EB2A967C7B956F7A9C2E
:105B60067CD5B22E5CD485A11927CCDC321C37A23
:105B70005B11927C212456CDC3212A927CC92A92A2
:105B80007CC9C3AE5B3E01219C7CCDF523032A9CDE
:105B90007CCDBA04CD0623112656CD1221E5210273
:105BA0000CD5B22119A7CCDC3212A9A7CC9C3F710
:105BB0005B3E0121A07CCDF523032AA07CEB2110C4
:105BC0000CD5B0A22A27C2AA07CE5211000CD8981
:105BD000A22A47C2AA27CE5CD145ACD0122E52A12
:105BE000A47CE5CD145ACD0122D1CD1221119E7C89
:105BF000CDC3212A9E7CC9C3935C3E0121A87CCDE4
:105C0000F523052AA87CCD4D2222AA7C11FFFFD5C1
:105C1000C35D5C2AA87CE52AAA7CE5210100CD9B16

:105C200022EB212956CD5821C6FF9FF52AA87CE5F5
:105C30002AAA7CE5210100CD9B22CDEA2111090091
:105C40007B956F7A9CB5C6FF9FC1A01FD2525CC3E3
:105C50007B5C11FFFF2AAA7C1922AA7CD5EB2101CB
:105C600000F1B7F2675CEB7D937C9AF2135C11A6AE
:105C70007C212C56CDC3212AA67CC92AA87CE52AE2
:105C800AA7CCD172211A67CCDC3212AA67CC92AC5
:105C9000A67CC9C3135D3E0221AE7CCDF52305036E
:105CA0002AB27C2322B27C2AB47C7CB5C2B85CCDFB
:105CB0000C102AB67CCD4110212E56CD390F2AB8B2
:105CC0007CCD03102AAE7CEB214456CD5821C2E492
:105CD0005C2ABA7CEB2AB07C29195E2356EBCD39BD
:105CE0000FC3F45C2ABA7CEB2AB07C29195E2356D8
:105CF000EBCD41102ABC7C7CB5CA0B5D214756CD4B
:105D0000390FCD691422B07CCD0C102AAC7CC92A85
:105D1000AC7CC9C3345E3E0121C07CCDF523052196
:105D20000010022C27C2AC67C22C47C2AC27CEB2AC7
:105D3000C47C7D937C9AF2435D21000022BE7C2AC4
:105D4000BE7CC92AC27CEB2AC47C19EB210200CD9F
:105D50005B0A22C87C2AC07CCD4D22E52ACA7CEB96
:105D6002AC87C29195E2356210100 29195E235671
:105D7000EBCD4D22D17D937C9AF29A5D2ACA7CEBC1
:105D8002AC87C29195E2356210100 29195E235651
:105D9000EB11CC7CCDC321C3BE5D2ACA7CEB2AC8E3
:105DA0007C29195E2356210100 29195E2356D52A24
:105DB000C07CCD4D22CD172211CC7CCDC3212ACC65
:105DC0007CEB2AC07CCD5821C20F5E2ACA7CEB2A0C
:105DD000C87C29195E2356210100 29195E2356D556
:105DE0002AC07CCD4D2223E5210100CD9B22EB2151
:105DF0005F56CD5821C2055E2AC87C22BE7C2ABED1
:105E00007CC9C30F5E2AC87C2B22C47CC32B5D2AAD
:105E1000C07CEB2ACC7CCD5821D2265E2AC87C2BB4
:105E20022C47CC32D5E2AC87C2322C27CC32B5D86
:105E30002ABE7CC9C3875E3E0121D07CCDF52305F7
:105E4000216256E52AD07CE5210100CD6F2522D2C2
:105E50007C2AD27C1100007B957A9CF2765E2AD057
:105E60007CE5210100E52AD27C2BCD9B2211CE7C42
:105E7000CDC321C37F5E2AD07C11CE7CCDC3212A25
:105E8000CE7CC92ACE7CC9C32E5F3E0121DC7CCDED
:105E9000F523052ADC7CE5210100CD1722CDEA217E
:105EA00022DE7C2ADE7C1140007B957A9CF2C25E69
:105EB0002ADE7C1137007D936F7C9A6722DE7CC3DB
:105EC000D15E2ADE7C1130007D936F7C9A6722DEE2
:105ED0007C2ADC7CE5210200E5210100CD9B22CD5E
:105EE000EA2122E07C2AE07C1140007B957A9CF23A
:105EF00045F2AE07C1137007D936F7C9A6722E073
:105F00007CC3135F2AE07C1130007D936F7C9A671D
:105F10022E07C2ADE7C111000CD1B0AEB2AE07CFB
:105F20019CDBA0421D47CCD880321D47CC9C3C83F
:105F30005F3E0121E47CCDF523032AE47CE5210AC0
:105F40000CDB90A22E67C2AE47CEB2AE67C7B952C
:105F50006F7A9C67EB210A00CD5B0AE5210A00CD30
:105F6000B90A22E87C2AE87C110A00CD1B0AEB2A38
:105F7000E47C7D936F7C9A67EB2AE67C7B956F7A55

:105F80009C67EB216400CD5B0A22EA7C2AEA7C1143
:105F9000410019CD0122116556CD1221E52AE87C78
:105FA00011410019CD0122D1CD1221E52AE67C1143
:105FB000410019CD0122D1CD122111E27CCDC321A6
:105FC0002AE27CC92AE27CC9C3F05F3E0121EE7C53
:105FD000CDF523052AEE7CE52AEE7CCD4D222BCD96
:105FE0005B2211EC7CCDC3212AEC7CC92AEC7CC954
:105FF000C331603E0121F87CCDF523032AF87C7C77
:1060000085C21460210000CDBA0421F07CCD880314
:1060100021F07CC92AF87C2BE52AFA7CCD890A2329
:10602000CDBA0421F07CCD880321F07CC921F07C1D
:10603000C9C336613E0321FE7CCDF52305050321 4E
:10604000010022047DC392602A087DEB2A047D2989
:10605000195E235621010029195E23562A007DCDA1
:106060005821C28B602A0A7DEB2A027D2919E52A74
:10607000087DEB2A047D29195E2356210600291983
:106080005E2356EB01CDC321C3A9602A047D232210
:10609000047DEB2A067D7D937C9A1FB4F248602133
:1060A000FFFF22FC7C2AFC7CC9210200220C7DC35C
:1060B00021612A087DEB2A047D29195E23562A0CCA
:1060C0007D29195E23562AFE7CCD5821D6019FF5E5
:1060D0002A0E7D7CB5D6019FF52A087DEB2A047D2A
:1060E00029195E23562A0C7D29195E2356216856EC
:1060F000CD5821D6019FF52AFE7CEB216C56CD5858
:1061000021D6019FC1A0C1A0C1B01FD21A612A0C23
:106110007D2B2B22FC7C2AFC7CC92A0C7D23220CA3
:106120007D11FAFF19D2B26021FFFF22FC7C2AFC0C
:106130007CC92AFC7CC9C395613E0121127DCDF545
:1061400023052170 56E52A127DE5210100CD6F253A
:1061500022147D2A147D1100007B957A9CF28461C3
:106160002A127DE52A127DCD4D22EB2A147D7B95E6
:106170006F7A9C67CD5B22E5CD485A11107DCDC367
:1061800021C38D6111107D217356CDC3212A107D4D
:10619000C92A107DC9C3FB613E0121187DCDF523BD
:1061A00005217556E52A187DE5210100CD6F2522D0
:1061B0001C7D2A1C7D1100007B957A9CF2D6612AF9
:1061C000187DE52A1C7D2BCD1722CD4723111A7D82
:1061D000CDC321C3E2612A187DCD4723111A7DCD9D
:1061E000C3212A1A7DE5CDFA58E5CD485A11167D0B
:1061F000CDC3212A167DC92A167DC9C38E623E01F0
:1062000021207DCDF52305217856E52A207DE52145
:106210000100CD6F2522227D210900CD0122E52A32
:10622000207DE5210100CD6F2522247D2A247D7C5F
:10623000B5C6FF9FF52A227D7CB5D6019FF52A249D
:106240007DEB2A227D7B957A9C07C1B0C1A01FD22D
:1062500058622A247D22227D2A227D1100007B950E
:106260007A9CF27D622A207DE5210100E52A227DCB
:106270002BCD9B22111E7DCDC321C386622A207D9A
:10628000111E7DCDC3212A1E7DC92A1E7DC9C3A42E
:10629000643E0121287DCDF523052ACA7CEB2A2CFA
:1062A0007D29195E235621030029195E2356D52A1C
:1062B000047DE5210100CD9B22112A7DCDC3212142
:1062C0000100220C7DC38A642A307DEB2A0C7D29D3
:1062D000195E235621030029195E23562A287DEBD7
:1062E000CD5821C286632A307DEB2A0C7D29195EA8
:1062F000235621010029195E2356217B56CD5821B2
:10630000D6019FF52A2A7DEB217F56CD5821D60153
:106310009FF52A2A7DEB218256CD5821D6019FC1B7
:10632000B0F52A2A7DEB218556CD5821D6019FC193
:10633000B0F52A2A7DEB218856CD5821D6019FC180
:10634000B0F52A2A7DEB218B56CD5821D6019FC16D
:10635000B0C1A01FD2676311267D218E56CDC32107
:106360002A267DC9C386632A307DEB2A0C7D291934
:106370005E235621010029195E2356EB11267DCD9F
:10638000C3212A267DC92A307DEB2A0C7D29195E7E
:10639000235621020029195E2356219256CD5821F9
:1063A000C283642A307DEB2A0C7D29195E23562195
:1063B000030029195E23562A287DEBCD582107F5C5
:1063C0002A307DEB2A0C7D29195E235621040029F1
:1063D000195E23562A287DEBCD58212F07C1A01F17
:1063E000D283642A307DEB2A0C7D29195E23562145
:1063F000010029195E2356219556CD5821D6019FB8
:10640000F52A2A7DEB219956CD5821D6019FF52AF0
:106410002A7DEB219C56CD5821D6019FC1B0F52A8B
:106420002A7DEB219F56CD5821D6019FC1B0F52A78
:106430002A7DEB21A256CD5821D6019FC1B0F52A65
:106440002A7DEB21A556CD5821D6019FC1B0C1A010
:106450001FD2646411267D21A856CDC3212A267D32
:10646000C9C383642A307DEB2A0C7D29195E23562B
:10647000210100 29195E2356EB11267DCDC3212A67
:10648000267DC92A0C7D23220C7DEB2A2E7D7D934F
:106490007C9A1FB4F2C86211267D21AC56CDC3216F
:1064A0002A267DC921000022B87C21000022327DED
:1064B000CD0C10CD0C1021AE56CD411021D156CDB2
:1064C000411021F156CD4110211457CD4110CD0C72
:1064D00010213557CD390F21067DCD29142A067D8F
:1064E000E5210600E5210200E5210500E521087D02
:1064F000CD362421010022347DC32E6521010022E6
:10650000047DC320652A087DEB2A347D29195E238A
:10651000562A047D2919CDF5132A047D2322047DF2
:1065200011F9FF19D205652A347D2322347DEB2A27
:10653000067D7D937C9A1FB4F2FC64212E7DCD29CB
:10654000142A2E7DE5210400E5210200E521050045
:10655000E521307DCD362421010022347DC39265B2
:1065600021010022047DC384652A307DEB2A347D1D
:1065700029195E23562A047D2919CDF5132A047D95
:106580002322047D11FBFF19D269652A347D232261
:10659000347DEB2A2E7D7D937C9A1FB4F2606521B9
:1065A000C67CCD29142AC67CE5210300E521020022
:1065B000E5210300E521367DCD36242AC67CE52180
:1065C0000400E5210200E5210500E521CA7CCD3665
:1065D00024210100 22347DC3626621010022047D52
:1065E000C3FE652ACA7CEB2A347D29195E23562A0C
:1065F000047D2919CDF5132A047D2322047D11FD84
:10660000FF19D2E36521010022047DC329662A36E1
:106610007DEB2A347D29195E23562A047D2919CD64
:1066200029142A047D2322047D11FCFF19D20E6651
:1066300021030022047DC354662ACA7CEB2A347DE0

```
:1066400029195E23562A047D2919CDF5132A047DC4
:106650002322047D11FBFF19D239662A347D2322BF
:10666000347DEB2AC67C7D937C9A1FB4F2DA6521D7
:10667000387DCD29142A387DE5210100E52105006A
:10668000E521BA7CCD36242A387DE5210100E521BB
:106690000500E5213A7DCD362421010022347DC359
:1066A000C1662ABA7CEB2A347D2919CDF5132A3A22
:1066B0007DEB2A347D2919CDF5132A347D2322342C
:1066C0007DEB2A387D7D937C9A1FB4F2A266210B64
:1066D00000E5210100E5210500E5213C7DCD3624C2
:1066E000210B00E5210100E5210500E5213E7DCDDE
:1066F0003624210B00E5210100E5210500E52140BC
:106700007DCD3624210B00E5210100E5210300E5C4
:1067100021427DCD3624210B00E5210100E5210336
:1067200000E521447DCD3624210B00E5210100E563
:10673000210500E5210A7DCD3624210B00E521014C
:1067400000E5210500E521467DCD3624CD1322E567
:10675000CDFE6111487DCDC321CD1322E5CDE65A92
:10676000E5CDFE61114A7DCDC321214A57E52A4A74
:106770007DE5210100CD6F257CB5CA86672100002B
:1067800022B47CC38C6721010022B47C214D57E5E3
:106790002A4A7DE5210100CD6F257CB5CAA8672175
:1067A0000100224C7DC3AE67210000224C7D2150A8
:1067B00057E52A4A7DE5210100CD6F257CB5CAC980
:1067C000673EFFCD7810C3CE673E00CD78102153D1
:1067D00057E52A4A7DE5210100CD6F257CB5CAEA3F
:1067E00067210100224E7DC3F067210000224E7D0B
:1067F000215657E52A4A7DE5210100CD6F257CB55C
:10680000CA0C6821010022507DC3126821000022B9
:10681000507D215957E52A4A7DE5210100CD6F259C
:106820007CB5CA2E6821010022527DC33468210044
:106830000022527D215C57E52A4A7DE5210100CDE9
:106840006F257CB5CA506821010022547DC3566868
:1068500021000022547D215F57E52A4A7DE5210170
:1068600000CD6F257CB5CA726821010022567DC318
:1068700078682100002256 7D216257E52A4A7DE58D
:10688000210100CD6F257CB5CA946821010022BC8E
:106890007CC39A6821000022BC7C216557E52A4A06
:1068A0007DE5210100CD6F257CB5CAB668210100C8
:1068B000220E7DC3BC68210000220E7D210100E56F
:1068C00021AC74CD571A2A487DEB216857CD582149
:1068D000C2F268210200E52A3A7D11020019195E10
:1068E0002356D5CD965C216A57CD4110CD681FCD7A
:1068F0009D01219557CD390F2A487DCD41102A0E93
:106900007D7CB5C20F69219B57CD4110C31569210C
:10691000B057CD4110CD0C102A487DE5210000E58F
:10692000210100E52101003E00CD8719210100E58C
:1069300021CB74CD571A21C757E5210000E521026C
:1069400000E52101003E00CD0F1A21D057CDEC10FB
:10695000210200CD651A21D357CD9C1ECD0475218F
:10696000D057E52A3E7D11010019195E2356D52118
:106970000100CD6F257CB5CAAD6921E057CDEC1083
:10698000210200CD651A2A3E7D11010019195E23EE
:1069900056EBCD9C1E21010022587D210200225A77
:1069A0007D2A5C7D2B7CB5C2AD69C35C692A3E7DC6
:1069B000EB2A5A7D29195E2356D5210600CD1722D0
:1069C000EB21E357CD5821C2FC692A3E7DEB2A5AC0
:1069D0007D29195E2356D5210200CD5822EB21EBE8
:1069E00057CD5821C2F36921010022327DC35E6A6E
:1069F000C3FC6921000022327DC35C692A327D2BF1
:106A00007CB5C25E6A115E7D21EF57CDC3212A5A43
:106A10007D22347DC33E6A2A3E7DEB2A347D2919CE
:106A20005E23562A5E7DEBCD1221EB21F157CD126C
:106A300021115E7DCDC3212A347D2322347DEB2AB2
:106A40005C7D7D937C9AF2176A21F557CDEC10217D
:106A50000200CD651A2A5E7DCD9C1EC35C692A3E6C
:106A60007DEB2A5A7D29195E2356D5CD165D222C41
:106A70007D2A2C7D7CB5C2A26A210300E52A3A7DDD
:106A800011030019195E2356D5CD965C2A3E7DEB85
:106A90002A5A7D29195E2356EBCD4110CD0C10C327
:106AA0005C692A5C7D2BEB2A587D7B956F7A9C670D
:106AB00022607D2ACA7CEB2A2C7D29195E2356216F
:106AC000010029195E2356EB11627DCDC3212A6294
:106AD0007DEB21F857CD5821D6019FF52A627DEB39
:106AE000210958CD5821D6019FC1B0F52A627DEB0E
:106AF000211A58CD5821D6019FC1B01FD2786B21E1
:106B0000010022647D2A587D11030019EB2A3E7D05
:106B100019195E2356EBCD8E14210200CDBA04CD97
:106B20001E042A607DCDBA04CDDB03CA726B21043A
:106B300000E52A3A7D11040019195E2356D5CD9639
:106B40005C212B58CD390F2A587D11030019EB2AEF
:106B50003E7D19195E2356EBCD390F213A58CD39B8
:106B60000F2A607D2B2BCD0310CD0C10C35C69C3A5
:106B7000756BC3FA6BC3976B2A627DEB214658CDC8
:106B80005821C2916B21020022647DC3A974C3976E
:106B90006B21000022647D2A367DEB2A2C7D291989
:106BA0005E235621020029195E23562A607D7B95BB
:106BB0006F7A9CB5CAFA6B210400E52A3A7D11046C
:106BC0000019195E2356D5CD965C215558CD390F45
:106BD0002A367DEB2A2C7D29195E235621020029B5
:106BE000195E2356EBCDDB0F216258CD390F2A6099
:106BF0007DCD0310CD0C10C35C692A5A7D2322661B
:106C00007D21010022047D2A4C7D7CB5CA156C21B2
:106C10006F58CD390F2A667D22347DC3DC6C2A3E45
:106C20007DEB2A347D29195E2356D5210100CD172D
:106C30002211687DCDC3212A687DEB217A58CD5879
:106C400021C25D6C2A3E7DEB2A347D29195E2356D4
:106C5000D5210200CD172211687DCDC3212A407DA8
:106C6000EB2A047D2919E52A687DE5CD9162D1CD15
:106C7000C3212A407DEB2A047D29195E2356217DFC
:106C800058CD5821C2B06C210500E52A3A7D110586
:106C90000019195E2356D5CD965C2A3E7DEB2A3429
:106CA0007D29195E2356EBCD4110CD0C10C35C69D4
:106CB0002A4C7D7CB5CACE6C2A407DEB2A047D2906
:106CC000195E2356EBCD390F217F58CD390F2A0499
:106CD0007D2322047D2A347D2322347DEB2A5C7DB2
:106CE0007D937C9AF21E6C2A4C7D7CB5CAF26CCDE9
:106CF0000C102A4E7D7CB5CA006D218458CD390F09
```

:106D000021010022347DC3B66D2ACA7CEB2A2C7D7A
:106D100029195E235621030029195E2356D52A34EA
:106D20007DE5210100CD9B22116A7DCDC3212A4240
:106D30007DEB2A347D2919E52A347DE52A6A7DE533
:106D40002A407DEB2A347D29195E2356D5CD346047
:106D5000EBE17323722A427DEB2A347D29195E23ED
:106D600056EB237CB5C2916D210600E52A3A7D11D0
:106D7000060019195E2356D5CD965C2A407DEB2A74
:106D8000347D29195E2356EBCD4110CD0C10C35C28
:106D9000692A4E7D7CB5CAAF6D2A427DEB2A347DCF
:106DA00029195E2356EBCDDB0F218F58CD390F2AE1
:106DB000347D2322347DEB2A607D7D937C9A1FB441
:106DC000F2096D2A4E7D7CB5CACE6DCD0C102A64B9
:106DD0007D7CB5CAEB6D2A5C7DEB2A587D7B956F77
:106DE0007A9C672B2B226C7DC3036E2A367DEB2A9F
:106DF0002C7D29195E235621030029195E2356EBA9
:106E0000226C7D2A6C7D7C07D2116E210000226CE1
:106E10007D2ACA7CEB2A2C7D29195E23562102008B
:106E200029195E2356219358CD5821C25E6E2A6CD3
:106E30007D7CB5C23F6E210100226E7DC35B6E2A50
:106E40006C7D1103007B957A9CFA556E210200221D
:106E50006E7DC35B6E210300226E7DC39A6E2A6C29
:106E60007D1103007B957A9C07F52ACA7CEB2A2CBE
:106E70007D29195E235621020029195E2356219689
:106E800058CD582107C1B01FD2946E210300226E45
:106E90007DC39A6E210200226E7D2A6E7D2322041C
:106EA0007D210100220C7D2ACA7CEB2A2C7D291928
:106EB0005E235621040029195E2356D5CD98611111
:106EC000707DCDC3212A527D7CB5CAD96E219958D7
:106ED000CD390F2A707DCD411021010022347DC3B0
:106EE0005C712A707DE5210100CD1722CD8E14CD75
:106EF000D80422727D2A707DE5CD396111707DCD77
:106F0000C3212A407DEB2A727D29195E2356EB119D
:106F1000747DCDC3212A447DEB2A0C7D2919E52AF5
:106F2000427DEB2A727D29195E2356E17323722A72
:106F3000467DEB2A0C7D2919E52A0A7DEB2A727D14
:106F400029195E2356EBD1CDC3212A5A7DEB2A7233
:106F50007D19EB2A3E7D19195E2356EB11767DCD06
:106F6000C3212A747DEB21A458CD5821C2896F2AF0
:106F70003C7DEB2A047D2919E52A767D11A858CDA0
:106F80001221D1CDC321C347712A747DEB21AE58A4
:106F9000CD5821C2B46F2A3C7DEB2A047D2919E526
:106FA0002A767DE5CDCB5F11B258CD1221D1CDC36C
:106FB00021C347712A747DEB21B858CD5821C210E6
:106FC000702A767DE5210100CD1722EB21BC58CD3A
:106FD0005821C2F66F2A3C7DEB2A047D2919E52A47
:106FE000767DE5CDCB5F11BF58CD1221D1CDC32128
:106FF000C34771C310702A3C7DEB2A047D2919E533
:107000002A767D11C658CD1221D1CDC321C3477137
:107010002A747DEB21CC58CD5821D6019FF52A74D6
:107020007DEB21D058CD5821D6019FC1B01FD2573A
:10703000702A3C7DEB2A047D2919E52A767DE52A14
:10704000767DCD4D222B28CD5B2211D458CD122134
:10705000D1CDC321C347712A747DEB21DA58CD58B5
:1070600021C2B27021DE58E52A767DE5210100CDEE
:107070006F257CB5C2AC702A3C7DEB2A047D2919B2
:10708000E52A767DCD4D222BCDBA04CD062311E124
:1070900058CD1221EB21E758CD1221EB2A767DCD78
:1070A0001221D1CDC321C34771C3B270CDF676C3CF
:1070B00047712A747DEB21EA58CD5821D6019FF5FE
:1070C0002A747DEB21EE58CD5821D6019FC1B0F531
:1070D0002A747DEB21F258CD5821D6019FC1B01FF3
:1070E000D201712A3C7DEB2A047D2919E52A767D9F
:1070F000E5CDCB5F11F658CD1221D1CDC321C347C9
:10710000712A747DEB21FD58CD5821C22C712A3C87
:107110007DEB2A047D2919E52A767DE5CDCB5F112B
:107120000159CD1221D1CDC321C347712A3C7DEB3A
:107130002A047D2919E52A767DE5CDCB5F11085912
:10714000CD1221D1CDC3212A047D2322047D2A0C16
:107150007D23220C7D2A347D2322347DEB2A607D21
:107160007D937C9A1FB4F2E26E2A547D7CB5C27482
:1071700071C3B071210E59CD390F21010022347D28
:10718000C3A0712A0A7DEB2A347D29195E2356EBB0
:10719000CD390F211959CD390F2A347D2322347D61
:1071A000EB2A607D7D937C9A1FB4F28371CD0C1025
:1071B0002A567D7CB5C2BB71C3F771211D59CD39EB
:1071C0000F21010022347DC3E7712A467DEB2A346A
:1071D0007D29195E2356EBCD390F212859CD390F62
:1071E0002A347D2322347DEB2A607D7D937C9A1F97
:1071F000B4F2CA71CD0C102A3C7DEB2A6E7D2919A0
:10720000E52A367DEB2A2C7D29195E2356210100C3
:1072100029195E2356EBCDBA04CD0623D1CDC32167
:107220002A607D2322787D210100227A7D210100C0
:10723000220C7D21010022347DC305732180002280
:107240007C7D211000227E7D2A7A7D22047DC3CEA2
:10725000722A787D2B22787D2A787D7CB5C27A725D
:107260002A3C7DEB2A347D2919E52A7C7DCDBA04A0
:10727000CD0623D1CDC321C316732A467DEB2A0C3C
:107280007D29195E2356212C59CD5821C299722A85
:107290000C7D23220C7DC351722A447DEB2A0C7D88
:1072A00029195E23562A7E7DCD1B0AEB2A7C7D1987
:1072B000227C7D2A7E7DEB210400CD5B0A227E7D2F
:1072C0002A0C7D23220C7D2A047D2322047D2A7A28
:1072D0007D2323EB2A047D7B957A9CF251722A3C14
:1072E0007DEB2A347D2919E52A7C7DCDBA04CD06B3
:1072F00023D1CDC3212A7A7D232323227A7D2A34E8
:107300007D2322347D2A6E7D2BEB2A347D7B957A7A
:107310009C1FB2F23C722ACA7CEB2A2C7D29195E92
:10732000235621020029195E2356EB118C7DCDC31F
:10733000212A807DEB212F59CD5821D6019FF52A96
:107340006E7D2B2B7CB5D6019FC1A0F52A807DEBED
:107350002132 59CD582107C1B01FD288732A3C7DF4
:107360001101001919E52A3C7D11010019195E234C
:1073700056EBCD8E14214000CDBA04CD1E04CD06AF
:1073800023D1CDC321C3D1732A807DEB213559CDC3
:107390005821D6019FF52A807DEB213859CD5821FF
:1073A000D6019FC1B01FD2D1732A3C7D11020019B2
:1073B00019E52A3C7D11020019195E2356EBCD8E8A

:1073C00014214000CDBA04CD1E04CD0623D1CDC377
:1073D000212101002234 7DC302742A3C7DEB2A3432
:1073E0007D2919E52A3C7DEB2A347D29195E235637
:1073F000EB113B59CD1221D1CDC3212A347D23225B
:10740000347DEB2A6E7D7D937C9A1FB4F2DA732172
:107410000100223 47DC391742A347D2B7CB5D601C2
:107420009FF52A807DEB214159CD5821D6019FC17E
:10743000A0F52A3C7DEB2A347D29195E2356214490
:1074400059CD5821D6019FC1A01FD25074C38A7450
:10745000214D59CDEC10210200CD651A2A3C7DEB5F
:107460002A347D29195E2356EBCD9C1E2A507D7C43
:10747000B5CA8A74215059CD390F2A3C7DEB2A3484
:107480007D29195E2356EBCD41102A347D23223409
:107490007D2A607DEB2A6E7D19EB2A347D7B957AFF
:1074A0009C1FB2F21874C35C69C35C69210100E5DA
:1074B0002A3A7D11010019195E2356D5CD965C2A12
:1074C000487DCD4110CD681FCD9D01CD0C10215BB5
:1074D00059CD41102AB27CCD080F217D59CD411011
:1074E000210100CD331F219359CDEC10210200CD95
:1074F000651A219659CD9C1E210200CD331FCD68FF
:107500001FCD9D0121010022347DC380752A3E7D5F
:10751000EB2A347D2919EB219E59CDC3212A3C7DCC
:10752000EB2A347D2919EB21A059CDC3212A447D82
:10753000EB2A347D2919360023360 02A427DEB2AB6
:10754000347D2919360023360 02A407DEB2A347D0C
:107550002919EB21A259CDC3212A0A7DEB2A347DBA
:107560002919EB21A459CDC3212A467DEB2A347D6C
:107570002919EB21A659CDC3212A347D2322347D3C
:1075800011F4FF19D20D75210100225A7D2100004E
:10759000225C7D21000022587DCD53147CB5CAA702
:1075A00075CD681FCD9D01210100CD651A21827D19
:1075B000CD5F1D2AB87C2322B87C2A827DE5CD4888
:1075C0005AEB21A859CD5821D6019FF52A827DE595
:1075D000CD485AE5CDFE61E5210100CD1722EB2112
:1075E000AA59CD5821D6019FC1B01FD2F175C399B8
:1075F000752A827D11B67CCDC3212A827DE5CD9886
:1076000061118 27DCDC321C3BC762A3E7DEB2A5A0F
:107610007D2919E52A827DE5CDFE61D1CDC3212AE0
:107620003E7DEB2A5A7D29195E2356D5210100CDD6
:107630001722EB21AF59CD5821C2A17621B259E5CD
:107640002A827DE5210200CD6F2522847D2A3E7DA0
:10765000EB2A5A7D2919E52A827DE52A847DCD17FA
:1076600022D1CDC3212A827DCD4D22EB2A847D7B80
:1076700095 6F7A9CB5C2847611827D21B559CDC3B0
:1076800021C3A1762A827DE52A827DCD4D22EB2A77
:10769000847D7B956F7A9C67CD5B2211827DCDC303
:1076A000212A827DE5CDE65A11827DCDC3212A5A59
:1076B0007D23225A7D2A5C7D23225C7D2A827DEBFC
:1076C00021AD59CD5821C20A76210100225A7D2AC6
:1076D000B47C7CB5CAE0762AB67CCD4110C3F57681
:1076E000210D00CD0122CD390F21B759CD390F2AF7
:1076F000B87CCD080FC911747D21BE59CDC3212AC1
:10770000767DCD4D222B22867D21010022887D2190
:1077100000000228A7D2A767DCD4D22EB2A887D7D50
:10772000937C9AFA2977C3FA7821C059E52A767DA5
:10773000E52A887DCD6F25228C7D2A8C7D7CB5C283
:107740004577C3FA782A767DCD4D22EB2A8C7D7B56
:10775000956F7A9CB5C27277210700E52A3A7D11B0
:1077600070019195E2356D5CD965C2A767DCD414A
:1077700010C92A767DE52A8C7D23E5210100CD9B69
:1077800022EB21C359CD5821C2D1772A8C7D2323E6
:1077900022887D2A767DE52A8C7DCD1722E52A7602
:1077A0007DE52A767DCD4D22E52A8C7D23D17B9502
:1077B0006F7A9C67CD5B22D1CD122111767DCDC32E
:1077C000212A867D2B22867D210100228A7DC315F8
:1077D000772A8A7D237CB5C2EF77112A7D21C6598D
:1077E000CDC321118E7D21CA59CDC321C31E782A54
:1077F0008A7D7CB5C20C78112A7D21CC59CDC3215C
:10780000118E7D21D059CDC321C31E78112A7D212F
:10781000D559CDC321118E7D21DA59CDC3212A76C8
:107820007DE52A8C7D23E5210200CD9B2211907DF0
:10783000CDC3212A907DE5210100CD1722EB21DF68
:1078400059CD5821F256782A907D11E259CD122156
:1078500011907DCDC3212A747DEB2A2A7DCD122182
:10786000E52A767DE52A887DE52A8C7DEB2A887DD0
:107870007B956F7A9C67CD9B22D1CD1221EB2A8E0E
:107880007DCD1221EB2A907DCD1221EB21E559CD42
:107890001221117 47DCDC3212A867D2B2B22867D5A
:1078A0002A867D1100007B957A9CFAC77821070013
:1078B000E52A3A7D11070019195E2356D5CD965C4D
:1078C0002A767DCD4110C92A8C7D23232322887DF1
:1078D0002A767DE52A887DE5210100CD9B22EB21DA
:1078E000E859CD5821C2F17821FFFF228A7DC3F7E4
:1078F0007821010 0228A7DC315772A3C7DEB2A047A
:107900007D2919E52A867DCDBA04CD062311EB59D0
:10791000CD1221EB2A747DCD1221EB21F159CD122C
:1079200021E52A767DE52A767DCD4D22EB2A887DDC
:107930007B956F7A9C6723CD5B22D1CD1221D1CD6F
:10794000C32121F659E52A3C7DEB2A047D29195EE5
:107950002356D5210100CD6F25228C7D2A8C7D7C7C
:10796000B5CAF7792A3C7DEB2A047D29195E235696
:10797000EBCD4D22E52A8C7D232323D17B956F7A95
:107980009C6722927D2A927D1100007B957A9CF261
:10799000D2792A3C7DEB2A047D2919E52A3C7DEB2E
:1079A0002A047D29195E2356D52A8C7D2BCD1722DA
:1079B000E52A3C7DEB2A047D29195E2356D52A92BF
:1079C0007DCD5B22D1CD1221D1CDC321C34279C35C
:1079D000F7792A3C7DEB2A047D2919E52A3C7DEBC9
:1079E0002A047D29195E2356D52A8C7D2BCD17229A
:1079F000D1CDC321C34279C9CD681FCD9D01726429
:0000000000

TABLE XXXVI

Object Code of ZAPDSTAT State Table Compression Program

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATEND AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
:10010000C3EB6B00000000000000000000000000D6
:10011000000000000100000004000000000000101D8
:100120000001000000000000000010200010000000CA
:100130000000000000000000000000000000000000BF
:100140000000000000000000000000000000000000AF
:1001500000000000000000000000000000000000009F
:1001600000000000000000000000000000000000008F
:1001700000000000000000000000000000000000007F
:100180000000000000000000002020100A675000024D
:100190000000A67503000000A675010100001267489
:1001A0006B7188010200707188010200757180E0107
:1001B00005007A718E0105007F718E010500847142
:1001C0008E01050089718E0104008E718E0104007C
:1001D00093719401030098719401030000009A0147
:1001E000000002000100327002000002010003270C3
:1001F000020000020100327002000000000002370C3
:10020000000000000000000237000000000000002370C8
:10021000000000000000000237000000000000002370B8
:10022000000000000000000237000000000000002370A8
:100230000000000000000002370000003CB70E03C4A9BA
:100240001BF1FE2CCAEA2BC93A2C3D87C2C104CD22
:10025000C80B2A463D2BCD714EB7CA312CCD344F39
:10026000C3DF043D322C3D2A463D7E2322463DFE1F
:1002700021D2352CC9CDC80BFE28C29D04CD290B37
:10028000FE27C29D04CD550BC29D04FE27C29D04CE
:10029000CD290BFE29C29D04CD400B3AEC3CB7C0E2
:1002A0003AE93DFE06DA782C3E0611EA3D215D3F33
:1002B000477EB7C2B5041A77231305C2842C70C9D0
:1002C000CDD42CCDC80BFE2FC29D04CD550BC4CC74
:1002D0002CFE2FC29D04CD400BCDFC0C237EE6D01E
:1002E000C2B504E57EF62477CD3227E12B22DA3D34
:1002F0003E0332D13D21000022D23DC3B126F53E5E
:10030000132E93DF1C93AE43DB7C8C1C3C70411A0
:100310008000CD550BC2062DF5B7D5CDFC0CCD1503
:100320002DD17EB277237EE664C20C2D7EE603B328
:1003300077F1FE2CFFFF2CC9CD9D04C3002DF610D4
:1003400077CDB504C3FF2C7EE67FFE42D8AF77E5BC
:10035000AF237723772377E1C9CD550BCD15057EE4
:1003600087D4C104237EFE10CA3E2DFE0FC4C104F3
:10037000118004C3E02C22433DCD6D2D3A113E3255
:10038000313DFE55C878E680C2AF0478F6203230A1
:100390003D2A433D223F3DCDDB0DEB78C3341BCDE1
:1003A00083203AC23EB7C8C3CD0422433D7EF680C7
:1003B000777C32313DCD6D2D78E680C2AF042A4383
:1003C0003DCD152D237EE694C2B5047EE640B0F601
:1003D0002077237323722 3D5EB2ADE3DEB73237240
:1003E000E1C3341BF5CDB84B3AFA3FB7C4772F3A87
:1003F000F33CB7C4A82FF121EC3C347E3DC25A2E09
:10040000215D3F7EB7C2E22D21313E7EB7C2E22D93
:1004100021D5402301060 0115D3F7E23FE20CA0442
:100420002EFE09CA042EB7CA042EFE0DCA042E12CF
:1004300013040DC2E82D21563F7023223F3D0E02CA
:10044000CDA91BCD322721354F221B40CDC40CDA5C
:10045000412E223F3D7EE67F77237EE640C26B2F12
:100460007EE604CA1A2E235E23560105 00CDA91B81
:10047000C31A2E2AD83DEB010A00CDA91B010D019C
:100480002AD63DEB7BB2C4A91BC36E012A463DF5BB
:10049000D48320D5C5CD2B1921FFFF22343D223630
:1004A0003D7D322F3DCD701A21F42FCDD51A213349
:1004B0003D343421723F3E05CD973BCD5A1A3A3335
:1004C0003DFE38D4701A21333D343421E92FCDD587
:1004D0001A21B43F3E03CD973BCD5A1ACD842F2AF3
:1004E000ED3C7CB5CACB2EE5CDDF1AE13AB4403CF9
:1004F000325B3FC4DF1AAF325B3FC3D12E214C2F9A
:10050000CDD02F214F2FCDD02F2AEF3C7CB5CA065E
:100510002F3E2CCD764C3AB4403C3E2CC4EE4AE5FE
:10052000CDDF1AE13AB4403C325B3FC4DF1AAF3250
:100530005B3F215F2FCDD02FCD842FC1D1F1D2148D
:100540002F0600110000CD831B0E0ECDA91B2AC360
:100550003E7CFEF8CA2C2FAFCD461CC31C2F010FCA
:1005600000CDA91B0600CD2B1C3A8C40B7CA432FE7
:100570003E80CD764CCDD84BCD1B4CC300014E6F86
:10058000020466174616C2065727 26F7228732955
:1005900002057617 26E696E672873 29000E003A59
:1005A000D13D47CDA91BC31A2ECDCD2F21862FCDEE
:1005B000D02FCD291BC3B42F524550542F49525030
:1005C0002F495250432F4D4143524F00556E746591
:1005D000726D696E617465642000CDCD2F21DD2FB1
:1005E000CDD02FCD291B3E0DCD5A1A3E0ACD5A1A19
:1005F0003AB4403CC83E0DCDEE4A3E0AC3EE4A2115
:100600009A2FE5CDD51AE13AB4403CC8C3CC464355
:100610006F6E646974696F6E616C0053796D626F9F
:100620006C733A0D0A004D6163726F733A0D0A00E4
:1006300021E2FF39EB2A2940CD8D0DD214343AFA4C
:100640003FB7210000222340222 5402AF83FC22341
:10065000302A29402B3C32FA3FAF32FB3F32054073
:10066000EB2A1F4024CD8D0DD23E30EB22F83FC93E
:1006700025EBE5CD4F3BE1C32E30CD1505C07EB750
:100680003CF03DF5E610CA72303A05403C32054078
:10069000F1E608EE08C03A0540B7C83A05403D32D9
:1006A00005403CC9237EFE1BC25E303A0540B7C2FE
:1006B0005E303A0F40B7C25E30F137C922F83F3A98
:1006C000FA3F3D32FA3FC9CDEA0AFE26C2D1302AAE
:1006D000463D7EFE20CACF30FE09CACF30E5C5CDEB
:1006E000550BCDDD30C1E122463DC2CF303E263232
:1006F000FC3FC33E31FE26C2D1303AFC3FB7C2D6E2
:10070000303E26CD3B3AB7F8F5AF32FC3FF1C92A6F
:1007100007400 6007EB7CA0B3111E93D1ABEC20080
:10072000314F2B131ABEC200310DC2F03078F68063
:10073000BFC92B7EFE07D2003104C3E2303A10401D
:10074000B7C02A114006C07EB7CA3C3111E93D1A34
:10075000BEC231314F2B131ABEC231310DC223310B
:10076000AF78C92B7EFE07D2313104C315313CC9A5
:100770002A463DE5CD550BF5CDDD30C2773147F149
:10078000E1F57E23FE20CA5C31FE09C26431E5CD6D
:10079000D130E1C35031 78CDD130F147F5F1C2C34A
:1007A00030FE26C2C330C3360BF1E1F522463DCD03
:1007B000EA0AFE20CA9031FE09CA9031CD360BC339
```

:1007C0009631CDD130C37D31CDB10BC26B31C3A5D4
:1007D00031CDB10BFA6B31CDD130C39F31CDEA0AA7
:1007E000FE3BCAC731C3B931CDC63ACDD130FE0DBB
:1007F000CA9E3ACDEA0AC3B931CDC63ACDC63AFE51
:1008000020CACA31FE09CACA31B7CDED3A22254005
:10081000CA9E3AFE0DCA9E3A3E0DCD3B3AC39E3A61
:10082000E5F53A1040B7CAFF31D5EB2A1D4019341F
:10083000D1F1E67FF587FA49322A0B407EB7CA38F4
:1008400032F1C547042B05CA23327ED52F5F16FF30
:1008500019D1C314327EB7CA46323D472B7E0405F8
:10086000CA4632CDD83305C32A32F12B3C3DCA43A8
:10087000322BC33B327EE1C9C1E1C93E2ECDD83314
:10088000CDD833F1E63FC52A18404F06000944CDC4
:10089000141945CD1419C1E11B1AC9E5CD550BE159
:1008A000C48232F511E93D1A3C4F1A77132B0DC261
:1008B0007832F1C9FE0DC8FE3BC8D1C39D040600C5
:1008C000C5E52BCDC80BFE27CA7D33FE22CA7D337A
:1008D000FE3CCA9B33FE3ECAA633FE25CAD332FE77
:1008E0002CCAB033FE20CAB033FE09CAB033FE3B77
:1008F000CAB033FE21CC290BFE0DCACD33772BCDE8
:10090000EA0AC39432227B33C5017133C5CDC428B2
:10091000EB0E003A113EFE20C236333AF13CFE1097
:10092000CA2E33FE08CA0E3301F6FF50580913DAF7
:10093000FB32E5EB7CB5C4F9323E3AC181C3663384
:10094000AF29CE30CD52333E05F5AF0603298F05D2
:10095000C21B33C630CD5233F13DC21733C33633D9
:1009600044CD3E3345CD3E330C0DC03E30C36633DF
:10097000781F1F1F1FCD473378E60FC630FE3ADAC7
:100980005233C6070C0DC26633FE30C84FFE3ADA4A
:1009900066333E30CD663379E52A7B33772B227B75
:1009A00033E1C9C1CD360B2A7B33C3CD3200004FB2
:1009B000772BCDEA0AB9CA8F33FE0DCAD233C37E74
:1009C00033772BCDEA0AB9CA7E33C394320405CA01
:1009D000A233772B04C3CD3205CACD32FAB533C367
:1009E000CB320405C2CB32D17B953D12C1EB2A46F6
:1009F0003D2B7EFE20CC360BFE09CC360BEBC9041A
:100A000005CAB533CDE504C3B533F5E521CA3DCDFF
:100A10008D0D02EB3323360D2BEBE1F1C9E1F11251
:100A200013C9CD3E31FE26CAF033FE3ACA3E31FE2E
:100A300021D0FE0DC8F5CD0E0CCA1034CD1505CA57
:100A4000C718F1C33E31211A34C3720D3F5374618C
:100A5000636B206F766572666C6F772C2074727989
:100A6000206D6F72652050207377697463686573B9
:100A70009A030000C4283A113EFE20CA4F341100E8
:100A800000EB22FD3FCDFE2FC1D1E1016334C5D57E
:100A90003E0DC35C04C1015E34C5CD550BFE3ACC9E
:100AA000550BCD4830CA843411483D1ACD3B3A131A
:100AB000FE0DC27934C9AFCD3B3ACD9E3AC1D1E1EA
:100AC00021CC02E5D52A2340E5E52AFD3FE521CCEE
:100AD00002E521A634E5C5C9CDF934C1E1D1CD8DFA
:100AE0000DC2D5343A0640B7C2BE3478B1C2D5344F
:100AF0002AF83FE5CD9439E1CD8A30AF320640D1B6
:100B0000D52AFF3FE5EBE9D5CD723AB7CA083511D2
:100B1000483DCD883ACDD833FE0DC2E034E5C52A34
:100B20000140E52A0340E52AFF3FE9D1E122FF3FEA
:100B3000E1220340E1220140EBE90B626BC3AB34DD
:100B40003AFA3FB7CAE504320640C1E1D1112B356C
:100B5000D5E5C5AF320540C3400BC3C1043A0640DA
:100B6000B7CA8A35C101DE01C5CD550BFE3ACC5559
:100B70000BCD1505C0B7F04FE608C25E3579E6101B
:100B8000C2663579E620C26E3579E640C27B35C94A
:100B90003A05403D320540C93A05403C320540C95E
:100BA0003A0540B7C03AF33CB7C8C3EA283A054013
:100BB000B7C0237EFE08C83EFFC35029C1D1E12142
:100BC000CC02E5D5C5C987F5CDFE2F220740CD69CA
:100BD000324F3A113EFE20CAB0352A0740CD8A3046
:100BE000F1C97936002BFE2CC49D04F1F5CAEC3511
:100BF000CD290BFE3CC49D04F177E5F50E002B3AA0
:100C0000113EFE20C24736F1F547CAFA35CD8C3287
:100C10000CFE0DCA4436FE3ECA4736C3DB35CD2333
:100C20000BD63C320E40CCEA0AC3C635CDEA0AFEEA
:100C30000DCA3D36F53A0E40B7CA1F36F111473698
:100C4000D5FE20C8FE09C8FE3BC8FE2CC8D1C3375C
:100C500036F1FE3CCA3336FE3EC237360405CA477B
:100C60003605C3373604C337360C772BC3FA353A0B
:100C70000E40B7C2740A01000436002BCD2E307826
:100C8000B7C49D04F1E122094026006922FD3FC15D
:100C9000D1E1016D36C35C34AFC23E01C39435C1AE
:100CA000015E34C52A25403E01321040E5CDF033C7
:100CB000F5CD4830CAB136F1E1FE0DCAB631FE3B82
:100CC000CAAB31FE27CAA136FE22CAA136CD3E31BB
:100CD000C3873647CD9530FE0DCAB631B8CA9B36AC
:100CE000C3A236F1E1222540AFCD3B3ACD9E3AC1B9
:100CF000D1E121CC02E5D52A2340E5E52A0940E5EA
:100D00002AFD3FE521CC02E521DC36E5C5C9CDF958
:100D100034C1E1D13E01321040220B40E1CD8D0DB6
:100D2000C20D373A0640B7C2FD3678B1C20D372A38
:100D30000B4023237EFE0823D202372BC3C134EBA2
:100D4000D5CD723AB7CA343711483DCD723AB7FCA7
:100D5000EE31CDED3ACDD833FE0DC21937E52A0B71
:100D600040E5C5C3ED340B626BD1C3F136CDC80B82
:100D7000FE0DCA9D044FCDEE4ACD290BFE0DCA567D
:100D800037CDEE4AB9C247373E0DCDEE4A3E0ACDC9
:100D9000EE4A3A113EFE20C0C3400BCDC80BFE0DFB
:100DA000CA9D04320D404FCDEA0AFE0DCA8437B900
:100DB000CA400BC37537E1D1C1018D37C35C34C163
:100DC000015E34C521483D3A0D404F7EB9CAA53772
:100DD000FE0DC823C39937C1D1E121CC02E5D5C5A9
:100DE000C9B7CDD40D2322F63F7EF62877CDFE2F4E
:100DF0002207400E00C5CD6932C10CFE2CCAC33794
:100E0000AF772B320F403215403C772B2211402216
:100E10001340360079321A40CD3B3AAFCD3B3AC150
:100E2000D1E121F737E5D5C5C9C1015E34C52A2511
:100E300040E5AF320F40321040CDF033F5CD4830B1
:100E4000DA1C38CA4F38F1320F40E1C38736F1CD92
:100E5000550BC49D042A1340F5C231383A15403C65
:100E6000321540011E93D1A3C4F1A772B130DC2374A
:100E7000383600221340F1FE2CCA1D38E1222540ED

:100E8000C9F1E1AF222540CD3B3ACD9E3A2A23401D
:100E900011050019EB2A1D40193A1540772A234005
:100EA000EB2AF63F23D5E55E23567AB3C49439E1A5
:100EB000D17323722A0740CD8A30C1D1E121CC02FF
:100EC000E5D5C5C9E537CD930DCDFE2F36002B36C0
:100ED00001220B402B0E00CD8C32470CCD360BCDB2
:100EE000C80BFE0DCACD38FE3BCACD38FE2CCAA5B4
:100EF0003878FE20CAA538FE09C4CD04C3A538E35E
:100F000023235E2356EBCD883AE3B7CAEA38B9CA41
:100F1000EA38DAEA3836002B0CC3DC3836002BCD41
:100F20002E30E1C1CD883AE52A1640E5C54F0600CE
:100F300009221640C12A0B40E521CC02E5111139E6
:100F4000D5C5C9CDF934E1220B40E1221840E1AF0B
:100F5000321040CD723AB7CA493911483DCD723A84
:100F6000B7FCEE31CDED3ACDD833FE0DC22B39E5CD
:100F70002A1840E52A0B40E5C3ED342A0B4023AF85
:100F8000320640C3C6347D935F7C9A57C93AE43D2C
:100F9000B7C2C704CD83203A113EFE20C032E43DE3
:100FA00078E680C29D0478E60332E73D2AD23DEB25
:100FB000CD5439EB22E53DC93AE43DB7CCCD04AF81
:100FC00032E43DC3400B2121404E73234672CDA62F
:100FD00039CDAF39712370C92A1D40195E23562BB4
:100FE000C92A1D401923235E23562BC92A21407D7F
:100FF000B4CACF39EBD5CDAF39EB222140D1C3FBF9
:10100000392A1F40112000EB19221F40D5EB2A2955
:1010100040CD8D0DD1DA493B2AF83F253AFA3FB74A
:10102000CD8D0DDA493B2A1D40EBCD5439D5CDA6E7
:1010300039EB2A2540EB7BE6E05F7BB2C20F3AD169
:10104000D5732372233E00772377CDAF39D1CA25DC
:101050003A732372C32A3AEB222340EB2A2340D56A
:10106000EBCDA639D17323727BF6045FC9D5F52A7F
:101070002540EB7BE61FCCBA392A1D4019F1F577E4
:101080007BE61FFE1FCA573A13CC613AEB2225407C
:10109000F1D1C97BE6E05FCDAF397AB3CABA391373
:1010A000131313C9D5EB2A1D40EB7DE61FC2823A0C
:1010B0007DF6046FEB197EEBD1C9CD723AF5D5EB15
:1010C0007BE61FFE1FCA973A13CC613AEBD1F1C9F0
:1010D000EB7BE6E05FD5CDAF397BB2C1C8AF7723FC
:1010E000772A1D4019732372C5CD9439C12A234034
:1010F000EBCDA639712370C92A2540D5EB7BE61FBD
:101100001BFE04CCE13A2A1D40EB222540EB197E60
:10111000EBD1C97BE6E05FCDA6397BF61F5FC9D571
:10112000F5EB7BE61FFE1FCAF93A13CC613AEBF1EF
:10113000D1C92A1F40EB2AF83F3AFA3FB7C2123B07
:101140002A294025CD5439DA6F0D7AB7CA6F0D1FA1
:10115000577B1F5FD52A1D40EB2A1F40CD543942D3
:101160004BD12A1F40EB19221F4078B1CA453B2BB7
:101170001B1A770BC3383B221D40C9CD4F3BC3CF51
:1011800039D52A413DEB2A1D40CD5439DA6F0D7A0D
:10119000FE03DA6F0D1F577B1F5FE1C5E52A1D4077
:1011A000EBE3CD5439424BD12A1D40E52A413D198C
:1011B000E5221D4009221F40E1D178B1CA953B0BC1
:1011C0001A772313C3883BC1C932C13E32C23E4F96
:1011D00006215E235623E5C5CD873BC1E105C2A07C
:1011E0003B3AC13EB9C45A1AC9010000C57AB3CA14
:1011F000C718EBE55E23567BB2C2C03BE17DB4C8A5
:10120000CDE63B2B2B562B5E7BB2CACA3BAF772376
:10121000772B2B2BE5C3C03B010400094623223F5B
:101220003D7EE640C0237EE680C4D43C7E235E2320
:1012300056C5E547E608C2353CC5CDC03CF15FE682
:1012400080C27F3C7BE604C2853C7BE640C4903C88
:101250007BE6A0CA883C7BE6035F160021661B196B
:101260007ECD764CCD7A3CE1C1232323C57E23CDB0
:10127000764C05C23B3CC13E1090C24C3C3C47CD35
:10128000753C05C24D3C21C13E35C26D3C3AC23E63
:1012900077CD5A1A21333D343A323DBECC701A2AEA
:1012A0003F3D7EF64077C93E20C37C3C3E09C37675
:1012B0004C3E2ACA3E4DCA3E43CA3E55CD764CC32B
:1012C000323CD5C52A3F3DE5237BE603470E072385
:1012D0005E235623D55E2356EB22DE3DD1CD831B04
:1012E000E1223F3D237EE620C4A91BC1D13E49C374
:1012F000764C21113E220F3ECDC9182A0F3E3600F2
:1013000021113EC3D51AC5E57EE603470E06235ECE
:101310002356CDA91BE1C1C9450000000100020010
:10132000000000000A0000000000000000000000B3
:1013300000000000000000000000000000000000AD
:10134000000000000000000000000000000000009D
:10135000000000000000000000000101002100006A
:1013600001FF00003C14FFFF01000000000000002E
:101370000028509C5C0000E54D3D09454E440D0D94
:101380000D202F2E6C6E70726D2F0D0D2C313132A1
:101390002C3131372C3131362C3130322C31303543
:1013A0002C3130382C3130312C33322C31302C3040
:1013B0000D0D2C33320D0D0D0D000000000000004E
:1013C000000000000000000000000000000000001D
:1013D000000000000000000000000000000000000D
:1013E00000000000000000000000000000000000FD
:1013F00000000000000000000000000000000000ED
:10140000000000000304000071130000905C905C79
:10141000B753552200000000000000002020202OCB
:101420002020202020202020202020202020002ODC
:1014300020202020202020202020202020202020AC
:1014400020153E3133314400342120202020202O3B
:10145000202020202020202020202020202020208C
:10146000202020000000000000000000000000001C
:10147000000000000000000000000000000000006C
:10148000000000000000000000000000000000005C
:10149000000000000000000000000000000000004C
:1014A000000000000000000000000000000000003C
:1014B000000000000000000000000000000000002C
:1014C000000000000000000000000000000000001C
:1014D000000000000000000000000000000000000C
:1014E00000000000000000000000000000000000FC
:1014F000008181540303O0FF000800FBF20000009C
:1015000000000000000000008004008O0A000800C5
:1015100008000000000000000000000000000000C3
:1015200000000000000000000000000000000000BB
:1015300000000000000000000000000000000000AB

```
:1015400000000000000000000000000000000000009B
:1015500000000000000000000000000000000000008B
:1015600000000000000000000000000000000000007B
:1015700000000000000000000000000000000000006B
:10158000000000000000000000062006A82100005A09
:101590004150445354000000000000000000000000CF
:1015A0000000863F0000000000000000000000000076
:1015B000000000000000000000000062500000000079
:1015C00000000000000000000000000000000000001B
:1015D00000000000000000000000000000000000000B
:1015E000000000000000000000825000000000000029
:1015F0000000354F414F4D4F594F654F4B51000043
:10160000714F804F000000007D4F894F1650000011
:10161000A24F0000BC4F954FED511D54000000003B
:10162000000000000023500000685004F000FF00009C
:1016300000FC01CC02113900004F0000083F000AE
:10164000000010100F000F000000000000019C5CEDD2
:10165000A08DA12000000000005F305F051410716
:1016600051420051430151440251450351480045134
:101670004C05514D0662535006635053570651496D
:1016800008515209624243006244450262484C04D8
:1016900062414606 6A4958446A495964724E5A0082
:1016A000715A01724E43027150067250 4F047250CB
:1016B000450500C003F30001000001000111000016
:1016C0004D00000000005A4150445354415452 45CB
:1016D0004C0004C03AC2009F01A001A1010000001B
:1016E00000000000003A005A41504453544154500 5
:1016F000524E000000000000000000000000000004A
:101700000000000000000005A415044535441546E
:1017100041534D0104807397019801990 19A019BEF
:1017200019C019D019E01730000000000000000006B
:101730000000000000000000000000000000000000A9
:1017400000000000000000000000000000000000099
:10175000000000000000000000000000000000A017E
:101760004150445354415441534D52454C435246C9
:1017700050524EA40000C8C9EA08A9CBF19B512CD5
:1017800008CA0A4929CA9193813C8CA0AAA8A6BF122
:10179000099D0BC8CA686829C8D1D0000A9A8292901
:1017A000CBF1DA709CA0A4929CA88B1D200CCA0AD5
:1017B0004929CA8A91DED09CA48A8288A0831DF41C
:1017C00008CA68A8A96A0831D9E09CA68AA8AAA074
:1017D000931D2312CA6A882A88AA719CA09CA6A875
:1017E000A40682A9197212CA6A8A4869AA119D91AF
:1017F0002CA6A8A486A0B319C10BCA6A8A4988A9D5
:10180000D19740BCAA9C8E8AA8871D1D13CAAA68BE
:1018100028E8ABF38000009E1A919D11265C9A99EE
:1018200019A80B65C9C8B19F10765C9EA519BA08A6
:1018300065CA49B191E1385CA682AD1D2711C8285F
:101840006A89CA6B319D700C82A0AAA886BF1D60F0
:1018500003C84AA9298888D1DEA06C84AA929888F6
:101860009F194113A8AB092A8BF194F0BC8C8E8A86
:10187000A8A6BF19A00000000000000000000000A2
:1018800000000000000000000000000000000000058
:1018900000000000000000000000000000000000048
:1018A0000000000000000000000000000000000038
:1018B0000000000000000000000000000000000028
:1018C0000000000000000000000000000000000018
:1018D0000000000000000000000000000000000008
:1018E00000000000000000000000000000000000F8
:1018F00000000000000000000000000000000000E8
:1019000000000000000000000000000000000000D7
:1019100000000000000000000000000000000000C7
:1019200000000000000000000000000000000000B7
:1019300000000000000000000000000000000000A7
:101940000000000000000000000000000000000097
:101950000000000000000000000000000000000087
:101960000000000000000000000000000000000077
:101970000000000000000000000000000000000067
:101980000000000000000000000000000000000057
:101990000000000000000000000000000000000047
:1019A0000000000000000000000000000000000037
:1019B0000000000000000000000000000000000027
:1019C0000000000000000000000000000000000017
:1019D0000000000000000000000000000000000007
:1019E00000000000000000000000000000000000F7
:1019F00000000000000000000000000000000000E7
:101A000000000000000000000000000000000000D6
:101A100000000000000000000000000000000000C6
:101A200000000000000000000000000000000000B6
:101A300000000000000000000000000000000000A6
:101A40000000000000000000000000000000000096
:101A50000000000000000000000000000000000086
:101A60000000000000000000000000000000000076
:101A7000000000000000005A0120482C2E313432B2
:101A80002B31300D0A09505553482048 0D0A09469C
:101A9000554E43096670757 4735F0D0A0943414CD6
:101AA0004C2066707574735F0D0A09504F502044C6
:101AB0000D0A09504F5020440D0A094C5849204 83E
:101AC0002C310D0A0950555348204 80D0A09465536
:101AD0004E4309657869745F0D0A0943414C4C20F7
:101AE000657869745F0D0A09504F5020440D0A094A
:101AF0005245540D0A2E3134332045515520300DB6
:101B00000A2E3134323A0D0A0944422031302C3841
:101B1000352C3131352C39372C3130332C313031B3
:101B20002C3538 2C33322C31302C302C3132322CB5
:101B300039372C3131322C3130302C3131350D0ADE
:101B40000944422031313 62C39372C3131362C338F
:101B5000322C33322C3130352C3131302C31313282
:101B60002C3131372C3131362C3130322C3130356B
:101B70002C3130382C3130312C33320D0A094442AB
:101B80002033322C3131312C3131372C3131362C5C
:101B900031313 22C3131372C3131362C3130322C3D
:101BA00031303 52C3130382C3130312C33322C312E
:101BB000302C300D0A09434F4D4D4F4E202F2E6CC7
:101BC0006E70726D2F0D0A094453203 40D0A0945B9
:101BD0004E440D0A1A1A1A1A1A1A1A1A1A1A1A1A24
:101BE0001A1A1A1A1A1A1A1A1A1A1A1A1A1A1A1A55
:101BF0001A1A1A1A1A1A1A1A1A4457202E313493
```

```
:101C0000330D0A094C5849204B2C2E342B32320D02
:101C10000A0950555348204B0D0A094C5849204894
:101C20002C2E3134322B300D0A0950555348204BA0
:101C30000D0A0946554E43096670757474735F0D0AA7
:101C40000943414C4C2066707574735F0D0A09504E
:101C50004F5020440D0A09504F5020440D0A094CA2
:101C60005849204B2C2E342B32320D0A0950555336
:101C700048204B0D0A094C5849500D3D5A415044DE
:101C80005354415F2E41534D0D0A000000000000F2
:101C900000000000000000000000000000000000044
:101CA00000000000000000000000000000000000034
:101CB00000000000000000000000000000000000024
:101CC0000000000000000000000000058463F436F85
:101CD0006D6D616E642065727726F72003F46696C53
:101CE00065206E6F7420666F756E64003F43616E91
:101CF0002774206568746572206669C65007EE6E7
:101D00007FC0CDEE4A23C3CC46219B46C3E646217D
:101D1000AA46C3E64621BA46CDCC46C358474734FF0
:101D20004D53434E00000000000000000000000082
:101D3000000000000000000000000000F246222C1D
:101D40004111F2461AB7CA3C473A0B47473A0A478D
:101D50004F2A06002E001ABEC2324723130DC2249A
:101D600047C33C47130DC2324705C8C31847AF32B8
:101D7000F2462A06002BF92B2B2282402A2C41E521
:101D80003A8E40B7C20000328540 2A8240F9CD48DE
:101D90004A3A4946FE0DCA5847AF3292403289400E
:101DA00032904032 8F40328C40328D40328B403204
:101DB00091403C328A40328840 01D746C5AF3281DB
:101DC00040CDE148D8113841CDC448112D411AFE0B
:101DD00020C2A7473E80328140E5219340CDB848DC
:101DE000E13E20322D41323541AF322C4179D62CA3
:101DF000B7328B40C2D1473A8140EE80328B40CD22
:101E0000E148D8113E413A8C40B7CADE47113B4108
:101E1000CDC448112D413A2C413287401AD6203288
:101E20008640C2FB473A8140C6403281 40E521B43A
:101E300040CDB848E179FE3D37C0CDE148FE0D37D1
:101E4000C0110601CDC448112C411A13B7FA23481A
:101E50001AFE2037C8E521D540CDB848E13A814087
:101E6000872193 40DC98488721B440F53A8C40B7ED
:101E7000CA534811BD40013B413E03F50A1213030A
:101E8000F13DC24948F1DC98483A8940B7C26848F8
:101E90003A8640B7C268483A87403289400E19CD29
:101EA000500F50E0DCD0500F15F0E0ECD0500AF5E
:101EB000328000CD844BCD254BCD3B4BE12A824077
:101EC00023233A8A40328540 47C9F5112C410E0937
:101ED0007EB7C2B2481AB7FAB2481A77231 30DC2B6
:101EE000A848F1C90D2313C3A8481B060C1A772371
:101EF0001305C2BB48C93A8440B7C8E5213541 7EC5
:101F0000FE20C2DF4806031AE67F77231305C2D5F9
:101F100048E1C9CD2A4AFE3A373E00C205497 8B7A2
:101F2000CAE148EBCD074A4F703D79C22649FE5BDE
:101F3000D0FE41D8D640EB322C41D42A4A78FE0B51
:101F4000DA1349060BC5EBD5112D410405CA6F49BB
:101F5000CDD74A1213C31A49FE54C23F49CDD74ABE
```

```
:101F6000FE5437C0CDD74AFE5937C09FEBB7C305E3
:101F700049FE4CC25949CDD74AFE5337C0CDD74A46
:101F8000FE5437C03EFEEBB7C30549FE5237C0CD05
:101F9000D74AFE4437C0FE5237C03EFEEBB7C305FA
:101FA00049E1C13E0A90DA8049EB3620233DF278C0
:101FB00049EB790600D62E328440CC2A4AEBD51163
:101FC0003541 78FE04DA9849060304 05CAA549CDCF
:101FD000D74A1213C39949E179D62FB779C0CDD723
:101FE0004AFE4CC28E49328940CDD74A4FC3A649AA
:101FF000FE4EC2C949329040C3B749FE4FC2D449D0
:10200000328F40C3B749FE52C2DF49328B40C3B75B
:1020100049FE43C2ED49328C40328940C3B749FE84
:102020004DC2F849329140C3B749FE49C2034A3212
:102030008840C3B749FE58C2104A3EFF328D40C3A4
:10204000B749FE5AC21C4AAF328840C3B749FE5056
:1020500037C03A8A403C328A40C3B7490600E5CD02
:10206000D74AFE5BD2484AFE30DA484AFE41D244A3
:102070004AFE3AD2484A04C32D4A4FD1C9C5D52198
:102080008007E3600B747CA7A4A237EFE20C263AC
:102090004A05C3554A1148467828041213230 5CA32
:1020A000744A7EC3694A328E40C39A4AAF328E4028
:1020B0003A8540B7C28D4ACD1B4B3E2ACDEE4A0E23
:1020C000A114746CD05003E0ACDEE4AD1C13A4835
:1020D0004621 4946E5229946856F3E008C67360DBC
:1020E000233E0A77E13A8540B7C2D64AE521494600
:1020F0007EFE0DCAD54AD661DAD14AFE1AD2D14A3D
:10210000C6417723C3BE4AE1C97E23FE20CAD74A0F
:10211000FE0ACAD74AFE0DC2154B23229946C9F1C1
:10212000E5D5C5F50E02E67F5FCD0500F1C1D1E131
:10213000B7C9E52A99462B7EE67FFE0A23CC4B4A97
:10214000232299462B7EE1FE1A37C8B7C93E0DCD32
:10215000EE4A3E0AC3EE4AF5C5D5E51145422100D7
:10216000022434221B4403A8940C34E4BF5C5D5C5
:10217000E51143412100022414121934 03A8B4027
:10218000B7CA7F4BE50E1ACD0500E17EB7FA7F4B4B
:10219000CDA14BD50E13CD0500D1D50E16CD050022
:1021A0003CCAE346E1CDA14B0E0FCD05003CCADD94
:1021B00046E1D1C1F1C9F5C5D5E52100022245446A
:1021C0001147440E1ACD050021D5407EB7FA7F4B4A
:1021D000C3734BE5D5110C0019AF1604772315C254
:1021E000AA4B1110001977E1D1C9F5D511D5401AC4
:1021F000B7FAD84BC5E5D511 47440E1ACD0500D125
:1022000001C5E50E10CD0500E1C1D1F1C9F53A894E
:1022100040B7CAB040D53AB4403CCAD84BFA644C2F
:102220003E0DCD764C3E0ACD764C3E1ACD764CE531
:102230002A4342114542C501B440CD4E4C1145429E
:102240000E1ACD0500C1E111B440C3CF4BF53A8B56
:1022500040B7CAB040D53A9340B7FAD84B3E1ACDEA
:10226000DD4CE52A41411 4341C5019340CD4E4C1F
:10227000011434 10E1ACD0500C1E1119340C3CF4B6C
:102280007CB5C870E67FCA594CC6801717E603297E
:1022900046069C3AD4C3E0DCD764C3E0ACD764C84
:1022A0003E0CCD764CD1F1C9F53A8940B7CAB04859
:1022B0003AB4403CCAED4AFA554DE3E5D52A4342CB
```

:1022C0007CFE02CCA54C2322434211444219D1F199
:1022D000F5E67F77F1E1C91145422184403E04F5AE
:1022E000C5D5E50E1ACD0500D1D50E15CD0500B723
:1022F000C2A14DD1E101800009EBC1F13DC2AD4C5D
:10230000210000C91143413E02219340C3AD4CF569
:102310003A8B40B7CAB0403A9340B7FAED4AE3E582
:10232000D52A41417C3DCCD24C232241411142412E
:1023300019D1F177E1C93AD5403CCA004BFA904D2A
:10234000E5D52A45447CFE02CC254D232245441187
:10235000464419D1C3134B1147443E04F5D5C50E6D
:102360001ACD050011D5400E14CD0500C1D13DCACE
:102370004E4D21800019EBF13DC22A4D210000C9CC
:10238000F13E1A12C34A4DF1E5D5C5F50E05E67FBB
:102390005F219240FE20D2734DD60DCA714D3CCACA
:1023A000714D7E3D77347BFE09C2884D3E20CD764F
:1023B0004C7EE607C27A4DC38B4DCD0500F1C1D1ED
:1023C000E1C9E5D5C50E03CD0500C1D1E1FE1A373F
:1023D000C8B7C921C14DCDCC46D11AC640FE40C2B6
:1023E000B24D3E20CDEE4A21C74DCDCC46CD1B4B44
:1023F000C300004449534B20002046554C4C00007C
:1024000000000000000000000000000000000000CC
:1024100000000000000000000000000000000000BC
:1024200000000000000000000000000000000000AC
:10243000000000000000000000000000000000009C
:10244000000000000000000000000000000000008C
:10245000000000000000000000000000000000007C
:10246000000000000000000000000000000000006C
:10247000000000000000000000000000000000005C
:10248000000000000000000000000000000000004C
:10249000000000000000000000000000000000003C
:1024A000000000E5D5C5EB21CD4D131A1BFE3A3EC9
:1024B00000C28C4E1A13D640FE1BD2F04E13772367
:1024C00006081A13328440FE2ECAB74EFE21DAB730
:1024D0004E772305C2904E1A13328440FE2ECABE98
:1024E0004EFE21D2A54EC3BE4E36202305C2B74EA6
:1024F00006033A8440FE2ECACB4E1106011A13770A
:102500002305C2CB4E7011F14D0E1ACD050011CD31
:102510004D0E0FCD0500FEFFCAF04EAF32ED4D322D
:10252000EE4DC1D1E1C9E5D5C53AEE4D3DF21B4FA7
:1025300011F14D0E1ACD050011CD4D0E14CD050033
:10254000C6FFDA304F21F14D22EF4D3E7F32EE4D86
:102550002AEF4D7EFE1AC22B4F37C3304F2322EF96
:102560004DB7C1D1E1C9C9000000000150200700EA
:102570000000410000000001502000000000420067
:102580000000000150200100000043000000000195
:102590005020020000004400000000015020030011
:1025A0000000450000000001502004000000480029
:1025B00000000001502005009C6F4C00000000014D
:1025C0005020060039734DD4520000026020060EE
:1025D0004F2153503C50000003602006008CC25035
:1025E0005357000000000150200800509D49000092
:1025F000000001502009004F21520000000002603D
:102600002000000000194243000000000260200288
:102610005060444500000000026020040097D1484B
:102620004C6E530000026020060000CD41460000C1
:1026300000000268204400567A4958000000000259
:1026400068206400EB2249592F50000000027020DE
:1026500000C3CD4E5A0000000001702001004E9DC5
:10266000005A00000000027020020059114E430081
:102670000000000170200600CD4D50555500027002
:10268000200400EBCD504F00000000027020050038
:1026900019C95045000000000440286000825046DF
:1026A000554E43000000000640240200CD2945524B
:1026B000524E4F5F7E51000002C023000076502E24
:1026C00032CD5000000740240800003953595356BA
:1026D00045435FC652000002C023000094502E33D1
:1026E000000000000740247900E5CD4342554646EE
:1026F000535F0F54000002C02300000B3502E344C2F
:102700005300000840240200003953544442554607
:10271000535F2355000002C0230000D2502E358C99
:102720005100000740240600EB21434F4E444556 1C
:102730005F1356000002C0230000F2502E362C51C9
:1027400000000840240600040042444F534F5554F3
:102750005FF656000002C023000011512E37000022
:10276000000007402406009D1142444F53494E5F2C
:102770008257000002C023000031512E38CC58008F
:1027800000084024 0600EB2946494C454445565F65
:102790003858000002C023000050512E39000000BC
:1027A00000084024420000304445565441424C5FEA
:1027B0002E54000003C023000070512E3130000061
:1027C0000000084024580062004348414E544142F2
:1027D0005FC559000003C023000091512E31310024
:1027E000000000074024FA008CFC4249544D41503F
:1027F0005F4C5A000003C0230000B2512E3132005A
:1028000000000007402402 00B3CA4E53544154450F
:102810005FF15A000003C0230000D2512E31330073
:102820000000000940246400210154414 24C4550FD
:1028300054525F785B000003C0230000F2512E3138
:102840003431520000094024D60669234D41494ED7
:102850005441424C5F405C000003C023000014520E
:102860002E31350000000008402402005121 4D4166
:10287000494E5054525F00000000003C0230000 3650
:10288000522E313600000000094024020011754C20
:10289000415354 4D41494E5F0000000003C02300E6
:1028A0000057522E313794520000074024000269 2D
:1028B0002B524553554C545F0000000003C02300C9
:1028C0000079522E3138755600000740240200006E
:1028D000EB5245535054525F0000000003C02300E8
:1028E0000099522E313990530000074024 0200CD48
:1028F000584D415856414C5F0000000003C0230072
:1029000000B9522E32307755000007 4024AC0D52EA
:10291000C9534F555243455F0000000003C02300D8
:1029200000D9522E32310000000004402401 00532F
:102930002A4552525F0000000003C0230000F952F4
:102940002E32320000000004402402 00C9CD464966
:102950004E5F0000000003C023000016532E3233E8
:102960003B540000054024020056D5464F55545FA5
:1029700000000000 0003C023000033532E3234000057

```
:102980000000094024E803400053544154454E419F
:10299000045F000000003C023000051532E32356C
:1029A000000000000094024EC130000414354494F4B
:1029B00004E4E415F00000000003C023000073532E01
:1029C0003236D4530000094024020000014D415822
:1029D00041435444E535F000000003C023000095A4
:1029E000532E3237000000009402402007321 4DAD
:1029F00041585354415453 5F000000003C023006A
:102A0000B7532E323000000000005C0610000B747
:102A1000534D41494E5F015400004408 11E13B7DD
:102A2000532E5341560000000003C020FCFFB75353
:102A30002E3239E8560000034081F90DF2512E4C38
:102A4000540000000003C0211B00B7532E3330F99F
:102A50005800006C0611D13B7535553414 7455FE9
:102A600000000000002C021D402B7532E3100000044
:102A700000064081A000B350464F50454E5F000015
:102A800000003C0217F00B7532E3331B3560003E
:102A9000064081381 3B35046505554535F00000030
:102AA000000064081D700B35041505554435F0000A9
:102AB00000000540814113B350455849545F000060
:102AC000000003C021E300B7532E3332A8540000A6
:102AD00003C0211001B7532E33340000000003C09F
:102AE0002101 01B7532E3333000000003C0213A07
:102AF00001B7532E3335000000000 34081D112B3DB
:102B0000502E4D4CE054000003C0215701B7532E06
:102B100033370000000003C0214801B7532E33367D
:102B20000000000003C0218101B7532E3338 00009C
:102B3000000008C061271 1B7534143544E53594D0B
:102B40005F00000000009C061231 2B7535354415481
:102B5000455359 4D5F000000003C021CE01B7531B
:102B60002E34300000000003C021BF01B7532E33C4
:102B700039000000003C0215D02B7532E34315BE1
:102B800055000003C021FB01B7532E343300000071
:102B900003C021EC01B7532E3432000000003C3
:102BA000C0215A02B7532E3434D456000009C061F4
:102BB0009E09B7535345545550494E505F0000008D
:102BC00003C0217402B7532E3435000000000901
:102BD000C061A709B7535052494E5445 52525F0045
:102BE0000000003C021CB02B7532E343600000092
:102BF000009C0616003B7534255494C44464952ED
:102C0005F000000003C0219502B7532E34370047
:102C100000000003C021CB02B7532E3438000005F
:102C20000009C061EA06B7534255494C444F544825
:102C3005F00000009C061200CB7535052494E9C
:102C4000545441425F00000000003C020F6FFB75318
:102C50002E35302F56000003C0219603B7532E3572
:102C600032000000003C0218703B7532E35310026
:102C70000000003C0217105B7532E3533595600AB
:102C800003C021C303B7532E3535000000003F5
:102C9000C0218403B7532E35340000000003C02117
:102CA0005305B7532E353600000009C061ED0909
:102CB000B75352454144504149525F0000000000360
:102CC000C0215D04B7532E35370000000003C0213A
:102CD0002804B7532E35380000000003C0218405B6
```

```
:102CE000B7532E3439000000000084081B512B350AC
:102CF00046505249 4E54465F000000003C0215A1E
:102D00004B7532E35390000000009C061F408B73C
:102D100053534545 4B504149525F275900000340EA
:102D2000818B0E33532E4551000000003C021500B
:102D30005B7532E36300000000034081C90B1642
:102D4000532E4745000000003C0215005B7532E05
:102D50036312E57000003C0216505B7532E363398
:102D600000000000003C0216E05B7532E3632625 8B2
:102D70000000003C020F6FFB7532E3635585700029
:102D80003C0211707B7532E3637000000003C0D9
:102D90002108 07B7532E363600000000003C021E794
:102DA0008B7532E363800000000003C0216807B76B
:102DB000532E36390000000003C021AF08B7532E50
:102DC00037300000000003C021E207B7532E37312F
:102DD00000000000003C0214C08B7532E3732DD58E5
:102DE00000000034081F10779522E4F520000000 08D
:102DF00034081BA08B2512E524D000000003C0BA
:102E00021AC08B7532E373300000000003C021E483
:102E10008B7532E3734000000003C020FEFFB770
:102E2000532E3735005800003C0211609B7532E22
:102E3000373700000000003C0210709B7532E37360B
:102E4000B75B000034081521 2B7532E4C4500007F
:102E500000003C0217C09B7532E37380000000062
:102E6003C0216909B7532E37390000000003C0A1
:102E70219A09B7532E3830000000003C020000B
:102E8000B7532E383100000000003C0200000B707
:102E9000532E3832000000003C021D509B7532E4D
:102EA000363400000000074081CA09B35053545221
:102EB0004341545F9E58000003C020FEFEB7532ECE
:102EC000383400000000003C021FD09B7532E383507
:102ED000000000003C021100CB7532E383300004F
:102EE000000000740819D0B165346534 3414E465FF9
:102EF00000000000003C021490AB7532E38360000F5
:102F0000000640814F0B16534647455453 5F005F
:102F10000000034081A80B16532E4E4500000010
:102F2000003C0216D0AB7532E3837000000000798
:102F300040817 40B1653554E474554435F000000C3
:102F400003C021760AB7532E38380000000000372
:102F5000C021AD0AB7532E38390000000003C0214C
:102F6000F80AB7532E3930A55B0000074081C10B2A
:102F7000165353545 24C454E5F000000003C021CD
:102F8000CE0AB7532E393100000000003C021F80AE1
:102F9000B7532E39320000000003C021F80AB7539E
:102FA0002E39330000000003C0210B0BB7532E391C
:102FB0003400000000003C0210B0BB7532E3935003D
:102FC0000000000003C021570BB7532E39360000014
:102FD00003C0217B0BB7532E3937000000003DC
:102FE000C021840BB7532E3938000000003C021E4
:102FF000BB0BB7532E393900000000004C021070C69
:103000000B7532E313030000000004C021DC0BB774
:1030100532E3130310000000004C021070CB7539B
:1030200 02E31303200000000004C021070CB7532EAF
:1030300031303331 05A000004C020FCFFB7532E314A
```

:1030400030350000000004C021010FB7532E31308D
:10305000342E5A000004C021690CB7532E3130378A
:103060000000000004C0215A0CB7532E3130360046
:1030700000000004C021EC0CB7532E3130380000A2
:10308000000004C021960CB7532E313130000000EF
:103090000004C021870CB7532E31303900000000E6
:1030A00004C021E90CB7532E313131885A00000495
:1030B000C021160DB7532E3131330000000004C07B
:1030C00021070DB7532E3131320000000004C0211A
:1030D0004A0DB7532E3131340000000004C0216D79
:1030E0000DB7532E3131350000000004C0212C0EE5
:1030F000B7532E313136D35A000004C0218F0DB76B
:10310000532E3131380000000004C021B00DB753F8
:103110002E3131370000000004C021290EB7532E94
:10312000313139000000000004C021FE0DB7532E31AB
:10313000323000F5B000004C021560EB7532E3132DF
:1031400032000000004C021470EB7532E31323147
:10315000000000004C021000FB7532E31323300AD
:1031600000000004C021800EB7532E31323400001D
:10317000000004C021B60EB7532E313235000000D6
:103180000004C021A00EB7532E313236000000000DB
:1031900004C021B60EB7532E313237E35B00000472
:1031A000C020FEFFB7532E313239875B000004C0C8
:1031B000214B11B7532E313331000000004C021E0
:1031C0003A11B7532E313330000000004C021803
:1031D00011B7532E3133320000000007408172 12C4
:1031E00051535354524 34D505F000000000340813F
:1031F0009712B7532E4754000000000004C0000000 8F
:103200002F823382CD8F45FCFF210C00395E23D5
:1032100056EB2B110200EBCD0046CA2032CD2245E1
:10322000210E0039E57E23666F2323EBE1732372C1
:103230002109 34E5211000395E2356EB5E2356D5A3
:10324000CD585BD1D122251A7CB5C2843221230100
:10325000E521D834E5CD815ED1D1212301E52110CB
:1032600000395E2356EB5E2356D5CD815ED1D12148
:103270002301E5210A00E5CD8F5ED1D1210100E5A2
:10328000CDFB6FD1210E0039E57E23666F2323EB42
:10329000E1732372 21E734E5211000395E2356EBF8
:1032A0005E2356D5CD585BD1D122271A7CB5C2E812
:1032B0003221 2301E521E934E5CD815ED1D12123FD
:1032C00001E5211000395E2356EB5E2356D5CD81F2
:1032D0005ED1D1212301E5210A00E5CD8F5ED1D128
:1032E000210100E5CDFB6FD1210E0039E57E23667B
:1032F0006F2323EBE1732372210000EB21060039D9
:10330000732372C3153321060039E57E23666F23CC
:10331000EBE173237221060 0395E235621FF00CDB5
:1033200046CA3F33210000E521080 0395E2356DC
:10333000211400CD7E461111E19D173C30633210D
:1033400000EB21040039732372C35C33210400B5
:1033500039E57E23666F23EBE17323722104003984
:103360005E2356213200CD0046CA8633210000E597
:10337000210600395E2356211400CD7E4611291AFC
:1033800019D173C34D3321F934E5CD2C43D17D32AE
:10339000740A210135E5CD2844D17D32750A210713
:1033A00035E5CD2C43D17D32760A210F35E5CD2888
:1033B00044D17D32770A210000EB2104003973 23C8
:1033C00072C3D33321040039E57E23666F23EBE11A
:1033D000732372210400395E2356213200CD00464A
:1033E000CA6234210000EB21060039732372C30046
:1033F00034210600 39E57E23666F23EBE1732372E7
:10340000210600395E2356212300CD0046CA5F34D1
:103410003A740A6F2600E5210800395E2356EB292D
:10342000E5210800395E23562146 00CD7E46D1199C
:10343000117 80C19D1733A750A6F2600E521080 03E
:10344000395E2356EB29E5210800395E2356214 6D3
:1034500000CD7E46D11911790C19D173C3F133C354
:10346000C433CDA33B7D32241A7CB5CA7934211 8EC
:1034700035E5CDAC3BD1C3D03421780CE521740ABD
:10348000E5CD6535D1D17D32241A7CB5CA9A342177
:10349000 4035E5CDAC3BD1C3D034219A03E521368C
:1034A0003E5213A02E521780CE521740AE5CDEF28
:1034B00038EB210A0039F921740AE5219A03E52144
:1034C0003603E5213A02E5CD253EEB21080039F926
:1034D000210000E5CDFB6FD1C97200436 16E2774F6
:1034E0002066696E64200077004361 6E2774207740
:1034F0007269746520746F200045 52524F52232325
:10350000524541 4459004552524F522323005323
:10351000414D455F53232300496E707574206669E1
:103520006C652069732065 6D707479206F722069F5
:103530006E2077726F6E6720666F726D61742E00F9
:10354000436F756C646E277420627569 6C642052D9
:10355000657375 6C742F536F757263652074616247
:103560006C65732E00CD8F45F6FF21780A22740C0E
:10357000210000EB21050039732104003973 21007B
:1035800000EB210A0039732372C39B35210A0039ED
:10359000E57E23666F23EBE1732372210A00395E17
:1035A0002356213200CD0046CA7637210000EB2198
:1035B0000C0039732372C3C835210C0039E57E2312
:1035C000666F23EBE1732372210C00395E235621D1
:1035D0002300CD0046CA5837210600 39E5CDF23B1D
:1035E000D1CA6236210C00397E23B6C22D36210A9B
:1035F00000395E2356D5218937E5212301E5CDB376
:1036000047D1D1D12A760CE5219F37E5212301E569
:10361000CDB347D1D1D1210A00395E2356EB2234F4
:1036200032 1FFFFEB21040039 73C35F3621C33749
:10363000E5CDAC3BD1210C00395E2356D5210C00E1
:1036400 0395E2356D5210838E5212301E5CDB3475E
:10365000EB21080039F921FFFFEB21050039 73C385
:103660005837210600395E1600D5210E00395E2339
:1036700056EB29E5210E00395E2356214600CD7E0A
:1036800046D11911780C19D173210700395E160043
:10369000D5210E00395E2356EB29E5210E00395E57
:1036A0002356214600CD7E46D11911790C19D173CC
:1036B0002A760CE521740AE5210A0039E5CDF93AAC
:1036C000D1D1D1EB21080039732372210800395E72
:1036D000235621FFFFCDC645CA5537210600395E66
:1036E0001600D52A740CD173210700395E1600D557
:1036F0002A740C23D1732A740C232322740C2A7687

:103700000C2322760C11FF00EBCDE545CA5537217D
:1037100025308E5CDAC3BD12A760CE5210E00395E8B
:1037200023S6D5210E00395E2356D5216D38E5216B
:10373000230 1E5CDB347EB210A0039F921A138E592
:1037400021230 1E5CDB347D1D121FFFFEB210500B6
:103750003973C35837C3B935210500397EB7C26AFA
:10376000372104003978B7CA7337210500395E1648
:1037700000EBC9C38C3521D038E5CDAC3BD121FF5E
:10378000FFEB2105003973EBC92564207374617464
:103790006573207072 6F6365737365642E0A00250C
:1037A000642061637469 6F6E2F6E657773746174E2
:1037B0006520766 16C7565732063726561746564FC
:1037C0002E0A0050726F6772616D2072616E206FF9
:1037D0007574206F6620696E7075742066726F6DE7
:1037E0002066696C65206265666F72652073746 11E
:1037F0007465207461626C652077617320666 96C02
:103800006C656420757 02E00202028737461746 5C7
:10381000203D3D2025642C20696E707574203D3D4F
:1038200025642 90A0052657 3756C74207461626C9A
:1038300065206F766572666C6F77202D20746F6FD0
:10384000206D616E7920616374696F6E2F6E65778C
:103850007374617465206 36F6D62696E6174696F02
:103860006E7320696E20696E7075742E0028207347
:103870007461746520 3D2025642C20696E70757418
:10388000203D2025642C20636F6D62696E61746930
:103890006F6E7320757365642 03D20256420290AAE
:1038A000000A41206469666665726 56E7420636F04
:1038B0006D707265737369 6F6E206D6574686F6487
:1038C000206D757374206265207573656 42E0A001F
:1038D000546F6F206D616E7920737461746573200D
:1038E000696E20696E70757420666 96C652E00CDF6
:1038F0008F45F6FF210000EB21060039732372216A
:103900000000EB210A0039732372C31C39210A001D
:1039100039E57E23666F23EBE1732372210A0039B8
:103920005E23562A3403CD0046CAEC3A21060039FC
:103930005E2356D5210C00395E2356EB2911360340
:1039400019D1732372210000EB21040039732372 13
:10395000210000EB21090039732101 00EB2108004F
:103960003973210000EB210C0039732372210C0004
:10397000395E2356212300CD0046CAB43A210C00FB
:10398000395E2356EB29E5210C00395E235621468A
:103990000CD7E46D11911780C195E16003A760AD0
:1039A0006F2600CDC645CAE739210C00395E235683
:1039B000EB29E5210C00395E2356214600CD7E46D9
:1039C000D11911790C195E16003A770A6F2600CDCD
:1039D000C645CAE7392108 00395E1600EB29EB21FC
:1039E0000800 3973C3513A210900395E16002108D5
:1039F00000396E2600CDA846EB21090039732108 55
:103A000000395E1600EB29EB2108 0039732A760C89
:103A1000E521740AE5211000395E2356EB29E521E2
:103A20001000395E2356214600CD7E46D119117808
:103A30000C19E5CDF93AD1D1D1E52108 0039E57E5F
:103A400023666F23EBE1732372EB2B119A0319D1D9
:103A500073210C0039E57E23666F23EBE17323723B
:103A6000210C00395E2356210800CD1A46C2B13A16
:103A7000210900395E1600D521060039E57E23664E
:103A80006F23EBE1732372EB2BE5210E00395E23EC
:103A900056210500CD7E46D119113A0219D1732164
:103AA0000000EB21090039732101 00EB21080039E6
:103AB00073C36D39210C00395E2356210800CD1ADD
:103AC00046CAE93A210900395E1600D5210C0039B1
:103AD0005E23562105 00CD7E46EB210600397E236C
:103AE000666F19113A0219D173C30D3921060039D5
:103AF0005E2356EB2B22720AC9CD8F45FEFF2100B3
:103B00000EB21040039732372C31B3B21040039ED
:103B1000E57E23666F23EBE1732372210400395E97
:103B20002356210E00397E23666FCDE645CA813BC0
:103B3000210C00395E2356EB5E1600D5210C0039AE
:103B40005E2356EB5E1600E1CDC645CA6E3B210CE6
:103B500000395E2356EB235E1600D5210C00395E3A
:103B60002356EB235E1600E1CDC645C2813B210CF6
:103B700039E57E23666F2323EBE1732372C30CC8
:103B80003B210400395E2356210E00397E23666FE7
:103B9000CDE645CA9F3B210400395E2356EBC9217F
:103BA000FFFFC9CD8F450000210000C9CD8F450022
:103BB00000212301E521DA3BE5CD815ED1D121232E
:103BC0001E521F03BE5210C00395E2356D5CD2AD5
:103BD0001D1D1E5CD815ED1D1C90A2A2A2A2045D9
:103BE00052524F52204445544543544544210A0003
:103BF000A00CD8F45FEFE210000EB210400397341
:103C000023722106 0039E521153EE52A251AE5CD66
:103C1000 1F48D1D1D1EB210400397323 72D5210182
:103C20000D1CDC645CA4E3C210600395E160021A2
:103C30003B00CDC645CA4E3C2A251AE5210001E5C0
:103C4000210A0039E5CD495D D1D1D1C3023C21041F
:103C500000395E235621FFFFCD0545CA723C2A2587
:103C60001AE5210800395E1600D5CD3463D1D1C3E1
:103C70007B3C210400395E2356EBC9210000EB2177
:103C800040039732372210 60039E521193EE52A23
:103C900251AE5CD1F48D1D1D1E5210100D1CDD5DF
:103CA00045CAB23C21FFFFEB21040039732372C3E4
:103CB000FD3C21060039E5CDE480D1111400EBCDA7
:103CC000E545CAD33C21FFFFEB2104003973237281
:103CD000C3FD3C21060039E5CD2C43D1E5210C0183
:103CE000395E2356EBD173D5217F00D1CDC645CAAD
:103CF000FD3C21FFFFEB210400397323722 10400F6
:103D0000397E23B6CA103D210400395E2356EBC923
:103D10002106 0039E5211D3EE52A251AE5CD1F487B
:103D2000D1D1D1EB21040039732372D5210100D107
:103D3000CDC645CA5C3D210600395E1600213B0018
:103D4000CDC645CA5C3D2A251AE5210001E5210AB8
:103D500039E5CD495DD1D1D1C3103D21040039F1
:103D60005E235621FFFFCD0545CA803D2A251AE5A1
:103D7000210800395E1600D5CD3463D1D1C3893D09
:103D8000210400395E2356EBC9210000EB21040019
:103D900039732372210600 39E521213EE52A251ACF
:103DA000E5CD1F48D1D1D1E5210100D1CDD545CAFE
:103DB000C03D21FFFFEB21040039732372C30C3E89

:103DC00021060039E5CDE480D1111400EBCDE545A5
:103DD000CAE13D21FFFFEB21040039732372C30CBC
:103DE0003E21060039E5CD2844D1E5210C01395E9C
:103DF0002356EB23D173D5217F00D1CDC645CA0C04
:103E00003E21FFFFEB21040039732372210400 39A6
:103E10005E2356EBC920256300202573002025630F
:103E20000020257300CD8F45FCFF210641E52A27A0
:103E30001AE5CDB347D1D1213F41E52A271AE5CD77
:103E4000B347D1D1217B41E52A271AE5CDB347D12C
:103E5000D1210000EB21060039732372C36E3E210D
:103E6000060039E57E23666F23EBE173237221069A
:103E700000395E23562A3403CD0046CAF13E2100A4
:103E800000EB21040039732372C39B3E21040039E7
:103E9000E57E23666F23EBE1732372210400395E14
:103EA0002356210500CD0046CAEE3E210400395EAE
:103EB0002356D5210800395E2356D5210A00395EE4
:103EC0002356210500CD7E46EB210800397E23666E
:103ED0006F19113A02195E1600D5219F41E52A2774
:103EE0001AE5CDB347EB210A0039F9C38C3EC35F15
:103EF0003E21C541E52A271AE5CDB347D1D121009E
:103F000000EB21060039732372C31B3F21060039E1
:103F1000E57E23666F23EBE1732372210600395E91
:103F200023562A3403CD0046CA4F3F210600395E8E
:103F30002356D5210800395E2356D521FB41E52AB9
:103F4000271AE5CDB347EB21080039F9C30C3F210F
:103F50001742E52A271AE5CDB347D1D1210000EB5E
:103F600021040039732372210000EB21060039730C
:103F70002372210600395E23562A3403CD0046CA37
:103F80003140210600395E2356D5210800395E23D1
:103F900056D5213842E52A271AE5CDB347EB21084B
:103FA0000039F921060039E57E23666F23EBE173C2
:103FB0002372C3C43F21040039E57E23666F23EBDF
:103FC000E1732372210400395E23562A720ACDE67A
:103FD00045CA2E40210600395E23562A3403CDC639
:103FE00045C20340210600395E2356EB29113603F2
:103FF000195E2356D5210600395E2356E1CD0046D1
:10400000CA2E40210400395E2356D5210600395EB0
:104010002356219A03195E1600D5215D42E52A2711
:104020001AE5CDB347EB21080039F9C3B53FC37298
:104030003F217642E52A271AE5CDB347D1D12100A9
:1040400000EB21040039732372C35B402104003963
:10405000E57E23666F23EBE1732372210400395E52
:1040600023562A760CCDE645CA0541210400397E47
:1040700023B6C2054021B242E52A271AE5CDB347CF
:10408000D1D1C3BB40210400395E2356210100CDAC
:10409000C645CAA54021D842E52A271AE5CDB3472F
:1040A000D1D1C3BB40210400395E2356D521FD4246
:1040B000E52A271AE5CDB347D1D1D1210400395ED5
:1040C0002356EB2911750A195E1600211400CD7EC6
:1040D0004611291A19E5210600395E2356EB2911EC
:1040E000740A195E1600211400CD7E4611111E19A6
:1040F000E5210C43E52A271AE5CDB347EB2108005B
:1041000039F9C34C40C9093B205441424C45532E18
:1041100041534D202D207461626C657320666F726F
:104120002073746174652D7461626C65204C6F6FCF
:104130006B55702070726F6365647572650A000A52
:10414000093B205A41504420766572736 96F6E2096
:104150002D20417373656D626C652F6C696E6B20E9
:104160007769746820646F776E6C6F616461626CEC
:1041700065207461626C65732E0A000A4249544DD1
:1041800041503A3A09093B4269744D61705B73745E
:104190006174655D5B627974656374725D0A0009C0
:1041A00044422009302578482009 3B20737461740B
:1041B000653D25642C2062797465637472203D200E
:1041C0002564200A000A5441424C50543A3A2009CE
:1041D000093B5461626C655074725B737461746501
:1041E0005D2028686F6C64696E6720747275652045
:1041F000706F696E74657273290A0009445720094B
:104200004D4E54414225642009 3B2073746174650E
:10421000203D2025640A000A4D4E5441424C3A3A52
:104220002009093B204D61696E5461626C655B69D0
:104230006E6465785D200A004D4E54414225643A13
:104240002009093B2028656E747269657320666FCA
:104250007220737461746520 2564290A0009444240
:104260002009256444200 93B20696E646578203D5F
:10427000202564200A000A54524553554C543A3ABA
:104280002009093B20526573756C745B636F64652C
:104290005D20286D65616E696E67206F66204D61D7
:1042A000696E5461626C6520656E7472696573290C
:1042B0000A0009093B20636F6465203D20302028F7
:1042C000506172616D657465722072616E67652000
:1042D0006572726F72290A0009093B20636F646579
:1042E000203D2031202844656661756C742072651C
:1042F0007475726E2076616C7565290A0009093B38
:1043000020636F6465203D2025640A000944422033
:104310000925732C2573093B20416374696F6E2C4A
:10432000204E657874537461746 50A00CD8F45FE04
:10433000FF210000EB21040039732372C350432195
:10434000040039E57E23666F23EBE1732372EB2BC8
:10435000210400395E23562AFD31CDE645CA854346
:10436000210400395E2356211400CD7E4611111E12
:1043700019E5210C00395E2356D5CD8680D1D1CAEE
:104380008543C33F43210400395E23562AFD31CDC6
:104390000146CAF143210400395E235621FF00CD86
:1043A0000146CAC74321FA43E5CDAC3BD1210A00FF
:1043B000395E2356D5211A44E5212301E5CDB347C3
:1043C000D1D1D1217F00C9210A00395E2356D521E0
:1043D0000600395E2356211400CD7E4611111E19A8
:1043E000E5CD8F80D1D1210400395E2356EB22FDFB
:1043F00031210400395E2356EBC9416374696F6E45
:104400002073796D626F6C207461626C65206F76C9
:104410006572666C6F7765642E000A416374696F1C
:104420006E203D2025730A00CD8F45FEFF21000040
:10443000EB21040039732372C34C4421040039E595
:104440007E23666F23EBE1732372EB2B210400398B
:104450005E23562AFF31CDE645CA81442104003946
:104460005E2356211400CD7E4611291A19E5210C30
:1044700000395E2356D5CD8680D1D1CA8144C33B55

```
:1044800044210400395E23562AFF31CD0146CAED8E
:104490004421040039 5E2356213200CD0146CAC3AF
:1044A0004421F644E5CDAC3BD1210A00395E2356C8
:1044B000D5211545E5212301E5CD8347D1D1D12142
:1044C0007F00C9210A00395E2356D5210600395ED6
:1044D0002356211400CD7E4611291A19E5CD8F803F
:1044E000D1D1210400395E2356EB22FF3121040093
:1044F000395E2356EBC953746174652073796D621C
:104500006F6C207461626C65206F766572666C6F8B
:104510007765642E000A5374617465203D2025730D
:104520000A00CD8F450000212301E5214A45E5CD54
:10453000815ED1D1212301E5215445E5CD815ED1B4
:10454000D1210100E5CDFB6FD1C90A5573616765C3
:104550003A200A007A6170647374617420206 96E75
:1045600070757466696C6520206F75747075746 6FB
:10457000696C65200A00E32EAE02078B18DA7CA274
:10458000677DA36FB4C97C2F677D2F6FB4C9E9E144
:10459000C55E235623444D21000039EB39F9D5601F
:1045A00069CD8E45EBE1F9C1EB7CB5C97AAC3277C8
:1045B00045CD2B46EB3A7745B7FA96467DB4C9CD43
:1045C0004446EB7DB4C97D93C2D0457C92CADF4599
:1045D000210000AFC97D93C2DF457C92CAD045213E
:1045E00001007DB4C9EB7CAAFAF8457D937C9A3F23
:1045F0003E00CE006F2600C97A07E6016F2600C98B
:10460000EB7CAAFA12467D937C9A3E00CE006F2680
:1046100000C97C07E6016F2600C97A327745CD2BA9
:10462000463A7745B7FA96467CB5C97CB7F2364626
:104630002F677D2F6F237AB7F244462F577B2F5F6A
:1046400013C34446C5444D2100003E10327645292F
:10465000EB29EBD25746237D916F7C9867D26F464A
:10466000093A76453D327645C24F46C17DB4C913FD
:104670003A76453D327645C24F46C17DB4C9C54400
:104680004D2100003E1029EB29EBD28E46093DC298
:104690008646C17DB4C97D2F6F7C2F67237DB4C949
:1046A0007CB5CADF45C3D0457CB2677DB36FB4C962
:1046B000EB7BE61F5FCAD7467CB4F24F477C371FBF
:1046C000677D1F6F1DC2BD46B4C9EB7BE61F5FCA85
:1046D000D746291DC2D2467DB4C9EB7D936F7C9A23
:1046E00067B5C9EBE1C54E234623EB09EB4E2346E4
:1046F000237AB8DAFB467BB9D2FF46232319195E29
:104700002356EBC1E9EBE1C5424B5E23561B7AB75A
:10471000FA25472379BECA1F47232323C30D472306
:1047200078BEC21A47237E23666FC1E9EB7D937C76
:104730009A3E003FCE006F2600C9EB7D937C9A3EE7
:1047400000CE006F2600C9EB7BE61F5FCAD7467C10
:10475000B71F677D1F6F1DC24F47B4C97CAA677D15
:10476000AB6FB4C97E1223130B78B1C26447C9D1B1
:1047700021020039C5D5117845067E122313059E
:10478000C27B47218847E3E9C17CB5C9A7C90C783A
:10479000CD8F450000211801228E47210A0039E5FE
:1047A000210A00395E2356D521DB47E5CD0765D1C7
:1047B000D1D1C9CD8F450000210800395E2356EBC9
:1047C000228E47210C0039E5210C00395E2356D595
:1047D00021DB47E5CD0765D1D1D1C9CD8F4500009B
```

```
:1047E0002A8E47E5210A00395E2356D5CD8F5ED11A
:1047F000D1C93D3C8D37CD8F450000210D0122F4FC
:104800004721000022F247210A0039E5210A003938
:104810005E2356D5214D48E5CD5649D1D1D1C9CD0C
:104820008F450000210800395E2356EB22F4472112
:10483000000022F247210C0039E5210C00395E23EB
:1048400056D5214D48E5CD5649D1D1D1C9CD8F4559
:10485000000021080039 7E23B6C286482AF4471199
:104860000600195E1600210800CD7E45CA78482151
:10487000FFFF22F247C383482AF447E5CDEA5DD122
:1048800022F247C396482AF447E52AF247E5CD3499
:1048900063D1D122F2472AF247C932514451000074
:1048A000DEF2FFB33DAC38414243444546616263AA
:1048B00064656639383736353433323130000A0BA7
:1048C0000C0D0E0F0A0B0C0D0E0F09080706050440
:1048D00003020100CD8F450000210800395E2356F8
:1048E000EB22A44821000007D32A648210C0039E5C6
:1048F000210C00395E2356D5210349E5CD5649D117
:10490000D1D1C9CD8F450000210800397E23B6C220
:1049100036492AA4487EB7CA2C492AA4482322A48F
:10492000482B5E160021FF00CD7E45C92101007D88
:1049300032A648C352493AA6486F26007CB5C252F7
:10494000492AA4482B22A4485E160021FF00CD7EF0
:1049500045C921FFFFC9CD8F4566FF21A400394E0F
:104960002346210000EB218E003973237221A2001F
:10497000395E2356EB22A248606923444D2B5E1614
:10498000002190003973237 27AB3CAA04E2190009F
:10499000395E2356212500CDC645CA454E2100006B
:1049A000EB218C0039732372218A00397323722121
:1049B0007F0022A04860695E1600212A00CDC6450E
:1049C000CAD349606923444D210100EB218C003991
:1049D00073237260695E1600D5CDEF81D1CA0E4A8D
:1049E00021000022A0482AA048110A00CD7E46E5F9
:1049F00060695E1600E11911D0FF1922A0486069B4
:104A000023444D5E1600D5CDEF81D1C2E6496069E1
:104A10005E1600216C00CDC645CA2C4A210100EB70
:104A2000218A0039732372606923444D60692344ED
:104A30004D2B5E1600EBC3FF4D212500EB219000AE
:104A40003973237 2C3744E210000EB218A0039733D
:104A50002372C3604A210100EB218A00397323725B
:104A6000210C00EB21900039732372210A00EB2105
:104A700088003973237 2C3BE4A210100EB218A00EA
:104A8000397323722100 00EB2190003973237221C6
:104A90001000EB21880039732372C3BE4A21010044
:104AA000EB218A0039732372210E00EB219000392B
:104AB00073237221080 0EB21880039732372CDA97A
:104AC0004EC25A4E21920039E5218A00395E2356A2
:104AD000D5219400395E235621BE4819E521960060
:104AE000395E235621A74819E5CDEE4FD1D1D1E14A
:104AF000CD6D82218C00397E23B6C2614B218A00A4
:104B0000397E23B6CA2C4B21A60039E57E23666F79
:104B10002323EBE1732372EB2B2B5E2356D52194D9
:104B20000039CD5A82E1CD6D82C3524B21920039BA
:104B3000CD5A82CDD085E521A80039E57E23666F5B
```

```
:104B40002323EBE1732372EB2B2B5E2356EBD17304
:104B5000237221BE0039E57E23666F23EBE17323F8
:104B600072C3424E210100EB218A00397323 72CDBA
:104B7000A94EC25A4E21960039E521060039E5CDED
:104B8000E04ED1E1CDF551218C00397E23B6C2F142
:104B90004B218A00397E23B6CAC04B21A60039E5D5
:104BA0007E23666F2323EBE1732372EB2B2B5E23B3
:104BB00056D5219800 39CDD651E1CDF551C3E24B00
:104BC00021A60039E57E23666F2323EBE173237270
:104BD000EB2B2B5E2356D521980039CD7E51E1CDAC
:104BE000A351218E0039E57E23666F23EBE1732309
:104BF00072C3424E210000EB218A003973237260 98
:104C0000695E1600215E00CDC645C21B4C60695E20
:104C100016002 17E00CDC645CA2B4C606923444D49
:104C20002101 00EB218A00397323 7221040039EB42
:104C300021860039732372606923444D2B5E160070
:104C40002190003973237221 5D00CD0545CA6E4C89
:104C5000219000395E2356D521880039E57E2366F0
:104C60006F23EBE1732372EB2BD173C3374C21001D
:104C70000 0E5218800395E2356EBD173C3AE4C2189
:104C800001 00EB218A0039732372212000EB2104FB
:104C900000 3973210900EB21050039 73210A00EB6B
:104CA00021060039 73210000EB2107003973CDA9D8
:104CB0004EC25A4E218C00397E23B6C2DB4C21A64F
:104CC0000039E57E23666F2323EBE1732372EB2B20
:104CD0002B5E235621860039 7323722AA0482B228B
:104CE000A048237CB5CA7C4D210000E52AA248CD0E
:104CF0008E45D1EB21900039 73237221FFFFCDC681
:104D000045C27C4D218A00397E23B6CA294D2190A7
:104D100000395E2356D521060039E5CD6681D1D113
:104D2000110000CD0545C3414D219000395E235679
:104D3000D521060039E5CD6681D1D1110000CDC65F
:104D400045 7CB5CA544D210100E52AA248CD8E45C7
:104D5000D1C37C4D218C00397E23B6C2794D219080
:104D600000395E2356D521880039E57E23666F23FE
:104D7000EBE1732372EB2BD173C3DB4C218C003935
:104D80007E23B6C2A34D210000E5218800395E23B1
:104D900056EBD173218E0039E57E23666F23EBE15C
:104DA000732372C3424E210000E52AA248CD8E45EE
:104DB000D1EB21900039 73237221FFFFCDC645C28C
:104DC0005A4E218C00397E23B6C2FC4D2190003909
:104DD0005E2356D521A80039E57E23666F2323EB99
:104DE000E1732372EB2B2B5E2356EBD173218E00E4
:104DF00039E57E23666F23EBE1732372C3424ECD08
:104E0000005470F002500394A4400554A4500644BC8
:104E1000460064 4B4F009D4A5800794A5B00F44BB2
:104E20006300A64D6400604A65006F4B66006F4BDF
:104E3000680047 4A6F00A84A73007F4C7800844A94
:104E4000424EC39D4E219000395E2356D5CDAF8191
:104E5000D1CA744ECDA94ECA714E218E00397E231F
:104E6000B6C2684E21FFFFC9218E00395E2356EB82
:104E7000C9C39D4ECDA94EC25A4E210000E52AA2BB
:104E800048CD8E45D1EB219000397E23666FCD057C
:104E900045CA9D4E218E00395E2356EBC9C3784921
```

```
:104EA000218E00395E2356EBC9CD8F4500002100CD
:104EB00000E52AA248CD8E45D1E5CDAF81D1CAC447
:104EC0004EC3AE4E210100E52AA248CD8E45D11138
:104ED000FFFFCDC645CADC4E21FFFFC9210000C936
:104EE000CD8F45FBFF210D00395E23562104003988
:104EF00073237221 0000EB210800397321060039 69
:104F0000732107003973 2AA0482B22A048237CB5BF
:104F1000CAD34F210000E52AA248CD8E45D1444D89
:104F20002107003 97EB7C24B4F6069112D00CDC6F5
:104F300045C23F4F6069112B00CDC645CA4B4F217A
:104F40000100EB2107003973C3BA4F210800397EF5
:104F5000B7C26B4F6069112E00CDC645CA6B4F2199
:104F60000100EB2108003973C3BA4F210600397ED6
:104F7000B7C2A44F6069116500CDC645C28A4F60B3
:104F800069114500CDC645CAA44F210000EB210799
:104F90000039732101 00EB21080039732106003923
:104FA00073C3BA4FC5CDEF81D1C2BA4F210100E51D
:104FB0002AA248CD8E45D1C3D34F6069E5210600B2
:104FC00039E57E23666F23EBE1732372EB2BD173FC
:104FD000C3064F210000E5210600395E2356EBD1C0
:104FE00073210D00395E2356D5CD307FD1C9CD8FC9
:104FF00045F8FF2AA048110000EBCDE645CA08504D
:10500000CD538200000000C921060039E5210000CF
:10501000EB210600397323 72EBCDCA85E1CD6D8299
:10502000210000E52AA248CD8E45D1EB210A0039A6
:105030007323722 12D00CDC645CA5150210100EBCA
:105040002104003973237 22AA0482B22A048C3767A
:1050500050210A00395E23562128 00CDC645CA6B6C
:105060005 02AA0482B22A048C37650210100E52AEF
:10507000A248CD8E45D12AA0482B22A048237CB53A
:10508000CA0651210000E52AA248CD8E45D1E5216E
:105090001200395E2356D5CD6681D1D1444D7CB501
:1050A000C2B150210100E52AA248CD8E45D1C306E8
:1050B00051210600 39E5211600395E2356EBCDCA91
:1050C00085CDAC82E1E5CD5A82CDFF84E1CD6D8204
:1050D00021060039E56069EB211200397E23666FF5
:1050E000CDDA46EB211400397E23666F195E160077
:1050F000EBCDCA85CDAC82E1E5CD5A82CD1683E1F8
:10510000CD6D82C37650210400397E23B6CA235167
:1051100021060039E5210800 39CD5A82CDBB82E154
:10512000CD6D8221060039CD5A82C97A23231919FF
:105130004E2346C3E1760360 69424B5E23561B7AD9
:10514000B7FA247B2379BECA1E7B232323C30C7B9F
:10515000237 8BEC2197B234E2346C3E176EB5E2340
:1051600056C3E0761A5F1600C3E0762ADE997323F1
:1051700072C3E0762ADE99EB2A9C48C38251EB2A5F
:105180009A48C51A7723E67FD6407723 3600060370
:105190002313 1A7705C290510605AF237705C29BEA
:1051A00051C1C9C5EB2A9A487EE68047237EC64096
:1051B000E67FB01223060313237E1205C2B751C146
:1051C000C9D121080019E5EBEB2A9C48C3DA51D17B
:1051D00021080019E5EBEB2A9A48C51A7723E67FE8
:1051E000D64077233600060723131A7705C2E85105
:1051F000233600C1C9C5E5CDE755D12A9A487EE6D8
```

```
:1052000080472 37EC640E67FB01223060713237E25
:105210001205C20D52C1C9E1222B51CDE7552A9A80
:105220004811090019562B5E2BD5562B5E2BD556EF
:105230002B5E2BD5562B2B7EC640E67F5F2B7EE662
:1052400080B35FD52A2B51E9E1222B512A9C48D10A
:1052500073237EE67FD640772336002372 23D173F6
:105260002372 23D173237223D17323722336002A2E
:105270002B51E92A9C48EB2A9A48229C48EB229A17
:1052800048C92A9A487EEE8077C92A9A48237EFE2A
:10529000C0C26955C35E55AF3DC1C9AF3CC1C9C5A8
:1052A0002A9A48EB2A9C481AB7FAB352AEFA985294
:1052B000C3B852AEFA9752EB23131ABEFA9752C2F2
:1052C0009B52060923131ABEDA9752C29B5205C29B
:1052D000C452AFC1C92A9C487EEE8077C52A9A483D
:1052E000110B00190607AF772305C2E7522A9C4825
:1052F000110B00190607772305C2F6522A9A48EBCC
:105300002A9C4823131A96F20D53EB2F3C1B2B2299
:105310009C48EB229A48FE09D20E564FE5D5C609A5
:105320005F160019222D51D121090019222F51E1B8
:10533000EB1AAEF293531AB7FA5A5306072A2D51B5
:10534000EB2A2F511A9E12182B05C244531ADE0062
:10535000121B0DF24D53EBC3755306072A2F51EB69
:105360002A2D511A9E771B2B05C263533E009E7750
:105370002B0DF26C53237EB73E01F28C53110F00BC
:10538000193E009E772B1DF281533E812A9A487761
:10539000C30E5606072A2D51EB2A2F511A8E121BC7
:1053A0002B05C29C531ACE00121B0DF2A553C30E3F
:1053B00056C52A9A48EB2A9C481AAE1223131A960D
:1053C0004FD5E57EFEC0C2D353E1E13E03329E4895
:1053D000C3AE5613230608132 31ABEC2F55305C2E3
:1053E000D753E1E10C712336002336010608AF32B2
:1053F0009E48C33556D1E171DAFE530C712BD5119D
:105400000900190608115F517E122B1305C20854BA
:10541000E1110900190608116751 7E122B1305C20C
:105420001A5406082157 51AF772305C228543E402D
:105430003256512157510610B77E8F772305C23956
:10544000549FE6014F0608115F51216751B71A9E1C
:1054500012132305C24E5479DE00C26B54215751FA
:105460003421565135C23354C39D5421565135CA47
:105470009D542157510610B77E8F772305C278546B
:105480009F4F0608115F51216751B71A8E121323DF
:1054900005C28B5479CE00C26B54C35D542A9A481E
:1054A000110C001936002B360011575106082B1A23
:1054B000771305C2AE54C30E56C52A9A48EB2A9CF0
:1054C000481AAE1223131AFEC0CA285686127EFE50
:1054D000C0CA2856D51109001906081167517E1255
:1054E0002B1305C2DE54E1110900190608115F51A2
:1054F0007E122B1305C2F0540608215751AF7723B3
:1055000005C2FE543E403256512157510610B77E17
:105510008F772305C20F55D23A550608115751 21EE
:105520006751B71A8E12132305C2235506081ACEE7
:105530000012D23A551305C22E5521565135C209D3
:10554000552A9A48110C0019115D51060A1A771351
:105550002B05C24D55C30E56CD9F52CA6955210029
:1055600000AFC9CD9F52CA5E55210100AF3CC9CDE5
:105570009F52FA6955C35E55CD9F52FA6955CA6963
:1055800055C35E55CD9F52FA5E55C36955CD9F52A6
:10559000FA5E55CA5E55C36955C57CB5CA2856EB37
:1055A0000600C3BB55C57CB5CA2856EB06007AB7C2
:1055B000F2BB552F577B2F5F1306802A9A48702322
:1055C0007AB7C2D255360123360023730607AFC31C
:1055D000DE5536022336002372237306 06AF237787
:1055E00005C2DE55C36F562A9A48110A00197EFE7D
:1055F00080D8C2FB552B7EF60177C9C5010008375C
:105600002B7E897705C20056B7C20E56C1C92A9AA9
:1056100048237E545D234FAFBEC27656060823BE94
:10562000C23D560D05C21E56AF329E482A9A480604
:105630000A772336C0237705C23556C1C93E089084
:1056400047CA5D562B7912D5133E0F904F7E121329
:10565000230DC24D56AF121305C25656D11AB7FAD2
:105660006A56FE40DA6F56C3A956FEC1DA90563E1E
:1056700000329E48C1C90C7912060FD521100019BD
:10568000545D1B1A772B05C282563600D1C35D5676
:105690003E01329E48CDC956AF2A9A482336C123CF
:1056A00077233601060 8C335563E02329E48CDC9DF
:1056B000562A9A4823363F2336003EFF06072377B3
:1056C00005C2BE56233600C1C92A05017CB5CAE60B
:1056D00056EB210400394E2346C52A9E48E5EBCD02
:1056E000E556E1E1C9E9CD8457466C6F6174696E96
:1056F0006720706F696E7420003A9E48FE01C211E7
:1057000057CD8457756E646572666C6F7700C337CA
:1057100057FE02C22557CD84576F766572666C6F4F
:105720007700C33757CD8457646976696465206212
:1057300079207A65726F00CD8457206174206C6F78
:10574000636174696F6E20307800210500397EE551
:10575000F5CD6C57F1CD7057E12B7EF5CD6C57F13F
:10576000CD7057210A00E5CD4560E1C91F1F1F1FFD
:10577000E60FC630FE3ADA7B57C6076F2600E5CD46
:105780004560E1C9C10A03B7CA96576F2600E5CD47
:105790004560E1C38557C5C9C52A9A48360023 36F6
:1057A00003110400195D540605AF237705C2AA57FB
:1057B00006042A01322323237E2A0132B7F2D1576D
:1057C0003E009E12231B05C2C0571B3E8012C30E13
:1057D000567E12231B05C2D157C30E56C52A01326D
:1057E000545DAF772377237723772A9A484E237E19
:1057F000B7CA6F56FA6F56FE05D222584723856FF7
:10580000D20458247E12132B05C2045879B7F26FC4
:105810005606042A01323E009E772305C21658C35D
:105820006F56EB79B7FA3658367F2336FF2336FFAB
:105830002336FFC39D583680233600233600233697
:1058400000C39D58C50E00C34D58C50E012A9A4885
:1058500046237EB7CA5A58F26058210000C36F56DB
:10586000FE03D2845823856FD26C58245E2B56EBEE
:1058700079B7CA6F5678B7F26F567C2F677D2F6F56
:1058800023C36F5679B7C28F5821FFFFC39D587845
:10589000B7FA9A5821FF7FC39D582100803E0232FB
:1058A0009E48C1C940800000000000000000400CCCCCE4
:1058B000CCCCCCCD400147AE147AE1483F20C49B0C
```

:1058C000A5E354003F0346DC5D6388663E53E2D6A1
:1058D000238DA3CD3E08637BD05AF6C83DD6BF9436
:1058E000D5E57A663D15798EE2308C3D3D0225C1C5
:1058F0007D04DAD33C36F9BFB3AF7B803C057F5FD4
:10590000F85E59263B8CBCCC096F509A3B0E12E1D5
:105910003424BB433B016849B86A128A3A24075F92
:105920003DCEAC333A039A5652FB1138C5210C00D8
:10593000395E2356EB226F5121040039CDD6512117
:105940000E00397E3CFE11DA4C593E103271516F17
:1059500026002272512A9A487EB7F26959CD8252A6
:105960002A6F51362D23226F51010000CD8A52CA71
:10597000EF59CDC151410A0000000000002A9A48A9
:10598000237EFE01FAE859CACF59FE02C297592375
:10599000237EFE27DAD759CD125BCDC1514019992C
:1059A000999999999ACD1E5B03CD6F55C2A559CD92
:1059B000125B2A9A482323237EFE0ADAEF590BCD85
:1059C0001E5BC3EF592A9A48237EFE01C2D7592392
:1059D000237EFE0ADAEF59CDB15303C3C5592A9A83
:1059E00048237EFE01F2EF59CD1E5B0BC3DE592129
:1059F0001000397EB7CAFF592A7251092272512A02
:105A000072512B7CB7F20E5A210000C31A5AC217EA
:105A10005A7DFE10DA1A5A21100029292911A4589A
:105A200019CDC851CDDC52CDC151410A0000000052
:105A30000000CD8455CA4F5A210100CD995503214C
:105A40001000397EB7CA4F5A2A7251232272516010
:105A500069227451211000397EB7CA8B5A78B77900
:105A6000F28B5A2A6F51363023362E233A7351B7B0
:105A7000FA785A792FC37B5A3A7151B7CA865A3687
:105A800030233DC27F5A226F513EFF4F06FF3A73CB
:105A900051B7FAC75A043A7251B8DAC75ACAC75A44
:105AA0002A9A48237EFE013E30C2B15A232386360D
:105AB000002A6F51772378B9C2BE5A362E23226F3F
:105AC00051CD1E5BC3955A211000397EB7C20B5BC6
:105AD0002A6F513665233362B3A7551B73A7451F215
:105AE000E65A362D2F3C23FE64DAF15A363123D69E
:105AF000640600FE0ADAFE5A04D60AC3F35AC63018
:105B00005F3E308077237323226F512A6F51360016
:105B1000C1C9CD7352210100CD9955C3B153C52AD6
:105B20009A48233411090019AF0608C55EEB260018
:105B300029444D292909EB8323777ACE002B2BC1E9
:105B400005C22B5B2377B7CA0E562B2B7EB7FA56AE
:105B50005BFE40D2A956C1C9CD8F45FEFF210D0184
:105B6000444D6069110600197EB7CA865B606911F1
:105B70000B0019444D118601EBCD2C47CA835B21E4
:105B80000000C9C3625B210C00395E2356EB235E23
:105B90001600212B00CDC645EB210400397323727A
:105BA000210C00395E2356EB5E1600EBC3895C21A5
:105BB0000400397E23B6CABF5B210200C3C25B2149
:105BC0000000E5210C00395E2356D5CDBD71D1D141
:105BD000EB210700097321FFFFCDC645CAE35B2116
:105BE0000000C9C39C5C210400397E23B6CAF65B61
:105BF000210200C3F95B210100110003CDA846E595
:105C0000210C00395E2356D5CDBD71D1D1EB2107D2
:105C100000097321FFFFCDC645CA205C210000C9E1
:105C2000C39C5C210400397E23B6CA335C21020088
:105C3000C3365C210100110001CDA846E5210C000E
:105C4000395E2356D5CDBD71D1D1EB210700097343
:105C500021FFFFCDC645CA5D5C210000C9210200BD
:105C6000E5CD538200000000CD8082210700095E4F
:105C70001600D5CD417DEB21080039F9C39C5C218C
:105C8000FAFF220301210000C9CD05470300720070
:105C9000AF5B7700E65B6100235C7F5C210100EB7A
:105CA0002106000973210004EB2109000973237206
:105CB000210000EB606973237221020009732372D3
:105CC00021040009732372606 9C9CD8F45FEFF214D
:105CD0000A00395E2356424B210D01E5CDEA5DD124
:105CE000EB2104003973237221FFFFCDD545CA147F
:105CF0005D210400395E2356210A00CDD545CA1422
:105D00005D210400395E2356D5606923444D2BD1B3
:105D100073C3D85C210000EB606973210400395E15
:105D2000235621FFFFCDC645CA405D6069EB210ABD
:105D300000397E23666FCDC645CA405D210000C98B
:105D4000210A00395E2356EBC9CD8F45FEFF210A9B
:105D500000395E23562104003973237221 0C003967
:105D6000E57E23666F2BEBE1732372210000CD01EA
:105D700046CAAF5D210E00395E2356D5CDEA5DD10E
:105D8000444D11FFFFCDD545CAAF5D6069E52106E1
:105D90000039E57E23666F23EBE1732372EB2BD191
:105DA0007360691 10A00CDC645C2AF5DC35C5D2159
:105DB0000000E5210600395E2356EBD173606911BE
:105DC000FFFFCDC645CAE15D210400395E2356219F
:105DD0000A00397E23666FCDC645CAE15D21000009
:105DE000C9210A00395E2356EBC9CD8F45FEFF213C
:105DF0000A00394E2346C5CD5D5FD1117F00CD7EAF
:105E000045EB21040039732372EBC3215E6069E521
:105E10007E23666F2BEBE173237221FFFFC9C3F66C
:105E20005DCD054703001A000D5E0D001E5E0000EB
:105E30001E5E345E210400395E2356EBC9CD8F45CA
:105E40000000210800394E234660697EB7CA735EA0
:105E5000211801E5606923444D2B5E1600D5CDBFA6
:105E60005ED1D111FFFFCDC645CA705E21FFFFC9CB
:105E7000C3495E211801E5210A00E5CDBF5ED1D1FD
:105E8000C9CD8F450000210800394E234660697E48
:105E9000B7CAB85E210A00395E2356D56069234428
:105EA0004D2B5E1600D5CDBF5ED1D111FFFFCDC603
:105EB00045CAB85E21FFFFC9C38D5E210000C9CD70
:105EC0008F450000210800394E2346217F0050599C
:105ED000CD7E45444D6069110A00CDC645CAFE5EBF
:105EE000210A00395E2356D5210D00E5CDAC60D1E5
:105EF000D111FFFFCDC645CAFE5E21FFFFC9210AB1
:105F000000395E2356D5C5CDAC60D1D1C9CD8F4502
:105F1000FEFF210A00395E2356D5CD5D5FD1444D89
:105F200011FFFFCDC645C2465F210A00395E2356E8
:105F3000D5CD5D5FD1EB2104003973237221FFFFC2
:105F4000CDC645CA4A5F21FFFFC9210400395E233F
:105F500056210800CDCA465059CDA846C9CD8F4517
:105F6000FEFF210A00394E2346210200095E235616
:105F7000D560695E2356E1CD2C47CA2C602106000E

:105F8000095E1600210800CD7E45CA915F21FFFF02
:105F9000C921FBFFE5606911060019D1E56E2600F5
:105FA000CD7E45EBE1736069110400197E23B6C212
:105FB000B75FC5CD8963D1210900095E2356D5217C
:105FC0000400095E2356D5210700095E1600D5CDD1
:105FD000BB76D1D1D1EB2104003973237221000AB
:105FE000CDE645CA0F6021040039 7E23B6C2F65FB4
:105FF000210800C3F95F211000E5606911060019 4E
:10600000D1E56E2600CDA846EBE17321FFFFC92143
:106010000400095E23566069732372210400397EEF
:1060200023666F19EB210200097323726069E57E14
:1060300023666F23EBE1732372EB2B5E160021FFC7
:1060400000CD7E45C9CD8F450000212301E5210A01
:1060500000395E2356D5CDAC60D1D1C9CD8F450076
:1060600000210800394E2346210A00395E2356D507
:10607000C5CDAC60D1D1110000EBCD0046CA846023
:1060800021FFFFC9210A00395E2356D56069110836
:1060900000EBCD4747E5CDAC60D1D1110000EBCD91
:1060A0000046CAA96021FFFFC96069C9CD8F4500BC
:1060B00000210A00394E2346210200095E2356D5ED
:1060C00060695E2356E1CD2C47CAE1602108039A2
:1060D0005E235621FF00CD7E45E5C5CDE261D1D1DD
:1060E000C9210800395E2356D56069E57E23666FB5
:1060F00023EBE1732372EB2BD17321FF00CD7E459F
:10610000C9CD8F45000021FFFFE5210A00395E233C
:1061100056D5CDE261D1D1C9CD8F450000210D0109
:10612000444D606911860 1EBCD3A47CA426160690E
:10613000110B0019444D11F5FF19E5CD4361D1C391
:106140002261C9CD8F45FEFF210A00394E23462129
:1061500000000EB21040039 7323726069110600 19F5
:1061600007EB7CAD061210600095E1600210400CD69
:1061700007E45CA876121FFFFE5C5CDE261D1D1EB44
:10618000021040039732372210700095E1600D5CD62
:10619000A073D1EB21040039E57E23666FCDA846BC
:1061A000EBE173237221060095E1600210200CD87
:1061B0007E45CAD0612A8601E5210400095E235686
:1061C000EBD1732372210400095E2356EB22860172
:1061D000210000EB210600097321040 0395E2356DB
:1061E000EBC9CD8F45FEFF210A00394E234621061B
:1061F00000095E1600210400CD7E45CA57622104C5
:10620000000095E2356D560695E2356E1CDDA46EB80
:1062100021040039732372210400395E2356D521ED
:106220000400095E2356D5210700095E1600D5CD6E
:10623000377AD1D1D111FFFFCDC645CA576221109F
:1062400000E5606911060019D1E56E2600CDA8466B
:10625000EBE17321FFFFC9210C00395E235621FFBA
:10626000FFCDC645CA906221FBFFE560691106008B
:1062700019D1E56E2600CD7E45EBE173210000EBE0
:1062800060697323722102000973237221000 0C91F
:1062900060691104001 97E23B6C2A162C5CD89636D
:1062A000D1210900095E2356210100CDC645CADA75
:1062B00062210100E5210E0039E5210700095E1683
:1062C00000D5CD377AD1D1D111FFFFCDC645C23E21
:1062D00062210C00395E2356EBC9210400095E23BC
:1062E0005660697323722109000 95E2356D5210483
:1062F000000 95E2356E119EB21020009732372 2184
:10630000400E5606911060019D1E56E2600CDA8EC
:1063100046EBE173210C00395E2356D56069E57EBA
:1063200023666F23EBE1732372EB2BD17321FF0004
:10633000CD7E45C9CD8F450000210A00394E234648
:10634000210800395E235621FFFFCDC645C2646394
:106350002104 00095E2356D560695E2356E1CD2DE8
:1063600047CA686321FFFFC9210800395E2356D55B
:106370006069E57E23666F2BEBE1732372EBD173CB
:10638000210800395E2356EBC9CD8F45FEFF210A57
:10639000000394E2346210900095E2356210100CD14
:1063A000C645CAB463606911080019EB21040009ED
:1063B000732372C92A86017CB5CAD4632A8601EB8D
:1063C0002104003973237 22A86015E2356EB22864C
:1063D00001C3FB63210900095E2356D5CD2364D197
:1063E000EB21040039732 3727AB3C2FB63210100ED
:1063F000EB21090009732372C3A563210200E56044
:1064000069110600 19D1E56E2600CDA846EBE173AF
:10641000210400395E2356210400097323 72C90048
:106420000000000CD8F4500002A21647CB5C23E6487
:10643000210000E5CDD56CD1221F642221642A21E0
:1064400064444D210800395E23562A216419222113
:10645000645059EBCD3A47CA63646069222164 21D4
:1064600000000C92A2164EB2A1F64CD3B47CAA264FD
:106470002A2164EB2A1F64CDDA4611FF01191100AD
:10648000FECD7E45EB210800397323 72D5CDD56C46
:10649000D1CA5A6421080 0395E23562A1F64192282
:1064A0001F646069C900003031323334353637 3803
:1064B000396162636465 6600CD8F450000210800 84
:1064C000395E2356EB22A564210C0039E5210C002E
:1064D000395E2356D521E964E5CD0765D1D1D121B7
:1064E0000000E52AA564D173C9CD8F4500002108BD
:1064F00000395E2356D52AA5642322A5642BD173C7
:1065000021FF00CD7E45C9CD8F458CFF214C003910
:106510004E2346214E0039E57E23666F23EBE1735F
:106520002372EB2B5E16002146003973237 27AB377
:10653000CAA46A214600395E2356212500CDC645EE
:10654000CA936A210000EB211A003973210100EB84
:106550002144003973237221 2000EB214200 39735A
:106560002372 21FF7FEB214000397323722 14E00FB
:10657000395E2356EB5E1600214600397323 7221E3
:106580002D00CDC645CAAE65210000EB214400397F
:10659000732372214E0039E57E23666F23EBE1738E
:1065A0002372EB2B5E16002146003973237221 46BD
:1065B00000395E2356213000CDC645CAC965213059
:1065C0000EB21420039732372210000EB213E00D1
:1065D00039732372214E0039E57E23666F23EBE188
:1065E000732372EB2B5E16002146003973237221 50
:1065F0003000CDE545CA2E66214600395E2356217E
:106600003900CDE645CA2E66213E00395E2356216B
:10661000A00CD7E46EB214600397E23666F1911B4
:10662000D0FF19EB213E00397323 72C3D465214694
:106630000395E2356212E00CDC645CAA36621002F

:1066400000EB21400039732372214E0039E57E238F
:10665000666F23EBE1732372EB2B5E160021460070
:106660003973237221 3000CDE545CAA36621460067
:10667000395E2356213900CDE645CAA36621400084
:10668000395E2356210A00CD7E46EB21460039 7E35
:1066900023666F1911D0FF19EB214000397323726 3
:1066A000C3496621460039 5E2356216C00CDC6459C
:1066B000CAF466214E0039E57E23666F23EBE17351
:1066C0002372EB2B5E160021460039732372213AA8
:1066D0000039E5215200 39E57E23666F1104001967
:1066E000EBE1732372EB11FCFF19CD5A82E1CD6D02
:1066F00082C3A367214600395E2356216400CDC6BC
:1067000045CA2A67213A0039E5215200 39E57E233E
:10671000666F2323EBE1732372EB2B2B5E2356EB87
:10672000CDCA85E1CD6D82C3A367214600395E23C2
:1067300056216500CDC645C25A67214600395E2301
:1067400056216600CDC645C25A67214600395E23F0
:1067500056216700CDC645CA806721040039E5216E
:106760005200 39E57E23666F11080019EBE17323AF
:1067700072EB11F8FF19CD0651E1CDF551C3A367E6
:10678000213A0039E5215200 39E57E23666F232343
:10679000EBE1732372EB2B2B5E2356EBCDBC85E133
:1067A000CD6D82214600395E2356EBC35F69211A05
:1067B0000039E5210800E5213E0039CD5A82CD801F
:1067C00082CD0B6BEB21080039F921340039732 39A
:1067D00072C38669213A0039CD5A82CD45820000C4
:1067E0000000CD9285CA2768211A0039E5210A00E8
:1067F000E5213E0039CD5A82CDBB82CD8082CDA528
:106800006AEB21080039F921340039732372212DF4
:1068100000E5213600 39E57E23666F2BEBE173231B
:1068200072EBD173C34A68211A0039E5210A00E5E9
:10683000213E0039CD5A82CD8082CDA56AEB210858
:106840000039F9213400397323 72C38669211A0093
:10685000 39E5210A00E5213E0039CD5A82CD8082FA
:10686000CD0B6BEB21080039F92134003973237209
:10687000C38669211A0039E5211000E5213E00395F
:10688000CD5A82CD8082CD0B6BEB21080039F921E6
:106890003400397323 72C38669213A0039CD5A8294
:1068A000CDDD85EB2134003973 2372D5CDE480D161
:1068B000EB2138003973 2372C39E69214600395E8B
:1068C0002356216500CDC645CAD168210000C3D436
:1068D0006821010 0E5214200395E235621FF7FCD6A
:1068E000C645CAEB68210600C3F368214200395E41
:1068F0002356EBE5211000 39E5210A0039CDD651A8
:10690000CD1752CD2C59EB210E0039F9210C00394D
:10691000EB2134003973 2372D5CDE480D1EB2138D8
:106920000039732372 21C800EB21400039732372B0
:10693000C39E69213A0039CD5A82CDDD85EB2146CF
:106940000039732372214600395E2356D5211B007E
:106950 0039EB2136003973 2372EBD173C38669CDCD
:106960000054708006F00AE676400D46775004D6886
:1069700078007368730099686500BB686600BB683F
:106980006300336945 69211A0039EB213400397EEF
:1069900023666FCDDA46EB213800397323722138 34
:1069A00000395E235621400039 7E23666FCD0146B3
:1069B000CAC169214000395E235621380039 73234A
:1069C00072214400397E23B6CAFC69213E0039E5B4
:1069D0007E23666F2BEBE1732372EB23EB213800F0
:1069E000397E23666FCD0146CAFC69214200395EB8
:1069F0002356D56069CD8E45D1C3CB6921 0000EB0C
:106A0000213600397323 72C3196A21360039E57EB5
:106A100023666F23EBE173237221 3400395E235622
:106A2000EB7EB7CA596A213600395E2356214000F1
:106A3000397E23666FCD0046CA596A21340039E594
:106A40007E23666F23EBE1732372EB2B5E1600D57A
:106A50006069CD8E45D1C30A6A214400397E23B6D0
:106A6000C2906A213E0039E57E23666F2BEBE1730D
:106A70002372EB23EB213800397E23666FCD01466C
:106A8000CA906A212000E56069CD8E45D1C3636A52
:106A9000C3A16A214600395E2356D56069CD8E4573
:106AA000D1C31365C9CD8F450000210C00394E2399
:106AB000466069CDCA85CD8082210C0039CD5A82CD
:106AC000CD9882CD4084CDDD8511A764195E160076
:106AD000D5211000 39E57E23666F2BEBE17323721D
:106AE000EBD1732108 0039E56069CDCA85CDAC8250
:106AF000E1E5CD5A82CD0684E1CD6D82CDCB82C257
:106B0000B16A210E00395E2356EBC9CD8F45FEFFD9
:106B1000210E00394E2346210A0039CD5A82CD4537
:106B2000820000 0000CD9285CACB6B210A0039CDCE
:106B30005A82CDDD85110100CD7E45EB210400395F
:106B40007323 72210A0039E5210C0039CD5A82CD18
:106B500045820100 0000CDBD83CD4582FFFFFF7F50
:106B6000CD4283E1CD6D826069110100EBCDB0466D
:106B7000CDCA85CD8082210E0039CD5A82CD988232
:106B8000CD4084CDDD8529EB210400397E23666F5D
:106B90001911A764195E1600D521120039E57E236C
:106BA000666F2BEBE1732372EBD173210A0039E599
:106BB0006069110100EBCDB046CDCA85CDAC82E154
:106BC000E5CD5A82CD0684E1CD6D82211000395E7B
:106BD0002356D5C5210E0039CD5A82CD8082CDA550
:106BE0006AEB21080039F9EBC9E5852A0600F9CDE1
:106BF000BA6D010000CD0500C3F26BCD6F47CD0625
:106C00006CEBC9CD6F472A7845444D2A7A45EBCDC8
:106C10000500EB6F2600C9CD6F47CD246C6F2600B1
:106C2000C9CD6F472A7845EB2A01002B2B2B191968
:106C300019EB2A7A45444D2A7C45EBE9C52104002D
:106C4000394E2346235E23566B623600233E0B36B5
:106C500020233DC24F6C3E043600233DC2586CEBEE
:106C6000030AFE3A0B3E00C2886C0AE67FFE41DA55
:106C7000C56CFE5BD27C6CD640C3886CFE61DAC505
:106C80006CFE7BD2C56CD660770303231E081C0AFA
:106C9000003FE2ECAA66CB7CABF6C1DCA8E6CCDCCC3
:106CA0006C7723C38F6C1D7B856F7CCE00671E03C2
:106CB0000A03B7CABF6CCDCC6C77231DC2B06C2160
:106CC0000000AFC1C921FFFF7CB7C1C9FE61D8FE7A
:106CD0007BD0D620C9210200395E23562AE96B19E0
:106CE000EB2100FE397D937C9ADAF76C2AE96BEB95
:106CF00022E96BEB7CB5C9210000AFC900000000A0

:106D000000000000000000000000000000000000083
:106D100000000000000000000000000000000000073
:106D200000000000000000000000000000000000063
:106D300000000000000000000000000000000000053
:106D400000000000000000000000000000000000043
:106D500000000000000000000000000000000000033
:106D600000000000000000000000000000000000023
:106D700000000000000000000000000000000000013
:106D800000000000000000000000000000000000003
:106D9000000000000000000000000000000000000F3
:106DA000000000000000000000000000000000000E3
:106DB00000000000000000000000CD8F45FCFF2116
:106DC0007F00E5210100E521386DE5CD4A80D1D1F4
:106DD000D1210000E53A80006F2600117F00CD7EB2
:106DE0004511386D19D17321D66F22FC6C21386D95
:106DF000444D21010022B86D2AB86D111E00EBCD63
:106E00000046CAC36F60695E1600212000CDC645EA
:106E1000C2216E60695E1600210900CDC645CA29EF
:106E20006E606923444DC3056E60695E16007AB3D7
:106E3000CAC36F60695E1600213E00CDC645CA4FC9
:106E40006E210100EB21040039732372C3686E6068
:106E5000695E1600213C00CDC645CA746F21000052
:106E6000EB21040039732372606923444D5E1600E0
:106E7000212000CDC645C2876E60695E16002109D8
:106E800000CDC645CA8A6EC3686E6069EB210600F4
:106E9000397323726069234 44D7EB7CACC6E606932
:106EA0005E1600212000CDC645C2BA6E60695E162E
:106EB00000210900CDC645CAC96E210000E5606900
:106EC00023444D2BD173C3CC6EC3946E210400397F
:106ED0005E2356D5CDA073D1210400397E23B6CAD6
:106EE000FE6E21B601E5210800395E2356D5CD9D01
:106EF00071D1D1EB21040039732372C3176F2100C4
:106F000000E5210800395E2356D5CD8D71D1D1EB06
:106F10002104003973237221040039 5E235621FFB6
:106F2000FFCDC645CA716F21D76FE5218000E5CD41
:106F3000BF80D1D1210600395E2356D5218000E5DE
:106F4000CD2A81D1D121F96FE5218000E5CD2A81B8
:106F5000D1D1218000E5CDE480D1E5218000E5217B
:106F60000200E5CD377AD1D1D1210A00E5CDFB6F02
:106F7000D1C3C06F6069E52AB86D2322B86D2B2993
:106F800011FC6C19D17323726069234 44D7EB7CA1A
:106F9000C06F60695E1600212000CDC645C2AE6F8D
:106FA00060695E1600210900CDC645CABD6F21008B
:106FB00000E5606923444D2BD173C3C06FC3886F54
:106FC000C3F86D21FC6CE52AB86DE5CD0532D1D151
:106FD000E5CDFB6FD1C90043616E2774206F7065EA
:106FE0006E2066696C6520666F72207265646972D6
:106FF000656374696F6E3A20000A00CD8F4500000A
:10700000CD1861210800397E23B6CA157021197088
:10701000E5CD057FD1CDF26BC9413A2424242E530E
:10702000554200CD8F45000021FDFF22030121FFC5
:10703000FFC9CD8F450000210000C90000000000FD
:1070400000000000000000000000000000000000040
:1070500000000000000000000000000000000000030
:1070600000000000000000000000000000000000020
:1070700000000000000000000000000000000000010
:1070800000000000000000000000000000000000000
:10709000000000000000000000000000000000000F0
:1070A000000000000000000000000000000000000E0
:1070B000000000000000000000000000000000000D0
:1070C000000000000000000000000000000000000C0
:1070D000000000000000000000000000000000000B0
:1070E000000000000000000000000000000000000A0
:1070F00000000000000000000000000000000000090
:107100000000000000000000000000000000000007F
:107110000000000000000000000000000000000006F
:107120000000000000000000000000000000000005F
:107130000000000000000000000000000000000004F
:107140000000000000000000000000000000000003F
:107150000000000000000000000000000000000002F
:107160000000000000000000000000636F6E3A00A5
:10717000434F4E3A006C73743A004C53543A0070CB
:10718000726E3A0050524E3A0070756E3A00505589
:107190004E3A007264723A005244523A00CD8F4522
:1071A0000000210A00395E2356D5210103E5210C98
:1071B00000395E2356D5CD8D71D1D1D1C9CD8F4512
:1071C000F8FF21E201EB210A00397323722100004C
:1071D000EB21060039732372C3FC71210A0039E5E3
:1071E0007E23666F11080019EBE17323722106 00FC
:1071F00039E57E23666F23EBE173237221060039A4
:107200005E2356210B00CD0046CA2672210A0039A2
:107210005E2356210400195E2356212370CDC645F6
:10722000C23072C3DB7121F8FF22030121FFFFC9C5
:1072300021A001444DC34072606911060019444DFC
:1072400060697E23B6CA617221100 0395E2356D56B
:1072500060695E2356D5CD8680D1D1CA6172C338AC
:107260007221020009 5E235621080039732372211E
:107270001200395E2356210300CD7E4523EB210405
:107280000039732372210400395E2356210100CD99
:107290007E45CABA72210800395E2356EB5E16009D
:1072A000D5210C00395E2356EBD1737AB3C2BA7282
:1072B00021F6FF22030121FFFFC9210400395E23CB
:1072C00056210200CD7E45CAF172210800395E23A5
:1072D00056EB235E1600D5210C00395E2356EB23B6
:1072E000D1737AB3C2F17221F6FF22030121FFFFAD
:1072F000C9210400095E2356D5210C00395E2356AE
:1073000021060019D1732372210800395E2356EB40
:1073100023235E1600D5210C00395E2356EB232370
:10732000D173210800395E2356EB2323235E160018
:10733000D5210C00395E2356EB232323D17321A6DC
:1073400075E5210C00395E23562104 0019D1732301
:1073500072C5210C00395E2356D5211800395E23F1
:1073600056D5211800395E2356D5211800395E23E1
:1073700056D5211200395E2356210400195E23568A
:10738000EBCD8E45EB210A0039F9210000CD0046F6
:10739000CA977321FFFFC9210600395E2356EBC946
:1073A000CD8F450000210800395E2356210000CD15
:1073B0000046C2C573210800395E2356210800CD5B

:1073C0000146CACF7321FDFF22030121FFFFC9211E
:1073D0000800395E2356EB29292911E20119444D91
:1073E000210600095E2356D5210400095E2356EBD1
:1073F000CD8E45D1EB21080039732372210000EBBB
:10740000210300097321020009732101000973603F
:10741000697321237 0EB2104000973237221080092
:10742000395E2356EBC9CD8F450000213B70444D9A
:10743000C33B74606911260019444D6069116B717A
:10744000EBCD3A47CA5674212500095E16007AB37F
:10745000CA6074C3337421F9FF22030121FFFFC9FD
:10746000C5210A00395E2356D5CD3C6CD1D1CA7BEB
:107470007421FAFF22030121FFFFC9210A00395EAE
:107480002356210002CD7E45CA9574C5211300E51F
:10749000CD036CD1D1C5210F00E5CD036CD1D11145
:1074A000FF00CDC645CAD874210A00395E23562193
:1074B0000003CD7E45CACB74C5211600E5CD036C13
:1074C000D1D111FF00CDC645CAD57421FFFF2203DB
:1074D0000121FFFFC9C3F874210A00395E23562138
:1074E0000005CD7E45110005CDC645CAF87421FBC7
:1074F000FF22030121FFFFC9210000EB2121000928
:10750000732372212300097321240009736069E544
:10751000211000395E235621060019D173237221F0
:107520000A00395E2356210300CD7E4523EB212539
:10753000000973210200CD7E45CA5275218375E58D
:10754000211000395E235621040019D1732372C320
:107550006575216975E5211000395E235621040007
:1075600019D1732372210000C9CD8F45000021007D
:1075700000E5210A00395E235621250019D1732127
:107580000000C9CD8F450000210800394E2346C5B3
:10759000211000E5CD036CD1D1210000EB212500A5
:1075A0000973210000C9CD8F450000210000C923C7
:1075B000702977EA78C77900000000000000000019
:1075C00000000000000000000000000000000000BB
:1075D00000000000000000000000000000000000AB
:1075E000000000000000000000000000000000009B
:1075F000000000000000000000000000000000008B
:10760000000000000000000000000000000000007A
:10761000000000000000000000000000000000006A
:10762000000000000000000000000000000000005A
:10763000000000000000000000000000000000004A
:10764000000000000000000000000000000000003A
:10765000000000000000000000000000000000002A
:10766000000000000000000000000000000000001A
:10767000000000000000000000000000000000000A
:1076800000000000000000000000000000000000FA
:1076900000000000000000000000000000000000EA
:1076A00000000000000000000000000000000000DA
:1076B0000000000000000000000000CD8F45000029
:1076C000210800395E2356210000CD0046C2E07635
:1076D000210800395E2356210B00CD0146CAEA7607
:1076E00021FDFF22030121FFFFC9210800395E238C
:1076F00056EB29292911E20119444D210C00395E6C
:107700002356D5210C00395E2356D5210600095E8B
:107710002356D560695E1600EB2911AF75195E23FB
:1077200056EBCD8E45D1D1D1C9CD8F45FAFF210081
:1077300000444D210E00395E235621080039732381
:10774000722108 00395E2356212400197EB7CAA091
:1077500077210800395E2356212400195E1600D5D2
:10776000218000D1EBCDDA46444DEB211200397E69
:1077700023666FCD3B47CA8277211200395E2356BC
:10778000424BC5211200395E2356D5210C00395ECB
:107790002356D5CD6378D1D1D1CAA07721FFFFC9B7
:1077A000211200395E23566069CDDA46110700EBDD
:1077B000CD4747EB210600397323727AB3CA0B78A1
:1077C000210600395E2356D5211200395E2356600A
:1077D0006919E5210C00395E2356D5CDB47ED1D18F
:1077E000D1EB210400397323727AB3CA0B782106D6
:1077F00000395E2356210400397E23666FCDDA46B8
:10780000110700EBCDCA46505919C9210600395E4F
:107810002356210700CDCA46505919444D6069EBE3
:10782000211200397E23666FCD3A47CA5A78211259
:1078300000395E23566069CDDA46E5211200395ED3
:107840002356606919E5210C00395E2356D5CD63B6
:1078500078D1D1D1CA5A786069C9211200395E2322
:1078600056EBC9CD8F450000210800394E23462133
:107870008000E5211A00E5CD036CD1D1C52121009E
:10788000E5CD036CD1D12203017CB5CA927821FFEA
:10789000FFC9210C00395E2356D5212400095E164C
:1078A0000021800019E5210E00395E2356D5CD4A0E
:1078B00080D1D1212400095E1600210C00397E2F
:1078C00023666F19117F00CD7E45EB2124000973DB
:1078D0007AB3C2E678606911210019E57E23666FEC
:1078E00023EBE1732372210000C9CD8F4500003ADC
:1078F000B8756F26007CB5C2727921FF007D32B762
:10790000752100007D32B9757D32B87521B775E5F6
:10791000210A00E5CD036CD1D1210A00E521020046
:10792000E5CD036CD1D13AB9756F2600111A00CD9F
:10793000C645CA40792100007D32B875210000C9D2
:10794000210D00E53AB8756F2600237D32B8751118
:10795000B7751923D173210A00E53AB8756F26006F
:10796000237D32B87511B7751923D1732102002216
:10797000B9763AB8756F2600444DEB210C00397E7C
:1079800023666FCD0146CA9279210C00395E2356D9
:10799000424BC52AB97611B77519E5210E00395E3B
:1079A0002356D5CD4A80D1D1D16069EB2AB9761959
:1079B00022B9766069EB3AB8756F2600EBCDDA46EE
:1079C0007D32B8756069C9CD8F45FEFF210C003945
:1079D0004E2346210000EB21040039732372C3F0CB
:1079E0007921040039E57E23666F23EBE17323726E
:1079F000210400395E2356210E00397E23666FCDA7
:107A00000046CA267A210A00395E2356D5CD036C7A
:107A1000D1E5606923444D28D173211A00CDC645B1
:107A2000C2267AC3E179210400395E2356EBC923CB
:107A300070A77AB17CB17CCD8F4500002108003958
:107A40005E2356210000CD0046C25C7A2108003931
:107A50005E2356210B00CD0146CA667A21FDFF2226
:107A6000030121FFFFC9210800395E2356EB2929B4
:107A70002911E20119444D210C00395E2356D5210C

:107A80000C00395E2356D5210600095E2356D52108
:107A9000010009 5E1600EB29112F7A195E2356EBBF
:107AA000CD8E45D1D1D1C9CD8F45FAFF21000044FB
:107AB00004D210E00395E2356210800397323722 1AF
:107AC000080 0395E235621240019 7EB7CA1E7B2187
:107AD000080 0395E2356212400195E1600D5218046
:107AE00000D1EBCDDA46444DEB211200397E2366FE
:107AF0006FCD3B47CA007B211200395E2356424BB3
:107B0000C5211200395E2356D5210C00395E23565B
:107B1000D5CDE17BD1D1D1CA1E7B21FFFFC9211276
:107B200000395E23566069CDDA46110700EBCD4778
:107B30047EB21060039732372 7AB3CA897B210689
:107B400000395E2356D5211200395E2356606919 2B
:107B5000E5210C00395E2356D5CDBC7ED1D1D1EBC9
:107B60002104003973237 27AB3CA897B2106003954
:107B70005E2356210400397E23666FCDDA46110755
:107B8000 0EBCDCA46505919C9210600395E23566B
:107B90002107 00CDCA465059 19444D6069EB2112A6
:107BA00000397E23666FCD3A47CAD87B211200394F
:107BB0005E23566069CDDA46E5211200395E235610
:107BC000606919E5210C00395E2356D5CDE17BD1E2
:107BD000D1D1CAD87B6069C9211200395E2356EB26
:107BE000C9CD8F450000210800394E23462180007 1
:107BF000E5211A00E5CD036CD1D1C5212100E5CDE9
:107C0000036CD1D1220301110100CDC645C21C7CF9
:107C10002A0301110400CDC645CA377C2100002289
:107C200003012 11A00E5218000E5218000E5CD6AED
:107C30008 0D1D1D1C3437C2A03017CB5CA437C21C6
:107C4000FFFFC9210C00395E2356D5210C00395E97
:107C50002356D5212400095E16002180001 9E5CDA8
:107C60004A80D1D1D1C5212200E5CD036CD1D122EA
:107C7000030 17CB5CA7B7C21FFFFC9212400095E7A
:107C8000160021 0C00397E23666F19117F00CD7E0E
:107C90045EB212400097 37AB3C2AD7C6069112 1E0
:107CA000 0019E57E23666F23EBE1732372210000 48
:107CB000C9CD8F45FCFF210E00394E23462100001F
:107CC000EB2104003973237 2C3DA7C21040039E507
:107CD0007E23666F23EBE17323722104003 95E2358
:107CE00056211000397E23666FCD0046CA387D606C
:107CF00069234 44D2B5E1600210600397323722 13F
:107D0000 0600395E2356210A00CDC645CA207D21D2
:107D10000D00E5210E00395E2356D5CD036CD1D17F
:107D2000210600395E2356D5210E00395E2356D533
:107D3000CD036CD1D1C3CB7C210400395E2356EB3B
:107D4000C9CD8F450000210800395E235621 00006F
:107D5000CD0046C27D7D210800395E2356210B00EF
:107D6000CD0146C27D7D210800395E2356EB2929CD
:107D70002911E501195E16007AB3C28B7D21FDFF42
:107D800 0220301CD5382FFFFFFFFC9210800395EA6
:107D90002356EB292929 11E801195E2356424B216C
:107DA000E00395E2356EBC32C7EC5211000E5CD85
:107DB000036CD1D111FF00CDC645CACB7D21FDFF9B
:107DC000220301CD5382FFFFFFFFC9C5212300E538
:107DD000CD036CD1D1210000EB2124000973210ACD
:107DE0000039E5212100095E2356EBCDBC05CD4548
:107DF0008207000000CD8F03CD8082212400095EA0
:107E000 01600EBCDCA85CD9882CD1683CDAC82E12C
:107E1000E5CD5A82CD1683E1CD6D82C33F7E21FA36
:107E2000FF220301CD5382FFFFFFFFC9CD054703AA
:107E3000000200AA7D0100DE7D00001B7E1E7E2167
:107E40000000EB21230009 73210A0039CD5A82CDAD
:107E5000458200000000CD9285CA7A7E210000EBA9
:107E600021210009732372212400097321FAFF22C2
:107E7000 0301CD5382FFFFFFFFC9210A0039CD5A0C
:107E80008 2CDD85117F00CD7E45EB212400097375
:107E9000210A0039CD5A82CD4582070000 00CD8DB0
:107EA00083CDD085EB2121000973237 2210A00397E
:107EB000CD5A82C9CD6F470E21C3C17ECD6F470E0B
:107EC00022C52A7A45EB21800019227A450E1ACD67
:107ED0000500C1C52A7845EBCD0500B7C2FA7E2A58
:107EE00078451121001934C2EC7E23342A7C452BBD
:107EF00027C457DB4C2C27EC1C96F260022030127
:107F0000C12A7C45C9CD8F45DCFF21040039E5211C
:107F10002E00395E2356D5CD3C6CD1D121040039D9
:107F2000E5211300E5CD036CD1D1C90000000000AC
:107F3000C5AF322B7F322C7F322D7F210000222EC5
:107F4007FCD9955210400394E23460AFE2DC25794
:107F50007F322B7FC35C7FFE2BC25D7F030AFE3026
:107F6000DA8C7FFE3AD28C7FF5CD1E5BCD7352F159
:107F7000D6306F2600CD9955CDDC523A2D7FB7CA49
:107F80005C7F2A2E7F2B222E7FC35C7FFE2EC29920
:107F90007F212D7F3601C35C7F210000F620FE6526
:107FA000C2E67F030AFE2DC2B07F322C7FC3B57FAD
:107FB000FE2BC2B67F030AFE30DAD07FF¿3AD2D063
:107FC007FD63029545D2929195F160019C3B57F62
:107FD0003A2C7FB7CADE7F7C2F677D2F6F23EB2A79
:107FE0002E7F19222E7F2A2E7F7CB7F22C80FEFF57
:107FF000C248807D2F3C4FFEA6D24880FE96DA1301
:1080000080CDC151472386F26FC10000CD815379B5
:10801000D6104FCD7352210100CD9955CD1E5B0D69
:10802000C21C80CD7352CD8153C33C80C248807D09
:10803000B7CA3C804FCD1E5B0DC235803A2B7FB74F
:10804000CA4680CD8252C1C9C1C9C5210900394 67D
:108050002B4E2B562B5E2B7E2B6E6778B1CA688019
:108060001A7713230BC35B80C1C9C5210400395E95
:108070002356234E2346236EEB78B1CA84807323A4
:108080000BC37980C1C9210200 39C501FF7F5E237E
:1080900056237E23666F78B1CAAA801ABEC2AF800B
:1080A000B7CAAA8023130BC39680C1210000C9C19F
:1080B000DAB9802101007DB4C921FFFF7DB4C92157
:1080C000020039C501FF7F5E2356D5237E23666FEC
:1080D00078B1CAE1807E12B7CAE18023130BC3D006
:1080E00080E1C1C9210200397E23666F110000AF13
:1080F000BECAF9801323C3F080EB7DB4C92102000E
:108100 0039C55E2356D5235E2356234E2346EBD135
:10811000C39680210200 39C55E2356D5D5235E2340
:1081200056234E2346EBD1C3D080C501FF7F2104E7
:1081300000395E2356D5237E23666FEB78B1CAE102

```
:10814000807EB7CA4881230BC33C81EBC3D0802117
:10815000020039C55E2356D5D5235E2356234E2310
:1081600046E1AFC33C81C5210400395E2356236E2E
:10817000EB7EB7CA7E81BBCA848123C37181210093
:1081800000AFC1C97CB5C1C9C5210400395E235601
:10819000236EEB010000AFBECAA0812303C3978109
:1081A00078B1CA7E810B2B7EBBC2A081C3848121A2
:1081B0000200397EFE20CAD581FE09CAD581FE0A99
:1081C000CAD581C3EA81210200397EFE41DAEA8103
:1081D000FE5BD2EA812101007DB7C9210200397E10
:1081E000FE61DAEA81FE7BDAD581210000AFC92188
:1081F0000200397EFE30DAEA81FE3AD2EA81C3D546
:1082000081210200397EFE61DA1282FE7BD2128267
:10821000D6206F2600B7C9210200397EFE41DA2838
:1082200082FE5BD22882C6206F2600B7C9000000FC
:10823000000000000000000000000000000000003E
:10824000000000000000D121040019E5EBEB2A033205
:10825000C35E82D121040019E5EBEB2A01321A77C3
:1082600023131A7723131A7723131A77C9EB2A01DA
:10827000327E1213237E1213237E1213237E12C921
:10828000E1222D822A01321103001956285E2BD5D3
:108290005628 5ED52A2D82E9E1222D822A0332D186
:1082A00073237223D17323722A2D82E92A0332EBBE
:1082B0002A01322203 32EB220132C92A0132AF16DF
:1082C000043E009E772315C2C182C92A01321604DA
:1082D0007EB7C28C852315C2D082C38185AF3DC1D4
:1082E000C9AF3CC1C9C52A0132EB2A03322323237B
:1082F0001313131AB7FAFF82AEFAE182C30383AEF7
:10830000FADD8206041ABEDADD82C2E1822B1B0589
:10831000C20583AFC1C9C52A0132EB2A0332AF06B9
:10832000041A8E12231305C22183C1C9C52A013242
:10833000EB2A0332AF06041A9E12231305C23783B9
:10834000C1C9C52A0132EB2A03320604 1AA6122338
:108350001305C24C83C1C9C52A0132EB2A03320678
:10836000041AB612231305C26183C1C9C52A01329A
:10837000EB2A03320604 1AAE12231305C27683C118
:10838000C92A013216047E2F772315C28683C92A93
:108390003327EE63FC8C5472A01325E2356237E5C
:1083A00023666F29EB29EBD2AB832305C2A3834459
:1083B0004D2A013273237223712370C1C92A0332FB
:1083C0007EE63FC8572A01322323237EB7FAE28391
:1083D000E51E04B77E1F772B1DC2D483E115C2D0E2
:1083E00083C9E51E04377E1F772B1DC2E683E11586
:1083F000C2E283C9D506047E12231305C2F783E1C6
:108400004FB7F0C3BE82C52A0132113982CDF48341
:1084100079323782 2A033211 4182CDF4833A37828E
:10842000A93237 82CD738411398 22A013206041AA7
:108430007713 2305C22F84C13A3782B7FABB82C9AA
:10844000C52A0132113982CDF4837932378 22A0369
:10845000321141 82CDF483CD738411 3D822A0132E1
:1084600006041A77132305C26284C13A3782B7FA29
:10847000BB82C90604213D82AF772305C279843EC1
:108480002032388221398206088 77E8F772305C2D1
:10849000 8A849FE6014F0604113D82214182B71A6A
```

```
:1084A0009E12132305C29F8479DE00C2BA84213948
:1084B00082342138 8235C28484C921388235CAEC9D
:1084C0008421398206088 77E8F772305C2C7849F2F
:1084D0004F0604113D82214182B71A8E12132305E3
:1084E000C2DA8479CE00C2BA84C3AE840604113DD8
:1084F0008221418 2B71A8E12132305C2F584C9C5A1
:108500002A03320604114182 7E12231305C2088514
:108510002A01320604113D827E12231305C21885FA
:10852000060421398 2AF772305C226853E203238E2
:108530008221398206088 77E8F772305C237 85D21C
:1085400062850604113982214182B71A8E121323E3
:10855000 5C248506041ACE0012D262851305C2ED
:1085600056852138 8235C231852A013211398 20679
:10857000041A77132305C27185C1C9CDE582CA8C5F
:108580008521 0000AFC9CDE582CA8185210100AFF8
:108590003CC9CDE582FA8C85C38185CDE582FA8C14
:1085A00085CA8C85C38185CDE582FA8185C38C859A
:1085B000CDE582FA8185CA8185C38C85EB2A01329B
:1085C00073237223360023 3600C9EB2A013273234A
:1085D00072237AB7F2C48536FF2336FFC92A0132E7
:1085E0005E2356EBC935C231852A013211398 20624
:1085F000041A77132305C27185C1C9CDE582CA8CDF
:0000000000
```

TABLE XXXVII

Object Code of FILESYM Program to Translate Relative Addresses to Absolute Addresses

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSE OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
:10010000C36649000000000000000000000000007D
:1001100000000001000000040000000000000101D8
:1001200000010000000000000001020001000000CA
:10013000000000000000000000000000000000BF
:10014000000000000000000000000000000000AF
:100150000000000000000000000000000000009F
:100160000000000000000000000000000000008F
:100170000000000000000000000000000000007F
:10018000000000000000000000202010021530002F4
:10019000000021530300000021530101000 1A1517F
:1001A000E64E88010200EB4E88010200F04E8E01FF
:1001B0000500F54E8E010500FA4E8E010500FF4E3A
:1001C0008E01050044F8E010400094F8E010400CA
:1001D0000E4F940103001 34F94010300000009A0195
:1001E00000002000100AD4D020000020100AD4D13
:1001F000020000020100AD4D0200000000009E4D13
:100200000000000000009E4D000000000009E4D18
:100210000000000000009E4D000000000009E4D08
:100220000000000000009E4D000000000009E4DF8
:100230000000000000009E4D000000B70E03C4A99E
:100240001BF1FE2CCAEA2BC93A2C3DB7C2C104CD22
:10025000C80B2A463D2BCD714EB7CA312CCD344F39
:10026000C3DF043D322C3D2A463D7E2322463DFE1F
:1002700021D2352CC9CDC80BFE28C29D04CD290B37
:10028000FE27C29D04CD550BC29D04FE27C29D04CE
:10029000CD290BFE29C29D04CD400B3AEC3CB7C0E2
:1002A0003AE93DFE06DA782C3E0611EA3D215D3F33
:1002B000477EB7C2B5041A77231305C2842C70C9D0
:1002C000CD042CCDC80BFE2FC29D04CD550BC4CC74
:1002D0002CFE2FC29D04CD400BCDFC0C237EE6D01E
:1002E000C2B504E57EF62477CD3227E12B22DA3D34
:1002F0003E0332D13D21000022D23DC3B126F53E5E
:10030000132E93DF1C93AE43DB7C8C1C3C70411A0
:100310008000CD550BC2062DF5B7D5CDFC0CCD1503
:100320002DD17EB277237EE664C20C2D7EE603B328
:1003300077F1FE2CCAE02CC9CD9D04C3002DF61028
:1003400077CDB504C3FF2C7EE67FFE42D6AF77E5BC
:10035000AF2377237723 77E1C9CD550BCD15057EE4
:1003600087D4C104237EFE10CA3E2DFE0FC4C104F3
:10037000118004C3E02C22433DCD6D2D3A113E3255
:10038000313DFE55C878E680C2AF0478F6203230A1
:100390003D2A433D223F3DCDDB0DEB78C3341BCDE1
:1003A00083203AC23EB7C8C3CD0422433D7EF680C7
:1003B000777C32313DCD6D2D78E680C2AF042A4383
:1003C0003DCD152D237EE694C2B5047EE640B0F601
:1003D0002077237323722 3D5EB2ADE3DEB73237240
:1003E000E1C3341BF5CDB84B3AFA3FB7C4772F3A87
:1003F000F33CB7C4A82FF121EC3C347E3DC25A2E09
:10040000215D3F7EB7C2E22D21313E7EB7C2E22D93
:1004100021D5402301060011 5D3F7E23FE20CA0442
:100420002EFE09CA042EB7CA042EFE0DCA042E12CF
:1004300013040DC2E82D21563F7023223F3D0E02CA
:10044000CDA91BCD322721354F221B40CDC40CDA5C
:100450000412E223F3D7EE67F77237EE640C26B2F12
:100460007EE604CA1A2E235E23560105 00CDA91B81
:10047000C31A2E2AD83DEB010A00CDA91B010D019C
:100480002AD63DEB7BB2C4A91BC36E012A463DF5BB
:10049000D48320D5C5CD2B1921FFFF22343D223630
:1004A0003D7D322F3DCD701A21F42FCDD51A213349
:1004B0003D343421723F3E05CD973BCD5A1A3A3335
:1004C0003DFE38D4701A21333D343421E92FCDD587
:1004D0001A21B43F3E03CD973BCD5A1ACDB42F2AF3
:1004E000ED3C7CB5CACB2EE5CDDF1AE13AB4403CF9
:1004F000325B3FC4DF1AAF325B3FC3D12E214C2F9A
:10050000CDD02F214F2FCDD02F2AEF3C7CB5CA065E
:100510002F3E2CCD764C3AB4403C3E2CC4EE4AE5FE
:10052000CDDF1AE13AB4403C325B3FC4DF1AAF3250
:100530005B3F215F2FCDD02FCDB42FC1D1F1D2148D
:100540002F0600110000CD831B0E0ECDA91B2AC360
:100550003E7CFEF8CA2C2FAFCD461CC31C2F010FCA
:1005600000CDA91B0600CD2B1C3A8C40B7CA432FE7
:100570003E80CD764CCDDB4BCD1B4CC300014E6F86
:1005800000204661746 16C206572726F7228732955
:1005900000205761726E696E672873 29000E003A59
:1005A000D13D47CDA91BC31A2ECDCD2F21862FCDEE
:1005B000D02FCD291BC3B42F524550542F49525030
:1005C0002F495250432F4D4143524F00556E746591
:1005D000726D696E6174656420 00CDCD2F21DD2FB1
:1005E000CDD02FCD291B3E0DCD5A1A3E0ACD5A1A19
:1005F0003AB4403CC83E0DCDEE4A3E0AC3EE4A2115
:100600009A2FE5CDD51AE13AB4403CC8C3CC464355
:100610006F6E646974696F6E616C0053796D626F9F
:100620006C733A0D0A004D6163726F733A0D0A00E4
:1006300021E2FF39EB2A2940CD8D0DD214343AFA4C
:100640003FB7210000222340222540 2AF83FC22341
:1006500302A29402B3C32FA3FAF32FB3F32054073
:10066000EB2A1F4024CD8D0DD23E30EB22F83FC93E
:1006700025EBE5CD4F3BE1C32E30CD1505C07EB750
:100680003CF03DF5E610CA72303A05403C32054078
:10069000F1E608EE08C03A0540B7C83A05403D32D9
:1006A0005403CC9237EFE1BC25E303A0540B7C2FE
:1006B0005E303A0F40B7C25E30F137C922F83F3A98
:1006C000FA3F3D32FA3FC9CDEA0AFE26C2D1302AAE
:1006D000463D7EFE20CACF30FE09CACF30E5C5CDEB
:1006E000550BCDDD30C1E122463DC2CF303E263232
:1006F000FC3FC33E31FE26C2D1303AFC3FB7C2D6E2
:10070000303E26CD3B3AB7F8F5AF32FC3FF1C92A6F
:1007100074006007EB7CA0B3111E93D1ABEC20080
:100720003 14F2B131ABEC200310DC2F03078F68063
:10073000BFC92B7EFE07D2003104C3E2303A10401D
:10074000B7C02A114006C07EB7CA3C3111E93D1A34
:10075000BEC231314F2B131ABEC231310DC223310B
:10076000AF78C92B7EFE07D2313104C315313CC9A5
:100770002A463DE5CD550BF5CDDD30C2773147F149
:10078000E1F57E23FE20CA5C31FE09C26431E5CD6D
:10079000D130E1C3503178CDD130F147F5F1C2C34A
:1007A00030FE26C2C330C33608BF1E1F522463DCD03
:1007B000EA0AFE20CA9031FE09CA9031CD360BC339
```

:1007C0009631CDD130C37D31CD810BC26B31C3A504
:1007D00031CD810BFA6B31CDD130C39F31CDEA0AA7
:1007E000FE3BCAC731C3B931CDC63ACDD130FE0D88
:1007F000CA9E3ACDEA0AC3B931CDC63ACDC63AFE51
:1008000020CACA31FE09CACA31B7CDED3A22254005
:10081000CA9E3AFE0DCA9E3A3E0DCD3B3AC39E3A61
:10082000E5F53A1040B7CAFF31D5EB2A1D4019341F
:10083000D1F1E67FF587FA49322A0B407EB7CA38F4
:1008400032F1C547042B05CA23327ED52F5F16FF30
:10085000019D1C314327EB7CA46323D472B7E0405F8
:10086000CA4632CDD83305C32A32F12B3C3DCA43A8
:10087000322BC33B327EE1C9C1E1C93E2ECDD83314
:10088000CDD833F1E63FC52A18404F06000944CDC4
:10089000141945CD1419C1E11B1AC9E5CD550BE159
:1008A000C48232F511E93D1A3C4F1A77132B0DC261
:1008B0007832F1C9FE0DC8FE3BC8D1C39D040600C5
:1008C000C5E52BCDC80BFE27CA7D33FE22CA7D337A
:1008D000FE3CCA9B33FE3ECAA633FE25CAD332FE77
:1008E0002CCAB033FE20CAB033FE09CAB033FE3B77
:1008F000CAB033FE21CC290BFE0DCACD33772BCDE8
:10090000EA0AC39432227B33C5017133C5CDC428B2
:10091000EB0E003A113EFE20C236333AF13CFE1097
:10092000CA2E33FE08CA0E3301F6FF505809130AF7
:10093000FB32E5EB7CB5C4F9323E3AC181C3663384
:10094000AF29CE30CD52333E05F5AF0603298F05D2
:10095000C21B33C630CD5233F13DC21733C33633D9
:1009600044CD3E3345CD3E330C0DC03E30C36633DF
:1009700078F1F1F1FCD473378E60FC630FE3ADAC7
:100980005233C6070C0DC26633FE30C84FFE3ADA4A
:1009900066333E30CD663379E52A7B33772B227B75
:1009A00033E1C9C1CD360B2A7B33C3CD3200004FB2
:1009B000772BCDEA0AB9CA8F33FE0DCAD233C37E74
:1009C00033772BCDEA0AB9CA7E33C394320405CA01
:1009D000A233772B04C3CD3205CACD32FAB533C367
:1009E000CB320405C2CB32D17B953D12C1EB2A46F6
:1009F0003D2B7EFE20CC360BFE09CC360BEBC9041A
:100A00005CAB533CDE504C3B533F5E521CA3DCDFF
:100A10008D0DD2EB3323360D2BEBE1F1C9E1F11251
:100A20013C9CD3E31FE26CAF033FE3ACA3E31FE2E
:100A30021D0FE0DC0F5CD0E0CCA1034CD1505CA57
:100A4000C718F1C33E31211A34C3720D3F5374618C
:100A5000636B206F766572666C6F772C2074727989
:100A6000206D6F726520502073776974636865573B9
:100A70000D0A80CDC4283A113EFE20CA4F341100A1
:100A800000EB22FD3FCDFE2FC1D1E1016334C5D57E
:100A90003E0DC35C04C1015E34C5CD550BFE3ACC9E
:100AA000550BCD4830CA843411483D1ACD3B3A131A
:100AB000FE0DC27934C9AFCD3B3ACD9E3AC1D1E1EA
:100AC00021CC02E5D52A2340E5E52AFD3FE521CCEE
:100AD0002E521A634E5C5C9CDF934C1E1D1CD8DFA
:100AE0000DC2D5343A0640B7C2BE3478B1C2D5344F
:100AF0002AF83FE5CD9439E1CD8A30AF320640D1B6
:100B0000D52AFF3FE5EBE9D5CD723AB7CA083511D2
:100B1000483DCD883ACDD833FE0DC2E034E5C52A34
:100B20000140E52A0340E52AFF3FE9D1E122FF3FEA
:100B3000E1220340E1220140EBE90B626BC3AB34DQ
:100B40003AFA3FB7CAE50432064 0C1E1D1112B356C
:100B5000D5E5C5AF320540C3400BC3C1043A0640DA
:100B6000B7CA0A35C101DE01C5CD550BFE3ACC5559
:100B70000BCD1505C0B7F04FE608C25E3579E6101B
:100B8000C2663579E620C26E3579E640C27B35C94A
:100B90003A05403D320540C93A05403C320540C95E
:100BA0003A0540B7C03AF33CB7C8C3EA283A054013
:100BB00087C0237EFE08C83EFFC35029C1D1E12142
:100BC000CC02E5D5C5C9B7F5CDFE2F220740CD69CA
:100BD000324F3A113EFE20CAB0352A0740CD8A3046
:100BE000F1C9793600 2BFE2CC49D04F1F5CAEC3511
:100BF000CD290BFE3CC49D04F177E5F50E002B3AA0
:100C000113EFE20C24736F1F547CAFA35CD8C3287
:100C10000CFE0DCA4436FE3ECA4736C3DB35CD2333
:100C20000BD63C320E40CCEA0AC3C635CDEA0AFEEA
:100C30000DCA3D36F53A0E40B7CA1F36F111473698
:100C4000D5FE20C8FE09C8FE3BC8FE2CC8D1C3375C
:100C500036F1FE3CCA3336FE3EC237360405CA477B
:100C600003605C3373604C337360C772BC3FA353A0B
:100C70000E40B7C24736CDCD0436002BCD2E30788E
:100C8000B7C49D04F1E12209402600 6922FD3FC15D
:100C9000D1E1016D36C35C34AFC23E01C39435C1AE
:100CA00015E34C52A25403E01321040E5CDF033C7
:100CB000F5CD4830CAB136F1E1FE0DCAB631FE3B82
:100CC000CAAB31FE27CAA136FE22CAA136CD3E31BB
:100CD000C3873647CD9530FE0DCAB631B8CA9B36AC
:100CE000C3A236F1E1222540AFCD3B3ACD9E3AC1B9
:100CF000D1E121CC02E5D52A2340E5E52A0940E5EA
:100D00002AFD3FE521CC02E521DC36E5C5C9CDF958
:100D10034C1E1D13E01321040220B40E1CD8D0DB6
:100D2000C20D373A0640B7C2FD3678B1C20D372A38
:100D3000B4023237EFE0823D202372BC3C134EBA2
:100D4000D5CD723AB7CA343711483DCD723AB7FCA7
:100D5000EE31CDED3ACDD833FE0DC21937E52A0B71
:100D600040E5C5C3ED340B626BD1C3F136CDC80B82
:100D7000FE0DCA9D044FCDEE4ACD290BFE0DCA567D
:100D800037CDEE4AB9C247373E0DCDEE4A3E0ACDC9
:100D9000EE4A3A113EFE20C0C3400BCDC80BFE0DFB
:100DA000CA9D04320D404FCDEA0AFE0DCA8437B900
:100DB000CA400BC37537E1D1C1018D37C35C34C163
:100DC00015E34C521483D3A0D404F7EB9CAA53772
:100DD000FE0DC823C39937C1D1E121CC02E5D5C5A9
:100DE000C9B7CD040D2322F63F7EF62877CDFE2F4E
:100DF0002207400E00C5CD6932C10CFE2CCAC33794
:100E0000AF772B320F403215403C772B2211402216
:100E10001340360079321A40CD3B3AAFCD3B3AC150
:100E2000D1E121F737E5D5C5C9C1015E34C52A2511
:100E30040E5AF320F40321040CDF033F5CD4830B1
:100E4000DA1C38CA4F38F1320F40E1C38736F1CD92
:100E5000550BC49D042A1340F5C231383A15403C65
:100E6000321540 11E93D1A3C4F1A772B130DC2374A
:100E700038360022 1340F1FE2CCA1D38E1222540ED

```
:100E8000C9F1E1AF222540CD3B3ACD9E3A2A23401D
:100E900011050019EB2A1D40193A1540772A234005
:100EA000EB2AF63F23D5E55E23567AB3C49439E1A5
:100EB000D17323722A0740CD8A30C1D1E121CC02FF
:100EC000E5D5C5C9E537CD930DCDFE2F36002B36C0
:100ED00001220B402B0E00CD8C32470CCD360BCDB2
:100EE000C80BFE0DCACD38FE3BCACD38FE2CCAA5B4
:100EF0003878FE20CAA538FE09C4CD04C3A538E35E
:100F000023235E2356EBCD883AE3B7CAEA38B9CA41
:100F1000EA38DAEA3836002B0CC3DC3836002BCD41
:100F20002E30E1C1CD883AE52A1640E5C54F0600CE
:100F300009221640C12A0B40E521CC02E5111139E6
:100F4000D5C5C9CDF934E1220B40E1221840E1AF0B
:100F50003210 40CD723AB7CA493911483DCD723A84
:100F6000B7FCEE31CDED3ACD0833FE0DC22B39E5CD
:100F70002A1840E52A0B40E5C3ED342A0B4023AF85
:100F8000320640C3C6347D935F7C9A57C93AE43D2C
:100F9000B7C2C704CD83203A113EFE20C032E43DE3
:100FA00078E680C29D0478E60332E73D2AD23DEB25
:100FB000CD5439EB22E53DC93AE43DB7CCCD04AF81
:100FC00032E43DC3400B2121404E73234672CDA62F
:100FD00039CDAF39712370C92A1D40195E23562BB4
:100FE000C92A1D401923235E23562BC92A21407D7F
:100FF000B4CACF39EBD5CDAF39EB222140D1C3FBF9
:10100000392A1F40112000EB19221F40D5EB2A2955
:1010100040CD8D0D01DA493B2AF83F253AFA3FB74A
:10102000CD8D0DDA493B2A1D40EBCD5439D5CDA6E7
:1010300039EB2A2540EB7BE6E05F7BB2C20F3AD169
:10104000D5732372233E00772377CDAF39D1CA25DC
:101050003A732372C32A3AEB222340EB2A2340D56A
:10106000EBCDA639D17323727BF6045FC9D5F52A7F
:101070002540EB7BE61FCCBA392A1D4019F1F577E4
:101080007BE61FFE1FCA573A13CC613AEB2225407C
:10109000F1D1C97BE6E05FCDAF397AB3CABA391373
:1010A000131313C9D5EB2A1D40EB7DE61FC2823A0C
:1010B0007DF6046FEB197EEBD1C9CD723AF5D5EB15
:1010C0007BE61FFE1FCA973A13CC613AEBD1F1C9F8
:1010D000EB7BE6E05FD5CDAF397BB2C1C8AF7723FC
:1010E000772A1D4019732372C5CD9439C12A234034
:1010F000EBCDA639712370C92A2540D5EB7BE61FBD
:101100001BFE04CCE13A2A1D40EB222540EB197E60
:10111000EBD1C97BE6E05FCDA6397BF61F5FC9D571
:10112000F5EB7BE61FFE1FCAF93A13CC613AEBF1EF
:10113000D1C92A1F40EB2AF83F3AFA3FB7C2123B07
:101140002A294025CD5439DA6F0D7AB7CA6F0D1FA1
:10115000577B1F5FD52A1D40EB2A1F40CD543942D3
:101160004BD12A1F40EB19221F4078B1CA453B2BB7
:101170001B1A770BC3383B221D40C9CD4F3BC3CF51
:1011800039D52A413DEB2A1D40CD5439DA6F0D7A0D
:10119000FE03DA6F0D1F577B1F5FE1C5E52A1D4077
:1011A000EBE3CD5439424BD12A1D40E52A413D198C
:1011B000E5221D4009221F40E1D178B1CA953B0BC1
:1011C0001A772313C3883BC1C932C13E32C23E4F96
:1011D00006215E235623E5C5CD873BC1E105C2A07C
:1011E0003B3AC13EB9C45A1AC9010000C57AB3CA14
:1011F000C718EBE55E23567BB2C2C03BE17DB4C8A5
:10120000CDE63B2B2B562B5E7BB2CACA3BAF772376
:10121000772B2B2BE5C3C03B010400094623223F5B
:101220003D7EE640C0237EE680C4D43C7E235E2320
:1012300056C5E547E608C2353CC5CDC03CF15FE682
:1012400080C27F3C7BE604C2853C7BE640C4903C88
:101250007BE6A0CA883C7BE6035F160021661B196B
:101260007ECD764CCD7A3CE1C1232323C57E23CDB0
:10127000764C05C23B3CC13E1090C24C5C3C47CD35
:10128000753C05C24D3C21C13E35C26D3C3AC23E63
:1012900077CD5A1A21333D143A323D8ECC701A2AEA
:1012A0003F3D7EF64077C93E20C37C3C3E09C37675
:1012B0004C3E2ACA3E4DCA3E43CA3E55CD764CC32B
:1012C000323CD5C52A3F3DE5237BE603470E072385
:1012D0005E235623D55E2356EB22DE3DD1CD831B04
:1012E000E1223F3D237EE620C4A91BC1D13E49C374
:1012F000764C21113E220F3ECDC9182A0F3E3600F2
:1013000021113EC3D51AC5E57EE603470E06235ECE
:101310002356CDA91BE1C1C9450000000100020010
:10132000000000000A000000000000000000000000B3
:1013300000000000000000000000000000000000AD
:10134000000000000000000000000000000000009D
:10135000000000000000000000000101002100006A
:1013600001FF00003C35FFFF00000000000000000E
:1013700000285096580000E54D3D09454E440D0D9E
:101380000D202F2E6C6E70726D2F0D0D23230D0D01
:101390003130382C33322C3131302C3131312C3149
:1013A00031362C33322C3130322C3131312C313139
:1013B000372C3131300D0D0D000000000000000004
:1013C00000000000000000000000000000000000001D
:1013D000000000000000000000000000000000000D
:1013E00000000000000000000000000000000000FD
:1013F00000000000000000000000000000000000ED
:101400000000000030400000 0A8000008A588A5861
:101410008A525522000000000000000020202020F9
:1014200020202020202020202020202020200020DC
:1014300020202020202020202020202020202020AC
:1014400020153E303539390034212020202020203D
:10145000202020202020202020202020202020208C
:10146000202020000000000000000000000000001C
:10147000000000000000000000000000000000006C
:10148000000000000000000000000000000000005C
:10149000000000000000000000000000000000004C
:1014A000000000000000000000000000000000003C
:1014B000000000000000000000000000000000002C
:1014C000000000000000000000000000000000001C
:1014D000000000000000000000000000000000000C
:1014E00000000000000000000000000000000000FC
:1014F000816E58010300FF000900FBEE00000000B0
:1015000000000000000000008004008000000700D0
:1015100008000000000000000000000000000000C3
:1015200000000000000000000000000000000000BB
:1015300000000000000000000000000000000000AB
```

:10154000000000000000000000000000000000009B
:10155000000000000000000000000000000000008B
:10156000000000000000000000000000000000007B
:10157000000000000000000000000000000000006B
:101580000000000000000000062007AB210000461C
:1015900000494C455359000000000000000000000000C5
:1015A000000000863F00000000000000000000000076
:1015B0000000000000000000000062500000000079
:1015C000000000000000000000000000000000001B
:1015D000000000000000000000000000000000000B
:1015E00000000000000000008250000000000000029
:1015F0000000354F414F4D4F594F654F4B51000043
:10160000714FB04F000000007D4F894F1650000011
:10161000A24F0000BC4F954F0000EF5200000000A9
:101620000000000023500000685004EC00FF0000A0
:1016300000FC01CC021139000004EC000003EC00B6
:101640000000010100EC00EC00000000019658EDE4
:101650009E8D9F200000000005EF05EC51410722
:101660005142005143015144025145035148045134
:101670004C05514D0662535006635053570651496D
:101680000851520962424300624445026248 4C04D8
:10169000624146066A4958446A495964724E5A0082
:1016A000715A01724E430271500672504F047250CB
:1016B000450500C003EF00010000010001110000 1A
:1016C0004D000000000046494C4553594D205245FD
:1016D0004C002AC01DFF0005010000000000000000B2
:1016E00000000000001D0046494C4553594D205054
:1016F000524E000000000000000000000000000004A
:101700000000000000000000046494C4553594D20A0
:1017100041534D002A8079F700F800F900FA00FBE8
:1017200000FC00FD00FE00790000000000000000049
:1017300000000000000000000000000000000000A9
:101740000000000000000000000000000000000099
:1017500000000000000000000000000000000A017E
:10176000494C4553594D2041534D52454C435246E7
:1017700050524E16003CAA9C8E8AA8871D9905CA15
:10178000AA6828E8ABF38000009E1A82AD1985088C
:1017900065CA685192402C828E8AA886BF190407B8
:1017A000C82A0AAA886BF1D2B07C869096828 49F60
:1017B00019B801C86989EA68ABF1DF505C869CAC56
:1017C000A88C93193907886A09ABF1DF507C86AC85
:1017D00064908AB119D607A8AB092A8BF190C06C26
:1017E0008C8E8AA8A6BF1D4F07A8C929C88BF19067
:1017F000401C8C9EA08A9CBF19CD07C8CA0A4929E3
:10180000CA919B405C8CA0AAA8A6BF19FF03C8CAB6
:10181000686829C8D1D0000A9A82929CBF1D5102E3
:10182000CA0A4929CA88B1D9702CA48A8288A0839F
:101830001D1A02CA68AA8AAA093197402CA6A8A430
:101840008682A9199E07CA6A8A4869AA1195505CBE
:10185000A6A8A486A0B3192604CA6A8A4988A9D171
:10186000DF704CA6ACA6B29A9D1D5804CA6ACA6B1A
:1018700029AAD19D3000000000000000000000000F7
:101880000000000000000000000000000000000058
:101890000000000000000000000000000000000048
:1018A0000000000000000000000000000000000038
:1018B0000000000000000000000000000000000028
:1018C0000000000000000000000000000000000018
:1018D0000000000000000000000000000000000008
:1018E00000000000000000000000000000000000F8
:1018F00000000000000000000000000000000000E8
:1019000000000000000000000000000000000000D7
:1019100000000000000000000000000000000000C7
:1019200000000000000000000000000000000000B7
:1019300000000000000000000000000000000000A7
:101940000000000000000000000000000000000097
:101950000000000000000000000000000000000087
:101960000000000000000000000000000000000077
:101970000000000000000000000000000000000067
:101980000000000000000000000000000000000057
:101990000000000000000000000000000000000047
:1019A0000000000000000000000000000000000037
:1019B0000000000000000000000000000000000027
:1019C0000000000000000000000000000000000017
:1019D0000000000000000000000000000000000007
:1019E00000000000000000000000000000000000F7
:1019F00000000000000000000000000000000000E7
:101A000000000000000000000000000000000000D6
:101A100000000000000000000000000000000000C6
:101A200000000000000000000000000000000000B6
:101A300000000000000000000000000000000000A6
:101A400000FFFFFFFFAA5FAE5FCD0A23F4FF211462
:101A500000395E2356EB2B110300EBCD7B23CA64C8
:101A60001ACDE21F21160039E57E23666F2323EB92
:101A7000E1732372210D1CE5211800395E2356EB1A
:101A80005E2356D5CDD338D1D1223B027CB5C2C816
:101A90001A212301E5210F1CE5CDFC3BD1D12123E7
:101AA00001E5211800395E2356EB5E2356D5CDFCA7
:101AB0003BD1D1212301E5210A00E5CD3A3CD1D12A
:101AC000210100E5CD764DD121160039E57E236652
:101AD0006F2323EBE1732372211B1CE521180039CE
:101AE0005E2356EB5E2356D5CDD338D1D1223D02AD
:101AF0007CB5C22C1B212301E5211D1CE5CDFC3B3F
:101B0000D1D1212301E5211800395E2356EB5E2354
:101B100056D5CDFC3BD1D1212301E5210A00E5CDED
:101B20003A3CD1D1210100E5CD764DD121160039C5
:101B3000E57E23666F2323EBE173237221291CE5E5
:101B4000211800395E2356EB5E2356D5CDD338D10C
:101B5000D1223F027CB5C2901B212301E5212B1C21
:101B6000E5CDFC3BD1D1212301E5211800395E23CD
:101B700056EB5E2356D5CDFC3BD1D1212301E52187
:101B80000A00E5CD3A3CD1D1210100E5CD764DD119
:101B900021160039E57E23666F2323EBE173237260
:101BA000CD631C7D323A027CB5CAB71B213B1CE5D4
:101BB000CD9A1CD1C3EC1B21040039E52108003962
:101BC000E5CDE01CD1D1C2E41B21060039E5CD40B2
:101BD0001FD1210400395E2356D5CDA11ED1CD746D
:101BE00021C3B71B2A3D02E5CD3E20D12A3B02E5A9
:101BF000CD1B51D12A3D02E5CD1B51D12A3F02E533

```
:101C0000CD1B51D1210000E5CD764DD1C9720043E5
:101C1000616E27742066696E642000720043616EF5
:101C200027742066696E642000770043616E277414
:101C300020777269746520746F2000496E70757426
:101C40002066696C6520697320656D707479206FFA
:101C50007220696E2077726F6E6720666F726D6199
:101C6000742E00CD0A23FFFF2A3B02E5CD653BD150
:101C7000EB2104003973D521FFFFD1CD4123CA8563
:101C80001C21FFFFC92A3B02E5210600395E160030
:101C9000D5CDAF40D1D1210000C9CD0A230000210C
:101CA0002301E521C81CE5CDFC3BD1D1212301E571
:101CB00021DE1CE5210C00395E2356D5CDA55ED171
:101CC000D1E5CDFC3BD1D1C90A2A2A2A204552525E
:101CD0004F52204445544543544544210A000A00CC
:101CE000CD0A23FEFE210000EB210400397323728C
:101CF00021060039E521901EE52A3B02E5CD9A2513
:101D0000D1D1D1EB2104003973237 2D5210100D147
:101D1000CD4123CA3C1D210600395E1600213B003F
:101D2000CD4123CA3C1D2A3B02E5210001E5210AE1
:101D30000039E5CDC43AD1D1D1C3F01C210400391A
:101D40005E235621FFFFCD5023CA601D2A3B02E5CA
:101D5000210800395E1600D5CDAF40D1D1C3691D31
:101D6000210400395E2356EBC9210000EB21040059
:101D700039732372210C01395E2356D521941EE557
:101D80002A3B02E5CD9A25D1D1D1E5210100D1CD63
:101D90005023CAA01D21FFFFEB21040039732372D9
:101DA000210400397E23B6CAB31D210400395E2305
:101DB00056EBC921060039E521991EE52A3B02E5CB
:101DC000CD9A25D1D1D1EB21040039732372D521CD
:101DD0000100D1CD4123CAFF1D210600395E160046
:101DE000213B00CD4123CAFF1D2A3B02E521000112
:101DF000E5210A0039E5CDC43AD1D1D1C3B31D21C3
:101E00000400395E235621FFFFCD5023CA231E2A2A
:101E10003B02E5210800395E1600D5CDAF40D1D197
:101E2000C32C1E210400395E2356EBC9210000EBB0
:101E3000210400397323722 10A01395E2356D5210A
:101E40009D1EE52A3B02E5CD9A25D1D1D1E52101A0
:101E500000D1CD5023CA661E21FFFFEB21040039BB
:101E6000732372C3871E210A01395E2356D5CD5FC5
:101E70005ED1110A00EBCD6023CA871E21FFFFEB64
:101E8000210400397323722104 00395E2356EBC903
:101E900020256300202534780020256300202573 49
:101EA00000CD0A23FEFF2A411A23EB2104003973D7
:101EB0002372210400395E2356210002CD7C23CAFF
:101EC000E41E21111FE5CD9A1CD1210A00395E23A1
:101ED00056D521301FE5212301E5CD2E25D1D1D1C5
:101EE000217F00C9210A00395E2356D52106003919
:101EF0005E2356EB2911411619D173237221040070
:101F0000395E2356EB22411A210400395E2356EB39
:101F1000C953796D626F6C2076616C756520746150
:101F2000626C65206F766572666C6F7765642E00F3
:101F30000A56616C7565203D20302534784 80A00CA
:101F4000CD0A23FEFF2A431A23EB21040039732311
:101F500072210400395E2356210002CD7C23CA83FE
:101F60001F21B61FE5CD9A1CD1210A00395E2356E8
:101F7000D521D51FE5212301E5CD2E25D1D1D121B4
:101F80007F00C9210A00395E2356D5210600395E3B
:101F90002356210A00CDF92311410219E5CD3A5EFD
:101FA000D1D1210400395E2356EB22431A210400CB
:101FB000395E2356EBC953746174652073796D6281
:101FC0006F6C207461626C65206F766572666C6FF1
:101FD00077656 42E000A5374617465203D20257373
:101FE0000A00CD0A230000212301E5210A20E5CDC6
:101FF000FC3BD1D1212301E5211420E5CDFC3BD1CF
:10200000D1210100E5CD764DD1C90A5573616765CF
:102010003A200A0066696C6573796D202073796DCA
:1020200066696C652020696E70757466696C6520E0
:10203000206F75747075746669 6C65200A00CD0A2E
:10204000238FFF217900395E2356D5216400E521D5
:10205000150039E5CDC43AD1D1D1CA73212111007F
:1020600039444D60697EB7CA5921CD742160695ED8
:102070001600214000CD4123CA4221606923444D0E
:1020800021060039EB2104003973237260697EB7A1
:10209000CAC12060695E1600217C00CD5023CAC1F0
:1020A0002060692344 4D2B5E1600D521060039E5DA
:1020B0007E23666F23EBE1732372EB2BD173C38C0A
:1020C00020210000E5210600395E2356EBD1732163
:1020D000060039E5CD9821D129114116195E235604
:1020E000D521080039E5CD3E22D1D121060039EBBA
:1020F00021040039732372C30E212104 0039E57EC7
:1021000023666F23EBE1732372EB2B5E1600210431
:1021100000395E2356EB7EB7CA33212A3F02E52100
:102120000600395E2356EB5E1600D5CD3A3CD1D180
:10213000C3FA2060697EB7CA3F21606923444DC35A
:1021400056212A3F02E560695E1600D5CD3A3CD1A2
:10215000D16069 23444DC36320217900395E235641
:1021600021060019 5E1600210800CDF922C2732154
:10217000C34320C9CD0A23000021FF00E52106004A
:10218000E5CD7E49D1D1110300CD4123CA9721214C
:102190000100E5CD764DD1C9CD0A23FEFF21000017
:1021A000EB21040039732372C3BC2121040039E5FB
:1021B0007E23666F23EBE1732372EB2B210400393E
:1021C0005E23562A431ACD6123CAF1212104003926
:1021D0005E2356210A00CDF92311410219E5210C95
:1021E00000395E2356D5CD015ED1D1CAF121C3ABF2
:1021F00021210400395E23562A431ACD7C23CA22AA
:1022000022210A00395E2356D5CD9A1CD1212B22DA
:10221000E5212301E5CD2E25D1D1210100E5CD76A3
:102220004DD1210400395E2356EBC953796D626F9D
:102230006C206E6F7420666F756E642E0A00CD0A76
:10224000230000210000444DC35122606923444D06
:102250002B6069110400EBCD7B23CADF2260692962
:1022600029E5210C00395E2356E1CD2B24110F0006
:10227000CDF92211300019E52103005059EBCD555D
:1022800024EB210A00397E23666F19D173210300E4
:102290005059EBCD5524EB210800397E23666F1988
:1022A0005E1600213900CD7C23CADC2221030050B8
:1022B00059EBCD5524EB210800397E23666F195E5A
```

:1022C000160021070019E5210300505952CD5524D4
:1022D000EB210A00397E23666F19D173C34B22218B
:1022E0000000E5210A00395E235621040019D1734C
:1022F000C9A14DD1E1010000097CA2677DA36FB423
:10230000C97C2F677D2F6FB4C9E9E1C55E235623D1
:10231000444D21000039EB39F9D56069CD0923EB33
:10232000E1F9C1EB7CB5C97AAC32F222CDA623EB40
:102330003AF222B7FA11247DB4C9CDBF23EB7DB4A4
:10234000C97D93C24B237C92CA5A23210000AFC996
:102350007D93C25A237C92CA4B232101007DB4C9CC
:10236000EB7CAAFA73237D937C9A3F3E00CE006FEC
:102370002600C97A07E6016F2600C9EB7CAAFA8D10
:10238000237D937C9A3E00CE006F2600C97C07E631
:10239000016F2600C97A32F222CDA6233AF222B783
:1023A000FA11247CB5C97CB7F2B1232F677D2F6F5A
:1023B000237AB7F2BF232F577B2F5F13C3BF23C5E9
:1023C000444D2100003E1032F12229EB29EBD2D2FC
:1023D000232370916F7C9867D2EA23093AF1223D4D
:1023E00032F122C2CA23C17DB4C9133AF1223D326F
:1023F000F122C2CA23C17DB4C9C5444D2100003EAB
:102400001029EB29EBD20924093DC20124C17DB476
:10241000C97D2F6F7C2F67237DB4C97CB5CA5A2331
:10242000C34B237CB2677DB36FB4C9EB7BE61F5F00
:10243000CA52247CB4F2CA247C371F677D1F6F1DEB
:10244000C23824B4C9EB7BE61F5FCA5224291DC2DF
:102450004D247DB4C9EB7D936F7C9A67B5C9EBE1E0
:10246000C54E234623EB09EB4E2346237AB8DA7692
:10247000247BB9D27A24232319195E2356EBC1E9B0
:10248000EBE1C5424B5E23561B7AB7FAA0242379B1
:10249000BECA9A2423232323C3882423788EC295244A
:1024A000237E23666FC1E9EB7D937C9A3E003FCE8D
:1024B000006F2600C9EB7D937C9A3E00CE006F260C
:1024C00000C9EB7BE61F5FCA52247CB71F677D1FE4
:1024D0006F1DC2CA24B4C97CAA677DAB6FB4C97E24
:1024E0001223130B78B1C2DF24C9D121020039C5F0
:1024F000D511F3220606 7E12231305C2F62421030A
:1025000025E3E9C17CB5C9A7C90E1ACD0A2300008D
:102510002118012209252 10A0039E5210A00395E26
:102520002356D5215625E5CD8242D1D1D1C9CD0A38
:10253000230000210800395E2356EB220925210CD7
:1025400000039E5210C00395E2356D5215625E5CD0D
:1025500008242D1D1D1C9CD0A2300002A0925E52123
:102560000A00395E2356D5CD3A3CD1D1C9200700A7
:1025700000CD0A230000210D01226F252100002239
:102580006D25210A0039E5210A00395E2356D5213F
:10259000C825E5CDD126D1D1D1C9CD0A230000214E
:1025A0000800395E2356EB226F2521000226D259D
:1025B000210C0039E5210C00395E2356D521C825B0
:1025C000E5CDD126D1D1D1C9CD0A23000021080003
:1025D000397E23B6C201262A6F25110600195E1620
:1025E000002108 00CDF922CAF32521FFFF226D2525
:1025F000C3FE252A6F25E5CD653BD1226D25C3118C
:10260000262A6F25E52A6D25E5CDAF40D1D1226D73
:10261000252A6D25C9AD2EBF2E0000040097D14894
:102620004C004142434445466162636465663938003
:1026300037363534333231300000A0B0C0D0E0F0AA9
:10264000B0C0D0E0F0908070605040302010 0CD4F
:10265000A2300002108 00395E2356EB221F2621A1
:10266000000007D322126210C0039E5210C00395E65
:102670002356D5217E26E5CDD126D1D1D1C9CD0A8B
:102680002300002108 00397E23B6C2B1262A1F2666
:102690007EB7CAA7262A1F2623221F262B5E1600D6
:1026A00021FF00CDF922C92101007D322126C3CDB1
:1026B000263A21266F26007CB5C2CD262A1F262B5E
:1026C000221F265E160021FF00CDF922C921FFFF3F
:1026D000C9CD0A2366FF21A400394E2346210000FC
:1026E000EB218E0039732372 21A200395E2356EB51
:1026F000221D26606923444D2B5E1600219000396F
:1027000073237 27AB3CA1B2C219000395E235621A1
:102710002500CD4123CAC02B210000EB218C0039BC
:102720007323722 18A0039732372217F00221B26B2
:1027300060695E160021 2A00CD4123CA4E276069D8
:1027400023444D210100EB218C003973237260 6911
:102750005E1600D5CD6A5FD1CA8927210000221BF1
:10276000262A1B26110A00CDF923E560695E1600B2
:10277000E11911D0FF19221B26606923444D5E1612
:10278000000D5CD6A5FD1C2612760695E1600216CF9
:1027900000CD4123CAA727210100EB218A0039730C
:1027A0002372606923444D606923444D2B5E1600FB
:1027B000EBC37A2B212500EB219000397323 72C3E0
:1027C000EF2B210000EB218A00397323 72C3DB2732
:1027D000210100EB218A003973237 2210C00EB21C7
:1027E00090003973237 2210A00EB2188003973238A
:1027F00072C33928210100EB218A00397323722129
:102800000000EB2190003973237 2211000EB218826
:10281000003973237 2C33928210100EB218A003962
:10282000 73237 2210E00EB219000397323722108 6B
:1028300000EB2188003973237 2CD242CC2D52B21C3
:10284000920039E5218A00395E2356D5219400395A
:102850005E235621392619E5219600395E2356213B
:10286000222619E5CD692DD1D1D1E1CDE85F218CAA
:1028700000397E23B6C2DC28218A00397E23B6CAFD
:10288000A72821A60039E57E23666F2323EBE17399
:102890002372EB2B2B5E2356D5219400 39CDD55FC7
:1028A000E1CDE85FC3CD2821920039CDD55FCD5869
:1028B00063E521A80039E57E23666F2323EBE173EE
:1028C0002372EB2B2B5E2356EBD1732372218E00E8
:1028D00039E57E23666F23EBE1732372C3BD2B21A1
:1028E000100EB218A00397323 72CD242CC2D52B31
:1028F00021960039E521060039E5CD5B2CD1E1CDEB
:10290000702F218C00397E23B6C26C29218A0039B0
:102910007E23B6CA3B2921A60039E57E23666F23B4
:1029200023EBE1732372EB2B2B5E2356D52198000A
:1029300039CD512FE1CD702FC35D2921A60039E596
:102940007E23666F2323EBE1732372EB2B2B5E2335
:1029500056D5219800 39CDF92EE1CD1E2F218E00BC
:1029600039E57E23666F23EBE1732372C3BD2B2110
:102970000000EB218A003973237260695E16002122

```
:102980005E00CD4123C2962960695E1600217E005B
:10299000CD4123CAA629606923444D210100EB21C2
:1029A0008A003973237221040039EB2186003973C0
:1029B0002372606923444D2B5E1600219000397309
:1029C0002372215D00CD5023CAE929219000395E90
:1029D0002356D521880039E57E23666F23EBE1730A
:1029E0002372EB2BD173C3B229210000E5218800AB
:1029F000395E2356EBD173C3292A210100EB218ACA
:102A00000039732372212000EB2104003973210 95E
:102A100000EB2105003973210A00EB210600397310
:102A2000210000EB2107003973CD242CC2D52B21C6
:102A30008C00397E23B6C2562A21A60039E57E23B2
:102A4000666F2323EBE1732372EB2B2B5E2356215E
:102A50008600397323722A1B262B221B26237CB562
:102A6000CAF72A210000E52A1D26CD0923D1EB2132
:102A7000900039732372 21FFFFCD4123C2F72A2131
:102A80008A00397E23B6CAA42A219000395E2356D3
:102A9000D521060039E5CDE15ED1D1110000CD5040
:102AA00023C3BC2A219000395E2356D52106003964
:102AB000E5CDE15ED1D1110000CD41237CB5CAF777
:102AC0002A210100E52A1D26CD0923D1C3F72A2199
:102AD0008C00397E23B6C2F42A219000395E235639
:102AE000D521880039E57E23666F23EBE1732372DD
:102AF000EB2BD173C3562A218C00397E23B6C21E1C
:102B00002B210000E5218800395E2356EBD1732108
:102B10008E0039E57E23666F23EBE1732372C3B01C
:102B20002B210000E52A1D26CD0923D1EB219000A1
:102B30003973237221FFFFCD4123C2D52B218C0095
:102B4000397E23B6C2772B219000395E2356D521DA
:102B5000A80039E57E23666F2323EBE1732372EB34
:102B60002B2B5E2356EBD173218E0039E57E236635
:102B70006F23EBE1732372C3BD2BCD40240F00259F
:102B800000B4274400D0274500DF284600DF284F47
:102B90000018285800F4275B006F296300212B647C
:102BA00000DB276500EA286600EA286800C2276F74
:102BB000002328730 0FA297800FF27BD2BC3182CA7
:102BC0002190003 95E2356D5CD2A5FD1CAEF2BCD97
:102BD000242CCAEC2B218E00397E23B6C2E32B2194
:102BE000FFFFC9218E00395E2356EBC9C3182CCDD7
:102BF000242CC2D52B210000E52A1D26CD0923D186
:102C0000EB219000397E23666FCD5023CA182C210A
:102C10008E00395E2356EBC9C3F326218E00395E40
:102C20002356EBC9CD0A230000210000E52A1D260A
:102C3000CD0923D1E5CD2A5FD1CA3F2CC3292C2150
:102C40000100E52A1D26CD0923D111FFFFCD412327
:102C5000CA572C21FFFFC9210000C9CD0A23FBFF61
:102C6000210D00395E23562104003973237221009F
:102C700000EB2108003973210600397321070039 60
:102C8000732A1B262B221B26237CB5CA4E2D21001E
:102C900000E52A1D26CD0923D1444D210700397EA8
:102CA000B7C2C62C6069112D00CD4123C2BA2C6079
:102CB00069112B00CD4123CAC62C210100EB21074D
:102CC000003973C3352D210800397EB7C2E62C6068
:102CD00069112E00CD4123CAE62C210100EB210809
:102CE000003973C3352D210600397EB7C21F2D6010
:102CF00069116500CD4123C2052D6069114500CDE4
:102D00004123CA1F2D210000EB2107003973210147
:102D100000EB21080039732106003973C3352DC536
:102D2000CD6A5FD1C2352D210100E52A1D26CD09CE
:102D300023D1C34E2D6069E521060039E57E236667
:102D40006F23EBE1732372EB2BD173C3812C210032
:102D500000E5210600395E2356EBD173210D0039C1
:102D60005E2356D5CDAB5CD1C9CD0A23F8FF2A1B13
:102D700026110000EBCD6123CA832DCDCE5F00006C
:102D80000000C921060039E5210000EB21060039C9
:102D9000732372EBCD4563E1CDE85F210000E52AA6
:102DA0001D26CD0923D1EB210A0039732372212D71
:102DB00000CD4123CACC2D210100EB210400397341
:102DC00023722A1B262B221B26C3F12D210A003930
:102DD0005E2356212B00CD4123CAE62D2A1B262B2C
:102DE000221B26C3F12D210100E52A1D26CD092332
:102DF000D12A1B262B221B26237CB5CA812E21001B
:102E000000E52A1D26CD0923D1E5211200395E23D4
:102E100056D5CDE15ED1D1444D7CB5C22C2E2101D9
:102E200000E52A1D26CD0923D1C3812E21060039B4
:102E3000E5211600395E2356EBCD4563CD2760E1D1
:102E4000E5CD055FCD7A62E1CDE85F21060039E5B9
:102E50006069EB211200397E23666FCD5524EB218A
:102E60001400397E23666F195E1600EBCD4563CDE5
:102E70002760E1E5CD055FCD9160E1CDE85FC3F19D
:102E80002D210400397E23B6CA9E2E21060039E585
:102E90002108003 9CDD55FCD3660E1CDE85F210650
:102EA0000039CDD55FC92E53420000000003C02178
:102EB00093088A522E383200000000640240400095
:102EC00058602E4C4E50524D8CC2A058000000C38A
:102ED000A358210100C9CD378C000021080039 4ECC
:102EE000234660691130 00EBCD8D8CCAC8586069EB
:102EF0001139EB2A1726C3FD2EEB2A1526C51A77A2
:102F000023E67FD6407723360006032313 1A77057E
:102F1000C20B2F0605AF237705C2162FC1C9C5EB1B
:102F20002A15267EE68047237EC640E67FB0122320
:102F3000060313237E1205C2322FC1C9D121080016
:102F400019E5EBEB2A1726C3552FD121080019E507
:102F5000EBEB2A1526C51A7723E67FD64077233672
:102F60000006072313 1A7705C2632F233600C1C951
:102F7000C5E5CD6233D12A15267EE68047237EC67D
:102F800040E67FB012230607132 37E1205C2882F66
:102F9000C1C9E122A62ECD62332A152611090019D6
:102FA000562B5E2BD5562B5E2BD5562B5E2BD5562E
:102FB0002B2B7EC640E67F5F2B7EE680B35FD52A53
:102FC000A62EE9E122A62E2A1726D173237BE67FBF
:102FD000D64077233600237223D173237223D17313
:102FE000237223D17323722336002AA62EE92A17CF
:102FF00026EB2A15262217 26EB221526C92A152686
:103000007EEE8077C92A1526237EFEC0C2E432C335
:10301000D932AF3DC1C9AF3CC1C9C52A1526EB2A7B
:1030200017261AB7FA2E30AEFA1630C33330AEFA7E
:103030001230EB23131ABEFA1230C2163006092 3DF
```

```
:10304000131ABEDA1230C2163005C23F30AFC1C902
:103050002A17267EEE0077C52A1526110B00190641
:1030600007AF772305C262302A1726110B00190615
:1030700007772305C271302A1526EB2A172623135A
:103080001A96F28830EB2F3C1B2B221726EB2215C9
:1030900026FE09D289334FE5D5C6095F16001922ED
:1030A000A82ED12109001922AA2EE1EB1AAEF20EA8
:1030B000311AB7FAD53006072AA82EEB2AAA2E1AFB
:1030C0009E121B2B05C2BF301ADE00121B0DF2C868
:1030D00030EBC3F03006072AAA2EEB2AA82E1A9E40
:1030E000771B2B05C2DE303E009E772B0DF2E730BA
:1030F000237EB73E01F20731110F00193E009E7783
:103100002B1DF2FC303E812A152677C38933060732
:103110002AA82EEB2AAA2E1A8E121B2B05C21731B3
:103120001ACE00121B0DF22031C38933C52A152691
:10313000EB2A17261AAE1223131A964FD5E57EFEF8
:10314000C0C24E31E1E13E03321926C329341323B4
:1031500060813231ABEC2703105C25231E1E10CD6
:10316000712336002336010608AF321926C3B03367
:10317000D1E171DA79310C712BD5110900190608EA
:1031800011DA2E7E122B1305C28331E111090019C9
:1031900060811E22E7E122B1305C2953106082176
:1031A000D22EAF772305C2A3313E4032D12E21D299
:1031B0002E0610B77E8F772305C2B4319FE6014FEC
:1031C000060811DA2E21E22EB71A9E12132305C229
:1031D000C93179DE00C2E63121D22E3421D12E351B
:1031E000C2AE31C3183221D12E35CA183221D22EA7
:1031F0000610B77E8F772305C2F3319F4F06081163
:10320000DA2E21E22EB71A8E12132305C206327966
:10321000CE00C2E631C3D8312A1526110C0019366A
:1032200002B360011D22E06082B1A771305C2295F
:1032300032C38933C52A1526EB2A17261AAE122364
:10324000131AFEC0CAA33386127EFEC0CAA333D5AA
:10325000110900190608 11E22E7E122B1305C2591E
:1032600032E111090019060811DA2E7E122B13051E
:10327000C26B32060821D22EAF772305C279323EC7
:103280004032D12E21D22E0610B77E8F772305C271
:103290008A32D2B532060811D22E21E22EB71A8E0A
:1032A00012132305C29E3206081ACE0012D2B5327E
:1032B0001305C2A93221D12E35C284322A15261116
:1032C000C001911D82E060A1A77132B05C2C83222
:1032D000C38933CD1A30CAE432210000AFC9CD1AF8
:1032E00030CAD932210100AF3CC9CD1A30FAE432DC
:1032F000C3D932CD1A30FAE432CAE432C3D932CD5E
:103300001A30FAD932C3E432CD1A30FAD932CAD9D6
:1033100032C3E432C57CB5CAA333EB0600C33633EF
:10332000C57CB5CAA333EB06007AB7F236332F5704
:103330007B2F5F1306802A152670237AB7C24D3380
:1033400036012336002373 0607AFC35933360223F1
:103350003600237223730606AF237705C25933C3A1
:10336000EA332A1526110A00197EFE80D8C2763368
:103370002B7EF60177C9C5010008372B7E897705BA
:10338000C27B33B7C28933C1C92A1526237E545D57
:10339000234FAFBEC2F133060823BEC2B8330D05BA
```

```
:1033A000C29933AF3219262A1526060A772336C06A
:1033B000237705C2B033C1C93E089047CAD8332B22
:1033C0007912D5133E0F904F7E12132300C2C833CE
:1033D000AF121305C2D133D11AB7FAE533FE40DA82
:1033E000EA33C32434FEC1DA0B343E00321926C15D
:1033F000C90C7912060FD521100019545D1B1A77DC
:103400002B05C2FD333600D1C3D8333E0132192615
:10341000CD4434AF2A15262336C12377233601063F
:103420008C3B0333E02321926CD44342A15262370
:10343000363F2336003EFF0607237705C239342383
:103440003600C1C92A05017CB5CA6134EB210400EC
:10345000394E2346C52A1926E5EBCD6034E1E1C992
:10346000E9CDFF34466C6F6174696E6720706F69D7
:103470006E7420003A1926FE01C28C34CDFF3475DB
:103480006E646572666C6F7700C3B234FE02C2A0D0
:1034900034CDFF346F766572666C6F7700C3B234DB
:1034A000CDFF34646976696465206279207A65723B
:1034B0006F00CDFF3420617420 6C6F636174696F9D
:1034C0006E20307800210500397EE5F5CDE734F136
:1034D000CDEB34E12B7EF5CDE734F1CDEB34210A91
:1034E00000E5CDC03DE1C91F1F1F1FE60FC630FE1E
:1034F0003ADAF634C6076F2600E5CDC03DE1C9C112
:103500000A03B7CA11356F2600E5CDC03DE1C300FF
:1035100035C5C9C52A1526360023360311040019FE
:103520005D540605AF237705C2253506042A451AE2
:103530002323237E2A451AB7F24C353E009E1223E0
:103540001B05C23B351B3E8012C389337E12231BF1
:1035500005C24C35C38933C52A451A545DAF77235C
:1035600077237723772A15264E237EB7CAEA33FAC4
:10357000EA33FE05D29D354723856FD27F35247E01
:1035800012132B05C27F3579B7F2EA3306042A45B8
:103590001A3E009E772305C29135C3EA33EB79B713
:1035A000FAB135367F2336FF2336FF2336FFC318A3
:1035B000363680233600233600233600C31836C53E
:1035C0000E00C3C835C50E012A152646237EB7CA8C
:1035D000D535F2DB35210000C3EA33FE03D2FF35D7
:1035E00023856FD2E735245E2B56EB79B7CAEA33D1
:1035F00078B7F2EA337C2F677D2F6F23C3EA3379E4
:10360000B7C20A3621FFFFC3183678B7FA1536213C
:10361000FF7FC318362100803E02321926C1C940FF
:10362000800000000000000400CCCCCCCCCCCD40C5
:103630000147AE147AE1483F20C49BA5E354003F04
:10364000346DC5D6388663E53E2D6238DA3CD3E00
:103650008637BD05AF6C83DD6BF94D5E57A663D5F
:1036600015798EE2308C3D3D0225C17D04DAD33CD4
:1036700036F9BFB3AF7B803C057F5FF85E59263BD0
:103680008CBCCC096F509A3B0E12E13424BB433BF7
:1036900016849B86A12BA3A24075F3DCEAC333AA2
:1036A000039A5652FB1138C5210C00395E2356EBA4
:1036B00022EA2E21040039CD512F210E00397E3C03
:1036C000FE11DAC7363E1032EC2E6F260022ED2EA8
:1036D0002A15267EB7F2E436CDFD2F2AEA2E362DA6
:1036E0002322EA2E010000CD0530CA6A37CD3C2FD7
:1036F000410A0000000000002A1526237EFE01FA80
```

:1037000063337CA4A37FE02C2123723237EFE27DA06
:103710005237CD8D38CD3C2F401999999999999A66
:10372000CD993803CDEA32C22037CD8D382A1526FF
:103730002323237EFE0ADA6A370BCD9938C36A3712
:103740002A1526237EFE01C2523723237EFE0ADA83
:103750006A37CD2C3103C340372A1526237EFE015C
:10376000F26A37CD99380BC35937211000397EB72B
:10377000CA7A372AED2E0922ED2E2AED2E2B7CB7A0
:10378000F28937210000C39537C292377DFE10DAE7
:10379000953721100029292911F3619CD432FCD26
:1037A0005730CD3C2F410A000000000000CDFF3211
:1037B000CACA37210100CD14330321100397EB766
:1037C000CACA372AED2E2322ED2E606922EF2E2160
:1037D0001000397EB7CA06387B779F206382AEA77
:1037E0002E363023362E233AEE2EB7FAF337792FC2
:1037F000C3F6373AEC2EB7CA01383630233DC2FA49
:103800003722EA2E3EFF4F06FF3AEE2EB7FA423835
:103810000043AED2EB8DA4238CA42382A1526237EF9
:10382000FE013E30C22C3823238636002AEA2E774A
:103830002378B9C23938362E2322EA2ECD9938C3DF
:1038400010382110003977EB7C286382AEA2E366534
:103850002336283AF02EB73AEF2EF26138362D2F61
:103860003C23FE64DA6C38363123D6640600FE0A47
:10387000DA793804D60AC36E38C6305F3E308077B6
:1038800023732322EA2E2AEA2E3600C1C9CDEE2F59
:10389000210100CD1433C32C31C52A152623341140
:1038A000090019AF0608C55EEB260029444D2929F9
:1038B00009EB8323777ACE002B2BC105C2A63823D0
:1038C00077B7CA89332B2B7EB7FAD138FE40D22482
:1038D00034C1C9CD0A23FEFF210D01444D60691199
:1038E0000600197EB7CA01396069110B00194440F1
:1038F000118601EBCDA724CAFE38210000C9C3DD23
:10390000038210C00395E2356EB235E1600212B0074
:10391000CD4123EB21040039732372210C00395E61
:103920002356EB5E1600EBC3043A210400397E23D4
:10393000B6CA3A39210200C33D39210000E5210C05
:103940000395E2356D5CD384FD1D1EB2107000980
:103950007321FFFFCD4123CA5E39210000C9C3177F
:103960003A210400397E23B6CA7139210200C3749A
:103970003921010011003CD2324E5210C00395E1B
:103980002356D5CD384FD1D1EB2107000097321FF44
:10399000FFCD4123CA9B39210000C9C3173A210436
:1039A00000397E23B6CAAE39210200C3B1392101E4
:1039B00000110001CD2324E5210C00395E2356D5EA
:1039C000CD384FD1D1EB210700097321FFFFCD4145
:1039D00023CAD839210000C9210200E5CDCE5F00FD
:1039E000000000CDFB5F210700095E1600D5CD8CAD
:1039F0005AEB210800039F9C3173A21FAFF220301D3
:103A0000210000C9CD8024030072002A39770061AB
:103A10003961009E39FA39210100EB210600097352
:103A2000210004EB210900097323722100000EB60DF
:103A300069732372210200097323722104000097340
:103A400023726069C9CD0A23FEFF210A00395E2373
:103A500056424B210D01E5CD653BD1EB21040039E8
:103A600073237221FFFFCD5023CA8F3A21040039FE
:103A70005E2356210A00CD5023CA8F3A2104003913
:103A80005E2356D5606923444D2BD173C3533A212D
:103A9000000000EB606973210400395E235621FFFFAB
:103AA000CD4123CABB3A6069EB210A00397E236607
:103AB0006FCD4123CABB3A210000C9210A00395EFB
:103AC0002356EBC9CD0A23FEFF210A00395E235697
:103AD00021040039732372210C0039E57E23666FBF
:103AE0002BEBE1732372210000CD7C23CA2A3B21FA
:103AF000E00395E2356D5CD653BD1444D11FFFFF5
:103B0000CD5023CA2A3B6069E521060039E57E23B2
:103B1000666F23EBE1732372EB2BD173606911OA9B
:103B200000CD4123C22A3BC3D73A210000E521063C
:103B30000395E2356EBD173606911FFFFCD41233D
:103B4000CA5C3B210400395E2356210A00397E23DA
:103B50006666FCD4123CA5C3B210000C9210A0039B0
:103B60005E2356EBC9CD0A23FEFF210A00394E23FE
:103B700046C5CDD83CD1117F00CDF922EB21040000
:103B800039732372EBC39C3B6069E57E23666F2B20
:103B9000EBE173237221FFFFC9C3713BCD80240386
:103BA00001A00083B0D00993B0000993BAF3B2178
:103BB000400395E2356EBC9CD0A2300002108001A
:103BC000394E234660697EB7CAEE3B211801E56095
:103BD0006923444D2B5E1600D5CD3A3CD1D111FF5F
:103BE000FFCD4123CAEB3B21FFFFC9C3C43B2118D2
:103BF00001E5210A00E5CD3A3CD1D1C9CD0A230027
:103C000000210800394E234660697EB7CA363C2140
:103C10000A00395E2356D5606923444D2B5E160099
:103C2000D5CD3A3CD1D111FFFFCD4123CA333C2140
:103C3000FFFFC9C3083C210000C9CD0A23000021B1
:103C4000800394E2346217F005059CDF922444DBA
:103C5000606911 0A00CD4123CA793C210A00395E0E
:103C60002356D5210D00E5CD273ED1D111FFFFCD43
:103C70004123CA793C21FFFFC9210A00395E23563E
:103C8000D5C5CD273ED1D1C9CD0A23FEFF210A00DB
:103C9000395E2356D5CDD83CD1444D11FFFFCD41DF
:103CA00023C2C13C210A00395E2356D5CDD83CD170
:103CB000EB21040039732372 21FFFFCD4123CAC5D4
:103CC0003C21FFFFC9210400395E2356210800CDA5
:103CD00045245059CD2324C9CD0A23FEFF210A00D3
:103CE000394E2346210200095E2356D560695E23C2
:103CF00056E1CDA724CAA73D210600095E16002182
:103D0000800CDF922CA0C3D21FFFFC921FBFFE5C8
:103D10006069110600019D1E56E2600CDF922EBE1AC
:103D200073606911040019 7E23B6C2323DC5CD040B
:103D30041D1210900095E2356D5210400095E23E3
:103D40056D5210700095E1600D5CD3654D1D1D104
:103D5000EB21040039732372210000CD6123CA8A4C
:103D6003D210400397E23B6C2713D210800C37491
:103D7003D211000E5606911060019D1E56E2600AD
:103D8000CD2324EBE17321FFFFC9210400095E2349
:103D9005660697323722104003 97E23666F19EB24
:103DA00021020009732372606 9E57E23666F23EBAD
:103DB000E1732372EB2B5E160021FF00CDF922C9BF

```
:103DC000CD0A230000212301E5210A00395E235694
:103DD000D5CD273ED1D1C9CD0A2300002108003915
:103DE0004E2346210A00395E2356D5C5CD273ED144
:103DF000D1110000EBCD7B23CAFF3D21FFFFC9217C
:103E00000A00395E2356D56069110800EBCDC22443
:103E1000E5CD273ED1D1110000EBCD7B23CA243E56
:103E200021FFFFC96069C9CD0A230000210A0039BA
:103E30004E2346210200095E2356D560695E235653
:103E4000E1CDA724CA5C3E210800395E235621FF3C
:103E500000CDF922E5C5CD5D3FD1D1C9210800399A
:103E60005E2356D56069E57E23666F23EBE17323FD
:103E700072EB2BD17321FF00CDF922C9CD0A2300AB
:103E800000021FFFFE5210A00395E2356D5CD5D3FB5
:103E9000D1D1C9CD0A230000210D01444D60691123
:103EA0008601EBCD8524CABD3E6069110B001944F3
:103EB0004D11F5FF19E5CD8E3ED1C39D3EC9CD0ADA
:103EC00023FEFF210A00394E2346210000EB210486
:103ED000003973237260691106001 97EB7CA4B3F1F
:103EE000210600095E1600210400CDF922CA023F16
:103EF00021FFFFE5C5CD5D3FD1D1EB210400397332
:103F000023722107000095E1600D5CD1B51D1EB218C
:103F10000040039E57E23666FCD2324EBE173237221
:103F20000210600095E1600210200CDF922CA4B3F8E
:103F30002A8601E5210400095E2356EBD173237222
:103F40002104000095E2356EB228601210000EB21AB
:103F5000060009732104000395E2356EBC9CD0A23FC
:103F6000FEFF210A00394E23462106000095E160095
:103F7000210400CDF922CAD23F210400095E235654
:103F8000D560695E2356E1CD5524EB21040039 73D9
:103F900023722104000395E2356D5210400095E23D3
:103FA00056D5210700095E1600D5CD8257D1D1D123
:103FB00011FFFFCD4123CAD23F211000E5606911F6
:103FC000060019D1E56E2600CD2324EBE17321FF15
:103FD000FFC9210C00395E235621FFFFCD4123CAC2
:103FE000B4021FBFFE560691106001 9D1E56E2643
:103FF0000000CDF922EBE173210000EB6069732372BD
:1040000021020009732372210000C960691104 00B4
:10401000197E23B6C21C40C5CD0441D12109000937
:104020005E2356210100CD4123CA5540210100E500
:10403000210E0039E5210700095E1600D5CD8257E3
:10404000D1D1D111FFFFCD4123C2B93F210C00399D
:104050005E2356EBC9210400095E23566069732371
:10406000722109000095E2356D5210400095E2356FA
:10407000E119EB21020009732372210400E5606954
:104080001106001 9D1E56E2600CD2324EBE1732142
:104090000C00395E2356D56069E57E23666F23EBFD
:1040A000E1732372EB2BD17321FF00CDF922C9CD2F
:1040B0000A230000210A00394E2346210800395EF8
:1040C00023 5621FFFFCD4123C2DF40210400095EBA
:1040D0002356D560695E2356E1CDA824CAE340216A
:1040E000FFFFC9210800395E2356D56069E57E23AC
:1040F000666F2BEBE1732372EBD173210800395EFD
:104100002356EBC9CD0A23FEFF210A00394E234670
:10411000210900095E2356210100CD4123CA2F4100
:1041200006069110800 19EB2104000973 2372C92A80
:104130008601 7CB5CA4F412A8601EB2104003973 00
:1041400023722A86015E2356EB228601C376412123
:104150000900095E2356D5CD9E41D1EB21040039D8
:104160007323727AB3C27641210100EB2109000961
:10417000732372C32041210200E56069110600 1912
:10418000D1E56E2600CD2324EBE173210400395ED6
:104190002356210400097323 72C900000000CD0AD0
:1041A0002300002A9C417CB5C2B941210000E5CD25
:1041B000504AD1229A41229C412A9C41444D2108D7
:1041C00000395E23562A9C4119229C415059EBCD5F
:1041D000B524CADE416069229C41210000C92A9CA5
:1041E00041EB2A9A41CD8624CA1D422A9C41EB2AB2
:1041F0009A41CD552411FF01191100FECDF922EB92
:104200002108003973 2372D5CD504AD1CAD5412136
:1042100008 00395E23562A9A4119229A416069C9D9
:10422000EB5E30313233343536373839616263 64AE
:104230006566 00CD0A230000210800395E2356EB95
:104240002220422 10C0039E5210C00395E2356D58D
:104250002164 42E5CD8242D1D1D1210000E52A205E
:1042600042D173C9CD0A230000210800395E2356CC
:10427000D52A2042232220422BD17321FF00CDF9E1
:1042800022C9CD0A23BCFF214C00394E2346214EC2
:10429000 0039E57E23666F23EBE1732372EB2B5E1F
:1042A00016002146003973 23727AB3CA1F48214 68B
:1042B000000395E2356212500CD4123CA0E48210036
:1042C0000 0EB211A003973210100EB2144003973FE
:1042D000237221 2000EB2142003973237221FF7FDA
:1042E000EB21400039732372214E00395E2356EBD7
:1042F0005E16002146003973237221 2D00CD412323
:104300 00CA2943210000EB21440039732372214E56
:104310000 0039E57E23666F23EBE1732372EB2B5E9E
:1043200016002146003973237221 4600395E235650
:10433000213000CD4123CA4443213000EB2142000B
:1043400039732372210000EB213E003973 2372215F
:104350004E0039E57E23666F23EBE1732372EB2B6E
:104360005E16002146003973237221 3000CD602390
:10437000CAA943214600395E2356213900CD612365
:10438000CAA943213E00395E2356210A00CDF923F4
:10439000EB214600397E23666F1911D0FF19EB21FE
:1043A0003E0039732372C34F4321 4600395E2356C2
:1043B000212E00CD4123CA1E44210000EB214000E4
:1043C00039732372214E0039E57E23666F23EBE1BA
:1043D000732372EB2B5E16002146003973237221 82
:1043E0003000CD6023CA1E4421 4600395E23562189
:1043F0003900CD6123CA1E44214000395E23562175
:1044000 00A00CDF923EB214600397E23666F19118E
:10441000D0FF19EB2140003973 2372C3C44321 46F6
:1044200000395E2356216C00CD4123CA6F44214ED2
:104430000 0039E57E23666F23EBE1732372EB2B5E7D
:104440001600214600397323722 13A0039E52152C2
:10445000 00039E57E23666F11040019EBE1732372C6
:10446000EB11FCFF19CDD55FE1CDE85FC31E4521FF
:104470004600395E2356216400CD4123CAA544215C
```

:104480003A0039E521520039E57E23666F2323EB9C
:10449000E1732372EB2B2B5E2356EBCD4563E1CD0D
:1044A000E85FC31E4521460039E2356216500CDD5
:1044B0004123C2D544214600395E2356216600CDF2
:1044C0004123C2D544214600395E2356216700CDE1
:1044D0004123CAFB4421040039E521520039E57E1D
:1044E00023666F11080019EBE1732372EB11F8FFDB
:1044F00019CD512FE1CD702FC31E45213A0039E56A
:104500002152O039E57E23666F2323EBE17323728A
:10451000EB2B2B5E2356EBCD3763E1CDE85F2146D5
:1045200000395E2356EBC3DA46211A0039E521082B
:1045300000E5213E0039CDD55FCDFB5FCD8648EB50
:1045400021080039F9213400397323723C30147214E
:104550003A0039CDD55FCDC05F00000000CD0D63BE
:10456000CAA245211A0039E5210A00E5213E003999
:10457000CDD55FCD3660CDFB5FCD2048EB21080067
:1045800039F92134003973237212D00E5213600D9
:1045900039E57E23666F2BEBE1732372EBD173C396
:1045A000C545211A0039E5210A00E5213E0039CD33
:1045B000D55FCDFB5FCD2048EB21080039F92134D0
:1045C0000039732372C30147211A0039E5210A001B
:1045D000E5213E0039CDD55FCDFB5FCD8648EB218F
:1045E000080039F9213400397323723C3014721 1AB5
:1045F0000039E5211000E5213E0039CDD55FCDFB26
:104600005FCD8648EB21080039F92134003973234 6
:10461000 72C30147213A0039CDD55FCD5863EB21F4
:104620003400397323 72D5CD5F5ED1EB2138003968
:10463000732372C319472146 00395E235621650052
:10464000CD4123CA4C46210000C34F46210100E55D
:104650002142 00395E235621FF7FCD4123CA6646A1
:10466000210600C36E46214200395E2356EBE52148
:10467000100039E5210A0039CD512FCD922FCDA759
:1046800036EB210E0039F9210C0039EB21340039C9
:10469000732372D5CD5F5ED1EB2138003973237 25D
:1046A00021C800EB21400039732372C319472 13A16
:1046B0000039CDD55FCD5863EB214600397323 72A5
:1046C0002146 00395E2356D5211B0039EB213600E7
:1046D00039732372EBD173C30147CD8024080 06F77
:1046E00000294564004F457500C8457800EE4573C4
:1046F000001446650036466600364663 00AE46C086
:1047000046211A0039EB213400397E23666FCD55DE
:1047100024EB213800397323722138003 95E235687
:1047200021400397E23666FCD7C23CA3C4721405F
:1047300000395E2356213800397323722144003931
:104740007E23B6CA7747213E0039E57E23666F2B6C
:10475000EBE1732372EB23EB213800397E23666F84
:10476000CD7C23CA7747214200395E2356D5606944
:10477000CD0923D1C3464721 0000EB213600397310
:104780002372C3944721360039E57E23666F23EBFD
:10479000E17323722134 00395E2356EB7EB7CAD40D
:1047A00047213600395E2356214000397E23666F48
:1047B000CD7B23CAD44721340039E57E23666F239D
:1047C000EBE1732372EB2B5E1600D56069CD0923F4
:1047D000D1C38547214400397E23B6C20B48213E10
:1047E0000039E57E23666F2BEBE1732372EB23EB3D
:1047F000213800397E23666FCD7C23CA0B482120E7
:1048000000E56069CD0923D1C3DE47C31C482146BA
:104810000395E2356D56069CD0923D1C38E42C9C4
:10482000CD0A230000210C00394E23466069CD4596
:1048300063CDFB5F210C0039CDD55FCD1360CDBBBF
:1048400061CD5863112242195E1600D5211000393E
:10485000E57E23666F2BEBE1732372EBD1732108A6
:104860000039E56069CD4563CD2760E1E5CDD55FD1
:10487000CD8161E1CDE85FCD4660C22C48210E00BC
:10488000395E2356EBC9CD0A23FEFF210E00394EB7
:1048900023462 10A0039CDD55FCDC05F000000005E
:1048A000CD0D63CA4649210A0039CDD55FCD586385
:1048B000110100CDF922EB21040039732372210A82
:1048C0000039E5210C0039CDD55FCDC05F01000076
:1048D00000CD3861CDC05FFFFFFF7FCDBD60E1CD72
:1048E000E85F6069110100EBCD2B24CD4563CDFB62
:1048F0005F210E0039CDD55FCD1360CDBB61CD58A2
:104900006329EB210400397E23666F1911224219B5
:104910005E1600D521120039E57E23666F2BEBE190
:10492000732372EBD173210A0039E56069110 1002C
:10493000EBCD2B24CD4563CD2760E1E5CDD55FCD13
:104940008161E1CDE85F211000395E2356D5C52194
:104950000E0039CDD55FCDFB5FCD2048EB2108009F
:1049600039F9EBC960632A0600F9CD354801000027
:10497000CD0500C36D49CDEA24CD8149EBC9CDEA0F
:10498000242AF322444D2AF522EBCD0500EB6F26B5
:104990000 0C9CDEA24CD9F496F2600C9CDEA242A5B
:1049A000F322EB2A01002B2B2B191919EB2AF522E4
:1049B000444D2AF722EBE9C5210400394E23462352
:1049C0005E23566B623600233E0B3620233DC2CA5F
:1049D000493E043600233DC2D349EB030AFE3A0B9D
:1049E0003E00C2064A0AE67FFE41DA404AFE5BD23A
:1049F000F749D640C3034AFE61DA404AFE7BD24003
:104A00004AD660770303231E081C0A03FE2ECA2120
:104A10004AB7CA3A4A1DCA094ACD474A7723C30A48
:104A20004A1D7B856F7CCE00671E030A03B7CA3A16
:104A30004ACD474A77231DC22B4A210000AFC1C986
:104A400021FFFF7CB7C1C9FE61D8FE7BD0D620C94B
:104A50002102 00395E23562A644919EB2100FE39F0
:104A60007D937C9ADA724A2A6449EB226449EB7C92
:104A7000B5C9210000AFC90800395E2356EB2323D6
:104A8000D17323726069E5210600395E2356EB235A
:104A900023D1732372C3AD73C36F73C9CD378C0039
:104AA00000210B00E5CD7C91D1CA8B74210100E57A
:104AB000CD7C91D1110300CD7D8CCA8C74C9219D10
:104AC00074E5CDE28ED1210400E5CDC293D1C94376
:104AD0006F6D70696C65722061626F7274656420BD
:104AE000627920757365722100030AFE2ED2B77CAD
:104AF000D55F160021CD7419197E23666FE3C9B7FF
:104B00007C1F8616854184 3A84E783BE86C986D594
:104B100086DE86F386EA867F758575887591759A34
:104B200075A075A675AC757C83B5753B83C7756537
:104B3000757275D883CD0A23FCFF217F00E52181A2

:104B400000E521B34AE5CDC55DD1D1D1210000E515
:104B50003A80006F2600117F00CDF92211B34A1967
:104B6000D17321514D22774A21B34A444D2101008E
:104B700022334B2A334B111E00EBCD7B23CA3E4D13
:104B800060695E1600212000CD4123C29C4B606904
:104B90005E1600210900CD4123CAA44B606923445D
:104BA0004DC3804B60695E16007AB3CA3E4D6069A2
:104BB0005E1600213E00CD4123CACA4B210100EB05
:104BC00021040039732372C3E34B60695E16002130
:104BD0003C00CD4123CAEF4C210000EB21040039F9
:104BE000732372606923444D5E1600212000CD417D
:104BF00023C2024C60695E1600210900CD4123CA20
:104C0000054CC3E34B6069EB2106003973237260E6
:104C10006923444D7EB7CA474C60695E1600212067
:104C200000CD4123C2354C60695E1600210900CD0C
:104C30004123CA444C210000E5606923444D2BD137
:104C400073C3474CC30F4C210400395E2356D5CDA6
:104C50001B51D1210400397E23B6CA794C21B601FB
:104C6000E5210800395E2356D5CD184FD1D1EB216F
:104C7000040039732372C3924C210000E52108001F
:104C8000395E2356D5CD184FD1D1EB21040039738D
:104C90002372210400395E235621FFFFCD4123CA30
:104CA000EC4C21524DE5218000E5CD3A5ED1D12179
:104CB0000600395E2356D5218000E5CDA55ED1D111
:104CC00021744DE5218000E5CDA55ED1D121800084
:104CD000E5CD5F5ED1E5218000E5210200E5CDB2A2
:104CE00057D1D1D1210A00E5CD764DD1C33B4D60DE
:104CF00069E52A334B2322334B2B2911774A19D1EB
:104D0000732372606923444D7EB7CA3B4D60695E70
:104D10001600212000CD4123C2294D60695E160096
:104D2000210900CD4123CA384D210000E5606923E7
:104D3000444D2BD173C33B4DC3034DC3734B2177FC
:104D40004AE52A334BE5CD491AD1D1E5CD764DD18F
:104D5000C90043616E2774206F70656E2066696CB0
:104D60006520666F72207265646972656374696F2D
:104D70006E3A20000A00CD0A230000CD933E2108A0
:104D800000397E23B6CA904D21944DE5CD805CD18B
:104D9000CD6D49C9413A2424242E53554200CD0AF1
:104DA00023000021FDFF22030121FFFFC9CD0A23BB
:104DB0000000210000C9E076C608856F3E008C67C0
:104DC0005E2356D5C3E076110000C3E076110100E2
:104DD000C3E076110200C3E076110000C3E0761153
:104DE0000400C3E076110500C3E076110600C3E0BD
:104DF00076110700C3E076110800C3E076110900C0
:104E0000000076110A00C3E076110B00C3E07611B2
:104E10000C00C3E076110D00C3E076110E00C3E074
:104E200076110F00C3E00000000022DE99C3E07697
:104E300021010022DE99C3E07621020022DE99C31F
:104E4000E07621030022DE99C3E07621000022DE15
:104E500099C3E07621050022DE99C3E076210600A1
:104E600022DE99C3E07621070022DE99C3E0762195
:104E70000800000099C3E07621090022DE99C3E012
:104E800076210A0022DE99C3E076210B0022DE990A
:104E9000C3E076210C0022DE0000E076210D002226

:104EA000DE99C3E076210E0022DE99C3E076210F61
:104EB0000022DE99C3E076210000E5C3E076000021
:104EC00000E5C3E076210200E5C3E076210300E5BA
:104ED000C3E076210400E5C3E076210500E5C3E0E8
:104EE000762106000000636F6E3A00434F4E3A0091
:104EF0006C73743A004C53543A0070726E3A00501E
:104F0000524E3A0070756E3A0050554E3A00726437
:104F1000723A005244523A00CD0A230000210A009E
:104F2000395E2356D5210103E5210C00395E235655
:104F3000D5CD384FD1D1D1C9CD0A23F8FF21E20117
:104F4000EB210A0039732372210000EB210600399E
:104F5000732372C3774F210A0039E57E23666F11F0
:104F6000800019EBE173237221060039E57E236600
:104F70006F23EBE1732372210600395E2356210B60
:104F800000CD7B23CAA14F210A00395E235621049C
:104F900000195E2356219E4DCD4123C2AB4FC3560F
:104FA0004F21F8FF22030121FFFFC921A001444D39
:104FB000C3BB4F606911060019444D60697E23B67A
:104FC000CADC4F211000395E2356D560695E235636
:104FD000D5CD015ED1D1CADC4FC3B34F2102000948
:104FE0005E235621080039732372211200395E2393
:104FF00056210300CDF92223EB21040039732372DB
:10500000210400395E2356210100CDF922CA355012
:10501000210800395E2356EB5E1600D5210C0039BD
:105020005E2356EBD1737AB3C2355021F6FF2203CB
:105030000121FFFFC9210400395E2356210200CD62
:10504000F922CA6C50210800395E2356EB235E1604
:1050500000D5210C00395E2356EB23D1737AB3C2FD
:105060006C5021F6FF22030121FFFFC92104000932
:105070005E2356D5210C00395E235621060019D136
:10508000732372210800395E2356EB23235E16003A
:10509000D5210C00395E2356EB2323D17321080060
:1050A000395E2356EB2323235E1600D5210C0039ED
:1050B0005E2356EB232323D173212153E5210C00DA
:1050C000395E235621040019D1732372C5210C00C7
:1050D000395E2356D5211800395E2356D521180094
:1050E000395E2356D5211800395E2356D52112008A
:1050F000395E2356210400195E2356EBCD0923EBBC
:10510000210A0039F9210000CD7B23CA125121FF69
:10511000FFC9210600395E2356EBC9CD0A230000E2
:10512000210800395E2356210000CD7B23C2405167
:10513000210800395E2356210B00CD7C23CA4A5139
:1051400021FDFF22030121FFFFC9210800395E2351
:1051500056EB29292911E20119444D210600095E67
:105160002356D5210400095E2356EBCD0923D1EB4C
:1051700021080039732372210000EB210300097319
:1051800021020009732101000973606973219E4D9A
:10519000EB21040009732372210800395E2356EBCA
:1051A000C9CD0A23000021B64D444DC3B6516069F4
:1051B00011260019444D606911E64EEBCDB524CAA5
:1051C000D151212500095E16007AB3CAD851C3AE66
:1051D0005121F9FF22030121FFFFC9C5210A00392E
:1051E0005E2356D5CD8749D1D1CAF65121FAFF2257
:1051F000030121FFFFC9210A00395E235621000265

```
:10520000CDF922CA1052C5211300E5CD7E49D1D176
:10521000C5210F00E5CD7E49D1D111FF00CD41233D
:10522000CA5352210A00395E2356210003CDF922C8
:10523000CA4652C5211600E5CD7E49D1D111FF00E5
:10524000CD4123CA505221FFFF22030121FFFFC994
:10525000C37352210A00395E2356210005CDF9227D
:10526000110005CD4123CA735221FBFF2203012106
:10527000FFFFC9210000EB212100097323722123C4
:10528000000973212400097360 69E5211000395E6B
:105290002356210600 19D1732372210A00395E2397
:1052A00056210300CDF92223EB21250009732102A9
:1052B00000CDF922CACD5221FE52E5211000395EFF
:1052C0002356210400 19D1732372C3E05221E45202
:1052D000E5211000395E2356210400 19D173237291
:1052E000210000C9CD0A230000210000E5210A00A9
:1052F000395E2356212500 19D173210000C9CD0A3A
:105300002300002108003 94E2346C5211000E5CD89
:105310007E49D1D1210000EB2125000973210000 35
:10532000C9CD0A230000210000C99E4DA454655632
:1053300042570000000000DC99030A856F030A8CC5
:1053400067C9030A6F030A67C9CDE575C3DF76CD68
:10535000B774C3DF76F376F376F376F376F376F30A
:1053600076F376F376F376F376F376F376F376F3F5
:1053700076F376F37619771977197719771977 19FC
:1053800077197719771977197719771977 1977199D
:10539000771977197747774777477747774777 4779
:1053A0007747774777477747774777477747 70D
:1053B000774777477 76D776D776D776D776D776D19
:1053C000776D776D776D776D776D776D776D776DBD
:1053D000776D776D7795779B77A177A777AD77B363
:1053E00077B977BF77C577CB77D177D777DD77E395
:1053F00077E977EF77F577FE7707781078197822D5
:10540000782B7834783D7846784F785878617 86A88
:1054100078737 87C7885788C7893789A78A178A856
:1054200078AF78B678BD78C478CB78D278D978E080
:1054300078E778EE0000CD0A230000210800395EED
:105440002356210000CD7B23C25B54210800395E26
:105450002356210B00CD7C23CA655421FDFF220376
:105460000121FFFFC9210800395E2356EB292929B4
:1054700011E20119444D210C00395E2356D5210C4F
:1054800000395E2356D5210600095E2356D5606992
:105490005E1600EB29112A53195E2356EBCD092322
:1054A000D1D1D1C9CD0A23FAFF210000444D210EEC
:1054B00000395E2356210800397323722108003910
:1054C0005E2356212400197EB7CA1B5521080039D6
:1054D0005E2356212400195E1600D5218000D1EBF1
:1054E000CD552444DEB211200397E23666FCD8695
:1054F00024CAFD54211200395E2356424BC52112A5
:1055000000395E2356D5210C00395E2356D5CDDEF9
:1055100055D1D1D1CA1B5521FFFFC9211200395ED7
:1055200023566069CD5524110700EBCDC224EB2131
:1055300006003 97323727AB3CA8655210600395E94
:105540002356D5211200395E2356606919E5210CD6
:1055500000395E2356D5CD2F5CD1D1D1EB2104008B
:10556000397323727AB3CA8655210600395E2356F1
:1055700021040 0397E23666FCD5524110700EBCD41
:105580004524505919C9210600395E2356210700C8
:10559000CD4524505919444D6069EB211200397EE4
:1055A00023666FCD8524CAD555211200395E235626
:1055B0006069CD5524E5211200395E2356606919D2
:1055C000E5210C00395E2356D5CDDE55D1D1D1CAA7
:1055D000D5556069C9211200395E2356EBC9CD0A41
:1055E0002300002108003 94E2346218000E5211ABE
:1055F00000E5CD7E49D1D1C5212100E5CD7E49D13F
:10560000D12203017CB5CA0D5621FFFFC9210C0030
:10561000395E2356D5212400095E16002180001929
:10562000E5210E00395E2356D5CDC55DD1D1D121FE
:105630002400095E1600210C00397E23666F1911C3
:105640007F00CDF922EB21240009737AB3C26156A1
:105650006069112100 19E57E23666F23EBE1732356
:105660007221000 0C9CD0A2300003A33536F26008F
:105670007CB5C2ED5621FF007D32325321000070D2
:105680003234537D32335321325 3E5210A00E5CDC4
:105690007E49D1D1210A00E5210200E5CD7E49D124
:1056A000D13A34536F2600111A00CD4123CABB569C
:1056B0002100007D32335321000 0C9210D00E53A5D
:1056C00033536F2600237D323353113253 1923D1C4
:1056D00073210A00E53A33536F2600237D3233539A
:1056E0001132531923D17321020022 34543A335317
:1056F0006F2600444DEB210C00397E23666FCD7C74
:1057000023CA0D57210C00395E2356424BC52A345B
:10571000541132531 9E5210E00395E2356D5CDC5FB
:105720005DD1D1D16069EB2A3454192234546069B7
:10573000EB3A33536F2600EBCD55247D3233536063
:1057400069C9CD0A23FEFF210C00394E23462100F2
:1057500000EB21040039732372C36B572104003915
:10576000E57E23666F23EBE173237221040 0395E2B
:105770002356210E00397E23666FCD7B23CAA157A5
:10578000210A00395E2356D5CD7E49D1E5606923D3
:10579000444D2BD173211A00CD4123C2A157C35CC4
:1057A00057210400395E2356EBC99E4D22582C5ACE
:1057B0002C5ACD0A230000210800395E235621000F
:1057C00000CD7B23C2D757210800395E2356210B19
:1057D00000CD7C23CAE15721FDFF22030121FFFFF9
:1057E000C9210800395E2356EB2929 2911E2011944
:1057F000444D210C00395E2356D5210C00395E231F
:1058000056D5210600095E2356D5210100095E16F2
:1058100000EB2911AA57195E2356EBCD0923D1D1EC
:10582000D1C9CD0A23FAFF210000444D210E0039D1
:105830005E2356210800397323722108003 95E2344
:1058400056212400197EB7CA9958210800395E23D1
:105850005621240019 5E1600D5218000D1EBCD55CC
:1058600024444DEB211200397E23666FCD8624CA45
:105870007B58211200395E2356424BC52112003954
:105880005E2356D5210C00395E2356D5CD5C59D107
:10589000D1D1CA995821FFFFC9211200395E235680
:1058A0006069CD5524110700EBCDC224EB21060021
:1058B000397323727AB3CA0459210600395E23561C
```

:1058C000D5211200395E2356606919E5210C003993
:1058D0005E2356D5CD375CD1D1D1EB210400397380
:1058E00023727AB3CA0459210600395E2356210473
:1058F00000397E23666FCD5524110700EBCD45247A
:10590000505919C9210600395E23562107008CD459B
:10591000245059194440D6069EB211200397E2366E9
:1059200006FCDB524CA5359211200395E23566069E0
:10593000CD5524E5211200395E23566069 19E52111
:105940000C00395E2356D5CD5C59D1D1D1CA5359FB
:1059500006069C9211200395E2356EBC9CD0A2300C4
:105960000021080039 4E2346210000E5211A00E578
:10597000CD7E49D1D1C5212100E5CD7E49D1D122AD
:10598000030111010 0CD4123C297592A03011104D8
:105990000CD4123CAB259210000220301211A007F
:1059A000E5210000E5210000E5CDE55DD1D1D1C3C1
:1059B000BE592A03017CB5CABE5921FFFFC9210C7B
:1059C00000395E2356D5210C00395E2356D521249B
:1059D000000095E1600218000 19E5CDC55DD1D1D149
:1059E000C5212200E5CD7E49D1D12203017CB5CA73
:1059F000F65921FFFFC9212400095E1600210C0081
:105A0000397E23666F19117F00CDF922EB21240026
:105A1000097 37AB3C2285A6069112100 19E57E23FF
:105A2000666F23EBE17323722 10000C9CD0A23FCCA
:105A3000FF210E00394E2346210000EB21040039DE
:105A400073 2372C3555A21040039E57E23666F2300
:105A5000EBE173237221040039 5E23562110003 9D3
:105A60007E23666FCD7B23CAB35A6069234 4 4D2BD6
:105A7000 5E160021060039732372 2106003 95E2369
:105A800056210A00CD4123CA9B5A210D00E5210E63
:105A900000395E2356D5CD7E49D1D1210600395E2D
:105AA0002356D5210E00395E2356D5CD7E49D1D15E
:105AB000C3465A210400395E2356EBC9CD0A2300A0
:105AC000002108 00395E2356210000CD7B23C2F857
:105AD0005A210800395E2356210B00CD7C23C2F8E1
:105AE0005A210800395E2356EB292929 11E50119AD
:105AF0005E16007AB3C2065B21FDFF220301CDCE04
:105B0000 5FFFFFFFFFC9210800395E2356EB2929FB
:105B10002911E801195E2356424B210E00395E23FC
:105B20056EBC3A75BC5211000E5CD7E49D1D1114D
:105B3000FF00CD4123CA465B21FDFF220301CDCEEC
:105B40005FFFFFFFFFC9C5212300E5CD7E49D1D10D
:105B5000210000EB2124000973210A0039E52121ED
:105B6000000 095E2356EBCD3763CDC05F0700000010
:105B7000CD0A61CDFB5F212400095E1600EBCD4507
:105B800063CD1360CD9160CD2760E1E5CDD55FCDCC
:105B90009160E1CDE85FC3BA5B21FAFF220301CD3A
:105BA000CE5FFFFFFFFFC9CD8024030002002 55B0D
:105BB000100595B0000965B995B210000EB2123FB
:105BC000000973210A0039CDD55FCDC05F00000008
:105BD0000CD0D63CAF55B210000EB2121000973A4
:105BE00023722124000973 21FAFF220301CDCE5F25
:105BF000FFFFFFFFC9210A0039CDD55FCD586311E2
:105C00007F00CDF922EB2124000973210A0039CD50
:105C1000D55FCDC05F07000000CD3861CD5863EB84
:105C20002121000973237221 0A0039CDD55FC9CD26
:105C3000EA240E21C33C5CCDEA240E22C52AF522BB
:105C4000EB2180001922F5220E1ACD0500C1C52ACC
:105C5000F322EBCD0500B7C2755C2AF3221121 00B7
:105C60001934C2675C23342AF7222B22F7227DB431
:105C7000C23D5CC1C96F2600220301C12AF722C9B7
:105C8000CD0A23DCFF21040039E5212E00395E23F3
:105C900056D5CDB749D1D1210400 39E5211300E50E
:105CA000CD7E49D1D1C9B77E8F7723C5AF32A65CEF
:105CB00032A75C32A85C21000022A95CCD143321FC
:105CC0000400394E23460AFE2DC2D25C32A65CC3C4
:105CD000D75CFE2BC2D85C030AFE30DA075DFE3AC1
:105CE000D2075DF5CD9938CDEE2FF1D6306F260075
:105CF000CD1433CD57303AA85CB7CAD75C2AA95C18
:105D00002B22A95CC3D75CFE2EC2145D21A85C3691
:105D10001C3D75C210000F620FE65C2615D030A65
:105D2000FE2DC22B5D32A75CC3305DFE2BC2315D00
:105D3000030AFE30DA4B5DFE3AD24B5D06302954 71
:105D40005D2929195F160019C3305D3AA75CB7CAEF
:105D5000595D7C2F677D2F6F23EB2AA95C1922A93F
:105D60005C2AA95C7CB7F2A75DFEFFC2C35D7D2FF4
:105D70003C4FFEA6D2C35DFE96DA8E5DCD3C2F472A
:105D80002386F26FC10000CD2C3179D6104FCDEEB5
:105D9000 2F210100CD1433CD99380DC2975DCDEE82
:105DA0002FCD2C31C3B75DC2C35D7DB7CAB75D4F80
:105DB000CD99380DC2B05D3AA65CB7CAC15DCDFDC4
:105DC0002FC1C9C1C9C52109003946 2B4E2B562BFD
:105DD0005E2B7E2B6E6778B1CAE35D1A7713230BB7
:105DE000C3D65DC1C9C5210400395E2356234E23A5
:105DF00046236EEB78B1CAFF5D73230BC3F45DC11C
:105E0000C921020039C501FF7F5E2356237E236628
:105E10006F78B1CA255E1ABEC22A5EB7CA255E2354
:105E2000130BC3115EC1210000C9C1DA345E210128
:105E300007DB4C921FFFF7DB4C921020039C5012D
:105E4000FF7F5E2356D5237E23666F78B1CA5C5EE2
:105E50007E12B7CA5C5E23130BC34B5EE1C1C9213E
:105E6000200397E23666F110000AFBECA745E1354
:105E700023C36B5EEB7DB4C921020039C55E235696
:105E8000D5235E2356234E2346EBD1C3115E210258
:105E900039C55E2356D5D5235E2356234E2346AF
:105EA000EBD1C34B5EC501FF7F210400395E235651
:105EB000D5237E23666FEB78B1CA5C5E7EB7CAC617
:105EC0005E230BC3B75EEBC34B5E21020039C55E98
:105ED0002356D5D5235E2356234E2346E1AFC3B7C1
:105EE0005EC5210400395E2356236EEB7EB7CAF9E6
:105EF0005EBBCAFF5E23C3EC5E210000AFC1C97C5C
:105F0000B5C1C9C5210400395E2356236EEB0100D8
:105F10000AFBECA185F2303C3125F78B1CAF95E2C
:105F2000B2B7EBBC21B5FC3FF5E210200397EFECE
:105F30020CA505FFE09CA505FFE0ACA505FC3659F
:105F4005F210200397EFE41DA655FFE5BD2655F4C
:105F5002101007DB7C9210200397EFE61DA655F4B
:105F6000FE7BDA505F210000AFC9210200397EFEBE
:105F70030DA655FFE3AD2655FC3505F2102003987

:105F80007EFE61DA8D5FFE7BD28D5FD6206F2600AC
:105F9000B7C9210200397EFE41DAA35FFE5BD2A3BE
:105FA0005FC6206F2600B7C98706042A739C3E008F
:105FB0009E772305C27C89C3D587EB79B7FA9C8984
:105FC000D121040019E5EBEB2A471AC3D95FD1218F
:105FD000040019E5EBEB2A451A1A7723131A7723E5
:105FE000131A7723131A77C9EB2A451A7E12132343
:105FF0007E1213237E1213237E12C9E122A85F2A88
:10600000451A11030019562B5E2BD5562B5ED52A47
:10601000A85FE9E122A85F2A471AD173237223D12E
:106020007323722AA85FE92A471AEB2A451A2247E6
:106030001AEB22451AC92A451AAF16043E009E776C
:106040002315C23C60C92A451A16047EB7C20763ED
:106050002315C24B60C3FC62AF3DC1C9AF3CC1C98F
:10606000C52A451AEB2A471A2323231313131AB7F9
:10607000FA7A60AEFA5C60C37E60AEFA58600604DD
:106080001ABEDA5860C25C602B1B05C28060AFC1CB
:10609000C9C52A451AEB2A471AAF06041A8E1223DD
:1060A0001305C29C60C1C9C52A451AEB2A471AAF1D
:1060B00006041A9E12231305C2B260C1C9C52A453F
:1060C0001AEB2A471A06041AA612231305C2C76040
:1060D000C1C9C52A451AEB2A471A06041AB6122363
:1060E0001305C2DC60C1C9C52A451AEB2A471A0646
:1060F000041AAE12231305C2F160C1C92A451A164B
:10610000047E2F772315C20161C92A471A7EE63F14
:10611000C8C5472A451A5E2356237E23666F29EB9E
:1061200029EBD226612305C21E61444D2A451A730C
:106130002372237123 70C1C92A471A7EE63FC857CC
:106140002A451A2323237EB7FA5D61E51E04B77E34
:106150001F772B1DC24F61E115C24B61C9E51E04BB
:10616000377E1F772B1DC26161E115C25D61C9D504
:1061700006047E12231305C27261E14FB7F0C339E2
:1061800060C52A451A11B45FCD6F617932B25F2ABA
:10619000471A11BC5FCD6F613AB25FA932B25FCDD1
:1061A000EE6111B45F2A451A06041A77132305C25B
:1061B000AA61C13AB25FB7FA3660C9C52A451A1159
:1061C000B45FCD6F617932B25F2A471A11BC5FCDDF
:1061D0006F61CDEE6111B85F2A451A06041A771374
:1061E0002305C2DD61C13AB25FB7FA3660C9060461
:1061F00021B85FAF772305C2F4613E2032B35F213F
:10620000B45F0608B77E8F772305C205629FE6015B
:106210004F060411B85F21BC5FB71A9E1213230505
:10622000C21A6279DE00C2356221B45F3421B35FE5
:1062300035C2FF61C921B35F35CA676221B45F0609
:1062400008B77E8F772305C242629F4F060411B8BC
:106250005F21BC5FB71A8E12132305C2556279CE37
:1062600000C23562C329620604 11B85F21BC5FB762
:106270001A8E12132305C27062C9C52A471A060472
:1062800011BC5F7E12231305C283622A451A0604DD
:1062900011B85F7E12231305C29362060421B45F16
:1062A000AF772305C2A1623E2032B35F21B45F06FF
:1062B00008B77E8F772305C2B262D2DD6206041171
:1062C000B45F21BC5FB71A8E12132305C2C66206E3
:1062D000041ACE0012D2DD621305C2D16221B35F6F
:1062E00035C2AC622A451A11B45F06041A7713232B
:1062F00005C2EC62C1C9CD6060CA0763210000AF6E
:10630000C9CD6060CAFC62210100AF3CC9CD6060AC
:10631000FA0763C3FC62CD6060FA0763CA0763C310
:10632000FC62CD6060FAFC62C30763CD6060FAFC7A
:1063300062CAFC62C30763EB2A451A7323722336D1
:1063400000233600C9EB2A451A732372237AB7F269
:106350003F6336FF2336FFC92A451A5E2356EBC931
:1063600035C2AC622A451A11B45F06041A771323AA
:1063700005C2EC62C1C9CD6060CA0763210000AFED
:0000000000

TABLE XXXVIII

Object Code of CTRUNZAP Program to Truncate Downloadable Object Code to Minimum Length

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSE OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

:10010000C35D370000000000000000000000000098
:10011000000000000000000000000000000000000DF

```
:1007C0000000000000000000000000000000000029
:1007D0000000000000000000000000000000000019
:1007E0000000000000000000000000000000000009
:1007F00000000000000000000000000000000000F9
:1008000000000000000000000000000000000000E8
:1008100000000000000000000000000000000000D8
:1008200000000000000000000000000000000000C8
:1008300000000000000000000000000000000000B8
:1008400000000000000000000000000000000000A8
:100850000000000000000000000000000000000098
:100860000000000000000000000000000000000088
:100870000000000000000000000000000000000078
:100880000000000000000000000000000000000068
:100890000000000000000000000000000000000058
:1008A0000000000000000000000000000000000048
:1008B0000000000000000000000000000000000038
:1008C0000000000000000000000000000000000028
:1008D0000000000000000000000000000000000018
:1008E0000000000000000000000000000000000008
:1008F00000000000000000000000000000000000F8
:1009000000000000000000000000000000000000E7
:1009100000000000000000000000000000000000D7
:1009200000000000000000000000000000000000C7
:1009300000000000000000000000000000000000B7
:1009400000000000000000000000000000000000A7
:100950000000000000000000000000000000000097
:100960000000000000000000000000000000000087
:100970000000000000000000000000000000000077
:100980000000000000000000000000000000000067
:100990000000000000000000000000000000000057
:1009A0000000000000000000000000000000000047
:1009B0000000000000000000000000000000000037
:1009C0000000000000000000000000000000000027
:1009D0000000000000000000000000000000000017
:1009E0000000000000000000000000000000000007
:1009F00000000000000000000000000000000000F7
:100A0000000000000000000000000000000000000E6
:100A1000000000000000000000000000000000000D6
:100A2000000000000000000000000000000000000C6
:100A3000000000000000000000000000000000000B6
:100A4000000000000000000000000000000000000A6
:100A500000000000000000000000000000000000096
:100A600000000000000000000000000000000000086
:100A700000000000000000000000000000000000076
:100A800000000000000000000000000000000000066
:100A900000000000000000000000000000000000056
:100AA00000000000000000000000000000000000046
:100AB00000000000000000000000000000000000036
:100AC00000000000000000000000000000000000026
:100AD00000000000000000000000000000000000016
:100AE00000000000000000000000000000000000006
:100AF000000000000000000000000000000000000F6
:100B0000000000000000000000000000000000000E5
:100B1000000000000000000000000000000000000D5
:100B2000000000000000000000000000000000000C5
:100B3000000000000000000000000000000000000B5
:100B4000000000000000000000000000000000000A5
:100B500000000000000000000000000000000000095
:100B600000000000000000000000000000000000085
:100B700000000000000000000000000000000000075
:100B800000000000000000000000000000000000065
:100B900000000000000000000000000000000000055
:100BA00000000000000000000000000000000000045
:100BB00000000000000000000000000000000000035
:100BC00000000000000000000000000000000000025
:100BD00000000000000000000000000000000000015
:100BE00000000000000000000000000000000000005
:100BF000000000000000000000000000000000000F5
:100C0000000000000000000000000000000000000E4
:100C1000000000000000000000000000000000000D4
:100C2000000000000000000000000000000000000C4
:100C3000000000000000000000000000000000000B4
:100C4000000000000000000000000000000000000A4
:100C500000000000000000000000000000000000094
:100C600000000000000000000000000000000000084
:100C700000000000000000000000000000000000074
:100C800000000000000000000000000000000000064
:100C900000000000000000000000000000000000054
:100CA00000000000000000000000000000000000044
:100CB00000000000000000000000000000000000034
:100CC00000000000000000000000000000000000024
:100CD00000000000000000000000000000000000014
:100CE00000000000000000000000000000000000004
:100CF000000000000000000000000000000000000F4
:100D0000000000000000000000000000000000000E3
:100D1000000000000000000000000000000000000D3
:100D2000000000000000000000000000000000000C3
:100D3000000000000000000000000000000000000B3
:100D4000000000000000000000000000000000000A3
:100D500000000000000000000000000000000000093
:100D600000000000000000000000000000000000083
:100D700000000000000000000000000000000000073
:100D800000000000000000000000000000000000063
:100D900000000000000000000000000000000000053
:100DA00000000000000000000000000000000000043
:100DB00000000000000000000000000000000000033
:100DC00000000000000000000000000000000000023
:100DD00000000000000000000000000000000000013
:100DE00000000000000000000000000000000000003
:100DF000000000000000000000000000000000000F3
:100E0000000000000000000000000000000000000E2
:100E1000000000000000000000000000000000000D2
:100E2000000000000000000000000000000000000C2
:100E3000000000000000000000000000000000000B2
:100E4000000000000000000000000000000000000A2
:100E500000000000000000000000000000000000092
:100E600000000000000000000000000000000000082
:100E700000000000000000000000000000000000072
```

```
:100E80000000000000000000000000000000000062
:100E90000000000000000000000000000000000052
:100EA0000000000000000000000000000000000042
:100EB0000000000000000000000000000000000032
:100EC0000000000000000000000000000000000022
:100ED0000000000000000000000000000000000012
:100EE0000000000000000000000000000000000002
:100EF00000000000000000000000000000000000F2
:100F000000000000000000000000000000000000E1
:100F100000000000000000000000000000000000D1
:100F200000000000000000000000000000000000C1
:100F300000000000000000000000000000000000B1
:100F400000000000000000000000000000000000A1
:100F50000000000000000000000000000000000091
:100F60000000000000000000000000000000000081
:100F70000000000000000000000000000000000071
:100F80000000000000000000000000000000000061
:100F90000000000000000000000000000000000051
:100FA0000000000000000000000000000000000041
:100FB0000000000000000000000000000000000031
:100FC0000000000000000000000000000000000021
:100FD0000000000000000000000000000000000011
:100FE0000000000000000000000000000000000001
:100FF00000000000000000000000000000000000F1
:1010000000000000000000000000000000000000E0
:1010100000000000000000000000000000000000D0
:1010200000000000000000000000000000000000C0
:1010300000000000000000000000000000000000B0
:1010400000000000000000000000000000000000A0
:10105000000000000000000000000000000000009O
:101060000000000000000000000000000000000080
:101070000000000000000000000000000000000070
:101080000000000000000000000000000000000060
:101090000000000000000000000000000000000050
:1010A0000000000000000000000000000000000040
:1010B0000000000000000000000000000000000030
:1010C0000000000000000000000000000000000020
:1010D0000000000000000000000000000000000010
:1010E0000000000000000000000000000000000000
:1010F00000000000000000000000000000000000F0
:1011000000000000000000000000000000000000DF
:1011100000000000000000000000000000000000CF
:1011200000000000000000000000000000000000BF
:1011300000000000000000000000000000000000AF
:10114000000000000000000000000000000000009F
:10115000000000000000000000000000000000008F
:10116000000000000000000000000000000000007F
:10117000000000000000000000000000000000006F
:10118000000000000000000000000000000000005F
:10119000000000000000000000000000000000004F
:1011A000000000000000000000000000000000003F
:1011B000000000000000000000000000000000002F
:1011C000000000000000000000000000000000001F
:1011D000000000000000000000000000000000000F
:1011E00000000000000000000000000000000000FF
:1011F00000000000000000000000000000000000EF
:1012000000000000000000000000000000000000DE
:1012100000000000000000000000000000000000CE
:1012200000000000000000000000000000000000BE
:1012300000000000000000000000000000000000AE
:10124000000000000000000000000000000000009E
:10125000000000000000000000000000000000008E
:10126000000000000000000000000000000000007E
:10127000000000000000000000000000000000006E
:10128000000000000000000000000000000000005E
:10129000000000000000000000000000000000004E
:1012A000000000000000000000000000000000003E
:1012B000000000000000000000000000000000002E
:1012C000000000000000000000000000000000001E
:1012D000000000000000000000000000000000000E
:1012E00000000000000000000000000000000000FE
:1012F00000000000000000000000000000000000EE
:1013000000000000000000000000000000000000DD
:1013100000000000000000000000000000000000CD
:1013200000000000000000000000000000000000BD
:1013300000000000000000000000000000000000AD
:10134000000000000000000000000000000000009D
:10135000000000000000000000000000000000008D
:10136000000000000000000000000000000000007D
:10137000000000000000000000000000000000006D
:10138000000000000000000000000000000000005D
:10139000000000000000000000000000000000004D
:1013A000000000000000000000000000000000003D
:1013B000000000000000000000000000000000002D
:1013C000000000000000000000000000000000001D
:1013D000000000000000000000000000000000000D
:1013E00000000000000000000000000000000000FD
:1013F00000000000000000000000000000000000ED
:1014000000000000000000000000000000000000DC
:1014100000000000000000000000000000000000CC
:1014200000000000000000000000000000000000BC
:1014300000000000000000000000000000000000AC
:10144000000000000000000000000000000000009C
:10145000000000000000000000000000000000008C
:10146000000000000000000000000000000000007C
:10147000000000000000000000000000000000006C
:10148000000000000000000000000000000000005C
:10149000000000000000000000000000000000004C
:1014A000000000000000000000000000000000003C
:1014B000000000000000000000000000000000002C
:1014C000000000000000000000000000000000001C
:1014D000000000000000000000000000000000000C
:1014E00000000000000000000000000000000000FC
:1014F00000000000000000000000000000000000EC
:1015000000000000000000000000000000000000DB
:1015100000000000000000000000000000000000CB
:1015200000000000000000000000000000000000BB
:1015300000000000000000000000000000000000AB
```

```
:1015400000000000000000000000000000000000009B
:1015500000000000000000000000000000000000008B
:1015600000000000000000000000000000000000007B
:1015700000000000000000000000000000000000006B
:1015800000000000000000000000000000000000005B
:1015900000000000000000000000000000000000004B
:1015A00000000000000000000000000000000000003B
:1015B00000000000000000000000000000000000002B
:1015C00000000000000000000000000000000000001B
:1015D00000000000000000000000000000000000000B
:1015E0000000000000000000000000000000000000FB
:1015F0000000000000000000000000000000000000EB
:101600000000000000000000000000000000000000DA
:101610000000000000000000000000000000000000CA
:101620000000000000000000000000000000000000BA
:101630000000000000000000000000000000000000AA
:1016400000000000000000000000000000000000009A
:1016500000000000000000000000000000000000008A
:1016600000000000000000000000000000000000007A
:1016700000000000000000000000000000000000006A
:1016800000000000000000000000000000000000005A
:1016900000000000000000000000000000000000004A
:1016A00000000000000000000000000000000000003A
:1016B00000000000000000000000000000000000002A
:1016C00000000000000000000000000000000000001A
:1016D00000000000000000000000000000000000000A
:1016E0000000000000000000000000000000000000FA
:1016F0000000000000000000000000000000000000EA
:101700000000000000000000000000000000000000D9
:101710000000000000000000000000000000000000C9
:101720000000000000000000000000000000000000B9
:101730000000000000000000000000000000000000A9
:10174000000000000000000000000000000000000099
:10175000000000000000000000000000000000000089
:10176000000000000000000000000000000000000079
:10177000000000000000000000000000000000000069
:10178000000000000000000000000000000000000059
:10179000000000000000000000000000000000000049
:1017A000000000000000000000000000000000000039
:1017B000000000000000000000000000000000000029
:1017C000000000000000000000000000000000000019
:1017D000000000000000000000000000000000000009
:1017E0000000000000000000000000000000000000F9
:1017F0000000000000000000000000000000000000E9
:101800000000000000000000000000000000000000D8
:101810000000000000000000000000000000000000C8
:101820000000000000000000000000000000000000B8
:101830000000000000000000000000000000000000A8
:10184000000000000000000000000000000000000098
:10185000000000000000000000000000000000000088
:10186000000000000000000000000000000000000078
:10187000000000000000000000000000000000000068
:10188000000000000000000000000000000000000058
:10189000000000000000000000000000000000000048
```

```
:1018A000000000000000000000000000000000000038
:1018B000000000000000000000000000000000000028
:1018C000000000000000000000000000000000000018
:1018D000000000000000000000000000000000000008
:1018E0000000000000000000000000000000000000F8
:1018F0000000000000000000000000000000000000E8
:101900000000000000000000000000000000000000D7
:101910000000000000000000000000000000000000C7
:101920000000000000000000000000000000000000B7
:101930000000000000000000000000000000000000A7
:10194000000000000000000000000000000000000097
:10195000000000000000000000000000000000000087
:10196000000000000000000000000000000000000077
:10197000000000000000000000000000000000000067
:10198000000000000000000000000000000000000057
:10199000000000000000000000000000000000000047
:1019A000000000000000000000000000000000000037
:1019B000000000000000000000000000000000000027
:1019C000000000000000000000000000000000000017
:1019D000000000000000000000000000000000000007
:1019E0000000000000000000000000000000000000F7
:1019F0000000000000000000000000000000000000E7
:101A00000000000000000000000000000000000000D6
:101A10000000000000000000000000000000000000C6
:101A20000000000000000000000000000000000000B6
:101A30000000000000000000000000000000000000A6
:101A4000000000000000000000000000000000000096
:101A5000000000000000000000000000000000000086
:101A6000000000000000000000000000000000000076
:101A7000000000000000000000000000000000000066
:101A8000000000000000000000000000000000000056
:101A9000000000000000000000000000000000000046
:101AA000000000000000000000000000000000000036
:101AB000000000000000000000000000000000000026
:101AC000000000000000000000000000000000000016
:101AD000000000000000000000000000000000000006
:101AE0000000000000000000000000000000000000F6
:101AF0000000000000000000000000000000000000E6
:101B00000000000000000000000000000000000000D5
:101B10000000000000000000000000000000000000C5
:101B20000000000000000000000000000000000000B5
:101B30000000000000000000000000000000000000A5
:101B4000000000000000000000000000000000000095
:101B5000000000000000000000000000000000000085
:101B6000000000000000000000000000000000000075
:101B7000000000000000000000000000000000000065
:101B8000000000000000000000000000000000000055
:101B9000000000000000000000000000000000000045
:101BA000000000000000000000000000000000000035
:101BB000000000000000000000000000000000000025
:101BC000000000000000000000000000000000000015
:101BD000000000000000000000000000000000000005
:101BE0000000000000000000000000000000000000F5
:101BF0000000000000000000000000000000000000E5
```

:101C000000000000000000000000000000000000D4
:101C100000000000000000000000000000000000C4
:101C200000000000000000000000000000000000B4
:101C300000000000000000000000000000000000A4
:101C40000000000000000000000000000000000094
:101C50000000000000000000000000000000000084
:101C60000000000000000000000000000000000074
:101C70000000000000000000000000000000000064
:101C80000000000000000000000000000000000054
:101C90000000000000000000000000000000000044
:101CA0000000000000000000000000000000000034
:101CB0000000000000000000000000000000000024
:101CC0000000000000000000000000000000000014
:101CD0000000000000000000000000000000000004
:101CE00000000000000000000000000000000000F4
:101CF00000000000000000000000000000000000E4
:101D000000000000000000000000000000000000D3
:101D100000000000000000000000000000000000C3
:101D200000000000000000000000000000000000B3
:101D300000000000000000000000000000000000A3
:101D40000000000000000000000000000000000093
:101D50000000000000000000000000000000000083
:101D60000000000000000000000000000000000073
:101D70000000000000000000000000000000000063
:101D80000000000000000000000000000000000053
:101D90000000000000000000000000000000000043
:101DA0000000000000000000000000000000000033
:101DB0000000000000000000000000000000000023
:101DC0000000000000000000000000000000000013
:101DD0000000000000000000000000000000000003
:101DE00000000000000000000000000000000000F3
:101DF00000000000000000000000000000000000E3
:101E000000000000000000000000000000000000D2
:101E100000000000000000000000000000000000C2
:101E200000000000000000000000000000000000B2
:101E300000000000000000000000000000000000A2
:101E40000000000000000000000000000000000092
:101E50000000000000000000000000000000000082
:101E60000000000000000000000000000000000072
:101E70000000000000000000000000000000000062
:101E80000000000000000000000000000000000052
:101E90000000000000000000000000000000000042
:101EA0000000000000000000000000000000000032
:101EB0000000000000000000000000000000000022
:101EC0000000000000000000000000000000000012
:101ED0000000000000000000000000000000000002
:101EE00000000000000000000000000000000000F2
:101EF00000000000000000000000000000000000E2
:101F000000000000000000000000000000000000D1
:101F100000000000000000000000000000000000C1
:101F200000000000000000000000000000000000B1
:101F300000000000000000000000000000000000A1
:101F40000000000000000000000000000000000091
:101F50000000000000000000000000000000000081
:101F60000000000000000000000000000000000071
:101F70000000000000000000000000000000000061
:101F80000000000000000000000000000000000051
:101F90000000000000000000000000000000000041
:101FA0000000000000000000000000000000000031
:101FB0000000000000000000000000000000000021
:101FC0000000000000000000000000000000000011
:101FD0000000000000000000000000000000000001
:101FE00000000000000000000000000000000000F1
:101FF00000000000000000000000000000000000E1
:1020000000000000000000000000000000000000D0
:1020100000000000000000000000000000000000C0
:1020200000000000000000000000000000000000B0
:1020300000000000000000000000000000000000A0
:10204000000000000000000000000000000000009O
:10205000000000000000000000000000000000008O
:10206000000000000000000000000000000000007O
:10207000000000000000000000000000000000006O
:10208000000000000000000000000000000000005O
:10209000000000000000000000000000000000004O
:1020A000000000000000000000000000000000003O
:1020B000000000000000000000000000000000002O
:1020C000000000000000000000000000000000001O
:1020D0000000000000000000000000000000000000
:1020E00000000000000000000000000000000000F0
:1020F00000000000000000000000000000000000E0
:102100000000000000000000000011ECFFCDBF4FF8
:1021100002100000EB210A00397323722100000EB211A
:102120000080039732372210000EB21060039732364
:102130000722100000EB210400397323722211C003945
:102140005E2356EB2B110300EBCD0354CA5221CD75
:10215000C526211E0039E57E23666F2323EBE1733C
:10216000237221F523E5212000395E2356EB5E23FF
:1021700056D5CD0F2FD1D12204017CB5C2B6212175
:1021800003336E521F723E5CD9A32D1D1210336E597
:1021900021200395E2356EB5E2356D5CD9A32D1ED
:1021A000D1210336E5210A00E5CDD932D1D1210173
:1021B00000E5CDA13AD1211E0039E57E23666F23CB
:1021C00023EBE17323722103 24E5212000395E23F0
:1021D00056EB5E2356D5CD0F2FD1D12206017CB50B
:1021E000C21A22210336E5210524E5CD9A32D1D148
:1021F000210336E5212000395E2356EB5E2356D5B8
:10220000CD9A32D1D1210336E5210A00E5CDD9326C
:10221000D1D1210100E5CDA13AD1211E0039E57EC1
:1022200023666F2323EBE17323722111124E5212020
:1022300000395E2356EB5E2356D5CD0F2FD1D12228
:1022400008017CB5C27E22210336E5211324E5CDA9
:102250009A32D1D1210336E5212000395E2356EB95
:102260005E2356D5CD9A32D1D1210336E5210A001D
:10227000E5CDD932D1D1210100E5CDA13AD1211E40
:1022800000039E57E23666F2323EBE1732372CD8251
:10229000247D3203017DB5CAA522212324E5CDBCCE
:1022A00024D1C3D423210C0039E521100039E5CD18
:1022B000325D1D1C27923214B24E521100039E532

:1022C000CDDF4DD1D1C2D9222210C00395E2356215B
:1022D0000A00397323372C34B23215224E5211000D5
:1022E00039E5CDDF4DD1D1C20023210C00395E2369
:1022F000562100601 9EB21080039732372C34B2368
:10230000215924E5211000039E5CDDF4DD1D1C22777
:1023100023210C00395E235621006019EB21060081
:1023200039732372C34B23216024E521100039E562
:10233000CDDF4DD1D1C24B23210C00395E23562174
:10234000006019EB2104003973237221 0A00397EE1
:1023500023B6CA7323210800397E23B6CA7323210A
:1023600008600397E23B6CA732321040 0397E23B6C2
:10237000C27923CD4828C3A522210A00397E23B67D
:10238000CAA123210800397E23B6CAA12321060051
:10239000397E23B6CAA123210400397E23B6C2B1F7
:1023A00023216724E5CDBC24D1210100E5CDA13A4C
:1023B000D1210A01E52A0601E5CD2327D1D1210A41
:1023C00000395E2356D5210A01E52A0801E5CD9C96
:1023D00027D1D1D12A0401E5CDA633D12A0601E5C2
:1023E000CDA633D12A0801E5CDA633D1210000E5E1
:1023F000CDA13AD1C9720043616E27742066696E1F
:102400006420007200436 16E27742066696E642048
:10241000007700436 16E277420777269746520748 9
:102420006F2000496E70757420666 96C6520697351
:1024300020656D707479206F7220696E2077726FDD
:102440006E6720666F726D61742E00454E44434F77
:10245000440043 4B4642595400434B5642595400A2
:102460005041524D454D00526571756972656420 49
:1024700073796D626F6C206E6F742066 6F756E6419
:102480002E0011FFFFCDBF4F2A0401E5CD5931D1F8
:10249000EB2104003973 1600D521FFFFD1CDC953BC
:1024A000CAA72421FFFFC92A0401E5210600395EDD
:1024B0001600D5CD9735D1D1210000C9110000CD2E
:1024C000BF4F210336E521EB24E5CD9A32D1D1214E
:1024D000336E5210125E5210C00395E2356D5CDD3
:1024E000334ED1D1E5CD9A32D1D1C90A2A2A2A2038
:1024F0004552524F5220444554454354454 4210AC5
:102500000000A0011FEFECDBF4F210000EB210400A8
:102510003973237221060039E521B426E52A040126
:10252000E5CD7128D1D1D1EB2104003973 2372D5C7
:102530002101 00D1CDC953CA6025210600395E169C
:102540000213B00CDC953CA60252A0401E52100C2
:102550001E5210A0039E5CDC930D1D1D1C3142517
:10256000210400395E235621FFFFCDD853CA8425AC
:102570002A0401E5210800395E1600D5CD9735D132
:10258000D1C38D25210400395E2356EBC9210000FB
:10259000EB21040039732372210C01395E2356D5D7
:1025A00021B826E52A0401E5CD7128D1D1D1E52154
:1025B0001 00D1CDD853CAC42521FFFFEB2104006F
:1025C000397323722104003 97E23B6CAD72521042A
:1025D00000395E2356EBC921060039E521BD26E509
:1025E0002A0401E5CD7128D1D1D1EB210400397342
:1025F0002372D5210100D1CDC953CA2326210600 5B
:102600000395E1600213B00CDC953CA23262A040196
:10261000E5210001E5210A0039E5CDC930D1D1D14C
:10262000C3D725210400395E235621FFFFCDD8539F
:10263000CA47262A0401E5210800395E1600D5CDD7
:1026400097 35D1D1C350262104 00395E2356EBC9FA
:10265000210000EB21040039732372210A01395E45
:102660002356D521C126E52A0401E5CD7128D1D113
:10267000D1E5210100D1CDD853CA8A2621FFFFEB35
:1026800021040039732372C3AB26210A01395E236A
:1026900056D5CD8F4ED1110A00EBCDE853CAAB26EB
:1026A00021FFFFEB21040039732372210400395EFE
:1026B0002356EBC9202563002025347800202563AC
:1026C0000020257300110000CDBF4F210336E52106
:1026D000EE26E5CD9A32D1D1210336E521F826E563
:1026E000CD9A32D1D1210100E5CDA13AD1C90A5507
:1026F00073616753A200A007A6170646368656B8C
:1027000020207379 6D66696C6520206 96E70757420
:102710006669 6C6520206F7574707574666 96C6588
:10272000200A0011FEFFCDBF4F210C00395E235659
:1027300021002019EB2104003973237 2210C003988
:102740005E2356424BC35027218000505919444DF7
:102750006069EB210400397E23666FCD6554CA9B06
:1027600027210A00395E2356D5210100E521800008A
:10277000E5C5CDD62FEB21080039F9CA9B27210AE0
:1027800000395E2356210600195E1600210800CD8F
:10279000A153C29B27CD4828C34827C911FEFFCDAE
:1027A000BF4F210C00395E2356210E00397E23666F
:1027B0006F1911800019EB21040039732372210C69
:1027C00000395E2356424BC3D22721800050 59194D
:1027D000444D6069EB210400397E23666FCD65545A
:1027E000CA2D28210A00395E2356D5210100E52192
:1027F0008000E5C5CD5830EB21080039F9C21028 1A
:102800000212E28E5CDBC24D1210100E5CDA13AD16E
:1028100 00210A00395E2356210600195E16002108A0
:1028200000CDA153C22D28CD4828C3CA27C9436F64
:10283000756C646E277420636F6D706C657465 20B1
:102840006F75747075742E00110000CDBF4F21FF9D
:1028500000E5210600E5CD734CD1D1110300CDC9AF
:1028600053CA6C28210100E5CDA13AD1C90000006E
:10287000000110000CDBF4F210800395E2356EB2226
:102880006F2821000022 6D28210C0039E5210C0061
:10289000395E2356D521A028E5CD3829D1D1D1C91B
:1028A000110000CDBF4F210800397E23B6C2DA28BF
:1028B0002A6F28110600195E1600210800CDA153C9
:1028C000CACC2821FFFF226D28C3D7282A6F28E50C
:1028D000CD5931D1226D28C3EA282A6F28E52A6D07
:1028E00028E5CD9735D1D1226D282A6D28C9000061
:1028F00000000000000000000000000000000000D8
:10290000004142434445464 16263646566393837 35
:1029100036353433323130000A0B0C0D0E0F0A0BF2
:102920000C0D0E0F09080706050403020100000044
:10293000000000000000000000117EFFCDBF4F218C81
:1029400000394E23462100 0022F828218A00395EF2
:102950002356EB22F028606923444D2B5E1600EBD2
:1029600022F6287CB5CAF82C2AF628112500CDC9F4
:10297000053CAB52C2100007D32FC287D32FD287D14

:1029800032FE28217F0022EE2860695E1600212A8F
:1029900000CDC953CAA329606923444D2101007D9C
:1029A00032FC2860695E160021164F19235E16005E
:1029B000210400CDA153CAF02921000022EE282ACB
:1029C000EE28110A00CD4A53E560695E1600E11950
:1029D00011D0FF1922EE28606923444D5E160021B4
:1029E000164F19235E1600210400CDA153C2BF2942
:1029F00060695E1600216C00CDC953CA0A2A210104
:102A0000007D32FD28606923444D606923444D2BCD
:102A10005E1600EBC37F2C21250022F628C3D22CA2
:102A20002100007D32FD28C3312A2101007D32FDC5
:102A300028210C0022F628210A0022FA28C3692A3C
:102A40002101007D32FD2821000022F628211000FE
:102A500022FA28C3692A2101007D32FD28210E00B7
:102A600022F62821080022FA28CD272DC2F82C2191
:102A7000F228E52AFA28E52AF62811182919E52A64
:102A8000F62811012919E5CD682DEB21080039F947
:102A9000CAF82C3AFC28B7C2F12A3AFD28B7CAC5B1
:102AA0002A218E0039E57E23666F2323EBE1732311
:102AB00072EB2B2B5E2356D521F228CD2250E1CD8F
:102AC0003450C3EA2A21F228CD2250CD4653E521C5
:102AD000900039E57E23666F2323EBE1732372EBCD
:102AE0002B2B5E2356EBD17323722AF8282322F86E
:102AF00028C3B22C2100007D32FD2860695E1600D8
:102B0000215E00CDC953C2172B60695E1600217E7D
:102B100000CDC953CA232B606923444D2101007D98
:102B200032FD282104003922FF28606923444D2BFF
:102B30005E1600EB22F628115D00CD8653CA512B4A
:102B40002AF628E52AFF282322FF282BD173C32A3F
:102B50002B210000E52AFF28D173C3802B21010017
:102B60007D32FD28212000EB21040039732109006A
:102B7000EB2105003973210A00EB2106003973218E
:102B80000000EB2107003973CD272DC2F82C3AFC49
:102B900028B7C2AF2B218E0039E57E23666F232331
:102BA000EBE1732372EB2B2B5E2356EB22FF2821E4
:102BB00000007D32FE282AEE282B22EE28237CB549
:102BC000CA3E2C210000E52AF028CD9D4FD122F6E7
:102BD0002811FFFFCDC953C23E2C3AFD28B7CAF8D1
:102BE0002B2AF628E521060039E5CD704ED1D1110A
:102BF0000000CD8653C30C2C2AF628E52106003955
:102C0000E5CD704ED1D1110000CDC9537CB5CA1F9E
:102C10002C210100E52AF028CD9D4FD1C33E2C3A4E
:102C2000FC28B7C2342C2AF628E52AFF282322FFE5
:102C3000282BD1732101007D32FE28C3B62B3AFE2A
:102C400028B7CAF82C3AFC28B7C25C2C210000E552
:102C50002AFF28D1732AF8282322F828C3B22C3A55
:102C6000FE28B7C26C2C21010022EE28210000EBC7
:102C70002104003973210100 7D32FD28C38E2BCD44
:102C800030540B002500172A44002A2A4F00562AE8
:102C90005800402A5B00F42A63005F2C6400312A4C
:102CA0006800202A6F005D2A73005D2B7800472A98
:102CB000B22CC3F52C2AF62811164F19235E1600E4
:102CC000211000CDA153CAD22CCD272DC2F82CC380
:102CD000F52C210000E52AF028CD9D4FD1EB2AF6F6
:102CE00028CD8653CAF52C210100E52AF028CD9D26
:102CF0004FD1C3F82CC356292AF8287CB5C2232DFE
:102D0000210000E52AF028CD9D4FD111FFFFCDC94C
:102D100053CA182D21FFFFC9210100E52AF028CD53
:102D20009D4FD12AF828C9110000CDBF4F210000C6
:102D3000E52AF028CD9D4FD111164F19235E1600BC
:102D4000211000CDA153CA4C2DC32D2D210100E52A
:102D50002AF028CD9D4FD111FFFFCDC953CA642D54
:102D600021FFFFC9210000C9110000CDBF4F2AEE8D
:102D700028110000EBCDE953CA7F2D210000C921A5
:102D80003229E5210000223629223029CD3753E1AE
:102D9000CD3450210000E52AF028CD9D4FD1222EC0
:102DA00029112D00CDC953CABA2D2101002236297F
:102DB0002A302923223029C3DB2D2A2E29112B006A
:102DC000CDC953CAD02D2A302923223029C3DB2D67
:102DD000210100E52AF028CD9D4FD1C3E52D2A30F1
:102DE00029232230292A3029EB2AEE28CD0354CA80
:102DF000AA2E210000E52AF028CD9D4FD1222E2980
:102E0000E5210A00395E2356D5CD704ED1D1444D0F
:102E10007CB5C2572E210C00395E2356211000CDFF
:102E2000C953CA492E213229CD2250CD8C50C249D6
:102E30002E2A2E29117800CDC953C2DE2D2A2E2923
:102E4000115800CDC953C2DE2D210100E52AF0281A
:102E5000CD9D4FD1C3AA2E213229E5210E00395E26
:102E60002356EBCD3753CD5F50E1E5CD2250CD82D7
:102E700052E1CD3450213229E56069EB210A003955
:102E80007E23666FCD2754EB210C00397E23666FBD
:102E9000195E1600EBCD3753CD5F50E1E5CD2250E2
:102EA000CD0450E1CD3450C3DE2D2A36297CB5CAAD
:102EB000CA2E210E00395E2356D5213229CD22504B
:102EC000CD7C50E1CD3450C3DC2E210E00395E2381
:102ED00056D5213229CD2250E1CD34502A3029C98E
:102EE0007200000000722B000200770000010377DF
:102EF0002B0002036100000109612B007209780028
:102F0000000105782B000205000000000000001100
:102F10000000CDBF4FCD6836444D7CB5C2232F2174
:102F20000000C9C5210C00395E2356D5210C00399B
:102F30005E2356D5CD3B2FD1D1D1C9110000CDBFD5
:102F40004F210C00395E2356D5CDA633D121E02E7A
:102F5000444DC35D2F606911050019444D78B1C21D
:102F60006C2F21FAFF223B37210000C9210A0039CA
:102F70005E2356D5C5CDDF4DD1D1CA802FC3552F85
:102F8000210300095E2356D5210A00395E2356D558
:102F9000CD063DD1D1220D2F11FFFFCDC953CAA5BA
:102FA0002F210000C92A0D2FE5210E00395E23567E
:102FB00021070019D173210100E5210E00395E239C
:102FC0005621060019D173210C00395E2356EBC936
:102FD000000000000000110000CDBF4F21080039A3
:102FE0004E2346210000 22D02FC3F32F2AD02F23B7
:102FF00022D02F2AD02FEB210C00397E23666FCDF3
:103000000354CA5030210A00395E2356EB22D42FD4
:10301000C31A302AD42F2B22D42F2AD42F7CB5CAFE
:103020004D30210E00395E2356D5CD8C31D122D290
:103030002F11FFFFCDC953CA3E302AD02FC92AD243

```
:103040002FE5606923444D2BD173C31330C3EC2F9C
:103050002AD02FC9000000000110000CDBF4F210869
:10306000000394E2346210A00395E2356210C0039CF
:103070007E23666FCD4A532256302100002254300l
:103080000C38A302A543023225430 2A5430EB2A5633
:1030900030CD6554CABE30210E00395E2356D5604E
:1030A0006923444D2B5E1600D5CD2233D1D111FFBB
:1030B000FFCDC953CABB30210000C9C38330210CE6
:1030C00000395E2356EBC90000110000CDBF4F212F
:1030D0000000800395E2356EB22C730210A0039E57E0D
:1030E00023666F2BEBE1732372210000CD0454CAD9
:1030F0002431210C00395E2356D5CD5931D1444DB0
:1031000011FFFFCDD853CA24316069E52AC73023A7
:1031100022C7302BD1736069110A00CDC953C22474
:1031200031C3DA30210000E52AC730D1736069115C
:10313000FFFFCDC953CA4E312AC730EB21080039F1
:103140007E23666FCDC953CA4E31210000C92108C4
:1031500000395E2356EBC90000110000CDBF4F219E
:103160000000800394E2346C5CD8C31D122573111FF5D
:10317000FFCDD853CAB631217F00EB2A5731CDA1FC
:1031800053225731C3A331210800E560691106008D
:1031900019D1E56E2600CD8153EBE17321FFFFC9D4
:1031A000C36631CD3054030000000A0310D00A031C2
:1031B0001A008731B6312A5731C90000110000CDFD
:1031C0008F4F210800394E23462102000095E2356D5
:1031D000D560695E2356E1CD5754CA81322106007D
:1031E000095E1600211800CDA153CAF13121FFFF5D
:1031F000C921FBFFE56069110600019D1E56E2600C3
:10320000CDA153EBE1736069110400197E23B6C2AE
:103210001732C5CD8136D1210900095E2356D5211B
:1032200000400095E2356D5210700095E1600D5CD9E
:10323000C341D1D1D122BA31110000EBCDE953CA3B
:1032400069322ABA317CB5C250322108000C35332E8
:10325000211000E56069110600019D1E56E2600CD48
:103260008153EBE17321FFFFC9210400095E23562E
:103270006069732372 2ABA3119EB21020009732 3A2
:10328000726069E57E23666F23EBE1732372EB2B9B
:103290005E160021FF00CDA153C9110000CDBF4F24
:1032A000210800394E234660697EB7CAD532210A0B
:1032B00000395E2356D560692344 4D2B5E1600D538
:1032C000CDD932D1D111FFFFCDC953CAD23221FF9E
:1032D000FFC9C3A732210000C9110000CDBF4F2193
:1032E0000000800394E23466069110A00CDC953CA0F40
:1032F00033210A00395E2356D5210D00E5CD223356
:10330000D1D111FFFFCDC953CA0F3321FFFFC9210E
:103310000A00395E2356D5C5CD2233D1D1C900006C
:103320000000110000CDBF4F210A00394E23462175
:1033300000200095E2356D560695E2356E1CD5754DD
:10334000CA5833210800395E235621FF00CDA1530E
:10335000E5C5CD2034D1D1C9210800395E2356D529
:103360006069E57E23666F23EBE1732372EB2BD15B
:103370007316002 1FF00CDA153C9110000CDBF4F2E
:1033800021ED35444D6069116636EBCD6554CAA513
:1033900033606911080019444D11F5FF19E5CDA6F5
```

```
:1033A00033D1C38533C9110000CDBF4F2108003987
:1033B0004E234621000022 1E3360691106000197E4B
:1033C000B7CA1334210600095E1600210400CDA1FE
:1033D00053CAE13321FFFFE5C5CD2034D1D1221EF0
:1033E0003321070095E1600D5CD8 33ED1EB2A1E9E
:1033F00033CD8153221E33210600095E160021028F
:1034000000CDA153CA1334210400095E2356D5CD43
:103410008F48D1210000EB21060009732A1E33C9DE
:1034200011 0000CDBF4F210800394E2346217A33C9
:103430002292382 10600095E1600211000CDA1530A
:10344000CA473421FFFFC9210600095E1600210486
:1034500000CDA153CAB834210400095E2356D560BB
:10346000695E2356E1CD27542220332A2033E521FB
:103470000400095E2356D5210700095E1600D5CD4C
:10348000CC44D1D1D1EB2A2033CDD853CAB8342182
:1034900001000E56069110600 19D1E56E2600CD8176
:1034A00053EBE173210000EB6069732372210200 8A
:1034B0000097323 7221FFFFC9210A00395E235621B7
:1034C000FFFFCDC953CAF13421FBFFE56069110646
:1034D000019D1E56E2600CDA153EBE1732100068
:1034E000EB60697323722102000973237221 0000CB
:1034F000C96069110400197E23B6C20235C5CD8179
:1035000036D1210900095E2356210100CDC953CAD5
:103510003B352101 00E5210C0039E5210700095E5A
:103520001600D5CDCC44D1D1D1110100CDD853C294
:103530008F34210A00395E2356EBC9210400095E4D
:103540002356606973237221 0900095E2356D52131
:103550000400095E2356E119EB210200097323726E
:10356000210400E56069110600 19D1E56E2600CD41
:103570008153EBE173210A00395E2356D56069E54A
:103580007E23666F23EBE1732372EB2BD17316005E
:1035900021FF00CDA153C9110000CDBF4F210A006A
:1035A000394E234621 0800395E235621FFFFCDC93D
:1035B00053C2C835210400095E2356D560695E23D5
:1035C00056E1CD5854CACC3521FFFFC92108003936
:1035D0005E2356D56069E57E23666F2BEBE173238E
:1035E00072EBD1732108 00395E2356EBC90000004D
:1035F0000000000100000100000000000000000101C7
:1036000000100000000000000000102000100000085
:10361000000000000000000000000000000000000AA
:10362000000000000000000000000000000000009A
:10363000000000000000000000000000000000008A
:10364000000000000000000000000000000000007A
:10365000000000000000000000000000000000006A
:103660000000000000000000110000CDBF4F21ED60
:1036700035444D606911060 0197EB7CA97366069F6
:10368000110B0019444D116636EBCD5754CA9436D0
:10369000210000C9C37336210000EB6069732372F7
:1036A00021020009732372210400097323726069E7
:1036B000C9110000CDBF4F210800394E2346210714
:1036C0000095E1600D5CDD048D1CAE736210100DC
:1036D000EB21090009732372606911080019EB21BD
:1036E00004000973 2372C9210004E5CD1A4AD122CE
:1036F00066367CB5CACD36210004EB210900097 37A
```

```
:103700002372210200E56069110600019D1E56E26D9
:1037100000CDB153EBE1732A6636EB210400097347
:103720002372C91922B7A5606922B9A560695E0034
:10373000000000000000725400000000003F3F45
:103740003F3F3F3F3F3F3F3F3F00000000691123A5
:103750000019D1E57E23666F19EBE173232A060079
:10376000F91100F819223937CD98380E11113D376B
:10377000CD0500010000CD0500C36B37020001003C
:103780000D3B0200000201000D3B0200000201009F
:103790000D3B020000000000FD3A000000000000A8
:1037A000FD3A000000000000FD3A000000000000AB
:1037B000FD3A000000000000FD3A0000000000009B
:1037C000FD3A000000000000FD3A0000000000008B
:1037D000FD3A0000000000000000000000000000B2
:1037E00000000000000000000000000000000000D9
:1037F00000000000000000000000000000000000C9
:1038000000000000000000000000000000000000B8
:1038100000000000000000000000000000000000A8
:10382000000000000000000000000000000000009B
:10383000000000000000000000000000000000008B
:10384000000000000000000000000000000000007B
:10385000000000000000000000000000000000006B
:10386000000000000000000000000000000000005B
:10387000000000000000000000000000000000004B
:10388000000000000000000000000000000000003B
:1038900000000D3B00000000110000CDBF4F217F54
:1038A00000E5211038E5218100E5CDC44ED1D1D10C
:1038B000210000E53A80006F2600117F00CDA15362
:1038C00011103819D173217C3A22D4372110384491
:1038D0004D2101002290382A9038111E00EBCD03B3
:1038E00054CA663A60695E1600212000CDC953C2F1
:1038F0000039 60695E1600210900CDC953CA083934
:10390000606923444DC3E43860697EB7CA663A6093
:10391000695E1600213E00CDC953CA263921010037
:103920002296 38C33A3960695E1600213C00CDC941
:1039300053CA173A2100002296386069 23444D5E2D
:103940001600212000CDC953C2593960695E1600A6
:10395000210900CDC953CA5C39C33A396069229440
:10396000386069 23444D7EB7CA993960695E160094
:10397000212000CDC953C2873960695E1600210934
:1039800000CDC953CA963921 0000E560692344 4D32
:103990002BD173C39939C361392A9638E5CD833E5B
:1039A000D12A96387CB5CABC3921B601E52A9438AB
:1039B000E5CDE53CD1D1229638C3CC39210000E5D4
:1039C0002A9438E5CD063DD1D12296382A96381171
:1039D000FFFFCDC953CA143A217D3AE5218000E5A5
:1039E000CD174ED1D12A9438E5218000E5CD334E54
:1039F000D1D1219F3AE5218000E5CD334ED1D121AF
:103A00008000E5210900E5CD734CD1D1210A00E504
:103A1000CDA13AD1C3633A6069E52A903823229058
:103A2000382B2911D43719D17323726069 23444D7F
:103A30007EB7CA633A60695E1600212000CDC95383
:103A4000C2513A60695E1600210900CDC953CA60AF
:103A50003A210000E5606923444D2BD173C3633ADA
:103A6000C32B3AC3D73821D437E52A9038E5CD0A9D
:103A700021D1D1210000E5CDA13AD1C90043616E29
:103A80002774206F70656E2066696C6520666F72A2
:103A9000207265646972656374696F6E3A200024F0
:103AA00000110000CDBF4F2A9238CD9D4F2100005C
:103AB000444D6069110B00EBCD0354CACC3A6069E8
:103AC00023444D2BE5CD833ED1C3B23A21080039C2
:103AD0007E23B6CAEF3A211800E5CD734CD111010F
:103AE00000CDA153CAEF3A21F33AE5CD5249D1CDE9
:103AF0006B37C9413A2424242E535542001100004B
:103B0000CDBF4F21FDFF223B3721FFFFC911000030
:103B1000CDBF4F210000C9020201000D3B00030090
:103B2000000D3B030000000D3B010100010A3FB303
:103B30003C173B0200B83C173B0200BD3C1D3B0557
:103B400000C23C1D3B0500C73C1D3B0500CC3C1D95
:103B50003B0500D13C1D3B0400D63C1D3B0400DB73
:103B60003C233B0300E03C233B03000000293B00D7
:103B70000000000000000000000000000000000045
:103B80000000000000000000000000000000000035
:103B90000000000000000000000000000000000025
:103BA0000000000000000000000000000000000015
:103BB0000000000000000000000000000000000005
:103BC00000000000000000000000000000000000F5
:103BD00000000000000000000000000000000000E5
:103BE00000000000000000000000000000000000D5
:103BF00000000000000000000000000000000000C5
:103C000000000000000000000000000000000000B4
:103C100000000000000000000000000000000000A4
:103C20000000000000000000000000000000000094
:103C30000000000000000000000000000000000084
:103C40000000000000000000000000000000000074
:103C50000000000000000000000000000000000064
:103C60000000000000000000000000000000000054
:103C70000000000000000000000000000000000044
:103C80000000000000000000000000000000000034
:103C90000000000000000000000000000000000024
:103CA0000000000000000000000000000000000014
:103CB000000000636F6E3A00434F4E3A006C73741D
:103CC0003A004C53543A0070726E3A0050524E3AD9
:103CD0000070756E3A0050554E3A007264723A00A8
:103CE0005244523A00110000CDBF4F210A00395E04
:103CF0002356D5210103E5210C00395E2356D5CD8D
:103D0000063DD1D1D1C9110000CDBF4F217C372252
:103D1000713B2100002275 3BC32C3D2A713B1108E9
:103D200000192271 3B2A753B2322753B2A753B11F2
:103D30000B00EBCD0354CA4F3D2A713B110400190F
:103D40005E235621FD3ACDC953C2593DC31B3D21C7
:103D5000F8FF223B3721FFFFC9212F3B444DC369A8
:103D60003D606911060019444D60697E23B6CA8A18
:103D70003D210800395E2356D560695E2356D5CDB6
:103D8000DF4DD1D1CA8A3DC3613D210200095E23C6
:103D900056EB22733B210A00395E2356210300CDE6
:103DA000A1532322773B2A773B110100CDA153CAAF
:103DB000CB3D2A733B5ED52A713BD1737BB3C2CB1B
```

:103DC0003D21F6FF223B3721FFFFC92A773B110235
:103DD00000CDA153CAF23D2A733B235ED52A713B25
:103DE00023D1737BB3C2F23D21F6FF223B3721FF83
:103DF000FFC9210400095E2356D52A713B11060034
:103E000019D17323722A733B23235ED52A713B2376
:103E100023D1732A733B2323235ED52A713B2323AB
:103E200023D173210D3BE52A713B11040019D17395
:103E30002372C52A713BE5211000395E2356D52136
:103E40001000395E2356D5211000395E2356D52A3D
:103E5000733B110400195E2356EBCD9D4FEB210AF5
:103E60000039F9210000CD0354CA7F3E21FD3AE517
:103E70002A713B11040019D173237221FFFFC92A53
:103E8000753BC9110000CDBF4F210800395E235694
:103E9000210000CD0354C2A93E210800395E2356FB
:103EA000210B00CD0454CAB33E21FDFF223B372134
:103EB000FFFFC9210800395E2356EB292929117C0F
:103EC0003719444D210600095E2356D5210400090 7
:103ED0005E2356EBCD9D4FD1EB21080039732372 41
:103EE000210000EB2103000973210200097321 0165
:103EF00000009736069 7321FD3AEB21040009732303
:103F00007221080039 5E2356EBC9110000CDBF4F66
:103F10002179 3B444DC3203F60691127001944 4D6E
:103F2000606911B13CEBCD6554CA3A3F6069112517
:103F300000197EB7CA443FC3183F21F9FF223B371F
:103F400021FFFFC9C5210A00395E2356D5CD874C14
:103F5000D1D122B13C11FFFFCDC953CA683F21FA2C
:103F6000FF223B3721FFFFC92AB13C11FF00CDC919
:103F700053CA7A3FCDAB4D22B13C2AB13CE5CDBA14
:103F80004DD1210A00395E2356210002CDA153CA2A
:103F90009C3FC5211300E5CD734CD1D1C5210F0045
:103FA000E5CD734CD1D111FF00CDC953CAE23F21F9
:103FB0000A00395E2356210003CDA153CAD23FC562
:103FC000211600E5CD734CD1D111FF00CDC953CAE4
:103FD000DF3F21FFFF223B37CDD34D21FFFFC9C378
:103FE000540210A00395E2356210005CDA1531159
:103FF0000005CDC953CA054021FBFF223B37CDD375
:104000004D21FFFFC9210000EB212100097323721C
:104010002123000973212400097 32AB13CEB2126D6
:104020000009736069E5211000395E2356210600FE
:1040300019D17323722 10A00395E2356210300CD62
:10404000A15323EB212500097321 7840E5211000BD
:1040500000395E2356210400 19D17323722 10A0039D5
:104060005E2356210008CDA153CA7140C5CD7D47BE
:10407000D1CDD34D210000C9110000CDBF4F210883
:1040800000394E2346CD3748212600095E1600D55B
:10409000CDBA4DD1C5211000E5CD734CD1D1CDD3D2
:1040A0004D210000EB21250009732 10000C9FD3AD4
:1040B000008429F4364440000000000000A00000022
:1040C00000000000000000000000000000000000F0
:1040D00000000000000000000000000000000000E0
:1040E00000000000000000000000000000000000D0
:1040F00000000000000000000000000000000000C0
:1041000000000000000000000000000000000000AF
:10411000000000000000000000000000000000009F
:10412000000000000000000000000000000000008F
:10413000000000000000000000000000000000007F
:10414000000000000000000000000000000000006F
:10415000000000000000000000000000000000005F
:10416000000000000000000000000000000000004F
:10417000000000000000000000000000000000003F
:10418000000000000000000000000000000000002F
:10419000000000000000000000000000000000001F
:1041A000000000000000000000000000000000000F
:1041B00000000000000000000000000000000000FF
:1041C000000000000110000CDBF4F210800395E2356CA
:1041D000EB292929117C3719444D210C00395E2324
:1041E00056D5210C00395E2356D5210600095E23E1
:1041F00056D560695E1600EB2911AE40195E235654
:10420000EBCD9D4FD1D1D1C9110000CDBF4F2100C1
:104210000000444D210800395E2356EB22B6408AB6F1
:1042200040112600195E1600D5CDBA4DD12AB640F0
:10423000011240019 7EB7CA83422AB64011240019FE
:10424000 05E1600D5218000D1EBCD2754444DEB21E3
:1042500000C00397E23666FCD6654CA6642210C007D
:10426000 0395E2356424BC5210C00395E2356D52AB0
:104270000B640E5CD2E43D1D1D1CA8342CDD34D2115
:10428000000000C9210C00395E23566069CD27541106
:10429000000700EBCD8C5322B8407CB5CAD7422AB870
:1042A00040E5210C00395E23566069 19E52AB640C5
:1042B000E5CDF748D1D1D122BA407CB5CAD742CD9D
:1042C000D34D2AB840EB2ABA40CD2754110700EB52
:1042D000CD7C535059 19C92AB840110700EBCD7C49
:1042E0005350591 9444D6069EB210C00397E236607
:1042F0006FCD6554CA2243210C00395E2356606994
:10430000CD2754E5210C00395E2356606919E52A52
:10431000B640E5CD2E43D1D1D1CA2243CDD34D6095
:1043200069C9CDD34D210C00395E2356EBC911006C
:1043300000CDBF4F210800394E2346C5CD4448D19A
:10434000CA474321FFFFC9210C00395E2356D521FE
:104350000C00395E2356D5212400095E1600218009
:104360000019E5CDC44ED1D1D1212400095E16003B
:104370002 10C00397E23666F19117F00CDA153EB0C
:104380002124000973 7BB3C29B436069112100198A
:10439000E57E23666F23EBE17323722 10000C911D0
:1043A0000000CDBF4F3ABE40B7C20F4421FF007D91
:1043B00032BD402100007D32BF407D32BE4021BD74
:1043C00040E5210A00E5CD734CD1D1210A00E52159
:1043D0000200E5CD734CD1D13ABF406F260011 1ACF
:1043E00000CDC953CAF2432100007D32BE402100F6
:1043F00000C93ABC406FE53ABE406F237D32BE40F3
:104400002600 11BD401923D17321020022BF413A79
:10441000BE406F2600444DEB210C00397E23666FB1
:10442000CD0454CA2F44210C00395E2356424BC59B
:10443000 0210C00395E2356D52ABF4111BD4019E534
:10444000CDC44ED1D1D16069EB2ABF411922BF4101
:1044500006069EB3ABE406F2600EBCD27547D32BE3B
:1044600040 6069C9110000CDBF4F210A00394E23B9
:10447000 04621000022C141C381442AC1412322C1F7

:10448000412AC141EB210C00397E23666FCD0354D4
:10449000CAB644210800395E2356D5CD734CD1E508
:1044A000606923444D2BD1731600211A00CDC953E6
:1044B000C2B644C37A442AC141C9FD3A13453347C1
:1044C0003347000000000000000000000110000CD94
:1044D000BF4F210800395E2356EB292929117C376B
:1044E00019444D210C00395E2356D5210C00395E4C
:1044F0002356D5210600095E2356D5210100095E09
:104500001600EB2911BA44195E2356EBCD9D4FD10D
:10451000D1D1C9110000CDBF4F210000444D210869
:1045200000395E2356EB22C2442AC24411260019E8
:104530005E1600D5CDBA4DD12AC244112400197E91
:10454000B7CA8E452AC244112400195E1600D5212F
:104550008000D1EBCD2754444DEB210C00397E2354
:10456000666FCD6654CA7145210C00395E235642F0
:104570004BC5210C00395E2356D52AC244E5CD46F1
:1045800046D1D1D1CA8E45CDD34D21FFFFC9210CD3
:1045900000395E23566069CD2754110700EBCD8C9E
:1045A0005322C4447CB5CAEF452AC444E5210C001B
:1045B000395E2356606919E52AC244E5CDFF48D12A
:1045C000D1D122C6447CB5CAEF45CDD34D2AC444CF
:1045D000EB2AC644CD2754110700EBCD7C5350592C
:1045E00019444D7CB5C2EC4521FFFFC96069C92A59
:1045F000C444110700EBCD7C53505919444D6069F8
:10460000EB210C00397E23666FCD6554CA3A4621F2
:104610000C00395E23566069CD2754E5210C003922
:104620005E2356606919E52AC244E5CD4646D1D1DC
:10463000D1CA3A46CDD34D6069C9CDD34D210C00C6
:10464000395E2356EBC9110000CDBF4F2108003958
:104650004E2346C5CD4448D1110000EBCD0354CACA
:10466000664621FFFFC9210C00395E2356D521245F
:1046700000095E160021800019E5210E00395E2335
:1046800056D5CDC44ED1D1D1C5212200E5CD734C34
:10469000D1D1223B377CB5CA9E4621FFFFC92124D8
:1046A00000095E1600210C00397E23666F19117F08
:1046B00000CDA153EB21240009737BB3C2D0466027
:1046C0006911210019E57E23666F23EBE1732372E4
:1046D000210000C9110000CDBF4F210A00394E232F
:1046E00046210C00395E2356EB22C8442AC8442BCD
:1046F00022C844237CB5CA2A4760695E1600210A95
:1047000000CDC953CA1447210D00E5210200E5CDB3
:10471000734CD1D1606923444D2B5E1600D5210224
:1047200000E5CD734CD1D1C3EC46210C00395E239A
:1047300056EBC9110000CDBF4F210A00394E234668
:10474000210C00395E2356EB22CA442ACA442B228C
:10475000CA44237CB5CA7247606923444D2B5E1658
:1047600000D5210A00395E2356D5CD734CD1D1C373
:104770004B47210C00395E2356EBC90000110000A5
:10478000CDBF4F210800394E2346C5212300E5CD7A
:10479000734CD1D16069112100197E23B6C2AD4797
:1047A000210000EB2124000973210000C960691178
:1047B000210019E57E23666F2BEBE1732372C5CDD3
:1047C0004448D1CACA4721FFFFC9210001227B47C3
:1047D0002A7B47118000EBCD6654CAFD472A7B47F0
:1047E0002B227B475E1600211A00CDD853CAFA4708
:1047F0002A7B4723227B47C3FD47C3D0472A7B47F9
:104800001180FF19EB21240009731600218000CDCF
:10481000C953CA2F48606911210019E57E23666FCC
:1048200023EBE1732372210000EB2124000973 21A3
:104830000000C900000000110000CDBF4F210000A2
:104840002233 48C9110000CDBF4F210800394E2343
:104850004621800 0E5211A00E5CD734CD1D12A33E1
:10486000485059CDD853C2794821210 0095E2356BA
:104870002A3548CDD853CAD948C5212100E5CD7382
:104880004CD1D1223B37110100CDC953C29B482ADC
:104890003B37110400CDC953CABD48210000223B5B
:1048A00037211A00E5218000E5218000E5CDA84EE2
:1048B000D1D1D1210000223348210100C92A3B3740
:1048C0007CB5CAC94821FFFFC960692233482121 4C
:1048D00000095E2356EB223548210000C911000073
:1048E000CDBF4F210800395E2356EB292929117EBF
:1048F00037195E1600EBC9CDDD4F0E21C30449CD3B
:10490000DD4F0E22C52A994FEB2180001922994FC5
:104910000E1ACD0500C1C52A974FEBCD0500B7C2D1
:104920003D492A974F1121001934C22F4923342AB7
:104930009B4F2B229B4F7DB4C20549C1C9FE01CAC2
:104940004D49FE04CA4D496F2600223B37C12A9BC0
:104950004FC911D8FFCDBF4F21040039E5213200E6
:10496000395E2356D5CD874CD1D1444DC5CDBA4DF6
:10497000D121040039E5211300E5CD734CD1D14498
:104980004DCDD34D606911FF00CDC953CA9949215E
:10499000FFFF223B3721FFFFC9210000C9000000B3
:1049A00000000000000000000000000000110000F6
:1049B000CDBF4F210800394E234621FCFF095E235D
:1049C00056EB2B292922A549C5CDBF4BD1210A0081
:1049D000395E2356D5CD1A4AD122A3497CB5CA16D1
:1049E0004A2AA3495059CDD853CA164A210A003938
:1049F0005E23562AA549CD6654CA024A2AA549C350
:104A00000A4A210A00395E2356EBE52AA349E5C587
:104A1000CDC44ED1D1D12AA349C9110000CDBF4F79
:104A2000210800395E2356EB232323110200EBCD2E
:104A30008C532322A9492AA14922A7497CB5C24DFA
:104A40004A219D4922A749229F4922A1492AA749D3
:104A500023235E2356424BC3684A606922A749213B
:104A60000200095E2356424B210200095E2356D5FF
:104A70006069D1CDD853CAE74A210200095E2356A6
:104A8000D560695E2356EB2929505919D1CDC953F8
:104A9000CAE74A210200095E2356D52AA149D1CD91
:104AA000C953CAB64A210200095E2356EB23235E8E
:104AB0002356EB22A149210200095E2356EB5E2317
:104AC00056D56069D1E57E23666F19EBE1732372D9
:104AD000210200095E2356EB23235E2356210200A8
:104AE00009732372C3684A60695E23562AA949CDB7
:104AF0005754CA744B60695E23562AA949CDC953DD
:104B0000CA174B210200095E2356D52AA749232341
:104B1000D1732372C35C4B2AA949292950591922 00
:104B2000A1492AA149E52AA7492323D17323722148
:104B30000200095E2356D52AA1492323D17323728B

:104B400060695E23562AA949CD2754E52AA149D197
:104B50007323722AA949EB60697323722AA7492239
:104B6000A149210000EB210200097323726069114 1
:104B7000040019C96069EB2AA149CDC953CABB4BCE
:104B8000210004E5CD704DD1444D11FFFFCDC95337
:104B9000CA974B210000C9210001EB6069732372A1
:104BA000210000EB2102000973237260691104 00E7
:104BB00019E5CDBF4BD12AA149444DC35A4AC91169
:104BC0000000CDBF4F210800395E235621FCFF199C
:104BD00022AB492AAB4923237E23B6CAE24B21FFED
:104BE000FFC92AA149444DC3F34B210200095E23AA
:104BF00056424B6069EB2AAB49CD6654C2124C2138
:104C0000200095E2356D52AAB49D1EBCD6654CAC2
:104C1000464C210200095E2356D56069D1EBCD5781
:104C200054CA434C2AAB495059EBCD6654C2464C4A
:104C3000210200095E2356D52AAB49D1EBCD65543C
:104C4000C2464CC3EA4B210200095E2356D52AAB6B
:104C5000492323D17323722AAB49EB210200097344
:104C600023726069 22A149210000C9CDDD4FCD76B4
:104C70004CEBC9CDDD4F2A974F444D2A994FEBCDD0
:104C80000500EB6FAF67C9C5210400394E234623E9
:104C90005E23566B623600233E0B3620233DC29ABC
:104CA0004C3E043600233DC2A34CEB79B0CA4B4DB9
:104CB000AFE20CABB4CFE09C2BF4C03C3B04CC5A0
:104CC00016000ACD644DDAD84CD6305F7A878787D4
:104CD0008282835703C3C24CFE2FC2E24C03F1C34E
:104CE000E54CC116FF030AFE3A0B3E00C2104D0A06
:104CF000E67FFE41DA4B4DFE5BD2014DD640C30D3F
:104D00004DFE61DA4B4DFE7BD24B4DD660770303EF
:104D1000231E081C0A03FE2ECA2B4DB7CA444D1D84
:104D2000CA134DCD524D7723C3144D1D7B856F7C27
:104D3000CE00671E030A03B7CA444DCD524D7723F8
:104D40001DC2354D26006A7AB7C1C921FFFF7CB765
:104D5000C1C9FE2AC25B4D0B3E3FC9FE61D8FE7B36
:104D6000D0D620C9FE30D8FE3AD26E4DB7C937C969
:104D7000210200395E23562A373719DA944DEB2A7F
:104D800039377D937C9ADA944D2A3737EB223737BF
:104D9000EB7CB5C921FFFFAF3DC9210200397D96EB
:104DA0005F7C239E57EB223937C900CDDD4F0E20A3
:104DB0001EFFCD05006F2600B7C9CDDD4F0E201EAA
:104DC000FFCD050032AA4D3A974FFEFFC80E205F77
:104DD000C30500CDDD4F0E203AAA4D5FC30500216B
:104DE000050039C501FF7FC3F34D210700039C546D2
:104DF0002B4E2B562B5E2B7E2B6E67EB78B1CA1198
:104E00004E1A96C2114E1AB7CA114E13230BC3FC89
:104E10004DC16F9F67B5C92105003956 2B5E2B7EAA
:104E20002B6E67E51A77B7CA2F4E1323C3244EE1C2
:104E30007CB5C921050039C501FF7FC3474E210755
:104E40000039C5462B4E2B562B5E2B7E2B6E67E50D
:104E5000AFBECA594E23C3514E78B1CA6A4E1A77B3
:104E6000B7CA6A4E13230BC3594E77E1C17CB5C94B
:104E7000210200395E2356236EEB7EBBCA8C4EB7EF
:104E8000CA874E23C37A4E210000AFC97CB5C92121
:104E90000200397E23666F110000AFBECAA44E1314
:104EA00023C39B4EEB7DB4C9C5210400395E235654
:104EB000234E2346236EEB78B1CAC24E73230BC335
:104EC000B74EC1C9C5210900394 62B4E2B562B5E62
:104ED0002B7E2B6E67BADA004FC2E44E7DBBDA0040
:104EE0004FCA144F09EB09AFC603EAF44EEB1B2B74
:104EF000EDB8C1C91B2B1A770B78B1C2F44EC1C9EA
:104F0000AFC603EA0A4FEDB0C1C97E1213230B7876
:104F1000B1C20A4FC1C9002020202020202020201B
:104F20003030303030202020202020202020202031
:104F300020202020202090404040404040404001
:104F4000404040404000C0C0C0C0C0C0C0C0C35
:104F50000C404040404040400909090909090 1014D
:104F6000101010101010101010101010101010131
:104F700010140404040014 00A0A0A0A0A0A0202AE
:104F800020202020202020202020202020202 0201
:104F900020240404040 20A192AA92BF92E9E1C59E
:104FA000444D21000039EB39F9D5DDE5FDE56069B7
:104FB000CD9D4FFDE1DDE1EBE1F9C1EB7CB5C9E150
:104FC000C5444D21000039EB39F9D521B74FE560D3
:104FD00069E97E1223130B78B1C2D24FC9D12102E5
:104FE0000039AFC603EAEC4FDDE5FDE5C5D5119705
:104FF0004F06067E12231305C2F34F210050E3E94A
:10500000C1AFC603EA0B50FDE1DDE17CB5C9D1219A
:105010000040019E5EB112B37C32550D121040019E9
:10502000E5EB1123377E1213237E1213237E121316
:10503000237E12C91123371A7723131A7723131AE1
:105040007723131A77C9D12126372A2537E52A2352
:1050500037E5EBE9D1E1222B37E1222D37EBE92AC5
:105060002B37EB2A2337222B37EB2223372A2D37F6
:10507000EB2A2537222D37EB222537C9212337AFDD
:1050800016043E009E772315C28250C92123371680D
:1050900047EB7C2D3522315C29150C3C852AF3D4C
:1050A000C1C9AF3CC1C9C5112637212E377EEE805C
:1050B0004F1AEE80B90604C3C550C5112637212EFC
:1050C0003706041ABEDA9E50C2A2502B1B05C2C37B
:1050D00050AFC1C9C5112337212B37AF06041A8E33
:1050E00012231305C2DE50C1C9C5112337212B3746
:1050F000AF06041A9E12231305C2F350C1C9C5118D
:105100002337212B3706041AA612231305C2075191
:10511000C1C9C51123372 12B3706041AB612231330
:105120005C21B51C1C9C5112337212B3706041AEB
:10513000AE12231305C22F51C1C9212337160 47E95
:105140002F772315C23F51C93A2B37E63FC82A2390
:1051500037EB2A253729EB29EBD25D512C3DC2557F
:1051600051222537EB222337C9C370513A2637170E
:10517000F53A2B37E63FCA8D51572126371E04F1E9
:10518000F57E1F772B1DC2815115C27A51F1C921BD
:10519000300194E79B7F0EBC37F50C5112337CD0B
:1051A0008F51C5112B37CD8F5179C1A9F5CDFB5149
:1051B000F1C1FA7C50C9C5112337CD8F5179B7F5AC
:1051C000112B37CD8F51CDFB5111273721233706B6
:1051D000041A77132305C2D151F1C1FA7C50C9C515
:1051E000CDFB51C1C9C5CDFB5111273721233 7064E
:1051F000041A77132305C2F151C1C90604212737C8

```
:10520000AF772305C201523E20F52123370608B7A8
:105210007E8F772305C210529FE6014F06041127A7
:1052200037212B37B71A9E12132305C2255279DE78
:1052300000C23E5221233734F13DC20952C9F13D2B
:10524000CA6F52F52123370608B77E8F772305C230
:105250004A529F4F0604112737212B37B71A8E1257
:10526000132305C25D5279CE00C23E52C3345206AA
:105270000411273721 2B37B71A8E12132305C27852
:1052800052C9C52123370604112737 7E1236002361
:105290001305C28B523E20F52123370608B77E8FB7
:1052A000772305C29E52D2B852060411233721 2B0D
:1052B00037B71A8E12132305C2B252F13DC297526C
:1052C000C1C9CDA650CAD352210000AFC9CDA65046
:1052D000CAC852210100AF3CC9CDA650FAD352C36F
:1052E000C852CDA650FAD352CAD352C3C852CDA683
:1052F00050FAC852C3D352CDA650FAC852CAC852A7
:10530000C3D352CDBA50FAD352C3C852CDBA50FA11
:10531000D352CAD352C3C852CDBA50FAC852C3D31B
:1053200052CDBA50FAC852CAC852C3D352222337F8
:10533000210000222537C92223377CB7F2305321C0
:10534000FFFF222537C92A2337C9C5444D21000054
:105350003E1029EB29EBD25A53093DC25253C17D6D
:10536000B4C9EB7BE61F5FCA89537CB4F294537CCB
:10537000371F677D1F6F1DC26F53B4C9EB7BE61FDC
:105380005FCA8953291DC284537DB4C9EB7BE61FD4
:105390005FCA89537CB71F677D1F6F1DC29453B4CA
:1053A000C97CA2677DA36FB4C97C2F677D2F6FB4C2
:1053B000C97CB2677DB36FB4C97CAA677DAB6FB49B
:1053C000C97CB5CAE253C3D3537D93C2D3537C92F5
:1053D000CAE253210000AFC97D93C2E2537C92CA56
:1053E000D353210100 7DB4C9EB7CAAFAFB537D9312
:1053F0007C9A3F3E00CE006F2600C97A07E6016F17
:105400002600C9EB7CAAFA15547D937C9A3E00CE07
:10541000006F2600C97C07E6016F2600C97D2F6F4B
:105420007C2F67237DB4C9EB7D936F7C9A67B5C9E8
:10543000EBE1C5424B5E23561B7AB7FA50542379F1
:10544000BECA4A54232323C338542378BEC24554CA
:10545000237E23666FC1E9EB7D937C9A3E003FCEAD
:10546000006F2600C9EB7D937C9A3E00CE006F262C
:1054700000C93F3E00CE006F2600C97A07E6016FE3
:0000000000
```

TABLE XXXIX

Source Code of Default Terminal Program Stored in ROM of Local Terminal

COPYRIGHT LICENSE LEGEND

THE ATTACHED TEXT INCLUDES MATERIAL WHICH IS COPYRIGHTED BY VERI-FONE, INC. OF HONOLULU, HAWAII. THE U.S. PATENT AND TRADEMARK OFFICE IS HEREBY LICENSED TO COPY THE MATERIAL FOR PURPOSES OF EXAMINATION OF THE PATENT APPLICATION AND FOR THE PURPOSES OF PUBLICATION OF ANY PATENT ISSUED ON THE APPLICATION AND FOR THE PURPOSE OF PROVIDING COPIES OF THE FILE HISTORY OF THE PATENT, PROVIDED THAT THIS LICENSE LEGEND IS INCLUDED ON THE MATERIAL COPIED AND/OR PUBLISHED. IF A PATENT ISSUES ON THIS APPLICATION, MEMBERS OF THE PUBLIC ARE LICENSED TO COPY THE MATERIAL ONLY AS PART OF COPYING THE ENTIRE PATENT AND/OR FILE HISTORY OF THE APPLICATION AND ONLY FOR THE PURPOSES OF REVIEWING THE SAME. NO OTHER LICENSE IS GRANTED AND VERI-FONE, INC. RESERVES ALL OTHER RIGHTS OF PUBLICATION AND ALL RIGHTS OF PERFORMANCE OF THE COPYRIGHTED MATERIAL.

```
; ROMCODE.ZAP = ZAPD ROM subroutine area.
; %KEYBD = 2
; %NE = 5
; %HANGUPKEY = 137
; %READ = 1
; %EQ = 0
; %WRITE = 2
; %CHKHSET = 7
; %GT = 3

ROMZBEGIN::

; ----------------------------------------

CKHANG::
        need_input      %KEYBD
WAITHUP:
        wait
LOOKKEY:
        chk_insrce      %KEYBD @chkkey
        wait_jump       @lookkey
CHKKEY:
        chk_char        @mchar## %ne %HANGUPKEY @waithup
        do_action       %CHKHSET
        halt

; ----------------------------------------

DORCL::
        call     @getflrc 2 @recalmsg## %READ
        do_recall       #temp1 #temp2
        chk_end_code    255 %eq 0 @rclend
        display_string  @secviol##
RCLEND:
        done

; ----------------------------------------

DOSTR::
        call     @getflrc 2 @storemsg## %WRITE
        do_store        #temp1 #temp2
        chk_end_code    255 %eq 0 @strend
        display_string  @secviol##
        done
STREND:
        do_c_call       @reeval## 0
        do_action       %CHKHSET
        done

; ----------------------------------------

GETFLRC::
        display_clear
        display_string  ^$1
        move_byte       #temp3 ^#2

        ; Get FILE number
                ; set up for 2 numeric digits
        set_edit        @filno
                ; set it to clear screen on first key press
        load_byte       @cls##  -1
                ; Get the two digits into destr
        do_data_entry
                ; Get it as a number
        move_byte       #temp1 @de_val##
                ; If nothing entered, or 0 entered, default to
                ;  file 1, record 0 (download phone #)
        chk_char        #temp1 %ne 0 @chkfil
        inc_byte        #temp1
        init_byte       #temp2
        display_clear
        display_string  '01-00'
        branch_goto     @chkrec

CHKFIL:
        do_c_call       @valfil## 2 #temp1 #temp3
        chk_end_code    255 %ne 0 @putsep
        err_beep
        branch_goto     @getflrc
PUTSEP:
        display_string  '-'
                ; Get the record number
        input_edit      @filno
                ; Get it as an integer.
        move_byte       #temp2 @de_val##
                ; If nothing entered, default to record 1
        chk_length      $destr %gt 1 @chkrec
        display_string  '01'
        inc_byte        #temp2

CHKREC:
        do_c_call       @valrec## 3 #temp1 #temp2 #temp3
        chk_end_code    255 %ne 0 @putblk
        err_beep
        branch_goto     @getflrc

PUTBLK:
        display_string  ' '
        return          2

ROMZEND::
```

```
.po3
.he ROMA000.ZAP, 07 July 1985
.fo ROMA000.ZAP, Page #

BEGIN HEADER

TITLE           Initial ROMA000 definition with store/recall.
VERSION         0.00
DATE            8/3/85
PROGRAMMER      CWR (copied from JMC)
DOWNLOAD        201ROM0.00

END HEADER

.pa
;       * * * * * * * * * * * * * * * * * * * * * * * * * * * * * *
;
;                      TABLE OF INCLUDED MODULES
;
;       * * * * * * * * * * * * * * * * * * * * * * * * * * * * * *

INCLUDE HARDWARE.ZNC    ;Hardware definition module
INCLUDE EQUATES.ZNC     ;Master table of equate definitions
INCLUDE MEMORY.ZNC      ;Memory partition definitions (standard)
INCLUDE VARBUF.ZNC      ;Variable definitions (minimal)
INCLUDE FILES.ZNC       ;File definition tables (minimal)
INCLUDE INPUT.ZNC       ;Input edit parameters (minimal)
INCLUDE INIT.ZNC        ; Initial job.
INCLUDE RECLSTOR.ZNC    ; ZAPD store/recall jobs
; INCLUDE DUMMY.ZNC     ; Dummy jobs for keys 1 to 3
INCLUDE STATES.ZNC      ;State table (default)
```

```
BEGIN HARDWARE DEFINITION TABLE
        ZMODEM          TI      ;(AMD or TI)
        ZCARDRDR        TRK2    ;(TRK2, TRK1/2, TRK1&2)
        ZPRINTER        ROLL    ;(ROLL, VFISLIP, EATSLP)

;  NOTE:  The following equates identify which physical memory
;         chips will be used for the application.

        MEM8000 _8K             ;(2K or 8K)
        MEMA000 _8K             ;(2K or 8K)
        MEMC000 _8K             ;(2K or 8K)
        MEME000 _2K             ;(0K or 2K)
        MEME800 _2K             ;(0K or 2K)
        MEMF000 _2K             ;(0K or 2K)
        MEMF800 _0K             ;(0K or 2K)

END HARDWARE DEFINITION TABLE
.pa
```

```
BEGIN EQUATE DEFINITIONS

;       ************************************************
;       Define for not being applicable
EQUATE  na      0

;
;     **************************************************
;       File security defines
EQUATE  NONE    0
EQUATE  READ    1
EQUATE  WRITE   2
EQUATE  BOTH    3

;
;     **************************************************
;       File compression defines
EQUATE  SIXBIT  1
EQUATE  BCD     2
EQUATE  HYBRID  3

;     **************************************************
;       Hardware device defines
EQUATE  TI      01
EQUATE  TRK2    01
EQUATE  ROLL    01

;     **************************************************
;       Input device defines

EQUATE  CARD    01
EQUATE  KEYBD   02
EQUATE  MODEM   04
EQUATE  RS232   08
EQUATE  PIN     16
EQUATE  TELCO   32
EQUATE  TIMER   64

EQUATE  KEYCRD  03      ; Keyboard and card-reader

EQUATE  KEYTIM  66      ; Keyboard and timer
EQUATE  MODTIM  68      ; Modem and timer
EQUATE  TELTIM  96      ; Telco and timer

;     **************************************************
;       Modem function defines
EQUATE  OFF     0       ; Specifier to turn modem off.
EQUATE  ORIG    1       ; Specifier to enable originate carrier.
EQUATE  ANSR    2       ; Specifier to enable answer carrier.

;     **************************************************
;       TELCO status defines

EQUATE  HS_UP   01      ; Handset picked up.
EQUATE  HS_DN   02      ; Handset back on-hook.

EQUATE  GOT_CAR 04      ; Carrier detected.
EQUATE  LST_CAR 05      ; Carrier lost.

EQUATE  GOT_RNG 03      ; Incoming ring received.
EQUATE  LST_RNG 06      ; Ring stopped.

;     **************************************************
;       OPSYS entry parameter defines

EQUATE  HANGUP  81      ; Hang up telephone
EQUATE  DISMOD  107     ; Disable modem command
EQUATE  OPNJAW  108     ; Open printer jaws (release paper)

;     **************************************************
        ;Math function defines
EQUATE  ADD     00      ;Specifier for ZAPD addition function
EQUATE  SUB     16      ;Specifier for ZAPD subtraction function
EQUATE  MUL     32      ;Specifier for ZAPD multiplication
EQUATE  DIV     48      ;Specifier for ZAPD division

;     **************************************************
        ;Clock format defines

EQUATE  MM      0       ;format 0, MMDDYYHHMMSS
EQUATE  DD      1       ;format 1, DDMMYYHHMMSS
EQUATE  YY      2       ;format 2, YYMMDDHHMMSS
EQUATE  MH      3       ;format 3, MM/DD/YY HH:MM
EQUATE  DH      4       ;format 4, DD/MM/YY HH:MM
EQUATE  YH      5       ;format 5, YY/MM/DD HH:MM
EQUATE  MY      6       ;format 6, MMDDYY
EQUATE  YM      7       ;format 7, DDMMYY
EQUATE  YD      8       ;format 8, YYMMDD
EQUATE  MDY     9       ;format 9, MM/DD/YY
EQUATE  DMY     10      ;format 10, DD/MM/YY
EQUATE  YMD     11      ;format 11, YY/MM/DD
EQUATE  HMS     12      ;format 12, HH:MM:SS

;     **************************************************
;       The following equates define either left or right justification
;       for the PAD_CHAR and PAD_BYTE opcodes.
;
EQUATE  PAD_L   0
EQUATE  PAD_R   1

;     **************************************************
;       The following three equates define the entry points to the
;       control string interpreter.  DE requires data entry and enters
;       through the "original" entry point.  DR builds a buffer from
;       files and constants and enters through the "data capture" entry
;       point.  FM performs formatting using files and constants, and
```

```
;       enters through the "print control string" entry point.
;
EQUATE  DE  0
EQUATE  DR  1
EQUATE  FM  2


;     ****************************************************
;       Relational operator equates.
;       NOTE:  These may be removed if the preprocessor
;                 learns how to deal with relational operators directly
EQUATE  eq      0
EQUATE  lt      1
EQUATE  le      2
EQUATE  gt      3
EQUATE  ge      4
EQUATE  ne      5


;     ****************************************************
;       Numeric/string conversion operator defines
EQUATE  SIGNED    0
EQUATE  UNSIGNED  1
EQUATE  HEX       2

;     ****************************************************
;       Check byte type defines
EQUATE  LRC  00         ;8 bit longitudinal redundancy check
EQUATE  CRC  01         ;16 bit cyclic redundancy check
EQUATE  CKS  02         ;checksum

;     ****************************************************
;       ASCII conversion code defines

EQUATE  STX  02
EQUATE  ETX  03
EQUATE  EOT  04
EQUATE  ENQ  05
EQUATE  ACK  06
EQUATE  CR   13
EQUATE  NAK  21
EQUATE  FS   28
EQUATE  BLANK  32
EQUATE  AST  42
EQUATE  DASH 45
EQUATE  PD  46
EQUATE  PERIOD 46
EQUATE  ZERO    48
EQUATE  ONE     49
EQUATE  TWO     50
EQUATE  THREE   51
EQUATE  FOUR    52
EQUATE  FIVE    53
EQUATE  SIX     54
EQUATE  SEVEN   55
EQUATE  EIGHT   56
EQUATE  NINE    57
EQUATE  Z_PAD  48
EQUATE  COLON 58
EQUATE  QMARK 63

;     ****************************************************
;       Input edit type defines

EQUATE  ALPHA    1              ;Edit form for aplphabetic input
EQUATE  NUM      2              ;Edit form for numeric input
EQUATE  ALPHNM   3              ;Edit form for alphanumeric input
EQUATE  TEL      6              ;Edit form for telephone numbers
EQUATE  PWD      7              ;Edit form for password input
EQUATE  CALNDR   8              ;Edit form for date/time

;     ****************************************************
;       Special key defines

EQUATE  ENTER   21      ; Usual enter key position.
EQUATE  CE      19      ; Usual backspace/CE key position.
EQUATE  HANG    27      ; Usual hangup key position.
EQUATE  SHIFT   28      ; Usual shift key position.

;     ****************************************************
;       Mapped key defines

EQUATE  ENTERKEY        131     ; Mchar of enter key
EQUATE  CEKEY           129     ; Mchar of backspace/CE key
EQUATE  HANGUPKEY       137     ; Mchar of hangup key
EQUATE  SHIFTKEY        128     ; Mchar of shift key

END EQUATE DEFINITIONS
.pa
```

```
BEGIN MEMORY PARTITION
;               Start    End
;               Addr     Addr     ID      Description
;               -----    -----    ---     --------------------------------
PARTITION       0A800h   0Bfffh   dnll    ;Nonvolatile, Switch
                                          ;protected (ZAPD code stuff &
                                          ;some files go here)
PARTITION       0E000h   0E7FFh   accl    ;Accumulators and other changable
                                          ;files go here.
                                          ;Also buffers, variables, & stack.

VARPAR  accl
BUFPAR  accl
STACKSIZE 45
STACKPAR accl

END MEMORY PARTITION
.pa
```

```
.po3
.pnl
.he VARBUF.BK1 13 July 1985
.fo VARBUF.BK1 Page #

BEGIN VARIABLE DEFINITION TABLE
;
;               Variable
;               Name            Description
;               --------        --------------------------------
        ;Variables which are free for general use.
        ; 3 are needed for store/recall.

VARIABLE        TEMP1           ;Temporary variable (no. 1)

VARIABLE        TEMP2           ;Temporary variable (no. 2)

VARIABLE        TEMP3           ;Temporary variable (no. 3)

END VARIABLE DEFINITION TABLE
.pa

BEGIN BUFFER DEFINITION TABLE
;
;
;          Buffer
;          Name           Length   Description
;          ------         ------   ------------------------------
BUFFER     input            128    ;desc of input buffer
BUFFER     transmit         128    ;desc of transmit buffer
BUFFER     receive          128    ;desc of receive buffer
BUFFER     destr             64    ;desc of data entry string buffer
BUFFER     intbuf            64    ;desc of control string buffer
BUFFER     int2buf           64    ;desc of data capture result buffer
BUFFER     int3buf           64    ;desc of miscellaneous buffer
BUFFER     supbuf            64    ;desc of supervisor data buffer
BUFFER     amtsav            16    ;desc of amount save buffer
BUFFER     brntbl            20    ;desc of branch-table buffer
BUFFER     mathbuf           16    ;desc of mathmetic buffer
BUFFER     user1buf           1    ;Not used (in ROM application)
BUFFER     user2buf           1    ;Not used (in ROM application)
BUFFER     user3buf           1    ;Not used (temporarily)
BUFFER     user4buf           1    ;Not used (temporarily)
BUFFER     tmp1buf           64    ;temporary buffer for implied use
BUFFER     tmp2buf           64    ;temporary buffer for implied use

END BUFFER DEFINITION TABLE
.pa
```

```
.po3
.pnl
.he FILES.ZNC 12 July 1985
.fo FILES.ZNC Page #

; ------------------------------------------------------------
BEGIN FILE DEFINITION TABLE
;               ----------------
;               SUMMARY OF FILES
;               ----------------
;
;       Physical Logical
;       File #   File #   File Name      Description
;       -------  -------  ---------      -----------
;
;         1        1      F_PHNM          phone numbers
;         2        2      F_DLTP          Tone/pulse select
;         3        3      F_RDET          Ring detect flag
;         4        4      F_RFLG          call restriction flag
;         5        5      F_SRNM          serial number
;         6        6      F_PRMT          prompts
; File used for debugging purposes.
;         7        99     F_ZERR          Storage for ZAPD error messages
.pa


; ------------------
; Telephone Numbers (both for transaction and speed dial)
; ------------------
;               Name    Id      Compr   Part    Alt     Cutf
;               ----    --      -----   ----    ---     ----
FILE            F_PHNM  01      bcd     dnll    na      254

;               File    Min     Max     Prompt  Input
;               Name    Rec     Rec     Rec #   Attr
;               ----    ---     ---     ------  -----
DESCFILE        F_PHNM  00      20      na      telc

;               File    Min     Max     Type    Access
;               Name    Rec     Rec     Protect Level
;               ----    ---     ---     ------- ------
SECURITY        F_PHNM  00      20      none    1
.cp26


; ------------------
; F_DLTP - Flag to indicate whether dialing is tone or pulse
; ------------------
;               Name    Id      Compr   Part    Alt     Cutf
;               ----    --      -----   ----    ---     ----
FILE            F_DLTP  02      sixbit  dnll    na      254

;               File    Min     Max     Prompt  Input
;               Name    Rec     Rec     Rec #   Attr
;               ----    ---     ---     ------  -----
DESCFILE        F_DLTP  1       1       na      flag

;               File    Min     Max     Type    Access
;               Name    Rec     Rec     Protect Level
;               ----    ---     ---     ------- ------
SECURITY        F_DLTP  1       1       none    1
.cp26


; ------------------
; F_RDET - Flag to enable incoming ring detect
; ------------------
;               Name    Id      Compr   Part    Alt     Cutf
;               ----    --      -----   ----    ---     ----
FILE            F_RDET  03      sixbit  dnll    na      254

;               File    Min     Max     Prompt  Input
;               Name    Rec     Rec     Rec #   Attr
;               ----    ---     ---     ------  -----
DESCFILE        F_RDET  1       1       na      flag
DESCFILE        F_RDET  2       4       na      number

;               File    Min     Max     Type    Access
;               Name    Rec     Rec     Protect Level
;               ----    ---     ---     ------- ------
SECURITY        F_RDET  1       4       none    1
.cp26


; ------------------
; Call restriction flag.  Permits/denys manual/auto dial
; ------------------
;               Name    Id      Compr   Part    Alt     Cutf
;               ----    --      -----   ----    ---     ----
FILE            F_RFLG  04      sixbit  dnll    na      254

;               File    Min     Max     Prompt  Input
;               Name    Rec     Rec     Rec #   Attr
;               ----    ---     ---     ------  -----
DESCFILE        F_RFLG  1       1       na      flag

;               File    Min     Max     Type    Access
;               Name    Rec     Rec     Protect Level
;               ----    ---     ---     ------- ------
SECURITY        F_RFLG  1       1       none    1
.cp26
```

```
; ____________________
; Unit Serial Number
; ____________________
;               Name     Id     Compr   Part    Alt     Cutf
;               ______   __     _____   ____    ___     ____
FILE            F_SRNM   05     bcd     dnll    na      254

;               File     Min    Max     Prompt  Input
;               Name     Rec    Rec     Rec #   Attr
;               ______   ___    ___     ______  _____
DESCFILE        F_SRNM   1      1       na      udno
DESCFILE        F_SRNM   2      2       NA      APPID

;               File     Min    Max     Type    Access
;               Name     Rec    Rec     Protect Level
;               ______   ___    ___     _______ ______
SECURITY        F_SRNM   1      2       none    1
.cp26


; ____________________
; Prompt file
; ____________________
;               Name     Id     Compr   Part    Alt     Cutf
;               ______   __     _____   ____    ___     ____
FILE            F_PRMT   06     sixbit  dnll    na      254

;               File     Min    Max     Prompt  Input
;               Name     Rec    Rec     Rec #   Attr
;               ______   ___    ___     ______  _____
DESCFILE        F_PRMT   0      80      na      prmpt

;               File     Min    Max     Type    Access
;               Name     Rec    Rec     Protect Level
;               ______   ___    ___     _______ ______
SECURITY        F_PRMT   0      80      none    1

;               File     Default
;               Number   File Type
;               ______   _________
DEFAULT         PRM      06
.cp26


; ____________________
; ZAPD Error stamp file.
; ____________________
;               Name     Id     Compr   Part    Alt     Cutf
;               ______   __     _____   ____    ___     ____
FILE            F_ZERR   99     sixbit  accl    na      254

; File can not be stored, so no file desc needed.
```

```
;               File     Min    Max     Type  , Access
;               Name     Rec    Rec     Protect Level
;               ______   ___    ___     _______ ______
SECURITY        F_ZERR   1      2       read    1

;       Default for:     File ID:
;       ____________     ________
DEFAULT         ERR      99


; Default file descriptor:
;               File     Min    Max     Prompt  Input
;               Name     Rec    Rec     Rec #   Attr
;               ______   ___    ___     ______  _____
DESCFILE        255      0      254     na      dfault

END FILE DEFINITION TABLE


BEGIN PASSWORD MODE SET TABLE;

MODE    0       11111111

END PASSWORD MODE

.pa
```

```
.po1
.pn1
.he INPUT.ZNC 07 July 1985
.fo INPUT.ZNC Page #

BEGIN INPUT ATTRIBUTE
;                        Key     Max
;EDIT   Label    Edit    Map     Len     P1      P2      Dec
;       -----    ----    ---     ---     --      --      ---
EDIT    dfault   alphan  0       30      na      na      na
EDIT    number   intege  0       3       00      255     0
EDIT    telc     teleno  0       32      na      na      na
EDIT    clock    alphan  0       18      na      na      na
EDIT    udno     alphan  0       10      na      na      na
EDIT    APPID    ALPHAN  9       7       NA      NA      7
EDIT    flag     alphan  0       1       na      na      na
EDIT    pass     pw_edi  0       40      na      na      na
EDIT    prmpt    alphan  1       16      na      na      na


END INPUT ATTRIBUTE
.pa


BEGIN SPECIAL KEYS

        KEY     ALPHA           SHIFT
        KEY     HANGUP          HANG
        KEY     ENTER           ENTER
        KEY     BACKSP          CE

END SPECIAL KEYS
.pa

BEGIN JOB -INIT FIRSTJOB

        display_clear
        display_string '<NOT PROGRAMMED>'
        pause           100
        do_action       7
        halt

END JOB INIT

BEGIN JOB -RECALL

        ; Start job to check for hangup.
        start_job       1 @chk_hangup

        ; Start job to get file/record and do the recall.
        start_job       2 @do_rcl
;waitrcl:
        waitfor_job     00000100B
;       chk_job_done    2 @rcldone
;       wait_jump       @waitrcl
rcldone:
        done

END JOB RECALL

BEGIN JOB -STORE

        take_input
        ; Check that memory is unlocked.
        chk_memlok      @sto01

        ; Memory is locked - can't store.
        display_string  @MEMLKEDMSG##
        done

sto01:
        ; Start job to check for hangup.
        start_job       1 @chk_hangup

        ; Start job to get file/record and do the STORE.
        start_job       2 @do_str
;waitstr:
        waitfor_job     00000100B
;       chk_job_done    2 @strdone
;       wait_jump       @waitstr
strdone:
        done

END JOB STORE

BEGIN JOB ROMENTRIES

chk_hangup:
        branch_rom      @jckhang##

do_str:
        branch_rom      @jdostr##

do_rcl:
        branch_rom      @jdorcl##

END JOB ROMENTRIES
```

```
.pn1
.po3
.he STATES.ZNC 17 July 1985
.fo STATES.ZNC Page #
;       RAM STATE TABLE DEFINITIONS
;
;       The State Table is used to identify the keys that
;       can initiate transactions from the READY state.
;
;       NOTE:  The task list entry point is in lower case and is
;              shown UNDER the key.  The key legends are shown
;              above the key.
;
;       NOTE:  Task list entry points that end with a ## sign
;              are ROM based (e.g., calc##).  Those without
;              a ## sign are RAM based.
;
;       NOTE:  Underneath each task list entry point is the
;              next STATE that will be entered after the
;              current task has been completed.
.pa


BEGIN STATE TABLE -READY
;
;
;        A       B       C               D       E               F       G
;        PURCH           TERMTOT                 CALC
;        +---+   +---+   +---+           +---+   +---+           +---+   +---+
;        | 1 |   | 2 |   | 3 |           |   |   |   |           |   |   |   |
;        +---+   +---+   +---+           +---+   +---+           +---+   +---+
ACTION   unpgmd## unpgmd## unpgmd##      error## calc##          phone## error##
STATE    same_s## same_s## same_s##      same_s## calcst         phonest same_s##
;
;        H       I       J               K       L               M       N
;        REF             DETAIL
;        +---+   +---+   +---+           +---+   +---+           +---+   +---+
;        | 4 |   | 5 |   | 6 |           |   |   |   |           |   |   |   |
;        +---+   +---+   +---+           +---+   +---+           +---+   +---+
ACTION   unpgmd## unpgmd## unpgmd##      error## error##         recall  error##
STATE    same_s## same_s## same_s##      same_s## same_s##       ready   same_s##
;
;        O       P       Q               R       S               T       U
;        F/PURCH         BALCOR                  CE                      ENTER
;        +---+   +---+   +---+           +---+   +---+           +---+   +---+
;        | 7 |   | 8 |   | 9 |           |   |   |   |           |   |   |   |
;        +---+   +---+   +---+           +---+   +---+           +---+   +---+
ACTION   unpgmd## unpgmd## unpgmd##      error## error##         store   error##
STATE    same_s## same_s## same_s##      same_s## same_s##       ready   same_s##
;
;        V       W       X               Y       Z               Space   MODE
;        REPEAT                          SCROLL  SCROLL          HANG    ALPHA
;        DIAL                                                            
;        +---+   +---+   +---+           +---+   +---+           +---+   +---+
;        | * |   | 0 |   | # |           |   |   |   |           |   |   |   |
;        +---+   +---+   +---+           +---+   +---+           +---+   +---+
ACTION   redial## unpgmd## error##       left##  right##         abort## error##
STATE    same_s## same_s## same_s##      same_s## same_s##       same_s## same_s##
;
;
;        CARDRDR         TIMEOUT         MODEM   TELCO   PINPAD
;        -------         -------         -----   -----   ------  ------  ------
ACTION   error##         nothin##        error## chkhset## error## error## error##
STATE    same_s##        same_s##        same_s## same_s## same_s## same_s## same_s##
;

END STATE TABLE READY
.pa


BEGIN STATE TABLE -ZAPDST
;
;
;        A       B       C               D       E               F       G
;        PURCH           TERMTOT                 CALC
;        +---+   +---+   +---+           +---+   +---+           +---+   +---+
;        | 1 |   | 2 |   | 3 |           |   |   |   |           |   |   |   |
;        +---+   +---+   +---+           +---+   +---+           +---+   +---+
ACTION   zkey##  zkey##  zkey##          zkey##  zkey##          zkey##  zkey##
STATE    same_s## same_s## same_s##      same_s## same_s##       same_s## same_s##
;
;        H       I       J               K       L               M       N
;        REF             DETAIL
;        +---+   +---+   +---+           +---+   +---+           +---+   +---+
;        | 4 |   | 5 |   | 6 |           |   |   |   |           |   |   |   |
;        +---+   +---+   +---+           +---+   +---+           +---+   +---+
ACTION   zkey##  zkey##  zkey##          zkey##  zkey##          zkey##  zkey##
STATE    same_s## same_s## same_s##      same_s## same_s##       same_s## same_s##
;
;        O       P       Q               R       S               T       U
;        F/PURCH         BALCOR                  CE                      ENTER
;        +---+   +---+   +---+           +---+   +---+           +---+   +---+
;        | 7 |   | 8 |   | 9 |           |   |   |   |           |   |   |   |
;        +---+   +---+   +---+           +---+   +---+           +---+   +---+
ACTION   zkey##  zkey##  zkey##          zkey##  zkey##          zkey##  zkey##
STATE    same_s## same_s## same_s##      same_s## same_s##       same_s## same_s##
;
;        V       W       X               Y       Z               Space   MODE
;        REPEAT                          SCROLL  SCROLL          HANG    ALPHA
;        DIAL                            RIGHT   LEFT            UP
;        +---+   +---+   +---+           +---+   +---+           +---+   +---+
;        | * |   | 0 |   | # |           |   |   |   |           |   |   |   |
;        +---+   +---+   +---+           +---+   +---+           +---+   +---+
ACTION   zkey##  zkey##  zkey##          zkey##  zkey##          zkey##  zkey##
```

```
STATE   same_s$$ same_s$$ same_s$$      same_s$$ same_s$$      same_s$$ same_s$$
;
;
;       CARDRDR     TIMEOUT     MODEM     TELCO     PINPAD
;       -------     -------     -----     -----     ------    --------  --------
ACTION  scardi$$    stimeo$$    smodem$$  stelco$$  spinin$$ error$$   error$$
STATE   same_s$$    same_s$$    same_s$$  same_s$$  same_s$$ same_s$$  same_s$$
;

END STATE TABLE ZAPDST
.pa



BEGIN STATE TABLE -CALCST
;
;
;       A        B        C             D        E             F        G
;       PURCH             TERMTOT                CALC
;       +---+    +---+    +---+         +---+    +---+         +---+    +---+
;       | 1 |    | 2 |    | 3 |         |   |    |   |         |   |    |   |
;       +---+    +---+    +---+         +---+    +---+         +---+    +---+
ACTION  buildn$$ buildn$$ buildn$$      operat$$ abort$$       error$$  error$$
STATE   same_s$$ same_s$$ same_s$$      same_s$$ ready       same_s$$ same_s$$
;
;       H        I        J             K        L             M        N
;       REF               DETAIL
;       +---+    +---+    +---+         +---+    +---+         +---+    +---+
;       | 4 |    | 5 |    | 6 |         |   |    |   |         |   |    |   |
;       +---+    +---+    +---+         +---+    +---+         +---+    +---+
ACTION  buildn$$ buildn$$ buildn$$      operat$$ error$$       error$$  error$$
STATE   same_s$$ same_s$$ same_s$$      same_s$$  same_s$$     same_s$$ same_s$$
;
;       O        P        Q             R        S             T        U
;       F/PURCH           BALCOR                 CE                     ENTER
;       +---+    +---+    +---+         +---+    +---+         +---+    +---+
;       | 7 |    | 8 |    | 9 |         |   |    |   |         |   |    |   |
;       +---+    +---+    +---+         +---+    +---+         +---+    +---+
ACTION  buildn$$ buildn$$ buildn$$      operat$$ clear$$       error$$  error$$
STATE   same_s$$ same_s$$ same_s$$      same_s$$ same_s$$      same_s$$ same_s$$
;
;       V        W        X             Y        Z             Space    MODE
;       REPEAT                          SCROLL   SCROLL        HANG     ALPHA
;       DIAL                            RIGHT    LEFT          UP
;       +---+    +---+    +---+         +---+    +---+         +---+    +---+
;       | * |    | 0 |    | # |         |   |    |   |         |   |    |   |
;       +---+    +---+    +---+         +---+    +---+         +---+    +---+
ACTION  error$$  buildn$$ setdec$$      operat$$ operat$$      abort$$  error$$
STATE   same_s$$ same_s$$ same_s$$      same_s$$ same_s$$      ready  same_s$$
;
;
;       CARDRDR     TIMEOUT     MODEM    TELCO    PINPAD
;       -------     -------     -----    -----    ------     --------  --------
ACTION  error$$     nothin$$    error$$  hsdown$$ error$$    error$$   error$$
STATE   same_s$$    same_s$$    same_s$$ same_s$$ same_s$$   same_s$$  same_s$$
;

END STATE TABLE CALCST
.pa


BEGIN STATE TABLE -PHONEST
;
;
;       A        B        C             D        E             F        G
;       PURCH             TERMTOT                CALC
;       +---+    +---+    +---+         +---+    +---+         +---+    +---+
;       | 1 |    | 2 |    | 3 |         |   |    |   |         |   |    |   |
;       +---+    +---+    +---+         +---+    +---+         +---+    +---+
ACTION  dialdi$$ dialdi$$ dialdi$$      error$$  error$$       longfl$$ error$$
STATE   same_s$$ same_s$$  same_s$$     same_s$$ same_s$$      same_s$$ same_s$$
;
;       H        I        J             K        L             M        N
;       REF               DETAIL
;       +---+    +---+    +---+         +---+    +---+         +---+    +---+
;       | 4 |    | 5 |    | 6 |         |   |    |   |         |   |    |   |
;       +---+    +---+    +---+         +---+    +---+         +---+    +---+
ACTION  dialdi$$ dialdi$$ dialdi$$      error$$  error$$        domemd$$ error$$
STATE   same_s$$ same_s$$  same_s$$     same_s$$ same_s$$      memdial  same_s$$
;
;       O        P        Q             R        S             T        U
;       F/PURCH           BALCOR                 CE                     ENTER
;       +---+    +---+    +---+         +---+    +---+         +---+    +---+
;       | 7 |    | 8 |    | 9 |         |   |    |   |         |   |    |   |
;       +---+    +---+    +---+         +---+    +---+         +---+    +---+
ACTION  dialdi$$ dialdi$$ dialdi$$      error$$  error$$        loadon$$ error$$
STATE   same_s$$  same_s$$  same_s$$    same_s$$ same_s$$      same_s$$ same_s$$
;
;       V        W        X             Y        Z             Space    MODE
;       REPEAT                          SCROLL   SCROLL        HANG     ALPHA
;       DIAL                            RIGHT    LEFT          UP
;       +---+    +---+    +---+         +---+    +---+         +---+    +---+
;       | * |    | 0 |    | # |         |   |    |   |         |   |    |   |
;       +---+    +---+    +---+         +---+    +---+         +---+    +---+
ACTION  dialdi$$ dialdi$$ dialdi$$      error$$  error$$        abort$$ error$$
STATE   same_s$$  same_s$$  same_s$$    same_s$$ same_s$$      ready same_s$$
;
;
;       CARDRDR     TIMEOUT     MODEM    TELCO    PINPAD
;       -------     -------     -----    -----    ------     --------  --------
ACTION  error$$     nothin$$    error$$  hsdown$$  error$$   error$$   error$$
STATE   same_s$$    same_s$$    same_s$$ same_s$$  same_s$$  same_s$$  same_s$$
;

END STATE TABLE PHONEST
.pa
```

```
BEGIN STATE TABLE -MEMDIAL
;
;
;       A       B       C             D       E             F       G
;       PURCH           TERMTOT               CALC
;       +---+   +---+   +---+         +---+   +---+         +---+   +---+
;       | 1 |   | 2 |   | 3 |         |   |   |   |         |   |   |   |
;       +---+   +---+   +---+         +---+   +---+         +---+   +---+
ACTION  getfir$$ getfir$$ error$$     error$$ error$$       longf1$$ error$$
STATE   mem2    mem2    same_s$$      same_s$$ same_s$$     phonest same_s$$
;
;       H       I       J             K       L             M       N
;       REF             DETAIL
;       +---+   +---+   +---+         +---+   +---+         +---+   +---+
;       | 4 |   | 5 |   | 6 |         |   |   |   |         |   |   |   |
;       +---+   +---+   +---+         +---+   +---+         +---+   +---+
ACTION  error$$ error$$ error$$       error$$ error$$       error$$ error$$
STATE   same_s$$ same_s$$ same_s$$    same_s$$ same_s$$     same_s$$ same_s$$
;
;       O       P       Q             R       S             T       U
;       F/PURCH         BALCOR                CE                    ENTER
;       +---+   +---+   +---+         +---+   +---+         +---+   +---+
;       | 7 |   | 8 |   | 9 |         |   |   |   |         |   |   |   |
;       +---+   +---+   +---+         +---+   +---+         +---+   +---+
ACTION  error$$ error$$ error$$       error$$ error$$       domemd$$ error$$
STATE   same_s$$ same_s$$ same_s$$    same_s$$ same_s$$     same_s$$ same_s$$
;
;       V       W       X             Y       Z             Space   MODE
;       REPEAT                        SCROLL  SCROLL        HANG    ALPHA
;       DIAL                          RIGHT   LEFT          UP
;       +---+   +---+   +---+         +---+   +---+         +---+   +---+
;       | * |   | 0 |   | # |         |   |   |   |         |   |   |   |
;       +---+   +---+   +---+         +---+   +---+         +---+   +---+
ACTION  error$$ getfir$$ error$$      error$$ error$$       abort$$ error$$
STATE   same_s$$ mem2   same_s$$      same_s$$ same_s$$     ready   same_s$$
;
;
;       CARDRDR     TIMEOUT     MODEM   TELCO   PINPAD
;       -------     -------     -----   -----   ------   -------  -------
ACTION  error$$     nothin$$    error$$ hsdown$$ error$$ error$$  error$$
STATE   same_s$$    same_s$$    same_s$$ same_s$$ same_s$$ same_s$$ same_s$$
;

END STATE TABLE MEMDIAL
.pa


BEGIN STATE TABLE -MEM2
;
;
;       A       B       C             D       E             F       G
;       PURCH           TERMTOT               CALC
;       +---+   +---+   +---+         +---+   +---+         +---+   +---+
;       | 1 |   | 2 |   | 3 |         |   |   |   |         |   |   |   |
;       +---+   +---+   +---+         +---+   +---+         +---+   +---+
ACTION  get2di$$ get2di$$ get2di$$    error$$ error$$       longf1$$ error$$
STATE   phonest phonest phonest       same_s$$ same_s$$     phonest same_s$$
;
;       H       I       J             K       L             M       N
;       REF             DETAIL
;       +---+   +---+   +---+         +---+   +---+         +---+   +---+
;       | 4 |   | 5 |   | 6 |         |   |   |   |         |   |   |   |
;       +---+   +---+   +---+         +---+   +---+         +---+   +---+
ACTION  get2di$$ get2di$$ get2di$$    error$$ error$$       error$$ error$$
STATE   phonest phonest phonest       same_s$$ same_s$$     same_s$$ same_s$$
;
;       O       P       Q             R       S             T       U
;       F/PURCH         BALCOR                CE                    ENTER
;       +---+   +---+   +---+         +---+   +---+         +---+   +---+
;       | 7 |   | 8 |   | 9 |         |   |   |   |         |   |   |   |
;       +---+   +---+   +---+         +---+   +---+         +---+   +---+
ACTION  get2di$$ get2di$$ get2di$$    error$$ error$$       domemd$$ error$$
STATE   phonest phonest phonest       same_s$$ same_s$$     same_s$$ same_s$$
;
;       V       W       X             Y       Z             Space   MODE
;       REPEAT                        SCROLL  SCROLL        HANG    ALPHA
;       DIAL                          RIGHT   LEFT          UP
;       +---+   +---+   +---+         +---+   +---+         +---+   +---+
;       | * |   | 0 |   | # |         |   |   |   |         |   |   |   |
;       +---+   +---+   +---+         +---+   +---+         +---+   +---+
ACTION  error$$ get2di$$ error$$      error$$ error$$       abort$$ error$$
STATE   same_s$$ phonest same_s$$     same_s$$ same_s$$     ready   same_s$$
;
;
;       CARDRDR     TIMEOUT     MODEM   TELCO   PINPAD
;       -------     -------     -----   -----   ------   -------  -------
ACTION  error$$     nothin$$    error$$ hsdown$$ error$$ error$$  error$$
STATE   same_s$$    same_s$$    same_s$$ same_s$$ same_s$$ same_s$$ same_s$$
;

END STATE TABLE MEM2
.pa
```

TABLE XXXX

| SEQUENCE OF INSTRUCTIONS EXECUTED DURING CONCURRENT JOB EXECUTION |
| --- |
| Example: Recall of download phone number (In VFI "generic" application) |

[Assuming Recall key on keyboard is initially pressed at the READY state]

First, the State-table processor, using the READY state from the VFI generic application and the Recall key input value, locates the corresponding action value, and decodes it to mean "ACTION.START.APM for APM -RECALL" (the APM from the BEGIN JOB-RECALL section of the VFI generic application)

The APM beginning at the label_RECALL: is thereby scheduled for execution as job 0.

[Assuming no input is then ready]

The ACTIVE SCHEDULER takes over, and begins by examining Job 0. As Job 0 is now active and has no special input requirements, indicated by its DEVICES byte being 0, it is now executed.

Job 0 APM begins executing at label_RECALL:

Command: START_JOB 1 @CHK_HANGUP

APM beginning at CHK_HANGUP is scheduled for execution as job 1.

Command: START_JOB 2 @DO_RCL

APM beginning at DO_RCL is scheduled for execution as job 2.

Command: WAITFOR_JOB 00000100B

As job 2 (specified in bitmap) is not yet completed, job 0 is suspended.

Job 1 - APM begins executing at label CHK_HANGUP:

Command: BRANCH_ROM @JCKHANG##

Transfers to CKHANG code area in ROM, via jump table.

(Now executing instructions from ROM based object code at address CKHANG::)

Command: NEED_INPUT %KEYBD

Sets devices byte to indicate Job 1 should only be restarted when keyboard input is present.

Command: WAIT

Suspends job 1 to be reawakened when keyboard input is available.

Job 2 - APM begins executing at label DO_RCL:

Command: BRANCH_ROM @JDORCL##

Transfers to DORCL code area in ROM, via jump table.

(Now executing instructions from ROM based object code at address DORCL::)

Command: CALL @GETFLRC 2 @RECALMSG## %READ

Does subroutine call to GETFLRC module in ROM based object code after placing 2 parameters on the stack, namely the address of the RECALL WHAT? message, and the numeric value to indicate RECALL access.

Command: DISPLAY_CLEAR

Clers the display of the terminal.

Command: DISPLAY_STRING *$1

Displays the string which was passed as a parameter, namely "RECALL WHAT?".

Command: MOVE_BYTE #TEMP3 *$2

Copies the %READ value which was passed as a parameter into the application-defined TEMP3 byte variable.

Command: SET_EDIT @FILNO

Sets the edit type for the next data entry to the FILNO entry information stored in the ROM.

TABLE XXXX-continued

| SEQUENCE OF INSTRUCTIONS EXECUTED DURING CONCURRENT JOB EXECUTION |
| --- |
| Example: Recall of download phone number (In VFI "generic" application) |

Command: LOAD_BYTE @CLS## -1

Sets the CLS predefined byte variable to indicate that the screen should be cleared after the first keystroke of data entry.

Command: DO_DATA_ENTRY

Sets up to begin keyboard data entry into the destr (data entry string) string variable; the command sets the DEVICES byte to request keyboard input only, and as no keyboard input is now present, the command then suspends this APM.

[Assuming no input is present, following the above sequence.]

The ACTIVE SCHEDULER takes over, and begins by examining Job 0. As Job 0 is now active and has no special input requirements, it is now executed.

Job 0 - APM begins executing at previous WAITFOR_JOB command, where it was suspended.

Command: WAITFOR_JOB 00000100B

As job 2 (specified in bitmap) is not yet completed, job 0 is suspended.

Job 1 - Will not be restarted, as CHECK/EXECUTE routine will determine that it is waiting for keyboard input only.

Job 2 - Will not be restarted, as CHECK/EXECUTE routine will determine that it is waiting for keyboard input only.

This sequence of actions will be followed continuously whenever no form of input is present (until such time as the hangup key has been pressed or the data entry job has completed.)

[Assuming a non-keyboard input is present, following the above sequence.]

The REALTIME SCHEDULER takes over, and begins by examining Job 0.

Job 0 - As APM is not in REALTIME status, it will not be examined for scheduling by REALTIME SCHEDULER.

Job 1 - Will be examined, but will not be restarted, as CHECK/EXECUTE routine will determine that it is waiting for keyboard input only.

Job 2 - Will be examined, but will not be restarted, as CHECK/EXECUTE routine will determine that it is waiting for keyboard input only.

This sequence of actions will be followed whenever some non-keyboard form of input is present, when the above code is executing, until such time as the hangup key has been pressed or the data entry for the Recall has been completed.

[Assuming HANGUP key input from keyboard is present]

The REALTIME SCHEDULER takes over, and begins by examining Job 0; Job 0 is not in REALTIME, so it skips immediately on to examine Job 1, which is in REALTIME.

Job 1 - APM begins executing following previous WAIT command

Command: CHK_INSRCE %KEYBD @CHKKEY

Checks the source of the current input, to see whether it is from the keyboard. As it is, it branches to the CHKKEY: label.

Command: CHK_CHAR @MCHAR## %NE %HANGUPKEY @WAITHUP

Checks the predefined variable MCHAR containing the mapped value of the input key, and as it is the hangup key value, it does not branch, and continues to the next command.

Command: DO_ACTION %R_CHKHSET

Executes the ROM action routine CHKHSET to display the READY

TABLE XXXX-continued

SEQUENCE OF INSTRUCTIONS EXECUTED DURING CONCURRENT JOB EXECUTION

Example. Recall of download phone number (In VFI "generic" application)

message or other default phone status message on the display of the terminal.

Command: HALT

Stops all other APMs and this one, and returns to the default READY state of the terminal.

Job 2 - Is not checked, as it has already been stopped by Job 1. This then terminates execution of APMs, until some other input is received which triggers one.

[Assuming that hangup key was not pressed, and some other keyboard input is present, e.g. key 0]

The REALTIME SCHEDULER takes over, and begins by examining Job 0; Job 0 is not in REALTIME, so it skips immediately on to examine Job 1, which is in REALTIME.

Job 1 - APM begins executing after previous WAIT command

Command: CHK_INSRCE %KEYBD @CHKKEY

Checks the source of the current input, to see whether it is from the keyboard. As it is, it branches to the CHKKEY: label.

Command: CHK_CHAR @MCHAR## %NE %HANGUPKEY @WAITHUP

Checks the predefined variable MCHAR containing the mapped value of the input key, and as it is not the hangup key value, it branches to the WAITHUP: label.

Command: WAIT

Suspends job 1 to be reawakened when keyboard input is available.

Job 2 - APM begins executing on previous DO_DATA_ENTRY command

Command: DO_DATA_ENTRY

The key is now checked according to the edit type defined, and either added to the data entry string, or rejected with an error beep. The input is taken so that it will not be passed on to other jobs or the state-table. Assuming this key did not complete the data field, the command will then suspend the job again to continue later. Assuming the key was the 0 key on the numeric keypad of the ZON terminal, an Ascii '0' will be added as the first character of the destr buffer.

[Assuming a subsequent keyboard input, other than the hangup key is present, e.g. key 0]

The REALTIME SCHEDULER takes over, and begins by examining Job 0; Job 0 is not in REALTIME, so it skips immediately on to examine Job 1, which is in REALTIME.

Job 1 - APM begins executing after previous WAIT command

Command: CHK_INSRCE %KEYBD @CHKKEY

Checks the source of the current input, to see whether it is from the keyboard. As it is, it branches to the CHKKEY: label.

Command: CHK_CHAR @MCHAR## %NE %HANGUPKEY @WAITHUP

Checks the predefined variable MCHAR containing the mapped value of the input key, and as it is not the hangup key value, it branches to the WAITHUP: label.

Command: WAIT

Suspends job 1 to be reawakened when keyboard input is available.

Job 2 - APM begins executing on previous DO_DATA_ENTRY command

Command: DO_DATA_ENTRY

The key is now checked according to the edit type defined, and either added to the data entry string, or rejected with an error beep. The input is taken so that it will not be passed on to other jobs or the state-table. Assuming the key was the 0 key on the numeric keypad of the ZON terminal, and that a previous '0' had been entered, an Ascii '0' will be added as the second character of the destr buffer. As the Input Attribute Table entry which was used for this command specifies that the field should be considered completed after two characters have been entered, the command will now complete and continue on to the following command.

A series of commands in this APM will now be executed, to finish implementing the memory recall, beginning from the command immediately following the DO_DATA_ENTRY command, and terminating with the DONE command at the end of this APM.

Command: MOVE_BYTE #TEMP1 @DE_VAL##
Command: CHK_CHAR #TEMP1 %NE 0 @CHKFIL
Command: INC_BYTE #TEMP1
Command: INIT_BYTE #TEMP2
Command: DISPLAY_CLEAR
Command: DISPLAY_STRING '01=00'
Command: BRANCH_GOTO @CHKREC
Command: DO_C_CALL @VALREC## 3 #TEMP1 #TEMP2 #TEMP3
Command: CHK_END_CODE 255 %NE 0 @PUTBLK
Command: DISPLAY_STRING ' '
Command: RETURN 2
Command: DO_RECALL #TEMP1 #TEMP2
Command: CHK_END_CODE 255 %EQ 0 @RCLEND
Command: DONE The APM in job 2 now terminates. There is no instantaneous impact on the other two jobs.

[Assuming no input is immediately present]

The ACTIVE SCHEDULER takes over, and begins by examining Job 0. As Job 0 is now active and has no special input requirements, it is now executed.

Job 0 - APM begins executing at previous WAITFOR_JOB command, where it was suspended.

Command: WAITFOR_JOB 00000100B

As job 2 (specified in bitmap), is now complete, execution continues to the next command.

Command: DONE

Job 0 now terminates. As it is the main APM, part of the termination process involves killing Job 1 which is running the Hangup key monitoring APM, and is the only other APM. It also selects the new CUR.STATE which was specified in the state-table, namely the READY state.

All APMs have now terminated, and the terminal is in the appropriate state.

TABLE XXXXI

Interface Between ZAPD System and AMX Operating System (Opsys Calls)

```
;
;
;                    VERI-FONE OPSYS
;         Veri-Fone Operating System Version 0.1
;                       NUCLEUS
;                    (Calls 0-29)
;
;
;
;  A. Operating System Nucleus Calls
;      0    System Reset. (Cold Start) (COLDBT)
;      1    System Reset. (Warm Start) (WARMBT)
;      2    Get system identification. (SYSID)
;      3    Set system current time and date. (oTDSET)
;      4    Get system current time and date. (oTDGET)
;      5    Format time and/or date as an ASCII
;           string into a character buffer according to
;           the caller's format specification parameter.
;           (oTDFMT).
;      6    Generate a Sound with the Programmable
;           Sound Generator (PSG). (SOUND)
;      7    Dedicated software timing loop (WAITLP)
;           (single task only)
;      8    Error Beep. (BEEP)
;      9    Reserved.
;
;  CALL 0: System reset (COLD Start)
(Call 0 would not be used by an applications programmer
and is not used within the ZAPD language)
;  (CALL 1: System reset (Warm Start)
(Call 1 would not be used by an applications programmer
and is not used within the ZAPD language)
;  CALL 2: Get system identification (SYSID)
(Call 2 would not be used by an applications programmer
and is not used within the ZAPD language)
;  CALL 3: Set Current system time and/or date.
;
;  3  Set Current System Date And/Or Time
;  PURPOSE:   This call is used to initialize the ZON time
;             of day clock. Because of the inherent ac-
;             curacy of the CTC timer used to drive the
```

TABLE XXXXI-continued

Interface Between ZAPD System and AMX Operating System (Opsys Calls)

```
;            clock, the clock will probably be plus or mi-
;            nus 20 seconds per day. This suggests that
;            the clock be reinitialized at the start of each
;            day.
;
;   CALLING SEQUENCE:
;          #define oTDSET 3;
;          char errcode;
;          char now = 13,'101784173000'; 10/17/84 at 17:30:00
;
;          errcode = opsys (oTDSET, now, §format  );
;
;   INPUT:
;      The character string sent to the routine is a counted
;      string. If ZAPD 2.0 is being supported, there are two
;      possible formats for the clock input:
;
;        format = 0: MM   DD   YY   HH   MM   SS
;        format = 1: YY   MM   DD   HH   MM   SS
;
;      If ZAPD 2.0 is not being supported, format 0 is the
;      only format supported, and the second parameter is
;      ignored, if present.
;
;      In both formats, there are no spaces.
;
;      NOTE: Internally the data are manipulated as
;      MM DD YY  HH MM SS.
;
;      On entry, the stack will look like this:
;
;          AZTEC BC Register              SP+0    SP+1
;          Application Return Address     SP+2    SP+3
;          Opsys Call Number              SP+4    SP+5
;          Address of Time/Date String    SP+6    SP+7
;          Clock Format Specifier         SP+8    SP+9
;
;   OUTPUT:
;          The operating system does not yet check the validity
;          of the call.
;----------------------------------------------------------------
;   CALL 4: Get Current system time and/or date.
;
;   4  Get Current System Date And/Or Time
;   PURPOSE: This call is used to determine the time of day.
;
;   CALLING SEQUENCE:
;      #define oTDGET 4;
;      char errcode;
;
;      Addr.TOD = opsys (oTDSET, §format  );
;
;   INPUT:
;      If the ZAPD 2.0 interpreter is supported, the clock
;      format can be modified. Two possible formats
;      are supported:
;
;        format = 0: MM   DD   YY   HH   MM   SS
;        format = 1: YY   MM   DD   HH   MM   SS
;
;      On entry, the stack will look like this:
;          AZTEC BC Register              SP+0    SP+1
;          Application Return Address     SP+2    SP+3
;          Opsys Call Number              SP+4    SP+5
;          Clock Format                   SP+6    SP+7
;
;   OUTPUT:
;      Returns the address of the counted string containing
;      an updated time of day. The format of the string
;      is MMDDYYHHMMSS if ZAPD 2.0 is not being sup-
;      ported, OR the clock format variable is zero.
;          MMDDYY is month, day and year
;          HHMMSS is hour, minute and second
;
;   If ZAPD 2.0 is being supported AND the Clock format
;   variable is one, then the format is
;          YYMMDD is year, month, and day
;          HHMMSS is hour, minute and second.
;
;   NOTE:    The time of day is not computed except when
;            this opsys routine is called. The ASCII counted
;            string for this call remains constant between
;            calls to the time of day clock.
;
;----------------------------------------------------------------
;   CALL 5: Format Date and Time
(Call 5 is not currently implemented or used in the
implementation of the ZAPD language)
;   CALL 6: Send a Sound to the PSG.
;
;   6  Generate a Sound with the Programmable Sound
;   Generator. (PSG)
;
;   PURPOSE:   The application programmer defines a sound
;              with a table entry. The operating system
;              plays that sound
;
;   PROC:      1. Registers are setup for MUZIK subroutine.
;              2. MUZIK sets up each tone. Each tone is
;                 defined in a specific tone table. The tone table
;                 may have one to 255 setup statements for the
;                 PSG.
;              3. The tones are setup by the TONBLK
;                 routine.
;              4. TONBLK calls AYOUT to send each instruc-
;                 tion.
;
;   CALLING SEQUENCE:
;          #define SOUND 6;
;          char errcode;
;          int mary__had__little__lamb;
;          errcode = opsys (SOUND, &mary__had__little__lamb);
;
;   INPUT:
;      &mary__had__little__lamb = Address of the beginning
;      byte of the music definition block.
;
;      On entry, the stack will look like this:
;          AZTEC BC Register              SP+0    SP+1
;          Application Return Address     SP+2    SP+3
;          Opsys Call Number              SP+4    SP+5
;          Address of Sound Block Begin   SP+6    SP+7
;
;   OUTPUT: {Error Code}
;      0 = Successful return.
;
;   REGISTERS MODIFIED: A, HL.
;
;   ERRORS DETECTED:
;      None.
;----------------------------------------------------------------
;   CALL 7: WAIT for specific period of time.
;
;   7  Wait Period of Time (in milliseconds) for Event
;
;   PURPOSE:
;      Dedicated software timing loop. Can wait from 1 ms to
;      64K ms (appox 1 minute). CAUTION: This call should
;      ONLY be used for single task timing. All interrupts are
;      disabled by this call and no other task can run. When
;      software WAITS are required which allow the CPU to
;      continue operation during the waiting period, use the
;      subroutine WAITCT.
;
;   CALLING SEQUENCE
;          #define WAITLP 7
;          .
;          .
;          .
;          char errcode;
;          double int time;
;
;          errcode = opsys(WAITLP,time);
;
;   INPUT:
;          time = # of milliseconds to wait.
;
;      On entry, the stack will be as follows:
;          Aztec BC Register              SP+0    SP+1
```

TABLE XXXXI-continued

Interface Between ZAPD System and AMX Operating System (Opsys Calls)

```
;            Application Program Return        SP+2     SP+3
;            Opsys Call Number                 SP+4     SP+5
;            Time (lsb)                        SP+6     SP+7
;            Time (msb)                        SP+8     SP+9
;
;   OUTPUT: ¦Errcode¦
;       0 = Successful return
;
;
;   8  Sound the Beep associated with an application error
;
;   PURPOSE:
;       To sound the error beep when an application error is made.
;   CALLING SEQUENCE
;           #define ERRBEEP 8
;
;           char errcode;
;           double int time;
;
;           errcode = opsys(ERRBEEP);
;   INPUT: (None)
;       On entry, the stack will be as follows:
;           Aztec BC Register                  SP+0     SP+1
;           Application Program Return         SP+2     SP+3
;           Opsys Call Number                  SP+4     SP+5
;   OUIPUT: ¦Errcode¦
;       0 = Successful return
;
;   CALL 9: Reserved
(Call 9 is not used, reserved for later use)
;   CALLS 10-29: Reserved
(None of calls 10-29 are used, reserved for later use)
;   OPSYSMEM - Opsys calls for memory manager.
;   CALLS 30-39
;
;       PURPOSE:    Used as data storage mechanism for
;                   storing information in records and files
;                   using different compression routines.
;
;       GENERAL CALLING SEQUENCE:
;         opsysmem(opfunc, filenum, recnum, buffer, len)
;             where opfunc = GETMEM for retreiving info
;                            from memory.
;                          = PUTMEM for storing info to
;                            memory.
;                          = DELMEM for turning entry to
;                            null string
;
;                 filenum = requested file number
;                 recnum = requested record number.
;                 buffer = A(data to be stored/retrieved)
;                 len = maximum length of record.
;
;
;       OUTPUT: HL contains the error code
;                   0 = success
;                 ¦¦0 = failure (see aperr.mac)
;
;               MEMORY MANAGEMENT CALLS
;
;    30  Read Record (memory to variable).
;       PURPOSE:    Read a specific record from a specific
;                   file, and store in application program
;                   variable.
;
; !2¦     PROC:  1. Find the record (Support routine FINREC)
;                2. Lock Record.
;                3. Decompress Record.
;                4. Unlock Record.
;                5. Transfer ASCII version to program
;                   variable.
;                6. Return error code of zero.
;
;    CALLING SEQUENCE:
;           #define GETMEM 30
;
;           char variable[ ], len;
;           int file, record;
;           char errcode;
;           .
;           .
;           .
;           errcode = opsys (GETMEN,¦file #¦,¦record #¦,
;                   ¦&variable¦,¦len¦);
;
;      INPUT:
;           ¦file #¦ =        Number of Application Data File
;                             to read. First application data
;                             file in memory is file zero.
;                             (Range is 0-127).
;           ¦record #¦ =      Record # to read. First record
;                             in a file is record zero.
;                             (Range is 0-511).
;           ¦&variable) =     Address of variable receiving
;                             data from memory.
;           ¦len¦ =           Maximum length of variable[ ].
;
;       On entry the stack will look like this:
;
;           Aztec C BC registers               SP+0     SP+1
;           Application Return Address         SP+2     SP+3
;           Opsys Call Number                  SP+4     SP+5
;           File #                             SP+6     SP+7
;           Record #                           SP+8     SP+9
;           A(Variable)                        SP+10    SP+11
;           Max Length of Variable             SP+12    SP+13
;
;       OUTPUT: ¦Error Code¦
;           0 = successful read.
;           1 = unsuccessful read. File Number out
;               of bounds.
;           2 = unsuccessful read. Record Number out
;               of bounds.
;           5 = unsuccessful read. Record is currently
;               locked.
;           9 = unsuccessful read. Record was truncated
;               to fit application variable.
;         255 = unsuccessful read. Fatal System Error
;               Occurred.
;
;   31  Write Record (Variable to Memory)
;
;
;      PURPOSE:     Write data currently stored in a variable
;                   to a specific application data file record.
;
;      PROC:        1. Compress Text
;                   2. Call Add Record
;                   3. Lock Record.
;                   4. Store compressed test.
;                   5. Unlock Record.
;                   6. Return zero error code.
;
;   CALLING SEQUENCE:
;           #define PUTMEM 31
;           char variable[ ];
;           int file, record;
;           char errcode;
;           .
;           .
;           .
;           errcode = opsys (PUTMEM,¦file #¦,¦record #¦,
;                   ¦&variable¦)
;
;      INPUT:
;           ¦file #¦ =        Number of Application Data File
;                             to read. First application data
;                             file in memory is file zero.
;                             (Range is 0-127)
;           ¦record #¦ =      Record # to write. First record
;                             in a file is record zero.
;                             (Range is 0-254).
;           ¦&variable¦ =     Address of first byte of the
;                             variable containing data.
```

TABLE XXXXI-continued

Interface Between ZAPD System and AMX Operating System (Opsys Calls)

On entry the stack will look like this:

| | | |
|---|---|---|
| Aztec C BC registers | SP+0 | SP+1 |
| Application Return Address | SP+2 | SP+3 |
| Opsys Call Number | SP+4 | SP+5 |
| File # | SP+6 | SP+7 |
| Record # | SP+8 | SP+9 |
| A(Variable) | SP+10 | SP+11 |

OUTPUT: errcode =
- 0 = successful write.
- 1 = unsuccessful write. File Number out of bounds.
- 2 = unsuccessful write. Record Number out of bounds.
- 3 = unsuccessful write. No room in data application file.
- 4 = unsuccessful write. Record is already locked, not free.
- 255 = unsuccessful write. System Error Occurred. @

32 Delete Record (Turn Record to Null String)

PURPOSE: Delete a record from a particular file by turning record contents to null string. Record still remains in the file but as a null string.

PROC:
1. Lock record.
2. Call DELREC.
3. Unlock record.
4. Return errorcode of zero.

CALLING SEQUENCE:
```
#define DELMEM 32
int file, record;
char errcode;
.
.
.
errcode = opsys (DELMEM,¦file #¦,¦record #¦)
```

INPUT:

¦file #¦ = Number of Application Data File to read. First application data file in memory is file zero. (Range is 0-127)

¦record #¦ = Record # to read. First record in a file is record zero. (Range is 0-254)

On entry the stack will look like this:

| | | |
|---|---|---|
| Aztec C BC registers | SP+0 | SP+1 |
| Application Return Address | SP+2 | SP+3 |
| Opsys Call Number | SP+4 | SP+5 |
| File # | SP+6 | SP+7 |
| Record Number | SP+8 | SP+9 |

OUTPUT: ¦Error Code¦

ERROR CODE:
- 0 = successful delete.
- 1 = unsuccessful delete. File Number out of bounds.
- 2 = unsuccessful delete. Record Number out of bounds.
- 255 = unsuccessful delete. System Error occurred. @

CALLS 33-39: Reserved
(None of calls 33-39 are used, reserved for later use)

VERI-FONE OPSYS
Veri-Fone Operating System Version 0.1

TABLE XXXXI-continued

Interface Between ZAPD System and AMX Operating System (Opsys Calls)

I/O CALLS
(Calls 40-49)

CONTENTS

A. Input/Output Calls

- 40 Get Data From Input Device. (GETINP)
- 41 Put Data to Requested Output Device(s). (PUTOUT)
- 42 Select Output Device(s) to which Input Will be Echoed. (SETECH)
- 43 Determine Output Device(s) to which Input Will be Echoed. (DETECH)
- 44 Inhibit or Re-enable Output to Device. (INHDEV)
- 45 Enable/Disable Input Device and set quantity of input desired from device. (SETIND)
- 46 Scroll Display left or right (SCROLL).
- 47 Backspace display (BACKSP).
- 48 Flush Output Buffer (Reset).
- 49 Reserved.

CALL 40: GET INPUT

PURPOSE: This call gets input from any given input device. The device has previously been selected with opsys call 45, and the number of records required by the operating system have been set.

PROCEDURE:
1. Set number of passes through opsys call 40 = 0.
2. Get the number of instructions on the application input circular list.
3. While the number of remaining instructions ¦¦ 0,
   a. Get instruction from bottom of list.
   b. Temporarily save the id # and error code.
   c. Compute the address of the full record buffer for the input device.
   d. If device has been activated by the opsys, and the device buffer indicates that a sufficient number of records exists,
      i. Store device number in INSRCE.
      ii. Copy to variable INPUT.
      iii. Adjust the full record buffer.
      iv. Adjust partial record buffer.
      v. Return
   e. Else
      i. Put device number and error code on top of the circular list.
      ii. Decrement the number of instructions remaining.
4. Increment the number of passes through opsys.
5. If the number of passes through opsys = 2, then
   a. Set errcode = system error.
   b. Return.
6 WAITM.
7. If device timed out, then
   a. Set errcode = timeout.
   b. Return.
8. An authorized input device has indicated that it has data. Goto step 3 to find out which device, and service it.

CALLING SEQUENCE:
```
#define GETINP 40;
char errcode;
int timeout;

errcode = opsys(GETINP, timeout);
```

INPUT:

timeout = amount of time to wait until timing out. Each unit is worth 10 ms.

INPCMD = Circular list containing the identifi-

TABLE XXXXI-continued

Interface Between ZAPD System and AMX Operating System (Opsys Calls)

cation number of the input device providing data (B), and the error code of the input process (C). If the input device is telco, then (C) contains the code for the telco event.

BUFFRC = Full record counter buffer. Created by either RDRPROC or DATAIN.

On entry, the stack will contain:

| | | |
|---|---|---|
| Aztec BC Register | SP+0 | SP+1 |
| Return address to applic | SP+2 | SP+3 |
| Opsys Call Number | SP+4 | SP+5 |
| Timeout Duration (in 10 ms units) | SP+6 | SP+7 |

OUTPUT:

Returns TIMOUT when no input during specified timeout period. (see MISCEQU for latest value)

Error code, if any, for associated input.

INSRCE = variable indicating the identification code of the input device that provided the data. The code for this is as follows:
1 = Card Reader
2 = Keyboard
3 = Modem
4 = RS232
5 = PIN Pad
6 = Telco INPUT = Counted string variable where the count includes the count byte. If the input device is telco, this is a two byte counted string (count + telco code byte).
The telco code is as follows:

Telco Code:
1 = Handset up (offhook)
2 = Handset down (onhook)
3 = Incoming Ring (not yet implemented)
4 = Carrier Detect On
5 = Carrier Detect Off

---

41 Put Data to Requested Output Device(s). (PUTOUT)

PURPOSE: This call is used to send data from a variable to the specified output devices.

PROC:
1. Turn variable string into a counted string.
2. Send counted string to DEVOUT (!3¦) with WAIT (¦!3).

CALLING SEQUENCE:

```
#define PUTOUT 41;
char len, errcode;
int output_devices;
int passwd;
char string[ ];
.
.
.
len = string[0];
errcode = opsys(PUTOUT, ¦len¦, ¦&string¦,
        ¦output_devices¦, ¦passwd¦);
```

INPUT: len = length of the string sent. This length includes the 1 byte for the count.

&string = the variable to be outputted. The string is represented by a counted string. The string must have a leading space for the count. When the opsys input variable $INPUT is used, this automatically has the count placed in the correct location.

output_devices = the 16 bit flag variable indicating the output devices to receive the data:
Bit 0 - Display (Code = 1)
Bit 1 - Printer (Code = 2)
Bit 2 - Modem (Code = 4)
Bit 3 - RS232C (Code = 8)
Bit 4 - PIN Pad (Code = 16)
Bit 5-15: Reserved for Expansion passwd = Password to the output device IF the inhibit bit flag for the device has been set. Can be zero if the inhibit bit flag hasn't been set.

On input, the stack will look as follows:

| | | |
|---|---|---|
| Aztec C BC Registers | SP+0 | SP+1 |
| Return to Application Program | SP+2 | SP+3 |
| Opsys Call Number | SP+4 | SP+5 |
| Length of String | SP+6 | SP+7 |
| Address of String with Data | SP+8 | SP+9 |
| Output Display Bit flags | SP+10 | SP+11 |
| Output Password if inhibit | SP+12 | SP+13 |

OUTPUT:

errcode = 0 successful output
= 255 system error (FATAL)
= nonzero. This means the device for which the bit is set cannot currently accept data without overflowing the buffer. (e.g. if the return value was 18 decimal, both the printer and PIN Pad could not currently accept the output).

---

; CALL 42: Select Output Echo Devices
(Call 42 is not currently implemented or used in the implementation of the ZAPD language)

---

; CALL 43: Determine Output Echo Devices
(Call 43 is not currently implemented or used in the implementation of the ZAPD language)

---

; CALL 44: Inhibit or Re-enable Output to Device
(Call 44 is not currently implemented or used in the implementation of the ZAPD language)

---

; CALL 45 - Enable/Disable Input device and set input requirements for device.

PURPOSE: This operating system call is used to enable a device to accept input. After a cold or warm start, no input device is activated for input.

PROCEDURE:

1. Use input device number to find the Full Record Buffer Table Counter for the input device.

2. If the desired record number ¦¦ 128 then change the opsys record requirement for the device.

3. If the desired record number = 128, then the application program wants to flush the input device's buffers, reset full and partial record buffer counters, and then deactivate the input device.

a. Use the number of characters in the ASCII buffer to move the characters to the application input variable (INPUT).

b. Reset both partial and full record buffer counters.

c. Store INSRCE variable.

4. Exit.

CALLING SEQUENCE:

TABLE XXXXI-continued

Interface Between ZAPD System and AMX Operating System (Opsys Calls)

```
        #define SETINP 45;
        char errcode, inpdev, recnum;
        .
        .
        .
        errcode = opsys(SETINP, inpdev, recnum);

INPUT:
    inpdev = The input identification number for the device.
                1 = card reader
                2 = keyboard
                3 = modem
                4 = RS232
                5 =

    recnum = The desired number of records requested from
             the input device before the input device sig-
             nals the operating system that input data is
             available.

                0 = Deactivate this device for input. The
                    operating system will still collect in-
                    put from this device, but will not tell
                    the application program that this
                    device has input.

              1-4 = The number of records to collect
                    before telling the application program
                    that this input device has data.

               -1 = Tell the application program that this
                    device has data when any character
                    is entered. Data are not divided into
                    records, but one input packet is sent
                    at a time, usually this is one
                    character.

              128 = This tells the operating system call to
                    get all the data from a particular de-
                    vice, and then deactivate the device.
                    The data for the device will be
                    stored in the regular variables for
                    communicating with the application
                    program. (INSRCE and INPUT).

    On entry, the stack will appear as follows:
        Aztec BC Register               SP+0    SP+1
        Return address to applic        SP+2    SP+3
        Opsys Call Number               SP+4    SP+5
        Input Device Number             SP+6    SP+7
        Input Requirement for Dev       SP+8    SP+9

OUTPUT:

    errcode = 0 for successful completion.
```

---

```
CALL 46 -   Scroll the display.

PURPOSE:    This operating system call is used to scroll the
            display either left or right a specified number
            of spaces.

PROCEDURE:
    1.    Add the number of spaces requested to the
          WNDPNT variable. If result is negative, make
          result zero. If result is larger than the
          buffer size, make it the end of the buffer -16.

NOTE:   5/17/84 we added code to allow this opsys
        call to scroll right correctly when there are
        a large number of commas and periods. The code
        for scrolling backwards when there are a large
        number of commas and periods has NOT yet been
        added.

NOTE:   7/30/84 added code to allow this opsys call
        to scroll left when commas and periods are in
        display buffer.

CALLING SEQUENCE:

        #define SCROLL 46;
        char errcode, num__spaces;
        .
        .
        .
        errcode = opsys(SCROLL, num__spaces);

INPUT:
    num__spaces = the number of spaces the display
                  should scroll.
                  If num__spaces ¡ 0, display will
                  scroll left.
                  If num__spaces ¡ 0, display will
                  scroll right.
                  Can scroll right or left 127 spaces.

    Example:
      Assume that the display buffer has the following infor-
      mation, and that the characters underlined are being
      shown in the display:

          THIS IS A TEST OF THE ZON DISPLAY

    After issuing the command
        errcode = opsys(SCROLL, 5);
    the display would appear as follows:

          THIS IS A TEST OF THE ZON DISPLAY

    On entry, the stack will appear as follows:
        Aztec BC Register               SP+0    SP+1
        Return address to applic        SP+2    SP+3
        Opsys Call Number               SP+4    SP+5
        Number of spaces to move        SP+6    SP+7

OUTPUT:

    errcode = 0 for successful completion.
```

---

```
CALL 47 -   Backspace the display.

PURPOSE:    This operating system call is used to back-
            space the display.

PROCEDURE:
    1.    Subtract one from CURSOR.
    2.    If character to be deleted is a comma or
          period subtract one from CPCNT.
    3.    Replace deleted character with a space.
    4.    Subtract one from WNDPNT if this is greater
          than zero.

CALLING SEQUENCE:
        #define BACKSP 47;
        char errcode;
        .
        .
        .
        errcode = opsys(BACKSP);

INPUT: (None)
  This opsys call operates on the display database. The
  contiguous memory locations are as follows:
      CPCNT = # of commas and periods in the display
              buffer.
     CURSOR = A(Next available position)
     WNDPNT = A(Character which is the far left
              display position)
     DSPBUF = Actual display buffer.

  See DSPOUT.MAC for schematic diagram of display
```

TABLE XXXXI-continued

Interface Between ZAPD System and AMX Operating System (Opsys Calls)

variables.

On entry, the stack will appear as follows:

| | | |
|---|---|---|
| Aztec BC Register | SP+0 | SP+1 |
| Return address to applic | SP+2 | SP+3 |
| Opsys Call Number | SP+4 | SP+5 |

OUTPUT:

errcode = 0 for successful completion.

---

CALL 48 - Flush output buffer

PURPOSE: This operating system call is used to clear out an output buffer. It is used when output may have been sent to an output device such as a printer, and then the user requests to cancel the transaction. Some output remains to be sent, but this should be cancelled. The flush output buffer command resets the header for the output device.

PROCEDURE:

1. Disable interrupts.
2. Determine which output device buffer should be reset.
3. Reset the circular list for the output device buffer. NOTE: Does no hardware reset.

CALLING SEQUENCE:

```
#define FLUSHOUT 48;
char errcode;
int output_devices
.
.
.
errcode = opsys(FLUSHOUT,output_devices);
```

INPUT: (output_devices)

Sixteen bit flag variable indicating which output devices should be flushed or reset. The bit positions are as follows:

| | |
|---|---|
| Bit 0 - Display | (Code = 1) |
| 1 - Printer | (Code = 2) |
| 2 - Modem | (Code = 4) |
| 3 - RS232C | (Code = 8) |
| 4 - PIN Pad | (Code = 16) |
| 5-15 - Reserved | |

On entry, the stack will appear as follows:

| | | |
|---|---|---|
| Aztec BC Register | SP+0 | SP+1 |
| Return address to applic | SP+2 | SP+3 |
| Opsys Call Number | SP+4 | SP+5 |
| Bit Flag of Output Device | SP+6 | SP+7 |

OUTPUT:

errcode = 0 for successful completion.

---

CALL 49: Reserved (Call 49 is not used, reserved for later use)

---

CALLS 50-69: Reserved (None of calls 50-69 are used, reserved for later use)

---

VERI-FONE OPSYS

Veri-Fone Operating System Version 0.1

APPLICATION AND TELCO CALLS (Calls 70-127)

---

CONTENTS

TABLE XXXXI-continued

Interface Between ZAPD System and AMX Operating System (Opsys Calls)

A. Application Program Calls.

70-79 Reserved

80 Auto Dial complete telephone number. (DIALNM)
81 Hang up telephone (HANGUP)
82 Turn on speaker. (SPKON)
83 Turn off speaker. (SPKOFF)
84 Disable/Enable Handset. (XHNDST)
85 Prepare line for dialling. (PREPLN)
86 Dial single digit (MANDL)
87 Turn on/off DTMF detect. (XDTMF)
88 Grab telco line without cking if free (GRABLN) This is used for auto answer.

80-99 Reserved

100 Set Current Modem Parameters (MODCT) (not yet implemented)
101 Set Current Error Handling Control Table. (ERRHCT)
102 Set Current Block Structure Control Table. (BLKSCT)
103 Set Current Character Conversion Control Table. (CHRCCT)
104 Set Current Logon Dialog Table. (LOGNDT)
105 Set Current Transaction Table. (TRNST)
106 Drop modem carrier. (MODDRP)
107 Disable modem.
108 Open printer jaws (slip release disengaged so paper can be removed)
109 Select different card reader track (only works on units with dual track readers)

110-119 Reserved

---

CALLS 70-79: Reserved

None of calls 70-79 are used, reserved for later use)

---

CALL 80 - AUTO DIAL COMPLETE TELEPHONE NUMBER

PURPOSE: This operating system call is used to dial a telephone number with either pulse or tone dialling. Currently, the procedure uses blind dialling.

PROCEDURE:

0. Setup number to dial and call appropriate telco dialling routine.

CALLING SEQUENCE:

```
#define DIALNM 80;
char errcode;
char tellen;
char telnum[ ];
.
.
.
errcode = opsys(DIALNM, telnum[ ], tellen);
```

INPUT:

Line has already been obtained with call 85.

telnum[ ] = ASCII string containing telephone number to dial.

tellen = length of ASCII dialling string.

On entry, the stack is as follows:

| | | |
|---|---|---|
| Aztec BC Register | SP+0 | SP+1 |
| Application Return Adr | SP+2 | SP+3 |
| Opsys call number | SP+4 | SP+5 |
| A(ASCII String to Dial) | SP+6 | SP+7 |
| Length of ASCII String | SP+8 | SP+9 |

OUTPUT: errcode = 0 if dialling successful. Successful dialling is able to get a line, and no illegal characters in dialling string.

errcode = BADNUM if illegal telephone number is sent in the string.

= WAITLN if line is currently unavailable.

TABLE XXXXI-continued

Interface Between ZAPD System and AMX Operating System (Opsys Calls)

```
;        If unable to autodial, DLSTAT will be set to 3.
;     Output is contained in HL and zero flags are set
;     according to HL.
;---------------------------------------------------------
;  CALL 81 -     HANG UP TELEPHONE
;
;  PURPOSE:    This routine hangs up the telephone.
;
;  CALLING SEQUENCE:
;          #define HANGUP 81;
;          char errcode;
;          .
;          .
;          .
;          errcode = opsys(HANGUP);
;
;     On entry, the stack is as follows:
;          Aztec BC Register           SP+0     SP+1
;          Application Return Adr      SP+2     SP+3
;          Opsys call number           SP+4     SP+5
;---------------------------------------------------------
;  CALL 82 -     TURN ON SPEAKER
;
;  PURPOSE:    This routine turns on the speaker.
;
;  CALLING SEQUENCE:
;          #define SPKON 82;
;          char errcode;
;          .
;          .
;          .
;          errcode = opsys(SPKON);
;
;     On entry, the stack is as follows:
;          Aztec BC Register           SP+0     SP+1
;          Application Return Adr      SP+2     SP+3
;          Opsys call number           SP+4     SP+5
;---------------------------------------------------------
;  CALL 83 -     TURN OFF SPEAKER
;
;  PURPOSE:    This routine turns off the speaker.
;
;  CALLING SEQUENCE:
;          #define SPKOFF 83;
;          char errcode;
;          .
;          .
;          .
;          errcode = opsys(SPKOFF);
;
;     On entry, the stack is as follows:
;          Aztec BC Register           SP+0     SP+1
;          Application Return Adr      SP+2     SP+3
;          Opsys call number           SP+4     SP+5
;---------------------------------------------------------
;  CALL 84 -     Disable/Enable Handset.
;
;  PURPOSE:    This routine is used to disable the handset so
;              that it is yanked into ZON, rather than onto
;              the telephone line.
;
;  CALLING SEQUENCE:
;          #define XHNDST 84;
;          char errcode, switch;
;          .
;          .
;          .
;       errcode = opsys(XHNDST,switch);
;
;       switch =   0   for enable handset. Handset is
;                      connected to the telco line.
;              =  -1   for disable handset. Handset is
;                      yanked into the ZON base unit and
;                      is not connected to the telco line.
;
;     On entry, the stack is as follows:
;          Aztec BC Register           SP+0     SP+1
;          Application Return Adr      SP+2     SP+3
;          Opsys call number           SP+4     SP+5
;          Switch (Enable or Disable)  SP+6     SP+7
;---------------------------------------------------------
;  CALL 85 -     Prepare line for dialling.
;
;  PURPOSE:    This routine is primarily used for manual
;              dialling. It sees whether or not an outside
;              line is free, and if so, it grabs it.
;
;  PROCEDURE:
;      0.    Transfer A(Dialling String) to proper places.
;      1.    Set Handset Relay (HS) to zero.
;      2.    Set Voltage Test Relay (VT) to one.
;      3.    Set Voltage Test Flag (VTSTF) to FF.
;            Set Voltage Test Status (VTSTAT) to 0.
;      4.    Load unit wait and add 100 to it.
;      5.    Wait for 100+unit wait for voltage test
;            results.
;      6.    Set Voltage Test Flag (VTSTF) to zero.
;      7.    Turn VT Relay off.
;      8.    If voltage was high during the entire test,
;            a.  Pull in A lead relay.
;            b.  Wait 10 ms.
;            c.  Go on hook.
;            d.  Load DIALTY (Dial type: pulse or tone)
;            e.  Call appropriate dialling routine.
;            f.  Set return code to successful completion.
;            g.  Exit.
;      9.    If voltage dropped at any point during test,
;            a.  Set return code to failure.
;            b.  Exit.
;
;  CALLING SEQUENCE:
;          #define PREPLN 85;
;          char errcode;
;          .
;          .
;          .
;          errcode = opsys(PREPLN);
;
;     On entry, the stack is as follows:
;          Aztec BC Register           SP+0     SP+1
;          Application Return Adr      SP+2     SP+3
;          Opsys call number           SP+4     SP+5
;
;  INPUT:     None.
;  OUTPUT:    Returns 0 if successfully obtained line.
;                     WAITLN if line in use.
;                     DLSTAT = 3 if line in use.
;---------------------------------------------------------
;  CALL 86 -     Dial single digit.
;
;  PURPOSE:    This routine is primarily used for manual
;              dialling. It dials a single digit using
;              the currently enabled dialling technique.
;              OPSYS call 85 must be successfully executed
;              before dialling begins.
;
;              This routine needs to communicate with the
;              dialling routines so that it doesn't send
;              a digit to dial before the dialling routines
;              PDLOFF and TDLOFF are finished with
;              a string.
;  CALLING SEQUENCE:
;          #define MANDL 86;
;          char errcode;
;          char number;
;          .
;          .
;          .
;          errcode = opsys(MANDL,number);
;
;     On entry, the stack is as follows:
;          Aztec BC Register           SP+0     SP+1
;          Application Return Adr      SP+2     SP+3
;          Opsys call number           SP+4     SP+5
;          Number to dial              SP+6     SP+7
;
;  INPUT:     number = ASCII digit to dial
;  OUTPUT:    Returns 0 if successfully dialled number.
;             Returns BADNUM if illegal number to dial.
;                     DLSTAT = 3 if line in use.
```

TABLE XXXXI-continued

Interface Between ZAPD System and AMX Operating System (Opsys Calls)

```
;
; CALL 87: Turn DTMF detect On/Off
(Call 87 is not currently implemented or used in the
implementation of the ZAPD language)
; CALL 88 -    Grab Telco Line.
;
; PURPOSE:     This routine is used to grab the telco
;              line without first checking for correct
;              voltage. Used during auto answer.
;
; CALLING SEQUENCE:
;        #define GRABLN 88;
;        char errcode;
;          .
;          .
;          .
;        errcode = opsys(GRABLN);
;
;    On entry, the stack is as follows:
;        Aztec BC Register           SP+0    SP+1
;        Application Return Adr      SP+2    SP+3
;        Opsys call number           SP+4    SP+5
;
; INPUT:     None.
; OUTPUT:    Returns 0.
;
; CALLS 89-99: Reserved
(None of calls 89-99 are used, reserved for later use)
; CALLS 100-105: Set Control Table Functions
(None of calls 100-105 is currently implemented or used in the
implementation of the ZAPD language)
; CALL 106:    DISABLE MODEM CARRIER
;
; PURPOSE:     This call is used to drop the modem carrier from
;              the ZON.
; PROCEDURE:
;     1.       Turn RTS off.
;     2.       Set modem status as 1 (DTR low but waiting
;              for carrier).
;
; CALLING SEQUENCE:
;        #define MODDRP 106;
;        char errcode;
;          .
;          .
;          .
;        errcode = opsys(MODDRP);
;
; INPUT:     None.
;
;    On input, the stack is as follows:
;        Aztec BC Register           SP+0    SP+1
;        Application Return Adr      SP+2    SP+3
;        Opsys call number           SP+4    SP+5
;
; OUTPUT:    None. Errcode always returned as zero.
;
; CALL 107:    DISABLE MODEM
;
; PURPOSE:
;     This call is used to totally disable the modem.
;     DTR is brought high, and the TX and RX ports on
;     the DART Channel A (modem) are disabled.
;
; PROCEDURE:
;     1. Bring DTR, RTS, high.
;     2. Bring MODEMST back to zero.
;     3. Disable DART transmit and receive ports.
;
; CALLING SEQUENCE:
;        #define DISMOD 107;
;        char errcode;
;          .
;          .
;          .
;        errcode = opsys(DISMOD);
;
```

TABLE XXXXI-continued

Interface Between ZAPD System and AMX Operating System (Opsys Calls)

```
; INPUT:     None.
;
;    On input, the stack is as follows:
;        Aztec BC Register           SP+0    SP+1
;        Application Return Adr      SP+2    SP+3
;        Opsys call number           SP+4    SP+5
;
; OUTPUT:    None.
;            Errcode always equals zero.
;
; CALL 108 -   PRINTER SETUP / PRINTER
;              MODE CONTROL
;
; PURPOSE:
;     This call is used to prepare the printer for printing.
;     It's actual purpose is dependent upon the printer type
;     that has been conditionally assembled with the opsys.
;
;     For document only printers, this call issues
;     a form feed to send the document out of the printer.
;     For slip printers this call opens the printer jaws so that
;     the document can be removed. For slip printers,
;     the slip release mechanism must be disengaged before
;     paper can be removed from the printer.
;
;     If the printer is idle, this routine energizes the
;     printer, sends the necessary control character(s),
;     and then disables the printer.
;
;     If the printer is being used, this routine just adds
;     the control character(s) to the bottom of the circular
;     list, and then calls CANXMT.
;
; PROCEDURE:
;     The actual procedure is dependent upon the control
;     byte sent. The document and VFI Slip printer only
;     respond to a command byte of value = 1.
;
;     1.  IF Document Printer (Not Slip Printer)
;         a. Send Form Feed
;
;     2.  IF VFI Printer (Slip Printer)
;         a. Send a 0Ch to the printer.
;
;     3.  IF EATON Printer (Slip Printer)
;         Depending upon value of command byte
;         a. Send Clamp Relax Command Sequence. (=0)
;         b. Send a Clamp Release Command Sequence (=1)
;         c. Set for slip printer (=2)
;         d. Set for Document printer (=3)
;         e. Set for jaw clamp (=4)
;
; CALLING SEQUENCE:
;        #define OPNJAW 108;
;        char errcode;
;          .
;          .
;          .
;        errcode = opsys(OPNJAW, {command});
;
; INPUT:
;     {command} (optional parameter)
;        This input is used only for the EATON printer.
;         0 = Relax Command
;         1 = Release Command
;         2 = Set EATON printer so that it requires
;             a form to be inserted before printing
;             can begin.
;         3 = Set EATON printer so that no document
;             needs to be inserted before printing
;             can begin.
;         4 = Close EATON printer jaws.
;
;    NOTE:    If the opsys does not support EATON printer,
;             then ANY call to 108 will be interpreted as a
;             open jaw command.
;
;    On input, the stack is as follows:
```

TABLE XXXXII

Addresses Within ROM for Program Routines Not Charted or Discussed

This table includes the starting address of every routine in the ROM which is not flowcharted or discussed with some detail in the text.

| | |
|---|---|
| 0000 | RESTAR |
| 00AA | INTCHP |
| 00B5 | INTDRT |
| 00FB | DNTBR5 |
| 00FC | TBLSIO |
| 0106 | DNTAR5 |
| 0121 | C48TBL |
| 0169 | USRTBL |
| 017D | TBLTDB |
| 01FA | VFID |
| 01FA | ZAPD20 |
| 0200 | INTRP |
| 0200 | X0200 |
| 0234 | OPSYST |
| 0334 | KEY_BE |
| 0339 | NO_BEE |
| 033E | ERROR_ |
| 0363 | BEEPOF |
| 0369 | RINGIT |
| 0388 | AMTDT |
| 0388 | ROMTBL |
| 038A | AMTCBL |
| 038C | AMSYSQ |
| 038E | AMNUMQ |
| 0390 | AMCLKP |
| 0392 | AMNTMR |
| 0394 | AMTMRL |
| 0396 | AMTMRR |
| 0398 | AMISTK |
| 03F0 | VAPPOP |
| 0739 | CHEKZA |
| 07B3 | GETMEM |
| 07FF | PUTDIA |
| 084B | SHOW2D |
| 087A | ZAPDIN |
| 08B8 | OFFCLE |
| 0C5E | HLBITC |
| 0C77 | RETHL |
| 0C7A | HAVEIN |
| 0C87 | OK2RUN |
| 0C8F | UNIMPL |
| 0CB2 | ERPARM |
| 0CB7 | ERINDX |
| 0CBC | EROVFL |
| 0CC1 | EXECER |
| 0CC5 | AEXECE |
| 0D63 | MEMLOC |
| 0D77 | LOADRA |
| 0D8F | BUILDM |
| 0FEA | ZSTKPU |
| 1012 | ZSTKPO |
| 103E | ZSTKIN |
| 1057 | ZSTKFR |
| 106D | ZSTKAL |
| 108E | ZSTKRE |
| 10D0 | ZFREEL |
| 193C | ZASNUL |
| 193C | ZBKPOI |
| 193D | ZSABAC |
| 1942 | ZSAJOB |
| 197F | VALJB0 |
| 19A6 | ZSOJOB |
| 19AB | ZSOBAC |
| 19BE | ZCKJOB |
| 19D4 | ZWIJOB |
| 19E7 | ZWIWAI |
| 19ED | ZWIJUM |
| 19F4 | ZHLHAL |
| 1A02 | ZDNDON |
| 1A1C | ZSTEND |
| 1A23 | ZGTEND |
| 1A3D | ZCKEND |
| 1A6E | ZSTCUR |
| 1A78 | ZSTGOT |
| 1A7F | ZD_ACT |
| 1A8B | ZGTLOO |
| 1AA4 | ZIIINT |
| 1AA9 | ZCVB2I |
| 1AA9 | ZLAINT |
| 1AA9 | ZMVINT |
| 1AB4 | ZIIBYT |
| 1AB7 | ZCVI2B |
| 1AB7 | ZLABYT |
| 1AB7 | ZMVBYT |
| 1ABF | ZCKBYT |
| 1AC9 | ZCKCHA |
| 1AE0 | ZCKINT |
| 1AEA | ZCKIN1 |
| 1B02 | ZMVRAN |
| 1B09 | ZDCBYT |
| 1B15 | ZICBYT |
| 1B1A | ZDCINT |
| 1B2F | ZICINT |
| 1B3B | ZCLBYT |
| 1B44 | ZCLINT |
| 1BA8 | ZETBYT |
| 1BC0 | ZCTWCC |
| 1BD7 | ZSTWCC |
| 1BFC | ZCKLUH |
| 1C13 | ZSTFI2 |
| 1C1A | ZSTFIL |
| 1C21 | ZSTFI1 |

1C28 ZSTFI5
1C2F ZPUPAU
1C51 ZIPKEY
1C83 ZCKTEL
1CAF ZD_DIA
1CD1 ZCKDIA
1CE1 ZSTMC1
1D03 MDMORG
1D08 MDMANS
1D1B ZSTSPK
1D2C ZSTTEL
1D39 ZSTHSE
1D46 ZCKANS
1D5A ZCKPRT
1D67 ZCKPR1
1D74 ZSTPRI
1D8D ZGTDEV
1DE3 ZCKMOD
1DCA ZSTMOD
1DD1 ZGTMOD
1DD9 ZIIMEM
1DF2 CSZON
1DF6 ZERBEE
1DF9 ZSTCHI
1E13 ZFTBYT
1E1D ZFTINT
1E29 ZSOBYT
1E31 ZSCINT
1E3C ZGTADD
1E47 SETCMP
1E51 OPSTRT
1E59 OPLINK
1E69 OPDONE
1E73 ZAPREC
1E83 ZCKCKB
1E9A ZCKFIL
1EAE ZCKMEM
1EE9 ZCKZAP
1EC4 ZCKLRC
1EFC ZGTLRC
1F2E ZDCREC
1F3D ZEDOF_
1F49 ZGTCKB
1F57 ZGTDEF
1F6D ZGTFIL
1F79 ZGTMEM
1FA6 ZGTREC
1FBC ZICREC
1FC4 ZIIFIL
1FD7 ZIIREC
1FE3 ZLAREC
1FE3 ZPTREC
1FF3 ZPTDEF
2003 ZSTFI4
2010 ZSTFI6
2017 ZISBYT
2023 ZISCHA
2051 ZISSTR
207D ZISFLD
20FB ZDLREC
2107 FILREC
2111 FIL2RE
211B FIL3RE
2125 GETREC
2144 APPREC
2166 PUTREC
2178 DELREC
218A CNTREC
21C5 COMPCK
224B ZCTCLO
225C ZCKCLO
2281 ZGTCLO
228D ZIICLO
2297 ZLACLO
2297 ZPTCLO
22A1 SETCLK
22B8 FMTCLK
2392 ZIISTR
239C ZGTLEN
23A4 ZCTBYT
23CA ZCTCHA
23E9 ZLASTR
23E9 ZMVSTR
23F8 ZCTFLD
243C ZCTACC
2451 ZCTREC
2468 ZCTSEQ
247D ZCTLRC
24C4 ZCTSTR
24D6 ZCKLEN
24F6 ZCNSTR
25A3 ZCNBYT
2624 ZLAB2S
2638 ZCVB2S
265F ZLAI2S
2673 ZCVI2S
26FE ZCVST1
2753 ZCVSTR
277B ZCKINS
27A1 ZDLFLD
27B8 ZDSBAC
27C1 ZDSCLE
27C4 ZDSFLD
27D8 ZDSPRO
27F0 ZDSSTR
27F9 ZNEINP
27FC AZNEIN
2818 ZRVBYT
285F ZRVPAC
28E7 ZRVFLD
296C ZSNCHA
297A ZSNFLD

2993 ZSNSTR
29A1 ZSTFI3
29A8 ZTKINP
29B6 ZSTTIM
29BA AZSTTI
29C2 ZCKTIM
29CD AZCKTI
29FB CKSUBS
2A1B ERSUBS
2A20 ZBAGOT
2A27 ZBAROM
2A33 ZCLCAL
2A65 ZRTRET
2A88 ZILON
2A95 ZD_C_C
2ACA ZD_OPS
2B01 ZBAIF
2B2B ZBASWI
2B5A SUMBIT
2B60 ZBAIND
2B73 JMPHEX
2B81 ZBACAS
2BDF ZBARAN
2C42 ZCKPAS
2CE7 ZCMBYT
2CFB ZCMCHA
2D24 ZCMSTR
2D4C ZCMFLD
2D90 ZCPBYT
2D99 ZCPCHA
2DB1 ZCPFLD
2DFA ZCPSTR
2E21 ZPDBYT
2E2D ZPDCHA
2E93 NUMSRC
2EAF LEXCMP
2ED8 ZIIACC
2EF2 ZGTACC
2F13 ZPTACC
2F26 ZICACC
2F6F ZDCACC
2F8B ZCKACC
2FAA ZSMACC
2FD6 ZSMSTR
2FEA ZLAACC
2FFA ZIISEQ
301D ZGTSEQ
3030 ZPTSEQ
3036 ZICSEQ
3055 ZDCSEQ
309C ZCKSEQ
30A2 ZLASEQ
30A8 ZSTSEQ
30E4 ZERO_S
30E6 ZD_REC
312D ZD_STO
3179 ZGTEDI
3191 ZSTEDI
3197 ZIPEDI
319F ZD_DAT
31ED ZD_BLD
32F6 CHKSHI
3314 DE_SET
3318 ADE_SE
3354 ZFNBYT
3367 ZFNCHA
3374 ZFNBY1
338B ZFNCH1
33DF ZFNREC
3472 ZFNFLD
34D1 ZFNSTR
3504 STRMAT
3609 RDMODE
3643 PUTRCL
36EE OPS_SE
3700 CALLRS
3724 ANSMOD
372F ORGMOD
373A ACTR_G
378C GIVEUP
37CA HSETST
37F3 EMSG_
3815 REEVAL
38A6 APPINI
38B5 FMTAMT
38FA DECAMT
393D PW_EDI
3994 ALPHA_
39AD NUM_ED
39BE ALPHAN
39E2 TELENO
39EB USREDI
3A06 INTEGE
3ADE DEFMAP
3AFA SMAP
3B16 MAPCHA
3B6D AMOUNT
3C05 ENTER_
3C0A FIL4RE
3FD3 JCKHAN
3FD3 JTBEGI
3FD6 JDOSTR
3FD9 JDORCL
3FDC JGETFL
3FDF JOPSYS
3FE2 JERRBE
3FE5 JPUT1C
3FE8 JPUTMO
3FEB JPUTRS
3FEE JPUTDS
3FF1 JPUTCS
3FF4 JVALFI

```
3FF7 JVALRE
3FFA JDATA7
3FFD JDATA8
4000 SERNUM
4000 ZCN
4018 ZONULR
401A OPSYS_
4049 CAL003
408C CAL004
41B0 CAL006
41BF MUZIK
41D6 TONBLK
420F AYAOUT
4221 AYBOUT
4233 AYOUT
423D CAL007
424D VWAIT
4264 CTWAIT
427C WAIRET
4280 CAL008
4289 BEEP
429E CAL022
429E CAL018
429E CAL000
429E CAL001
429E CAL002
429E CAL005
429E CAL029
429E CAL009
429E CAL010
429E CAL011
429E CAL012
429E CAL013
429E CAL014
429E CAL015
429E CAL016
429E CAL017
429E CAL019
429E CAL020
429E CAL021
429E CAL023
429E CAL024
429E CAL025
429E CAL026
429E CAL027
429E CAL028
42A1 CAL032
42A1 CAL035
42A1 CAL030
42A1 CAL031
42A1 CAL033
42A1 CAL034
42A1 CAL036
42A1 CAL037
42A1 CAL038
42A1 CAL039
42A4 CAL040
43FF CAL041
4405 CAL042
4408 CAL043
440B CAL044
440E CAL045
4496 CAL046
44F0 CAL047
451C CAL048
4548 CAL049
454B CAL069
454B CAL066
454B CAL058
454B CAL062
454E CAL050
454B CAL054
454B CAL051
454B CAL052
454B CAL053
454B CAL055
454B CAL056
454B CAL057
454B CAL059
454B CAL060
454B CAL061
454B CAL063
454B CAL064
454B CAL065
454B CAL067
454B CAL068
454E CAL080
4603 CAL081
464C CAL082
4657 CAL083
4662 CAL084
4688 CAL085
46A1 CAL086
46C8 CAL088
46CE CAL106
46DC CAL107
46FD MDMOFF
4716 CAL108
474D CAL109
4750 WT10MS
475D CAL122
475D CAL123
475D CAL124
475D CAL126
475D CAL098
475D CAL117
475D CAL070
475D CAL071
475D CAL072
475D CAL073
475D CAL074
475D CAL075
```

| | |
|---|---|
| 475D | CAL076 |
| 475D | CAL077 |
| 475D | CAL078 |
| 475D | CAL079 |
| 475D | CAL087 |
| 475D | CAL094 |
| 475D | CAL099 |
| 475D | CAL121 |
| 475D | CAL100 |
| 475D | CAL101 |
| 475D | CAL102 |
| 475D | CAL090 |
| 475D | CAL103 |
| 475D | CAL104 |
| 475D | CAL105 |
| 475D | CAL127 |
| 475D | CAL113 |
| 475D | CAL125 |
| 475D | CAL089 |
| 475D | CAL091 |
| 475D | CAL092 |
| 475D | CAL093 |
| 475D | CAL095 |
| 475D | CAL096 |
| 475D | CAL097 |
| 475D | CAL110 |
| 475D | CAL111 |
| 475D | CAL112 |
| 475D | CAL114 |
| 475D | CAL115 |
| 475D | CAL116 |
| 475D | CAL118 |
| 475D | CAL119 |
| 475D | CAL120 |
| 4760 | VRCMIN |
| 47B6 | SYSVER |
| 47BF | INTERR |
| 47BF | DUMMY |
| 47C1 | JRET |
| 47C4 | PIOAI |
| 47D1 | PIOBI |
| 4824 | DRTAEX |
| 48A2 | DRTASP |
| 48B9 | DRTBSP |
| 48D2 | DRTBEX |
| 493E | CLKISP |
| 4989 | CLK001 |
| 4A75 | COL080 |
| 4BFA | CLK090 |
| 4C14 | SETTST |
| 4C82 | HSOFFH |
| 4C8C | HSONH |
| 4C96 | VTFAIL |
| 4C9B | VTPASS |
| 4CA7 | CDPASS |
| 4CAF | CDFAIL |
| 4CB2 | RGPASS |
| 4D1C | RGFAIL |
| 4D29 | HSFAIL |
| 4DA0 | KEYBRD |
| 4DE4 | U1IN |
| 4E1A | U2IN |
| 4E75 | RDRIN |
| 4EC4 | U1OUT |
| 4EDD | PRTPRM |
| 4EED | U2OUT |
| 4F05 | CANXMT |
| 4F22 | HNDUP |
| 4F4E | HNDDWN |
| 4F73 | HNDOPS |
| 4F8F | SYSTAT |
| 4F8F | TASK |
| 4FA3 | ZONERR |
| 501D | VDSPOT |
| 5095 | DISPLA |
| 5141 | SFTUAR |
| 5188 | DBFRST |
| 51A2 | VMDOUT |
| 51E2 | DR5OUT |
| 51ED | VRSOUT |
| 521C | VPNOUT |
| 5242 | PININT |
| 528F | PININ |
| 53D7 | VDVOUT |
| 54DB | VRDRPC |
| 5563 | BACKCR |
| 560B | ASCBFT |
| 5615 | VDTAIN |
| 56F1 | DTAI98 |
| 5797 | ZERPRA |
| 57F6 | VTRANS |
| 57F7 | TDLON |
| 57F7 | TIMER |
| 5829 | TDLOFF |
| 584C | DTMFTB |
| 58F0 | PDLON |
| 5926 | PDLOFF |
| 59A3 | POLTON |
| 59B0 | POLTOF |
| 59BB | POLOFH |
| 59C8 | START |
| 59CA | AMREV |
| 5A87 | INTSV |
| 5B35 | TEND |
| 5B80 | RESHD |
| 5B89 | STASK |
| 5BA6 | WAIT |
| 5BAF | WAITM |
| 5BCF | WAKE |
| 5BFA | AMGTCB |
| 5C2E | STTMR |
| 5C85 | CLRST |

| | |
|---|---|
| 5C93 | CXATL |
| 5CCF | CXABL |
| 5CEC | CXRTL |
| 5D21 | CXRBL |
| 5D3E | CWAIT_ |
| 5D42 | CWAITM |
| 5D57 | C8ATL |
| 5D5B | CLATL |
| 5D60 | C8ABL |
| 5D64 | CLABL |
| 5D69 | C8RTL |
| 5D6D | CLRTL |
| 5D72 | C8RBL |
| 5D76 | CLRBL |
| 5D7B | _CRTFD |
| 5DA9 | OPSYSM |
| 5F81 | _RNGCH |
| 5FE7 | _FILMA |
| 6029 | _FDTBE |
| 61FE | _DECMP |
| 631E | MSTRUD |
| 63CB | SLAVUD |
| 640D | CRC16 |
| 64AB | CDLUHN |
| 64FE | MATHPA |
| 65F9 | C_CALC |
| 6617 | CALINT |
| 662C | C_SETD |
| 6661 | C_BUIL |
| 66B7 | C_OPER |
| 67FE | C_CLEA |
| 6A2C | CLRENT |
| 6A59 | CTLSTR |
| 6A5D | PRNTST |
| 6A61 | CAPTST |
| 6E7A | GETPAR |
| 6EA5 | APNDCH |
| 6EAD | APCHR_ |
| 6FCC | PUT_DC |
| 6FE6 | RMV_DC |
| 7008 | ALFT_J |
| 7010 | LFT_JS |
| 7037 | BLNKFI |
| 703E | ZEROFI |
| 7043 | CHARFI |
| 7093 | C_LOAD |
| 7131 | C_CHKH |
| 7165 | C_PHON |
| 7184 | C_DIAL |
| 71AE | C_DOME |
| 71BE | C_LONG |
| 71D1 | C_REDI |
| 720C | ACHKFN |
| 7213 | AMODFI |
| 7230 | ACHKSE |
| 725D | ACHKBI |
| 7265 | ASECFI |
| 729A | ADSCFI |
| 72C2 | AFILVA |
| 72E7 | VALFIL |
| 72F4 | VALREC |
| 7309 | PRTCKR |
| 7310 | PRTCHK |
| 7316 | PRTCAN |
| 7326 | RETNZT |
| 732E | RETZTR |
| 7337 | GETLIN |
| 738A | MEMCLE |
| 738D | UD_STA |
| 738D | UD_ID_ |
| 7510 | ANY_KE |
| 76F2 | MATCHV |
| 7777 | ETXLRC |
| 7790 | ETXCRC |
| 77B1 | APPCRC |
| 77D6 | RCVPAC |
| 7890 | RCVBYT |
| 78A7 | ARCVBY |
| 78C2 | SNDBYT |
| 78D3 | SNDPAC |
| 792C | DATA7 |
| 7935 | DATA8 |
| 793E | MDMINI |
| 7976 | ROMBDY |
| 7983 | CHEKSU |
| 799C | ACOMPL |
| 79A4 | ASC2HX |
| 79C1 | SETBIT |
| 79E1 | CLRBIT |
| 7A01 | FETCHD |
| 7A08 | RLHL |
| 7A17 | ERRBEE |
| 7A20 | PUT1C_ |
| 7A5E | PUTDSP |
| 7A62 | APUTDS |
| 7A87 | PUTPRT |
| 7A87 | PUTRS2 |
| 7A8B | PUTMOD |
| 7A8F | PUTPIN |
| 7AA0 | SCROLL |
| 7ABD | PUTCST |
| 7AEE | COPYRI |
| 7B10 | CSTRCM |
| 7B25 | CSTRCO |
| 7B4C | CSTRCA |
| 7B7F | CSTRPO |
| 7BA6 | CATOI_ |
| 7BCE | ITOCA_ |
| 7C35 | RANDOM |
| 7C3B | CLRSCR |
| 7C48 | BLOCKM |
| 7C62 | CLEAR_ |

```
7C7E ISDIGI
7C90 HX2ASC
7CA6 COMPOP
7CEE ERRMEM
7D10 CMPSTR
7D2F MAX
7D33 .CM
7D3B .DV
7D4E .UD
7D55 .RM
7D7C .UM
7DBC .NT
7DC4 .OR
7DCC .RS
7DE5 .LS
7DF3 .SB
7DF7 .JMP
7E17 .UF
7E18 .UE
7E25 .UL
7E26 .UG
7E32 .UR
7E46 .MOVE
7E49 .ASAVE
7E65 PRCTYP
7E67 .AN
7E6F .CHL
7E70 .SAV
7E8D .EQ
7E95 .FALSE
7E9A .NE
7EA2 .TRUE
7EA8 .GE
7EA9 .LE
7EC3 .LT
7EC4 .GT
7EDD .ML
7EF3 .SWT
7F17 .XR
7F1F CHEKTO
7F3A FREEZE
7F41 LOOKUP
7FF5 ENDROM
```

TABLE XXXXIII

Object Code for Download Program Running
In Remote Computer

Main Program:

```
:10010000C3E320CDAB436F7079726967687420 28B0
:1001100043292031393835204 24F524C414E44203A
:100120004 96E6300060083420000000000000000EA
:10013000000000000000000000000000000000BF
:10014000000000000000000000000000000000AF
:100150000000000013577973652057592D3130302F27
:100160003230302F333030645018000 21B283000FA
:100170000000000000000000000000021B28300 00A
:1001800000000000000000000000000041B3D000013
:1001900030300000000000000000000120200403B7
:1001A000000000 21B2A4A0000001B313B3100021BE9
:1001B0004500000000 21B520000000000021B7400FA
:1001C000000000021B29550000021B2855000000 00FA
:1001D0007EB737C823F5E57ECDE901E1F13D20F496
:1001E000B7C9CD01020D0A00C96FE5CDA600C9FE51
:1001F00080DC6C02D48502E67F18EEE521EF011861
:100200004E521E9012214 02E1E3F5C5D57E23B717
:100210002607E5CDE901E118F4D1C1F1E3C97DB4C6
:10022000C83A240187878 7E3E3E3E3C501D204C129
:100230003D20F42B18E8CDD001D82ACE0118DFF5E7
:10024000C5D5E521A801CD360221A201CDD0012AD4
:10025000BA01D41E02E1D1C1F1C9F5C5D5E521B479
:100260000118E9F5C5D5E521AE0118E0F53AE00041
:10027000B72810C5D5E5AF32E00021C801CD360260
:10028000E1D1C1F1C9F53AE000FEFF28F6C5D5E598
:100290003EFF32E00021C20118E3F5C5D5E521BCDF
:1002A0000118DAF5C5D5E5E511F000218B01011043
:1002B0000EDB0D13A9E014F3A9C0182D5CDDD02CE
:1002C000D13A9F014F3A9D0183CDDD0221F000CD4F
:1002D000D0012AA001CD1E02E1D1C1F1C921F00057
:1002E00060009EB219B01343528021 2C91B1B2192
:1002F0000B0306032B0E2F0C9630FC86F579FE308F
:100300002801 1213F110EDC9010A64216B01C336F3
:1003100002217B01C336021103 00CD6003E6011800
:10032000061106 00CD60036F2600C9111200 18F4F3
:10033000110C001808110F001803110900E1C1E5A4
:100340003ADD00B7281AD5C5CDA0007CB5280FCD61
:10035000E203FE132008CDE203FE03CAD520C1D17B
:100360002A010019E922D20078 32DD0079B7280B82
:100370003EC33238 0021FC1F22390021A60311A000
:10038000000011800EDB021BE0311B800010C00ED12
:10039000B0AF6F6732D00022D40022D6003E7E324A
:1003A000D10032E000C9C31703C32103C33A03C31A
:1003B0003003C33503C32B03C33A03C32103C10076
:1003C000820043 00C400C500C100C5D5E5DDE5FDE0
:1003D000E5F56F2600E5CDA600F1FDE1DDE1E1D117
:1003E000C1C9C5D5E5DDE5FDE5CDA3007D18EB0E62
```

:1003F000FF180C0E00ED5BD200131AFE2028FA2124
:10040000650006O3CD7C041ACDA704FE413812FE18
:10041000051300E47131AFE3A200678D640131802C0
:100420001BAF215C0077230C0D28191ACD83042003
:10043000013FE3F280FFE2A280BFE2E2807060BCDA1
:1004400078041810060 8CD5F041AFE2E2006130645
:100450003CD5F042168000618360023 10FBC91A7B
:1004600000C0D2808FE3F2809FE2A280BCD830428FE
:100470000B77231310E9C9133E3F18023E20772360
:10048000010FCC9CDA704FE20380DE5C52199040153
:1004900000E00EDB1C1E1C9BFC9202E2C3B3A3D3F52
:1004A0002A5B5D3C3E7B7DFE61D8FE7BD0D620C9B9
:1004B0007CCDB5047DF51F1F1F1FCDBE04F1E60FD7
:1004C000C69027CE4027C3CA03AF37CB7CC07CB7CA
:1004D0007DC83EFFC932D800C5CDB01EC12A060076
:1004E000B7ED42DAA920EBD1F90100FC0922C600E0
:1004F000AF6F6722CE0032DC003EC332D90021DF6D
:100500002022DA00EB22CC00E9E52AC600B7ED4252
:1005100022C600ED5BC400B7ED5219EBE1DA761D9F
:10052000EDB0C92AC600EDB022C600D9C95E235677
:1005300023D55E2356234E2346E1C9DDE1EB1A4F56
:100540006002F6F26FF39F9EB03EDB0DDE9D11A74
:100550004F06002F6F26FF39F9EB03EDB0E9DDE11F
:10056000EB21E0FF39F9EBC504052805AF121310A4
:10057000FCEDB0C13E209091280647AF121310FC4D
:10058000DDE9DDE121E0FF39F90620AF772310FC3A
:10059000DDE9DDE145CDBB05B677DDE9DDE1D17D06
:1005A0009338F73C4F43CDBB055F41AFB3CB23300E
:1005B00006B67723AF1E0110F318DD78E6F80F0FAB
:1005C000FC6026F26003978E6073C47AF37171091
:1005D000FDC9E5D9EBE373237223D1732372237131
:1005E0002370C9DDE178EB21000044394EE5092391
:1005F000E3B9380179121323B728034FEDB0E1F9ED
:10060000DDE9DDE178210000 44394EE509235E2370
:100610005618DCDDE1EB6826004439EDB0212000FE
:1006200039F9DDE9DDE1212000395E235668260035
:100630004439EDB021220018E7DDE1EB782F6F2679
:10064000FF39F970234806 00EBEDB0DDE9B7ED5254
:1006500019D83E90C32820B7ED52B7ED42300309B8
:1006600019C93E91C32820B7ED52EB13EA7206F088
:100670001801F8110000C9D5EBB7ED52EBE118EB0A
:10068000B7ED52210100C82BC9CDE00B18F5CDB153
:100690000918F0B7ED52210100C02BC9CDE00B18AD
:1006A000F5CDB10918F0CD7307210100D02BC9CDCC
:1006B000E00B18F5CDB10918F0CD7307210100C882
:1006C000D82BC9CDE00B18F4CDB10918EFCD7307C5
:1006D000210000C8D823C9CDE00B18F4CDB109180A
:1006E000EFCD7307210100D82BC9CDE00B18F5CD54
:1006F000B10918F0545D4B42EB2100007AB73E106F
:1007000020035 33E0829EB29EB3001093D20F6C9AF
:100710007CB5CA040A7CAAF5CD8107EBCD8107EB35
:10072000444DAF676F3E11ED6AED42300209373F2D
:10073000CB13CB123D20F0EBF1F01848E5CD930739
:10074000CB3CCB1DD1EBCD1007EBCB7AC81835CD08
:100750006207C82910FDC9CD6207C8CB3CCB1D106C
:10076000FAC9EB7AB720087BFE10300347B7C9AF50

:10077000676FC9EB7CAA7CFA7F07BAC07DBBC9173B
:10078000C9CB7CC87C2F677D2F6F23C97DE6016FA5
:1007900026 00C9ED4BCA00ED5BC800C5D578414ABB
:1007A000531E001FCB18CB19CB1ACB1BE119EBE161
:1007B000ED4A444D21E9621922C800EB211936EDEA
:1007C0004A22CA00444DC90600111027CDE3071183
:1007D000E803CDE307116400CDE3071E0ACDE3076C
:1007E0007D180DAF3CED5230FB19043D200205C8C9
:1007F000C630DD7700DD23C9DD7E00D6244F210021
:1008000000200 2DD23DD7E00CDA704D6303829FE8E
:100810000A380E0C0D2021D607FE0A381BFE1030B8
:1008200017545D29D829D80C0D2002545D19D829F8
:10083000D85F160019D818CB79B7C87C87C9DDE115
:10084000E1E57D26002339 4E81381C77EB2100003D
:1008500044ED4239F9EBE503EDB0EBE12B1B4F031F
:10086000EDB8EB23F9DDE93E10C32A20DDE1CDC967
:100870000457E1CDDE095FE1E57D93381A141528B0
:1008800016BA38164A060060397B82545D3D6F60A7
:100890003979EDB8EB1809AF18033C6B2D260039F8
:1008A00077F9DDE9DDE1E1E57D26002339F96F2601
:1008B0000DDE9DDE121000054395E4B23E5195EDE
:1008C0004323E519E5FDE1D1E1799038103C4FC5AE
:1008D000D5E51ABE280CE1D1C1230D20F22100007C
:1008E000180E231310ECD1E1C121000039EBED52B9
:1008F000FDF9DDE9DDE1CDC9044FE1CDDE095FE1C0
:100900007E93381B0C0D2817913812F57E917706CF
:1009100000 05019545D09F13C4FEDB018021D73DD14
:10092000E9DDE1CDDE094FD1ED53E80021000039CA
:100930001AF5863803B838017812F1575E91382FCE
:1009400003C6F7A833804B87D3808789338269138lC
:10095000233CB7281FC5D52AE8005F1D16004219A1
:1009600009D1D5E55019EBE14FEDB8D1C118057AA1
:100970003C28194F78913CBB38017BB7280E2AE8F8
:1009800000060009EB210100394FEDB021000054B1
:10099000395E1319F9DDE9DDE1E12DC267086C2646
:1009A0000000DDE9210200 54395E13197E36012377F8
:1009B000C921040054395E4B23E5195E4323E51930
:1009C000E5FDE1D1E1AFB82804B9200878B9E1D15B
:1009D000FDF9D5E91ABE20F62313050D18E77CB7FB
:1009E0002003 7DB7C03E11C32A20CD0E0AD03E01A0
:1009F000C32820CD820A18F5CDAD0FCD980A18ED89
:100A0000D97DB7D93E02CA2820CDF60A18DFD9CB46
:100A100078D9C2890AD97DB7D9C8D9C5D5E5D97DD4
:100A2000B72005D9CBB81854C5CBF8AF08D9CBF847
:100A30007DD99528133006ED44083D08D9CD7B0BB0
:100A40002C3D20F9082801D9F1E680200FCD930B29
:100A50003025CD7C0BB72C201E371820CDC70B3F7F
:100A6000F528103801D9CDAD0BCB782009CD870BF7
:100A70002D20F6CD730BF13802CBB8B7D9E1D1C137
:100A8000D9C9D9CB78D9C2150ACD900ACD150AD8C3
:100A90002C2DC878EE8047C9D97DB7D9CA730B7D94
:100AA000B7C8D985D9CD4E0BC5D5E5DD39CD730B8A
:100AB000D92E05D93E08DD23DD6E0008CB1D30039D
:100AC000CD930BCD7C0B083D20F1D92DD920E5DD50
:100AD0006EFBCB78200908CD880B2C2D28012DF139
:100AE000F1F1B708F1D9C1E1D9DDE1CBB8B0472CBC

:100AF0002DCC730B08C97DB7C8D995D93FCD4E0B06
:100B0000E5E5E5DD39D92E05D93E0808CDC70B3816
:100B100003CDAD0B3FCB15083D200CDD7505DD2B5E
:100B2000D92DD9280E3E08CD870B30DF08CDAD0B6F
:100B3000B718E1CD870B3804CDC70B3FE1D1C1CB4E
:100B400078 2005CD880E189A2C20973718953806F1
:100B5000C6803806181BC68038176FDDE3D9E5C597
:100B600078CBF8D9A8E680F5CBF8DDE5DD210000EB
:100B7000C9E1D8AF6F474F575F67C9B7CB18CB19DB
:100B8000CB1ACB1BCB1CC9B7CB14CB13CB12CB11BD
:100B9000CB10C97CD984D9677BD98BD95F7AD98AA4
:100BA000D95779D989D94F78D988D947C97CD99467
:100BB000D9677BD99BD95F7AD99AD95779D999D9ED
:100BC0004F78D998D947C978D9B8D9C079D9B9D97E
:100BD000C07AD9BAD9C07BD9BBD9C07CD9BCD9C954
:100BE000D978D9A8F2EA0B7817C9CB782806CDF4C2
:100BF0000BC83FC97DD9BDD9C0B7C8C3C70B7DD607
:100C000081DA730B3CFE28D0D9C5D5E508CD730B2E
:100C1000837CD7C0B3D20F9D97CD9A4D9677BD985
:100C2000A3D95F7AD9A2D95779D9A1D94F78D9A0B8
:100C3000D947C37C0AD9C5D5E5D9CDAD0FD9CDFEED
:100C40000BD9CD820A18EB7DB7C8CB783E03C228FA
:100C500020CDAD0F7DC680CB2FC6806FD614F5D9C1
:100C6000C5D5E5CDF60ACD0E0A2DC5D5E5CD820A4E
:100C70007DE1D1C1D9E1D1C1E3BCE330E3F1D9C910
:100C8000D9CD8F0F2DCD820AD9CD8F0F2CD97DFED6
:100C90006CD8C5CBB8CDE00BC13809CDF60ACD353F
:100CA000CCD980ACB782803CD0E0AD92DD9CDE0EA
:100CB0000EF53803CD820AD92DD9CDE00B3805D9F3
:100CC0002CCD820A7DFE6C383BD901AA2A11AAAA32
:100CD000217FAACD980ADDE5DD21080D3E05CD3541
:100CE000FDDE1CDAD0FCD980ACD980AC5D5E5D978
:100CF000CDAD0F2D2DD92DCD0E0AD9E1D1C1D9CD34
:100D0000820A2C2CF12C2DC8D878EE8047C967AA0E
:100D10003F2B32D76EB62A1DEF38740DD0000DD0A0
:100D20007A88888888087EABAAAAAAAA2C2D3E04B5
:100D3000CA2820CB78C22820D9CD990FD97D2E8101
:100D400095F5CDF60AD9CD870FD9CD820AC5D5E55F
:100D5000D92CCD0E0AD9E1D1C1CDF60ADDE5DD21D0
:100D60008D0D3E06CD350FDDE12CD9CDA30F2DD94C
:100D7000CD0E0AF1C5D5E56F2600300125CD09104D
:100D8000D92CCD980AD9E1D1C1CD0E0A7DFE67DA02
:100D9000730BC97D8A9DD8891D7DE9A28B2E3A7D72
:100DA0008EE3388E637E49922449127ECDCCCCCC22
:100DB0004C7FABAAAAAA2AD9CDA30FD9B7CB78F575
:100DC000CBB8CDF60A7DFE883047C5D5E52CCDD110
:100DD0000FE5CB3CCB1D7DE1F5CD09102C2D280175
:100DE0002DD9F1E1D1C1F5CD820ADDE5DD21110E6C
:100DF0003E08CD4A0FDDE1F1300AF5D9CD990FD982
:100E0000CD980AF1856F3809F1C8D9CD870FC3F69F
:100E10000AE13E01C328206D2E1D11603170462C61
:100E2000FEE57F74367C89842177533CFFC32E7A9C
:100E3000D27D5B951D7C25B84658637E16FCEFFD80
:100E40007580D2F71772317DB7C8DDE5D9CD870F30
:100E5000D9AFCB782803 3CCBB8F5CDE00B3808D917
:100E6000CDF60AF1CBFFF5D901CF06118EE9217E2F

:100E70004AD9CDE00B3005CD2F0F184FDD21CF0E15
:100E80003E0208D9111200DD19CD740FD9CDE00B47
:100E9000380B083D20ECD9110C00DD19D9D9CD6FE4
:100EA0000FCBF8CD0E0AC5D5E5CD740FCD980AD974
:100EB000CD870FCD0E0AD9E1D1C1CDF60ADDE5CD42
:100EC0002F0FDDE1D9CD6F0FCD0E0AF117300AF5E6
:100ED000D9CD8F0F2DCD820AF1DDE1CB4FC8CBF8F4
:100EE000C97FE7CFCC13547FF6F4A230097F6AC1E3
:100EF000910A0680B59E8A6F4480822C3ACD138079
:100F00006AC1910A06810000000000008021A2DA0F68
:100F1000497DE8A28B2EBA7D8EE3388E637E49929E
:100F20002449927ECDCCCCCC4C7FABAAAAAAAADD18
:100F3000210B0F3E05C5D5E5F5CDAD0FCD980AF1D6
:100F4000CD4A0FD9E1D1C1C3980AF5D9CD6F0F1899
:100F500010F5D9C5D5E5CD6F0FCD0E0AD9E1D1C1B8
:100F6000D9CD980AF13D20E9D9CD870FC30E0A11DA
:100F70000600DD19DD6E00DD6601DD5E02DD560373
:100F8000DD4E04DD4605C9218100444C545CC90195
:100F90000F4911A2DA218221C90104351133F3214D
:100FA00081FAC901723111F7172180D2C9C5D5E57F
:100FB000D9E1D1C1C9CD930721800003E20CB782053
:100FC000DCB23CB12CB11CB102D3D20F06FCBB826
:100FD000C9CB78D9CD870F2802CBF82DCD0E0AB713
:100FE000CB7D281CCB7808CBF83E8FBD3816280661
:100FF000CD7B0B2C18F3CD7B0B086069C8C384072D
:10100000210000C93E92C328207CB5CA730BCB7C5B
:1010100008CD81073E90293DCB7C28FA444D110034
:1010200000626F08C0CBB8C9CDC904EB1E003804FC
:10103000FE1938181DCDC904D9CB78D91607280157
:101040001492300lAFFE0938023E093C57D5D9FD54
:10105000215D00DDE5CDEC10DDE1D14F7A3CCB7BAD
:1010600020108lF26C10FD360000180BFE0C3802C7
:101070003E0BD5CD8111D1CB7828053E2DCDE61084
:10108000CB7B2803610E00CB792805CDE41018072F
:10109000CDDA100DF290107AB728173E2ECDE6105B
:1010A000C2806CDE4101520F715FAB210CDDA1091
:1010B00018F7CB7BC83E45CDE6103E2BCB7C2806EF
:1010C0007CED44673E2DCDE6107C062F04D60A3019
:1010D000FBC63ADD7000DD23180CFD7E00FD23B752
:1010E0002004FD2B3E30DD7700DD23C9FDE52C2DEE
:1010F000200E060CFD360030FD2310F8AFC37E1124
:10110000C5CBB87DD9D6806F9F67114D00CDF6064F
:10111000110500197CFED920013CFD7700ED44CD7E
:1011200041127DFE813006CDB412FD3500CBF83E74
:1011300084952E002808CD7B0BCB1D3D20F8FD7E2D
:1011400000F53E0C08781F1F1FE60FC630FD7705
:1011500000FD2378E60F47C5D5E5CB25CD880BCB21
:1011600025CD880BEBE319D1E3ED5AEBE1E3ED4A32
:10117000444DE1CB25CD880B083D20C8F1C1FDE1F0
:10118000C9FDE5E15F1600197E3600FE35D81DFA6F
:101190009D112B7E3C77FE3AD8360018F13631236C
:1011A00036000CC9D9010000D9CD730BDD7E00CD0E
:1011B000A704FE2E200CD9CB7037C0CBF0D9DD238D
:1011C00018EAFE452821CD3A123054 08CDB412D881
:1011D00008D9C56F2600CD0910CDEA09D9C1D8CBF1
:1011E0007028010DD918D7CD1F12D8D9CBE0DD2337

:1011F000DD7E00FE2B2806FE2D2004CBE8DD23CD6E
:10120000037123FD84FDD23CD3712300ADD2357790F
:101210008787818782 4FCB68280479ED444FD9D9DD
:10122000079C680FE5AD8FEA63FD8C5DDE579CD4106
:1012300012DDE1D9C1D9C9DD7E00D6303FD0FE0A2A
:10124000C9F5B7F24812ED44F5CB3FCB3F3C21FA4C
:10125000FF110600193D20FCEBDD217812DD19CDD0
:10126000740FF1E6032808F5CDB412F13D20F8F132
:10127000B7F2980AD9C3F60A81000000000008E0078
:10128000000040 1C9B000020BC3EA80010A5D468B4
:10129000B604BFC91B0EC3ACC5EB782DD0CDCE1B99
:1012A000C253DEF978393F01EB2BA8ADC51DF8C953
:1012B0007BCE97407DB7C8CBF8C5D57CCD7B0BCD19
:1012C0007B0B8467E3ED5AEBE1E3ED4A444DE130FB
:1012D00006CD7C0B2C37C87DC6036FCBB8C90E0179
:1012E00018020E00CD40131ABE2008231310F879FF
:1012F000EE014F21400039F9692600DDE90E0118A1
:1013000020E00CD40130D2001EB0E001AB6BE20D8
:10131000E2231310F70E0118DACD40131AB6772323
:101320001310F9EBF9DDE9CD40131A2FA67723133B
:1013300010F818EFCD40131AA677231310F918E30D
:10134000FDE1DDE121000039EB2120004539FDE917
:10135000DDE1212100397EB72803AF18062B46CDE9
:10136000BE05A6212200039F9210000280123DDE96F
:101370003EAF32E800FDE12AD2000610CDE305AF12
:1013800012E122E200FDE57CB720063E2232D000C9
:10139000C93AE800E7280ACDB71320052AE200773A
:1013A000C9CDF3032AE2003600110C0019EB215CD1
:1013B000012400EDB0C9060621E713C5E50603C8
:1013C000ED5BD200131AFE2028FA1ACDA704962846
:1013D0000AE1C11104001910E3B7C9231310EBC1CE
:1013E000C11AFE3AC07EC9434F4EC154524DC14B43
:1013F0004244824C535443415558C4555352C53E00
:10140000AF32E800CD6A143AD000B7C02AE200CB70
:10141000AE7EE60FC0CD31143AD000B7C02AE2004C
:101420003AE800B701808028030140007123237O4F
:10143000C9CD5B142AE200110C0019EB3AE800B7A1
:1014400010F01280AD50E13CD0500D10116F1C5F3
:10145000CD0500C13CC07832D000C92AE200111885
:101460000190618360023 10FBC922E2007EE60FA1
:10147000C0CB76280A3E1ACDC716CD0D171803CB60
:101480007EC82AE200E5110C0019EB0E10CD050014
:10149000E13C20053EFF32D0003600C9E322E400E3
:1014A000E3E521C20022E200E1C9E322E400E322F5
:1014B000E200CB7EC03E0232D000C9E322E400E36A
:1014C00022E200CB76C03E0332D000C93EAFE32219
:1014D000E400E3E521C20022E200CBAEF5CDE91441
:1014E000F1B72803CDE201E1C9060021D1007EFE5B
:1014F0007F38023E7E4F367E2AD20022D40016006C
:10150000CDE203771E01FE082836FE7F28321DFE3D
:1015100018282DFE1B2829FE1A2836FE0D2838FE15
:1015200020301 1FE0320D93ADD00B728D3DD2AE4AC
:101530000C3172079BA28C87E1423CDCA0318C067
:1015400015FAFE142BCD010208200800 1D28B11841
:10155000EF040528AB1804040520043 61A1808CD3A
:10156000E201360D23360A2322D600C92AE2003AC8

```
:10157000D000B720797ECB6F2070E60F202E23237A
:101580007EB7F298150E14E5CDBB19E12808E511D8
:101590002E0019361AE1AF7734C62E5F1600197E79
:1015A000FE1A203D2AE2002323351835 3D201B2A50
:1015B000D400ED5BD600B7ED52380506FFCDEB1435
:1015C0002AD4007E2322D40018173D2006CDA30084
:1015D0007D180E3D3D2006CDAF007D1804CDB50031
:1015E0007D2AE200CBEE23772BC9237E2BC93E1A3E
:1015F000C9E52AE2007EE60FFE062827CD6C15FE1F
:1016000021300 8FE1A2804CBAE18F1115D00061E29
:10161000C5D5CD6C15D1C1FE213806CBAE12131045
:10162000EFAF12E1C9DD215D00DD7E00B7C8060025
:10163000FE2DC004DD23C93805DD7E00B7C83E108D
:1016400032D00037C9E5CD6C15CBAEE177C93EAFDE
:101650004FC5CDF115C1CD2516C8C5E5CDF807D1CB
:10166000C1CD3716D805CC8407EB730C0D200223AF
:1016700072EBC9CDF115CD2516C8C5E5CDA411D99C
:10168000E1C1CD3716D805D9CC900AD9C3D205E52A
:10169000EB0E00C5D5CD6C15D1C1FE0D280BFE1A81
:1016A0002807CBAE0C131210EAE171C9CD6C15FE00
:1016B0001A2813CBAEFE0A280DFE0D20EFCD6C15B7
:1016C000FE0A2002CBAEC92AE2004F3AD000B7C0D2
:1016D0007EE60F20102323E57EC62E5F16001971CB
:1016E000E134F01828FE062815E10600C5E53DCADC
:1016F000A6003D3DCAA9003DCAAC00C3B2002AE81D
:1017000003AEA00BEC8345E16001971C92AE20028
:1017100023237EB7C836000E15CDBB19C83EF03264
:10172000D000C97DC3C716C1D1C5DD2AD200CB7C8C
:101730002806CD8407EB180EEBCB7C2809CD840757
:10174000DD36002DDD23D5CDC707E1CDC904ED5B26
:10175000D200DDE5E1B7ED524DEB91380E280C4794
:10176000E53E20C5CDC716C110F7E1410405C87E8E
:10177000C5E5CDC716E1C12318F3C1D1D9E1D1C167
:10178000D9C5DD2AD200D5CD281018BEC1D1C5CD0E
:10179000C904CB4321A2170E0420BF21A6170E05B2
:1017A00018B854525545 46414C5345CDC904210201
:1017B0000394E23CD5A17D1F9D5C9E17E23B72878
:1017C000C477EC5E5CDC716E1C12310F5E93E0DF6
:1017D000CDC7163E0AC3C716110D01180D110D0015
:1017E0001808111A011803111A0022E200CB7E28F2
:1017F0001CD5CD6C15D1BB2810FE1A280CFE21304B
:101800000C14152808CBAE18E8210100C9210000EE
:10181000C93EAF32E800ED53E600CD7B183AD00068
:10182000B7C0CD31143AD000B7C02AE20036D02379
:1018300023771106001977237711240019772377 6E
:1018400011D6FF193AE800B7201BE5010400AFCD1F
:101850000A19E123234E23462AE600B7ED42C83E8B
:101860009032D000C9E5AF77237723ED5BE60073B4
:101870002372E10104003E03C30A1922E2007EE65E
:10188000C0C8CDAF192AE200112D0019AF77237718
:1018900011D4FF1977232301040 03E01CD0A19CD8D
:1018A000AF19C38214E322E400E322E2007EE6C023
:1018B000C03E0432D000C93AD000B7C0E5CD5B1AB3
:1018C000EBB7ED52E13010AFCD0A192AE200110852
:1018D00001934C02334C93E9932D000C93AD0002F
:1018E000B7C0E5CD5B1AB7ED523E0120102AE200E9
```

```
:1018F000110400193420042334280083E03E1CD0AE2
:101900001918C8E13EF232D000C932E900EB2AE2F0
:1019100000CB66282FCBA63AE900CB472818232313
:1019200007E2B2BB720103AE900CB4F201778B72039
:101930001379B7FA4419C5D50E21CDBB19D1C120F1
:1019400051 2AE2003AE900CB47280 2CBEE23237E5E
:1019500 0C62ED55F160019D1D62ECD9B19EDA0E26B
:1019600067193CF25D193D3CCD9B192AE20023 2307
:10197000E67F772016C5D5E5CDAF19E1D1C1201599
:10198000D5112B0019D134200 2233478B1C20E199D
:10199000EBC93E99013EF032D000C9F53AE900CBDF
:1019A000472801EBF1C922E200CDAF19C818E60EB5
:1019B000222AE200CBE6CB6EC8CBAE2AE200E5C518
:1019C000113000 19EB0E1ACD0500C1E1110C001900
:1019D000EBCD0500B7C9C1D1ED53E200C5E5CD5B44
:1019E0001AD1B7ED523840 2AE200010600094E2311
:1019F00046237323 72CD2D1A010400093001137D93
:101A0000E67F29EBED6AEB535C2AE200232377 01A2
:101A10002B00094E2346EBB7ED4209C8D5E5CDAF03
:101A200019D1E1722B73C93E9132D000C9D5D9E1E9
:101A3000D92100 00545D3E1029EBED6AEBD929D97C
:101A400030040930011 33D20EFC9CD5E1AB7ED52C5
:101A5000210000C023C9CD5E1AEBC92AE200 11049F
:101A600000195E235623D54E2346235E2356E1C933
:101A70003EAF32E800CDB11A3AD000B7C0CD311434
:101A80003AD000B7C02AE20036C0E5110C0019EBCD
:101A90000E23CD0500E1112D0019AF4E77234677B7
:101AA00011D6FF19712370233680237723772377 8C
:101AB000C922E2007EE6C0C8C382143E2218023E5C
:101AC0002144 4D21F00022E600DDE1D1E1DDE5C554
:101AD000CDFE1AC13AD000B7C02AF000ED42C83A94
:101AE000E900FE213E9928023EF032D000C93E2294
101AF0001 8023E2122E600DDE1C1D1E1DDE532E957
:101B000 00022E2007EE6C0CAB1182AE600AF7723C1
101B10007778B12839C5D50E1ACD05002AE2001113
:101B20000C0019EB3AE9004FCD0500D1C1B7201EDA
101B3000D52AE200112D0019342002 2334D121804E
:101B400 00019EB2AE60034200223340B18C32AE2E2
101B50000112D00194D234611DAFF19712370115F
101B6000FCFF19562B5EEBB7ED42D0EB712370C929
101B7000C1D1ED53E200C5E5CD5B1AD1B7ED52DA24
101B8000271A2AE20001080009732372012400 09C0
101B9000732372C9CD4D1CC0110C0019EB0E13CD6F
:101BA00005003CC0183FFDE12AD2000610CDE30538
101BB000AF12E1FDE5CD4D1CC0E5CDF303E1E5112C
:101BC0001C0019EB215C00010C00EDB0E1110C00D0
:101BD00019E5EB0E17CD0500D13C2809215C000169
:101BE0002400EDB0C93E0132D000C93EAF32E8005A
101BF000CD4D1CC03AD800B73E2128EB2AE2001197
101C0000 0C0019115C00012400EDB0115C000E0FF6
101C1000CD05003C28CF21341C11B0000 11900ED86
:101C2000B01100013AE800B72004ED5B010131007A
:101C300001C3B000D50E1ACD0500115C000E14CD05
:101C40000500D121800019EBB728E9183722E200FE
:101C50007EE60FC83E2032D000C922E600ED53E8F0
:101C600000EBE122E2004E7323467 2EBB7ED42280F
```

```
:101C70005AEB23115C003ADC001213010B00EDB0AB
:101C800006 18AF121310FCE5115C000E0FCD050015
:101C9000D13C283F2AE600227D00ED4BE800C5D567
:101CA0000E1ACD0500115C000E21CD0500D1C1B783
:101CB00020212A7D0023227D002180019EB0B7852
:101CC000B120DB115C000E10CD05002AE200110DE1
:101CD0000019E9DD2AE2003EF0C32A20CDC904FE46
:101CE00011D032DC00C922F000EBE1E322F2001354
:101CF00013137BE6FC5F21DE0022F800DD2ADE0004
:101D0000DD6E02DD66037DB42848ED52300FDD6ED6
:101D100000DD6601E5DD22F800DDE118E3200ADDE3
:101D20005E00DD5601DDE5181B4D44DD6E00DD660D
:101D30001DDE5DD19DD7500DD7401DD7102DD70A9
:101D40003DDE5D12AF800732372D12AF200732350
:101D50072C9DDE5E11922C4002AF000010400097E
:101D6000DDE5C109DA761DED4BC600ED420100004C
:101D7000210000DA311D3EFFC32820EBE1E37E2382
:101D800666F1313137BE6FC5FEB22F0002ADE0084
:101D9000E5DDE1B7ED523052DD6E00DD6601E5B7FD
:101DA000ED523004DDE118F0E1D5FDE1ED4BF0003E
:101DB000FD7102FD7003FD7500FD7401DD7300DD32
:101DC0007201DDE5E1DD4E02DD4603CD051E280989
:101DD000DD5E00DD5601D5DDE1DDE5E1DD4E02DD54
:101DE0004603DD5E00DD5601181B2ADE00ED53DEE2
:101DF0000D5DDE1DD7500DD7401ED4BF000DD7136
:101E00002DD7003EB09B7ED52C0D5FDE12AC40035
:101E1000B7ED52281BFD7E00DD7700FD7E01DD77EA
:101E20001FD6E02FD660309DD7502DD7403AFC9B5
:101E3000DDE5E122C40006043600 2310FBC9CD4CC9
:101E40001E2AF400C9CD4C1E2AF600C921000022 2A
:101E5000F40022F600DD2ADE00DD4E02DD460379C5
:101E6000B0281E2AF400922F4002AF600B7ED4239
:101E70003004ED43F600DD6E00DD6601E5DDE118BE
:101E8000D82AC60001FBFF09ED5BC400B7ED52D8AC
:101E9000EB2AF4001922F4002AF600B7ED52D0ED37
:101EA0053F600C9ED5BC400732372C95E2356EB81
:101EB00022C40022DE0006043600 2310FBC93EAF18
:101EC0004F22E800AF7732D000 7832EA002AE200F1
:101ED00022ED0021471F22E200E122E400E10C0D87
:101EE0002005CD27171803CD7A172AED0022E2002E
:101EF0002AE400E93EAF32EC0022E8002AE20022A8
:101F0000ED0021471F22E200E122E400E122EA0085
:101F1000215C00061ECDE305AF122AEA003AEC0070
:101F2000B72005CD4F161803CD731621D0007E368D
:101F30000B7676F2808DDE5E1115C00ED52EB2A80
:101F400E8007323721 8A3C600ED5F32CB00C9EB23
:101F5000DDE1C1E178B1280B730B78B12805545D40
:101F60013EDB0DDE9444DDDE1D1E178B128F4EDC8
:101F70005 21930ED0B09EB09EB03EDB8DDE955140F
:101F800152803CD9E1FDDE14F06002F6F26FF3978
:101F9000F97123EB0C0D2802EDB0DDE916 0021806C
:101FA00003E1F46B8300 2061F230E000405280D10
:101FB0007EFE202804FE092004230518EF5D040599
:101FC00280D7EFE202808FE092804230518EF7D31
:101FD0093280 40C1520D569260054C9D1C1D52DEC
:101FE0006125C3A3027DCDA7046FC92A0100191979
```

:101FF00019E921D0007E36006F2600C9CD17037C79
:10200000B5C83ADD00F5AF32DD00CD2103F132DD98
:10201000007DFE03C0DDE111010018113AD000B7C8
:10202000C8DDE15F16011805DDE15F1602D5CD7B45
:102030003D1AF32DD002ACE007CB5DDE5E1ED4B0A
:10204000CC00ED420115000922CE00B72007D5D5FE
:10205000E5CDD900D17AB72014CD01025E430D0A37
:1020600055736572206272656 16B00182B3D200B01
:10207000CD01020D0A492F4F00180ECD01020D0AA5
:102080005 2756E2D74696D6500CD01022065727206
:102090006F7220007BCDB504CD01022C2050433D52
:1020A00002ACE00CDB0041815CD01024E6F742069
:1020B000656E6F756768206D656D6F727900CD0113
:1020C000020D0A50726F6772616D2061626F7274E7
:1020D000656 40D0A003AD800B7CA6D27C30000E155
:1020E000D1D1E931000121C2EF010000CD6503210A
:1020F0002652119CE30142F03E01CDD504C3A65106
:10210000030003003B0007003D0003004E000700F2
:102110003000A00230017002E000A004E001700DB
:1021200003001400 4E00180003000A002700160 0E8
:102130002A000A004E00160003000A004F00170094
:102140000300030 03B0007003D0003004E000700B2
:10215000030014004E00170003000A004F00170090
:1021600003000300 4E0017000A0003004E00140095
:10217000140003004E000F001E0003004E000B0071
:10218000280003004E000900320003004E00070043
:1021900018486F737420506 86F6E65204E756D62BD
:1021A0006572732020202020184D6572636861 6 1BD
:1021B0006E742049646 56E746966696572732020 67
:1021C000202018507 26F746F636F6C2053706563BA
:1021D0006966696572732020202020185061 73732E
:1021E000776F7264205370656369666965727320E6
:1021F00020202020185573657220 4E616D65732074
:1022000020202020202020202020202020201855734E
:1022100065722050617373776F72647320202020 81
:10222000202020202020184 36F6E74726F6C20 5382
:102230007472696E6720537065636966696572 18A8
:102240005072 6F6D70747320202020202020202079
:1022500020202020202020201855736572205068EF
:102260006F6E65204E756D6265727320202020 2090
:10227000201800180018001800180018001800187E
:1022800001800630063006300630063006300 6381
:102290000063000630001010101010104434F4D315E
:1022A0004434F4D3204434F4D3104434F4D321DD3
:1022B000484159455320313230304 22028494E544C
:1022C00045524E414C204D4F44454D292 0001D485C
:1022D0004159455320534D313230302028455 85410
:1022E00045524E414C204D4F44454D29001D505202
:1022F0004F4D455448455553205052 4F4D4F44453E
:102300004D20202020202020202020202 0001D5155423B
:102310004945203132303 04D4220202020202020DD
:10232000202020202020202020202 0001E49424D2057
:102330004D6F6E6F6368726F6D6520446973706C6A
:1023400061792041646170746F721E49424D20476B
:10235000726170686963732041646170746F722088
:10236000202020202020202020201E49424D204D6F7B

:102370006E6F6368726F6D6520446973706C61790C
:1023800020416461707465721E49424D2047726132
:10239000706869637320416461707465722020 20DB
:1023A000202020202020202034A616E03466562031E
:1023B0004D617203417072034D6179034A756E037A
:1023C0004A756C0341756703536570034F637403 6B
:1023D0004E6F76034465630000000000000000000BB
:1023E000000000220200000000000000000002202069
:1023F00000000000000000000001000100010001 00D9
:1024000001000100010001000000B0000000000000 18
:10241000000000000000000001000200FD03030003B3
:1024200005F00100001000400080003021C050406
:10243000615A000FDE1E122E0E9FDE52AE0E9E57D
:1024400021000 0D1CD77067AB3CA5924D522D6E926
:102450002AD6E92BD11BC34724C9FDE1E122CEE9ED
:10246000E122D0E9E122D2E9E122D4E9FDE521052A
:1024700000E5210100D1CD8006CB45CA8E24CD9C3C
:1024800014CDBB17066F6820626F79CDCE17C9C314
:102490009C24001804440 5EA03C100102103002213
:1024A0001F24215F002221242110002223242 10146
:1024B0000E5210A00D1CD67067AB3CAE524D5220A
:1024C000BBE92A1F24E5219224E52ABBE92B110A46
:1024D00000CD4D06D1196E2600C1ED692ABBE92356
:1024E000D11BC3B9242A2324E52A2124C1ED69C9BB
:1024F0002A1F24E5210500C1ED692A1F24E5216872
:1025000000C1ED6921D007E5CD34242A1F24E5213F
:1025100000500C1ED692A1F24E521EA00C1ED69C962
:102520002A1F244DED6811000001 0001CD57067DE2
:1025300032A9E92A1F24E5210000C1ED6921C80064
:10254000E5CD34242A1F24E5211000C1ED692AA914
:10255000E92600E52A2924D17CA2677DA36FE52125
:1025600000000D1CD9306110000010200CD57067D79
:1025700032B2E92AB2E92600C92A1F244DED6811BA
:102580000000010001CD57067D329FE92A1F24E596
:1025900021000 0C1ED6921C800E5CD34242A1F24A3
:1025A000E5211000C1ED692A9FE92600E52A2724CC
:1025B000D17CA2677DA36FE5210000D1CD930611E8
:1025C00000000010200CD57067D32A8E92AA8E926BD
:1025D00000C9FDE1E1110000010001CD57067D3287
:1025E0009EE9FDE52A1924E52A9EE92600C1ED6948
:1025F000C92A1F244DED68223FEA2A1F24E5210045
:1026000000C1ED6921C800E5CD34242A1F24E5214D
:102610001000C1ED692A3FEAE52A2524D17CA26792
:102620007DA36FE5210000D1CD93061100000102CA
:1026300000CD57067D3293E92A93E92600C92A196D
:10264000244DED68223FEA2A1F24E5210000C1ED58
:102650006921C800E5CD34242A1F24E5211000C1DA
:10266000ED692A3FEAE52A5DEAD17CA2677DA36F86
:10267000110000010001CD57067D328AE92A8AE95E
:102680002600C9FDE1E1227FE9E11100000100011E
:10269000CD57067D3281E9FDE52A81E92600E52155
:1026A0000800D1CD4F072275E9210100E52108007E
:1026B000D1CD67067AB3CA3427D52273E92A75E9E2
:1026C000E52A7FE95E2356EBD17CAA677DAB6FE5F7
:1026D00021000 0D1CDE1061100000 10200CD570616
:1026E0007D3272E92A7FE95E2356EBE5210100D1B4

:1026F000CD4F07EB2A7FE97323722A72E92600CBBC
:1027000045CA1D27210580E52A7FE95E2356EBD1C6
:102710007CAA677DAB6FEB2A7FE97323722A75E988
:10272000E5210100D1CD4F072275E92A73E923D1B4
:102730001BC3B426C92A0E242600E52A1124E5214C
:102740000000D1CD8006D17DA36FCB45CA62272181
:1027500001001100000102 00CD57067D3271E9C36E
:1027600072272100001100000102 00CD57067D32C2
:1027700071E92A71E92600C9CDA000E5CD3527D140
:102780007DB36FCB45CA9B2721010011000000102D8
:1027900000CD57067D3268E9C3AB272100001100 48
:1027A0000000010200CD57067D3268E92A0F24260079
:1027B000CB45CAD127CD20257DEE016FCB45CAD1AF
:1027C00027210100110000010200CD57067D32686B
:1027D000E92A68E92600C9CD78277DEE016FCB454F
:1027E000CA0C28CDF125CB45CA0928CD3E261100BB
:1027F0000000010001CD57067D3235EACD3E26E521A8
:102800000800D1CD4F0722F8E9C3D727CD78277D1F
:10281000EE016FCB45CA4428CDF125CB45CA4128EE
:10282000CD3E26110000010001CD57067D3235EA6C
:102830002AF8E9E5CD3E26D17CB2677DB36F22F858
:10284000E9C30C28C9CD7827E5CDF125D17DB36F3B
:102850007DEE016FCB45CA5C28C34528CDF125CB61
:1028600045CA6A28CD3E2622F4E9C9CD7827E5CDB0
:102870007925D17DB36F7DEE016FCB45CA8228C328
:102880006B28CD7925CB45CA94282AFAE96C260015
:10289000E5CDD225CD7827E5CD7925D17DB36F7DE6
:1028A000EE016FCB45CAAB28C39428CD7925CB4523
:1028B000CABC282AFAE92600E5CDD225C92AFAE9B8
:1028C0006C2600E52AF8E96C2600D1CD8006CB45C0
:1028D000CA0A292AFAE92600E52AF8E92600D1CD14
:1028E0008006CB45CAFA28210100110000010200 30
:1028F000CD57067D3247E9C30A29210000110000A7
:102900000010200CD57067D3247E92A47E92600C972
:10291000CD7827E5CDF125D17DB36F7DEE016FCB6D
:1029200045CA2729C31029CDF125CB45CA7629CD23
:102930003E26110000010001CD57067D3235EA2AFE
:1029400035EA2600E52A30242600D1CD8006CB4585
:10295000CA66292101001100000102 00CD57067D41
:10296000323EE9C376292100001100000102 00CDAA
:1029700057067D323EE92A3EE92600C92100 0022A1
:10298000FAE9CD4E050006FF215EECCDE305CDF161
:1029900025CB45CAA629CD3E26110000010001CD58
:1029A00057067D3235EA2A35EA2600E52A2C242608
:1029B0000D1CD8006E5CD7827D17DB36FCB45CA58
:1029C0008E29CDF125CB45CA152ACD3E2611000012
:1029D000010001CD57067D3235EA215EECCD3B0585
:1029E0002A35EA2600652E01E5CD3E0806FF215E68
:1029F000ECCDE3052A35EA2600E52A2B242600D172
:102A0000CD9306CB45CA152A2A35EA2600E521FAD8
:102A1000E9E5CD83262A35EA2600E52A2B2426007F
:102A2000D1CD8006E5CD7827D17DB36FCB45CAC225
:102A300029C9CD7827E5CD7925D17DB36F7DEE010C
:102A40006FCB45CA492AC3322ACD7925CB45CA5A0C
:102A50002A2A2B242600E5CDD225C921000022FAFE
:102A6000E9CD7827E5CD7925D17DB36F7DEE016F76

:102A7000CB45CA782AC3612ACD7925CB45CA892A94
:102A80002A2C242600E5CDD225210100E5215EEB8C
:102A9000CD3B05CDA408D1CD67067AB3CAFB2AD5B4
:102AA000221CE9215EEBE52A1CE9110001CD4D064F
:102AB000D1196E2600E521FAE9E5CD8326CD7827E8
:102AC000E5CD7925D17DB36F7DEE016FCB45CAD4BD
:102AD0002AC3BD2ACD7925CB45CAF22A215EEBE572
:102AE0002A1CE9110001CD4D06D1196E2600E5CD55
:102AF000D2252A1CE923D11BC39A2AC9210100E54A
:102B0000210600D1CD67067AB3CA492BD5223FEA08
:102B1000215DEEE52A3FEA2B118000CD4D06D1194B
:102B2000E5219522E52A3FEA2B110600CD4D06D17D
:102B3000196E2600110000010001CD5706EBE1736C
:102B40002A3FEA23D11BC3072B21FDEDE5CD4E051E
:102B50000B5A434F4E4649472E535953CD711321BB
:102B6000FDEDCD701A21FDEDE5215DEEE5210100C1
:102B7000CDBB1A21FDEDCDB11AC9CD4E050B5A437F
:102B80004F4E4649472E535953060E21EEEDCDE3E5
:102B900005212DEEE521EEEDCD3B05CD7113212D67
:102BA000EECD711A212DEEE5215DEEE5210100E566
:102BB0002158EBCDF21A212DEECDB11A210100E5FD
:102BC000210600D1CD67067AB3CA092CD5223FEA87
:102BD000219522E52A3FEA2B110600CD4D06D11999
:102BE000E5215DEEE52A3FEA2B118000CD4D06D1AF
:102BF000196E2600110000010001CD5706EBE173AC
:102C00002A3FEA23D11BC3C72BC92155002245EA1D
:102C1000210900110000010001CD57067D3237EA7D
:102C2000210900110000010001CD57067D3236EA6E
:102C3000C92100002224BEA2100002249EA210000BC
:102C40002247EAC9CD0A2CCD312C210100E5210112
:102C500000E5215000E5211900E5CD5A24210400AA
:102C6000E5211800CDDC1FCD9C14212000CD2317B9
:102C700021A723E52A37EA26002B110C00CD4D06AB
:102C80002929D119CD3B05210000CDAB172120000A
:102C9000CD23172A36EA2600E5210200CD2717CDDD
:102CA000BB17022C202A45EAE5210000CD27172179
:102CB0002000CD23172A4BEACD9C14E5210200CD3C
:102CC0002717213A00CD23172A49EAE5210200CD32
:102CD0002717213A00CD23172A47EAE5210200CD24
:102CE0002717212000CD2317210100E5210100CD68
:102CF000DC1FC9CD9C14211B00CD2317216000CD02
:102D00002317213000CD2317C9CD9C14211B00CDE2
:102D10002317216000CD2317213100CD2317C9FDD2
:102D2000E1E110000010001CD57067D32E3E8FD2D
:102D3000E5210500E5210F00CDDC1FCD9C14CDBBA6
:102D4000170D696E206765745F66756E6B6579CD6A
:102D5000CE1721D7E8CDCC140603CD8F1621050060
:102D6000E5211000CDDC1FCD9A02CD9C14CDBB1700
:102D700006647566D6D793D21D7E8CD3B05210000D6
:102D8000CDAB17CDCE1721D7E8E521010011040006
:102D9000CD4D06D1196E2600E5211B00D1CD800650
:102DA000CB45CAD02DCDA000CB45CAC02D210100F6
:102DB000110000010200CD57067D3230EAC3D02D4C
:102DC000210000110000010200CD57067D3230EADB
:102DD0002A30EA2600CB45CAE62DCD9C14CDBB1780
:102DE00005666756E6B79C9FDE1E122D5E8FDE52147

```
:102DF00000021E52AD5E82B110800CD4D0629292907
:102E0000D119E52101002B110400CD4D0629D1195E
:102E10005E2356EBE5210021E52AD5E82B110800B9
:102E2000CD4D06292929D119E52102002B110400D5
:102E3000CD4D0629D1195E2356EBE5210021E52A67
:102E4000D5E82B110800CD4D06292929D119E521F6
:102E500003002B110400CD4D0629D1195E2356EB3A
:102E6000E5210021E52AD5E82B110800CD4D0629E2
:102E70002929D119E52104002B110400CD4D062983
:102E8000D1195E2356EBE5CD5A24C9FDE1E122CBF1
:102E9000E8FDE5216021E52ACBE82B110600CD4DA8
:102EA00006292929D119E52101002B110400CD4D56
:102EB0000629D1195E2356EBE5216021E52ACBE8EE
:102EC0002B110600CD4D06292929D119E521020033
:102ED0002B110400CD4D0629D1195E2356EBE521B7
:102EE0006021E52ACBE82B110600CD4D06292929C2
:102EF000D119E52103002B110400CD4D0629D1196C
:102F00005E2356EBE5216021E52ACBE82B11060074
:102F1000CD4D06292929D119E52104002B110400E2
:102F2000CD4D0629D1195E2356EBE5CD5A24C9FDB6
:102F3000E1E122BFE8E122C1E8FDE5CD9C14C9FD35
:102F4000E1E122B3E8E122B5E8FDE5CD9C14C9FD3D
:102F5000E1E122A3E8E122A5E8E122A7E8E122A934
:102F6000E8FDE5CD9C14211B00CD2317213D00CDAC
:102F700023172AA9E8E5211F00D119CD23172AA775
:102F8000E8E5211F00D119CD2317CD9C14211B008A
:102F9000CD2317214700CD23172AA3E8CD2317CD32
:102FA0009C14211B00CD2317213D00CD23172AA9F6
:102FB000E8E5211F00D119CD23172AA7E8E52AA5A6
:102FC000E8D119E5211F00D119CD2317CD9C14217B
:102FD0001B00CD2317214700CD2317213000CD231F
:102FE00017C9FDE1E12228DE8E1228FE8E12291E8B5
:102FF000E12293E8E12295E8FDE5CD9C14C9FDE1CD
:10300000E12279E8E1227BE8E1227DE8E1227FE824
10301000FDE52A7FE8E52A7DE8CDDC1FCD9C142163
:103020001B00CD2317214800CD2317213200CD23CB
:1030300172A7FE8E5210100D119E52A7BE8E5217F
:10304000 0100D1EBB7ED52D1CD67067AB3CA723029
10305000D5226FE8CD9C14211B00CD2317214800F9
10306000CD2317213A00CD23172A6FE823D11BC3A4
103070004B30CD9C14211B00CD2317214800CD23BC
103080001721330 0CD23172A7DE8E5210100D1194E
10309000E52A79E8E5210100D1EBB7ED52D1CD6702
1030A000067AB3CAF130D5226FE82A7FE8E52A6FA5
1030B000E8CDDC1FCD9C14211B00CD231721480037
1030C000CD2317213600CD23172A7BE8E52A6FE8A8
1030D000CDDC1FCD9C14211B00CD2317214800CD32
1030E00023172136 00CD23172A6FE823D11BC3A154
1030F000302A7FE8E52A79E8CDDC1FCD9C14211B1E
1031000000CD2317214800CD2317213100CD2317EF
103110002A7FE8E5210100D119E52A7BE8E52101B4
1031200000D1EBB7ED52D1CD67067AB3CA5131D594
10313000226FE8CD9C14211B00CD2317214800CD20
1031400023172 13A00CD23172A6FE823D11BC32A66
1031500031CD9C14211B00CD2317214800CD23170E
10316000213500CD2317C9FDE1E11100000 1020066
```

```
:10317000CD57067D326AE8E1226BE8E1226DE8FD79
:10318000E5CD6C022A6DE8E5CDE72D210100E521B2
:10319000010OCDDC1F2A6AE82600CB45CA0232CDE9
:1031A0005A02210100E5210021E52A6DE82B1108D2
:1031B00000CD4D06292929D119E52104002B110440
:1031C00000CD4D0629D1195E2356EBE5210021E5FE
:1031D0002A6DE82B110800CD4D06292929D119E5C2
:1031E000210200 2B110400CD4D0629D1195E235672
:1031F000EBD1EBB7ED52E5210100D119CDDC1FC3B6
:10320000053 2CD6302210100E52A6BE8D1CD6706C6
:103210007AB3CA3A32D5223FEA21B6EAE52A3FEA32
:10322000115100CD4D06D1196E2600CD9C14CD2331
:10323000172A3FEA23D11BC31032C9FDE1065021F2
:103240001IE8CDE305FDE5210100E5211IE8CD3BC5
:1032500005CDA408D1CD67067AB3CA9D32D5110039
:103260000001000ICD57067D3208E8CD79257DEEBD
:1032700016FCB45CA7A32C36B322111E8E52A08C7
:10328000E82600115100CD4D06D1196E2600E5CD7E
:10329000D2252A08E8260023D11BC35832C92101B0
:1032A0000E5210100E5215000E5211900E5CD5A96
:1032B00024213C00E5211800CDDC1FCD9C14CDBBA2
:1032C000170F5E2057414954494E472E2E2E202080
:1032D0005D211800E5213B00E5211000E5213200C9
:1032E000E5CD4F2F21000011000001020OCD57064F
:1032F0007D320F24CD2025E5CD7827D17DB36F7D9C
:10330000EE016FCB45CA0E33CD442CC3F432CD78D9
:1033100027CB45CA1933C384332101001100000 1B2
:1033200000200CD57067D320F24213C00E521180014
:10333000CDDC1FCD9C14CDBB170F20494E434F4D04
:10334000494E4720434 14C4C20211800E5213C00C8
:10335000E5210E00E5213200E5CD4F2F210500E5E6
:10336000CDE72D2A102426007DEE016FCB45CA84BF
:103370003321204EE5CD34242A2E242600652E014B
:1033800 0E5CD3B32C9210500E5CDE72D210100E562
:10339000210100CDDC1F210000 22FAE9217F00225B
:1033A0005DEACD9E32CD7827CB45CAB033C33737DF
:1033B000CD7C29CD4528CD7827CB45CAC133C3372D
:1033C00037CD7827E5CD7925D17DB36F7DEE016FBF
:1033D000CB45CAD833C3C133CD7925CB45CAE933F0
:1033E0002A30242600E5CDD225215EECCD3B0521F7
:1033F0000100E5210300CD6C08060321EFE9CDE3D0
:10340000521EFE9CD3B05CD4E05037B5A50CD8E0E
:103410006CB45CAAE3421FF00225DEA215EECCD29
:103420003B05210400E5210300CD6C08060321EBD8
:10343000E9CDE305215EECCD3B05210700E5210345
:103440000CD6C08060321E7E9CDE305215EECCD54
:103450003B05210A00E5210400CD6C0806 0421E2A9
:10346000E9CDE305215EECCD3B05210F00E5215EB2
:10347000ECCD3B05CDA408E5210F00D1EBB7ED5213
:1034 8000CD6C08060A21D723CDE305215EECCD3BA8
:10349000 05210E00E5210100CD6C08CD9709110032
:1034A000000 10001CD57067D32F3E9C3ED35217FE0
:1034B0000225DEACD4E05032D202D060321EBE908
:1034C000CDE30521EFE9CD3B05060321E7E9CDE397
:1034D0005CD4E05032D202D060421E2E9CDE3059F
:1034E000215EECCD3B05215EECCD3B05CDA408E58E
```

```
:1034F000210100D1EBB7ED52E5210100CD6C08CDE3
:103500009709110000010001CD57067D32F3E92132
:10351000EFE9E5210200110400CD4D06D1196E2618
:1035200000115A00B7ED52C25435215EECCD3B0577
:10353000210F00E5215EECCD3B05CDA408E521106F
:1035400000D1EBB7ED52CD6C08060A21D723CDE3AD
:1035500005C3ED3519117D00B7ED52C28835215EE6
:10356000ECCD3B05210800E5215EECCD3B05CDA46B
:1035700008E5210900D1EBB7ED52CD6C08060A2110
:10358000D723CDE305C3ED3519113800B7ED52C28D
:10359000BC35215EECCD3B05210400E5215EECCD80
:1035A0003B05CDA408E5210A00D1EBB7ED52CD6C67
:1035B00008060A21D723CDE305C3ED3519113700DD
:1035C000B7ED52C2ED35215EECCD3B05210400E59F
:1035D000215EECCD3B05CDA408E5210C00D1EBB775
:1035E000ED52CD6C08060A21D723CDE30521010059
:1035F000E5210100E5215000E5211900E5CD5A241F
:10360000210300E5210900CDDC1FCD9C14CDBB17A3
:1036100012446F776E6C6F6164696E672066696CC7
:10362000653A202111EACD3B05210000CDAB17CD35
:10363000BB170420746F2021EFE9CD3B052100006A
:10364000CDAB17CDBB170B207465726D696E616CC5
:103650003A2021D723CD3B05210000CDAB17CD9CCF
:1036600014CDBB1713202020536F206661722C20CD
:10367000736F20676F6F642E210900E5210200E55A
:10368000214C00E5213400E5CD4F2F210300E52139
:103690000A00CDDC1FCD9C14CDBB17095265717596
:1036A0006573743A202AF3E92600CD2317CDBB17A2
:1036B0000F205A4150442076657273696F6E3A202C
:1036C00021EBE9CD3B05210000CDAB17CDBB171198
:1036D000204170706C69636174696F6E2049443A6F
:1036E0002021E7E9CD3B05210000CDAB17CDBB176D
:1036F0000720566572733A2021E2E9CD3B0521008F
:1037000000CDAB17213C00E5211800CDDC1FCD9C7E
:1037100014CDBB170F5B204F4E202D4C494E45203A
:103720002020205D211800E5213B00E5211000E567
:10373000213200E5CD4F2FC9210500E5210900CD3B
:10374000DC1FCD9C14CDBB172353657474696E6761
:10375000207570205 36D6172744D6F64656D2E2EEF
:103760002E2020202020202020202020210D006538
:103770002E01E5CD3B3221204EE5CD342421410000
:10378000652E01E5CD3B3221204EE5CD3424215478
:1037900000652E01E5CD3B3221204EE5CD342421BC
:1037A0005A00652E01E5CD3B3221204EE5CD342473
:1037B000210D00652E01E5CD3B3221204EE5CD34B3
:1037C00024214100652E01E5CD3B3221204EE5CD7F
:1037D0003424215400652E01E5CD3B3221204EE5F5
:1037E000CD3424215300652E01E5CD3B3221204EFE
:1037F000E5CD3424213000652E01E5CD3B3221207A
:103800004EE5CD3424213D00652E01E5CD3B32212E
:10381000204EE5CD3424213100652E01E5CD3B322B
:1038200021204EE5CD3424212000652E01E5CD3B3D
:103830003221204EE5CD3424215600652E01E5CD00
:103840003B3221204EE5CD3424213000652E01E5A8
:10385000CD3B3221204EE5CD3424212000652E01C0
:10386000E5CD3B3221204EE5CD3424214500652EA7
```

```
:1038700001E5CD3B3221204EE5CD342421310065D8
:103880002E01E5CD3B32210D00652E01E5CD3B3209
:1038900021204EE5CD3424210500E5210900CDDCB1
:1038A0001FCD9C14CDBB171B536D6172744D6F649B
:1038B00656D20496E697469616C697A6564202060
:1038C000202020021204EE5CD3424210500E52109CA
:1038D0000000CDDC1FCD9C14CDBB171C2020202020248
:1038E0002020202020202020202020202020202020D8
:1038F00020202020202020C9210500E5210900CD1D
:10390000DC1FCD9C14CDBB171D52657374696E67A7
:10391000204D6F64656D2E2E2E20202020202020202B
:103920002020202020202020210D00652E01E5CD3B32F6
:1039300021B80BE5CD342421410652E01E5CD3BB6
:103940003221204EE5CD342421540652E01E5CDF1
:103950003B3221204EE5CD3424215A00652E01E56D
:10396000CD3B3221204EE5CD3424210D00652E01C2
:10397000E5CD3B3221B80BE5CD3424210500E5210E
:10398000900CDDC1FCD9C14CDBB171C4D6F6465A9
:103990006D20526573746564642020202020202033
:1039A00020202020202020202021204EE5CD3424215D
:1039B0000500E5210900CDDC1FCD9C14CDBB171CF3
:1039C000202020202020202020202020202020202020F7
:1039D00020202020202020202020202020C92100007D
:1039E000224DEA210000110000010200CD57067DA2
:1039F000322EEA2103002255EA210D002253EA214A
:103A0000000000110000010200CD57067D3230EACDE2
:103A10004E050C5A41504441303030302E4D454D0634
:103A200008211EACDE305210000110000010200088
:103A3000CD57067D322FEA2100001100000102005F
:103A4000CD57067D322DEA2100001100000102005 1
:103A5000CD57067D322AEACD8F24CDF32C21952235
:103A6000E5210500 2B110600CD4D06D1196E26006B
:103A7000E5210100D1CD8006CB45CA8C3A2100B0AA
:103A8000220924210000220B24C3983A2100B822E5
:103A900009242100002 20B24CD9C1FE5210000D128
:103AA000CD9306CB45CAAE3A2100B8220924CD4EAB
:103AB000050006 0E21FBEECDE305CD4E0500060EFA
:103AC00021ECEECDE305C9219522E52101002B1162
:103AD0000600CD4D06D1196E2600E5210200D1CD9C
:103AE000CD06CB45CA203B219522E52101002B11B3
:103AF0000600CD4D06D119E5219522E52101002BC7
:103B0000110600CD4D06D1196E2600E5210200D127
:103B1000EBB7ED5211000001000 1CD5706EBE17348
:103B2000CD8F24219522E52105002B110600CD4DD6
:103B300006D1196E2600E5210100D1CD8006CB45C6
:103B4000CA4C3B2100B0220924C3523B2100B822B9
:103B500009 24C9210100E5215000D1CD67067AB3BF
:103B6000CAAE3BD522C8E72AC8E7E5210100CDDC73
:103B70001FCD9C14211B00CD2317214800CD2317F6
:103B8000213F00CD23172AC8E7E5211800CDDC1F0F
:103B9000CD9C14211B00CD2317214800CD231721D4
:103BA0003F00CD23172AC8E723D11BC35E3B210268
:103BB0000E5211700D1CD67067AB3CA093CD522AA
:103BC000C8E7210100E52AC8E7CDDC1FCD9C142100
:103BD0001B00CD2317214800CD2317213F00CD2303
:103BE00017215000E52AC8E7CDDC1FCD9C14211B0E
```

```
:103BF00000CD2317214800CD2317213F00CD2317E7
:103C00002AC8E723D11BC3B93B210100E5210400E9
:103C1000E5210200D1EBB7ED52D1CD67067AB3CAE8
:103C2000E83CD522C8E7214021E52AC8E72B11044A
:103C300000CD4D06292929D119E52101002B1104B8
:103C400000CD4D0629D1195E2356EBE5210100D1A7
:103C5000EBB7ED52E5214021E52AC8E72B1104001E
:103C6000CD4D06292929D119E52102002B11040087
:103C7000CD4D0629D1195E2356EBE5210100D1EB8C
:103C8000B7ED52E5214021E52AC8E72B110400CD0C
:103C90004D06292929D119E52103002B110400CD56
:103CA0004D0629D1195E2356EBE5210100D119E516
:103CB000214021E52AC8E72B110400CD4D06292912
:103CC00029D119E52104002B110400CD4D0629D17D
:103CD000195E2356EBE5210100D119E5CDFE2F2A0F
:103CE000C8E723D11BC31D3C213C00E5211800CDB2
:103CF000DC1FCD9C14CDBB170F5B204F46462D4CCF
:103D0000494E4520202020205DC9CD3F022160 21E59C
:103D10002101002B110600CD4D06292929D119E5D5
:103D20002101002B110400CD4D0629D1195E235627
:103D3000EBE5210100D1EBB7ED52E5216021E52152
:103D400001002B110600CD4D06292929D119E521A5
:103D500002002B110400CD4D0629D1195E2356EB2C
:103D6000E5210100D1EBB7ED52E5216021E521010C
:103D700002B110600CD4D06292929D119E5210373
:103D80002B110400CD4D0629D1195E2356EBE519
:103D9000210100D119E5216021E52101002B110647
:103DA00000CD4D06292929D119E52104002B110444
:103DB00000CD4D0629D1195E2356EBE5210100D136
:103DC00019E5CDFE2F210400E5210A00CDDC1FCD31
:103DD0009C14CDBB1728202020202020202020202C
:103DE00020202020202020202020202020202020D3
:103DF00020205A4F4E54414C4B20322E303121045A
:103E000000E5210B00CDDC1FCD9C14CDBB17292074
:103E100020202020202020202020202020202020A2
:103E20002020202020202020202020436F70797269DC
:103E3000676874203139383 5210400E5210C00CD44
:103E4000DC1FCD9C14CDBB172A2020202020202051
:103E500020202020202020202020202020202062
:103E6000202020205666572692D466F6E652C2049F2
:103E70006E632E215000E5211900CDDC1F210900C1
:103E8000E5210D00D1CD67067AB3CAAD3ED522BE7D
:103E9000E72ABEE7E5211A00E5211800E5213400F4
:103EA000E5CD4F2F2ABEE723D11BC3883E21010059
:103EB000E5210A00D1CD67067AB3CAD13ED522BE2C
:103EC000E7211027E5CD34242ABEE723D11BC3B850
:103ED0003E210100E5210100E5215000E521190006
:103EE000E5CD5A24CD3F02C9CD9C14C9CD9C14C93F
:103EF000CD9C14C9CD9C14C9211700E5210300E510
:103F0000214D00E5212000E5210100E5CDE22F2132
:103F100018 00E5210300E5214D00E5212000E52101
:103F20000100E5CDE22FC9CD5A1CFFFF5A41504494
:103F300020202020303030000000000000000000071
:103F4000000000000000000000000000000000071
:103F5000000000000000000000000000000000061
:103F6000000000000000000000000000000000051
```

```
:103F700000000000000000000000000000000000041
:103F800000000000000000000000000000000000031
:103F900000000000000000000000000000000000021
:103FA00000000000000000000000000000000000011
:103FB00000000000000000000000000000000000001
:103FC000000000000000000000000000000000000F1
:103FD000000000000000000000000000000000000E1
:103FE000000000000000000000000000000000000D1
:103FF000000000000000000000000000000000000C1
:10400000000000000000000000000000000000000B0
:10401000000000000000000000000000000000000A0
:104020000000000000000000000000000000000090
:104030000000000000000000000000000000000080
:104040000000000000000000000000000000000070
:104050000000000000000000000000000000000060
:104060000000000000000000000000000000000050
:104070000000000000000000000000000000000040
:104080000000000000000000000000000000000030
:104090000000000000000000000000000000000020
:1040A0000000000000000000000000000000000010
:1040B0000000000000000000000000000000000000
:1040C00000000000000000000000000000000000F0
:1040D00000000000000000000000000000000000E0
:1040E00000000000000000000000000000000000D0
:1040F00000000000000000000000000000000000C0
:10410000000000000000000000000000000000000AF
:104110000000000000000000000000000000000009F
:104120000000000000000000000000000000000008F
:104130000000000000000000000000000000000007F
:104140000000000000000000000000000000000006F
:104150000000000000000000000000000000000005F
:104160000000000000000000000000000000000004F
:104170000000000000000000000000000000000003F
:104180000000000000000000000000000000000002F
:104190000000000000000000000000000000000001F
:1041A000000000000000000000000000000000000F
:1041B00000000000000000C31447CDB741C9CD5A2C
:1041C0001CFFFF5A41504420202020303031000095
:1041D0000000000000000000000000000000000DF
:1041E0000000000000000000000000000000000CF
:1041F0000000000000000000000000000000000BF
:104200000000000000000000000000000000000AE
:1042100000000000000000000000000000000009E
:1042200000000000000000000000000000000008E
:1042300000000000000000000000000000000007E
:10424000000000000000000000000000000FDE190
:10425000E1227AE6FDE52172E5E521000011000189
:10426000CD4D06D119E52A7AE611000001001CDF5
:104270005706EBE1732172E5CD3B0506FF217CE695
:10428000CDE305FDE1217CE6CD3B05FDE5C9210F30
:104290000E521170 0CDDC1FCD9C14CDBB171145C7
:1042A00072726F7273204465746563746564 3A203A
:1042B0002A1324E5210300CD2717CDBB1715202095
:1042C000204572726F727320636F7272656374 65DA
:1042D000643A202A1524E5210300CD2717CDCE17F7
:1042E000210300E5211800CDDC1FCD9C14CDBB17A8
```

:1042F0000B5478206D6F6E69746F723A210300223F
:1043000055EA210D002253EAC9C33A51CD9C14C984
:10431000CD9C14C9CD9C14C9FDE1E1224EE5E122FA
:10432000050E5FDE5CD9C14C9CD9C14C9CD9C14C9A4
:10433000CD9C14C9CD9C14C9CD9C14C9210500E5A0
:10434000CDE72D210100E5210100CDDC1F21ECEEA0
:10435000CD3B050608211AEACDE3052166E4E521F7
:104360001AEACD3B05CD4E05042E55444CCD3E08F2
:10437000CD70132166E4CD00142166E4CDE7177DEE
:10438000EE016FCB45CA41442166E4CDAA14215EFB
:10439000ED0680CD8F16CDAC16210500E52112006B
:1043A000CDDC1FCD9C1421200065 2E01E5213700B6
:1043B000CDAB17210500E5211200CDDC1F215EEDFC
:1043C000CD3B05CD9C14210000CDAB17CDCE1721E0
:1043D0005EEDE5210100118100CD4D06D119E521E9
:1043E00031001100000010001CD5706EBE173215EA1
:1043F000EDCD3B05210100E5215EEDCD3B05CDA4D2
:1044000008E5210100D1EBB7ED52CD6C0806FF2184
:104410005EEBCDE305CD5B2ACD7827CB45CA23449F
:10442000C37644CD322A2A2B242600E521FAE9E579
:10443000CD8326CD6B28CD1029CB45CA1544C37931
:10444000432166E4CD6A14CD9C14CDCE172105001E
:10445000E5211400CDDC1FCD9C14CDBB1718466997
:104460006C6520646F776E6C6F616420636F6D7034
:104470006C6574652E20C9212500E52A5CEB652E4C
:104480001E5CDA309CD3E082A33EA2600652E01B9
:10449000E5CD3E0806FF215EEBCDE305210100E5F9
:1044A000218000D1CD67067AB3CAE144D5225CE40D
:1044B000215EEBCD3B05215DEEE52A5CE42B11800E
:1044C00000CD4D06D1196E2600652E01E5CD3E08C2
:1044D00006FF215EEBCDE3052A5CE423D11BC3A7D5
:1044E00044CD5B2ACD7827CB45CAEF44C31745CDD1
:1044F0009C14212E00CD2317CD6B28CD7827CB45DA
:10450000CA0645C31745CD1029CB45CAE144CD9C09
:1045100014212A00CD2317C9210500E5CDE72D215F
:104520000100E5210100CDDC1F21FBEECD3B05069E
:104530000821 11EACDE305212DEEE521FBEECD3B6F
:1045400005CD4E05042E4D454DCD3E08CD711321B0
:104550009F00225CEB2100002250E4210500E521B0
:1045600001000CDDC1F212DEECD711A212DEEE52A94
:1045700050E4CD701B212DEEE5215DEEE52101001B
:1045800 0E52158EBCDF21A212DEEE52A50E4E52184
:104590000100D119CD701B2130001100001000174
:1045A000CD57067D3233EA2A50E4E5210100D119C6
:1045B000CD8C077DEE016FCB45CACF452131001 16F
:1045C00000000010001CD57067D3233EAC3DB452AE6
:1045D0005CEBE5210100D119225CEB212DEECD4AE7
:1045E0001ACB45CAFE452A33EA2600E5210200D14E
:1045F00019110000010001CD57067D3233EA212D4B
:10460000EECDB11ACD9C14212300CD2317CD7744D4
:10461000CD7827CB45CA1B46C369462A50E4E5211D
:104620000100D1192250E42A33EA2600E5213100A5
:10463000D1CDCD06CB45CA6545CD9C14CDCE172135
:104640000500E5211200CDDC1FCD9C14CDBB171950
:104650004D656D6F727920646F776E6C6F61642049
:10466000636F6D706C657465 2EC9CDF03E210100DD

```
:10467000E5210100E5215000E5211900E5CD5A248E
:10468000CD3F02CD092D2A47E42600E5214400D183
:10469000CD9306CB45CA0247CDF125CB45CABB46D3
:1046A000CD3E2611000001000lCD57067D3235EACE
:1046B0002A35EA2600CD9C14CD2317CDA000CB458A
:1046C000CAFF4621BA00CDAA142146E4CD45162AD8
:1046D00046E42600CD9C14CD2317CD7925CB45CAC1
:1046E000EB462A46E42600E5CDD225CDA000CB45F9
:1046F000CAFF4621BA00CDAA142147E4CD4516C30E
:1047000008646CDF32CCDF43E210500E5CDE72DC93D
:10471000CD9C14C9CD9C14C9210500E5210300E5F9
:10472000211300E5213400E5CD4F2F210500E521BF
:104730001600E5210400E5213000E5CD4F2F210AC8
:1047400000E5210300E5214D00E5212000E52101E0
:1047500000E5CDE22F210000110000010200CD573D
:1047600067D321024CD85332AF3E92600115A0044
:10477000B7ED52C27C47CD1845C3AF4719115000 61
:10478000B7ED52C28C47CD3C43C3AF4719114100 2E
:10479000B7ED52C2AF47CD1845210100110000010D
:1047A0000200CD57067D321024CD8533CD3C43CD5C
:1047B0007827CB45CAE947210500E5CDE72D21053E
:1047C00000E5210E00CDDC1FCD9C14CDBB171A4691
:1047D000696C6520646F776E6C6F616420756E73B1
:1047E000756363657373667566C210000110000001C9
:1047F0000200CD57067D320F2421C800E5CD3424B8
:104800002A2F242600E5CDD225CDF024210100E574
:10481000210100E5215000E5211900E5CD5A2421B0
:104820003C00E5211800CDDC1FCD9C14CDBB170F3B
:104830005B204F46462D4C494E4520202020205D21CF
:104840001800E5213B00E5211000E5213000E5CD11
:104850004F2F210500E5210300E5211300E521701C
:1048600000E5CD4F2F210500E5211600E5210400CC
:10487000E5213400E5CD4F2F210100E5210100E5C0
:10488000215000E5211900E5CD5A24210500E5213C
:104890000900CDDC1FCD9C14CDBB170B446F776E88
:1048A0006C6F61646564202 1FBEECD3B05210000 47
:1048B000CDAB17CDBB17082E4D454D20746F202171
:1048C000E7E9CD3B05210000CDAB17CDBB170A2092
:1048D0007465726D696E616C2021D723CD3B052113
:1048E0000000CDAB17CD9C14CDBB17192020202084
:1048F0002055682D6F682E2E2E20202020202020206D
:10490000202020202020210900E5210200E5214C0083
:10491000E5213400E5CD4F2FC9210500E5CDE72D78
:10492000CD092D21FBEECD3B05CD4E0500CD8E06EC
:10493000CB45CA4A4A210500E5211200CDDC1FCD36
:104940009C1421200 0652E01E5212800CDAB172104
:10495000 0500E5211200CDDC1FCD9C14CDBB171C3A
:10496000456E746572205A4150442042696E6172 2EE
:104970007920666696C656E616D653A2021DDEECD4A
:10498000CC14060ECD8F16CD9C14CDCE1721DDEEA6
:10499000CD3B05210100E5210800CD6C08060E2164
:1049A000FBEECDE305212DEEE521FBEECD3B05CD64
:1049B0004E05042E4D454DCD3E08CD7113212DEEF3
:1049C000CD711ACDF21FE5210000D1CD8006110076
:1049D00000010200CD57067D3225E42A25E4260099
:1049E0007DEE016FCB45CA404A210500E521110 04B
```

```
:1049F000CDDC1FCD9C14212000652E01E52128006F
:104A0000CDAB17CD1C20210500E5211100CDDC1F09
:104A1000CD9C14CDBB170546696C652021FBEECDFE
:104A20003B05210000CDAB17CDBB170E2E4D454DDC
:104A3000206E6F7420666F756E64CDCE17CD1C200E
:104A40002A25E42600CB45CA354921ECEECD3B05AD
:104A5000CD4E0500CD8E06CB45CA7E4B210500E527
:104A6000211400CDDC1FCD9C14212000652E01E512
:104A7000212800CDAB17CD1C20210500E521140015
:104A8000CDDC1FCD9C14CDBB171D456E7465722007
:104A9000444F574E4C4F41442E55444C2066696C50
:104AA000656E616D653A20CD1C2021DDEECDCC1404
:104AB000060ECD8F16CD1C20CD9C14CDCE17CD1C4F
:104AC0002021DDEECD3B05210100E5210800CD6C64
:104AD0008060E21ECEECDE305212DEEE521ECEEEE
:104AE000CD3B05CD4E05042E55444CCD3E08CD7131
:104AF00013212DEECD711ACDF21FE5210000D1CD8D
:104B0000800611000010200CD57067D3225E42AFF
:104B100025E426007DEE016FCB45CA744B210500CC
:104B2000E5211300CDDC1FCD9C14212000652E0152
:104B3000E5212800CDAB17CD1C20210500E5211370
:104B400000CDDC1FCD9C14CDBB170546696C6520DC
:104B500021ECEECD3B05210000CDAB17CDBB170EF0
:104B60002E55444C206E6F7420666F756E64CDCEEA
:104B700017CD1C202A25E42600CB45CA5C4A21011A
:104B800000E5210100E5215000E5211900E5CD5A9D
:104B9000242105 00E5211100CDDC1FCD9C1421202E
:104BA00000652E01E5212800CDAB17CDCE17CD1C19
:104BB00020210500E5211200CDDC1FCD9C14212011
:104BC00000652E01E5212800CDAB17CDCE17CD1CF9
:104BD00020210500E5211300CDDC1FCD9C142120F0
:104BE00000652E01E5212800CDAB17CDCE17CD1CD9
:104BF00020210500E5211400CDDC1FCD9C142120CF
:104C000000652E01E5212800CDAB17CDCE17CD1CB8
:104C100020212000E5210300CDDC1FCD9C142120A4
:104C200000652E01E5211B00CDAB17CD1C202120F6
:104C300000E5210300CDDC1FCD9C14CDBB17125A1B
:104C400041504420426961727920666696C653A10
:104C50002021FBEECD3B05210000CDAB17CD1C2064
:104C6000212000E5210400CDDC1FCD9C1421200073
:104C7000652E01E5211B00CDAB17CD1C20212000A6
:104C8000E5210400CDDC1FCD9C14CDBB17115A418A
:104C9000504420415343434949 2066696C653A2021BC
:104CA000ECEECD3B05210000CDAB17CD1C20CDF3A4
:104CB0002C210500E5CDE72DC9210200E5CDE72D2A
:104CC000210400E5210300CDDC1FCD8502CD9C141D
:104CD000CDCE17CD1C20CD9C14212000652E01E5E2
:104CE000213D00CDAB17CDBB170E20205A4F4E549F
:104CF000414C4B20322E3031CDCE17CD1C20CD9CD7
:104D000014212000652E01E5213D00CDAB17CDBB60
:104D1000170F20436F707972696768742031 3938D2
:104D200035CDCE17CD1C20CD9C14212000652E0141
:104D3000E5213D00CDAB17CDBB171020566572693C
:104D40002D466F6E652C20496E632ECDCE17CD1C7F
:104D500020210000110000010200CD57067D322500
:104D6000EA210100E5210100E5215000E5211900BB
```

```
:104D7000E5CD5A24C92105002241EA210500E5219B
:104D800000300E5211300E5213400E5CD4F2F210577
:104D900000E5211600E5210400E5213000E5CD4FB6
:104DA0002FCDE83E21080011050OCD273FCD194940
:104DB0002A32EA2600E5214400D1CD9306CB45CA2C
:104DC0008C4E210500E5CDE72D21390011000001B1
:104DD0000001CD57067D3232EA210100E5210100B4
:104DE000CDDC1F213E00E5210700CDDC1F2132EA8A
:104DF000CDCD14CD4516CD1C20213E00E521070068
:104E0000CDDC1FCD9C14CDBB1703202020CD1C2052
:104E10002A32EA2600113B00B7ED52C2244ECDBA29
:104E2000041C3894E19113D00B7ED52C2344ECD6ACF
:104E3000046C3894E19113E00B7ED52C2444ECD38DB
:104E400037C3894E19113F00B7ED52C2544ECD18E9
:104E500047C3894E19114000B7ED52C2644ECDF8D8
:104E600038C3894E19114200B7ED52C2894ECD4E5A
:104E700000500060E21FBEECDE305CD4E0500060E26
:104E80021ECEECDE305CD1949C3B04D210500E578
:104E9000CDE72DCD3F02CDB94C210000110500CD4D
:104EA000273FCD533B210500E5210300E5211300F9
:104EB000E5213000E5CD4F2F210500E5211600E565
:104EC000210400E5213400E5CD4F2FC9CD9C14CD40
:104ED0001C20C9CD9C14CD1C20C9CD9C14CD1C20F8
:104EE000C9CD9C14CD1C20C92A2FEA2600CB45CA67
:104EF000F84ECD3443C3C14FCDE83E210100E5213A
:104F00000100E5215000E5211900E5CD5A242114C6
:104F100000E5211400CDDC1FCD9C14CDBB17225021
:104F20006C6561736520436F6E6669726D202D201C
:104F3000457869742074 6F20444F533F20592F4E99
:104F40003ACD1C2021BA00CDAA142131EACD451654
:104F5000CD1C202A31EA2600E5215F00D17CA26722
:104F60007DA36F223FEA2A3FEAE5215900D1CD8097
:104F70006CB45CA894F210100110000010200CD76
:104F80057067D322EEAC39B4FCD3F02CDB94C214F
:104F900000000110500CD273FCD533B210700E5213F
:104FA000300E5211300E5213000E5CD4F2F210757
:104FB00000E5211600E5210400E5213400E5CD4F90
:104FC0002FC9210100E5210100E5215000E521194B
:104FD0000E5CD5A242A2FEA2600CB45CA79502A6B
:104FE00053EAE5210100D1192253EA2A53EAE521C7
:104FF0004F00D1CD8006CB45CA52502A55EAE52153
:105000000A00CDDC1FCD9C1421DB00CD2317CD1C65
:10501000202A55EAE5210100D1192255EA210D0087
:105020002253EA2A57EAE5210100D1192257EA2A38
:1050300057EAE5210A00D1CD8006CB45CA52502A55
:1050400000D242600CB45CA4F50CD754DC35250CDCF
:105050003443 2A2AEA2600CB45CA7950214E00E57E
:10506000211800CDDC1FCD9C14210100E5CD4E425E
:10507000210000CDAB17CD1C20210000224DEAC934
:105080002A4DEAE5210100D119224DEA2A4DEAE52F
:10509000210200D1CD8006CB45CA9F50CDC24F2101
:1050A000100E5210100E5215000E5211900E5CDD1
:1050B0005A24CD442C210100E5210100CDDC1FCD77
:1050C000A000CB45CA8050C9213F0022CDE3213B3F
:1050D0000E5214400D1CD67067AB3CA2751D52215
:1050E000CFE32ACDE3E5210100D11922CDE3CD9C08
```

```
:1050F00014211B00CD2317217A00CD23172ACDE3DD
:10510000CD2317211B00CD23172ACFE3CD23172151
:105110000D00CD2317217F00CD2317CD1C202ACFD2
:10512000E323D11BC3D950CD9C14211B00CD2317E1
:10513000214E00CD2317CD1C20C9213E00E52107BB
:1051400000CDDC1F2132EACDCD14CD4516CD1C207B
:10515000213E00E5210700CDDC1FCD9C14CDBB17FF
:10516000032020CD1C202A32EA2600113F00B760
:10517000ED52C27B51CD754DC3885119114400B712
:10518000ED52C28851CDE84E210100E5210100E534
:10519000215000E5211900E5CD5A24210100E52127
:1051A0000100CDDC1FC9CD4E0500060E21FBEECD62
:1051B000E305CD4E050006032 1E7E9CDE305CD4E1D
:1051C0000500060A21D723CDE305CDC850CDDD3932
:1051D000CD3F02CD093DCDB94C210000110500CDD8
:1051E000273FCD533B2A2FEA2600CB45CAF8512151
:1051F00003002241EAC3FE512101002241EACD0908
:10520000432A2EEA2600CB45CAE551CD092DCD3FD4
:105210002CD9C14211B00CD2317214F00CD231755
:10522000CD1C20C3D520CD4E0500060E21FBEECDB2
:10523000E305CD4E0500060321E7E9CDE305CD4E9C
:105240000500060A21D723CDE305CDC850CDDD39B1
:10525000CD3F02CD093DCDB94C210000110500CD57
:10526000273FCD533B2A2FEA2600CB45CA1976218A
:1052700003002241EAC3ED512101002241EACD0998
:0000000000
```

Overlay 0

```
:10010000210100E5CDE72D210400E5210300CDDC30
:100110001FCD8502CD9C14CDBB1716202020202 09A
:100120002020202020202020204865 6C702020 46318F
:1001300020211B00CD2317214800CD23172136 0095
:10014000CD2317CDBB170520463220 20CD9C14CDE2
:10015000BB171653657475702020202020202020A6
:1001600020202020202020202020CDCE17210300E5B4
:10017000210400CDDC1FCD9C14CDBB1717202020FF
:1001800055706C6F61642F446F776E6C6F61642083
:1001900020463320211B00CD2317214800CD2317F3
:1001A000213600CD2317CDBB1705204634 2020CDA6
:1001B0009C14CDBB1716566965772 04C6F67204697
:1001C000696C6520202020202020202020CDCE172102
:1001D0000300E5210500CDDC1FCD9C14CDBB171716
:1001E00020202020205A415044204 46F776E6C6FAD
:1001F000616420204635 20211B00CD2317214800B3
:10020000CD2317213600CD2317CDBB170520463649
:100210002020CD9C14CDBB1713566965772046690 5
:100220006C652044697265637 46F7279CDCE172155
:100230000300E5210600CDDC1FCD9C14CDBB1717B4
:1002400056696577204 46F776E6C6F616420496EE4
:10025000666F2020463720211B00CD231721480040
:10026000CD2317213600CD2317CDBB1705204638E7
:100270002020CD9C14CDBB17174D6F6E69746F7223
:100280002054726 16E736D697373696F6E202020E4
:10029000CDCE17210300E5210700CDDC1FCD9C1436
:1002A000CDBB1717202020205669657720496E7630
```

```
:1002B000656E746F72792020463920211B00CD2392
:1002C00017214800CD2317213600CD2317CDBB17AA
:1002D000052046313020CD9C14CDBB171845786 9D8
:1002E0007420746F20444F53202020202020202091
:1002F00020202020202103 00E5210700D1CD670622
:100300007AB3CA5C41D5228CE72A8CE7E521160036
:10031000E5210900E5213400E5CD4F2F2A8CE723A4
:10032000D11BC33741C900000000000000000000DD
:1003300000000000000000000000000000000000BD
:1003400000000000000000000000000000000000AD
:10035000000000000000000000000000000000009D
:10036000000000000000000000000000000000008D
:10037000000000000000000000000000000000007D
:10038000CD9C14C900000000000000000000000027
:10039000000000000000000000000000000000005D
:1003A000000000000000000000000000000000004D
:1003B000000000000000000000000000000000003D
:1003C000000000000000000000000000000000002D
:1003D000000000000000000000000000000000001D
:1003E000000000000000000000000000000000000D
:1003F00000000000000000000000000000000000FD
:10040000CD9C14C9000000000000000000000000A6
:1004100000000000000000000000000000000000DC
:1004200000000000000000000000000000000000CC
:1004300000000000000000000000000000000000BC
:1004400000000000000000000000000000000000AC
:10045000000000000000000000000000000000009C
:10046000000000000000000000000000000000008C
:10047000000000000000000000000000000000007C
:10048000CD9C14C900000000000000000000000026
:10049000000000000000000000000000000000005C
:1004A000000000000000000000000000000000004C
:1004B000000000000000000000000000000000003C
:1004C000000000000000000000000000000000002C
:1004D000000000000000000000000000000000001C
:1004E000000000000000000000000000000000000C
:1004F00000000000000000000000000000000000FC
:100500002101 00E5CDE72D210400E5210300CDDC2C
:100510001FCD6C02CD9C14CDBB171620202020 20AF
:100520002020202020202020 48656C70202046318B
:1005300020211B00CD2317214800CD231721360091
:10054000CD2317CDBB1705204632 2020CD9C14CDDE
:10055000BB17172020202020202020202020202012
:1005600020202020202020202020CDCE1721030075
:10057000E5210400CDDC1FCD9C14CDBB1717202036
:1005800020202020205A41504420557 06C6F616417
:100590002020463320211B00CD2317214800CD23E6
:1005A000172136 00CD2317CDBB17052046342020 58
:1005B000CD9C14CDBB1717202020202020202020E8
:1005C0002020202020202020202020202020CDCED0
:1005D00017210300E5210500CDDC1FCD9C14CDBB08
:1005E0001717202020204265676 96E20446F776EC0
:1005F0006C6F616420204635 20211B00CD2317211C
:100600004800CD2317213600CD2317CDBB17052079
:1006100046362020CD9C14CDBB1717202020202 04B
:1006200020202020202020202020202020202020CA
:100630002020CDCE17210300E5210600CDDC1FCD03
```

```
:1006400009C14CDBB17172020202020202020202004
:1006500020202020202020202020463720211B0081
:10066000CD23172148 00CD2317213600CD2317CDE8
:10067000BB17052046382020CD9C14CDBB1717434F
:1006800068616E67652046696C65204E616D6573B3
:100690002020202020CDCE17210300E5210700B7
:1006A000CDDC1FCD9C14CDBB1717202020202020 8F
:1006B0002020202020202020202020202020204639FB
:1006C00020211B00CD23172148 00CD2317213600000
:1006D000CD2317CDBB17052046313020CD9C14CD3E
:1006E000BB17124D61696E204D656E75202020206C
:1006F000202020202020210100E5210100E5215000DB
10070000E5211900E5CD5A24210300E5210700D198
:10071000CD67067AB3CA6F41D5228CE72A8CE7E50C
10072000211600E5210900E5213400E5CD4F2F2AEF
:100730008CE723D11BC34A41CD8502C900000000CC
:1007400000000000000000000000000000000000A9
:100750000000000000000000000000000000000099
100760000000000000000000000000000000000089
:100770000000000000000000000000000000000079
10078000CD9C14C9000000000000000000000000023
:100790000000000000000000000000000000000059
1007A0000000000000000000000000000000000049
:1007B0000000000000000000000000000000000039
1007C0000000000000000000000000000000000029
1007D0000000000000000000000000000000000019
1007E0000000000000000000000000000000000009
:1007F00000000000000000000000000000000000F9
10080000CD9C14C900000000000000000000000A2
10081000000000000000000000000000000000000D8
10082000000000000000000000000000000000000C8
10083000000000000000000000000000000000000B8
10084000000000000000000000000000000000000A8
1008500000000000000000000000000000000000098
1008600000000000000000000000000000000000088
1008700000000000000000000000000000000000078
0000000000
```

ↃVERLAY 1

```
:10010000CD9C14C9000000000000000000000000A9
:100110000000000000000000000000000000000000DF
:100120000000000000000000000000000000000000CF
:100130000000000000000000000000000000000000BF
:100140000000000000000000000000000000000000AF
:1001500000000000000000000000000000000000009F
:1001600000000000000000000000000000000000008F
:1001700000000000000000000000000000000000007F
:10018000CD9C14CDCE17C9000000000000000000077
:1001900000000000000000000000000000000000005F
:1001A00000000000000000000000000000000000004F
:1001B00000000000000000000000000000000000003F
:1001C00000000000000000000000000000000000002F
:1001D00000000000000000000000000000000000001F
:1001E00000000000000000000000000000000000000F
:1001F0000000000000000000000000000000000000FF
:0000000000
```

What is claimed is:

1. In a method for operating a local terminal which includes a local computer system comprising a central processor unit, a read only memory coupled to said central processor unit, a random access memory coupled to said central processor unit, and a communication channel coupled to said central processor unit for communicating with a remote computer system, the steps of:

a. establishing a set of general purpose operation routines to be executed by said local computer system, each of said general purpose operation routines comprising a set of instructions for execution by said central processor unit in a prearranged manner to accomplish a specific task;

b. storing said set of general purpose operation routines in said read only memory;

c. defining a set of commands where each command of said set of commands is associated with a specific general purpose operation routine and including at least an operation code of a plurality of operation codes relating said command to said specific general purpose operation routine, each of said commands having an associated command code length which is either equal to or, in most cases, substantially less than the code length of said specific general purpose operation routine;

d. establishing at said remote computer system at least one application program module comprising a prearranged sequence of said commands;

e. communicating said application program module from said remote computer system to said local computer system via said communication channel, including the step of storing for each of said set of commands said operation code associated with said prearranged sequence of commands in said random access memory; and f. establishing in said local computer system a program execution routine for enabling said central processor unit to execute said application program module by repetitively performing the steps of:

(1) reading said associated operation code stored in said random access memory;

(2) accessing a specific general purpose operation routine associated with said read operation code; and (3) executing said specific general purpose operation routine.

2. In a method for operating a local terminal which includes a local computer system comprising a central processor unit, a read only memory coupled to said central processor unit, a random access memory coupled to said central processor unit, and a communication channel coupled to said central processor unit for communicating with a remote computer system, the steps of:

a. defining a set of different specific tasks to be carried out by said local computer system;

b. establishing a set of general purpose operation routines to be executed by said local computer system, each comprising a set of instructions for execution by said central processor unit in a prearranged manner to accomplish one of said specific tasks;

c. storing said set of general purpose operation routines in said read only memory;

d. defining a set of commands where each command of said set of commands is associated with a specific one of said general purpose operation routines and including at least an operation code relating said command to said specific general purpose operation routine, each of said commands having an associated command code length which is either equal to or, in most cases, substantially less than the code length of said associated general purpose operation routine;

e. establishing at said remote computer system at least one application program module comprising a prearranged sequence of said commands defining a desired functional feature for said local terminal;

f. communicating said application program module from said remote computer system to said local computer system via said communication channel, including the step of storing for each of said set of commands said operation code associated with said prearranged sequence of commands in said random access memory; and g. establishing in said local computer system a program execution routine for enabling said central processor unit to execute said application program module by repetitively performing the steps of:

(1) reading said associated operation code stored in said random access memory;

(2) accessing a specific general purpose operation routine associated with said associated operation code; and (3) executing said specific general purpose operation routine.

3. In a method for operating a local terminal to perform a set of predefined functions, said local terminal including a local computer system comprising a central processor unit, a read only memory coupled to said central processor unit, a random access memory coupled to said central processor unit, and a communication channel coupled to said central processor unit for communicating with a remote computer system, and input means for selecting one of said predefined functions, the steps of:

a. establishing a set of general purposes operation routines to be executed by said local computer system, each of said general purpose operation routines comprising a set of instructions for execution by said central processor unit in a prearranged manner to accomplish a specific task;

b. storing said set of general purpose operation routines in said read only memory;

c. defining a set of commands where each command of said set of commands is associated with a specific general purpose operation routine and including at least an operation code relating said commands to said specific general purpose operation routine, each of said commands having an associated command code length which is either to or, in most cases, substantially less than the code length of said specific general purpose operation routine;

d. establishing at said remote computer system a plurality of application programs, each of said application programs comprising a different set of application program modules which together define a different set of predefined functions for a local terminal to perform, each of said application program modules comprising a prearranged sequence of said set of commands to provide one of said predefined functions;

e. communicating a preselected application program from said remote computer system to said local computer system via said communication channel, including the step of storing for each of said set of commands said operation code associated with said prearranged sequence of commands in each of said application program modules of said preselected application program in said random access memory; and f. establishing in said local computer system a program execution routine for enabling said central processor unit to execute a selected one of said application program modules in response to said input means by repetitively performing the steps of:

(1) reading said associated operation code associated with said selected application program module stored in said random access memory;

(2) accessing a specific general purpose operation routine associated with said associated operation code; and (3) executing said specific general purpose operation routine.

4. The method of claim 1, wherein said step a. includes the steps of:

(1) establishing as a first one of said general purpose operation routines a START PROGRAM routine comprising machine instructions for calling for execution of a specified application program module;

(2) and establishing as a second one of said general purpose operation routines a WAIT routine comprising machine instructions for suspending execution of an application program module in which an operation code corresponding to said WAIT routine appears;

step d. comprises establishing a plurality of application program modules each comprising a sequence of said operation code, at least a first one of said application program modules including an operation code associated with said START PROGRAM routine for calling for execution of a specified second one of said application program modules, and at least one of said first and second application program modules including an operation code associated with said WAIT routine;

said method further comprising the steps of:

g. defining a program data structure format comprising a plurality of data elements associated with execution of an application program module by said program execution routine;

h. establishing in said random access memory an array storage area for storing a program data structure array comprising a plurality of application program module slots each having said program data structure format;

i. establishing in said random access memory an area for storing scheduler data program structures comprising a WAIT data element for storing define "wait" or "continue" data values, and a plurality of ACTIVE PROGRAM data elements each associated directly with one of said program slots in said program data structure array and storing one of two defined data values indicating whether or not said associated program slot contains data elements associated with an active application program module;

j. establishing in said local computer system a program scheduling routine for enabling said central processor unit to carry out the step of scheduling the sequential execution of application program modules one at a time based on the data values stored in said ACTIVE PROGRAM data elements, said execution of each active application program module continuing until said WAIT data element contains a wait data value or until the currently executing application program module has completed its execution;

said START PROGRAM routine including instructions for loading one of said ACTIVE PROGRAM data elements with a data value indicating presence of an active application program module and for loading into said array storage are of said random access memory a corresponding program data structure associated with said application program module called for execution by said routine; and said WAIT operation routine including instructions for storing said "wait" data value in said wait data element of said scheduler data structure.

5. The method of claim 4, wherein said program data structure array established in step h. is a fixed array with a fixed number of application program module slots;

said ACTIVE PROGRAM data elements in said scheduler data structure established in step i. comprise an ACTIVE PROGRAM fixed bitmap data structure with each bit location in said bitmap corresponding to as associated application program module slot in said program data structure array and storing one of a first bit value or a second bit value indicating the presence or absence, respectively, of an active application program module in the associated application program module slot;

said START PROGRAM routine includes a parameter specifying which application program module slot should be utilized for storing data structures for execution of said associated application program module.

6. The method of claim 5, wherein said wait data element established in step i. may also store a defined "HALT" data value; said step a. further includes the step of:

(3) establishing as another one of said general purpose operation routines a DONE routine comprising instructions for loading said wait data element with a HALT data value and loading the bit location in the ACTIVE PROGRAM bitmap of the application program module which includes said DONE routine with said second bit value indicating the absence of an active application program module in the associated application program module slot;

and each of said application program modules which completes execution without branching to another application program module includes an operation code corresponding to said DONE routine as a last command therein.

7. The method of claim 6, wherein said scheduler data structure established in step i. further comprises a BACKGROUND bitmap having bit locations corresponding to application program module slots in said program data structure array established in step h. and storing one of first or second bit values indicating whether the active application program module in a corresponding bit location in the ACTIVE PROGRAM bitmap has a background or foreground attribute;

said program data structure array established in step h. includes a first slot which comprises a main slot into which data structures for a main application program module are loaded;

said DONE routine includes instructions for loading all bit locations in said ACTIVE PROGRAM bitmap with said second bit value indicating the absence of an active application program module except those bit locations corresponding to bit locations in said BACKGROUND bitmap having a first bit value indicating a background attribute for said active application program module; and said step a. includes the step of:

(4) establishing as another one of said general purpose operation routines a START BACKGROUND routine comprising instructions for calling for execution of a specified application program module in a specified slot number with background attribute, including instructions to load the bit location in said ACTIVE PROGRAM bitmap with a first bit value indicating an active application program module in the specified slot number and to load the bit location in said BACKGROUND bitmap with a first bit value indicating a background attribute for said active application program module.

8. The method of claim 4, wherein said local terminal includes at least one other input device coupled to said central processor unit in addition to said communication channel;

said scheduler data structure established in step i. further comprises a plurality of REALTIME PROGRAM data elements each associated with one of said program data structures in said program data array and storing in a specific bit location one of two data values indicating whether or not an active application program module in a corresponding slot of said program data structure array is waiting for input from one of said communication channel or said other input device;

said step a. includes the steps of:

(3) establishing a plurality of said general purpose operation routines include machine instructions utilizing inputs from said communication channel or said other input device; and (4) establishing at least one general purpose operation routine which includes instructions for loading the bit location in said REALTIME PROGRAM data element corresponding to the application program module in which said general purpose operation routine is executed with a data value indicating that said application program module is waiting for input from said communication channel or said other input device;

and said scheduling program routine established in step j. enables said central processor unit to carry out the steps of:

(1) determining whether any input from said communication channel or said other input device is waiting to be read;

(2) when input is not waiting to be read, performing said step of scheduling the sequential execution of active application program modules one at a time based solely on the data values stored in said ACTIVE PROGRAM data elements in said schedule data structures, said execution of each active application program module continuing until said WAIT routine is executed or until said program module has completed execution;

(3) when input is waiting to be read, performing the steps of:

(a) reading an input from said communication channel or said input device; and (b) scheduling the execution of only said active application program modules having a data value in a corresponding REALTIME PROGRAM data element which indicates that said application program module is waiting for input until said read input is used by one of said application program modules and then returning to said step (1) above.

9. The method of claim 8, wherein said data structure format defined in step g. includes a plurality of DEVICE data elements each associated with said communication channel or said other input device and storing one of a first or a second data value indicating whether or not the specified application program module needs input from said communication channel or said other input device;

said step a. includes the step of:

(4) establishing as one of said general purpose operation routines a NEED INPUT routine which includes instructions for loading a specified set of said DEVICE data elements in an associated application program module with said first data value indicating that said application program module needs input from said communication channel or said other input device;

and said step (b) includes the steps of:

scheduling for execution one at a time in sequence each of said application program modules having a first data value in the corresponding REALTIME PROGRAM data element;

examining the DEVICE data element corresponding to the source of said input in said program data structure associated with each scheduled application program module to determine whether or not said scheduled application program module needs said read input;

if said DEVICE data element indicates that said read input is needed, proceeding to execute said scheduled application program module; and if said DEVICE data element indicates that said read input is not needed, returning to step above to schedule the next appropriate application program module.

10. The method of claim 1, wherein said step a. includes the steps of:

(1) establishing a subset of parameter dependent general purpose operation routines, each of said parameter dependent general purpose operation routines including instructions that use a predefined set of parameters, including a subset of parameters that are required to be supplied by an associated one of said set of commands, each of said parameters comprising one or both of a parameter address or a parameter value; and (2) establishing for each of said parameter dependent general purpose operation routines a set of parsing routines for determining the address and value of each parameter in said subset of parameters;

said step c. includes the step of:

defining a subset of parameter dependent commands, each of said parameter dependent commands being associated with one of said parameter dependent general purpose operation routines and including both a defined operation code and an ordered list of parameter types corresponding to said subset of parameters required to be supplied by said command;

said step d. includes the step of:

establishing for each use of said parameter dependent commands in said application program module an ordered list of actual parameter specifiers corresponding to said ordered list of parameter types;

said step e. includes the step of:

storing, in association with each of said set of commands of said operation code associated with a parameter dependent command, said ordered list of actual parameter specifiers;

said step f. (3) includes first performing with respect to each of said actual parameter specifiers the steps of:

(a) reading said parameter specifiers;

(b) executing an associated one of said parsing routines to obtain the address and value of said parameter;

(c) storing said parameter address and value;

followed by the step of executing said associated operation routine using one or both of said parameter address and value for each of said parameters.

11. The method of claim 1 where said general purpose operation routines have a specification of parameters, further comprising the steps of:

g-11. defining a set of data types that may be used to satisfy said specification of parameters utilized in said general purpose operation routines;

h-11. defining a set of parameter types that may be utilized in said general purpose operation routines, including defining for each of said parameter types an associated subset of said data types which may be used to satisfy said parameter types and a corresponding set of different data type values which may be utilized to specify said data types in said subset; one group of said parameter types being non-varying parameter types having an associated subset of only one of said data types, and another group of said parameter types being varying parameter types having an associated subset of a plurality of said data types;

i-11. establishing a set of data type parsing routines each comprising a set of instructions for obtaining at least the address and value of a parameter satisfied by an associated one of said data types;

j-11. establishing a set of parsing control routines each associated with one of said parameter types and comprising instructions for selectably executing one of a subset of said data type parsing routines corresponding to said associated subset of said data types, said subset having a single member when a parsing control routine is associated with one of said non-varying parameter types;

k-11. establishing a set of associated command parsing modules where each associated command parsing module is associated with at least one of said general purpose operation routines and comprising instructions for calling the execution of a subset of said parsing control routines in pre-established ordered sequence, said subset being a null subset in the case of each of said general purpose operation routines that do not utilize any of said parameter types;

l-11. storing each of said data type parsing routines, said parsing control routines, and said command parsing modules in said read only memory;

and wherein said step a. includes the steps of:

(1) establishing for each of said general purpose operation routines an operation routine which utilizes one or both of the address and value of a subset of said parameter types, said subset being null in the case of each operation routine that does not require any command specified parameters;

(2) incorporating into each of said general purpose operation routines a specific command parsing module; and said step b. includes the step of:

storing said operation routine for each of said general purpose operation routines in prearranged relation to said specific command parsing module;

said step c. includes the step of:

defining for each of said commands a subset of said parameter types in an ordered list corresponding to one of said ordered sequences, said subset being a null subset when each command associated with an operation routine has an associated null subset of parameter types;

said step d. includes the step of:

establishing for each use of each of said commands in said application program module a subset of actual parameter type specifiers which are in the form of an ordered list and a set of data type data elements which are in the form of an ordered sequence of data elements corresponding to varying parameter types in said ordered list of actual parameter type specifiers, each of said data type data elements having a value designating which of said data types said actual parameter type specifiers are associated with;

said step e. includes the step of:

storing said ordered list and said ordered sequence established for each usage of each command in said random access memory in predetermined relation to said operation code;

said step f. (3) includes the steps of:

(a) first executing said associated command parsing module, including executing associated parsing control routines and data type parsing routines based on said ordered sequence to obtain the address and value of each parameter required by said operation routine; and (b) storing the address and value of each of said parameters as they are obtained through execution of said data type parsing routines in prearranged locations in said random access memory; and (c) then executing said operation routine associated with one of said general purpose operation routine utilizing one or both of said address and value of each of said parameters.

12. The method of claim 11, wherein said data type parsing routines, said parsing control routines, said command parsing modules, and said operation routines are stored in separate areas of said read only memory with each of said routines having a predetermined starting address;

said step c. comprises the steps of:

(1) assigning to each of said general purpose operation routines operation codes comprising a numerical value in sequential numerical order; and (2) establishing an operation code jump table comprising a sequential listing of a first and a second address element for each of said operation codes in the same numerical order as said assigned order of operation code values, the first address element comprising the starting address of an associated one of said command parsing modules and the second address element comprising the starting address of an associated one of said operation routines;

said step f. (2) comprises looking up in said operation code jump table the first address element at the position in said jump table corresponding to said numerical value of said operation code; and said step f. (3) (a) comprises executing the associated one of said command parsing modules located at said first address element looked up in said operation code jump table; and said step f. (3) (c) comprises executing the one of said operation routines located at said second address element following said first address element.

13. The method of claim 12, wherein a plurality of said general purpose operation routines have a set of associated parameters comprising a null set; one of said command parsing modules comprises a null command parsing module which calls a null set of parsing control routines and returns to carry out step f. (3) (c).

14. The system of claim 1, wherein said step b. comprises storing each of said general purpose operation routines at a prearranged location within said read only memory having an associated starting memory address;

said step c. comprises the steps of:

(1) assigning to each of said general purpose operation routines an operation code comprising a numerical value in sequential numerical order; and (2) establishing an operation code jump table comprising a sequential listing of said starting memory address for each of said operation codes; and wherein said step f.(2) comprises looking up in said operation code jump table the starting memory address of said associated general purpose operation routine at the listing in said jump t able corresponding to said numerical value of said operation code and said step f.(3) comprises the step of sequentially executing the instructions stored in said read only memory beginning at said starting memory address.

15. The system of claim 1, further comprising the step of:

g-15. defining an operation code system comprising a plurality of opcode sets and a plurality of corresponding opcodes within each of said sets, such that each operation code comprises an opcode set designation and an opcode designation;

h-15. defining an object code command syntax comprising at least one data element having a set of possible values each designating one of said opcode sets and at least a second data element having a set of possible values each designating one of said operation codes;

and wherein said step c. includes the steps of:

(1) assigning each of said commands to a specific one of said opcode sets and assigning to each of said commands in each opcode set a different opcode in sequential numerical order;

(2) establishing a set of associated opcode jump tables each corresponding to one of said opcode sets and comprising a sequential listing of operation routine pointers each comprising starting memory addresses for the general purpose operation routines associated with the commands assigned to said corresponding opcodes;

(3) storing said set of opcode jump tables in said read only memory at prearranged starting addresses for each of said tables in said set;

(4) establishing an opset pointer table comprising a sequential listing of said starting memory addresses for said associated opcode jump tables; and (5) storing said opset pointer table in said read only memory at a prearranged starting address;

said step e. includes the step of:

storing said one data element and said second data element in associated locations in said random access memory;

said step f. includes establishing a command execution data structure including an opset data structure element and an opcode data structure element; said step f.(1) includes the steps of:

(a) reading said one data element and storing the read value in a opset data structure element; and (b) reading said second data element and storing the read value in said opcode data structure element;

and said step f.(2) includes the steps of:

(a) calculating the pointer address of an opset pointer from said starting memory addresses of said opset pointer table and said value stored in said opset data structure element;

(b) reading the value stored at said pointer address;

(c) calculating the opcode pointer address of said opcode pointer from said read value and said value stored in said opcode data structure element; and (d) reading the value stored at said opcode pointer address:

and said step f.(3) comprises the step of:

executing the general purpose operation routines stored in read only memory at the addresses corresponding to the read value at said pointer address.

16. The method of claim 1 wherein said general purpose operation routines have a specification of parameters, further comprising the steps of:

g-16. defining a set of data types that may be used to satisfy said specification of parameters utilized in said general purpose operation routines;

h-16. defining a set of parameter types that may be utilized in said general purpose operation routines, including defining for each of said parameter types an associated subset of said data types which may be used to satisfy said parameter types and a corresponding set of different data type values which may be utilized to specify said data types in said subset; one group of said parameter types being non-varying parameter types having an associated subset of only one of said data types; and another group of said parameter types being varying parameter types having an associated subset of a plurality of said data types;

i-16. establishing a set of data type parsing routines each comprising a set of instructions for obtaining the address and value of a parameter satisfied by an associated one of said data types;

j-16. establishing a set of parsing control routines each associated with one of said parameter types and comprising instructions for selectably executing one of a subset of said data type parsing routines corresponding to said associated subset of said data types, said subset having a single member when a parsing control routine is associated with one of said non-varying parameter types;

k-16. establishing a set of command parsing modules each associated with at least one of said general purpose operation routines and comprising instructions for executing of a subset of said parsing control routines in pre-established ordered sequences, said subset being a null subset when each of said general purpose operation routines do not utilize any of said parameter types;

l-16. storing each of said data type parsing routines, said parsing control routines, and said command parsing modules in said read only memory;

g-16. defining an operation code system comprising a plurality of opcode sets and a plurality of opcodes within each of said sets, such that each operation code comprises an opcode set designation and an opcode designation;

h-16. defining a object code command syntax comprising a set of bitmap bytes, a set of opcode bytes, and a set of parameter type specifier bytes, each of said bitmap bytes and said opcode bytes having a set of common bit positions comprising a byte-type flag and storing a first numeric value in each bitmap byte and a second numeric value in each opcode byte, each of said bitmap bytes also having a set of common bit positions comprising opset specifier data elements and a plurality of sets of common bit positions comprising data type data elements; each of said opcode bytes having a set of common bit positions comprising opcode specifier data elements; said opset specifier data elements in said set of bitmap bytes together identifying the opcode set of the command as a particular one of said opcode sets, said data type data elements in said set of bitmap bytes together identifying the data type values for all varying parameter types in the command that do not comprise the default data type value; said opcode specifier data elements in said set of opcode bytes together identifying the opcode of the command as one of said opcodes;

and wherein said step a. includes the steps of:

(1) establishing for each of said general purpose operation routines an operation routine which utilizes a subset of said parameter types, said subset being null for each operation routine that does not requires any command specified parameters;

(2) incorporating into each of said general purpose operation routines one of said command parsing modules; and said step b. includes the step of:

storing said operation routine for each of said general purpose operation routines in prearranged relation to said command parsing modules associated therewith;

said step c. includes the step of:

(1) defining for each of said commands a subset of said parameter types in an ordered list corresponding to one of said ordered sequences of parsing control routines in one of said command parsing modules, said subset being a null subset when each command associated with an operation routine has an associated null subset of parameter types;

(2) assigning each of said commands to a specific one of said opcode sets and assigning to each said command in each opcode set a different opcode in sequential numerical order;

(3) establishing a set of opcode jump tables each corresponding to one of said opcode sets and comprising a sequential listing of operation routine pointers each comprising starting memory addresses for the one of said general purpose operation routines associated with the command assigned to said corresponding opcode;

(4) storing said set of opcode jump tables in said read only memory at prearranged starting addresses for each of said tables in said set;

(5) establishing an opset pointer table comprising a sequential listing of said starting memory addresses for said opcode jump tables; and (6) storing said opset pointer table in said read only memory at a prearranged starting address;

said step d. includes the step of:

establishing for each use of each of said commands in said application program module object code commands in accordance with said object code command syntax;

said step e. includes the step of:

storing each of said object code commands in said application program module in said random access memory;

said step f. includes establishing a command execution data structure including an opset data structure element, an opcode data structure element, an array of data type data structure elements, an array of parameter address and value data structure elements, a variable parameter tracking data element, and a current parameter tracking data element;

said step f.(1) includes the step of:

decoding said set of bitmap bytes and said set of opcode bytes to obtain an opset value and store said opset value in said opset data structure element, to obtain an opcode value and store said opcode value in said opcode data structure element, and to obtain data type values and store data type values of all of said data type data elements in individual ones of said data type data structure elements;

and said step f.(2) includes the steps of:

(a) calculating the address of an opset pointer from said starting address of said opset pointer table and said value stored in said opset data structure element;

(b) reading the value stored at said opset pointer address;

(c) calculating the address of said opcode pointer from said read opset pointer value and said value stored in said opcode data structure element; and (d) reading the value stored at said opcode pointer address as the address of the one of said general purpose operation routines associated with said command;

said step f.(3) includes the steps of:

(a) first executing said command parsing module associated with said general purpose operation routine at said address read in step f.(2) (d) above, including executing associated parsing control routines and data type parsing routines based on said data type values stored in said data type data structure elements to read the parameter types in said object code command and to obtain the address and value of each parameter required by said operation routine; and (b) storing the address and value of each of said parameters as they are obtained through execution of said data type parsing routines in individual ones of said parameter and address data structure elements;

(c) then executing said operation routines associated with said general purpose operation routines utilizing one or both of said address and value of each of said parameters.

17. In a method for programming a local terminal, the steps of:

establishing a tokenized interpretive programming language having a plurality of commands and corresponding syntax including a source level command and parameter syntax, an associated object level command and parameter syntax including a defined operation code for each of said commands, a program module structure, application modules and a compiler for translating source level commands in said application modules to said object level command capable of being assembled and linked into binary code;

establishing a set of operation routines for execution by said terminal to perform a set of terminal tasks;

storing said operation routines in said local terminal;

defining a set of commands using said source level command and parameter syntax, each being associated with one of said operation routines;

creating an application program comprising a sequence of said source level command in accordance with said program module structure;

compiling said application program using said compiler;

assembling and linking said program using a standard machine code assembler and linker program;

communicating said program to said terminal for storage in local memory therein; and operating said terminal using said application program.

18. The method of claim 17, wherein said step of compiling comprises the steps of establishing a first section of compiled code comprising a fixed code structure that defines the environment of the application program and a variable code structure that comprises portions of the application program that vary with the content of the program created in said creating step whereby said assembling and linking step creates a corresponding fixed binary code section and a variable binary code section;

and said step of communicating said application program comprises first communicating said fixed binary code section and storing it at the local terminal and then communicating said variable binary code section and storing it in the local terminal;

said fixed binary code section stored in said local terminal providing information for accessing portions of said application program in said variable binary code section stored in said local terminal while performing said step of operating said terminal using said application program.

* * * * *